US012042095B2

(12) United States Patent
Ozana et al.

(10) Patent No.: US 12,042,095 B2
(45) Date of Patent: Jul. 23, 2024

(54) SINGLE-USE FOOD PREPARATION CONTAINER ASSEMBLIES, SYSTEMS AND METHODS

(71) Applicant: BLIX LTD., Valletta (MT)

(72) Inventors: Shalom Ozana, Or Akiva (IL); Ariel Sterngold, Jerusalem (IL); Marcel Hendrikus Simon Weijers, Assen (NL); Andreas Jacobus Louis Nijsen, Enschede (NL); Johannes Gabriel Kuster, Enschede (NL); Joris Bronkhorst, Enschede (NL); Hans Constant Dikhoff, Eindhoven (NL); Sybren Yme Leijenaar, Sint Nicolaasga (NL); Krijn Maltha, Dokkum (NL)

(73) Assignee: BLIX LTD., Valletta (MT)

( * ) Notice: Subject to any disclaimer, the term of this patent is extended or adjusted under 35 U.S.C. 154(b) by 792 days.

(21) Appl. No.: 16/632,053

(22) PCT Filed: Jan. 16, 2018

(86) PCT No.: PCT/IL2018/050057

§ 371 (c)(1),
(2) Date: Jan. 17, 2020

(87) PCT Pub. No.: WO2019/016790

PCT Pub. Date: Jan. 24, 2019

(65) Prior Publication Data

US 2020/0229646 A1 Jul. 23, 2020

Related U.S. Application Data

(60) Provisional application No. 62/533,743, filed on Jul. 18, 2017.

(30) Foreign Application Priority Data

Jul. 20, 2017 (WO) .................. PCT/IL2017/050823

(51) Int. Cl.
*A47J 43/046* (2006.01)
*A47G 19/22* (2006.01)
(Continued)

(52) U.S. Cl.
CPC ........ *A47J 43/046* (2013.01); *A47G 19/2205* (2013.01); *A47J 43/0716* (2013.01);
(Continued)

(58) Field of Classification Search
CPC ........ A47J 43/046; A47J 43/04; A47J 43/042; A47J 43/044; A47J 43/07; A47J 43/10;
(Continued)

(56) References Cited

U.S. PATENT DOCUMENTS 3,704,864 A * 12/1972 Lee ....................... B01F 27/808 366/205
3,785,579 A * 1/1974 Voglesonger ....... A47J 43/0766 241/282.1

(Continued)

FOREIGN PATENT DOCUMENTS

CN 1832698 A 9/2006
CN 101184420 A 5/2008

(Continued)

OTHER PUBLICATIONS

U.S. Appl. No. 62/364,491, filed Jul. 20, 2016.

(Continued)

*Primary Examiner* — J. Gregory Pickett
*Assistant Examiner* — Abigail Elizabeth Guidry
(74) *Attorney, Agent, or Firm* — Sughrue Mion, PLLC

(57) ABSTRACT

A product preparation system and method wherein a single-use product container assembly, including a cup body and a
(Continued)

cup closure, the cup closure including a rotatable blade, and a container processor including a container support and an electric motor including a drive shaft are employed to process contents of the container assembly.

18 Claims, 437 Drawing Sheets

(51) Int. Cl.
*A47J 43/07* (2006.01)
*B65D 47/08* (2006.01)
*B65D 51/16* (2006.01)
*B65D 55/02* (2006.01)

(52) U.S. Cl.
CPC ..... *B65D 47/0847* (2013.01); *B65D 47/0852* (2013.01); *B65D 51/16* (2013.01); *B65D 55/026* (2013.01); *B65D 2401/05* (2020.05); *B65D 2401/15* (2020.05)

(58) Field of Classification Search
CPC .... A47J 2043/04409; A47J 2043/04418; A47J 2043/04427; A47J 43/1006; A47J 43/1018; A47J 43/1031; A47G 19/2205; A47G 19/2272; A47G 19/2222; B65D 47/0847; B65D 47/0852; B65D 51/16; B65D 55/026; B65D 2401/15; B65D 51/165; B65D 85/8046; A23N 17/02; B01F 33/501; B01F 33/5011; B01F 33/50115; B01F 33/5014
See application file for complete search history.

(56) References Cited

U.S. PATENT DOCUMENTS 4,355,446 A 10/1982 Shimajiri et al.
4,446,979 A 5/1984 Gach et al.
D313,975 S 1/1991 Horie
D315,335 S 3/1991 Frischer
D334,564 S 4/1993 Basara et al.
D349,888 S 8/1994 Yamamoto et al.
D352,910 S 11/1994 Yamamoto et al.
D352,911 S 11/1994 Yamamoto et al.
5,432,306 A * 7/1995 Pfordresher ............ A47J 43/07 181/208
5,823,672 A * 10/1998 Barker ................ A47J 43/0722 366/205
5,960,709 A * 10/1999 Yip ......................... B26D 3/22 241/199.12
6,179,139 B1 * 1/2001 Heilman ............. B65D 55/066 215/901
6,450,363 B1 * 9/2002 Lin .................... A47G 19/2261 220/759
6,641,298 B2 * 11/2003 Safont .................. A47J 43/082 366/331
D501,759 S * 2/2005 Sands ........................... D7/378
7,422,362 B2 * 9/2008 Sands .................. A47J 43/046 366/205
7,600,706 B2 * 10/2009 Huang ................ A47J 43/0777 241/37.5
8,038,338 B2 * 10/2011 Maleiro Vilarino ........................ A47J 43/0705 366/601
8,113,379 B2 2/2012 Cai et al.
8,794,822 B2 8/2014 Serra
9,333,659 B2 * 5/2016 Schillheim ............. A47J 17/02
9,770,697 B2 9/2017 Denize et al.
9,924,837 B1 * 3/2018 Trojan ................ A47J 43/0716
10,278,542 B2 * 5/2019 Wolf .................... A47J 43/0711
10,399,050 B1 9/2019 Bertsch
10,399,050 B1 9/2019 Bertsch
D872,777 S 1/2020 Rashid
10,730,026 B2 * 8/2020 Hoare ................... B01F 27/808
11,124,335 B1 * 9/2021 Mahan ............... B65D 43/0212
11,325,274 B1 * 5/2022 Leung ................. B26D 7/2614
11,369,230 B2 * 6/2022 Guyatt .................... A47J 43/07
D959,912 S * 8/2022 Kuo .............................. D7/509
11,559,170 B2 * 1/2023 Ozana ..................... B01F 27/88
2002/0048215 A1 4/2002 McGill
2002/0127307 A1 * 9/2002 McGill ............... A47J 43/0716 426/115
2005/0047272 A1 * 3/2005 Sands ................ A47J 43/0716 366/205
2005/0193896 A1 * 9/2005 McGill ................ A47J 43/0711 99/348
2006/0176770 A1 * 8/2006 Sands .................. A47J 43/046 366/205
2006/0209627 A1 * 9/2006 McGill ............... A47J 43/0727 366/205
2007/0200018 A1 * 8/2007 Leung ................. A47J 43/0711 241/199.12
2007/0291585 A1 * 12/2007 Sivers .................. A47J 43/082 366/253
2008/0037360 A1 * 2/2008 McGill .................. A23G 9/224 366/208
2009/0308265 A1 * 12/2009 Obersteiner ........ A47J 43/0755 366/314
2010/0191823 A1 7/2010 Archer et al.
2010/0208549 A1 8/2010 Kitson
2010/0302897 A1 * 12/2010 George ............... B01F 27/1125 366/130
2010/0308046 A1 12/2010 Serra
2012/0152131 A1 6/2012 Sands
2013/0121105 A1 5/2013 Denize et al.
2014/0286123 A1 * 9/2014 Arnett .................. B01F 27/808 366/205
2015/0098298 A1 * 4/2015 Sapire ................ A47J 43/0716 366/144
2015/0098299 A1 * 4/2015 Sapire ................ A47J 43/0777 366/205
2015/0102046 A1 * 4/2015 Steininger .......... A47G 19/2272 251/331
2016/0000266 A1 * 1/2016 Potter .................. A47J 43/085 241/199.12
2016/0012465 A1 * 1/2016 Sharp .................. G06Q 20/321 705/14.17
2016/0220071 A1 * 8/2016 Hewitt .................. B65D 81/38
2016/0244250 A1 * 8/2016 Dolan, Jr. .......... B65D 85/8058
2016/0288963 A1 10/2016 D'amato
2017/0086621 A1 * 3/2017 Bascom .............. A47J 43/0722
2017/0135516 A1 * 5/2017 Fantappiè ........... A47J 31/3638
2017/0208998 A1 * 7/2017 Dickson, Jr. ........ A47J 43/0716
2017/0251866 A1 * 9/2017 Garcia ................ A47J 31/4403
2017/0340170 A1 11/2017 Brunner
2018/0073915 A1 * 3/2018 Finnance .............. A47J 43/046
2018/0140137 A1 * 5/2018 Barnard ................ A47J 43/046
2018/0279833 A1 * 10/2018 Lin ....................... A47J 43/042
2019/0000275 A1 * 1/2019 Sapire ................ A47J 43/0722
2019/0069725 A1 * 3/2019 Wang ................. A47J 43/0722
2019/0075950 A1 * 3/2019 Xu ......................... B65D 51/16
2019/0144231 A1 * 5/2019 Redivo ................ B26D 7/0006 83/549
2019/0282034 A1 9/2019 Ozana et al.
2019/0382191 A1 * 12/2019 Orler .................. B65D 85/8055
2020/0113388 A1 * 4/2020 Sapire ................... F16F 1/3842
2020/0121115 A1 * 4/2020 Oh ...................... A47J 31/0652
2020/0229646 A1 7/2020 Ozana et al.
2020/0281409 A1 * 9/2020 Bannister ............. A47J 43/046
2021/0078776 A1 3/2021 Sterngold et al.
2021/0145217 A1 * 5/2021 Roberts ................ A47J 43/0711
2021/0177210 A1 * 6/2021 Tu ....................... A47J 43/0722
2021/0347558 A1 * 11/2021 Footz ................ B65D 85/8067
2022/0073239 A1 3/2022 Sterngold et al.

FOREIGN PATENT DOCUMENTS

CN 101188960 A 5/2008
CN 201205232 3/2009

(56) References Cited

FOREIGN PATENT DOCUMENTS

| | | | | |
|---|---|---|---|---|
| CN | 201527370 U | | 7/2010 | |
| CN | 201755125 | | 3/2011 | |
| CN | 201822691 U | | 5/2011 | |
| CN | 201958462 U | | 9/2011 | |
| CN | 201987257 | | 9/2011 | |
| CN | 102249036 A | | 11/2011 | |
| CN | 102933291 A | | 2/2013 | |
| CN | 202829556 | | 3/2013 | |
| CN | 203138026 | | 8/2013 | |
| CN | 104042131 A | | 9/2014 | |
| CN | 104488367 A | | 4/2015 | |
| CN | 104523123 | | 4/2015 | |
| CN | 204654559 | | 9/2015 | |
| CN | 205083231 | | 3/2016 | |
| CN | 106395129 A | | 2/2017 | |
| DE | 6939265 U | | 1/1970 | |
| DE | 19602147 A1 | * | 7/1997 | ......... A47G 19/2205 |
| DE | 202021105571 U1 | * | 12/2021 | ......... A47G 19/2272 |
| EP | 2676539 | | 12/2013 | |
| EP | 3766394 A1 | * | 1/2021 | .......... A47J 43/0727 |
| EP | 4014810 | | 6/2022 | |
| JP | H0958716 | | 3/1997 | |
| JP | 2001-520901 A | | 11/2001 | |
| JP | 2008-545467 A | | 12/2008 | |
| JP | 2011-188763 A | | 9/2011 | |
| JP | 2015-62461 A | | 4/2015 | |
| JP | 5777833 B1 | | 9/2015 | |
| JP | 5777833 B1 | | 9/2015 | |
| JP | 2015-226780 A | | 12/2015 | |
| KR | 1020020056761 | | 7/2002 | |
| KR | 10-2009-0008837 A | | 1/2009 | |
| KR | 10-2009-0008837 A | | 1/2009 | |
| KR | 1020100107653 | | 10/2010 | |
| KR | 2020120001706 | | 3/2012 | |
| KR | 2020130004955 | | 8/2013 | |
| WO | WO-0013563 A1 | * | 3/2000 | .......... A47J 43/0716 |
| WO | 00/76875 | | 12/2000 | |
| WO | 00/76875 A1 | | 12/2000 | |
| WO | 2001/030663 | | 5/2001 | |
| WO | 02/28735 A1 | | 4/2002 | |
| WO | WO-2006041584 A2 | * | 4/2006 | .......... B41J 2/17506 |
| WO | WO-2006083420 A2 | * | 8/2006 | ......... A47G 19/2272 |
| WO | 2006/126009 A2 | | 11/2006 | |
| WO | 2008/068416 A2 | | 6/2008 | |
| WO | WO-2010041179 A2 | * | 4/2010 | ........... B65D 65/466 |
| WO | WO-2012030168 A2 | * | 3/2012 | ............ A47J 43/046 |
| WO | WO-2014110381 A1 | * | 7/2014 | ......... A47G 19/2205 |
| WO | 2015/081381 A1 | | 6/2015 | |
| WO | 2015/128091 A1 | | 9/2015 | |
| WO | 2016/067074 A1 | | 5/2016 | |
| WO | 2016/067074 A1 | | 5/2016 | |
| WO | 2018/015962 | | 1/2018 | |
| WO | WO-2018104813 A1 | * | 6/2018 | ............ A47J 43/046 |
| WO | WO-2018191773 A1 | * | 10/2018 | ............ A47J 43/046 |
| WO | 2019/016790 | | 1/2019 | |
| WO | 2019/142182 | | 7/2019 | |
| WO | 2020/148742 | | 7/2020 | |

OTHER PUBLICATIONS

U.S. Appl. No. 62/383,639, filed Sep. 6, 2016.
U.S. Appl. No. 62/533,743, filed Jul. 18, 2017.
U.S. Appl. No. 62/340,648, filed May 24, 2016.
An Invitation to pay additional fees dated Jan. 15, 2019, which issued during the prosecution of Applicant's PCT/IL2019/050056.
An International Search Report and a Written Opinion both dated Jun. 19, 2019, which issued during the prosecution of Applicant's PCT/IL2019/050056.
An International Search Report and a Written Opinion both dated Jul. 10, 2019, which issued during the prosecution of Applicant's PCT/IL2019/050374.
An International Search Report and a Written Opinion both dated Jun. 6, 2018, which issued during the prosecution of Applicant's PCT/IL2018/050057.
An International Search Report and a Written Opinion both dated Dec. 5, 2017, which issued during the prosecution of Applicant's PCT/IL2017/050823.
An International Preliminary Report on Patentability dated Jan. 22, 2019, which issued during the prosecution of Applicant's PCT/IL2017/050823.
An Office Action dated Mar. 21, 2019, which issued during the prosecution of U.S. Appl. No. 29/624,319.
An International Preliminary Report on Patentability dated Jan. 21, 2020, which issued during the prosecution of Applicant's PCT/IL2018/050057.
European Search Report dated Feb. 10, 2020, which issued during the prosecution of Applicant's European App No. 17830613.0.
An Office Action summarized English translation and Search Report dated May 6, 2022, which issued during the prosecution of Chinese Patent Application No. 201980015733.3.
European Search Report dated May 16, 2022 which issued during the prosecution of Applicant's European App No. 22156559.1.
Notice of Allowance dated May 31, 2022, which issued during the prosecution of Japanese Patent Application No. 2019-524547.
An Office Action dated Jun. 27, 2022, which issued during the prosecution of Australia Patent Application No. 2017301047.
An International Preliminary Report on Patentability dated Jul. 21, 2020, which issued during the prosecution of Applicant's PCT/IL2019/050056.
An Office Action together with summarized English translation dated Feb. 1, 2023, which issued during the prosecution of Korea Patent Application No. 10-2023-7001110.
An Office Action summarized English translation and Search Report dated Apr. 6, 2022, which issued during the prosecution of Chinese Patent Application No. 201880047466.3.
An Office Action summarized English translation and Search Report dated Mar. 22, 2023 which issued during the prosecution of Chinese Patent Application No. 202111170014.4.
Notice of Allowance dated Nov. 23, 2022, which issued during the prosecution of Australia Patent Application No. 2017301047.
European Search Report dated Dec. 7, 2022 which issued during the prosecution of Applicant's European App No. 19910439.9.
An Office Action dated Sep. 7, 2022, which issued during the prosecution of U.S. Appl. No. 16/956,792.
An Office Action summarized English Translation dated Feb. 10, 2023, which issued during the prosecution of Brazilian Application No. BR112019000975-2.
An Office Action dated Mar. 23. 2023, which issued during the prosecution of U.S. Appl. No. 16/956,792.
Notice of Allowance dated Nov. 23, 2022, which issued during the prosecution of U.S. Appl. No. 16/318,627.
Notice of Allowance dated Sep. 29, 2022, which issued during the prosecution of U.S. Appl. No. 16/318,627.
An Office Action dated Nov. 12. 2020, which issued during the prosecution of Indian Patent Application No. 201917005158.
An Office Action summarized English translation and Search Report dated Nov. 17. 2021, which issued during the prosecution of Chinese Patent Application No. 201780057822.5.
An Office Action dated Apr. 27. 2022, which issued during the prosecution of U.S. Appl. No. 16/318,627.
Notice of Allowance dated Sep. 18, 2019, which issued during the prosecution of U.S. Appl. No. 29/624,319.
European Search Report dated Apr. 14, 2021, which issued during the prosecution of Applicant's European App No. 18836047.
An International Preliminary Report on Patentability dated Jun. 16, 2021, which issued during the prosecution of Applicant's PCT/IL2019/050374.
An Office Action together with summarized English translation dated Sep. 1, 2022, which issued during the prosecution of Korea Patent Application No. 10-2022-7023412.
Partial European Search Report dated Sep. 6, 2022 which issued during the prosecution of Applicant's European App No. 19910439.9.
An Office Action dated Sep. 2, 2022, which issued during the prosecution of Australia Patent Application No. 2017301047.
An Office Action dated Jul. 13, 2022, which issued during the prosecution of U.S. Appl. No. 16/318,627.

(56) References Cited

OTHER PUBLICATIONS

An Office Action summarized English translation and Search Report dated Jul. 1, 2021, which issued during the prosecution of Chinese Patent Application No. 201780057822.5.
An Office Action summarized English translation and Search Report dated May 18, 2021, which issued during the prosecution of Chinese Patent Application No. 201880047466.3.
An Office Action dated Jul. 20, 2021, which issued during the prosecution of Japanese Patent Application No. 2019-524547.
An Office Action dated Jun. 17, 2021, which issued during the prosecution of Brazilian Patent Application No. BR1120190009752.
An Office Action together with summarized English translation dated Sep. 1, 2022, which issued during the prosecution of Korea Patent Application No. 10-2022-7023412.
Partial European Search Report dated Sep. 6, 2022 which issued during the prosecution of Applicant's European App No. 19910439.9.
An Office Action dated Sep. 2, 2022, which issued during the prosecution of Australia Patent Application No. 2017301047.
An Office Action dated Jul. 13, 2022, which issued during the prosecution of U.S. Appl. No. 16/318,627.
An Office Action summarized English translation and Search Report dated Nov. 25, 2021, which issued during the prosecution of Chinese Patent Application No. 201980015733.3.
Partial European Search Report dated Nov. 12, 2021 which issued during the prosecution of Applicant's European App No. 19740812.3.

* cited by examiner

Figure 57A:
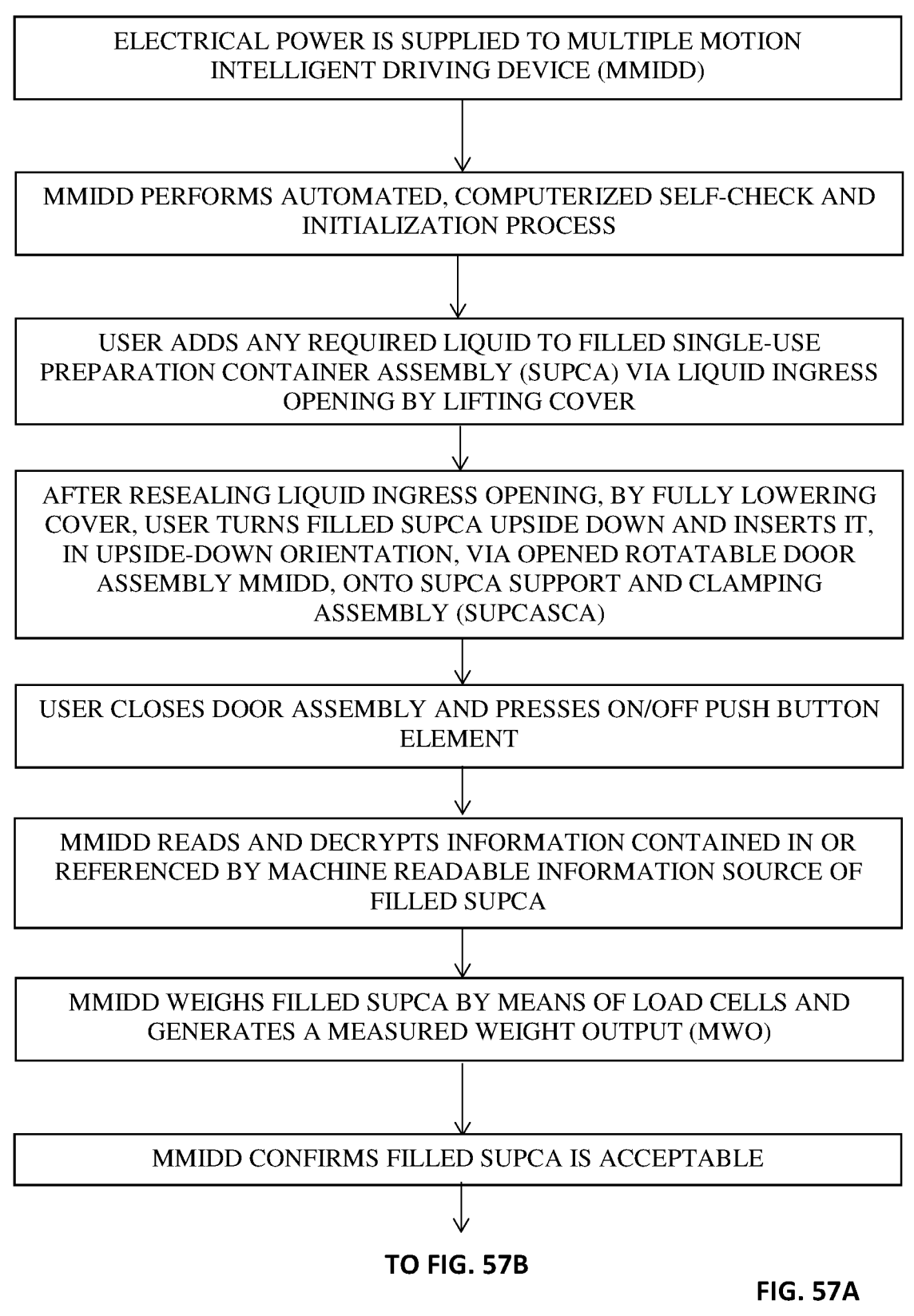

ELECTRICAL POWER IS SUPPLIED TO MULTIPLE MOTION INTELLIGENT DRIVING DEVICE (MMIDD)

↓

MMIDD PERFORMS AUTOMATED, COMPUTERIZED SELF-CHECK AND INITIALIZATION PROCESS

↓

USER ADDS ANY REQUIRED LIQUID TO FILLED SINGLE-USE PREPARATION CONTAINER ASSEMBLY (SUPCA) VIA LIQUID INGRESS OPENING BY LIFTING COVER

↓

AFTER RESEALING LIQUID INGRESS OPENING, BY FULLY LOWERING COVER, USER TURNS FILLED SUPCA UPSIDE DOWN AND INSERTS IT, IN UPSIDE-DOWN ORIENTATION, VIA OPENED ROTATABLE DOOR ASSEMBLY MMIDD, ONTO SUPCA SUPPORT AND CLAMPING ASSEMBLY (SUPCASCA)

↓

USER CLOSES DOOR ASSEMBLY AND PRESSES ON/OFF PUSH BUTTON ELEMENT

↓

MMIDD READS AND DECRYPTS INFORMATION CONTAINED IN OR REFERENCED BY MACHINE READABLE INFORMATION SOURCE OF FILLED SUPCA

↓

MMIDD WEIGHS FILLED SUPCA BY MEANS OF LOAD CELLS AND GENERATES A MEASURED WEIGHT OUTPUT (MWO)

↓

MMIDD CONFIRMS FILLED SUPCA IS ACCEPTABLE

FROM FIG. 57A

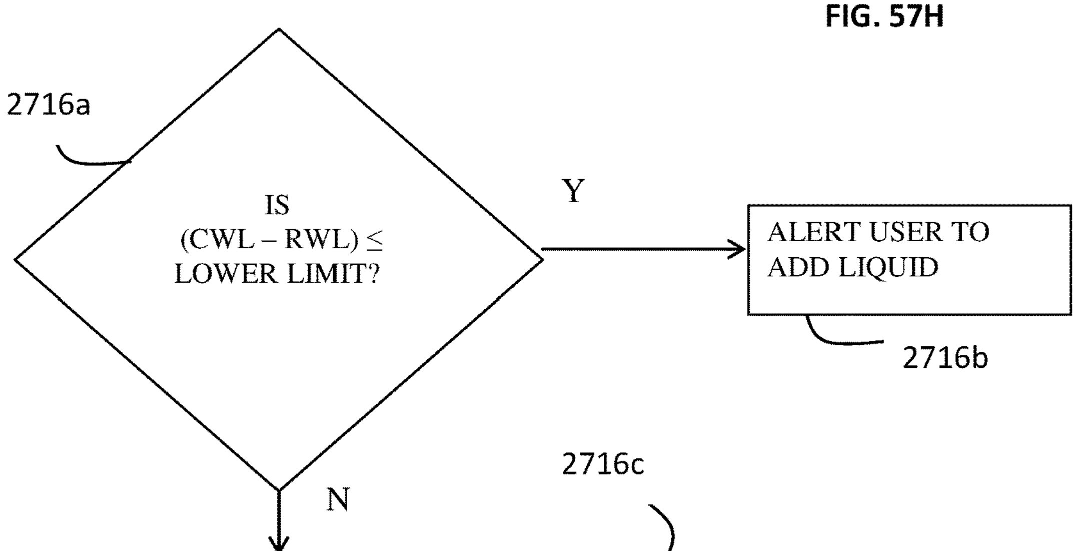

CALCULATE
LWOP = ((CWL – RWL)/RWL)*100

| IF | THEN |
|---|---|
| 0 < LOWP< 5% | OPERATE IN ACCORDANCE WITH PROCESS RECIPE |
| 5% < LWOP< 10% | RPM = 80% OF INTENDED RPM<br>TIME = 90% OF INTENDED TIME |
| 10% < LWOP< 15% | RPM = 70% OF INTENDED RPM<br>TIME = 85% OF INTENDED TIME |
| 15% < LWOP< 20% | RPM = 60% OF INTENDED RPM<br>TIME = 85% OF INTENDED TIME |
| LWOP>20% | RPM = 60% OF INTENDED RPM<br>TIME = 60% OF INTENDED TIME |
| -5%<LWOP<0 | OPERATE IN ACCORDANCE WITH PROCESS RECIPE |
| -10%<LWOP<-5% | RPM = 100% OF INTENDED RPM<br>TIME = 120% OF INTENDED TIME |
| LWOP<-10% | ADDITIONAL LIQUID REQUIRED |

2716d

STORE PROCESS RECIPE AS MODIFIED

TO STEP 2718 IN FIG. 57C

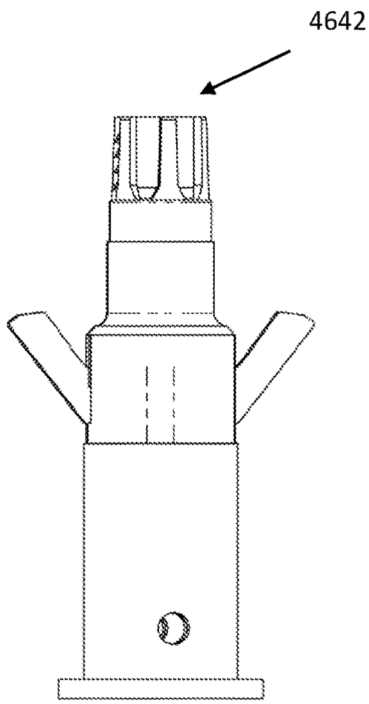
FIG. 76A
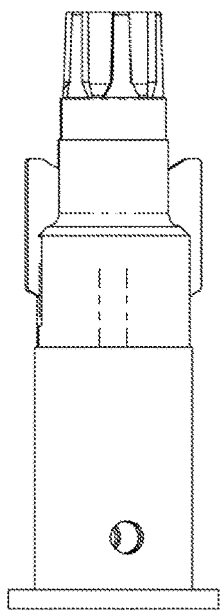
FIG. 77A
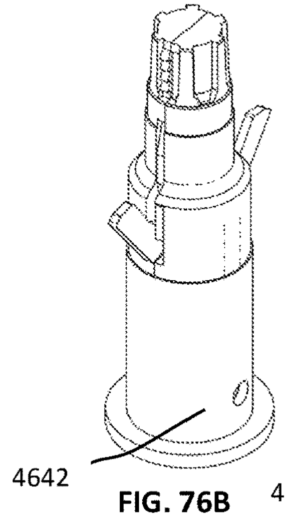
FIG. 76B
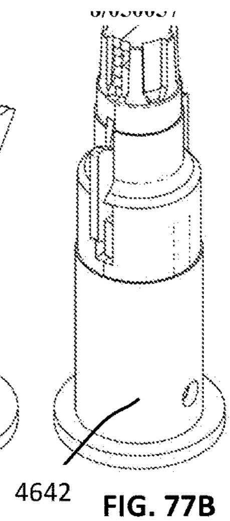
FIG. 77B
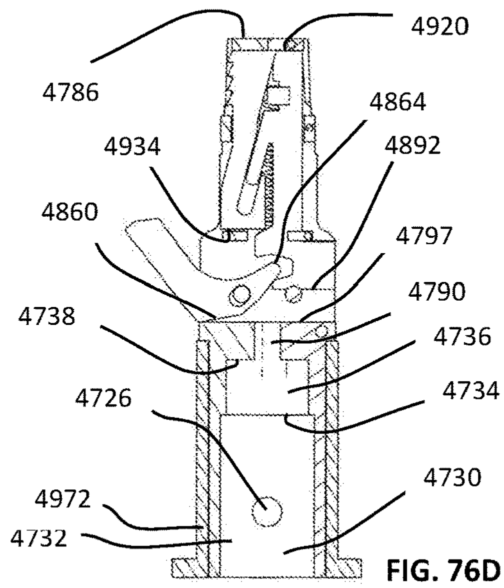
FIG. 76D
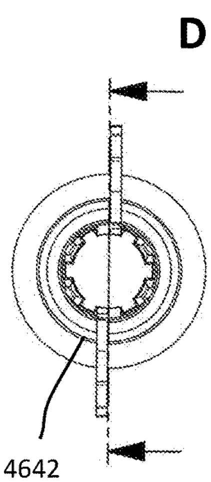
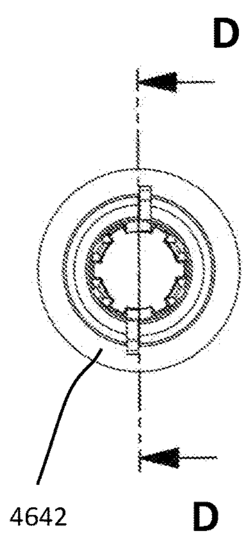
FIG. 76C
FIG. 77C
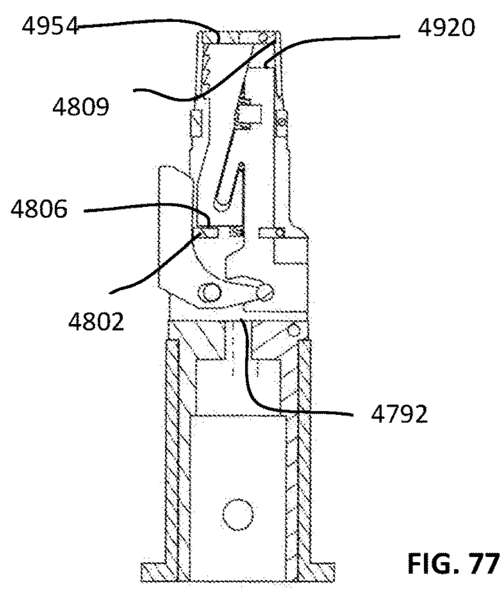
FIG. 77D

SINGLE-USE FOOD PREPARATION CONTAINER ASSEMBLIES, SYSTEMS AND METHODS

REFERENCE TO RELATED APPLICATIONS

The following patent applications are related to the subject matter of the present application and the disclosure thereof is hereby incorporated by reference and priority thereof is hereby claimed pursuant to 37 C.F.R. 1.78(a)(1):

U.S. Provisional Patent Application Ser. No. 62/533,743, filed Jul. 18, 2017 and entitled SINGLE-USE FOOD PREPARATION CONTAINER ASSEMBLIES, SYSTEMS AND METHODS; and PCT Patent Application No. PCT/IL2017/050823, filed Jul. 20, 2017 and entitled SINGLE-USE FOOD PREPARATION CONTAINER ASSEMBLY, SYSTEM AND METHOD.

The following patent applications are related to the subject matter of the present application and the disclosure thereof is hereby incorporated by reference:

U.S. Provisional Patent Application Ser. No. 62/364,491, filed Jul. 20, 2016 and entitled CUP WITH INTEGRATED BLENDING FUNCTIONALITY; and U.S. Provisional Patent Application Ser. No. 62/383,639, filed Sep. 6, 2016 and entitled FOOD PRODUCT PREPARATION SYSTEM.

FIELD OF THE INVENTION

The present invention relates to computerized and automated processing of products, preferably food products, within a single-use-container.

BACKGROUND OF THE INVENTION

Various types of devices for computerized processing of products, including food products are known.

SUMMARY OF THE INVENTION

The present invention seeks to provide an improved product preparation container assembly which is suitable for being processed by an intelligent driving device. The product preparation container assembly and the intelligent driving device together define a product preparation system which is particularly suitable for use with food products but is not limited to use therewith.

There is thus provided in accordance with a preferred embodiment of the present invention a container including a cup body and a cup closure configured for operative engagement with the cup body, the cup closure including a reuse inhibiting portion having a first operative orientation, prior to the operative engagement thereof with the cup body, a second operative orientation, different from the first operative orientation, when in the operative engagement with the cup body, and a third operative orientation, different from the second operative orientation, subsequent to disengagement thereof from the cup body.

Preferably, the third operative orientation is different from the first operative orientation. Additionally or alternatively, the third operative orientation provides at least a human sensible indication of the cup closure having previously been in the second operative orientation, notwithstanding re-engagement thereof with the cup body subsequent to the disengagement thereof from the cup body. Additionally or alternatively, the third operative orientation provides at least a machine sensible indication of the cup closure having previously been in the second operative orientation, notwithstanding re-engagement thereof with the cup body subsequent to the disengagement thereof from the cup body.

In accordance with a preferred embodiment of the present invention the reuse inhibiting portion has a fourth operative orientation following processing engagement thereof with the container contents processor and subsequent disengagement thereof from the container contents processor, the fourth operative orientation being different from at least the first operative orientation and preventing subsequent processing engagement thereof with the container contents processor. Additionally, the fourth operative orientation is different form at least two of the first, second and third operative orientations.

Preferably, the reuse inhibiting portion is manipulable by a filler in a user non-realizable manner to prevent it from assuming the third operative orientation.

There is also provided in accordance with another preferred embodiment of the present invention a container suitable for machine processing of contents thereof in an upside-down orientation by a container contents processor, the container including a cup body and a cup closure configured for operative engagement with the cup body, the cup closure including a container contents processor drivable, rotatable blade configured to be located within the cup body, a seal cooperating with the container contents processor drivable, rotatable blade, the seal having a first static sealing operative orientation, when the rotatable blade is not in rotation, and a second dynamic sealing operative orientation, different from the first static sealing operative orientation, when the rotatable blade is in rotation.

In accordance with a preferred embodiment of the present invention the cup closure is configured for operative engagement therewith by the container contents processor. Additionally or alternatively, the seal is in the first static sealing operative orientation, when the rotatable blade in a first axial operative orientation, and the seal is in the second dynamic sealing operative orientation, when the rotatable blade is in a second axial operative orientation, different from the first axial operative orientation.

In accordance with a preferred embodiment of the present invention the cup closure includes a single-use cover seal and externally rotatably drivable rotary engagement assembly (SUCSERDREA), the SUCSERDREA including a cover, a lid, fixedly connected to the cover, and a blade arranged for rotation with respect to the cover, the blade including a rotatable static sealing portion. Preferably, the blade includes a drive shaft engaging wall, a generally cylindrical wall, surrounding the drive shaft engaging wall and radially outwardly spaced therefrom, and a flexible radially outwardly and downwardly extending sealing skirt. Additionally, when the blade is lockingly but rotatably engaged with the lid, the sealing skirt sealingly engages an annular sealing surface of the lid. Preferably, when the blade is rotated relative to the lid, the sealing skirt is slightly spaced from the annular sealing surface by centrifugal force of rotation of the blade.

In accordance with a preferred embodiment of the present invention the cup closure includes a reuse inhibiting portion having a first operative orientation, prior to the operative engagement thereof with the cup body, a second operative orientation, different from the first operative orientation, when in the operative engagement with the cup body, and a third operative orientation, different from the second operative orientation, subsequent to disengagement thereof from the cup body. Preferably, the third operative orientation is different from the first operative orientation.

In accordance with a preferred embodiment of the present invention the third operative orientation provides at least a human sensible indication of the cup closure having previously been in the second operative orientation, notwithstanding re-engagement thereof with the cup body subsequent to the disengagement thereof from the cup body. Additionally or alternatively, the third operative orientation provides at least a machine sensible indication of the cup closure having previously been in the second operative orientation, notwithstanding re-engagement thereof with the cup body subsequent to the disengagement thereof from the cup body.

In accordance with a preferred embodiment of the present invention the cup body is prefilled with consumer usable contents prior to initial engagement of the cup closure therewith.

Preferably, the container is configured for use with a container contents processor operative to engage the cup closure and process the consumer usable contents thereof.

Preferably, the reuse inhibiting portion has a fourth operative orientation, following processing engagement thereof with the container contents processor and subsequent disengagement thereof from the container contents processor, the fourth operative orientation being different from at least the first operative orientation and preventing subsequent processing engagement thereof with the container contents processor. Additionally, the fourth operative orientation is different form at least two of the first, second and third operative orientations.

In accordance with a preferred embodiment of the present invention the reuse inhibiting portion is manipulable by a filler in a user non-realizable manner to prevent it from assuming the third operative orientation.

In accordance with a preferred embodiment of the present invention the cup closure includes a single-use cover seal and externally rotatably drivable rotary engagement assembly (SUCSERDREA) providing both human and machine sensible tamper-evident and re-use preventing fluid sealing engagement with the cup body, the SUCSERDREA including the reuse inhibiting portion.

Preferably, the SUCSERDREA includes a cover, a lid, fixedly connected to the cover, and a blade arranged for rotation with respect to the cover. Additionally, the SUCSERDREA also includes a machine-readable information source. Alternatively, the SUCSERDREA also includes an encrypted machine-readable information source.

In accordance with a preferred embodiment of the present invention the reuse inhibiting portion includes a multifunctional tamper indicating and re-use prevention element (MTIRPE) integrally formed with the cover. Additionally, the reuse inhibiting portion includes a MTIRPE receiving portion (MTIRPERP) for interacting with the MTIRPE.

Preferably, the MTIRPERP includes an inner circumferential edge portion and an outer circumferential edge portion, which is generally radially spaced from the inner circumferential edge portion. Additionally, the outer circumferential edge portion is formed with at least one engagement window.

Preferably, when the reuse inhibiting portion is in the first operative orientation, the at least one engagement window is blocked. In accordance with a preferred embodiment of the present invention when the reuse inhibiting portion is in the second operative orientation, the at least one engagement window is open. In accordance with a preferred embodiment of the present invention when the reuse inhibiting portion is in the third operative orientation, the at least one engagement window is blocked.

Preferably, the cup closure is configured for operative engagement with the cup body, the cup closure including a container contents processor drivable, rotatable blade configured to be located within the cup body, the blade including a drive shaft engagement portion adapted for axial initial engagement with a drive shaft of the container contents processor and subsequent tightened rotational engagement with the drive shaft upon driven rotation of the drive shaft in engagement with the blade.

There is further provided in accordance with a preferred embodiment of the present invention a container suitable for machine processing of contents thereof in an upside-down orientation by a container contents processor, the container including a cup body and a cup closure configured for operative engagement with the cup body, the cup closure including a container contents processor drivable, rotatable blade configured to be located within the cup body, the blade including a drive shaft engagement portion adapted for axial initial engagement with a drive shaft of the container contents processor and subsequent tightened rotational engagement with the drive shaft upon driven rotation of the drive shaft in engagement with the blade.

Preferably, the cup body is prefilled with consumer usable contents prior to initial engagement of the cup closure therewith.

In accordance with a preferred embodiment of the present invention the cup closure is configured for operative engagement therewith by the container contents processor.

Preferably, the drive shaft engagement portion is formed with curved splines. Alternatively, the drive shaft engagement portion is formed with axial splines formed of a material which is softer than a material forming portions of the drive shaft which axially and rotatably engage the splines.

In accordance with a preferred embodiment of the present invention the cup closure includes a rotatable blade for processing of the contents of the container and a blade receiving recess for receiving the blade when the blade is not in use.

There is yet further provided in accordance with yet another preferred embodiment of the present invention a container suitable for machine processing of contents thereof in an upside-down orientation by a container contents processor, the container including a cup body and a cup closure configured for operative engagement with the cup body, the cup closure including a rotatable blade for processing of the contents of the container and a blade receiving recess for receiving the blade when the blade is not in use.

In accordance with a preferred embodiment of the present invention the blade receiving recess is configured for receiving the blade when the blade is in one of only two azimuthal orientations, which are mutually separated by 180 degrees.

Preferably, the cup body includes a window which enables a product contained therein to be seen. Additionally, the cup body includes marking indicating minimum and maximum fill levels.

In accordance with a preferred embodiment of the present invention the SUCSERDREA includes a cover, a lid, fixedly connected to the cover, a blade arranged for rotation with respect to the cover, a machine-readable information source and a human visible tamper-evident mechanism and re-use prevention is provided by at least one of reading and writing to the machine-readable information source.

There is also provided in accordance with still another preferred embodiment of the present invention a container and container contents processing system including a container, including a blade arranged for rotation with respect to the container and a container contents processor including a container support configured for supporting the container in an upside-down orientation and an electric motor including a drive shaft, the container support and the electric motor having a first operative orientation, wherein the drive shaft is axially retracted with respect to the container support and does not operatively engage the blade, and a second operative orientation, wherein the drive shaft is axially extended with respect to the container support and operatively engages the blade.

In accordance with a preferred embodiment of the present invention the container and container contents processing system also includes a container clamping assembly cooperating with the container support for selectably clamping the container onto the container support.

Preferably, the container support includes a spillage channel. Additionally or alternatively, the container support includes a container azimuthal locator for engagement with a container and locating it in a desired azimuthal orientation relative to the container support. Additionally or alternatively, the container support includes a plurality of clamp accommodating pockets for accommodating clamps forming part of the container clamping assembly.

In accordance with a preferred embodiment of the present invention the container and container contents processing system also includes a base assembly including a base housing, a vertically displacing rotary drive motor assembly and electrical circuitry which operates the container contents processing system.

Preferably, the vertically displacing rotary drive motor assembly includes a rotary drive motor axially raising and lowering the electric motor, the rotary drive motor having first and second operative orientations, corresponding to respective raised and lowered positions of the electric motor relative to the container support.

Preferably, rotation of the drive shaft, by operation of the electric motor, produces centrifugal forces which result in enhanced radially outward displacement of at least one portion of the drive shaft, thereby enhancing the mutual engagement of the drive shaft and the blade.

In accordance with a preferred embodiment of the present invention the drive shaft includes a blade engagement element and a grip element and the grip element may be rotatably driven inside the blade ahead of the blade engagement element, enabling the grip element to insinuate itself into enhanced engagement with the blade, thereby enhancing resistance to linear disengagement between the blade and the drive shaft during motor driven rotation thereof.

In accordance with a preferred embodiment of the present invention the drive shaft includes at least one curved blade engagement portion arranged for engagement with a corresponding curved portion of the blade and wherein motor driven rotation of the drive shaft causes enhanced engagement of the at least one curved blade engagement portion with the corresponding curved portion of the blade, thereby enhancing resistance to linear disengagement between the blade and the drive shaft during motor driven rotation thereof.

Preferably, the container support is static and the drive shaft is adapted to be axially displaced relative to the container support between the first and second operative orientations.

In accordance with a preferred embodiment of the present invention the electric motor is supported on a motor support bracket which is selectably vertically positioned by a motor lifting element. Additionally or alternatively, the drive shaft of the electric motor is associated with a linearly displaceable ventilating element positioning hub operative to azimuthally position the blade in at least one azimuthal orientation permitting seating of the blade in a blade receiving recess of the cup closure prior to disengagement with the drive shaft therefrom.

In accordance with a preferred embodiment of the present invention the electric motor is axially static and the container support is adapted to be axially displaced relative to the drive shaft between the first and second operative orientations.

Preferably, the container and container contents processing system also includes a base assembly supporting the electric motor, the base assembly including a vertically displaceable base housing supporting the container support and a user operable clamping and base housing raising assembly operable for selectably upwardly vertically displacing the vertically displaceable housing. In accordance with a preferred embodiment of the present invention the user operable clamping and base housing raising assembly includes clamp elements, which are pivotably mounted onto a pivotable clamp mounting element and spring biased with respect thereto, a pivotable lever-operated element, pivotably mounted with respect to the pivotable clamp mounting element and pivotably mounted onto the base assembly, a lever connecting element pivotably mounted onto the pivotable lever-operated element, a bottom lever element pivotably mounted onto the lever connecting element and a top lever element, slidably connected to the bottom lever element.

In accordance with a preferred embodiment of the present invention the container contents processor also includes a user operable lever operative, upon engagement therewith by a user, to cause the container to be clamped to the container support and the electric motor to be relatively axially displaced from the first operative orientation to the second operative orientation and operative, upon disengagement therefrom by a user, to cause rotation of the drive shaft in engagement with the blade such that the blade is in azimuthal alignment with a blade receiving recess of the container.

Preferably, the user operable lever is configured such that the user engagement thereof by application thereto of only vertical forces cause the container to be clamped to the container support and the electric motor to be relatively axially displaced from the first operative orientation to the second operative orientation and operative upon disengagement therefrom by a user to cause rotation of the drive shaft in engagement with the blade such that the blade is in azimuthal alignment with the blade receiving recess. Additionally or alternatively, the user operable lever is configured such that the user engagement thereof by application thereto of only downward vertical forces cause the container to be clamped to the container support and the electric motor to be relatively axially displaced from the first operative orientation to the second operative orientation and operative upon disengagement therefrom by a user to cause rotation of the drive shaft in engagement with the blade such that the blade is in azimuthal alignment with the blade receiving recess.

In accordance with a preferred embodiment of the present invention the user operable lever is configured such that the user engagement thereof producing a single downward stroke of the lever causes the container to be clamped to the container support and the electric motor to be relatively axially displaced from the first operative orientation to the second operative orientation. Additionally or alternatively, the user operable lever is configured such that the user engagement thereof producing a single downward stroke of the lever following completion of processing of the contents is operative to cause the container to be unclamped from the container support, to cause rotation of the drive shaft in engagement with the rotatable blade such that the blade is in azimuthal alignment with the blade receiving recess and subsequently to cause the electric motor to be relatively axially displaced from the second operative orientation to the first operative orientation.

In accordance with a preferred embodiment of the present invention the blade receiving recess is configured for receiving the blade when the blade is in one of only two azimuthal orientations, which are mutually separated by 180 degrees.

In accordance with a preferred embodiment of the present invention the electric motor is axially static and the container support is adapted to be axially displaced relative to the drive shaft between the first and second operative orientations.

Preferably, the user-operable lever governs the operation of a base assembly supporting the electric motor, the base assembly including a vertically displaceable base housing supporting the container support and a user operable clamping and base housing raising assembly operable for selectably upwardly vertically displacing the vertically displaceable housing.

Preferably, the user operable clamping and base housing raising assembly includes clamp elements, which are pivotably mounted onto a pivotable clamp mounting element and spring biased with respect thereto, a pivotable lever-operated element, pivotably mounted with respect to the pivotable clamp mounting element and pivotably mounted onto the base assembly, a lever connecting element pivotably mounted onto the pivotable lever-operated element, a bottom lever element pivotably mounted onto the lever connecting element and a top lever element, slidably connected to the bottom lever element.

Preferably, the base assembly also includes an azimuthal alignment assembly. In accordance with a preferred embodiment of the present invention the azimuthal alignment assembly includes at least two hinge clamp elements which define a rotational axis, a rotationally displacing element rotatable about the rotational axis and an azimuthal alignment activation element, which rotates about the rotational axis and is rotatably held in place by the hinge clamp elements, the azimuthal alignment activation element defining a rotation and translation pathway for the rotationally displacing element.

Preferably, the azimuthal alignment assembly also includes a multifunctional bracket element, a lever locking element and an azimuthal alignment activation driving element. Additionally, the azimuthal alignment activation driving element is pivotably mounted onto the azimuthal alignment activation element and is spring biased.

In accordance with a preferred embodiment of the present invention linear displacement of the azimuthal alignment activation driving element beyond a given extent produces corresponding linear displacement of the lever locking element and linear displacement of the azimuthal alignment activation driving element produces rotation of the rotational displacing element, and of the azimuthal alignment activation element, about the rotational axis. Additionally or alternatively, lever locking element includes a plurality of sliding shoe portions having mutually coplanar bottom surfaces.

Preferably, the container and container contents processing system also includes a rotating ventilating element, which is driven for rotation by the drive shaft, a sensor for sensing rotational velocity of the ventilating element and at least one load cell for sensing weight applied to the container support.

Preferably, engagement and disengagement of the drive shaft and the blade is provided by an axially displacing motor assembly, the container support which is static, a rotary drive motor, a gear and spindle assembly operative to translate rotation into vertical displacement and an electronic control operative to govern operation of the axially displacing motor assembly and the rotary drive motor for providing clamping and unclamping of the container onto the container support and engagement and disengagement of the drive shaft and the blade.

In accordance with a preferred embodiment of the present invention engagement and disengagement of the drive shaft and the blade is provided by a static motor assembly, the container support which is vertically displaceable and a manual control operative to govern clamping and unclamping of a container onto the container support and engagement and disengagement of the drive shaft and the blade.

In accordance with a preferred embodiment of the present invention engagement and disengagement of the drive shaft and the blade is provided by an axially displacing motor assembly, the container support which is static and a manual control operative to govern axial displacement of the motor assembly, clamping and unclamping of a container onto the container support and engagement and disengagement of the drive shaft and the blade.

Preferably, the container contents processor also includes a motor controller operative to control operation of the electric motor in accordance with pre-programmed instructions which are keyed to contents of the container and in accordance with sensed parameters which are sensed during operation of the electric motor. Preferably, the sensed parameters include motor operation parameters. Additionally or alternatively, the sensed parameters include environmental parameters. In accordance with a preferred embodiment of the present invention the motor controller is operative to terminate processing based on sensed motor operation parameters which indicate completion of processing.

In accordance with a preferred embodiment of the present invention the container contents processor also includes a motor controller operative to control operation of the electric motor in accordance with pre-programmed instructions which are linked to contents of the container and in accordance with sensed parameters which are sensed during operation of the electric motor. Additionally, the container and container contents processing system also includes an Internet communications link enabling automatic download of the pre-programmed instructions to the motor controller from a remote site.

There is further provided in accordance with another preferred embodiment of the present invention, for use with a container suitable for machine processing of contents thereof in an upside-down orientation, the container including a cup body and a cup closure, the cup closure being configured for operative engagement with the cup body, the cup closure including a rotatable blade and a blade receiving recess, a container contents processing system including a container support configured for supporting the container in the upside-down orientation, an electric motor including a drive shaft and a motor controller operative to control operation of the electric motor in accordance with pre-programmed instructions which are keyed to contents of the container and in accordance with sensed parameters which are sensed during operation of the electric motor.

Preferably, the sensed parameters include motor operation parameters including environmental parameters. In accordance with a preferred embodiment of the present invention the motor controller is operative to terminate processing based on sensed motor operation parameters which indicate completion of processing.

There is even further provided in accordance with still another preferred embodiment of the present invention, for use with a container suitable for machine processing of contents thereof in an upside-down orientation, the container including a cup body and a cup closure, the cup closure being configured for operative engagement with the cup body, the cup closure including a rotatable blade and a blade receiving recess, a container contents processing system including a container support configured for supporting the container in the upside-down orientation, an electric motor including a drive shaft and a motor controller operative to control operation of the electric motor in accordance with pre-programmed instructions which are linked to contents of the container and in accordance with sensed parameters which are sensed during operation of the electric motor.

Preferably, the container contents processing system also includes an Internet communications link enabling automatic download of the pre-programmed instructions to the motor controller from a remote site.

There is still further provided in accordance with yet another preferred embodiment of the present invention, for use with a container suitable for machine processing of contents thereof in an upside-down orientation the container including a cup body and a cup closure, the cup closure being configured for operative engagement with the cup body, the cup closure including a rotatable blade, a container contents processor including a container support configured for supporting the container in the upside-down orientation and an electric motor including a drive shaft, the container support and the electric motor having a first operative orientation, wherein the drive shaft is axially retracted with respect to the container support and does not operatively engage the blade, and a second operative orientation, wherein the drive shaft is axially extended with respect to the container support and operatively engages the blade.

In accordance with a preferred embodiment of the present invention the container contents processor also includes a container clamping assembly cooperating with the container support for selectably clamping the container onto the container support.

Preferably, the container support includes a spillage channel. Additionally or alternatively, the container support includes a container azimuthal locator for engagement with a container and locating it in a desired azimuthal orientation relative to the container support. Additionally or alternatively, the container support includes a plurality of clamp accommodating pockets for accommodating clamps forming part of the container clamping assembly.

In accordance with a preferred embodiment of the present invention the container contents processor also includes a base assembly including a base housing, a vertically displacing rotary drive motor assembly and electrical circuitry which operates the container contents processor.

Preferably, the vertically displacing rotary drive motor assembly includes a rotary drive motor axially raising and lowering the electric motor, the rotary drive motor having first and second operative orientations corresponding to respective raised and lowered positions of the electric motor relative to the container support. Additionally, rotation of the drive shaft, by operation of the electric motor, produces centrifugal forces which result in enhanced radially outward displacement of at least one portion of the drive shaft, thereby enhancing the mutual engagement of the drive shaft and the blade.

Preferably, the drive shaft includes a blade engagement element and a grip element and the grip element may be rotatably driven inside the blade ahead of the blade engagement element, enabling the grip element to insinuate itself into enhanced engagement with the blade, thereby enhancing resistance to linear disengagement between the blade and the drive shaft during motor driven rotation thereof. Alternatively, the drive shaft includes at least one curved blade engagement portion arranged for engagement with a corresponding curved portion of the blade and wherein motor driven rotation of the drive shaft causes enhanced engagement of the at least one curved blade engagement portion with the corresponding curved portion of the blade, thereby enhancing resistance to linear disengagement between the blade and the drive shaft during motor driven rotation thereof.

In accordance with a preferred embodiment of the present invention the container support is static and the drive shaft is adapted to be axially displaced relative to the container support between the first and second operative orientations. Additionally, the electric motor is supported on a motor support bracket which is selectably vertically positioned by a motor lifting element. Preferably, the drive shaft of the electric motor is associated with a linearly displaceable ventilating element positioning hub operative to azimuthally position the blade in at least one azimuthal orientations permitting seating of the blade in a blade receiving recess of the cup closure prior to disengagement with the drive shaft therefrom.

In accordance with a preferred embodiment of the present invention the electric motor is axially static and the container support is adapted to be axially displaced relative to the drive shaft between the first and second operative orientations. Preferably, the container contents processor also includes a base assembly supporting the electric motor, the base assembly including a vertically displaceable base housing supporting the container support and a user operable clamping and base housing raising assembly operable for selectably upwardly vertically displacing the vertically displaceable housing.

In accordance with a preferred embodiment of the present invention the user operable clamping and base housing raising assembly includes clamp elements, which are pivotably mounted onto a pivotable clamp mounting element and spring biased with respect thereto, a pivotable lever-operated element, pivotably mounted with respect to the pivotable clamp mounting element and pivotably mounted onto the base assembly, a lever connecting element pivotably mounted onto the pivotable lever-operated element, a bottom lever element pivotably mounted onto the lever connecting element and a top lever element, slidably connected to the bottom lever element.

Preferably, the base assembly also includes an azimuthal alignment assembly. In accordance with a preferred embodiment of the present invention the azimuthal alignment assembly includes at least two hinge clamp elements which define a rotational axis, a rotationally displacing element rotatable about the rotational axis and an azimuthal alignment activation element, which rotates about the rotational axis and is rotatably held in place by the hinge clamp elements, the azimuthal alignment activation element defining a rotation and translation pathway for the rotationally displacing element.

Preferably, the azimuthal alignment assembly also includes a multifunctional bracket element, a lever locking element and an azimuthal alignment activation driving element. Additionally, the azimuthal alignment activation driving element is pivotably mounted onto the azimuthal alignment activation element and is spring biased.

There is also provided in accordance with still another preferred embodiment of the present invention, for use with a container suitable for machine processing of contents thereof in an upside-down orientation, the container including a cup body and a cup closure, the cup closure being configured for operative engagement with the cup body, the cup closure including a rotatable blade and a blade receiving recess, a container contents processor including a container support configured for supporting the container in the upside-down orientation, an electric motor including a drive shaft and a user operable lever operative, upon engagement therewith by a user, to cause the container to be clamped to the container support and the drive shaft to be relatively axially displaced from a first operative orientation, wherein the drive shaft does not operatively engage the blade, to a second operative orientation, wherein the drive shaft operatively engages the blade, and operative, upon disengagement therefrom by a user, to cause rotation of the drive shaft in engagement with the rotatable blade such that the rotatable blade is in azimuthal alignment with the blade receiving recess.

Preferably, the user operable lever is configured such that the user engagement thereof, by application thereto of only vertical forces, causes the container to be clamped to the container support and the drive shaft to be relatively axially displaced from the first operative orientation to the second operative orientation and operative, upon disengagement therefrom by a user, to cause rotation of the drive shaft in engagement with the rotatable blade such that the blade is in azimuthal alignment with the blade receiving recess. Additionally or alternatively, the user operable lever is configured such that the user engagement thereof, by application thereto of only downward vertical forces, causes the container to be clamped to the container support and the drive shaft to be relatively axially displaced from the first operative orientation to the second operative orientation and operative, upon disengagement therefrom by a user, to cause rotation of the drive shaft in engagement with the rotatable blade such that the blade is in azimuthal alignment with the blade receiving recess.

Preferably, the user operable lever is configured such that the user engagement thereof producing a single downward stroke of the lever causes the container to be clamped to the container support and the drive shaft to be relatively axially displaced from the first operative orientation to the second operative orientation. Additionally or alternatively, the user operable lever is configured such that the user engagement thereof, by producing a single downward stroke of the lever following completion of processing of the contents, is operative to cause the container to be unclamped from the container support, to cause rotation of the drive shaft in engagement with the rotatable blade such that the blade is in azimuthal alignment with the blade receiving recess and subsequently to cause the drive shaft to be relatively axially displaced from the second operative orientation to the first operative orientation.

In accordance with a preferred embodiment of the present invention the blade receiving recess is configured for receiving the blade when the blade is in one of only two azimuthal orientations, which are mutually separated by 180 degrees.

Preferably, the electric motor is axially static and the container support is adapted to be axially displaced relative to the drive shaft between the first and second operative orientations.

Preferably, the user-operable lever governs the operation of a base assembly supporting the electric motor, the base assembly including a vertically displaceable base housing supporting the container support and a user operable clamping and base housing raising assembly operable for selectably upwardly vertically displacing the vertically displaceable housing.

In accordance with a preferred embodiment of the present invention the user operable clamping and base housing raising assembly includes clamp elements, which are pivotably mounted onto a pivotable clamp mounting element and spring biased with respect thereto, a pivotable lever-operated element, pivotably mounted with respect to the pivotable clamp mounting element and pivotably mounted onto the base assembly, a lever connecting element pivotably mounted onto the pivotable lever-operated element, a bottom lever element pivotably mounted onto the lever connecting element and a top lever element, slidably connected to the bottom lever element.

Preferably, the base assembly also includes an azimuthal alignment assembly. Additionally, the azimuthal alignment assembly includes at least two hinge clamp elements which define a rotational axis, a rotationally displacing element rotatable about the rotational axis and an azimuthal alignment activation element, which rotates about the rotational axis and is rotatably held in place by the hinge clamp elements, the azimuthal alignment activation element defining a rotation and translation pathway for the rotationally displacing element. Preferably, the azimuthal alignment assembly also includes a multifunctional bracket element, a lever locking element and an azimuthal alignment activation driving element. Additionally, the azimuthal alignment activation driving element is pivotably mounted onto the azimuthal alignment activation element and is spring biased.

In accordance with a preferred embodiment of the present invention linear displacement of the azimuthal alignment activation driving element beyond a given extent produces corresponding linear displacement of the lever locking element and linear displacement of the azimuthal alignment activation driving element produces rotation of the rotational displacing element and of the azimuthal alignment activation element about the rotational axis.

Preferably, the lever locking element includes a plurality of sliding shoe portions having mutually coplanar bottom surfaces Preferably, the container contents processor also includes a rotating ventilating element, which is driven for rotation by the drive shaft, a sensor for sensing rotational velocity of the ventilating element and at least one load cell for sensing weight applied to the container support.

Preferably, engagement and disengagement of the drive shaft and the blade is provided by an axially displacing motor assembly, the container support which is static, a rotary drive motor, a gear and spindle assembly operative to translate rotation into vertical displacement and an electronic control operative to govern operation of the axially displacing motor assembly and the rotary drive motor for providing clamping and unclamping of a container onto the container support and engagement and disengagement of the drive shaft and the blade. Alternatively, engagement and disengagement of the drive shaft and the blade is provided by a static motor assembly, the container support which is vertically displaceable and a manual control operative to govern clamping and unclamping of a container onto the container support and engagement and disengagement of the drive shaft and the blade. Alternatively, engagement and disengagement of the drive shaft and the blade is provided by an axially displacing motor assembly, the container support which is static and a manual control operative to govern axial displacement of the motor assembly, clamping and unclamping of a container onto the container support and engagement and disengagement of the drive shaft and the blade.

There is also provided in accordance with another preferred embodiment of the present invention a method of processing contents of a container, the method including providing a container, the container including a cup body and a cup closure, the cup closure including a blade, and a container contents processor, the container contents processor including a container support, a motor and a drive shaft, filling the container with contents to be processed by the container contents processor, placing the container in an upside-down orientation on the container support of the container contents processor, clamping the container in the upside down orientation onto the container support, processing the contents to be processed by the container contents processor, disengaging the container from the container contents processor following the processing and unclamping the container from the container support.

In accordance with a preferred embodiment of the present invention the method includes, following the filling, employing a tool to configure a reuse inhibiting portion of the cup closure from a first operative orientation to a second operative orientation, different from the first operative orientation, and sealingly engaging the cup closure, when in the second operative orientation, to the cup.

Preferably, the method includes, following the filling, adding liquid to the contents via a resealable opening in the cup closure.

In accordance with a preferred embodiment of the present invention following the clamping, the reuse inhibiting portion of the cup closure is in a third operative orientation. Preferably, following the clamping, the reuse inhibiting portion of the cup closure is in the third operative orientation and automatically assumes a fourth operative orientation upon disengagement of the container from the container contents processor.

Preferably, during the processing the drive shaft is fully engaged with the blade. Additionally or alternatively, following the processing and prior to the unclamping the blade is initially rotated to overlie a blade receiving recess in the cup closure and is subsequently located in the blade receiving recess.

Preferably, following the unclamping, the drive shaft is disengaged from the blade.

In accordance with a preferred embodiment of the present invention fully seated engagement between the drive shaft and the blade is achieved by relative axial displacement therebetween. Alternatively, fully seated engagement between the drive shaft and the blade is achieved by relative axial displacement therebetween and by rotational displacement of the drive shaft.

In accordance with a preferred embodiment of the present invention the axial displacement is produced by lowering of the container support relative to the drive shaft, which drive shaft is axially static. Alternatively, the axial displacement is produced by raising of the drive shaft relative to the blade.

In accordance with a preferred embodiment of the present invention the container contents processor also includes a base assembly supporting a rotary drive motor and including a bottom assembly, a vertically displaceable base housing supporting the container support and a user operable clamping and base housing raising assembly operable for selectably upwardly vertically displacing the vertically displaceable housing and prior to placing the container in an upside-down orientation on a container support of the container contents processor, the container contents processor is in an operative orientation wherein the vertically displaceable base housing and the container support are upwardly spring biased but retained in a lowered position by a user operable clamping and base housing raising assembly operable for selectably upwardly vertically displacing the vertically displaceable base housing.

Preferably, at the time of placement of the container in an upside-down orientation on a container support of the container contents processor, clamp elements, which are pivotably mounted onto a pivotable clamp mounting element and spring biased with respect thereto are outside of engagement with the container. Additionally, following placement of the container in an upside-down orientation on a container support of the container contents processor, user application of a downward force on a lever element produces touching engagement of the clamp elements with the container.

In accordance with a preferred embodiment of the present invention the clamping is produced by further application of a downward force on the lever element, which causes the vertically displaceable base housing to be lowered relative to the bottom assembly and causes engagement of the drive shaft with the blade.

In accordance with a preferred embodiment of the present invention following the clamping and termination of application of the downward force on the lever element the drive shaft and the blade are disengaged with from an azimuthal alignment assembly, allowing free rotation of the drive shaft and the blade.

Preferably, the processing takes place upon user actuation of an actuation control.

In accordance with a preferred embodiment of the present invention following the processing and prior to the unclamping, actuation of an azimuthal alignment assembly for azimuthal alignment of the blade with a blade receiving recess on the cup closure takes place upon application of a downward force on the lever element by a user. Additionally, the azimuthal alignment assembly is operative to properly align the blade such that it is aligned with the blade receiving recess irrespective of an azimuthal orientation of the blade upon termination of the processing.

Preferably, the disengaging takes place automatically following the actuation of the azimuthal alignment assembly. Additionally, the unclamping take place automatically following the disengaging.

In accordance with a preferred embodiment of the present invention the axial displacement prior to the processing of the contents causes the blade to shift from an initial statically sealed operative orientation to a dynamically sealed operative orientation. Additionally, the axial displacement following the processing of the contents causes the blade to shift from the dynamically sealed operative orientation to a further staticly sealed operative orientation. Additionally, the further staticly sealed operative orientation is at least similar to the initial staticly sealed operative orientation.

There is further provided in accordance with yet another preferred embodiment of the present invention a method for processing a food product in a processing container, the method including receiving a processing recipe for processing the food product, the recipe including at least one of processing time and processing speed, weighing the food product to ascertain the weight of the food product, modifying the processing recipe in accordance with the weight of the food product to provide a modified processing recipe and processing the food product in accordance with the modified processing recipe.

Preferably, the receiving includes reading the processing recipe from an information source.

In accordance with a preferred embodiment of the present invention the processing recipe includes a designation of an amount of liquid to be added to the food product. Additionally, the weighing includes weighing the food product together with the amount of liquid.

In accordance with a preferred embodiment of the present invention the modifying includes modifying the processing recipe in accordance with the weight of the food product to provide a modified processing recipe in which at least one of processing time and processing speed are modified. Alternatively, the modifying includes modifying the processing recipe in accordance with the weight of the food product to provide a modified processing recipe in which both processing time and processing speed are modified.

In accordance with a preferred embodiment of the present invention the method for processing a food product also includes generating an alert to a user. Preferably, the alert to the user includes at least one of the following alerts to a user: too little liquid, too much liquid, previously used processing container and unauthorized processing container.

Preferably, the method for processing a food product also includes the step of preventing processing. Alternatively, the method for processing a food product also includes the step of terminating processing.

In accordance with a preferred embodiment of the present invention the receiving includes reading a unique identification which provides a link to the processing recipe via an internet connection to a lookup system.

There is yet further provided in accordance with still another preferred embodiment of the present invention a method for processing a food product in a processing container, the method including receiving a processing recipe for processing the food product, the recipe including at least one of processing time and processing speed, processing the food product, while sensing at least one of speed and power consumption and governing the processing based on the at least one of speed and power consumption.

Preferably, the governing includes at least one of modifying the processing recipe and terminating the processing.

There is also provided in accordance with yet another preferred embodiment of the present invention a method for processing a food product in a processing container, the method including receiving a processing recipe for processing the food product, the recipe including at least one of processing time and processing speed, employing a processing machine having at least one machine performance sensor for processing the food product, while sensing at least one machine operation parameter and governing the processing based on the at least one of speed and power consumption.

In accordance with a preferred embodiment of the present invention the governing includes at least one of modifying the processing recipe and terminating the processing.

Preferably, the at least one sensor includes at least one sensor sensing at least one of speed, power consumption, vibration, temperature, weight, photo image, liquid sensing and motion.

BRIEF DESCRIPTION OF THE DRAWINGS

The present invention will be understood and appreciated more fully from the following detailed description, taken in conjunction with the drawings in which:

FIGS. 57A and 57B are together a simplified flowchart illustrating control operation of the MMIDD in accordance with a preferred embodiment of the present invention;

FIGS. 57C, 57D, 57E, 57F, 57G, 57H, 57I and 57J are together a more detailed series of flowcharts illustrating control operation of the MMIDD in accordance with a preferred embodiment of the present invention;

FIGS. 76A, 76B, 76C and 76D are simplified respective planar side, pictorial, planar top view and planar sectional illustrations of one embodiment of an outer drive shaft assembly, suitable for forming part of the axially displaceable rotary drive assembly of FIGS. 75A and 75B, in a first operative orientation, FIG. 76D being taken along lines D-D in FIG. 76C;

FIGS. 77A, 77B, 77C and 77D are simplified respective planar side, pictorial, planar top view and planar sectional illustrations of the embodiment of the outer drive shaft assembly of FIGS. 76A-76D, forming part of the axially displaceable rotary drive assembly shown in FIGS. 75A & 75B, in a second operative orientation, FIG. 77D being taken along lines D-D in FIG. 77C;

FIGS. 108A, 108B, 108C, 108D are simplified pictorial, partially cut-away pictorial, partially cut away side view and sectional view illustrations of the SUPCASCA of FIGS. 69A-69E of the MMIDD of FIG. 68 and the SUPCA of FIGS. 60A-60I prior to engagement of the SUPCA with the SUPCASCA, FIG. 108D being taken along lines D-D in FIG. 108A;

FIGS. 109A, 109B and 109C are simplified partially cut-away pictorial, partially cut-away side view and sectional view illustrations, corresponding to FIG. 98, of initial engagement of the SUPCA with the clamping assembly (SUPCASCA) of the MMIDD, FIG. 109C being taken along lines C-C in FIG. 109A;

FIGS. 110A, 110B and 110C are simplified partially cut-away pictorial, partially cut-away side view and sectional view illustrations, corresponding to FIG. 99, of an initial stage in clamping and human and machine sensible tamper-evidencing and re-use preventing fluid sealing engagement of the SUPCA with the SUPCASCA, FIG. 110C being taken along lines C-C in FIG. 110A;

FIGS. 111A, 111B and 111C are simplified partially cut-away pictorial, partially cut-away side view and sectional view illustrations, corresponding to FIG. 100, of a final stage in clamping and an intermediate stage of activation of human and machine sensible tamper-evidencing and re-use prevention functionality of the SUPCA, FIG. 111C being taken along lines C-C in FIG. 111A;

FIGS. 112A, 112B and 112C are simplified partially cut-away pictorial, partially cut-away side view and sectional view illustrations, corresponding to FIG. 104, of a stage wherein the SUPCA is fully unclamped and the human and machine sensible tamper-evidencing and re-use prevention functionality of the SUPCA is not yet fully activated, FIG. 112C being taken along lines C-C in FIG. 112A;

Figure 65A:
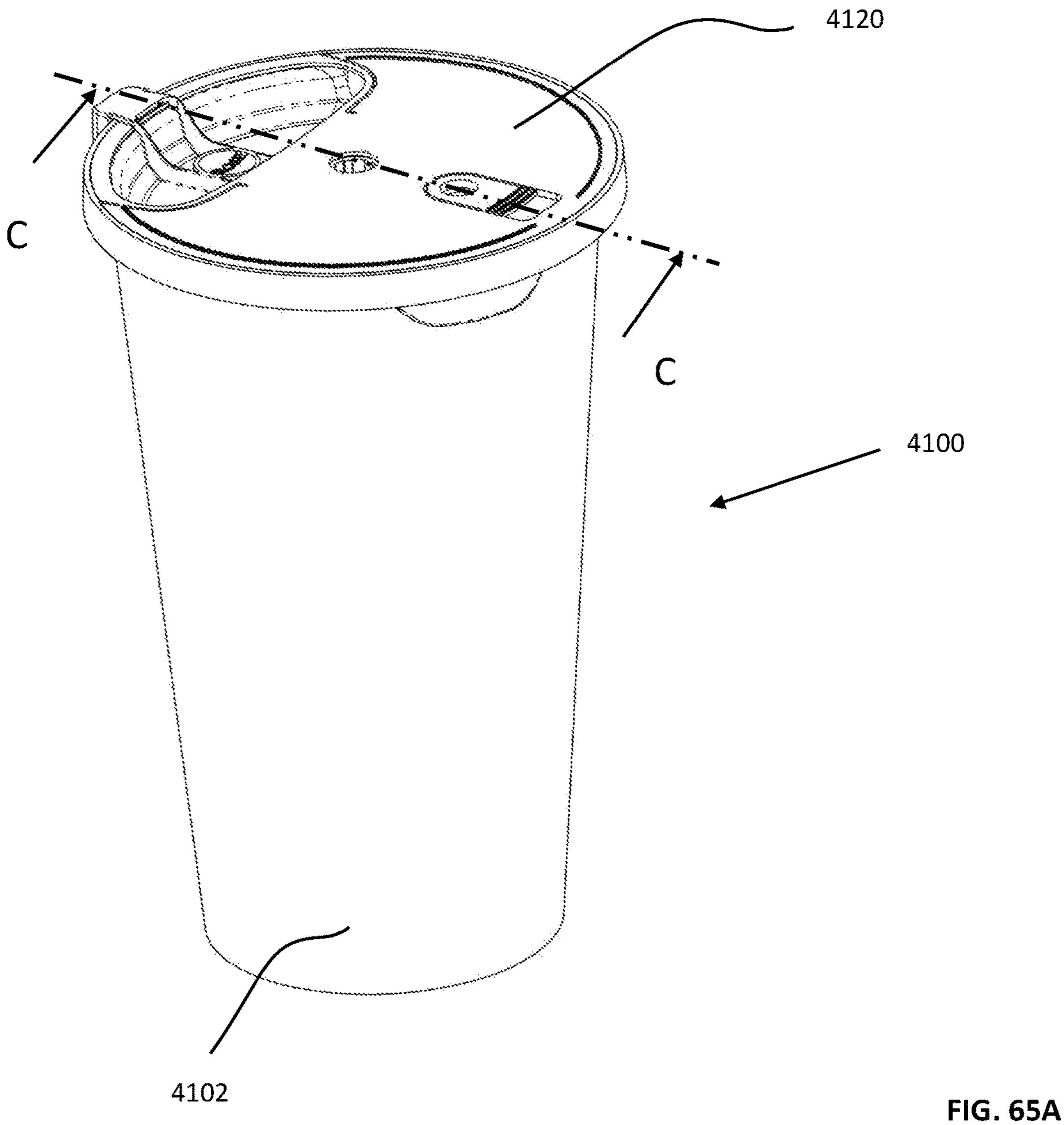
FIGS. 65A, 65B and 65C are respective simplified pictorial, exploded view and sectional view illustrations of a single-use preparation container assembly (SUPCA) constructed and operative in accordance with yet another preferred embodiment of the present invention, FIG. 65C being taken along lines C-C in FIG. 65A.
Figure 65B:
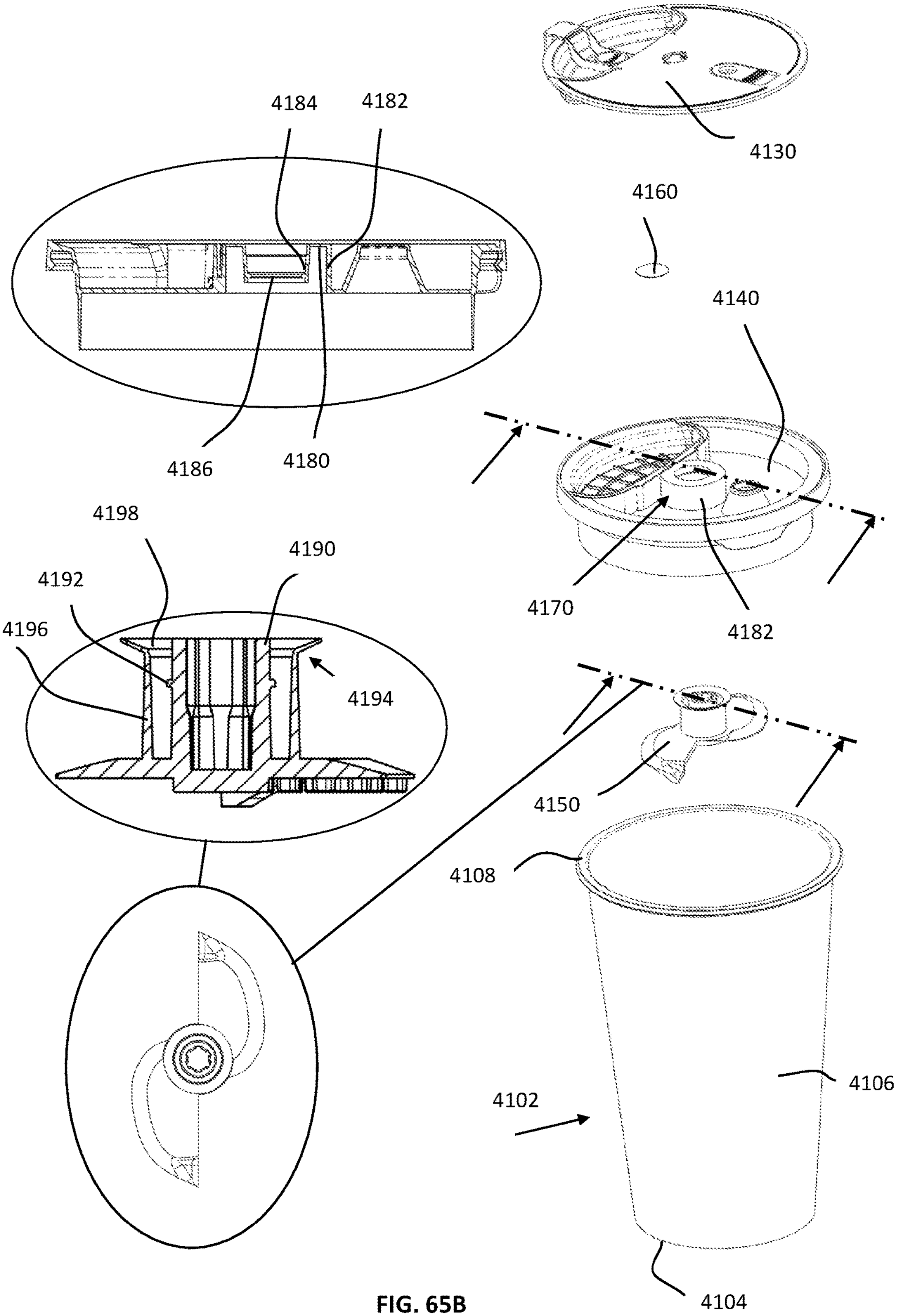
Figure 65C:
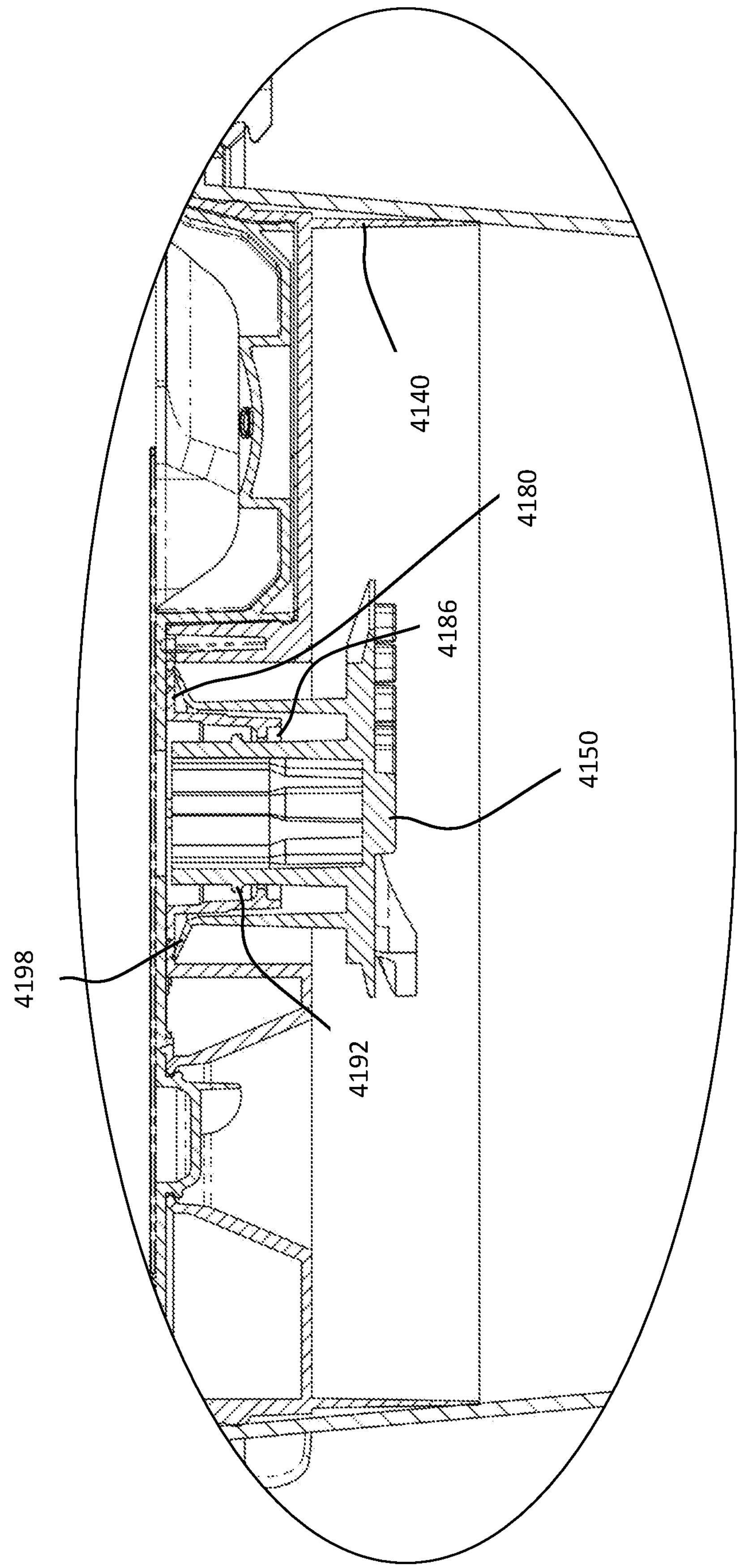
Figure 65D:
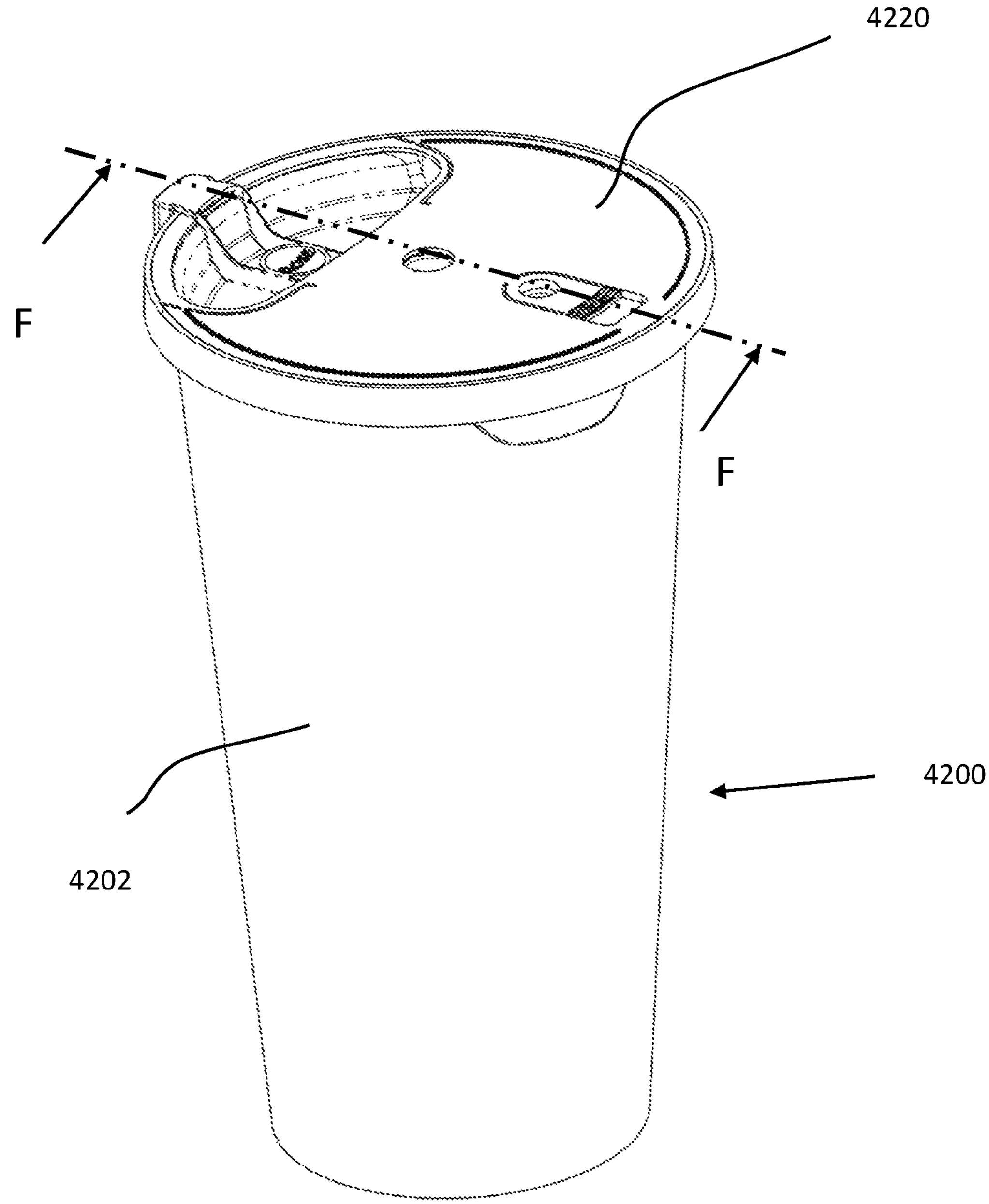
FIGS. 65D, 65E and 65F are respective simplified pictorial, exploded view and sectional view illustrations of a single-use preparation container assembly (SUPCA) constructed and operative in accordance with still another preferred embodiment of the present invention, FIG. 65F being taken along lines F-F in FIG. 65D.
Figure 65E:
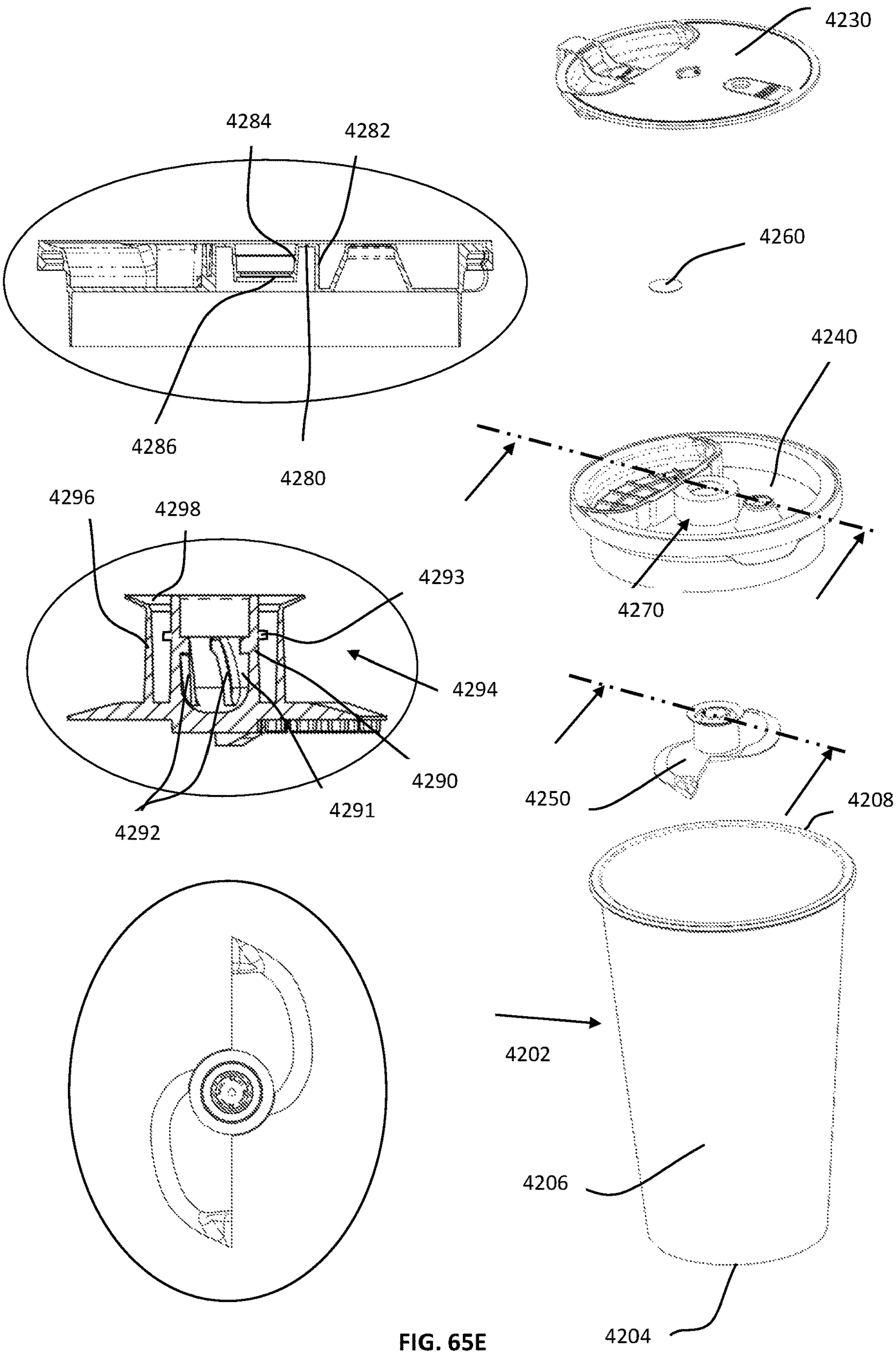
Figure 65F:
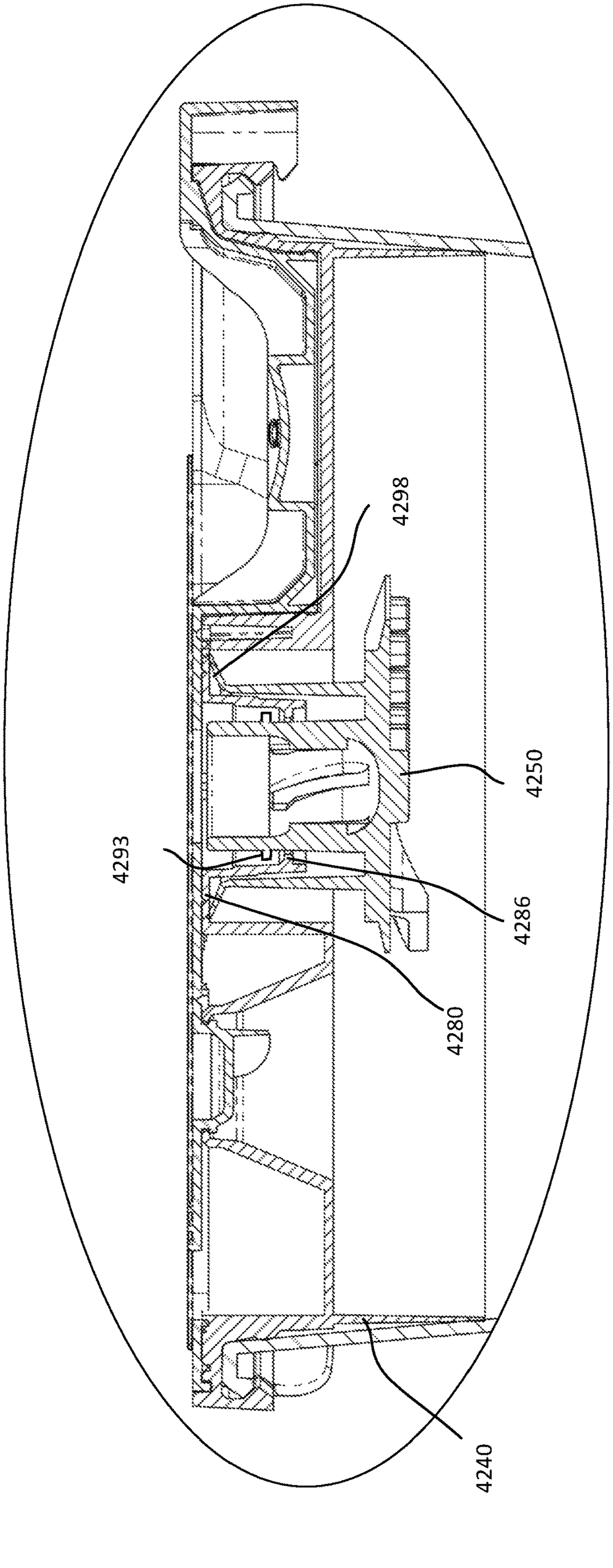
Figure 66A:
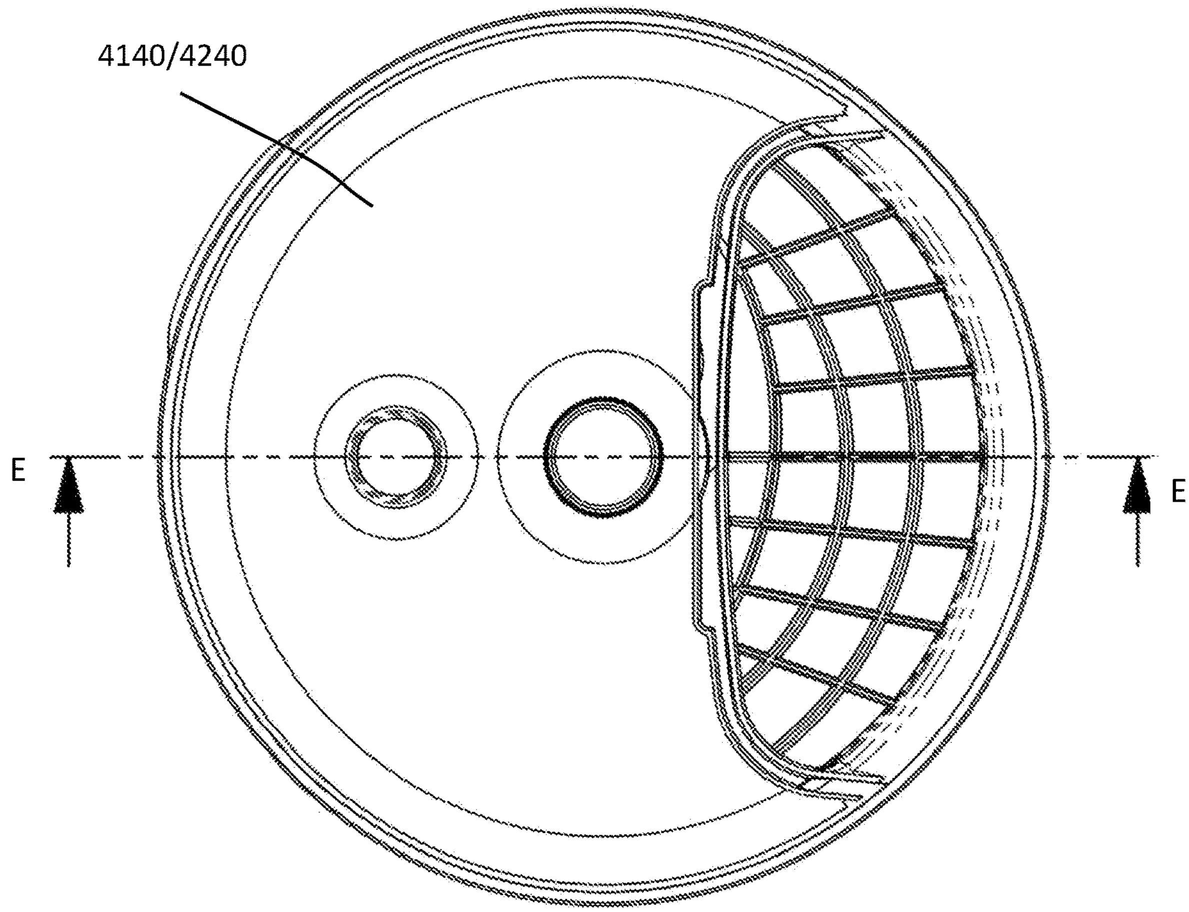
FIGS. 66A, 66B, 66C, 66D and 66E are simplified respective planar top, planar bottom, pictorial top, pictorial bottom and planar sectional illustrations of a lid of the SUCSERDREA of FIGS. 65A-65C, FIG. 66E being taken along lines E-E in FIG. 66A.
Figure 66B:
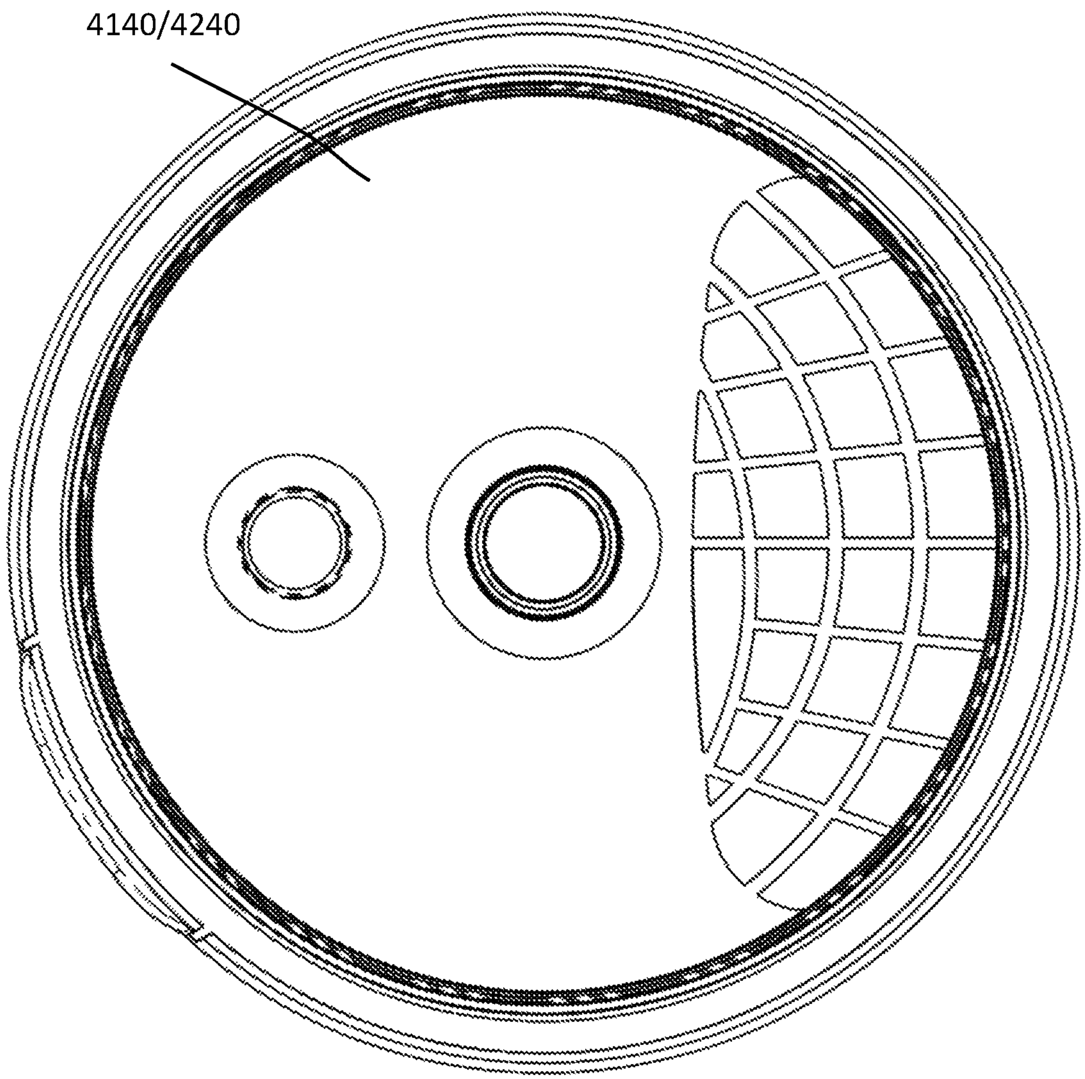
Figure 66C:
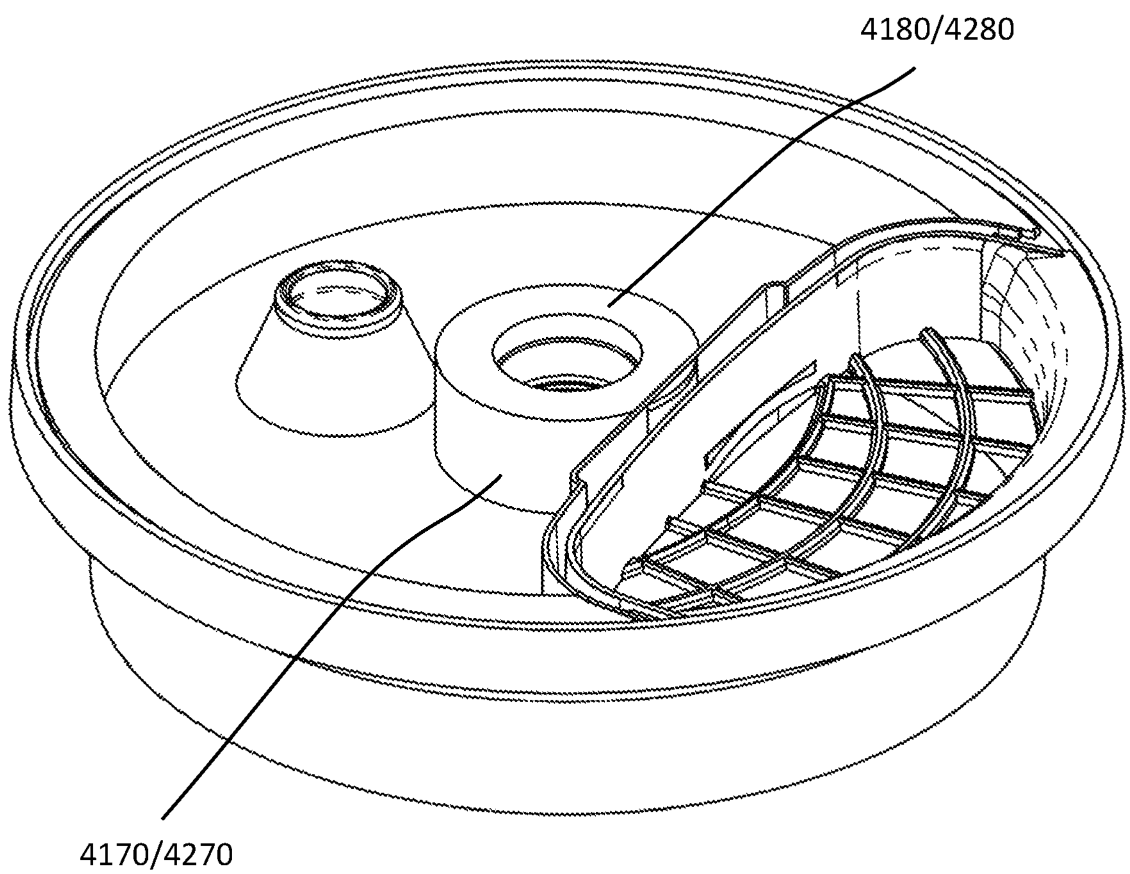
Figure 66D:
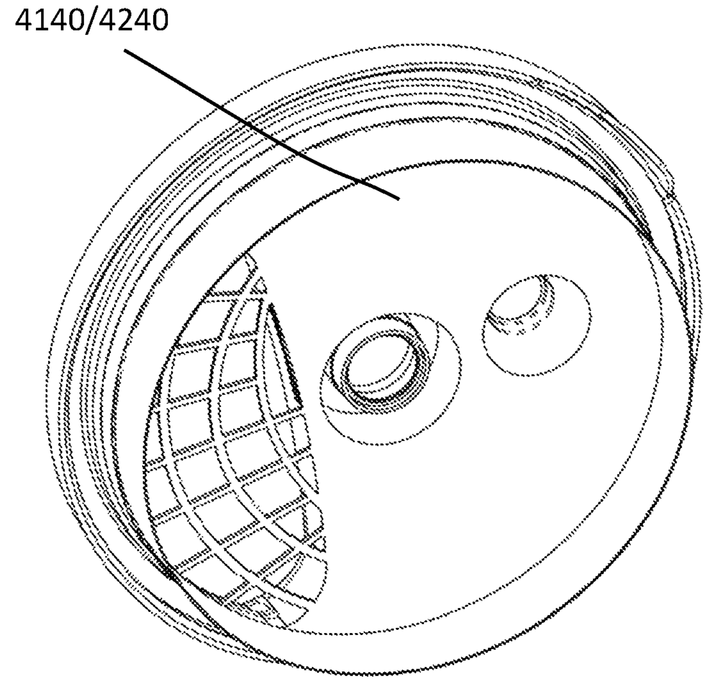
Figure 66E:
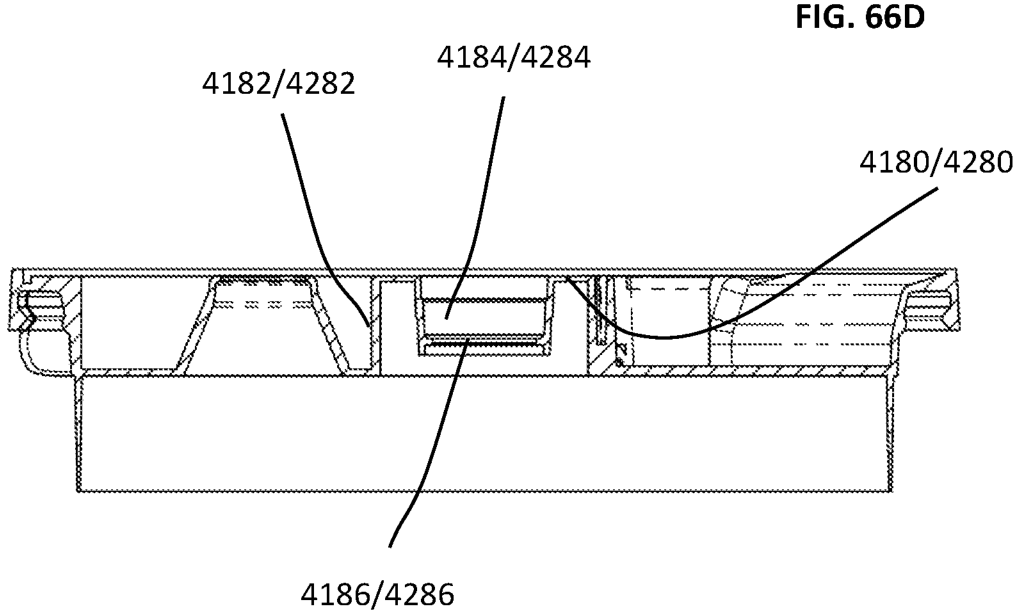
Figure 67A:
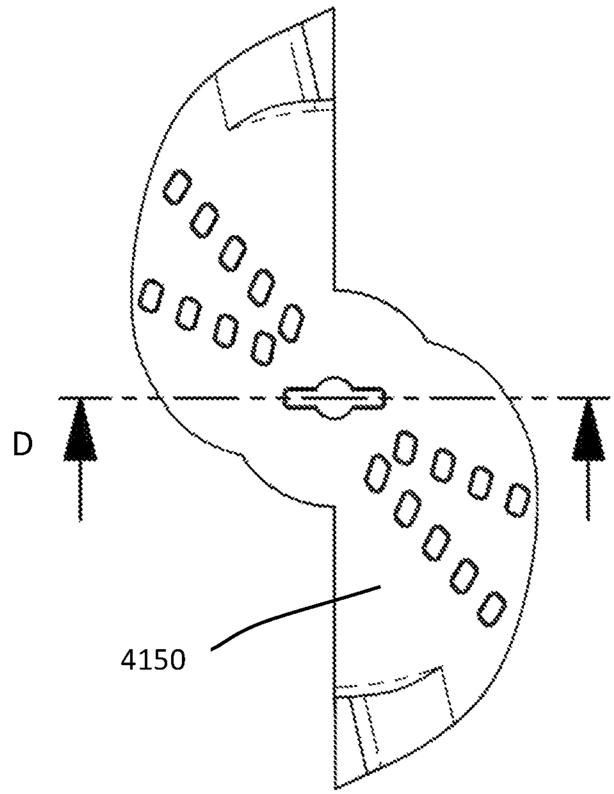
FIGS. 67A, 67B, 67C and 67D are simplified respective planar top, pictorial bottom, pictorial top and planar sectional illustrations of a preferred embodiment of a blade of the SUCSERDREA of FIGS. 65A-65C and 66A-66E, FIG. 67D being taken along lines D-D in FIG. 67A.
Figure 67B:
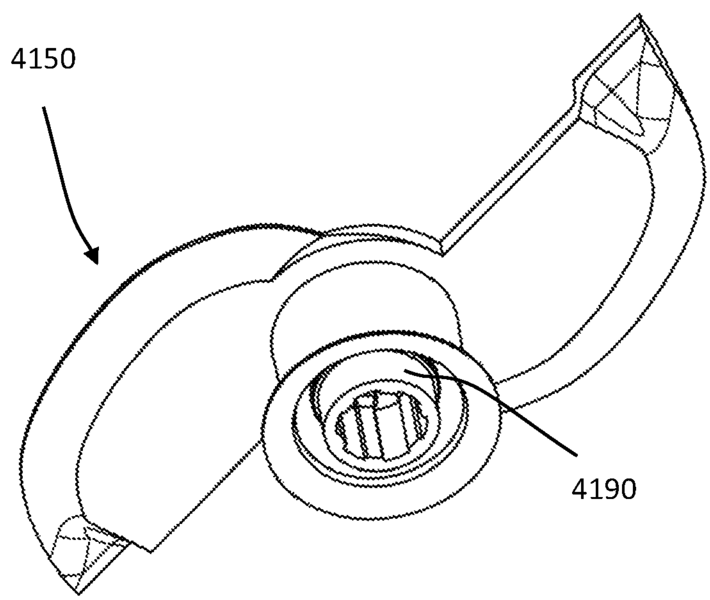
Figure 67C:
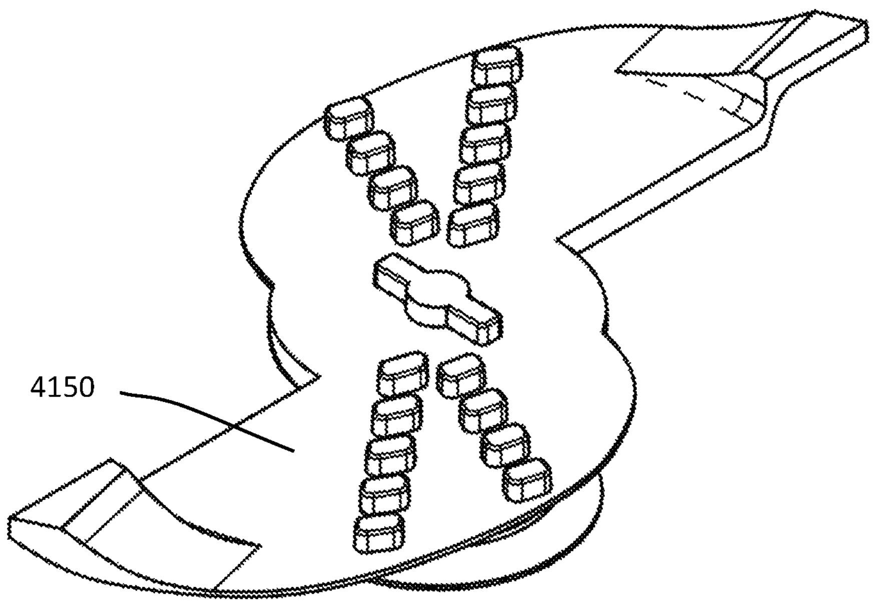
Figure 67D:
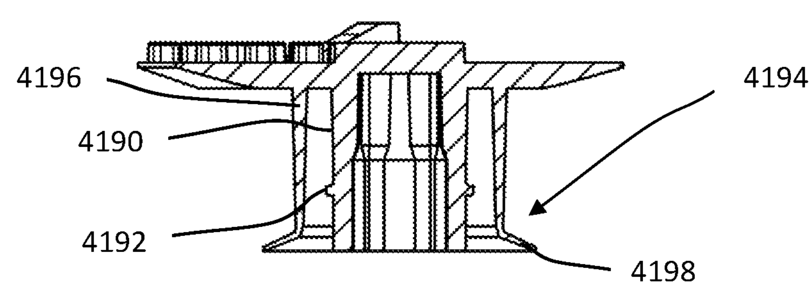
Figure 67E:
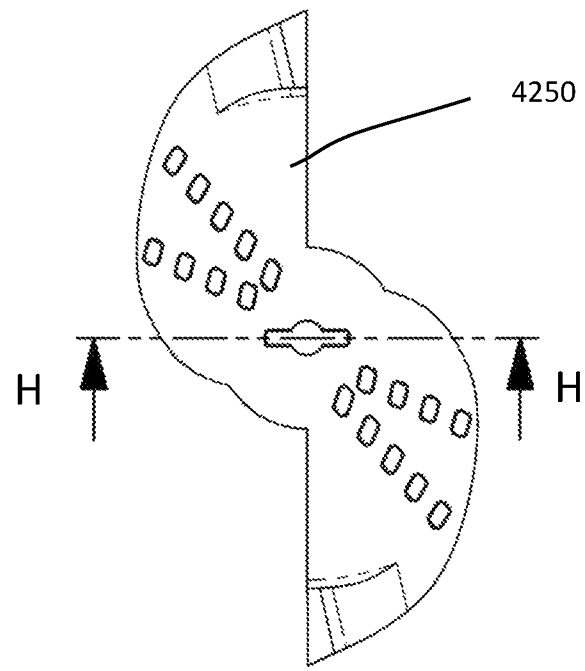
FIGS. 67E, 67F, 67G and 67H are simplified respective planar top, pictorial bottom, pictorial top and planar sectional illustrations of another preferred embodiment of a blade of the SUCSERDREA of FIGS. 65D-65F and 66A-66E, FIG. 67H being taken along lines H-H in FIG. 67E.
Figure 67F:
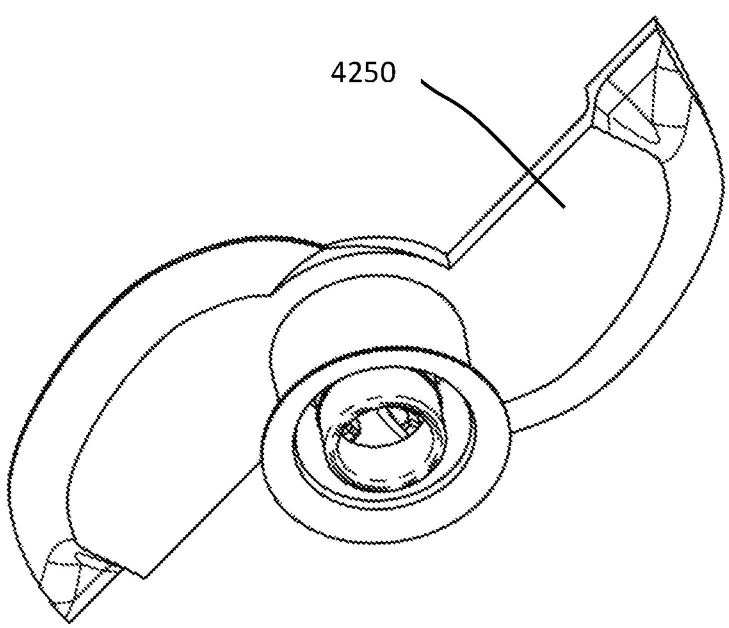
Figure 67G:
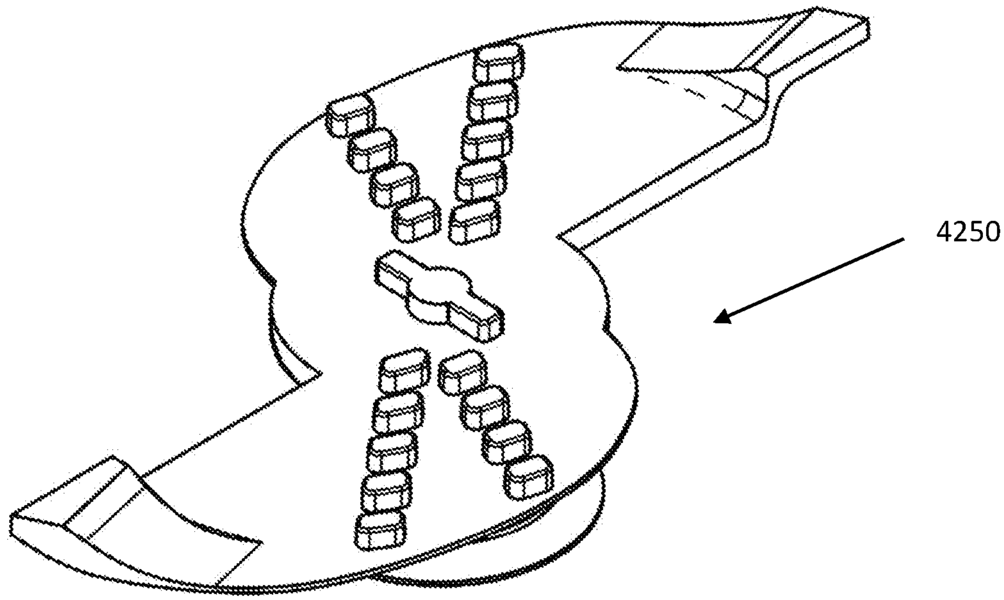
Figure 67H:
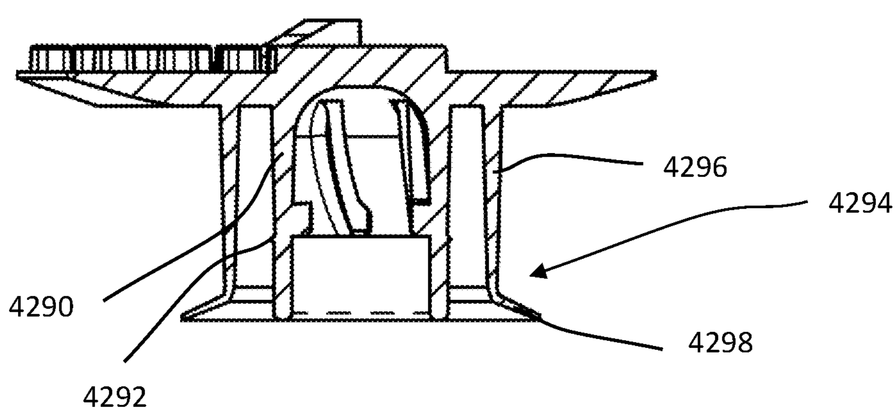
Figure 68:
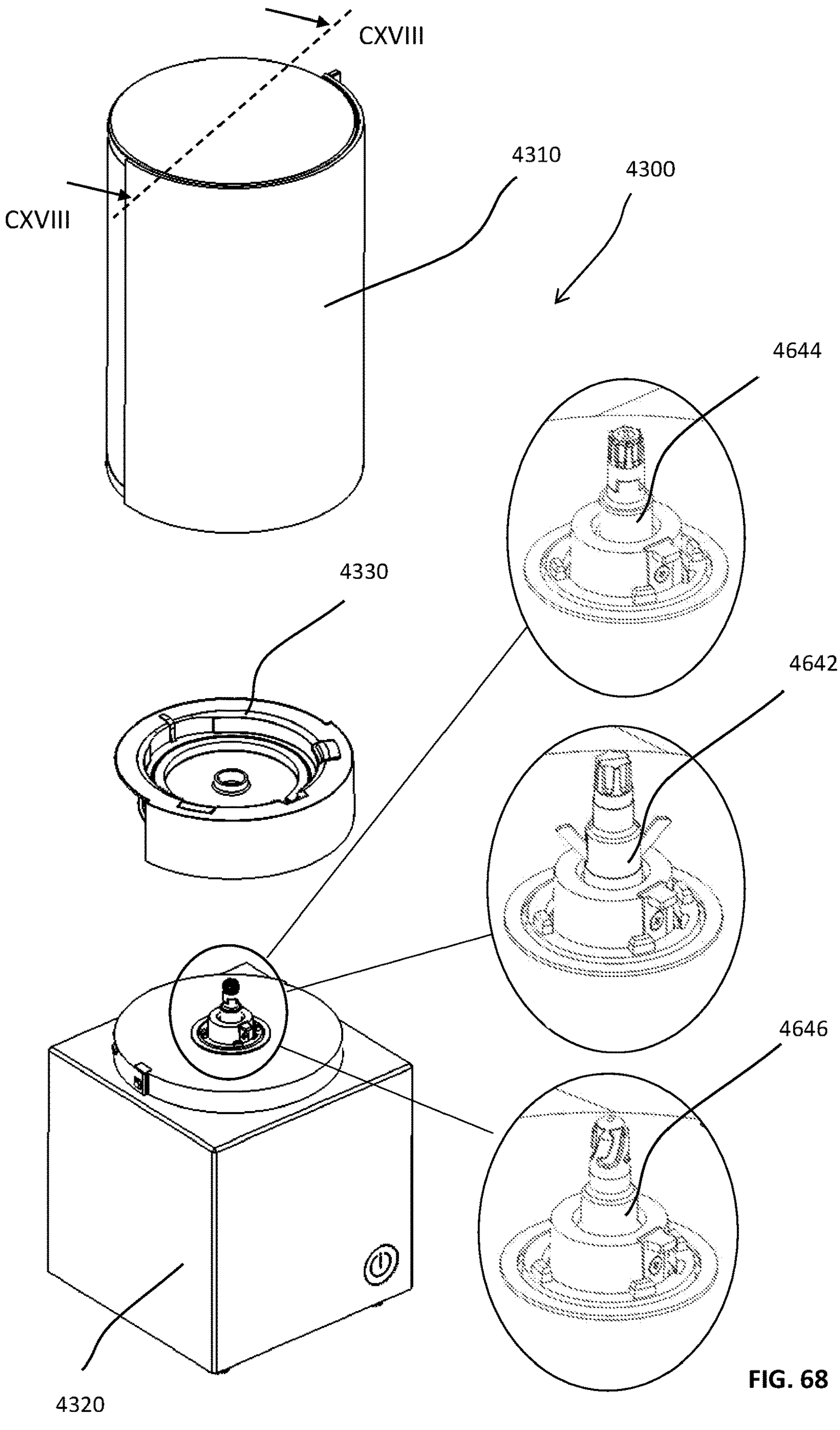
FIG. 68 is a simplified exploded view illustration of additional preferred embodiments of a multiple motion intelligent driving device (MMIDD), each constructed and operative in accordance with an embodiment of the present invention and useful with the SUPCA of FIGS. 60A-60I.
Figure 69A:
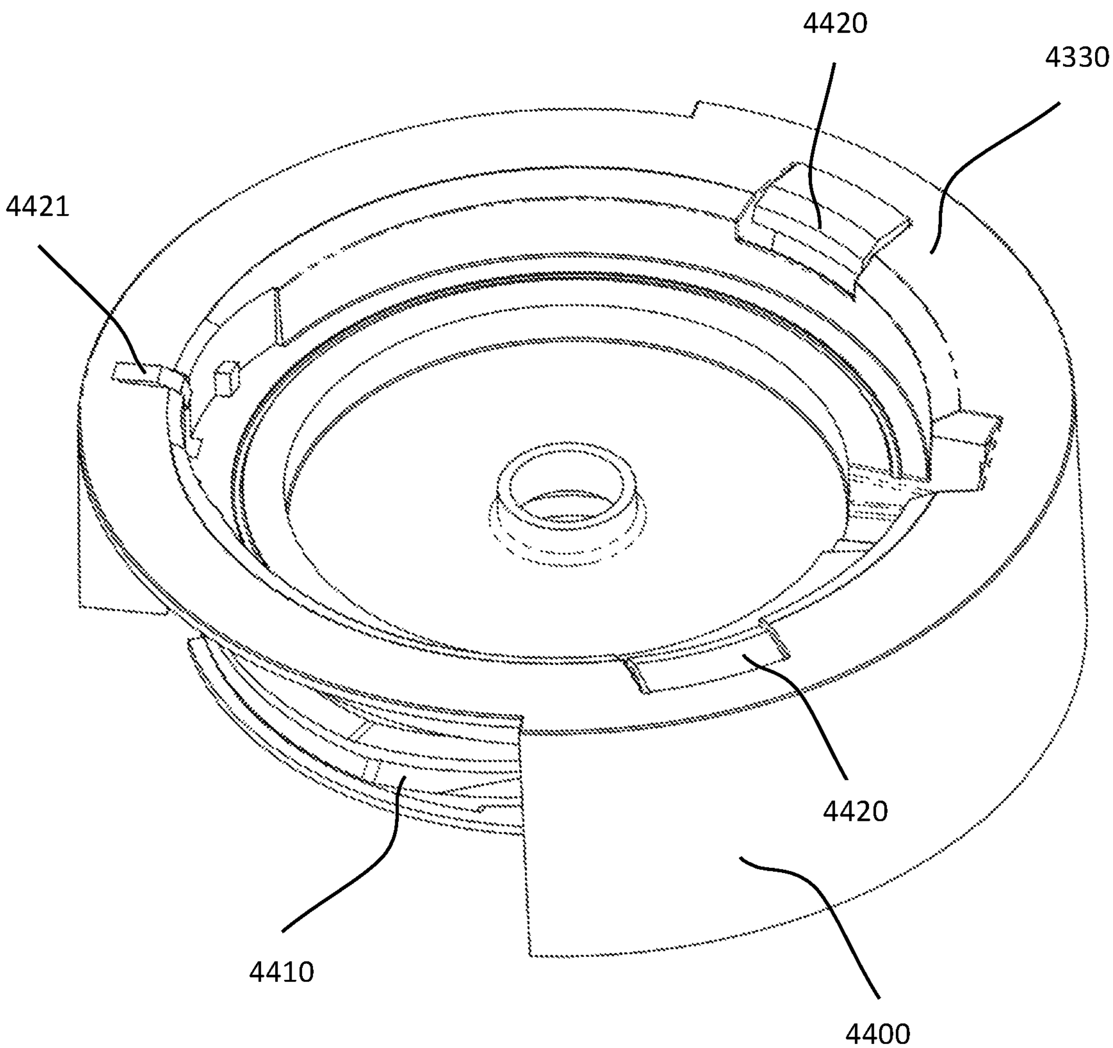
FIGS. 69A, 69B, 69C, 69D and 69E are simplified respective pictorial top view, planar top view, planar side view, planar bottom view and exploded view illustrations of a SUPCA support and clamping assembly (SUPCASCA) forming part of the MMIDD of FIG. 68.
Figure 69B:
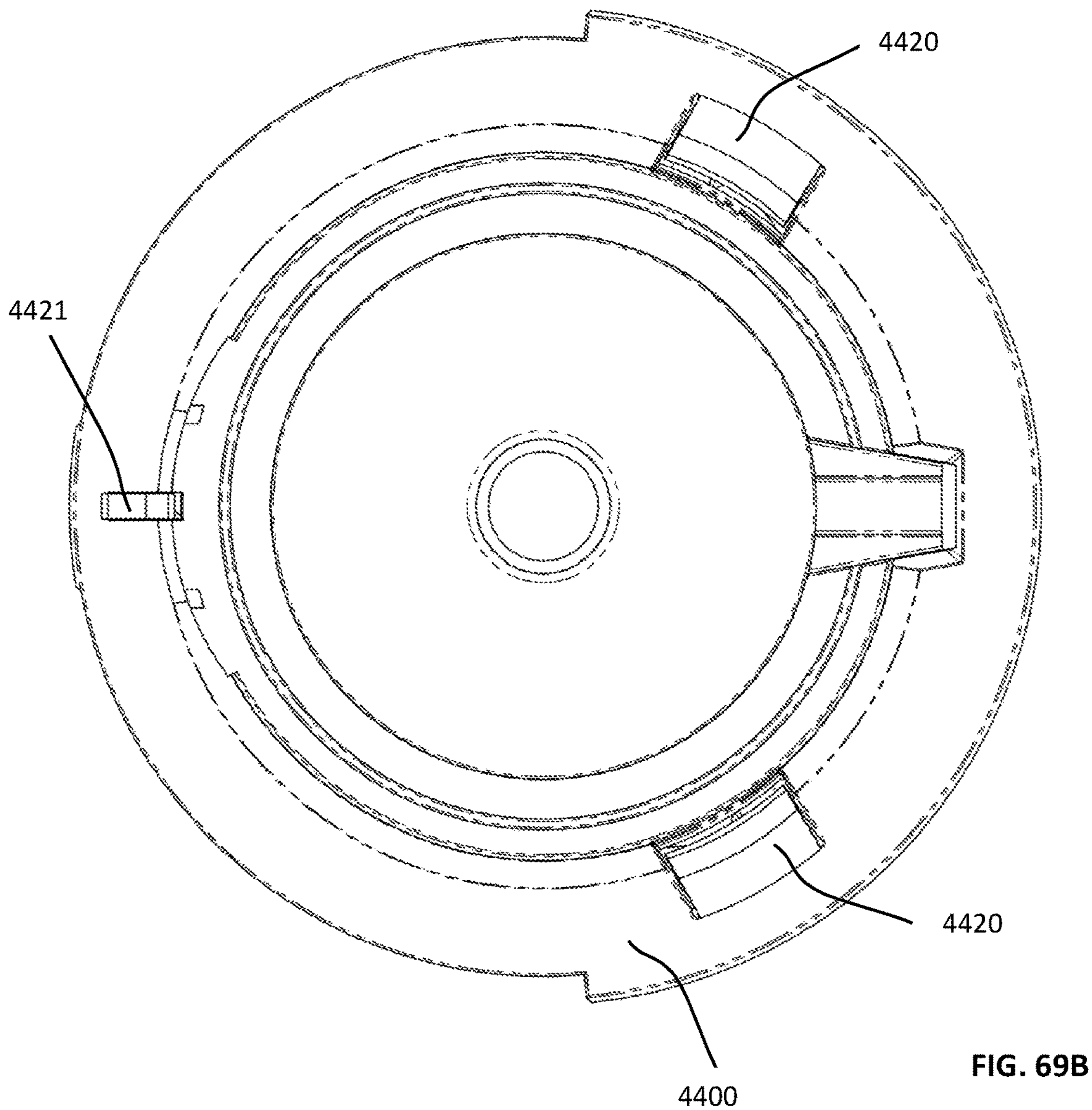
Figure 69C:
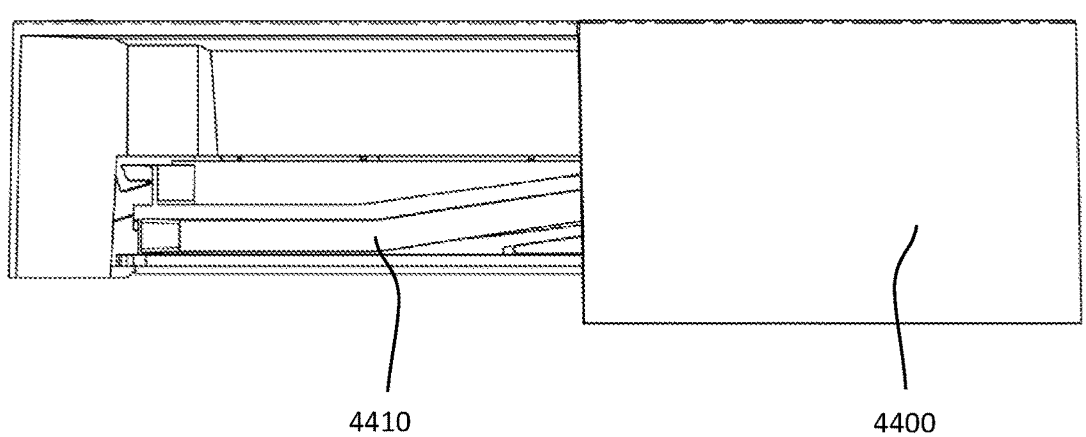
Figure 69D:
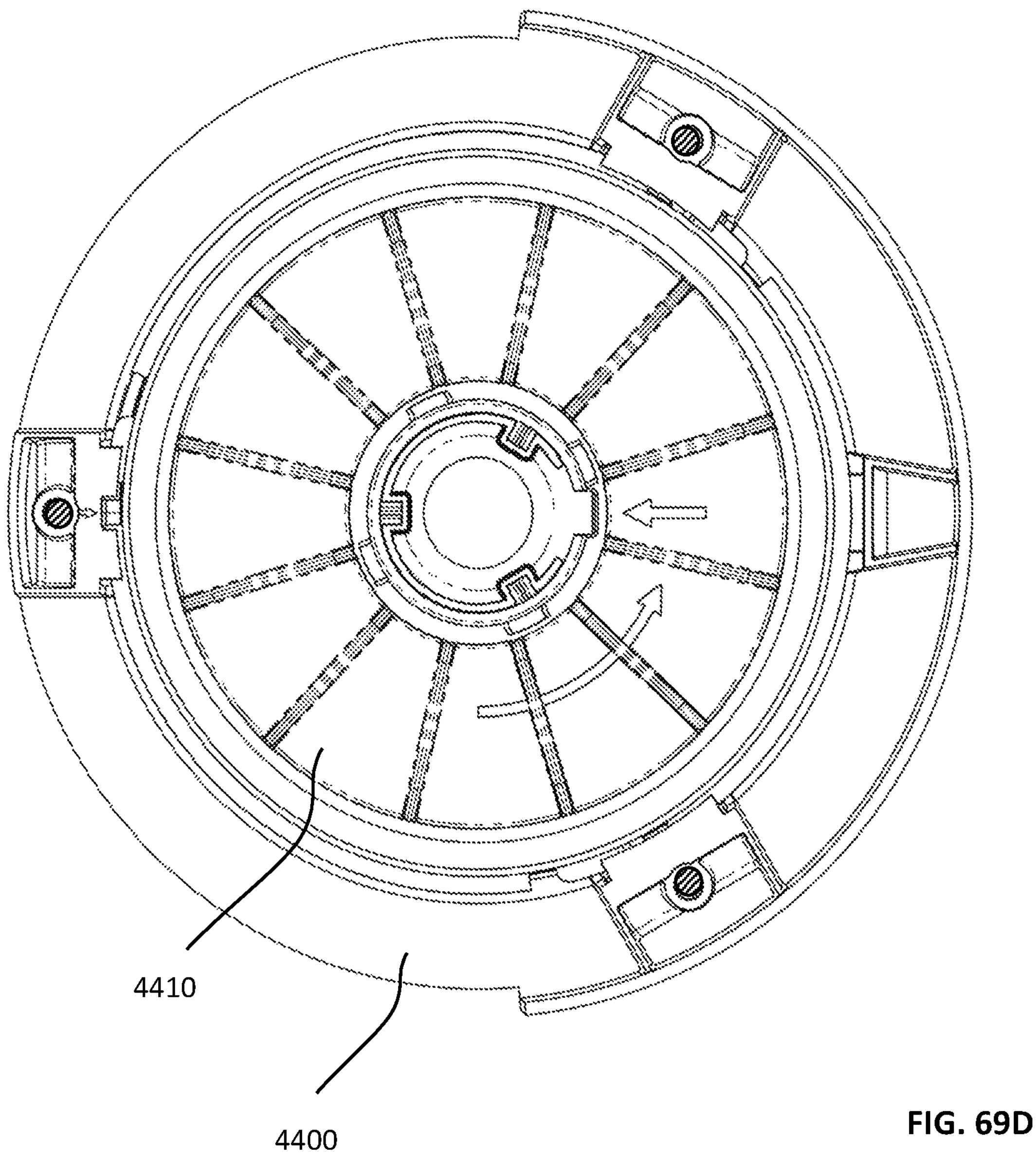
Figure 69E:
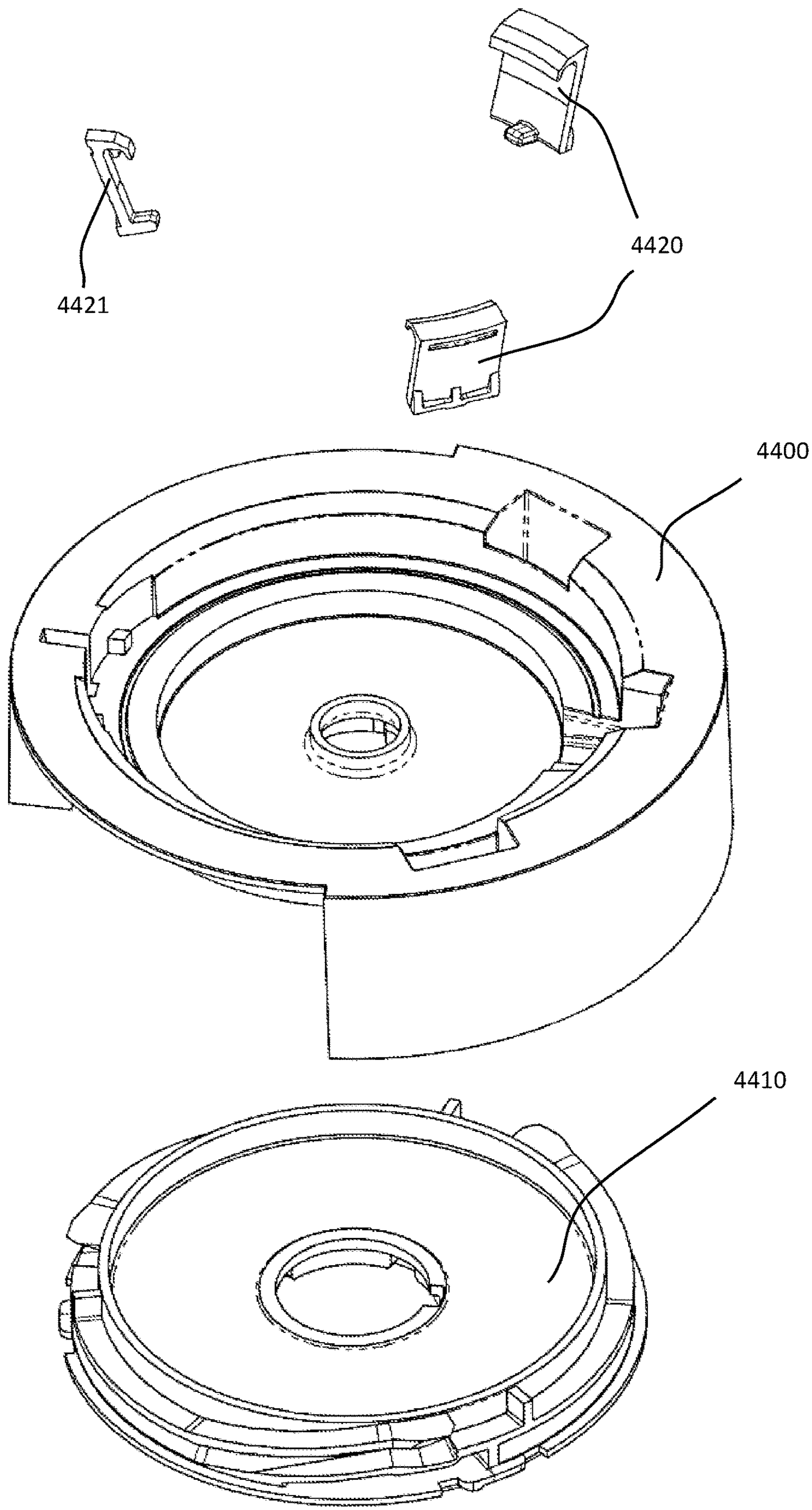
Figure 70A:
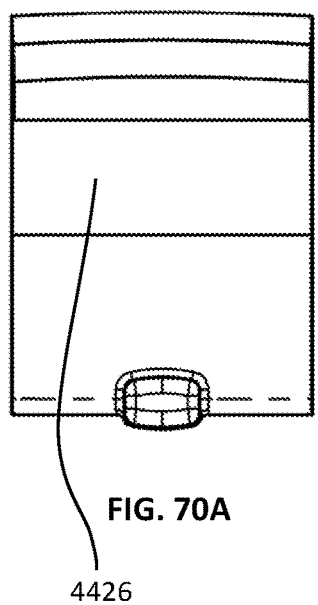
FIGS. 70A, 70B, 70C, 70D, 70E and 70F are simplified respective planar front view, planar rear view, planar side view, planar top view, top-facing pictorial front view, bottom-facing pictorial rear view illustrations of a first clamp element forming part of the SUPCASCA of FIGS. 69A-69E.
Figure 70B:
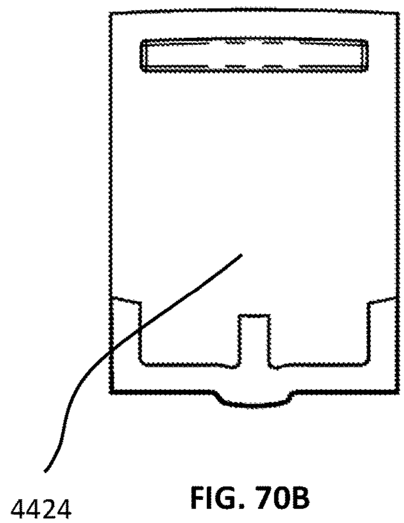
Figure 70G:
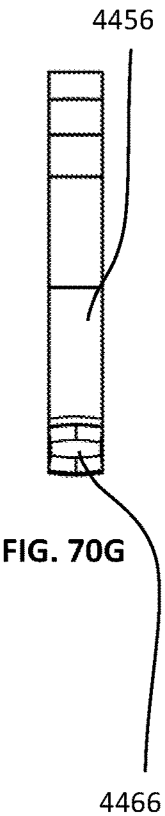
FIGS. 70G, 70H, 70I, 70J, 70K and 70L are simplified respective planar front view, planar rear view, planar side view, planar top view, top-facing pictorial front view, bottom-facing pictorial rear view illustrations of a second clamp element forming part of the SUPCASCA of FIGS. 69A-69E.
Figure 70H:
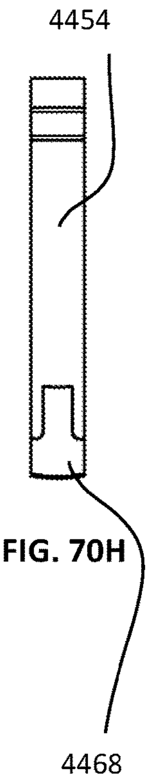
Figure 70C:
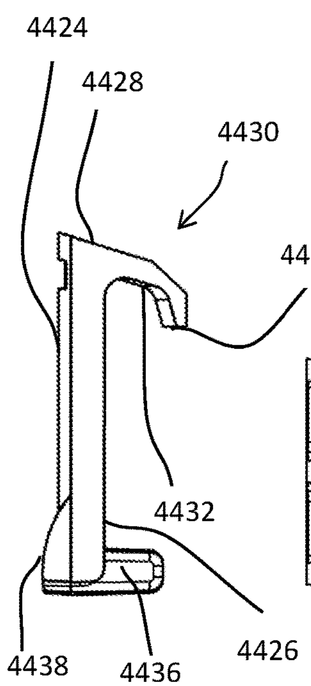
Figure 70D:
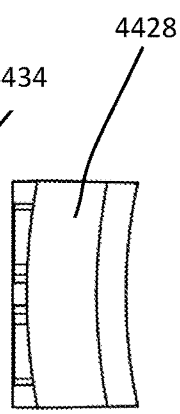
Figure 70I:
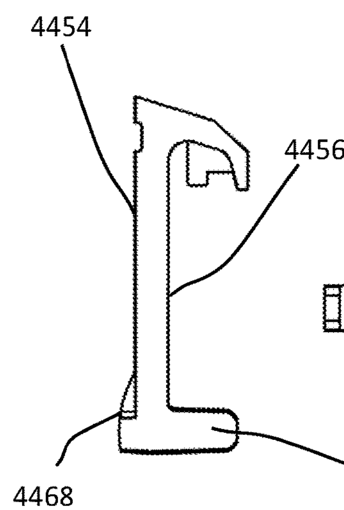
Figure 70J:
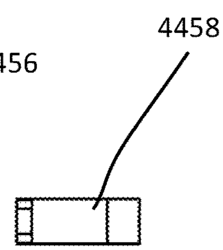
Figure 70E:
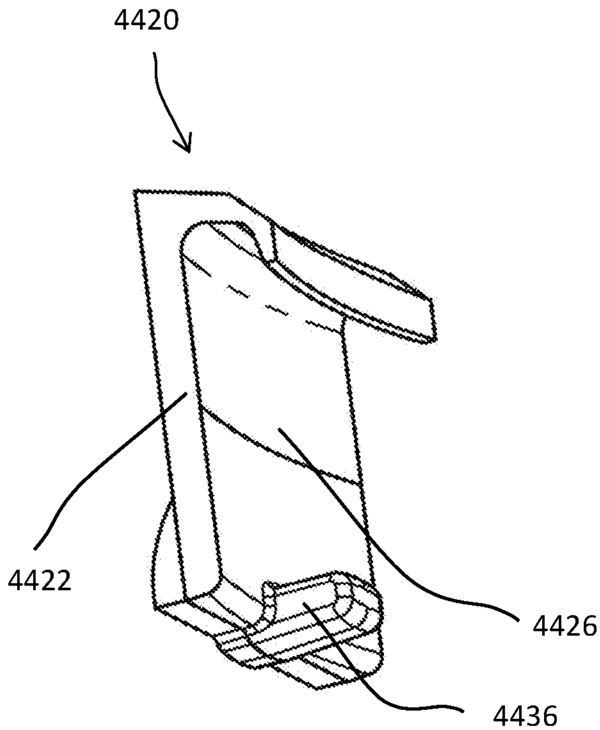
Figure 70K:
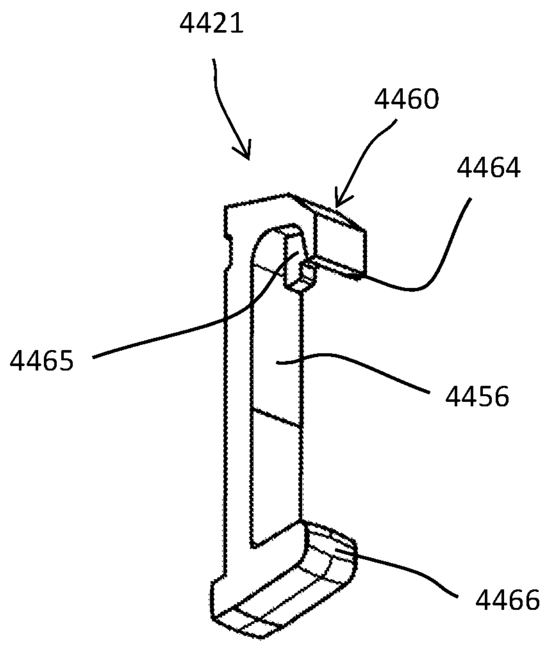
Figure 70F:
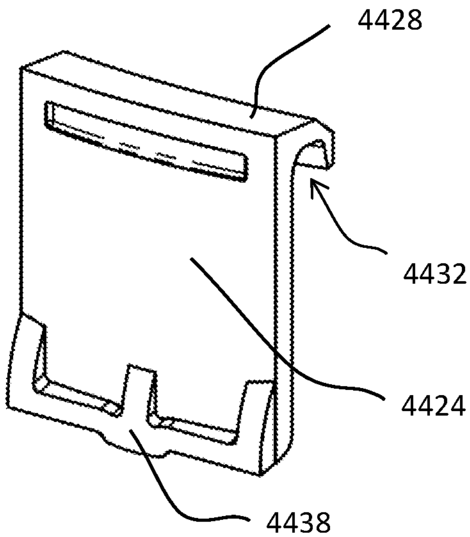
Figure 70L:
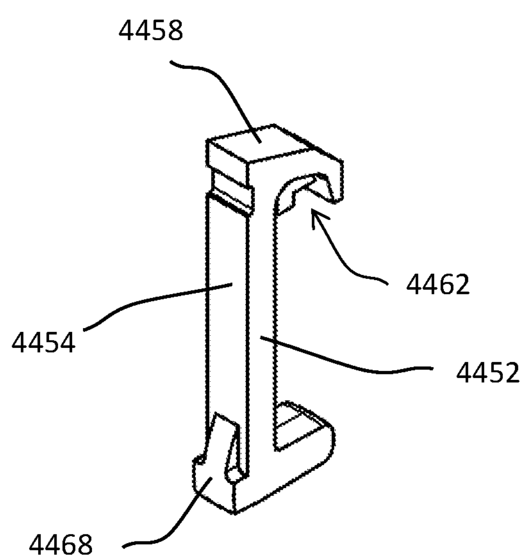
Figure 71A:
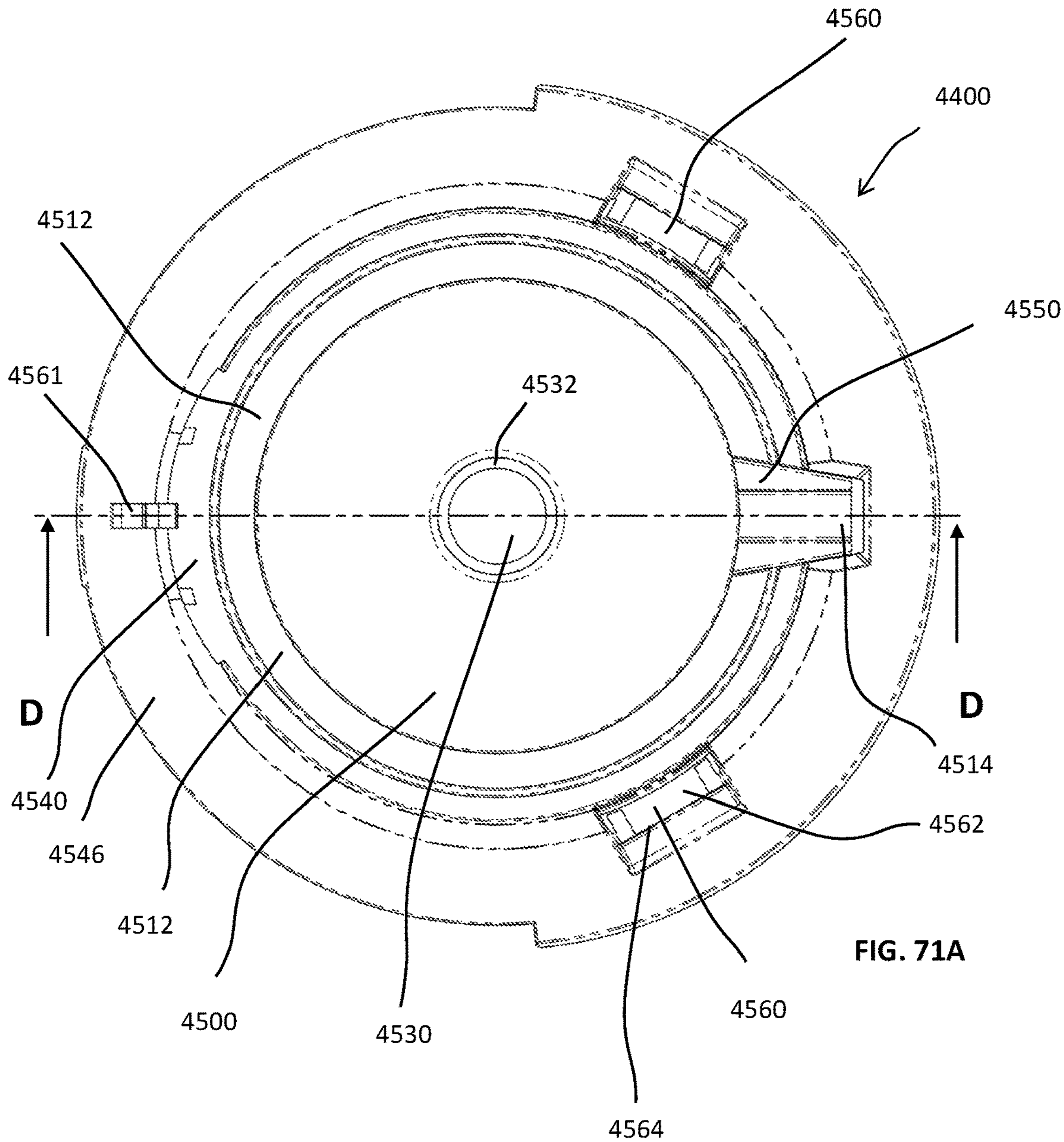
FIGS. 71A, 71B, 71C, 71D, 71E and 71F are simplified respective planar top view, planar side view, planar bottom view, sectional view, pictorial top view and pictorial bottom view illustrations of a support element forming part of the SUPCASCA of FIGS. 69A-69E, FIG. 71D being taken along lines D-D in FIG. 71A.
Figure 71B:
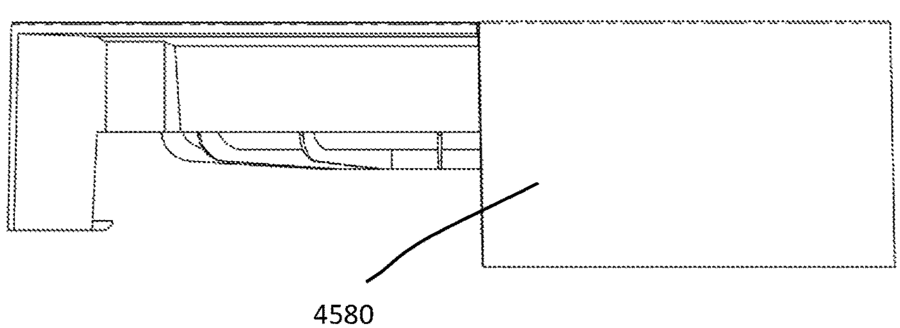
Figure 71C:
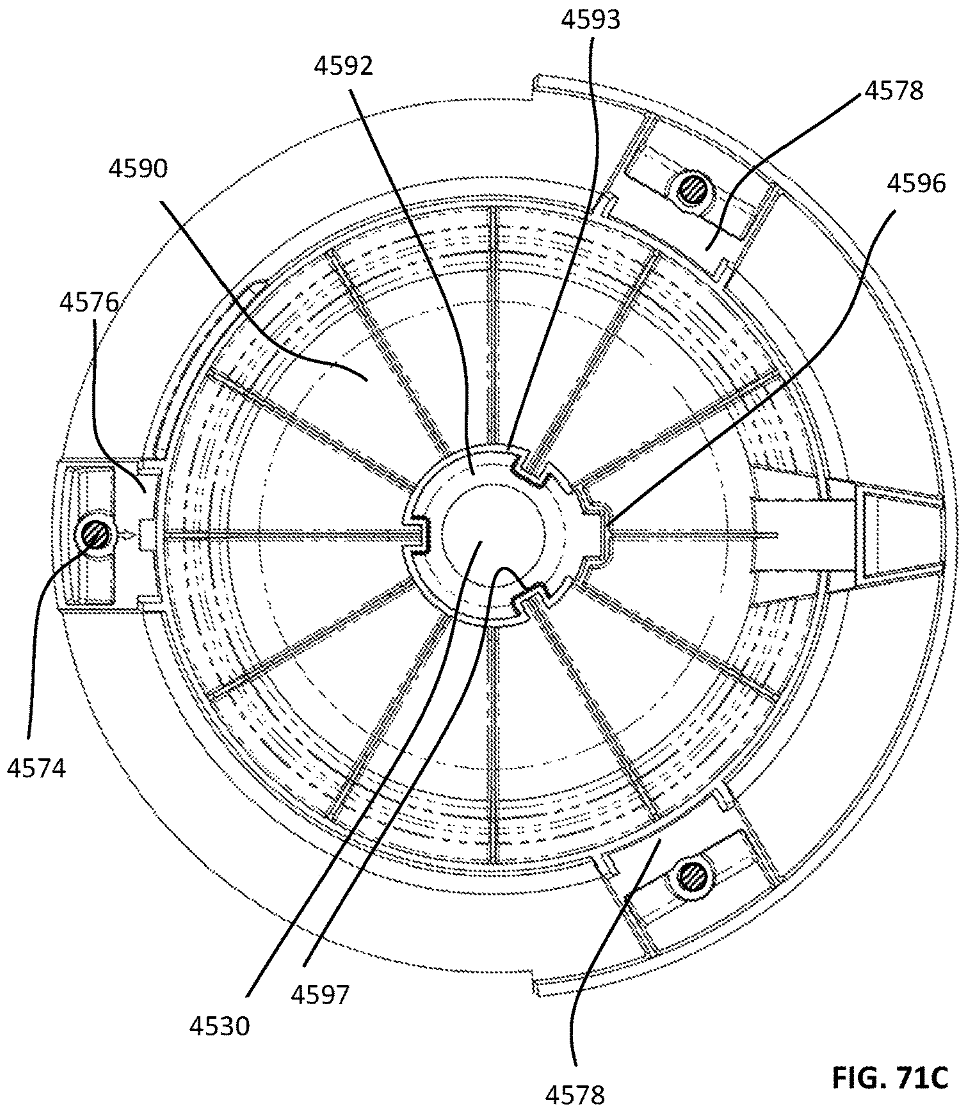
Figure 71D:
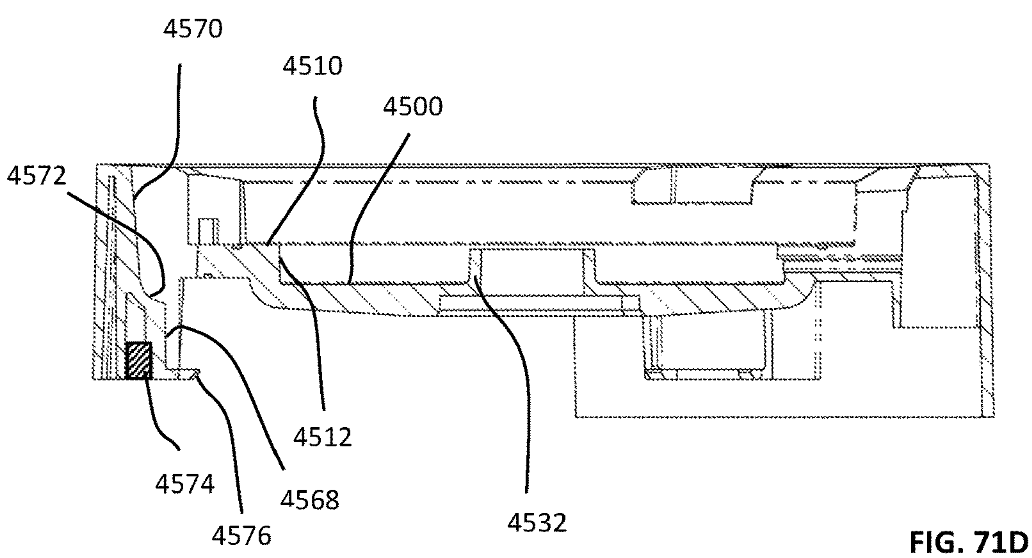
Figure 71E:
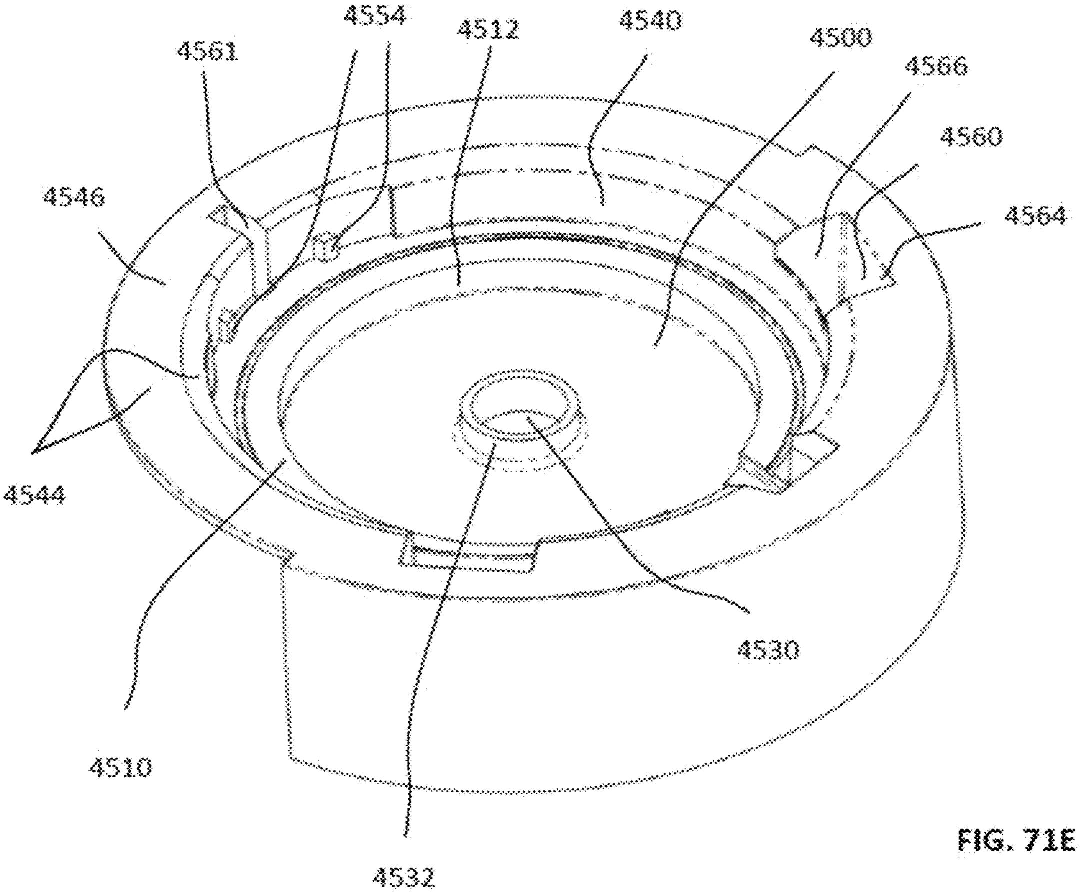
Figure 71F:
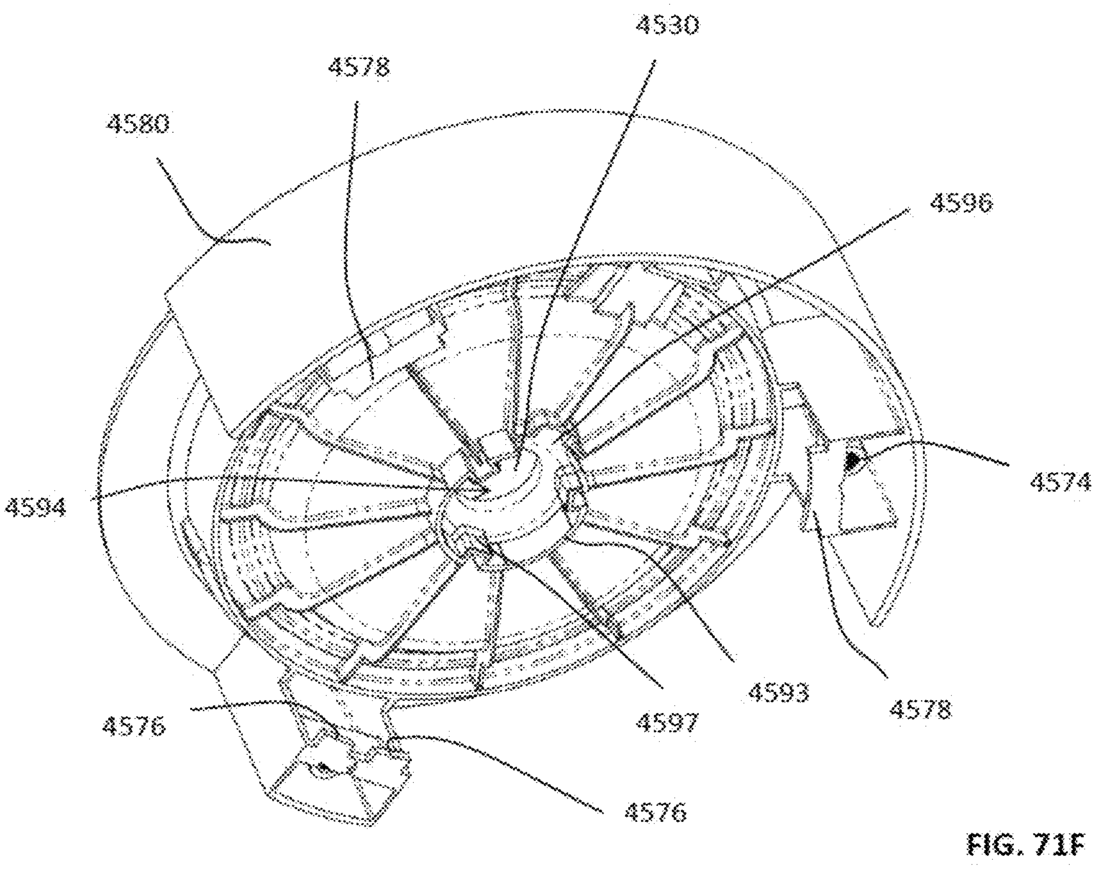
Figure 72A:
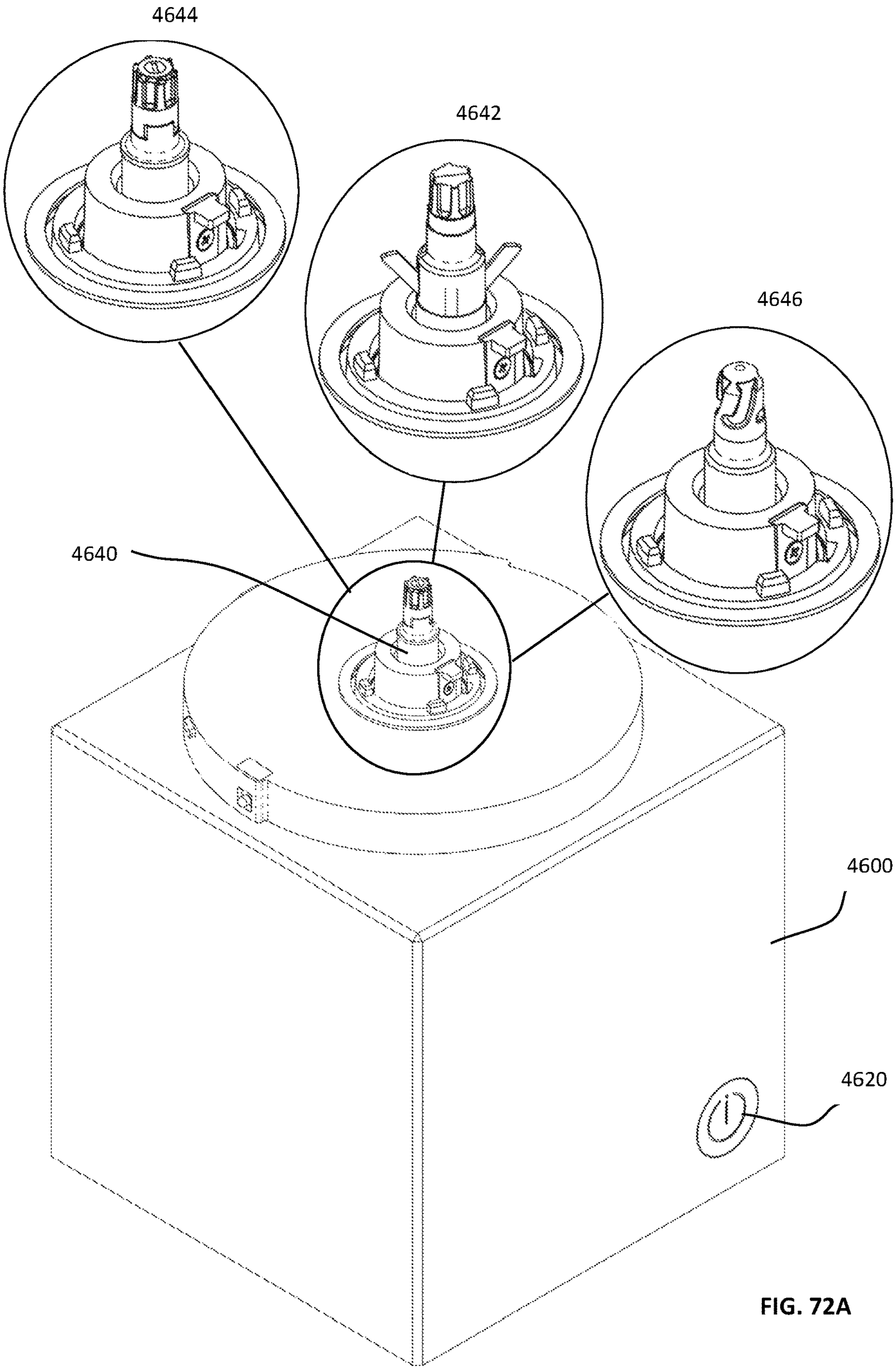
FIGS. 72A, 72B, 72C and 72D are simplified respective pictorial, planar front, planar top and exploded view illustrations of a base assembly forming part of the MMIDD of FIGS. 68-71F.
Figure 72B:
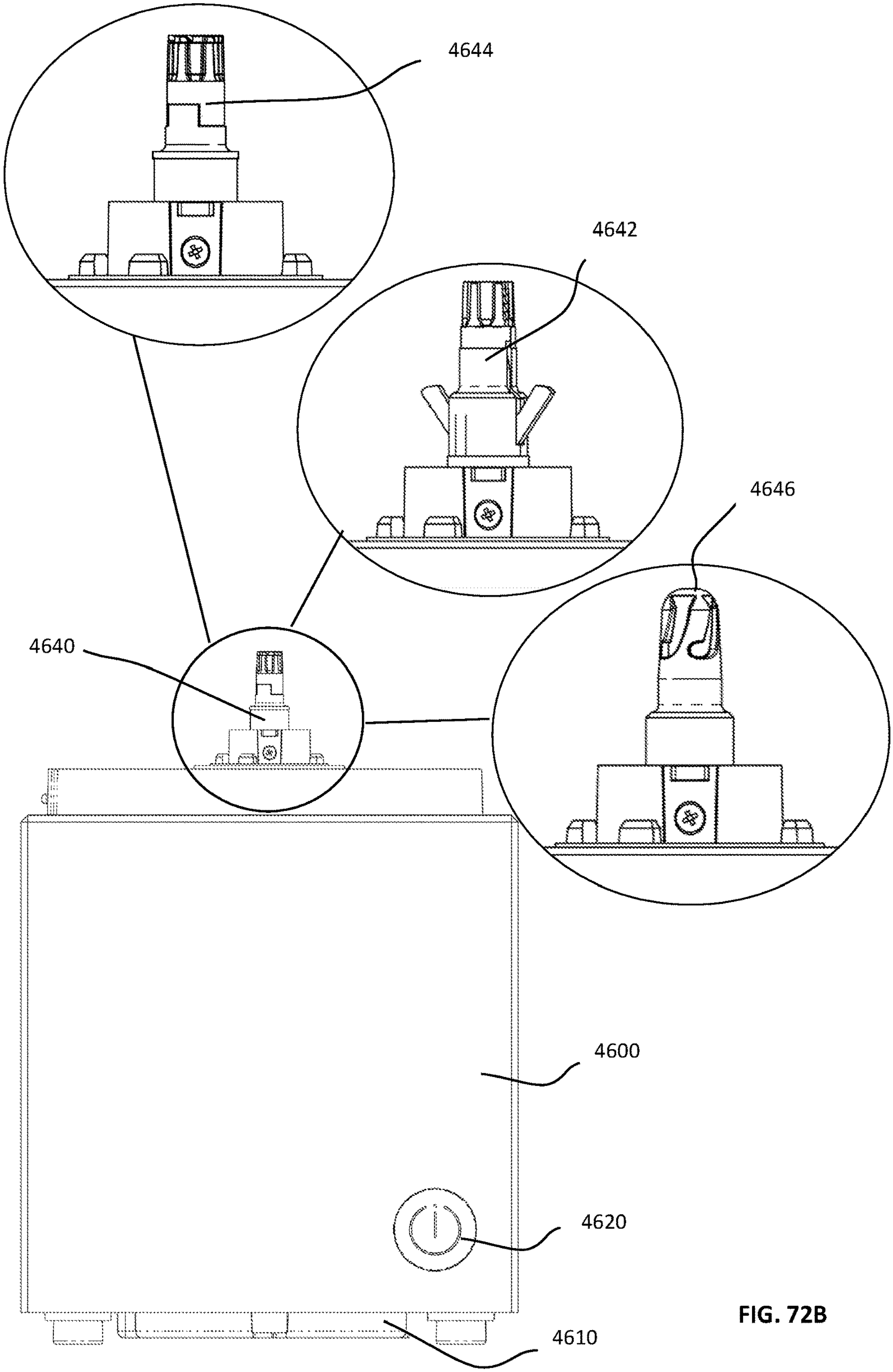
Figure 72C:
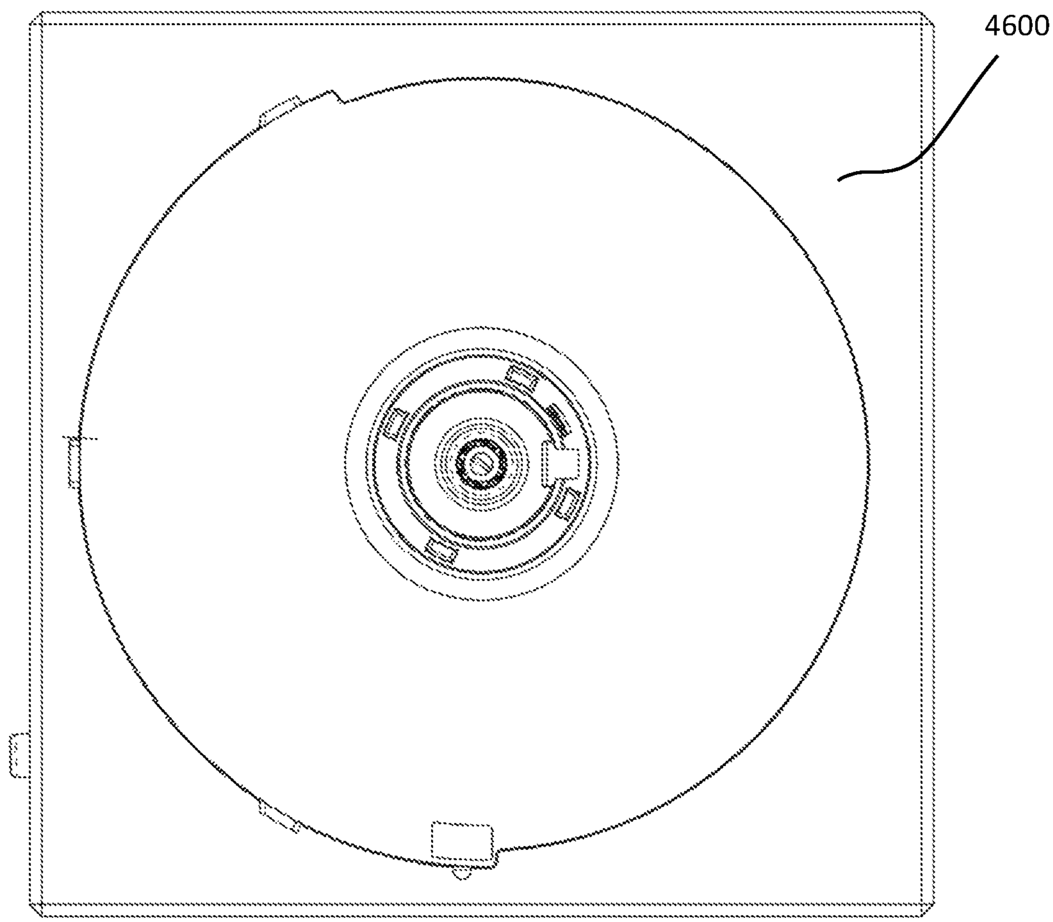
Figure 72D:
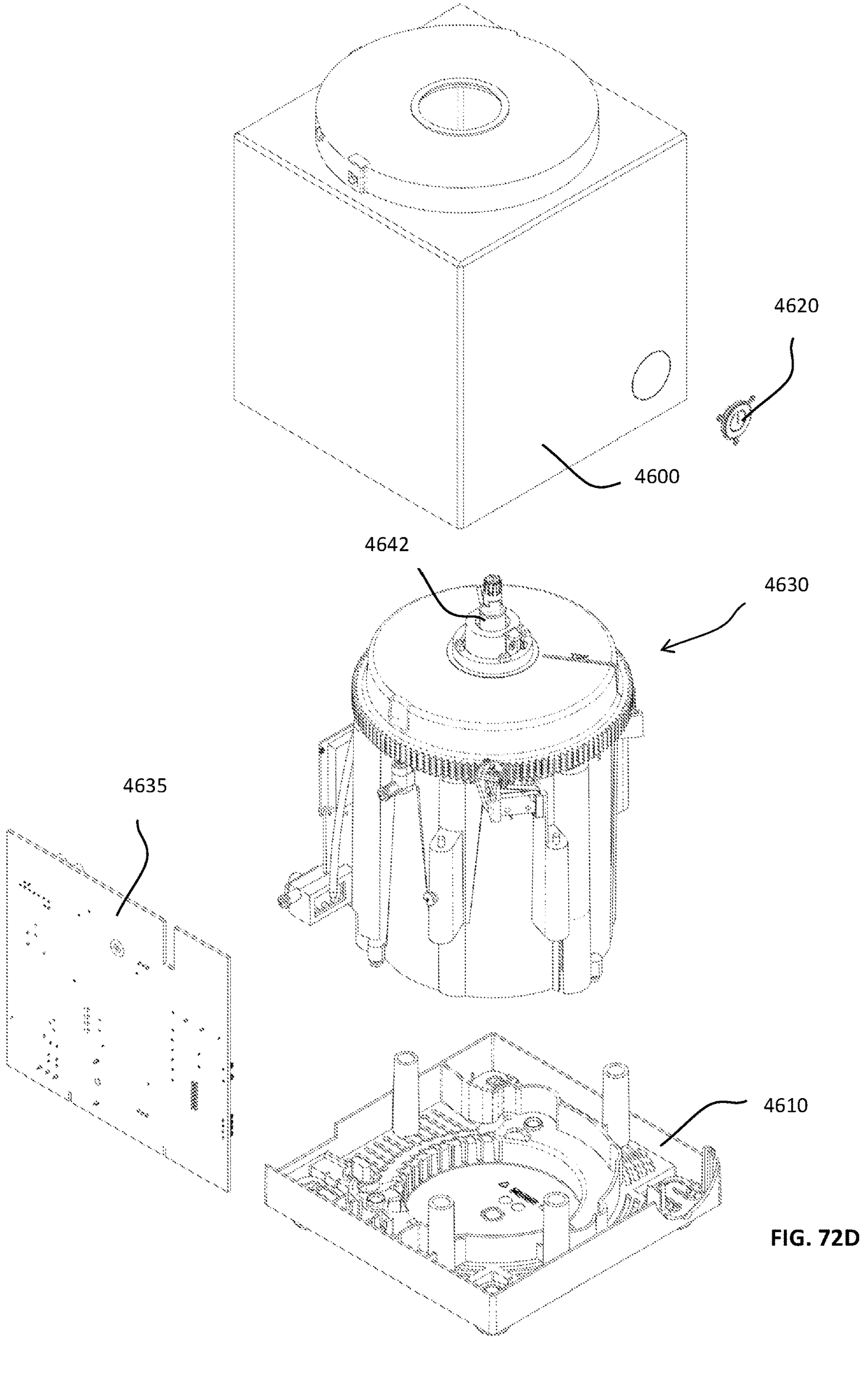
Figure 105:
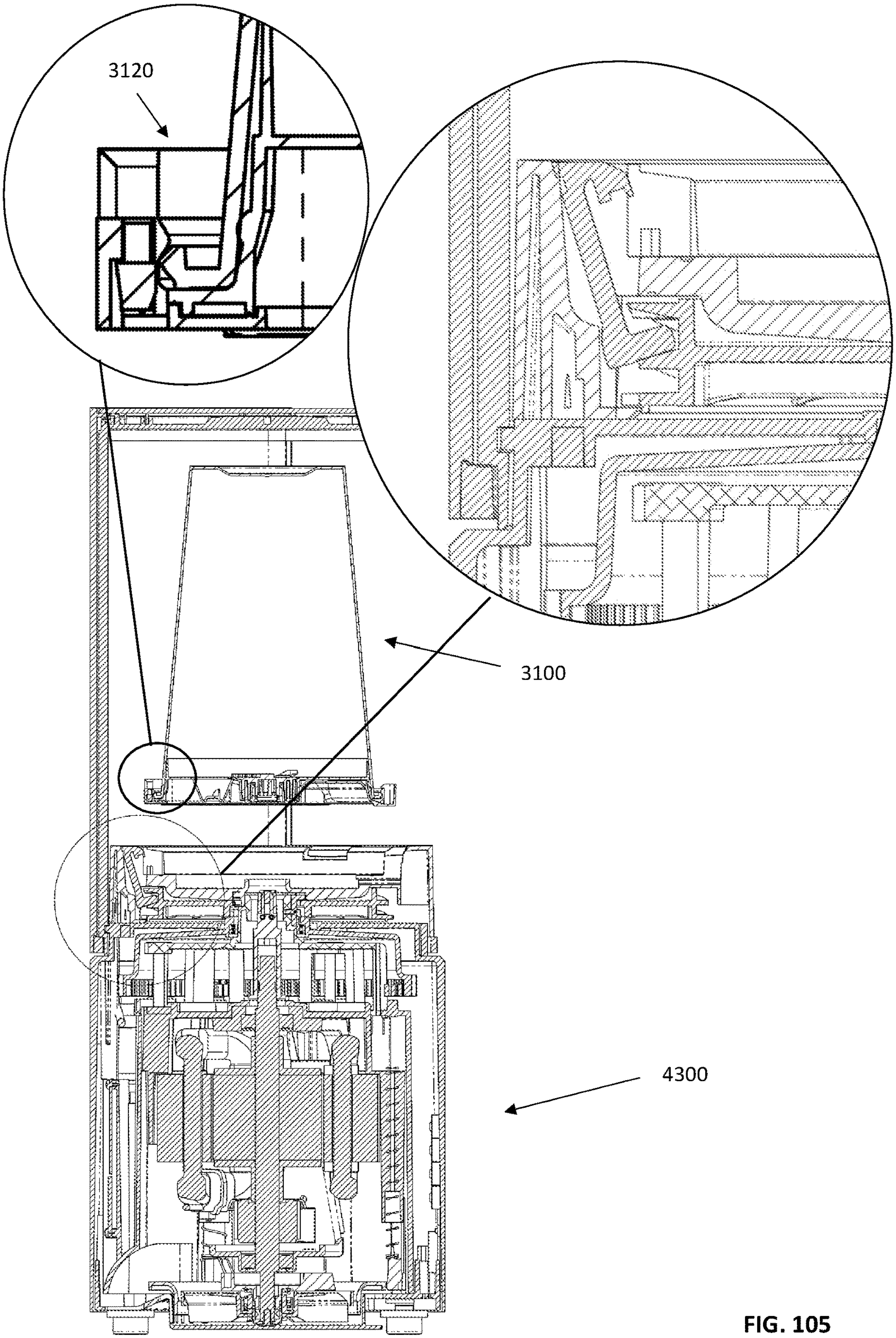
FIG. 105 is a simplified sectional illustration, corresponding to FIG. 104 but showing the SUPCA in an upside-down orientation, removed from operative engagement with the MMIDD.
Figure 112A:
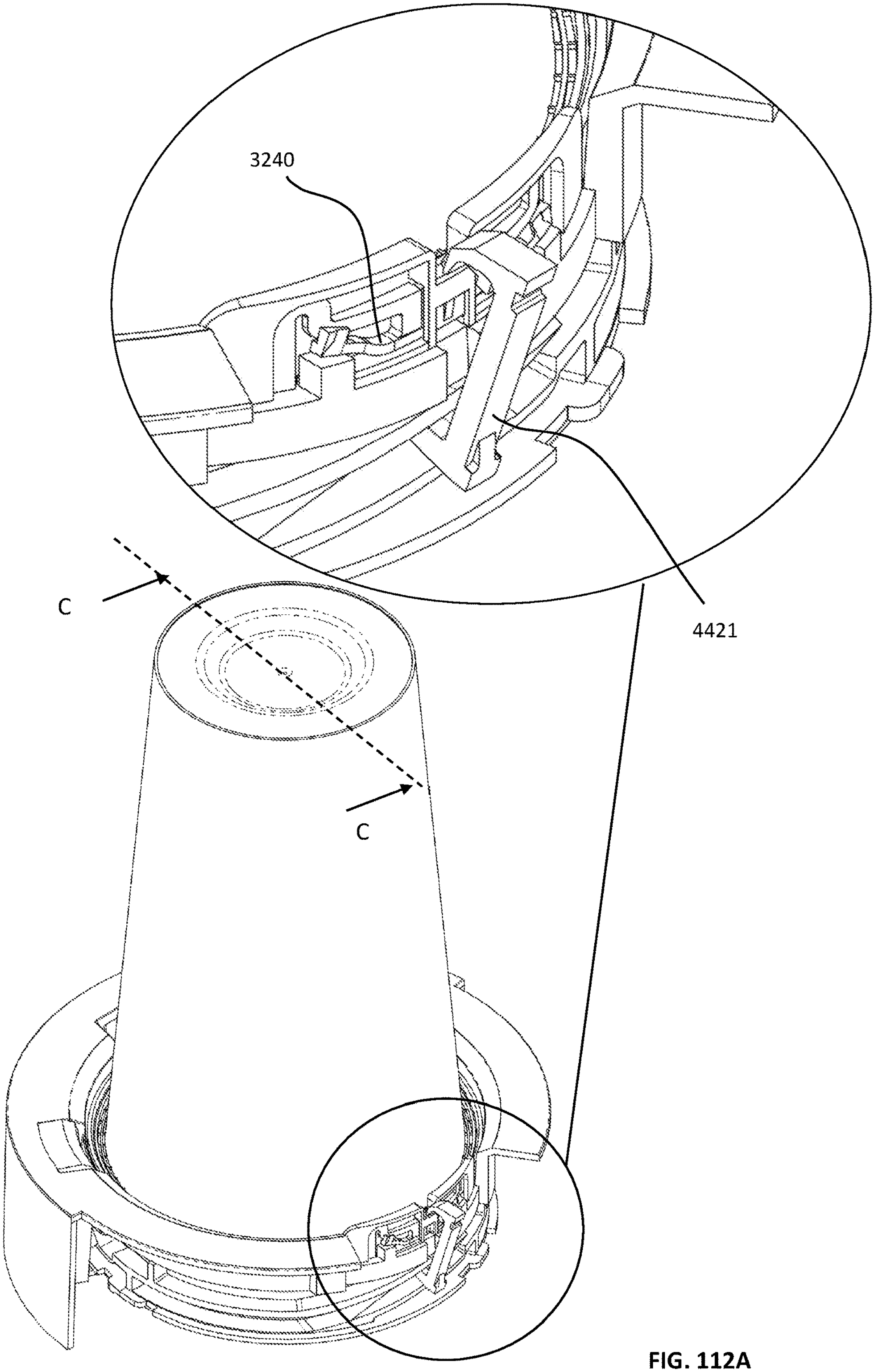
Figure 112B:
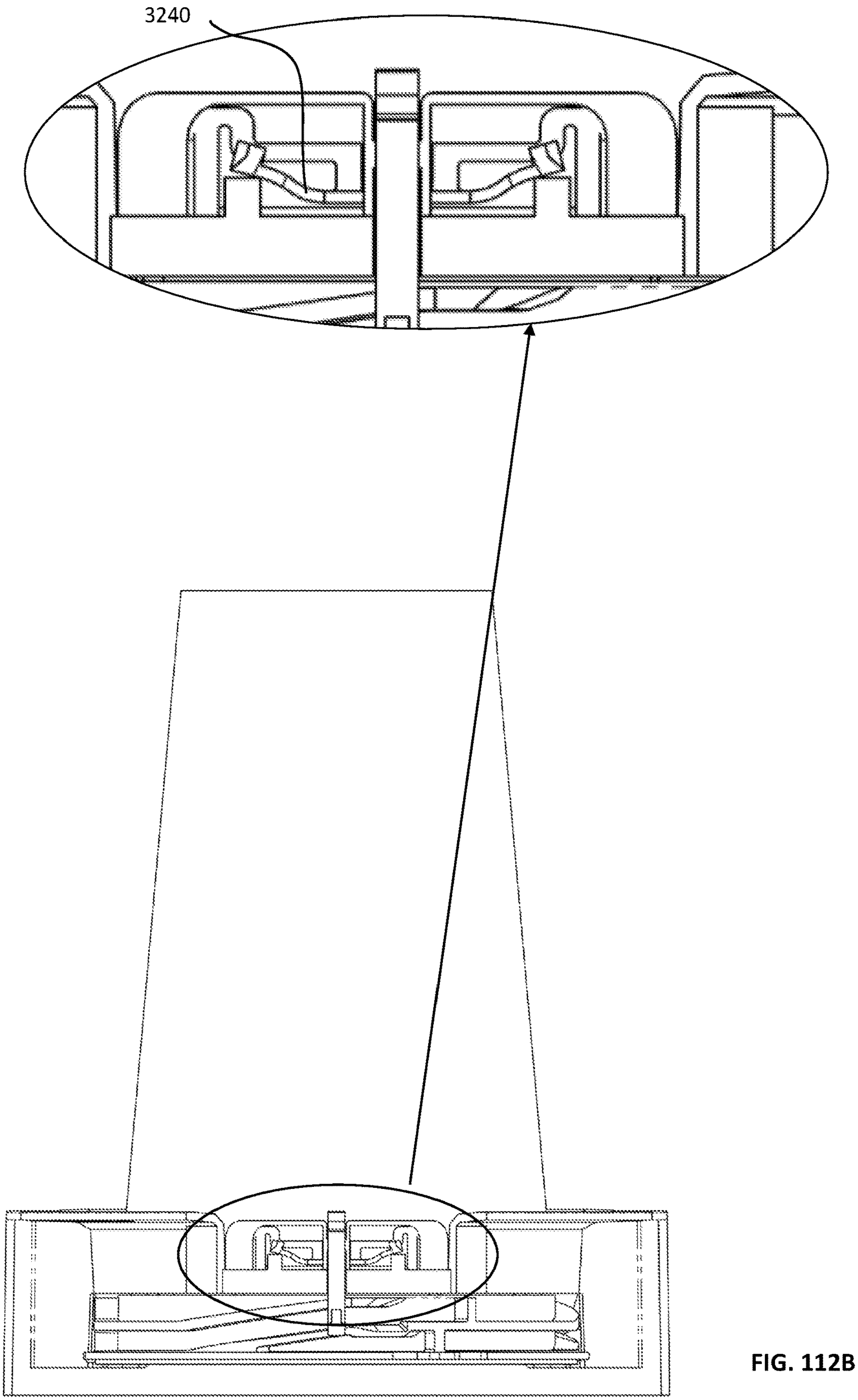
Figure 112C:
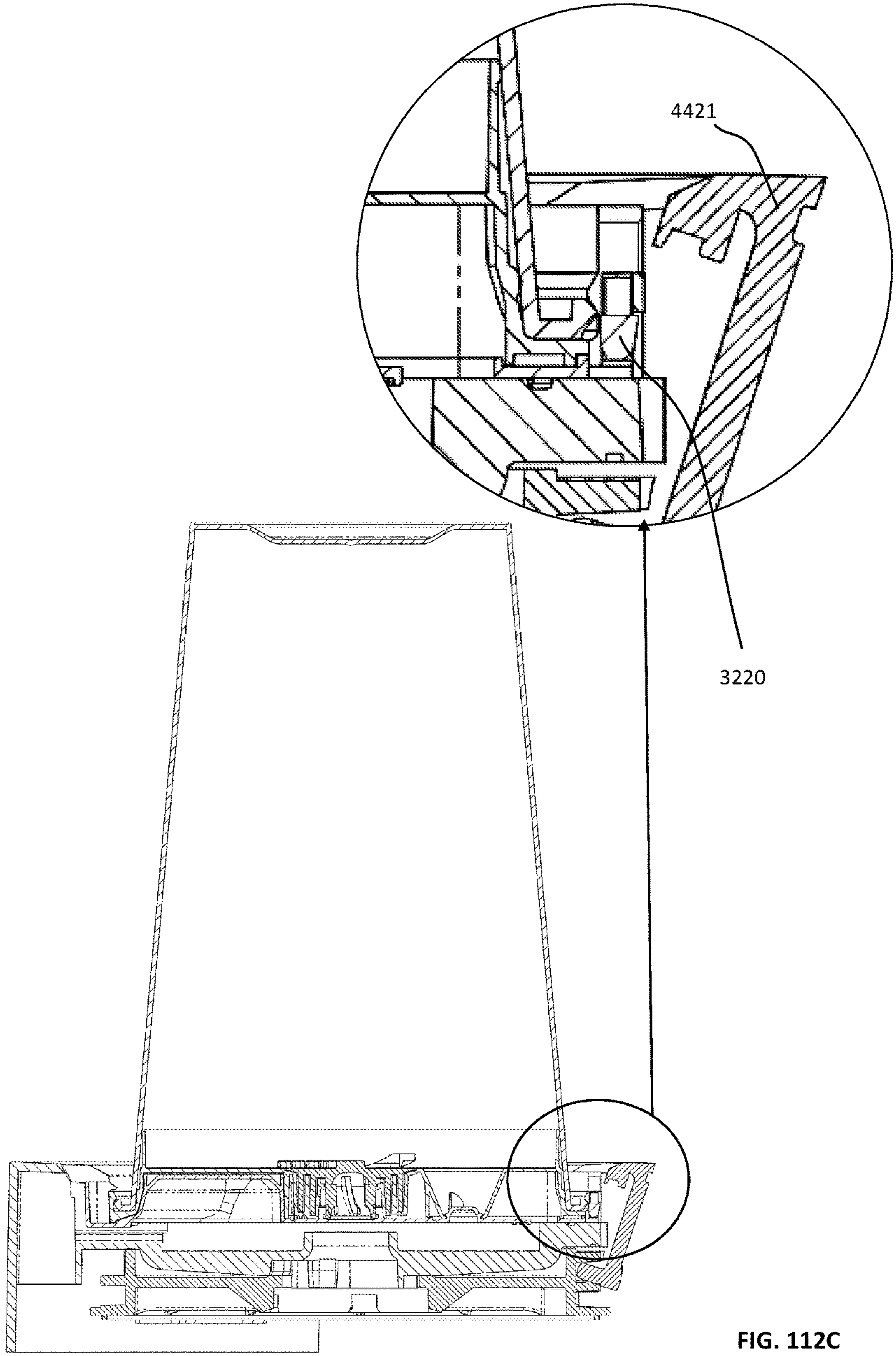
Figure 113A:
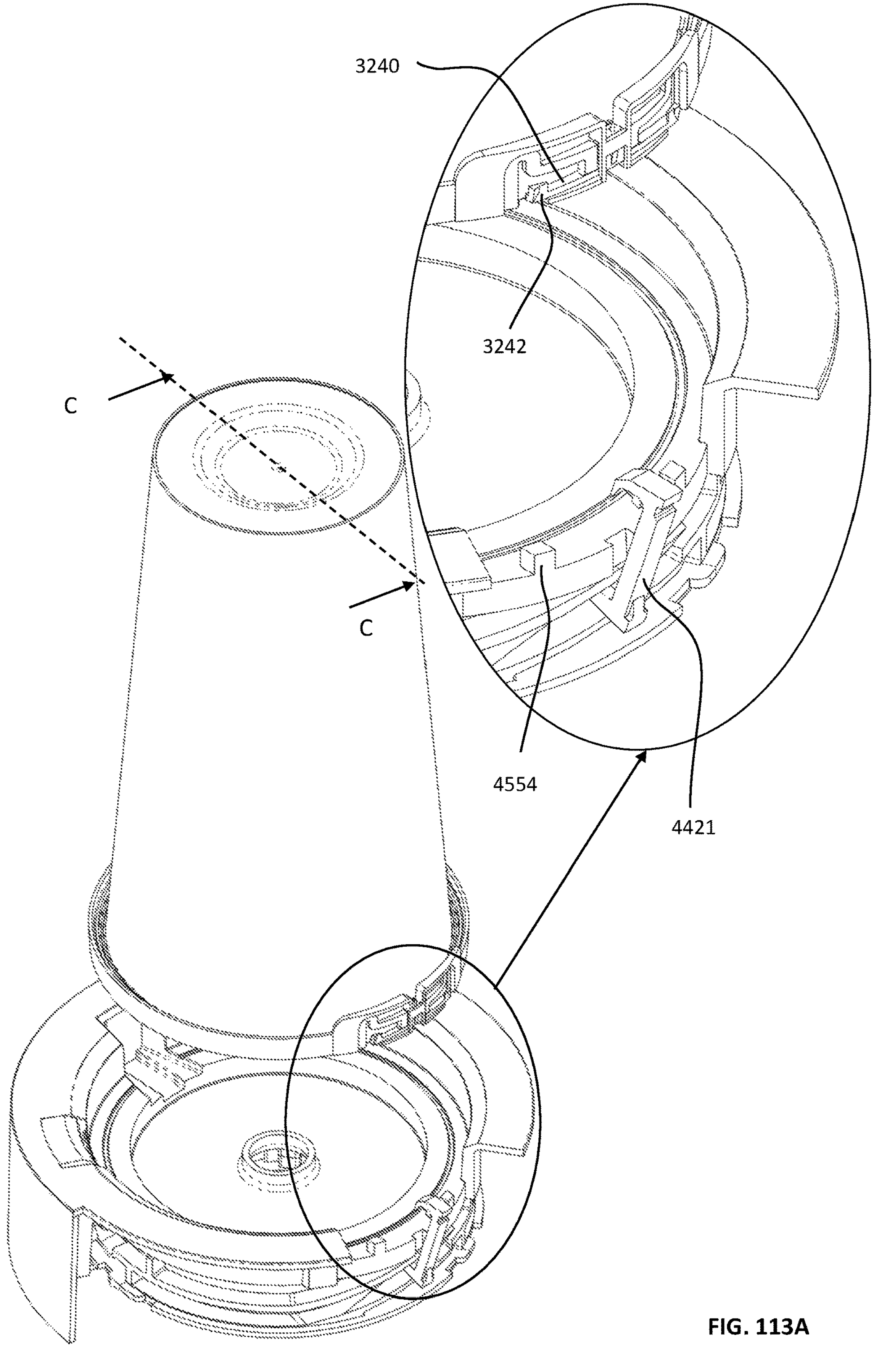
Figure 113B:
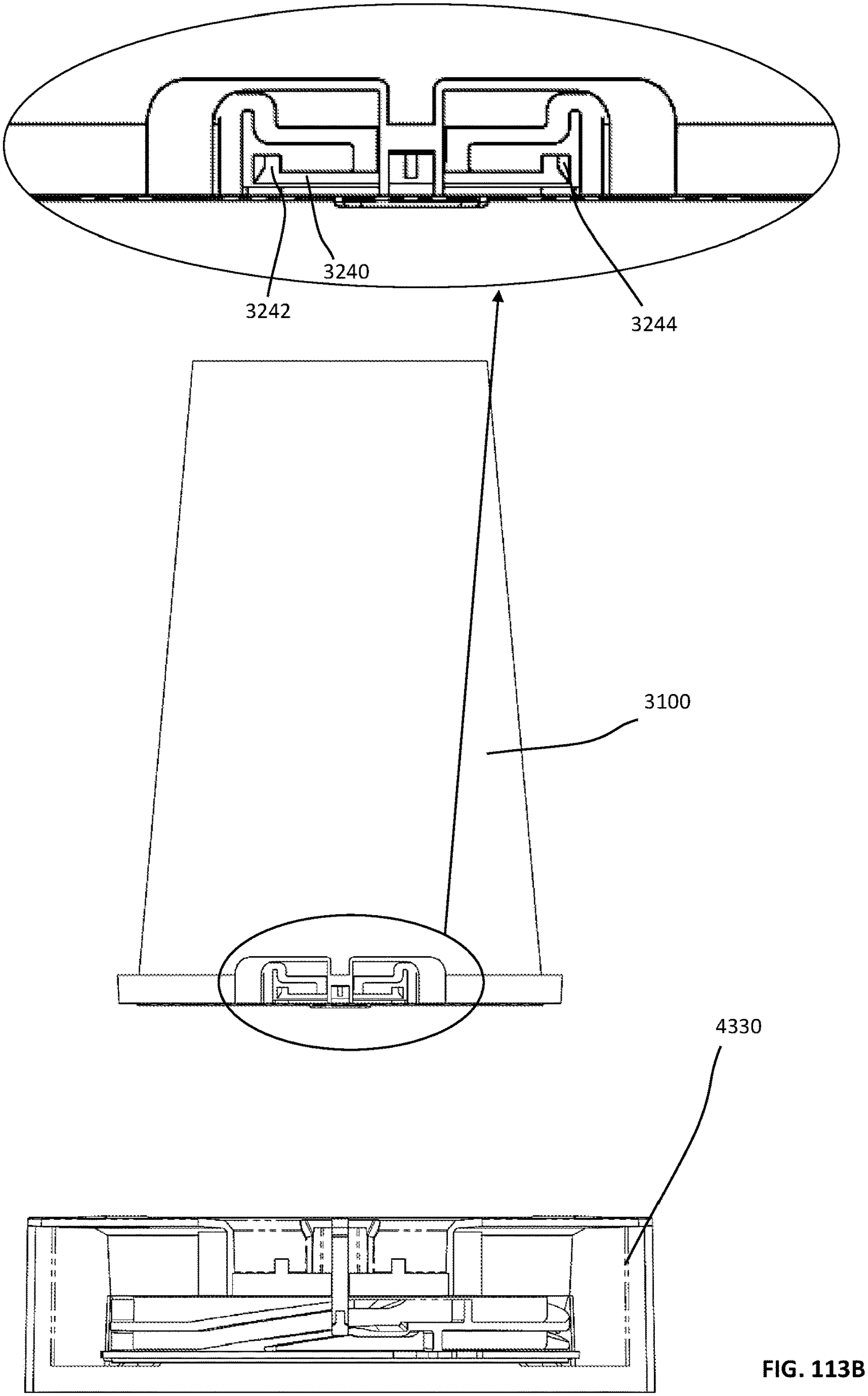
Figure 113C:
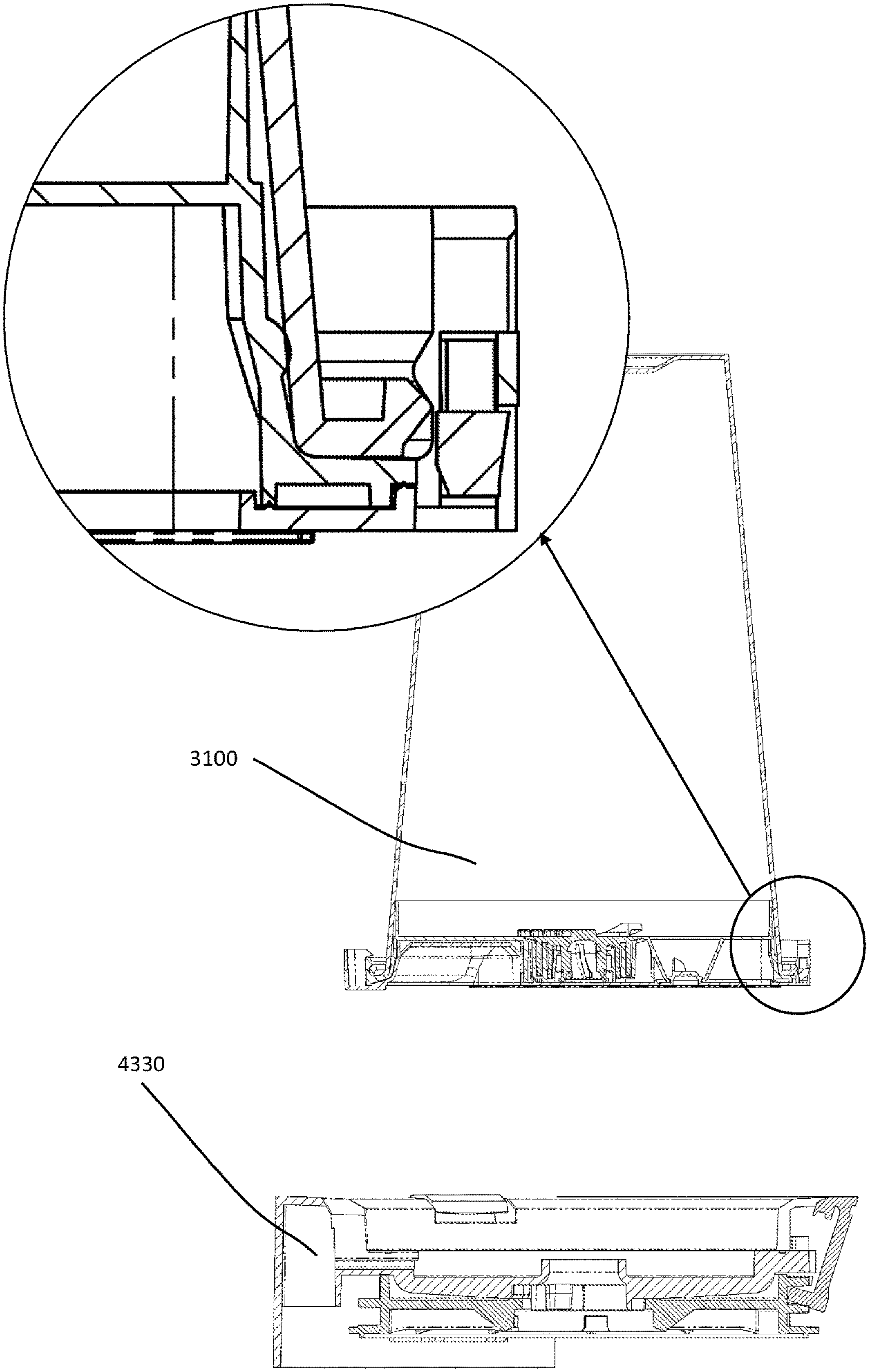
Figure 113D:
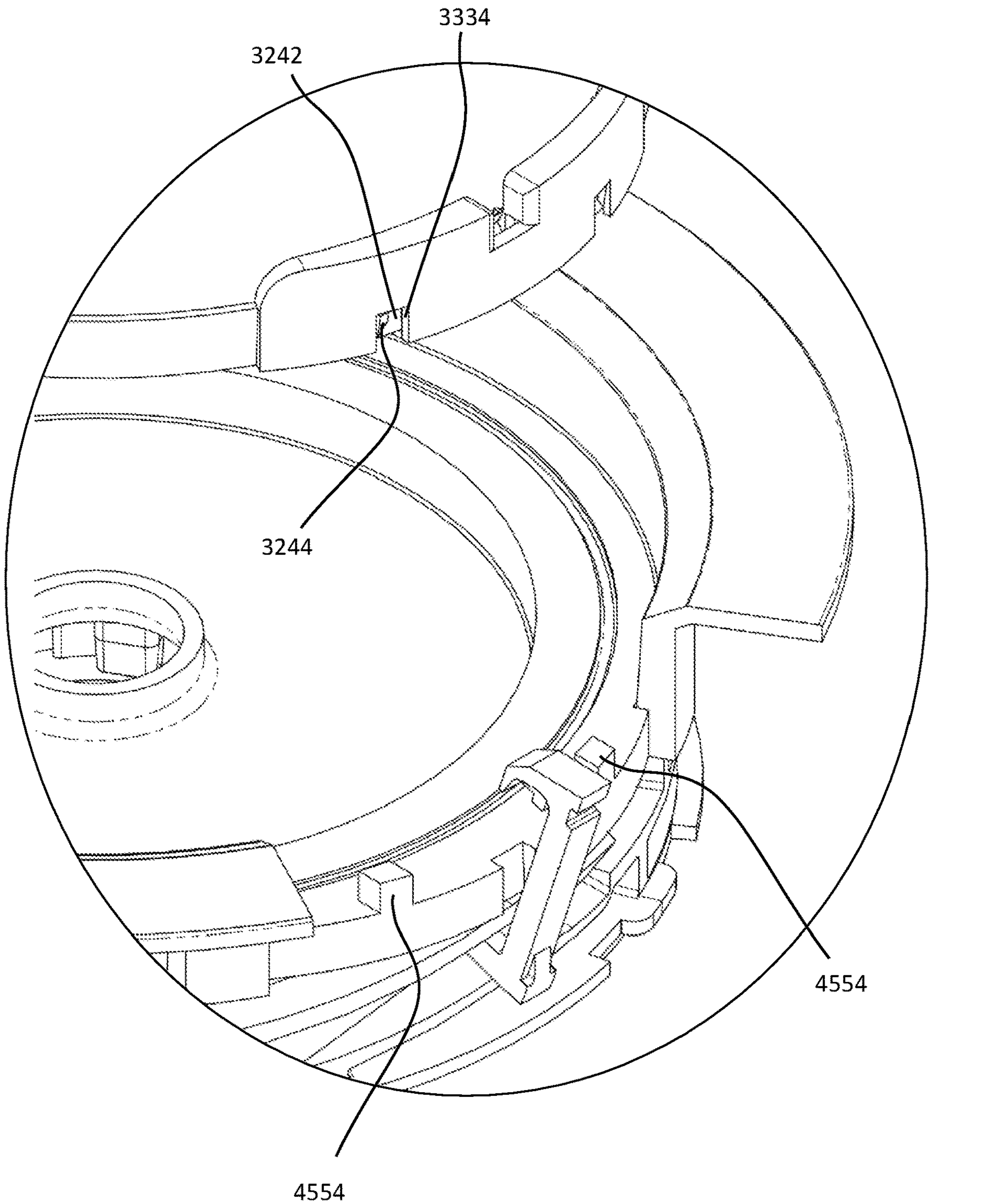
Figure 113E:
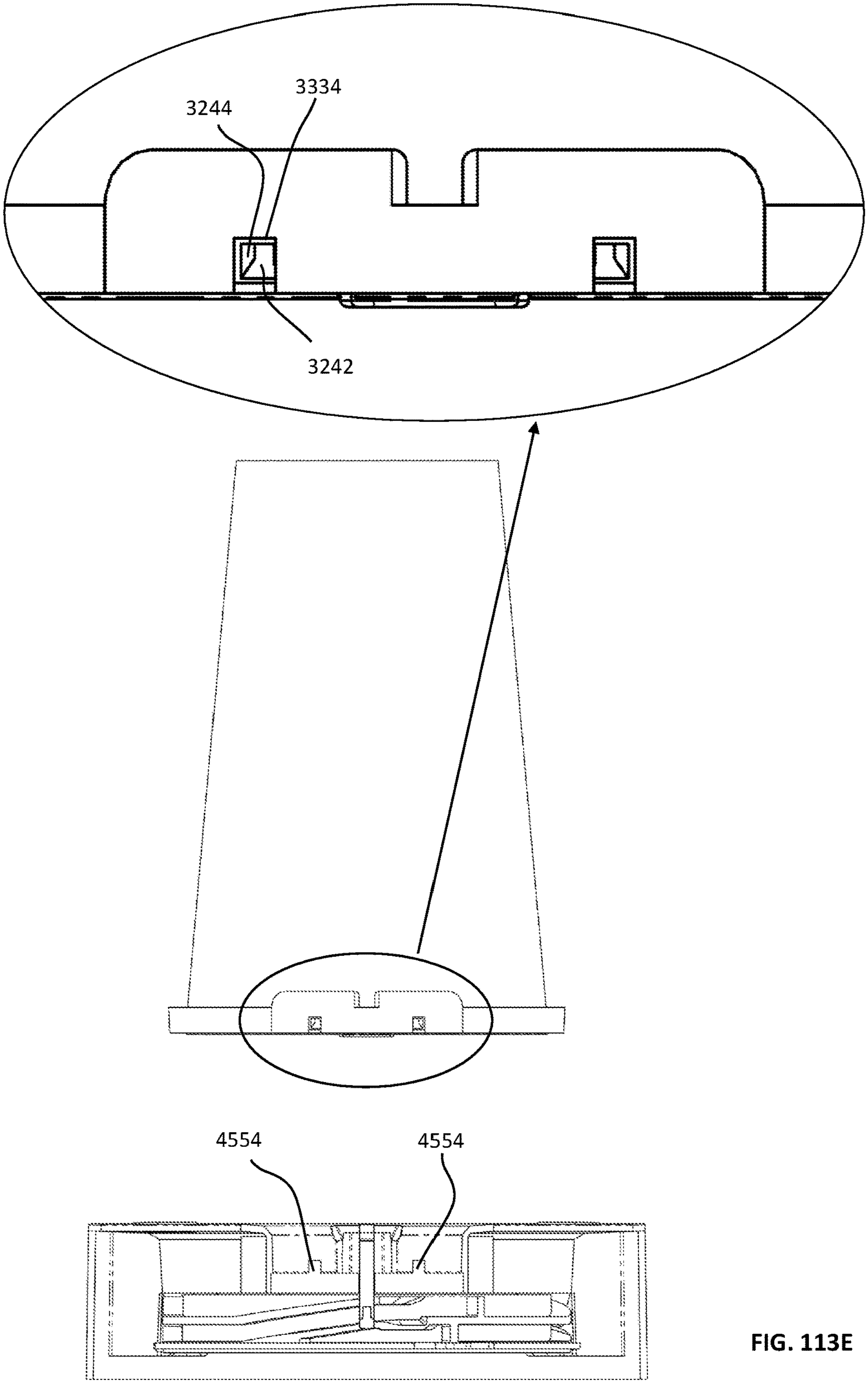
Figure 114A:
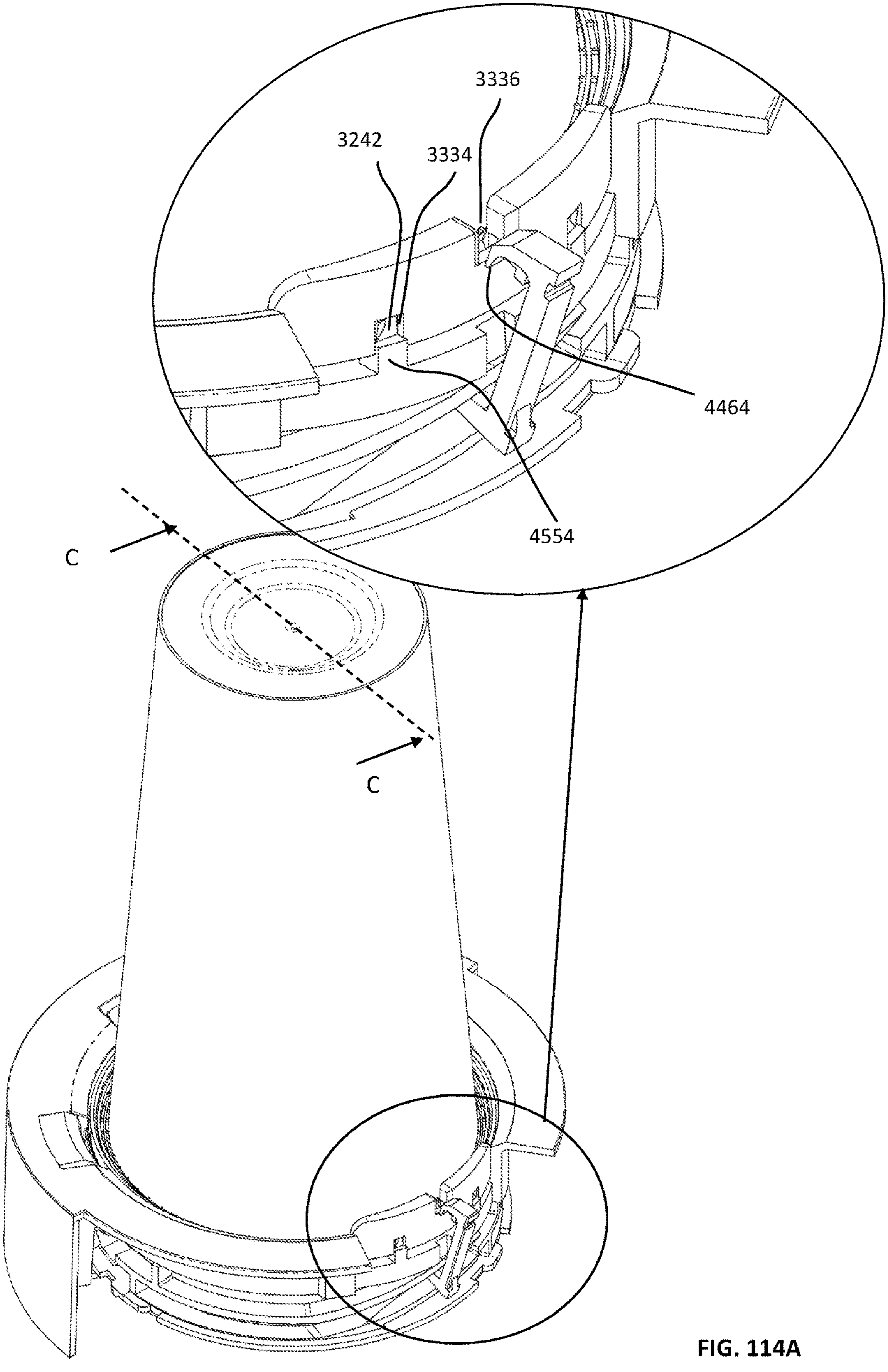
Figure 114B:
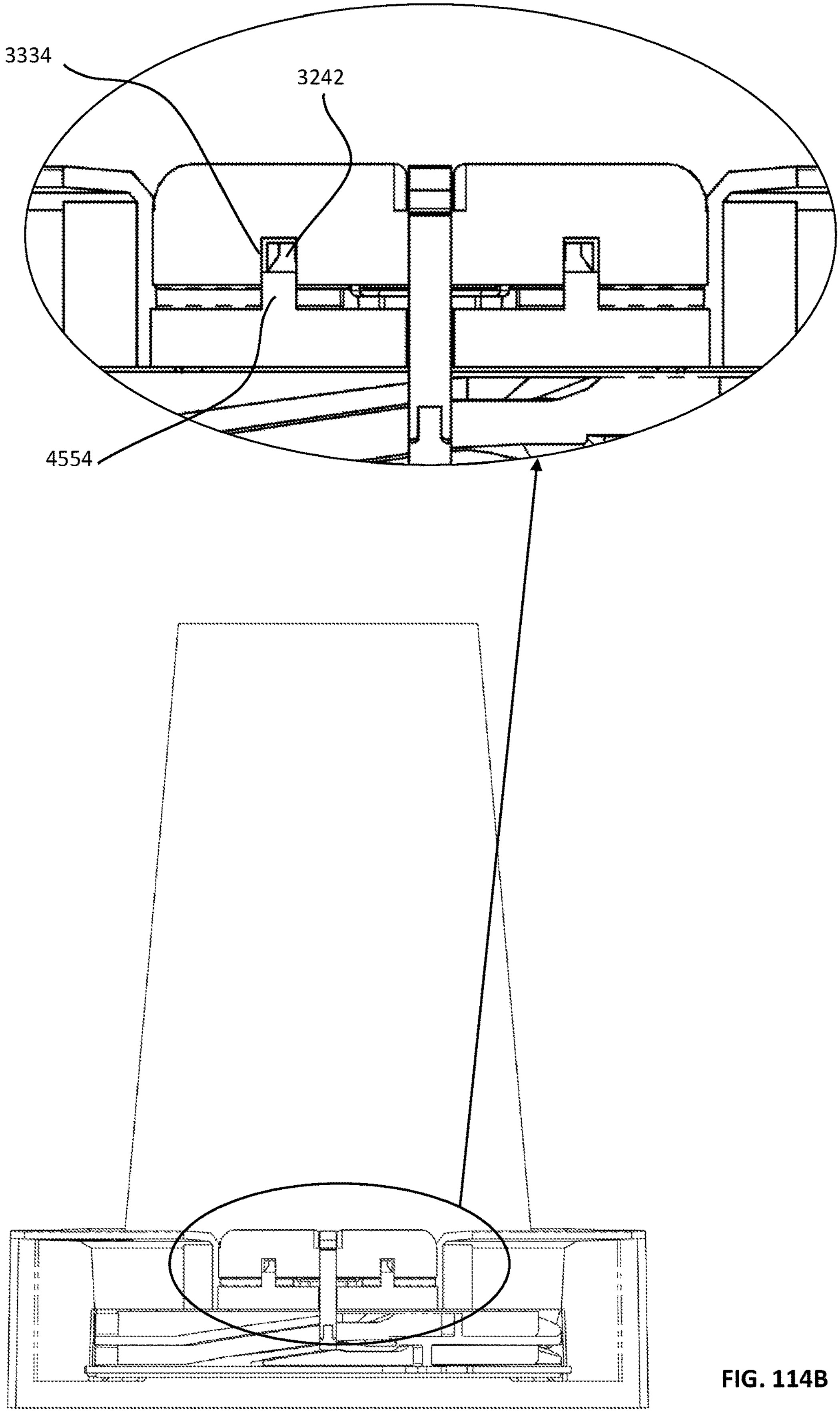
Figure 114C:
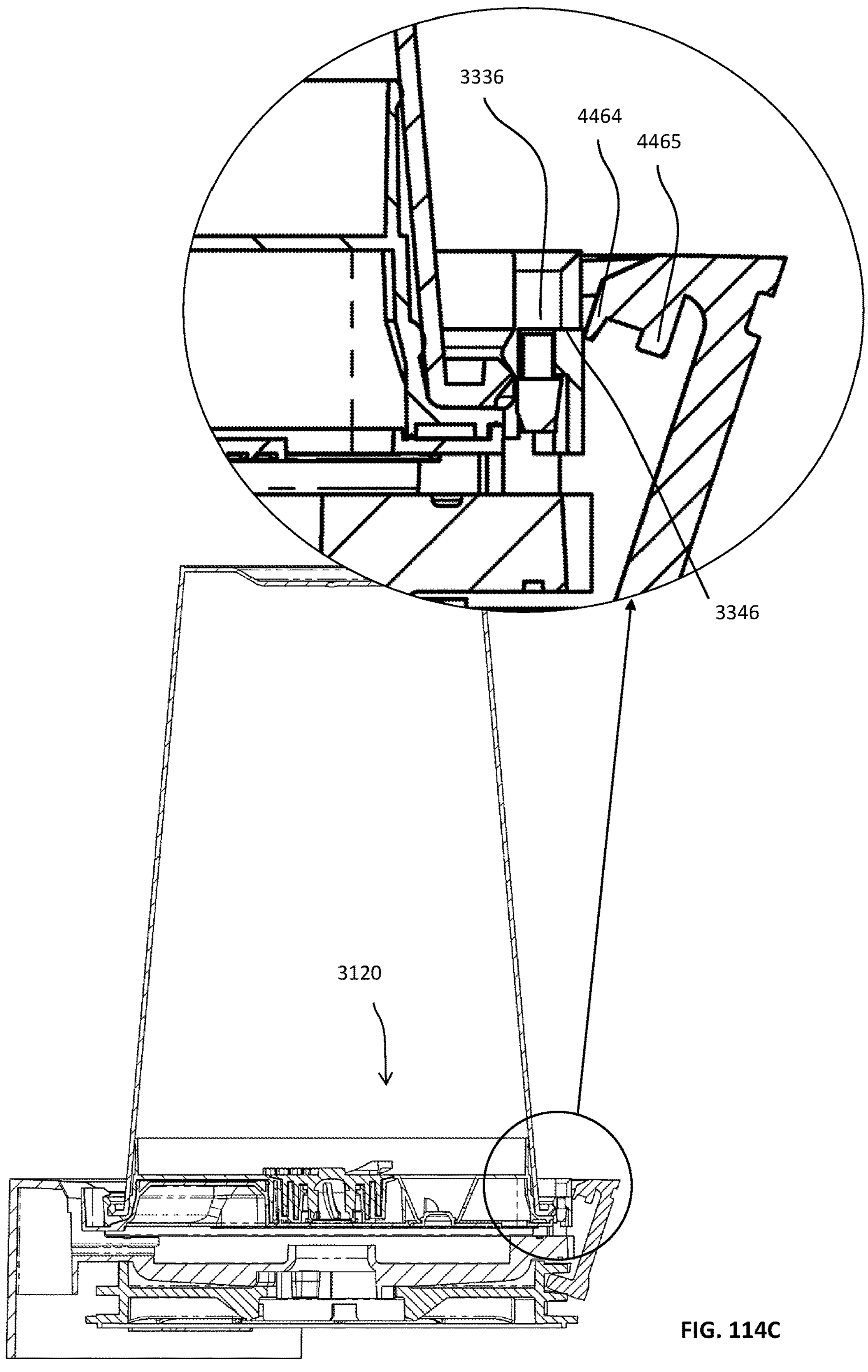
Figure 115A:
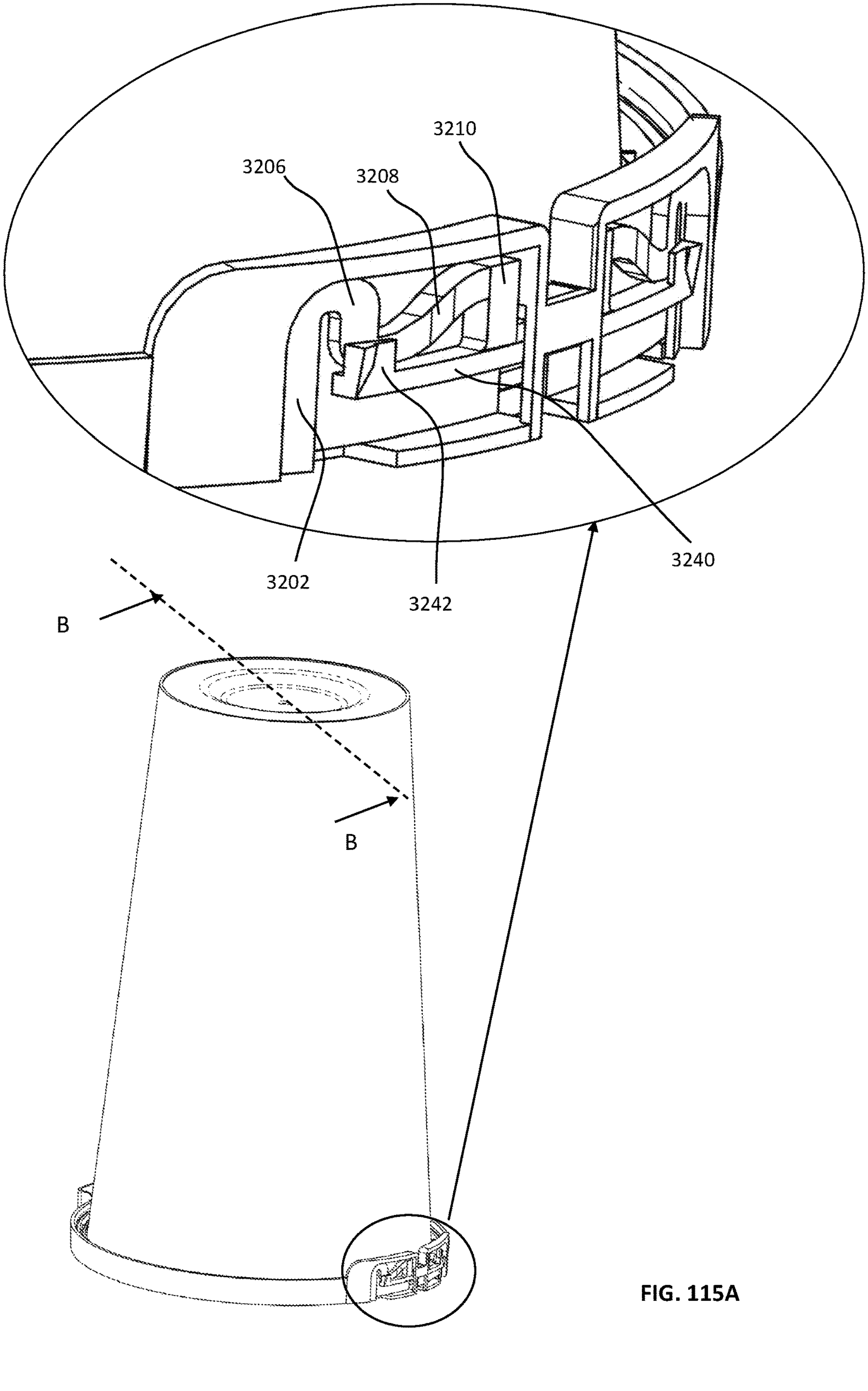
Figure 115B:
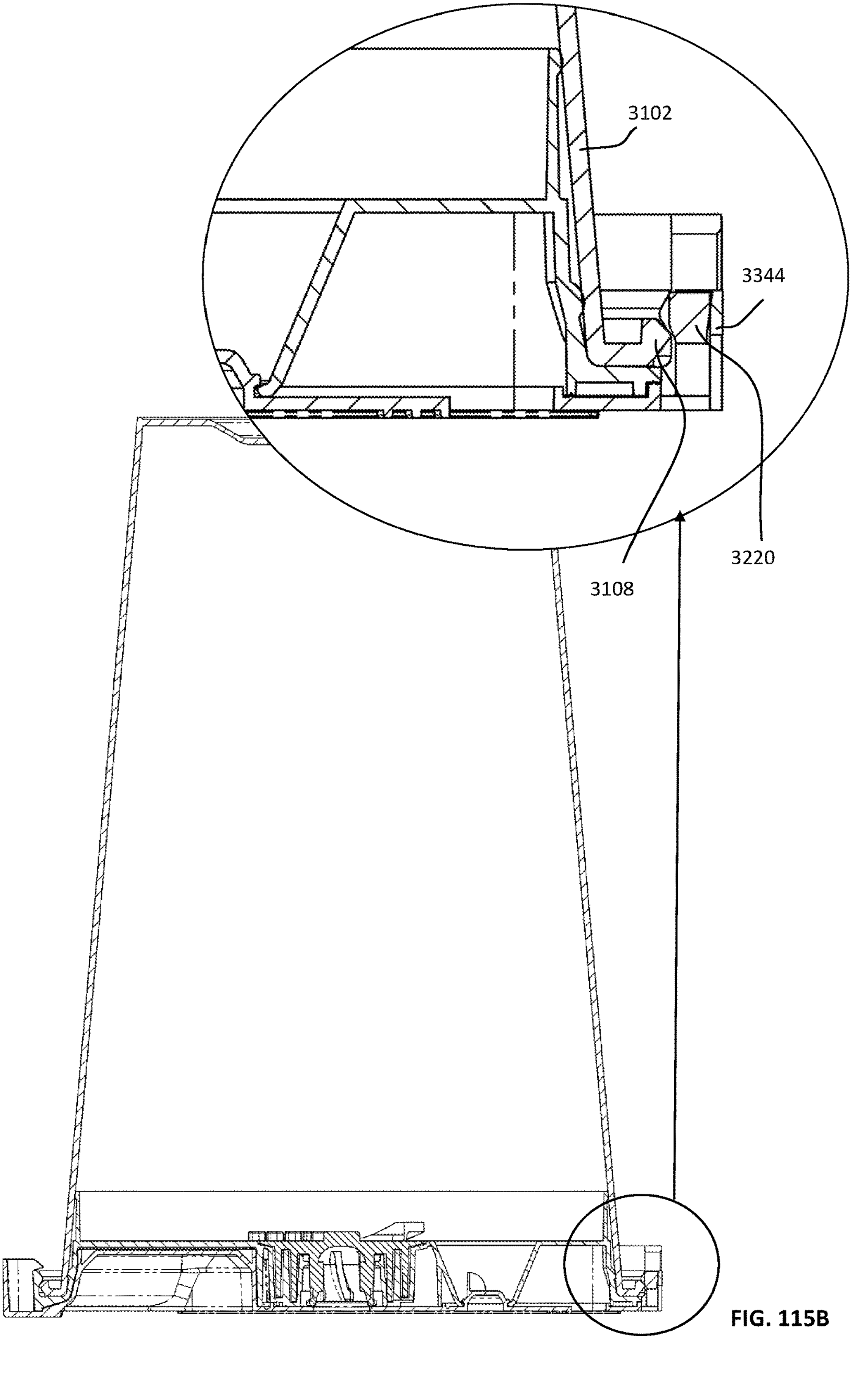
Figure 115C:
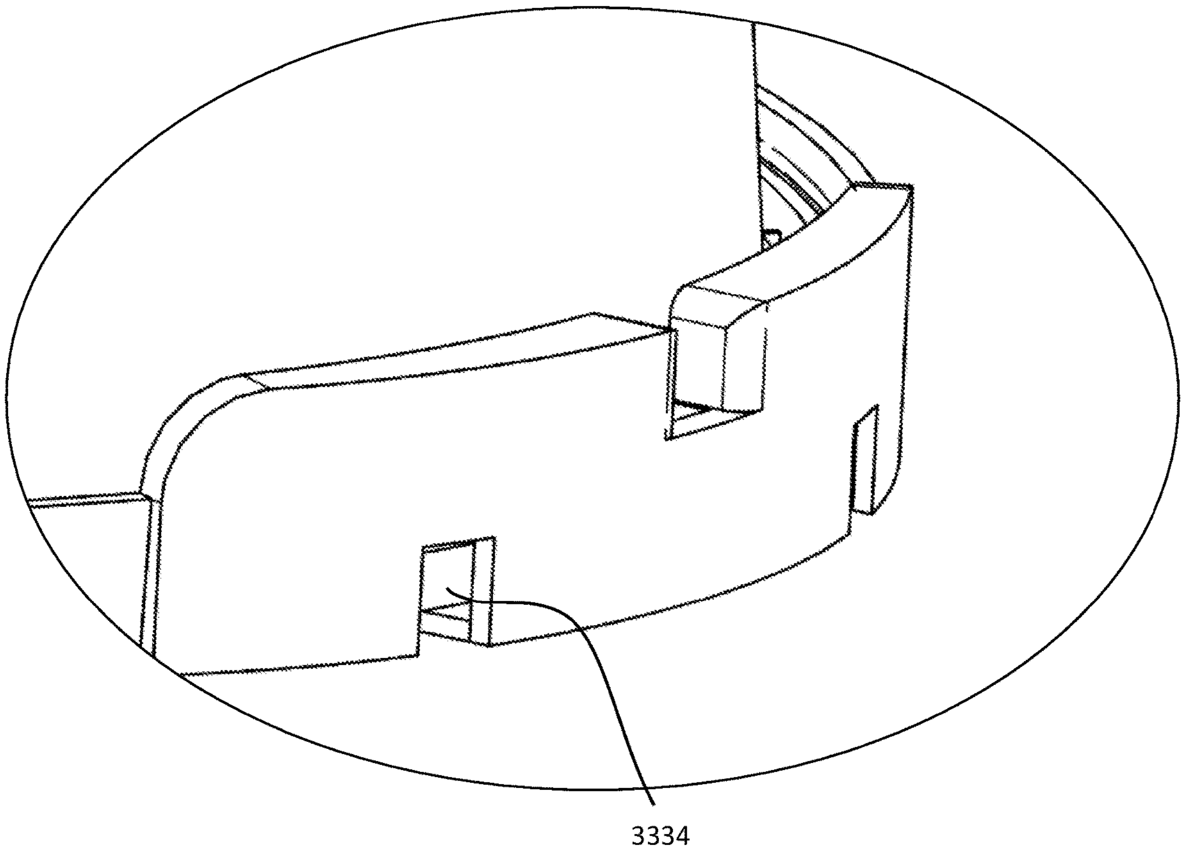
Figure 116A:
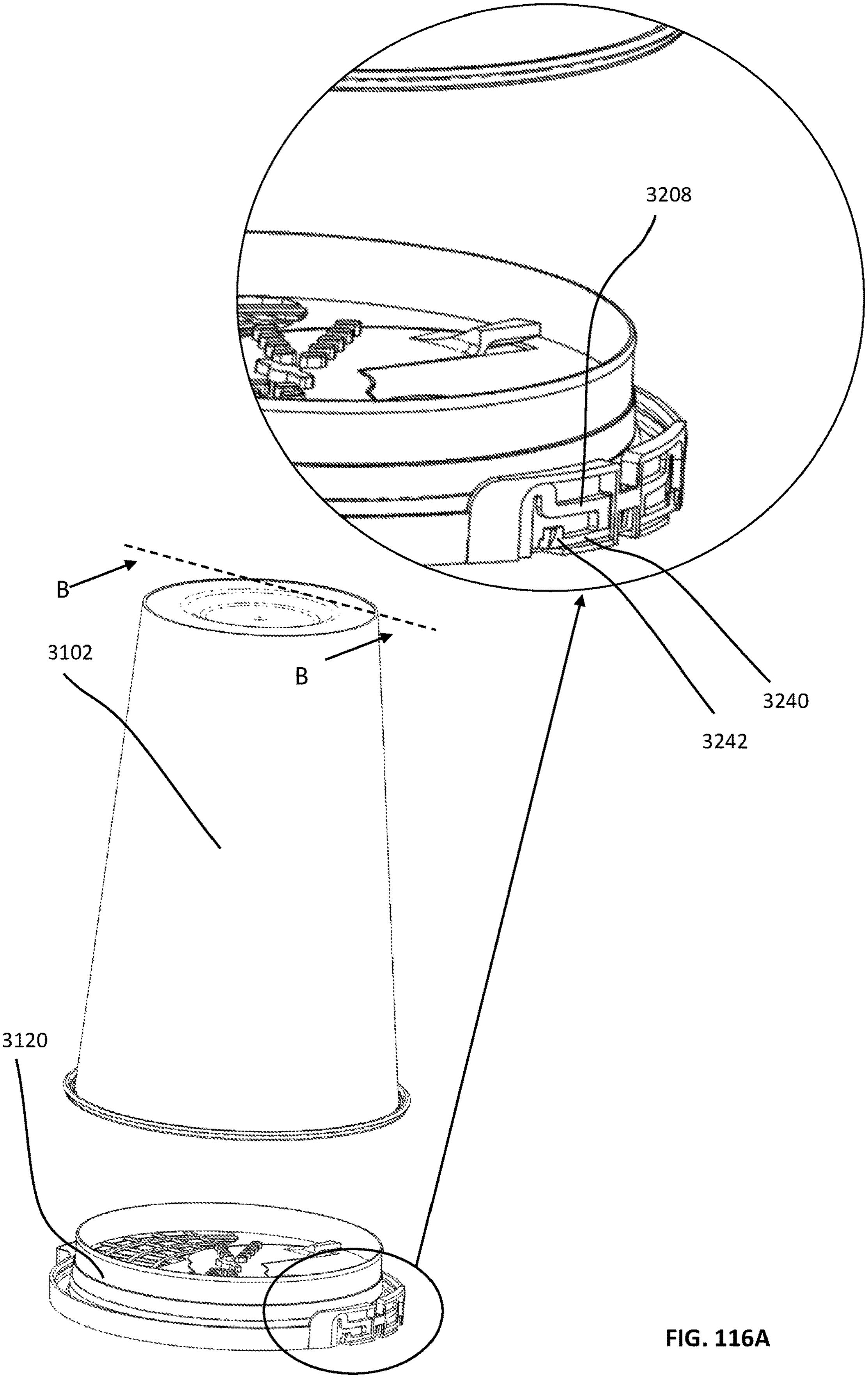
Figure 116B:
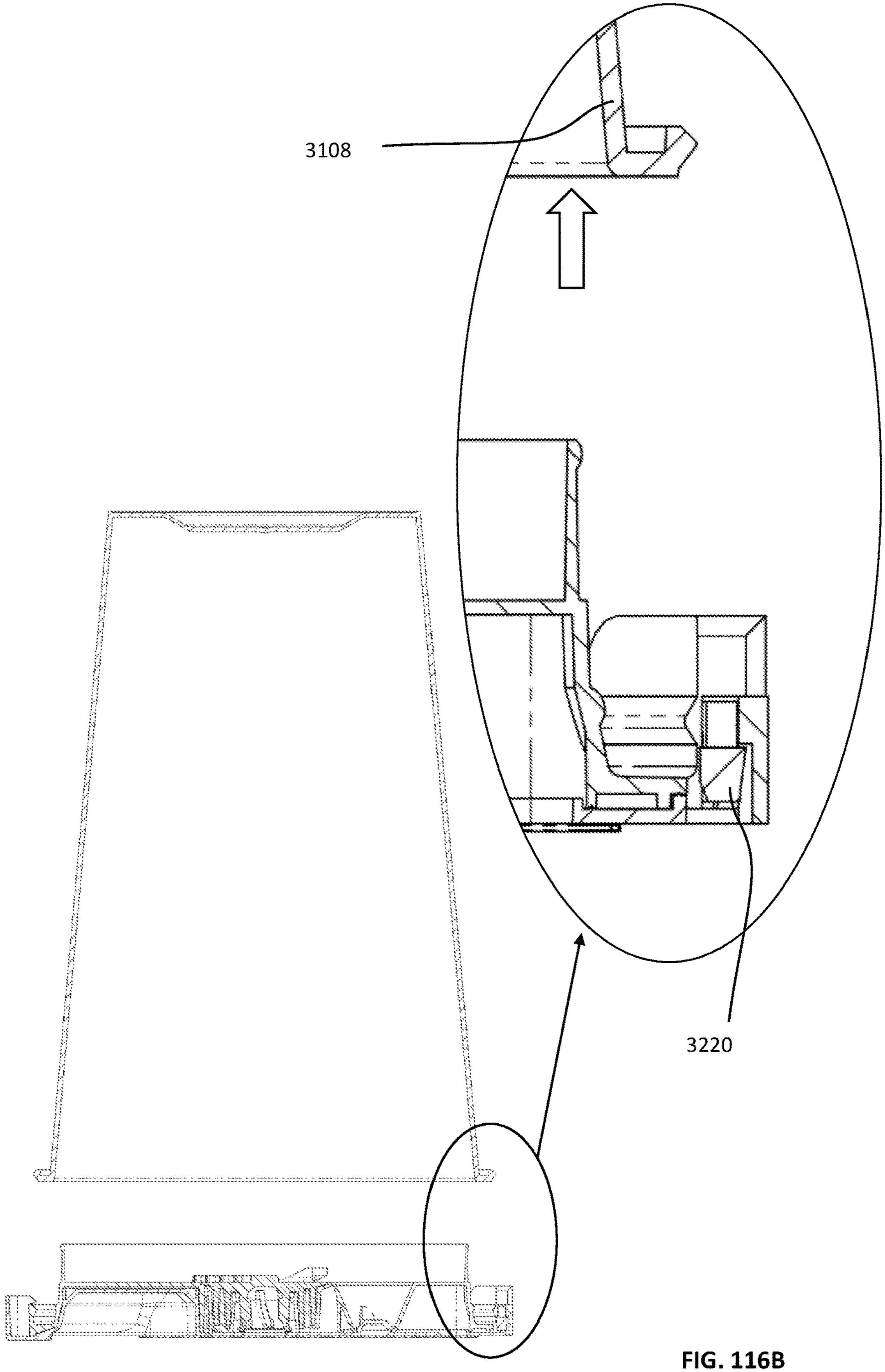
Figure 116C:
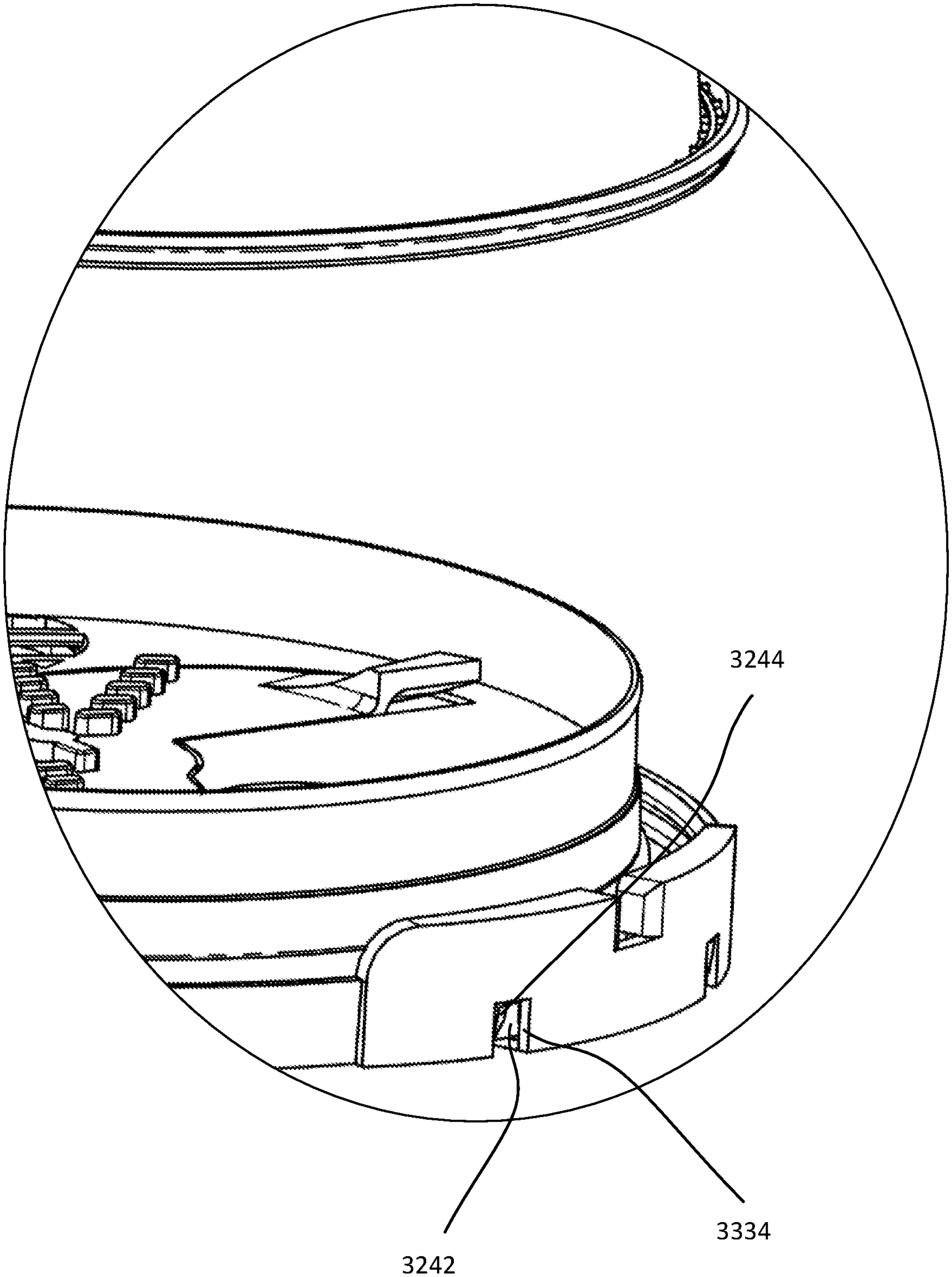
Figure 117A:
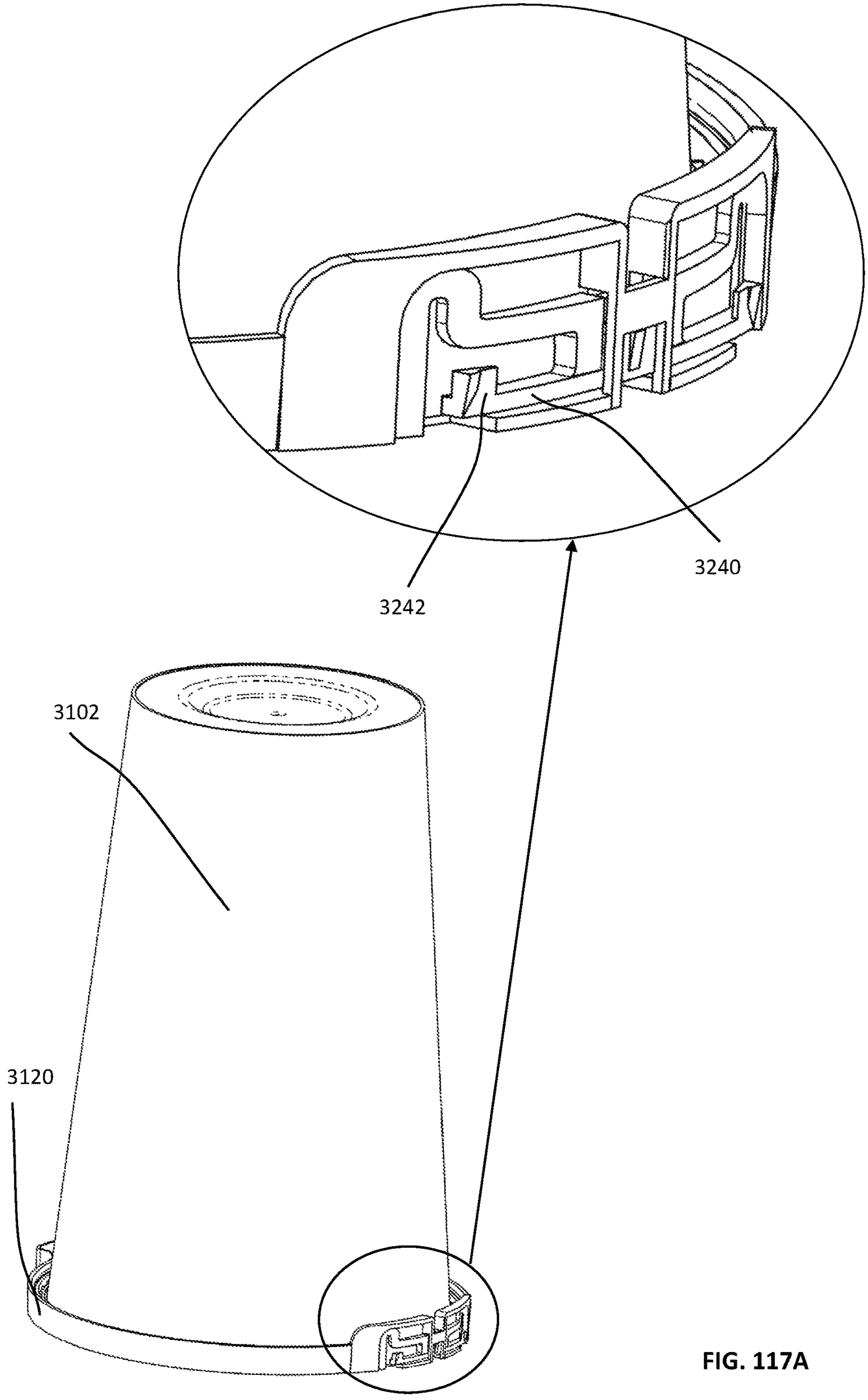
Figure 117B:
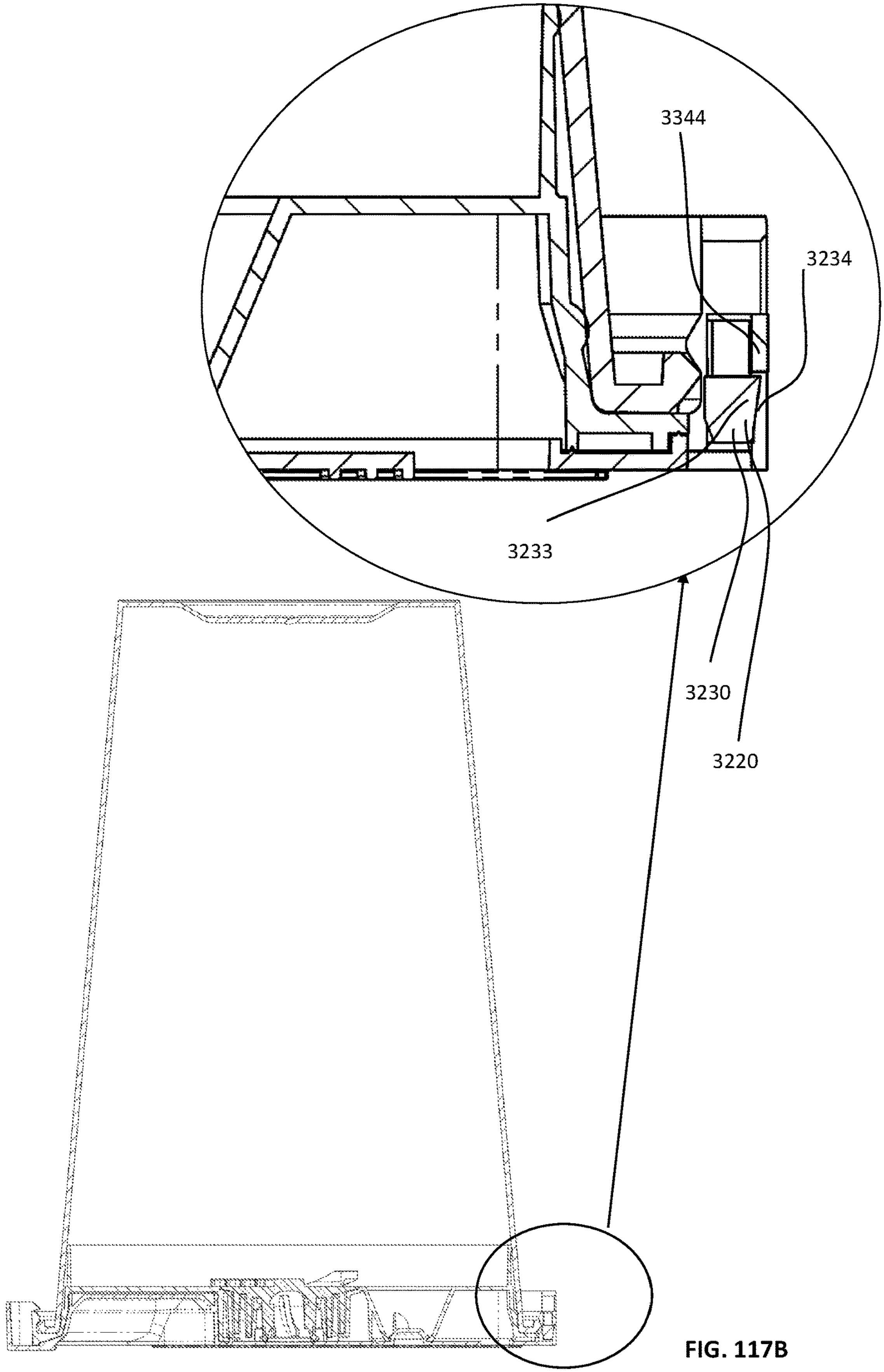
Figure 117C:
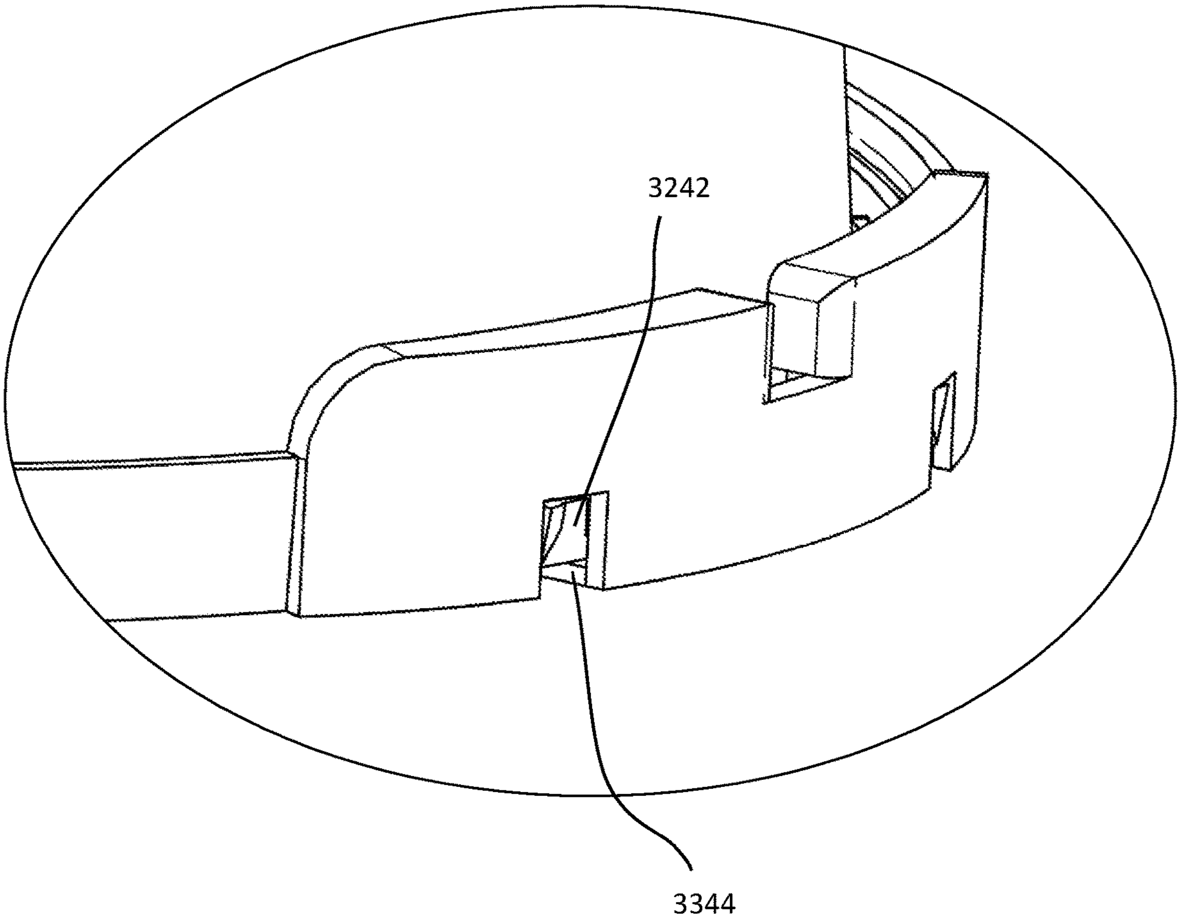
Figure 121A:
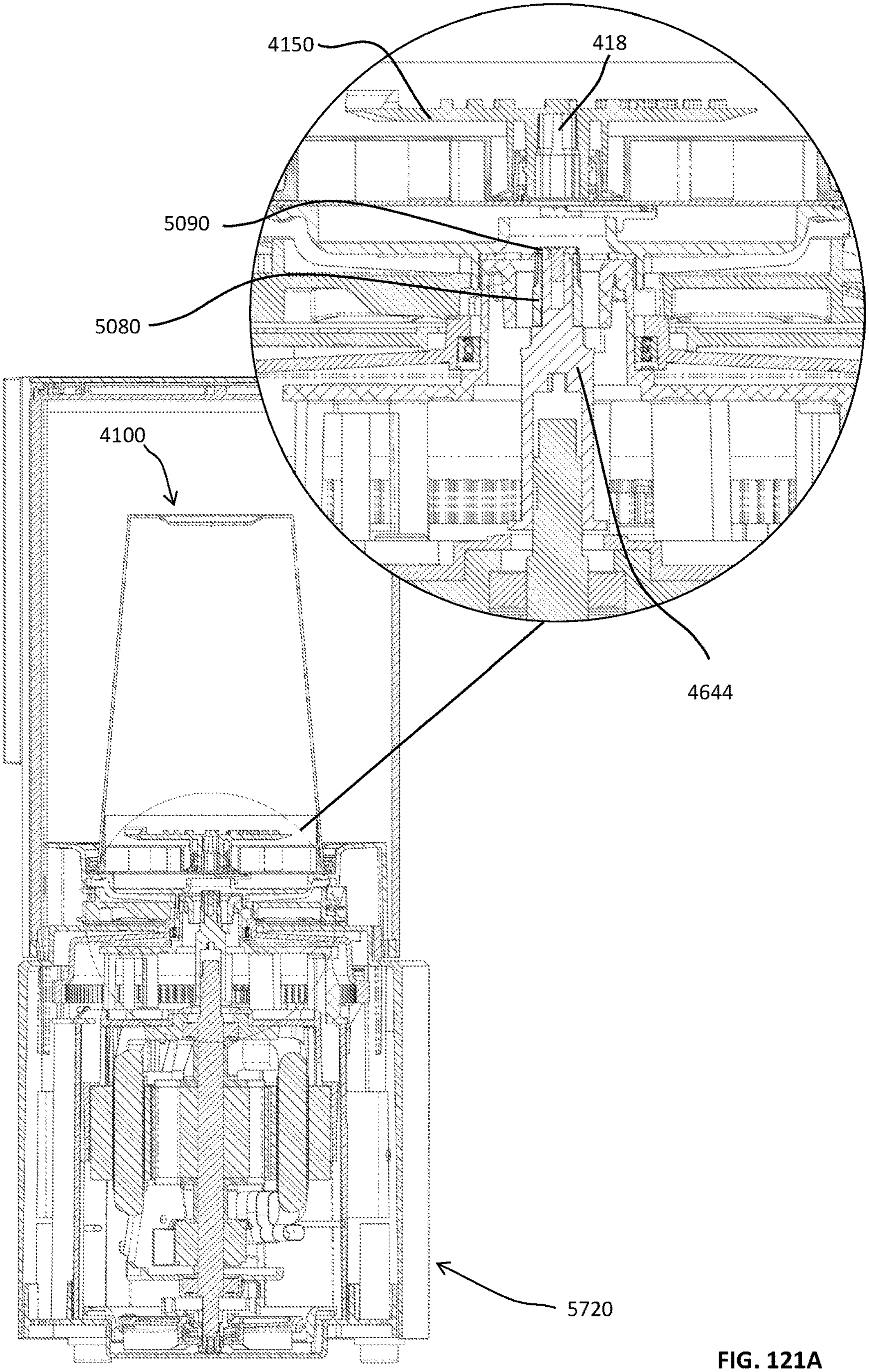
Figure 121B:
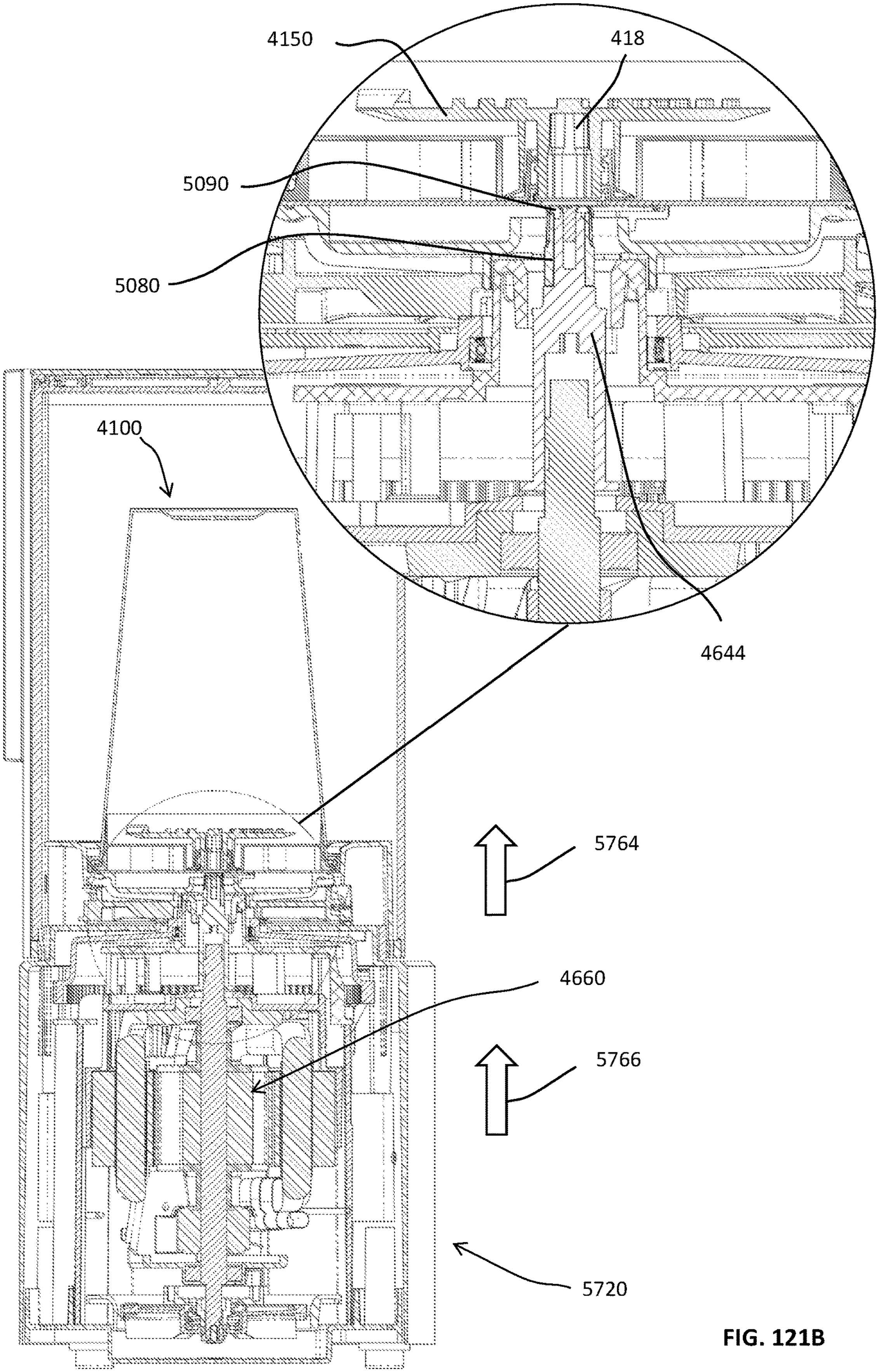
Figure 121C:
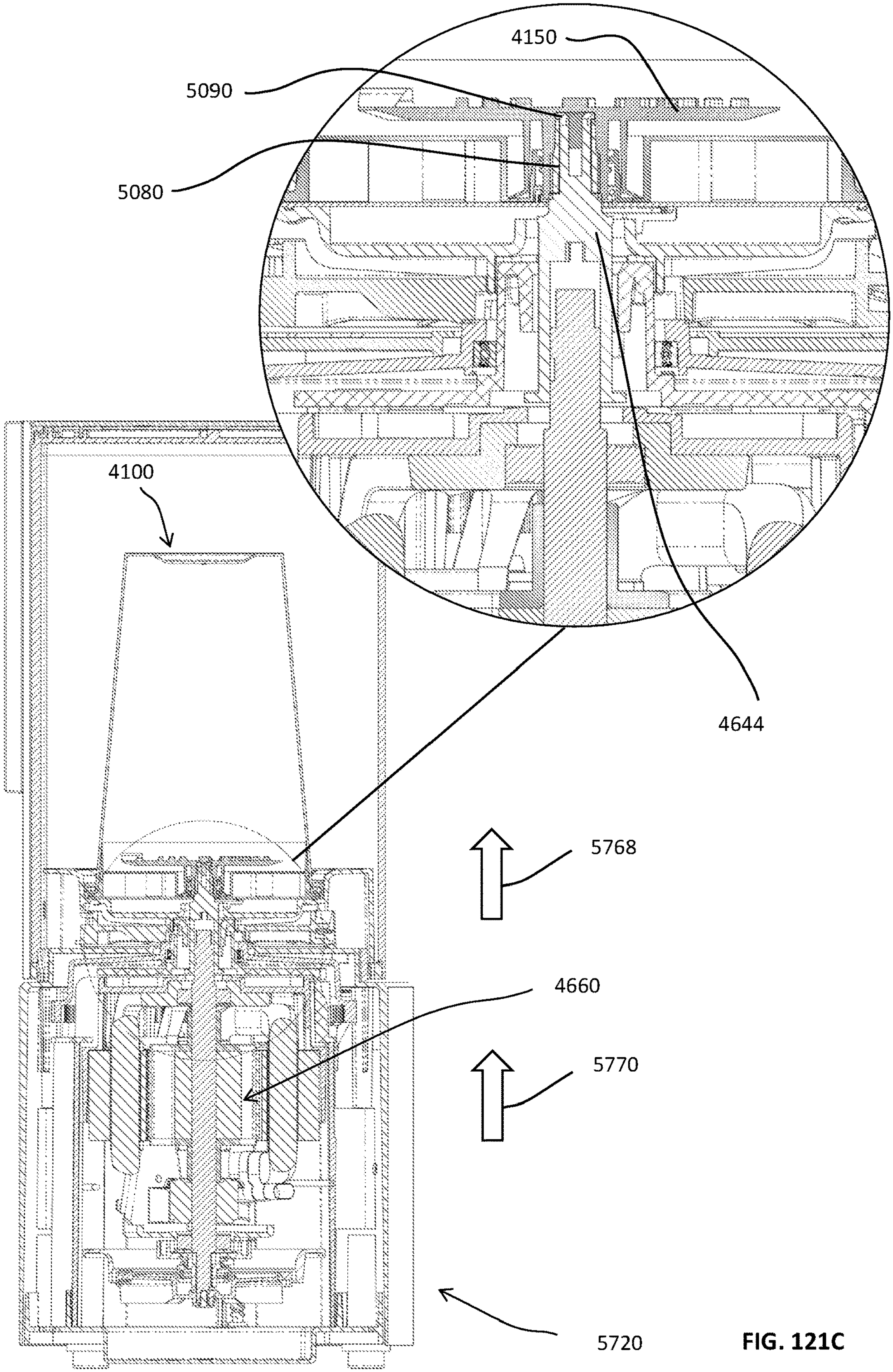
Figure 122A:
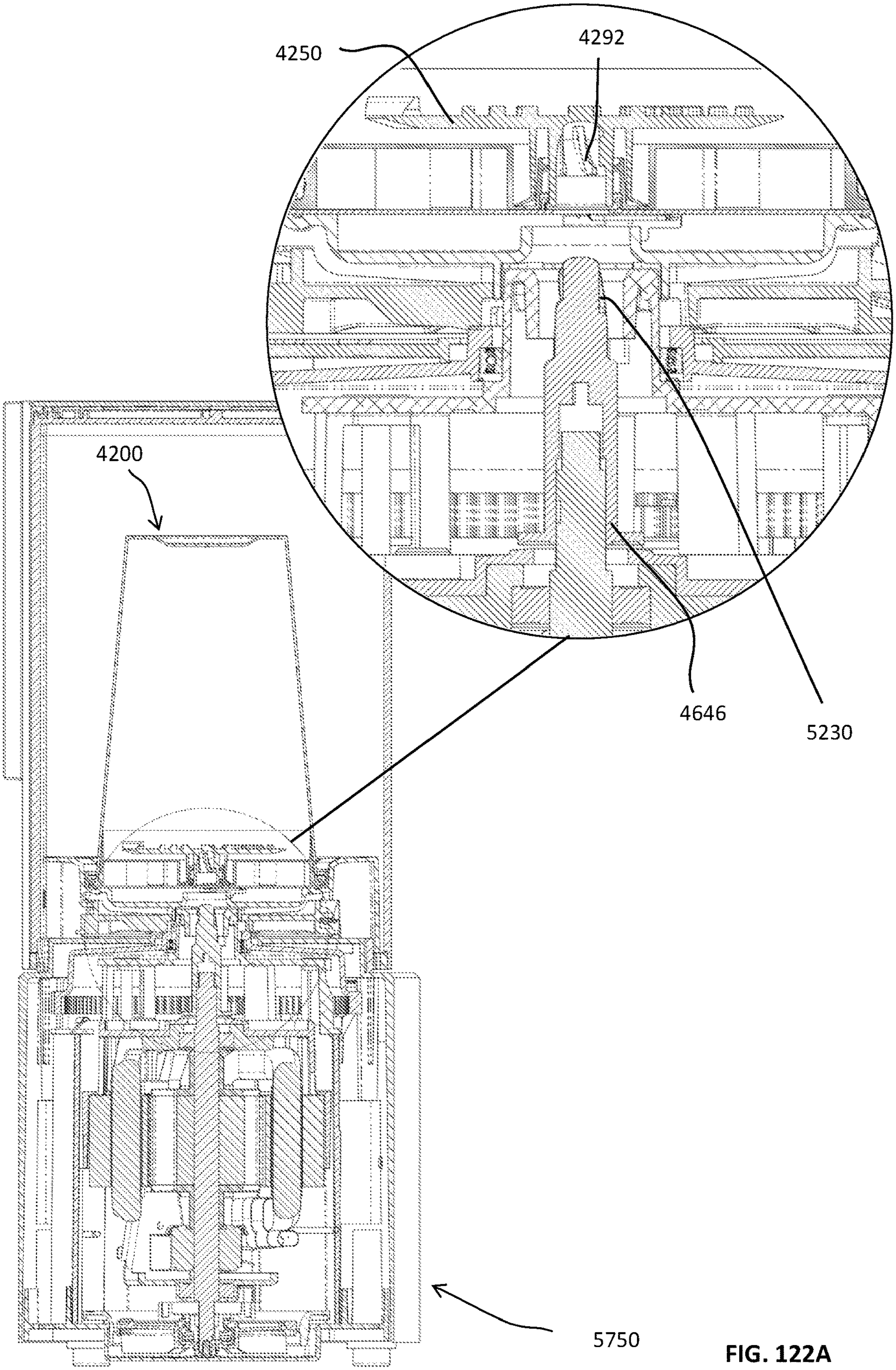
Figure 122B:
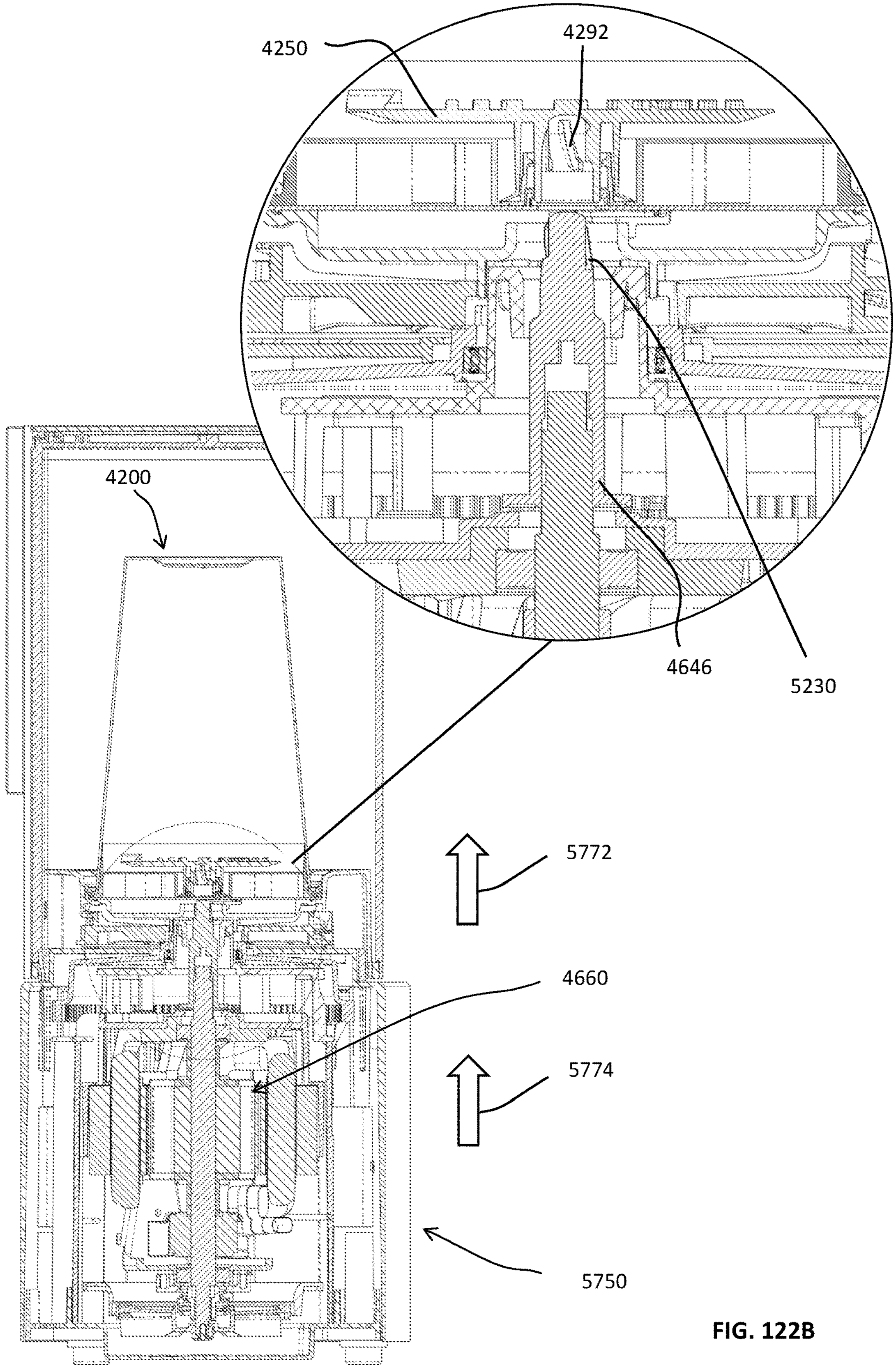
Figure 122C:
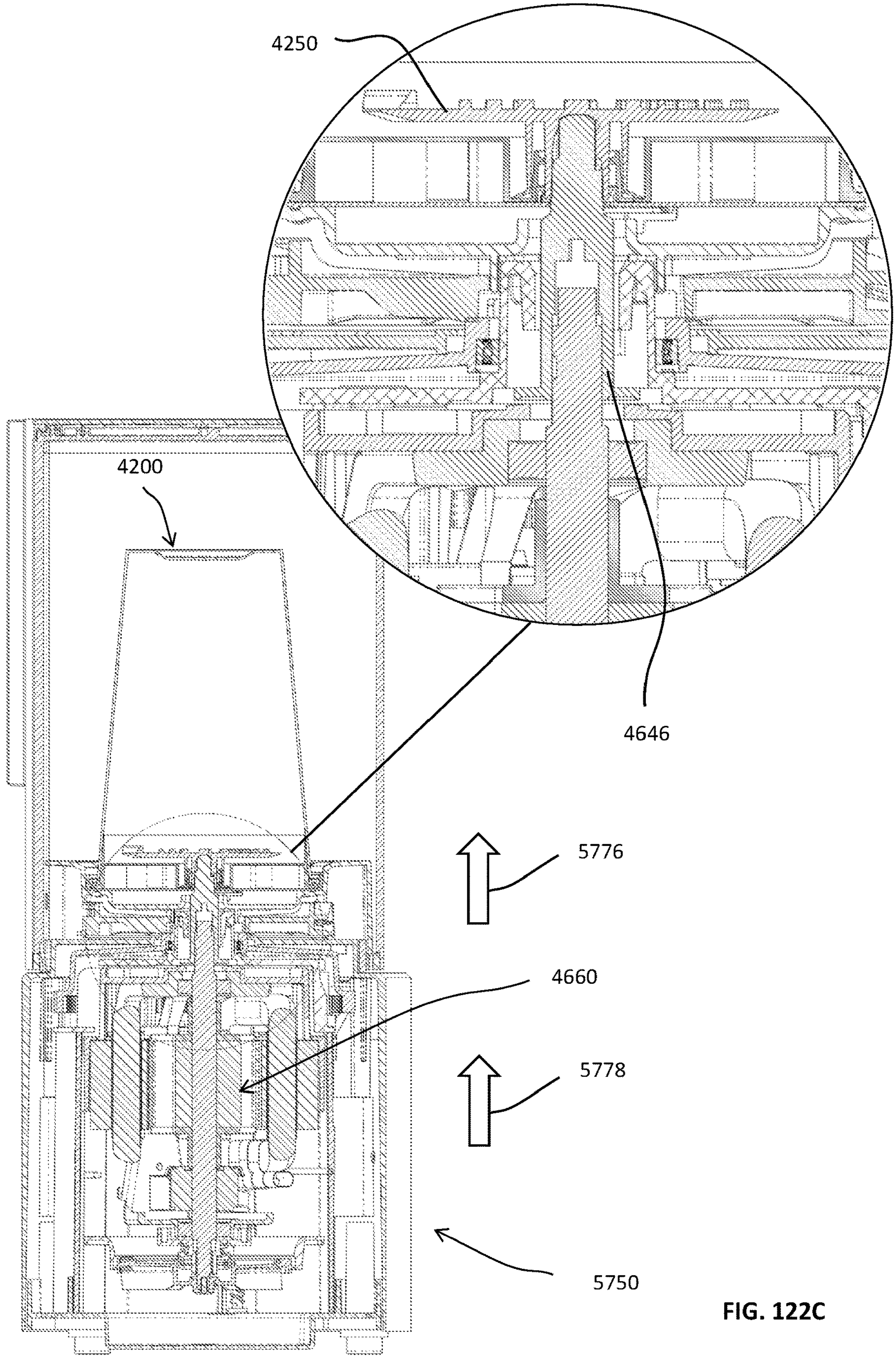
Figure 123A:
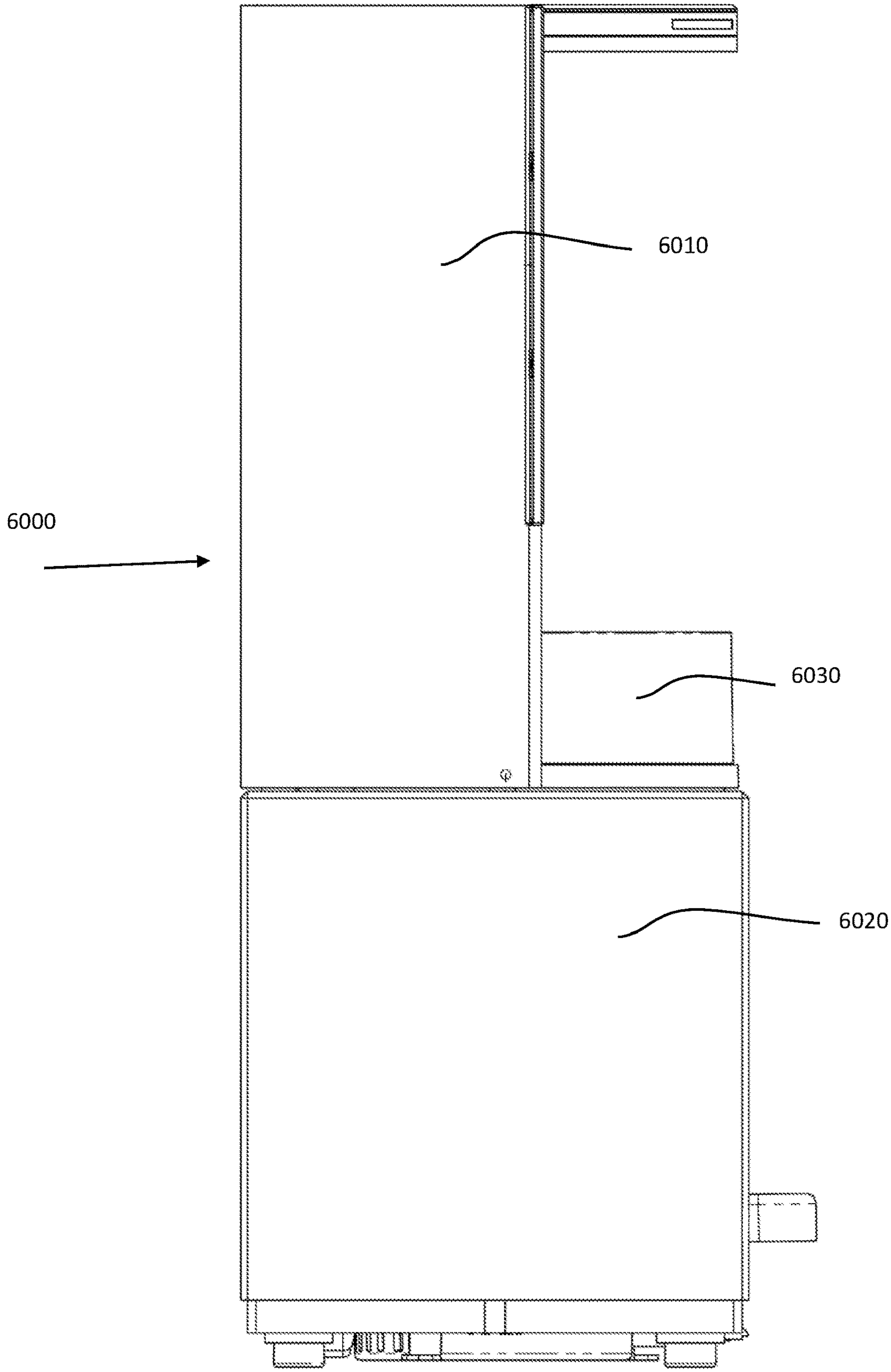
Figure 123B:
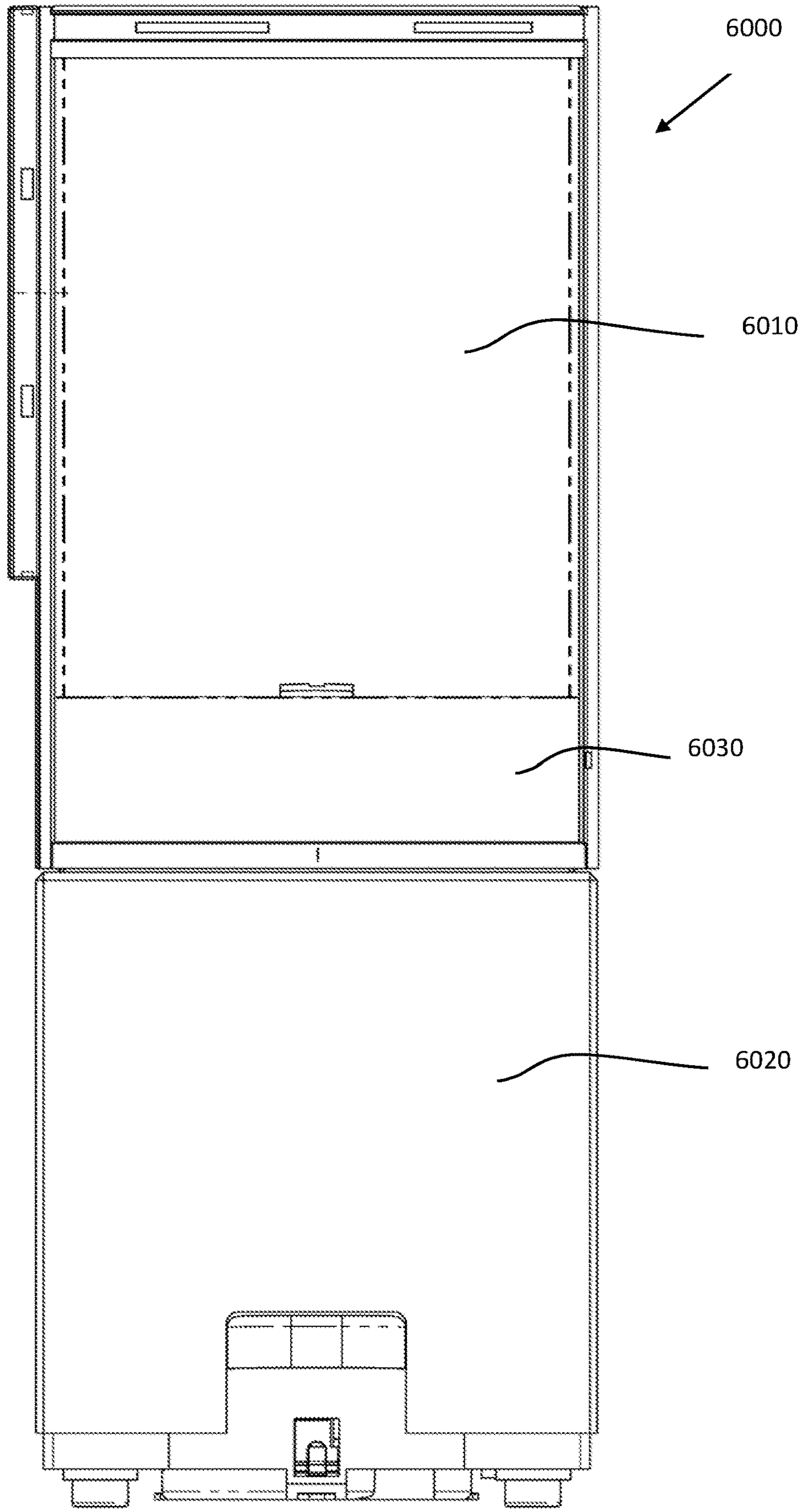
Figure 123C:
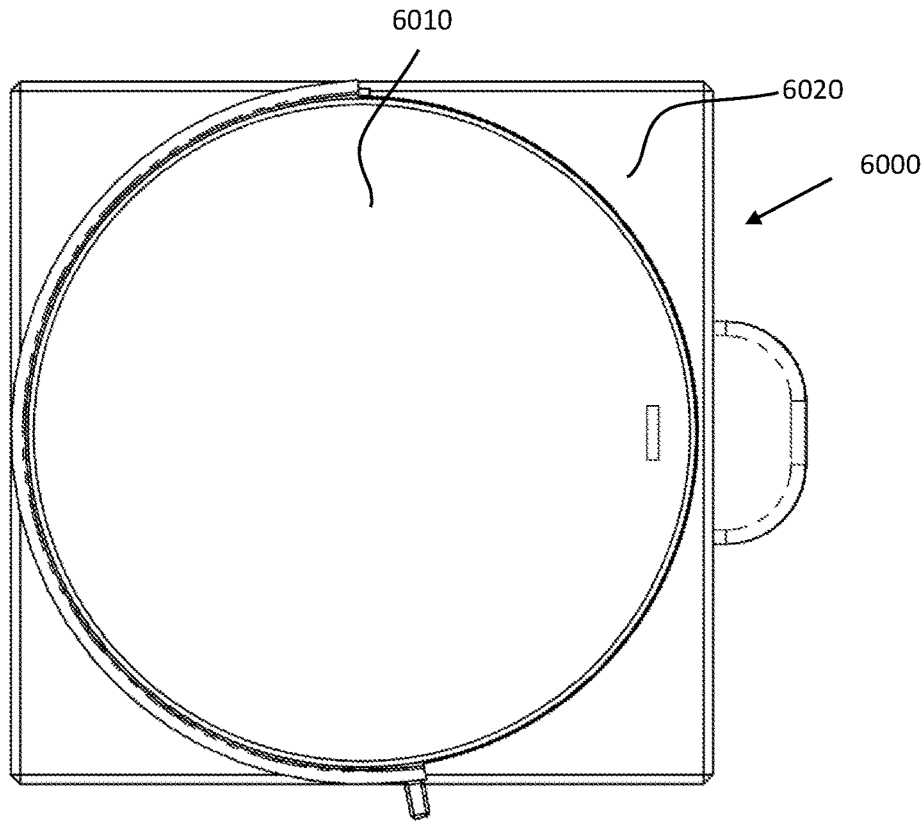
Figure 123D:
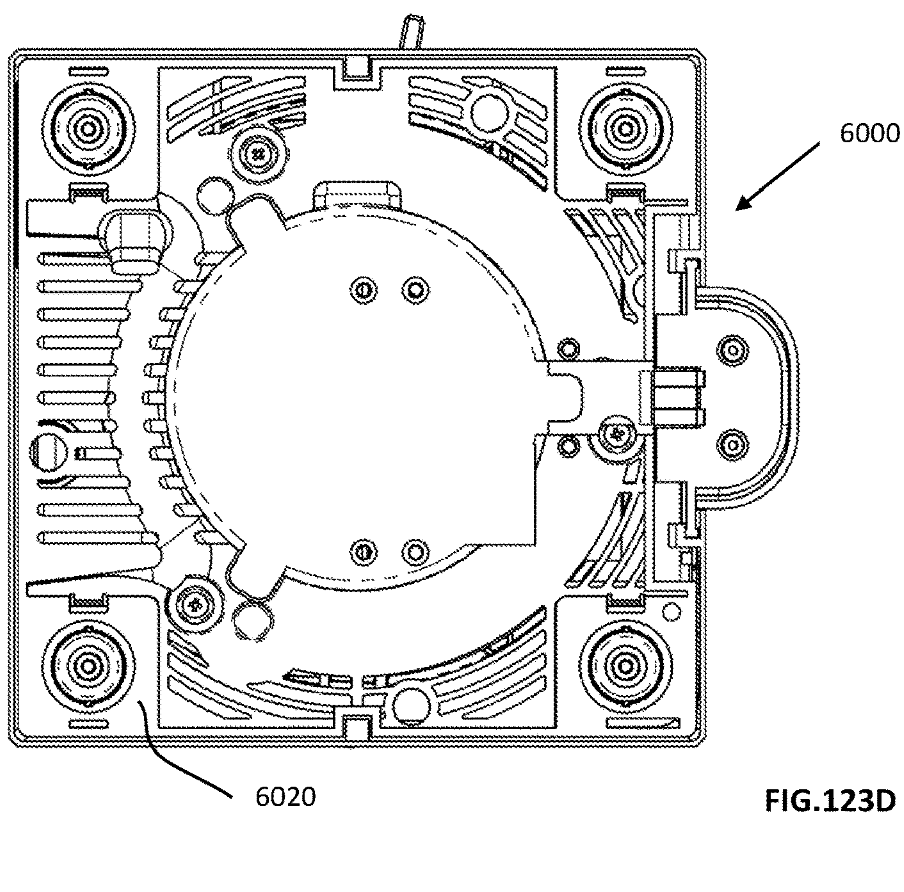
Figure 123E:
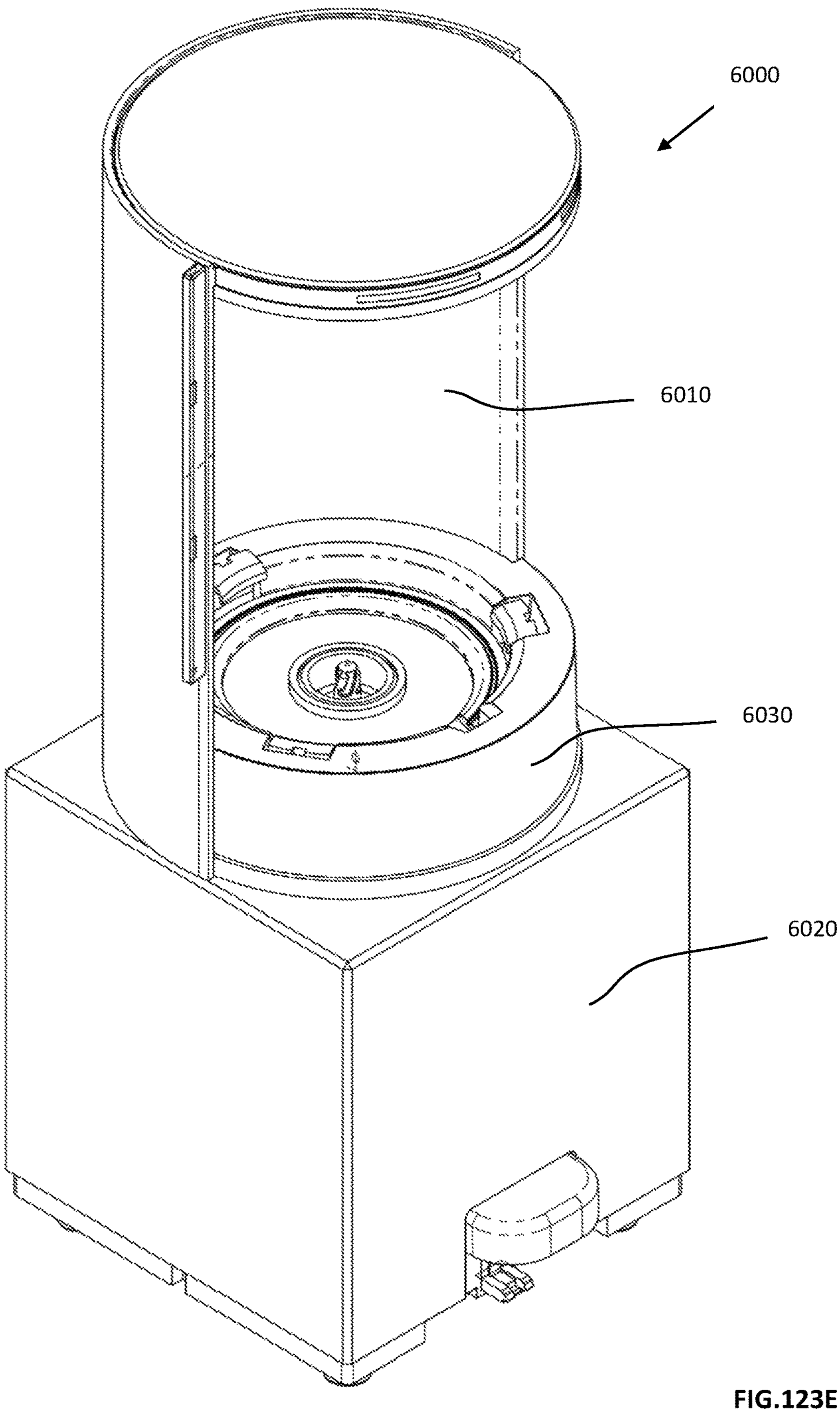
Figure 123F:
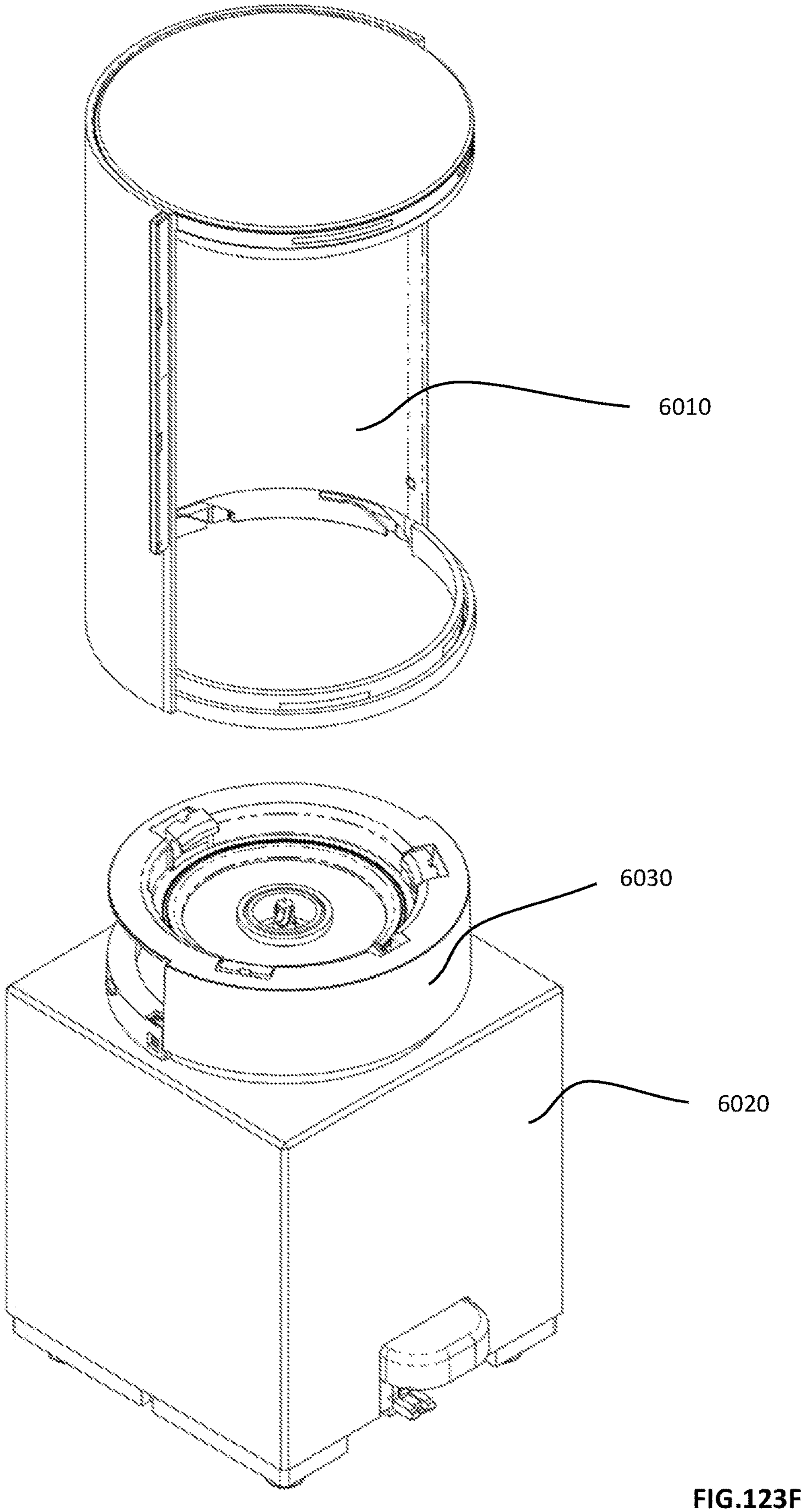
Figure 123G:
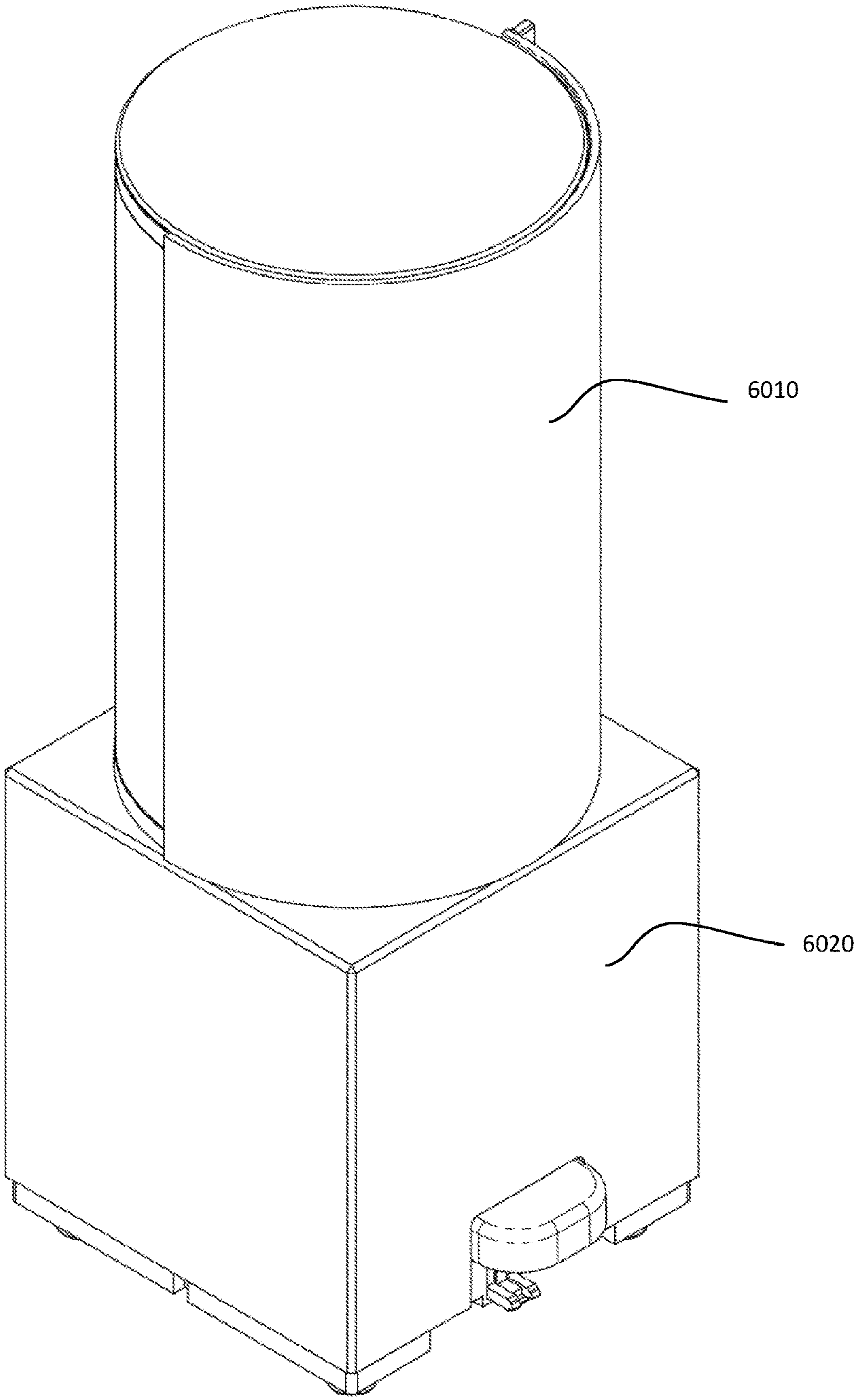
Figure 126:
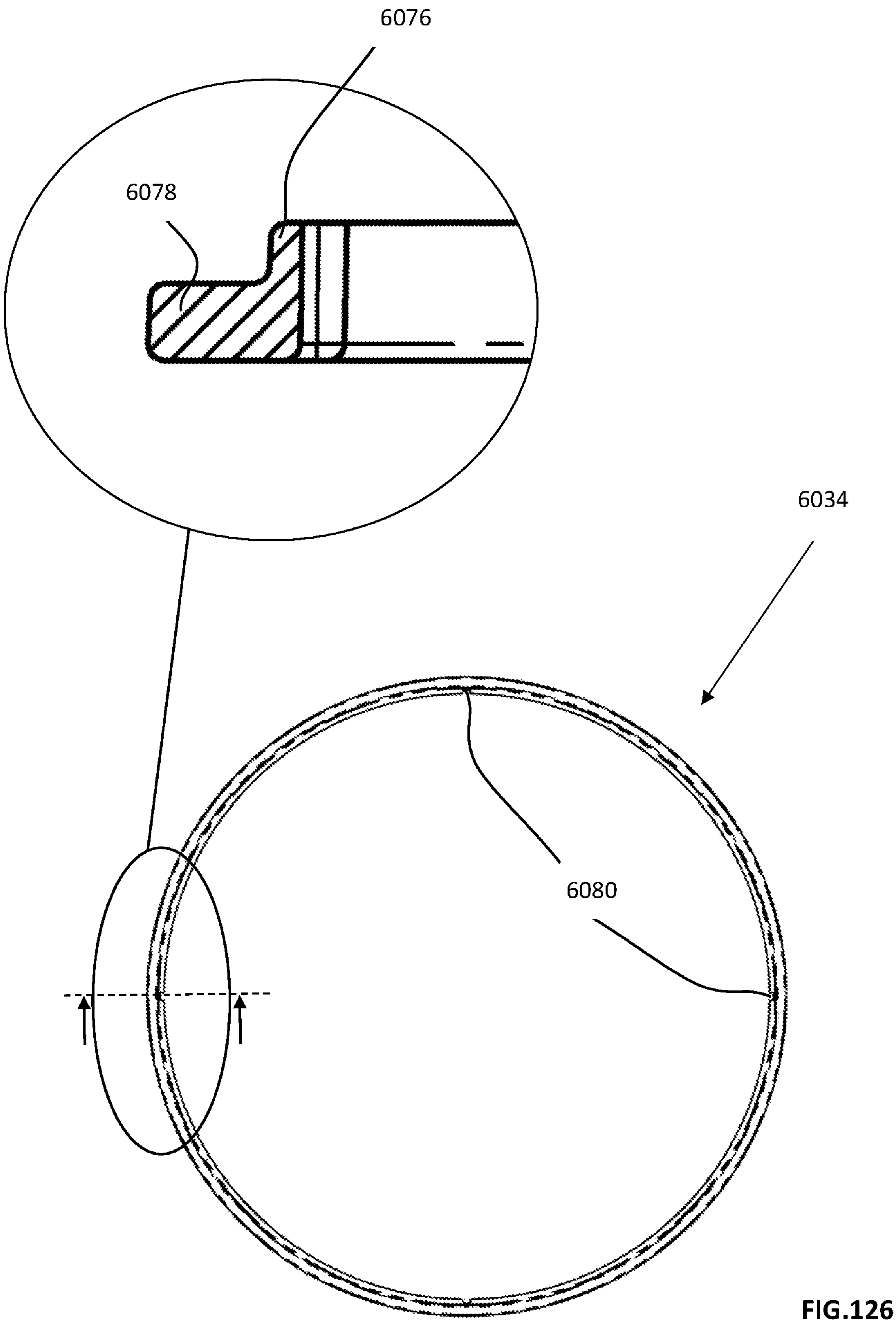
Figure 127A:
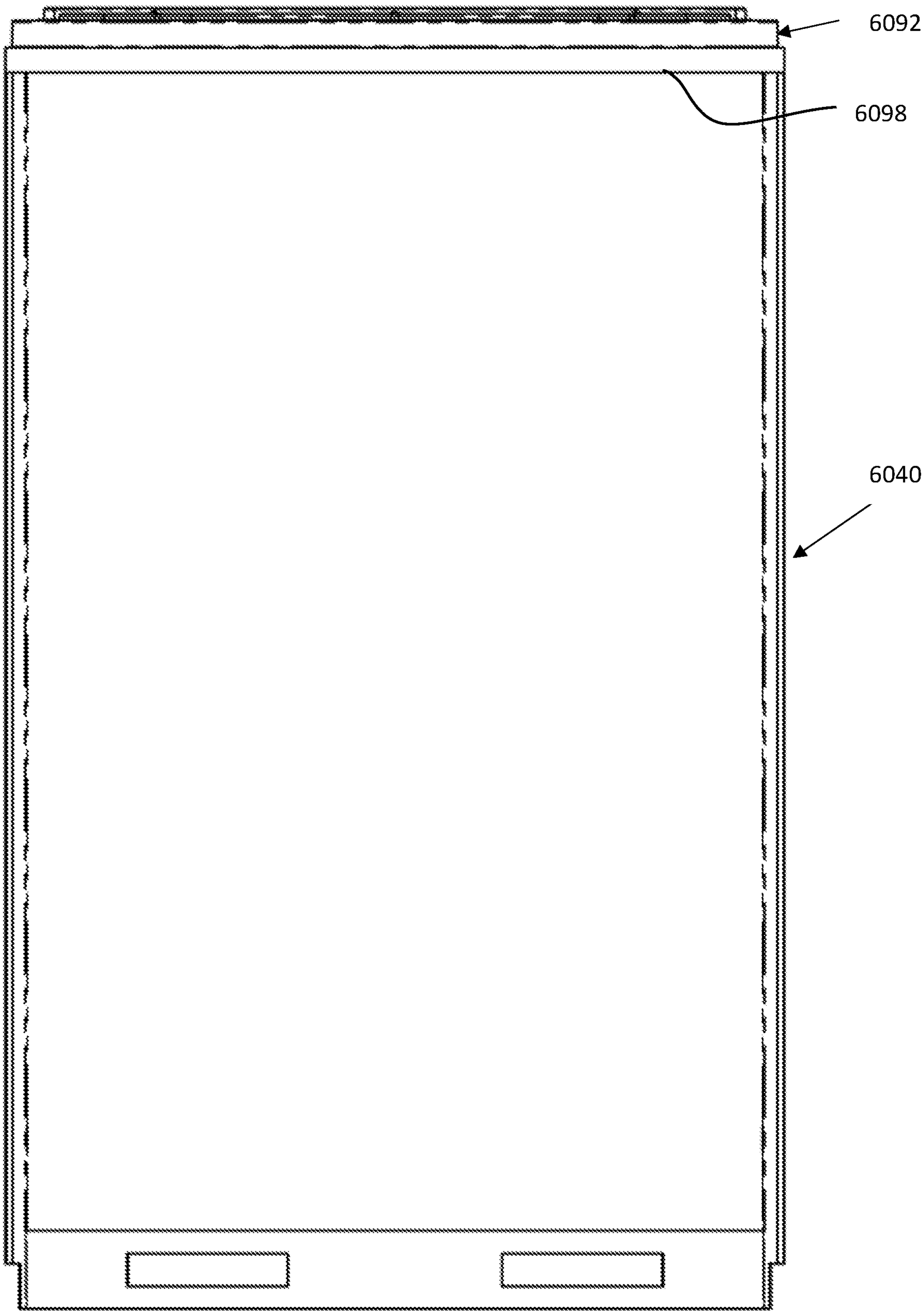
Figure 127B:
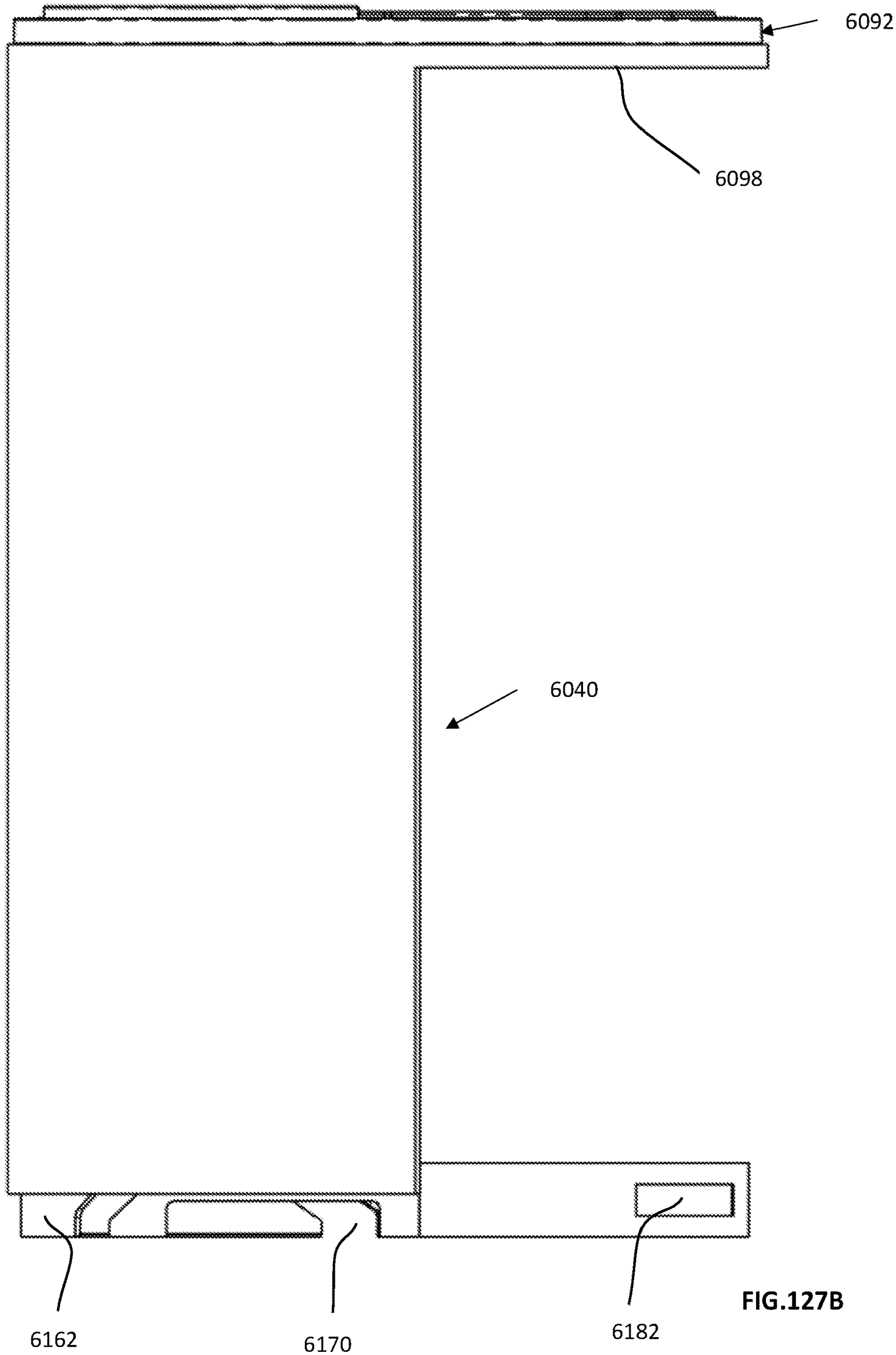
Figure 127C:
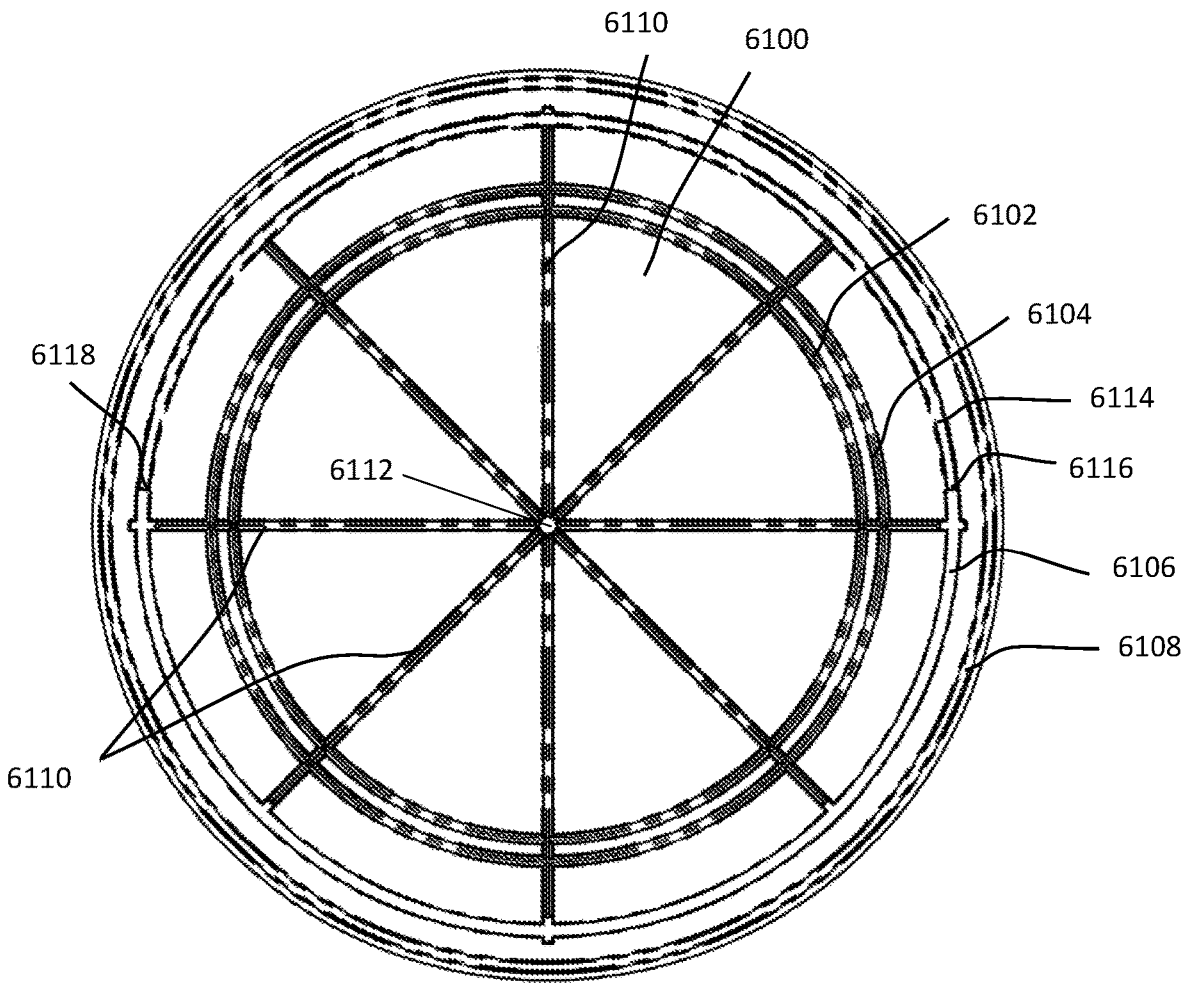
Figure 127D:
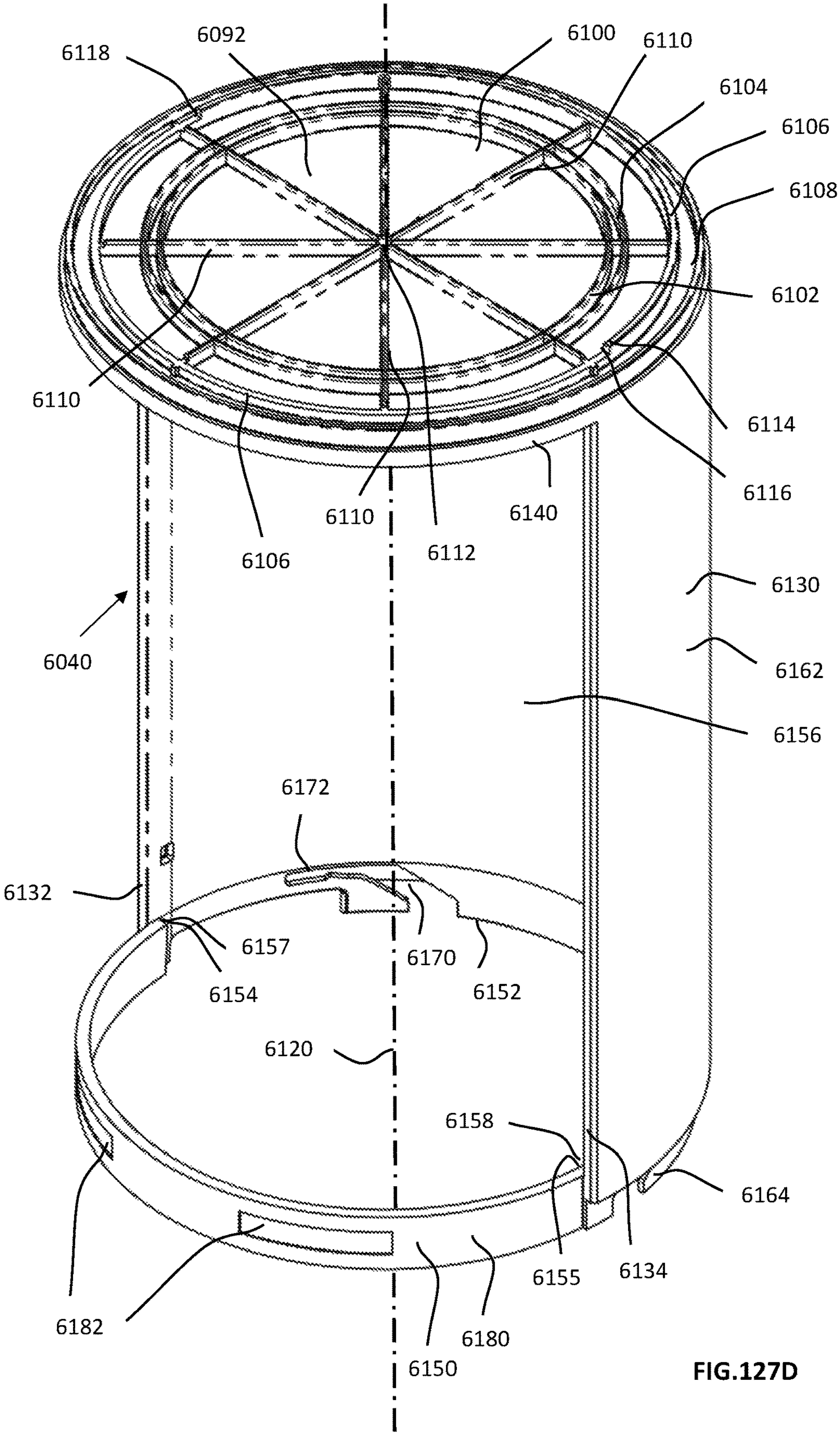
Figure 129:
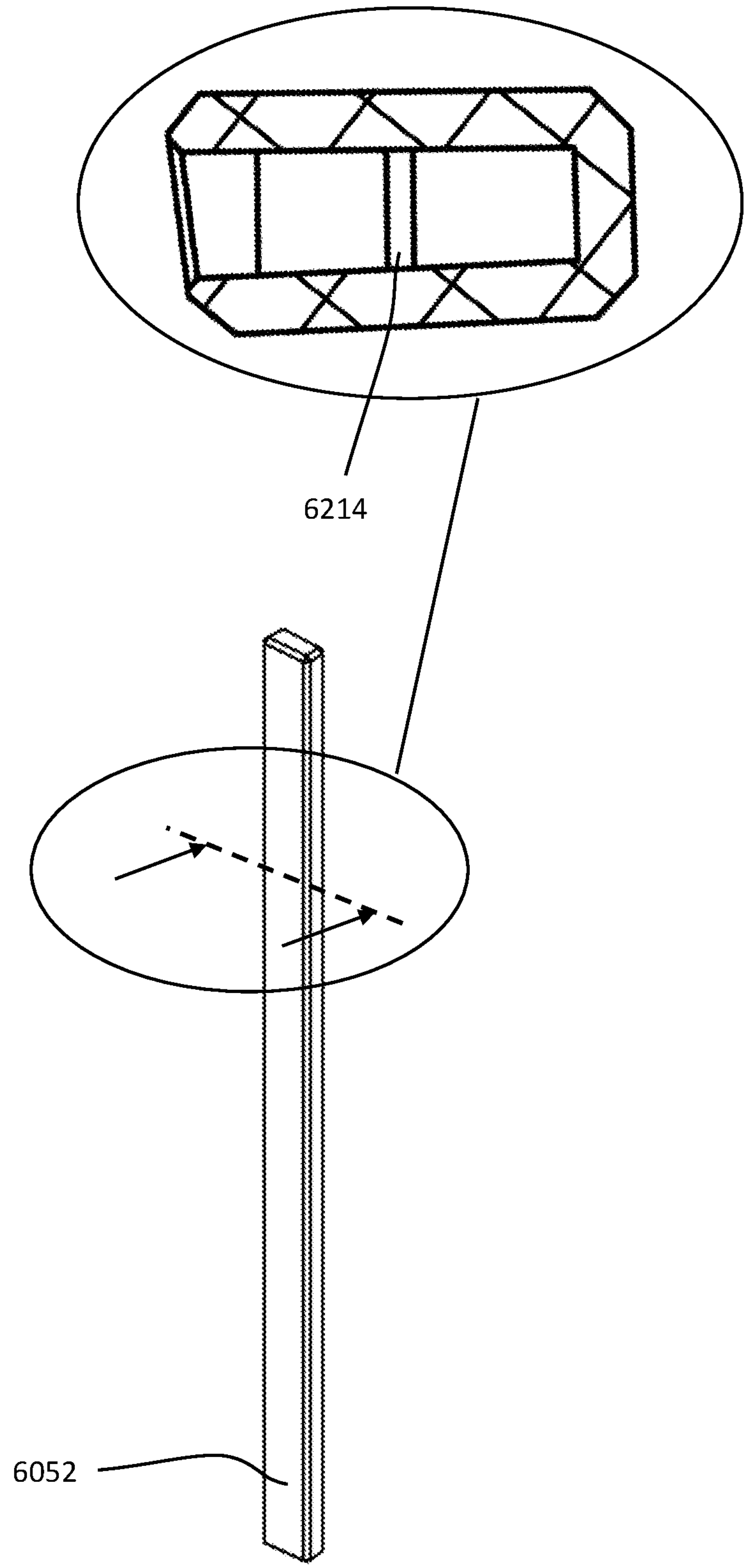
Figure 130A:
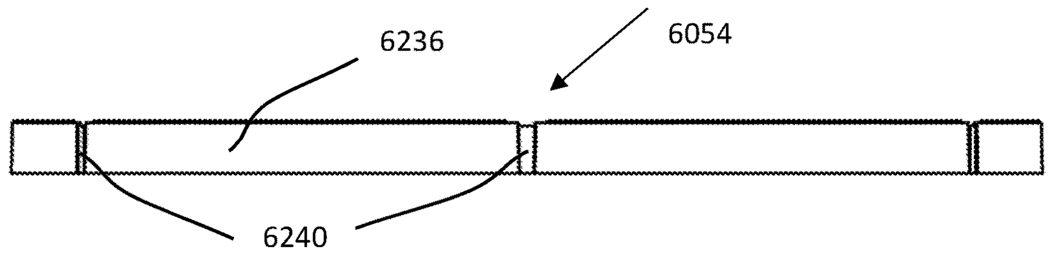
Figure 130B:
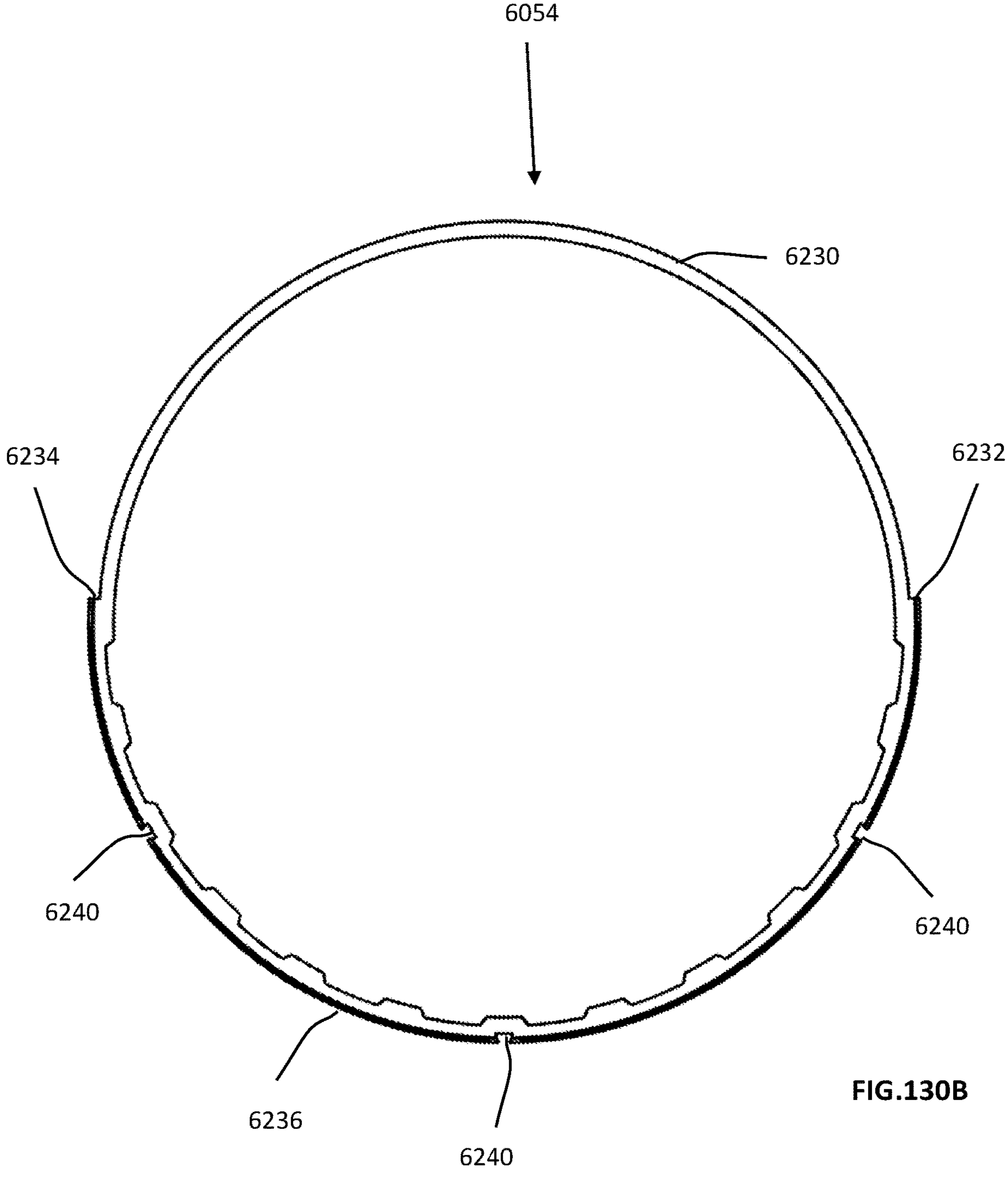
Figure 130C:
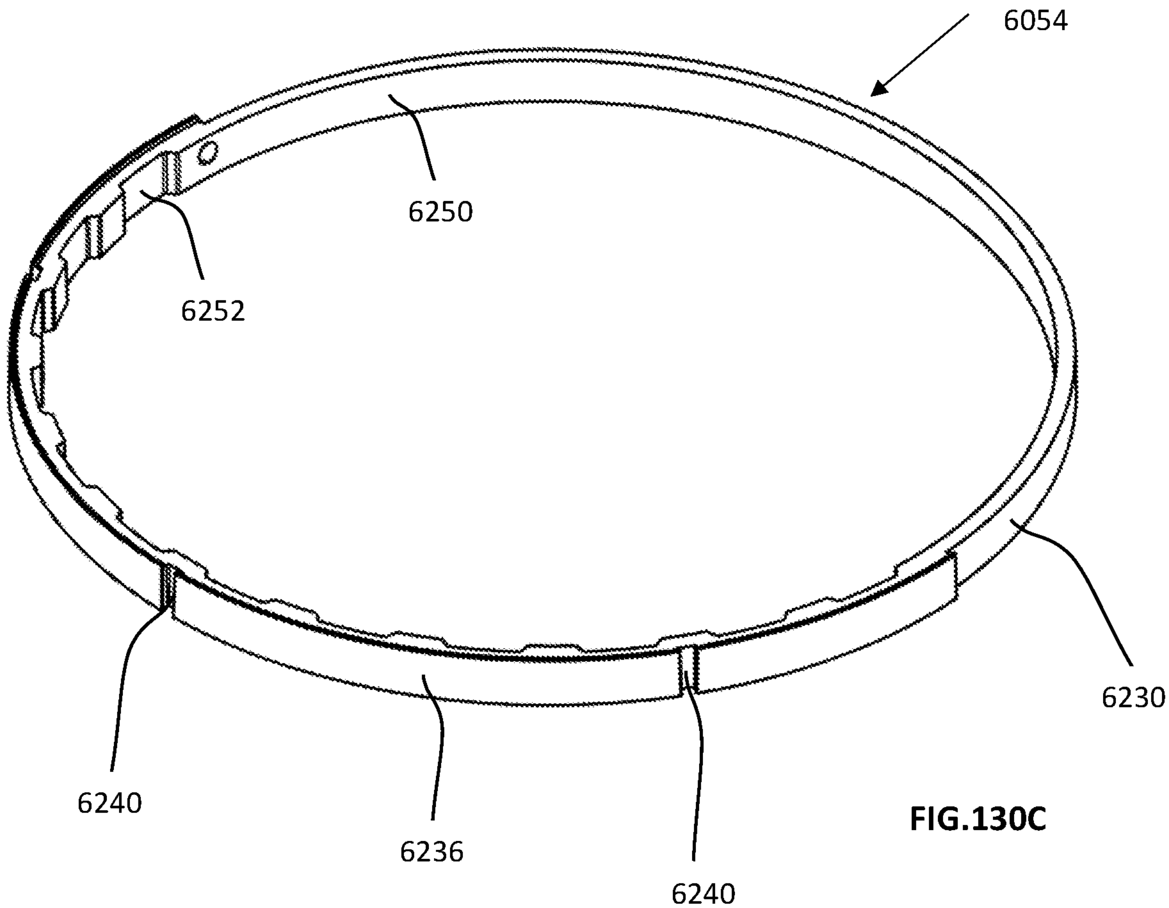
Figure 137A:
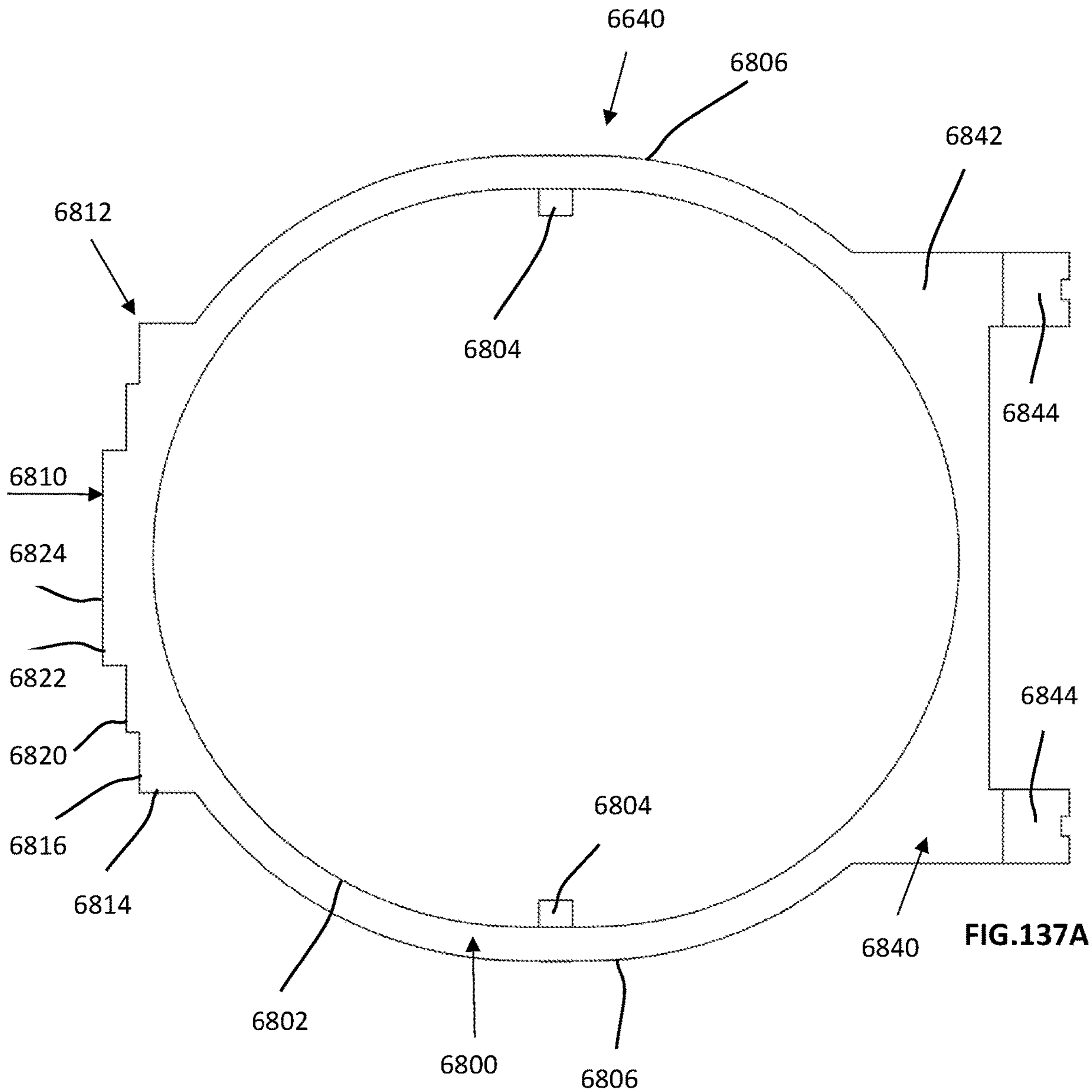
Figure 137B:
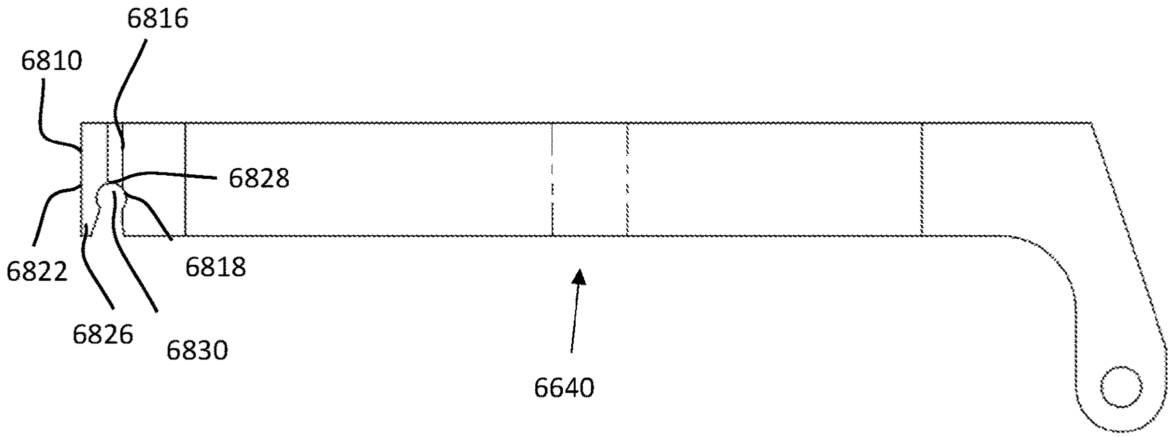
Figure 137C:
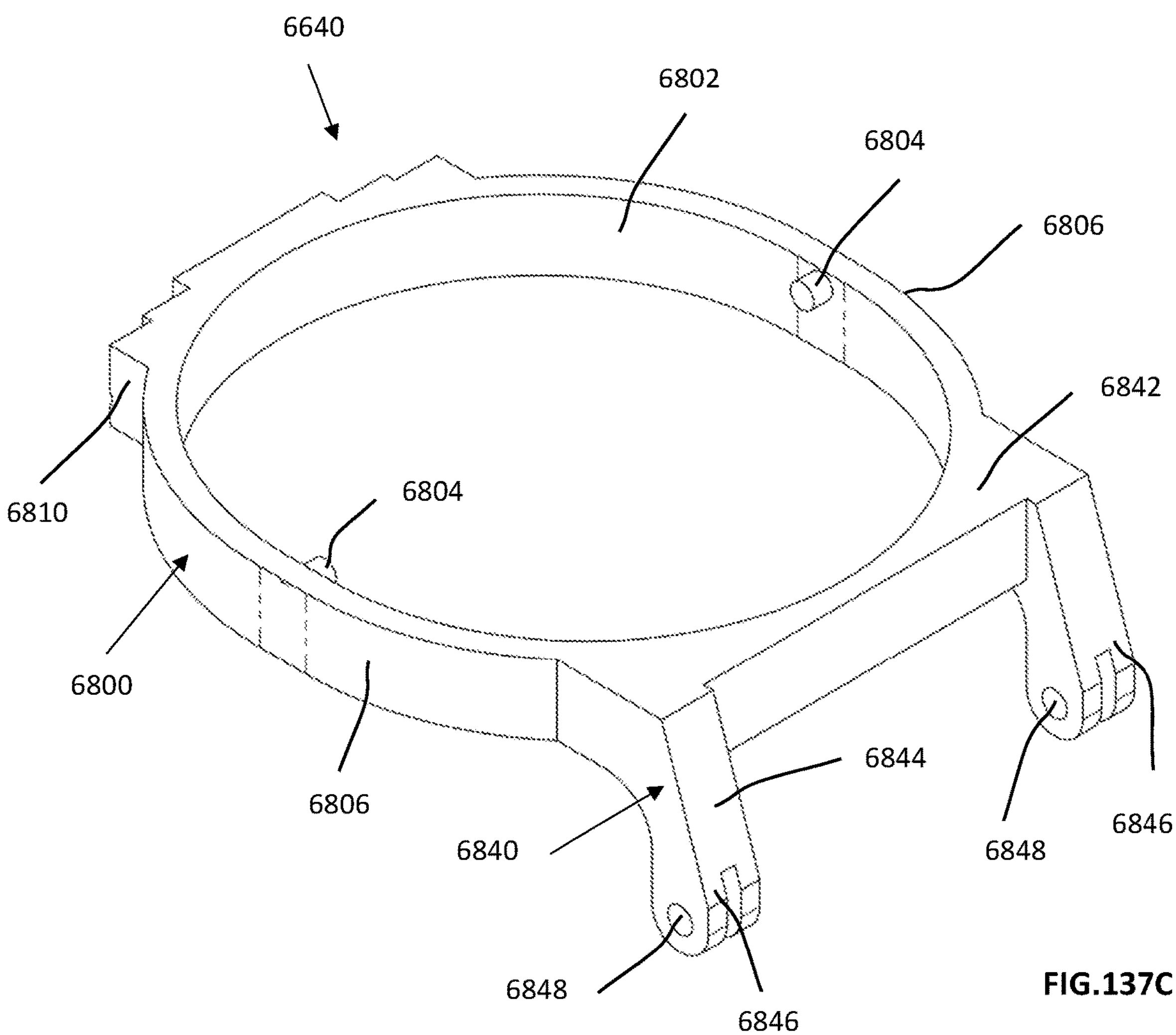
Figure 138A:
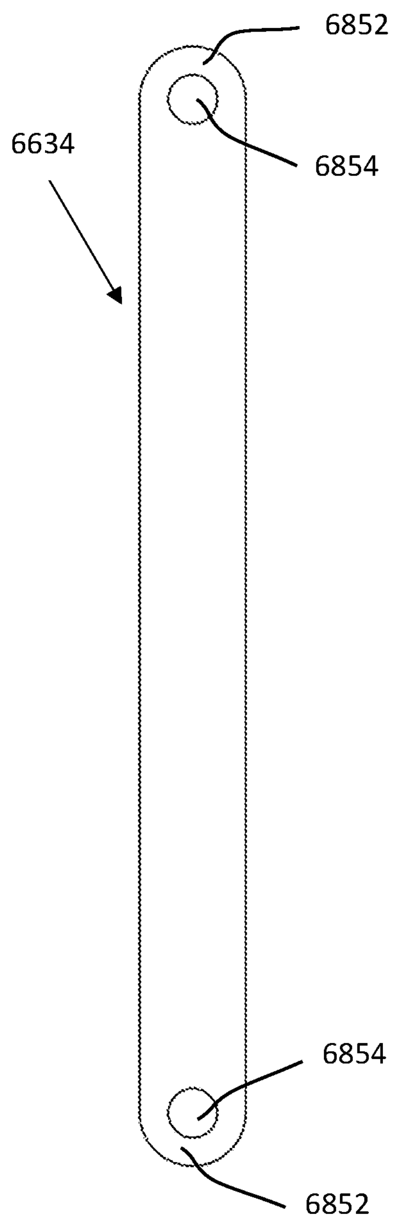
Figure 138B:
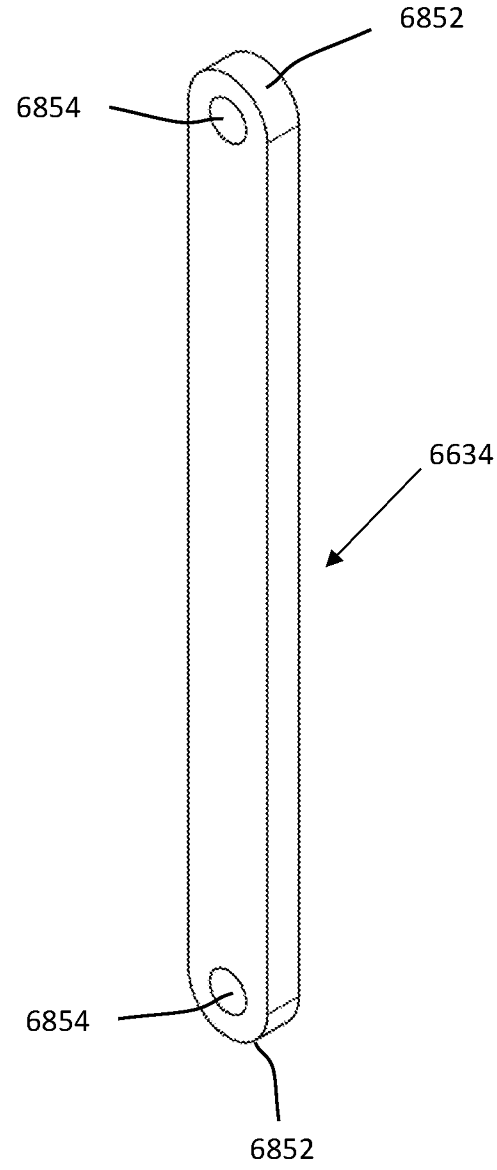
Figure 139A:
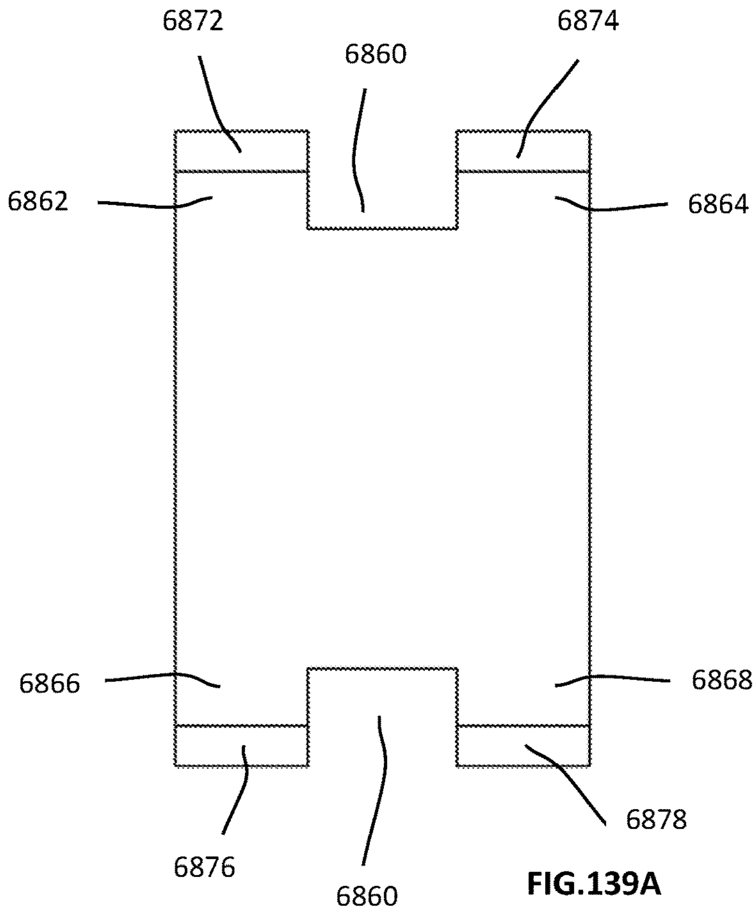
Figure 139B:
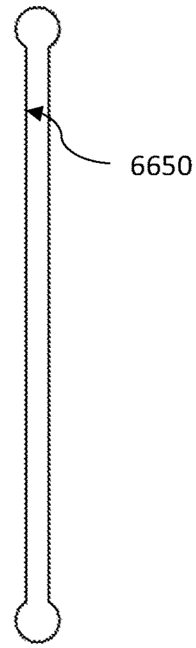
Figure 139D:
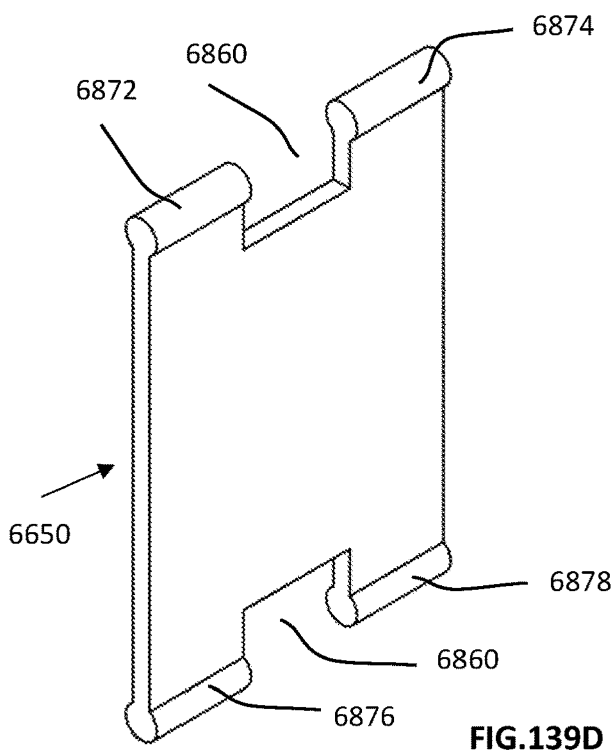
Figure 139C:
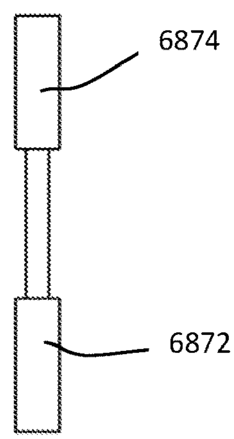
Figure 140A:
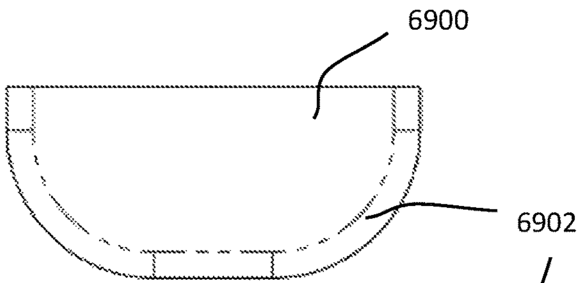
Figure 140C:
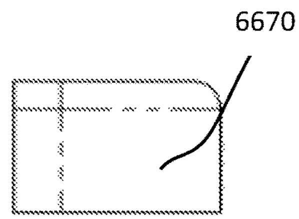
Figure 140D:
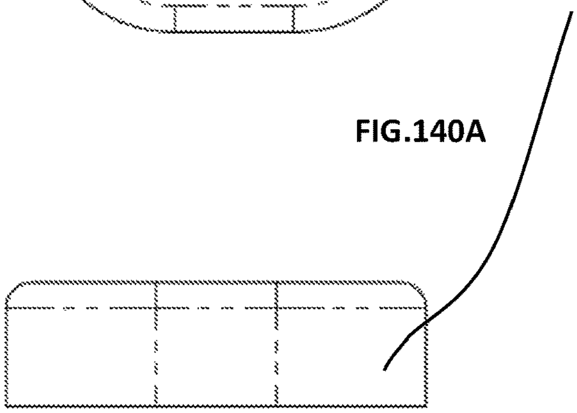
Figure 140E:
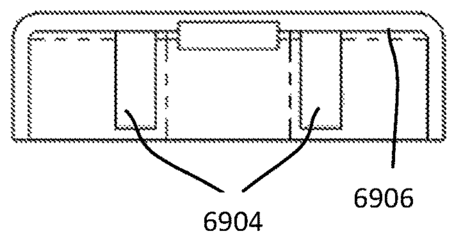
Figure 140B:
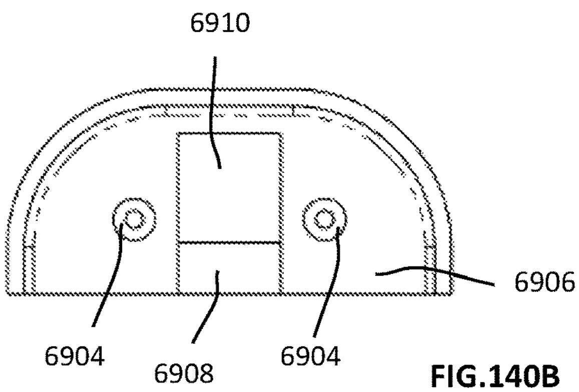
Figure 140F:
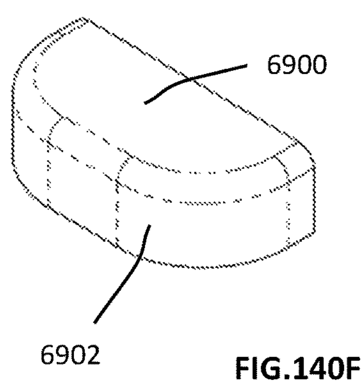
Figure 140G:
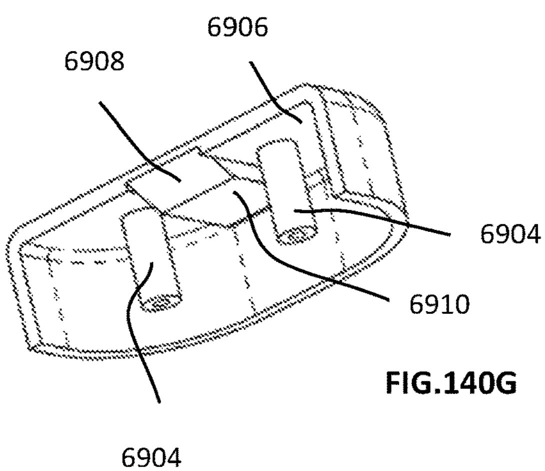
Figure 141A:
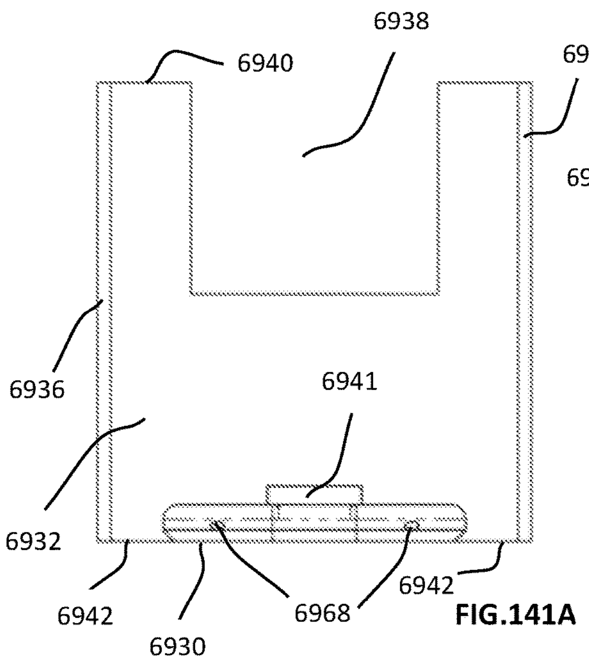
Figure 141B:
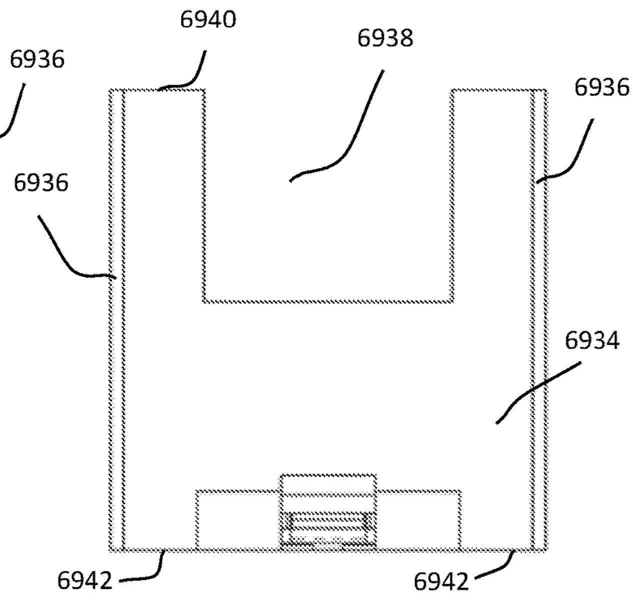
Figure 141C:
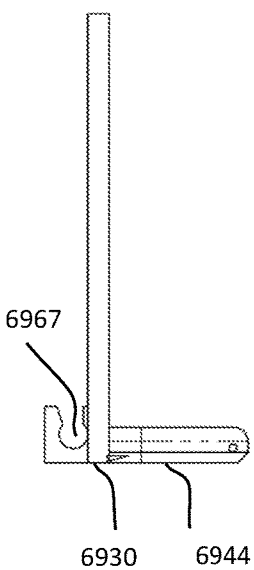
Figure 141E:
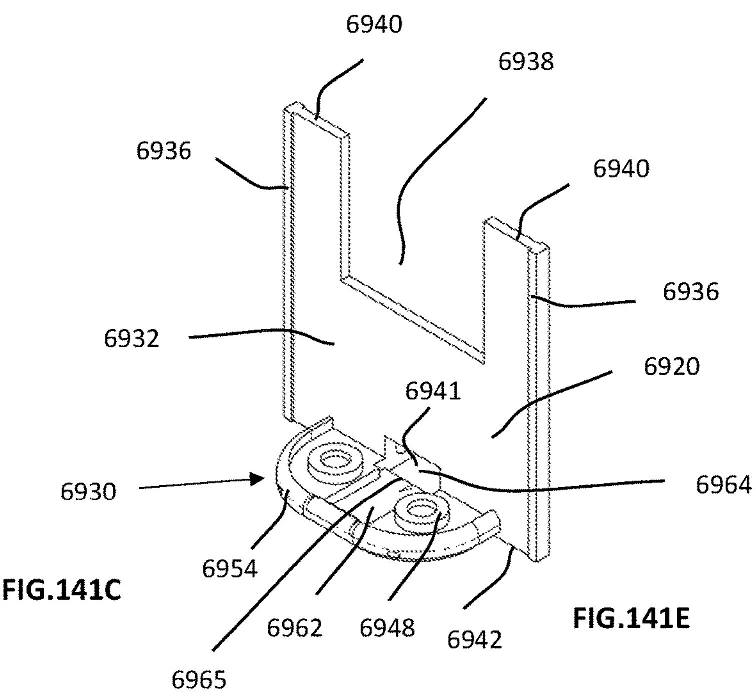
Figure 141D:
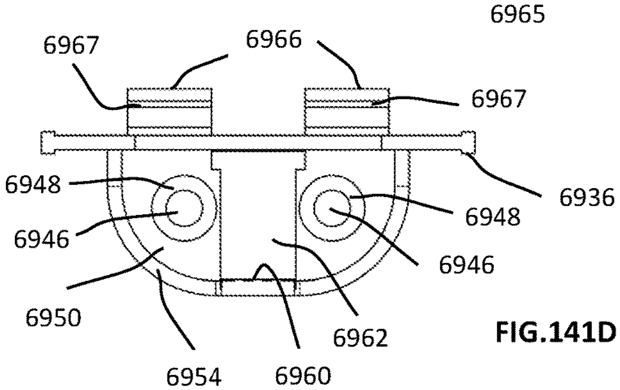
Figure 142A:
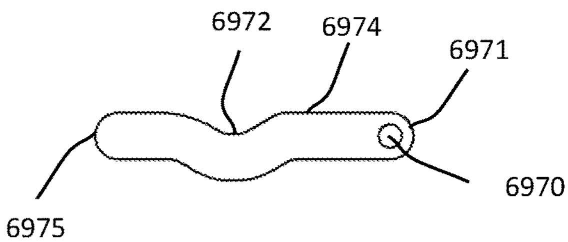
Figure 142B:
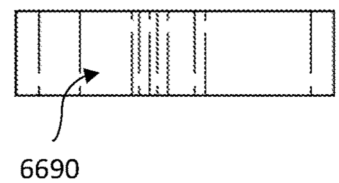
Figure 142C:
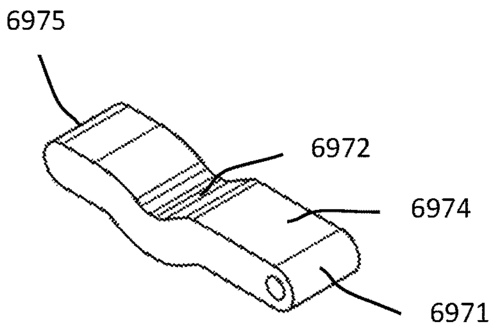
Figure 143A:
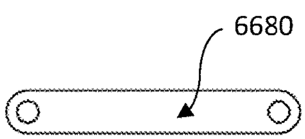
Figure 143B:
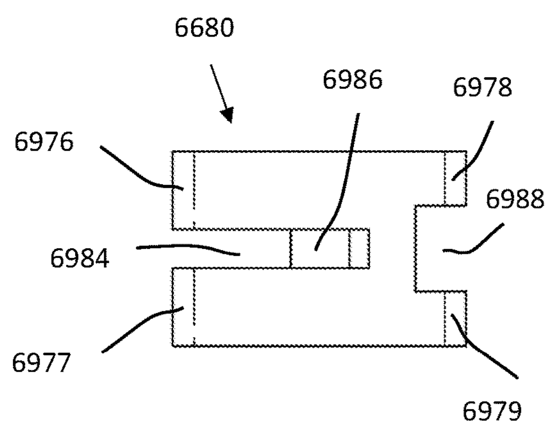
Figure 143C:
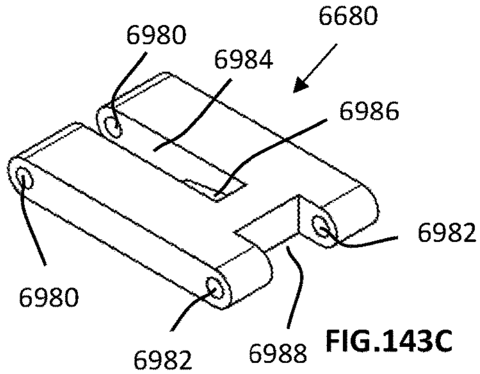
Figure 151A:
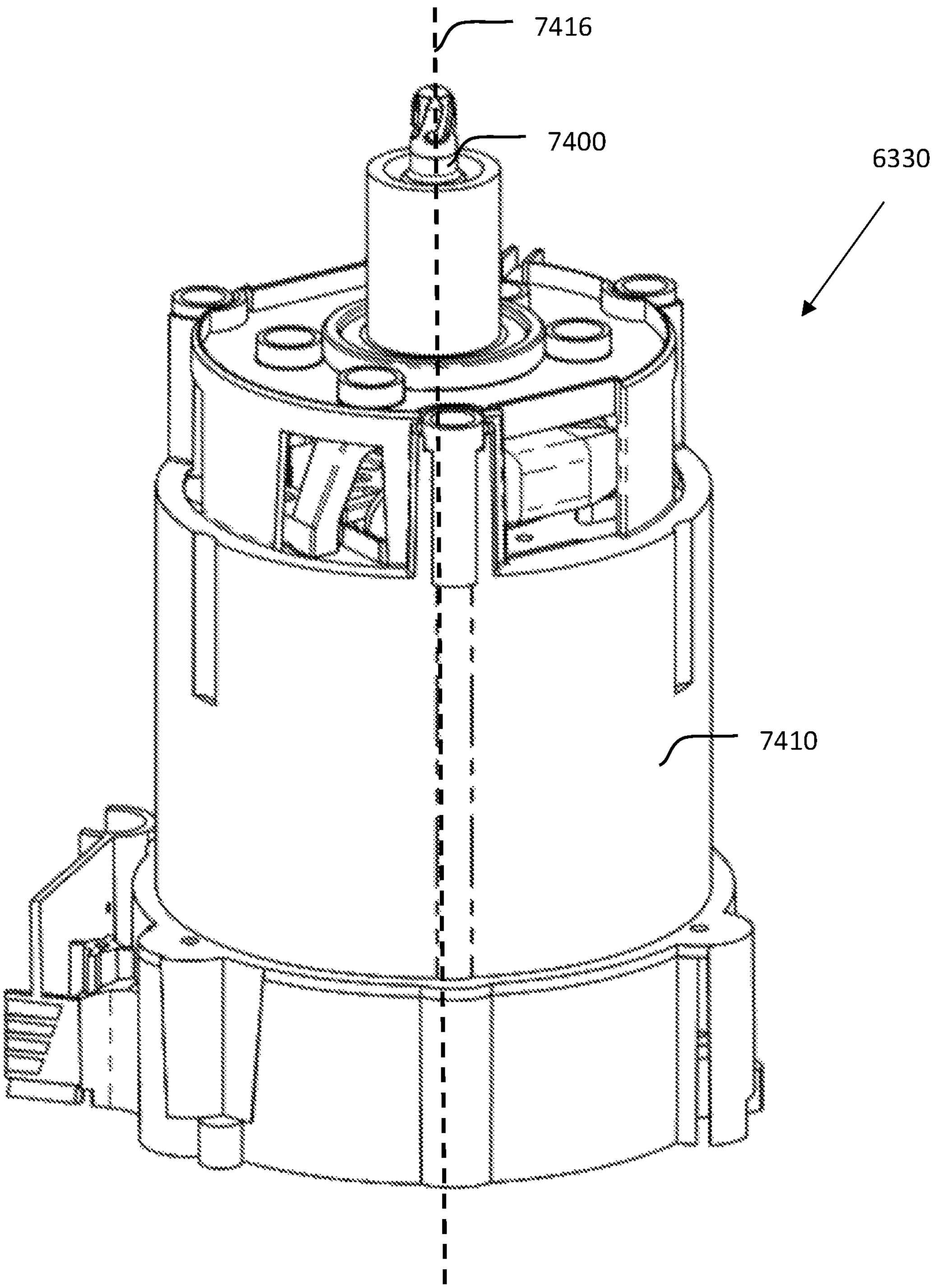
Figure 151B:
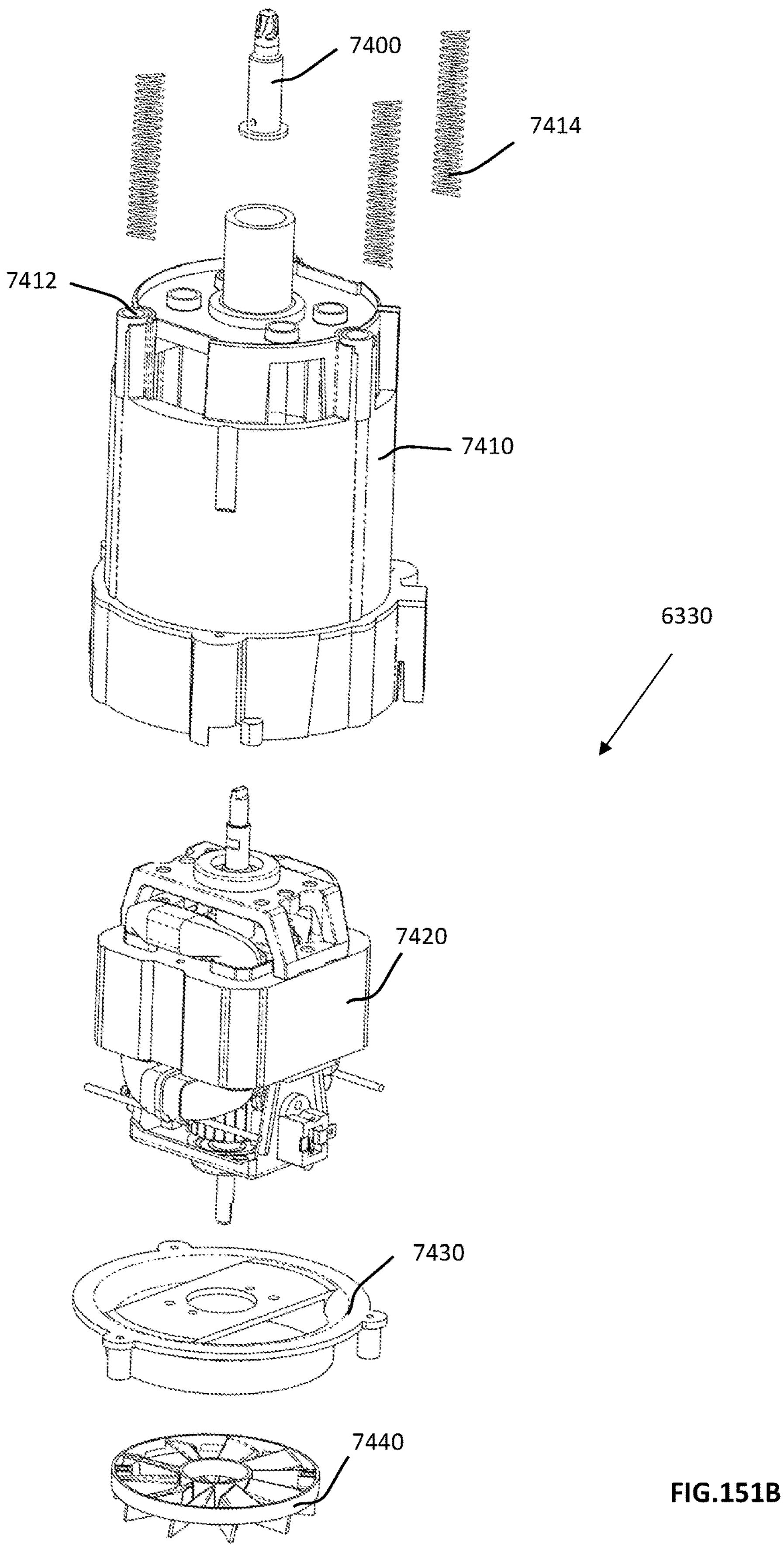
Figure 152:
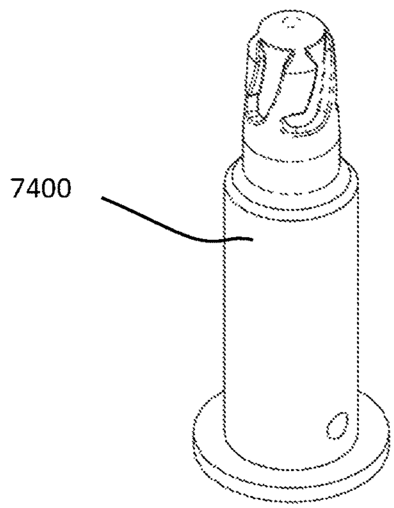
Figure 153A:
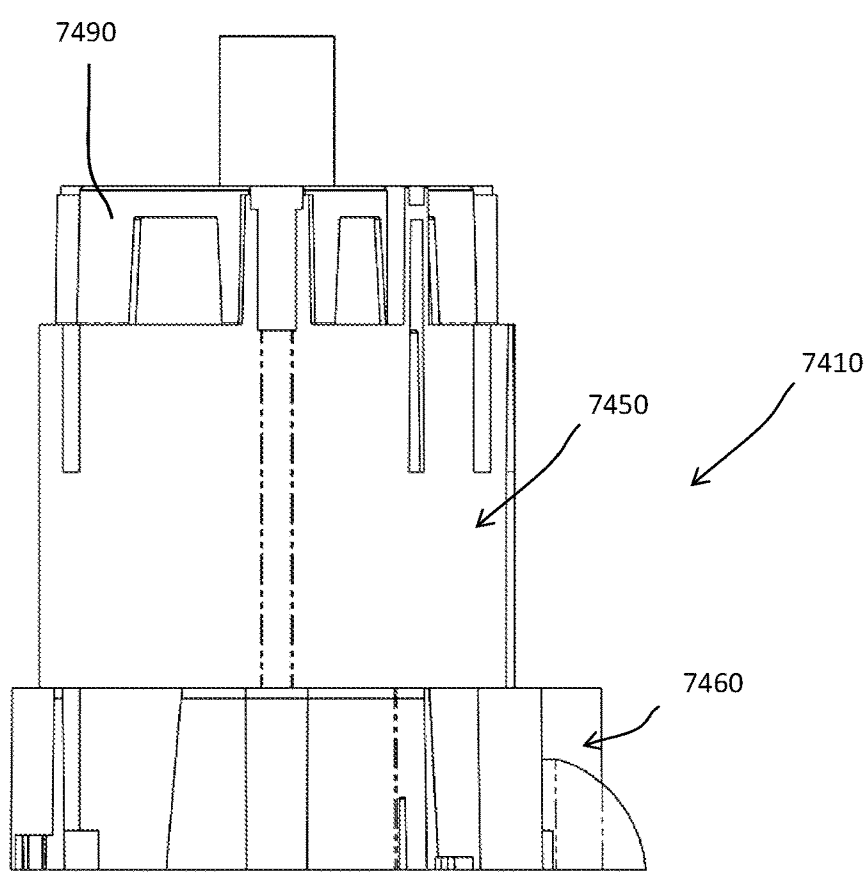
Figure 153B:
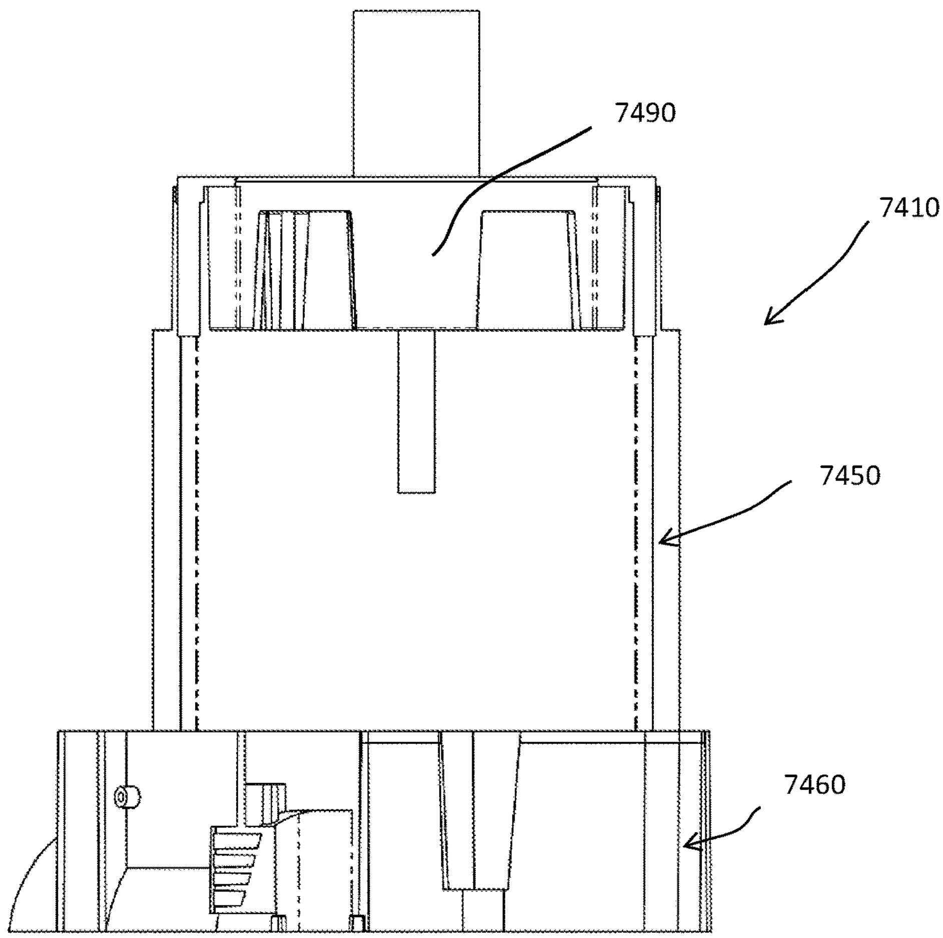
Figure 153C:
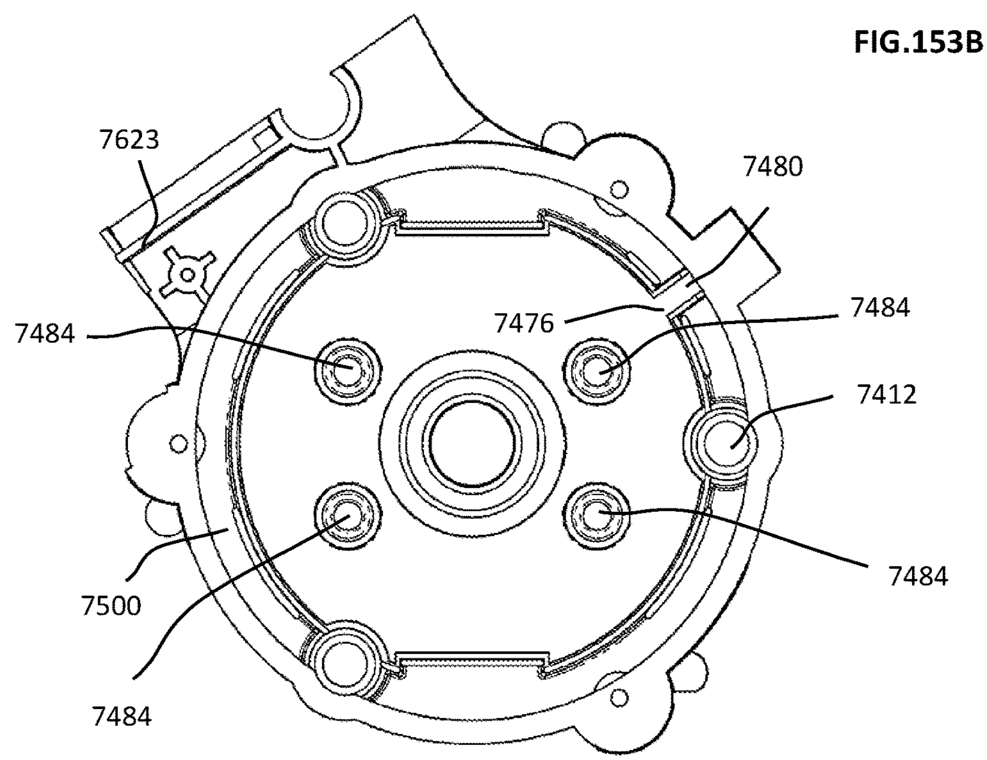
Figure 153D:
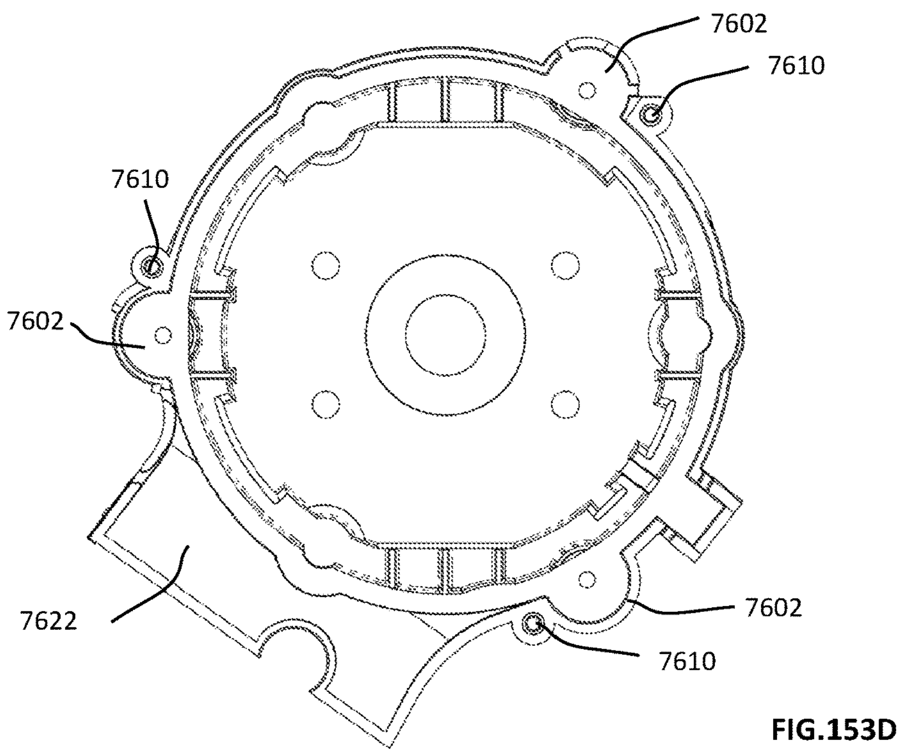
Figure 153E:
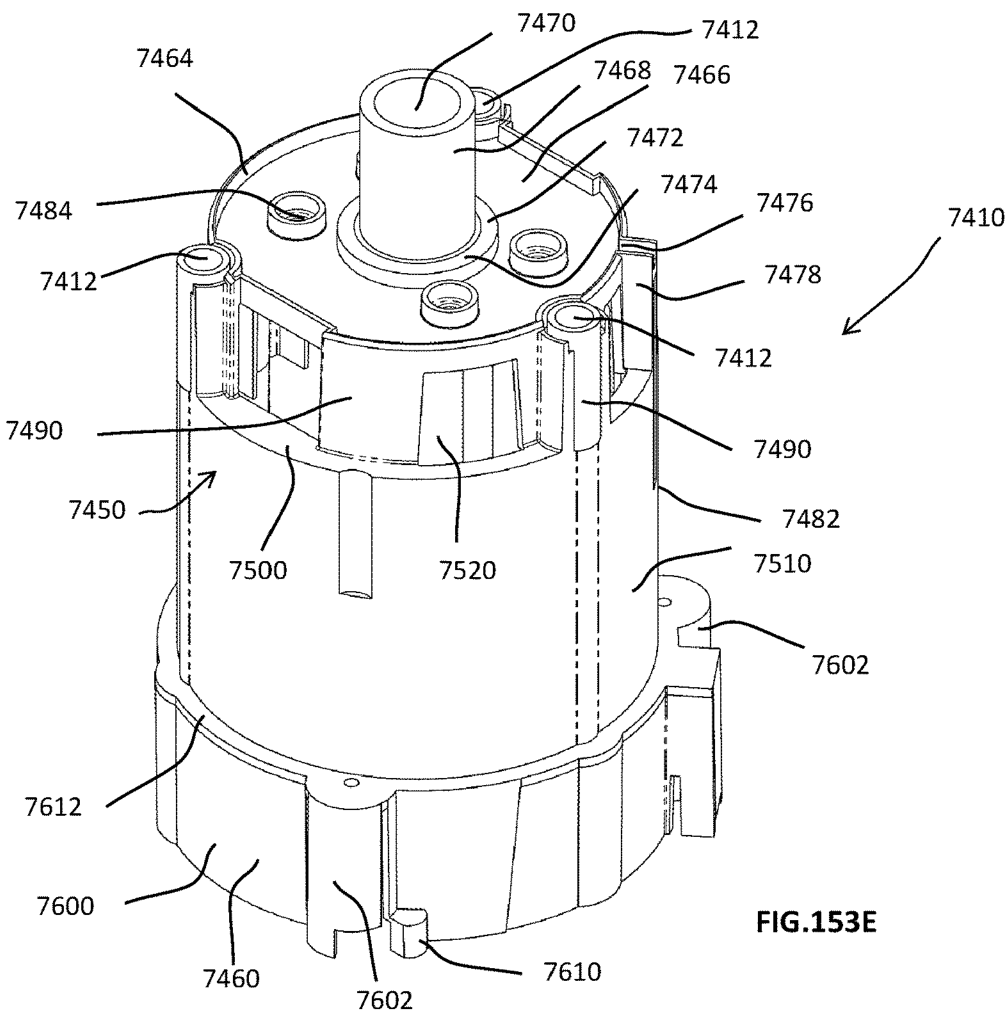
Figure 154:
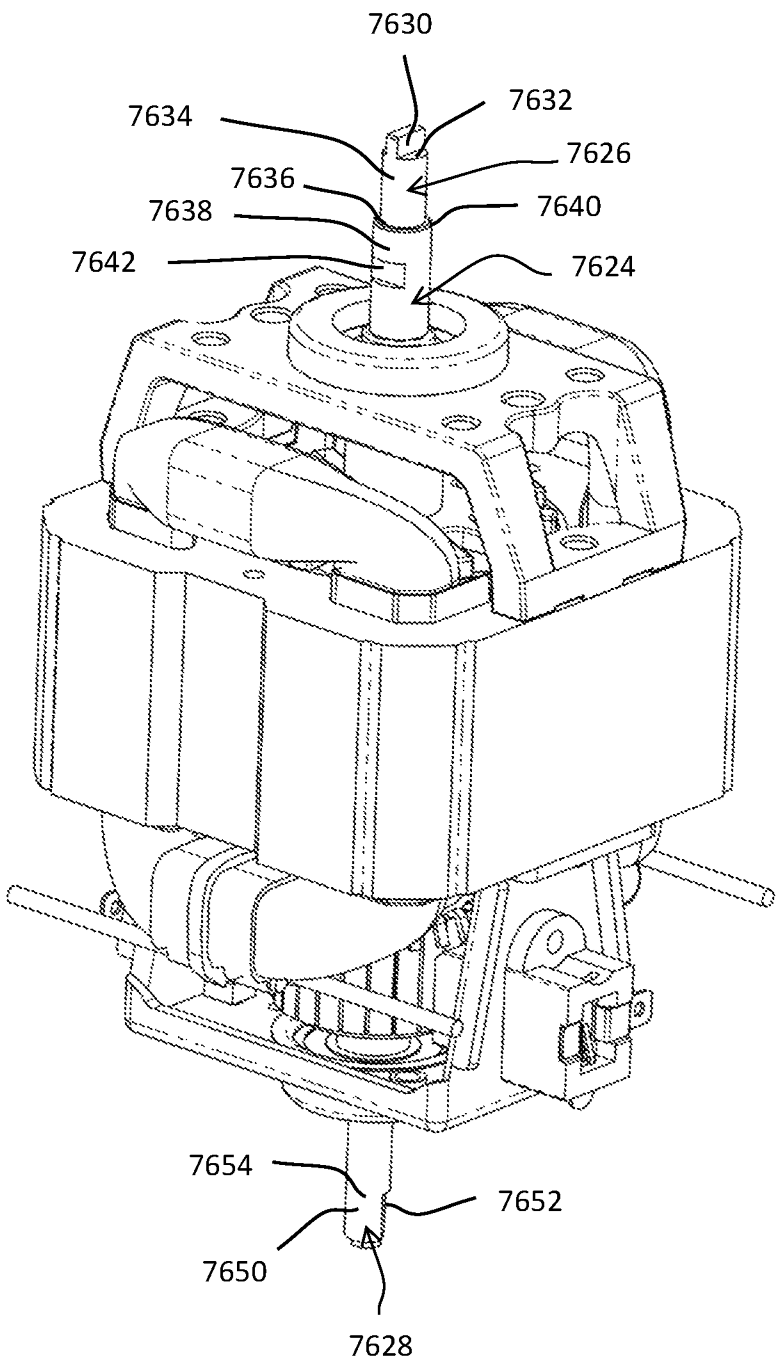
Figure 155A:
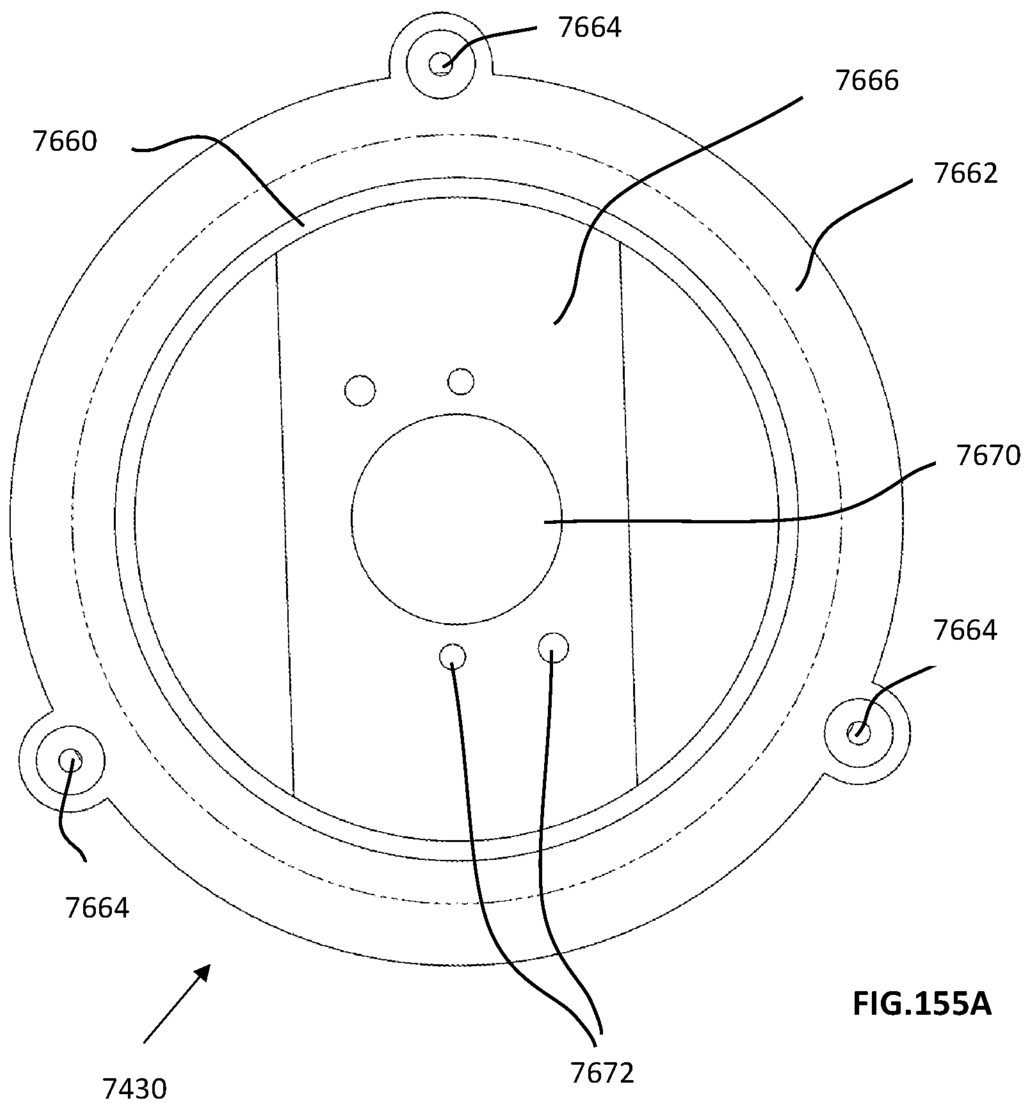
Figure 155B:
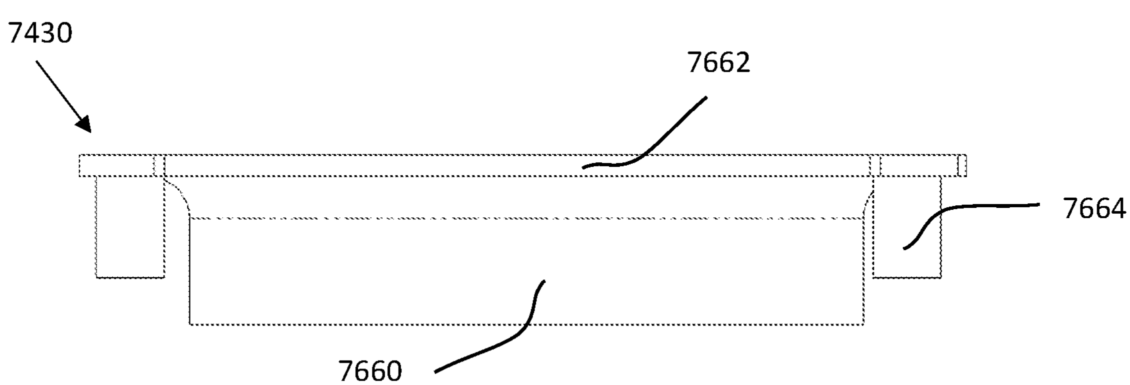
Figure 155C:
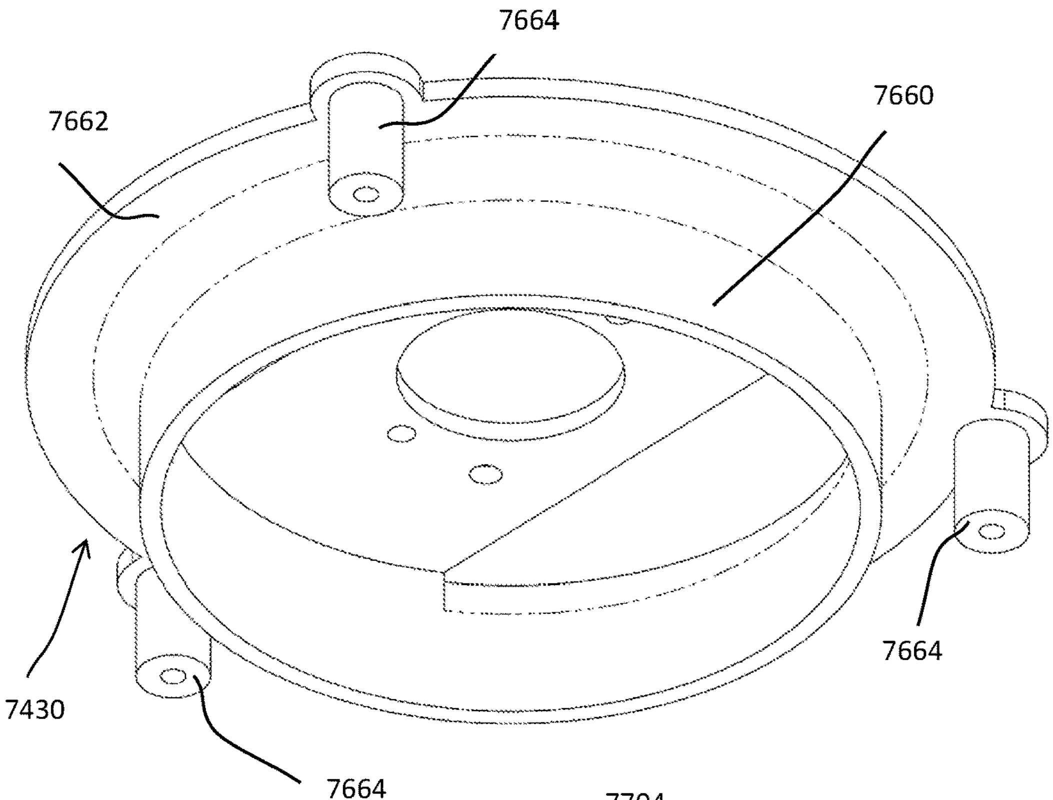
Figure 156A:
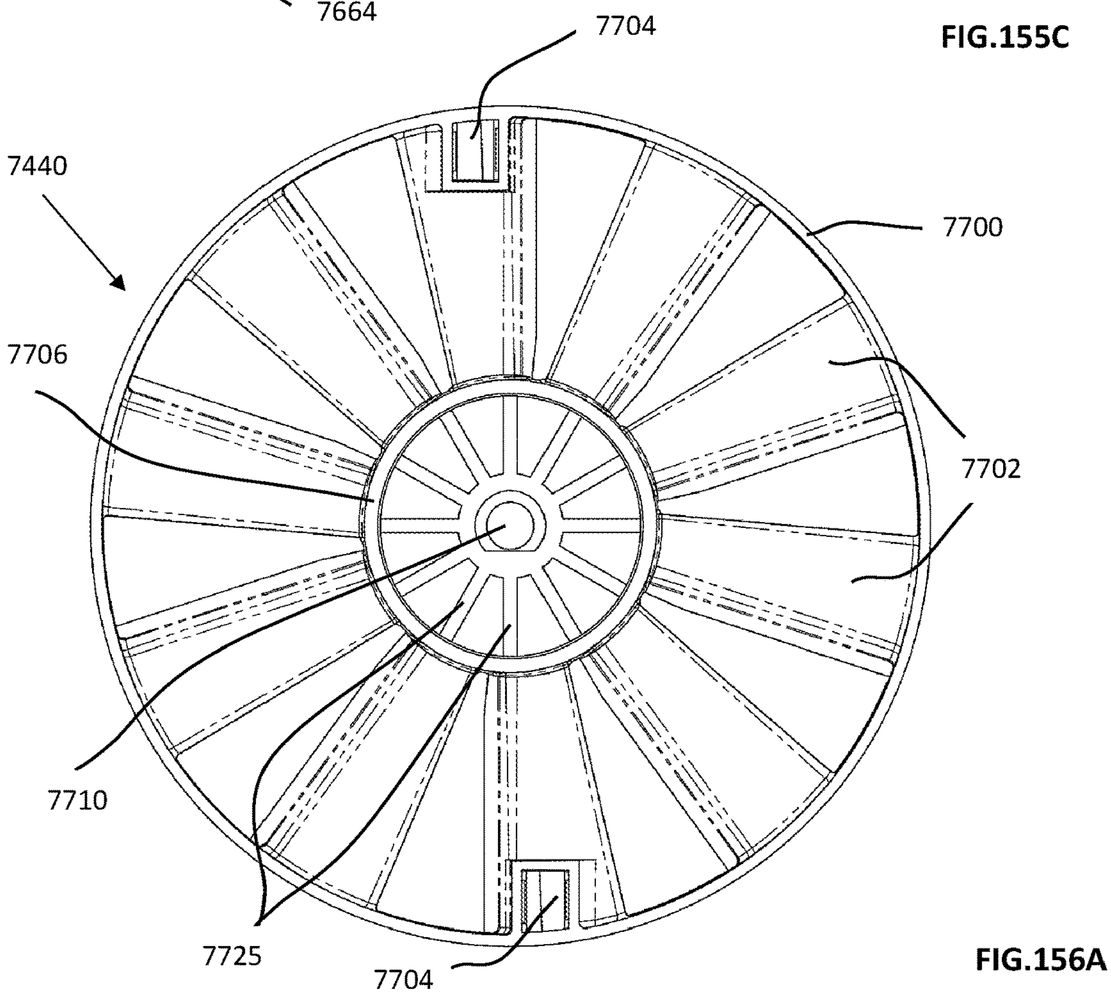
Figure 156B:
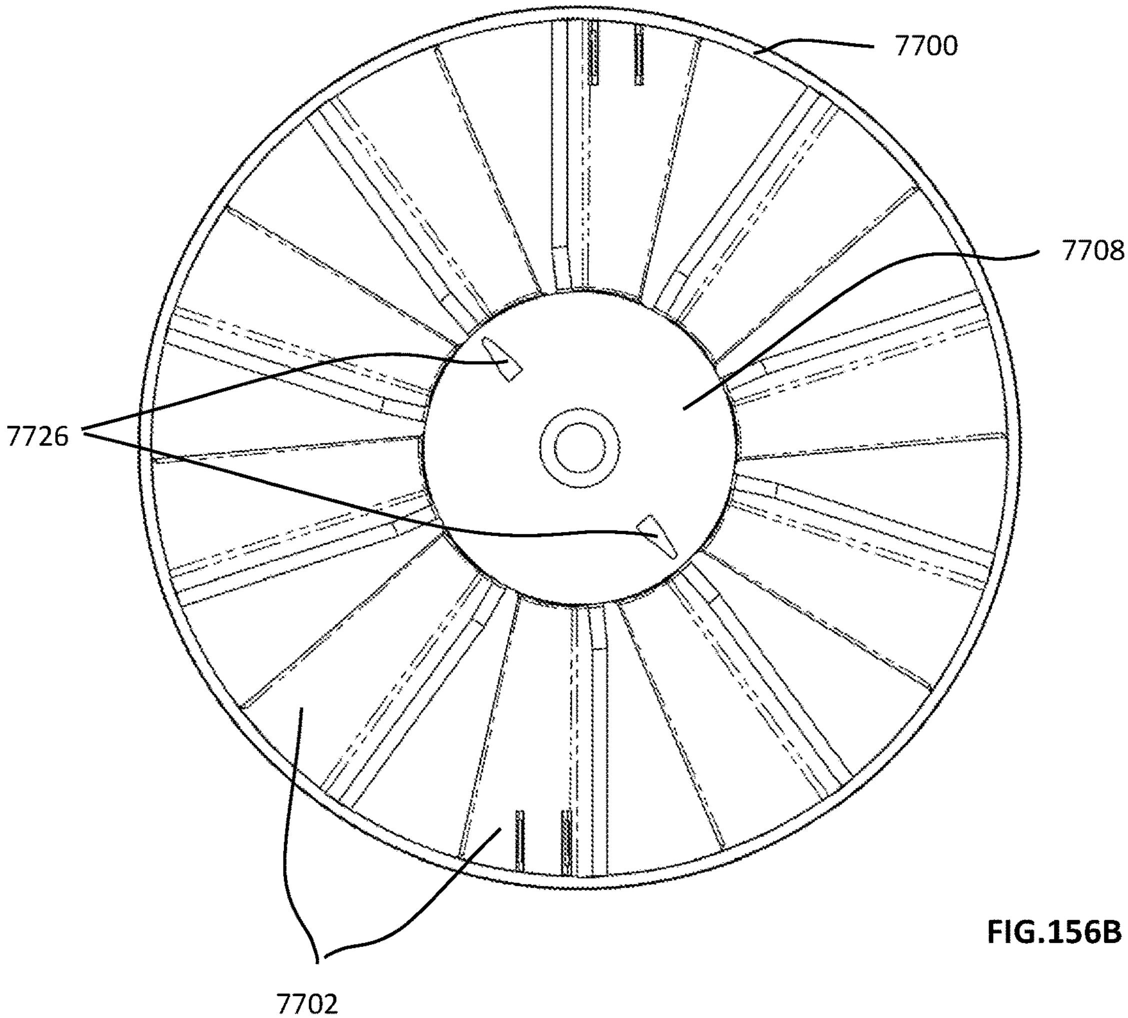
Figure 156C:
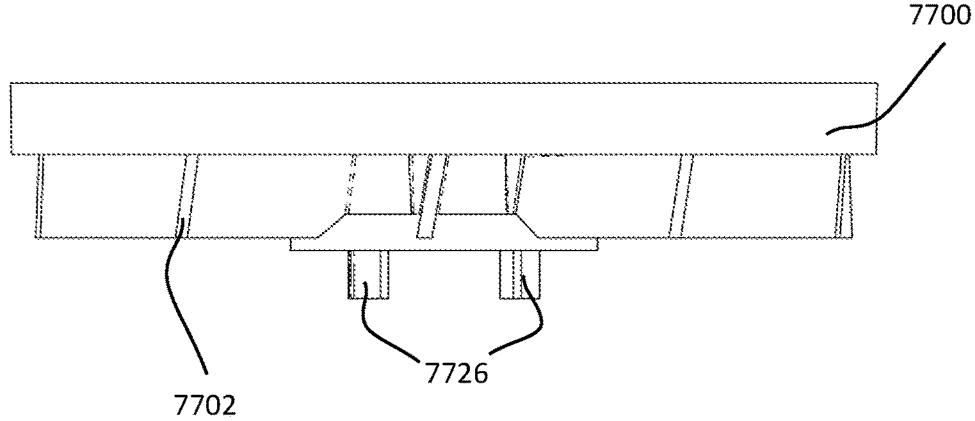
Figure 156D:
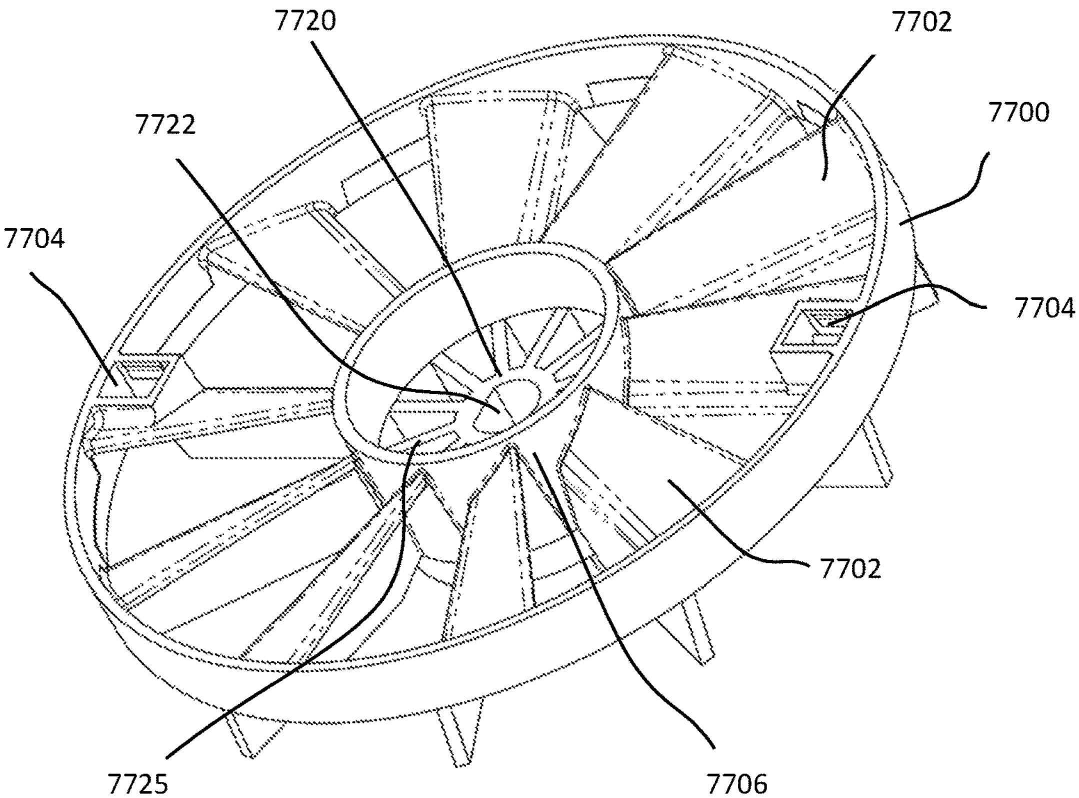
Figure 156E:
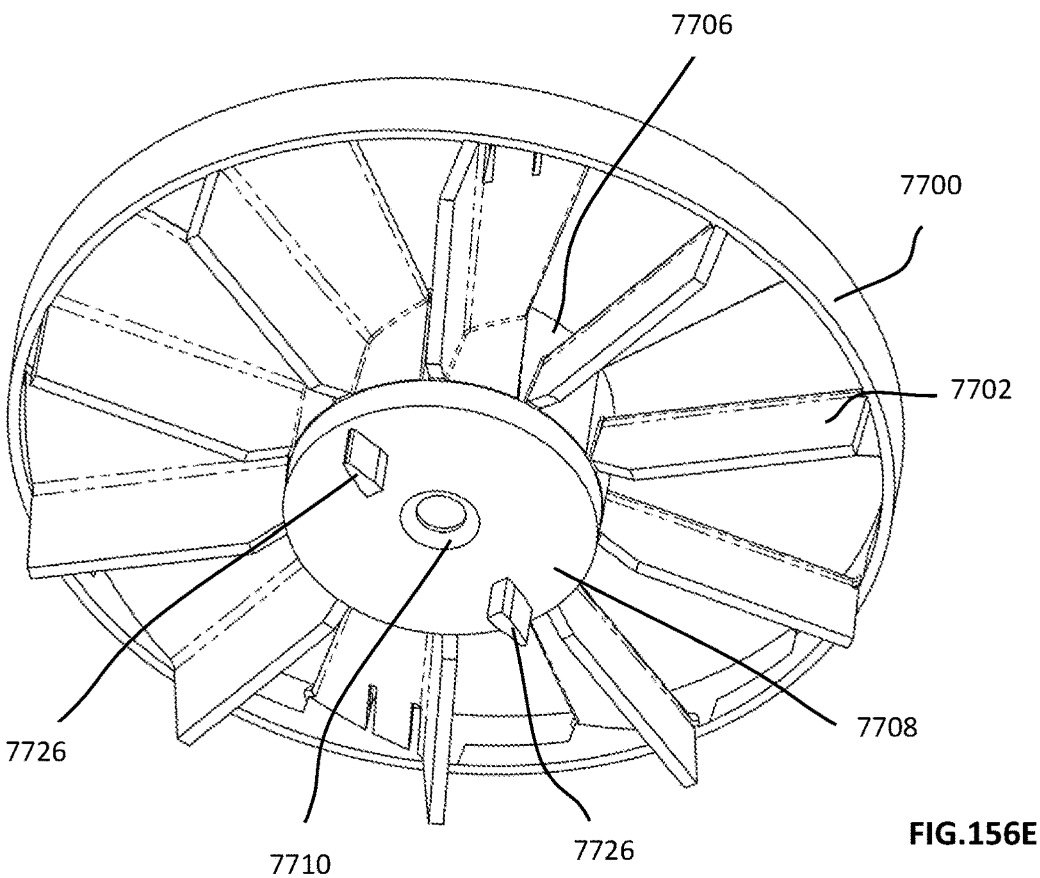
Figure 157A:
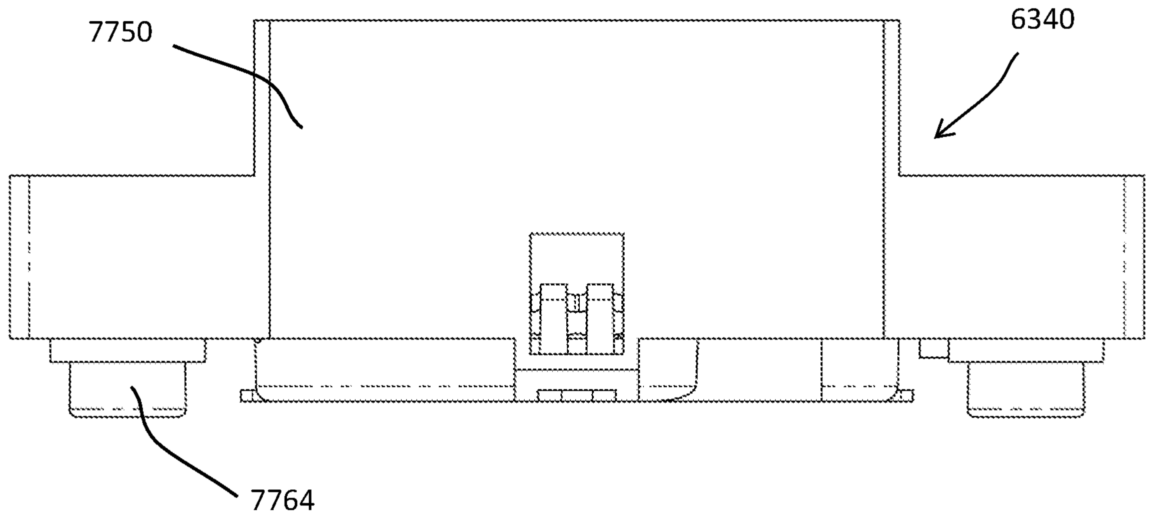
Figure 157B:
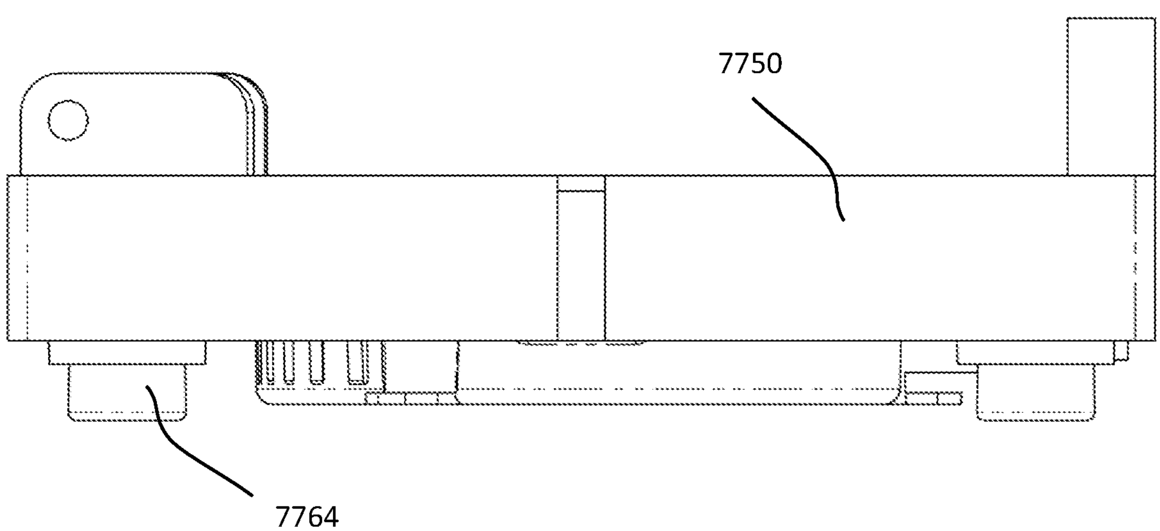
Figure 157C:
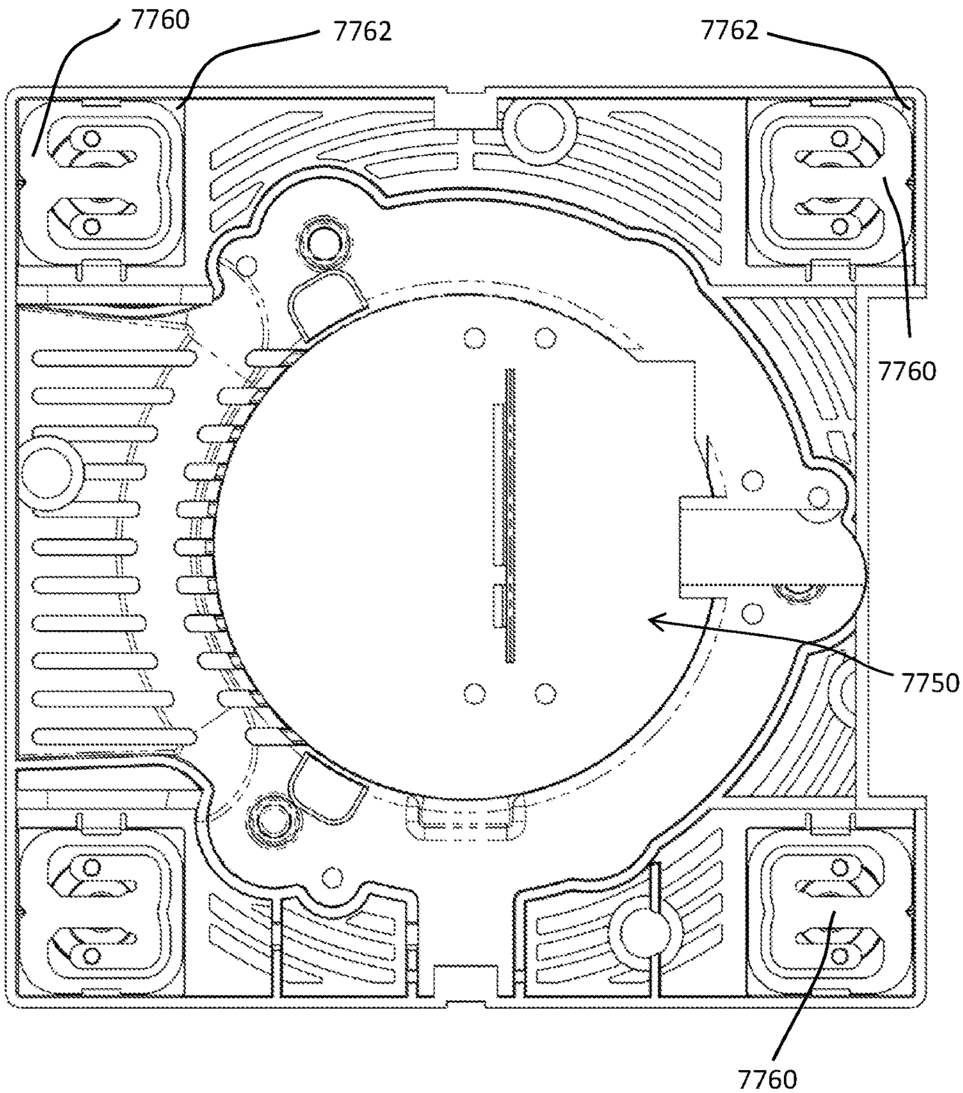
Figure 157D:
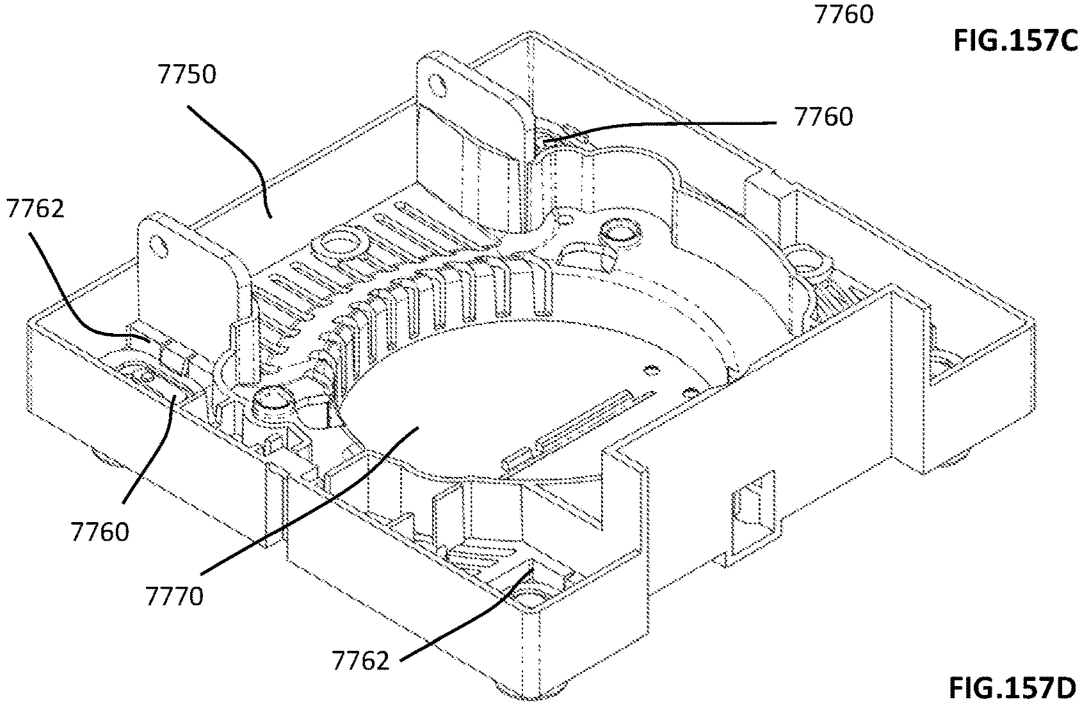
Figure 157E:
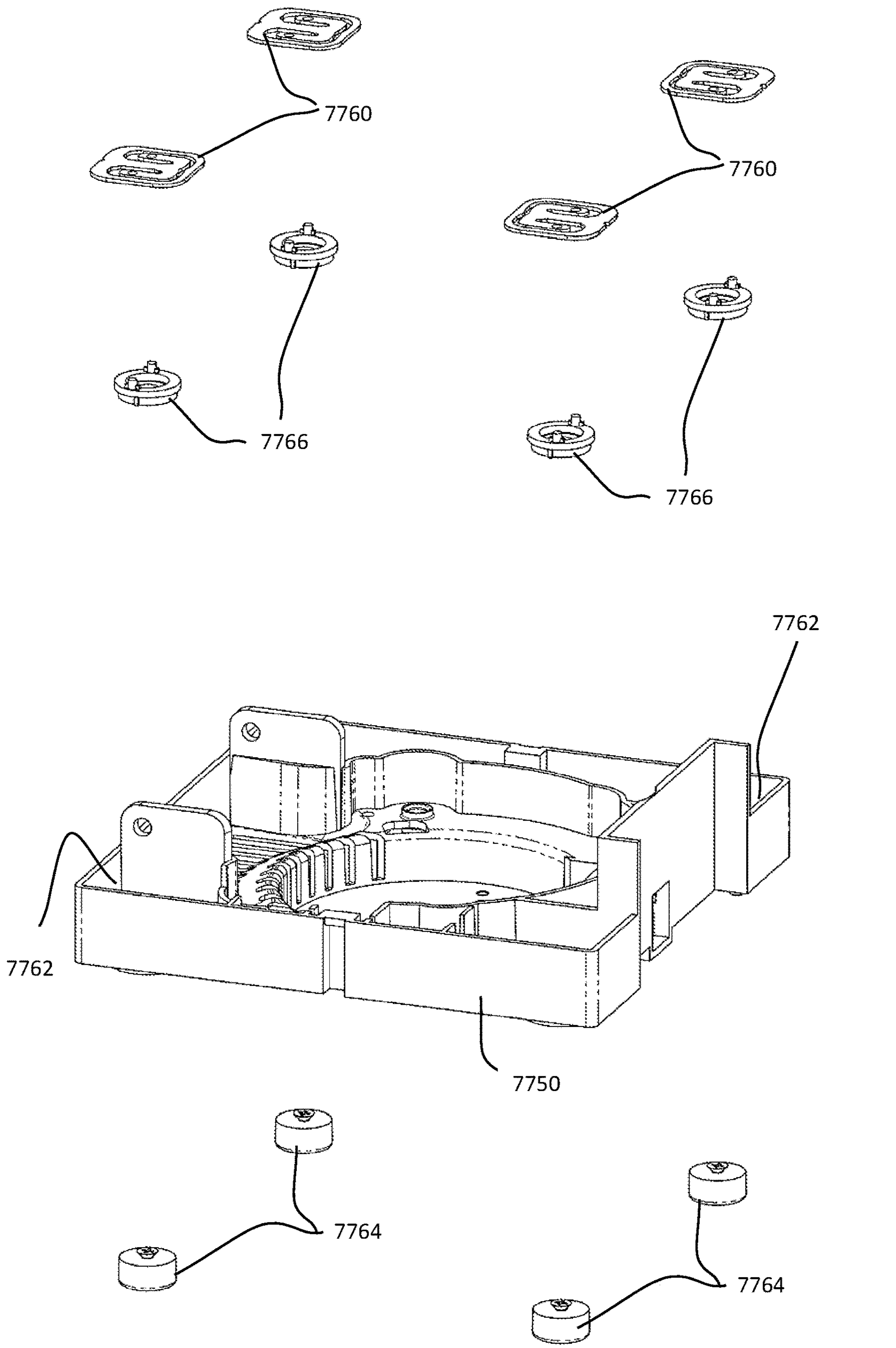
Figure 158A:
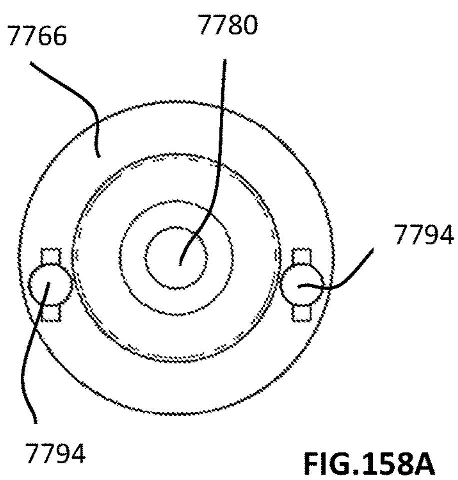
Figure 158B:
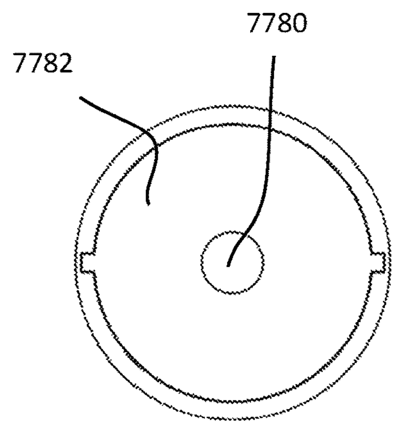
Figure 158C:
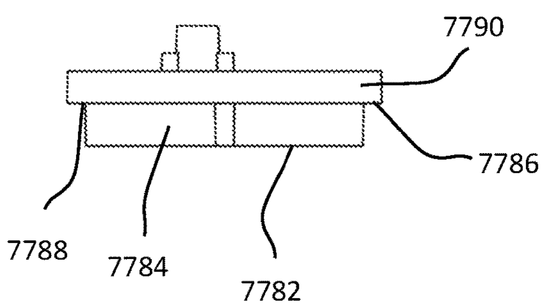
Figure 158D:
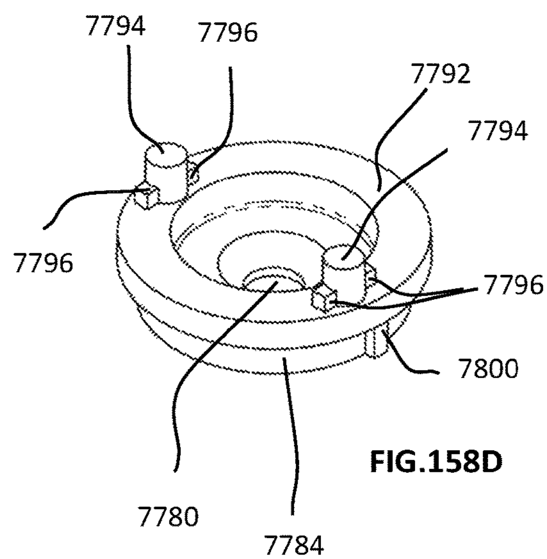
Figure 159A:
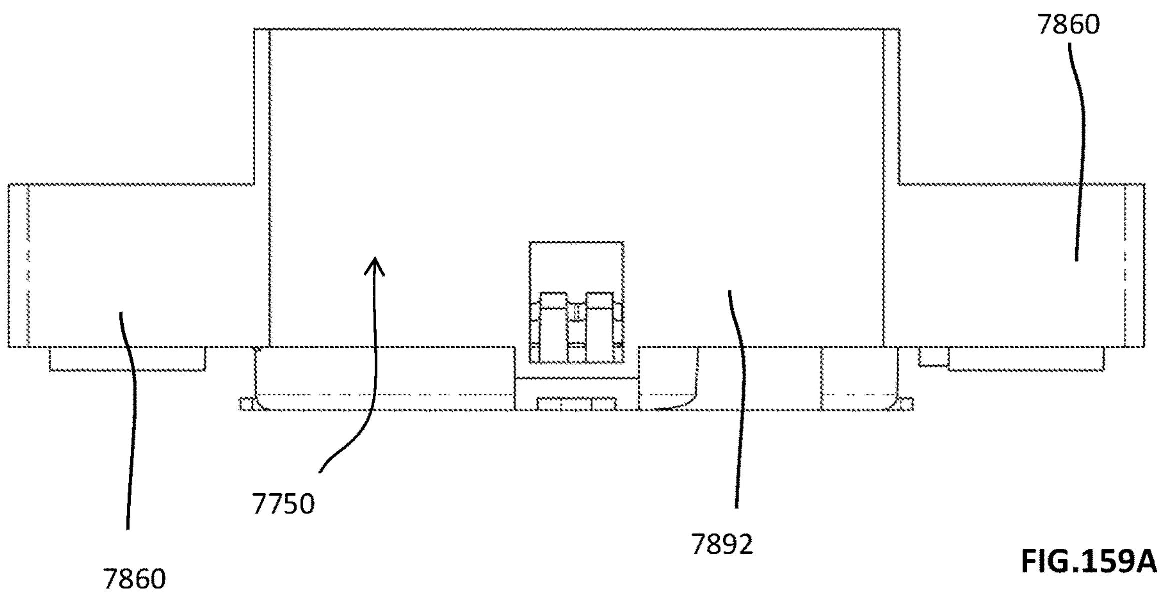
Figure 159B:
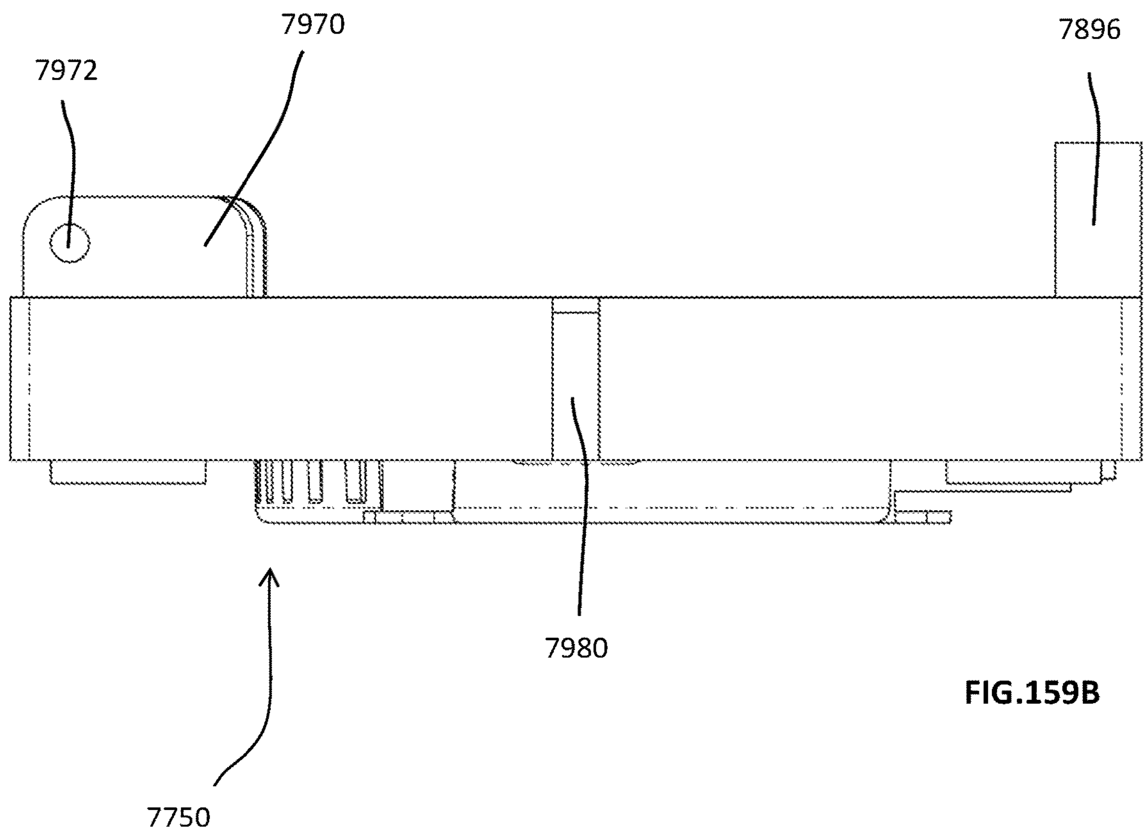
Figure 159C:
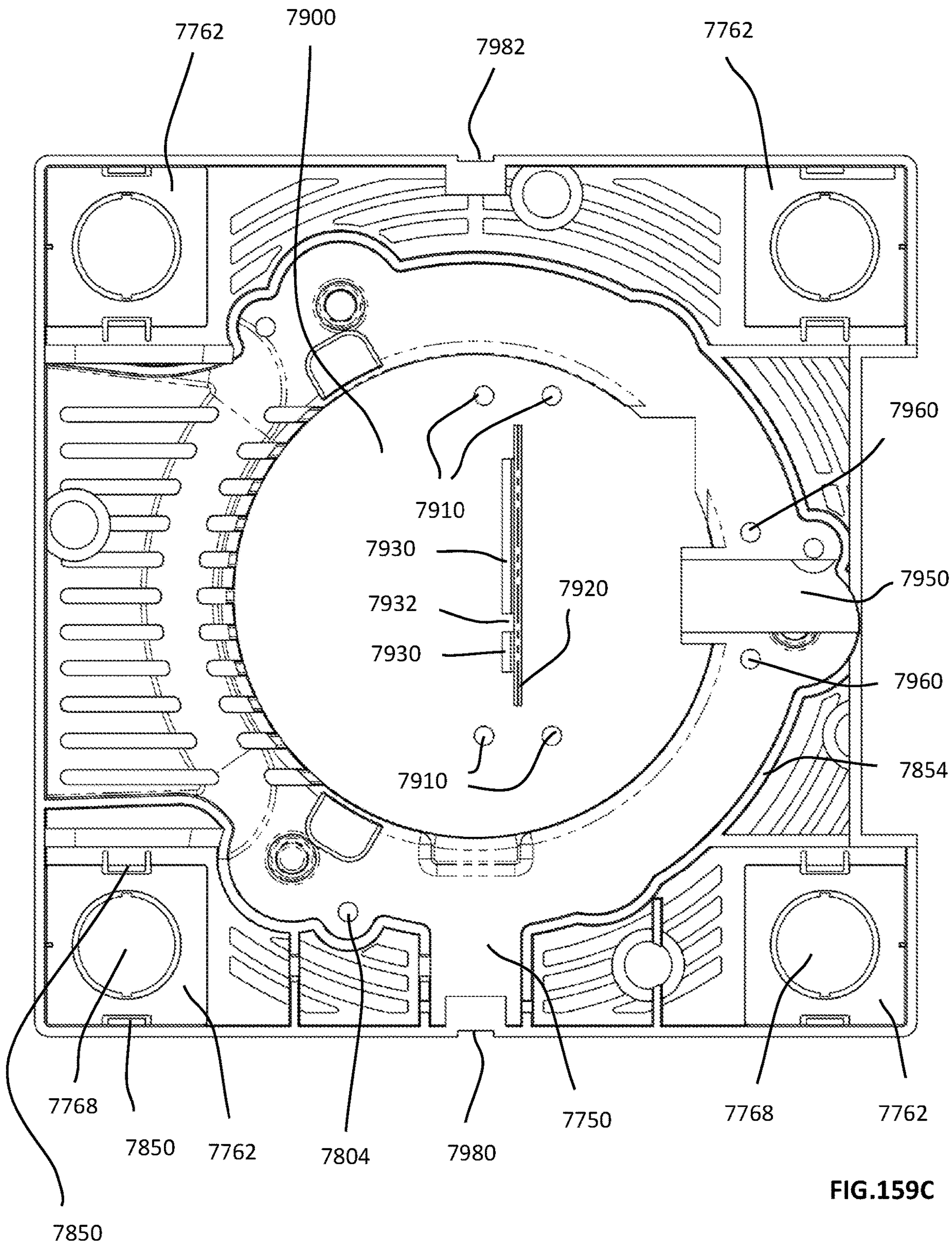
Figure 159D:
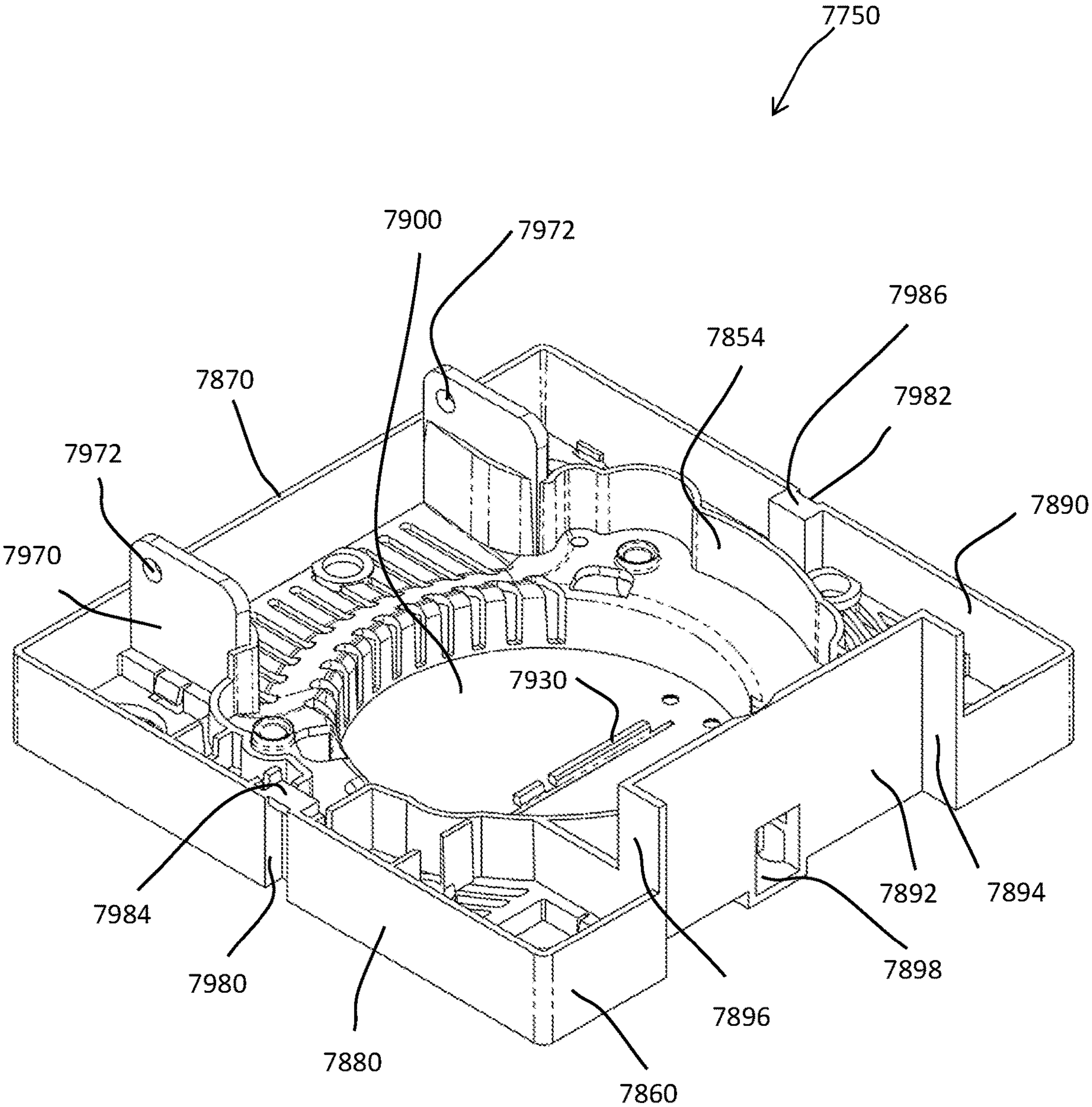
Figure 160A:
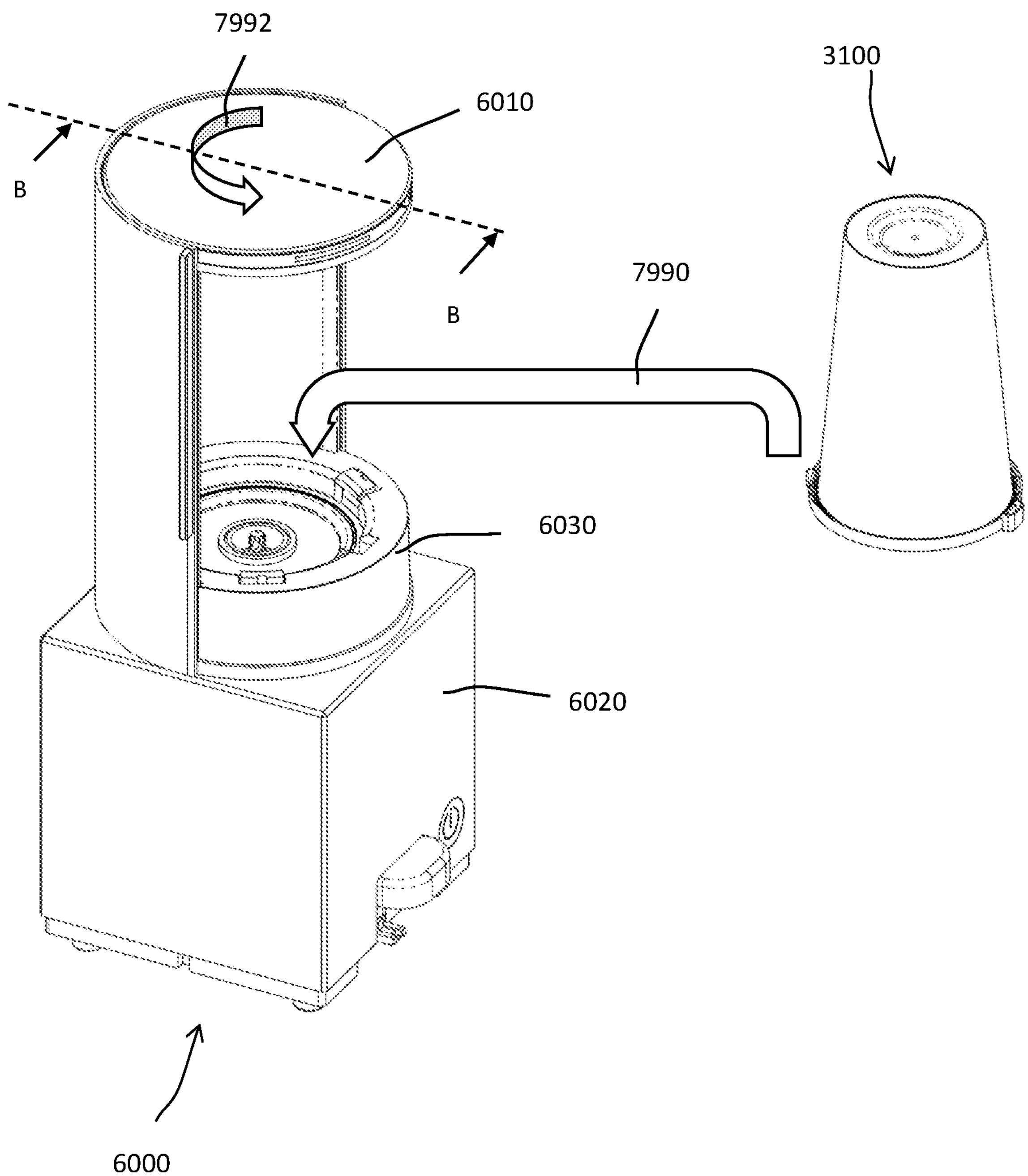
Figure 160B:
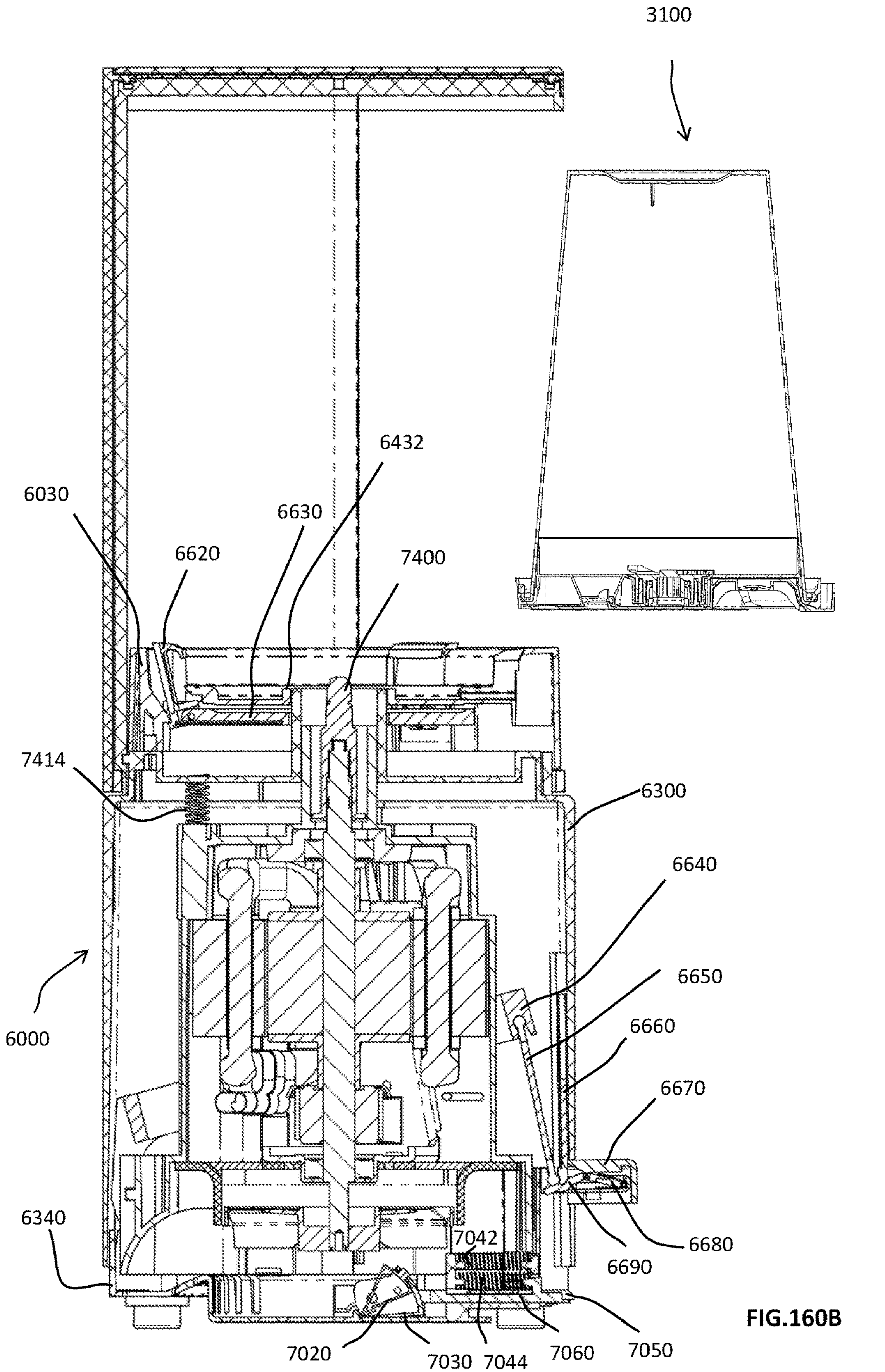
Figure 161A:
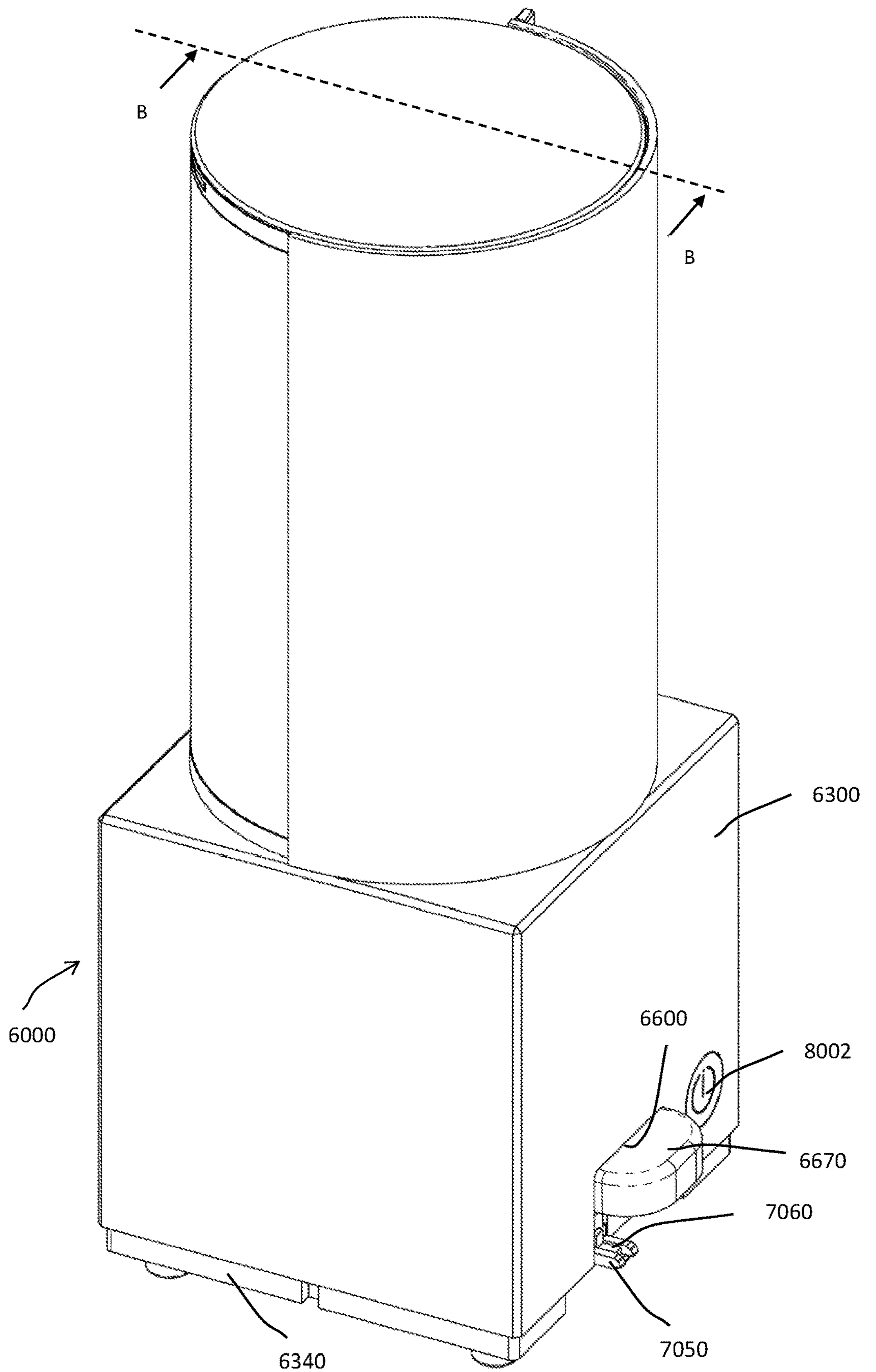
Figure 161B:
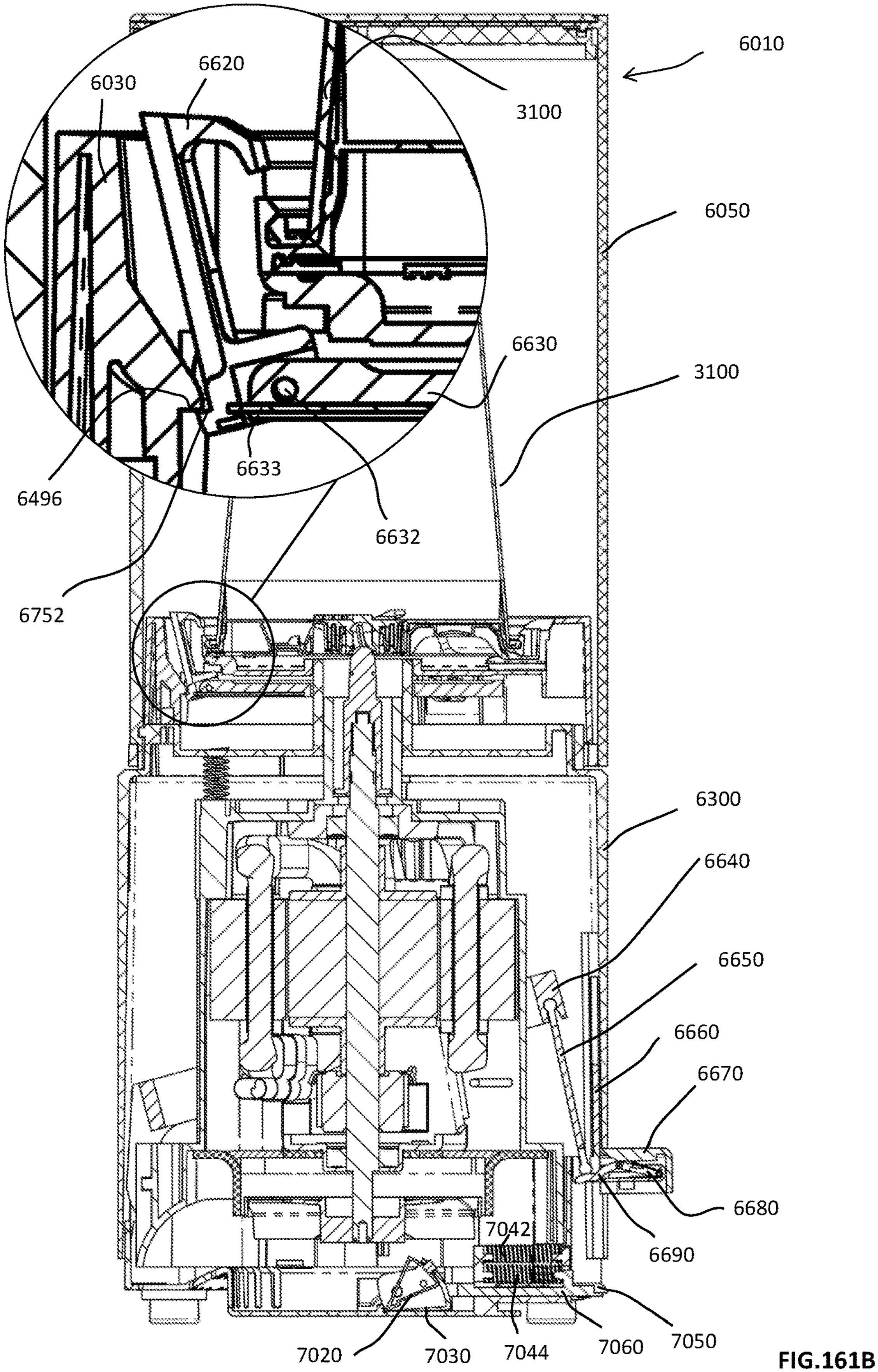
Figure 162A:
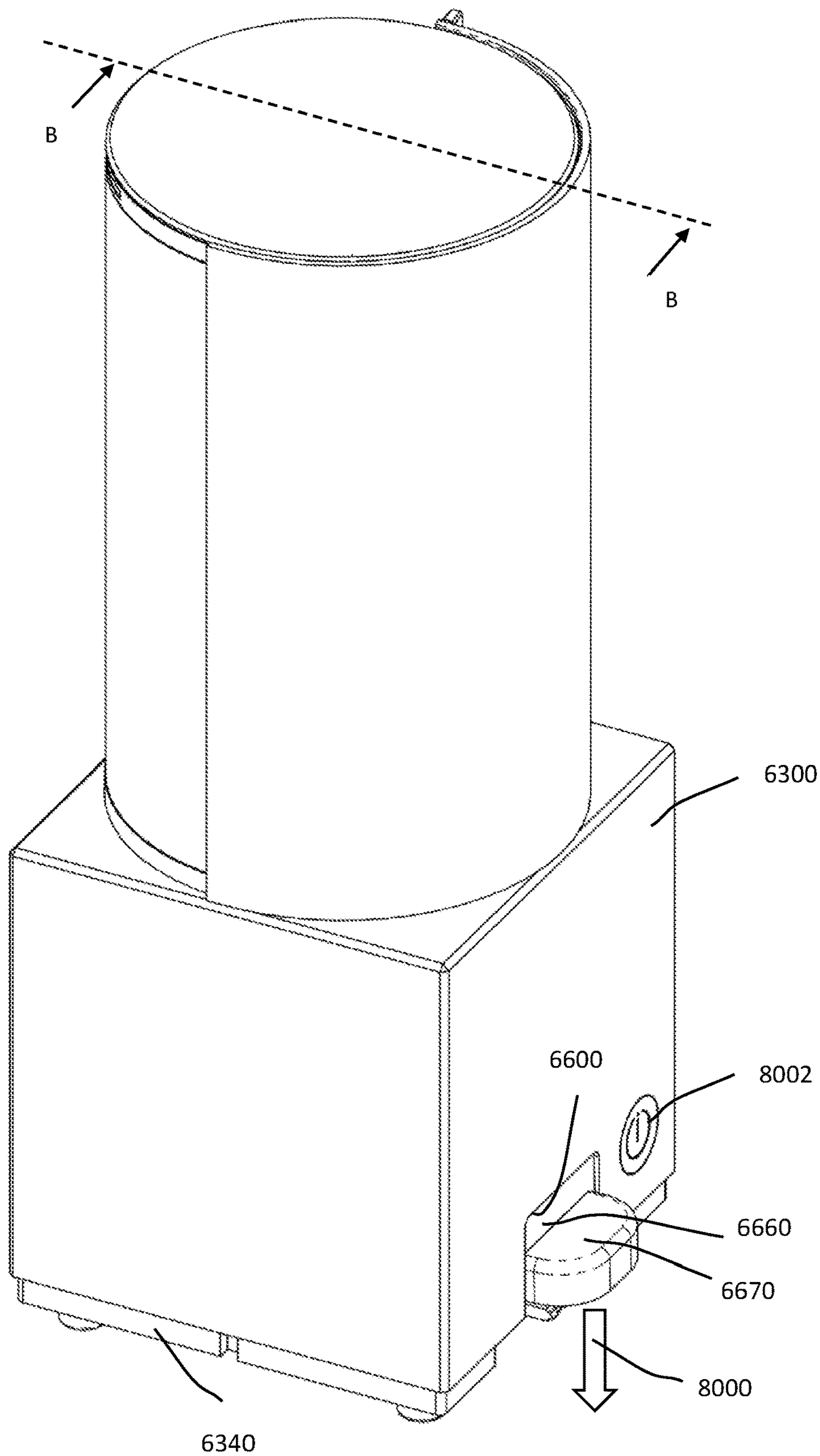
Figure 162B:
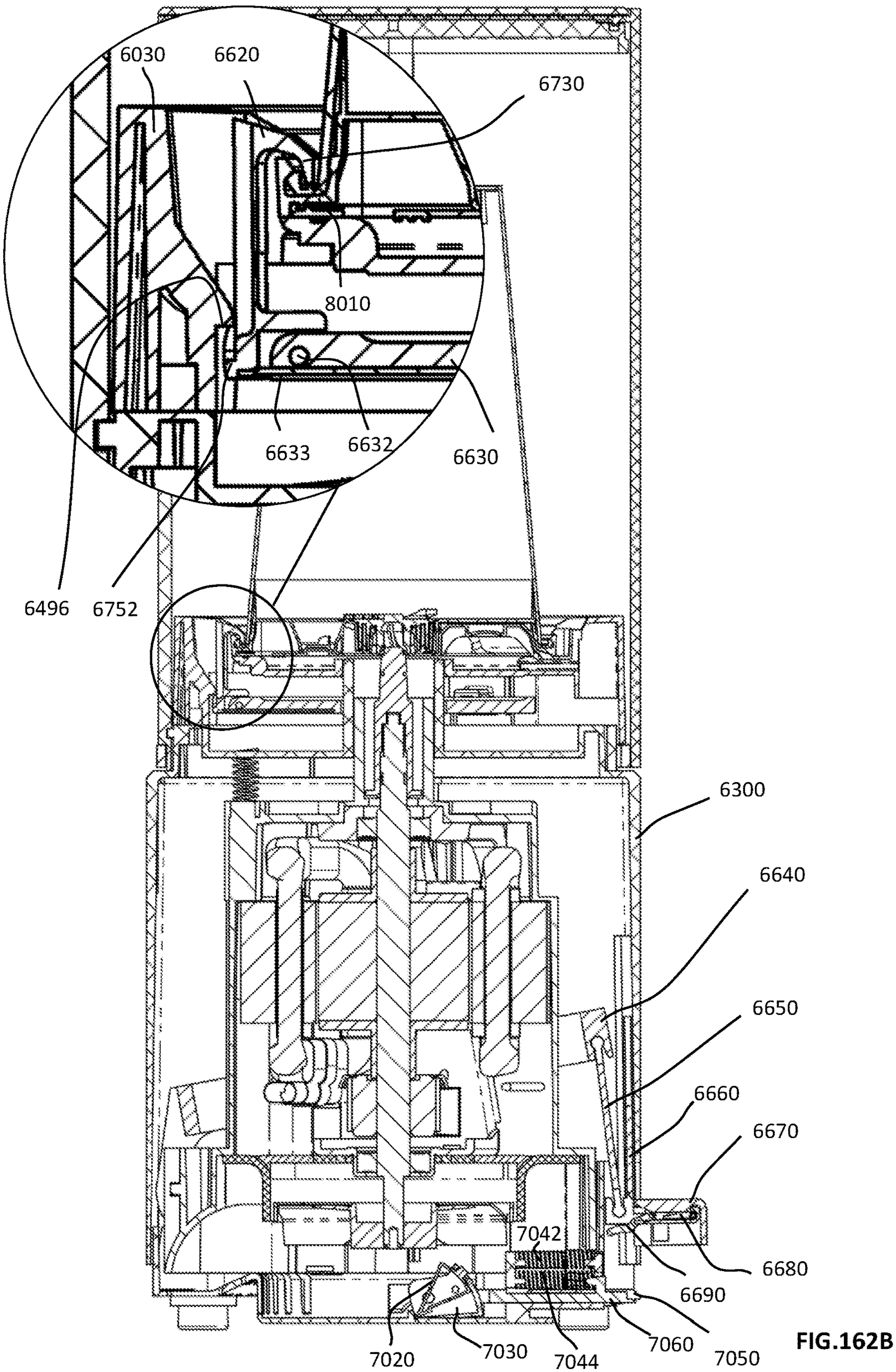
Figure 163A:
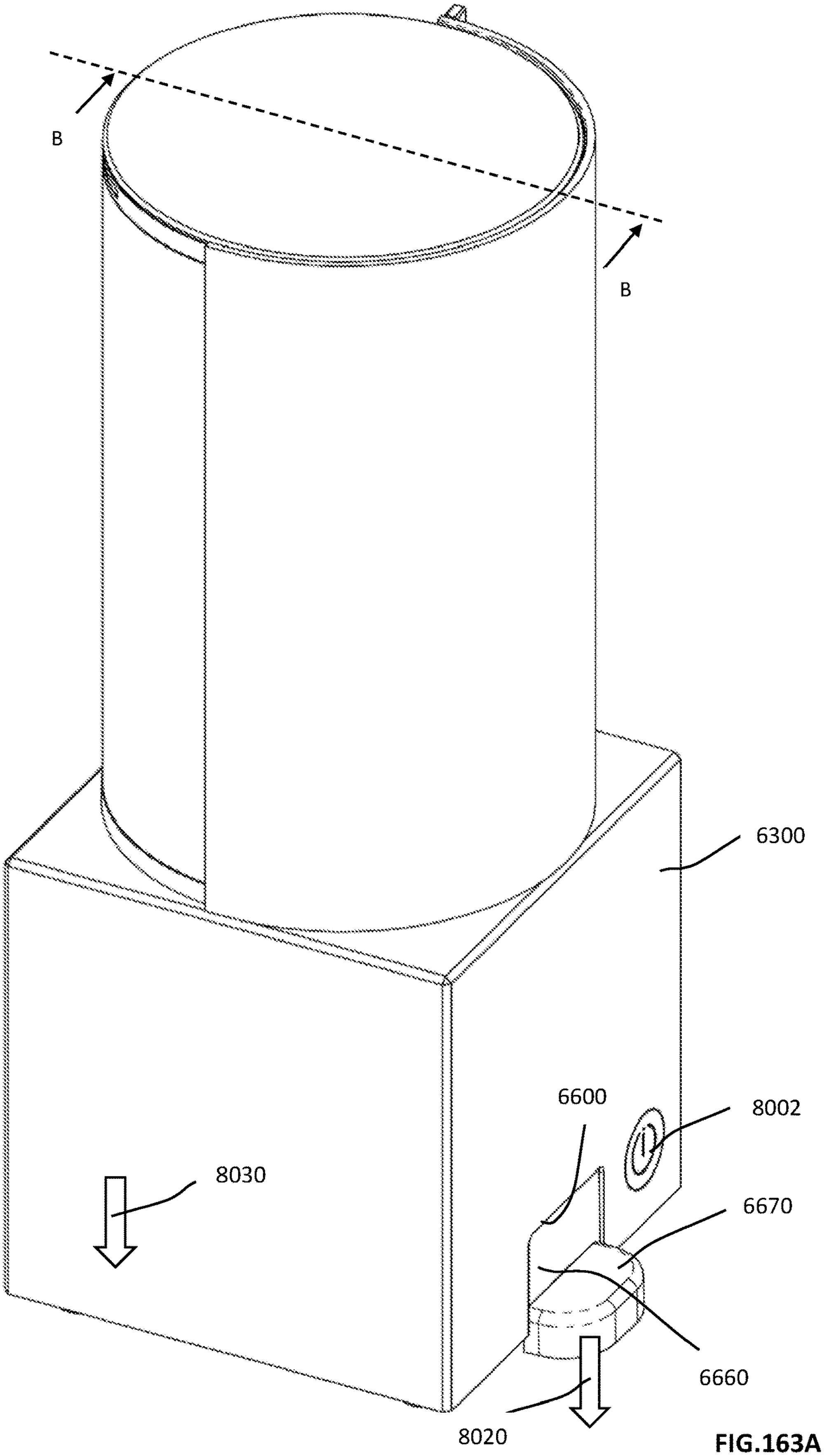
Figure 163B:
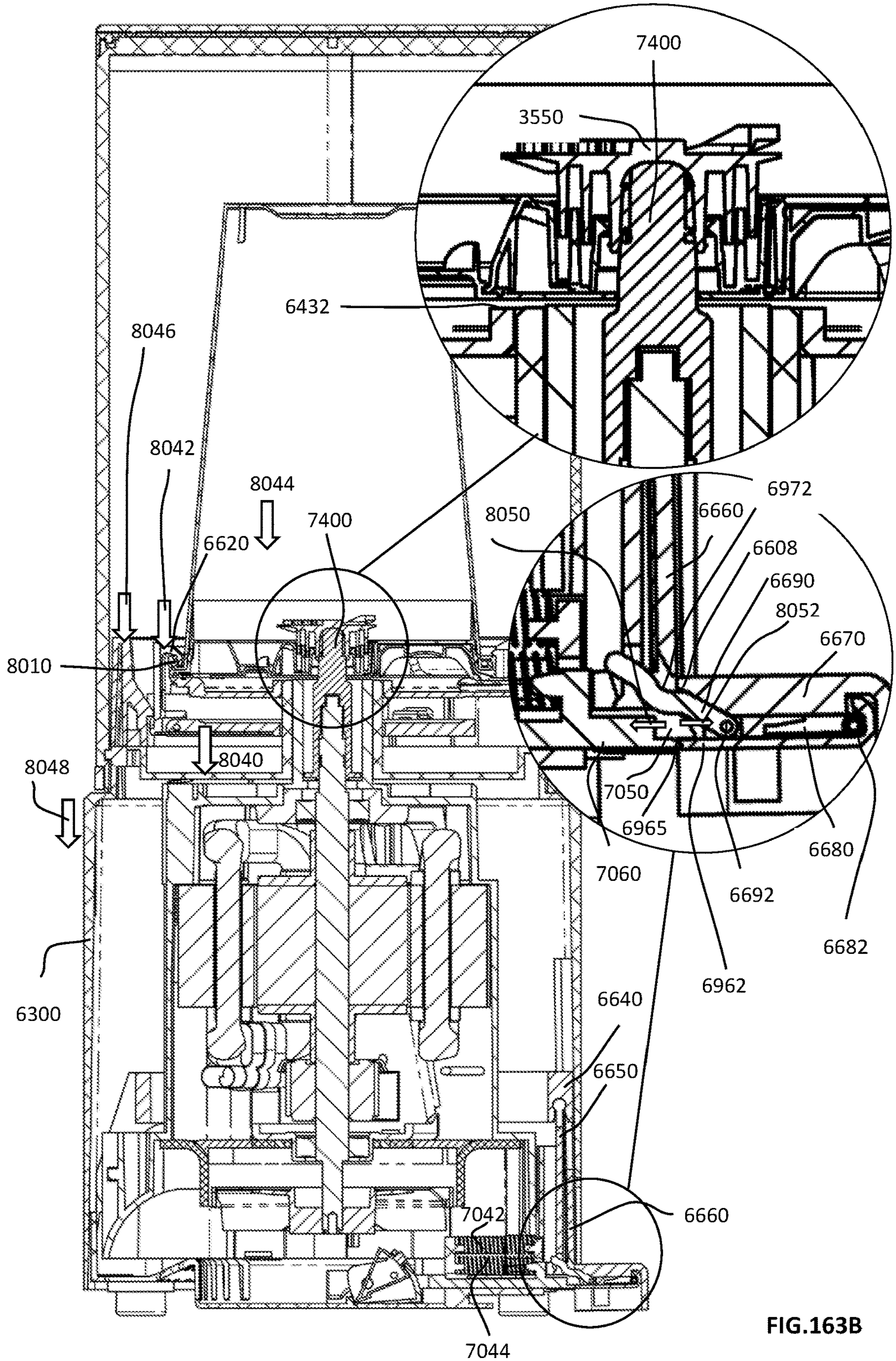
Figure 164A:
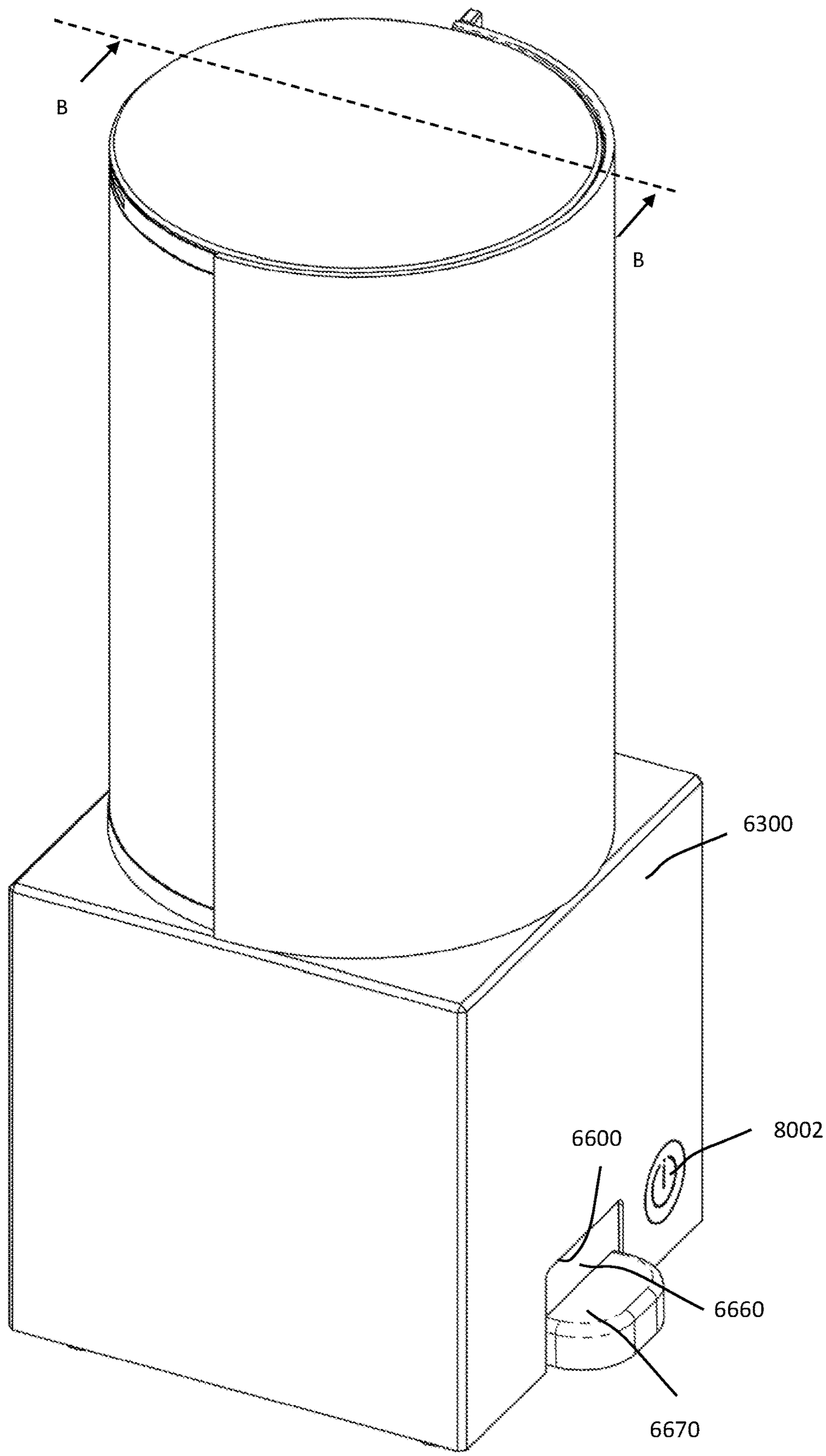
Figure 164B:
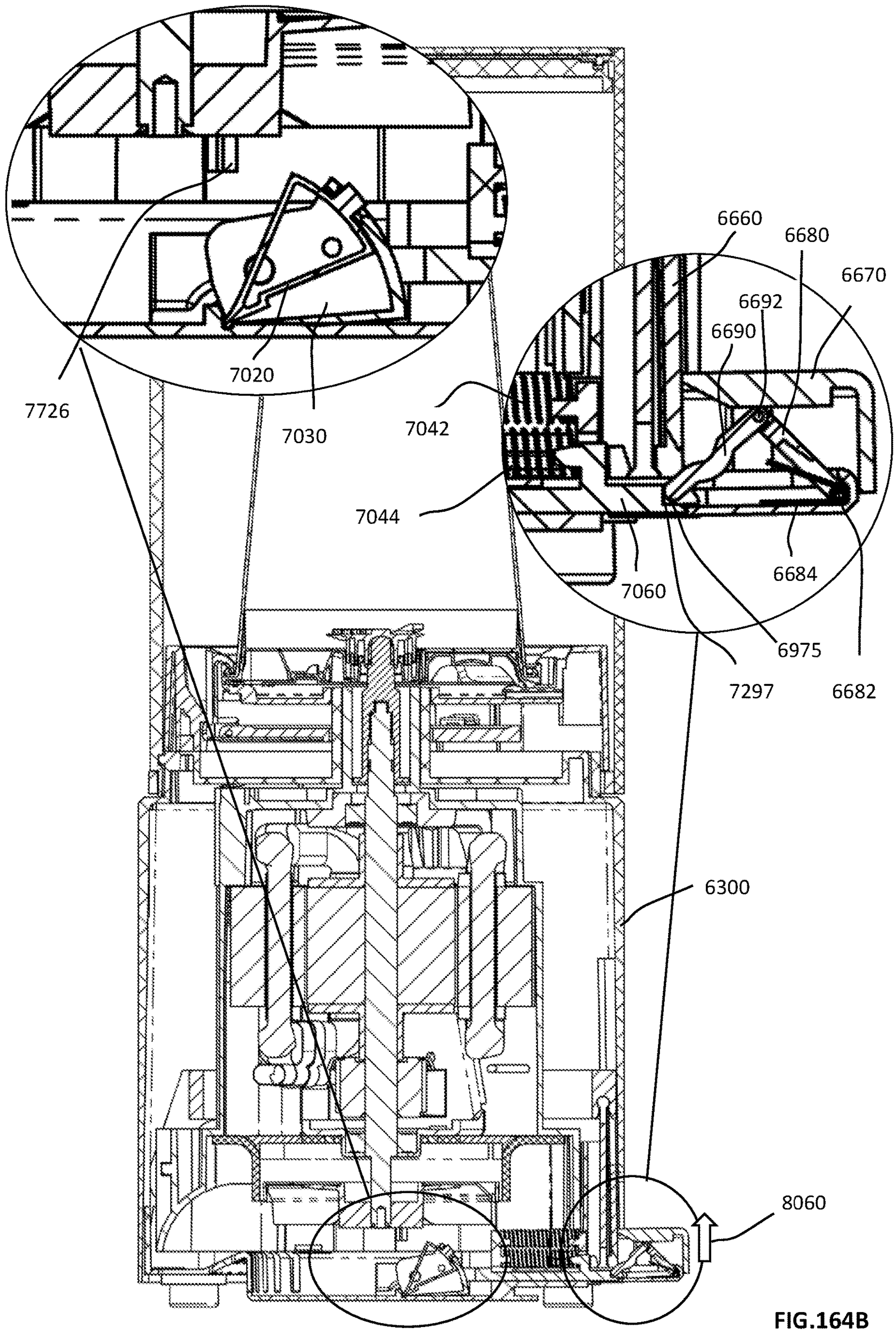
Figure 164C:
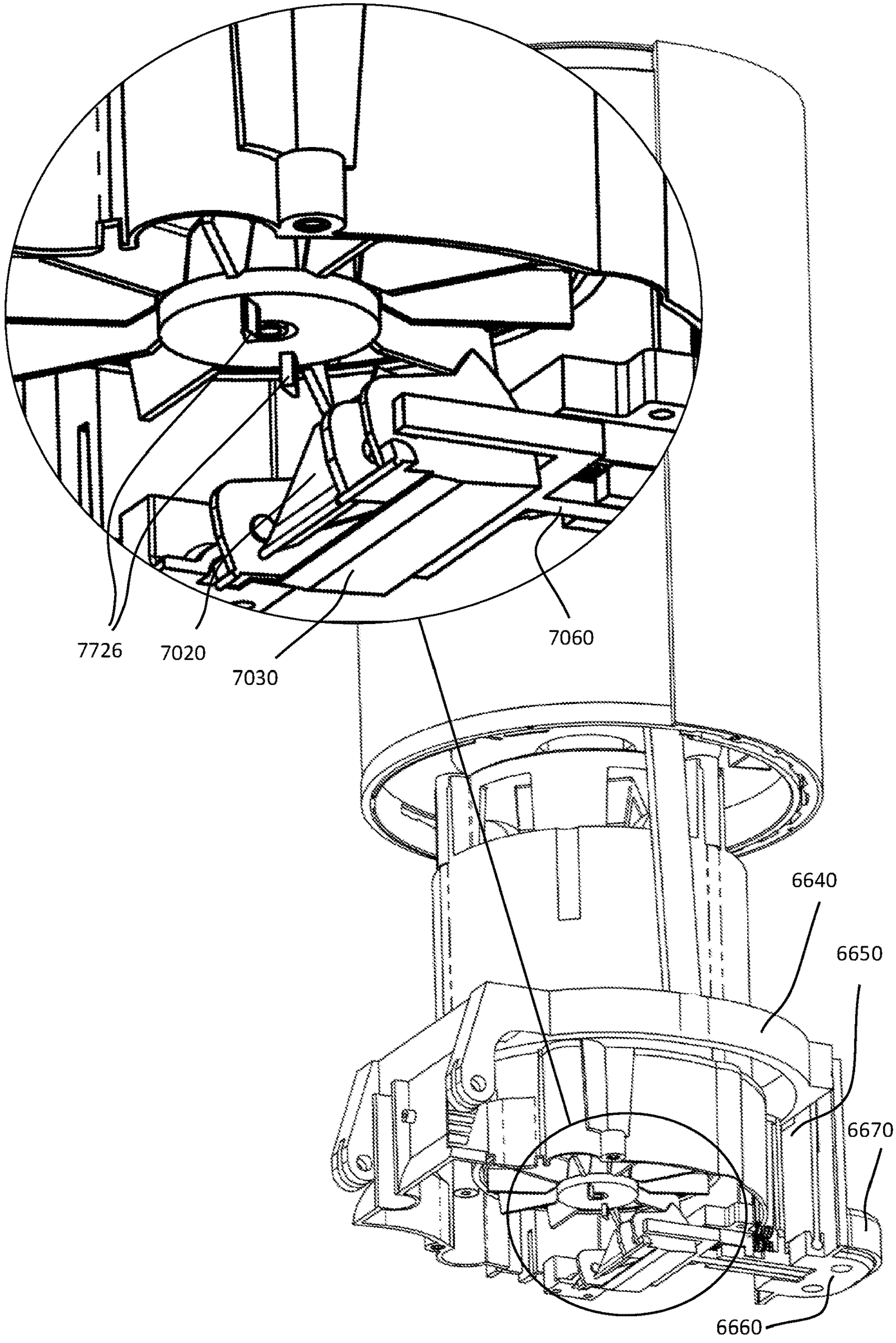
Figure 165A:
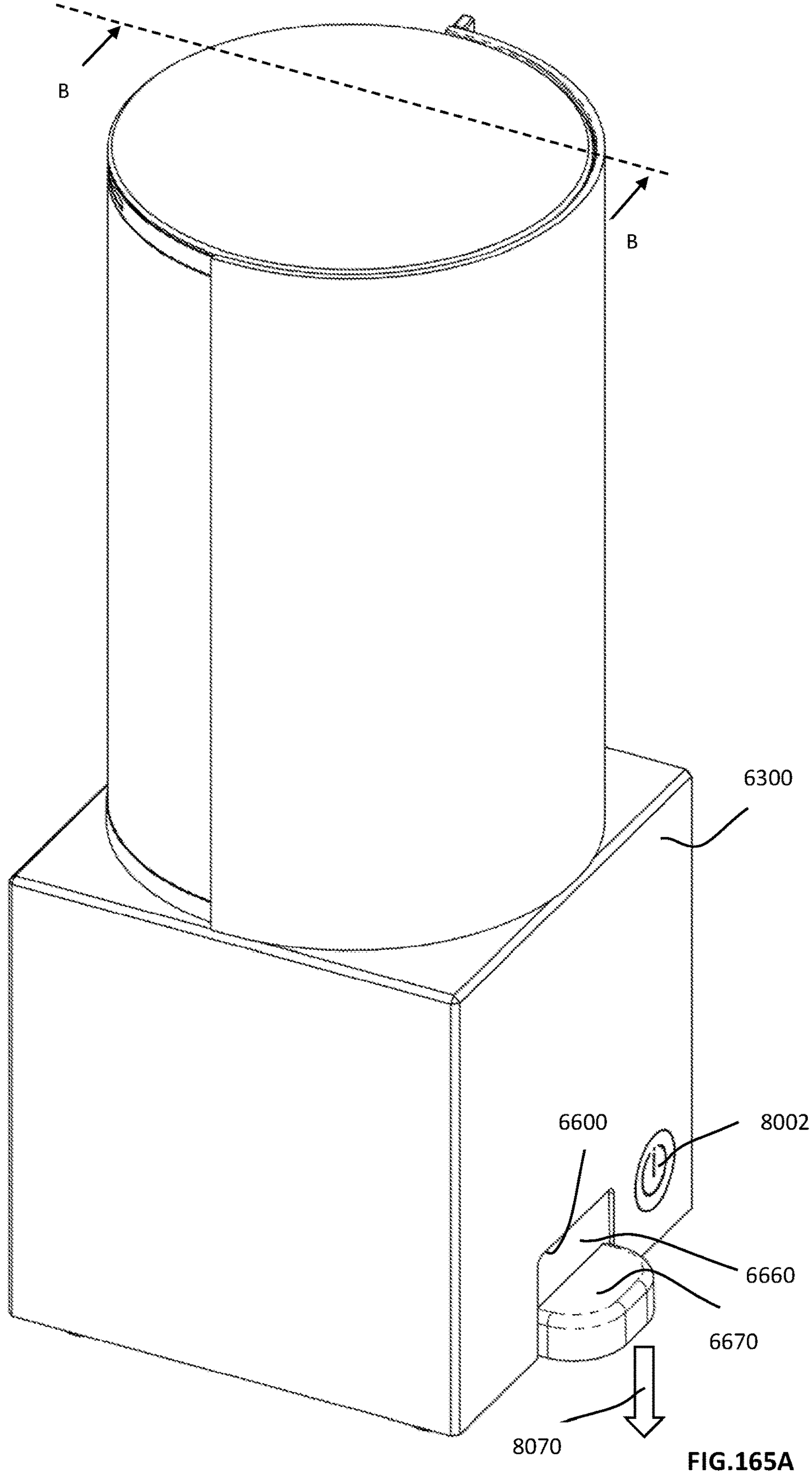
Figure 165B:
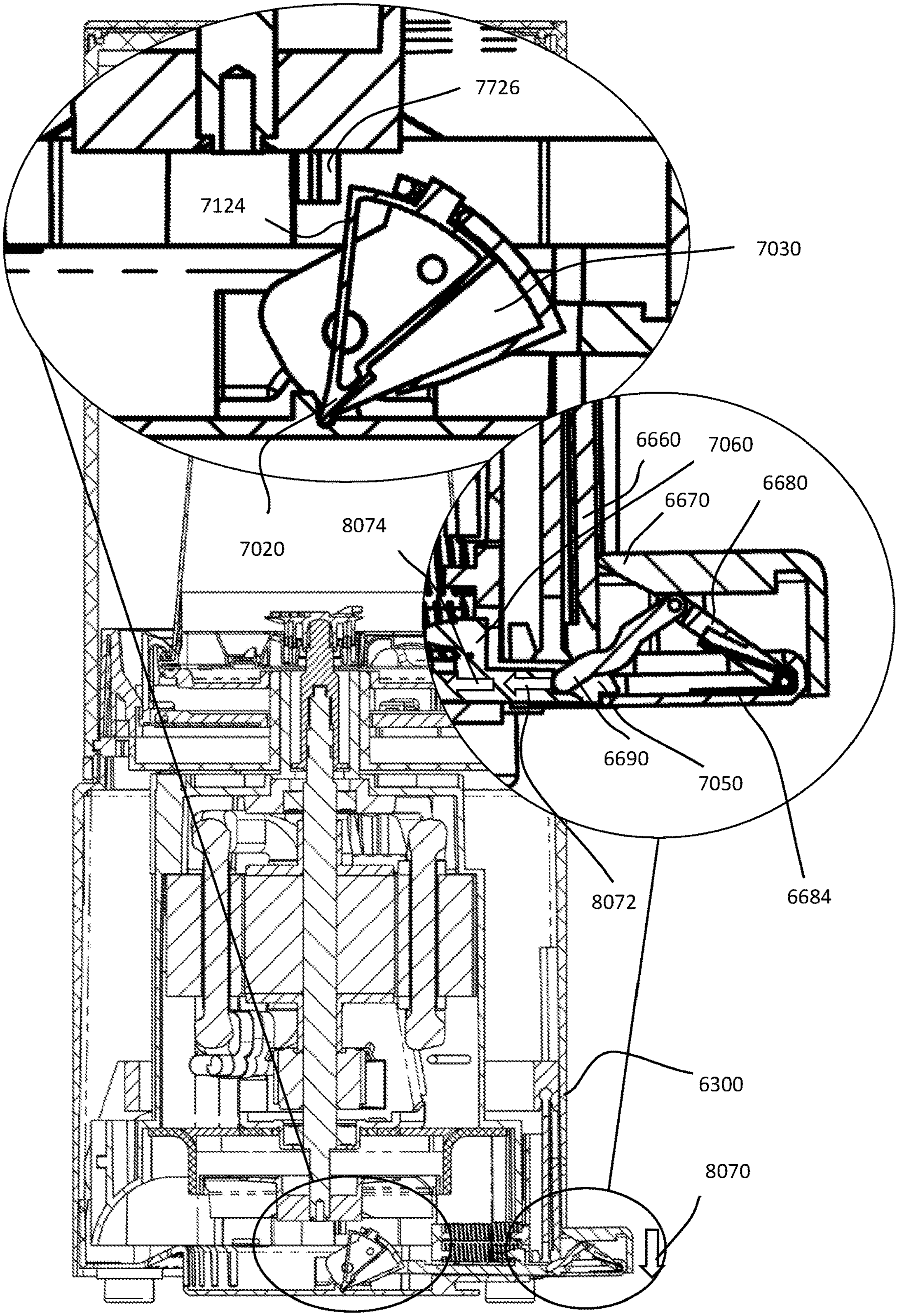
Figure 165C:
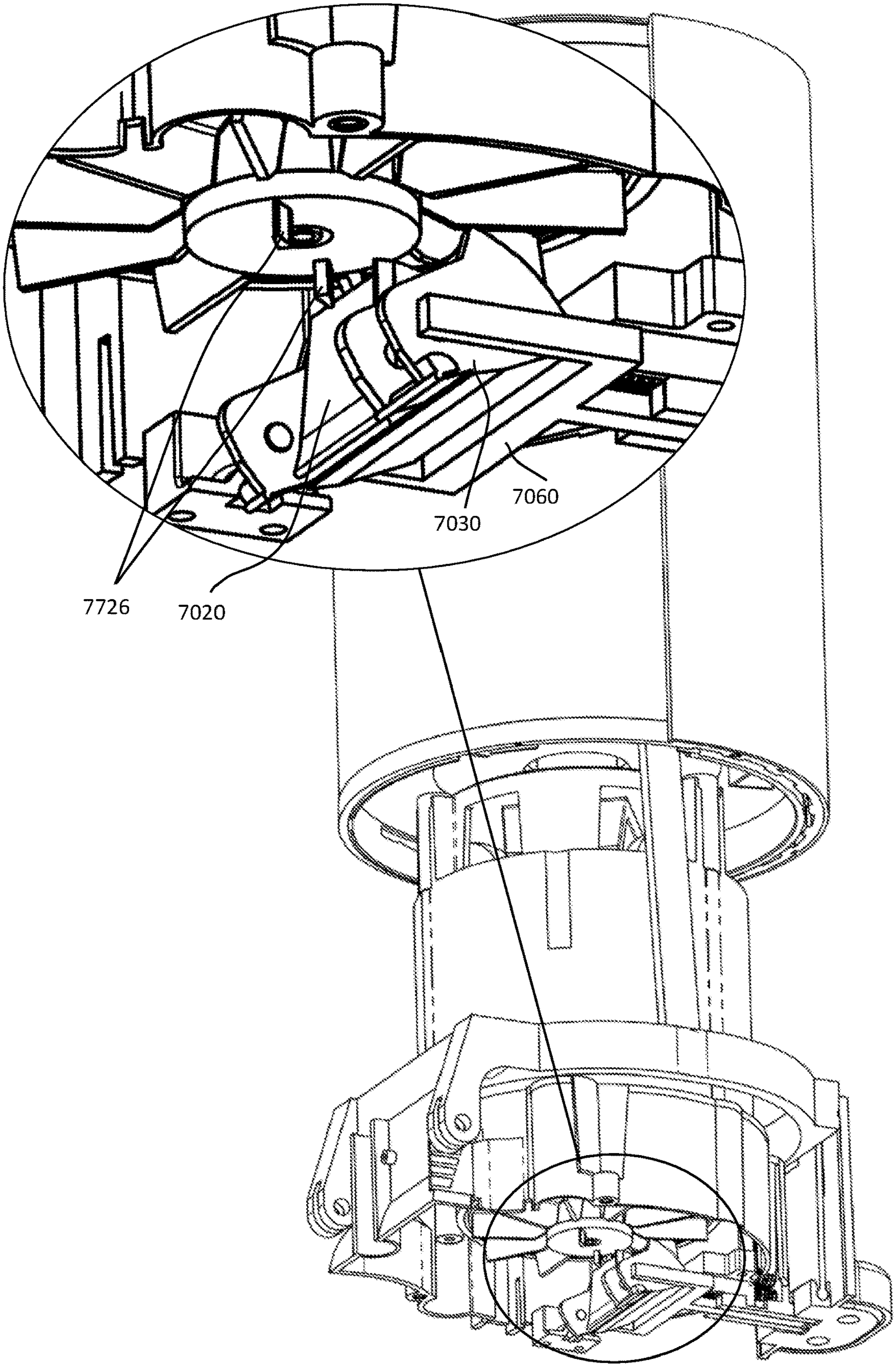
Figure 166A:
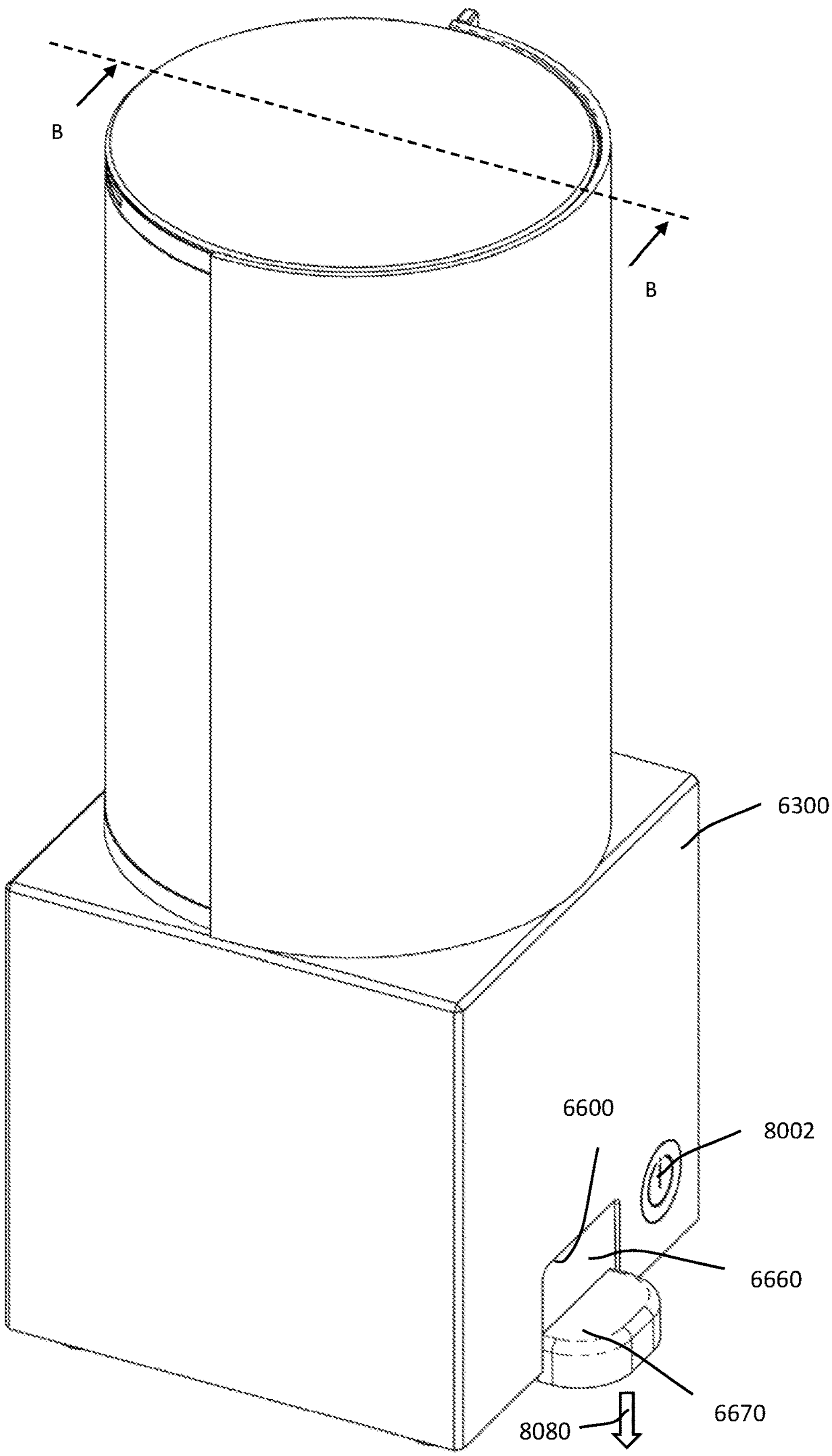
Figure 166B:
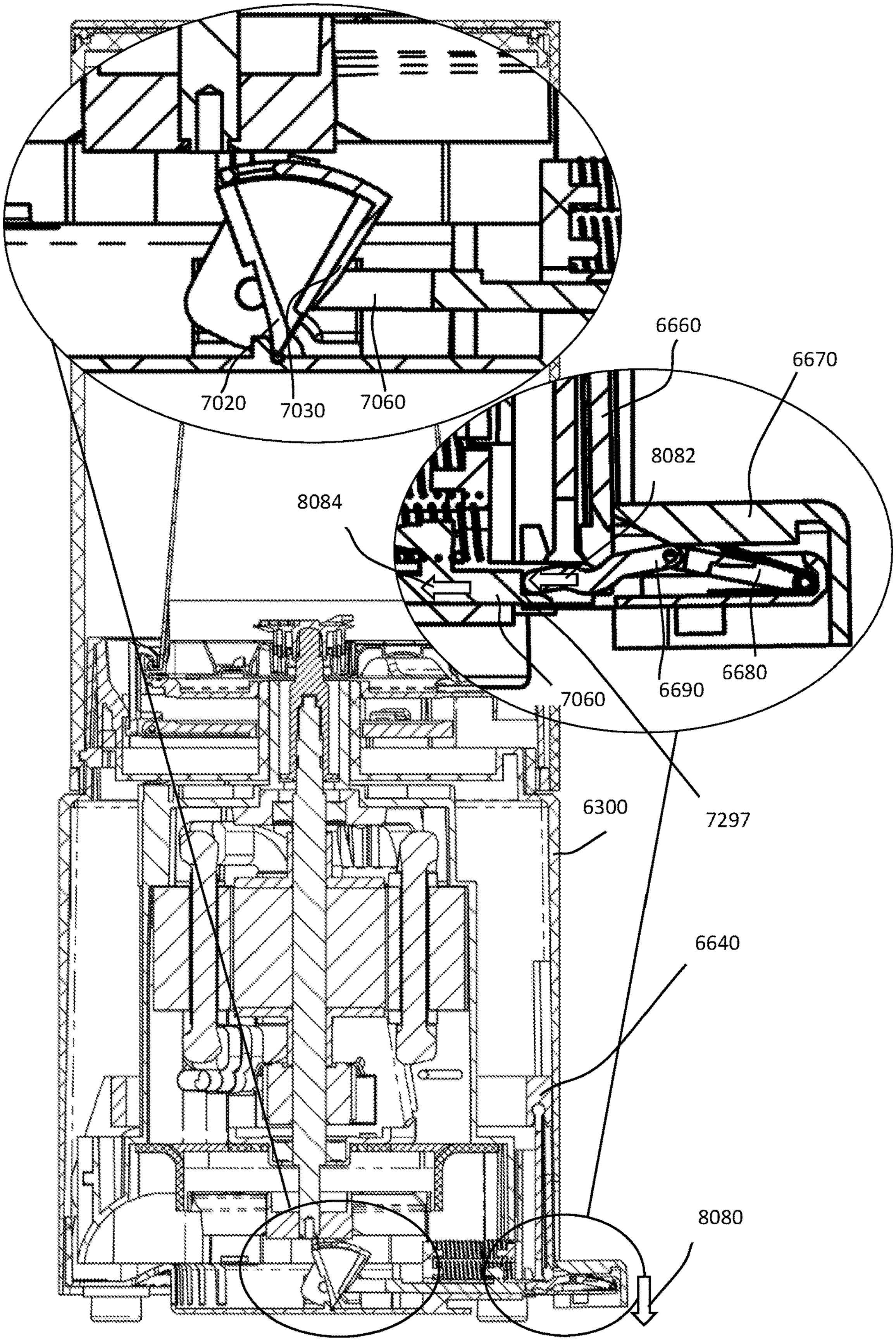
Figure 166C:
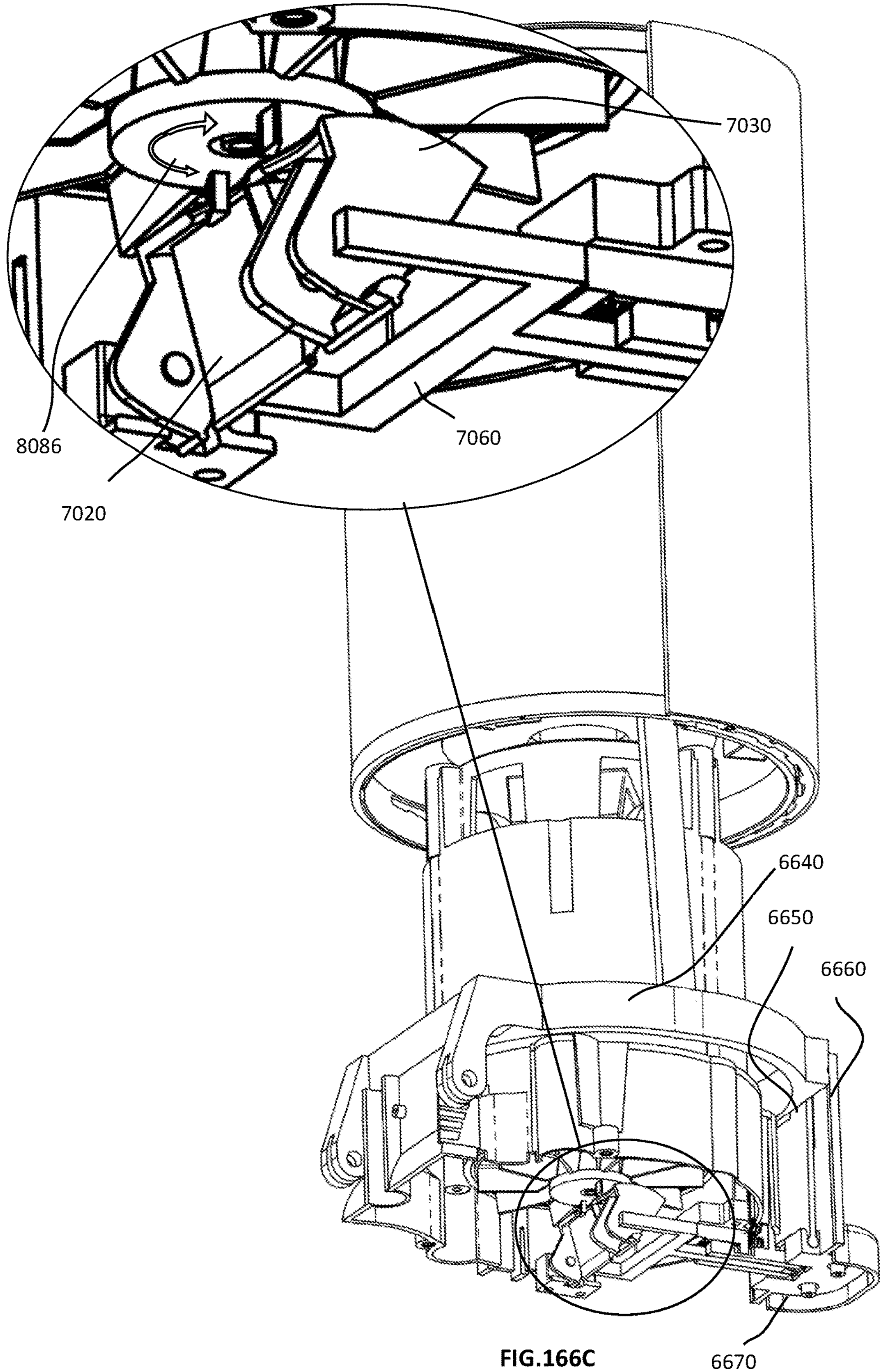
Figure 167A:
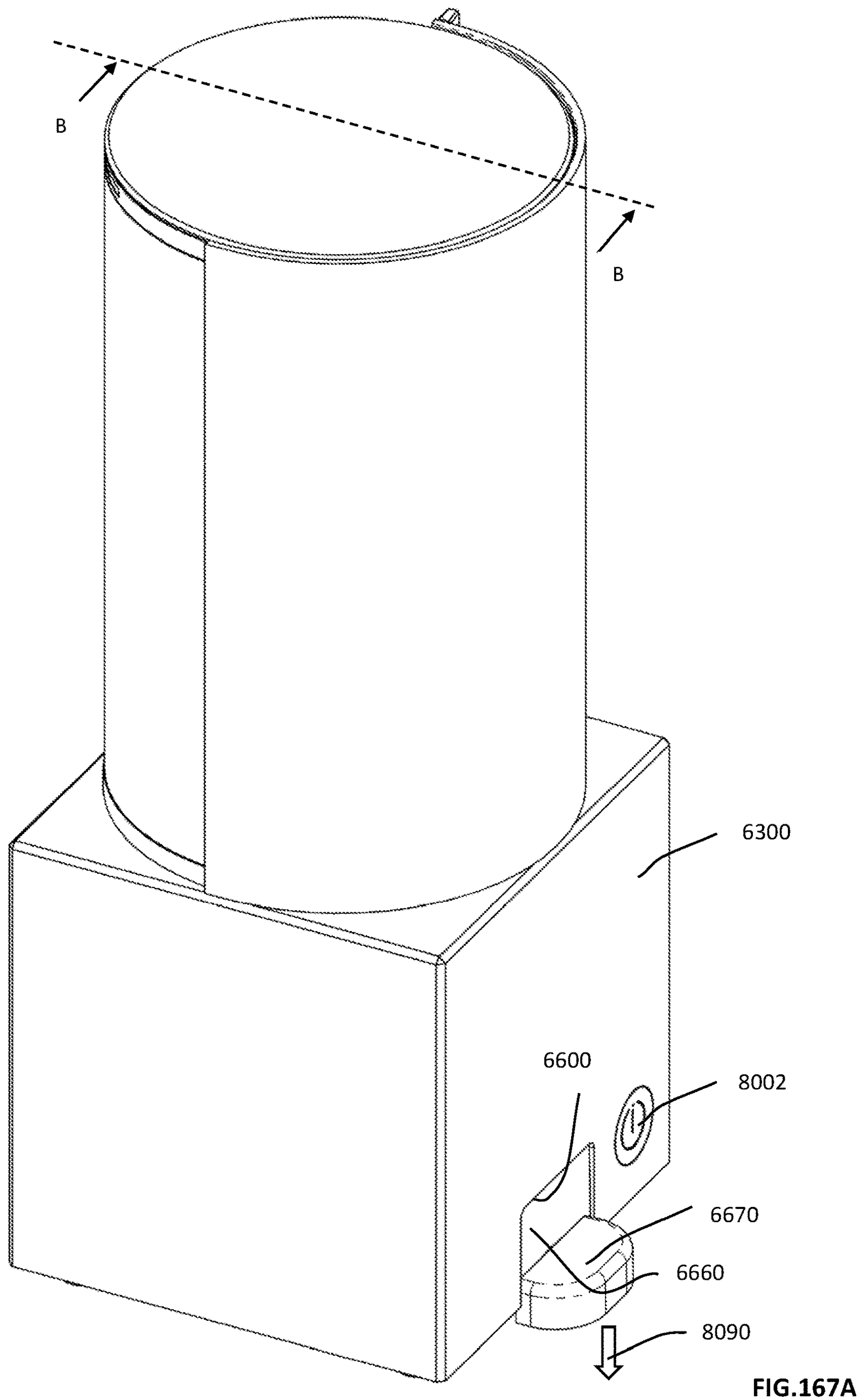
Figure 167B:
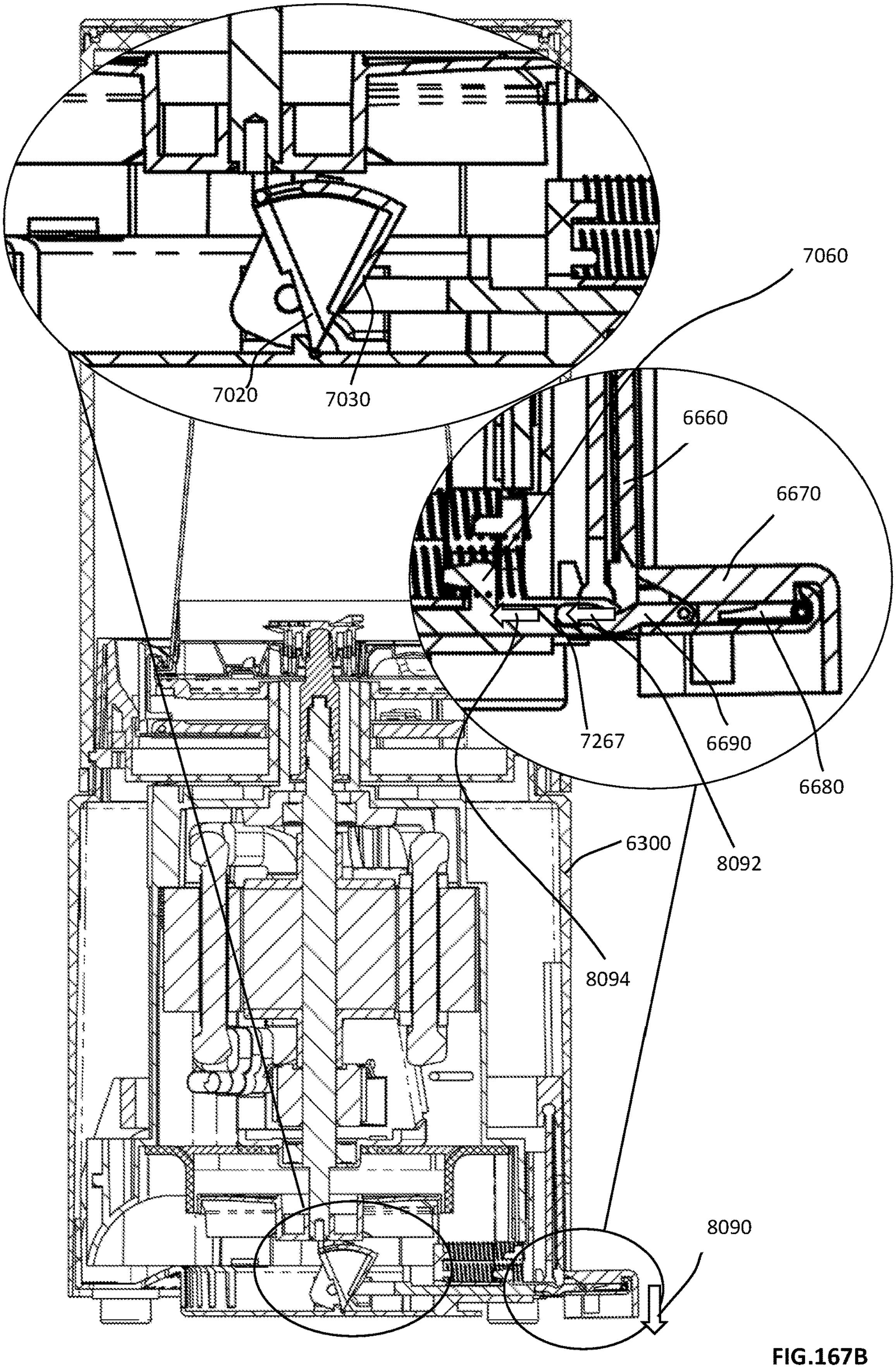
Figure 167C:
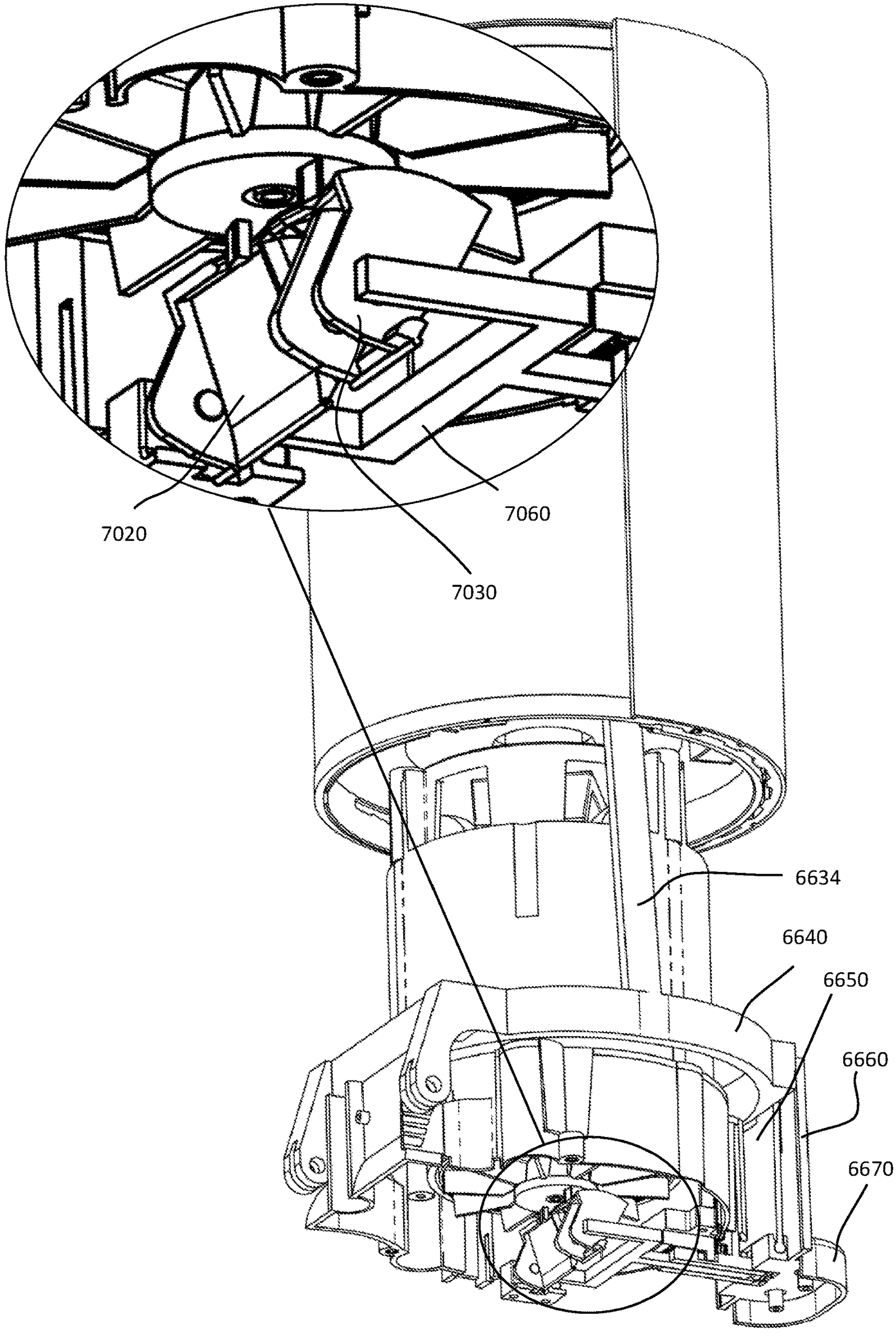
Figure 168A:
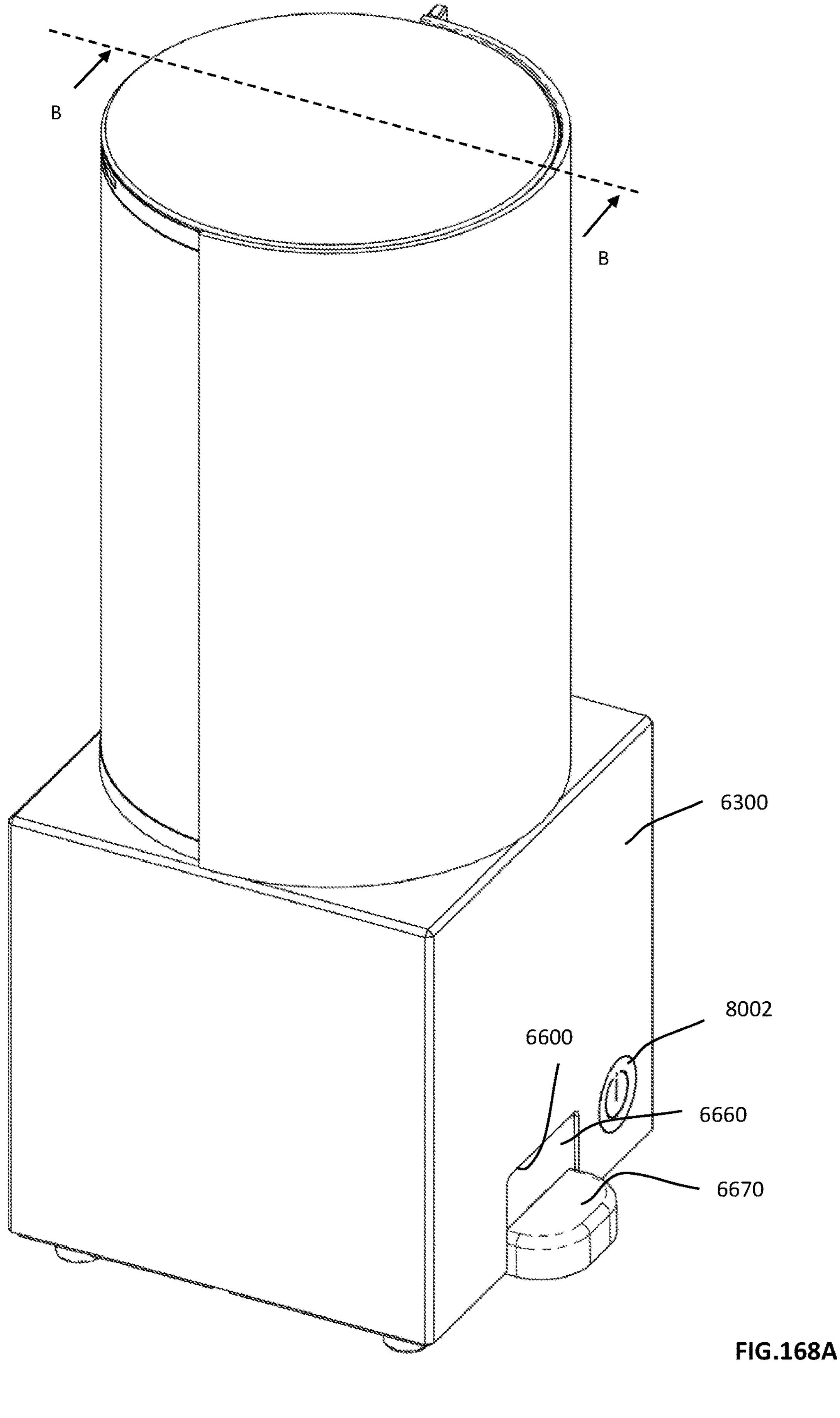
Figure 168B:
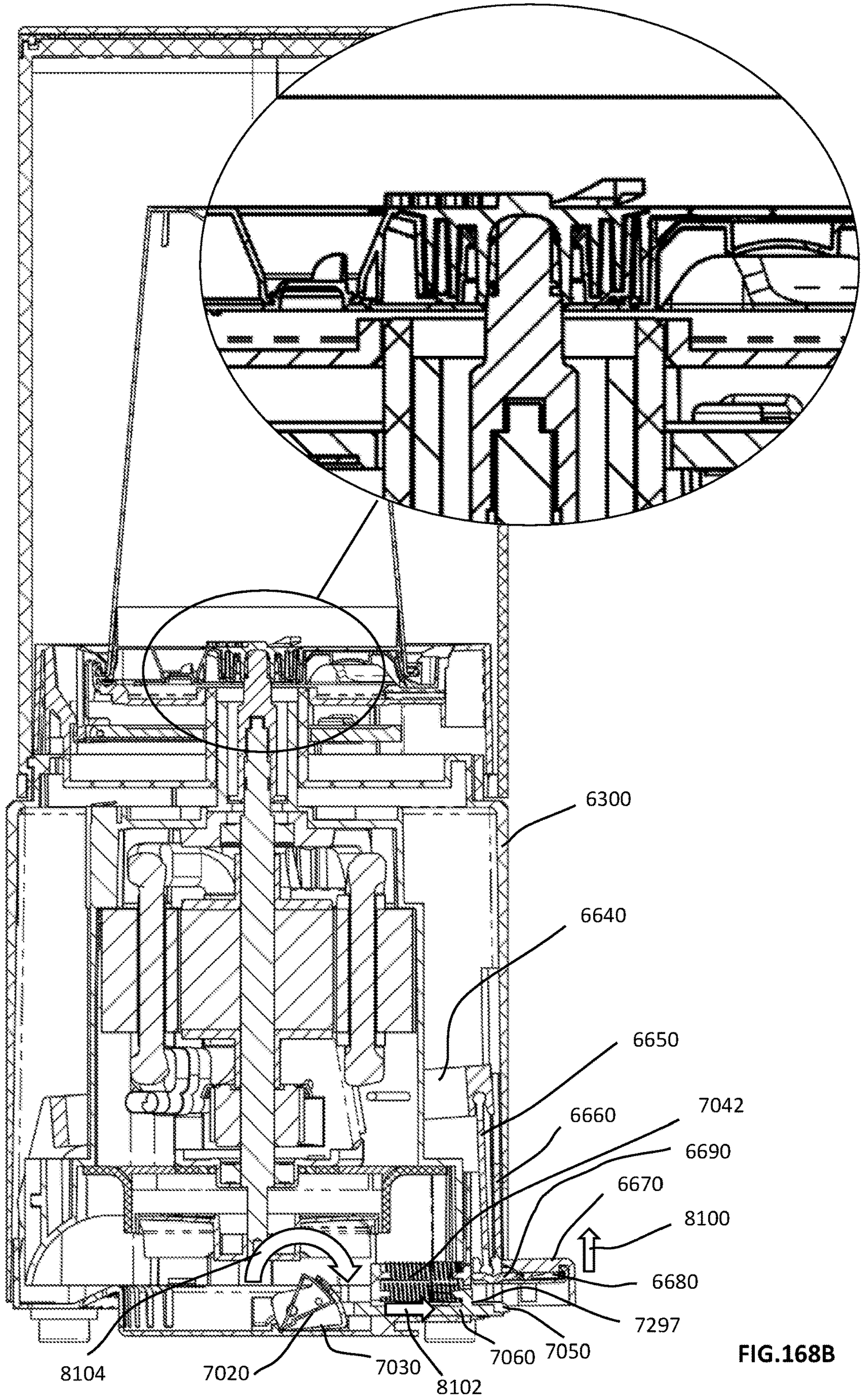
Figure 168C:
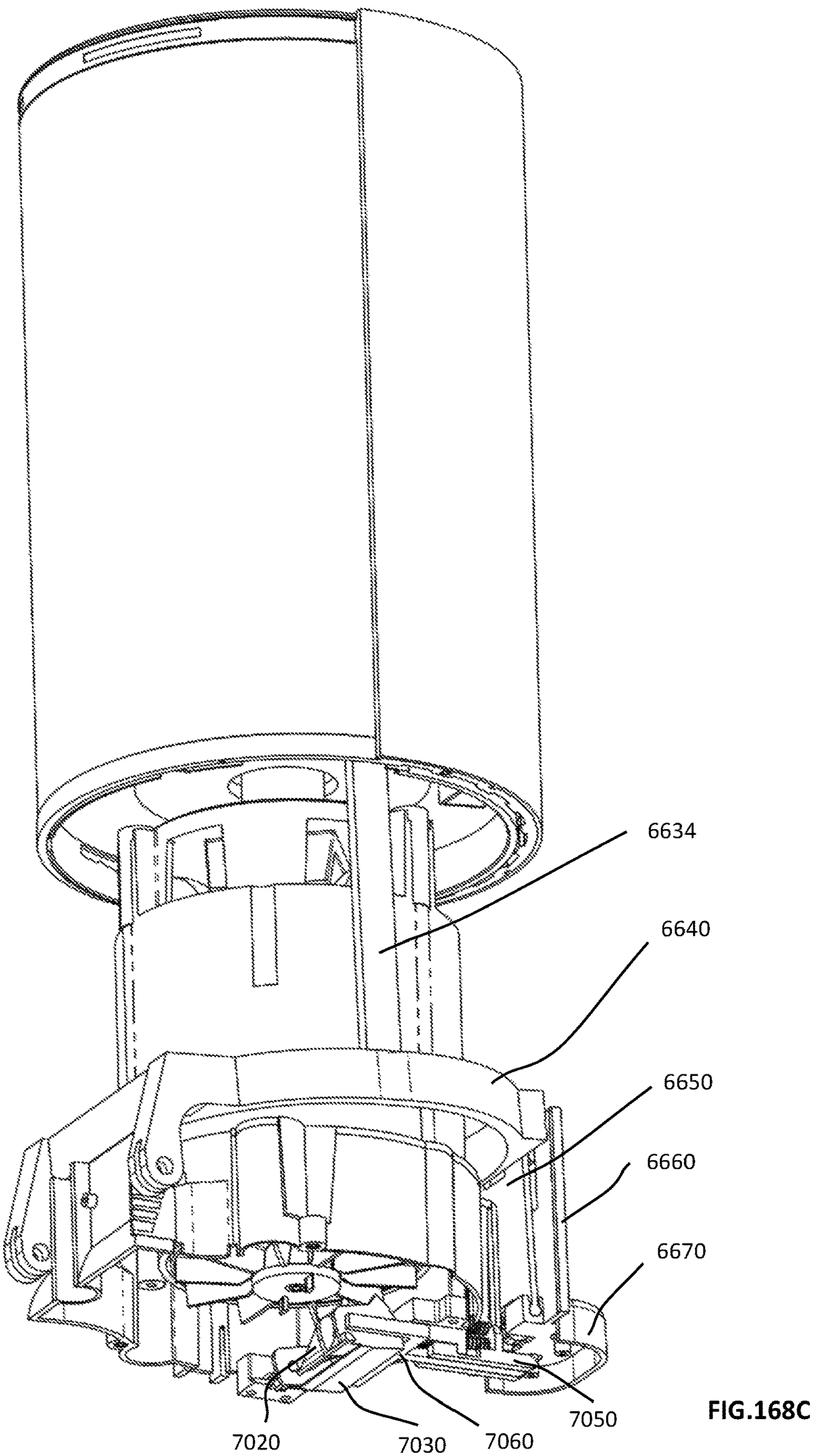
Figure 169A:
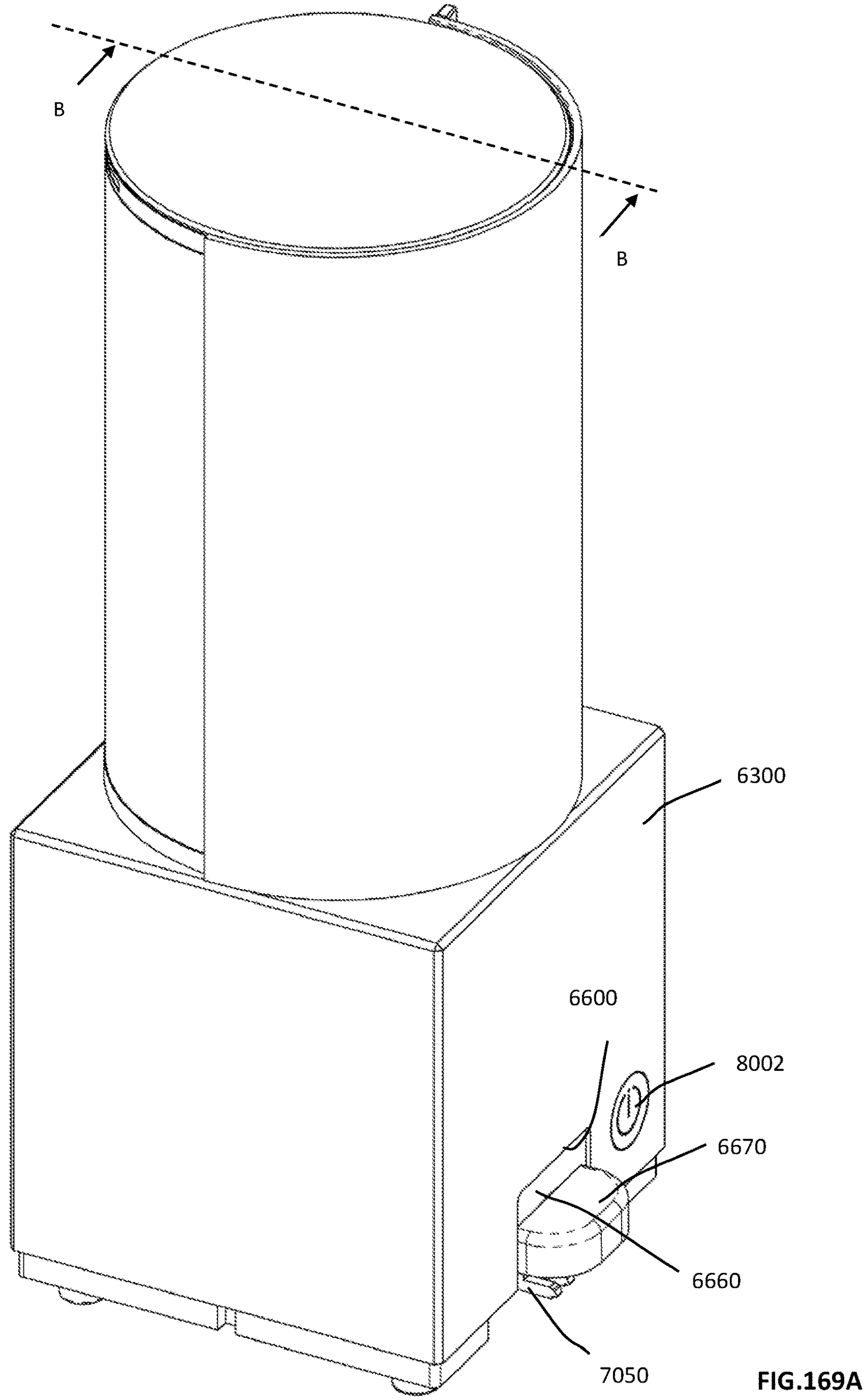
Figure 169B:
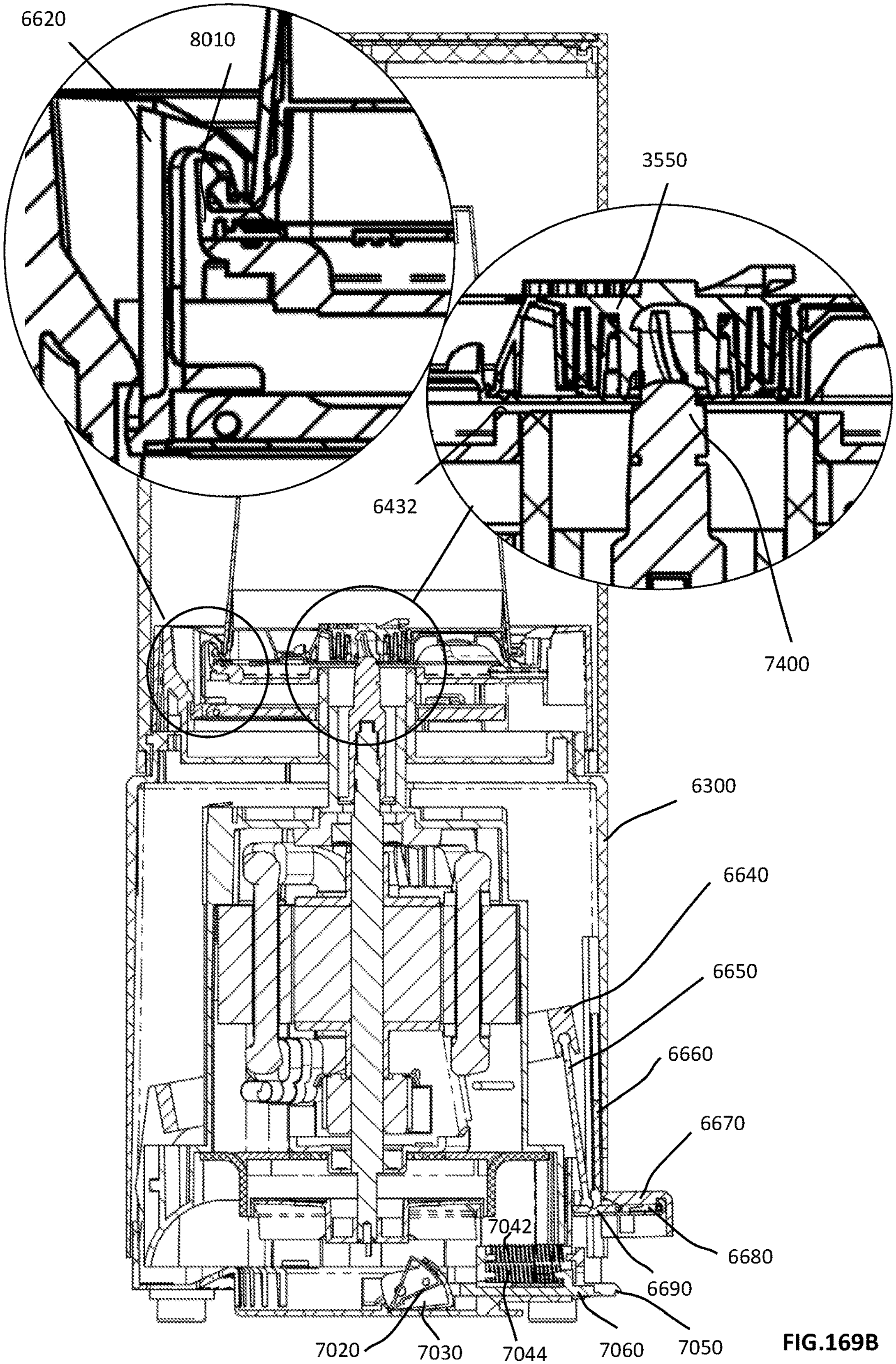
Figure 170A:
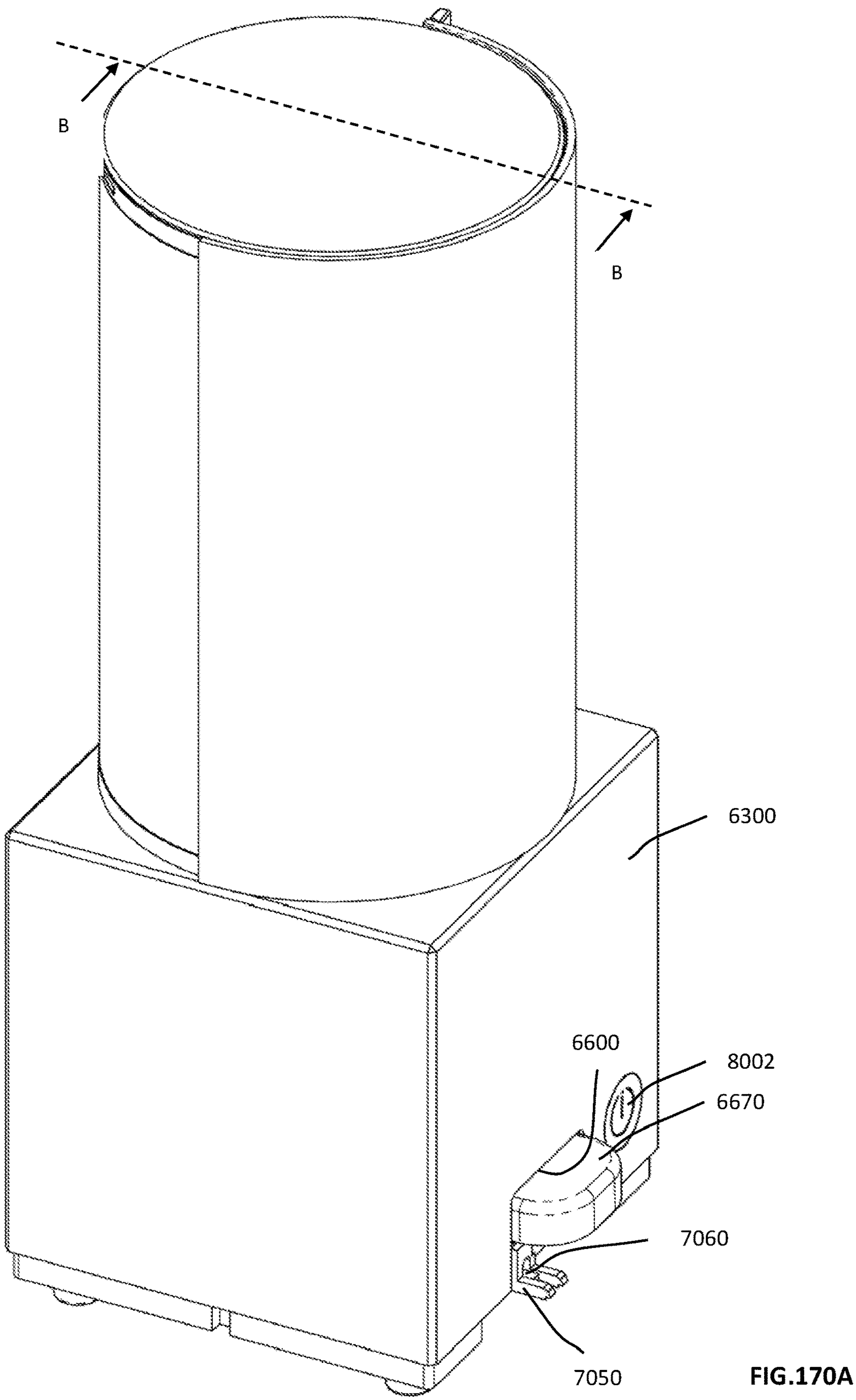
Figure 170B:
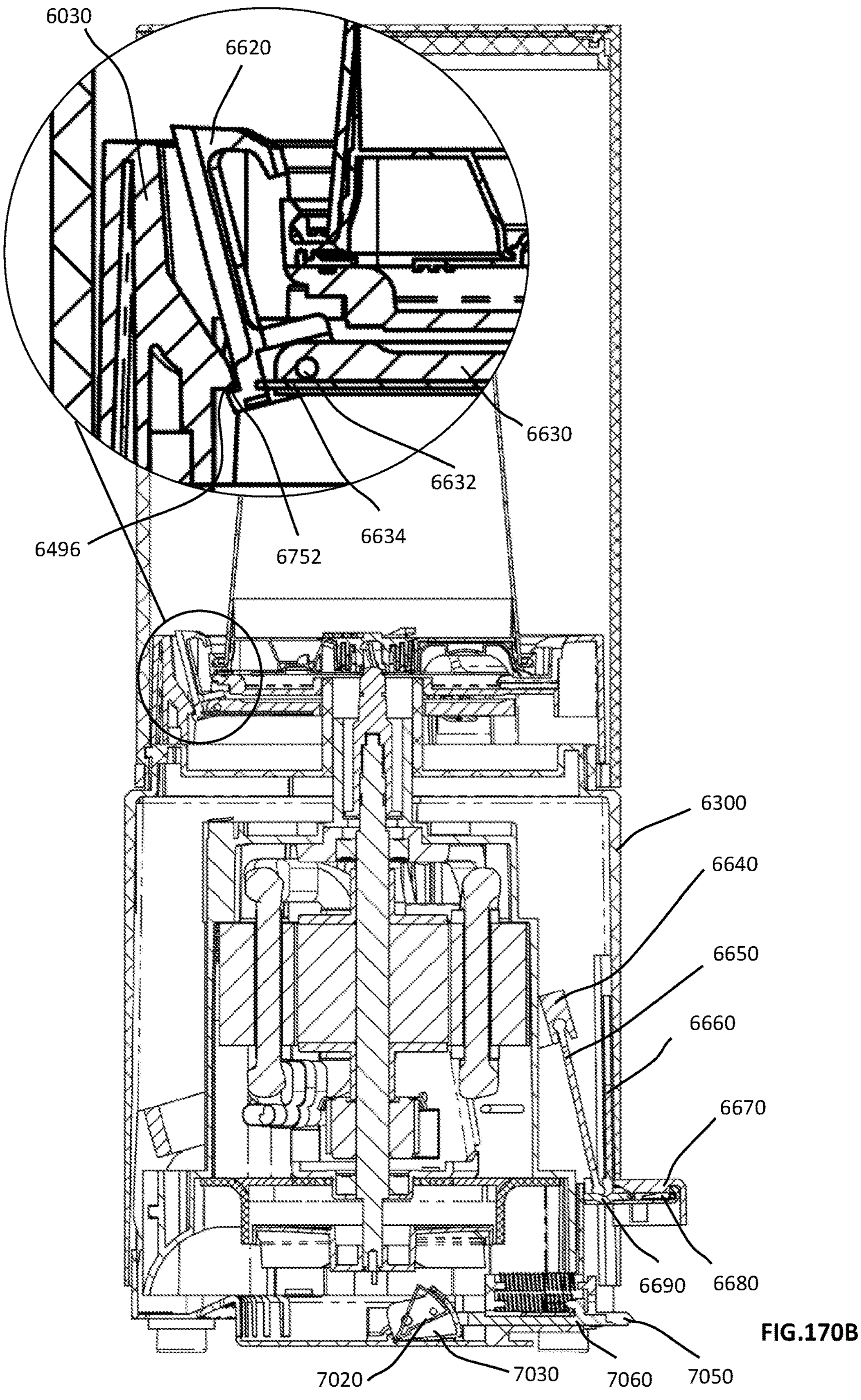

FIGS. 113A, 113B, 113C, 113D and 113E are simplified first partially cut-away pictorial, first partially cut-away side view, sectional view, second partially cut-away pictorial and second partially cut-away side view illustrations, corresponding to FIG. 105, of disengagement of the SUPCA from the SUPCASCA of the MMIDD and activation of the human and machine sensible tamper-evidencing and re-use prevention functionality of the SUPCA, FIG. 113C being taken along lines C-C in FIG. 113A;

FIGS. 114A, 114B and 114C are simplified partially cut-away pictorial, partially cut-away side view and sectional view illustrations of the results of an attempted re-use of a SUPCA following activation of the human and machine sensible tamper-evidencing and re-use prevention functionality of the SUPCA as illustrated in FIGS. 108A-113E, FIG. 114C being taken along lines C-C in FIG. 114A;

FIGS. 115A, 115B and 115C are simplified partially cut-away pictorial, sectional view and pictorial illustrations of a SUPCA including a SUCSERDREA mounted on a single-use container body prior to activation of the human and machine sensible tamper-evidencing and re-use prevention functionality of the SUPCA, FIG. 115B being taken along lines B-B in FIG. 115A;

FIGS. 116A, 116B and 116C are simplified partially cut-away pictorial, sectional view and pictorial illustrations corresponding to FIGS. 115A-115C but showing disengagement of the SUCSERDREA from the single-use container body and resulting activation of the human and machine sensible tamper-evidencing and re-use prevention functionality of the SUPCA, FIG. 116B being taken along lines B-B in FIG. 116A;

FIGS. 117A, 117B and 117C are simplified partially cut-away pictorial, sectional view and pictorial illustrations corresponding to FIGS. 116A-116C but showing re-engagement of the SUCSERDREA with the single-use container body and operation of the human and machine sensible tamper-evidencing and re-use prevention functionality of the SUPCA, FIG. 117B being taken along lines B-B in FIG. 116A;

FIGS. 118A, 118B, 118C and 118D are simplified sectional illustrations, taken along a central cross section of the MMIDD of FIG. 68, having an outer drive shaft assembly as shown in FIGS. 76A-81B with the SUPCA as shown in FIGS. 60A-60I, illustrating blade engagement and sealing functionality thereof in four operative orientations, FIGS. 118A-118D being taken along lines CXVIII-CXVIII in FIG. 68;

FIGS. 119A, 119B, 119C and 119D are simplified sectional illustrations, taken along a central cross section of the MMIDD of FIG. 68, having an outer drive shaft assembly as shown in FIGS. 82A-87D with the SUPCA as shown in FIGS. 60A-60I, illustrating blade engagement and sealing functionality thereof in four operative orientations, FIGS. 119A-119D being taken along lines CXVIII-CXVIII in FIG. 68;

FIGS. 120A, 120B, 120C and 120D are simplified sectional illustrations, taken along a central cross section of the MMIDD of FIG. 68 having an outer drive shaft assembly as shown in FIGS. 88A-88E with the SUPCA as shown in FIGS. 60A-60I having the alternative blade of FIGS. 64A-64F, illustrating blade engagement and sealing functionality thereof in four operative orientations, FIGS. 120A-120D being taken along lines CXVIII-CXVIII in FIG. 68;

FIGS. 121A, 121B and 121C are simplified sectional illustrations, taken along a central cross section of the MMIDD of FIG. 68 having an outer drive shaft assembly as shown in FIGS. 82A-87D with the SUPCA as shown in FIGS. 65A-65C, illustrating blade engagement and sealing functionality thereof in four operative orientations, FIGS. 121A-121C being taken along lines CXVIII-CXVIII in FIG. 68;

FIGS. 122A, 122B and 122C are simplified sectional illustrations, taken along a central cross section of the MMIDD of FIG. 68 having an outer drive shaft assembly as shown in FIGS. 88A-88E with the SUPCA as shown in FIGS. 65D-65F, illustrating blade engagement and sealing functionality thereof in four operative orientations, FIGS. 122A-122C being taken along lines CXVIII-CXVIII in FIG. 68;

FIGS. 123A, 123B, 123C, 123D, 123E and 123F are simplified respective planar side, planar front, planar top, planar bottom, pictorial and exploded view illustrations of a further preferred embodiment of a multiple motion intelligent driving device (MMIDD) constructed and operative in accordance with a preferred embodiment of the present invention, in a door open operative orientation, useful with any suitable embodiment of SUPCA described hereinabove;

FIG. 123G is a simplified pictorial illustration corresponding to FIG. 123E in a door closed operative orientation;

FIGS. 124A, 124B, 124C, 124D and 124E are simplified respective planar front, planar side, planar top, pictorial and exploded view illustrations of a top housing assembly of the MMIDD of FIGS. 123A-123G in the door closed operative orientation of FIG. 123G;

FIGS. 125A, 125B, 125C and 125D are simplified respective planar top, planar bottom, planar side and pictorial illustrations of a top cover of the top housing assembly of FIGS. 124A-124E;

FIG. 126 is a simplified illustration of an upper movable housing element bearing ring forming part of the top housing assembly of the MMIDD of FIGS. 123A-123G;

FIGS. 127A, 127B, 127C and 127D are simplified respective planar front, planar side, planar top and pictorial illustrations of a static housing element forming part of the top housing assembly of the MMIDD of FIGS. 123A-123G;

FIGS. 128A, 128B, 128C and 128D are simplified respective planar front, planar side, planar top and pictorial illustrations of a movable housing element forming part of the top housing assembly of the MMIDD of FIGS. 123A-123G;

FIG. 129 is a simplified illustration of a handle, forming part of the top housing assembly of the MMIDD of FIGS. 123A-123G;

FIGS. 130A, 130B and 130C are simplified planar side, planar top and pictorial illustrations of a lower movable housing element bearing ring forming part of the top housing assembly of the MMIDD of FIGS. 123A-123G;

FIGS. 131A, 131B, 131C, 131D, 131E and 131F are simplified planar front, planar side, planar top, planar bottom, pictorial and exploded view illustrations of a base assembly forming part of the MMIDD of FIGS. 123A-123G;

FIGS. 132A, 132B, 132C and 132D are simplified planar side, planar top, planar bottom and pictorial view illustrations of a SUPCA support forming part of the base assembly of FIGS. 131A-131F;

FIGS. 133A, 133B, 133C, 133D, 133E and 133F are simplified planar front, planar side, planar top, planar bottom, top-facing pictorial and bottom-facing pictorial illustrations of a vertically displaceable base housing forming part of base assembly of FIGS. 131A-131F;

FIGS. 134A, 134B, 134C, 134D and 134E are simplified planar front, planar side, planar top, pictorial and exploded view pictorial illustrations of a clamping and base housing raising assembly, forming part of base assembly of FIGS. 131A-131F;

FIGS. 135A, 135B, 135C, 135D, 135E, 135F and 135G are simplified planar top, planar bottom, planar side, planar inward facing, planar outward facing, top-facing pictorial and side-facing pictorial illustrations of a clamp element forming part of the clamping and base housing raising assembly of FIGS. 134A-134E;

FIGS. 136A, 136B, 136C and 136D are simplified planar top, planar side, top-facing pictorial and bottom-facing pictorial view illustrations of a pivotable clamp mounting element forming part of the clamping and base housing raising assembly of FIGS. 134A-134E;

FIGS. 137A, 137B and 137C are simplified planar top, planar side and pictorial view illustrations of a pivotable lever-operated element forming part of the clamping and base housing raising assembly of FIGS. 134A-134E;

FIGS. 138A and 138B are simplified planar side and pictorial view illustrations of a strut forming part of the clamping and base housing raising assembly of FIGS. 134A-134E;

FIGS. 139A, 139B, 139C and 139D are simplified planar front, planar side, planar top and pictorial view illustrations of a lever connecting element forming part of the clamping and base housing raising assembly of FIGS. 134A-134E;

FIGS. 140A, 140B, 140C, 140D, 140E, 140F and 140G are simplified planar top, planar bottom, planar side, planar front, planar back, top-facing pictorial and bottom-facing pictorial illustrations of a top lever element forming part of the clamping and base housing raising assembly of FIGS. 134A-134E;

FIGS. 141A, 141B, 141C, 141D and 141E are simplified planar front, planar back, planar side, planar top and pictorial illustrations of a bottom lever element forming part of the clamping and base housing raising assembly of FIGS. 134A-134E;

FIGS. 142A, 142B and 142C are simplified planar side, planar top and pictorial view illustrations of a activation pin element forming part of the clamping and base housing raising assembly of FIGS. 134A-134E;

FIGS. 143A, 143B and 143C are simplified planar side, planar top and pictorial view illustrations of a linkage element forming part of the clamping and base housing raising assembly of FIGS. 134A-134E;

FIGS. 144A, 144B, 144C, 144D and 144E are simplified planar side, planar front, planar top, planar bottom and exploded view pictorial illustrations of an azimuthal alignment assembly, forming part of base assembly of FIGS. 131A-131F;

FIGS. 145A, 145B, 145C and 145D are simplified planar front, planar side, top-facing pictorial and bottom-facing pictorial illustrations of hinge clamp element forming part of the azimuthal alignment assembly of FIGS. 144A-144E;

FIGS. 146A, 146B, 146C, 146D and 146E are simplified first planar side, second planar side, planar front, planar top and pictorial illustrations of rotationally displacing element forming part of the azimuthal alignment assembly of FIGS. 144A-144E;

FIGS. 147A, 147B, 147C and 147D are simplified planar front, planar top, planar side and pictorial illustrations of an azimuthal alignment activation element forming part of the azimuthal alignment assembly of FIGS. 144A-144E;

FIGS. 148A, 148B, 148C, 148D and 148E are simplified planar top, planar side, planar front, planar back and pictorial illustrations of a multifunctional bracket element forming part of the azimuthal alignment assembly of FIGS. 144A-144E;

FIGS. 149A, 149B, 149C, 149D and 149E are simplified planar top, planar bottom, planar back, planar side and pictorial illustrations of a lever locking element forming part of the azimuthal alignment assembly of FIGS. 144A-144E;

FIGS. 150A, 150B, 150C and 150D are simplified planar top, planar side, planar back and pictorial illustrations of an azimuthal alignment activation driving element forming part of the azimuthal alignment assembly of FIGS. 144A-144E;

FIGS. 151A and 151B are simplified pictorial and exploded view illustrations of a motor assembly forming part of the base assembly of FIGS. 131A-131F;

FIG. 152 is a simplified pictorial view illustration of an outer drive shaft assembly forming part of the motor assembly of FIGS. 151A & 151B;

FIGS. 153A, 153B, 153C, 153D and 153E are simplified first planar side, second planar side, planar top, planar bottom and pictorial view illustrations of motor housing forming part of the motor assembly of FIGS. 151A & 151B;

FIG. 154 is a simplified pictorial illustration of an electric motor forming part of the motor assembly of FIGS. 151A & 151B;

FIGS. 155A, 155B and 155C are simplified planar bottom, planar side and pictorial view illustrations of a motor support bracket forming part of the motor assembly of FIGS. 151A & 151B;

FIGS. 156A, 156B, 156C, 156D and 156E are simplified planar top, planar bottom, planar side, top-facing pictorial and bottom-facing pictorial view illustrations of a rotating ventilating element forming part of the motor assembly of FIGS. 151A & 151B;

FIGS. 157A, 157B, 157C, 157D and 157E are simplified planar front, planar side, planar top, pictorial and exploded view illustrations of a bottom assembly, forming part of the base assembly of FIGS. 131A-131F;

FIGS. 158A, 158B, 158C and 158D are simplified respective planar top, planar bottom, planar side and pictorial view illustrations of a load cell support forming part of the bottom assembly of FIGS. 157A-157E;

FIGS. 159A, 159B, 159C and 159D are simplified respective planar front, planar side, planar top and pictorial view illustrations of a bottom element forming part of the bottom assembly of FIGS. 157A-157E;

FIGS. 160A and 160B are simplified respective pictorial and sectional view illustrations of an initial step in the operation of the MMIDD of FIGS. 123A-159D, FIG. 160B being taken along lines B-B in FIG. 160A;

FIGS. 161A and 161B are simplified respective pictorial and sectional view illustrations of a second step in the operation of the MMIDD of FIGS. 123A-159D, FIG. 161B being taken along lines B-B in FIG. 161A;

FIGS. 162A and 162B are simplified respective pictorial and sectional view illustrations of a third step in the operation of the MMIDD of FIGS. 123A-159D, FIG. 162B being taken along lines B-B in FIG. 162A;

FIGS. 163A and 163B are simplified respective pictorial and sectional view illustrations of a fourth step in the operation of the MMIDD of FIGS. 123A-159D, FIG. 163B being taken along lines B-B in FIG. 163A;

FIGS. 164A, 164B and 164C are simplified respective pictorial, sectional and partially cut away pictorial illustrations of a fifth step in the operation of the MMIDD of FIGS. 123A-159D, FIG. 164B being taken along lines B-B in FIG. 164A;

FIGS. 165A, 165B and 165C are simplified respective pictorial, sectional and partially cut away pictorial illustrations of a sixth step in the operation of the MMIDD of FIGS. 123A-159D, FIG. 165B being taken along lines B-B in FIG. 165A;

FIGS. 166A, 166B and 166C are simplified respective pictorial, sectional and partially cut away pictorial illustrations of a seventh step in the operation of the MMIDD of FIGS. 123A-159D, FIG. 166B being taken along lines B-B in FIG. 166A;

FIGS. 167A, 167B and 167C are simplified respective pictorial, sectional and partially cut away pictorial illustrations of an eighth step in the operation of the MMIDD of FIGS. 123A-159D, FIG. 167B being taken along lines B-B in FIG. 167A;

FIGS. 168A, 168B and 168C are simplified respective pictorial, sectional and partially cut away pictorial illustrations of a ninth step in the operation of the MMIDD of FIGS. 123A-159D, FIG. 168B being taken along lines B-B in FIG. 168A;

FIGS. 169A and 169B are simplified respective pictorial and sectional view illustrations of a tenth step in the operation of the MMIDD of FIGS. 123A-159D, FIG. 169B being taken along lines B-B in FIG. 169A; and FIGS. 170A and 170B are simplified respective pictorial and sectional view illustrations of an eleventh step in the operation of the MMIDD of FIGS. 123A-159D, FIG. 170B being taken along lines B-B in FIG. 170A.

DETAILED DESCRIPTION OF PREFERRED EMBODIMENTS

Figure 1A:
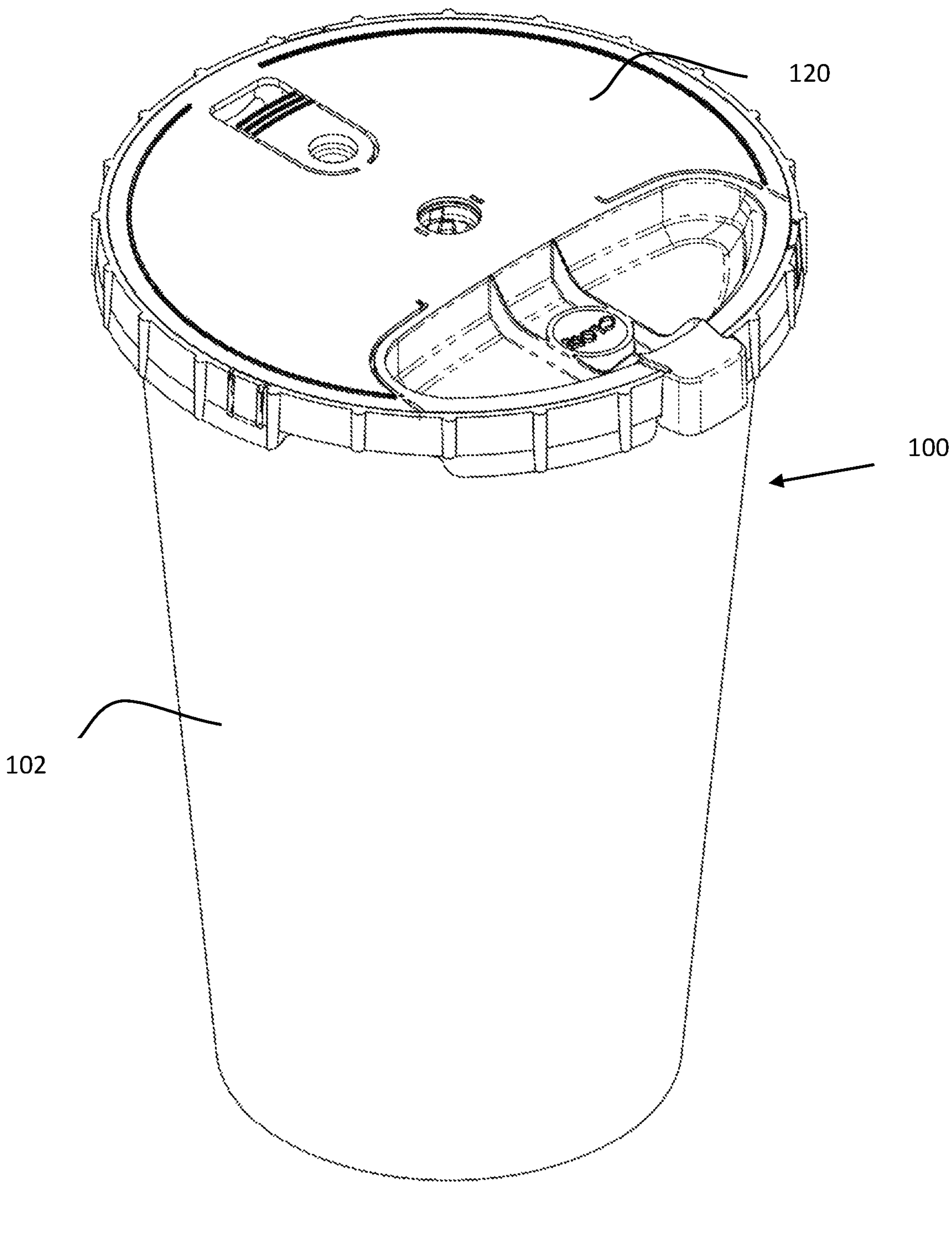
FIG. 1A is a simplified pictorial illustration of a single-use preparation container assembly (SUPCA) constructed and operative in accordance with a preferred embodiment of the present invention.
Figure 1B:
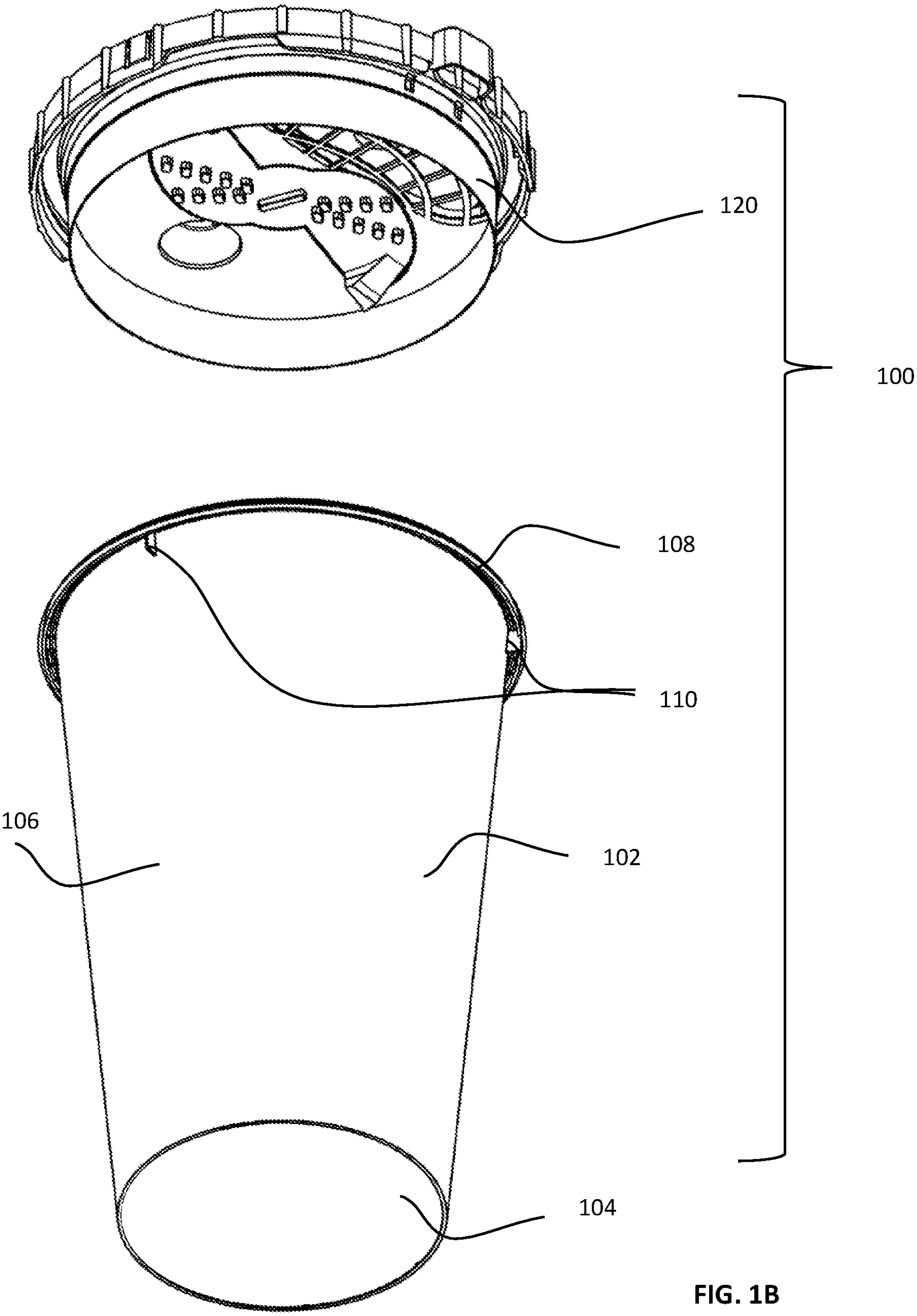
FIG. 1B is a simplified exploded view illustration of the SUPCA of FIG. 1A FIGS. 2A, 2B, 2C, and 2D are simplified respective planar top view, planar bottom view, planar side view and planar sectional illustrations of a single-use cover, seal and externally rotatably drivable rotary engagement assembly (SUCSERDREA) forming part of the SUPCA of FIGS. 1A & 1B, FIG. 2D being taken along lines D-D in FIG. 2A.
Figure 2A:
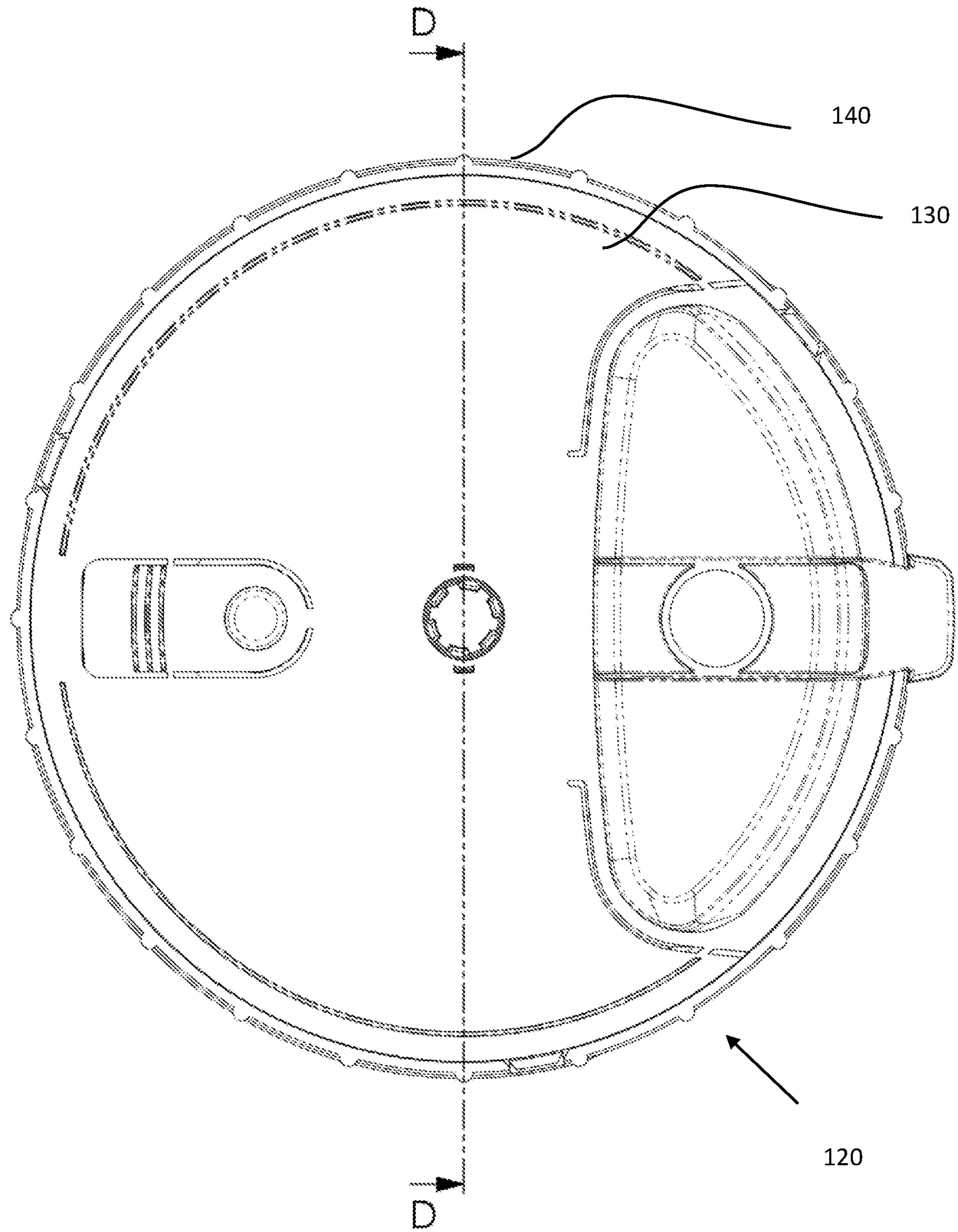
Figure 2B:
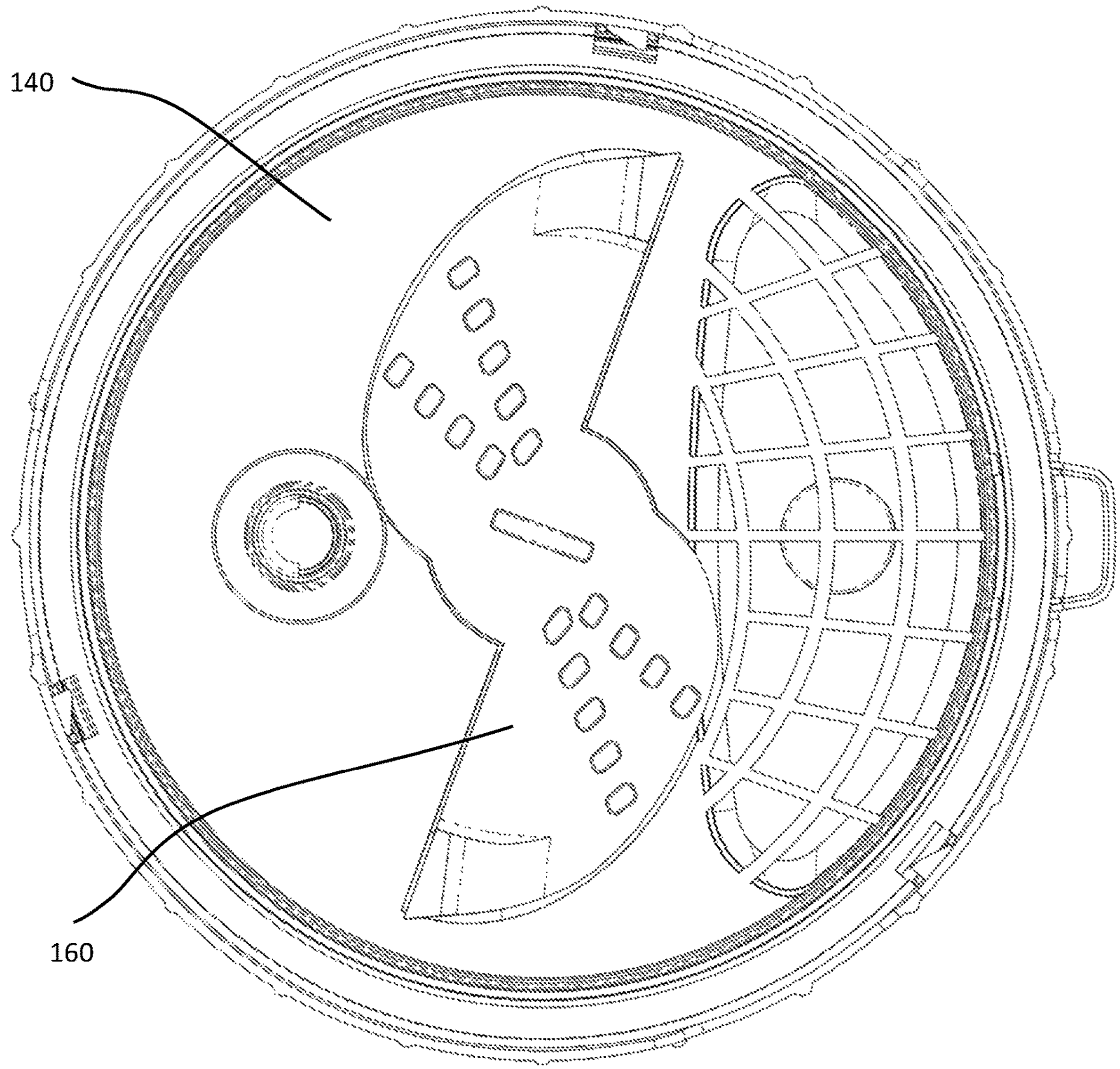
Figure 2C:
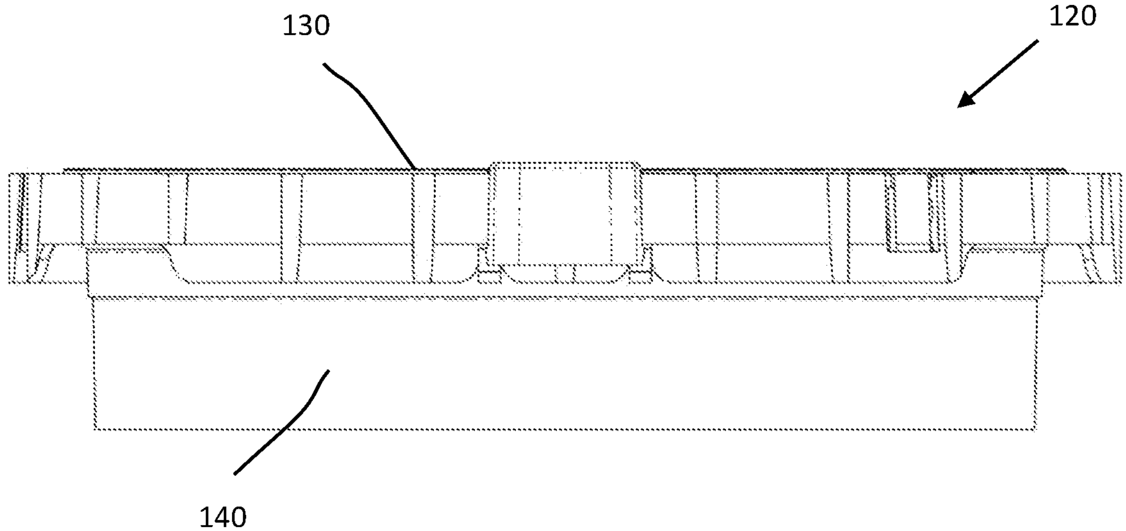
Figure 2D:
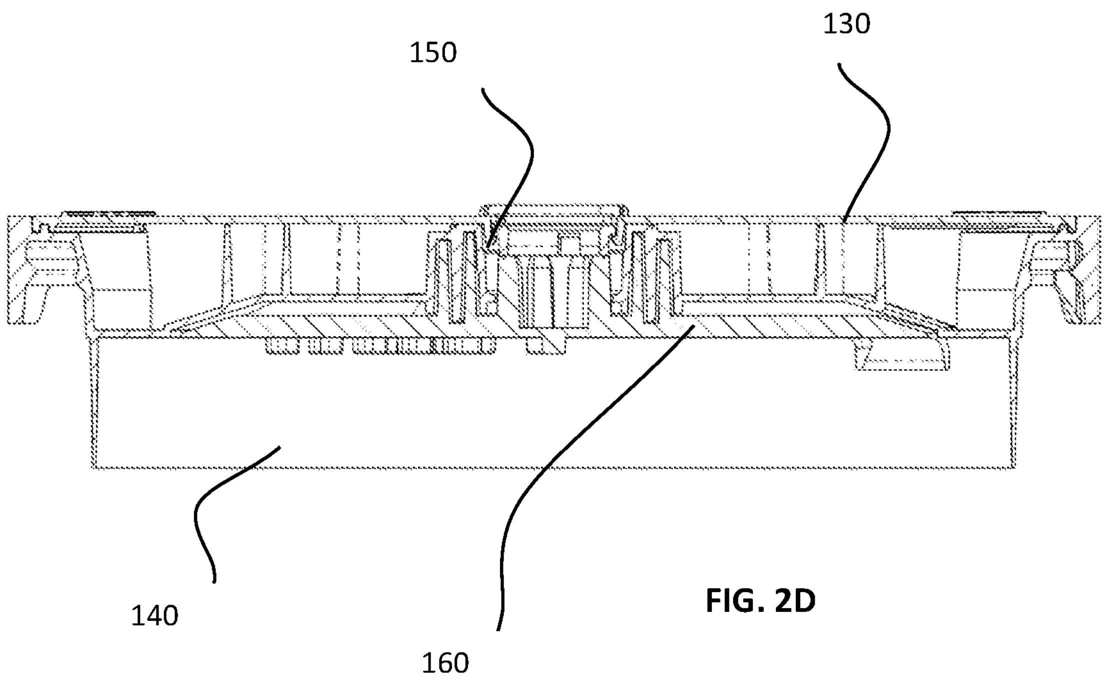

Reference is now made to FIGS. 1A and 1B, which are, respectively, a simplified pictorial illustration and a simplified exploded view illustration of a container, such as a single-use preparation container assembly (SUPCA) 100, also referred to as a product container assembly, constructed and operative in accordance with a preferred embodiment of the present invention. SUPCA 100 is preferably used for food products but is not limited for use therewith unless explicitly stated hereinbelow.

As seen in FIGS. 1A and 1B, SUPCA 100 preferably comprises a cup body, such as a single-use container body 102, for containing a food product prior to, during and following food preparation. Single-use container body 102 may be any suitable container body 102 and is preferably a truncated conical shaped container, preferably formed of polypropylene having a bottom wall 104, a truncated conical side wall 106, a circumferential rim 108 and a plurality of, typically three, radially outwardly extending tamper indicating tabs 110 underlying circumferential rim 108.

In accordance with a preferred embodiment of the invention, there is also provided a cup closure, such as a single-use cover seal and externally rotatably drivable rotary engagement assembly (SUCSERDREA) 120, for both human and machine sensible tamper-evident and re-use preventing fluid sealing engagement with the single-use container body 102.

SUCSERDREA 120 is preferably used for food products but is not limited for use therewith unless explicitly stated hereinbelow.

It is a particular feature of the present invention that the same SUCSERDREA 120 may be used for container bodies 102 having different sizes and configurations, provided that their circumferential rim 108 is uniform.

A preferred embodiment of SUCSERDREA 120 is illustrated in FIGS. 2A-3B. As seen in FIGS. 2A-3B, SUCSERDREA 120 preferably includes a cover 130, a lid 140, a hub 150 and a blade 160. Cover 130 and lid 140 are preferably fixedly connected to each other, preferably by suitable welding techniques, preferably ultrasonic welding. Hub 150 is preferably fixedly connected to blade 160 and is arranged for sealed rotation with respect to cover 130 and lid 140. Alternatively, hub 150 and blade 160 may be integrally formed.

SUCSERDREA 120 preferably includes a machine-readable information source 162, preferably an RFID tag, but alternatively a bar-coded label or any other suitable machine-readable information source. Preferably, the information contained on the machine-readable information source 162 is encrypted. Information source 162 may contain some or all of the relevant information and/or may provide a reference, such as a link to information available on the internet.

Figure 3A:
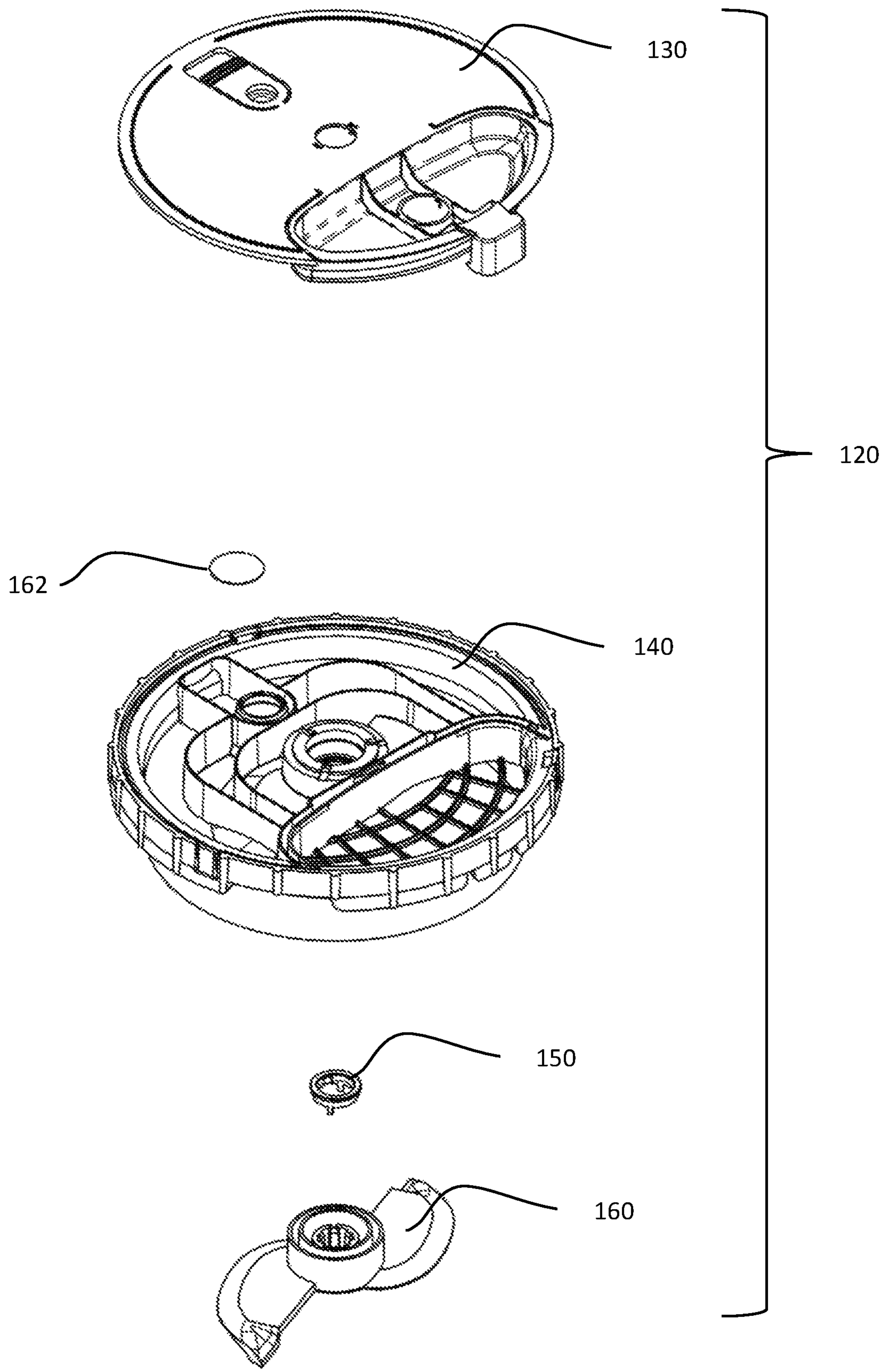
FIGS. 3A and 3B are simplified respective downward-facing and upward-facing exploded view illustrations of the SUCSERDREA of FIGS. 2A-2C.
Figure 3B:
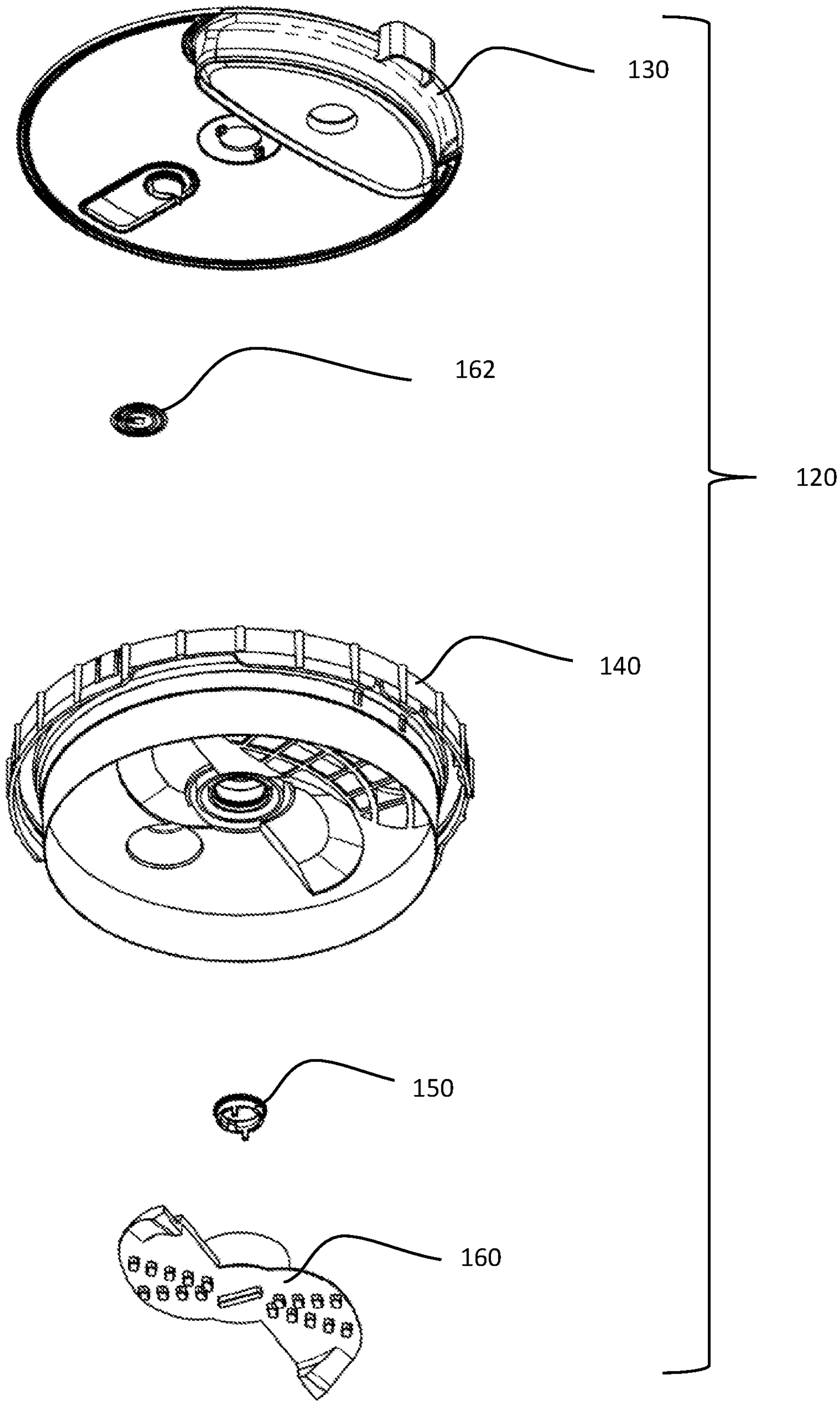
Figure 4A:
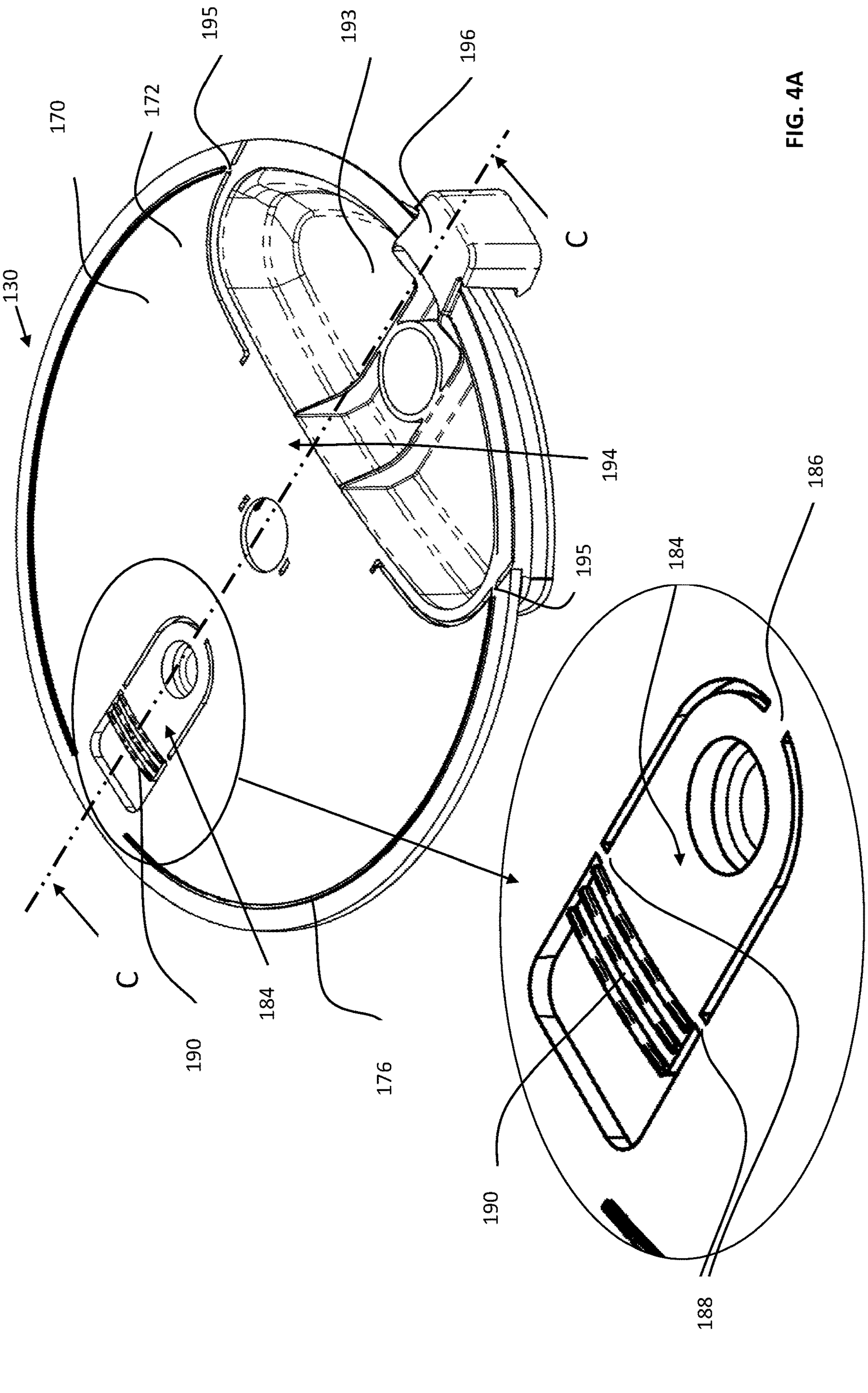
FIGS. 4A, 4B and 4C are simplified respective top, bottom and planar sectional illustrations of a cover of the single-use cover seal of FIGS. 2A-3B, FIG. 4C being taken along lines C-C in FIG. 4A.
Figure 4B:
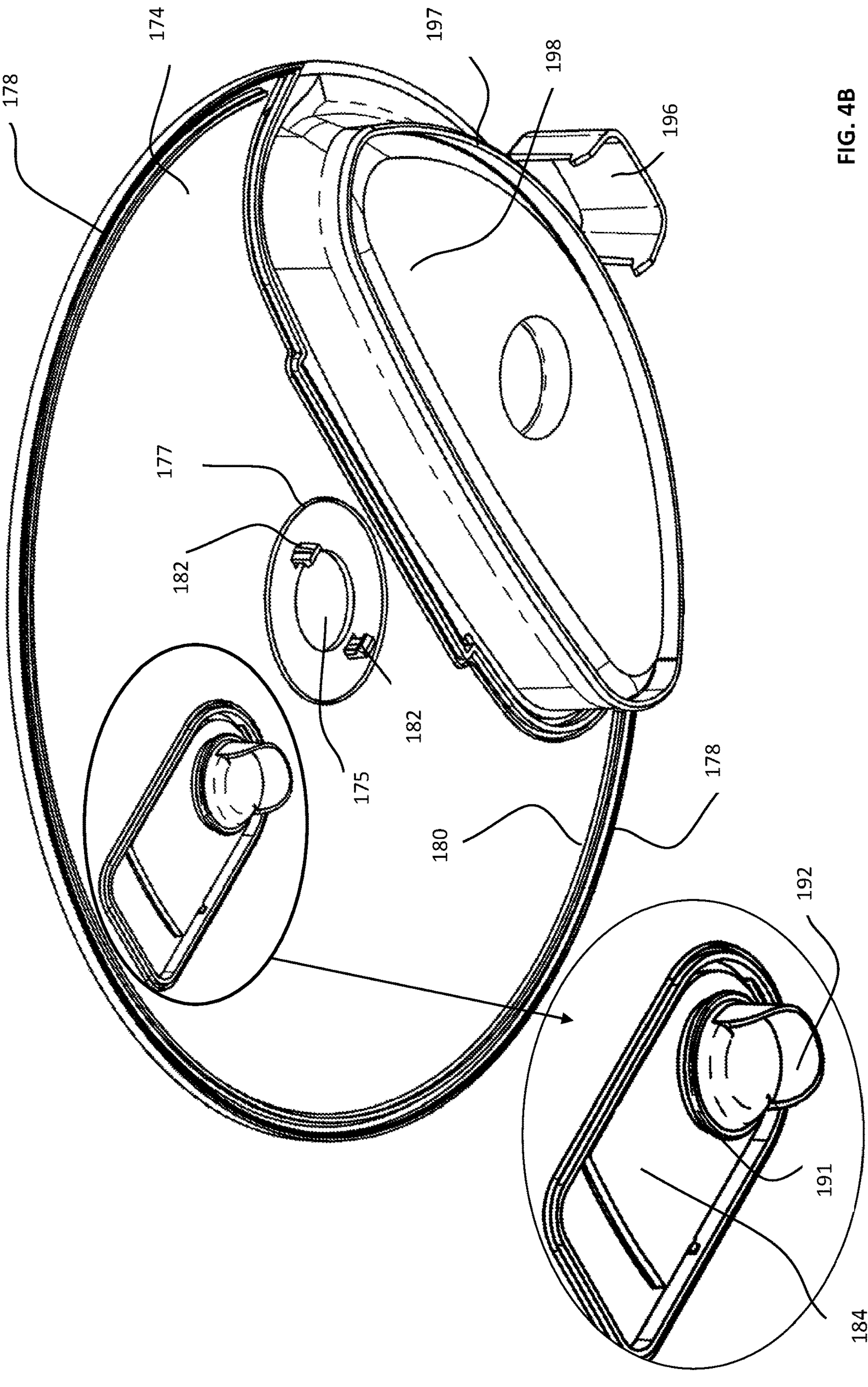
Figure 4C:
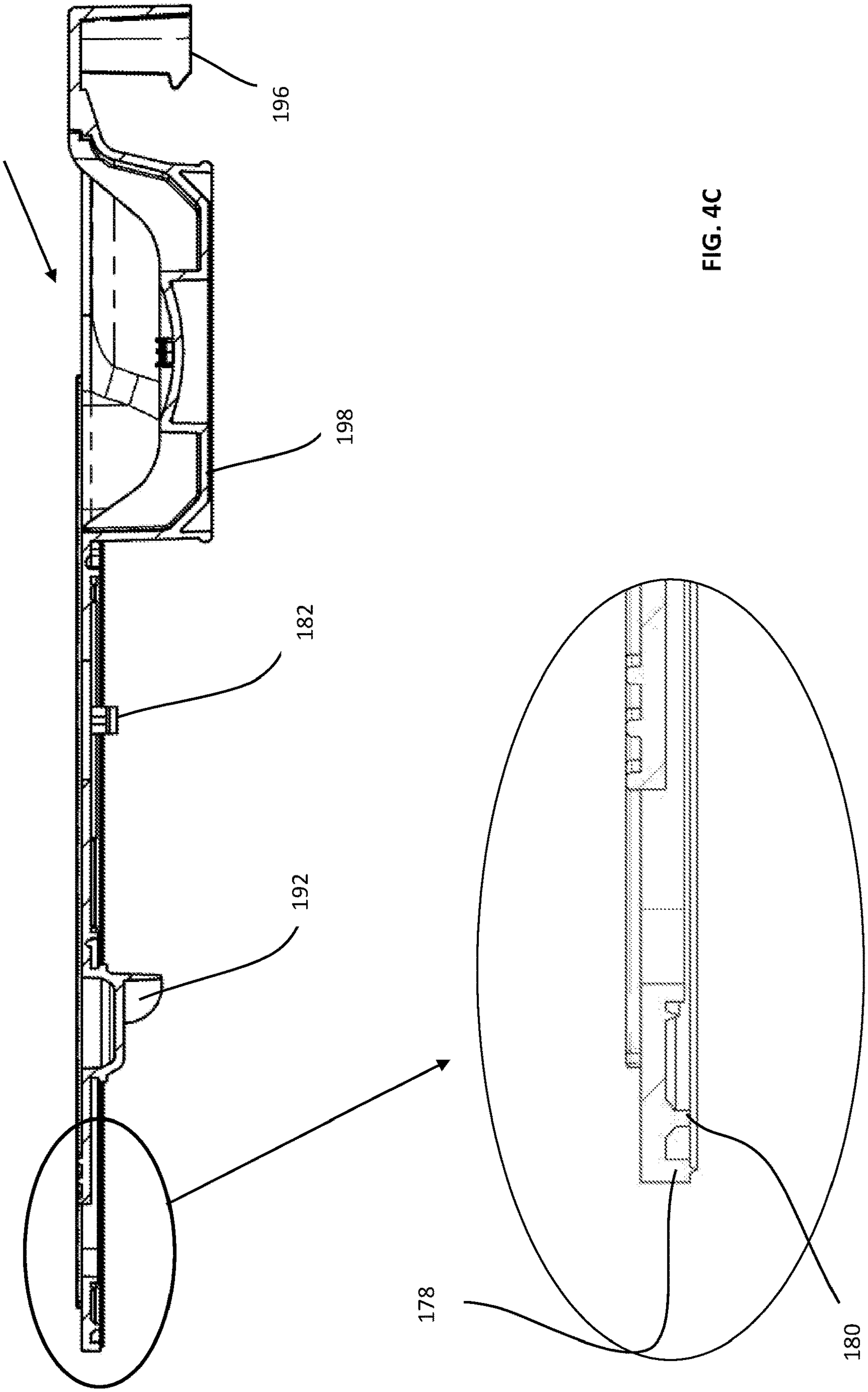

Reference is now additionally made to FIGS. 4A, 4B and 4C, which are respective simplified top, bottom and sectional illustrations of cover 130 of SUCSERDREA 120 of FIGS. 2A-3B. As seen in FIGS. 4A-4C, cover 130 preferably comprises a generally circular planar portion 170 having an upwardly-facing surface 172 in the sense of FIG. 3A and a downwardly-facing surface 174 in the sense of FIG. 3B. A central aperture 175 is formed in generally circular planar portion 170. An upwardly facing, in the sense of FIG. 3A, generally circular stacking positioning protrusion 176 is preferably formed on upwardly-facing surface 172. Three mutually concentric, mutually spaced downwardly-facing, in the sense of FIG. 3B, generally circular generally circumferential protrusions 177, 178 and 180 are formed on downwardly-facing surface 174 for welding to corresponding protrusions of lid 140. A pair of downward and inwardly facing hook protrusions 182 are also formed on downwardly-facing surface 174 adjacent aperture 175 for disengageable mounting of hub 150 onto cover 130.

Formed in generally circular planar portion 170 is an integrally hinged pivotably openable straw ingress opening cover 184, including an integral hinge portion 186 and a pair of human visually sensible tamper-evident frangible portions 188, which are normally necessarily broken when opening straw ingress opening cover 184. A finger engagement portion 190 is defined as an extension of straw ingress opening cover 184. Integrally hinged pivotably openable straw ingress opening cover 184 is preferably formed with an outer peripheral sealing surface 191, which removably sealably engages a corresponding straw ingress opening of lid 140 (FIGS. 5A-5M). A guiding lip portion 192 is preferably provided for guiding the straw ingress opening cover 184 when resealing straw ingress opening cover 184 with respect to corresponding straw ingress opening of lid 140.

Also formed in generally circular planar portion 170 is an integrally hinged liquid ingress cover 193 including an integral hinge 194 and a pair of human visually sensible tamper-evident frangible portions 195, which are normally necessarily broken when opening cover 193. A finger engagement portion 196 is defined as a radially outwardly extension of cover 193 and also serves for rotational orientation of SUPCA 100 onto a container contents processor, such as a multiple motion intelligent driving device (MMIDD) (FIGS. 10A-10C), also referred to as an intelligent driving device, as is described hereinbelow.

Integrally hinged pivotably openable liquid ingress opening cover 193 is preferably formed with an outer peripheral sealing surface 197 which terminates in a recessed, generally planar, downwardly-facing in the sense of FIG. 3B, cover surface 198.

Reference is now made to FIGS. 5A-5M, which illustrate lid 140 of the SUCSERDREA 120 of FIGS. 2A-3B.

As seen in FIGS. 5A-5M, lid 140 preferably is a generally circular, generally planar element 200 having a generally circumferential edge surface 210 including a plurality of generally vertical radially outwardly extending elongate protrusions 212 distributed therealong. A plurality of, typically three, integrally hinged tamper and reuse indicating tabs 214 are formed in respective openings 215 in circumferential edge surface 210. Each of tabs 214 is formed with a pair of tapered mutually circumferentially spaced edge surfaces 216 and a radially inwardly facing cam 217 defining a cam engagement surface 218.

Figure 5A:
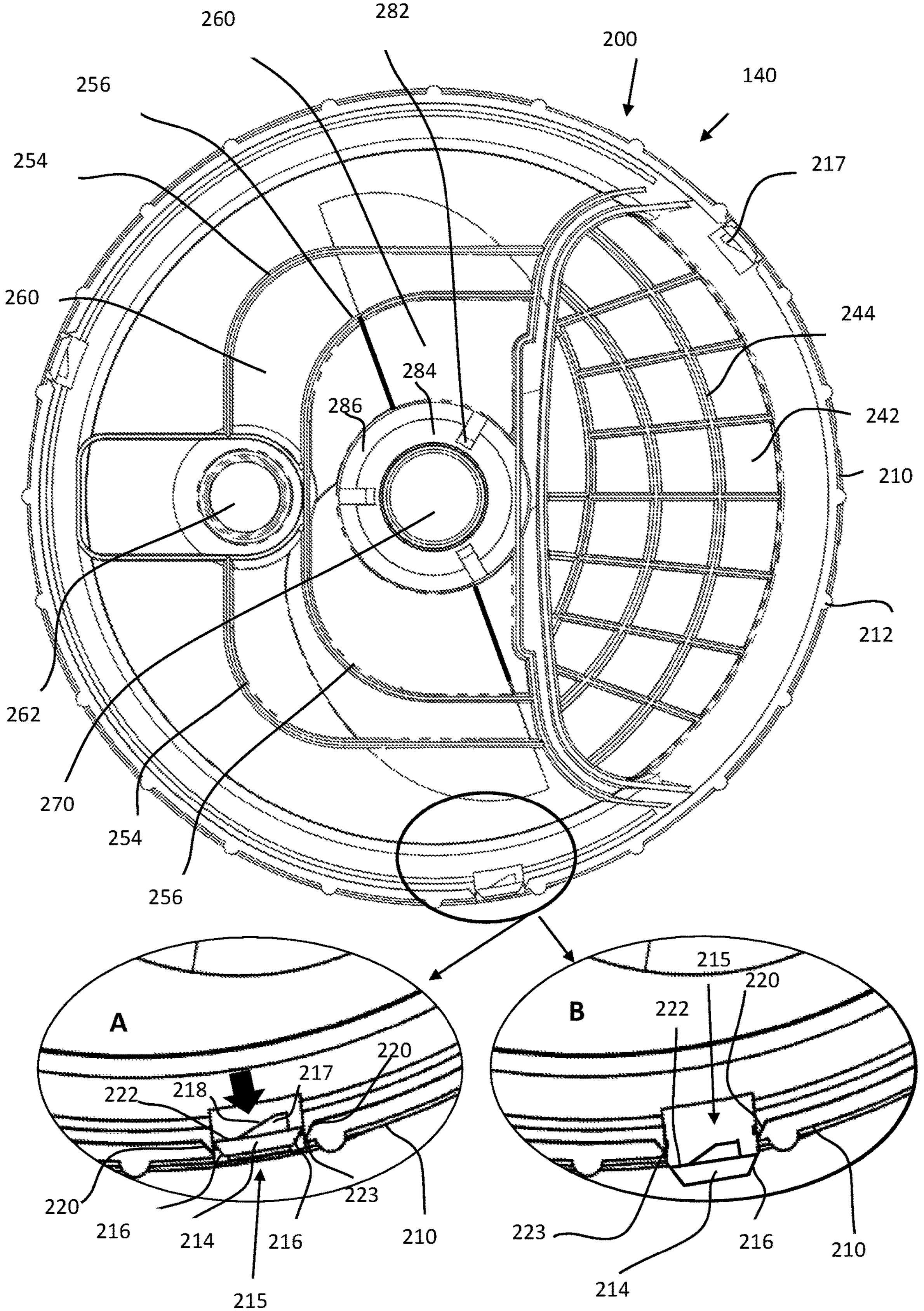
FIGS. 5A, 5B, 5C, 5D, 5E, 5F, 5G, 5H and 5I are simplified respective planar top, planar bottom, pictorial top, pictorial bottom, first planar sectional, second planar sectional, third planar sectional, pictorial sectional and bottom pictorial illustrations of a lid of the single-use cover seal of FIGS. 2A-3B, FIGS. 5E and 5F being taken along respective section lines E-E and F-F in FIG. 5B and FIGS. 5G and 5H both being taken along section lines G-G in FIG. 5B.
Figure 5B:
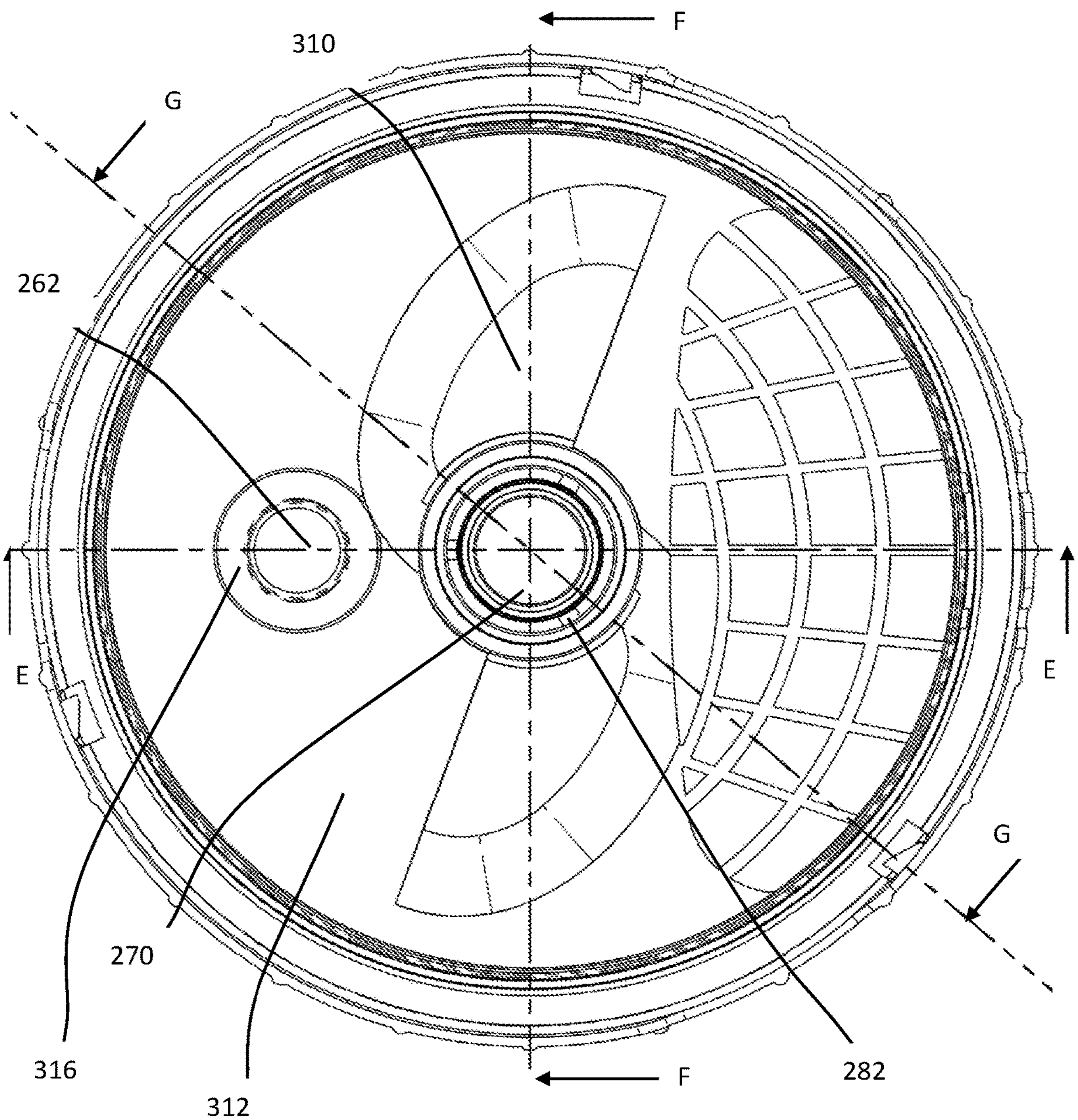
Figure 5C:
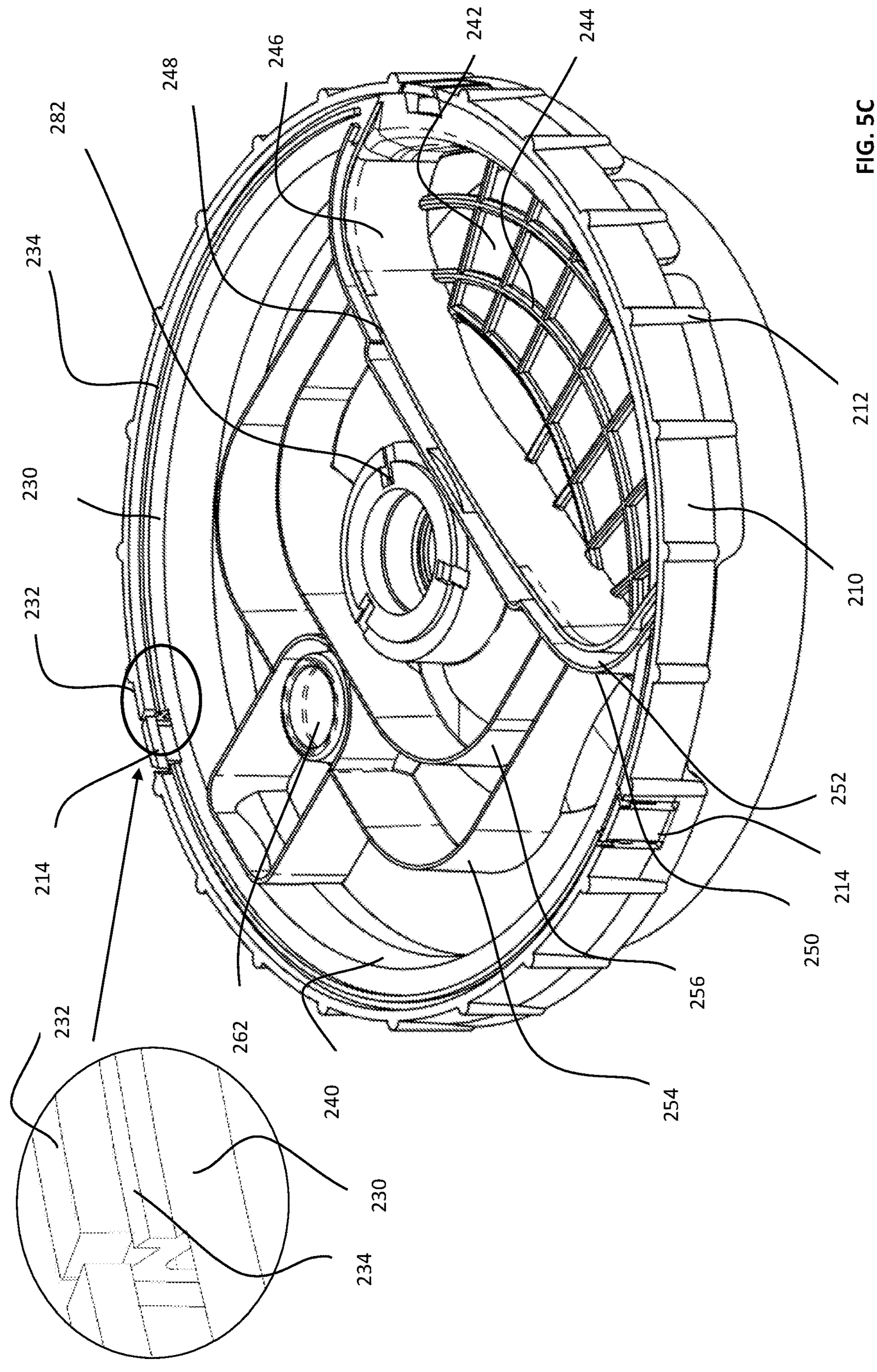
Figure 5D:
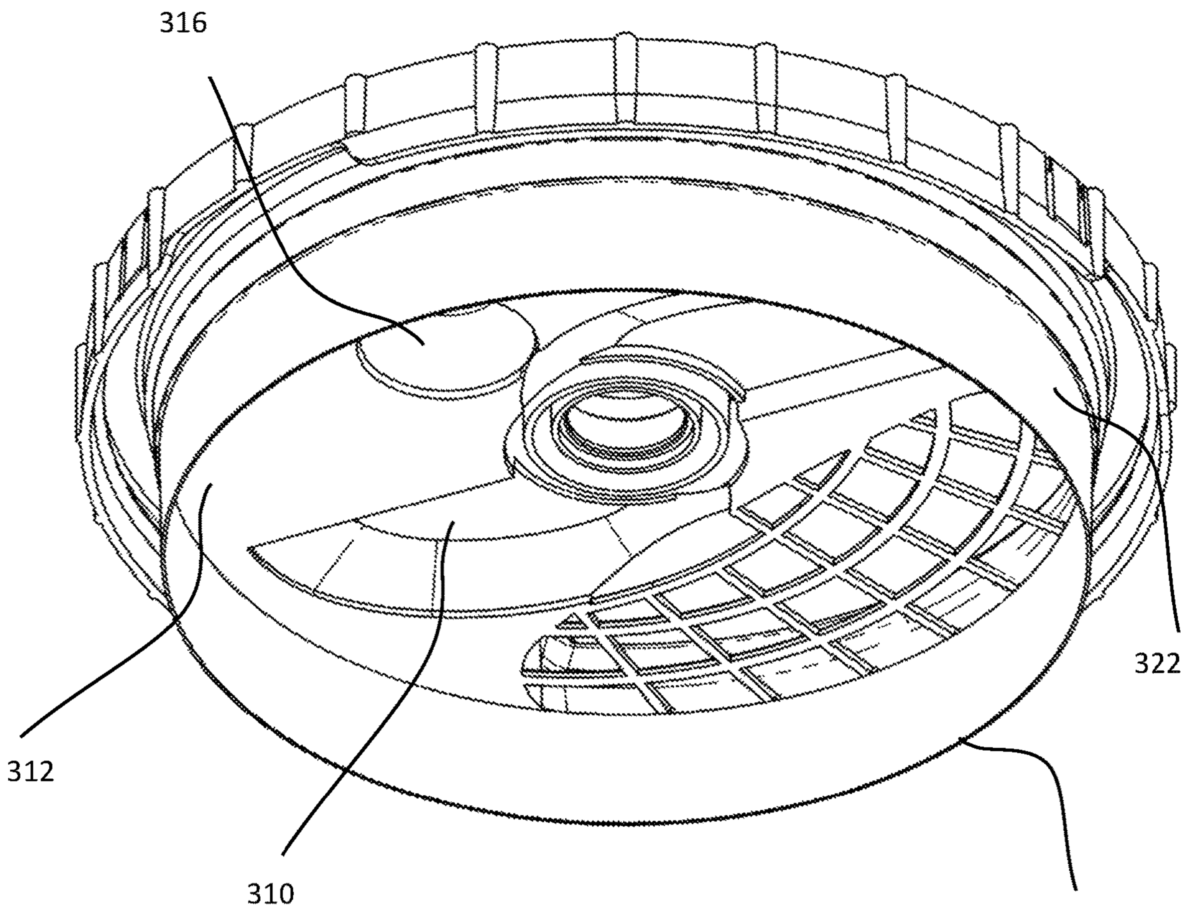
Figure 5E:
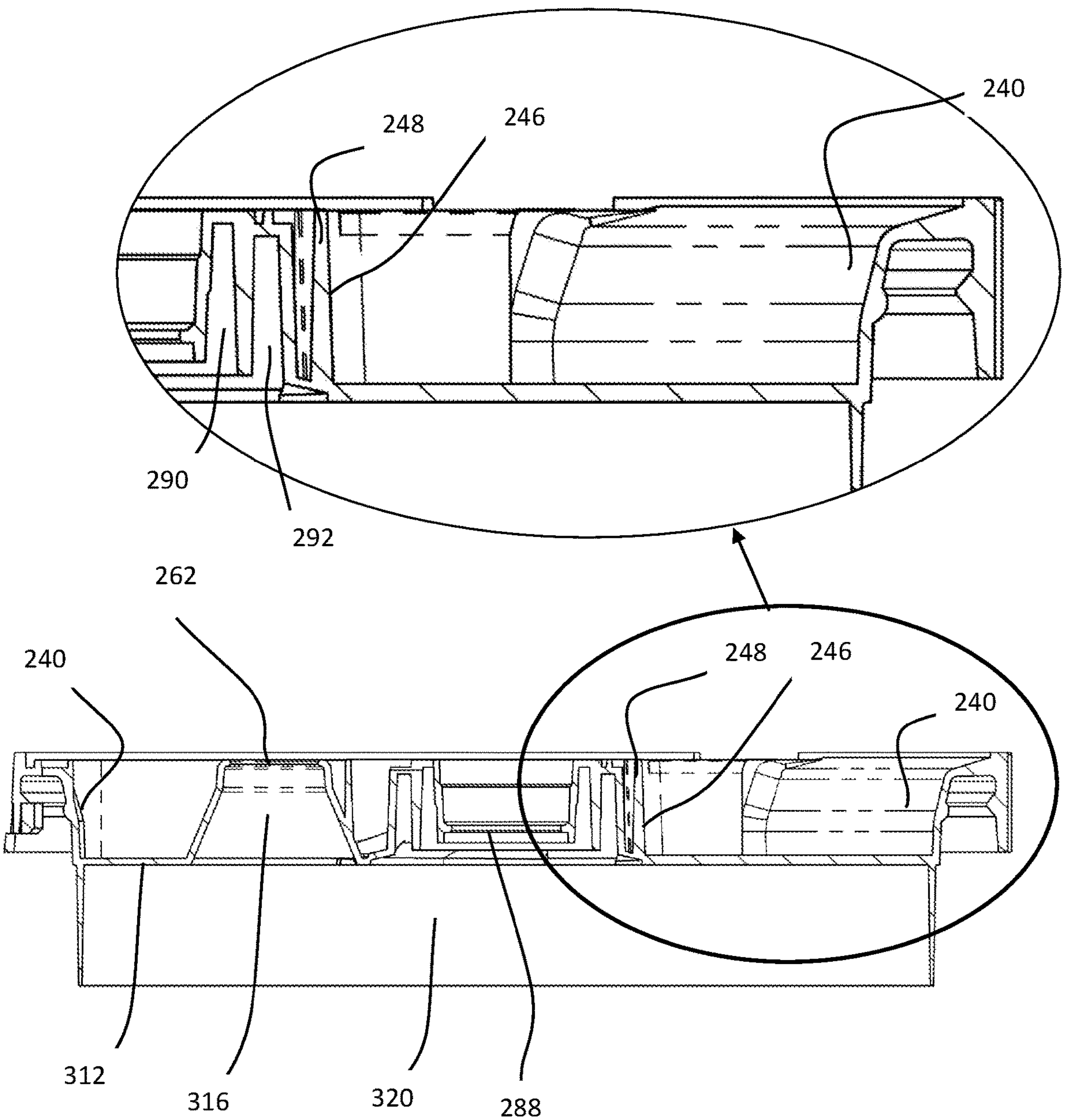

Prior to tamper and use, as seen in enlargement A of FIG. 5A, tapered mutually circumferentially spaced edge surfaces 216 of each of tabs 214 are arranged in mutually spaced parallel arrangement with corresponding tapered mutually circumferentially spaced edge surfaces 220 of circumferential edge surface 210, such that tabs 214 can, principally due to flexibility thereof, be forced radially outwardly through openings 215.

The arrangement of tabs 214 and openings 215 is such that following use or tampering, as seen in enlargement B of FIG. 5A, tabs 214 are displaced radially outwardly through openings 215 such that edge surfaces 216 lie radially outwardly of edge surfaces 220 and are prevented from returning to their original position by engagement of a relatively wide radially inwardly-facing surface 222 of tabs 214 with radially outwardly-facing edges 223 of circumferential edge surface 210 alongside opening 215. This is seen more clearly with reference to FIGS. 5J-5M.

It is a particular feature of this embodiment of the present invention that generally circumferential edge surface 210 is preferably formed with a plurality of cut outs 224, best seen in FIG. 5I, which are provided to enable clamping of the SUPCA 100 to a container contents processor, such as a multiple motion intelligent driving device (MMIDD) (FIGS. 10A-10C), during operation thereof, as will be described hereinbelow in detail.

Figure 5F:
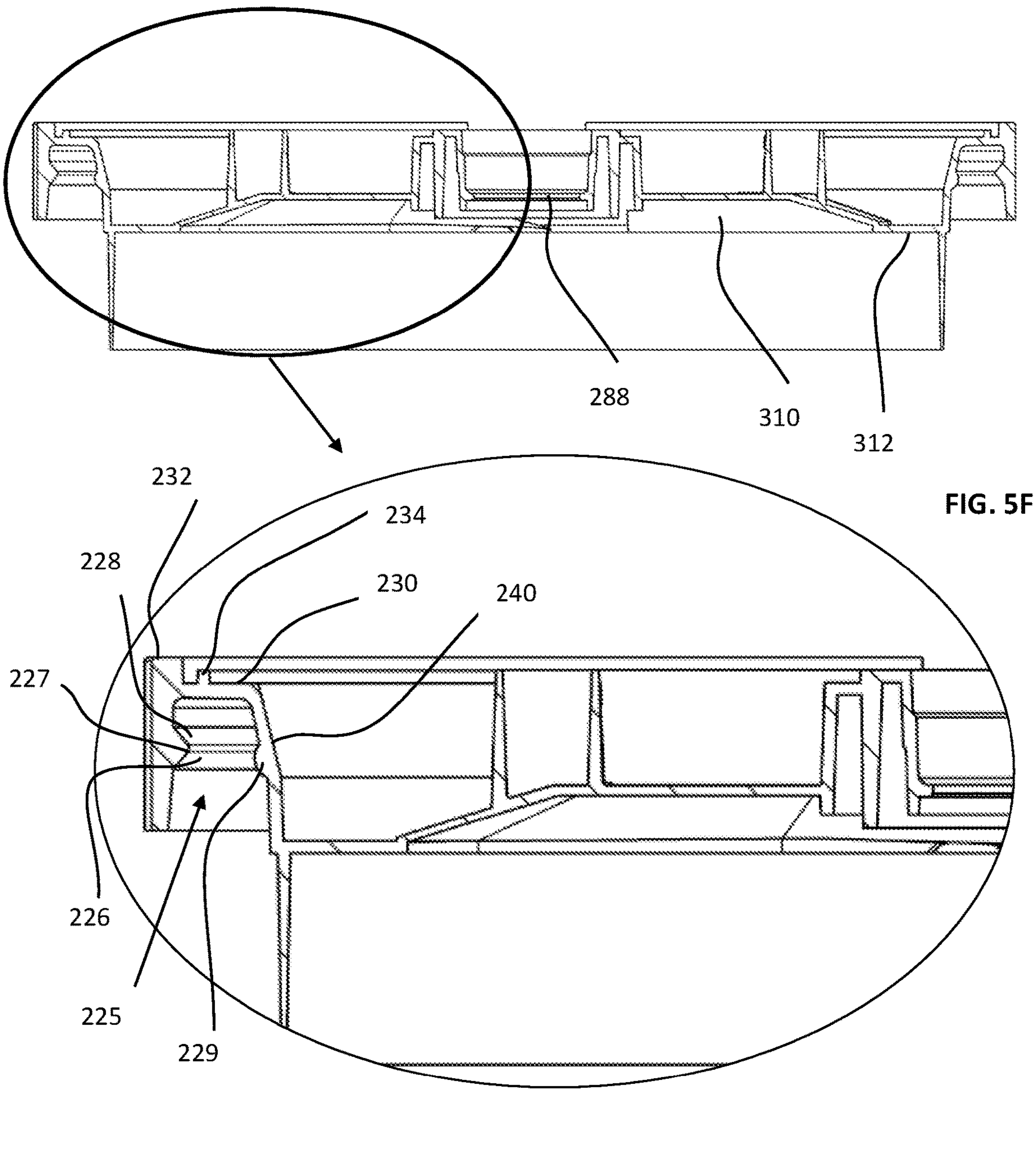
Figure 5G:
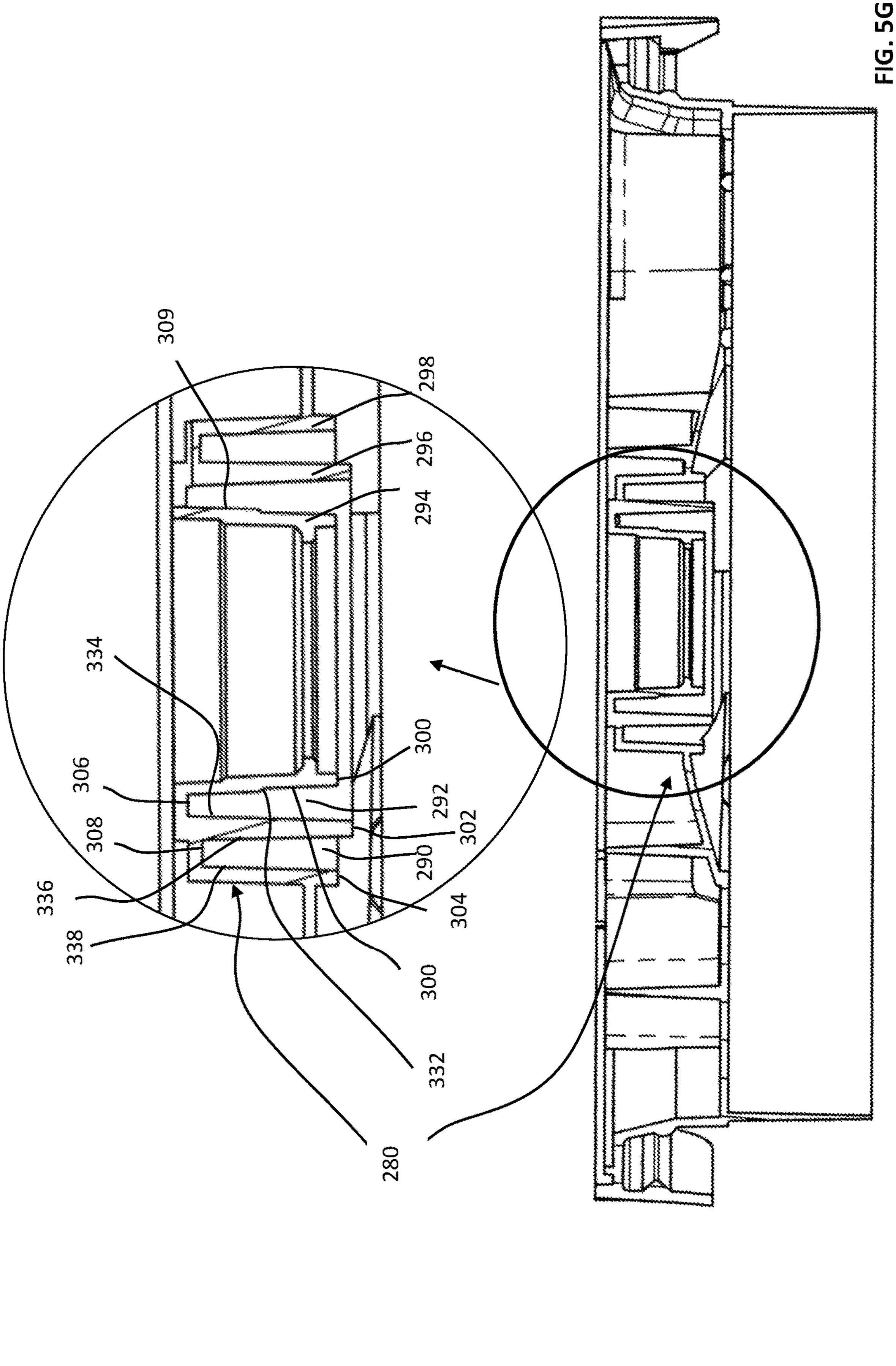
Figure 5H:
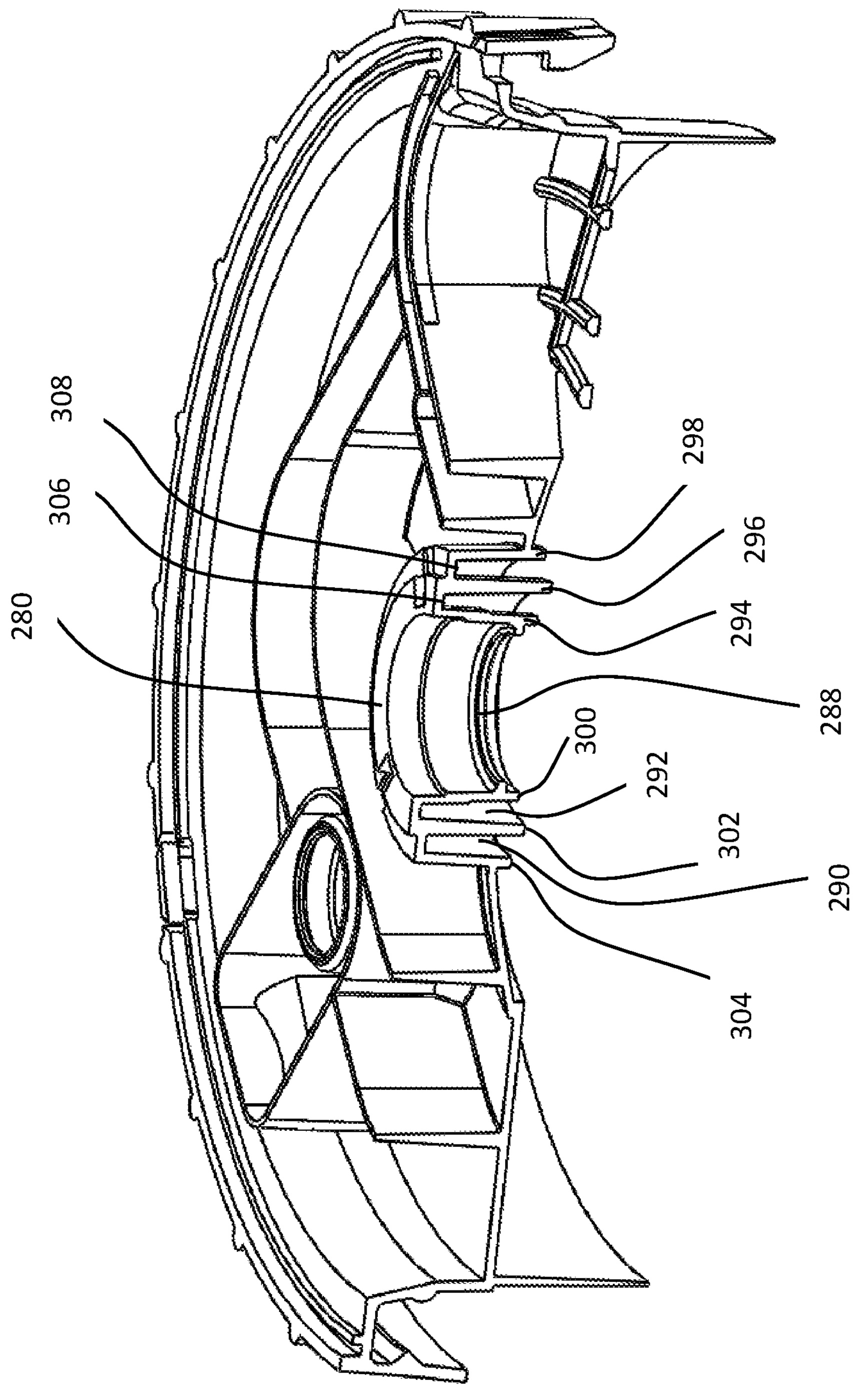
Figure 5I:
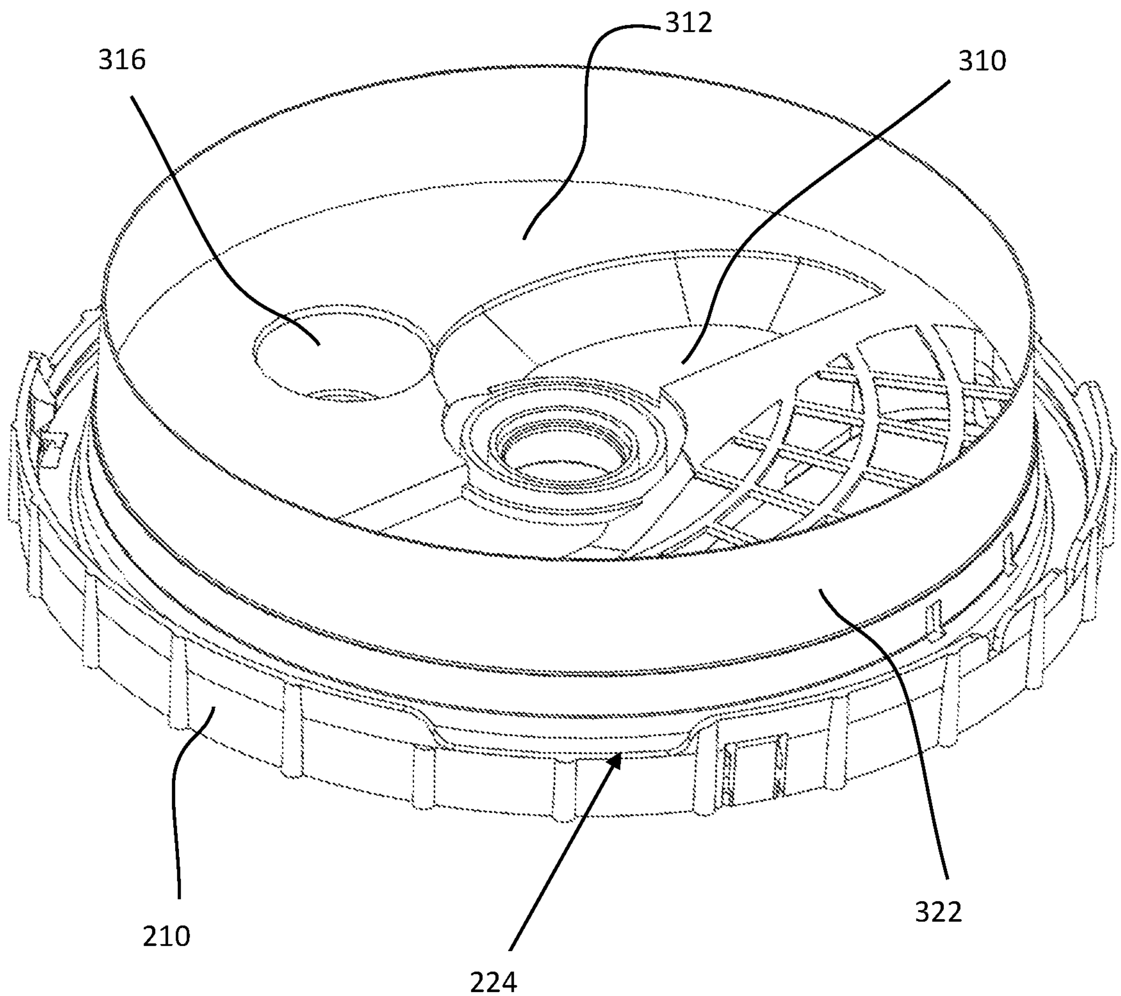
Figure 5J:
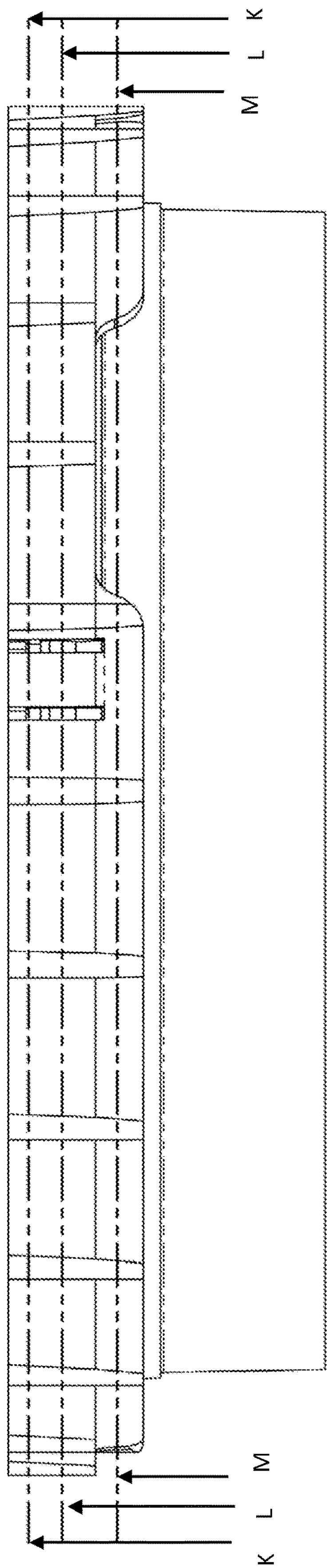
FIG. 5J is a simplified side view illustration of the lid of FIGS. 5A-5I.
Figure 5K:
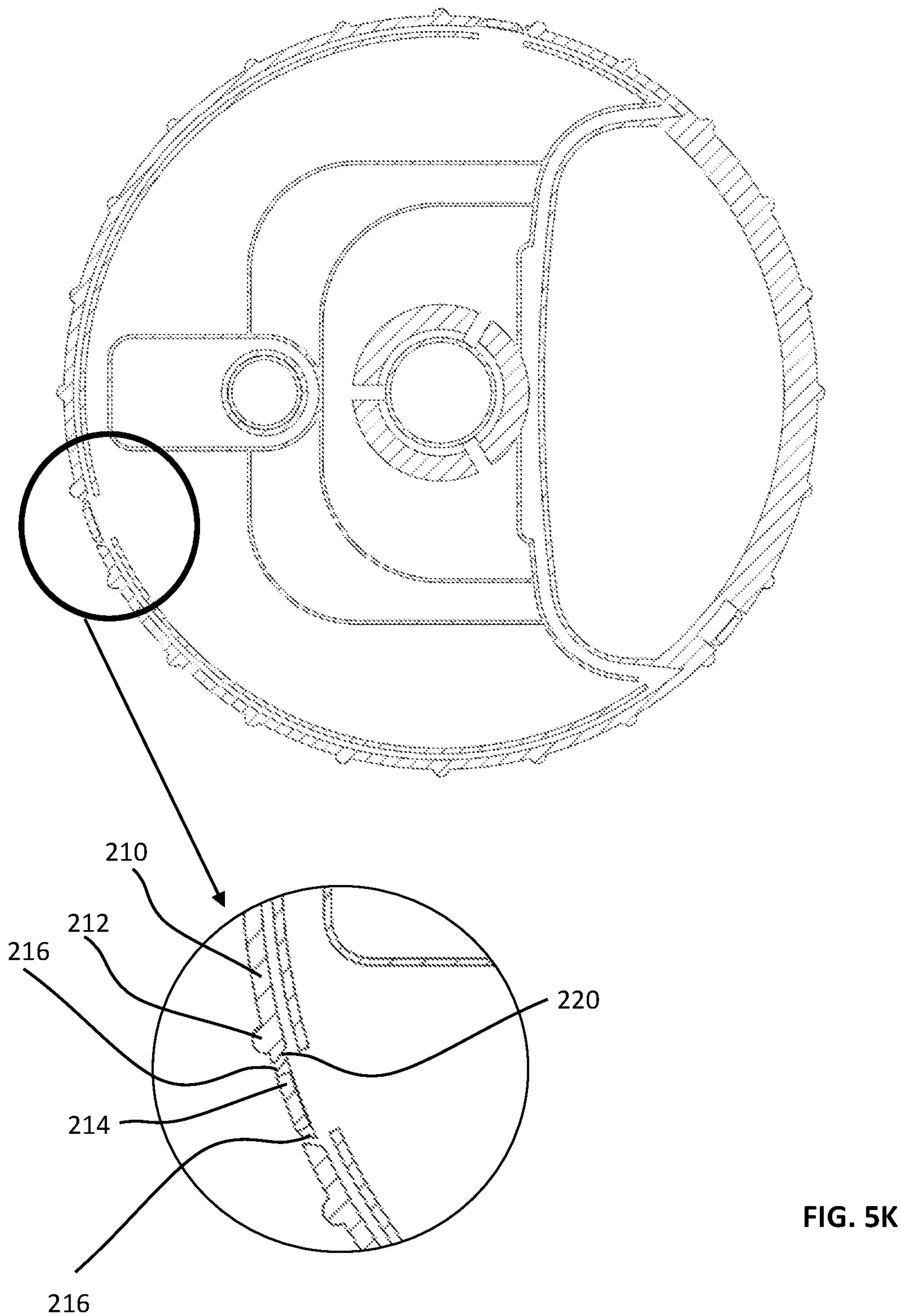
FIGS. 5K, 5L and 5M are simplified sectional illustrations taken along respective lines K-K, L-L and M-M in FIG. 5J.
Figure 5L:
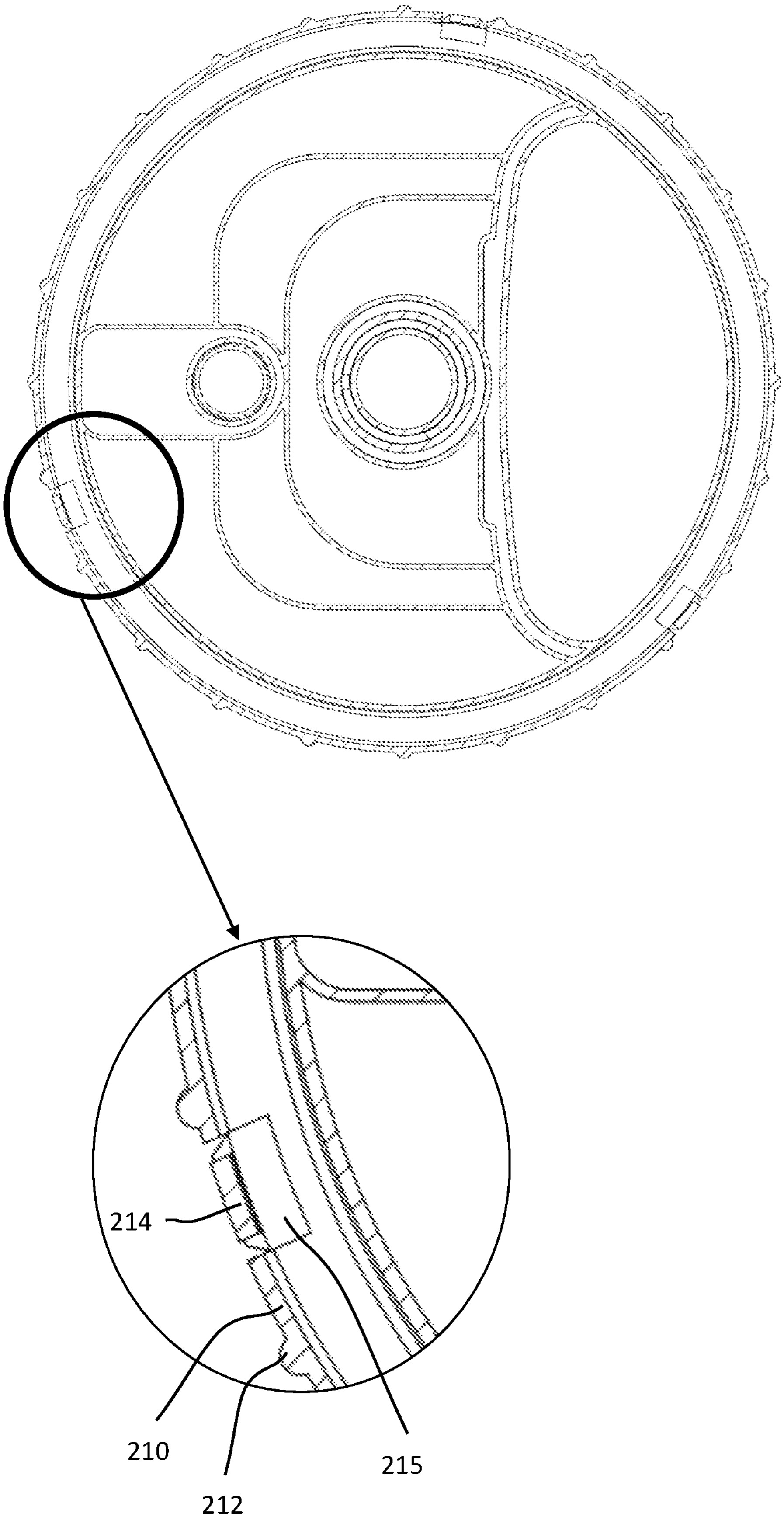
Figure 5M:
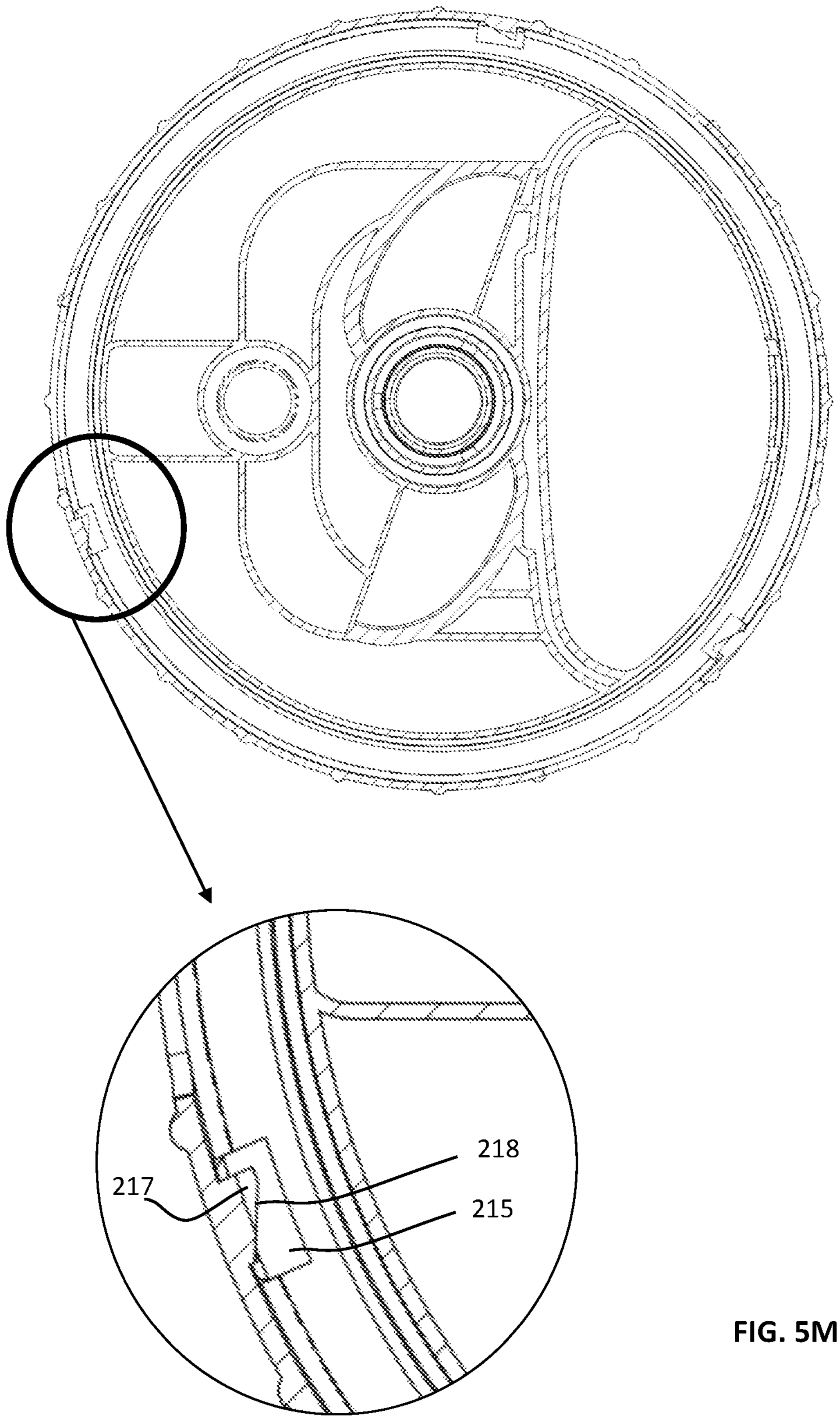
Figure 6A:
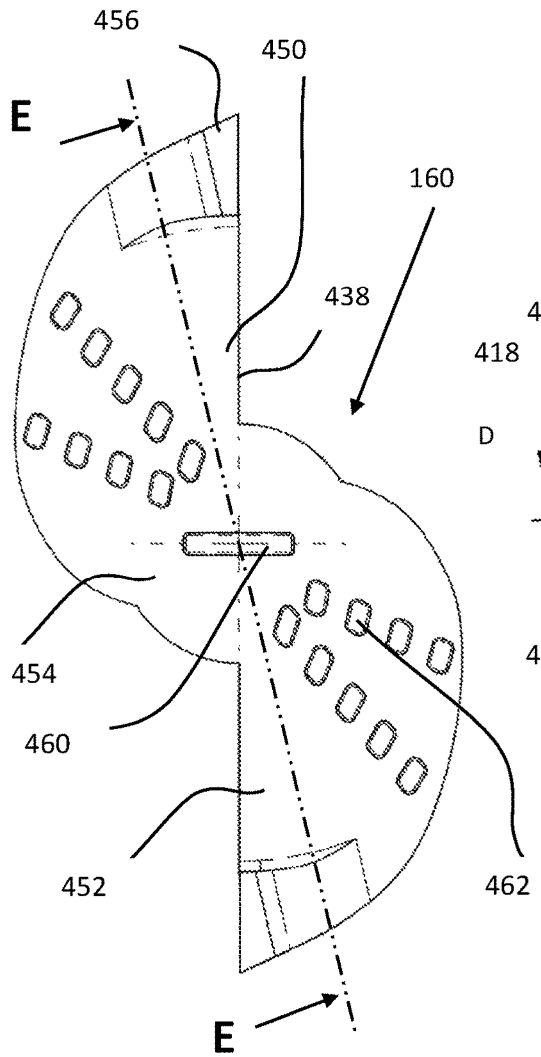
FIGS. 6A, 6B, 6C, 6D and 6E are simplified respective planar top, planar bottom, pictorial bottom, planar sectional and pictorial sectional illustrations of a preferred embodiment of a blade of the single-use cover seal of FIGS. 2A-3B, FIGS. 6D and 6E being taken along respective section lines D-D in FIG. 6B and E-E in FIG. 6A.
Figure 6B:
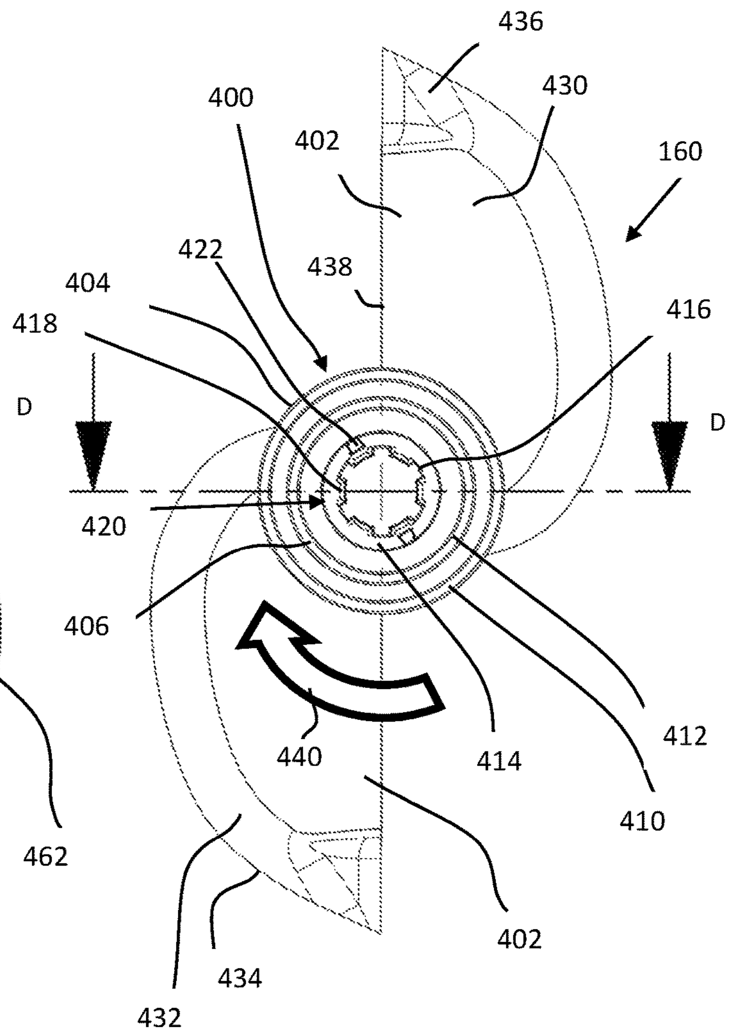
Figure 6C:
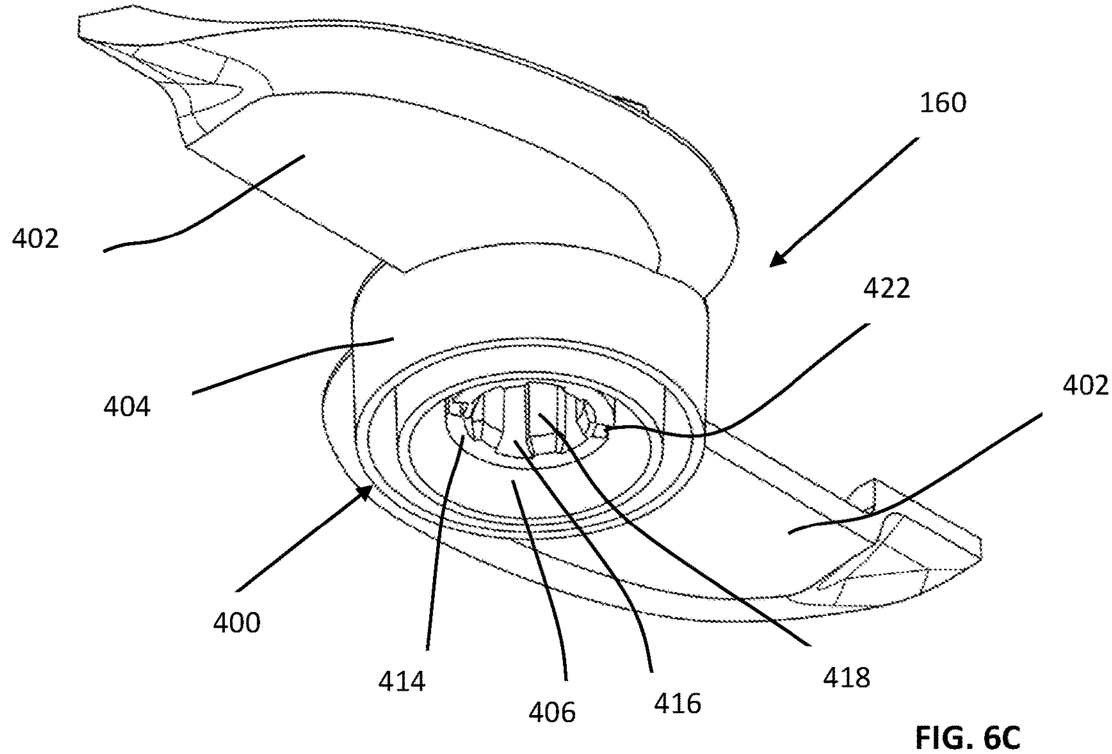
Figure 6D:
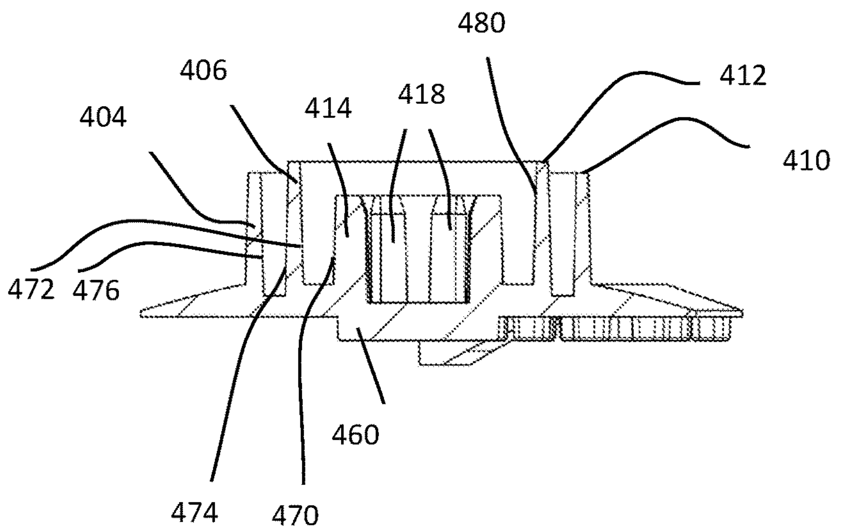
Figure 6E:
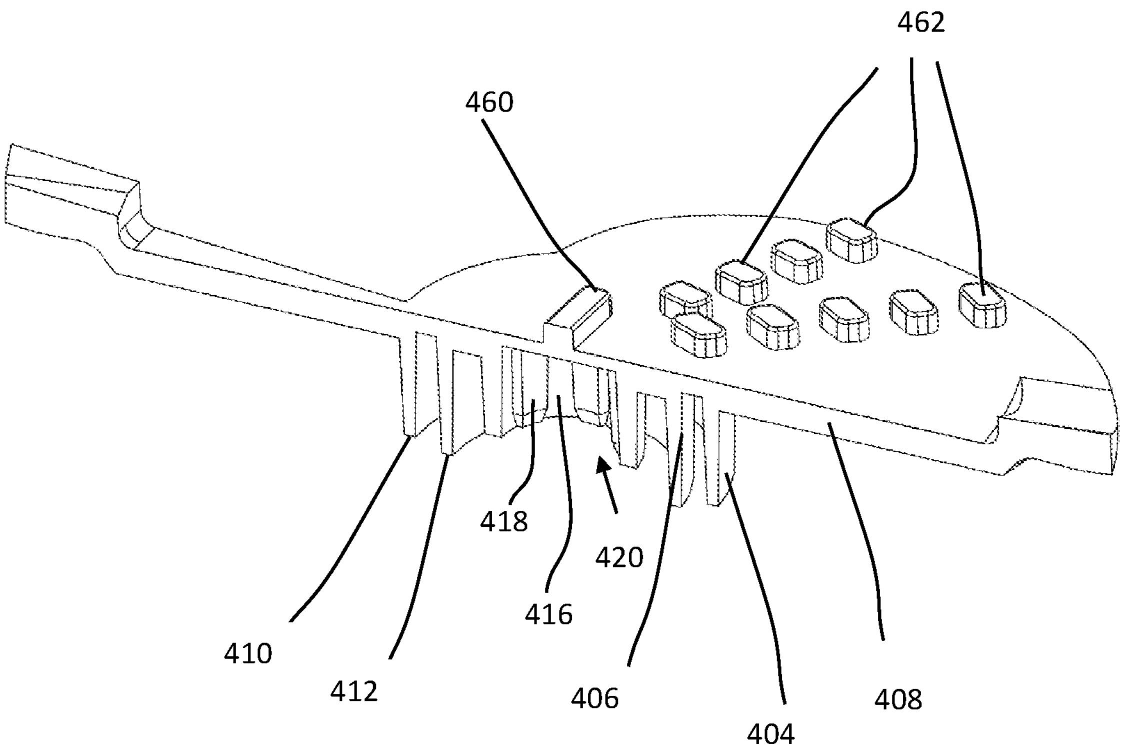
Figure 7A:
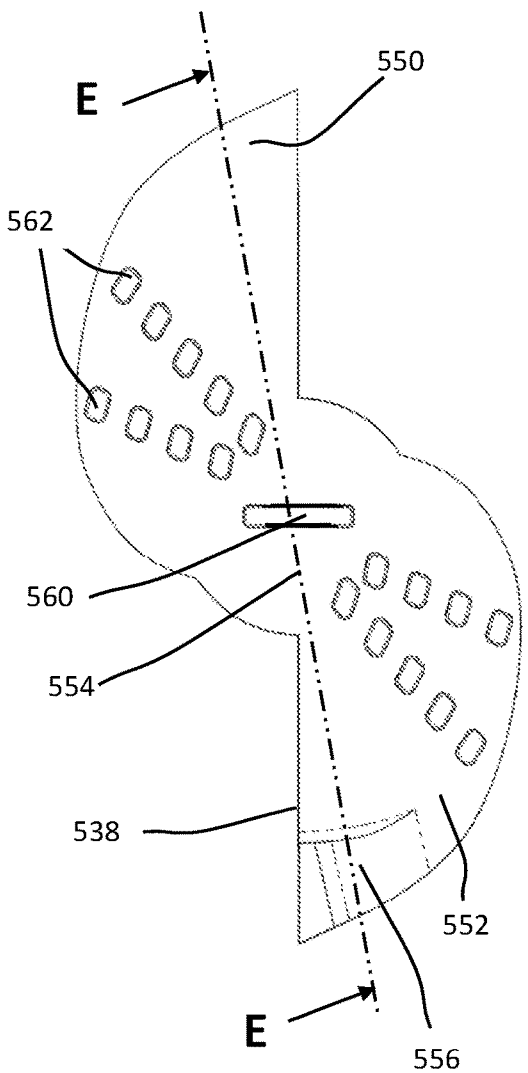
FIGS. 7A, 7B, 7C, 7D and 7E are simplified respective planar top, planar bottom, pictorial bottom, planar sectional and pictorial sectional illustrations of an alternative embodiment of a blade of the single-use cover seal of FIGS. 2A-3B, FIGS. 7D and 7E being taken along respective section lines D-D in FIG. 7B and E-E in FIG. 7A.
Figure 7B:
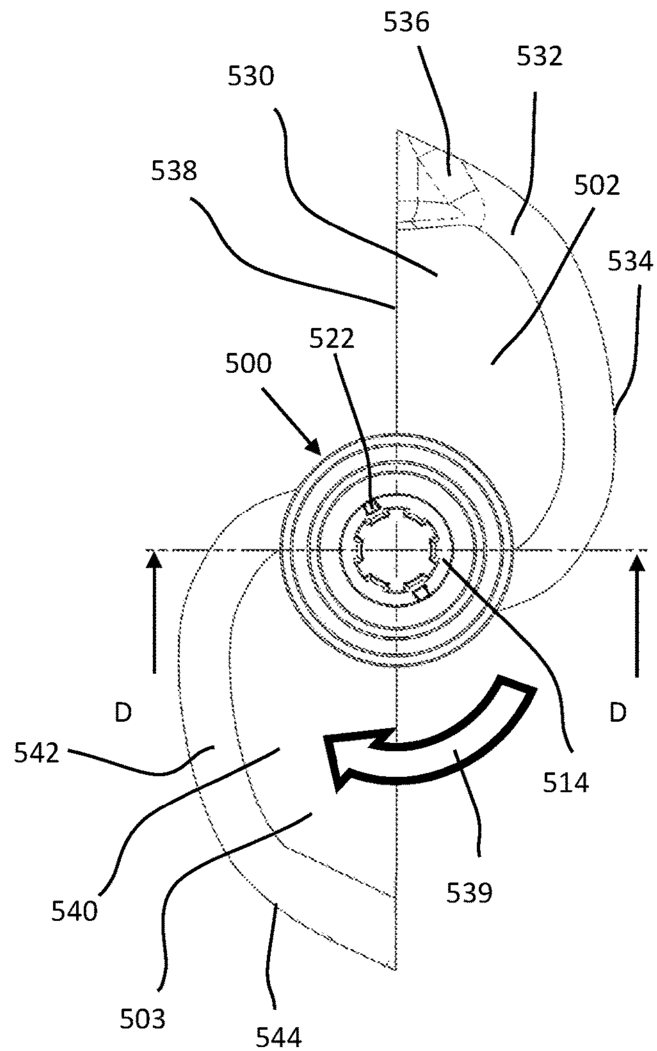
Figure 7C:
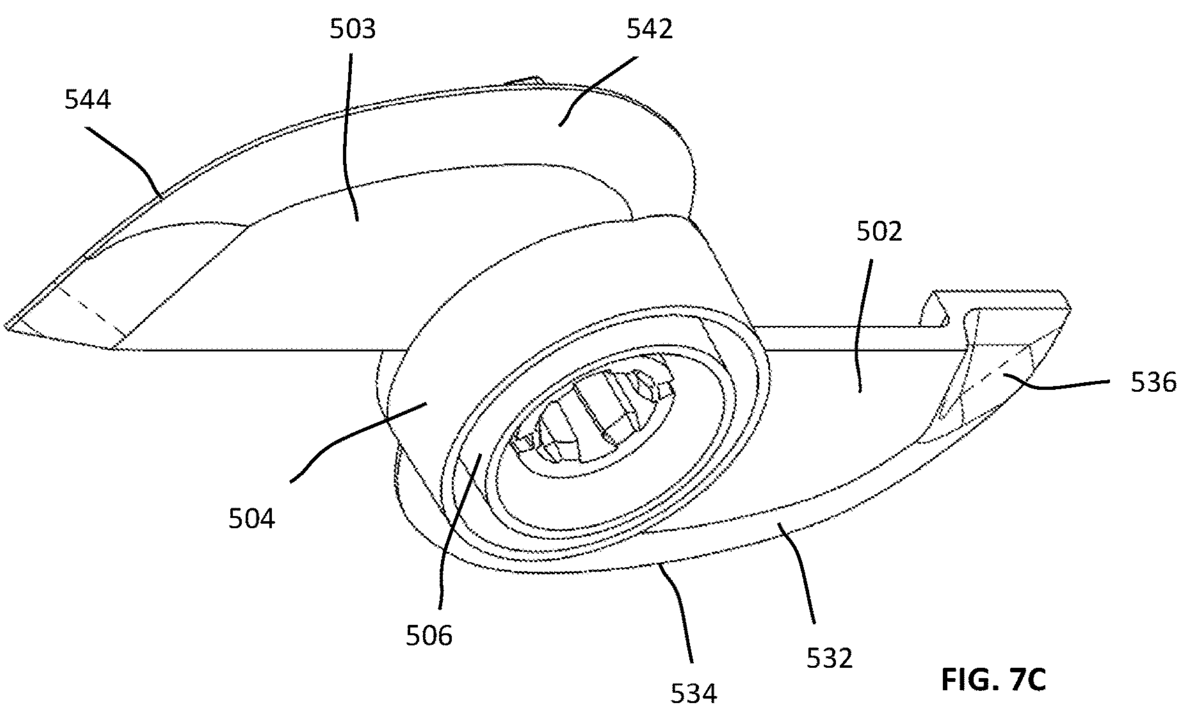
Figure 7D:
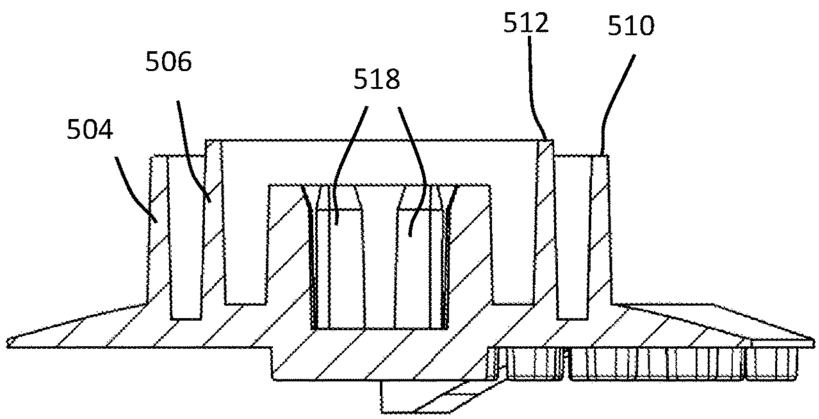
Figure 7E:
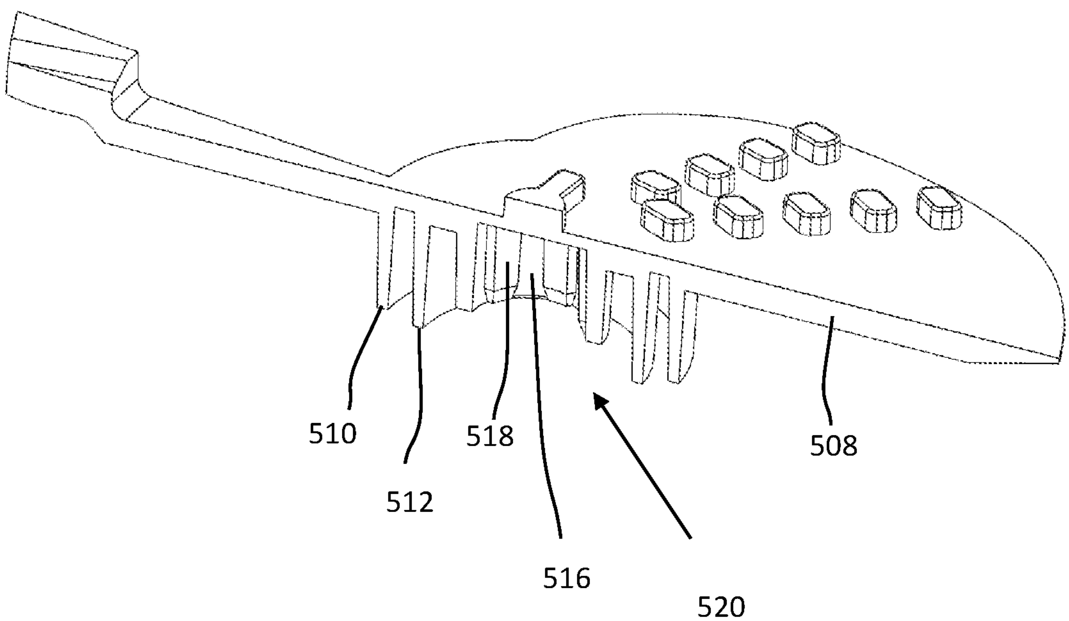
Figure 8A:
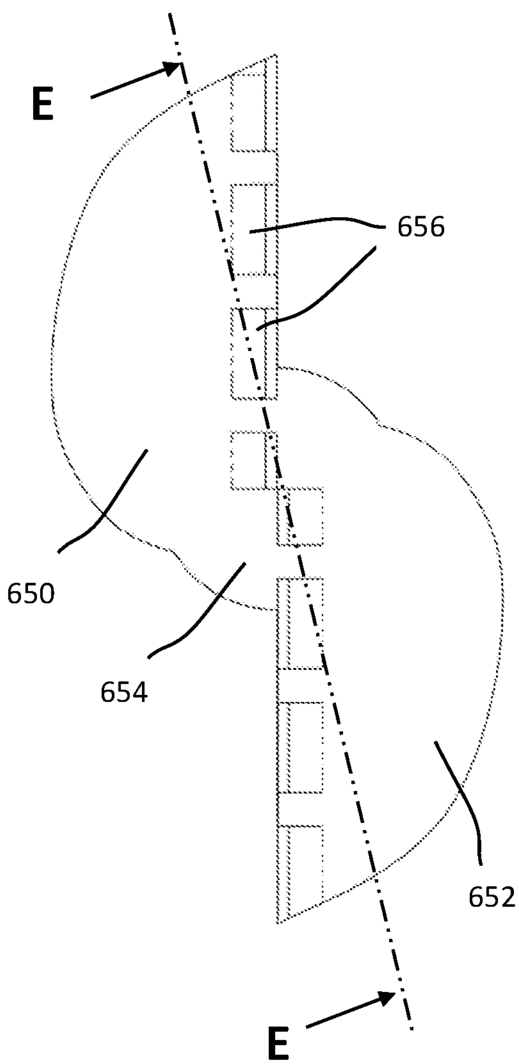
FIGS. 8A, 8B, 8C, 8D and 8E are simplified respective planar top, planar bottom, pictorial bottom, planar sectional and pictorial sectional illustrations of a further alternative embodiment of a blade of the single-use cover seal of FIGS. 2A-3B, FIGS. 8D and 8E being taken along respective section lines D-D in FIG. 8B and E-E in FIG. 8A.
Figure 8B:
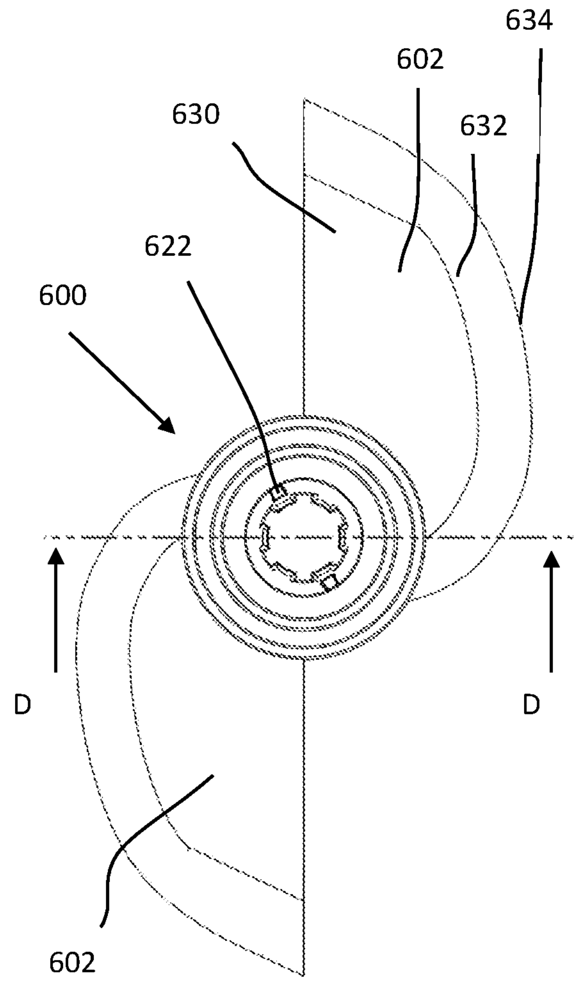
Figure 8C:
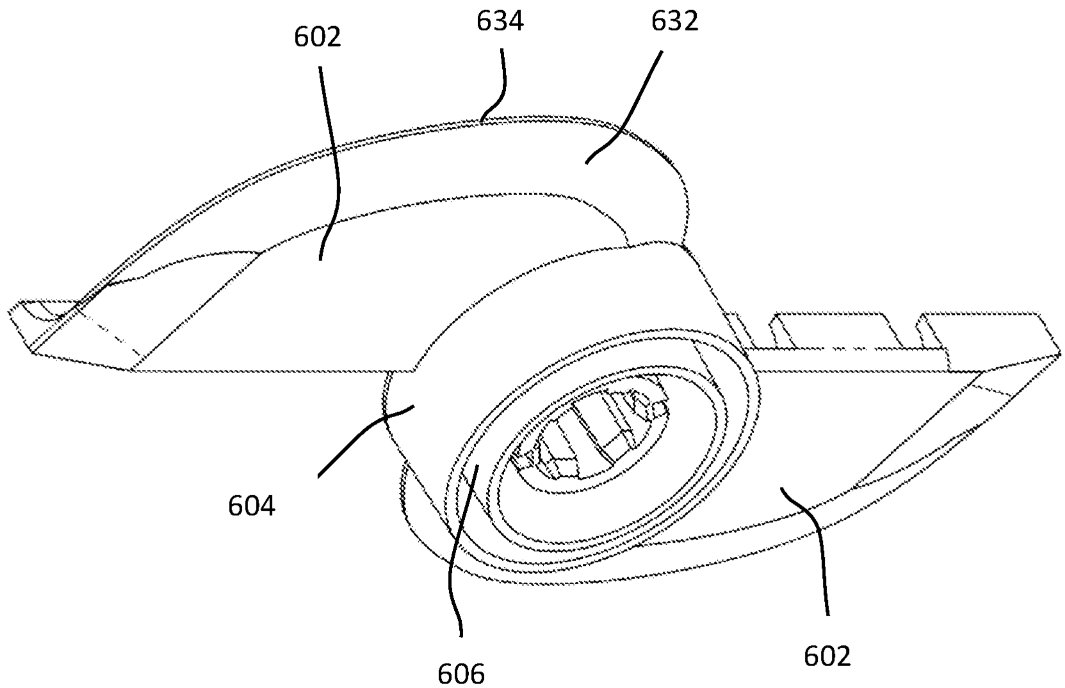
Figure 8D:
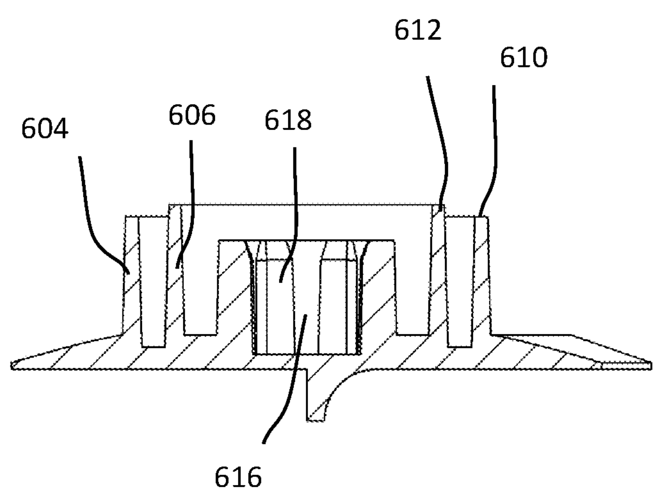
Figure 8E:
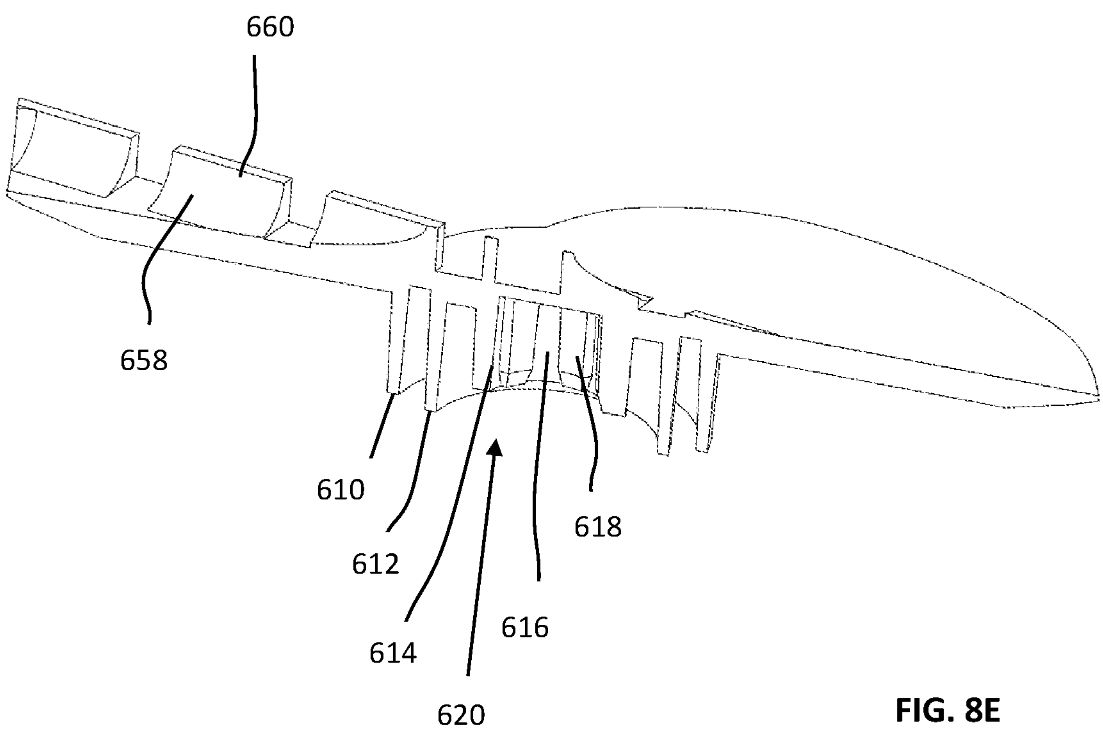

It is also a particular feature of this embodiment of the present invention that, as seen best in FIGS. 5F, 5G and 5H, interiorly of circumferential edge surface 210 there is defined an annular clamping recess 225 for removable engagement with container body 102. Annular clamping recess 225 preferably includes a downward-facing, in the sense of FIG. 5F, tapered annular surface 226, an inwardly facing edge surface 227, an upward-facing, in the sense of FIG. 5F, tapered annular surface 228 and a radially outwardly facing sealing surface 229.

Inwardly of generally circumferential edge surface 210 is a generally planar annular surface 230, which lies slightly below a top edge 232 of edge surface 210. A generally circular protrusion 234 extends upwardly, in the sense of FIG. 1A, from annular surface 230.

Extending downwardly, in the sense of FIG. 1A, from annular surface 230 is a radially inwardly slightly tapered circumferential surface 240. Extending inwardly of radially inwardly circumferential surface 240 along a portion of the extent thereof, typically about one-third of the circumference thereof, is a liquid ingress opening 242 formed with a protective grid 244, which is engaged by cover surface 198 of cover 130 when the liquid ingress opening cover 193 is in its closed and sealed operative orientation. The periphery of liquid ingress opening 242 is partially defined by surface 240 and partially by a surface 246 of a wall 248.

An additional wall 250 is spaced from wall 248 and defines therewith a volume 252 which partially accommodates integral hinge 194 of cover 130.

Extending from wall 250 in a direction opposite to liquid ingress opening 242 are a pair of curved mutually separated walls 254 and 256, which may provide structural support to cover 130, when welded to lid 140, and which may define one or more sealed leaked fluid reservoir volumes 260.

A straw communication aperture 262 is preferably provided adjacent leaked fluid reservoir volumes 260.

Located generally at the center of lid 140 is a rotary drive aperture 270, which is surrounded by a multiple walled sealing structure 280, preferably having a plurality of leaked fluid egress apertures 282, which communicate with one or more sealed leaked fluid reservoir volumes 260. Apertures 282 are distributed along a generally annular planar inner surface 284 which surrounds aperture 270. Surrounding surface 284 and generally downwardly stepped with respected thereto is a generally annular planar surface 286.

Cover 130 is preferably welded to lid 140 at the intersections respectively of an inner edge of annular surface 284, annular surface 230, and protrusion 234 with corresponding surfaces of downwardly-facing protrusions 177, 178, and 180 of cover 130.

An upwardly-facing partially tapered and partially flat annular surface 288 is defined interiorly of aperture 270.

Turning now particularly to FIGS. 5A, 5B and 5E-5H, it is seen that multiple walled sealing structure 280 preferably comprises at least two mutually concentric downwardly-facing recesses 290 and 292, in the sense of FIG. 5H, which are sealingly engaged by corresponding protrusions of the blade 160, as described in detail hereinbelow. Recesses 290 and 292 are defined by three mutually concentric walls 294, 296 and 298, having respective downwardly facing annular edges 300, 302 and 304 and by base surfaces 306 and 308 extending respectively between walls 294 & 296 and 296 & 298. Base surfaces 306 and 308 generally underlie respective annular surfaces 284 and 286. Wall 294 preferably defines a radially outwardly facing internal circumferential static sealing surface 309, which intersections with base surface 306.

A downwardly-facing blade receiving recess 310 is defined in a downwardly facing, generally planar surface 312 of lid 140.

A truncated conical recess 316 is preferably defined with respect to surface 312 about straw communication aperture 262.

Generally coextensive with radially inwardly circumferential surface 240 and extending downwardly from generally planar surface 312 is a circumferential wall 320 having an outer surface 322 which preferably sealingly engages an interior surface of wall 106 of container body 102 when SUCSERDREA 120 is fully engaged with the single-use container body 102.

It is appreciated that walls 294, 296 and 298 also define dynamic sealing surfaces as described hereinbelow:

Wall 294 defines a dynamic radially outwardly facing circumferential sealing surface 330 which is joined by a circumferential tapered junction surface 332 to static sealing surface 309.

Wall 296 defines a dynamic radially inwardly facing circumferential sealing surface 334 which faces surfaces 309, 330 and 332.

Wall 296 also defines a dynamic radially outwardly facing circumferential sealing surface 336.

Wall 298 defines a dynamic radially inwardly facing circumferential sealing surface 338.

Reference is now made to FIGS. 6A-6E, which illustrate a preferred embodiment of blade 160 of SUCSERDREA 120.

As seen in FIGS. 6A-6E, blade 160 comprises a unitary element, preferably injection molded from polypropylene and including a central driving and sealing portion 400 and a pair of blade portions 402 extending radially outwardly therefrom in opposite directions. Central driving and sealing portion 400 comprises a pair of mutually radially spaced, concentric sealing walls 404 and 406 extending upwardly in the sense of FIGS. 1A & 1B from a wall 408 and defining respective upwardly facing annular surfaces 410 and 412. Interiorly of wall 406 and radially spaced therefrom and concentric therewith is a drive shaft engaging wall 414 having, on a radially inwardly-facing surface 416 thereof, an arrangement of splines 418, which engage corresponding splines on a drive shaft of a container contents processor, such as a multiple motion intelligent driving device (MMIDD) (FIGS. 10A-10C), and together with a portion of surface 412 define a drive shaft seating recess 420. Drive shaft engaging wall 414 is also provided with a pair of recesses 422 for positioning of the hub 150 with respect thereto.

Blade portions 402 each define a top-facing surface in the sense of FIGS. 1A & 1B, which includes a planar portion 430 and a tapered portion 432 which terminates at a curved cutting edge 434. The tapered portion 432 includes a further downwardly and circumferentially tapered portion 436 alongside a trailing edge 438 of blade portion 402, defined with respect to a blade rotation direction indicated by an arrow 440.

A bottom-facing surface 450 of blade 160 preferably includes a generally planar surface 452, which extends over central driving and sealing portion 400 and most of blade portions 402. Generally planar surface 452 may have a slightly downwardly-extending central dome 454. Also formed on bottom-facing surface 450 are one or two downwardly and circumferentially tapered portions 456 alongside trailing edge 438 of blade portions 402, which underlie tapered portions 436. Formed on planar surface 452 are preferably a central protrusion 460 and a plurality of mutually spaced radially distributed protrusions 462.

It is appreciated that walls 414, 406 and 404 define dynamic sealing surfaces as described hereinbelow:

Wall 414 defines a dynamic radially outwardly facing circumferential sealing surface 470.

Wall 406 defines a dynamic radially inwardly facing circumferential sealing surface 472 which faces surface 470.

Wall 406 also defines a dynamic radially outwardly facing circumferential sealing surface 474.

Wall 404 defines a dynamic radially inwardly facing circumferential sealing surface 476.

It is appreciated that an inner disposed portion 480 of surface 472 also defines a static sealing surface.

Reference is now made to FIGS. 7A-7E, which illustrate an alternative embodiment of a blade for SUCSERDREA 120.

As seen in FIGS. 7A-7E, the blade comprises a unitary element, preferably injection molded from polypropylene and including a central driving and sealing portion 500 and a pair of blade portions 502 and 503 extending radially outwardly therefrom in opposite directions. Central driving and sealing portion 500 comprises a pair of mutually radially spaced, concentric sealing walls 504 and 506 extending upwardly, in the sense of FIGS. 1A & 1B, from a wall 508 and defining respective upwardly facing annular surfaces 510 and 512. Interiorly of wall 506 and radially spaced therefrom and concentric therewith is a drive shaft engaging wall 514 having, on a radially inwardly-facing surface 516 thereof, an arrangement of splines 518, which engage corresponding splines on a drive shaft of a container contents processor, such as a multiple motion intelligent driving device (MMIDD) (FIGS. 10A-10C), and, together with a portion of surface 512, define a drive shaft seating recess 520. Drive shaft engaging wall 514 is also provided with a pair of recesses 522 for positioning of hub 150 with respect thereto.

Blade portion 502 defines a top-facing surface, in the sense of FIGS. 1A & 1B, which includes a planar portion 530 and a tapered portion 532 which terminates at a curved cutting edge 534. The tapered portion 532 includes a further downwardly and circumferentially tapered portion 536 alongside a trailing edge 538 of blade portion 502, defined with respect to a blade rotation direction indicated by an arrow 539.

Blade portion 503 defines a top-facing surface in the sense of FIGS. 1A & 1B, which includes a planar portion 540 and a tapered portion 542 which terminates at a curved cutting edge 544.

A bottom-facing surface 550 preferably includes a generally planar surface 552, which extends over central driving and sealing portion 500 and most of blade portions 502 and 503. Generally planar surface 552 may have a slightly downwardly-extending central dome 554. Also formed on bottom-facing surface 550 is one downwardly and circumferentially tapered portion 556 alongside trailing edge 538 of blade portion 502, which underlies tapered portion 536 thereof. Formed on planar surface 552 are preferably a central protrusion 560 and a plurality of mutually spaced radially distributed protrusions 562.

Reference is now made to FIGS. 8A-8E, which illustrate another alternative embodiment of a blade of SUCSERDREA 120.

As seen in FIGS. 8A-8E, the blade comprises a unitary element, preferably injection molded from polypropylene and including a central driving and sealing portion 600 and a pair of blade portions 602 extending radially outwardly therefrom in opposite directions. Central driving and sealing portion 600 comprises a pair of mutually radially spaced, concentric sealing walls 604 and 606 extending upwardly, in the sense of FIGS. 1A & 1B, from an upwardly facing surface 608 and defining respective upwardly facing annular surfaces 610 and 612. Interiorly of wall 606 and radially spaced therefrom and concentric therewith is a drive shaft engaging wall 614 having, on a radially inwardly-facing surface 616 thereof, an arrangement of splines 618, which engage corresponding splines on a drive shaft of a container contents processor, such as a multiple motion intelligent driving device (MMIDD) (FIGS. 10A-10C), and, together with a portion of surface 612, define a drive shaft seating recess 620. Drive shaft engaging wall 614 is also provided with a pair of recesses 622 for positioning of hub 150 with respect thereto.

Blade portions 602 each define a top-facing surface in the sense of FIGS. 1A & 1B, which includes a planar portion 630 and a tapered portion 632 which terminates at a curved cutting edge 634.

A bottom-facing surface 650 preferably includes a generally planar surface 652, which extends over central driving and sealing portion 600 and most of blade portions 602. Generally planar surface 652 may have a slightly downwardly-extending central dome 654. Also formed on bottom-facing surface 650 are a row of mutually spaced downwardly-facing protrusions 656, each of which preferably has a downwardly curved tapered leading edge 658 and a downwardly extending trailing edge 660.

Figure 9A:
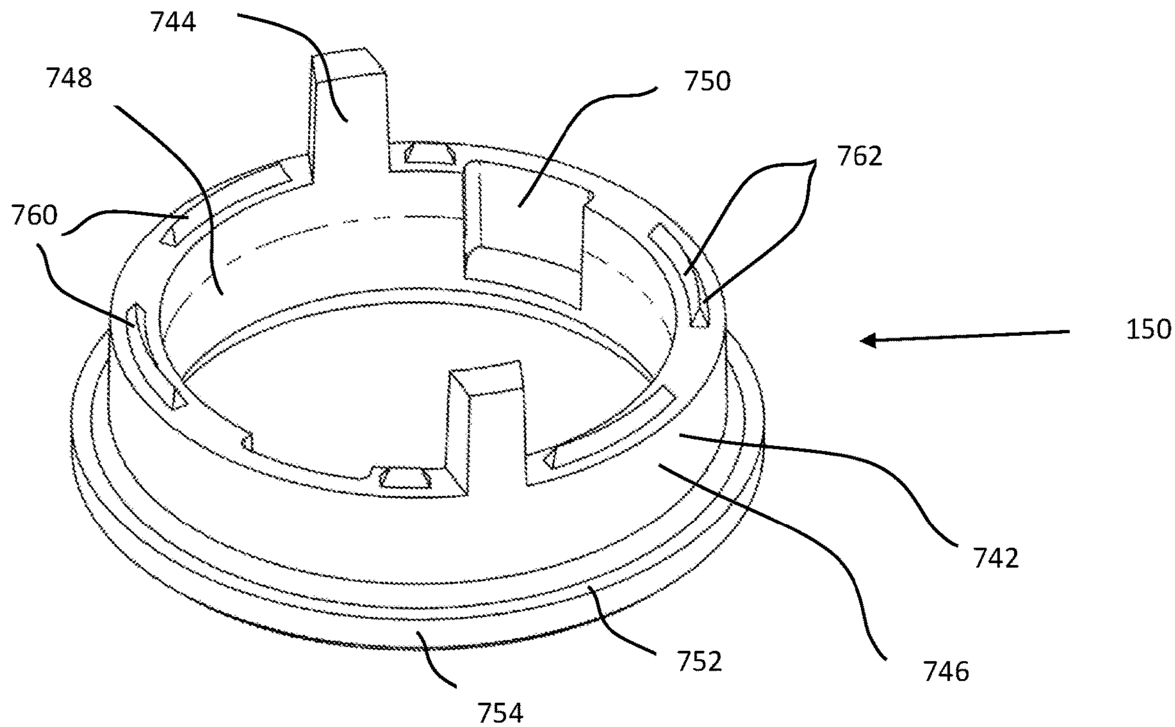
FIGS. 9A and 9B are respective simplified top and bottom pictorial illustrations of a hub of the single-use cover seal of FIGS. 2A-3B.
Figure 9B:
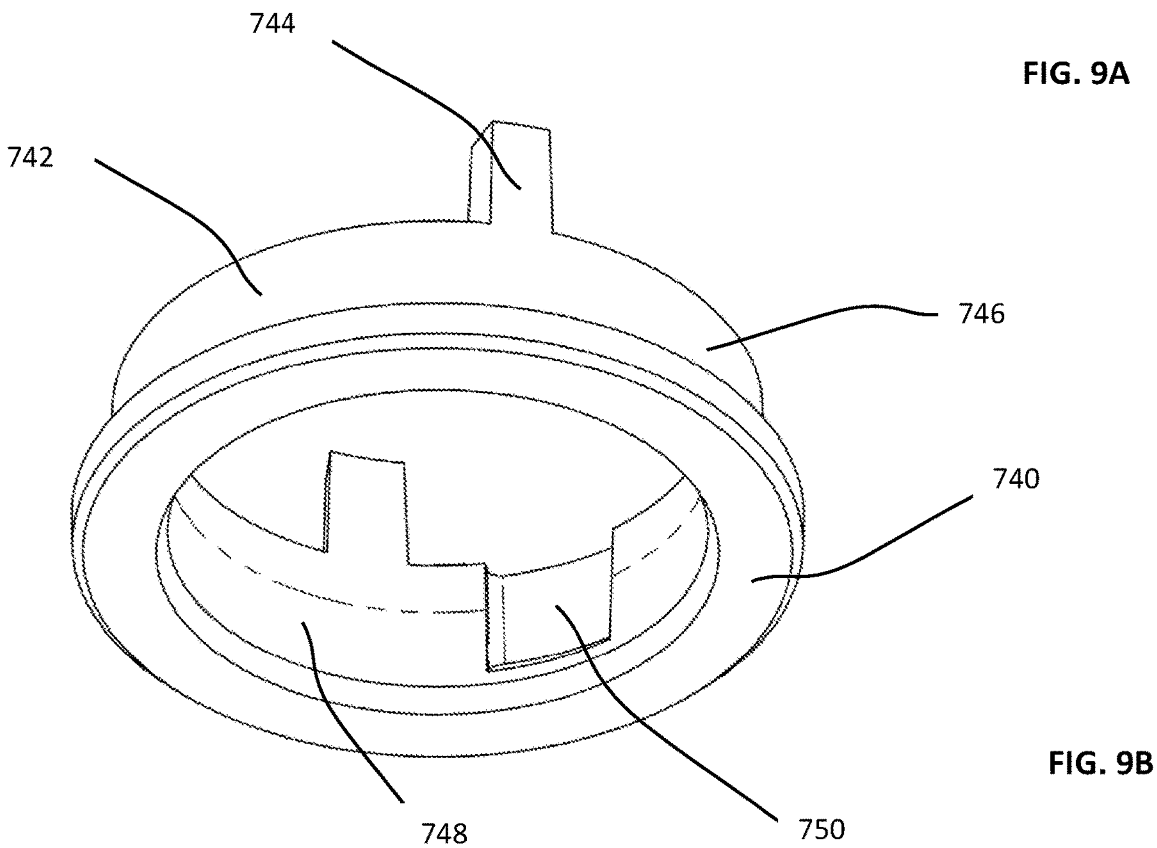

Reference is now made to FIGS. 9A and 9B, which illustrate hub 150. It is appreciated that alternatively hub 150 may be integrally formed with a blade, such as blade 160, as a single piece. Hub 150 is preferably a generally annular element and defines an upwardly-facing, in the sense of FIGS. 1A & 1B, planar ring surface 740 and a circumferential wall 742 extending downwardly therefrom, in the sense of FIGS. 1A & 1B. Circumferential wall 742 preferably includes a pair of downwardly extending protrusions 744 which preferably engage recesses 422 of blade 160 or corresponding recesses of alternative embodiments of blades.

Figure 10B:
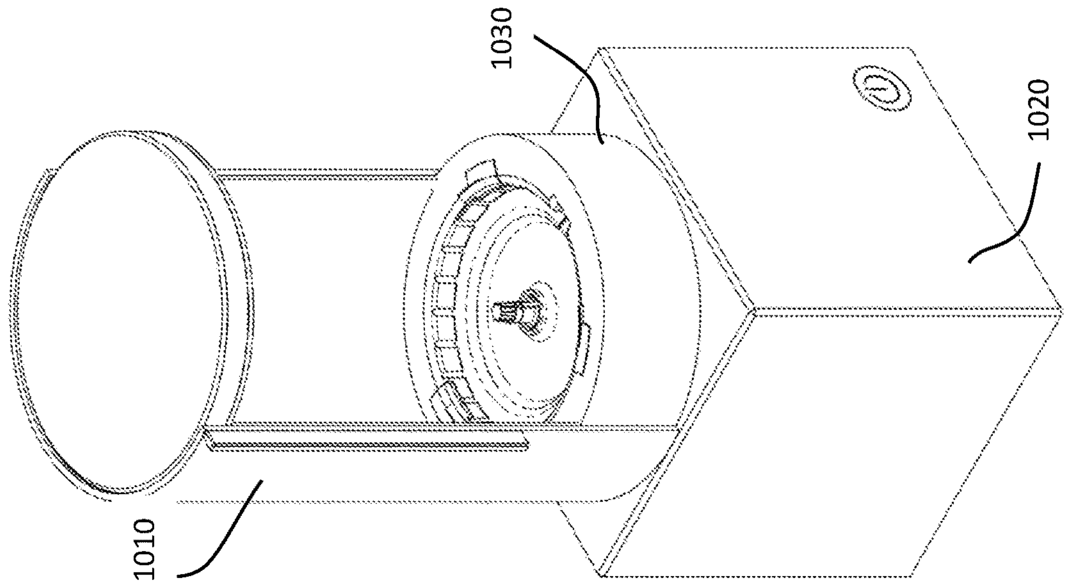
FIGS. 10A and 10B are simplified pictorial illustrations of a preferred embodiment of a multiple motion intelligent driving device (MMIDD) constructed and operative in accordance with a preferred embodiment of the present invention and useful with the SUPCA of FIGS. 1A-9B, in respective door open and door closed states.
Figure 10A:
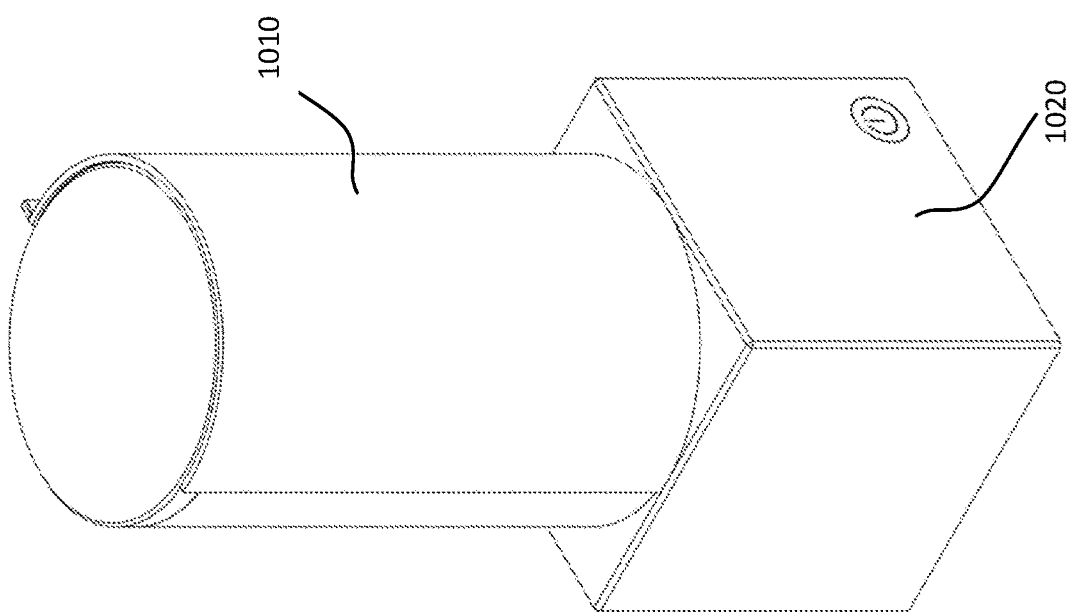
Figure 10C:
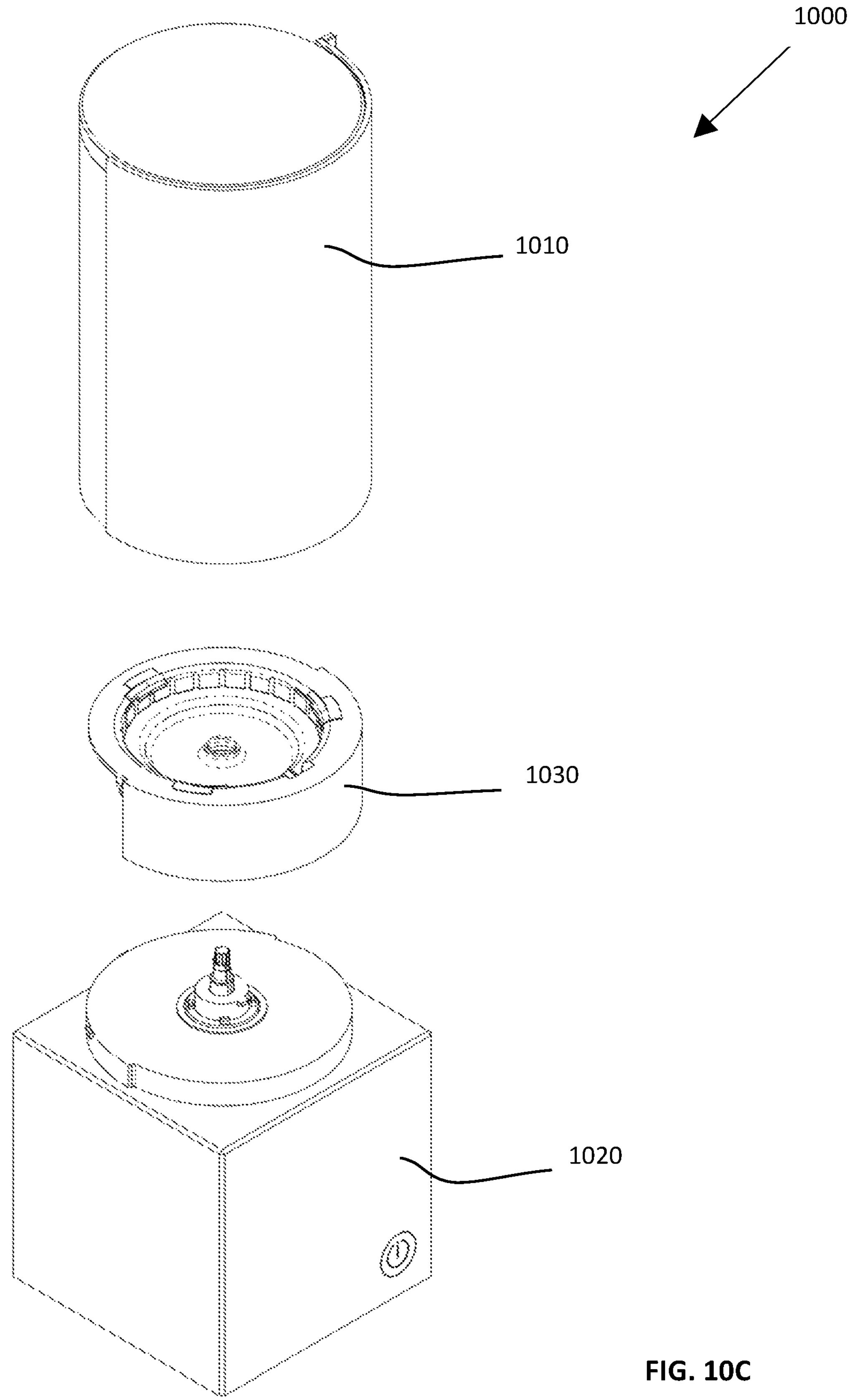
FIG. 10C is a simplified exploded view illustration of the MMIDD of FIGS. 10A & 10B.

Circumferential wall 742 defines a circumferential radially outwardly-facing wall surface 746 and a circumferential radially inwardly-facing wall surface 748, preferably having a pair of mutually facing undercut recesses 750 for removable engagement with a container contents processor, such as a drive shaft of a multiple motion intelligent driving device (MMIDD) (FIGS. 10A-10C). A tapered annular radially outwardly-facing surface 752 preferably joins surfaces 746 and a radially outwardly-facing edge surface 754. Tapered annular radially outwardly-facing surface 752 preferably is rotatably snap fit engaged with flat annular surface 288 of lid 140.

A plurality of downwardly extending, in the sense of FIGS. 1A and 1B, protrusions 760 extend from circumferential wall 742 and define end surfaces 762, which are preferably welded to a top surface, in the sense of FIG. 3A, of wall 414 of blade 160.

Reference is now made to FIGS. 10A-10C, which illustrate a multiple motion intelligent driving device (MMIDD) 1000 constructed and operative in accordance with a preferred embodiment of the present invention and useful with SUPCA 100 of FIGS. 1A-9B.

It is a particular feature of an embodiment of the present invention that functionality for both human and machine sensible tamper-evident and re-use prevention may be actuated both by removal of the SUCSERDREA 120 from the single-use container body 102 and by clamping of the SUPCA to the MMIDD and subsequent unclamping and disengagement of the SUPCA from the MMIDD.

As seen in FIGS. 10A-10C, MMIDD 1000 includes a top housing assembly 1010, which is shown in FIGS. 10A and 10B in respective door closed and door open operative orientations. The top housing assembly 1010 is supported on a base assembly 1020, which also supports a SUPCA support and clamping assembly (SUPCASCA) 1030, which is surrounded by the top housing assembly 1010, when it is in a door closed operative orientation.

Reference is now made to FIGS. 11A-11D, which are simplified assembled and general exploded view illustrations of top housing assembly 1010 of the MMIDD of FIGS. 10A-10C.

As seen in FIGS. 11A-11D, top housing assembly 1010 comprises a static housing assembly 1040 and a rotatable door assembly 1050. Static housing assembly 1040 preferably comprises a static housing element 1060 including a semicylindrical upstanding wall portion 1062, integrally formed with a semicylindrical base ring 1064. Semicylindrical upstanding wall portion 1062 is preferably formed with a plurality of radially inward-facing bayonet receiving recesses 1066, each of which has an opening at the base of semicylindrical upstanding wall portion 1062.

Semicylindrical upstanding wall portion 1062 preferably terminates, at an upward end thereof, at a generally circular top portion 1068, which is formed with an upwardly-facing circumferential recess 1070 for receiving a low friction bearing ring 1072, which in turn rotatably supports the rotatable door assembly 1050. A top cover 1074 is mounted onto generally circular top element 1068.

The rotatable door assembly 1050 includes a semicylindrical upstanding wall portion 1080 which is integrally formed with a cylindrical top ring 1082. A generally vertical user hand engageable door grip 1084 is mounted onto semicylindrical upstanding wall portion 1080.

Figure 11A:
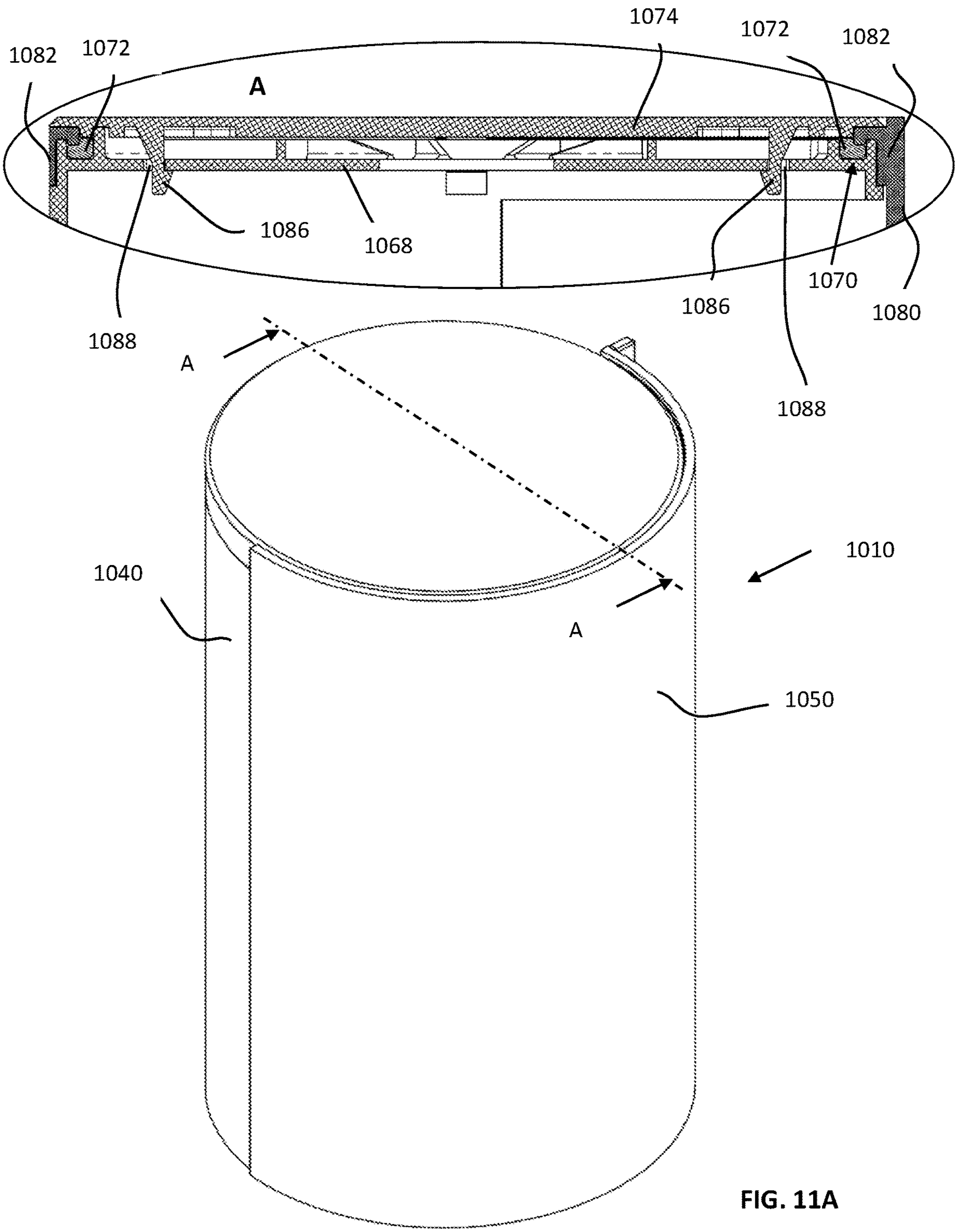
FIGS. 11A and 11B are simplified assembled and general exploded view illustrations of a top housing assembly of the MMIDD of FIGS. 10A-10C.
Figure 11B:
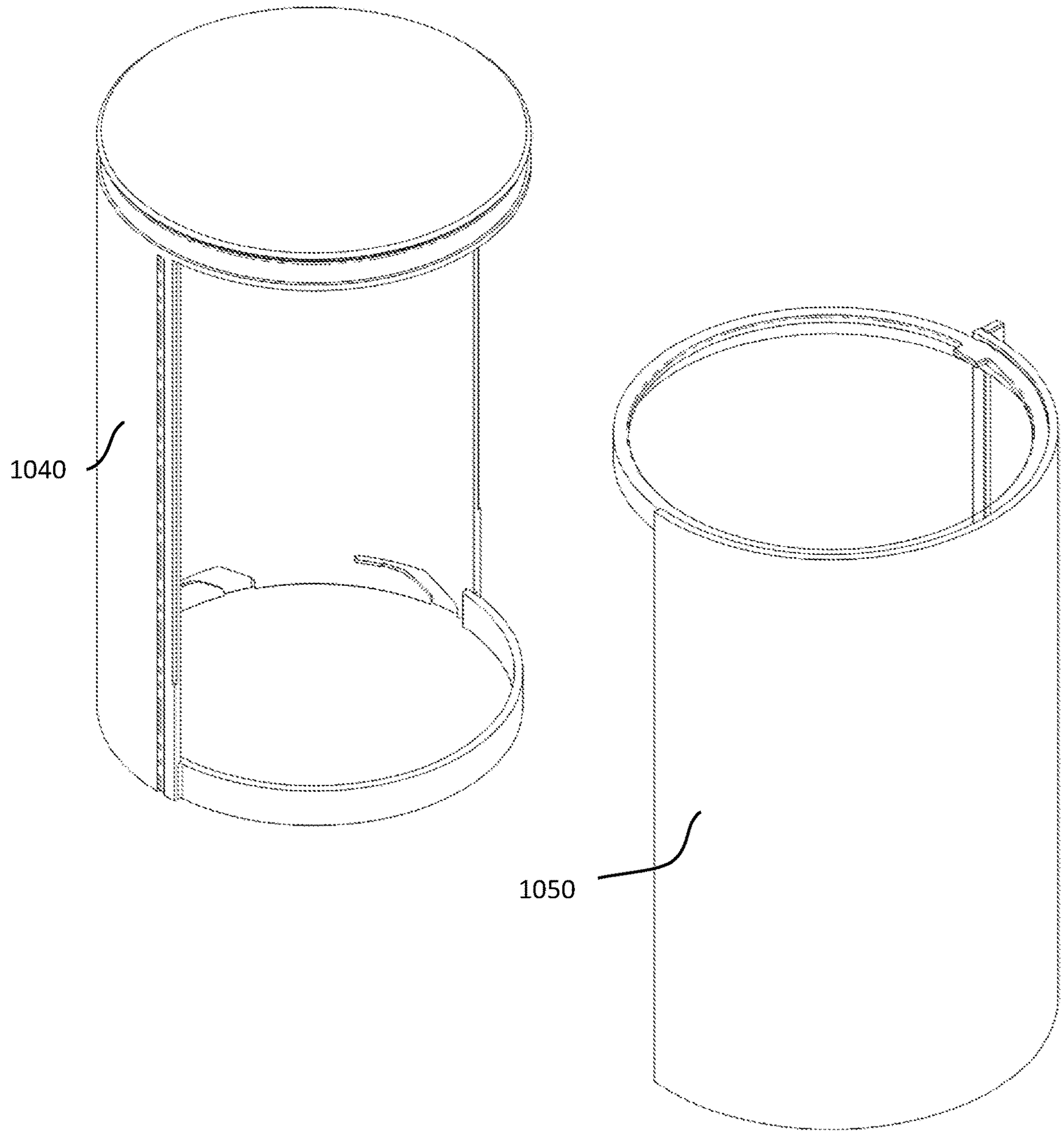
Figure 11C:
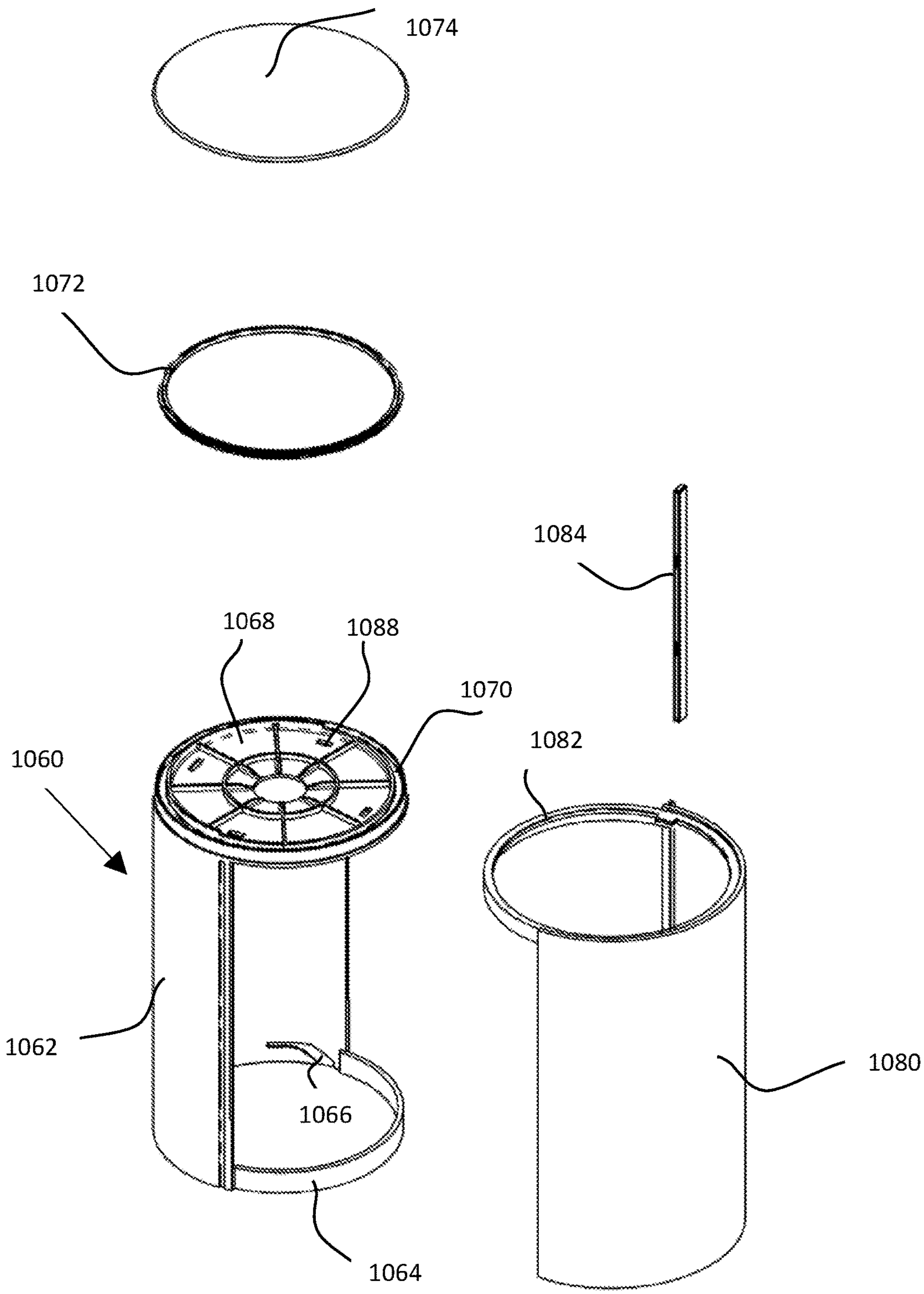
FIGS. 11C and 11D are simplified respective top-facing and bottom-facing more detailed exploded view illustrations of a top housing assembly of the MMIDD of FIGS. 10A-10C.
Figure 11D:
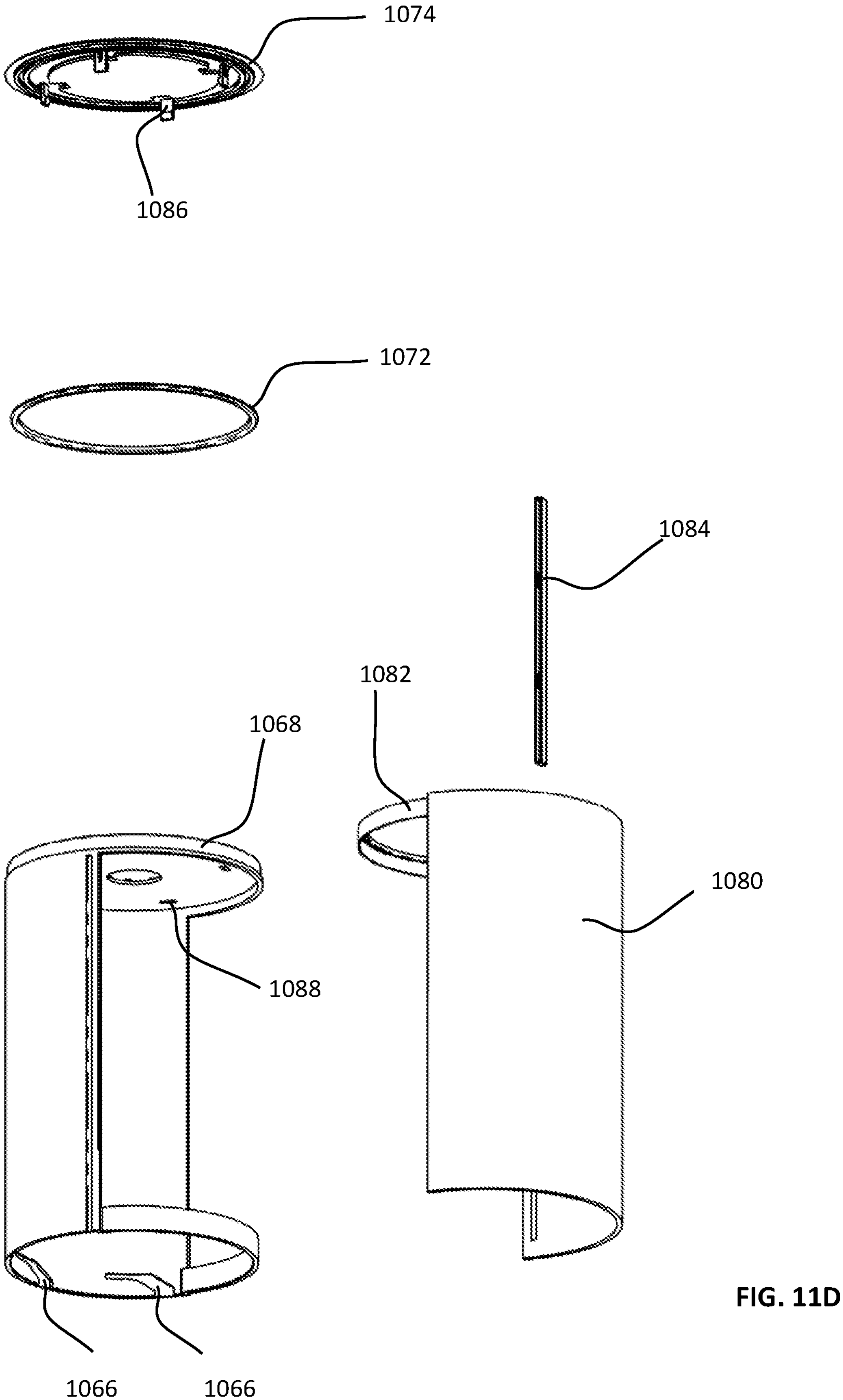
Figure 12A:
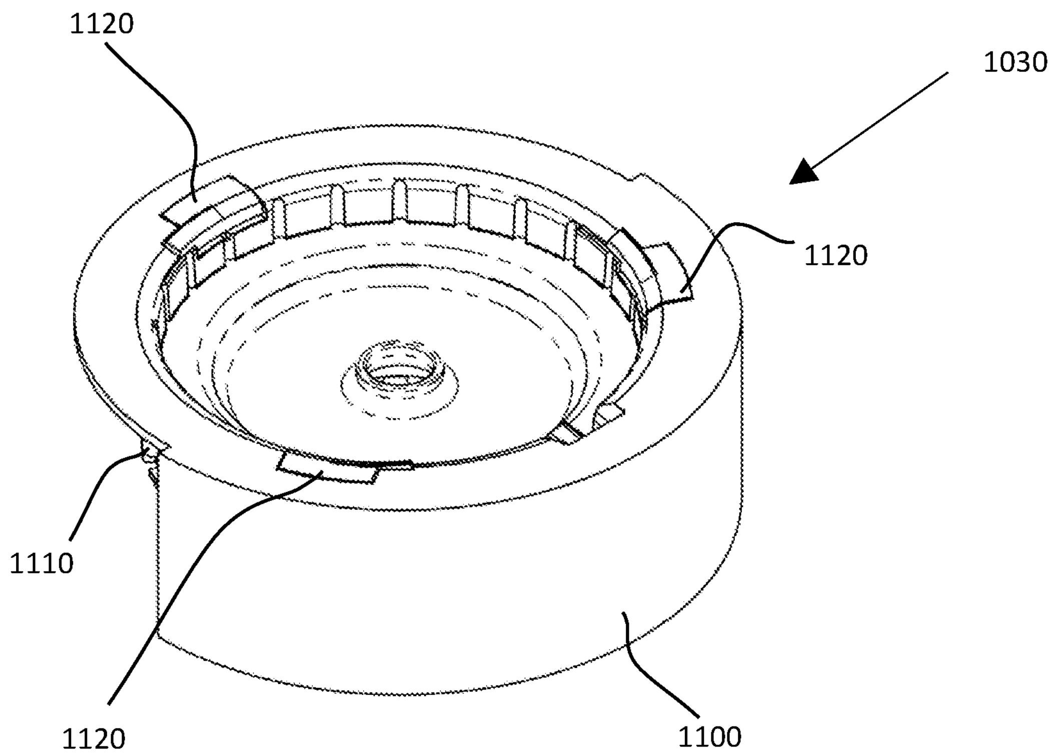
FIGS. 12A, 12B, 12C and 12D are simplified respective pictorial top view, planar top view, planar side view and planar bottom view illustrations of a SUPCA support and clamping assembly (SUPCASCA) forming part of MMIDD of FIGS. 10A-10C.
Figure 12B:
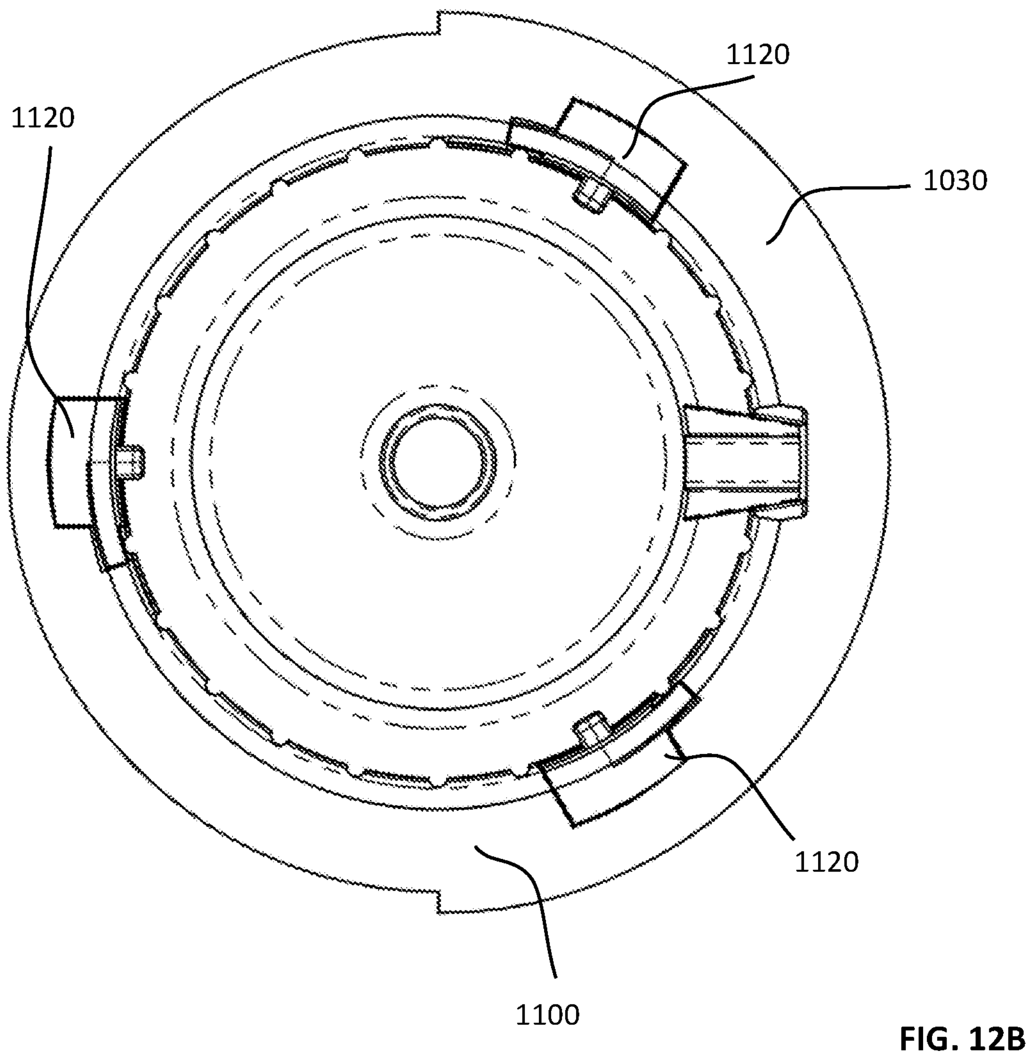
Figure 12C:
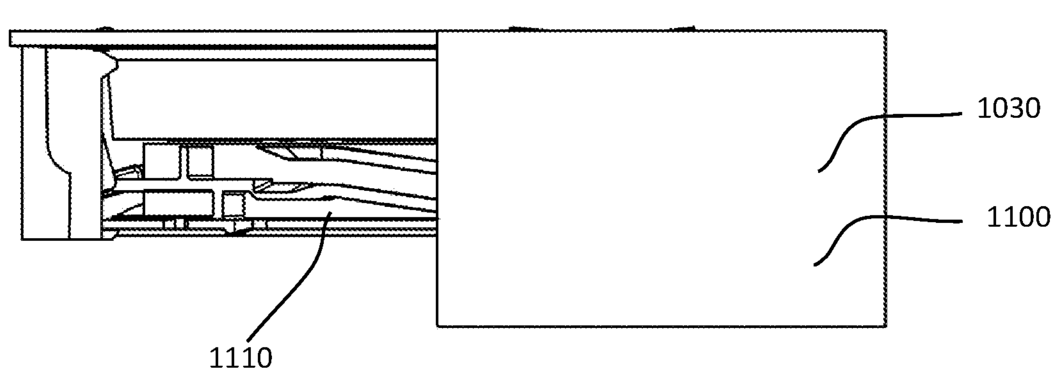
Figure 12D:
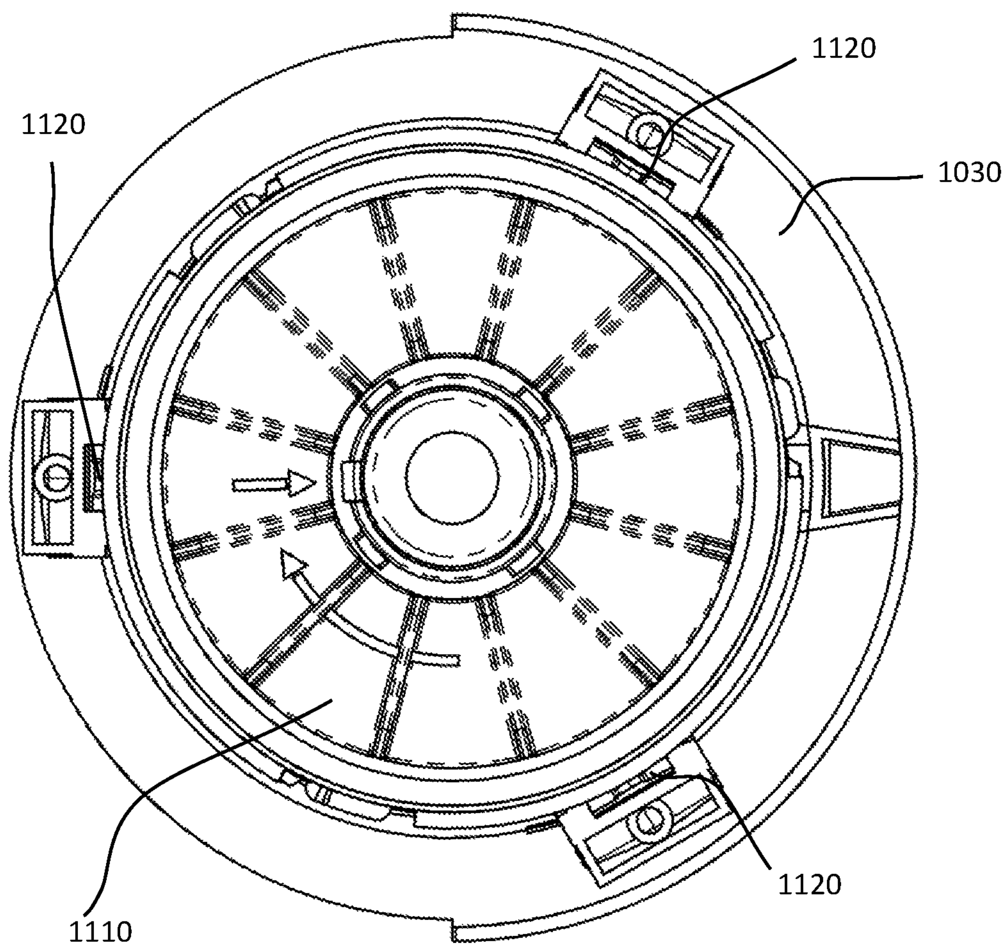
Figure 12E:
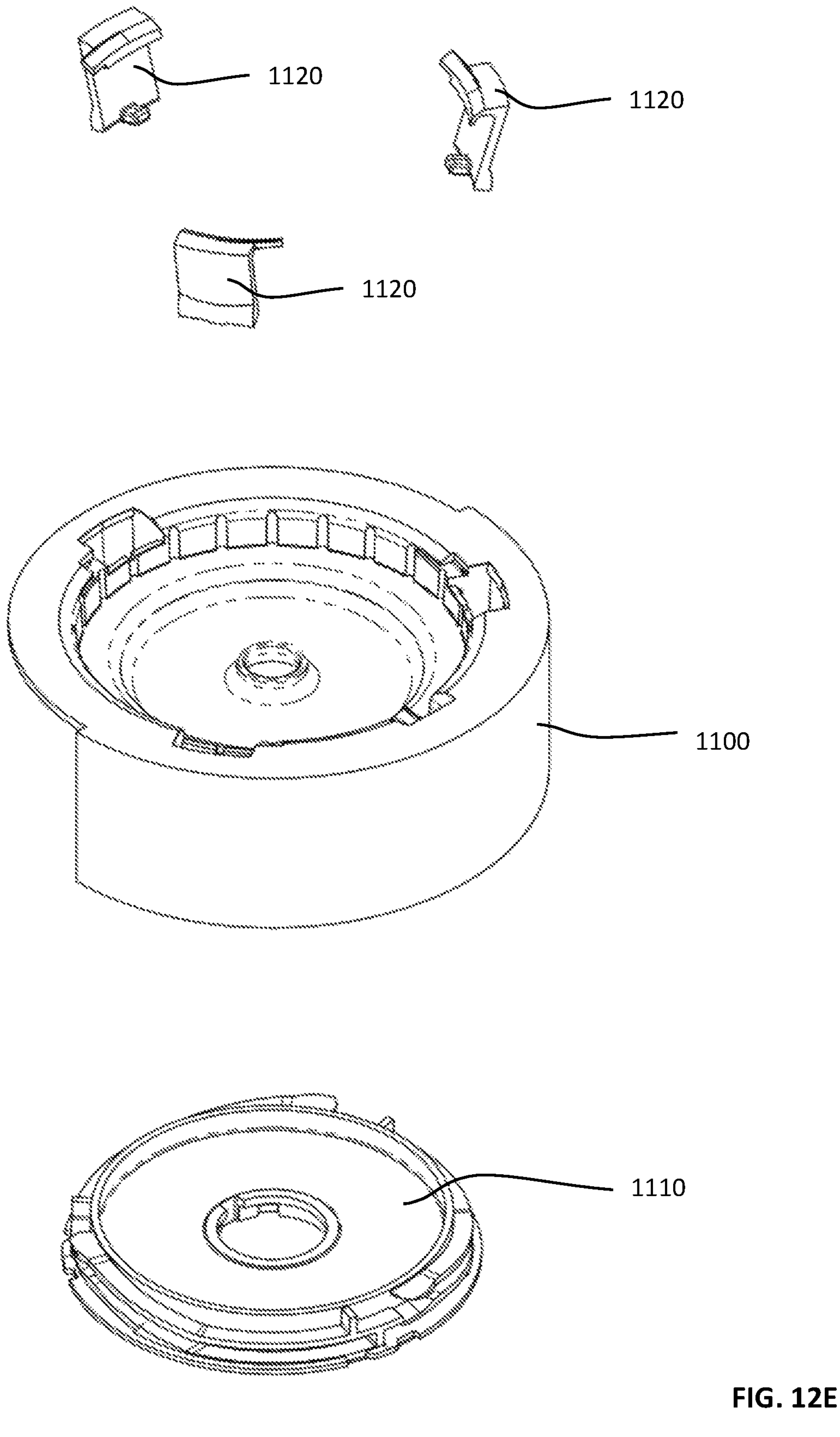
FIG. 12E is a simplified exploded view illustration of the SUPCASCA of FIGS. 12A-12D.
Figure 13A:
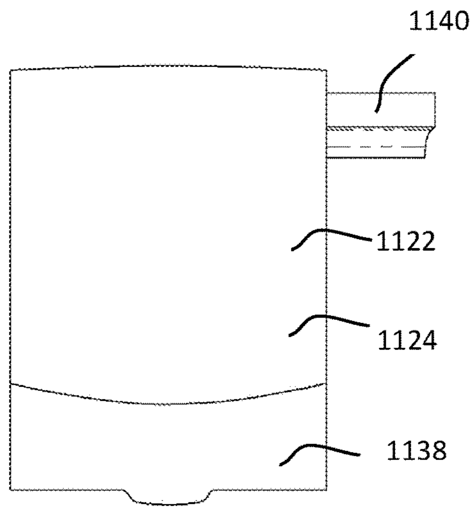
FIGS. 13A, 13B, 13C, 13D, 13E, 13F, 13G and 13H are simplified respective planar front view, planar rear view, planar side view, planar top view, planar sectional view, top-facing pictorial front view, bottom-facing pictorial rear view and bottom-facing pictorial front view illustrations of a clamp element forming part of the SUPCASCA of FIGS. 12A-12E, FIG. 13E being taken along lines E-E in FIG. 13D.
Figure 13B:
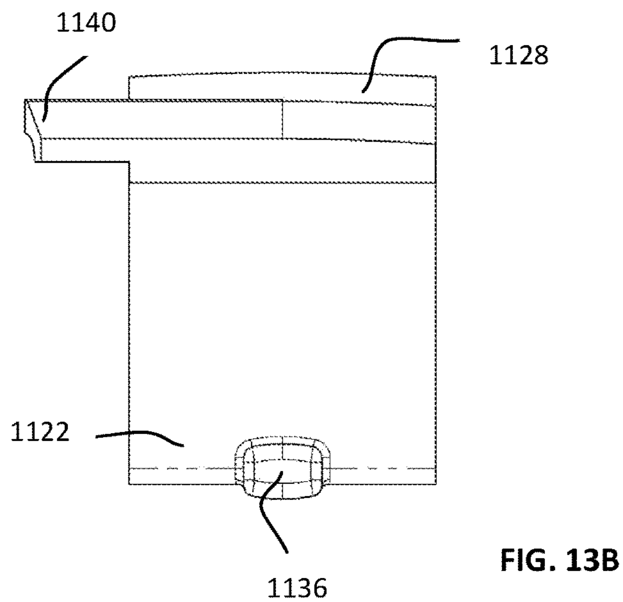
Figure 13C:
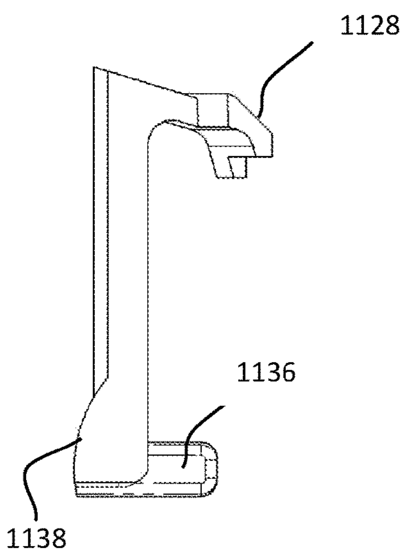
Figure 13D:
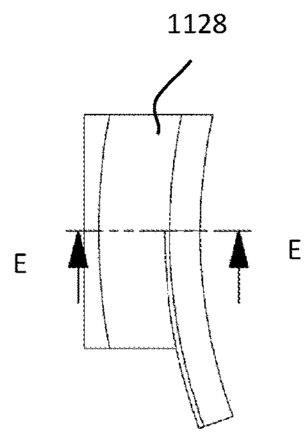
Figure 13E:
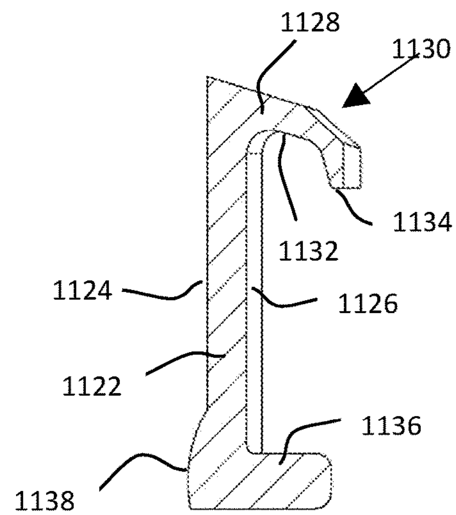
Figure 13F:
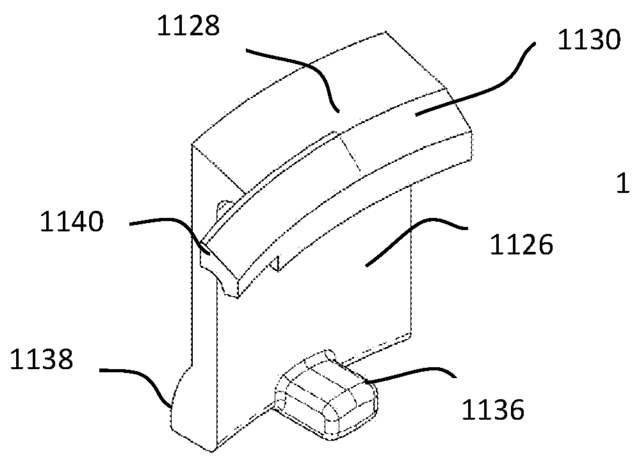
Figure 13G:
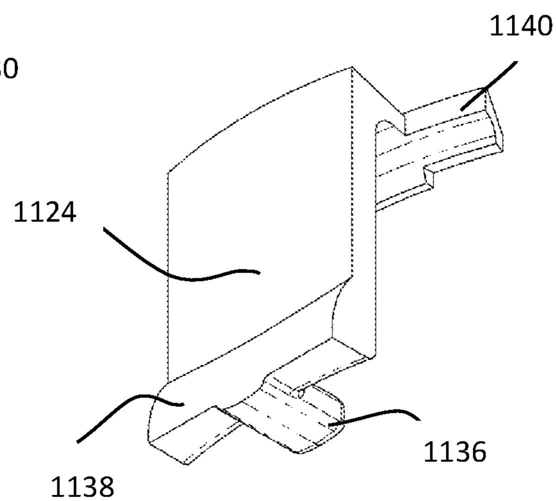
Figure 13H:
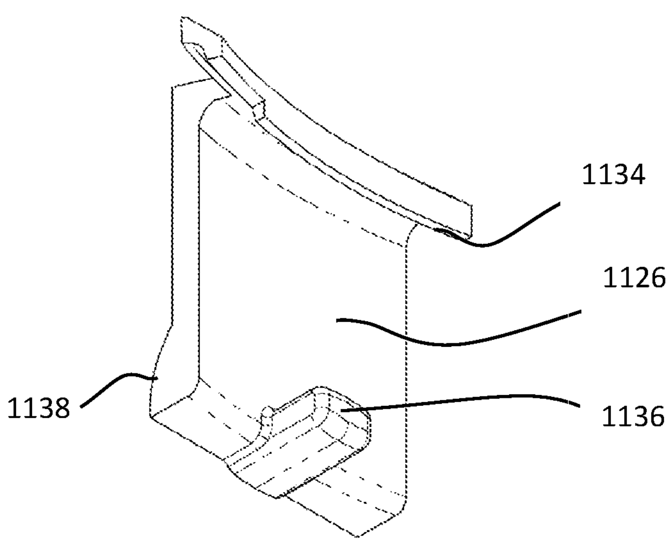
Figure 14A:
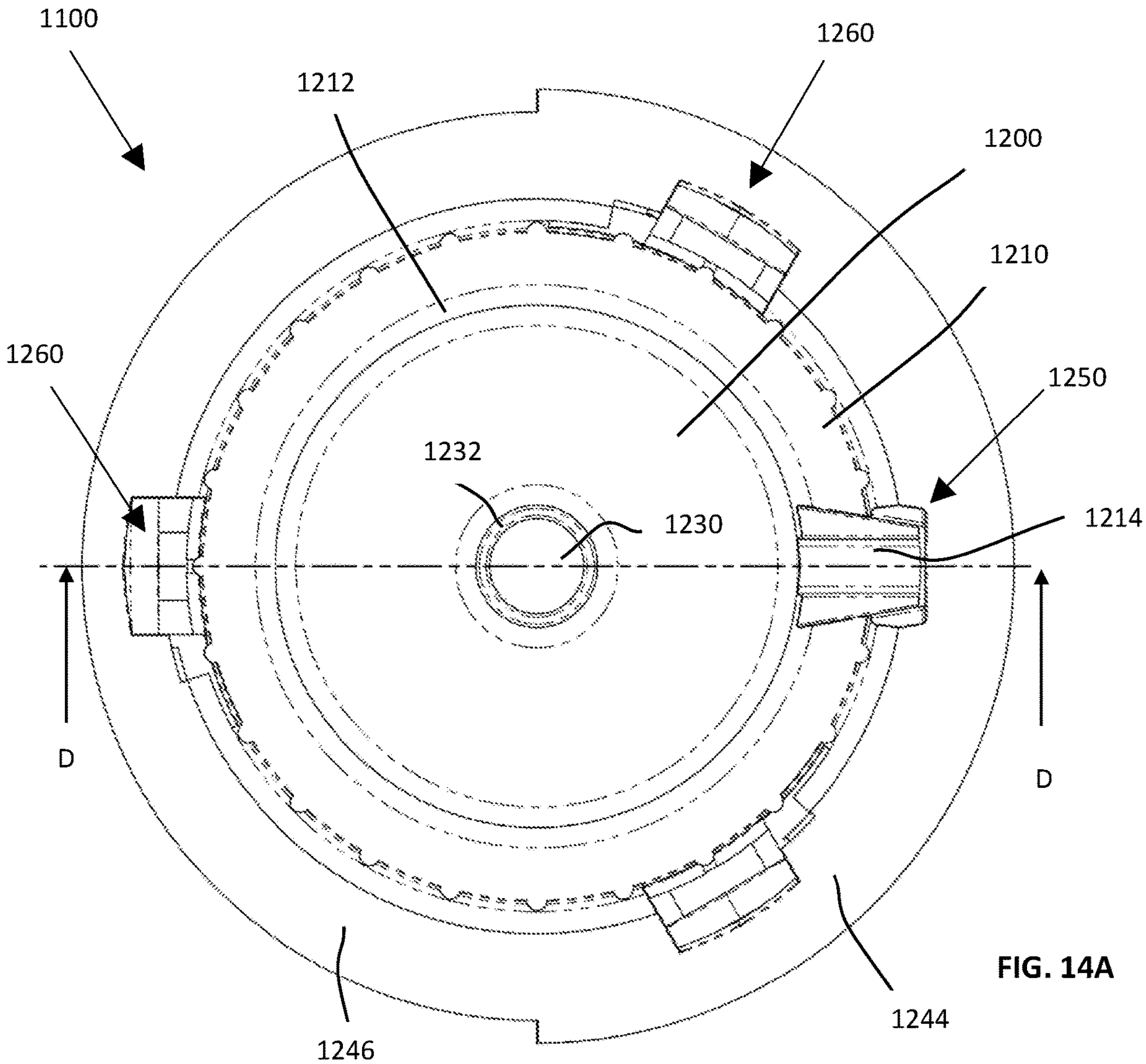
FIGS. 14A, 14B, 14C, 14D, 14E and 14F are simplified respective planar top view, planar side view, planar bottom view, sectional view, pictorial top view and pictorial bottom view illustrations of a support element forming part of the SUPCASCA of FIGS. 12A-12E, FIG. 14D being taken along lines D-D in FIG. 14A.
Figure 14B:
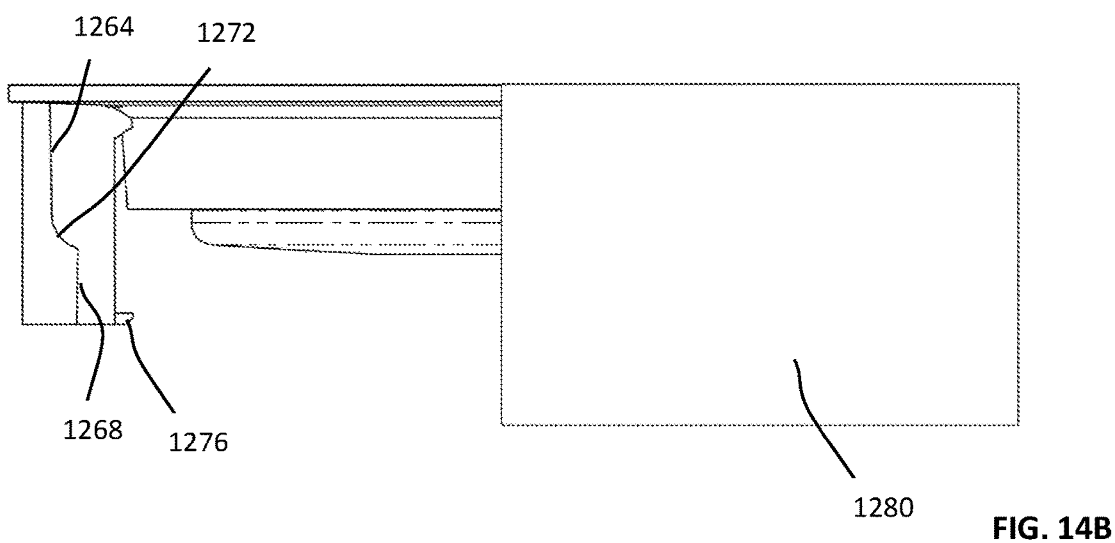
Figure 14C:
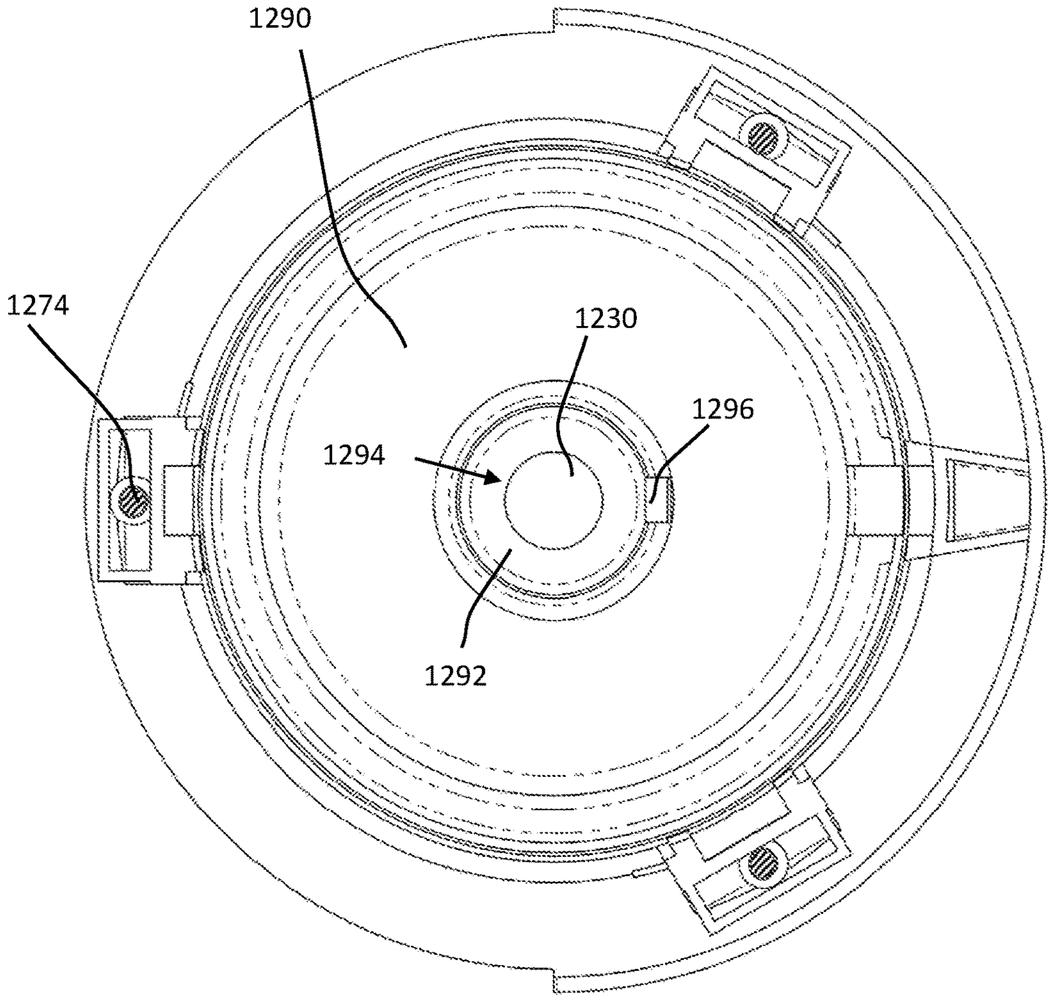
Figure 14D:
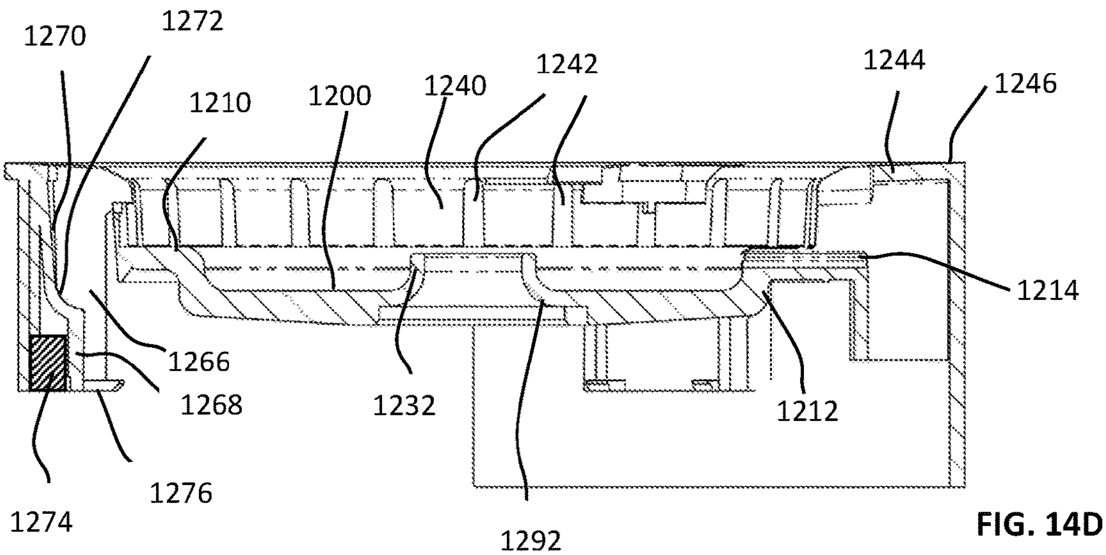
Figure 14E:
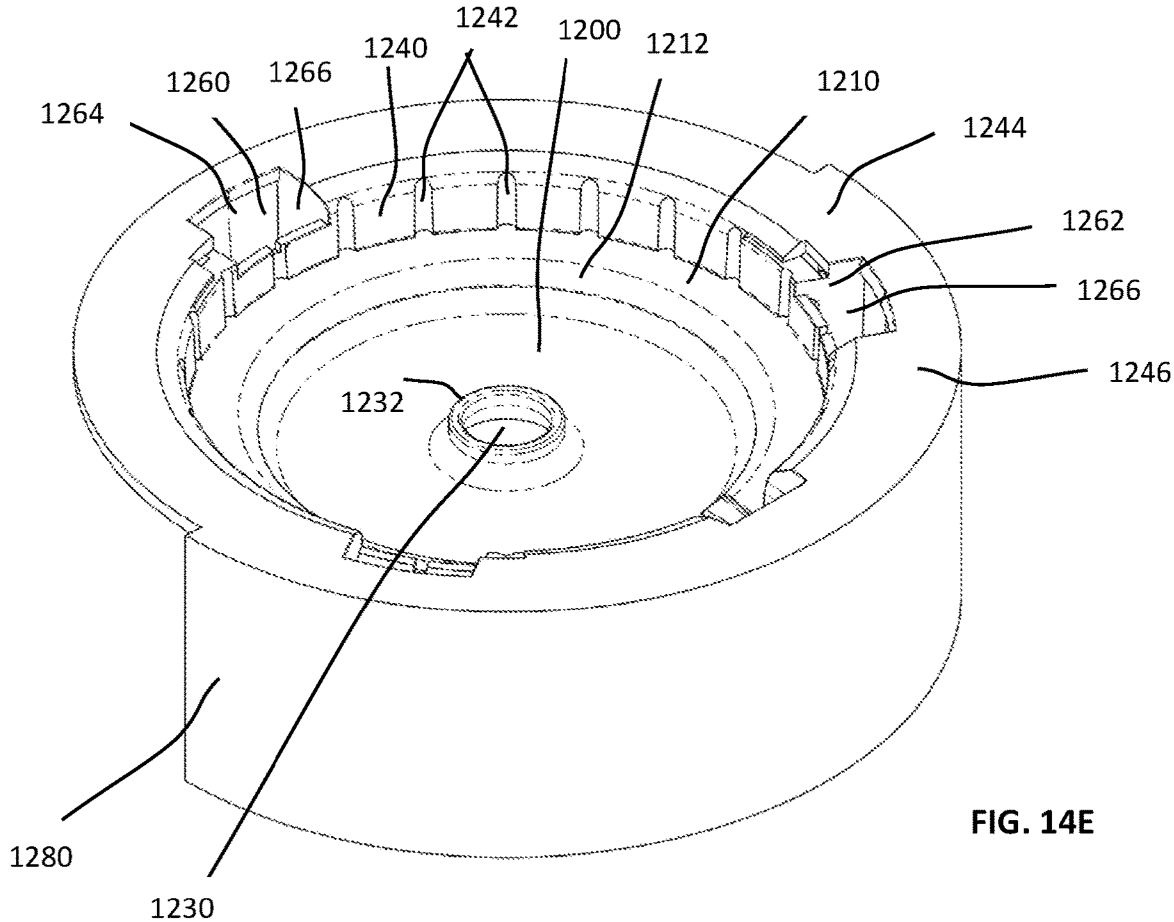
Figure 14F:
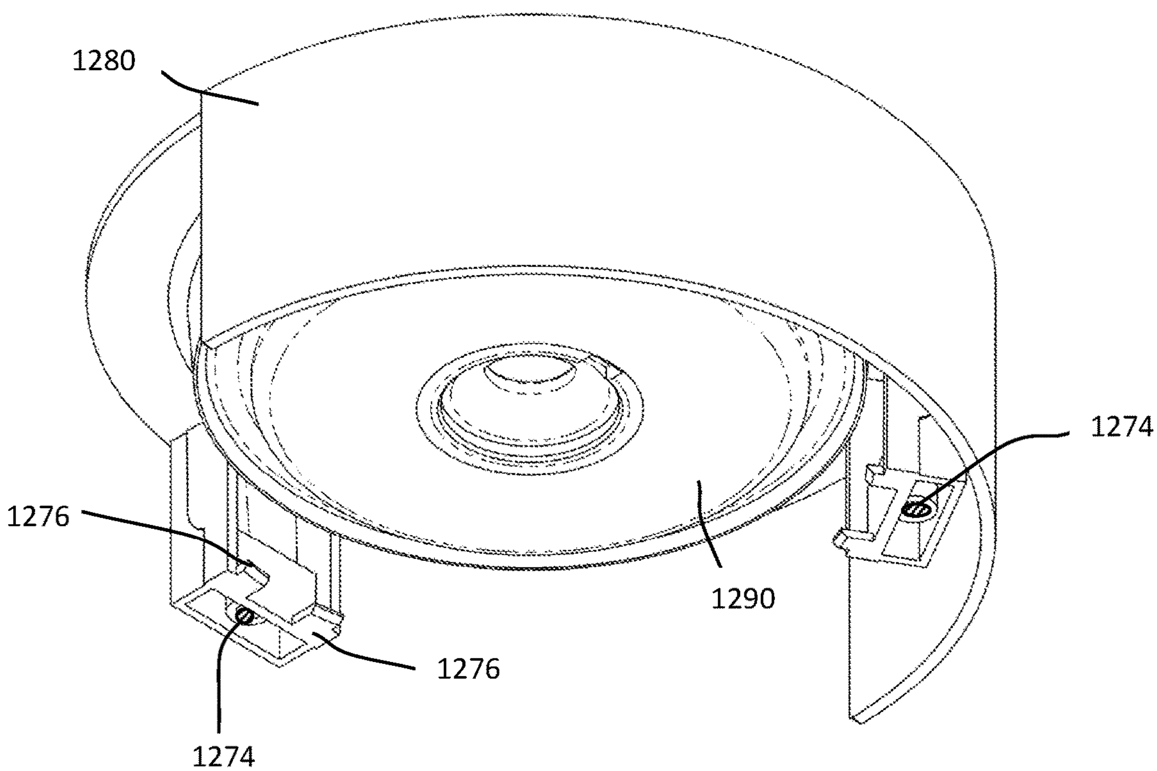
Figure 15A:
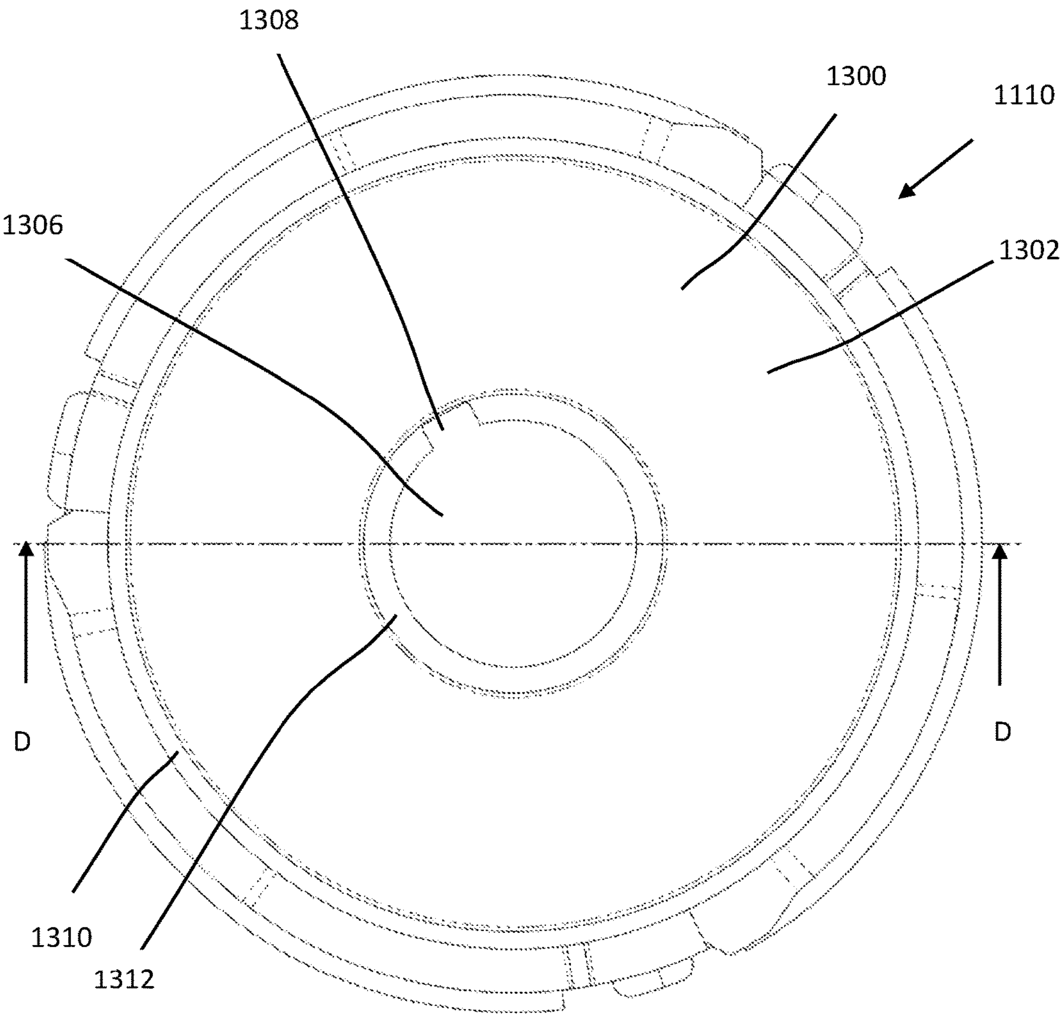
FIGS. 15A, 15B, 15C, 15D, 15E and 15F are simplified respective planar top view, planar side view, planar bottom view, sectional view, pictorial top view and pictorial bottom view illustrations of a cam element forming part of the SUPCASCA of FIGS. 12A-12E, FIG. 15D being taken along lines D-D in FIG. 15A.
Figure 15B:
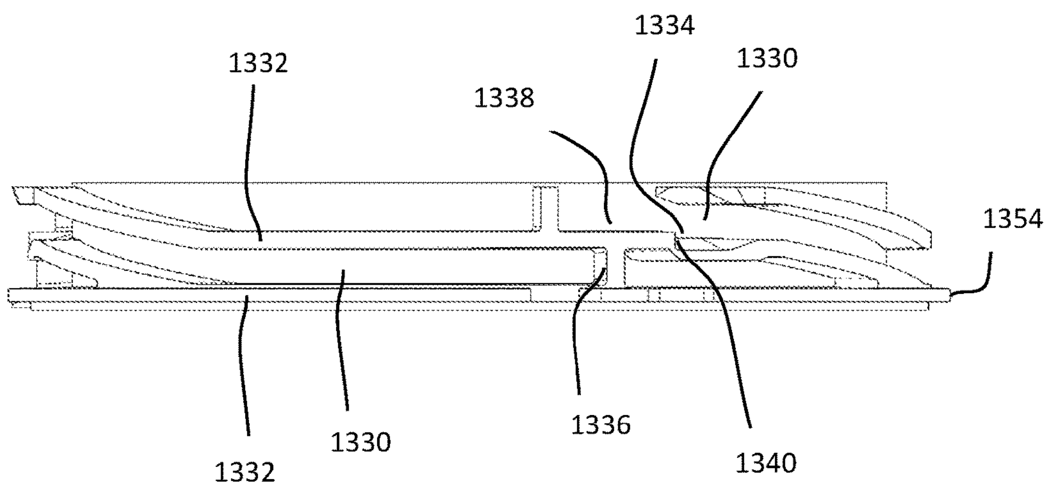
Figure 15C:
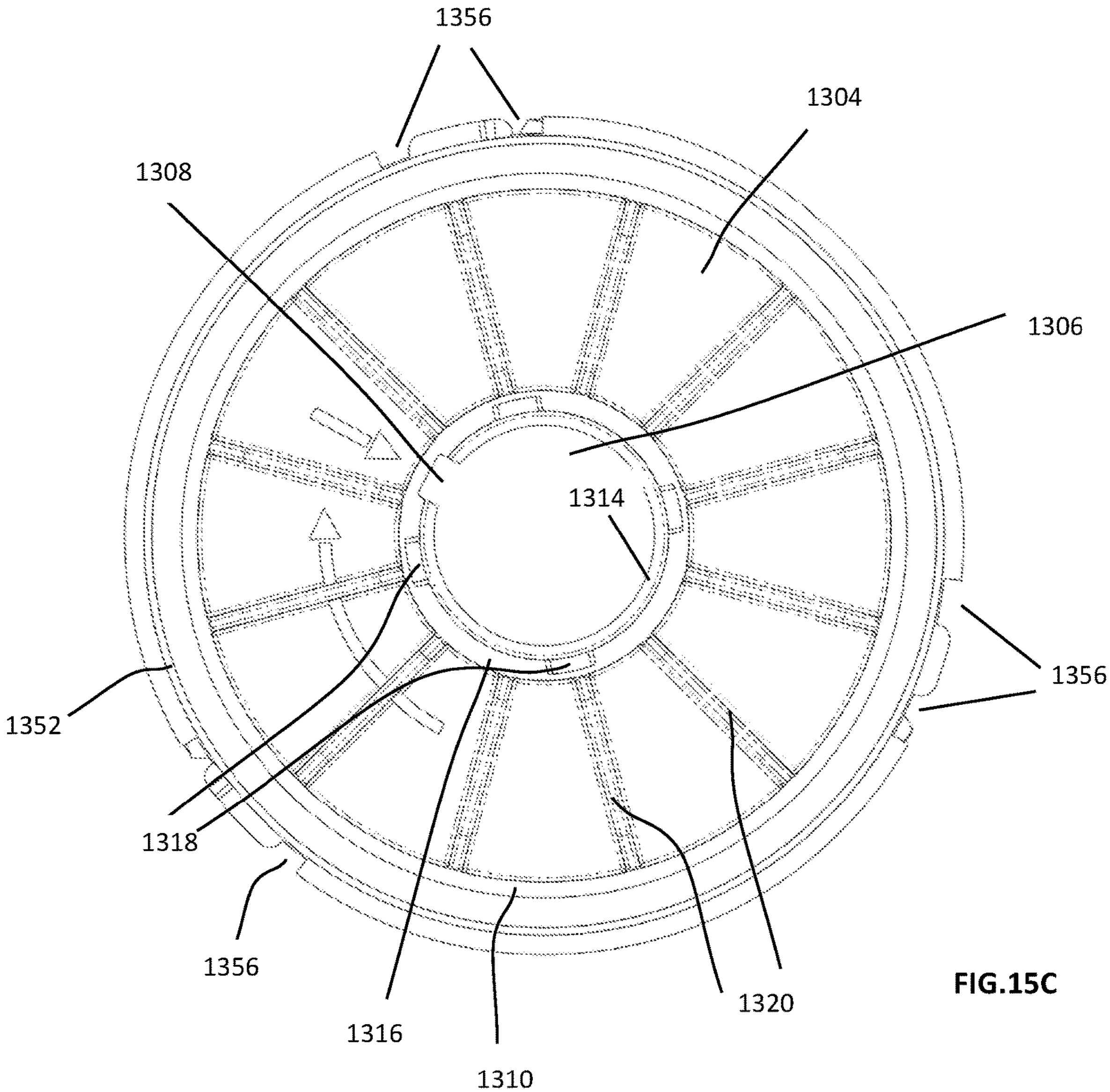
Figure 15D:
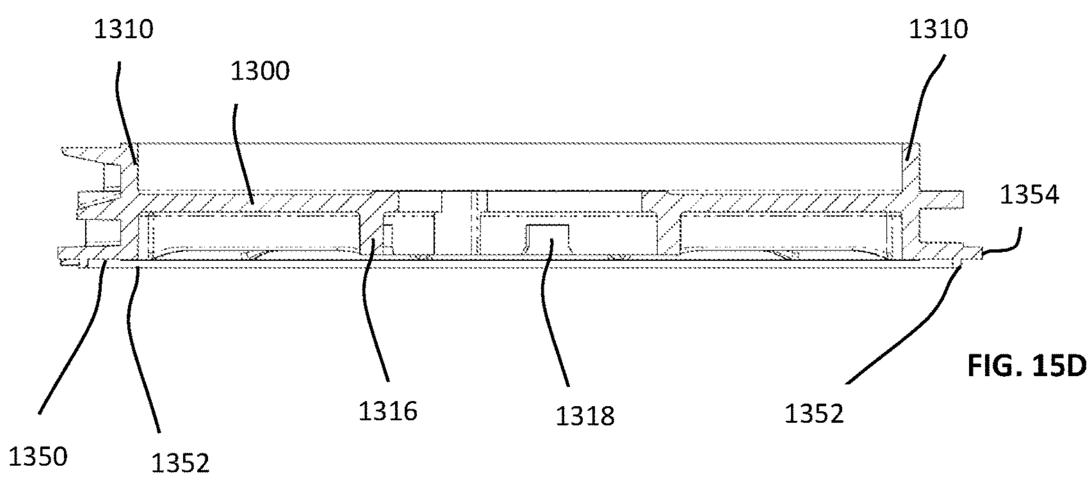
Figure 15E:
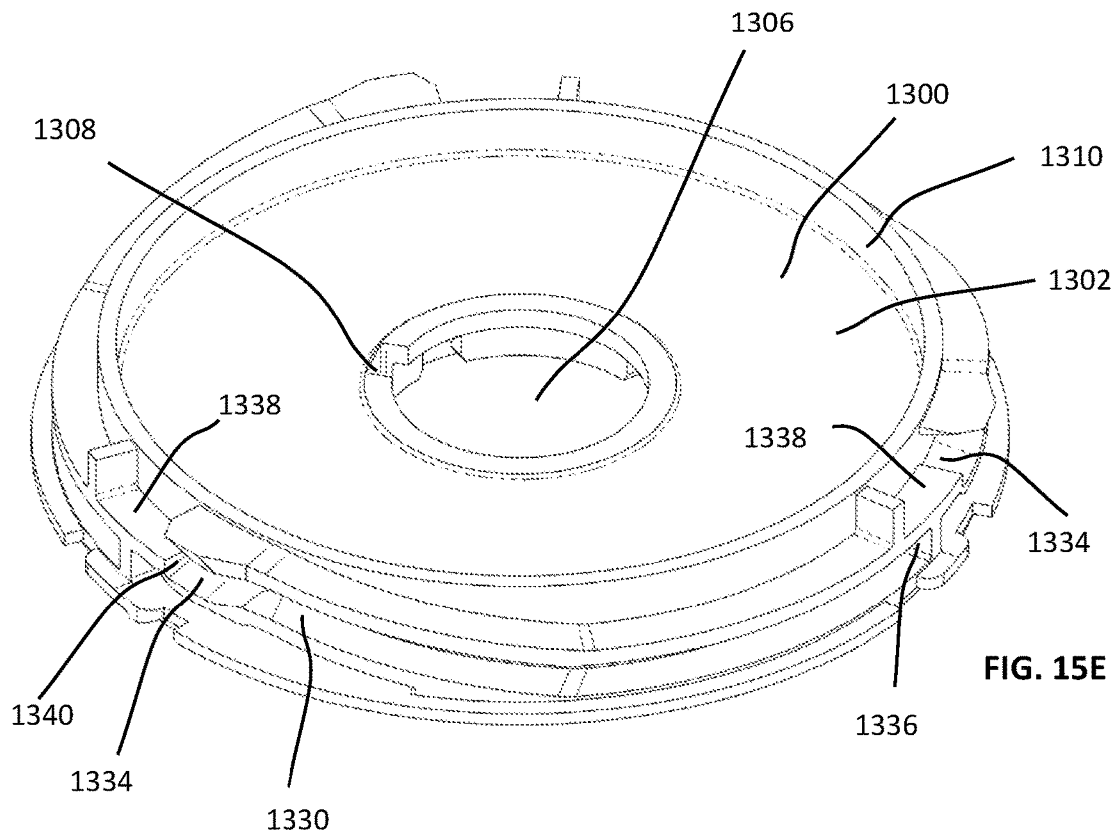
Figure 15F:
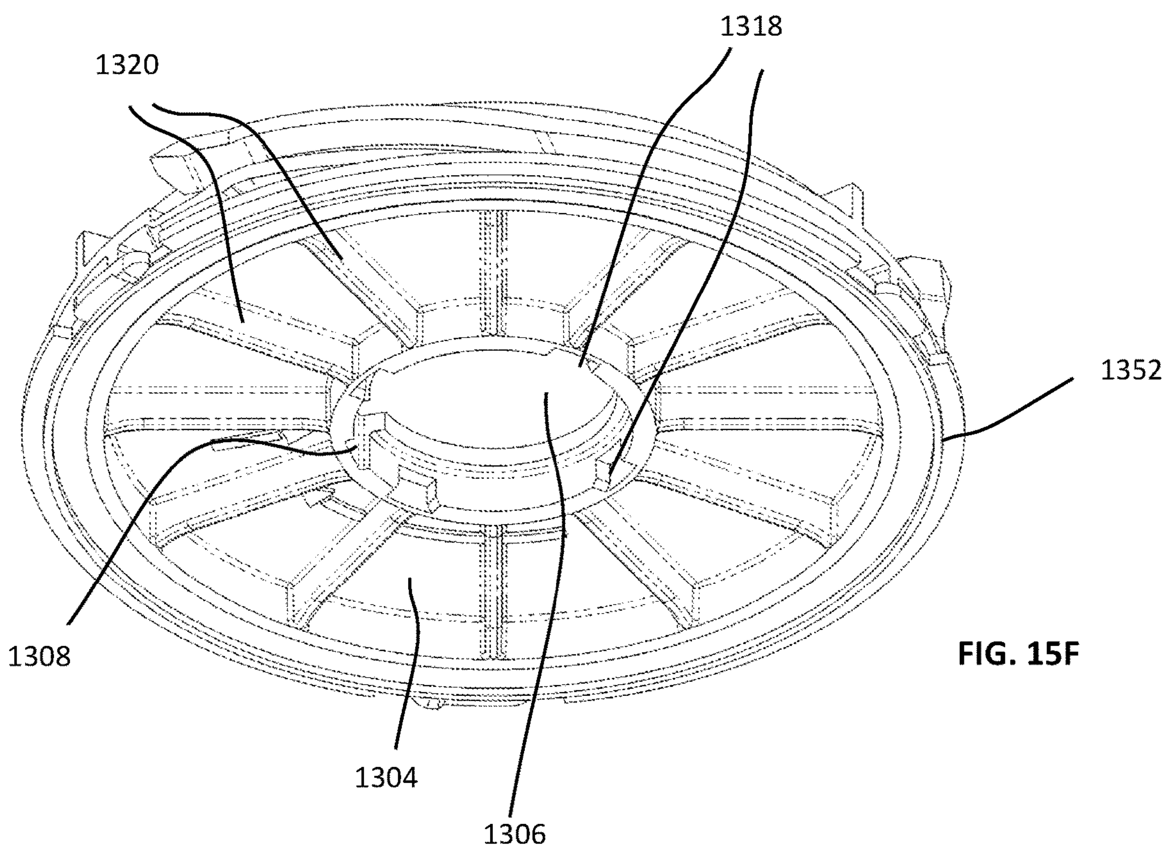
Figure 16A:
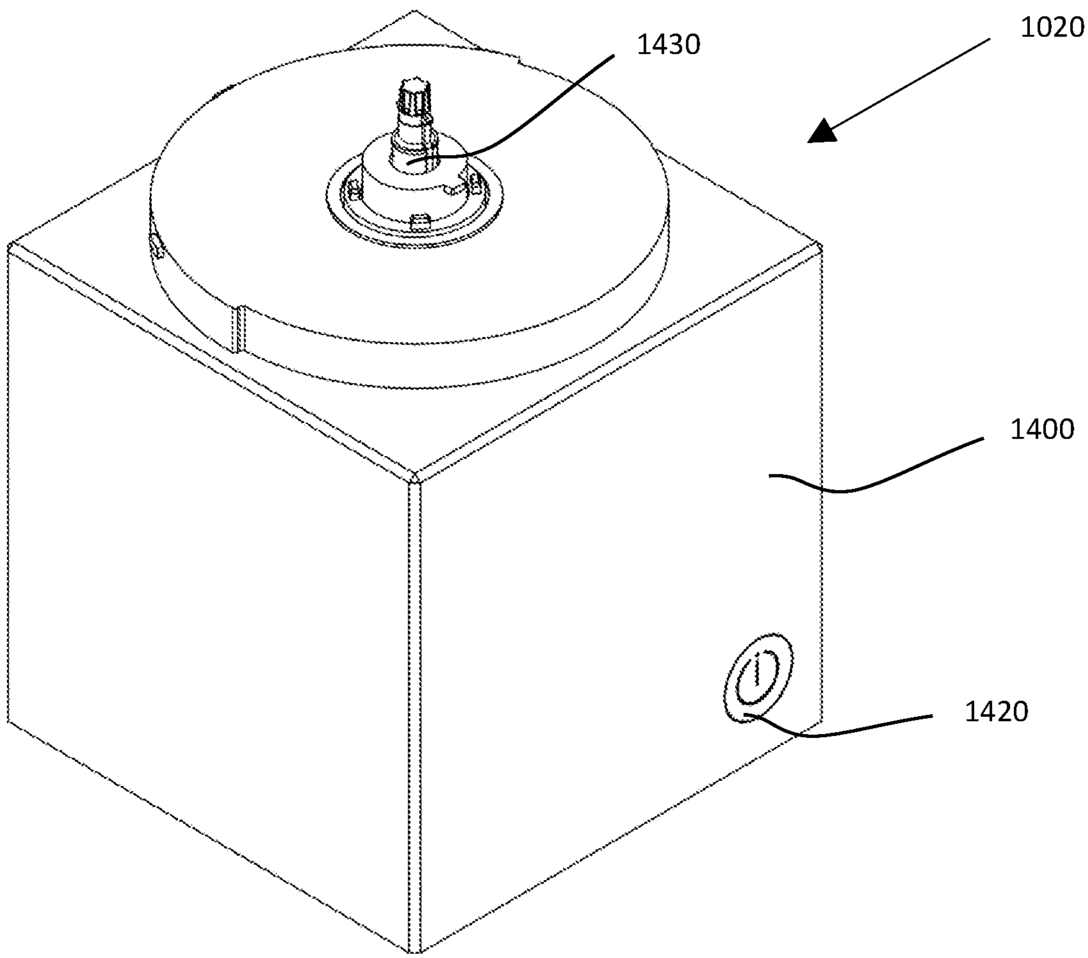
FIGS. 16A, 16B, 16C, 16D and 16E are simplified respective pictorial, planar front, planar top, planar bottom and exploded view illustrations of a base assembly forming part of the MMIDD of FIGS. 10A-10C.
Figure 16B:
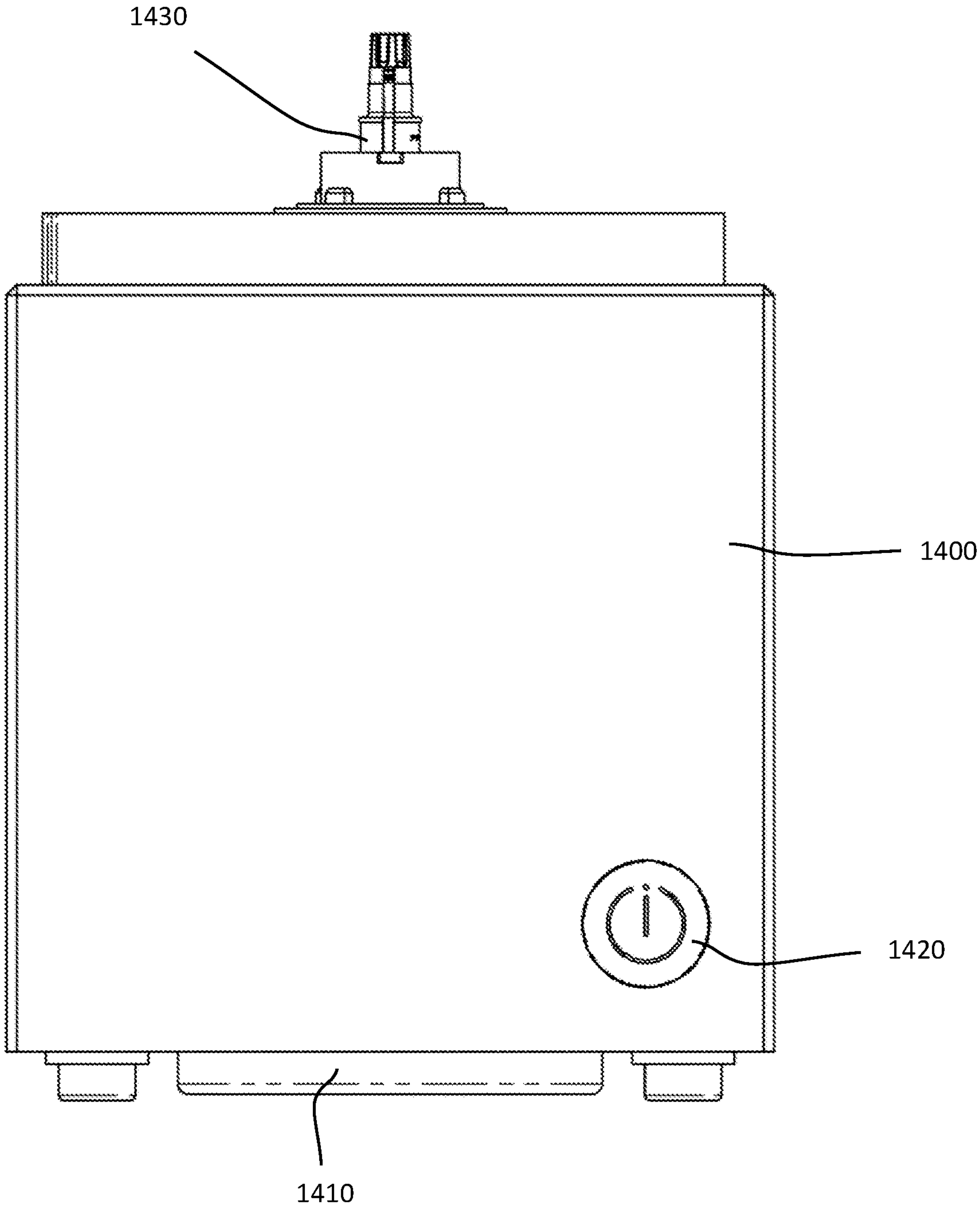
Figure 16C:
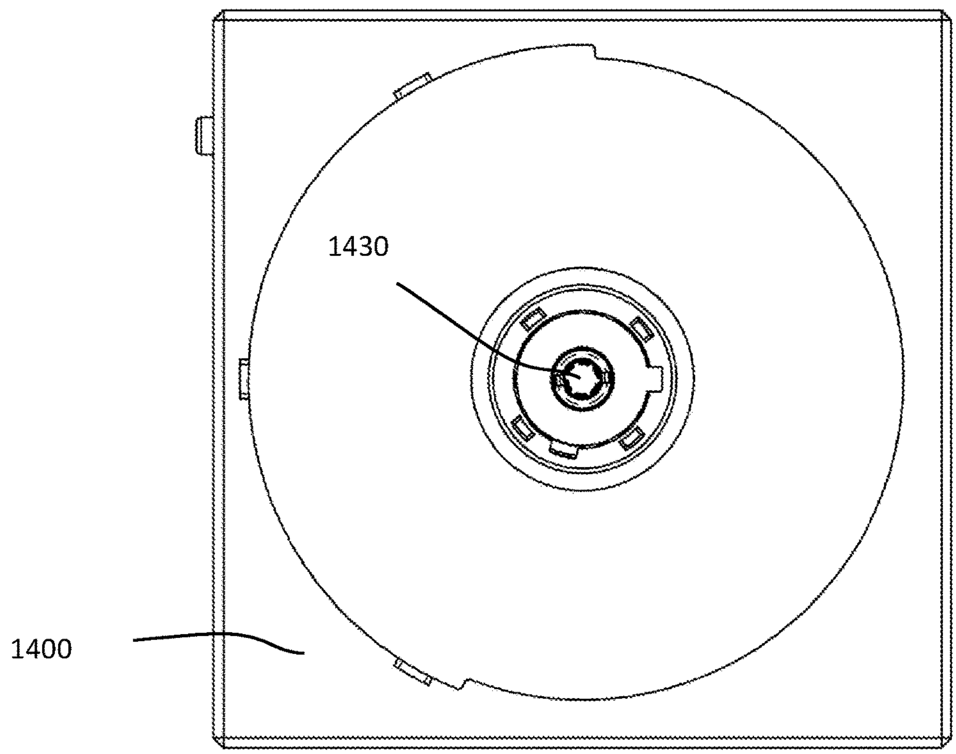
Figure 16D:
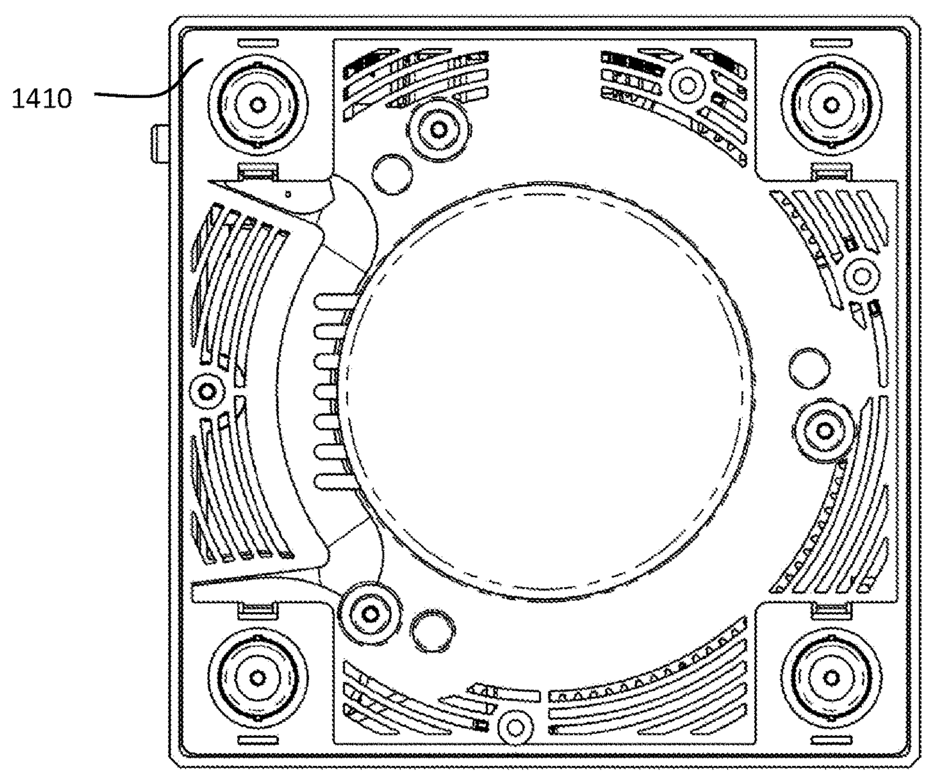
Figure 16E:
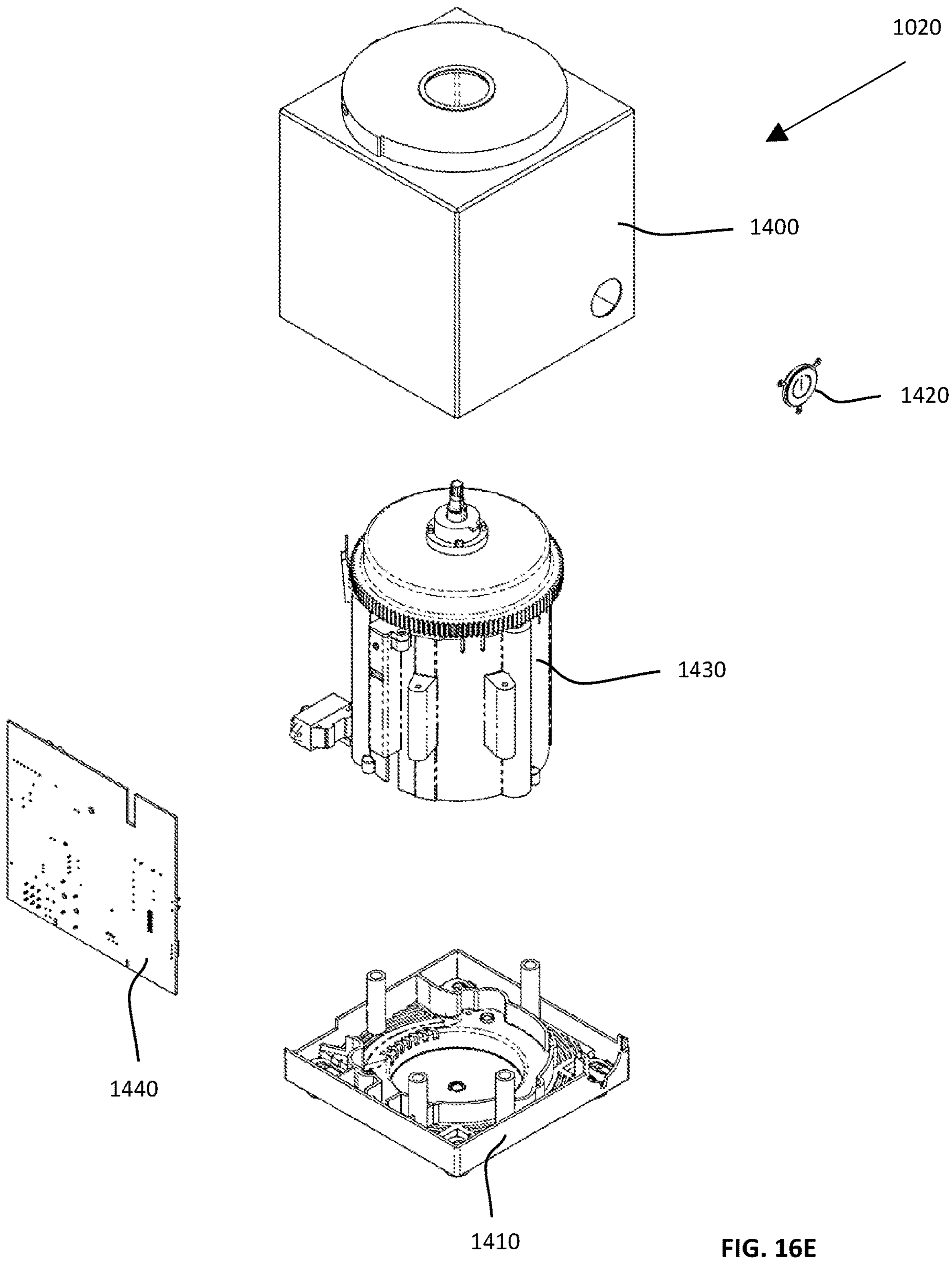
Figure 17A:
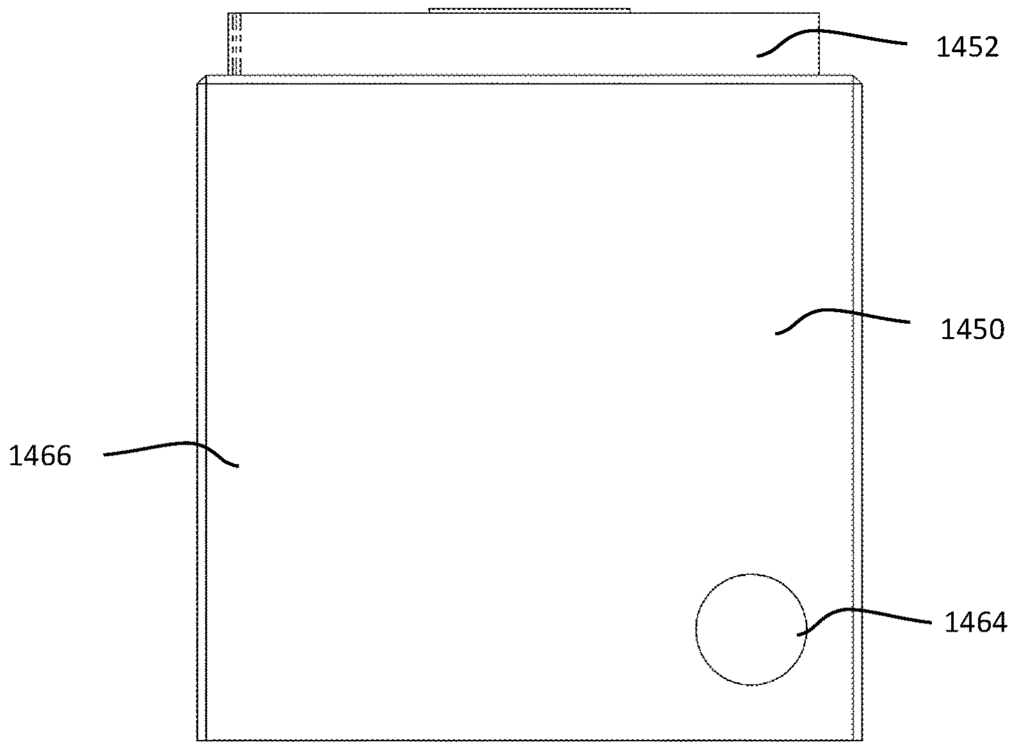
FIGS. 17A, 17B, 17C, 17D and 17E are simplified respective planar front, planar top, planar bottom, upward-facing pictorial and downward-facing pictorial view illustrations of a base housing forming part of the base assembly of FIGS. 16A-16E.
Figure 17B:
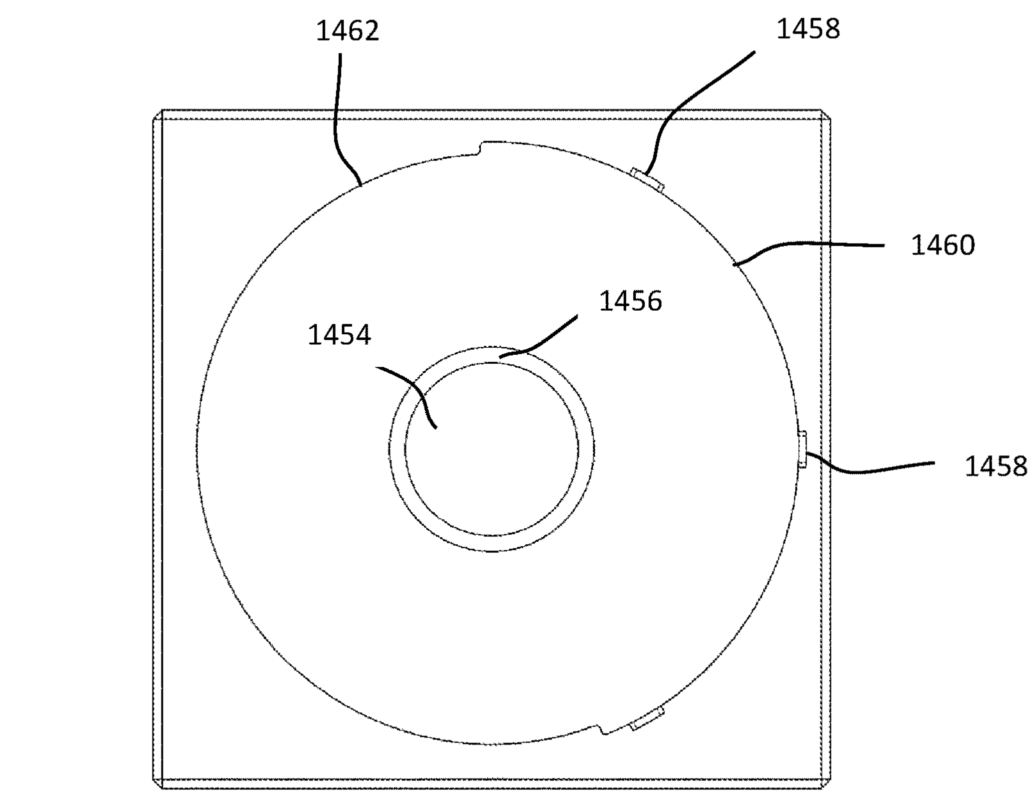
Figure 17C:
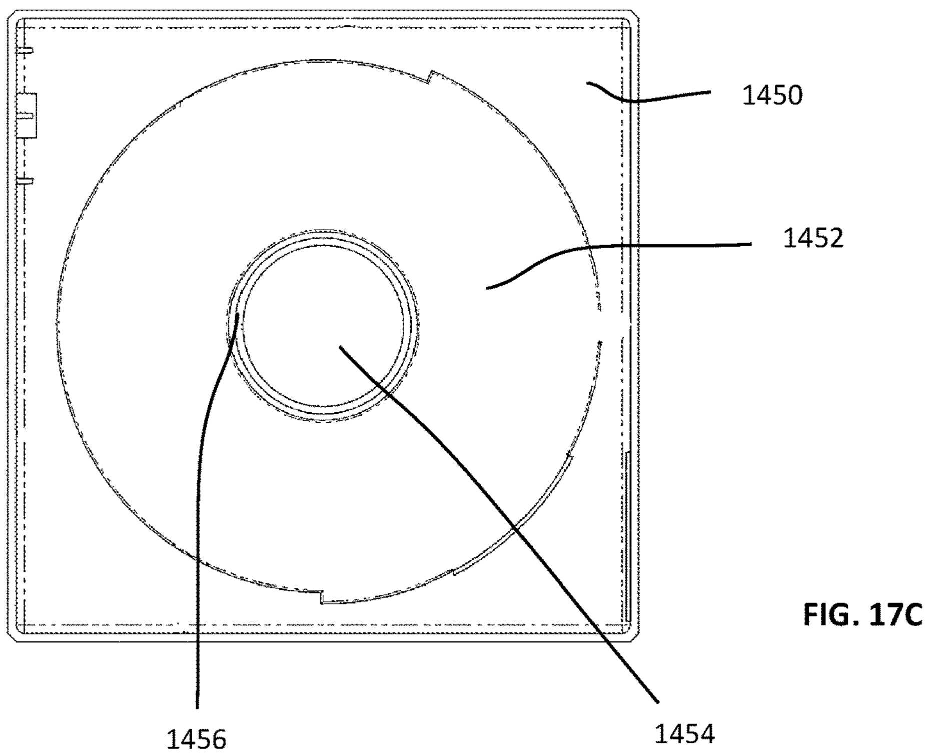
Figure 17D:
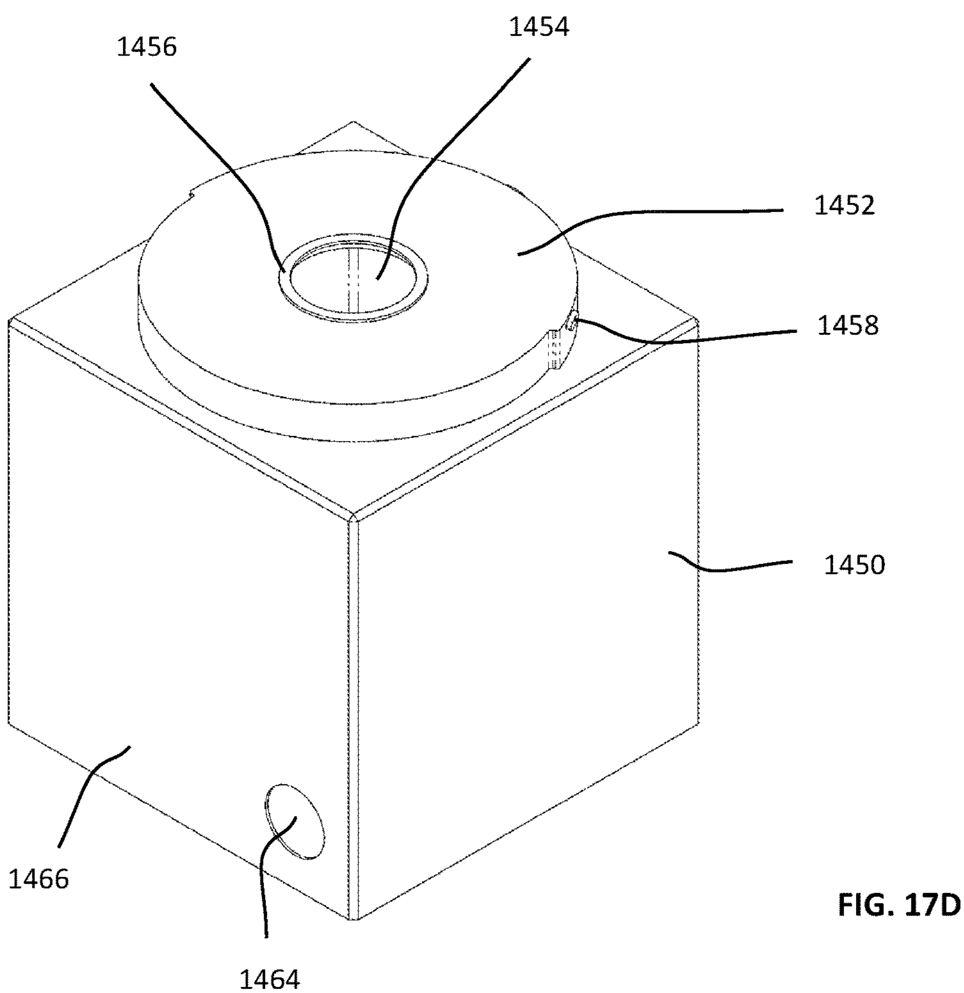
Figure 17E:
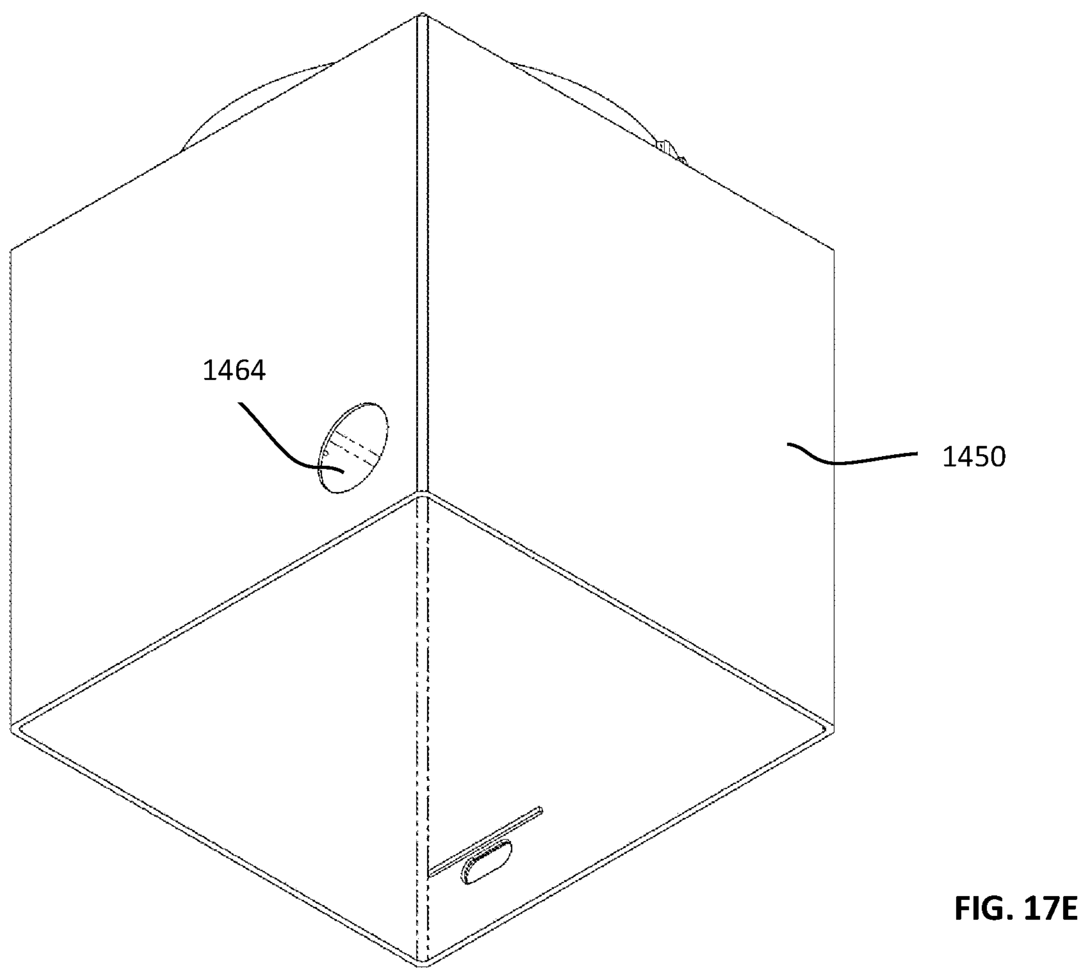

As seen with particular clarity in sectional enlargement A in FIG. 11A, low friction bearing ring 1072 is seated in circumferential recess 1070 and cylindrical top ring 1082 is rotatably supported thereon. Top cover 1074, which is fixed to static housing element 1060 by means of clips 1086 which engage apertures 1088 formed in top portion 1068, overlies recess 1070, low friction ring 1072 and cylindrical top ring 1082.

Reference is now made to FIGS. 12A-12E, which illustrate SUPCA support and clamping assembly (SUPCASCA) 1030 forming part of MMIDD 1000. As seen in FIGS. 12A-12E, SUPCASCA 1030 preferably includes a support element 1100, which rotatably supports a cam element 1110 and pivotably and slidably supports a plurality of, typically three, clamp elements 1120.

Reference is now made to FIGS. 13A-13H, which are simplified illustrations of clamp element 1120 forming part of the SUPCASCA 1030 of FIGS. 12A-12E. As seen in FIGS. 13A-13H, clamp element 1120 comprises a planar generally rectangular portion 1122 having a radially outward-facing surface 1124 and a radially inward-facing surface 1126. Radially outward-facing surface 1124 terminates at a radially inward tapered top surface 1128 of a clamping portion 1130 defining a radially inwardly and downwardly directed clamping groove 1132 which extends to radially inward-facing surface 1126. Top surface 1128 and clamping groove 1132 together define a clamping engagement edge 1134.

A cam engagement protrusion 1136 extends radially inwardly at a bottom portion of front surface 1126. A support element pivotable and slidable engagement protrusion 1138 is formed on radially outward-facing surface 1124 at a location generally opposite protrusion 1136.

Extending circumferentially to one side of clamping portion 1130 is a tab engagement protrusion 1140, which operatively engages tab 214 of lid 140 in response to clamping operation of clamp element 1120 and causes irreversible radially outward displacement of tab 214, thereby providing single-use functionality for SUPCA 100.

Reference is now made to FIGS. 14A-14F, which are simplified illustrations of support element 1100, forming part of SUPCASCA 1030 of FIGS. 12A-12E. As seen in FIGS. 14A-14F, support element 1100 preferably comprises a generally circular planar surface 1200 which is surrounded by a raised, generally annular planar container support surface 1210, preferably joined to surface 1200 by a tapered circular wall 1212. A spillage channel 1214 extends radially outwardly through tapered circular wall 1212 at a height between the planes of surface 1200 and annular planar container support surface 1210.

Disposed centrally of generally circular planar surface 1200 is a drive shaft accommodating aperture 1230, which is surrounded by an upstanding circumferential rim 1232, thereby to help prevent leaking of spillage located on generally circular planar surface 1200 into the remainder of the MMIDD 1000 lying below support element 1100.

Annular planar container support surface 1210 is preferably surrounded by a tapered wall 1240 which is preferably formed with a multiplicity of circumferentially distributed indents 1242, arranged to accommodate a plurality of generally vertical radially outwardly extending elongate protrusions 212 distributed along circumferential edge surface 210 of lid 140 of SUPCA 100. Wall 1240 terminates in a circumferential planar annular top and radially outwardly extending wall 1244 having a top-facing surface 1246.

Extending circumferentially to both sides of channel 1214 is a SUPCA azimuthal locating channel 1250, which extends radially outwardly of wall 1240 and communicates with channel 1214. SUPCA azimuthal locating channel 1250 accommodates finger engagement portion 196 of SUPCA 100.

Walls 1240 and 1244 are formed with a plurality of clamp accommodating pockets 1260, typically three in number. Each of pockets 1260 preferably includes an opening 1262, which extends from wall 1240 at a height just below that of wall 1244 radially outwardly along wall 1244. Each of pockets 1260 includes a radially outwardly extending wall 1264 and side walls 1266. Radially outwardly extending wall 1264 includes a radially inward lower portion 1268 and a radially outward upper portion 1270 joined by a concave curved surface 1272. Preferably, a magnet 1274 is seated behind radially inward lower portion 1268. Extending radially inwardly from radially inward outer portion 1268 adjacent each of side walls 1266 and underlying opening 1262 are a pair of protrusions 1276.

Preferably, a depending circumferential wall 1280 extends along nearly one half of the circumference of wall 1244 at an outer edge thereof.

Underlying surface 1200 is a corresponding circular planar surface 1290 which is formed with a convex curved circumferential wall 1292 surrounding aperture 1230. Surrounding wall 1292 there is formed a generally circular recess 1294, which is preferably configured to have a radially outwardly extending rectangular notch 1296.

Reference is now made to FIGS. 15A-15F, which are simplified illustrations of cam element 1110 forming part of the SUPCASCA 1030 of FIGS. 12A-12E.

As seen in FIGS. 15A-15F, cam element 1110 preferably is a generally circular planar element, preferably formed of polyoxymethylene(POM) or fiberglass-reinforced polyamide.

Cam element 1110 preferably includes a generally circular disk 1300 having a generally planar top surface 1302 and a generally planar bottom surface 1304 and is formed with a central aperture 1306 having a radially outwardly extending generally rectangular notch 1308. A circumferential wall 1310 surrounds disk 1300.

Aperture 1306 is surrounded on generally planar top surface 1302 by a generally circular rotational engagement surface 1312 and is surrounded on generally planar bottom surface 1304 by a generally circular ledge surface 1314. Generally circular ledge surface 1314 is surrounded adjacent generally planar bottom surface 1304 by a generally circular wall 1316 that is formed with a plurality of radially outwardly extending notches 1318. A plurality of mutually equally spaced ribs 1320 preferably extend from circular wall 1316 to circumferential wall 1310 and are joined to planar bottom surface 1304.

Formed on a radially outer surface of circumferential wall 1310 are a plurality of cam channels 1330, preferably three in number, each arranged to operate and selectably position a clamp element 1120, located in a pocket 1260 of support element 1100, as will be described hereinbelow with reference to FIGS. 48A and 49A. The clamp element 1120 is retained in a cam channel 1330 by engagement of engagement surface 1138 of the radially outwardly facing surface 1124 of the clamp element 1120 with lower surface 1268 of pocket 1260. As seen particularly well in FIGS. 15B and 15E, cam channels 1330 are distributed about the outer circumference of cam element 1110 and are partially overlapping. Each cam channel 1330 is defined by a pair of radially outwardly extending mutually spaced circumferential walls 1332, each of which extends from a first location 1334 therealong to a second location 1336 therealong. Upstream of the first location 1334 is an entry location 1338 wherein, during assembly of the SUPCASCA 1030, each clamp element 1120 is inserted into cam channel 1330. Generally, each cam channel 1330 extends circumferentially and downwardly through approximately 105 degrees of azimuth. The width of each cam channel 1330, as defined by the separation between adjacent circumferential walls 1332, is at a maximum at the first location 1334.

It is a particular feature of this embodiment of the present invention that the operation of the cam element 1110 in causing clamp elements 1120 to assume a clamping operative orientation is produced both by the downward orientation of the cam channel 1330 from the first location 1334 to the second location 1336 and by varying the radial extent of a circumferential wall 1332 relative to circumferential wall 1310 along the cam channels 1330. Thus it will be seen that at first location 1334, the radial extent of the upper circumferential wall 1332 defining the cam channel 1330 is at a maximum, forcing the clamp element 1120 located in the cam channel 1330 at the first location 1334 radially outwardly and as the cam channel 1330 rotates relative to the clamp element 1120 in pocket 1260, the radial extent of the upper circumferential wall 1332 decreases, allowing the clamp element 1120 to be biased radially inwardly by engagement of engagement surface 1138 of the radially outwardly facing surface 1124 of the clamp element 1120 with lower surface 1268 of pocket 1260.

This operation is enhanced by construction of the cam channels 1330 to have a maximum width between adjacent circumferential walls 1332 at the first location 1334 along each cam channel 1330 so as to accommodate radial outward biasing of the clamp element 1120 within the cam channel 1330 thereat.

It is appreciated that the cam channels 1330 are each constructed to have a somewhat flexible stopper portion 1340 downstream of entry location 1338 and upstream of the first location 1334 thereof to permit assembly of the device with each clamp element 1120 located within a cam channel 1330 and to prevent inadvertent disengagement of the clamp element 1120 from the cam channel 1330. Each cam channel 1330 is blocked at the second location 1336, thus preventing disengagement of the clamp element 1120 from the cam channel 1330 at the second location 1336.

It is a particular feature of this embodiment of the present invention that a generally planar annular wall surface 1350 extends radially outwardly of circumferential wall 1310 below generally planar bottom surface 1304 and is formed with a downwardly facing circumferential leakage directing protrusion 1352, which is operative to direct liquids away from the interior of MMIDD 1000.

It is also a particular feature of this embodiment of the present invention that a radially outwardly directed edge 1354 of generally planar annular wall surface 1350 is formed with a plurality of locating notches 1356, which are configured to engage protrusions 1276 associated with each pocket 1260, thereby ensuring proper azimuthal alignment between the cam element 1110 and the support element 1100.

Reference is now made to FIGS. 16A-16E, which are simplified illustrations of base assembly 1020 forming part of MMIDD 1000 of FIGS. 10A-10C. As seen in FIGS. 16A-16E, the base assembly 1020 includes a base housing 1400, which is preferably generally cubic in configuration and is supported on a bottom assembly 1410. Mounted on base housing 1400 is an ON/OFF push button element 1420.

Disposed within base housing 1400 are a vertically displacing rotary drive motor assembly 1430 and a printed circuit board 1440, which preferably contains control electronics which manage operation of the MMIDD 1000.

Reference is now made to FIGS. 17A-17E, which are illustrations of base housing 1400, forming part of the base assembly 1020 of FIGS. 16A-16E. As seen in FIGS. 17A-17E, base housing 1400 includes a cubic main portion 1450 and a generally cylindrical top portion 1452 integrally formed therewith and having a central aperture 1454, surrounded by a raised rim 1456.

Generally cylindrical top portion 1452 is preferably formed with a plurality of, typically three, radially outwardly extending protrusions 1458 distributed along an outer periphery of a first generally semicircular wall portion 1460 thereof. Protrusions 1458 are inserted into radially inward-facing bayonet receiving recesses 1066 to provide locking of semicylindrical upstanding wall portion 1062 of static housing assembly 1060 to base housing 1400. Generally cylindrical top portion 1452 also includes a second generally semicircular wall portion 1462 which is concentric with first generally semicircular wall portion 1460 but has a smaller outer radius. An aperture 1464 is provided on a front wall 1466 of cubic main portion 1450.

Figure 18A:
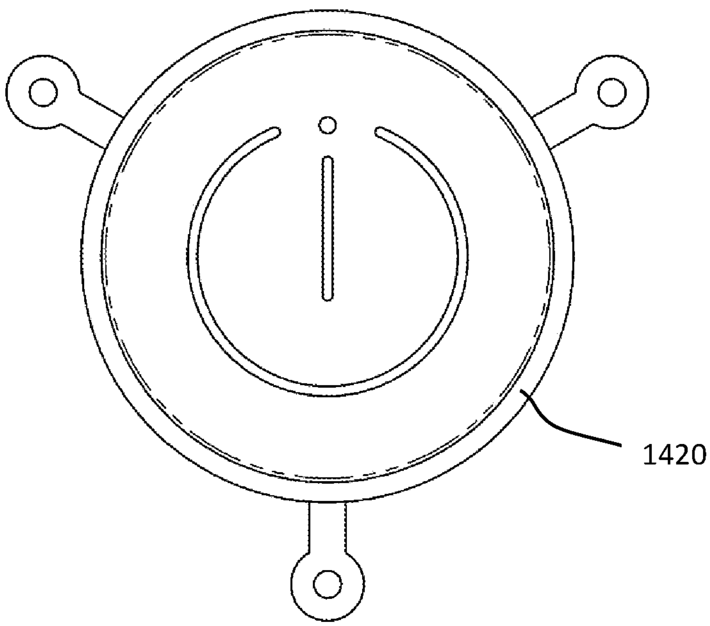
FIGS. 18A, 18B and 18C are simplified respective planar front view, pictorial front view and pictorial rear view illustrations of an ON/OFF push button element forming part of the base assembly of FIGS. 16A-16E.
Figure 18B:
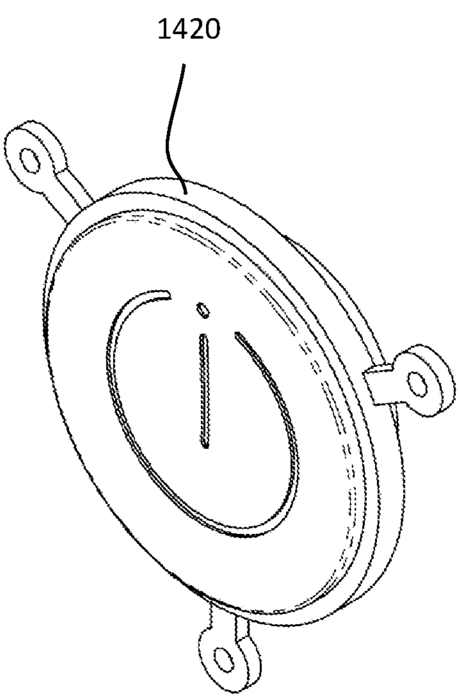
Figure 18C:
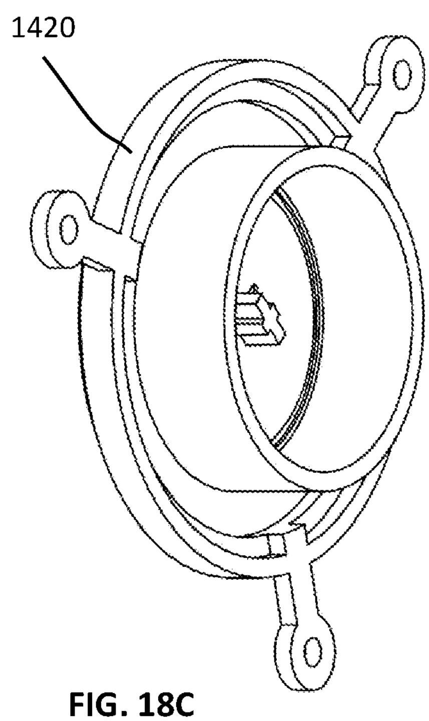

Reference is now made to FIGS. 18A-18C, which are simplified illustrations of ON/OFF push button element 1420, forming part of the base assembly 1020 of FIGS. 16A-16E. ON/OFF push button element 1420 is preferably a somewhat flexible plastic element which engages a switch and is preferably mounted on a printed circuit board (not shown) located within base housing 1400. ON/OFF push button element 1420 is preferably mounted in aperture 1464 of cubic main portion 1450.

Reference is now made to FIGS. 19A-19F, which are simplified illustrations of vertically displacing rotary drive motor assembly 1430, forming part of the base assembly 1020 of FIGS. 16A-16E. As seen in FIGS. 19A-19F, the vertically displacing rotary drive motor assembly 1430 preferably comprises a rotary drive gear 1500 which is rotatably mounted on a motor housing and support assembly 1510. Motor housing and support assembly 1510 in turn supports an auxiliary rotary drive motor 1520 and encloses an axially displaceable rotary drive assembly 1530.

Figure 20:
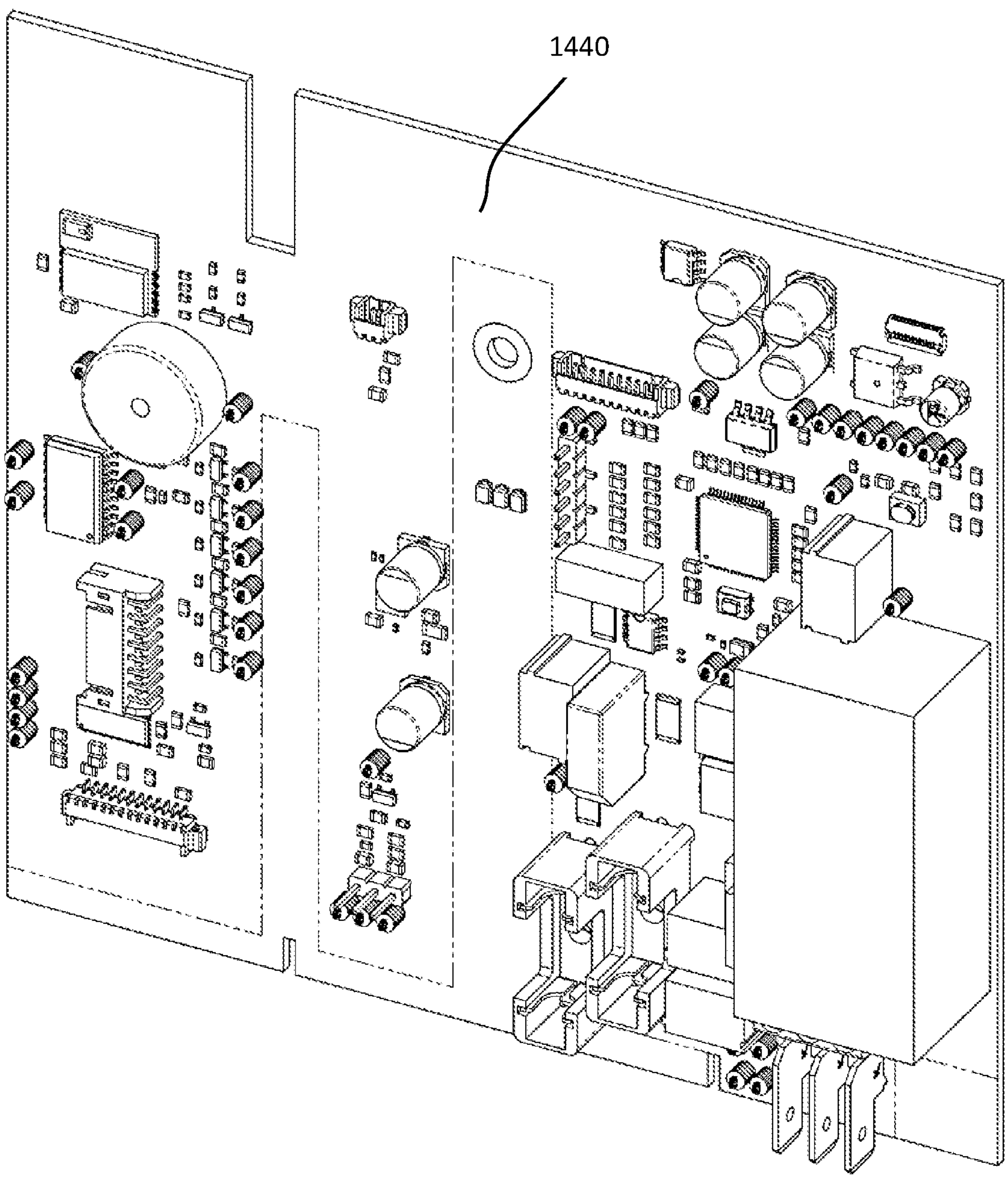
FIG. 20 is a simplified pictorial illustration of a control circuit board forming part of the base assembly of FIGS. 16A-16E.

Reference is now made to FIG. 20, which is a simplified pictorial illustration of printed circuit board 1440, forming part of the base assembly 1020 of FIGS. 16A-16E. It is appreciated that there may be additionally provided multiple various printed circuit boards (not shown) within base housing 1400.

Figure 21A:
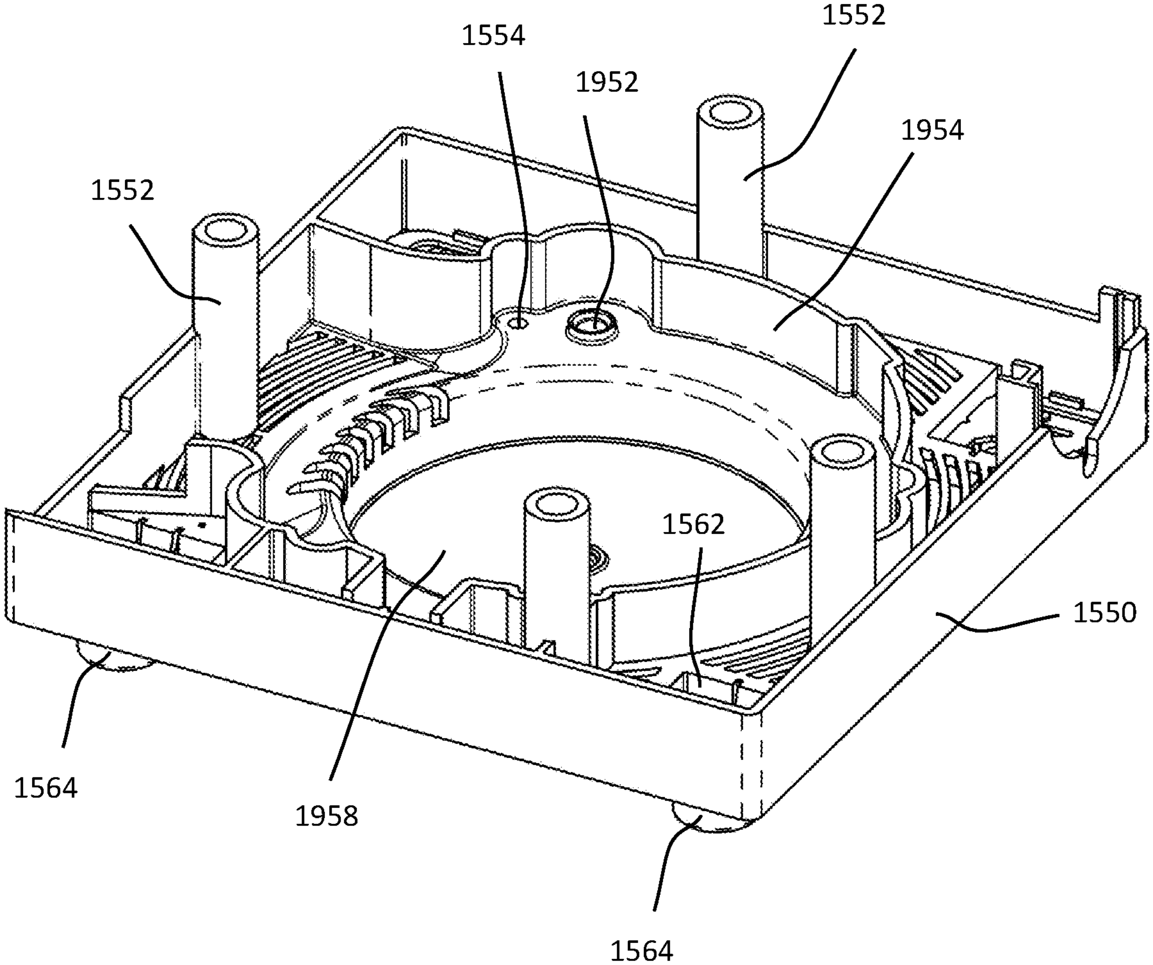
FIGS. 21A and 21B are simplified pictorial respective assembled and exploded view illustrations of a bottom assembly forming part of the base assembly of FIGS. 16A-16E.
Figure 21B:
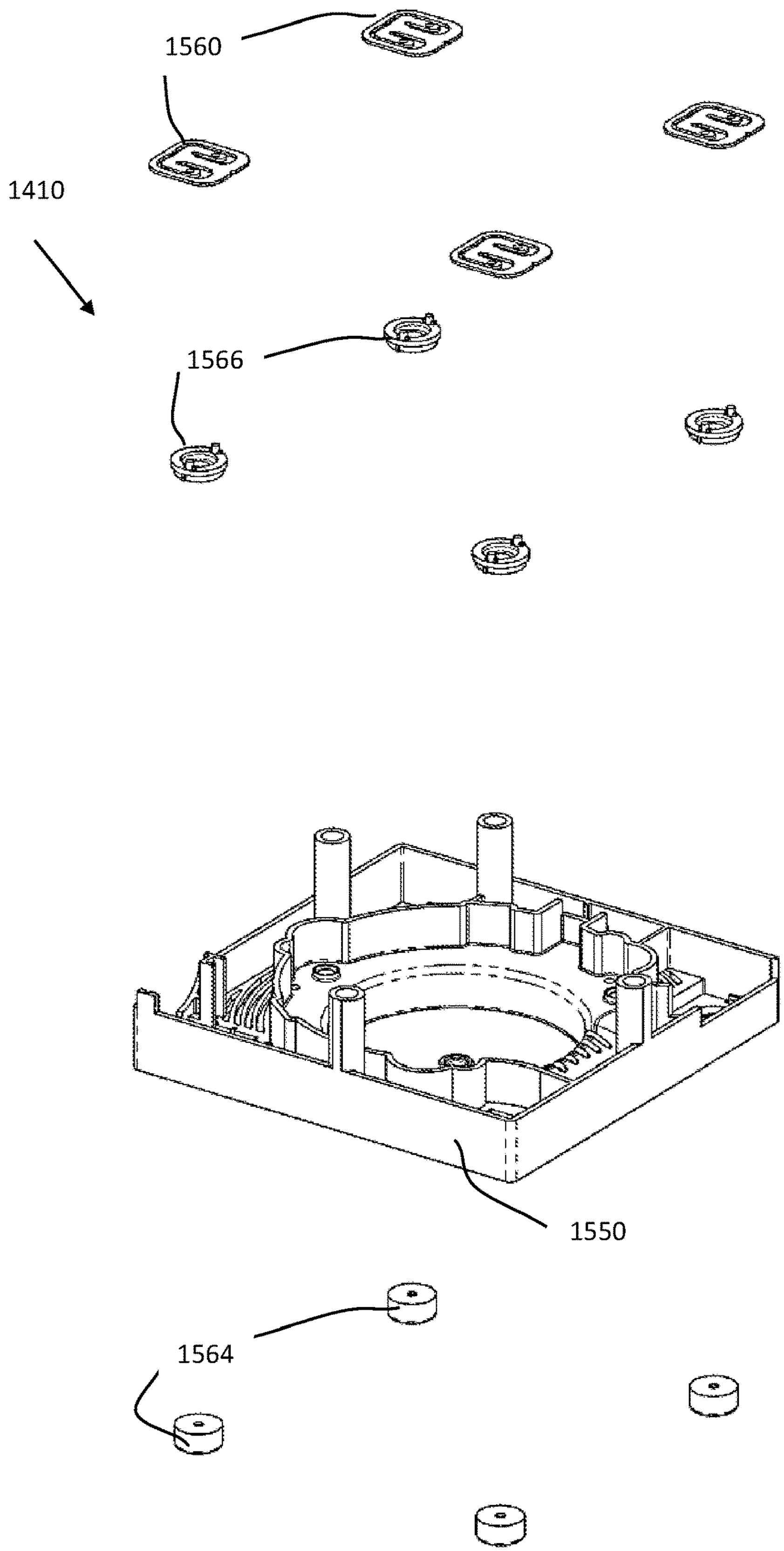
Figure 22A:
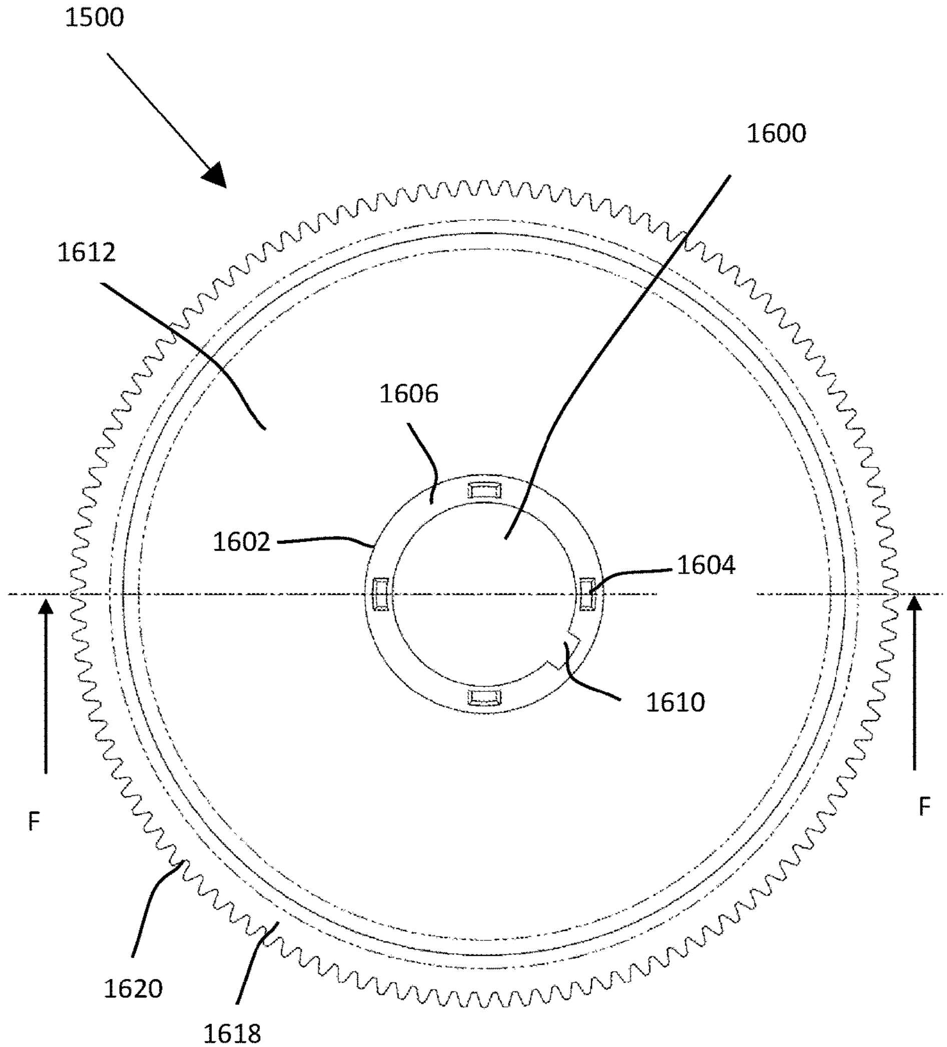
FIGS. 22A, 22B, 22C, 22D, 22E, 22F and 22G simplified respective planar top, planar side, planar bottom, pictorial top, pictorial bottom, first planar sectional and second planar sectional view illustrations of a rotary drive gear forming part of the vertically displacing rotary drive motor assembly of FIGS. 19A-19F, FIGS. 22F and 22G being taken along lines F-F in FIG. 22A and G-G in FIG. 22B, respectively.
Figure 22B:
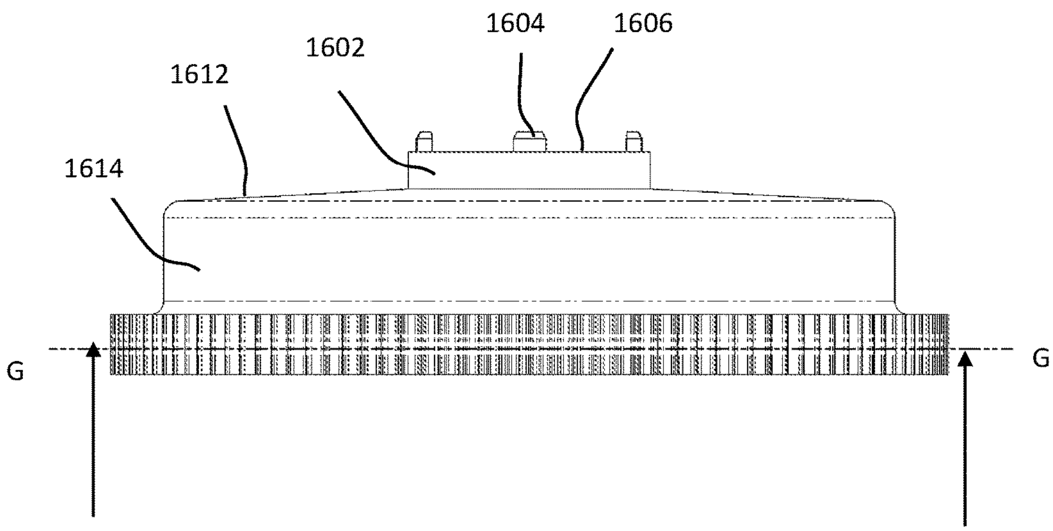
Figure 22C:
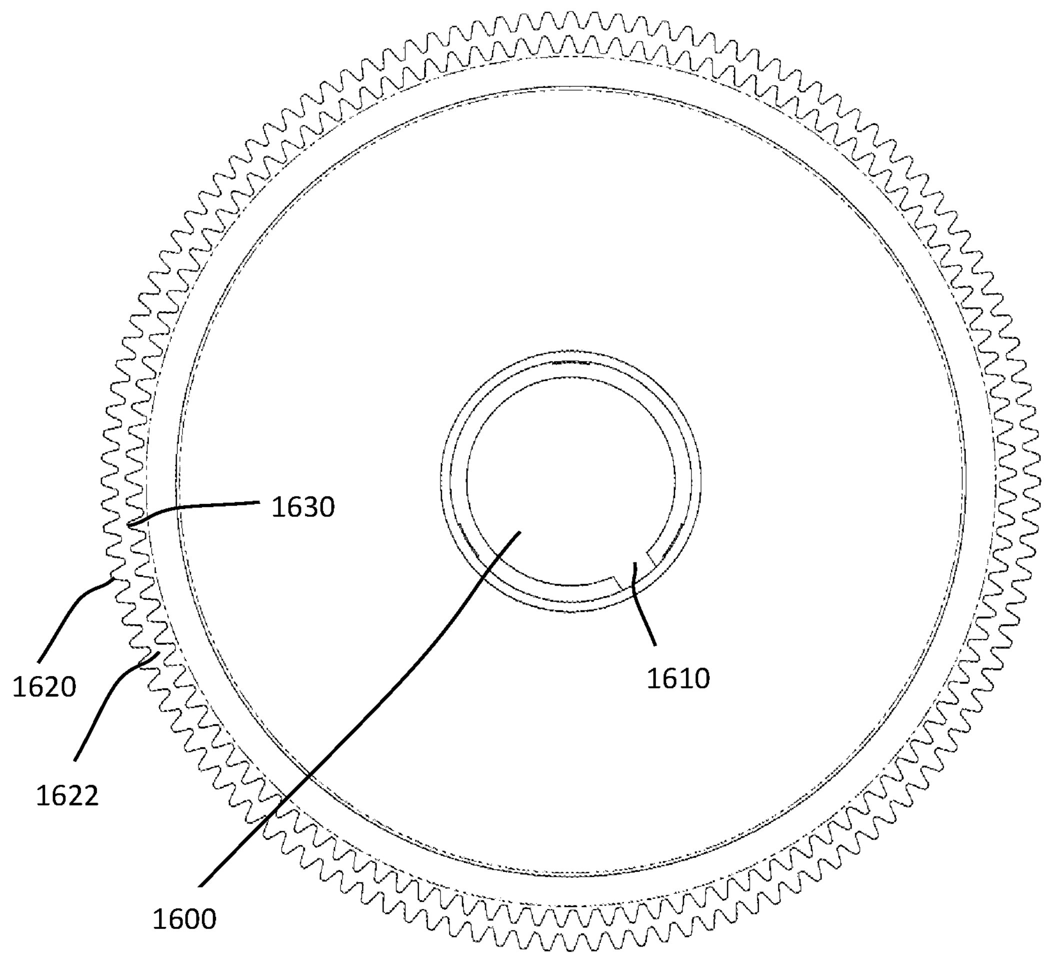
Figure 22D:
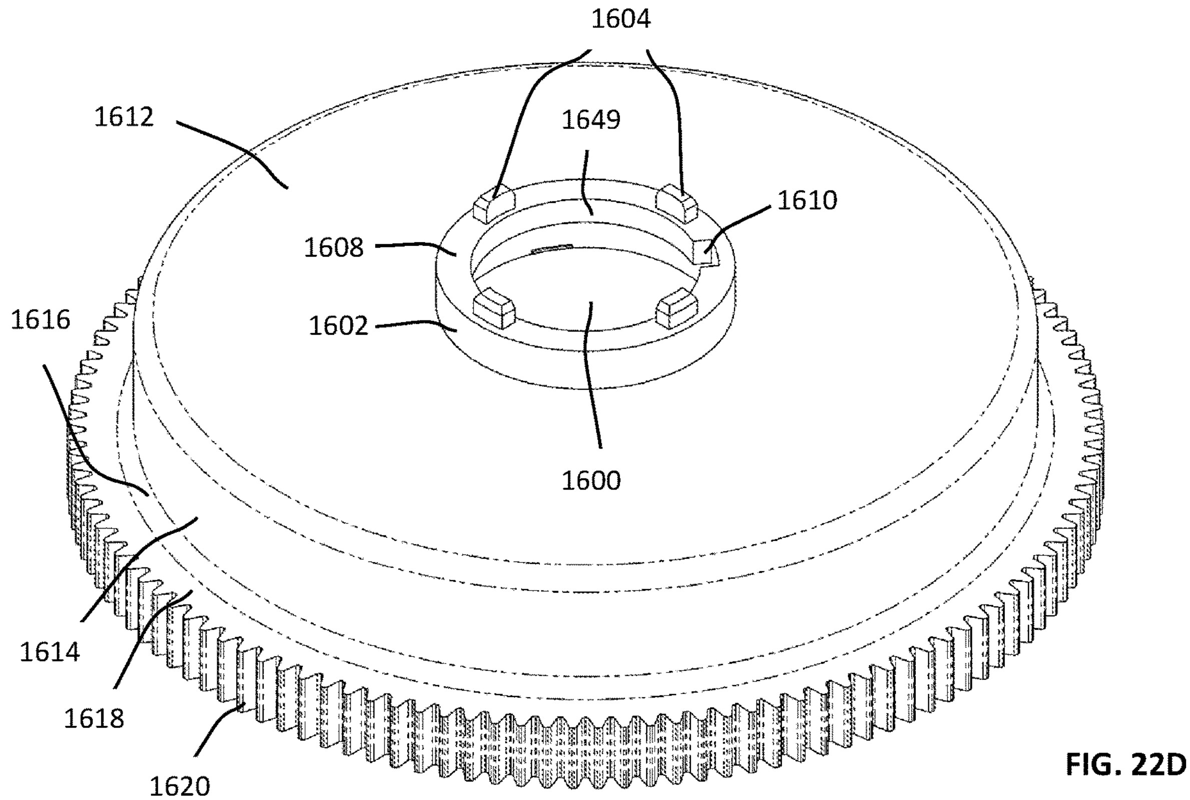
Figure 22E:
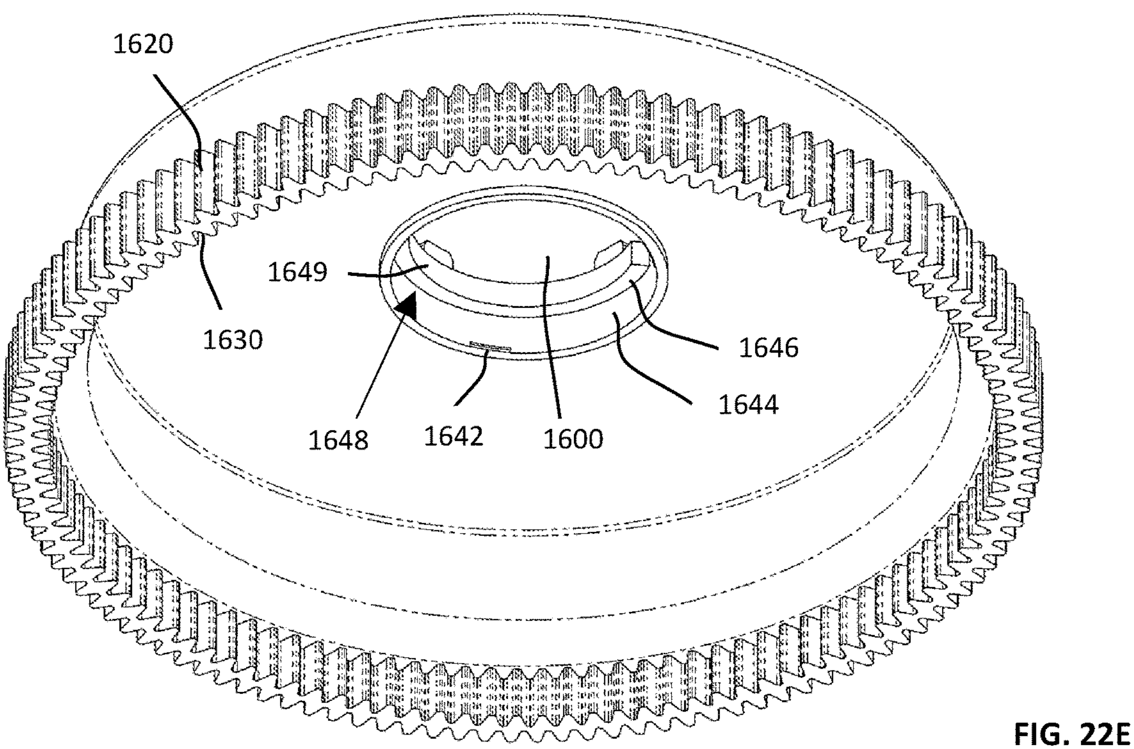
Figure 22F:
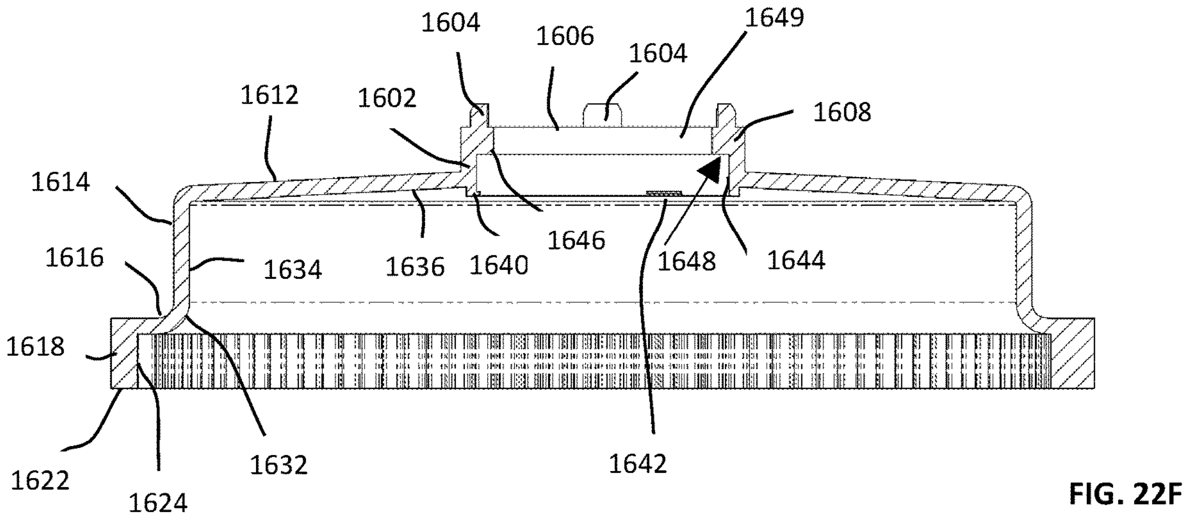
Figure 22G:
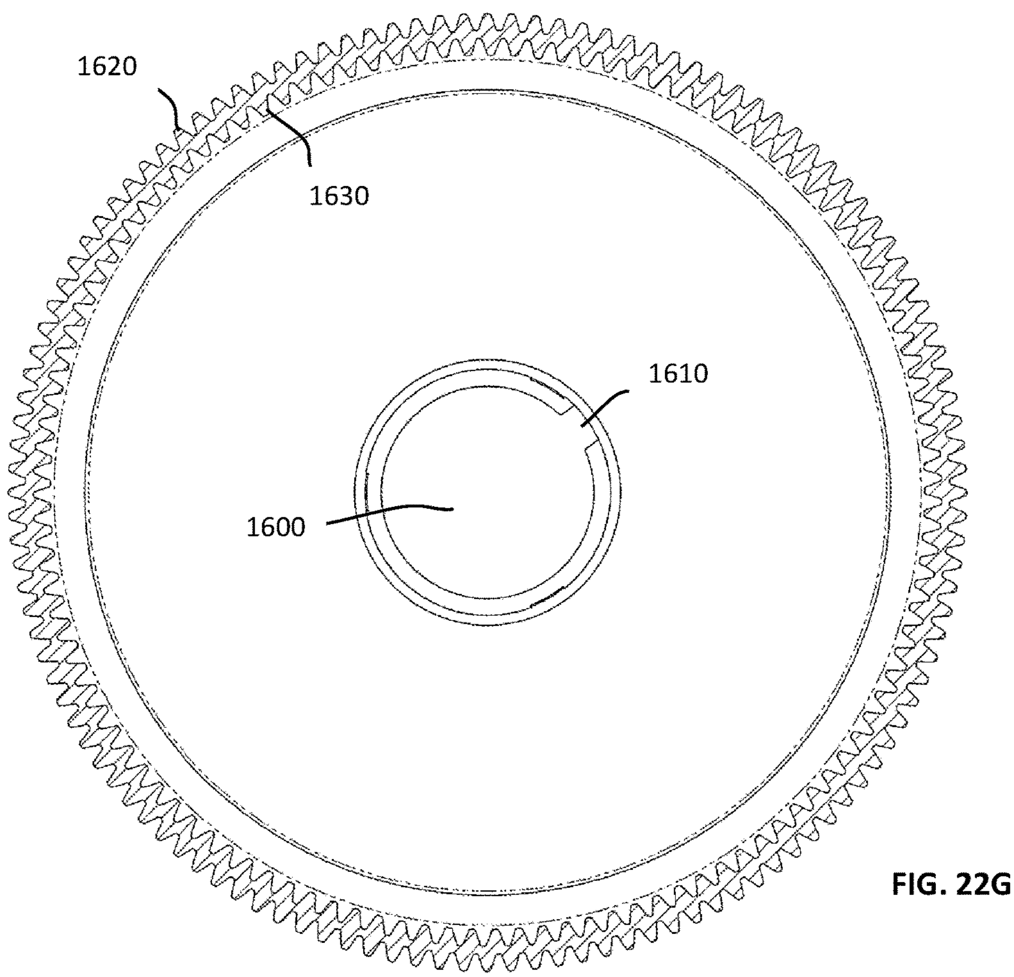
Figure 23A:
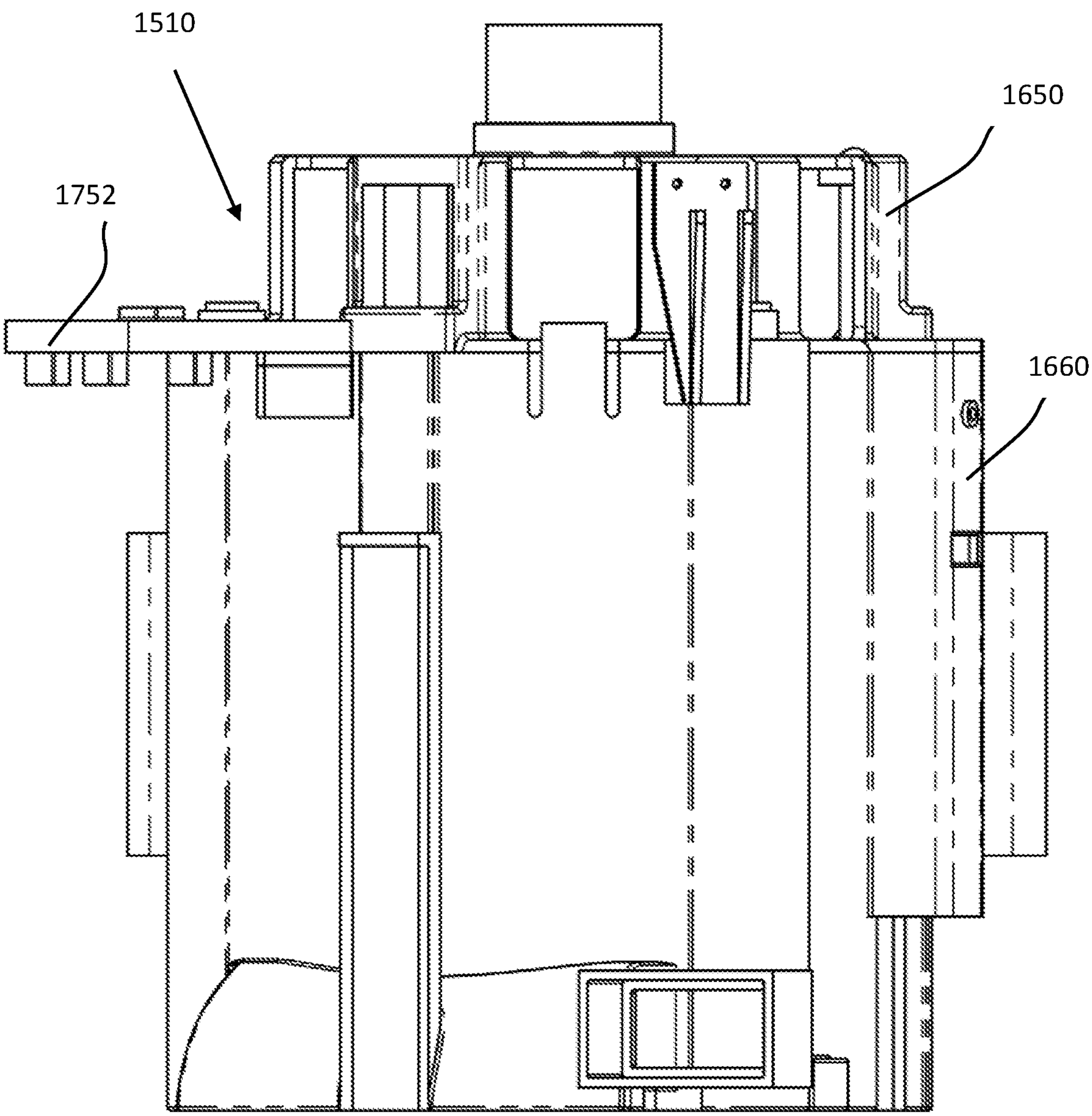
FIGS. 23A, 23B, 23C and 23D are simplified respective planar side, planar top, planar bottom and exploded view illustrations of a motor housing and support assembly, forming part of the vertically displacing rotary drive motor assembly of FIGS. 19A-19F.
Figure 23B:
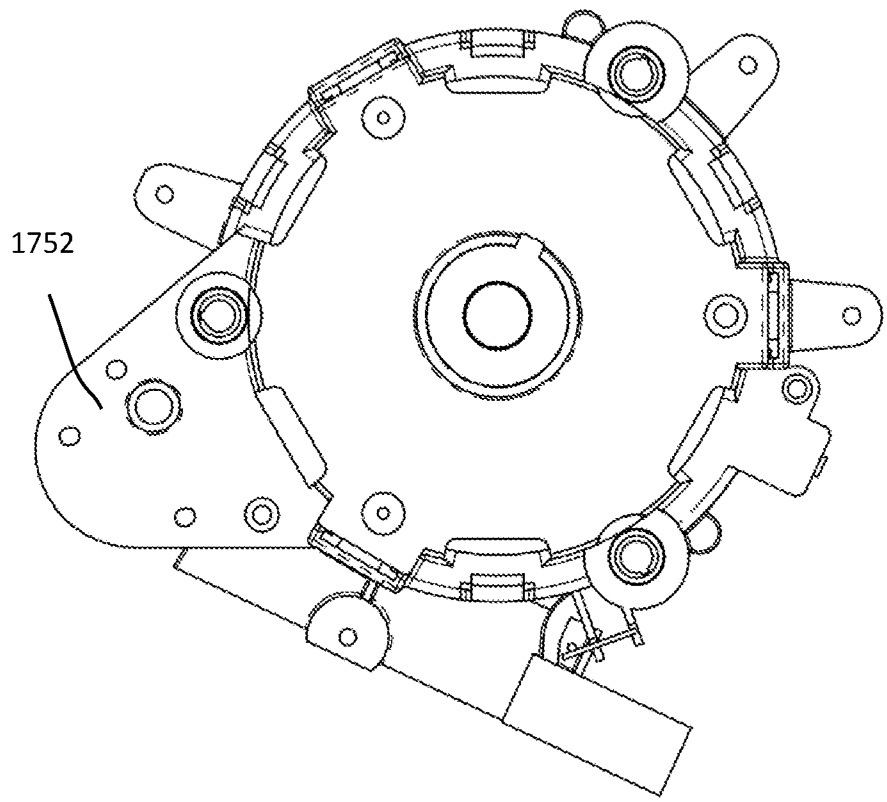
Figure 23C:
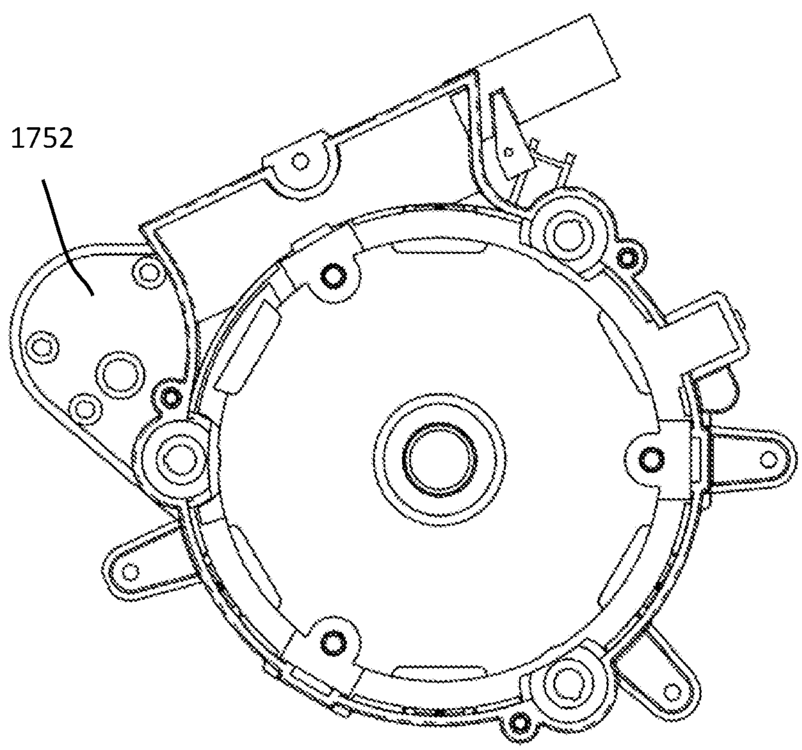
Figure 23D:
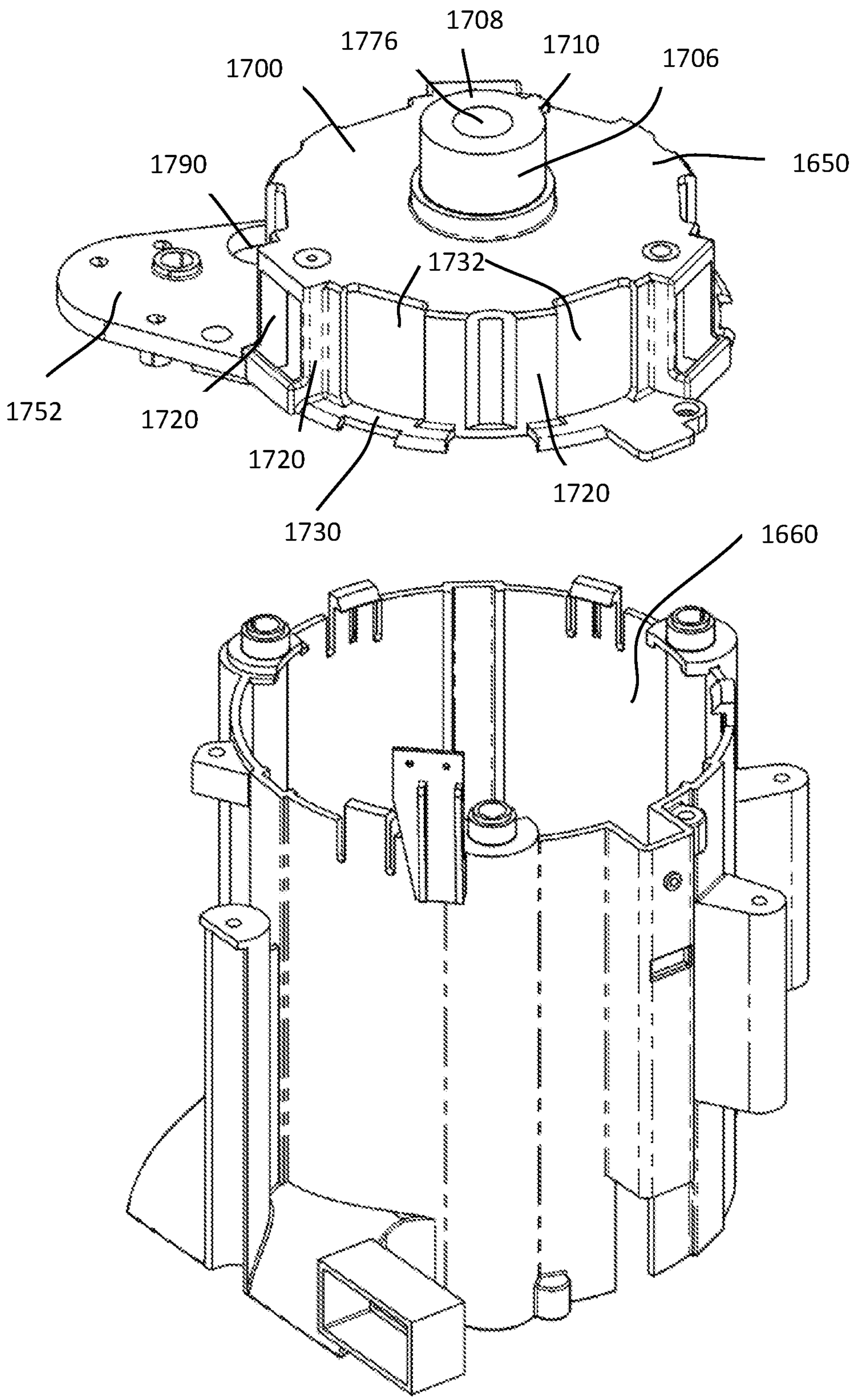

Reference is now made to FIGS. 21A and 21B, which are simplified pictorial respective assembled and exploded view illustrations of bottom assembly 1410, forming part of the base assembly 1020 of FIGS. 16A-16E. As seen in FIGS. 21A and 21B, bottom assembly 1410 preferably includes a generally square bottom element 1550 which defines a plurality of upstanding mounting screw guiding bosses 1552, which enable insertion of screws (not shown) which are employed for static mounting of base housing 1400 onto motor housing and support assembly 1510. Bottom element 1550 also defines screw mounting apertures 1554, which accommodate screws (not shown), which are employed for static mounting of motor housing and support assembly 1510 onto bottom element 1550.

A plurality of, preferably four, load cells 1560 are preferably located in corner recesses 1562 in bottom element 1550 and are secured by screws (not shown) to corresponding support pads 1564 underlying bottom element 1550 via load cell supports 1566, which overlie bottom element 1550. Support pads 1564 extend through corresponding apertures 1568 (FIG. 27B), which extend through bottom element 1550 at corner recesses 1562. Load cells 1560 are preferably model GML624, commercially available from Xi'an Gavin Electronic Technology Co., Ltd Xi'an, Shaanxi, China.

Reference is now made to FIGS. 22A-22G, which are simplified illustrations of rotary drive gear 1500 forming part of vertically displacing rotary drive motor assembly 1430 of FIGS. 19A-19F. As seen in FIGS. 22A-22G, rotary drive gear 1500 preferably is a generally circularly symmetric cap having a central aperture 1600 surrounded by an upstanding circumferential wall 1602 having a plurality of upwardly extending protrusions 1604 at an upper edge 1606 thereof. Protrusions 1604 are configured to seat in notches 1318 of cam element 1110. A circumferentially inwardly directed annular wall 1608 extends inwardly of circumferential wall 1602 at upper edge 1606 thereof and is formed with a notch 1610.

At its base, circumferential wall 1602 is surrounded by a nearly planar but slightly conical top surface 1612, which terminates in a depending circumferential wall 1614. Circumferential wall 1614 terminates in an annular circumferential surface 1616, which terminates in a further depending circumferential wall 1618 having formed on an outer circumferential surface thereof a radially outwardly directed circumferentially extending gear train 1620.

Wall 1618 has a bottom edge 1622 and an inner circumferential surface 1624. A radially inwardly directed circumferentially extending gear train 1630 is formed on inner circumferential surface 1624. Preferably gear trains 1620 and 1630 have an identical pitch and are slightly out of phase. Bottom edge 1622 exhibits edges of both gear trains 1620 and 1630.

Interiorly and upwardly of inner circumferential surface 1624 there is provided a curved circumferential surface 1632, which underlies annular circumferential surface 1616 and extends to an inner circumferential surface 1634 which lies inwardly of circumferential wall 1614. An inner nearly planar but slightly conical surface 1636 underlies nearly planar but slightly conical top surface 1612.

Surrounding aperture 1600 at the interior of rotary drive gear 1500 is a downwardly extending annular protrusion 1640 having a plurality of slightly radially inwardly protrusions 1642 formed thereon. Extending upwardly from annular protrusion 1640 is an inner circumferential surface 1644, which terminates in an annular surface 1646 and defines therewith a shoulder 1648. An upper inner circumferential surface 1649 extends upwardly from annular surface 1646.

Reference is now made to FIGS. 23A-23D, which are simplified illustrations of motor housing and support assembly 1510, forming part of the vertically displacing rotary drive motor assembly 1430 of FIGS. 19A-19F. As seen in FIGS. 23A-23D, the motor housing and support assembly 1510 includes a top element 1650, which is described hereinbelow in detail with reference to FIGS. 24A-24F, and a bottom element 1660, which is described hereinbelow in detail with reference to FIGS. 25A-25E.

Reference is now made to FIGS. 24A-24F, which are simplified illustrations of top element 1650 forming part of the motor housing and support assembly 1510 of FIGS. 23A-23D.

As seen in FIGS. 24A-24F, top element 1650 preferably includes a planar wall portion 1700 from which extends upwardly a central upstanding circumferential wall surface 1702, which terminates at an annular generally planar wall surface 1704, which rotatably supports annular surface 1646 of rotary drive gear 1500.

Annular generally planar wall surface 1704 terminates radially inwardly in an upstanding circumferential wall surface 1706 having a top planar annular edge surface 1708, which is formed with a radially outwardly extending protrusion 1710, which corresponds to notch 1610 of rotary drive gear 1500 and which corresponds to notch 1308 of cam element 1110.

Peripherally of planar wall portion 1700 are a plurality of mutually spaced depending wall portions 1720, all of which terminate in a generally planar, generally annular wall 1730, which lies parallel to planar wall portion 1700. Wall portions 1720, together with wall portion 1700 and wall 1730, define an array of ventilation apertures 1732. An extension 1752 of wall 1730 supports auxiliary rotary drive motor 1520.

Figure 24A:
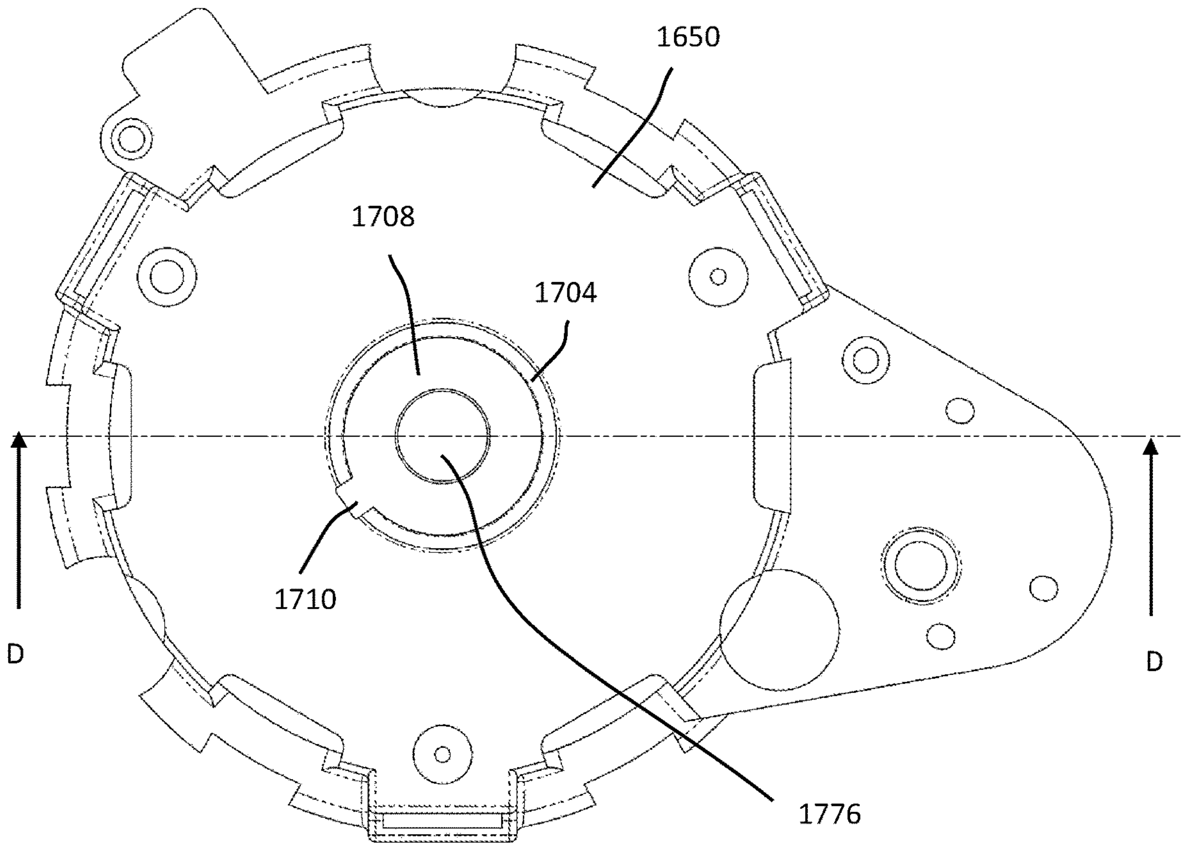
FIGS. 24A, 24B, 24C, 24D, 24E and 24F are simplified respective planar top, planar bottom, planar side, sectional, pictorial top and pictorial bottom view illustrations of a top element forming part of the motor housing and support assembly of FIGS. 23A-23D, FIG. 24D being taken along lines D-D in FIG. 24A.
Figure 24B:
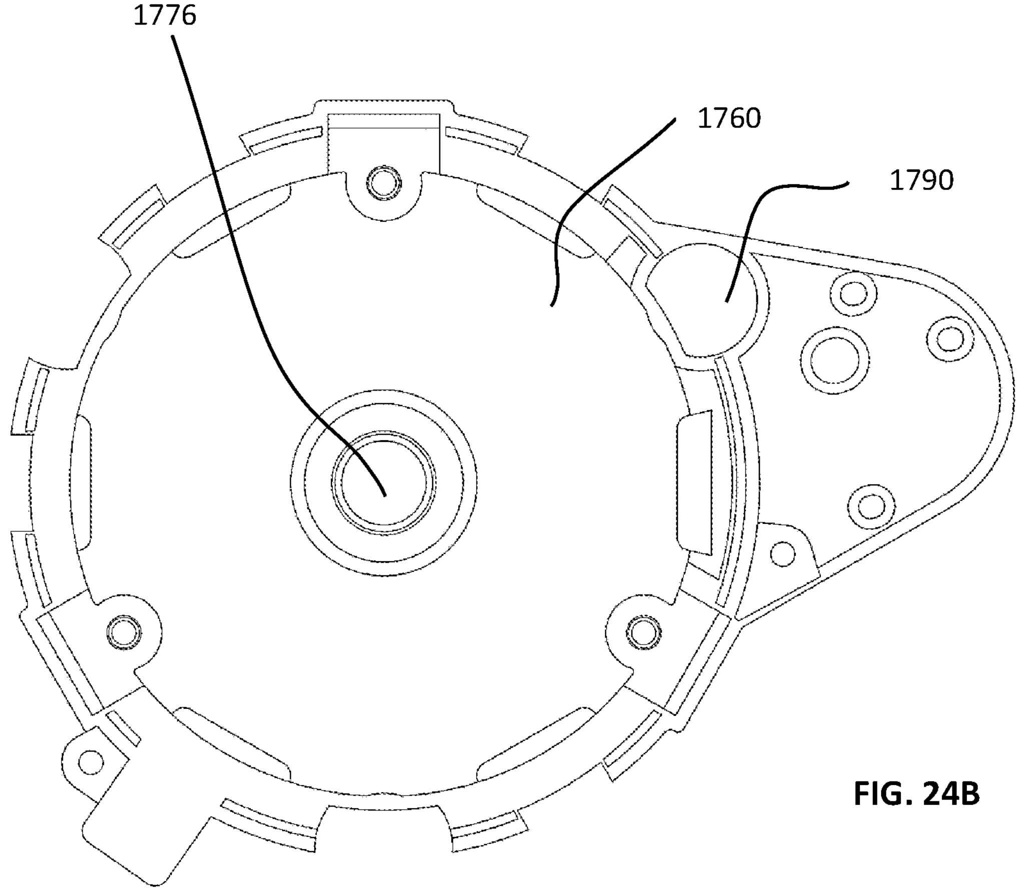
Figure 24C:
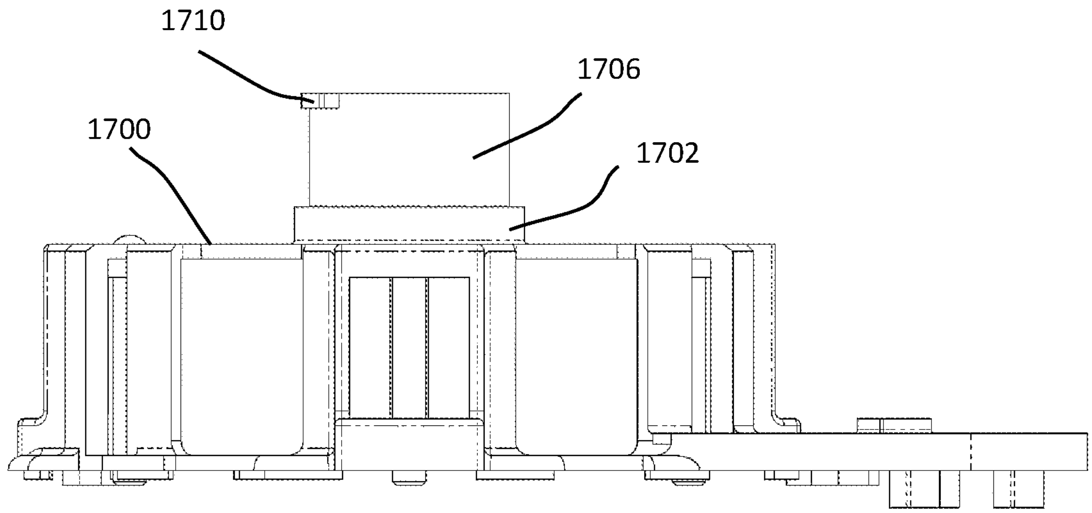
Figure 24D:
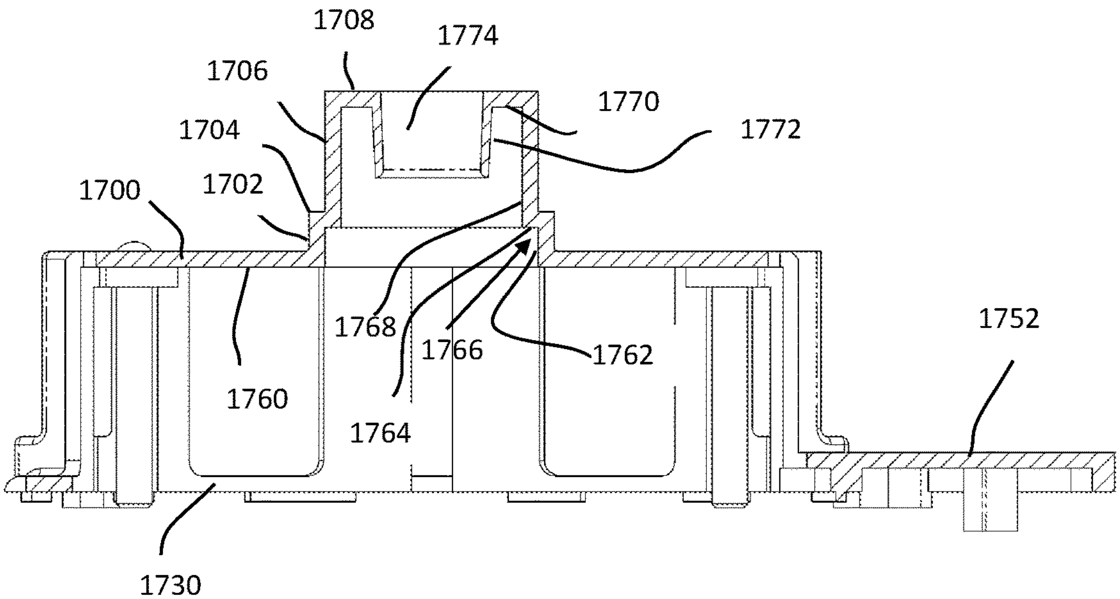
Figure 24E:
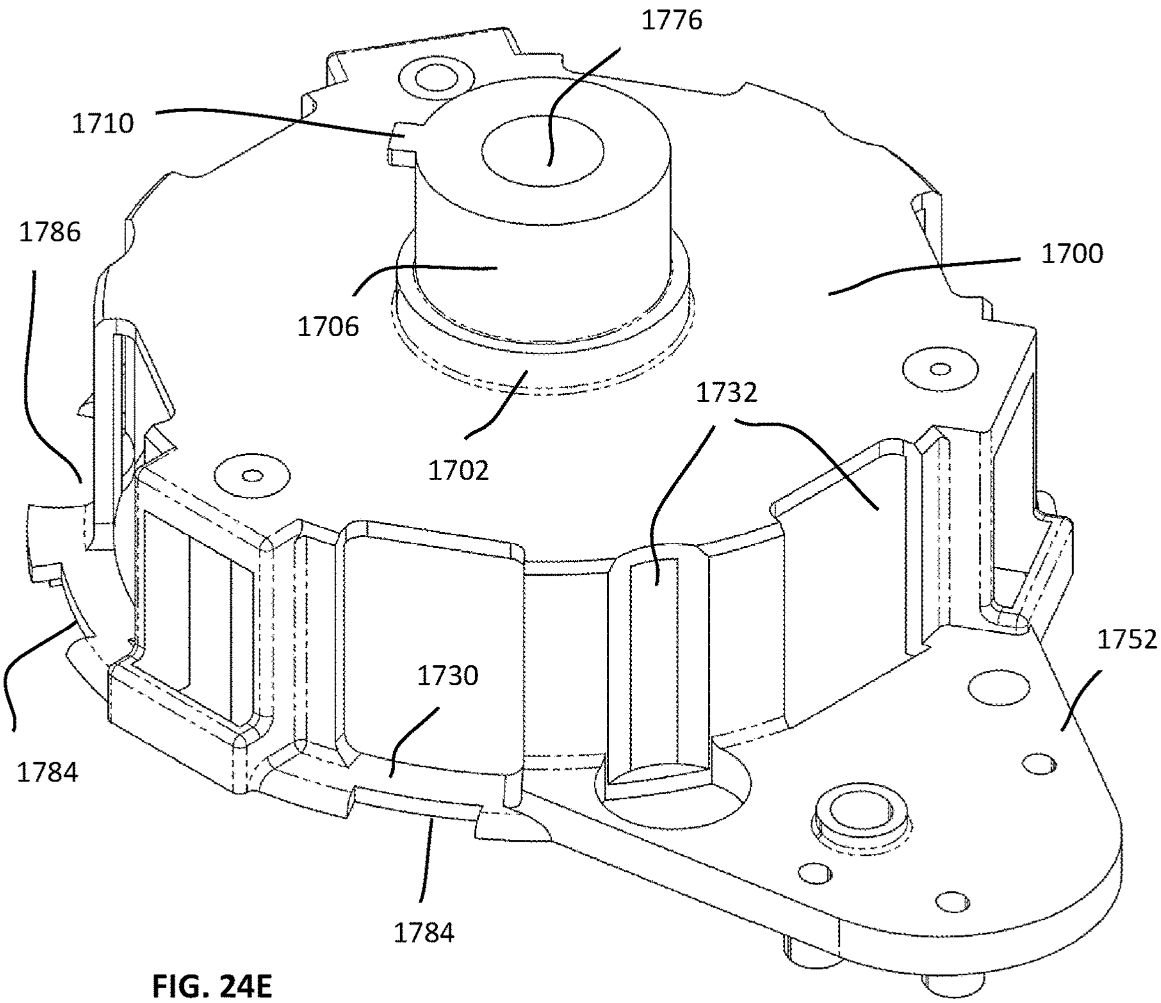
Figure 24F:
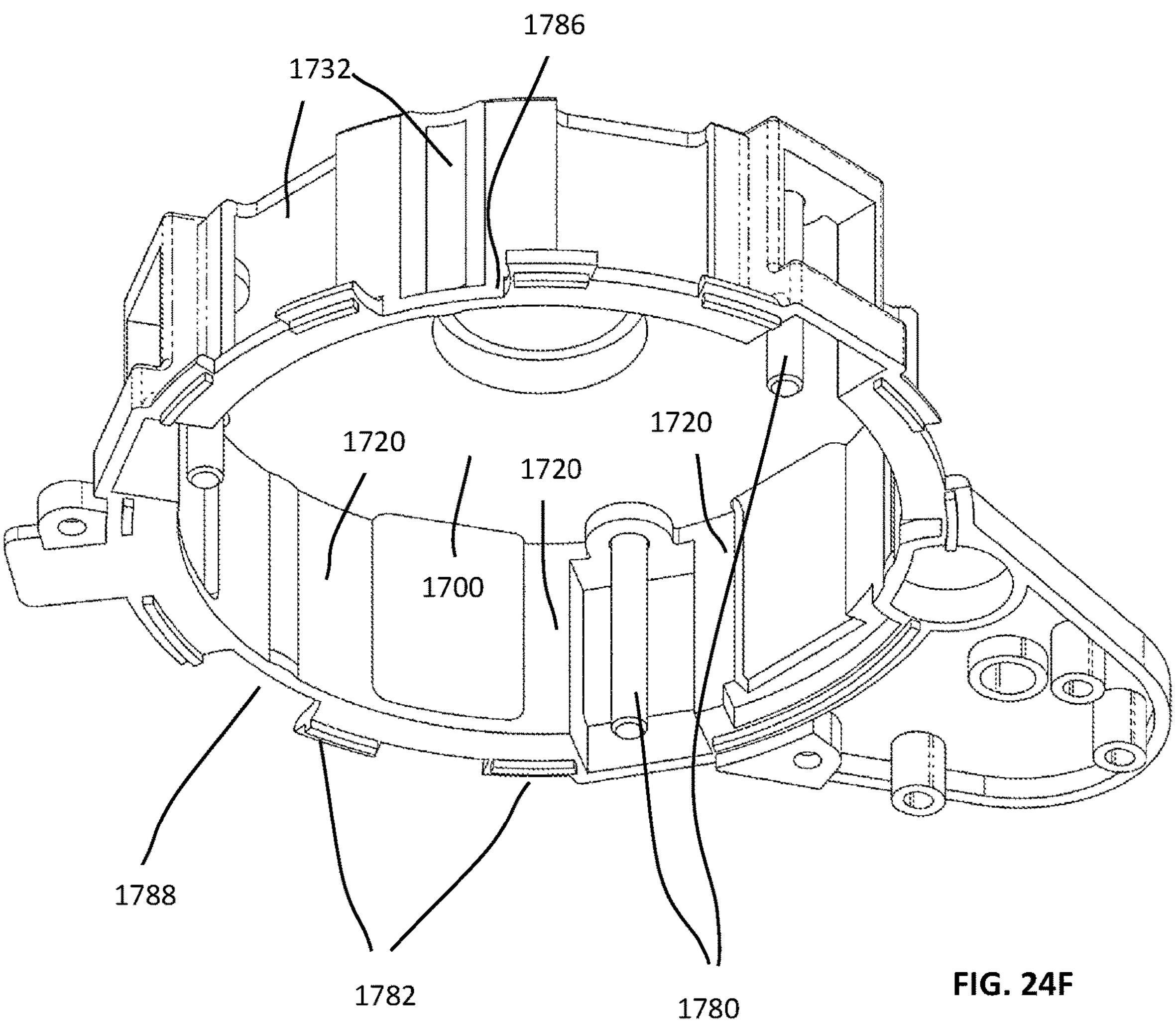
Figure 25A:
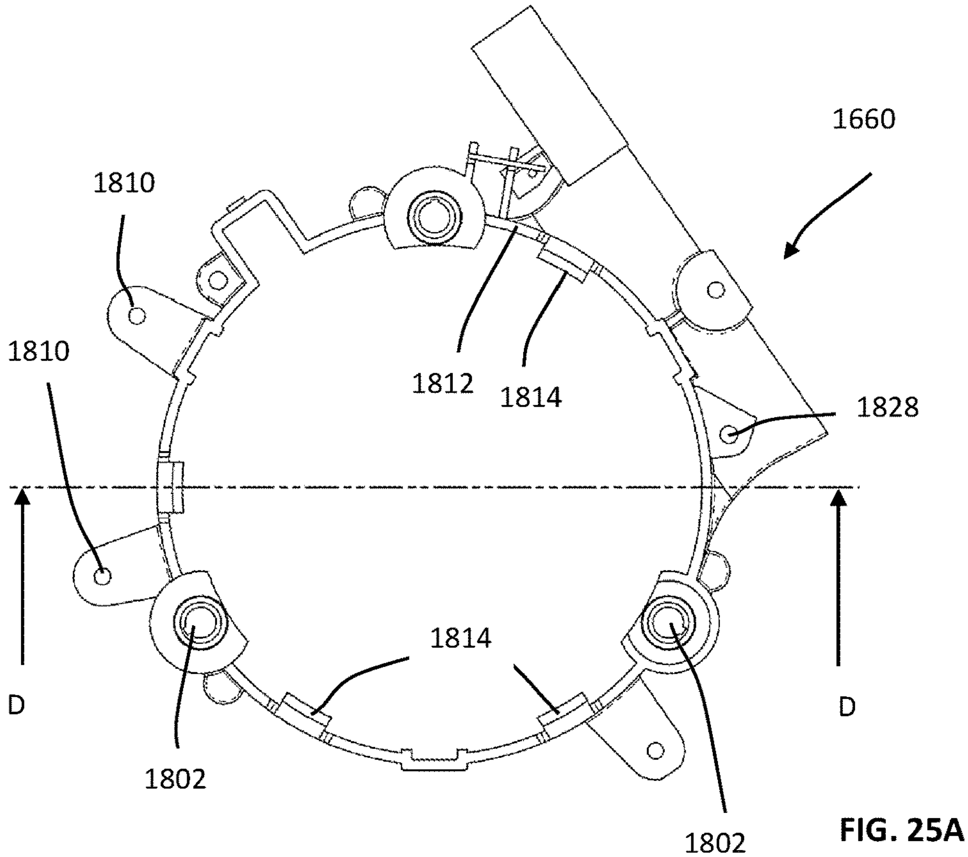
FIGS. 25A, 25B, 25C, 25D and 25E are simplified respective planar top, planar bottom, planar side, sectional and pictorial view illustrations of a bottom element forming part of the motor housing and support assembly of FIGS. 23A-23D, FIG. 25D being taken along lines D-D in FIG. 25A.
Figure 25B:
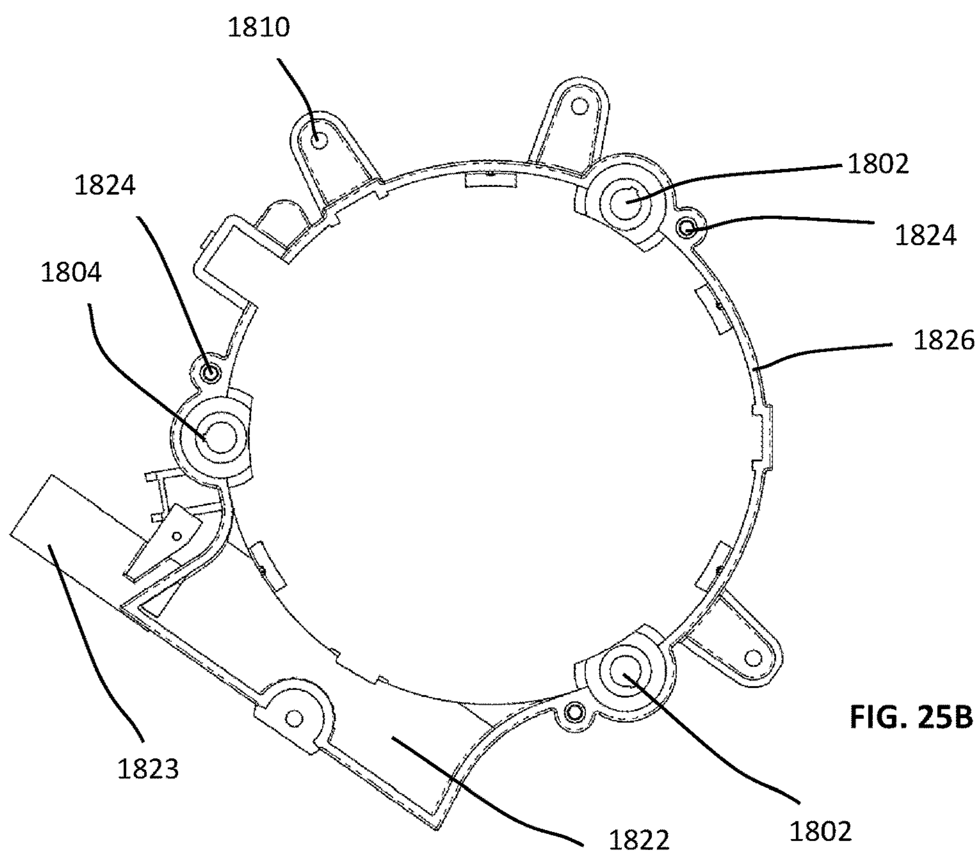
Figure 25C:
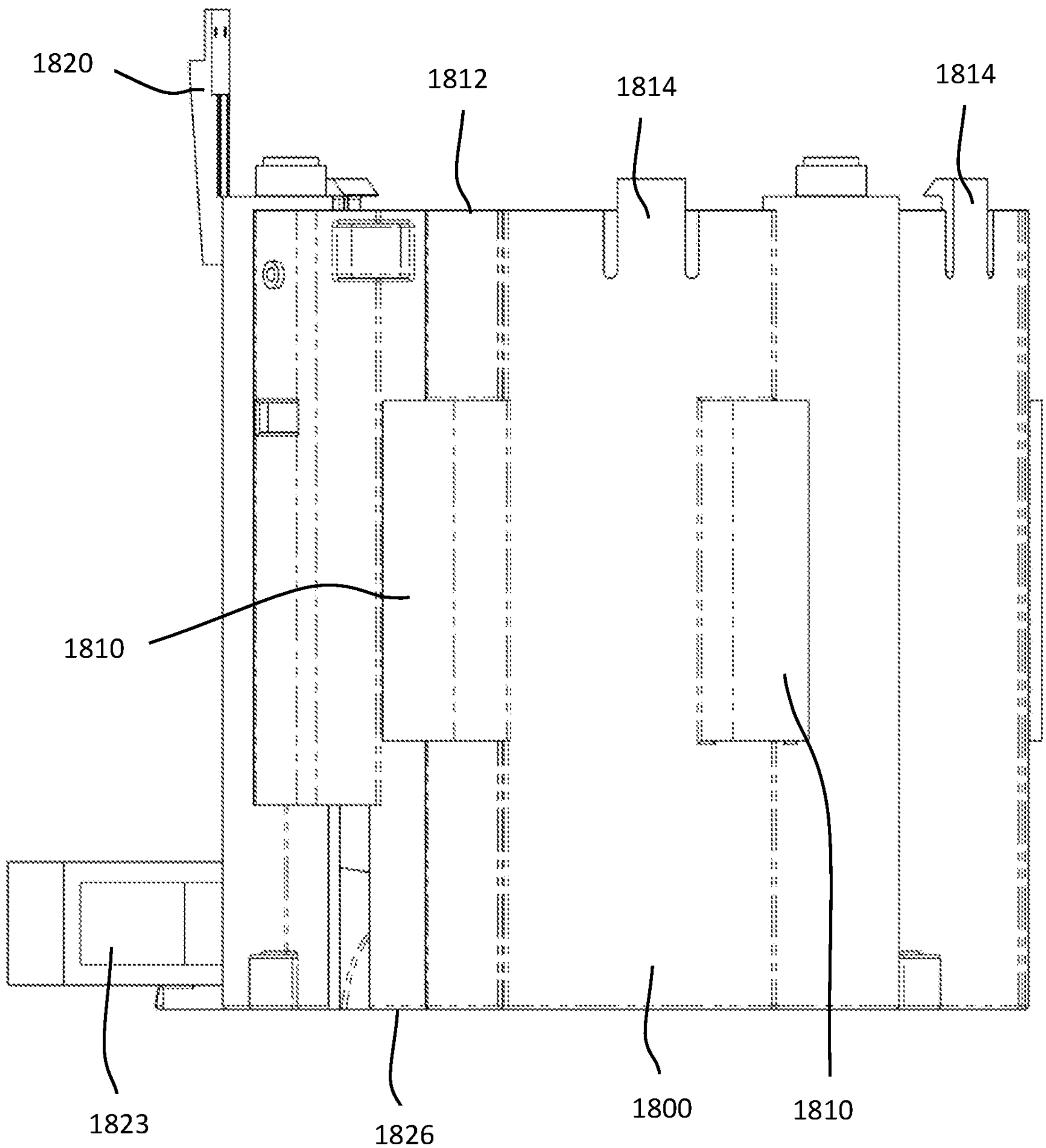
Figure 25D:
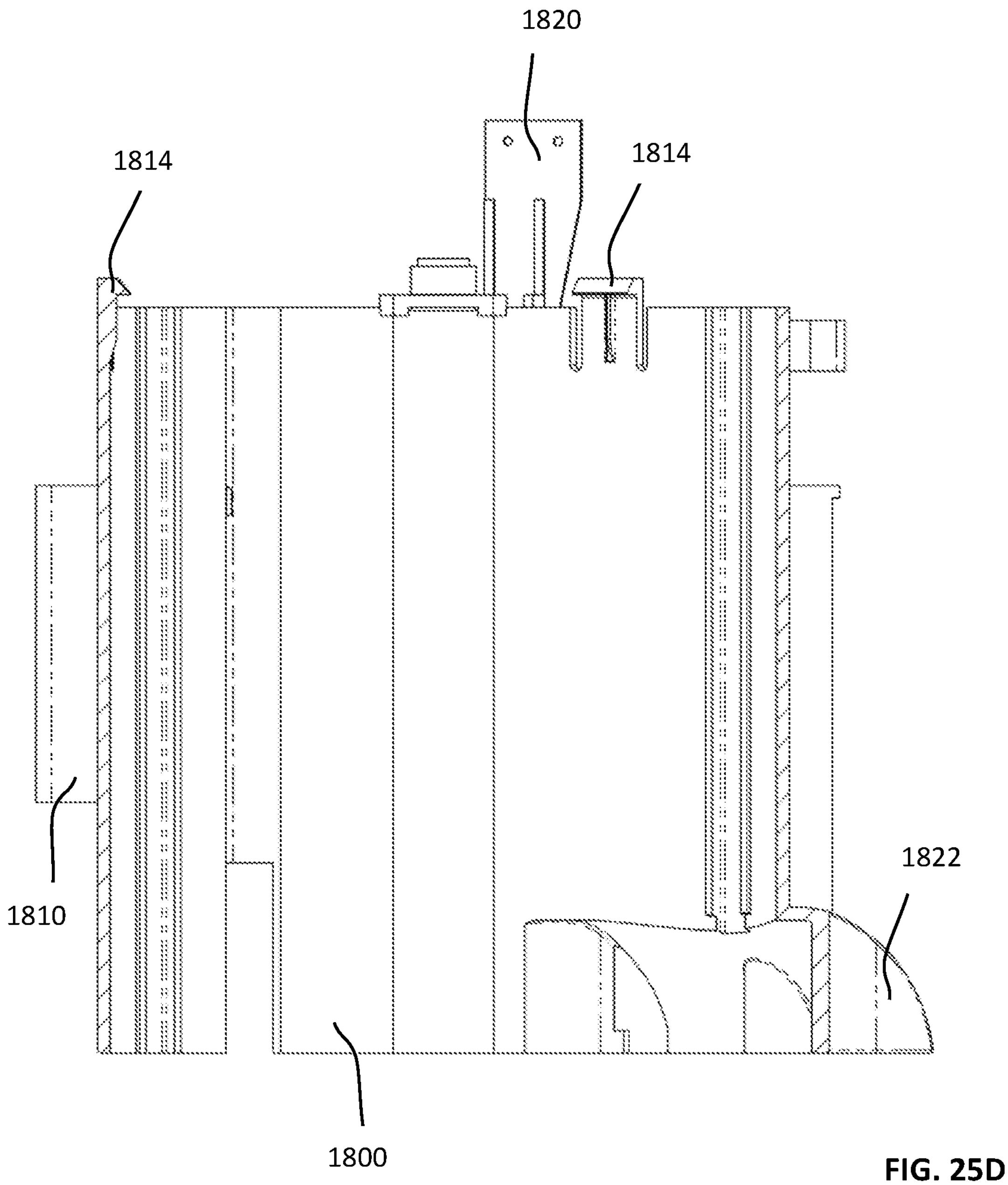
Figure 25E:
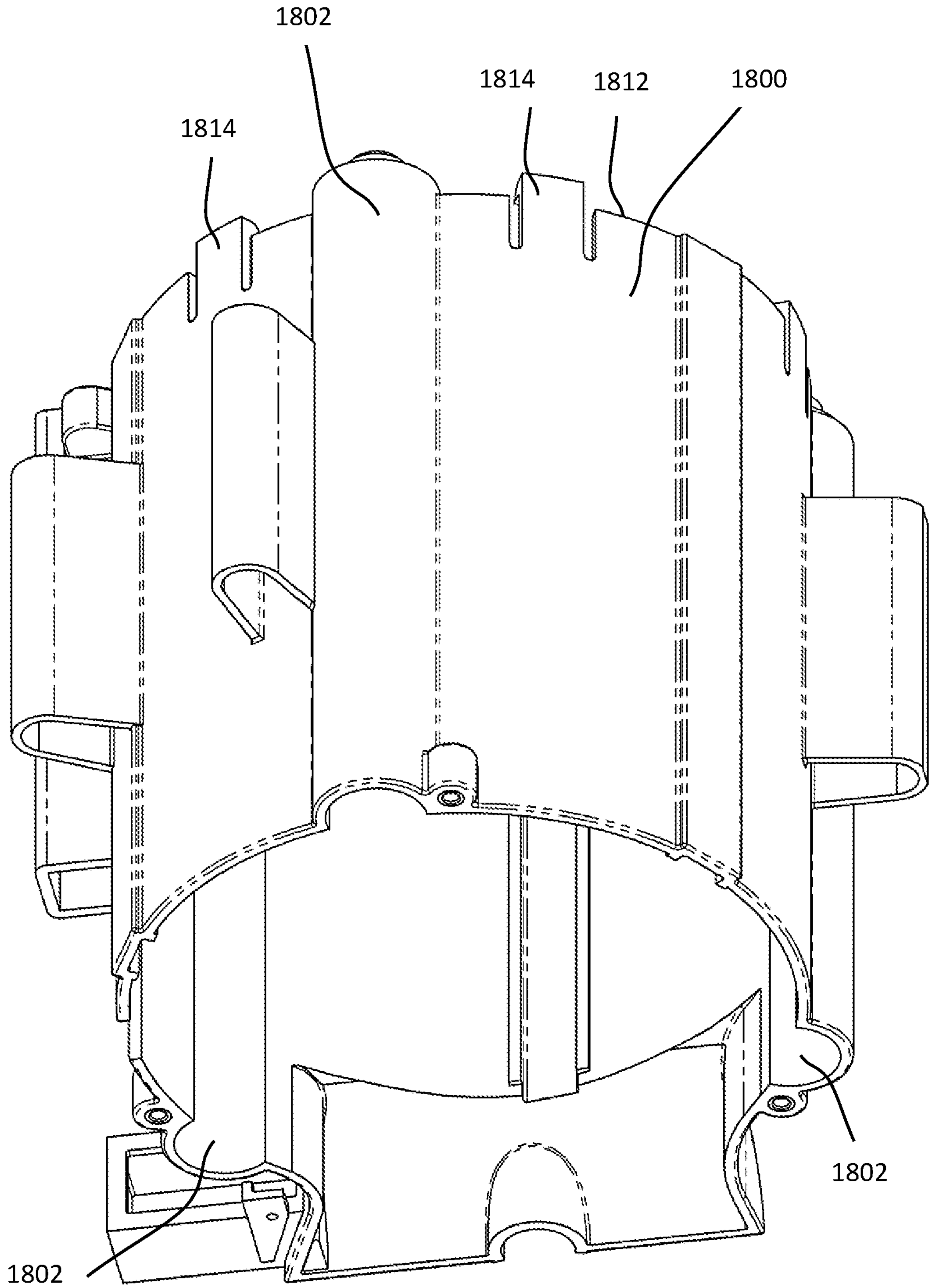
Figure 26A:
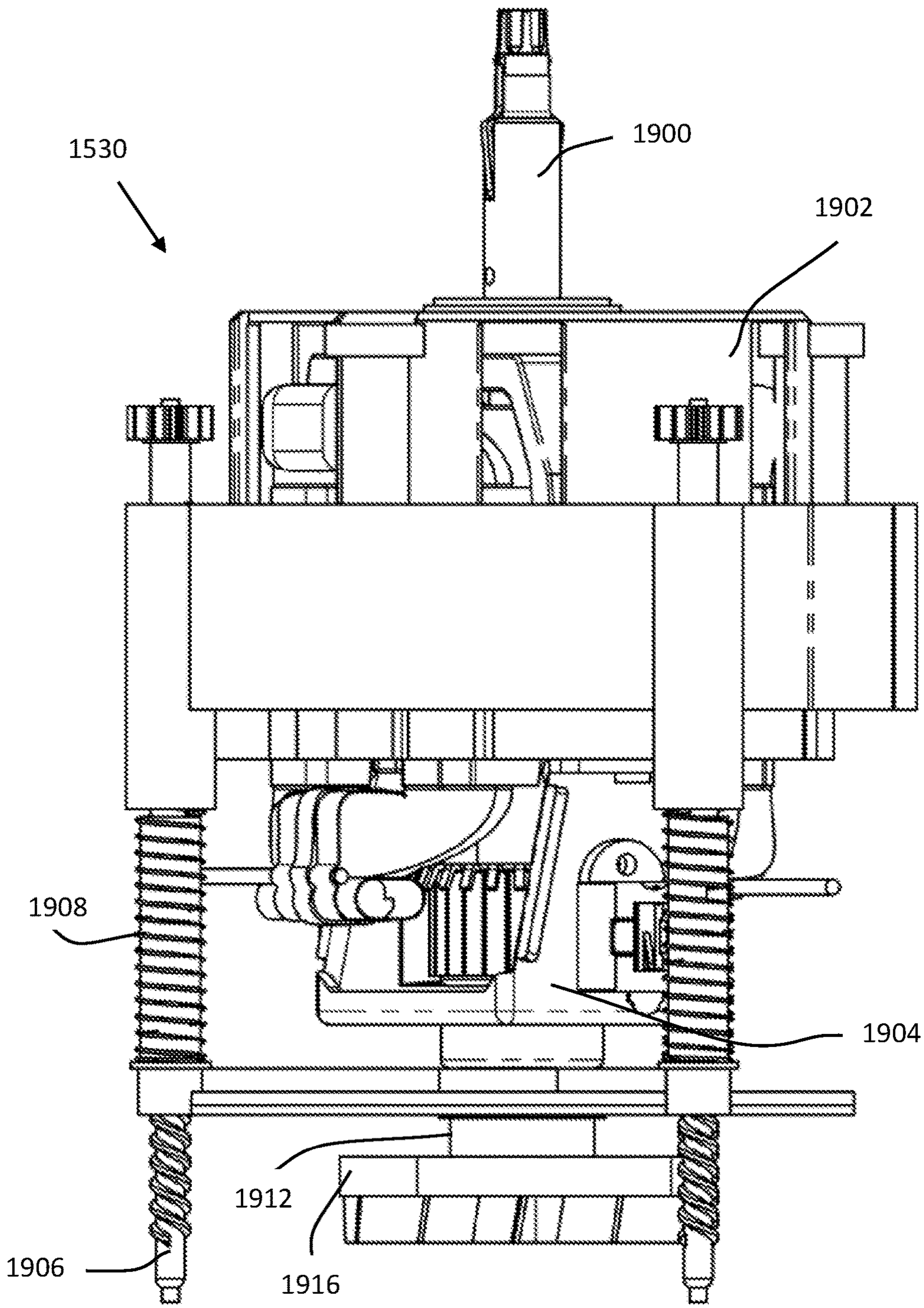
FIGS. 26A, 26B, 26C, 26D and 26E are simplified respective planar side, planar top, planar bottom, pictorial and exploded view illustrations of an axially displaceable rotary drive assembly forming part of the vertically displacing rotary drive motor assembly of FIGS. 19A-19F.
Figure 26B:
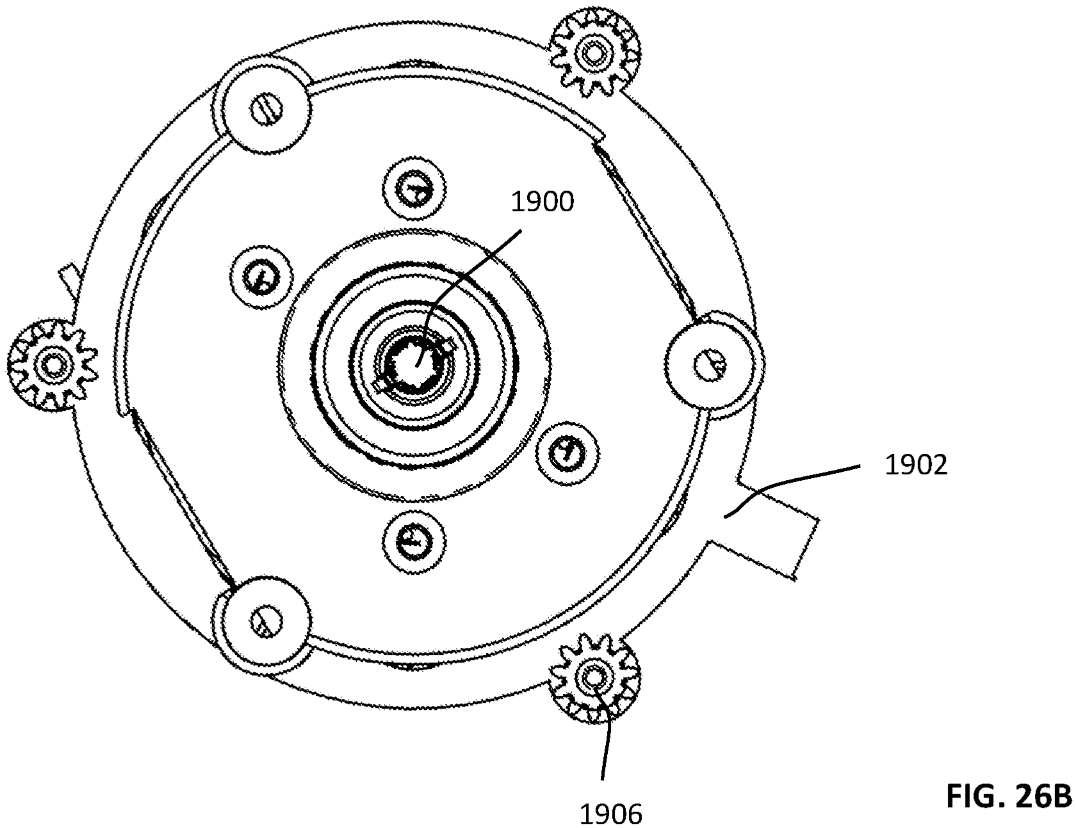
Figure 26C:
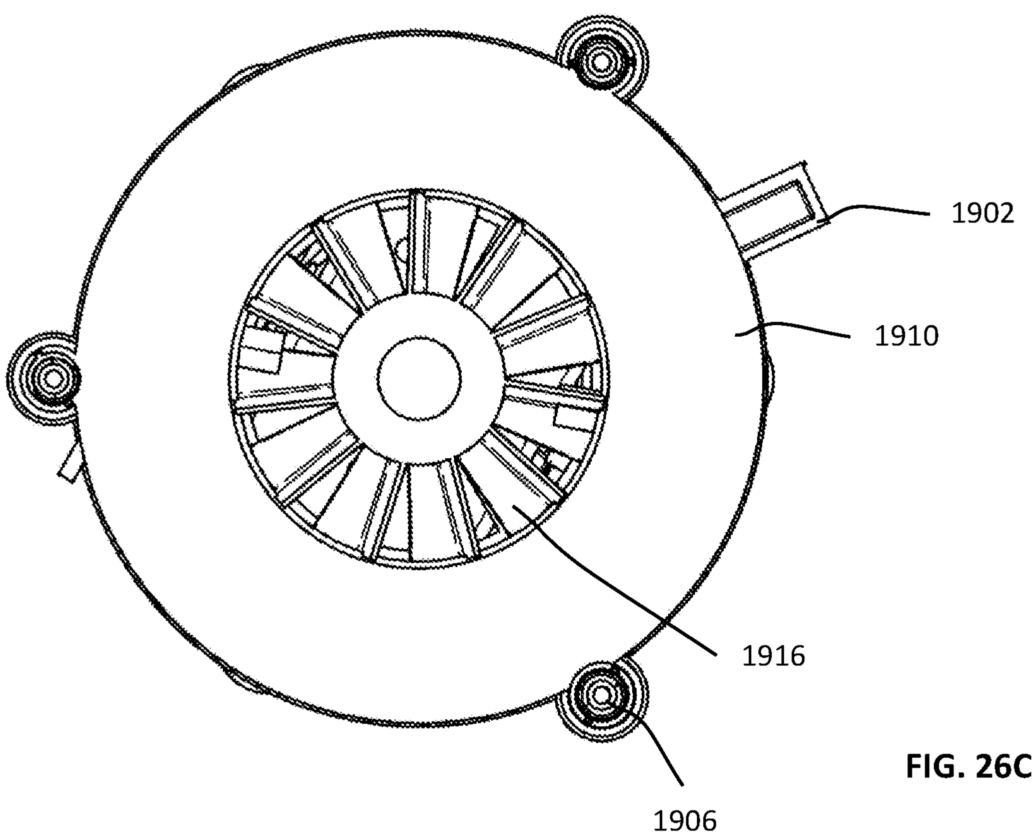
Figure 26D:
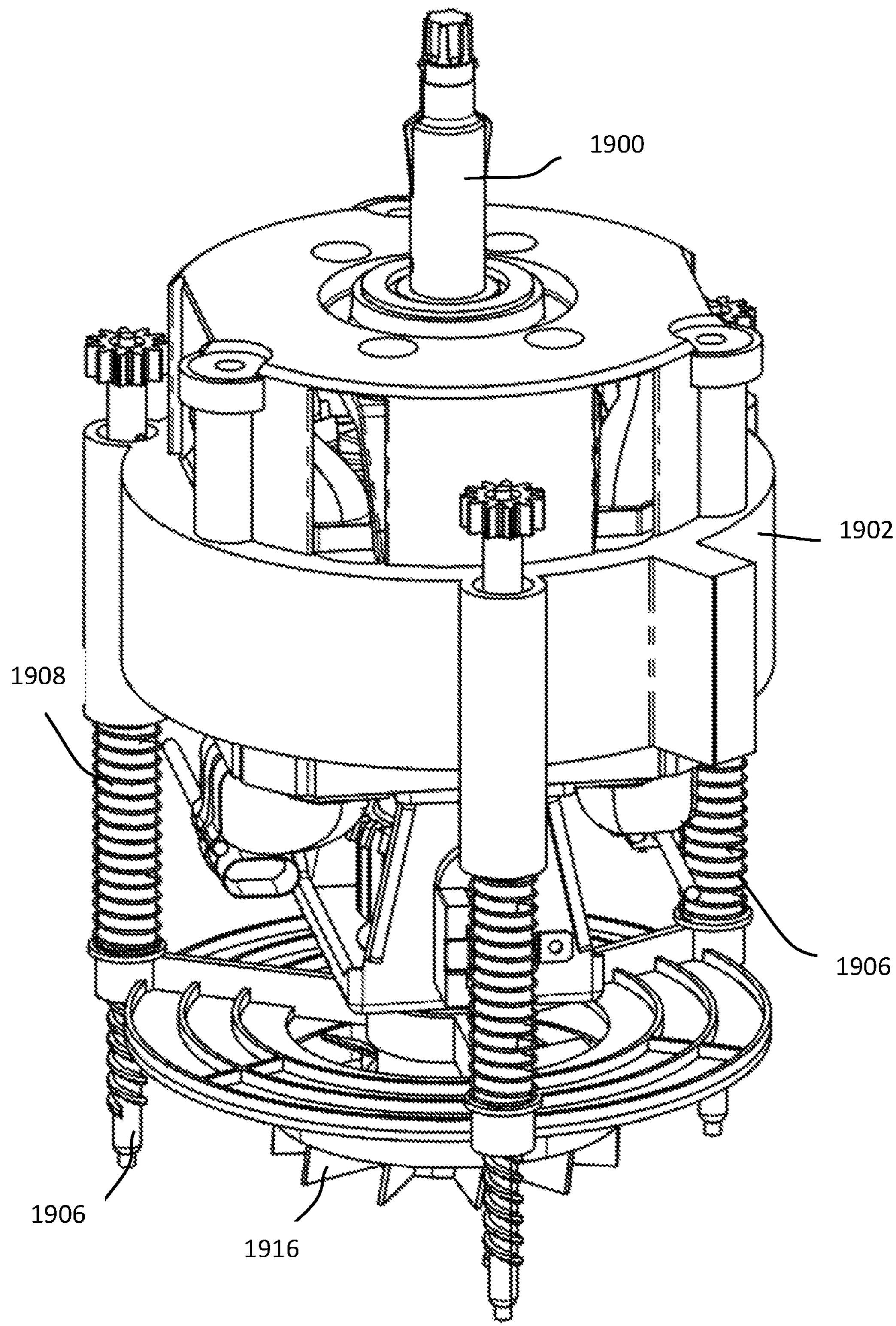
Figure 26E:
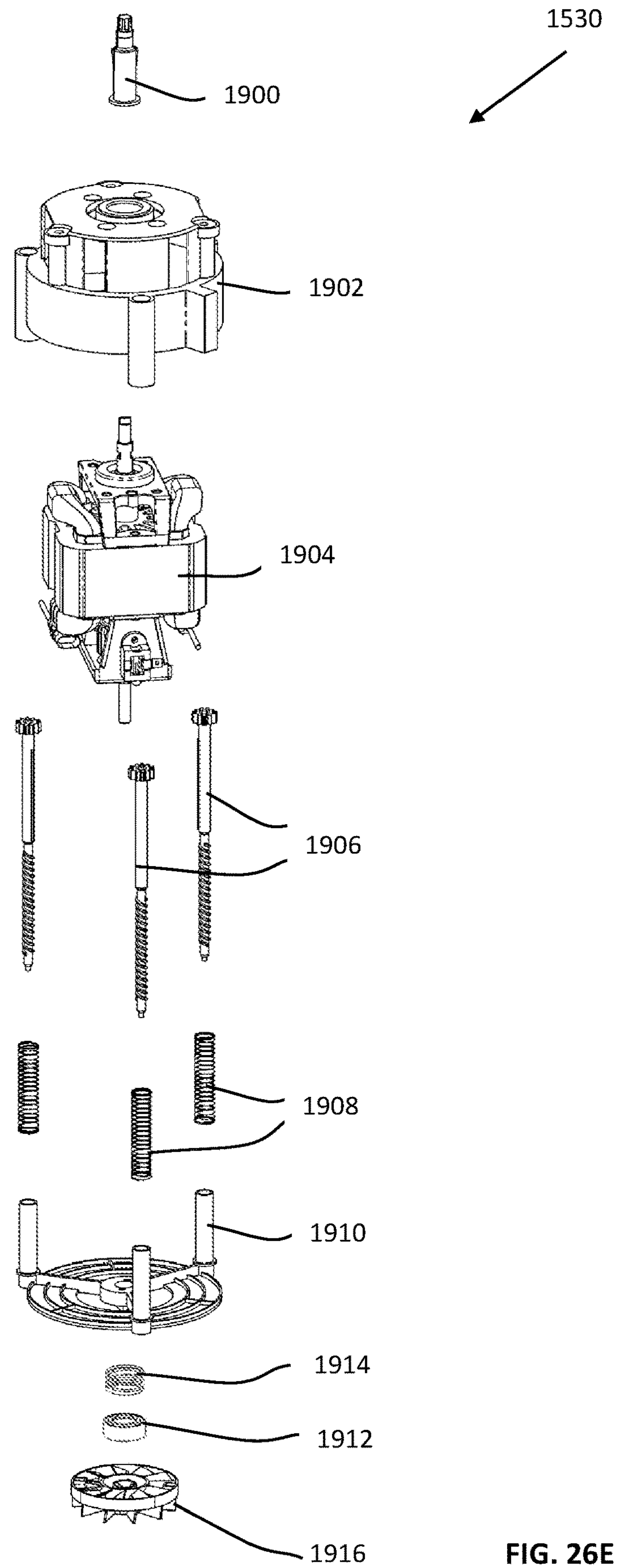

As seen particularly in FIG. 24D, at an underside surface 1760 of planar wall portion 1700 there is defined a central interior circumferential surface 1762, which terminates at an annular wall surface 1764 and defines therewith a shoulder 1766. Annular wall surface 1764 terminates radially inwardly at an inner interior circumferential wall surface 1768, which, in turn, terminates at an underside annular surface 1770, which underlies top planar annular edge surface 1708. A depending circumferential wall 1772 extends downwardly from underside annular surface 1770 and defines a radially inwardly directed cylindrical surface 1774 which extends to top planar annular edge surface 1708 and defines therewith an aperture 1776.

A plurality of guiding pins 1780, preferably three in number, extend downwardly from underside surface 1760 for guiding axially displaceable rotary drive assembly 1530 in its vertical displacement relative to motor housing and support assembly 1510. A plurality of mutually circumferentially arranged downwardly extending protrusions 1782 are formed on wall 1730. A plurality of, preferably four, snap-engagement cut outs 1784 are formed at edges of wall 1730. A pair of recesses 1786 and 1788 and an aperture 1790 are provided in wall 1730 and its extension 1752 for accommodating linear displacement spindles (not shown).

Reference is now made to FIGS. 25A-25E, which are simplified illustrations of bottom element 1660 forming part of the motor housing and support assembly 1510 of FIGS. 23A-23D.

As seen in FIGS. 25A-25E, the bottom element 1660 is a generally cylindrical element having a cylindrical wall 1800 which generally, but not entirely, has a uniform cross section. Cylindrical wall 1800 preferably defines a plurality of, preferably three, spindle accommodating channels 1802, each of which is formed with a spindle locking socket 1804 for rotatably locking a spindle against vertical displacement relative to the bottom element 1660.

Cylindrical wall 1800 also defines a plurality of mounting screw accommodating channels 1810 which receive mounting screws (not shown) which serve to fixedly attach the bottom element 1660 to the base housing 1400. Formed along a top edge 1812 of cylindrical wall 1800 are a plurality of, preferably four, snap engagement portions 1814 which are configured for snap engagement with top element 1650 at snap-engagement cut outs 1784 of top element 1650.

Preferably extending upwardly from top edge 1812 is a sensor mounting protrusion 1820 for mounting of an optional sensor (not shown) for sensing a rotational position of rotary drive gear 1500.

The bottom of cylindrical wall 1800 is preferably formed with a first widened region 1822 for facilitating air flow therefrom and a second widened region 1823 for accommodating electronic circuitry (not shown).

A plurality of threaded screw bosses 1824 are preferably provided at a bottom edge 1826 of cylindrical wall 1800 for accommodating screws (not shown) which attach bottom element 1660 to bottom assembly 1410 at screw mounting apertures 1554.

A plurality of threaded screw bosses 1828 are preferably provided at top edge 1812 of cylindrical wall 1800 for accommodating screws (not shown) which attach bottom element 1660 to top element 1650.

Reference is now made to FIGS. 26A-26E, which are simplified illustrations of axially displaceable rotary drive assembly 1530 forming part of the vertically displacing rotary drive motor assembly 1430 of FIGS. 19A-19F. As seen in FIGS. 26A-26E, the axially displaceable rotary drive assembly 1530 preferably comprises an outer drive shaft assembly 1900, a motor support bracket assembly 1902, an electric motor 1904, a plurality of, preferably three, spindles 1906, a corresponding plurality of coil springs 1908, a motor lifting element 1910, a linear to rotary converting adaptor 1912, a spring 1914 and a linearly driven rotating ventilating element 1916.

Figure 27A:
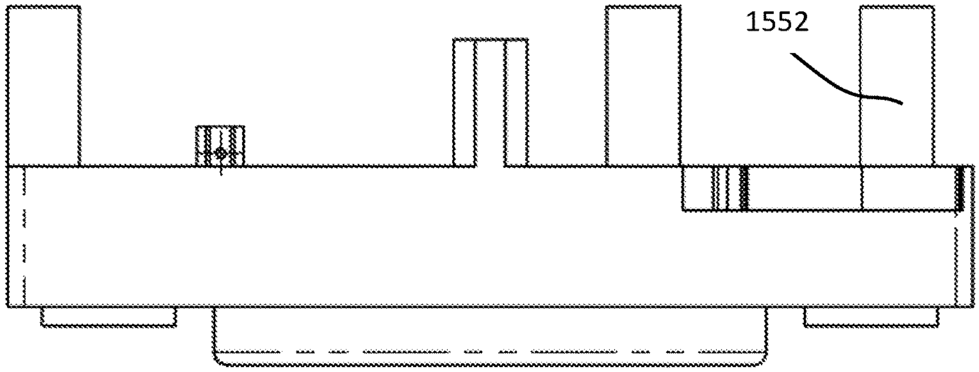
FIGS. 27A, 27B and 27C are simplified respective planar side, planar top and pictorial view illustrations of a bottom element forming part of the bottom assembly of FIGS. 21A & 21B.
Figure 27B:
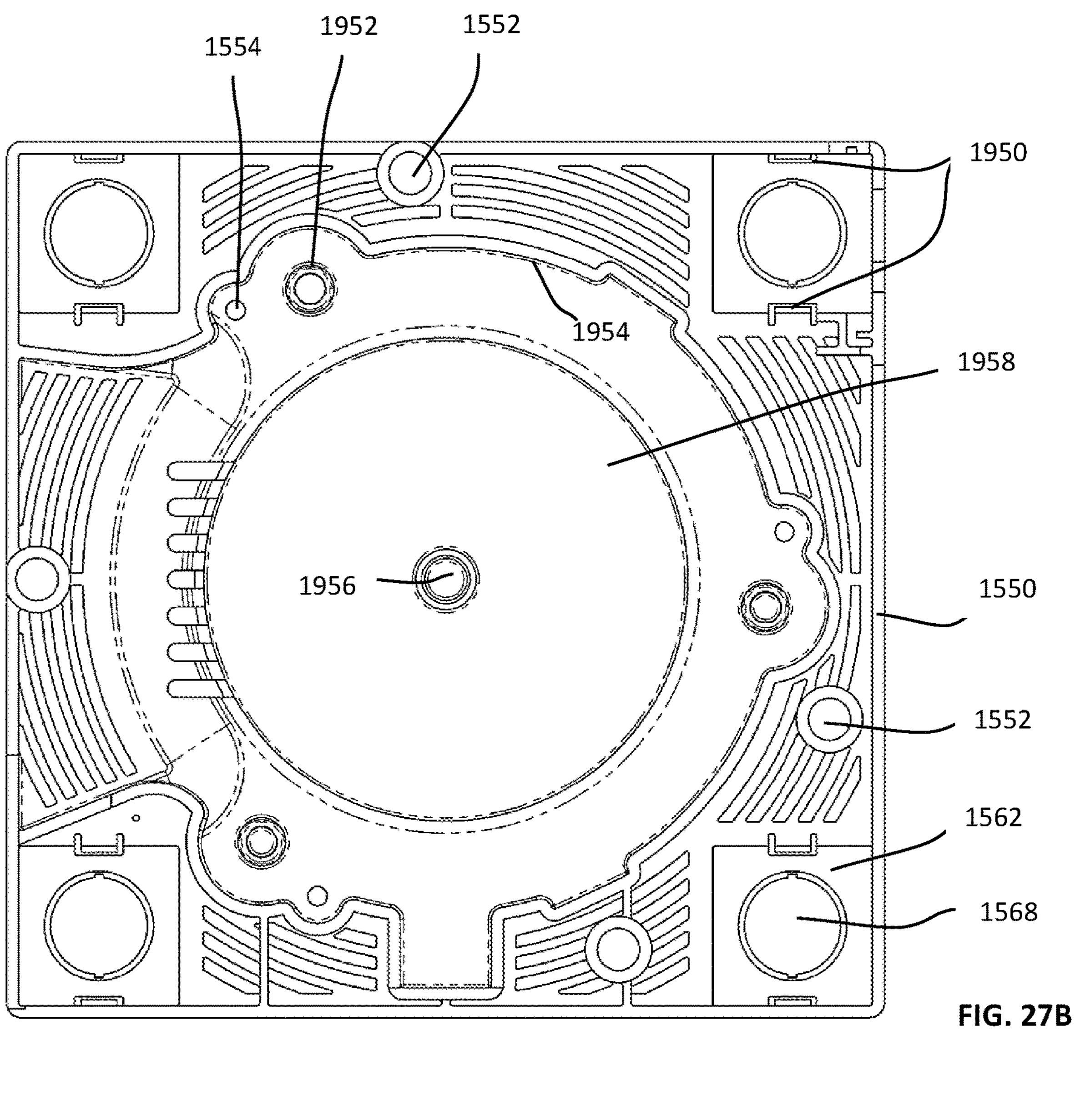
Figure 27C:
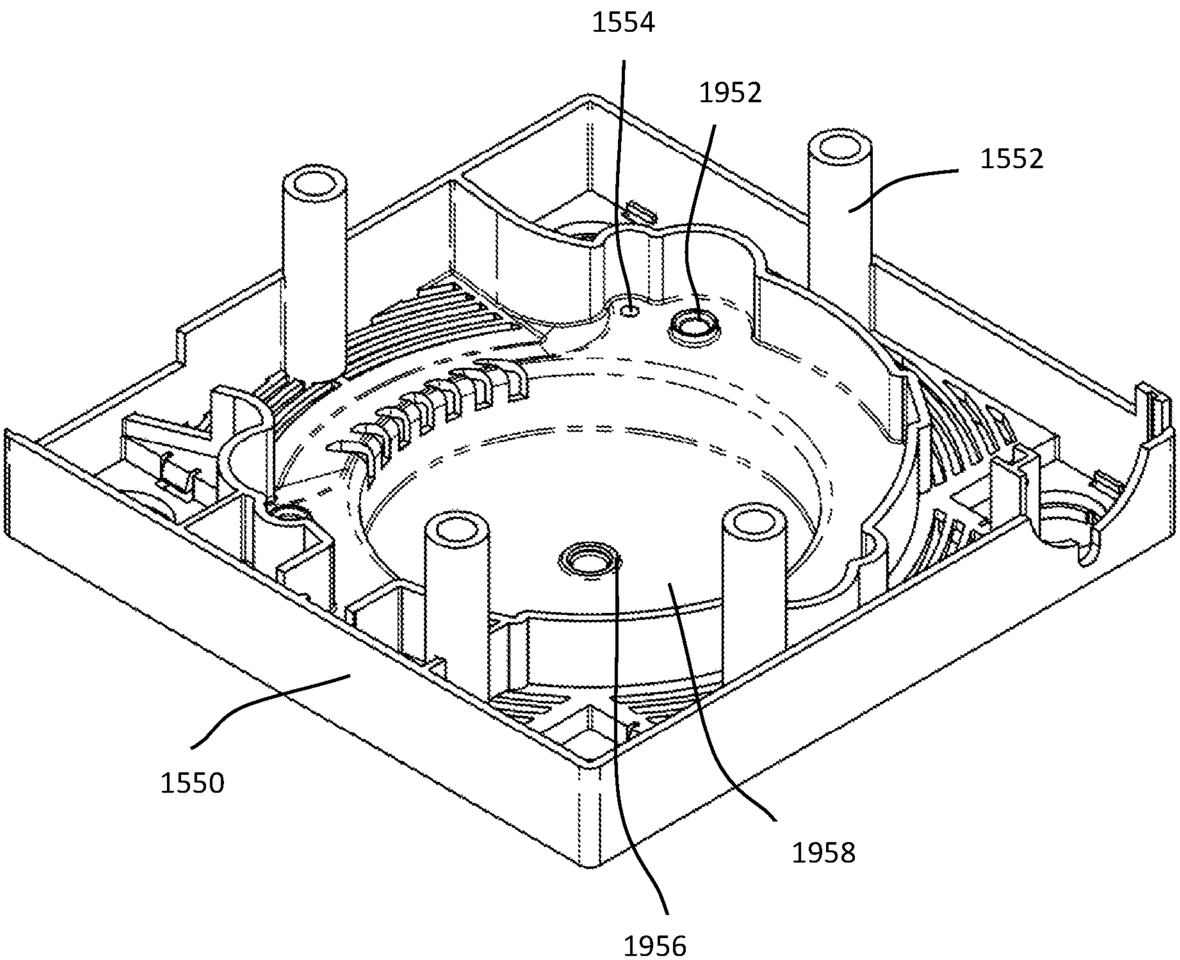

Reference is now made to FIGS. 27A-27C, which are simplified respective planar side, planar top and pictorial view illustrations of bottom element 1550, forming part of the bottom assembly 1410 of FIGS. 21A & 21B.

In addition to the elements described hereinabove with reference to FIGS. 21A & 21B, namely the plurality of upstanding mounting screw guiding bosses 1552, and the plurality of screw mounting apertures 1554, the corner recesses 1562 and the apertures 1568, it is seen that each corner recess 1562 of the bottom element 1550 includes a plurality of, preferably two, snaps 1950, for securing load cells 1560 to bottom element 1550.

Bottom element 1550 also preferably includes a plurality of, preferably three, apertures 1952 for accommodating spindles 1906.

Bottom element 1550 preferably defines a partially interrupted circumferential wall 1954 for locating bottom element 1660 of motor housing and support assembly 1510 thereon and for separating warm and ambient air flows through the bottom element 1660.

Bottom element 1550 preferably also defines a drive shaft engageable socket 1956 on a top-facing planar surface 1958 thereof.

Figure 28A:
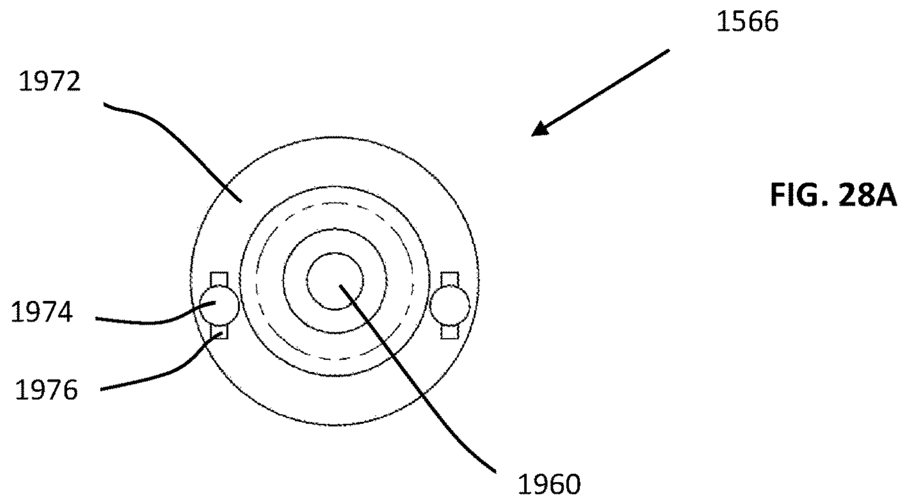
FIGS. 28A, 28B and 28C are simplified respective planar top, planar side and pictorial view illustrations of a load cell support forming part of the bottom assembly of FIGS. 21A &21B.
Figure 28B:
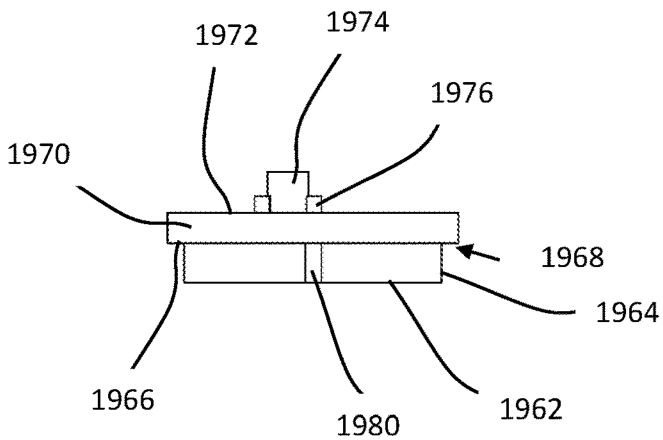
Figure 28C:
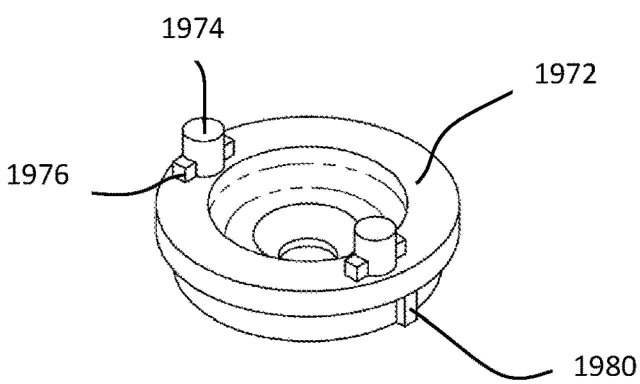

Reference is now made to FIGS. 28A-28C, which are simplified illustrations of load cell support 1566, forming part of the bottom assembly 1410 of FIGS. 21A & 21B.

As seen in FIGS. 28A-28C, load cell support 1566 is a generally circular integrally formed element having a central aperture 1960 for accommodating a screw. Outer surfaces of the load cell support 1566 include an aperture bottom surface 1962, a circumferential surface 1964 extending upwardly from bottom surface 1962 and terminating in a downward-facing annular surface 1966, thereby defining a circumferential locating shoulder 1968 which seats in a correspondingly configured portion of corner recess 1562. Extending upwardly from annular surface 1966 is a circumferential surface 1970 which extends to a top annular surface 1972. A pair of upstanding load cell locating protrusions 1974 extend upwardly from top annular surface 1972. A pair of side protrusions 1976 extend laterally from each of protrusions 1974. A pair of rotational locating protrusions 1980 extend radially outwardly in opposite directions from circumferential surface 1964.

Figure 29A:
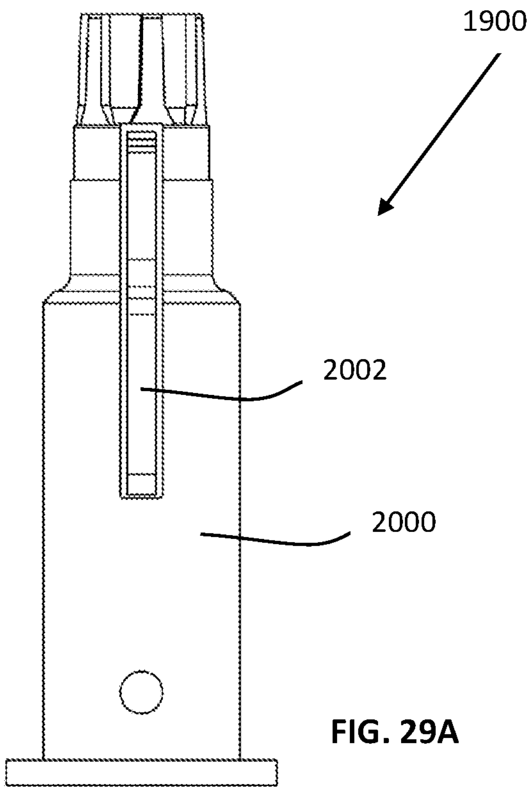
FIGS. 29A, 29B, 29C, 29D and 29E are simplified respective planar side, pictorial, planar top, first sectional and second sectional view illustrations of an outer drive shaft assembly forming part of the axially displaceable rotary drive assembly of FIGS. 26A-26E, FIGS. 29D and 29E being taken along lines D-D in FIG. 29C and illustrate two different operative orientations.
Figure 29B:
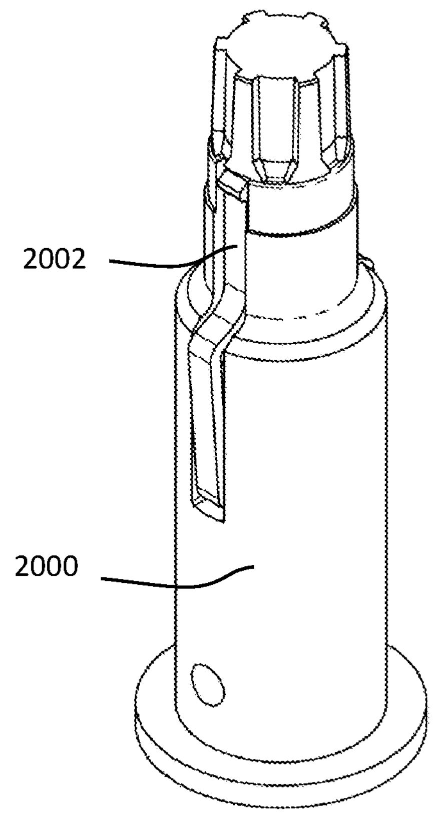
Figure 29C:
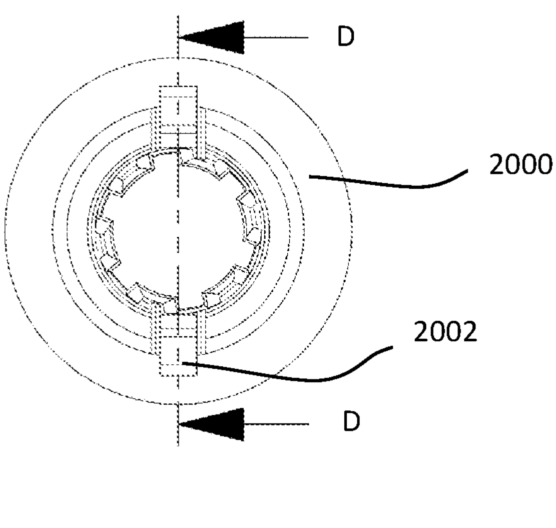
Figure 29D:
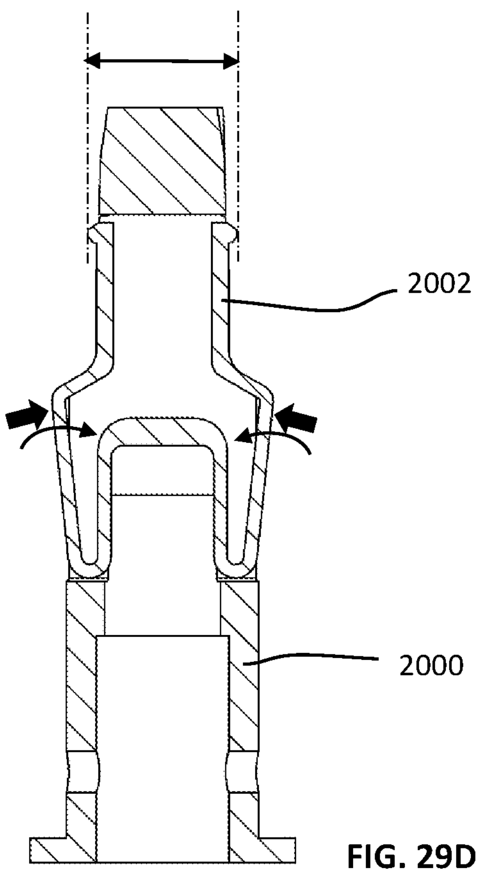
Figure 29E:
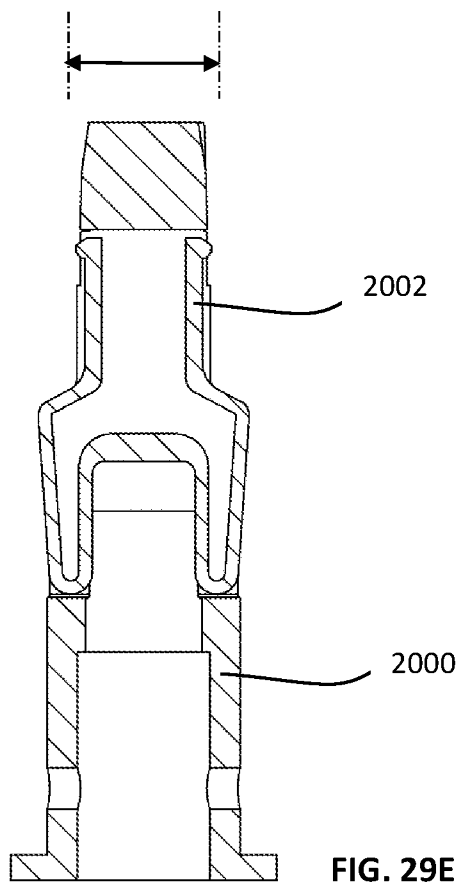
Figure 30A:
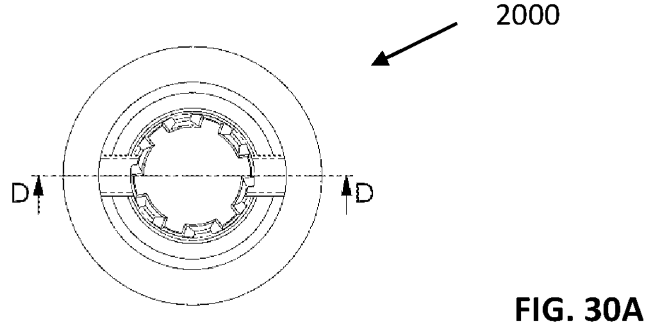
FIGS. 30A, 30B, 30C and 30D are simplified planar top, planar side, pictorial and sectional view illustrations of an outer drive shaft housing element forming part of the outer drive shaft assembly of FIGS. 29A-29E, FIG. 30D being taken along lines D-D in FIG. 30A.
Figure 30B:
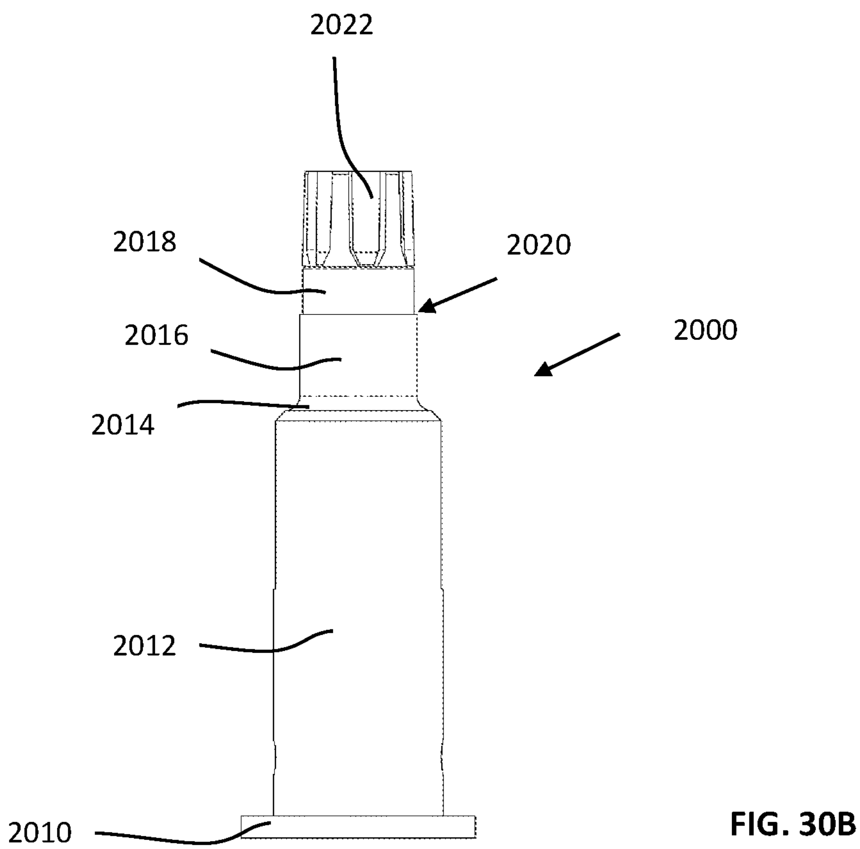
Figure 30C:
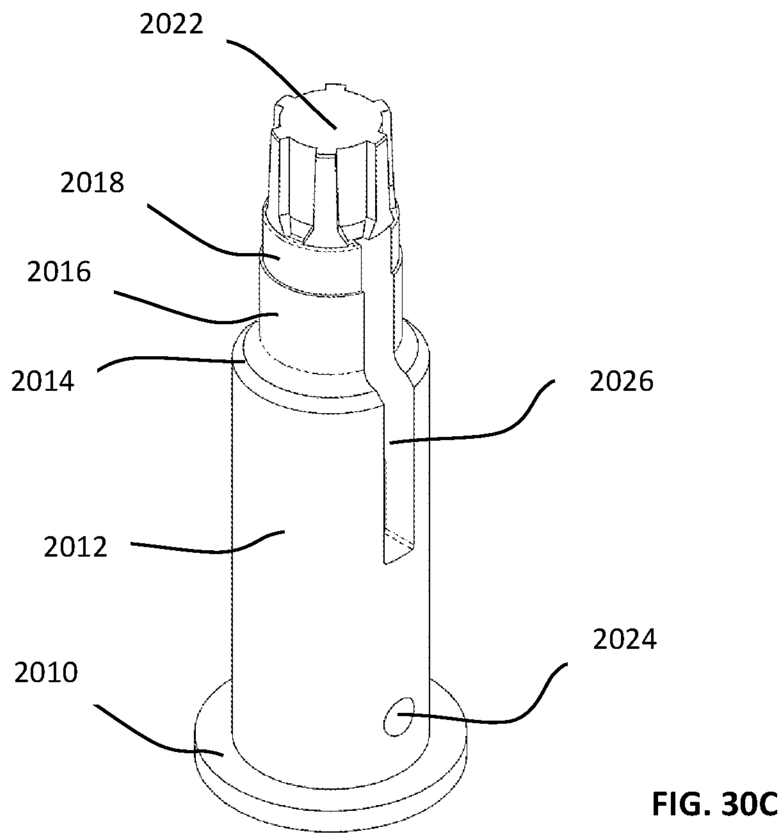
Figure 30D:
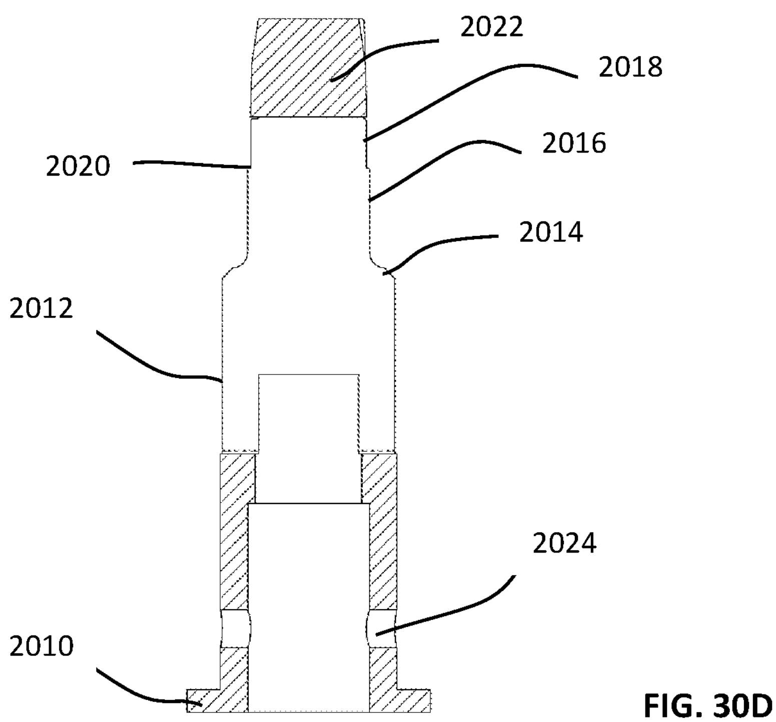

Reference is now made to FIGS. 29A-29E, which are simplified illustrations of outer drive shaft assembly 1900 forming part of the axially displaceable rotary drive assembly 1530 of FIGS. 26A-26E. As seen in FIGS. 29A-29E, the outer drive shaft assembly 1900 includes an outer drive shaft housing element 2000 and an outer drive shaft locking engagement element 2002, which is partially seated within outer drive shaft housing element 2000. FIG. 29D illustrates outer drive shaft assembly 1900 in an extended operative orientation which occurs when MMIDD 1000 is at rest or when electric motor 1904 is solely engaged in rotary motion. FIG. 29E illustrates the outer drive shaft assembly 1900 in a retracted operative orientation during axial displacement of the axially displaceable rotary drive assembly 1530.

Reference is now made to FIGS. 30A-30D, which are simplified illustrations of outer drive shaft housing element 2000, forming part of the outer drive shaft assembly 1900 of FIGS. 29A-29E. As seen in FIGS. 30A-30D, the outer drive shaft housing element 2000 is a generally elongate upstanding element having a base 2010, a generally cylindrical lower portion 2012, extending upwardly from base 2010, a tapered portion 2014 extending upwardly from generally cylindrical lower portion 2012 and terminating in an intermediate cylindrical portion 2016, which extends to a slightly narrower upper cylindrical portion 2018 and defines therewith a shoulder 2020.

A vertically splined top generally cylindrical portion 2022 extends upwardly from cylindrical portion 2018 and is configured for engagement with a correspondingly configured drive shaft engaging wall 414 of blade 160.

A throughgoing transverse bore 2024 is formed in cylindrical lower portion 2012 above base 2010 and a throughgoing slot 2026 is formed in an upper portion of cylindrical lower portion 2012, tapered portion 2014, intermediate cylindrical portion 2016 and upper cylindrical portion 2018. Slot 2026 is configured to accommodate outer drive shaft locking engagement element 2002.

Figure 31A:
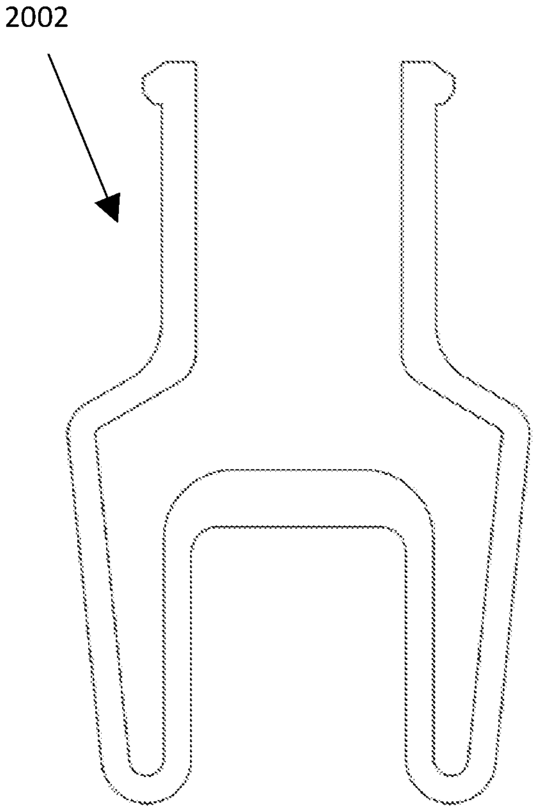
FIGS. 31A, 31B and 31C are simplified planar front, planar side and pictorial illustrations of an outer drive shaft locking engagement element forming part of the outer drive shaft assembly of FIGS. 29A-29E.
Figure 31B:
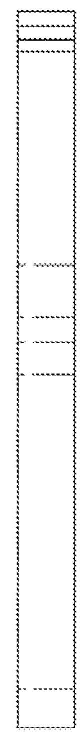
Figure 31C:
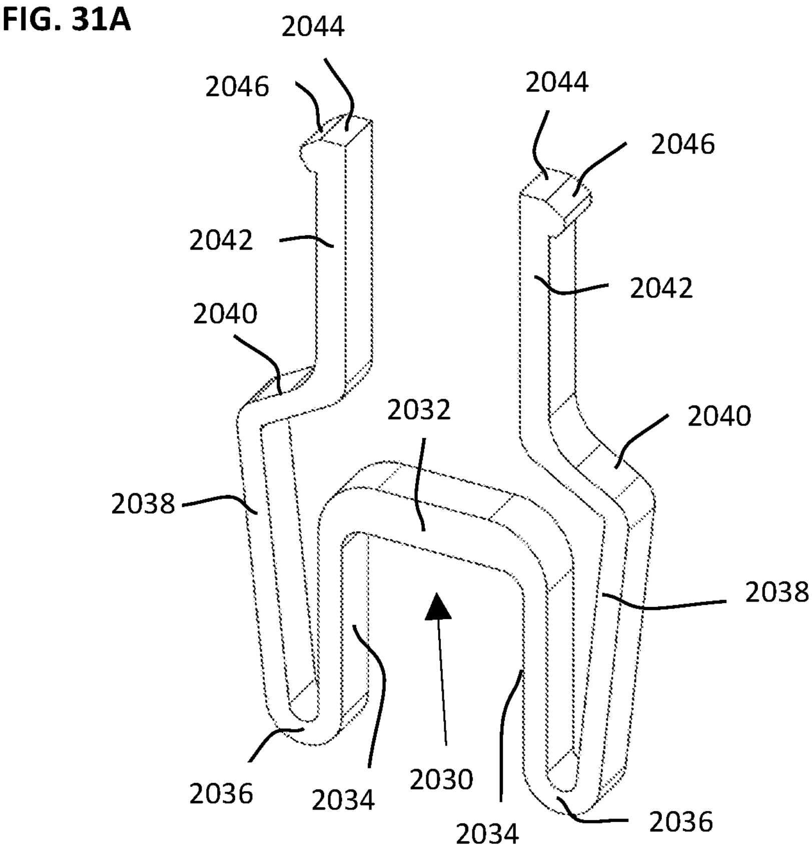
Figure 32A:
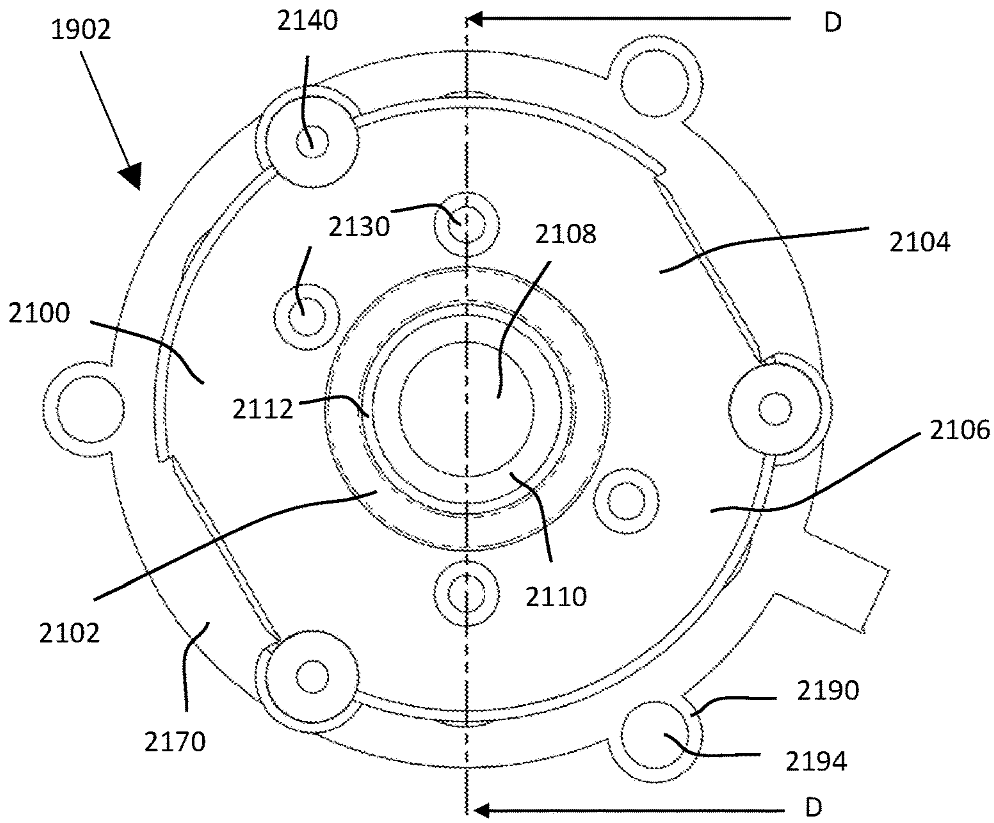
FIGS. 32A, 32B, 32C and 32D are simplified planar top, planar bottom, planar side and sectional illustrations of a motor support bracket assembly forming part of the axially displaceable rotary drive assembly of FIGS. 26A-26E, FIG. 32D being taken along lines D-D in FIG. 32A.
Figure 32B:
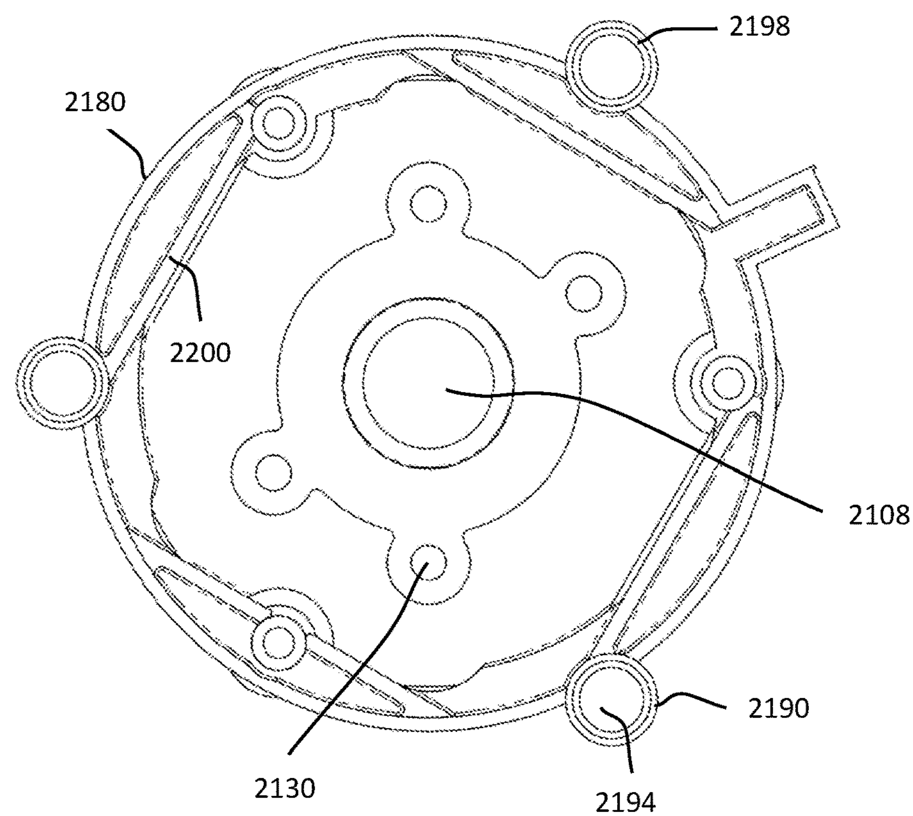
Figure 32C:
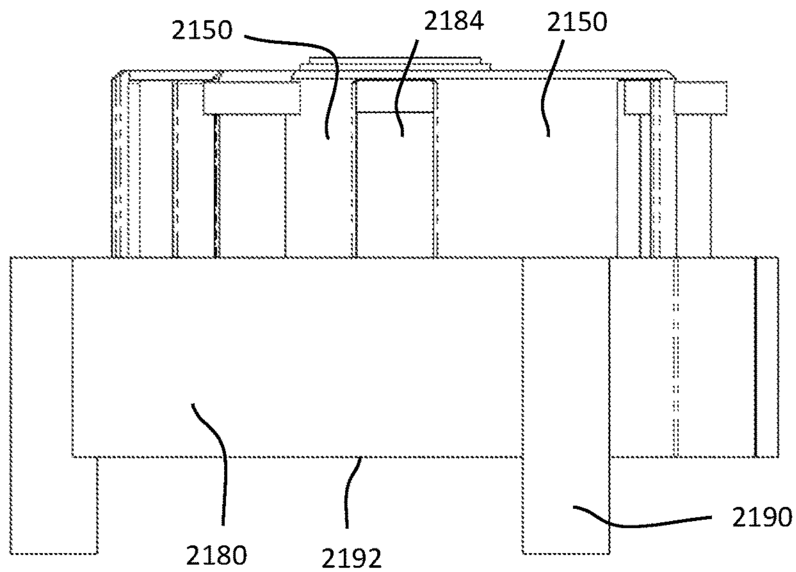
Figure 32D:
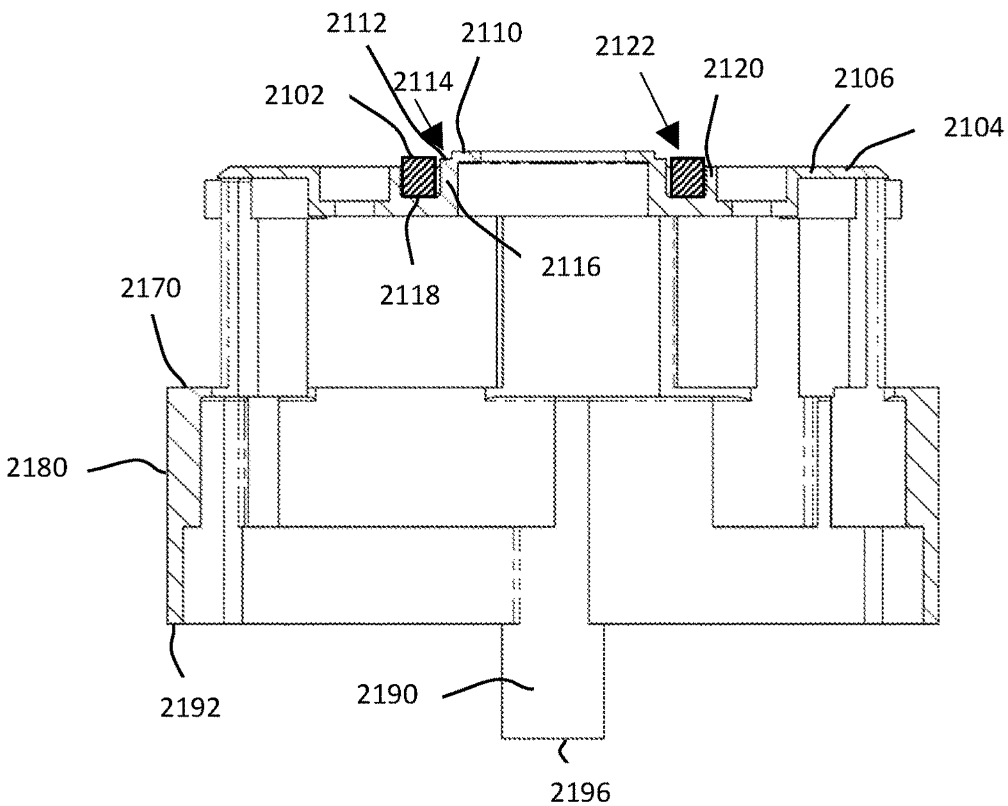

Reference is now made to FIGS. 31A-31C, which are simplified illustrations of outer drive shaft locking engagement element 2002, forming part of the outer drive shaft assembly 1900 of FIGS. 29A-29E. As seen in FIGS. 31A-31C, outer drive shaft locking engagement element 2002 preferably comprises a unitary side to side symmetric element formed of spring steel.

Element 2002 preferably includes a central bridge portion 2030 including a cross beam portion 2032 and a pair of upstanding side portions 2034. The bottoms of upstanding side portions 2034 each extend through a curved bent portion 2036 to a slightly outwardly tapered upwardly extending portion 2038. Portions 2038 each extend via an inwardly tapered section 2040 to an upstanding top portion 2042 having, at a top edge 2044 thereof, an outwardly extending protrusion portion 2046.

Reference is now made to FIGS. 32A-32D, which are simplified illustrations of motor support bracket assembly 1902 forming part of the axially displaceable rotary drive assembly 1530 of FIGS. 26A-26E.

As seen in FIGS. 32A-32D, motor support bracket assembly 1902 is a generally cylindrical assembly, which includes a support bracket element 2100 onto which is mounted an annular sealing ring 2102. Support bracket element 2100 includes a top planar generally circular wall 2104 having a top surface 2106 and a central aperture 2108.

A raised annular wall surface 2110 surrounds central aperture 2108. Surrounding raised annular wall surface 2110 is a slightly lower raised annular wall surface 2112, which defines a circumferential shoulder 2114 therewith. Wall surface 2112 terminates at a radially outward edge thereof in a depending circumferential wall 2116, which in turn extends to a recessed annular surface 2118, which lies in a plane below that of top surface 2106.

Recessed annular surface 2118 is delimited at its radial outward extent by a circumferential wall 2120, which extends to top surface 2106 and is concentric with circumferential wall 2116 and defines therewith an annular recess 2122. Annular sealing ring 2102 is seated in annular recess 2122 and is preferably positioned in touching engagement with circumferential wall 2120 and is spaced from circumferential wall 2116. Annular sealing ring 2102 preferably extends slightly above top surface 2106 but lies below raised annular wall surface 2110.

A plurality of bolt mounting holes 2130 are preferably formed in wall 2104 for accommodating motor mounting bolts (not shown), which bolt electric motor 1904 to motor support bracket assembly 1902.

A plurality, preferably three, of pin receiving shaft portions 2140 are preferably arranged about top wall 2104 and are arranged for slidably receiving pins 1780 of top element 1650.

Extending downwardly from top planar generally circular wall 2104 in a generally circular cylindrical arrangement are a plurality of depending wall sections 2150, some of which preferably surround pin receiving shafts 2140.

Depending wall sections 2150 preferably all terminate at a generally circumferential planar wall surface 2170, from which depends in turn, a generally cylindrical wall portion 2180. Wall sections 2150, together with top planar circular wall 2104 and generally circumferential planar wall surface 2170, define an array of ventilation apertures 2184. The array of ventilation apertures 2184 is generally mutually aligned with the array of ventilation apertures 1732 formed in top element 1650 of motor housing and support assembly 1510.

Protruding from generally cylindrical wall portion 2180 are a plurality of spindle guiding shaft portions 2190, which extend below a bottom edge 2192 of cylindrical wall portion 2180. Each of spindle guiding shaft portions 2190 preferably defines a vertical bore 2194, each of which terminates adjacent a lower edge 2196 of the spindle guiding shaft portion 2190 in a widened spring seat 2198 for accommodating a coil spring 1908.

Interiorly of cylindrical wall portion 2180 there are provided two pairs of mutually perpendicular planar upstanding wall surfaces 2200, which are configured to receive corresponding side surfaces of electric motor 1904.

Figure 33A:
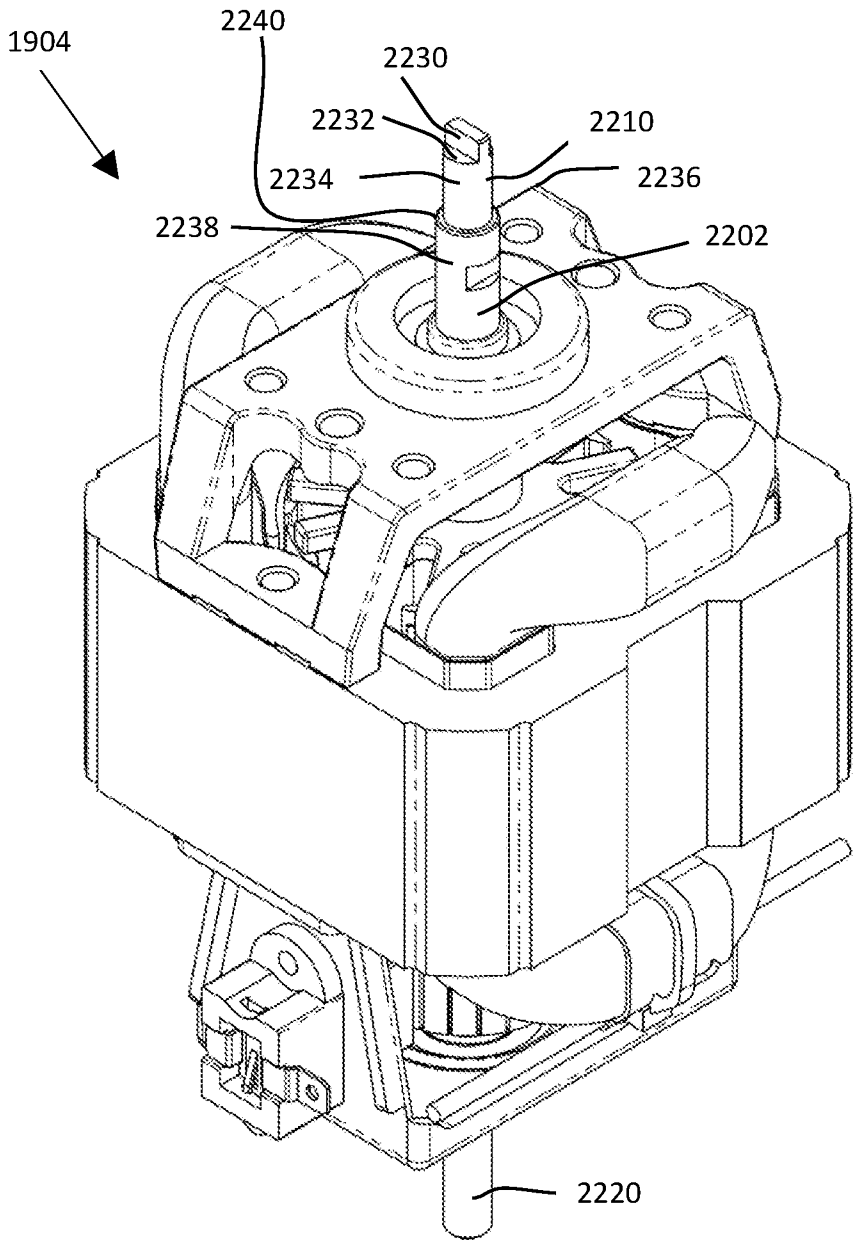
FIGS. 33A and 33B are simplified respective upward facing and downward facing pictorial view illustrations of a modified standard electric motor forming part of the axially displaceable rotary drive assembly of FIGS. 26A-26E.
Figure 33B:
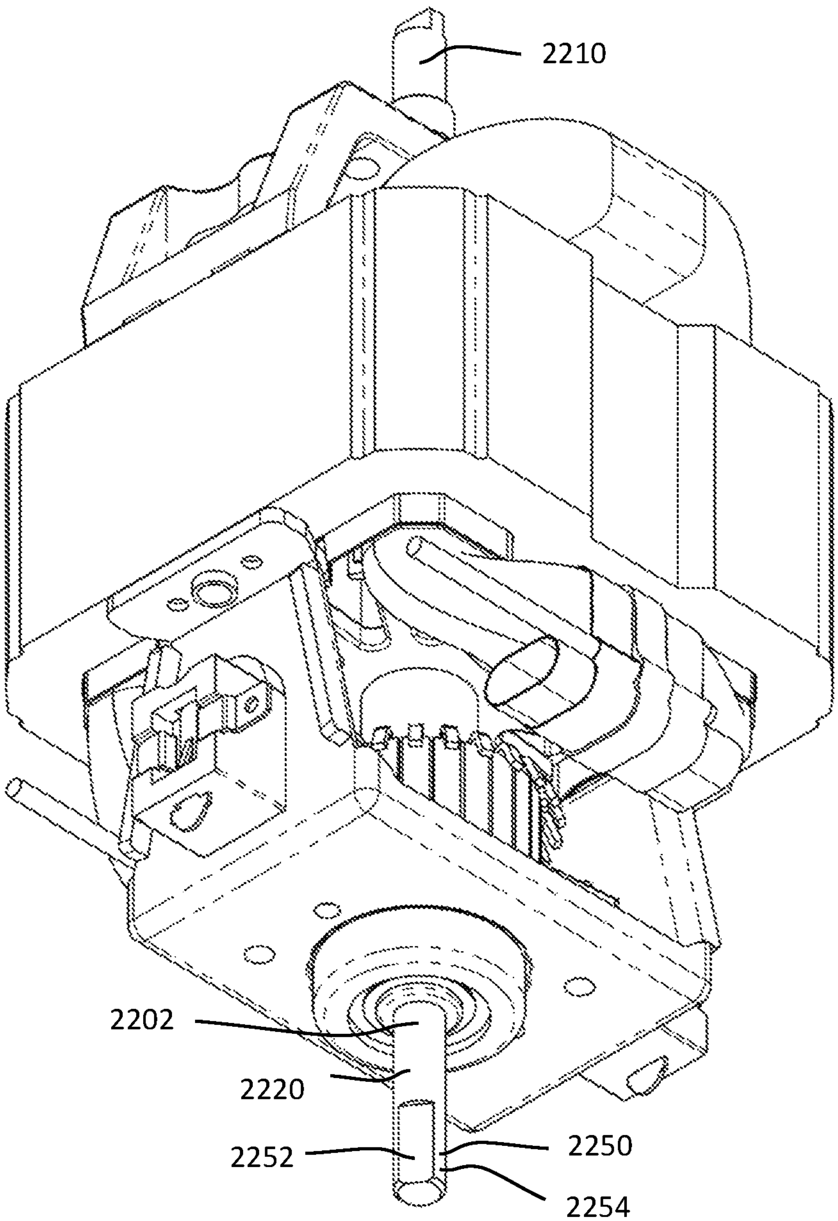

Reference is now made to FIGS. 33A and 33B, which are simplified respective upward facing and downward facing pictorial view illustrations of modified standard electric motor 1904, forming part of the axially displaceable rotary drive assembly 1530 of FIGS. 26A-26E. As seen in FIGS. 33A and 33B, the electric motor 1904 is generally a model EU9537-1201, manufactured by Euroka Electrical of Dongguan, China, and has a drive shaft 2202 having specially configured drive shaft top and bottom ends 2210 and 2220.

As seen in FIG. 33A, drive shaft top end 2210 is configured to have an uppermost portion 2230 having a generally elongate rectangular cross section, which terminates in a pair of coplanar side surfaces 2232. Underlying the uppermost portion 2230 and side surfaces 2232, the drive shaft top end 2210 includes an intermediate cylindrical portion 2234, which terminates in an annular planar surface 2236. Underlying intermediate cylindrical portion 2234 is the remainder 2238 of the drive shaft top end 2210 which has a slightly larger cross section than that of intermediate cylindrical portion 2234 and defines therewith a shoulder 2240.

As seen in FIG. 33B, drive shaft bottom end 2220 is configured to have a bottommost portion 2250 having a generally uniform cross section characterized in that it includes a flat side surface 2252 and a circular cylindrical surface 2254.

Figure 34A:
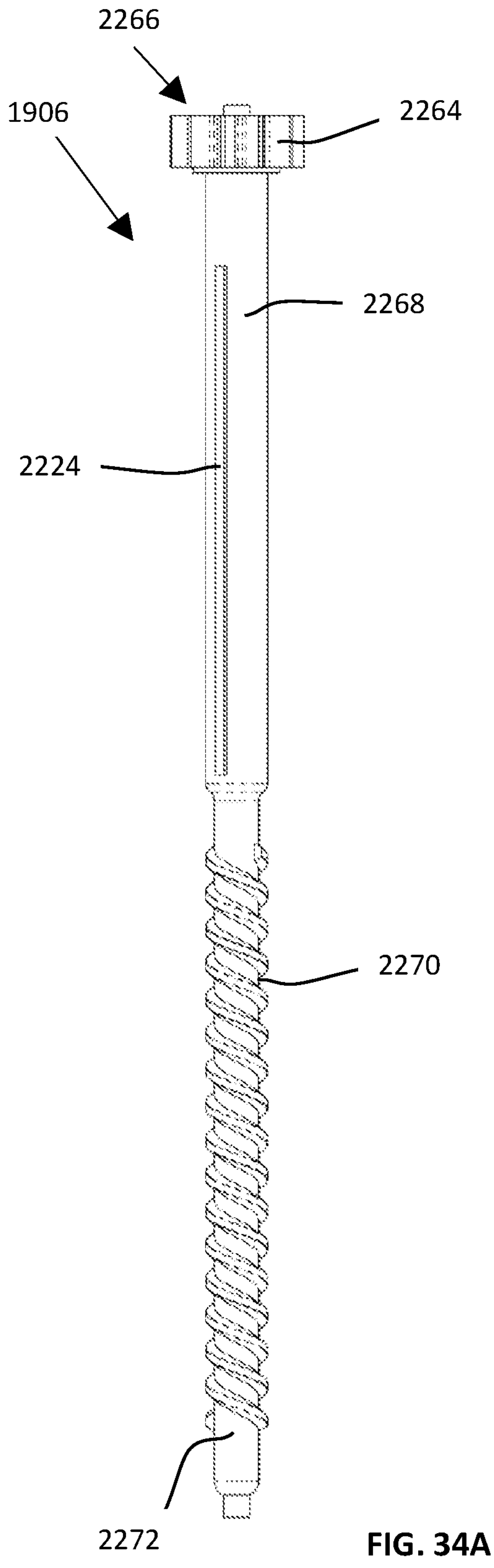
FIGS. 34A and 34B are simplified respective planar side and pictorial view illustrations of a spindle forming part of the axially displaceable rotary drive assembly of FIGS. 26A-26E.
Figure 34B:
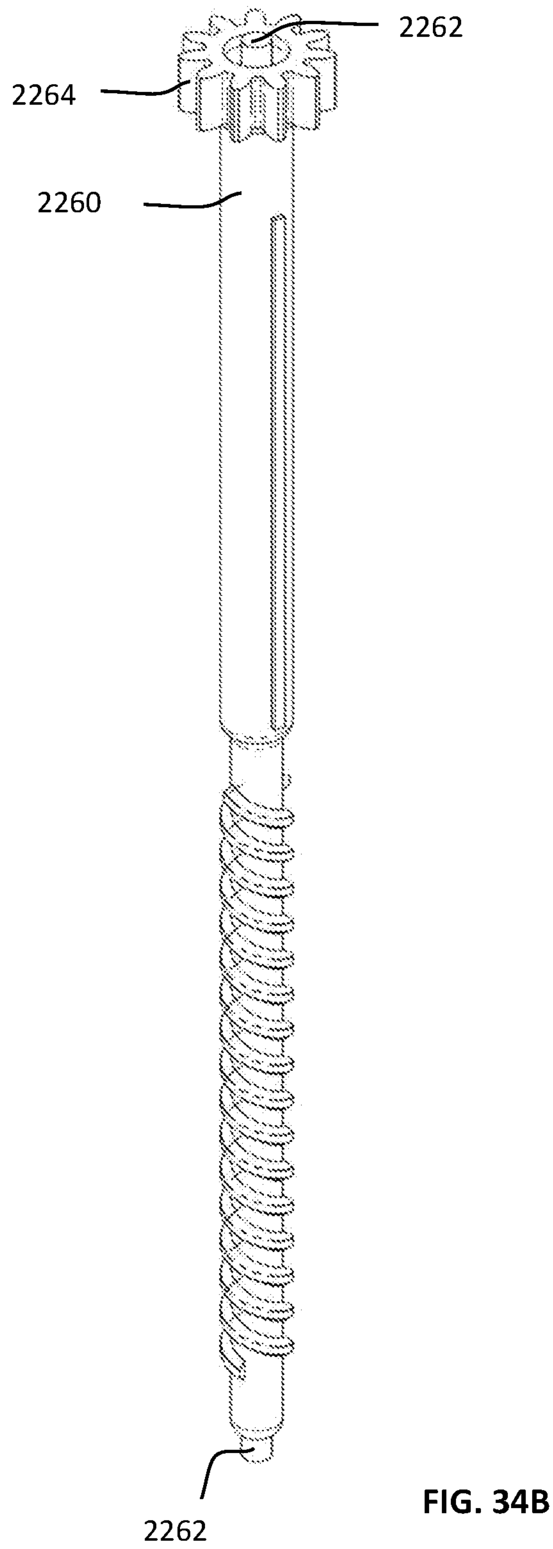
Figure 35A:
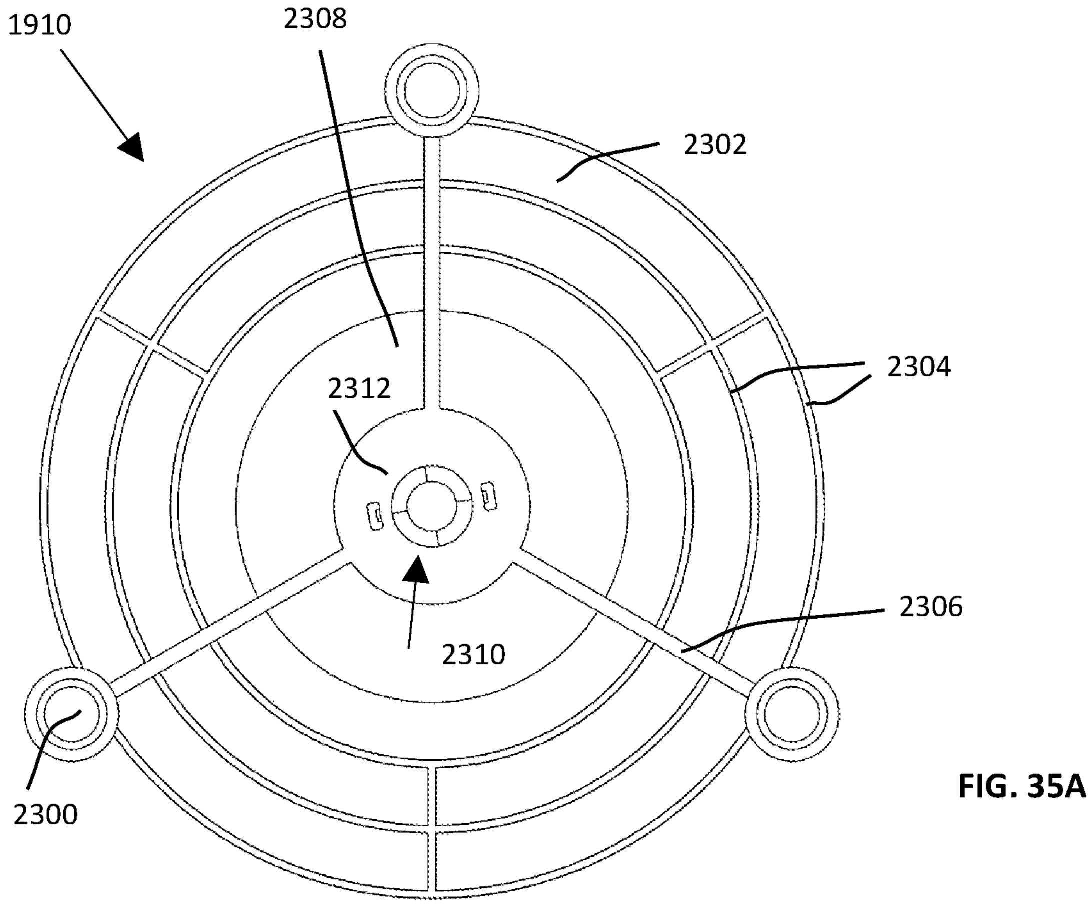
FIGS. 35A, 35B, 35C, 35D and 35E are simplified respective planar top, planar side, planar bottom, top-facing pictorial and bottom-facing pictorial view illustrations of a motor lifting element forming part of the axially displaceable rotary drive assembly of FIGS. 26A-26E.
Figure 35B:
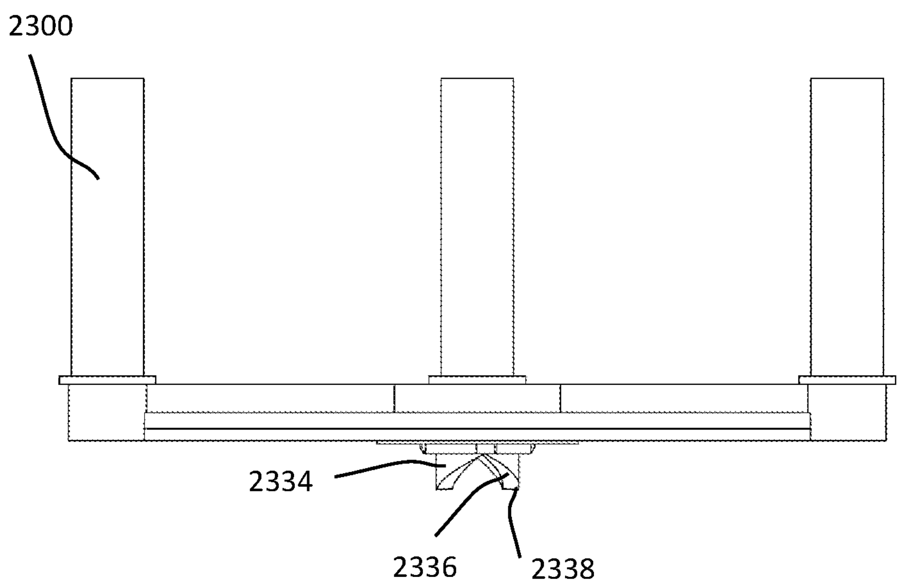
Figure 35C:
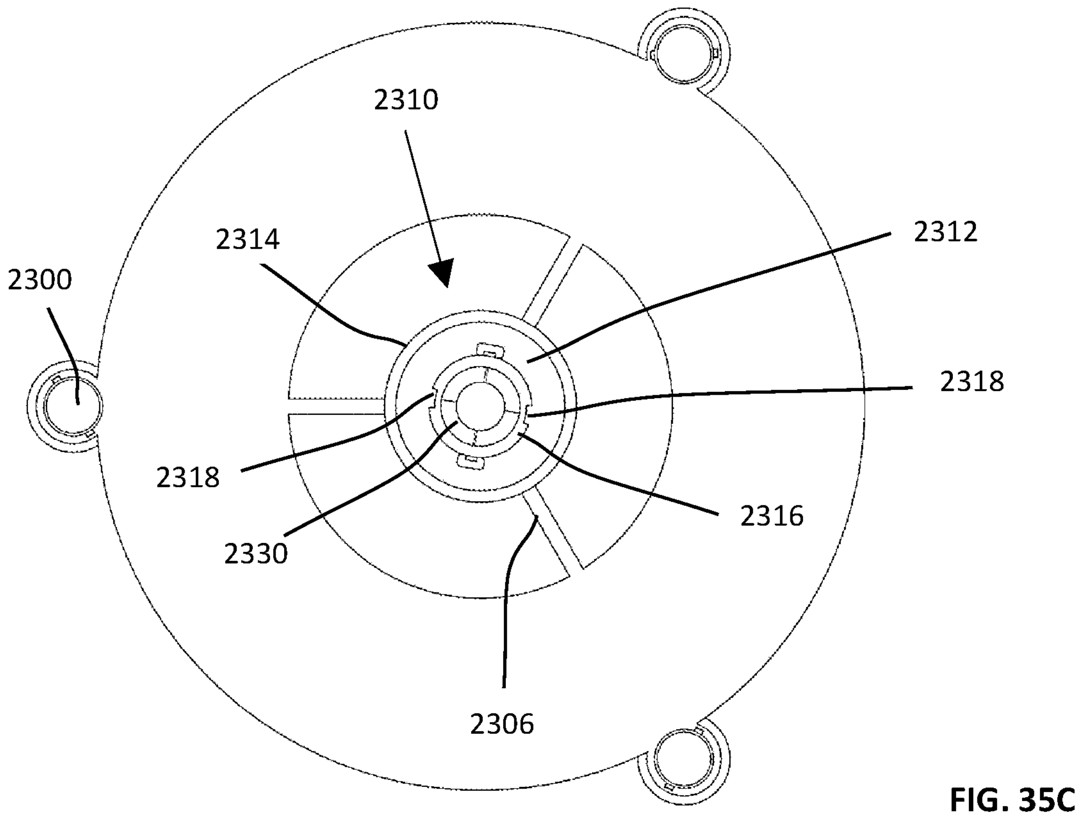
Figure 35D:
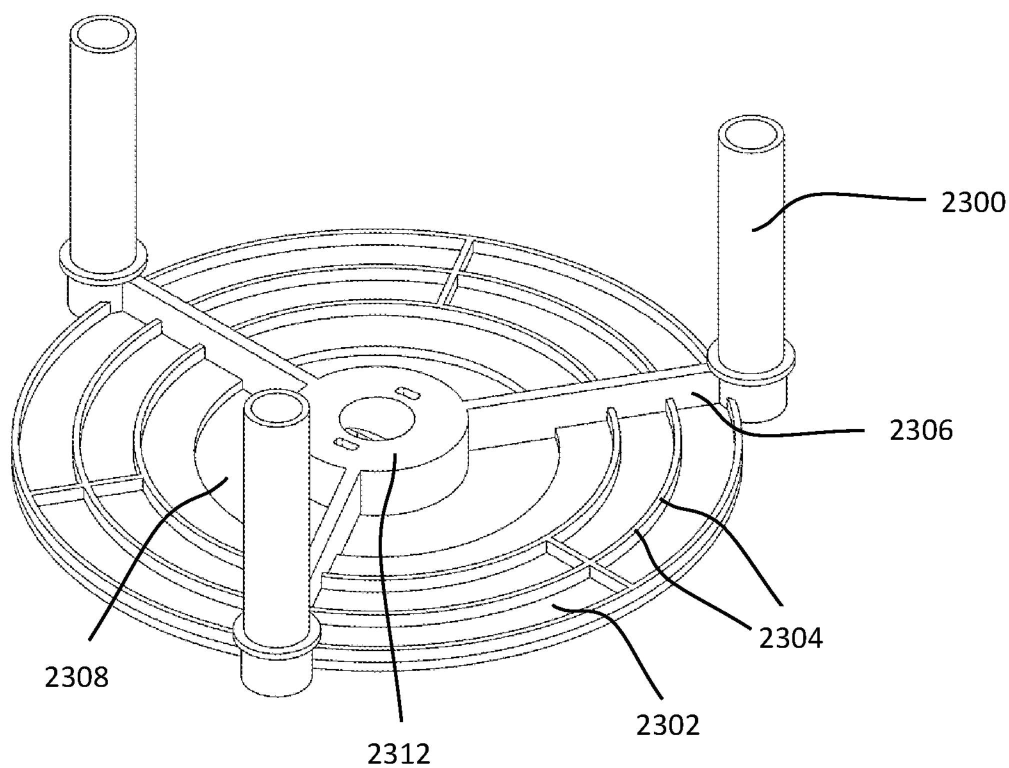
Figure 35E:
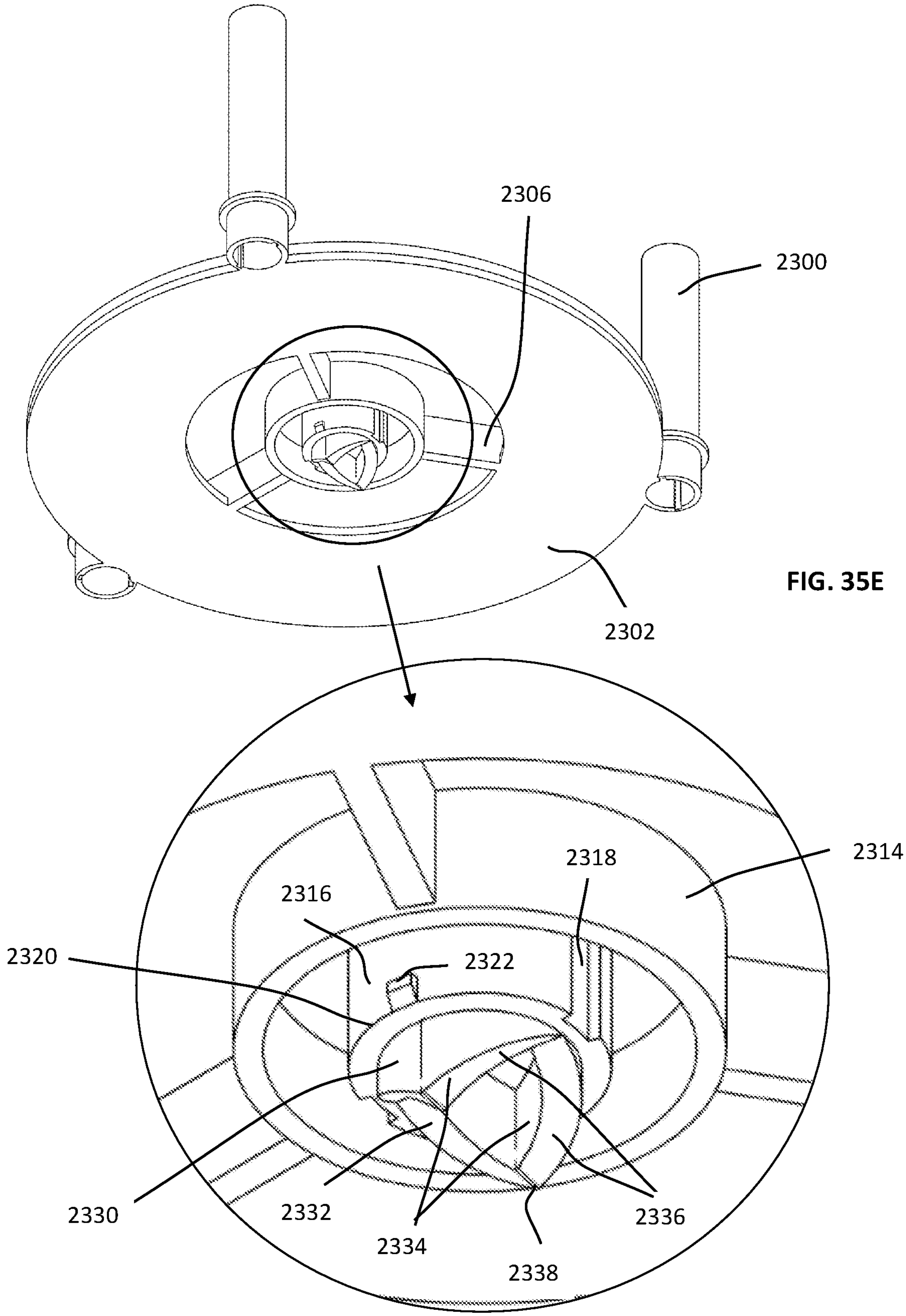
Figure 36A:
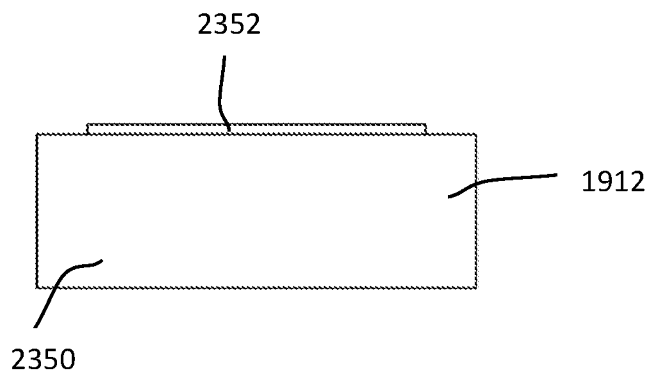
FIGS. 36A, 36B, 36C, 36D and 36E are simplified respective planar side, planar top, planar bottom, bottom-facing pictorial and sectional view illustrations of a linear to rotary converting adaptor, forming part of the axially displaceable rotary drive assembly of FIGS. 26A-26E, FIG. 36E being taken along lines E-E in FIG. 36C.
Figure 36B:
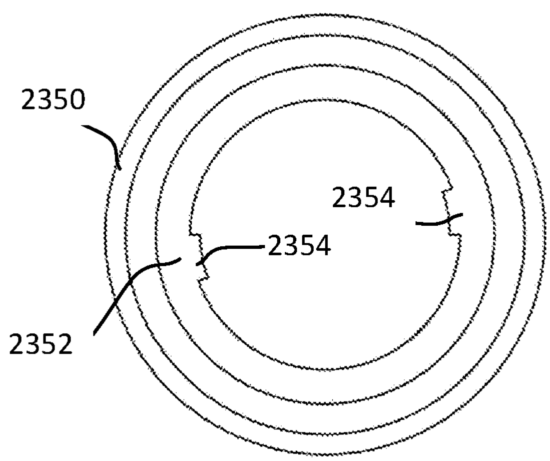
Figure 36C:
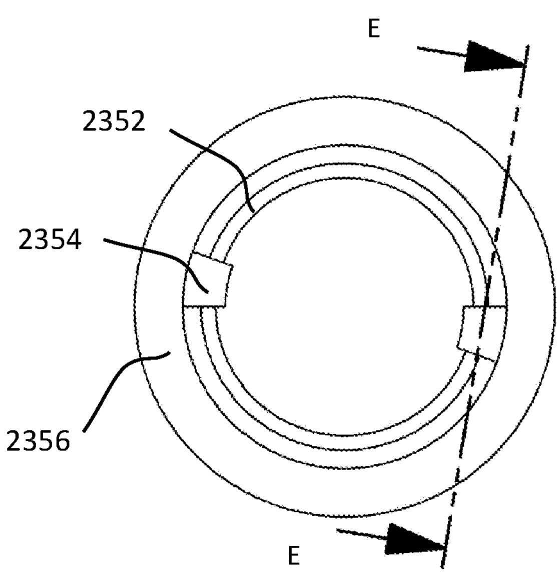
Figure 36D:
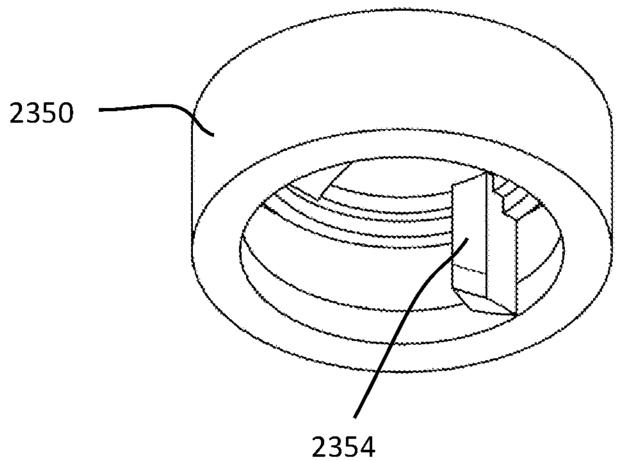
Figure 36E:
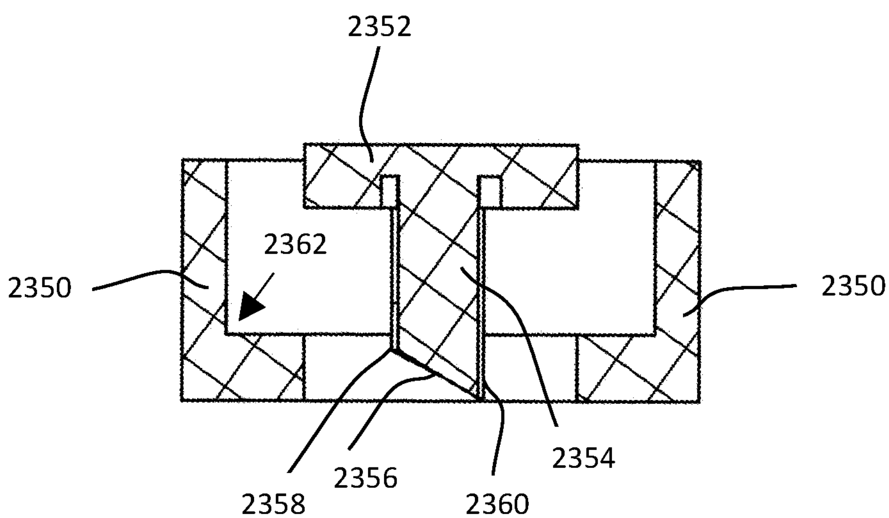
Figure 37A:
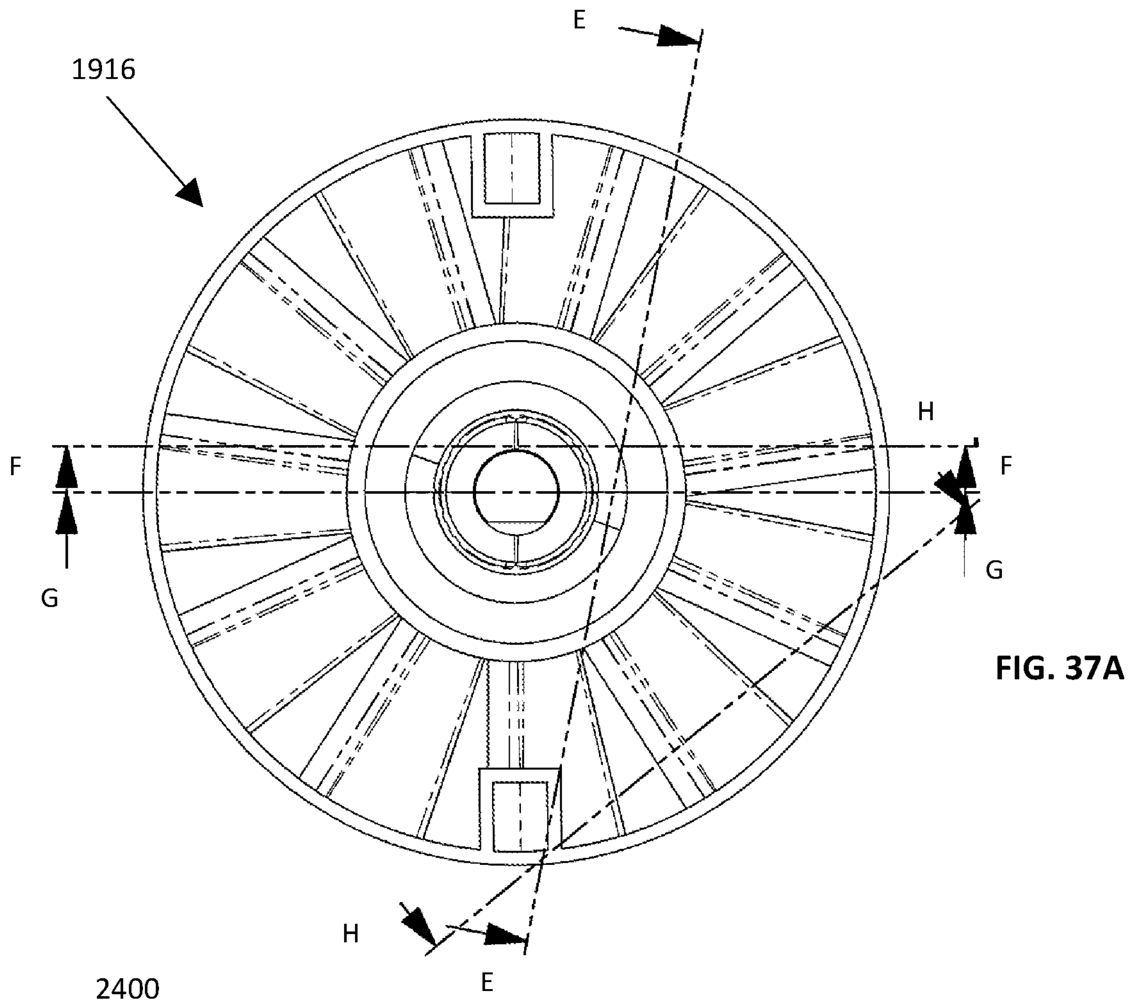
FIGS. 37A, 37B, 37C, 37D, 37E, 37F, 37G and 37H are simplified respective planar top, planar side, top-facing pictorial, bottom-facing pictorial, first sectional, second sectional, third sectional and fourth sectional view illustrations of a linearly driven rotating ventilating element forming part of the axially displaceable rotary drive assembly of FIGS. 26A-26E, FIGS. 37E, 37F, 37G and 37H being taken along respective lines E-E, F-F, G-G and H-H in FIG. 37A.
Figure 37B:
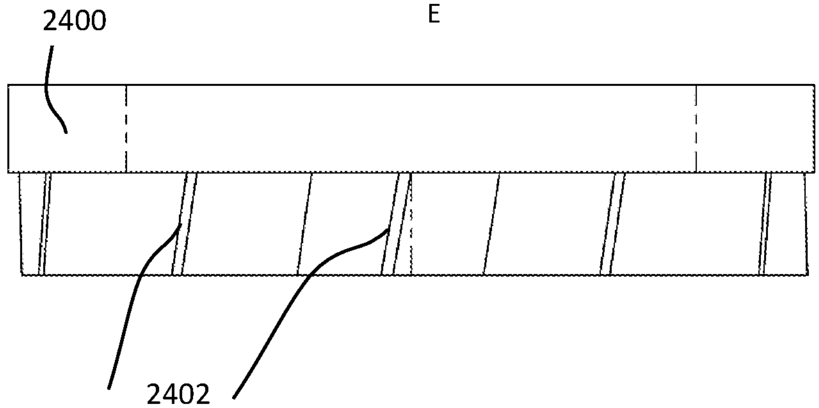
Figure 37C:
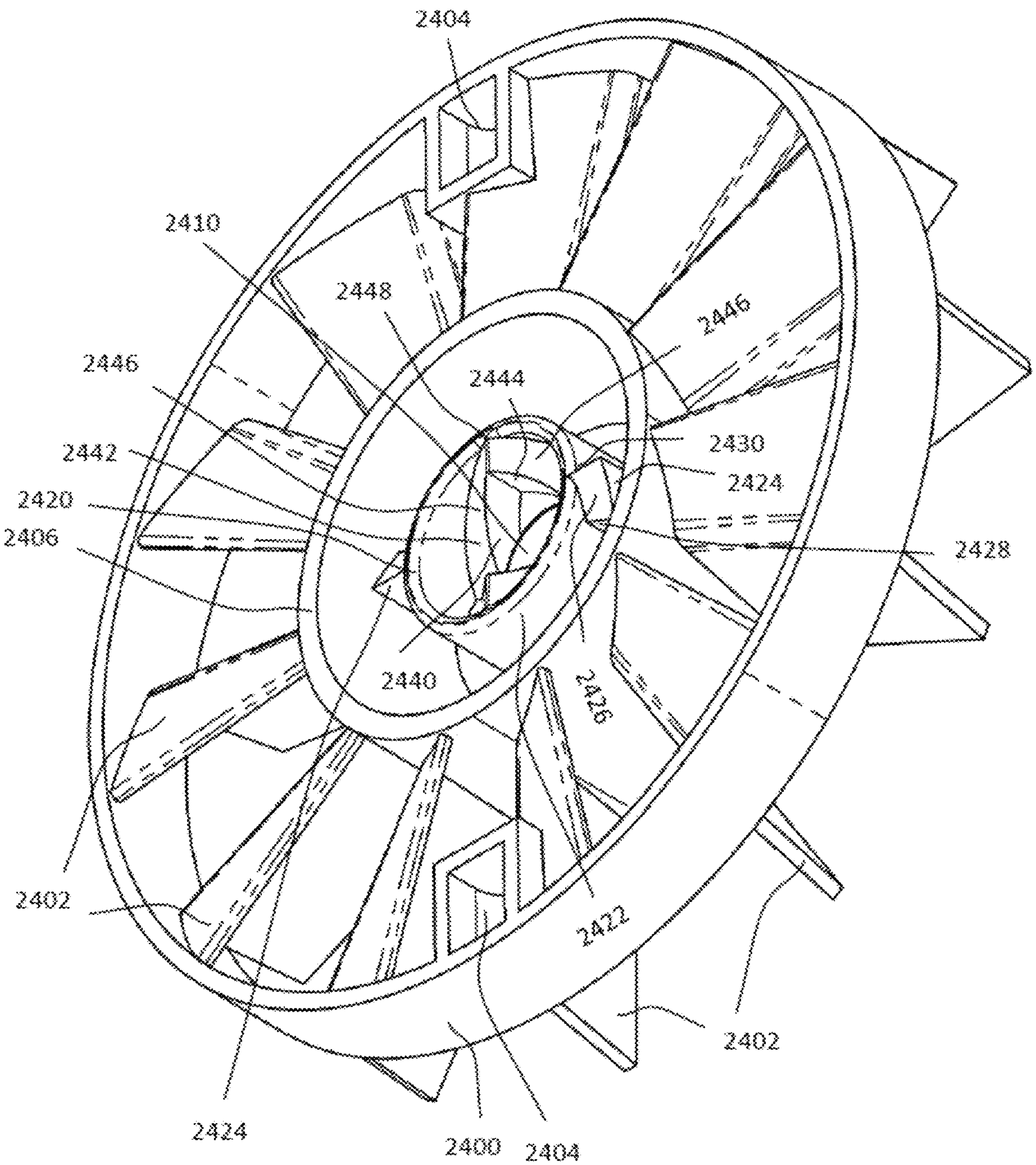
Figure 37D:
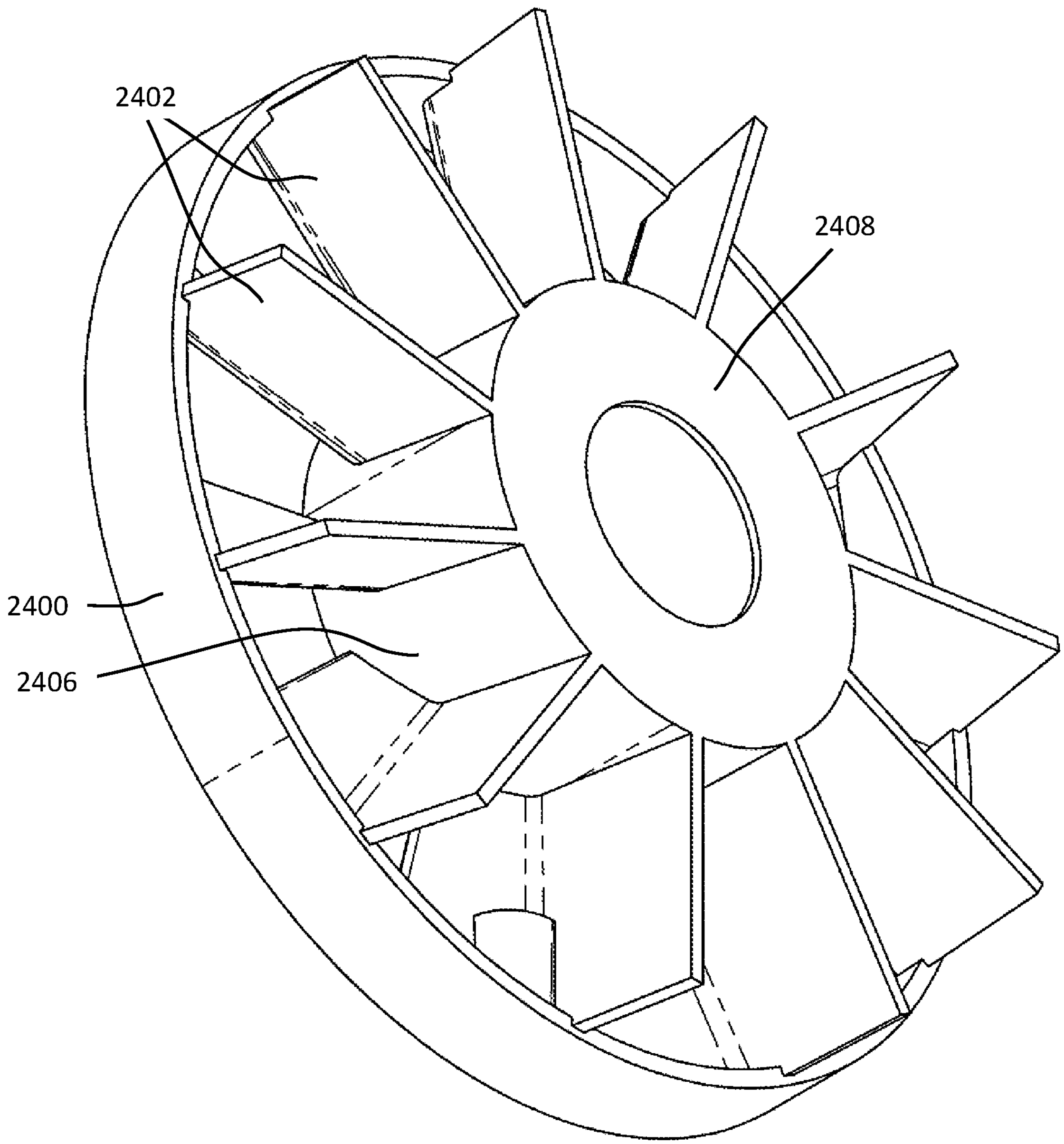
Figure 37E:
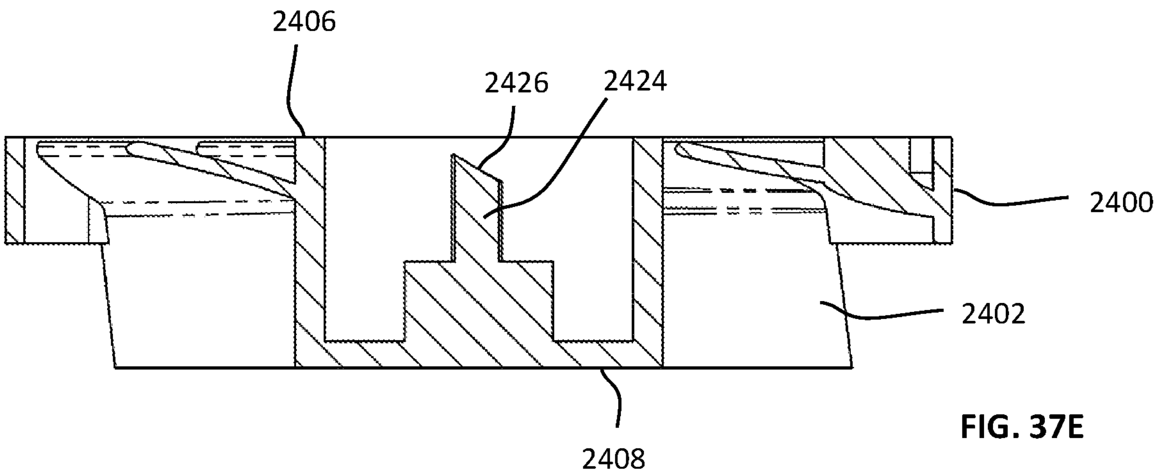
Figure 37F:
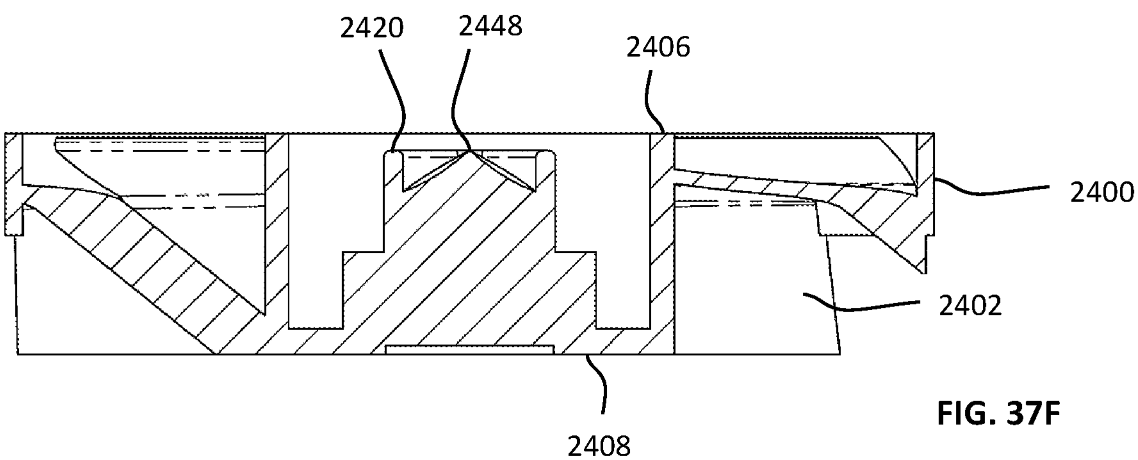
Figure 37G:
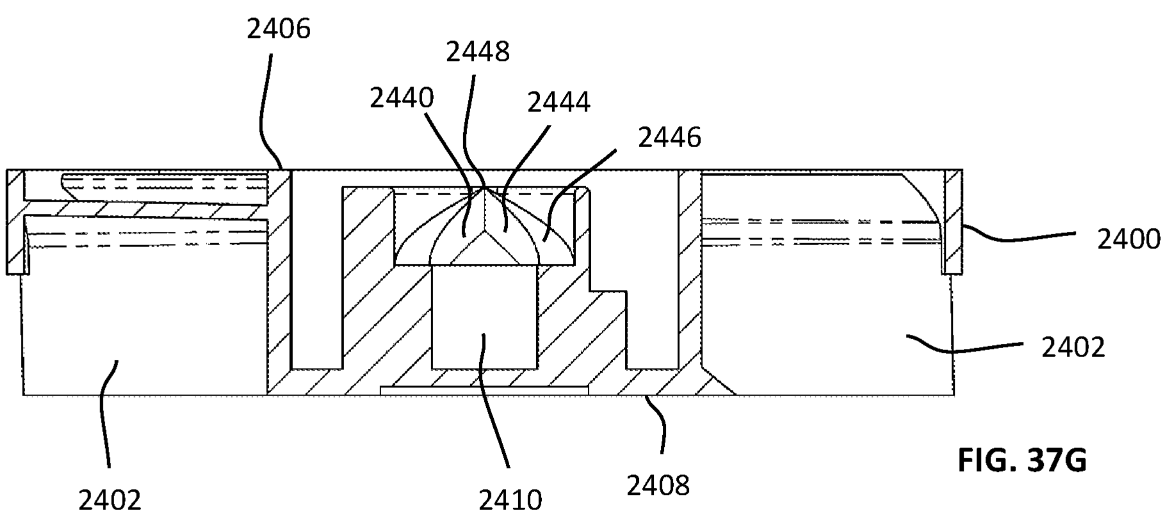
Figure 37H:
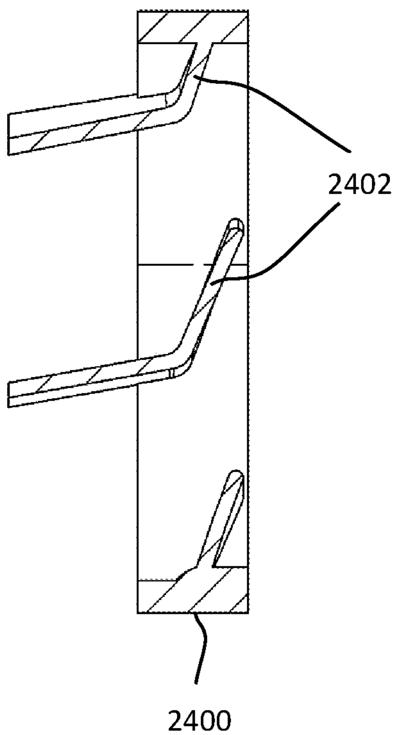

Reference is now made to FIGS. 34A and 34B, which are simplified respective planar side and pictorial view illustrations of spindle 1906, forming part of the axially displaceable rotary drive assembly 1530 of FIGS. 26A-26E.

As seen in FIGS. 34A & 34B, spindle 1906 preferably is an elongate element formed by injection molding of a plastic sheath 2260 over an elongate steel rod 2262. Spindle 1906 preferably includes a gear portion 2264 at a top end 2266 thereof. Below gear portion 2264 is a generally cylindrical portion 2268 which terminates in a helically threaded portion 2270, which terminates in a cylindrical bottom portion 2272. Preferably, generally cylindrical portion 2268 is formed along part of the extent thereof with an elongate side protrusion 2274.

Reference is now made to FIGS. 35A-35E, which are simplified illustrations of motor lifting element 1910 forming part of the axially displaceable rotary drive assembly 1530.

As seen in FIGS. 35A-35E, motor lifting element 1910 includes a plurality of upstanding internally threaded spindle receiving sockets 2300 which are disposed about a generally planar annular wall 2302, preferably having circumferential and radial reinforcement ribs 2304 and 2306, respectively, and defining a central ventilation aperture 2308. Disposed centrally of central ventilation aperture 2308 is a linearly displaceable ventilating element positioning hub 2310. The purpose of ventilating element positioning hub 2310 is to correctly azimuthally position blade 160 upon lowering of axially displaceable rotary drive assembly 1530, such that the blade 160 accurately seats in downwardly-facing blade receiving recess 310 of lid 140. This is achieved by correctly azimuthally positioning ventilating element 1916, which is rotationally fixed to drive shaft 2202, which in turn is rotationally fixed to blade 160.

Ventilating element positioning hub 2310 is preferably configured to have a planar wall 2312, which is integrally formed with inner portions of radial reinforcement ribs 2306. Extending downwardly from planar wall 2312 is an outer circumferential wall 2314, interiorly of which is an inner circumferential wall 2316 having a pair of outer facing vertical elongate side slots 2318 for receiving a corresponding pair of interior ribs of linear to rotary converting adaptor 1912 thereby to lock linear to rotary converting adaptor 1912 against rotation relative to motor lifting element 1910.

Inner circumferential wall 2316 terminates at a downward facing edge 2320 adjacent which is provided a pair of protrusions 2322. Inwardly of edge 2320 is a circumferential wall 2330 having a bottom edge 2332 defining a pair of symmetric downward facing teeth 2334, each of which has a pair of inclined tooth surfaces 2336 which meet at a point 2338. It is also noted that protrusions 2322 also serve to lock linear to rotary converting adaptor 1912 against linear disengagement from to motor lifting element 1910.

Reference is now made to FIGS. 36A-36E, which are simplified illustrations of linear to rotary converting adaptor 1912, forming part of the axially displaceable rotary drive assembly 1530 of FIGS. 26A-26E.

As seen in FIGS. 36A-36E, the linear to rotary converting adaptor 1912 comprises an outer cylindrical wall 2350 and an inner cylindrical ring 2352, arranged interiorly of the outer cylindrical wall 2350 adjacent the top thereof and attached thereto by integrally formed vertically extending interior ribs 2354. Interior ribs 2354 each have an inclined downward facing end surface 2356, presenting a progressively lower surface portion from a leading edge 2358 to a trailing edge 2360 thereof.

Outer cylindrical wall 2350 defines a shoulder 2362 adjacent a bottom edge thereof, which shoulder, together with inner cylindrical ring 2352 provides a spring seat for accommodating spring 1914.

Reference is now made to FIGS. 37A-37H, which are simplified illustrations of linearly driven rotating ventilating element 1916 forming part of the axially displaceable rotary drive assembly 1530 of FIGS. 26A-26E.

As seen in FIGS. 37A-37H, linearly driven rotating ventilating element 1916 preferably includes an outer cylindrical wall 2400 to which are connected integrally formed outer edges of a plurality of circumferentially distributed generally radially extending vanes 2402. Preferably, there are provided a pair of recesses 2404 interior of outer cylindrical wall 2400 for retaining magnets (not shown) which may serve for sensing the rotational velocity of the rotating ventilating element 1916.

Inner edges of vanes 2402 are joined to an inner cylindrical wall 2406, which terminates at a downward-facing edge thereof in a planar, generally circular wall 2408 having formed at a center thereof a socket 2410, which is configured to lockably receive bottom end 2220 of drive shaft 2202.

Surrounding socket is an inner circular cylindrical wall 2420 defining an outer cylindrical wall surface 2422. Extending outwardly from cylindrical wall surface 2422 are a pair of protrusions 2424, each of which has an inclined upward surface 2426, presenting a progressively higher surface portion from a leading edge 2428 to a trailing edge 2430 thereof. Protrusions 2424 interact with end surfaces 2356 of interior ribs 2354 of linear to rotary converting adaptor 1912.

Interiorly of cylindrical wall surface 2422 is a circumferential wall 2440 having a top edge 2442 defining a pair of symmetric upward facing teeth 2444, each of which has a pair of inclined tooth surfaces 2446 which meet at a point 2448. Teeth 2444 interact with teeth 2334 of motor lifting element 1910.

Figure 19A:
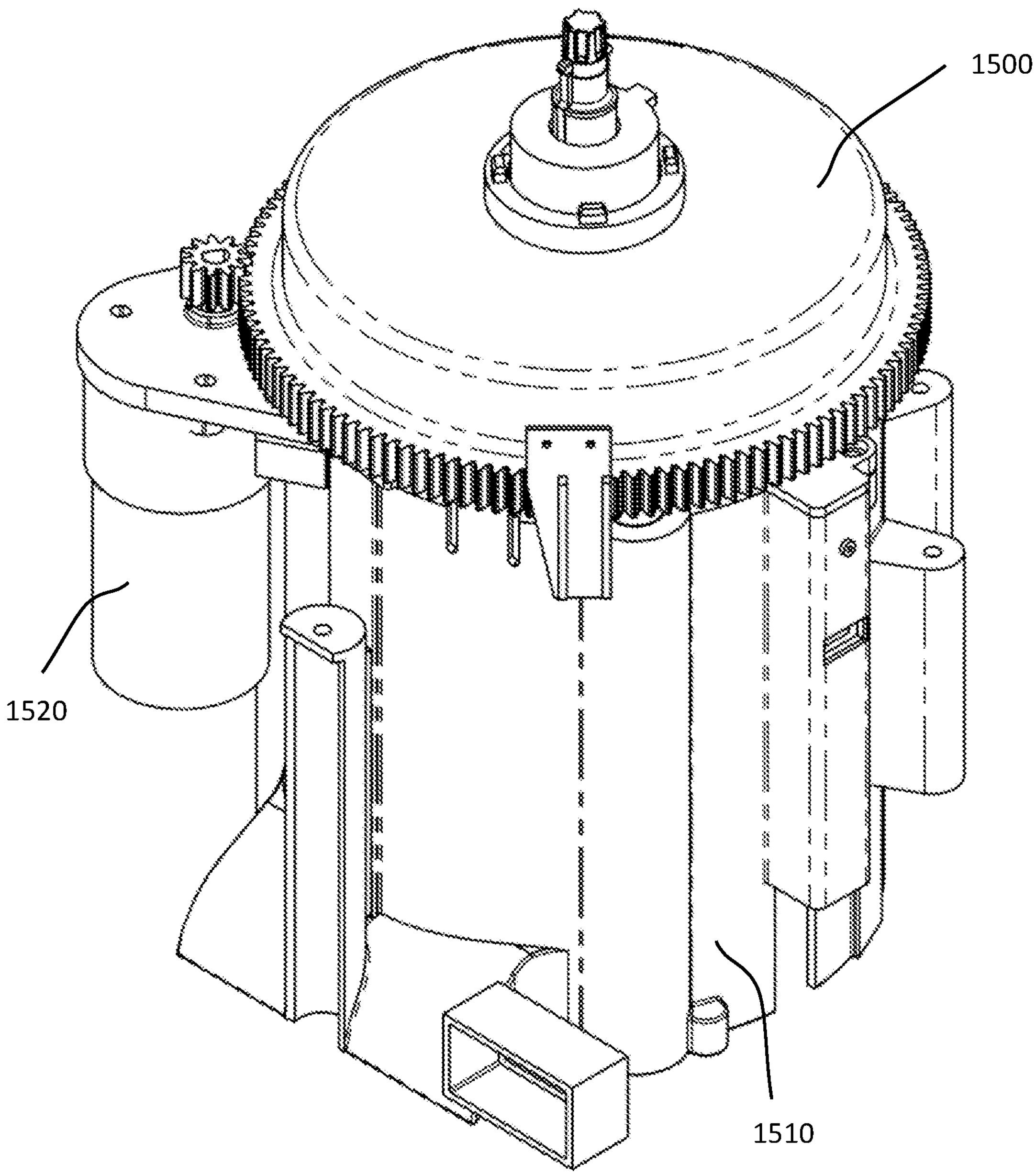
FIGS. 19A, 19B, 19C, 19D, 19E and 19F are simplified respective pictorial, planar side, first planar top, second planar top, planar bottom and exploded view illustrations of a vertically displacing rotary drive motor assembly forming part of the base assembly of FIGS. 16A-16E, FIGS. 19C and 19D showing different rotational orientations of the drive shaft.
Figure 19B:
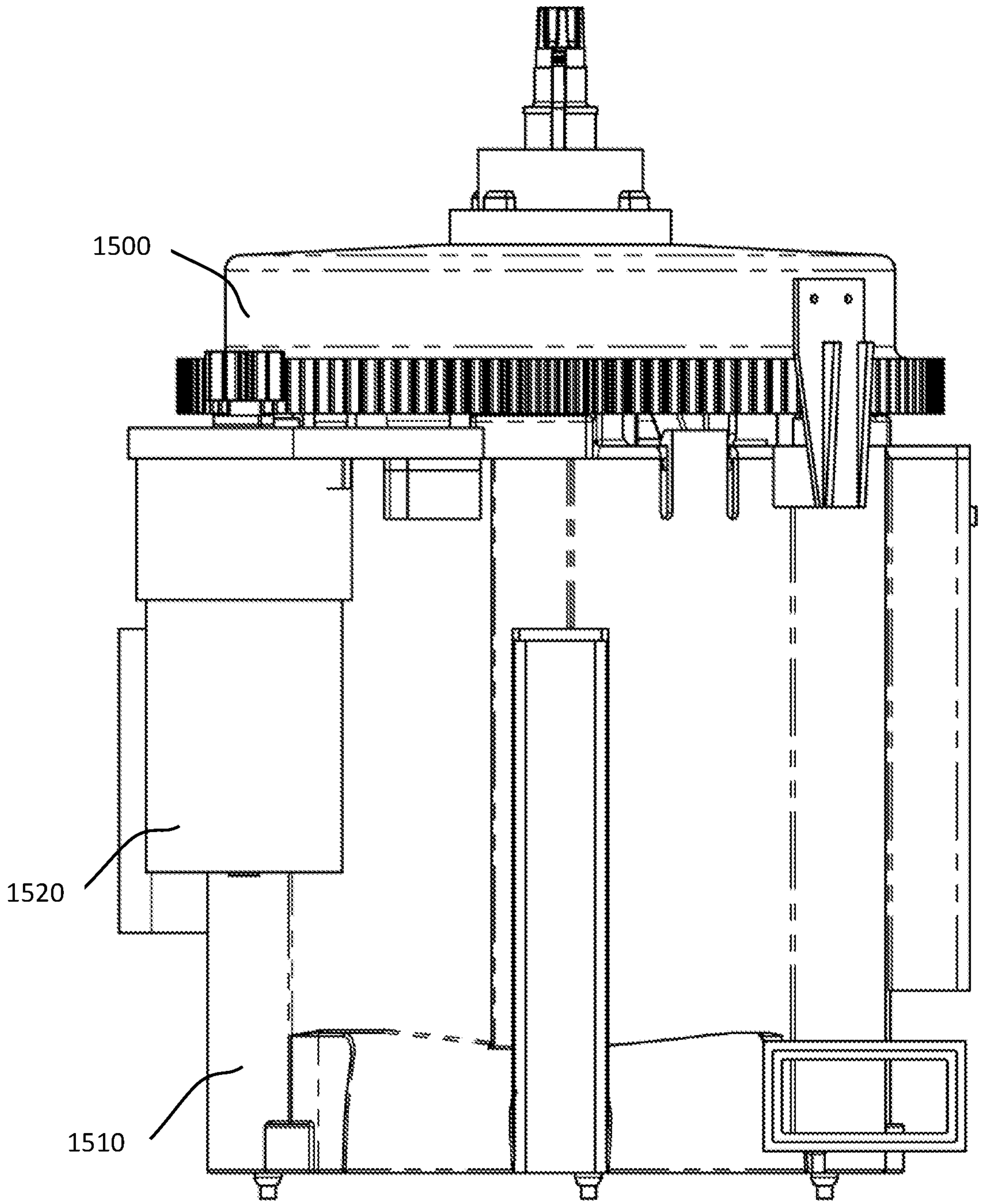
Figure 19C:
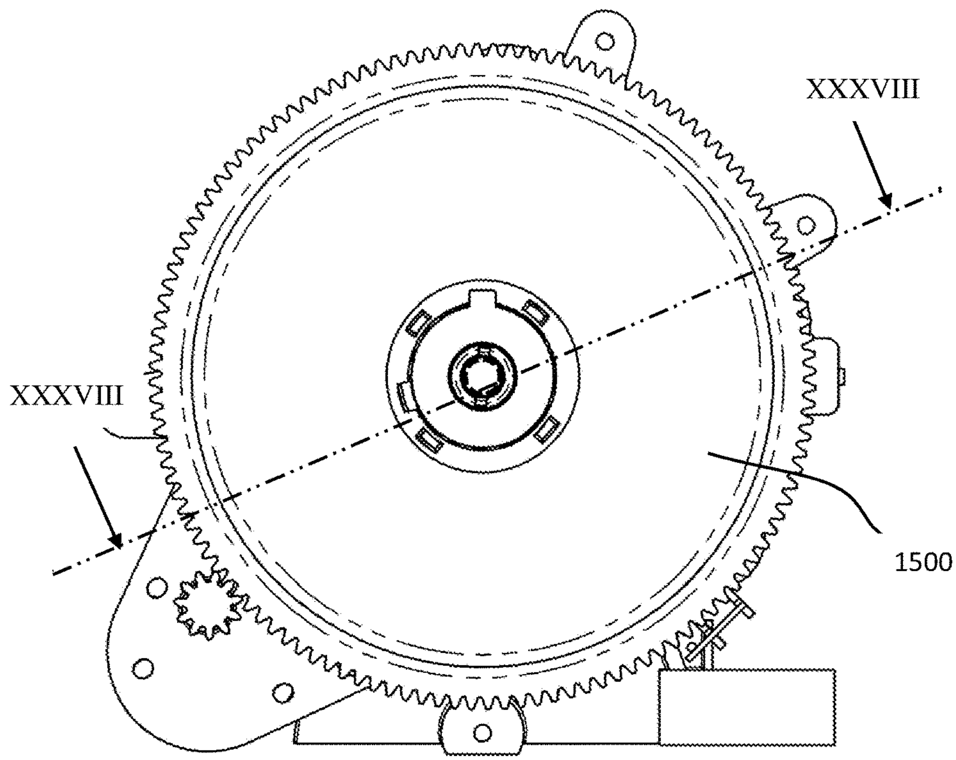
Figure 38:
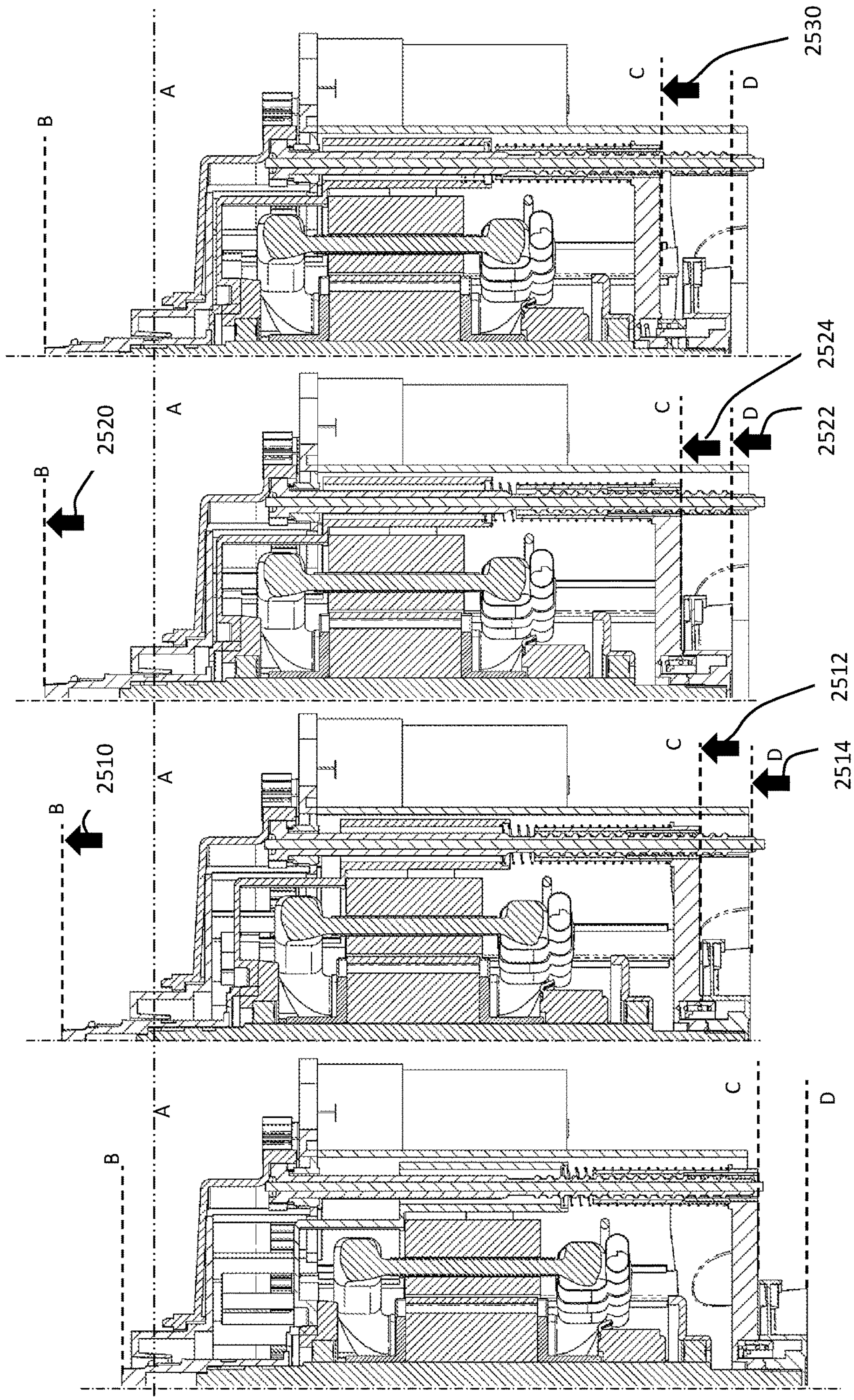
FIG. 38 is a simplified composite sectional illustration, taken along a section line XXXVIII-XXXVIII in FIG. 19C, illustrating various operative orientations in the operation of the vertically displacing rotary drive motor assembly of FIGS. 19A-19F.

Reference is now made to FIG. 38, which is a simplified composite sectional illustration taken along a section line XXXVIII-XXXVIII in FIG. 19C illustrating various operative orientations in the operation of the vertically displacing rotary drive motor assembly 1430 of FIGS. 19A-19F, and to FIGS. 39A, 39B, 39C and 39D, which are sectional illustrations taken along section line XXXVIII-XXXVIII in FIG. 19C, showing the vertically displacing rotary drive motor assembly 1430 in the four operative orientations represented in FIG. 38. It is appreciated that the various vertical displacements described hereinbelow are produced by the operation of spindles 1906 driven by auxiliary rotary drive motor 1520 via rotary drive gear 1500.

Figure 39A:
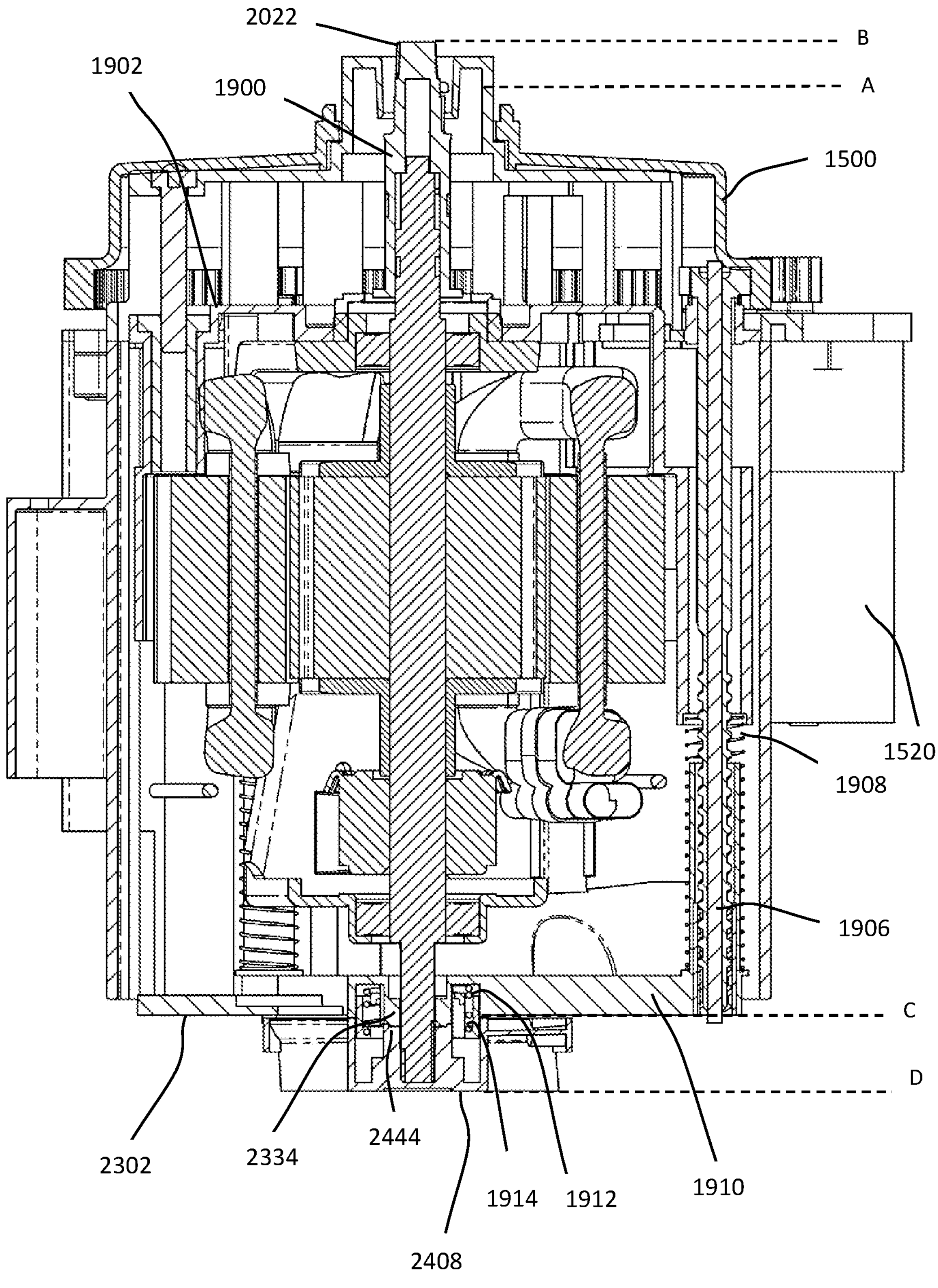
FIGS. 39A, 39B, 39C and 39D are sectional illustrations, taken along section line XXXVIII-XXXVIII in FIG. 19C, showing the vertically displacing rotary drive motor assembly in the four operative orientations represented in FIG. 38.

In the leftmost portion of FIG. 38, designated as I, and shown in detail in FIG. 39A, the vertically displacing rotary drive motor assembly 1430 of FIGS. 19A-19F is in its rest position. In the rest position, shown in portion I of FIG. 38, the axially displaceable rotary drive assembly 1530 is in its lowest vertical position, such that the motor lifting element 1910 is at its lowest vertical position, such that teeth 2334 of the motor lifting element 1910 operatively engage corresponding teeth 2444 of linearly driven rotating ventilating element 1916 such that inclined surfaces 2336 of teeth 2334 slidingly engage corresponding inclined surfaces 2446 of teeth 2444.

It is seen that linear to rotary converting adaptor 1912 is in its highest vertical position, relative to motor lifting element 1910, against the urging of spring 1914.

For purposes of reference, the top surface of generally cylindrical top portion 1452 of base housing 1400 is indicated to lie in a plane designated A. The top surface of vertically splined top generally cylindrical portion 2022 of drive shaft assembly 1900 is indicated to lie in a plane designated B, parallel to plane A. The bottom surface of generally planar annular wall 2302 of motor lifting element 1910 is indicated to lie in a plane designated C, parallel to planes A and B. The bottom surface of planar, generally circular wall 2408 of linearly driven rotating ventilating element 1916 is indicated to lie in a plane designated D, parallel to planes A, B and C.

Figure 39B:
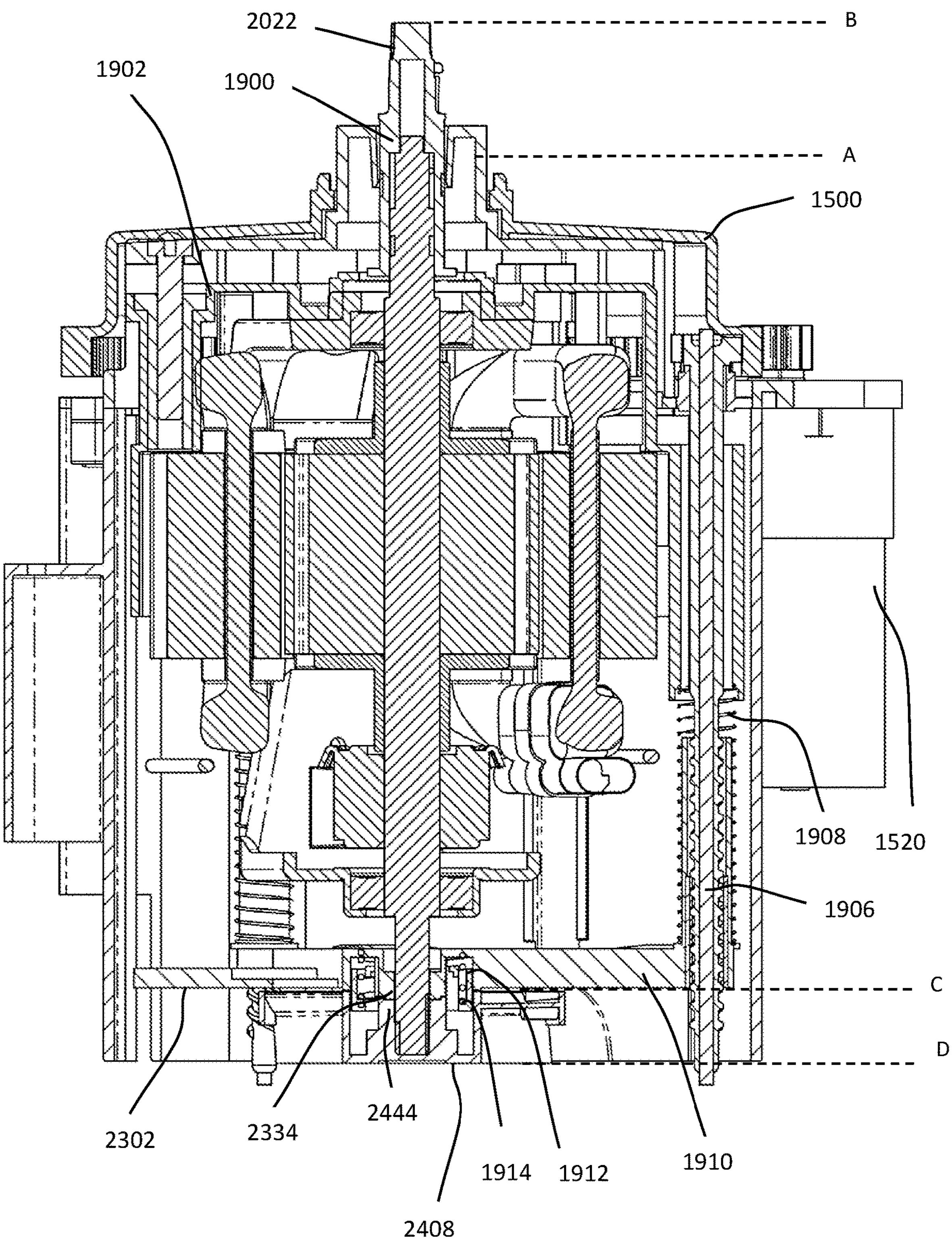

In the next to leftmost portion of FIG. 38, designated as II, and shown in detail in FIG. 39B, the vertically displacing rotary drive motor assembly 1430 of FIGS. 19A-19F is in a lower intermediate position. In the lower intermediate position, as shown in portion II of FIG. 38, the axially displaceable rotary drive assembly 1530 is in a relatively low but not lowest vertical position, such that the motor lifting element 1910 is raised from its lowest vertical position by operation of spindles 1906, while teeth 2334 of the motor lifting element 1910 still operatively engage corresponding teeth 2444 of linearly driven rotating ventilating element 1916 such that inclined surfaces 2336 of teeth 2334 slidingly engage corresponding inclined surfaces 2446 of teeth 2444.

It is seen that linear to rotary converting adaptor 1912 remains in its highest vertical position, relative to motor lifting element 1910, against the urging of spring 1914.

Raising of the motor lifting element 1910 provides corresponding raising of motor support bracket assembly 1902 under the urging of coil springs 1908. Inasmuch as electric motor 1904 is fixedly attached to motor support bracket assembly 1902, the electric motor 1904 is corresponding raised such that the top surface of vertically splined top generally cylindrical portion 2022 of drive shaft assembly 1900, plane B, is raised relative to plane A as indicated by an arrow 2510. It is appreciated that the bottom surface of generally planar annular wall 2302 of motor lifting element 1910 in plane C and the bottom surface of planar, generally circular wall 2408 of linearly driven rotating ventilating element 1916 in plane D are also raised relative to plane A as indicated by arrows 2512 and 2514, respectively, to a vertical extent generally identical to the raising of plane B relative to plane A.

Figure 39C:
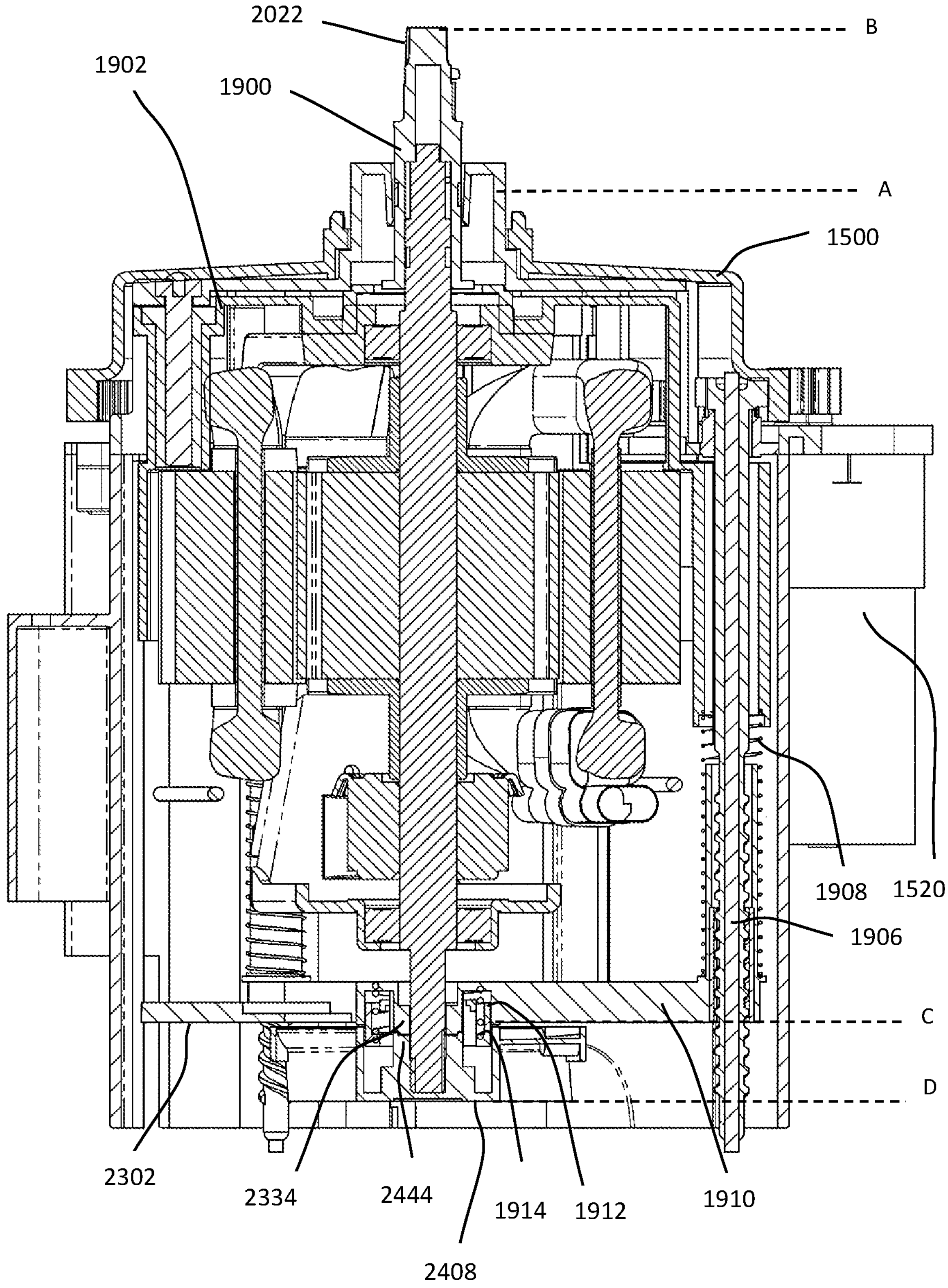

In the next to rightmost portion of FIG. 38, designated as III, and shown in detail in FIG. 39C, the vertically displacing rotary drive motor assembly 1430 of FIGS. 19A-19F is in an upper intermediate position. In the upper intermediate position, as shown in portion III of FIG. 38, the motor support bracket assembly 1902 is at its highest position. The motor lifting element 1910 of axially displaceable rotary drive assembly 1530 is in a relatively high but not highest vertical position.

It is seen that linear to rotary converting adaptor 1912 remains in its highest vertical position, relative to motor lifting element 1910, against the urging of spring 1914.

Inasmuch as electric motor 1904 is fixedly attached to motor support bracket assembly 1902, the electric motor 1904 is corresponding raised such that the top surface of vertically splined top generally cylindrical portion 2022 of drive shaft assembly 1900, plane B, is raised to its highest position relative to plane A, as indicated by an arrow 2520. Accordingly the linearly driven rotating ventilating element 1916 is in its highest position, while teeth 2334 of the motor lifting element 1910 still operatively engage corresponding teeth 2444 of linearly driven rotating ventilating element 1916 such that inclined surfaces 2336 of teeth 2334 slidingly engage corresponding inclined surfaces 2446 of teeth 2444.

It is appreciated that in the operative orientation shown at III, planes B, C and D have been raised further upwardly relative to plane A and relative to their positions indicated at II. Specifically, the top surface of vertically splined top generally cylindrical portion 2022 of drive shaft assembly 1900, plane B, is shifted at its maximum vertical position relative to plane A and the bottom surface of planar, generally circular wall 2408 of linearly driven rotating ventilating element 1916 in plane D is also shifted to its maximum vertical position relative to plane A as indicated by an arrow 2522. Plane C is upwardly shifted relative to plane A, as indicated by an arrow 2524, but is not at its maximum vertical position relative to plane A.

Figure 39D:
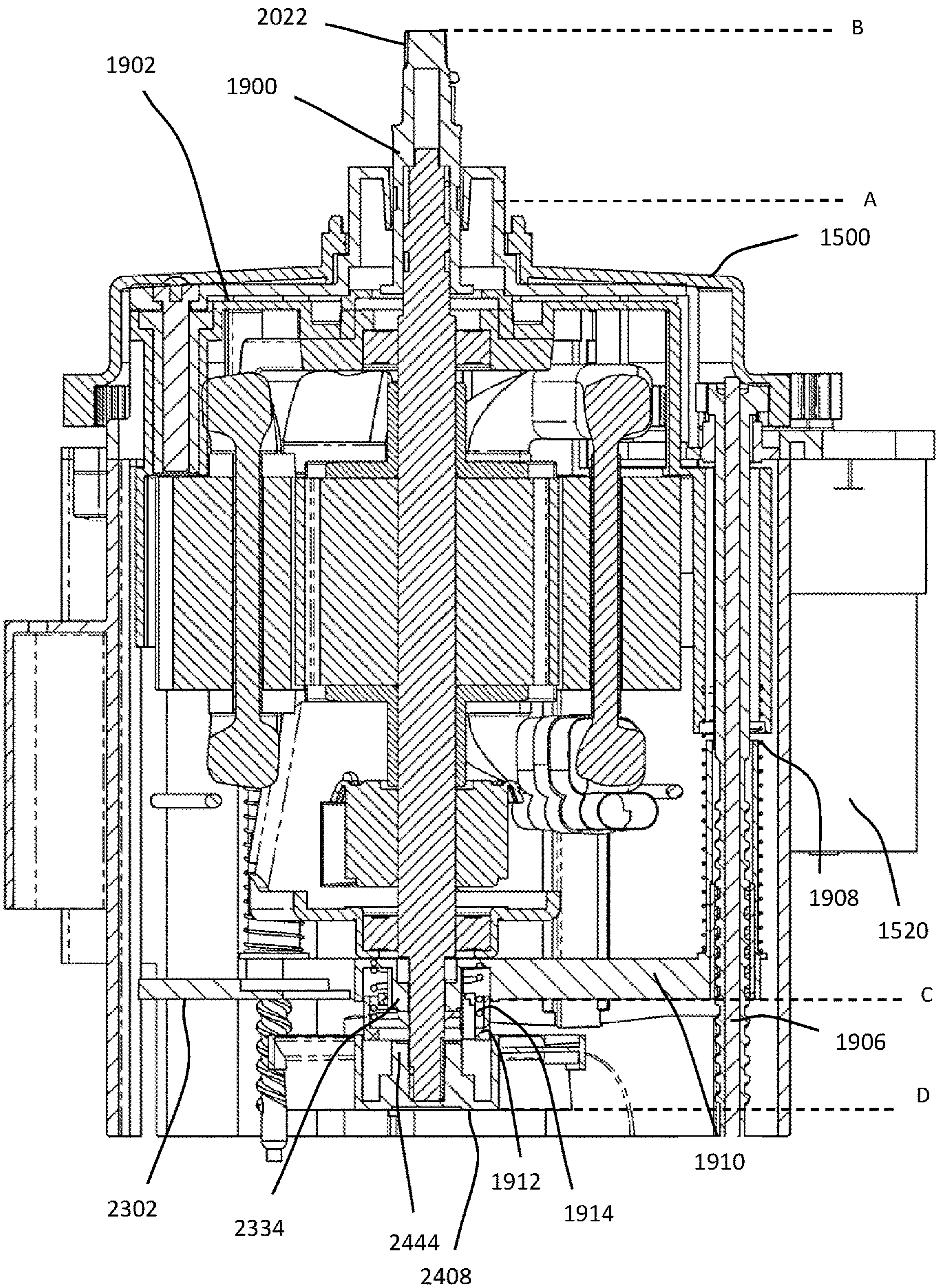

In the right most portion of FIG. 38, designated as IV, and shown in detail in FIG. 39D, the vertically displacing rotary drive motor assembly 1430 of FIGS. 19A-19F is in its highest vertical position. In this position, shown in portion IV of FIG. 38, the motor support bracket assembly 1902 remains at its highest position. The motor lifting element 1910 of axially displaceable rotary drive assembly 1530 is raised to its highest vertical position.

It is seen that linear to rotary converting adaptor 1912 is lowered relative to motor lifting element 1910, under the urging of spring 1914.

The top surface of vertically splined top generally cylindrical portion 2022 of drive shaft assembly 1900, plane B, remains at its highest position relative to plane A. The linearly driven rotating ventilating element 1916 remains in its highest position, however, the raising of the motor lifting element 1910 relative thereto causes disengagement of teeth 2334 of the motor lifting element 1910 from corresponding teeth 2444 of linearly driven rotating ventilating element 1916, allowing rotation of the linearly driven rotating ventilating element 1916 relative to the motor lifting element 1910.

It is appreciated that in the operative orientation shown at IV, plane C has been raised further upwardly relative to plane A, as indicated by an arrow 2530, and relative to its position indicated at III. Specifically, the bottom surface of generally planar annular wall 2302 of motor lifting element 1910 in plane C is upwardly shifted relative to plane A as indicated by arrow 2530 to its maximum vertical position relative to plane A.

Reference is now made to FIGS. 40A-40G, which are sectional illustrations showing part of the vertically displacing rotary drive motor assembly 1430 seen in FIGS. 39A-

39D in six operative orientations which occur following operation of blade 160, as the vertically displacing rotary drive motor assembly 1430 shifts from operative orientation IV of FIGS. 38 and 39D back to operative orientation III of FIGS. 38 and 39C. FIGS. 40C and 40D show the same operative orientation from different points of view.

Figure 40A:
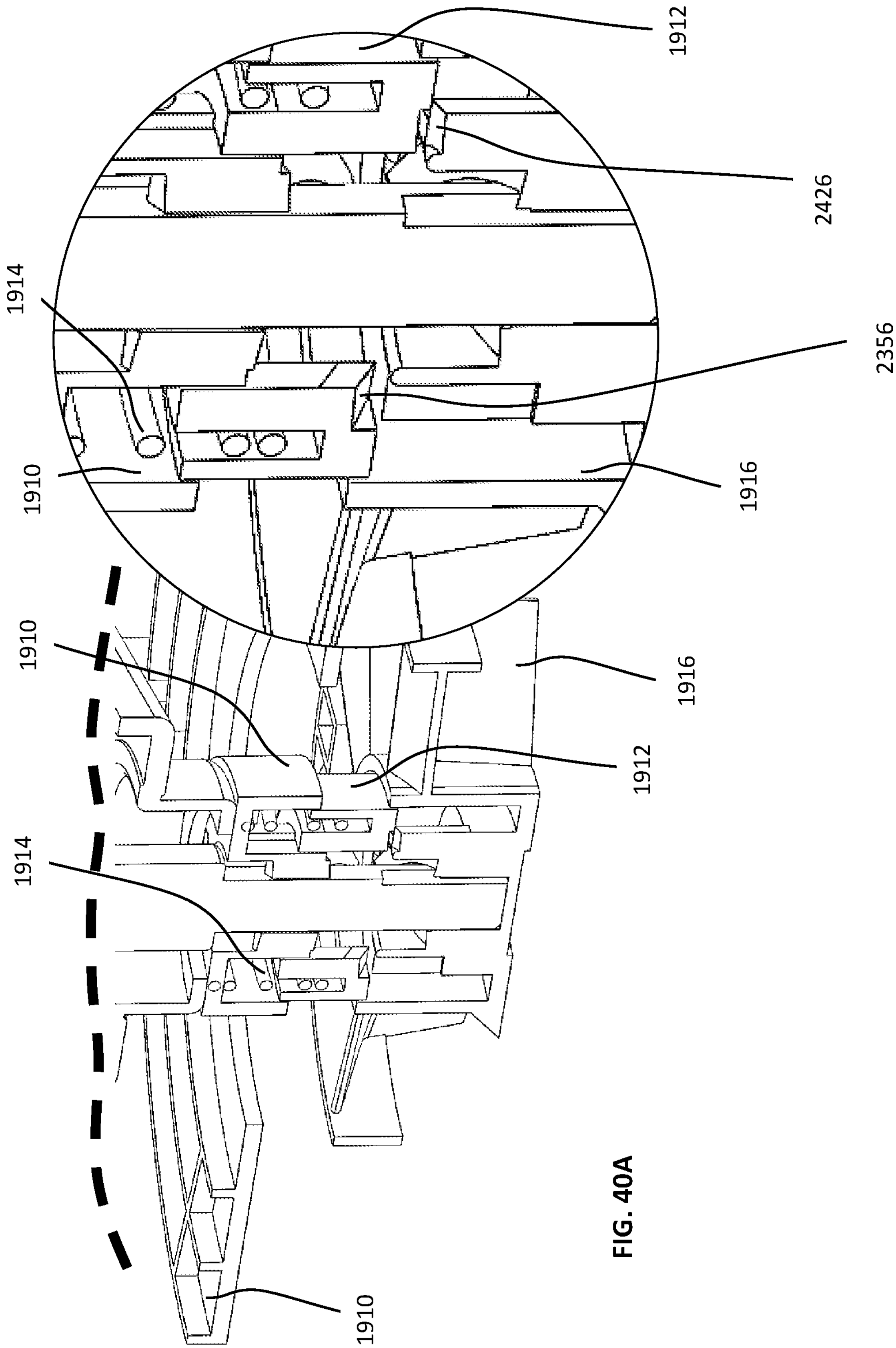
FIGS. 40A, 40B, 40C, 40D, 40E, 40F and 40G are sectional illustrations showing part of the vertically displacing rotary drive motor assembly seen in FIGS. 39A-39D in six operative orientations.

FIG. 40A shows an operative orientation of axially displaceable rotary drive assembly 1530 at a stage corresponding to operative orientation IV of FIGS. 38 and 39D in which the relative rotational orientations of linear to rotary converting adaptor 1912 and linearly driven rotating ventilating element 1916 are such that inclined downward facing end surfaces 2356 of linear to rotary converting adaptor 1912 nearly engage corresponding inclined upward surfaces 2426 of linearly driven rotating ventilating element 1916.

Figure 40B:
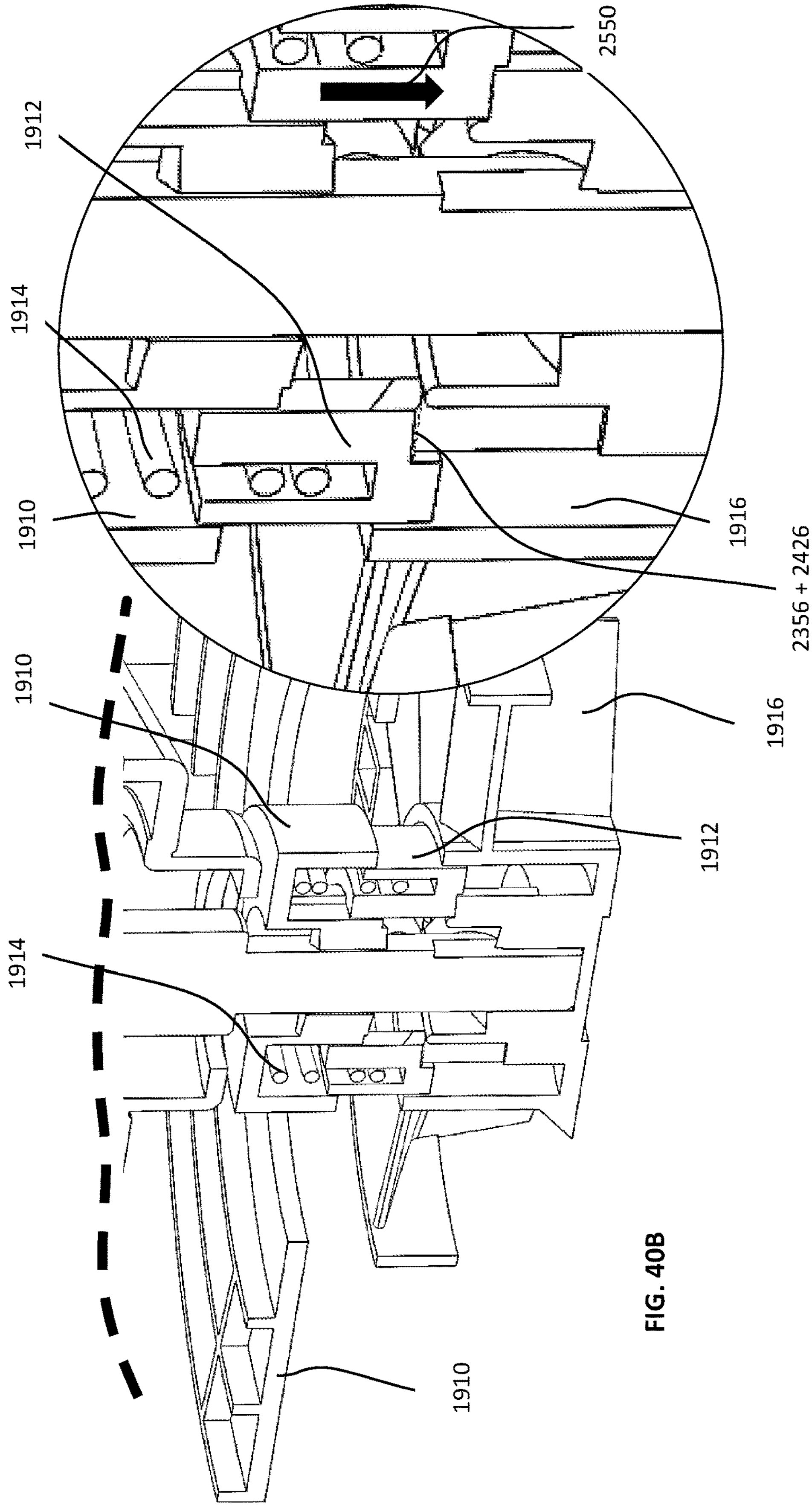
Figure 40C:
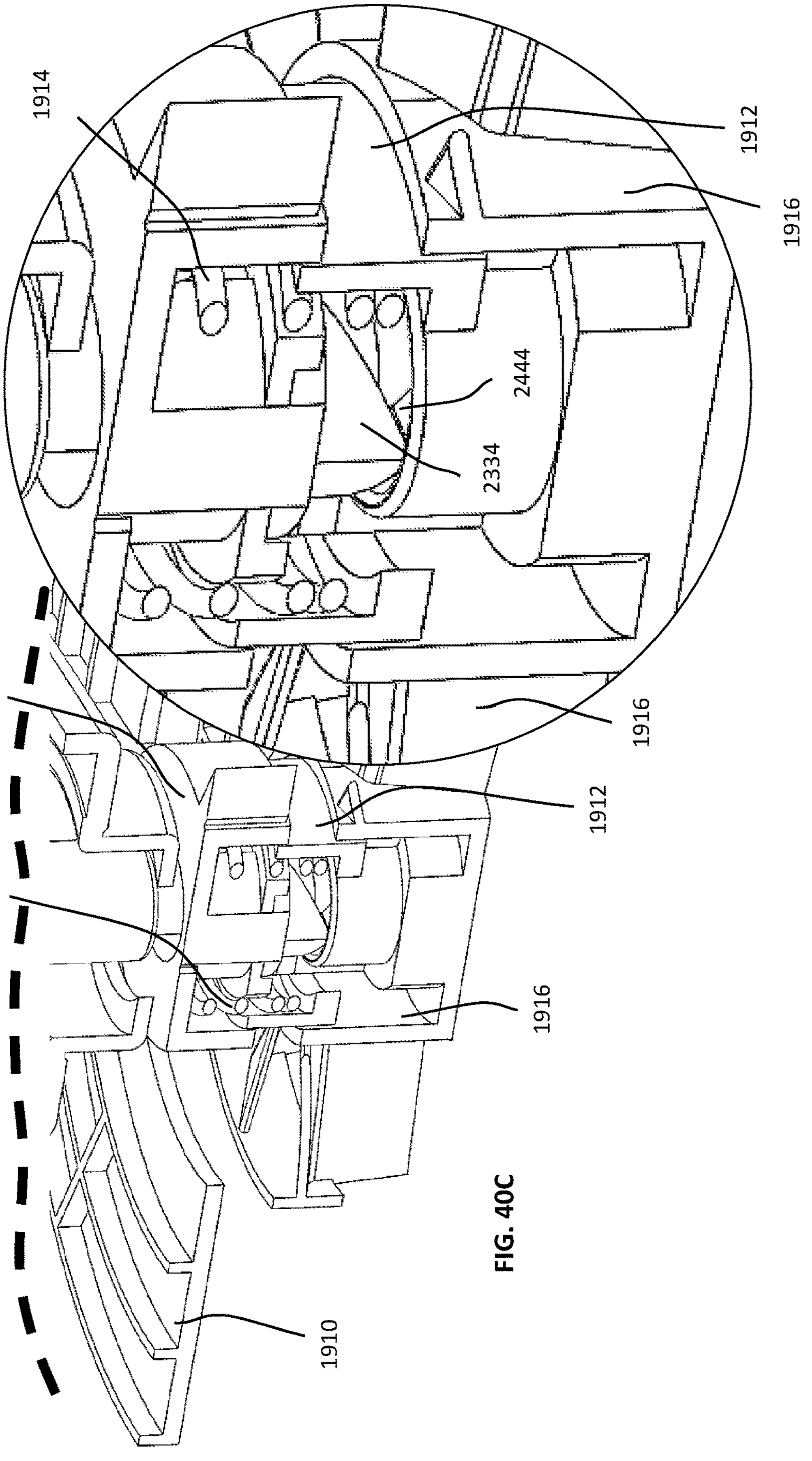
Figure 40D:
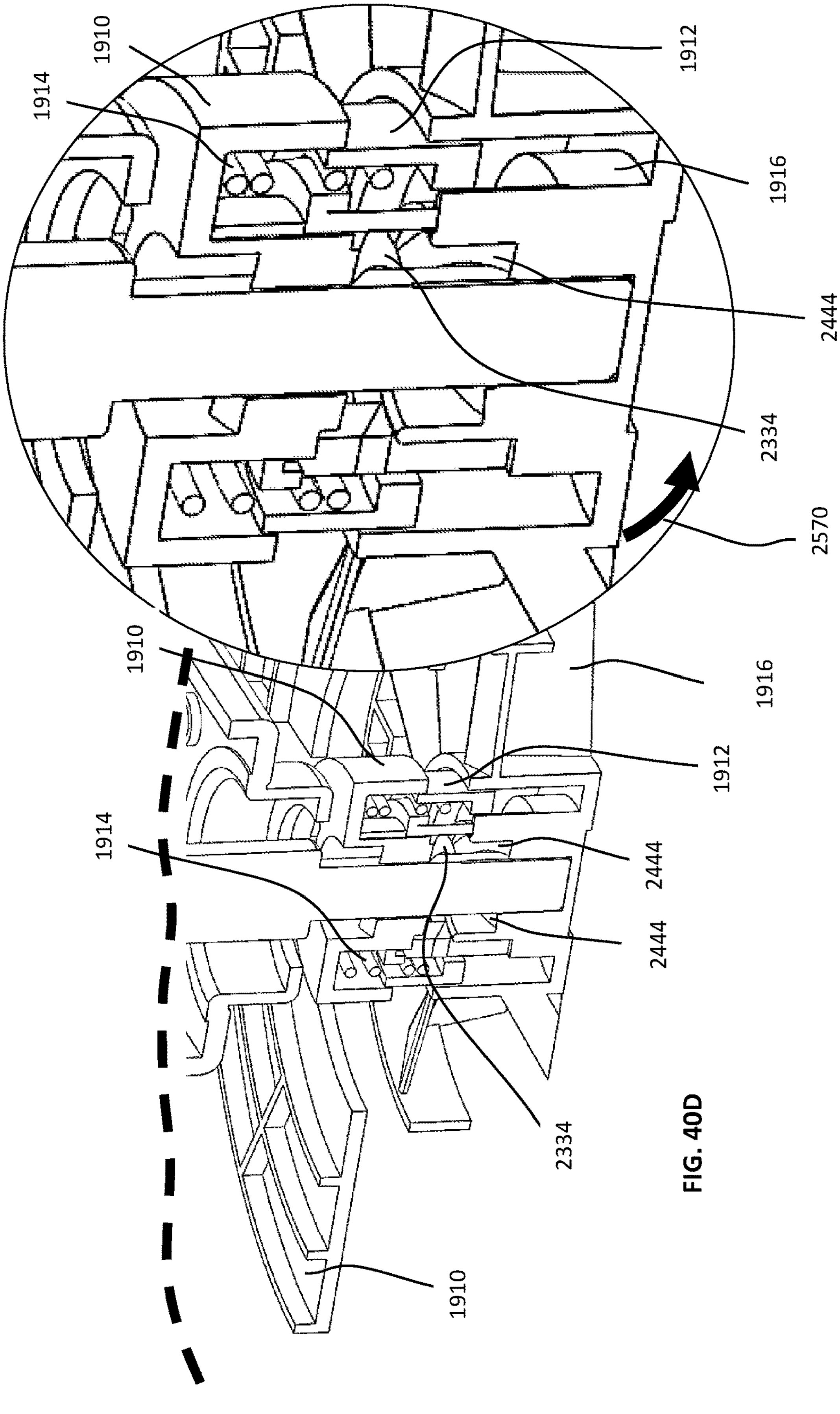

FIG. 40B shows an operative orientation of axially displaceable rotary drive assembly 1530 in which the motor lifting element 1910 and the linear to rotary converting adaptor 1912 is shifted downward, as indicated by an arrow 2550, and in which the relative rotational orientations of linear to rotary converting adaptor 1912 and linearly driven rotating ventilating element 1916 are such that inclined downward facing end surfaces 2356 of linear to rotary converting adaptor 1912 engage corresponding inclined upward surfaces 2426 of linearly driven rotating ventilating element 1916.

Figure 40E:
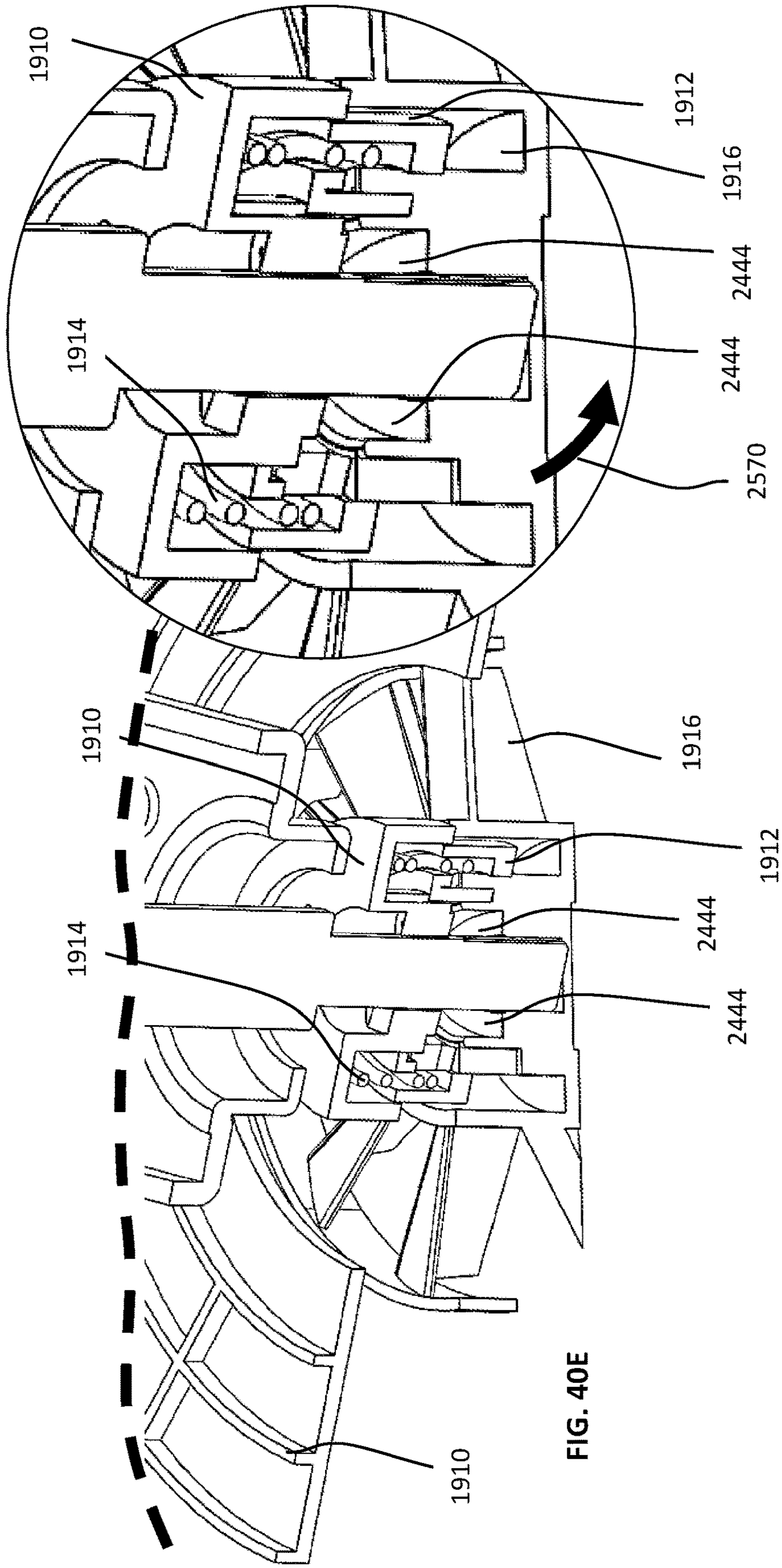

FIGS. 40C and 40D show an operative orientation of linearly driven rotating ventilating element 1916 so as to rotatably reposition the teeth 2444 of the linearly driven rotating ventilating element 1916, as indicated by an arrow 2570 in FIG. 40E, so that they are about to engage the corresponding teeth 2334 of motor lifting element 1910.

FIG. 40D illustrates the interference between surfaces 2356 and 2426 which produce the rotation indicated by arrow 2570 in FIG. 40E.

Figure 40F:
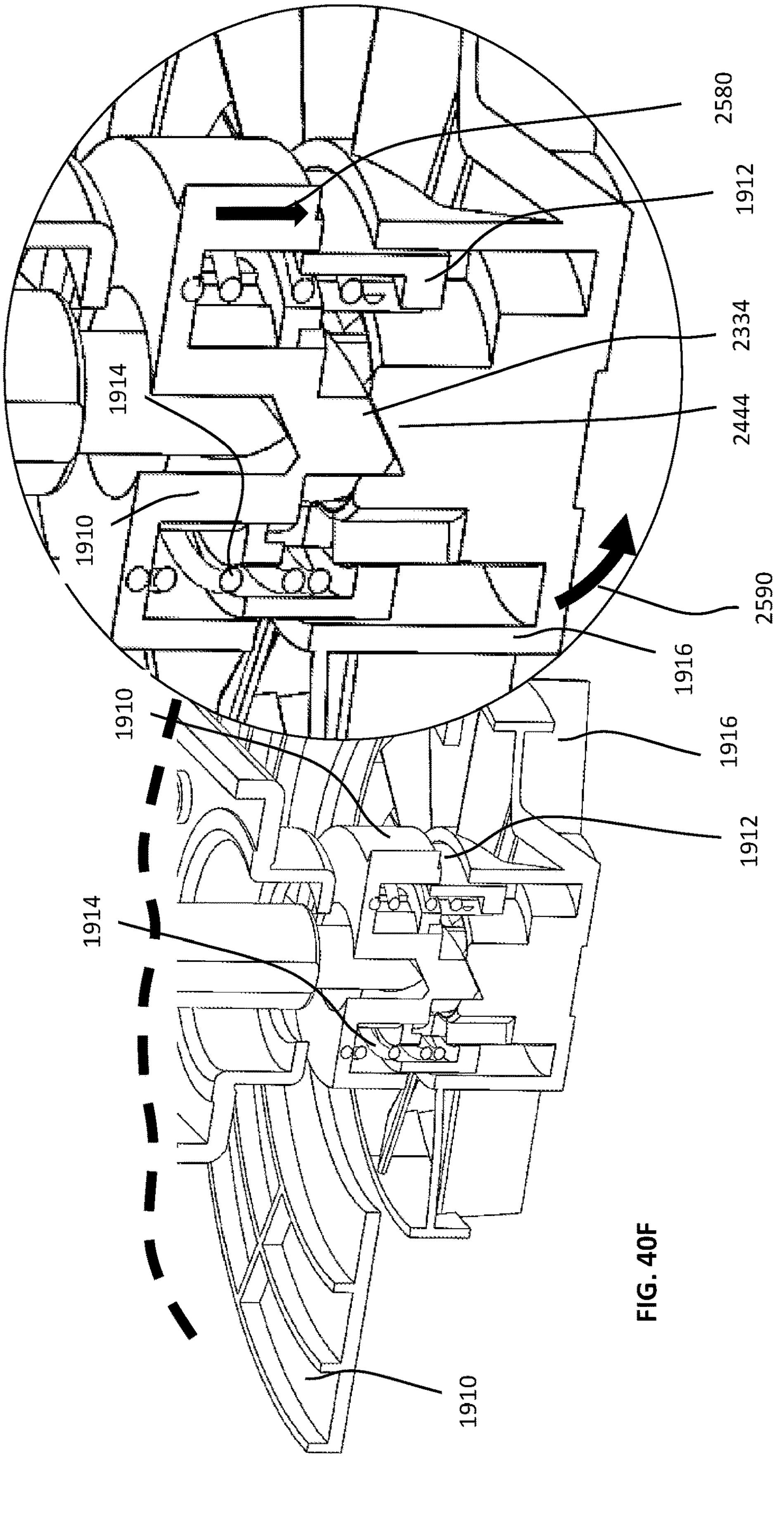

FIG. 40F shows an operative orientation of axially displaceable rotary drive assembly 1530 in which the motor lifting element 1910 and the linear to rotary converting adaptor 1912 are shifted still further downward relative to linearly driven rotating ventilating element 1916, as indicated by an arrow 2580, and in which the relative rotational orientation of linear to rotary converting adaptor 1912 and linearly driven rotating ventilating element 1916 is changed, as indicated by an arrow 2590, such that inclined downward facing end surfaces 2356 of linear to rotary converting adaptor 1912 lie alongside corresponding inclined upward surfaces 2426 of linearly driven rotating ventilating element 1916 and no longer interfere with engagement of teeth 2334 of motor lifting element 1910 and teeth 2444 of linearly driven rotating ventilating element 1916.

Figure 40G:
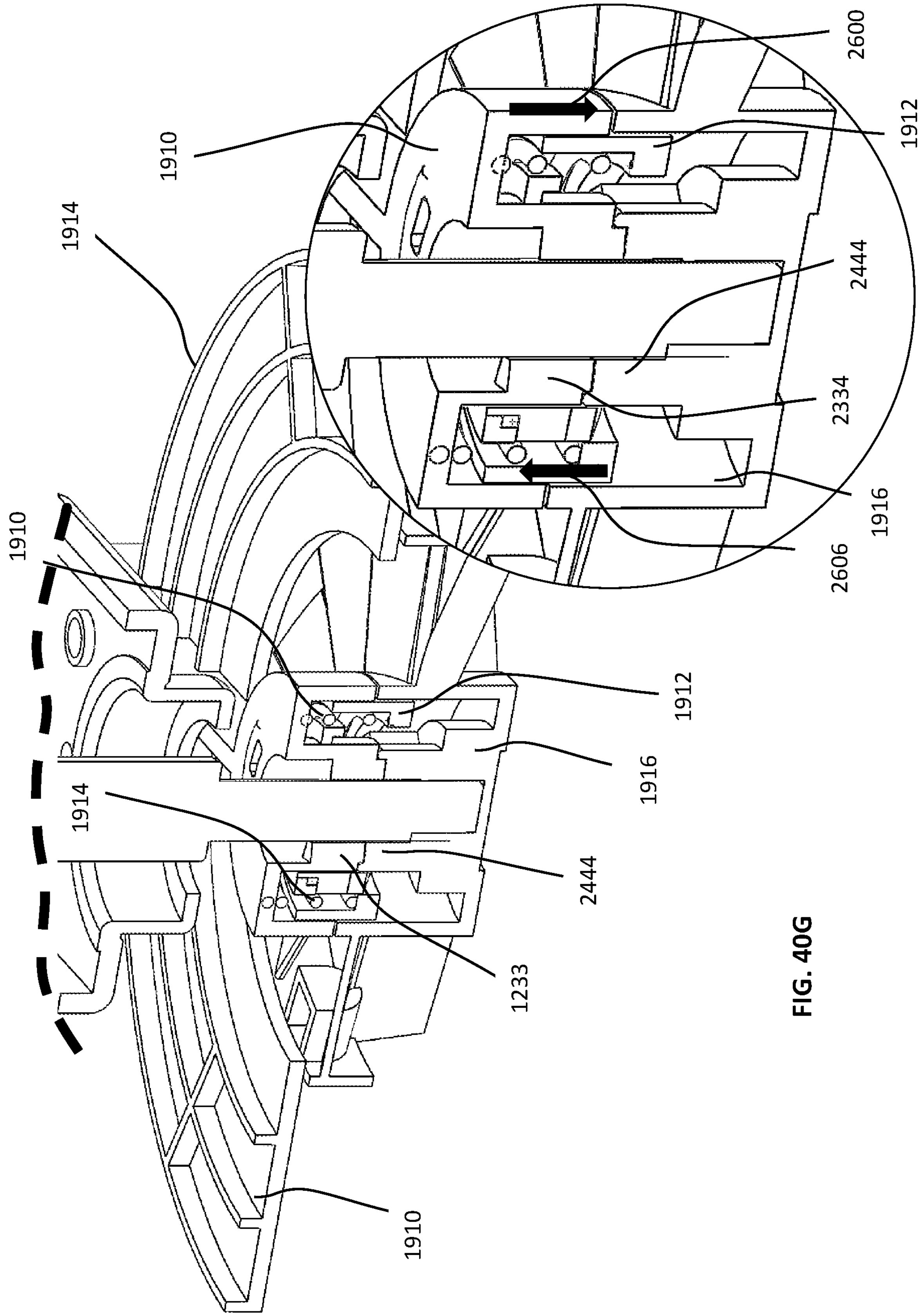

FIG. 40G shows an operative orientation of axially displaceable rotary drive assembly 1530 in which the motor lifting element 1910 is shifted still further downward relative to linearly driven rotating ventilating element 1916, as indicated by an arrow 2600, and teeth 2334 of motor lifting element 1910 drivingly engage teeth 2444 of linearly driven rotating ventilating element 1916. In this operative orientation, the linear to rotary converting adaptor 1912 is shifted upwardly, as indicated by an arrow 2602, against the urging of spring 1914.

Figure 19D:
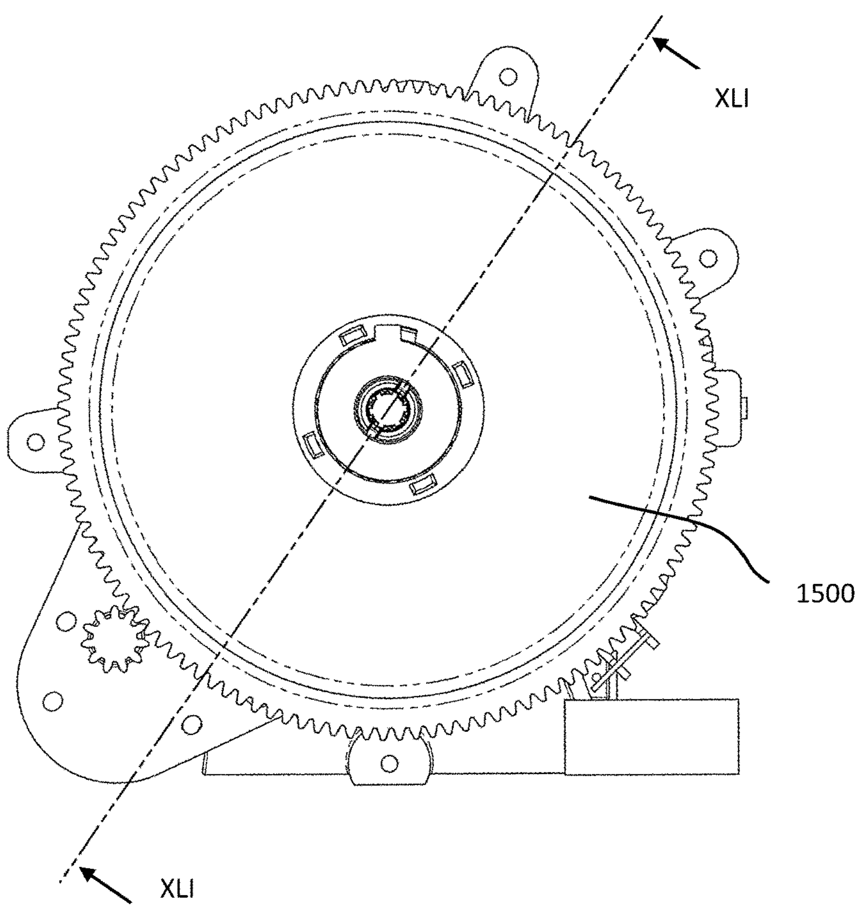
Figure 19E:
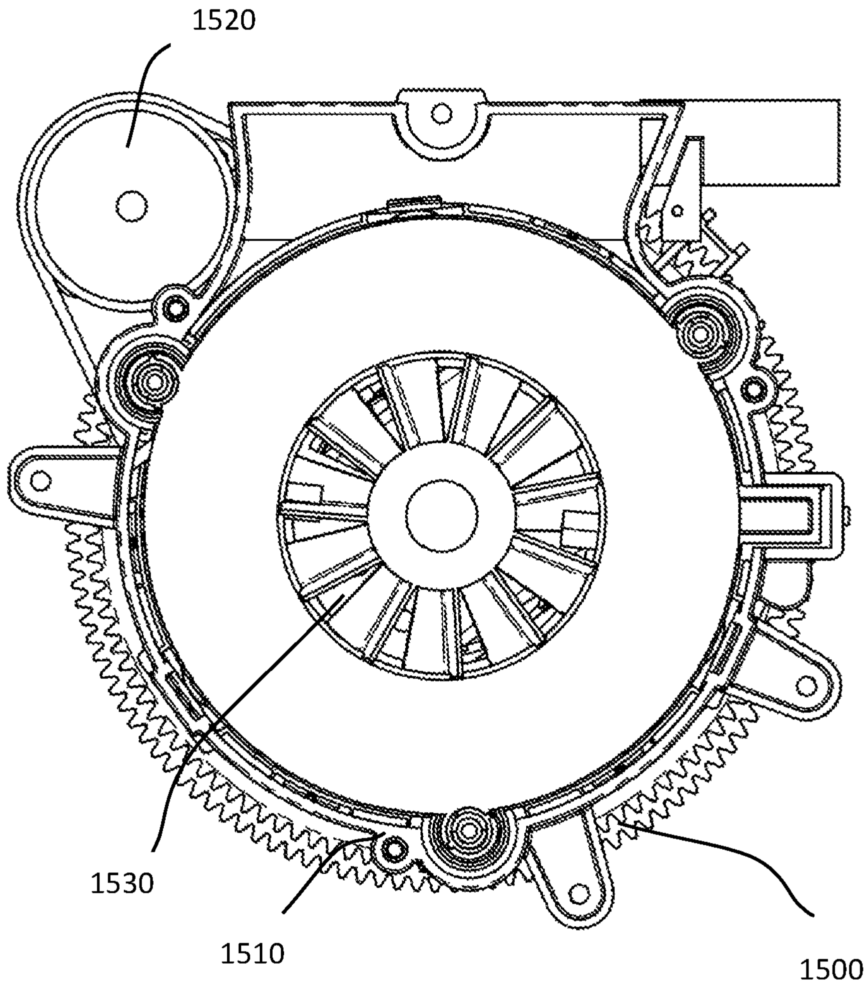
Figure 19F:
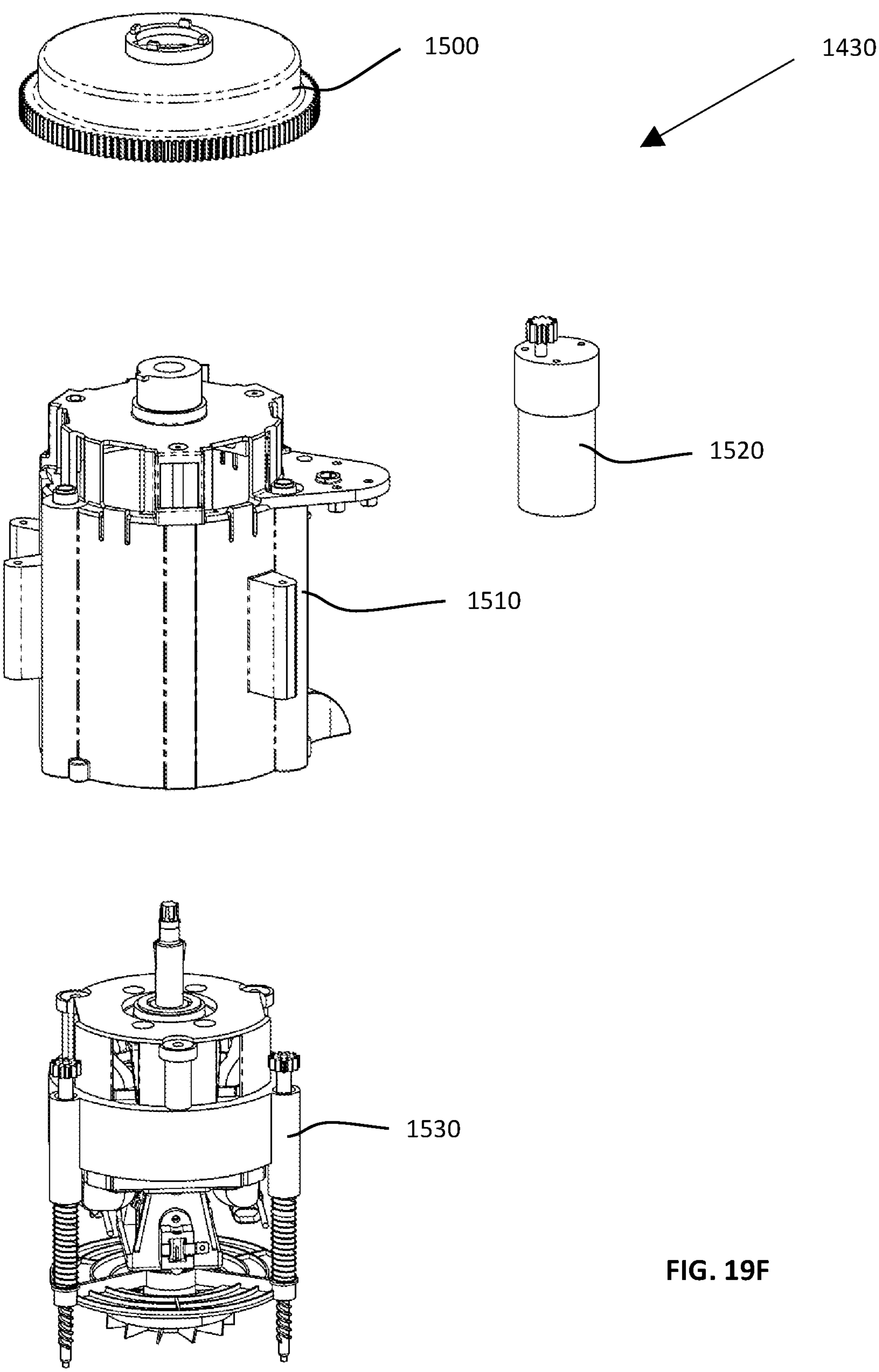
Figure 41A:
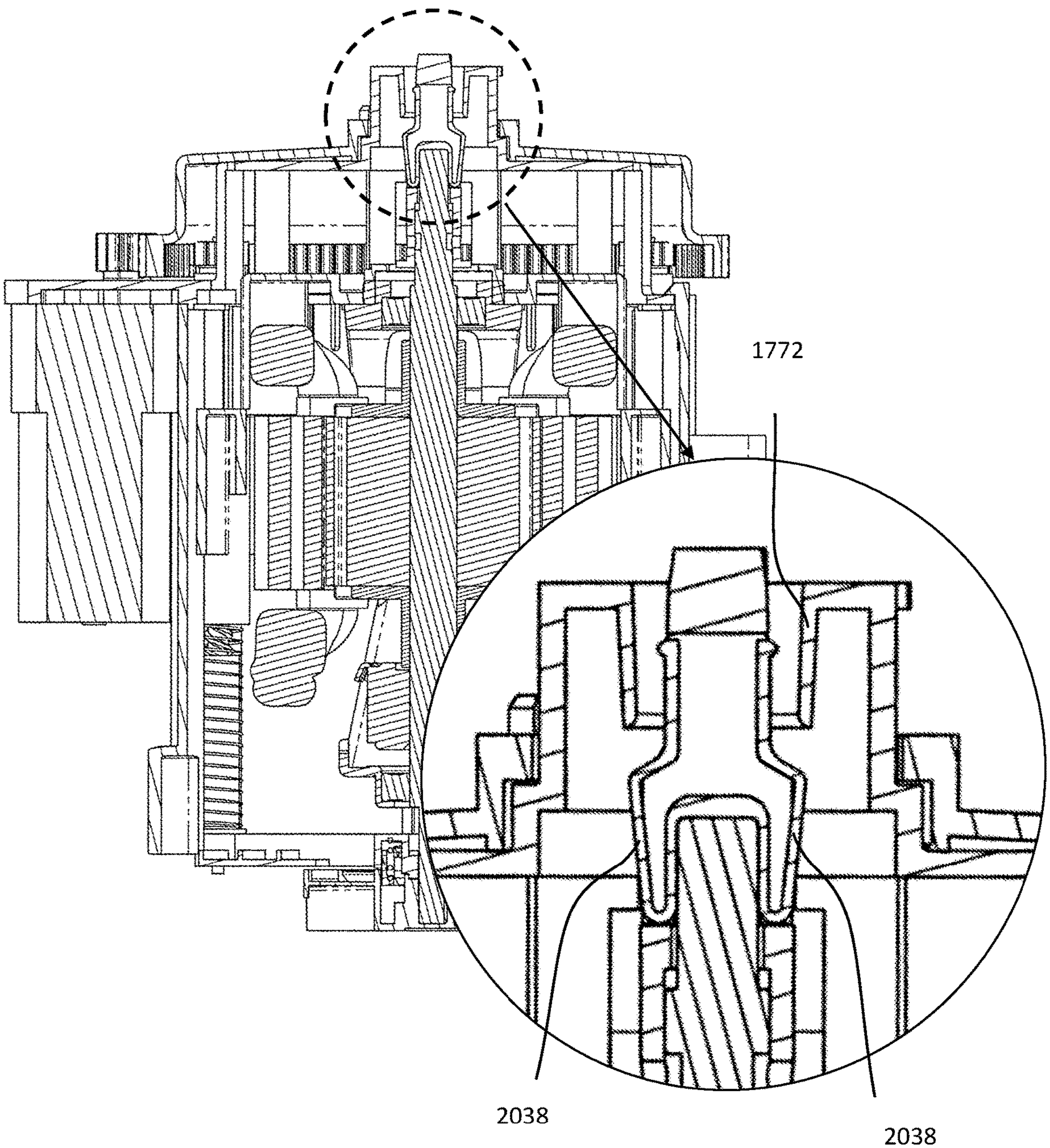
FIGS. 41A, 41B and 41C are sectional illustrations taken along section line XLI-XLI in FIG. 19D showing part of the vertically displacing rotary drive motor assembly in three operative orientations.
Figure 41B:
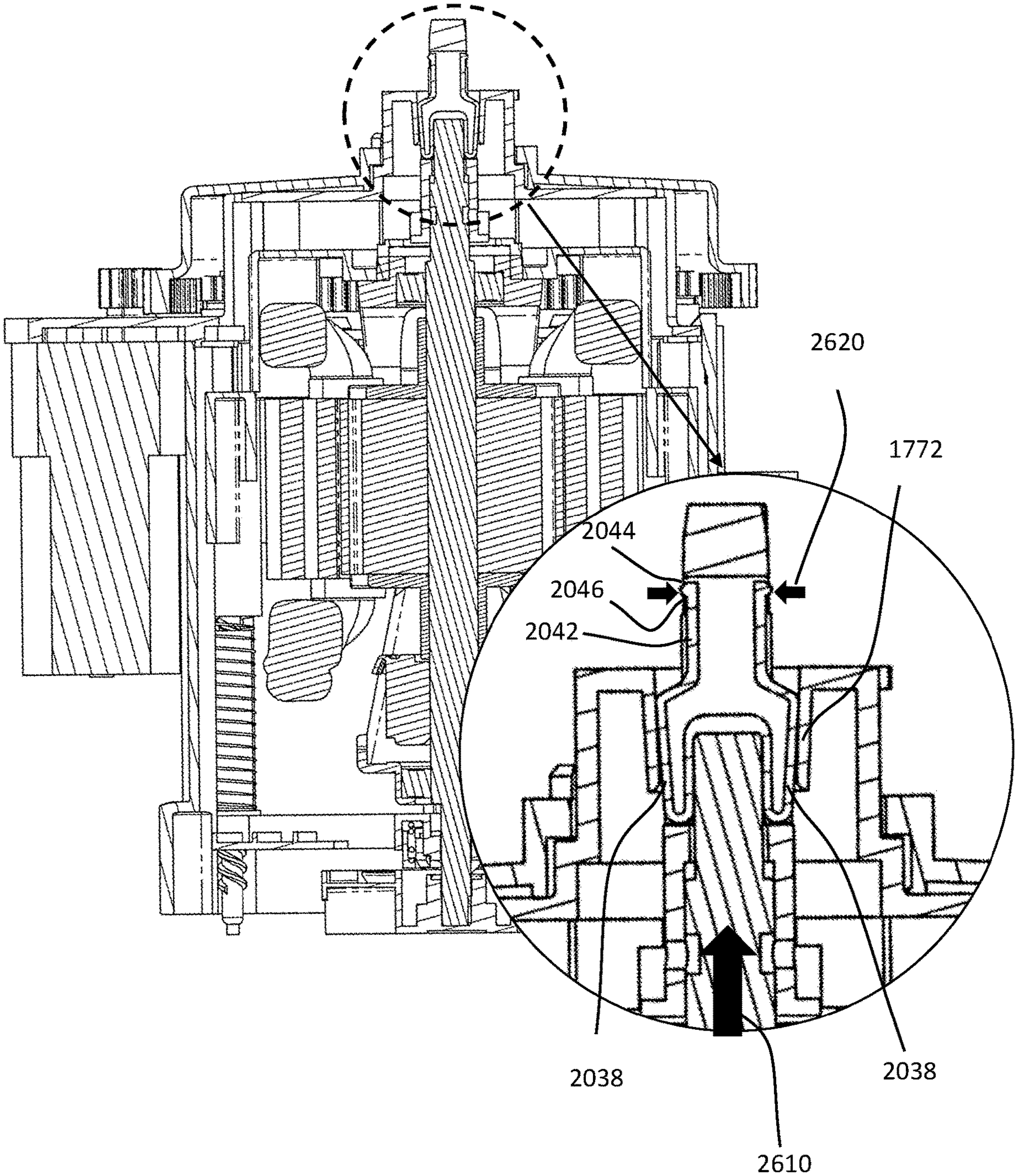
Figure 41C:
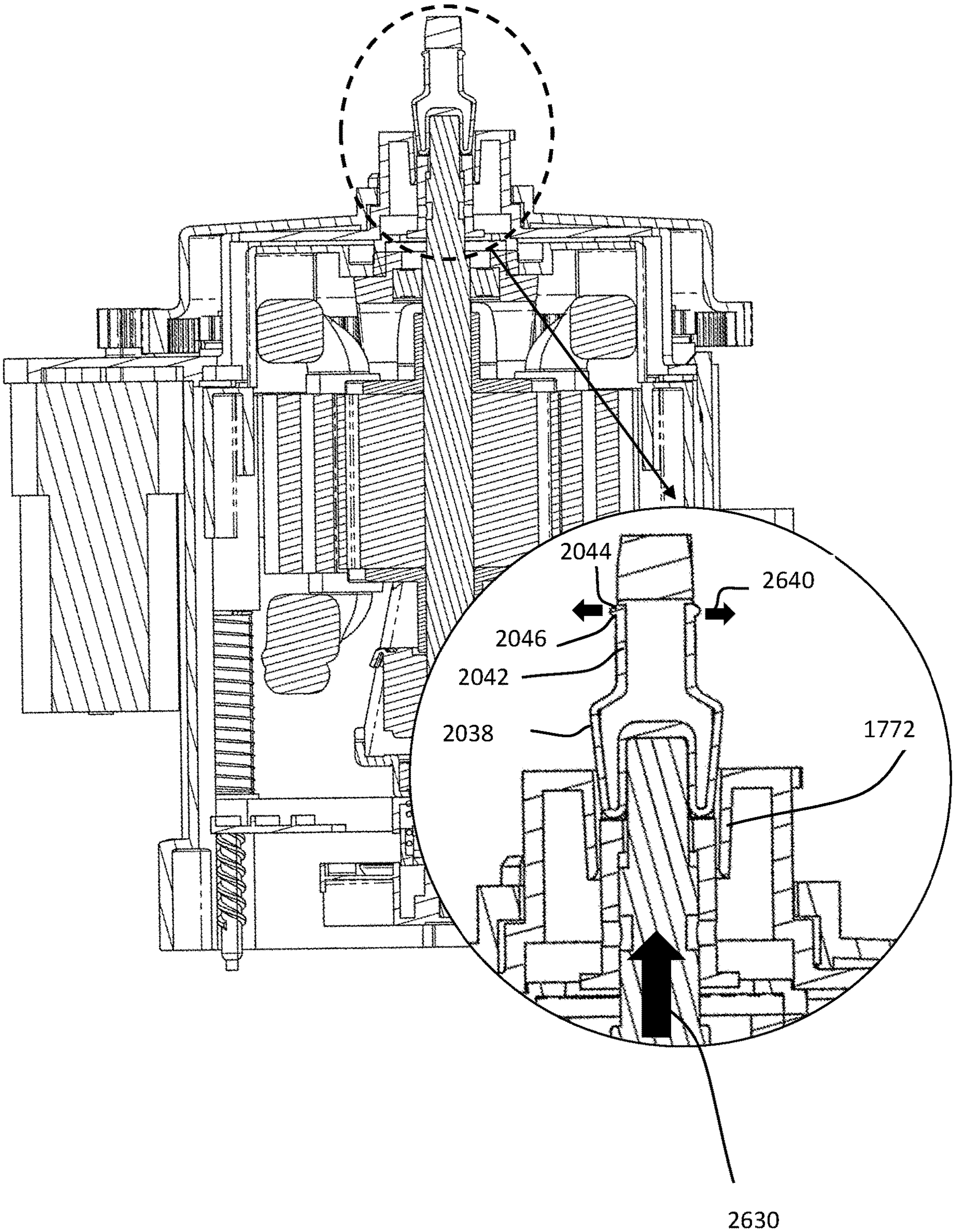

Reference is now made to FIGS. 41A, 41B and 41C, which are sectional illustrations taken along section line XLI-XLI in FIG. 19D showing part of the vertically displacing rotary drive motor assembly in three operative orientations.

FIG. 41A illustrates an additional aspect of the operative orientation indicated at I in FIGS. 38 and 39A and shows outer drive shaft locking engagement element 2002 in its lowest operative orientation at rest.

FIG. 41B shows upward vertical displacement of drive shaft locking engagement element 2002, as indicated by an arrow 2610, such that slightly outwardly tapered upwardly extending portions 2038 comes into engagement with an inner cylindrical surface of circumferential wall 1772 of top element 1650, thus forcing upstanding top portions 2042, each having at a top edge 2044 thereof an outwardly extending protrusion portion 2046, towards each other, as indicated by arrows 2620, into an operative orientation allowing the drive shaft assembly to be able to engage blade 160.

FIG. 41C shows further upward vertical displacement of drive shaft locking element 2002, as indicated by an arrow 2630, such that slightly outwardly tapered upwardly extending portions 2038 come out of engagement with the inner cylindrical surface of circumferential wall 1772 of top element 1650, thus enabling upstanding top portions 2042, each having at a top edge 2044 thereof an outwardly extending protrusion portion 2046, to spring back away from each other, as indicated by arrows 2640, into an operative orientation wherein the drive shaft assembly 1900 is linearly locked to blade 160 against vertical separation thereof.

Figure 42A:
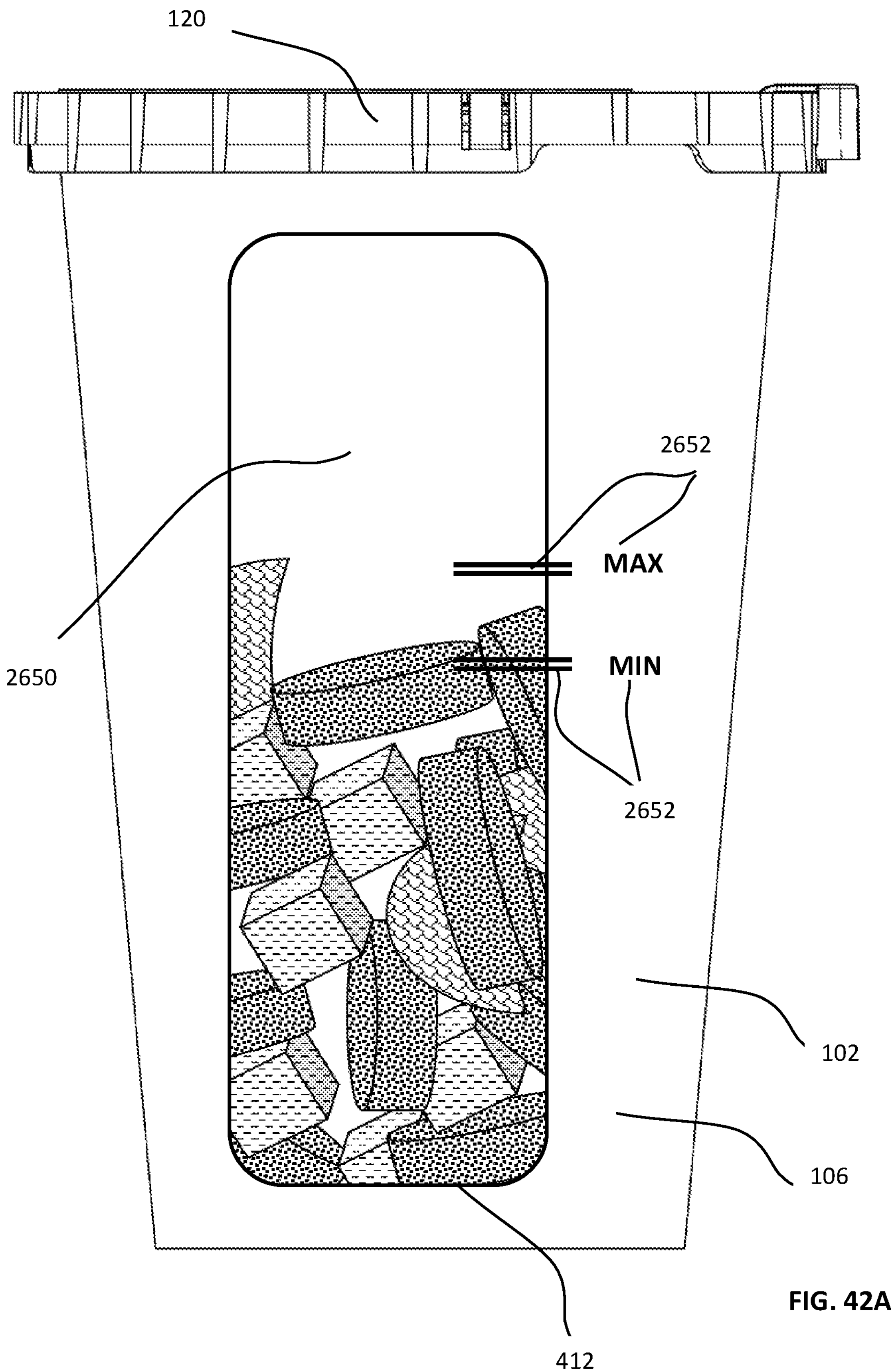
FIGS. 42A and 42B are simplified respective planar side and central cross-sectional illustrations of the SUPCA of FIGS. 1A-9B filled with a frozen food product.
Figure 42B:
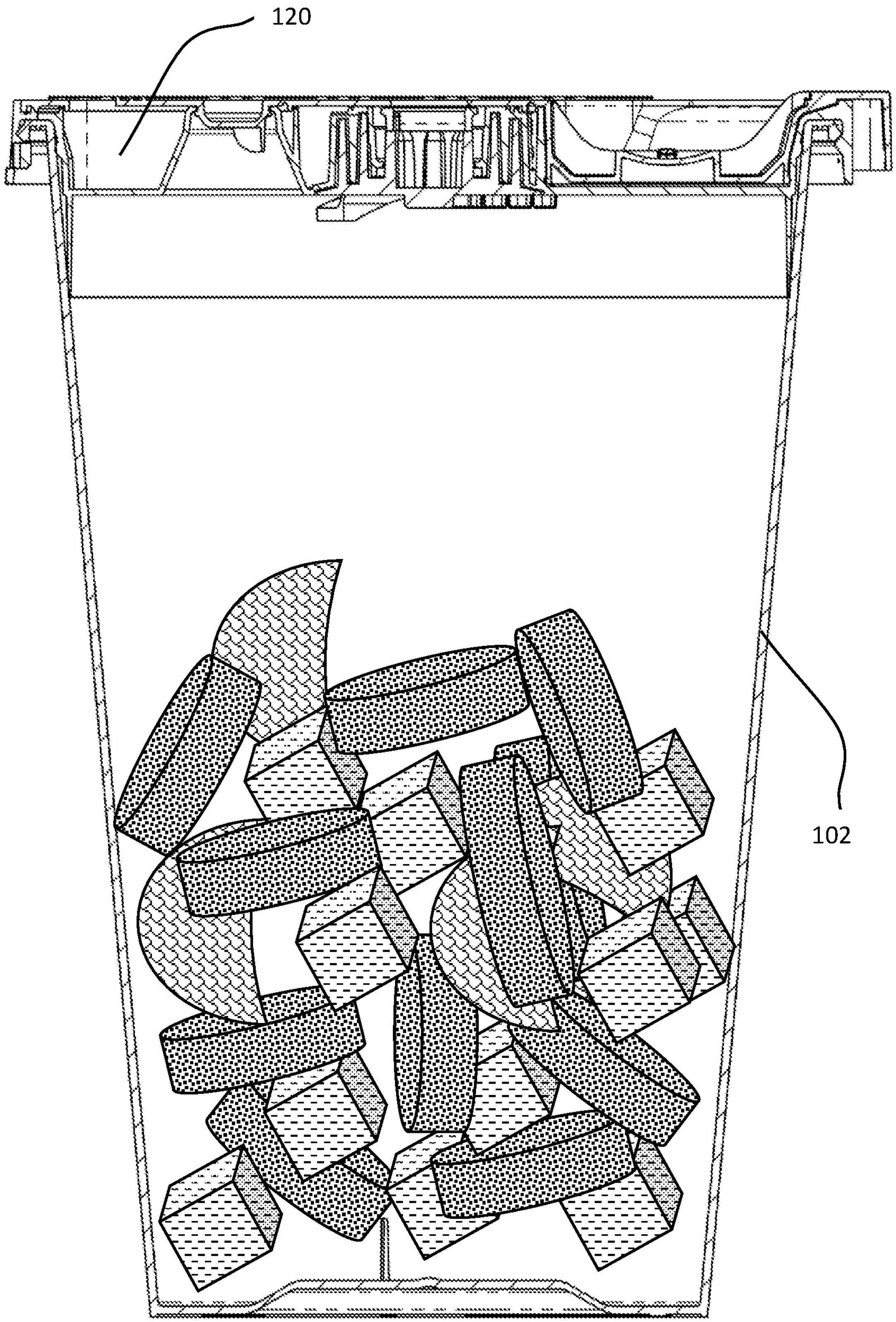
Figure 43A:
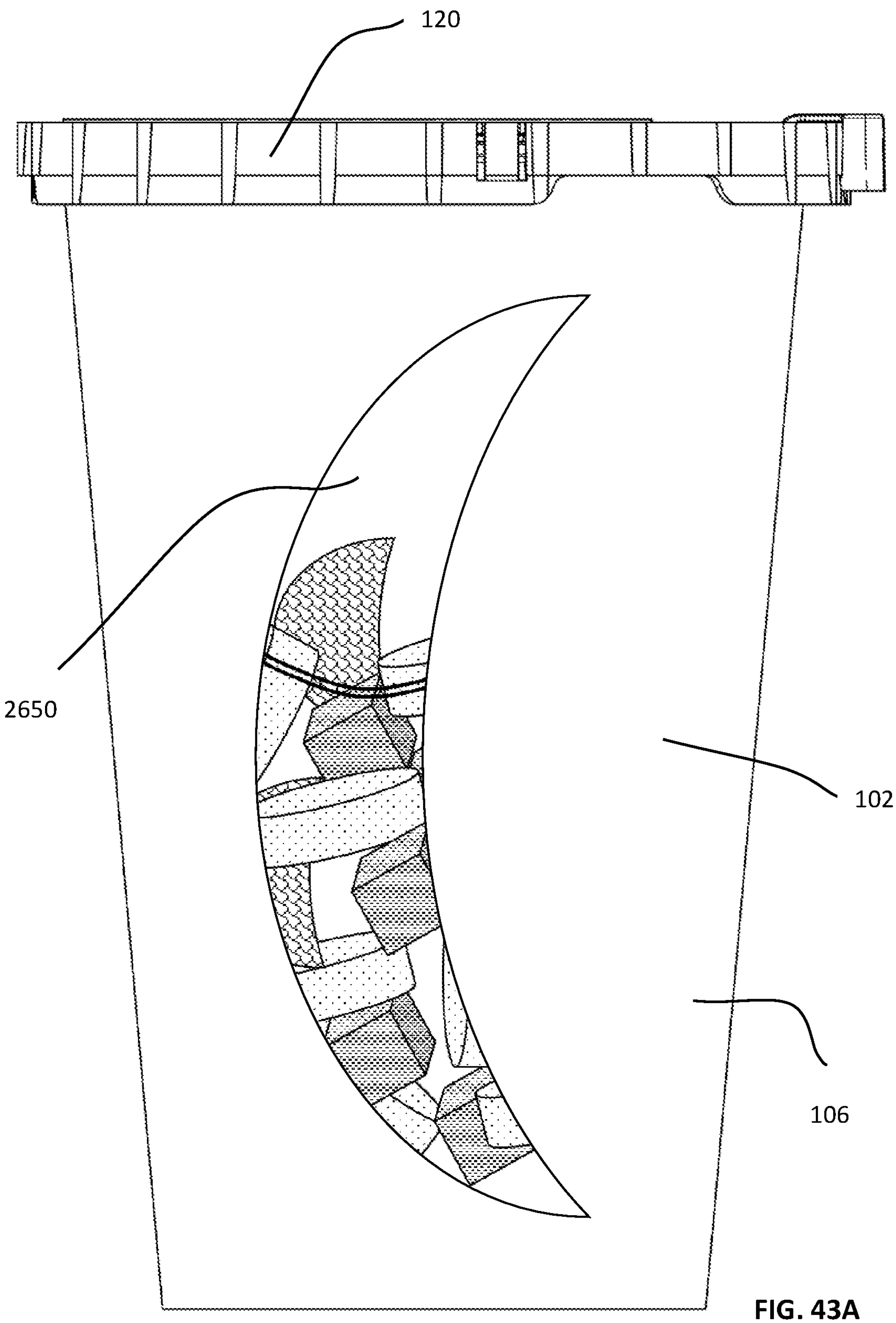
FIGS. 43A and 43B are respective simplified planar side and central cross-sectional illustrations of the SUPCA of FIGS. 1A-9B filled with a non-frozen food product.
Figure 43B:
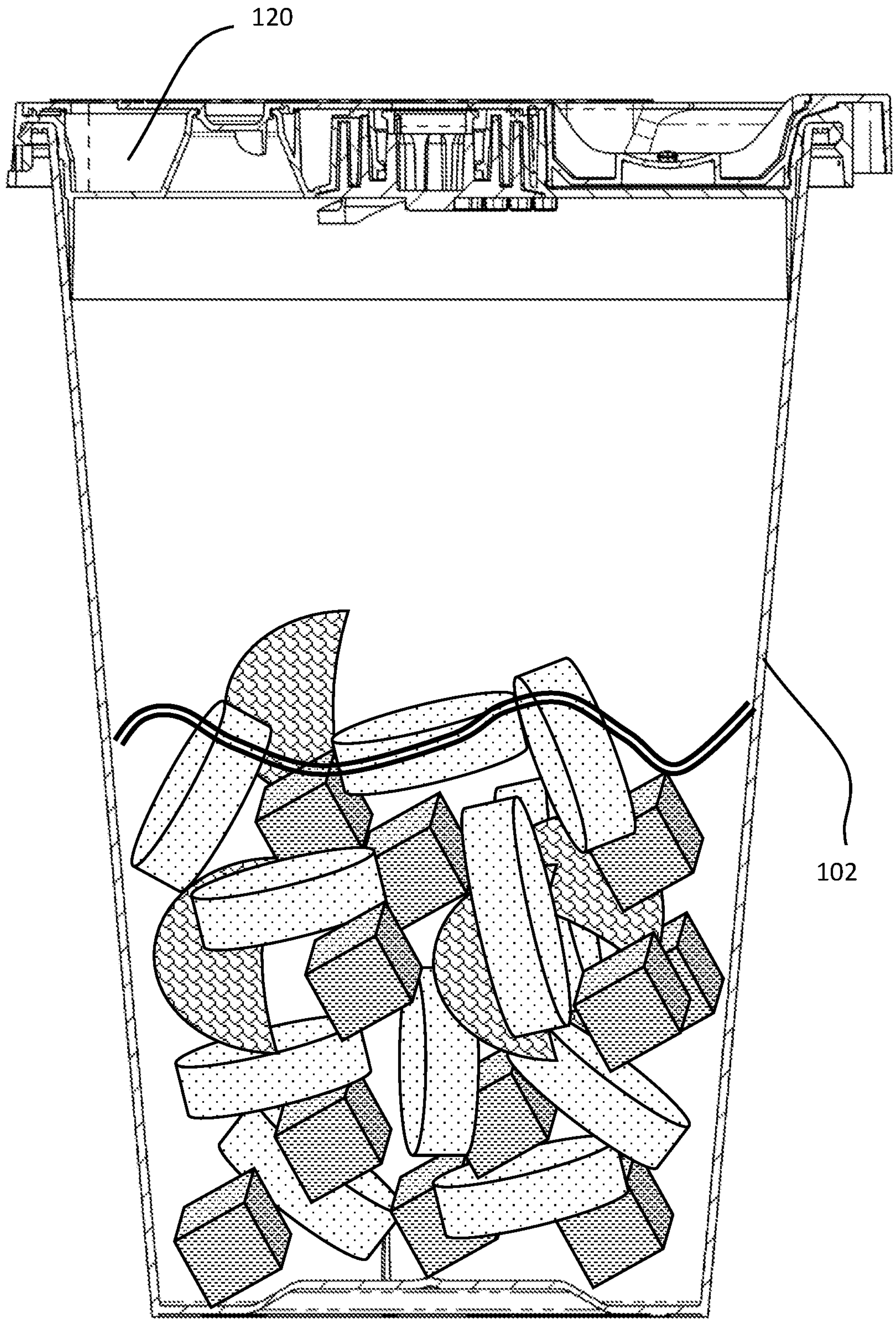

Reference is now made to FIGS. 42A and 42B, which are simplified respective planar side and central cross-sectional illustrations of the SUPCA 100 of FIGS. 1A-9B filled with a frozen food product, and to FIGS. 43A and 43B, which are respective simplified planar side and central cross-sectional illustrations of the SUPCA 100 of FIGS. 1A-9B filled with a non-frozen food product. The description that follows relates to use of the SUPCA 100 and the MMIDD 1000 with a food product, it being appreciated that SUPCA 100 and MMIDD 1000 are not limited to applications to food products although use thereof with food products is a preferred use.

As seen in FIGS. 42A & 42B, preferably the single-use container body 102 includes on wall 106 thereof a transparent or translucent window 2650, which enables a food product contained therein and a liquid level to be seen. As seen in FIG. 42A, the container body 102 preferably includes markings 2652, preferably indicating minimum and maximum fill levels to be reached when adding liquid thereto. As seen in FIG. 43A, when the container body 102 includes a non-frozen food product, normally no liquid filling is required and no markings are provided. Alternatively, even in the case of FIG. 43A, when the container body 102 includes a non-frozen food product, additional liquid may be added and markings 2652, such as those in FIG. 42A, may be provided.

It is a particular feature of the present invention that normally, the SUPCA 100 is received by the user with SUCSERDREA 120 attached thereto and intact, such that tabs 214 are in the relatively radially inward orientation seen in enlargement A of FIG. 5A, indicating that SUCSERDREA 120 has not been disengaged from container body 102. Should SUCSERDREA 120 have been earlier disengaged from container body 102 or should SUPCA 100 have earlier been processed by MMIDD 1000, tabs 214 are in the relatively radially outward orientation seen in enlargement B of FIG. 5A, providing a visible and a machine sensible indication of prior use or tampering, which prevents subsequent processing thereof by MMIDD 1000.

Figure 44A:
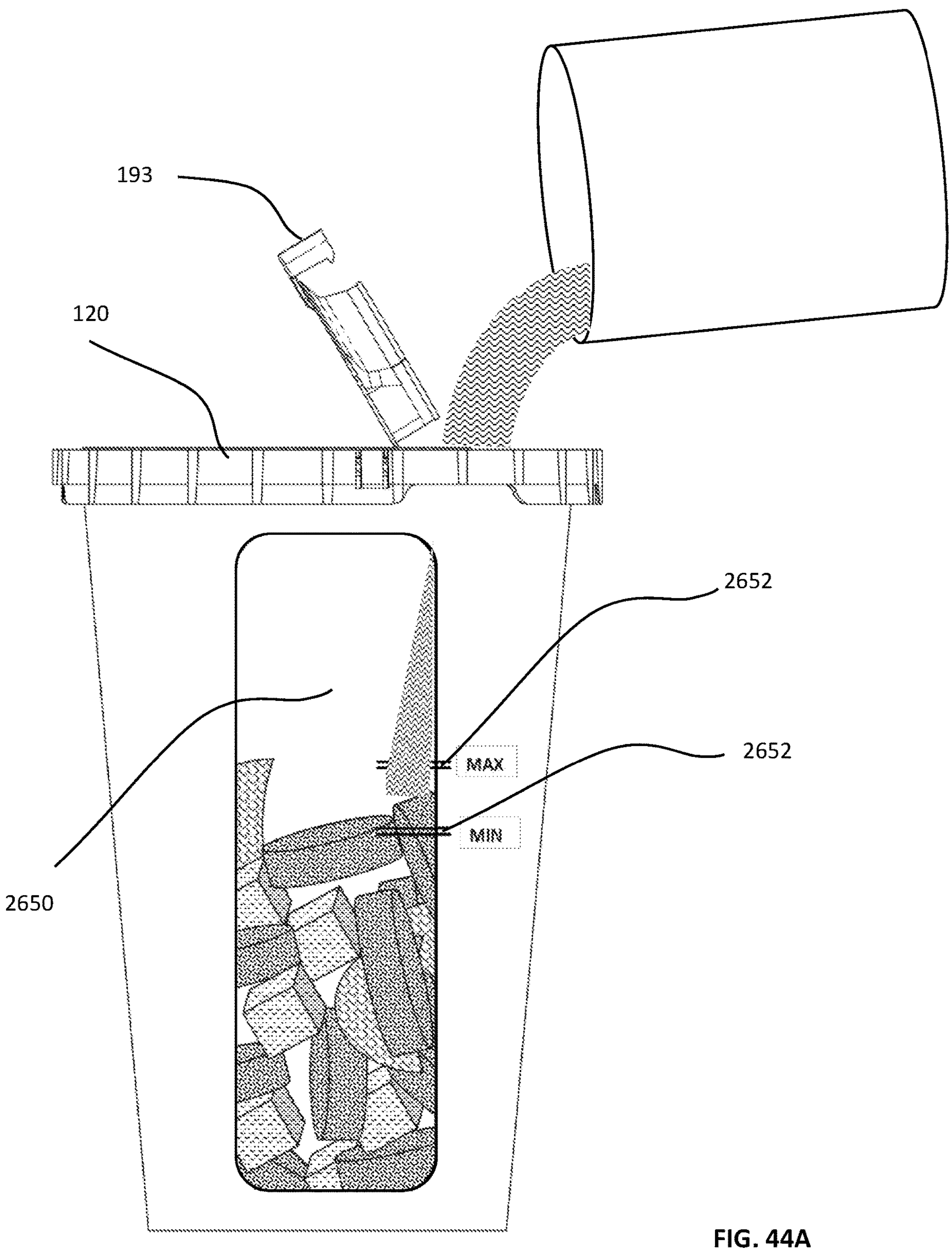
FIGS. 44A and 44B are simplified respective planar side and sectional illustrations of the SUPCA filled with a frozen food product of FIGS. 42A & 42B wherein liquid is being added to the frozen food product via a resealable opening in the SUCSERDREA of FIGS. 2A-3B.
Figure 44B:
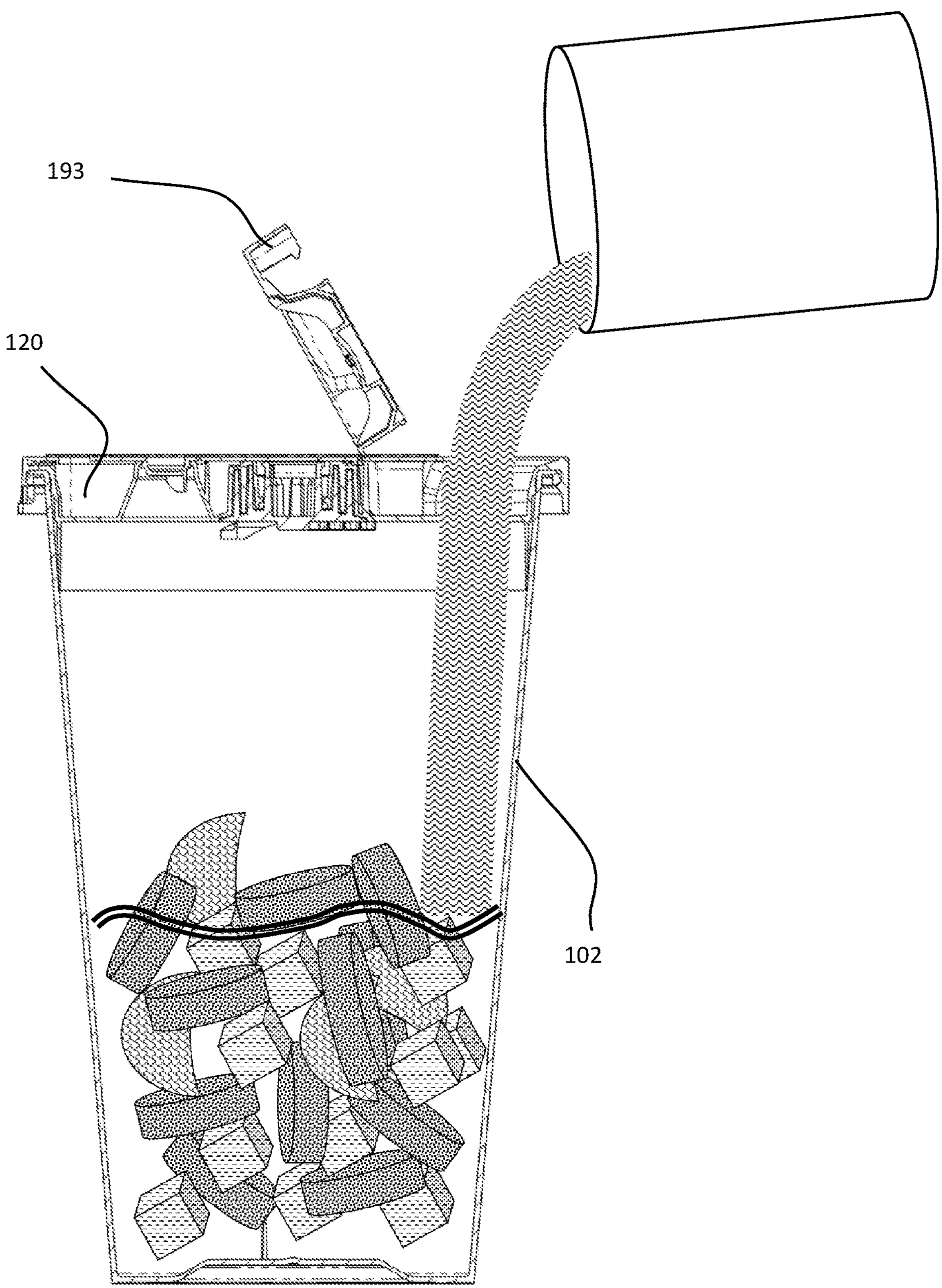

Reference is now made to FIGS. 44A and 44B, which are simplified respective planar side and sectional illustrations of the SUPCA 100 filled with a frozen food product of FIGS.

Figure 45A:
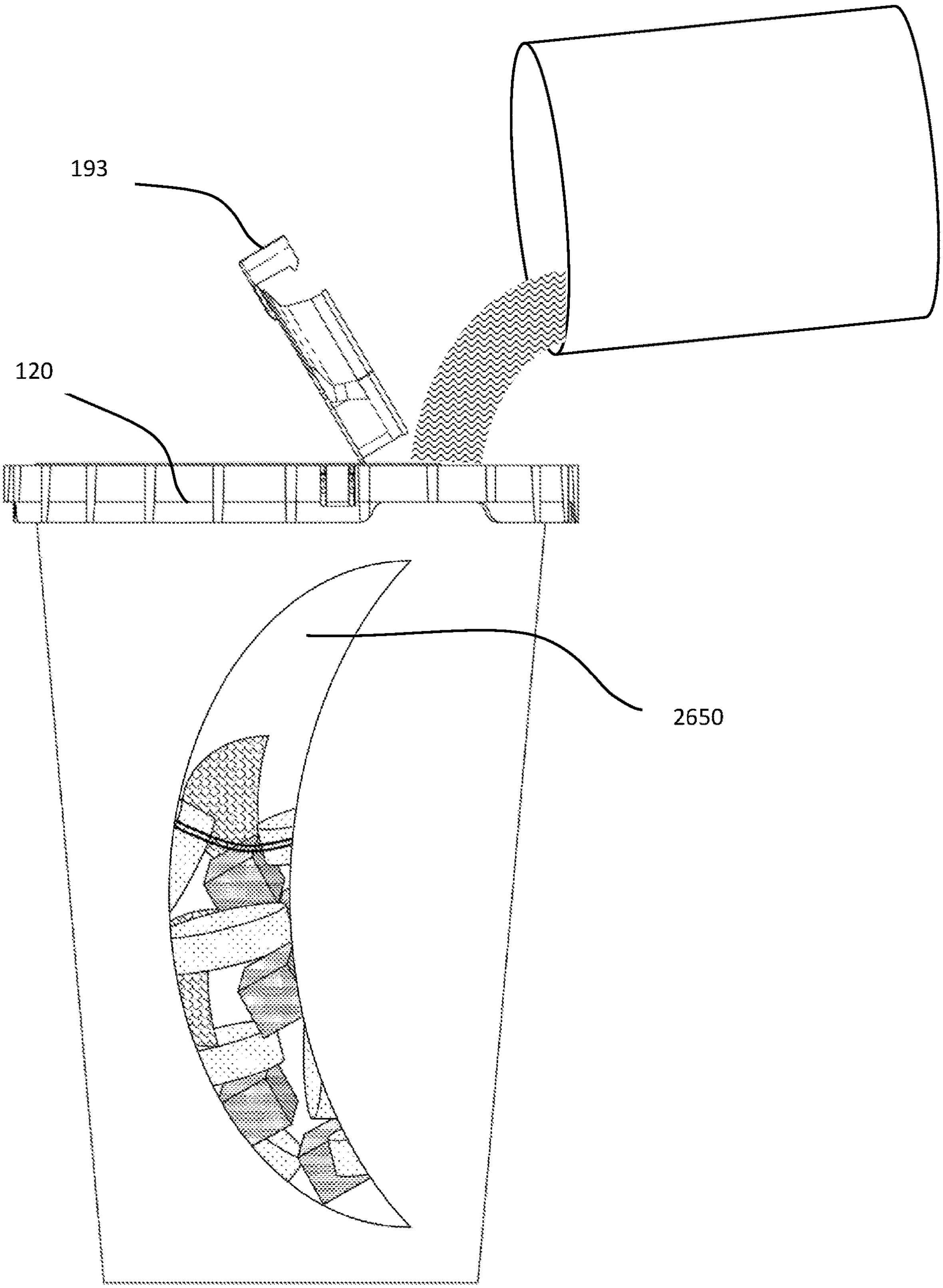
FIGS. 45A and 45B are simplified respective planar side and sectional illustrations of the SUPCA filled with a non-frozen food product of FIGS. 43A & 43B wherein liquid is being added to the non-frozen food product via a resealable opening in the SUCSERDREA of FIGS. 2A-3B.
Figure 45B:
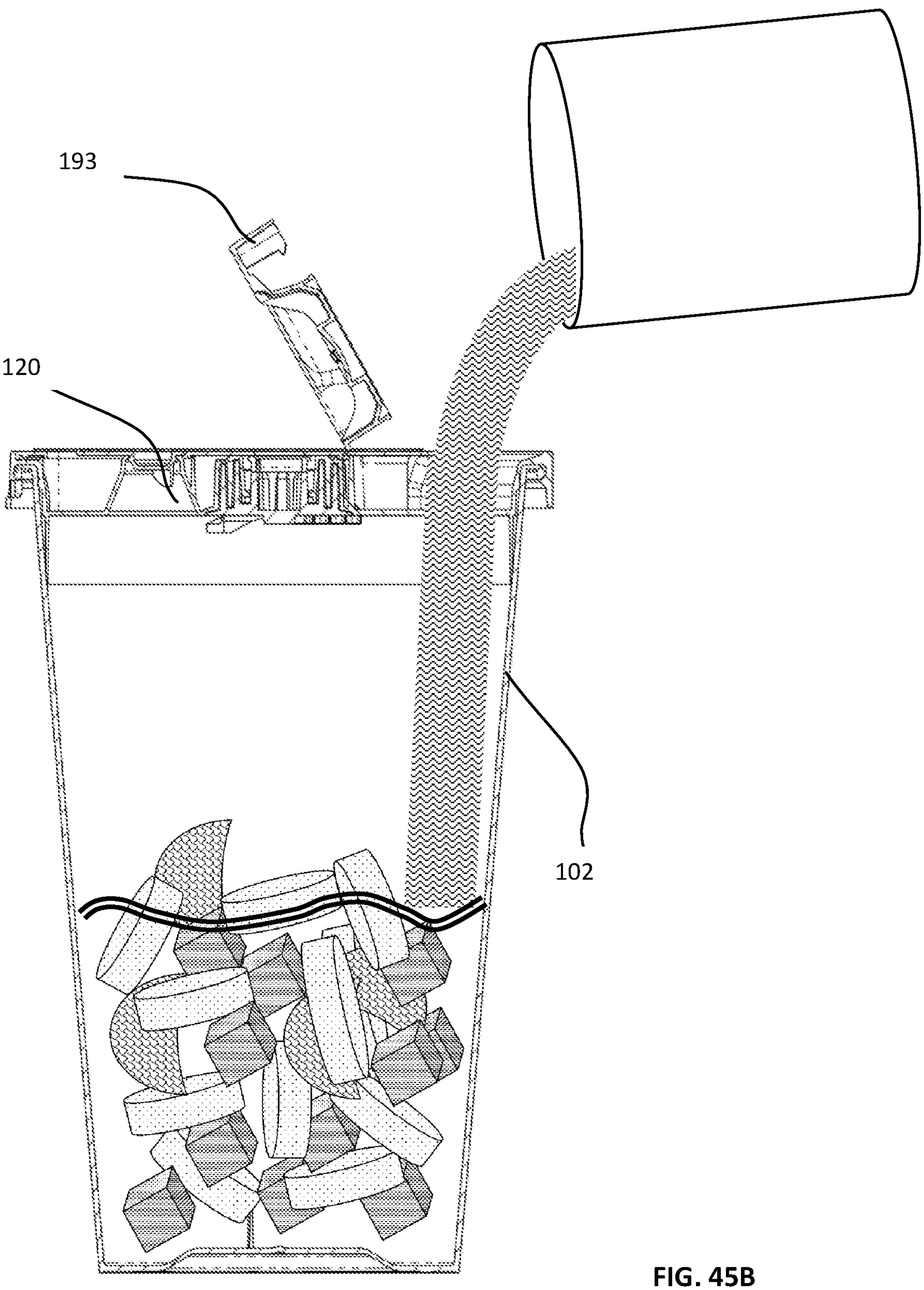

42A & 42B wherein liquid is being added to the frozen food product via a resealable opening in the SUCSERDREA 120 of FIGS. 2A-3B, and to FIGS. 45A and 45B, which are simplified respective planar side and sectional illustrations of the SUPCA 100 filled with a non-frozen food product of FIGS. 43A & 43B wherein liquid is being added to the non-frozen food product via a liquid ingress opening 242 in the SUCSERDREA 120 of FIGS. 2A-3B As seen in FIGS. 44A-45B, liquid is being added to the food product contained in SUPCA 100 via pivotably openable liquid ingress opening cover 193, in cover 130.

Figure 46A:
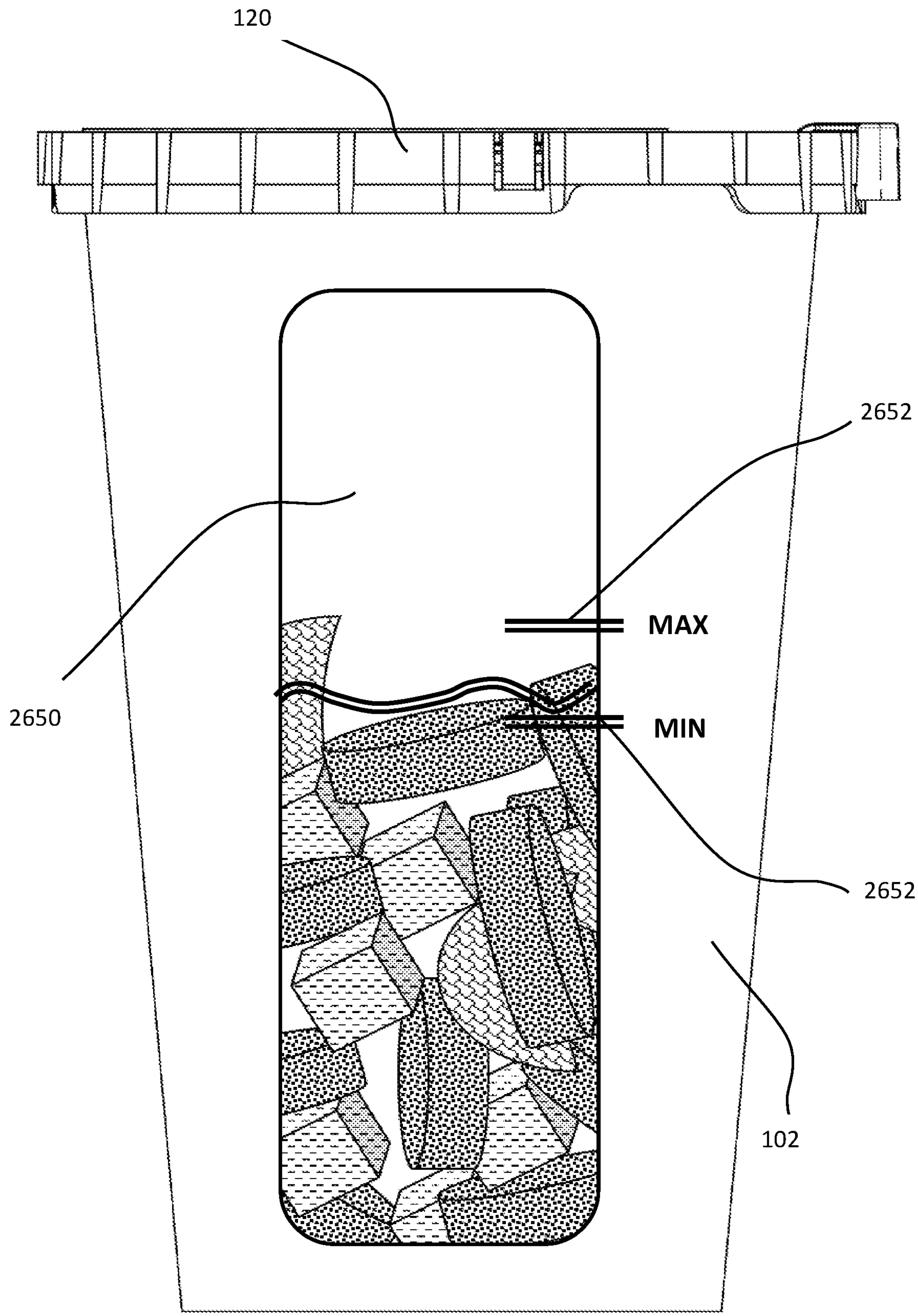
FIGS. 46A and 46B are simplified respective planar side and sectional illustrations of the SUPCA filled with a frozen or non-frozen food product as well as liquid, ready for processing by the MMIDD of FIGS. 10A-41C.
Figure 46B:
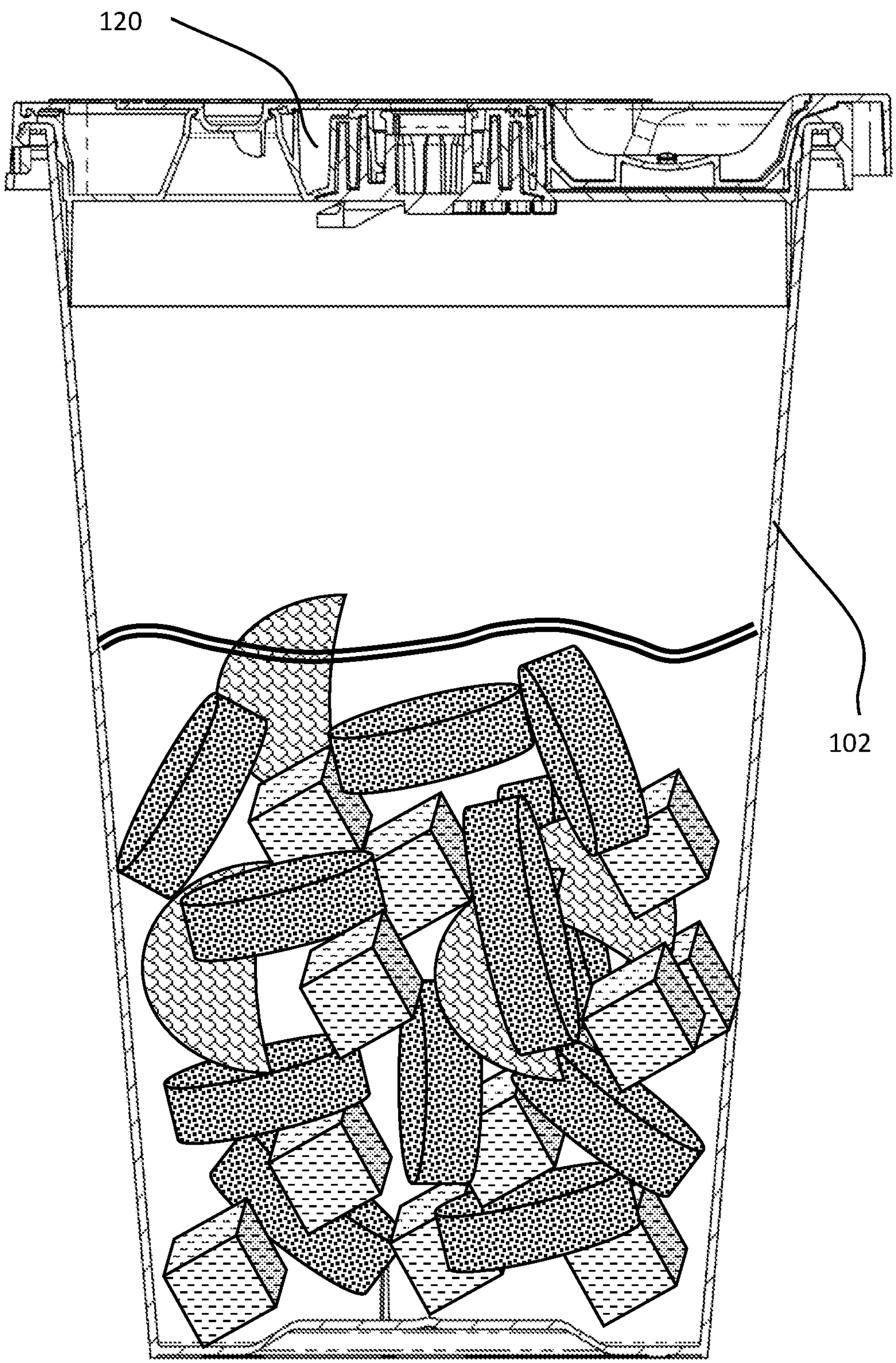

Reference is now made to FIGS. 46A and 46B, which are simplified respective planar side and sectional illustrations of SUPCA 100 filled with a frozen or non-frozen food product as well as liquid, ready for processing by the MMIDD 1000 of FIGS. 10A-41C.

As seen in FIGS. 46A & 46B, filled SUPCA 100 is in its upstanding orientation as shown in FIGS. 1A & 1B and liquid ingress opening cover 193 is closed and thereby tightly sealed.

Figure 47A:
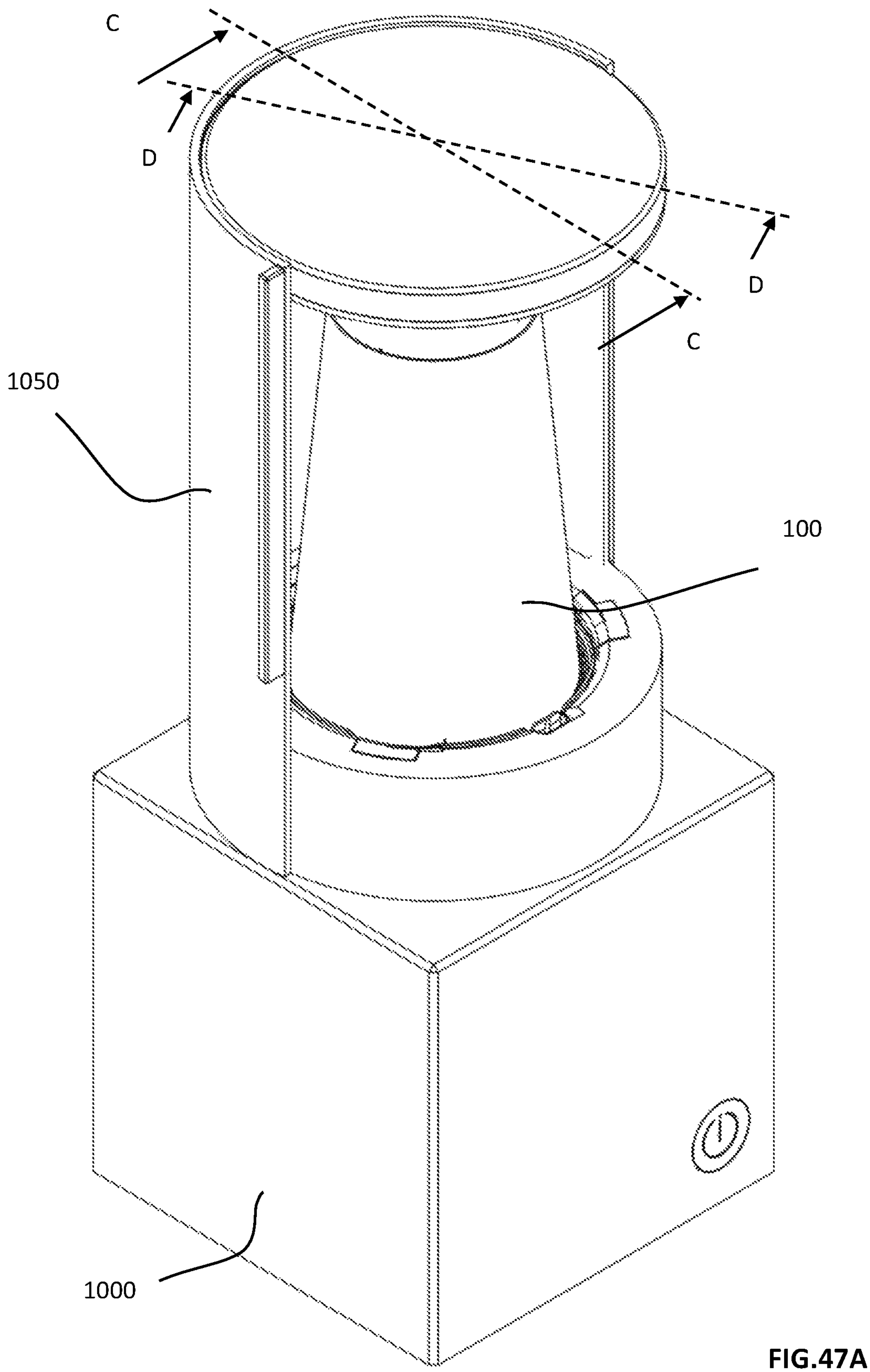
FIGS. 47A, 47B and 47C are simplified respective pictorial, planar side and sectional illustrations of the SUPCA of FIGS. 1A-9B, filled with a food product (not shown) in an upside-down unclamped orientation in typical initial operative engagement with the MMIDD with the door open, FIG. 47C being taken along lines C-C in FIG. 47A.
Figure 47B:
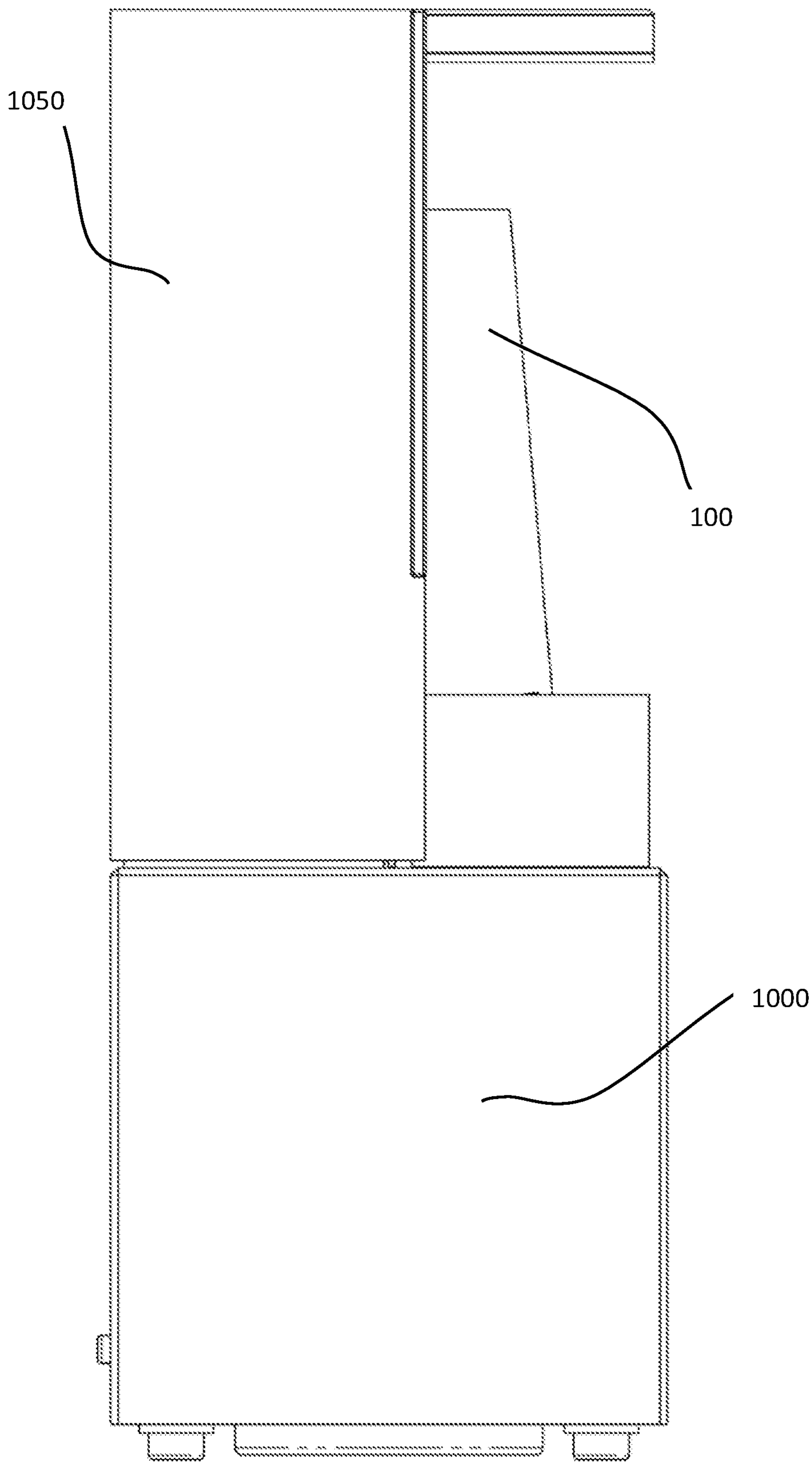
Figure 47C:
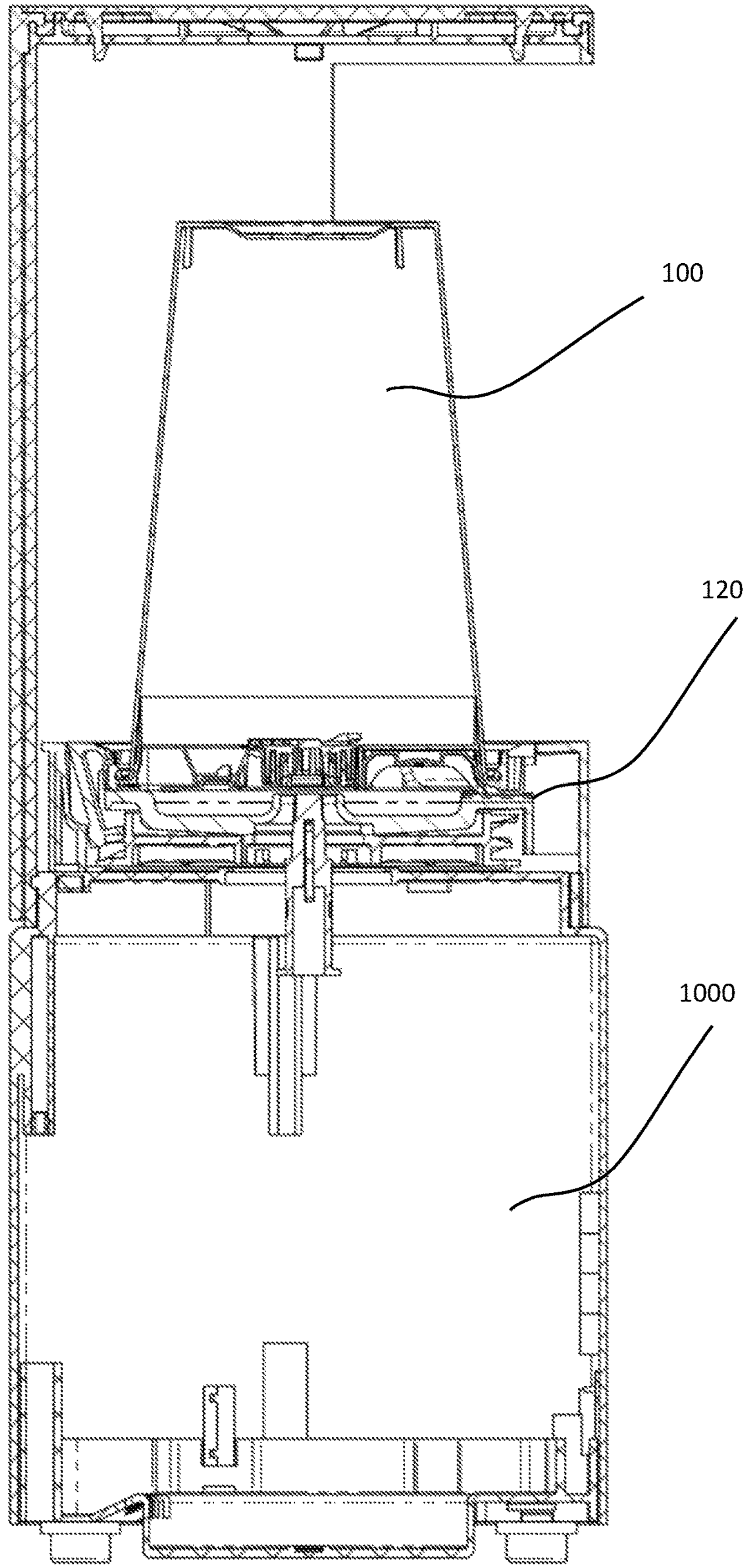

Reference is now made to FIGS. 47A, 47B and 47C, which are simplified respective pictorial, planar side and sectional illustrations of SUPCA 100 of FIGS. 1A-9B filled with a food product (not shown) in an upside-down unclamped orientation in typical initial operative engagement with MMIDD 1000 with the door assembly 1050 in an open operative orientation. It is seen that SUCSERDREA 120 is supported on annular planar container support surface 1210 and centered thereon by tapered wall 1240 of support element 1100. A predetermined azimuthal orientation of SUPCA 100 on MMIDD 1000 is achieved by insertion of finger engagement portion 196 of cover 193 forming part of SUCSERDREA 120, in SUPCA azimuthal locating channel 1250 of support element 1100. The various elements of the MMIDD 1000 are in their respective rest positions as shown at I in FIG. 38 and in FIG. 39A.

Figure 48A:
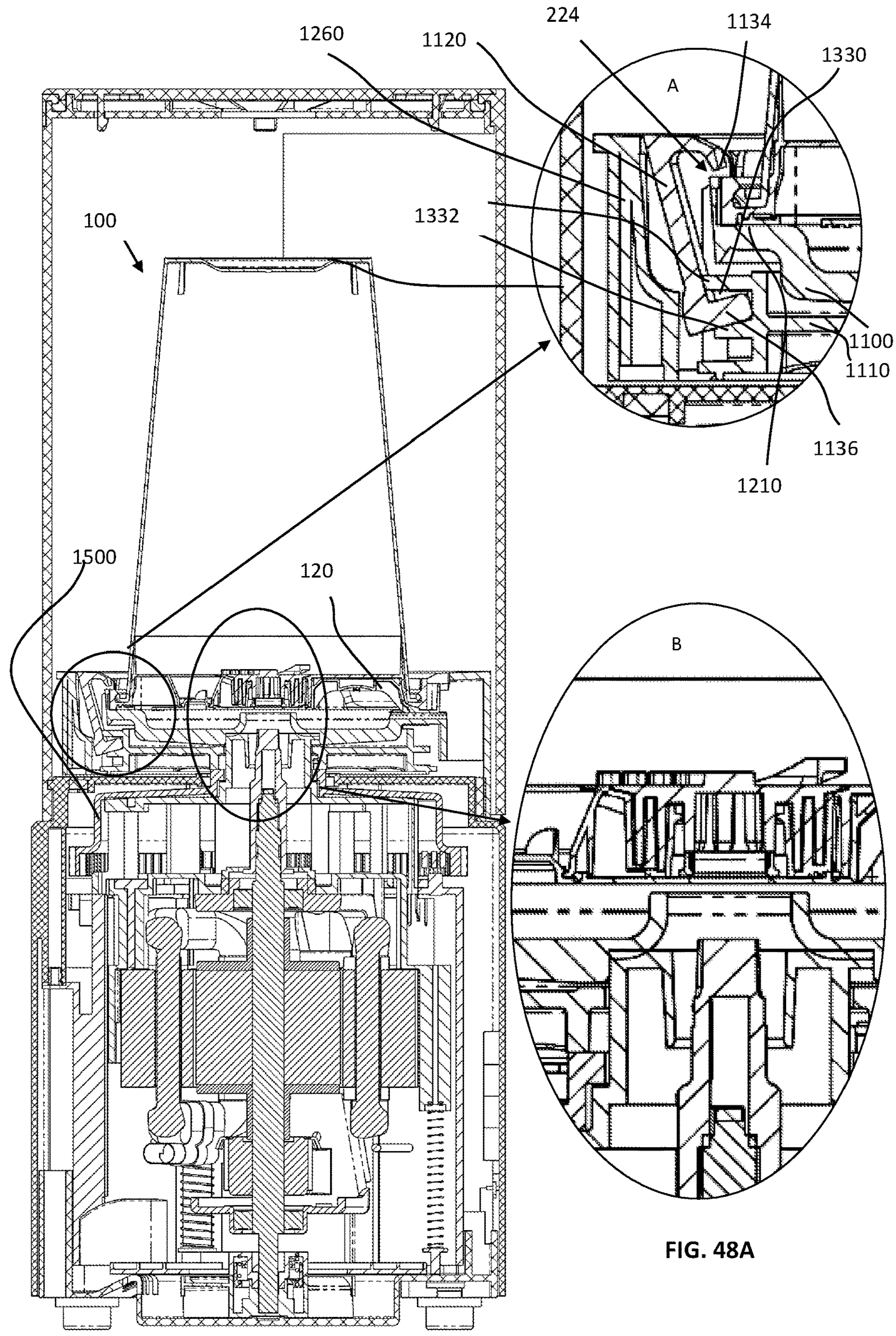
FIGS. 48A and 48B are simplified first and second sectional illustrations of the SUPCA of FIGS. 47A-47C in an upside-down unclamped orientation in operative engagement with the MMIDD with the door closed, FIGS. 48A and 48B being taken along respective lines C-C and D-D in FIG. 47A.
Figure 48B:
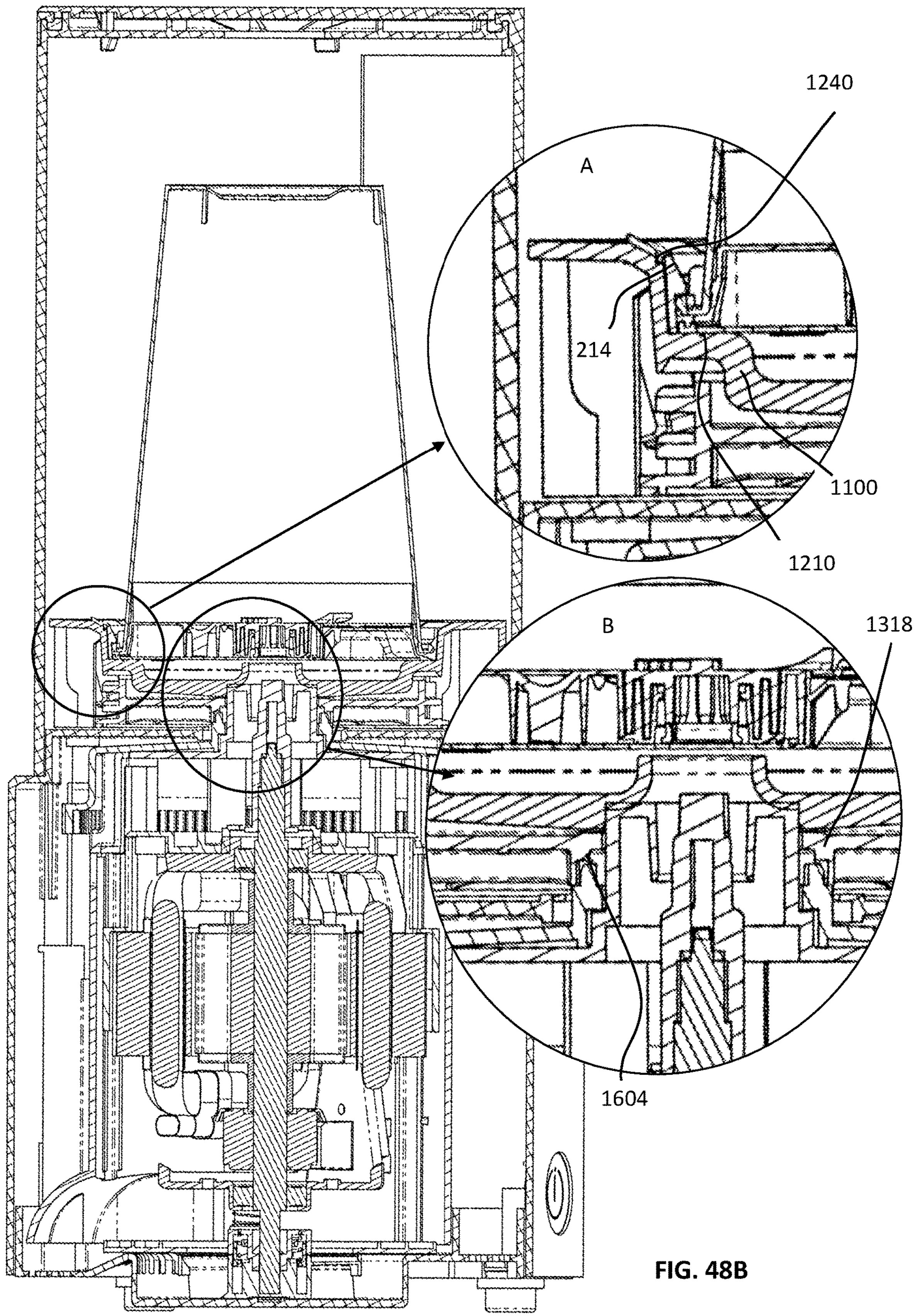

Reference is now made to FIGS. 48A-48B, which are simplified respective first and second sectional illustrations of SUPCA 100 of FIGS. 47A-47C in an upside-down unclamped orientation in operative engagement with MMIDD 1000 with the door assembly 1050 in a closed operative orientation, prior to operation of the MMIDD 1000.

As seen particularly clearly in an enlargement B in FIG. 48B, protrusions 1604 on rotary drive gear 1500 are seated in notches 1318 of cam element 1110 in order to transfer rotational motion of rotary drive gear 1500 to cam element 1110. The various elements of the MMIDD 1000 remain in their respective rest positions as shown at I in FIG. 38 and in FIG. 39A.

As seen particularly clearly in an enlargement A in FIG. 48A, clamp elements 1120 are in a retracted operative orientation, each clamp being arranged with respect to cam element 1110 whereby a cam engagement protrusion 1136 thereof lies at a first location 1334 of a corresponding cam channel 1330, whereby the radial extent of the upper circumferential wall 1332 defining the cam channel 1330 is at a maximum, forcing the clamp element 1120 located in the cam channel 1330 at the first location 1134 radially outwardly in pocket 1260, as shown in enlargement A of FIG. 48A. This orientation of the clamp elements 1120 enables the SUCSERDREA 120 of SUPCA 100 to clear the clamp elements 1120 upon insertion of the SUPCA 100 into engagement with MMIDD 1000.

As seen in enlargement A of FIG. 48B, tabs 214 of SUCSERDREA 120, which has not been tampered with or previously processed by the MMIDD 1000, are intact and located as shown in enlargement A of FIG. 5A. In cases where SUCSERDREA 120 has either been tampered with or previously processed by the MMIDD 1000, the tabs 214 are in a radially outwardly extending operative orientation as seen in enlargement B of FIG. 5A and thus prevent the SUCSERDREA 120 from being able to seat on annular planar container support surface 1210 within tapered wall 1240 of support element 1100.

It is noted that when SUCSERDREA 120 is properly seated on support surface 1210 within tapered wall 1240 of support element 1100, as seen in enlargement A of FIG. 48A, recessed edges of SUCSERDREA 120 at cut outs 224 underlie edges 1134 of clamp elements 1120.

Figure 49A:
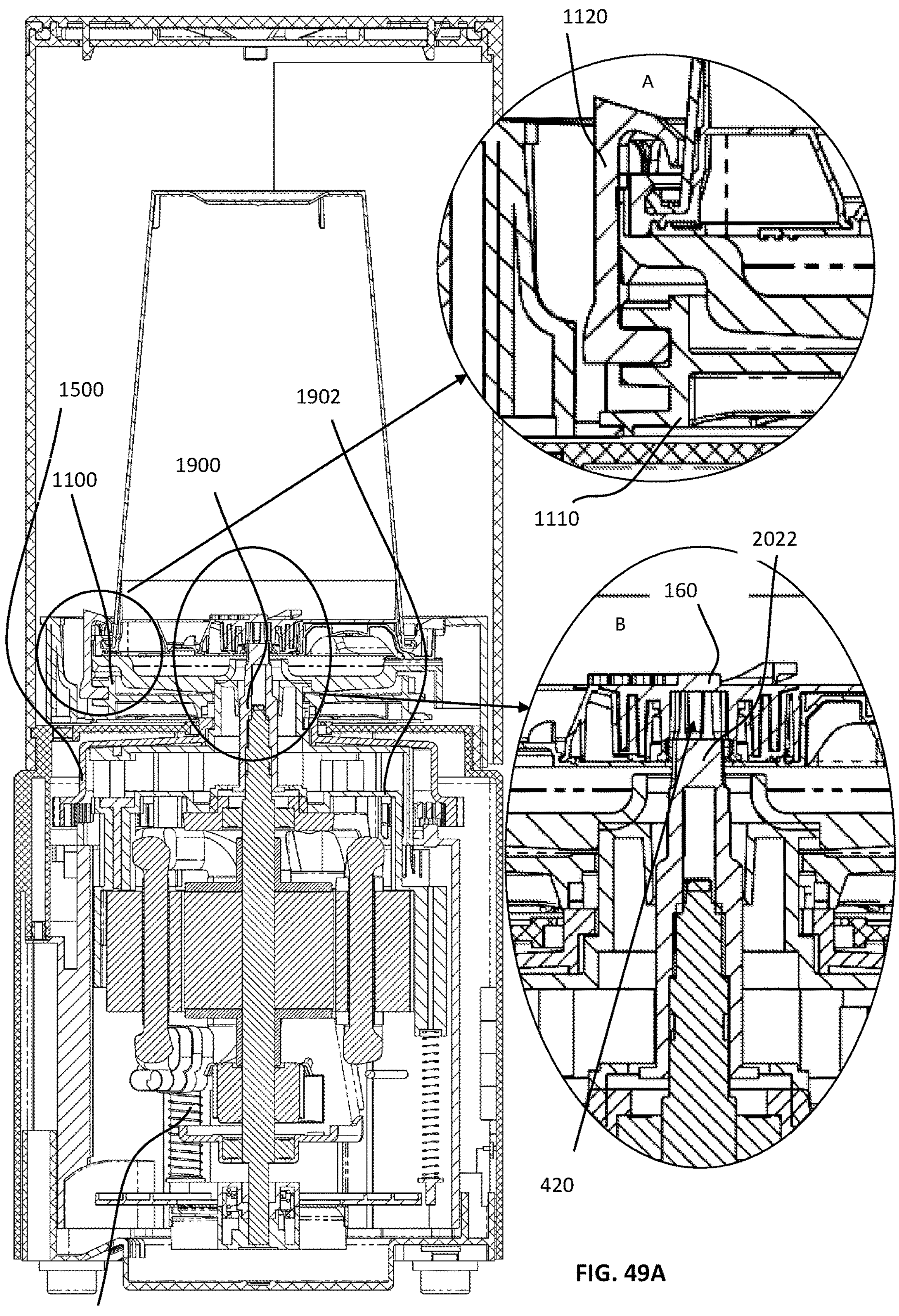
FIGS. 49A and 49B are simplified first and second sectional illustrations, corresponding to FIGS. 48A and 48B but showing the SUPCA of FIGS. 47A-47C in upside-down partially clamped operative engagement with the MMIDD.
Figure 49B:
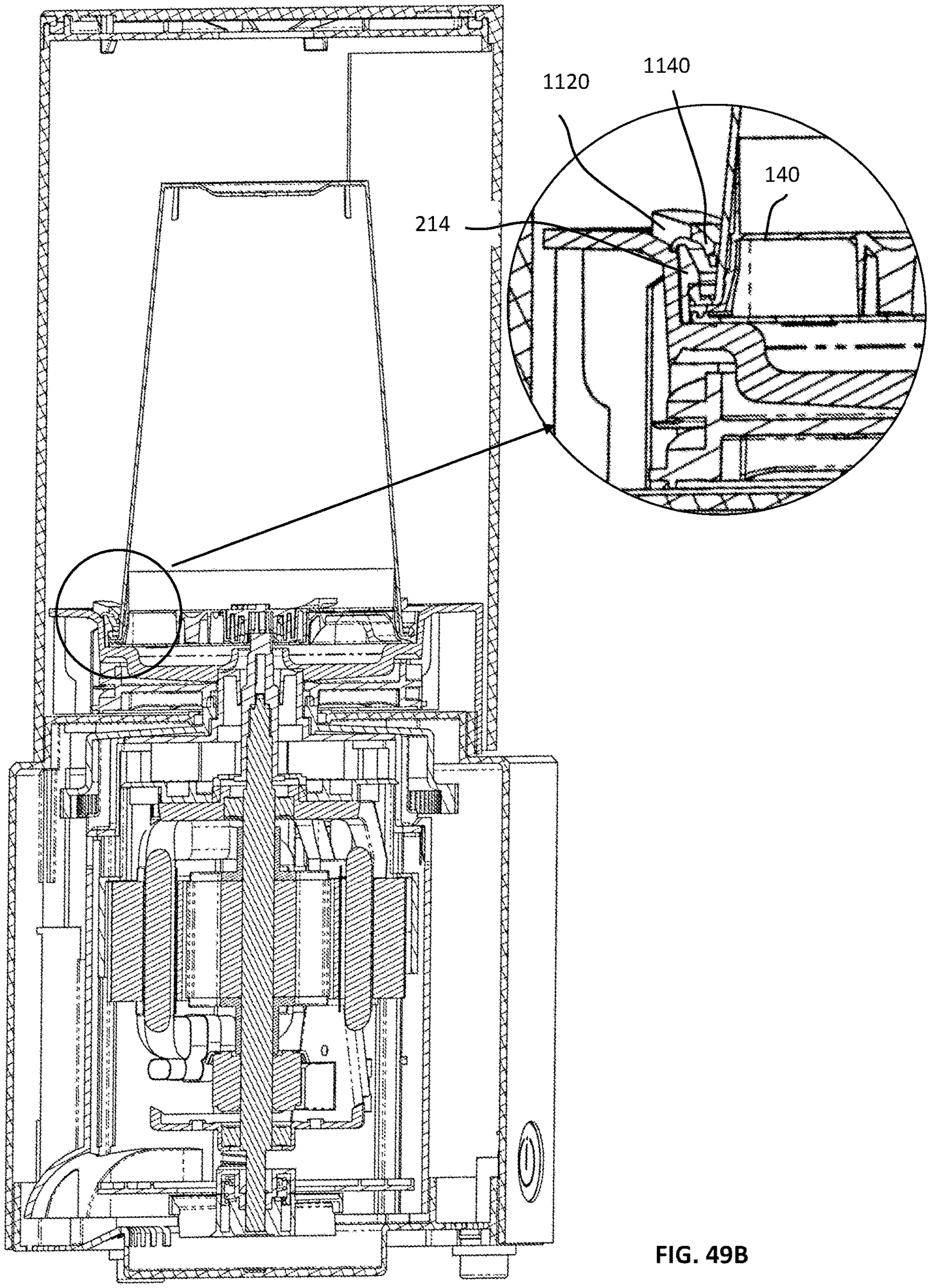

Reference is now made to FIGS. 49A and 49B, which are simplified first and second sectional illustrations, corresponding to FIGS. 48A and 48B but showing SUPCA 100 of FIGS. 47A-47C in upside-down partially clamped operative engagement with the MMIDD 1000.

As seen in FIGS. 49A & 49B, the operation of auxiliary motor 1520 in operative engagement with rotary drive gear 1500 causes rotation of spindles 1906 which raises motor support bracket assembly 1902 producing corresponding raising of outer drive shaft assembly 1900, while rotating cam element 1110, which reorients clamp elements 1120 to their inward clamping orientation, as shown in enlargement A of FIG. 49A.

It is seen that the vertically splined top generally cylindrical portion 2022 of outer drive shaft assembly 1900 is partially seated in a drive shaft seating recess 420 of blade 160, as seen in enlargement B of FIG. 49A.

As seen in an enlargement of FIG. 49B, a tab engagement protrusion 1140 of clamp element 1120 operatively engages tab 214 of lid 140 in response to clamping operation of clamp element 1120 and causes irreversible radially outward displacement of tab 214, thereby providing single-use functionality for SUPCA 100.

Figure 50:
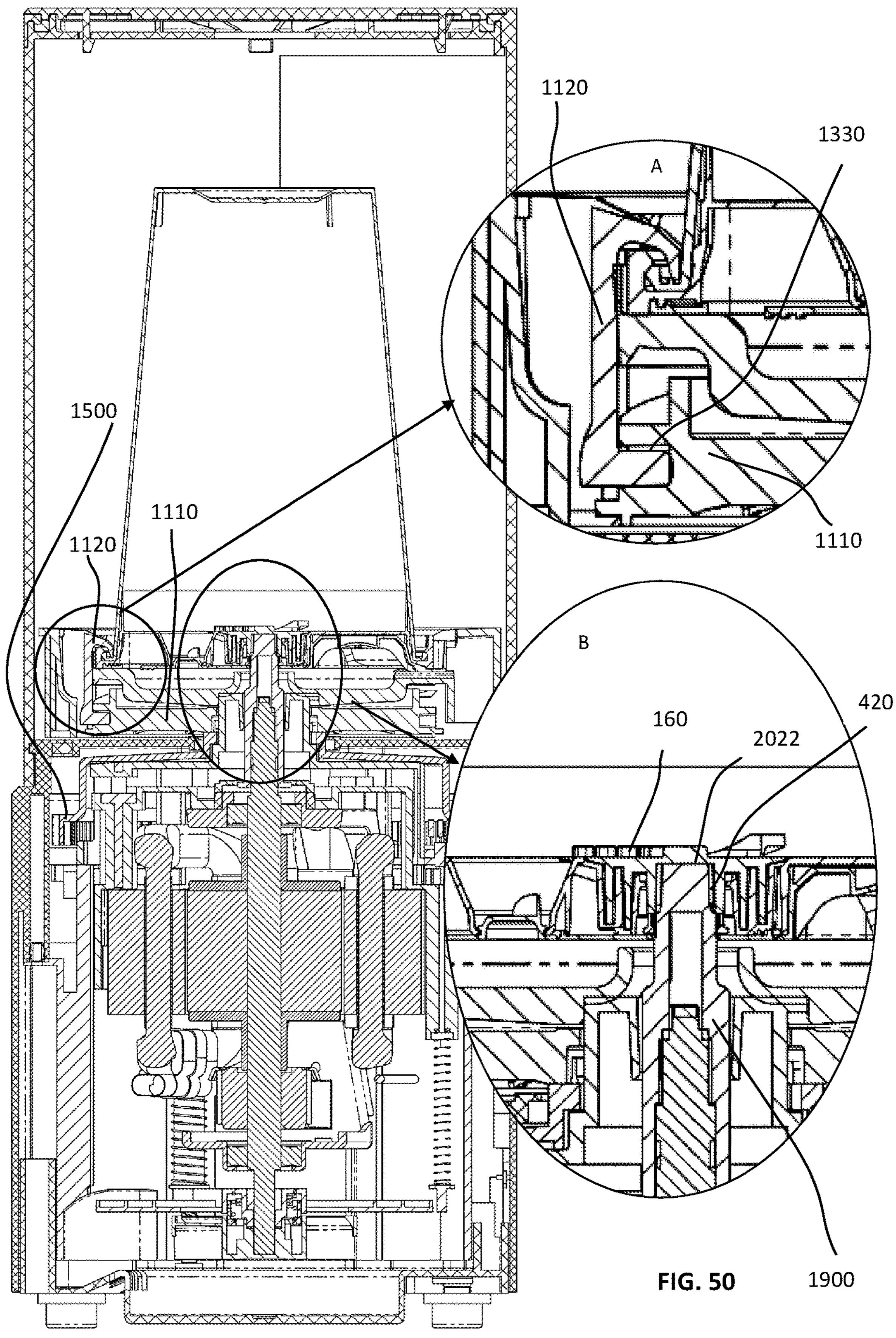
FIG. 50 is a simplified sectional illustration, corresponding to FIG. 49A but showing the SUPCA of FIGS. 47A-47C in upside-down fully clamped operative engagement with the MMIDD.

Reference is now made to FIG. 50, which is a simplified sectional illustration, corresponding to FIG. 49A, but showing the SUPCA 100 of FIGS. 47A-47C in upside-down fully clamped operative engagement with the MMIDD 1000, as seen in an enlargement A of FIG. 50. The full clamping is a result of the clamping element 1120 being located at a lower portion of the cam channel 1330 as the result of rotation of the cam element 1110.

It is seen in an enlargement B of FIG. 50 that the vertically splined top generally cylindrical portion 2022 of outer drive shaft assembly 1900 is fully seated in a drive shaft seating recess 420 of blade 160 but the blade 160 remains in recess 310.

Figure 51:
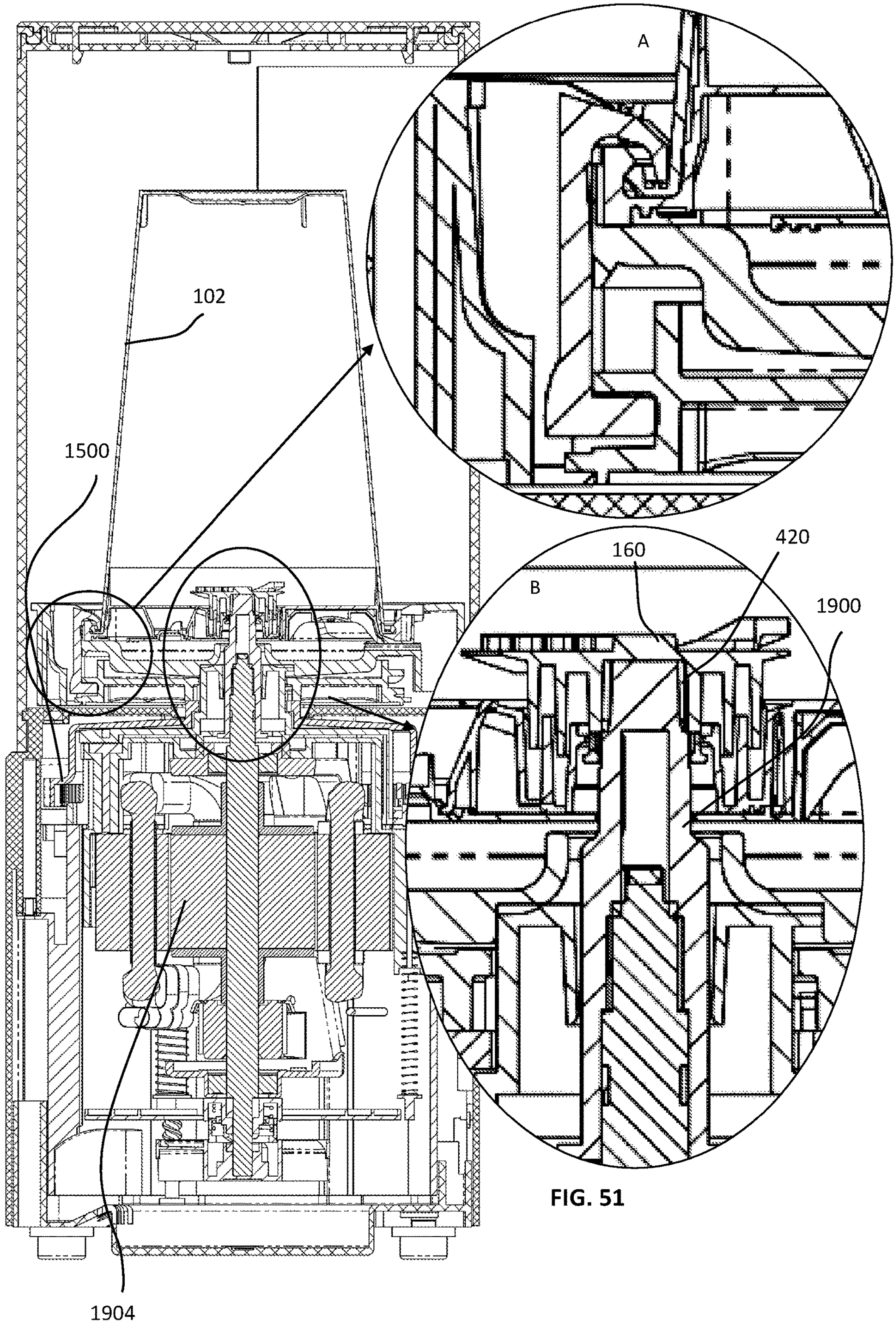
FIG. 51 is a simplified sectional illustration, corresponding to FIG. 50 but showing the SUPCA of FIGS. 47A-47C in operative engagement with the MMIDD wherein the blade of the SUPCA is extended and rotatable.

Reference is now made to FIG. 51, which is a simplified sectional illustration, corresponding to FIG. 50 but showing the SUPCA 100 of FIGS. 47A-47C in operative engagement with MMIDD 1000 wherein the blade of the SUPCA 100 is extended and rotatable.

As seen in FIG. 51, the outer drive shaft assembly 1900, which is fully seated in drive shaft seating recess 420 of blade 160, is raised causing blade 160 to be raised out of recess 310. It is noted that the operative orientation of the elements of MMIDD 1000 shown in FIG. 51 is that shown at IV in FIG. 38 and in FIG. 39D. The transition between operative orientations I and IV shown in FIG. 38 occurs during transitions between the operative orientations shown in FIGS. 48A and 48B and FIG. 51. A corresponding transition occurs between the operative orientations shown in FIGS. 41A-41C. At this stage electric motor 1904 may be operative to drive blade 160 in rotational motion within the container body 102 for processing the contents thereof.

Figure 52A:
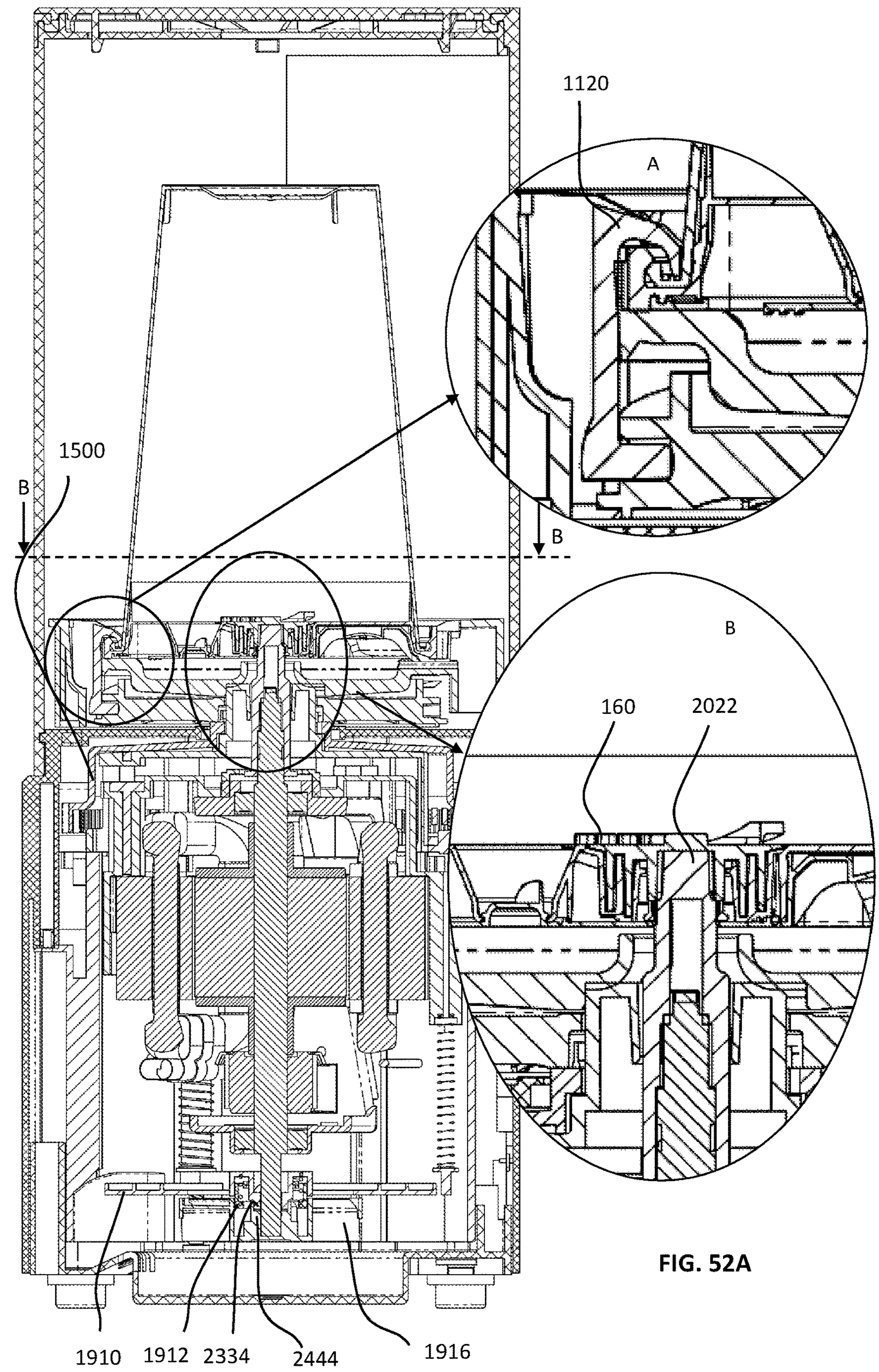
FIGS. 52A and 52B are simplified first and second sectional illustrations, wherein FIG. 52A corresponds to FIG. 51, but shows the SUPCA of FIGS. 47A-47C in operative engagement with the MMIDD wherein the blade of the SUPCA is retracted, after having been rotated, to be aligned with a blade receiving recess, FIG. 52B being taken along lines B-B in FIG. 52A.
Figure 52B:
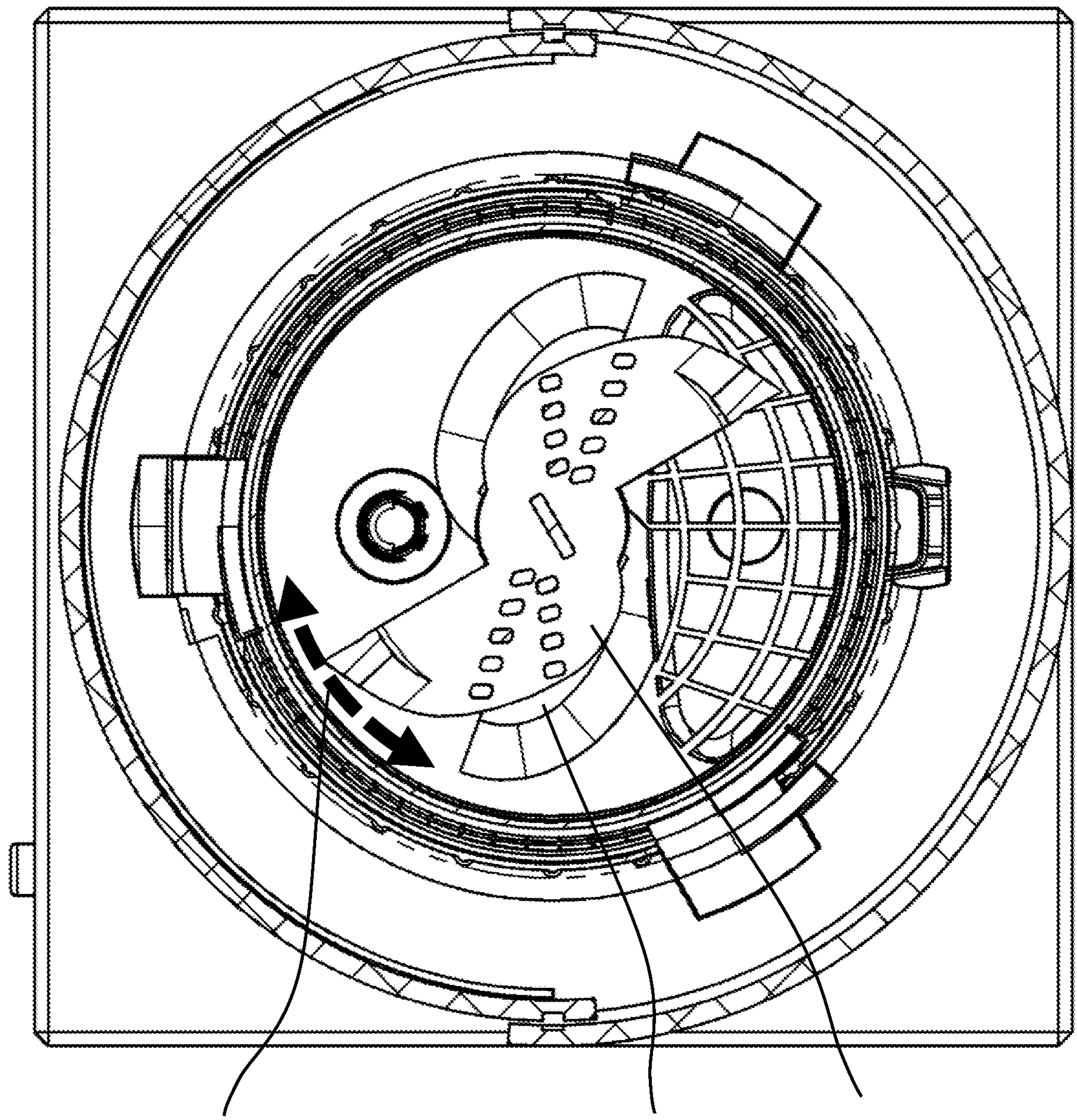

Reference is now made to FIGS. 52A and 52B, which are simplified first and second sectional illustrations, wherein FIG. 52A corresponds to FIG. 51 but show the SUPCA 100 of FIGS. 47A-47C in operative engagement with MMIDD 1000 wherein the blade of the SUPCA 100 is retracted after having been rotated to be aligned with blade receiving recess 310. FIG. 52B shows an arbitrary azimuth orientation of the blade 160 relative to recess 310 prior to this rotation. The rotation, which may be in either a clockwise or counter-clockwise direction, as indicated by an arrow 2660, is produced by mechanical interaction of teeth 2334 of motor lifting element 1910 and teeth 2444 of linearly driven rotating ventilating element 1916, as described hereinabove with reference to FIGS. 40A-40G, which may be preceded by a mechanical interaction of surfaces 2356 and 2426 of linear to rotary converting adaptor 1912 and linearly driven rotating ventilating element 1916, respectively, depending on the precise azimuth location of blade 160 prior to rotation, as shown generally in FIG. 52B. SUPCA 100 remains fully clamped to MMIDD 1000.

Figure 53:
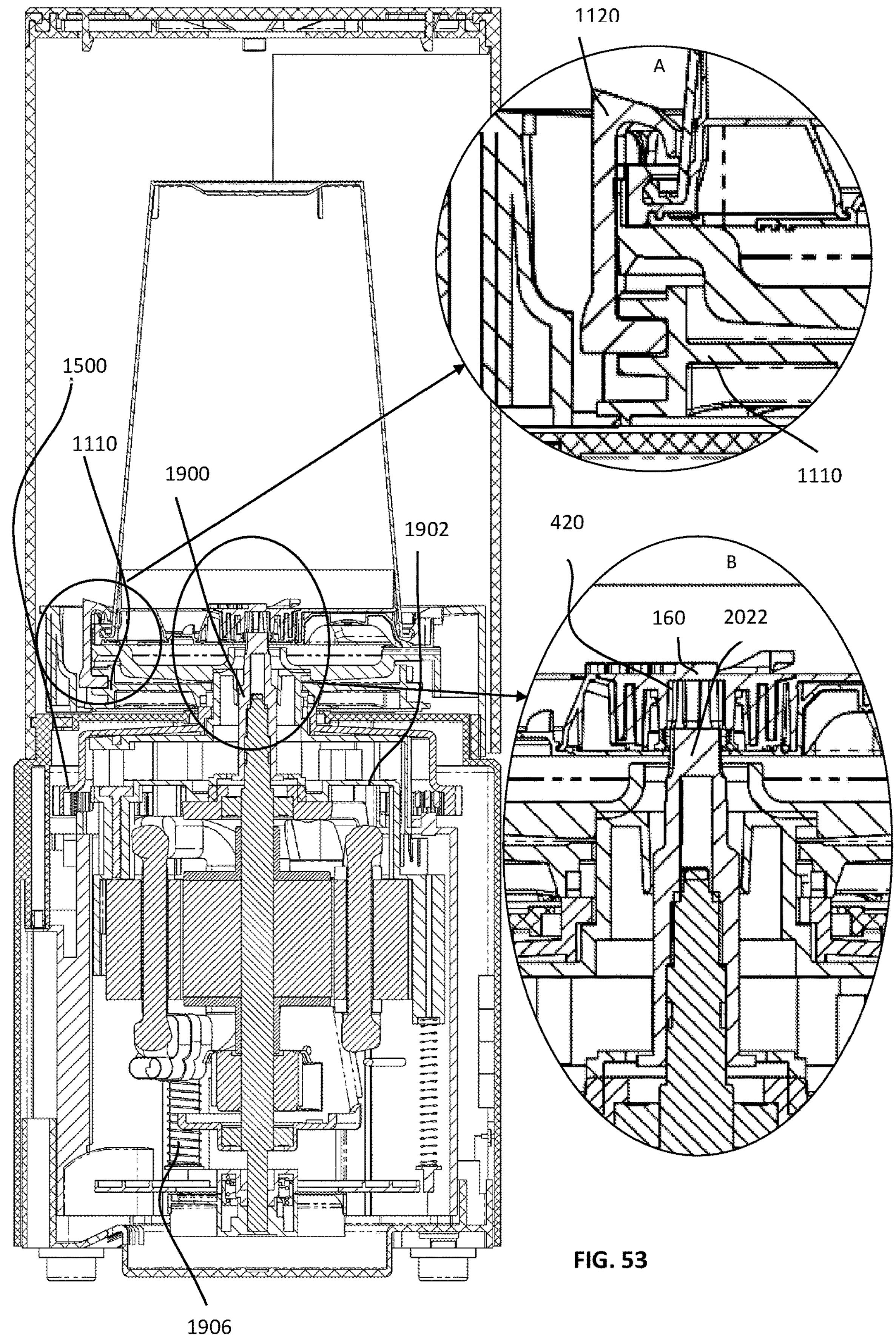
FIG. 53 is a simplified sectional illustration, corresponding to FIG. 52A but showing the SUPCA in upside-down partially clamped operative engagement with the MMIDD.
Figure 54:
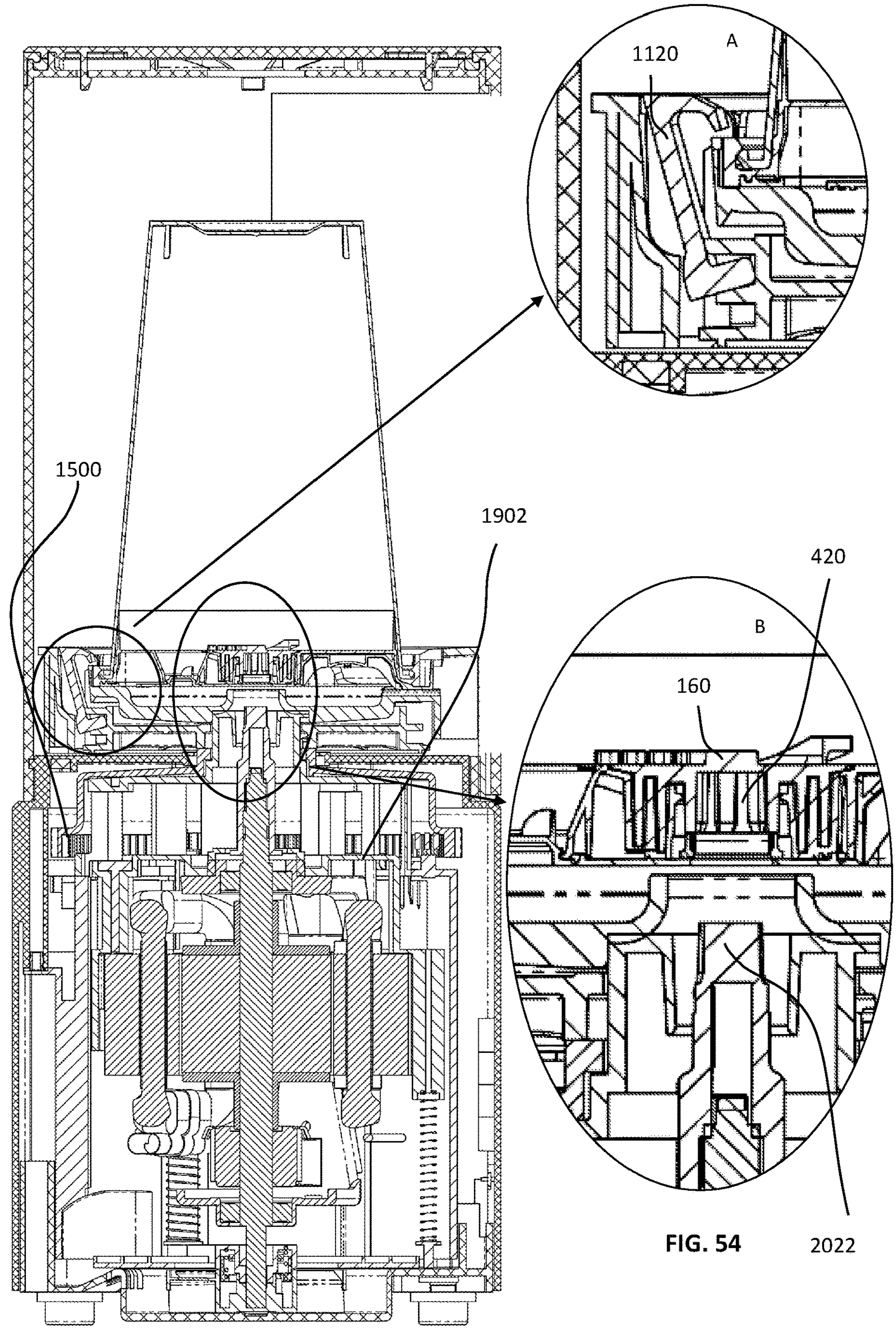
FIG. 54 is a simplified sectional illustration, corresponding to FIG. 53 but showing the SUPCA in upside-down unclamped operative engagement with the MMIDD with the door open.

Reference is now made to FIGS. 53 and 54, which are simplified sectional illustrations, corresponding to FIG. 52A. FIG. 53 shows partial unclamping, which is produced by rotation of the cam element 1110 as driven by the auxiliary motor 1520 via rotary drive gear 1500.

It is seen in enlargement B of FIG. 53 that the outer drive shaft assembly 1900 is no longer fully seated in a drive shaft seating recess 420 of blade 160 by virtue of reverse operation of auxiliary motor 1520 in operative engagement with rotary drive gear 1500, which causes reverse rotation of spindles 1906, which, in turn, lowers motor support bracket assembly 1902 producing corresponding lowering of outer drive shaft assembly 1900, while rotating cam element 1110, which reorients clamp elements 1120 to their outward non-clamping orientation, as shown in enlargement A of FIG. 54.

It is appreciated that a transition between operative orientations IV and I shown in FIG. 38 occurs during transitions between the operative orientations shown in FIGS. 51 and 54. A corresponding transition occurs between the operative orientations shown in FIGS. 41C-41A.

Figure 55A:
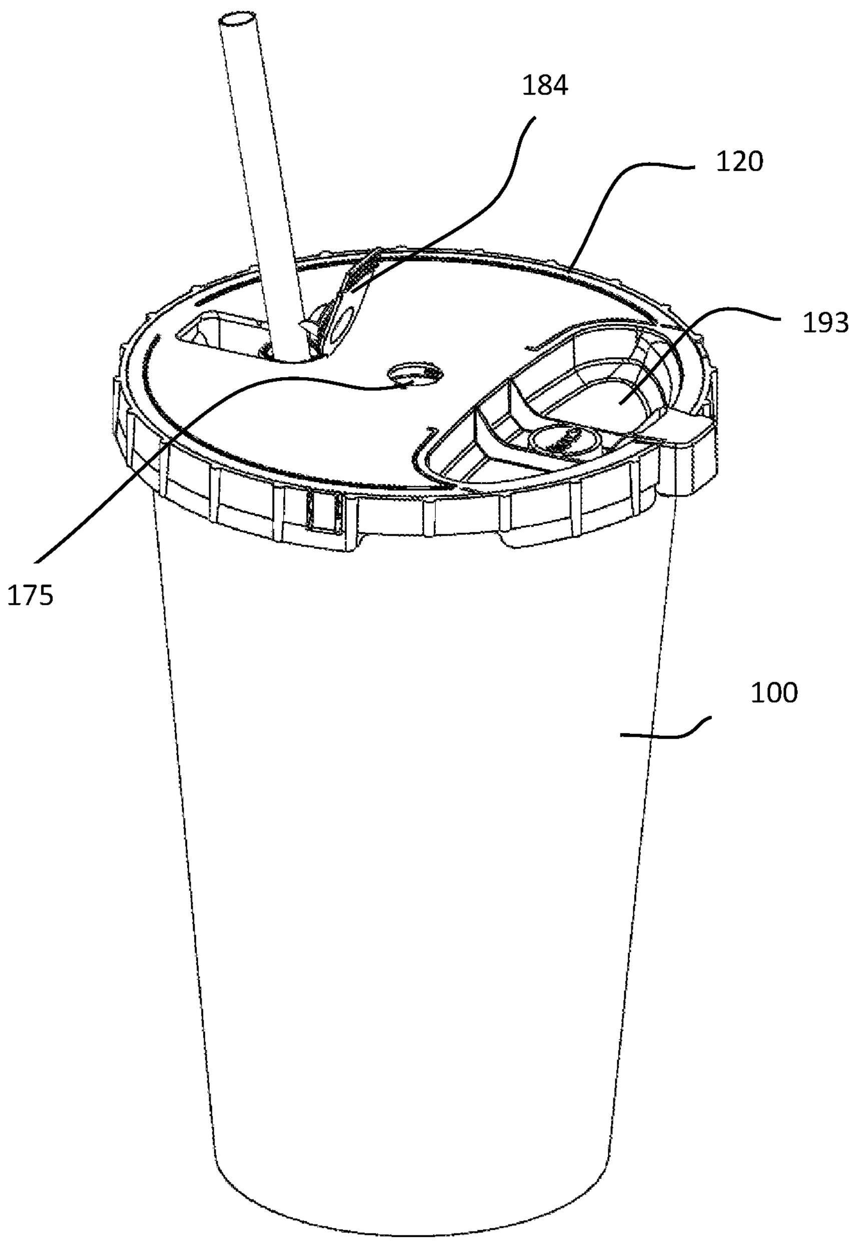
FIGS. 55A and 55B are simplified respective pictorial and pictorial central cross-sectional illustrations of the SUPCA after removal from the MMIDD having a straw extending through a straw communication aperture.
Figure 55B:
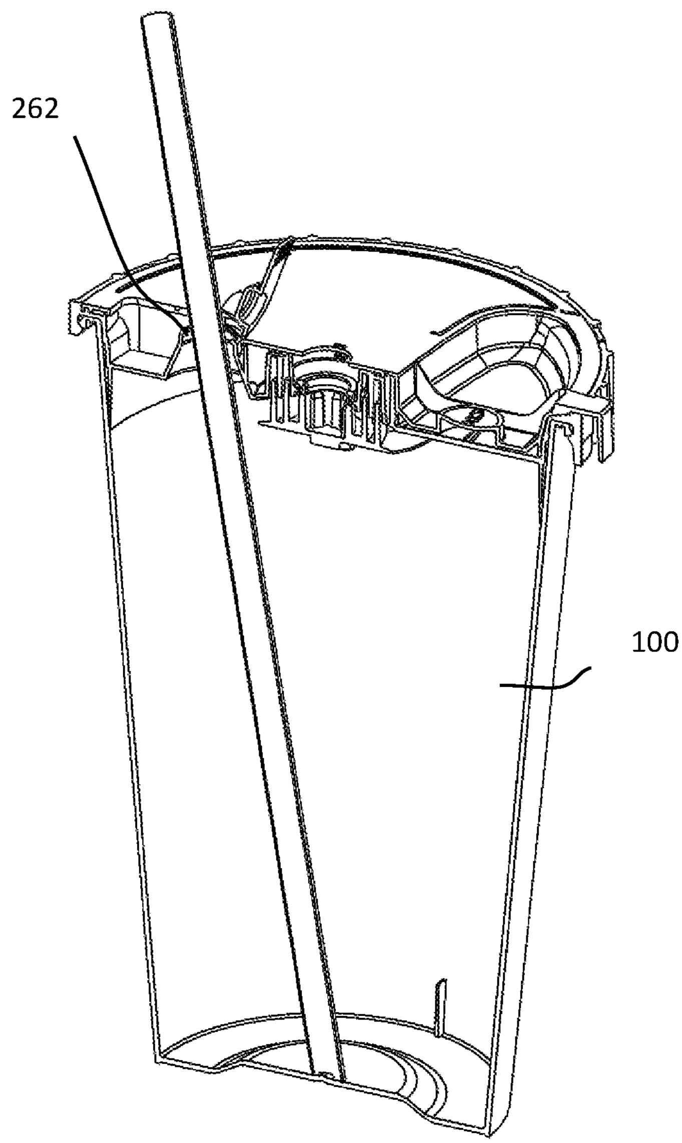

Reference is now made to FIGS. 55A and 55B, which are simplified respective pictorial and sectional illustrations of SUPCA 100 after removal from MMIDD 1000 having a straw extending through straw communication aperture 262 of lid 140.

This completes a general description of the operation of the MMIDD 1000 in accordance with a preferred embodiment of the invention.

It is a particular feature of the above-described embodiment of the present invention that leakage of liquids from the SUPCA 100 when it is in an upside-down state in engagement with MMIDD 1000 is prevented. This leakage prevention is preferably provided by a static/dynamic sealing produced by the interaction of blade 160 and lid 140, whose structures have been described hereinabove with reference to FIGS. 6A-6E and FIGS. 5A-5M, respectively.

Figure 56A:
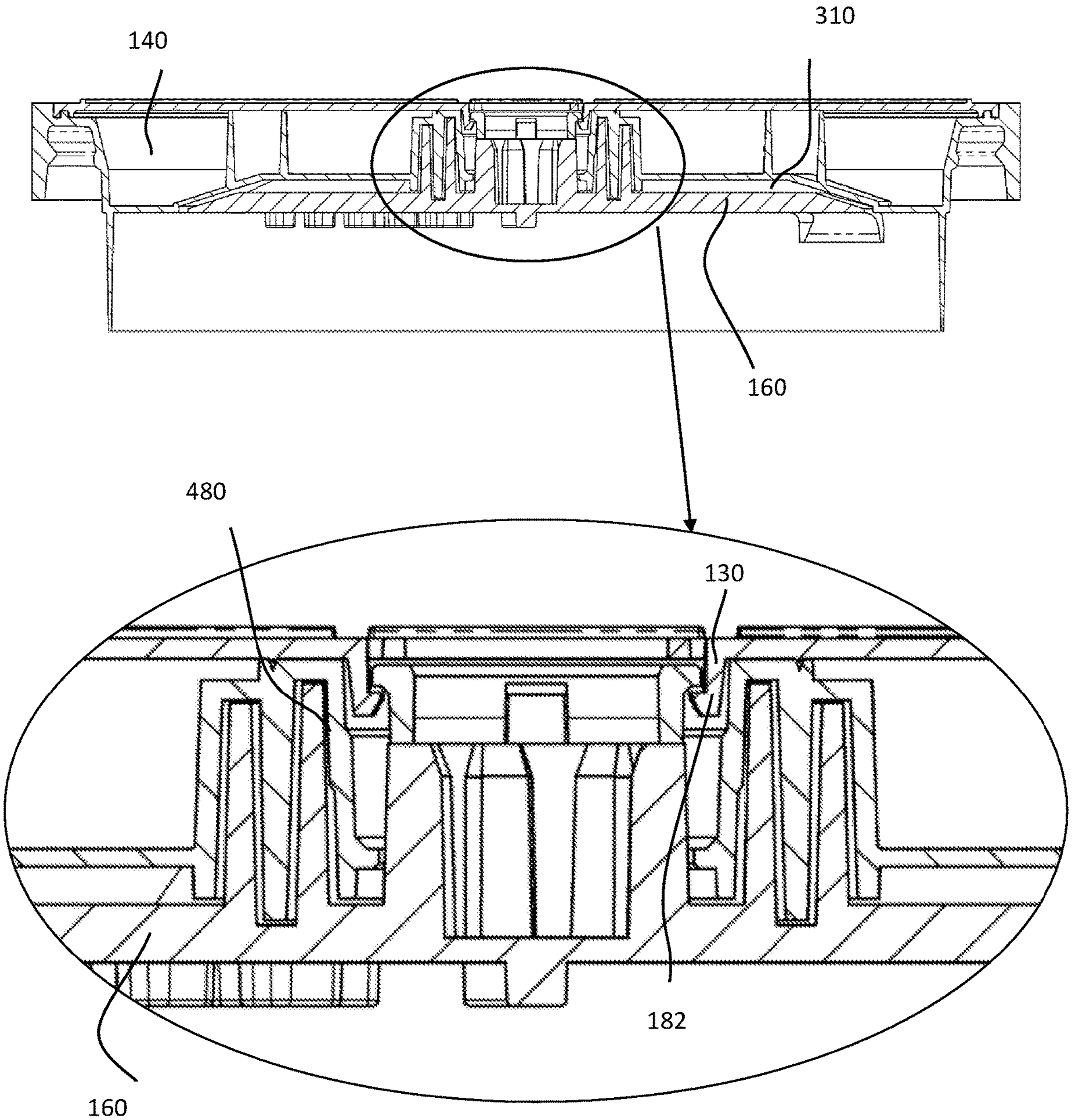
FIGS. 56A and 56B are simplified central cross-sectional illustrations, taken along lines D-D in FIG. 2A, of the SUCSERDREA showing two operative orientations providing static/dynamic sealing functionality.
Figure 56B:
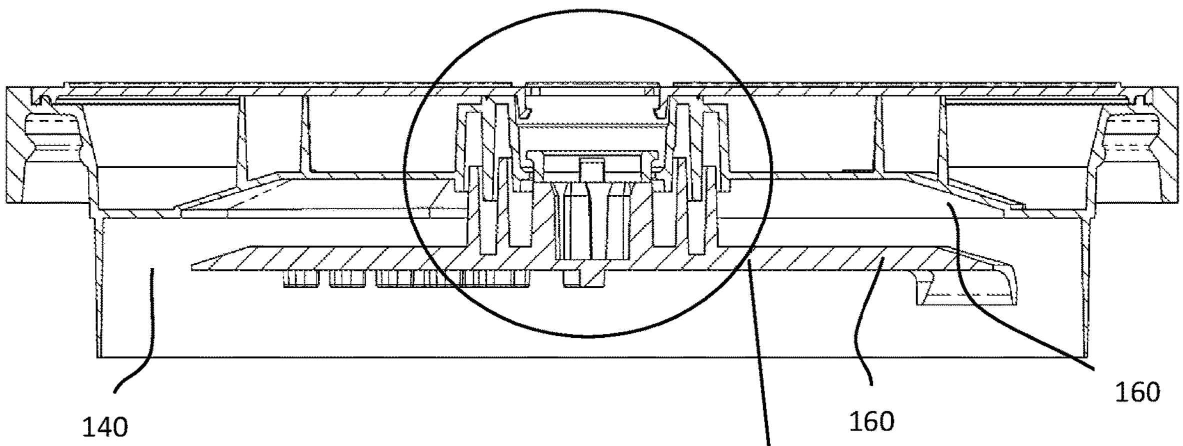
Figure 56B:
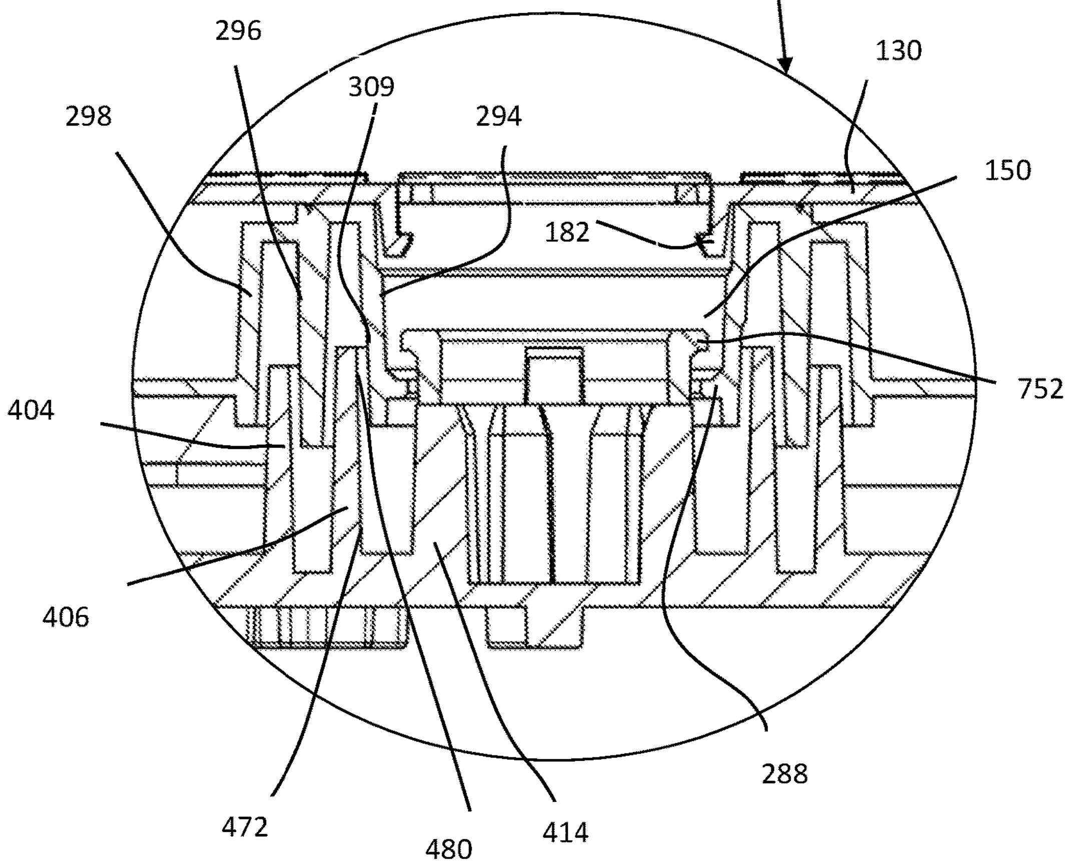

Reference is now made to FIGS. 56A and 56B, which are simplified central cross-sectional illustrations of the SUCSERDREA 120 showing two operative orientations in the static/dynamic sealing. It is noted that FIGS. 56A and 56B are upwardly oriented in the sense of FIGS. 1A-1B.

Turning initially to FIG. 56A, it is seen that prior to rotational operation of blade 160, blade 160 is fully seated in downwardly-facing blade receiving recess 310 of lid 140. In this operative orientation, which corresponds to operative orientation I, a static seal is defined by pressure engagement between static sealing surface 480 of blade 160 and a corresponding static sealing surface 309 of lid 140. It is appreciated that in this operative orientation, blade 160 is mechanically locked to cover 130 against linear mutual displacement therebetween by engagement of downward and inwardly facing hook protrusions 182 of cover 130 with surface 752 of hub 150, which is in turn fixed to blade 160.

Turning now to FIG. 56B, it is seen that prior to rotational operation of blade 160, blade 160 is now no longer seated in downwardly-facing blade receiving recess 310 of lid 140 by virtue of raising of outer drive shaft assembly 1900. In this operative orientation, which corresponds to operative orientation IV of FIG. 38, a static seal is no longer defined by pressure engagement between static sealing surface 480 of blade 160 and a corresponding static sealing surface 309 of lid 140. However, static sealing is provided by a slight underpressure produced within the region of walls 404, 406, 414 of blade 160 and walls 294, 296 and 298 of lid 140 of SUPCA 100 by virtue of raising of the blade 160 and possibly also resulting from defrosting of frozen contents of SUPCA 100. This underpressure, combined with capillary effects between adjacent surfaces of walls 404, 406, 414 of blade 160 and walls 294, 296 and 298 resists the leakage of liquid from the interior of SUPCA 100 through the region defined by walls 404, 406, 414 of blade 160 and walls 294, 296 and 298 of lid 140 of SUPCA 100.

It is appreciated that in this operative orientation, blade 160 is no longer mechanically locked to cover 130 against linear mutual displacement therebetween by engagement of downward and inwardly facing hook protrusions 182 of cover 130 with surface 752 of hub 150. The unlocking results from the axial force provided by raising of the outer drive shaft assembly 1900. It is noted that, as seen in FIG. 56B, in this operative orientation, to reduce friction, upwardly-facing partially tapered and partially flat annular surface 288 of lid 140 is located at a vertical distance from tapered annular radially outwardly-facing surface 752 of hub 150, which is joined to blade 160. It is appreciated that during normal operation of MMIDD 1000 and normal handling of SUPCA 100, provision of upwardly-facing partially tapered and partially flat annular surface 288 of lid 140 prevents disengagement of blade 160 from lid 140.

During rotational operation of blade 160, the configuration shown in FIG. 56B is the same and here dynamic sealing is provided by virtue of centrifugal forces resulting from the rotation of blade 160 relative to lid 140.

Preferably following completion of rotational operation of blade 160, the SUCSERDREA 120 returns to the operative orientation shown in FIG. 56A.

It is appreciated that any liquid leaking from the SUPCA 100 via the SUCSERDREA 120 is preferably channeled via leak fluid egress apertures 282 into sealed leaked fluid reservoir volumes 260 of lid 140.

Figure 57B:
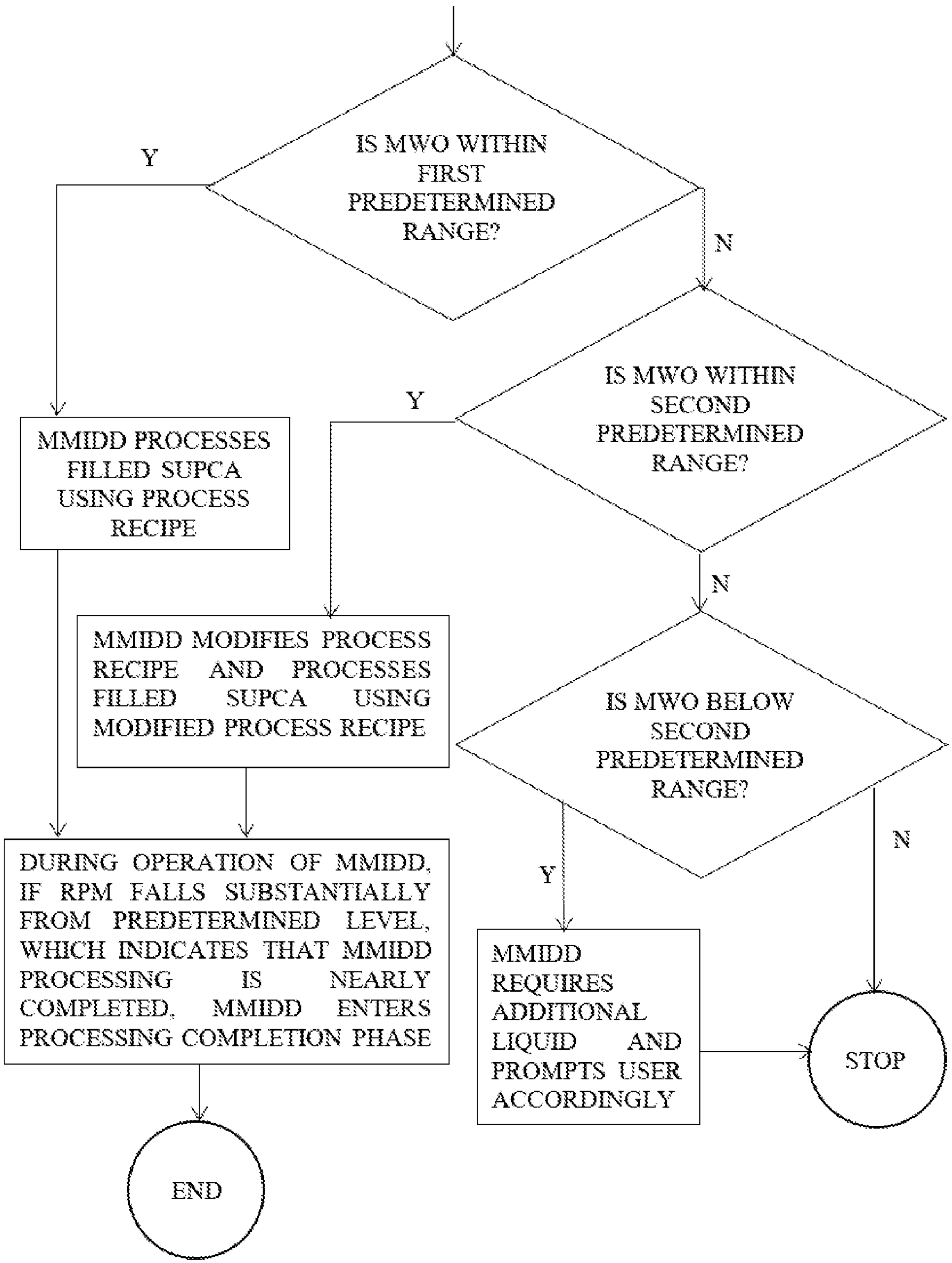

Reference is now made to FIGS. 57A and 57B, which are together a simplified flowchart illustrating control operation of the MMIDD 1000 in accordance with the above-described preferred embodiment of the present invention.

As seen in FIGS. 57A & 57B, the principal steps in the operation of the system described hereinabove in FIGS. 1A-56B may be summarized as follows:

Electrical power is supplied to the MMIDD 1000, as by user operation of a power switch (not shown). The MMIDD 1000 performs an automated, computerized self-check and initialization process.

The user adds any required liquid to the filled single-use preparation container assembly (SUPCA) 100 of FIGS. 1A-9B via liquid ingress opening 242 by lifting cover 193.

After resealing liquid ingress opening 242 by fully lowering cover 193, the user turns the filled SUPCA 100 of FIGS. 1A-9B, containing any added liquid, upside down and inserts it, in an upside-down orientation, via an opened rotatable door assembly 1050 of the MMIDD 1000 onto SUPCASCA 1030 of the MMIDD 1000.

The user closes the door assembly 1050 and presses the push button element 1420.

The MMIDD 1000 reads and decrypts information contained in or referenced by machine readable information source 162 of the filled SUPCA 100 of FIGS. 1A-9B. This information preferably contains some or all of the following information:

A process recipe for processing of the contents of filled SUPCA 100, including, inter alia, time sequencing of rotation of the blade 160 including intended rpm, rpm threshold levels and timing;

Reference weight of the filled SUPCA 100 (RWF);

Reference weight of the liquid (RWL) to be added by the user to the filled SUPCA 100 prior to processing by the MMIDD 1000;

Type of filled SUPCA 100 specific ID;

Unique individual filled SUPCA 100 specific ID; and

Internet links to information of possible interest.

The MMIDD 1000 weighs the filled SUPCA 100 by means of load cells 1560, including any additional user added liquid and generates a Measured Weight Output (MWO).

Based on some or all of the above information, MMIDD 1000 confirms that an acceptable filled SUPCA 100 has been inserted into operative engagement therewith.

If the MWO of an otherwise acceptable filled SUPCA 100 is within a predetermined range of the sum of the RWO and RWL, the MMIDD 1000 processes the filled SUPCA 100 in accordance with the process recipe.

If the MWO of an otherwise acceptable filled SUPCA 100 exceeds the sum of the RWO and RWL or is below the sum of the RWO and RWL within a predetermined range, the MMIDD 1000 modifies the process recipe accordingly and then processes the filled SUPCA 100 in accordance with the modified process recipe.

If the MWO of an otherwise acceptable filled SUPCA 100 is below the sum of the RWO and RWL or is below the sum of the RWO and RWL beyond the predetermined range, the MMIDD 1000 requires addition of further liquid to the filled SUPCA 100 and prompts the user accordingly and only once this is done processes the filled SUPCA 100 in accordance with the process recipe or a suitably modified process recipe.

During operation of the MMIDD 1000, if the RPM falls substantially from a predetermined level as set forth in the appropriate process recipe, which indicates that MMIDD processing is nearly completed, MMIDD 1000 enters a processing completion phase as set forth in the appropriate process recipe and terminates rotation of the blade 160 and notifies the user that filled SUPCA 100 may be removed from MMIDD 1000 and consumed.

Reference is now made to FIGS. 57C-57J, which are together a more detailed series of flowcharts illustrating control operation of the MMIDD 1000, including additional steps and processes in comparison to the simplified control operation outlined hereinabove with reference to FIGS. 57A and 57B.

Figure 57C:
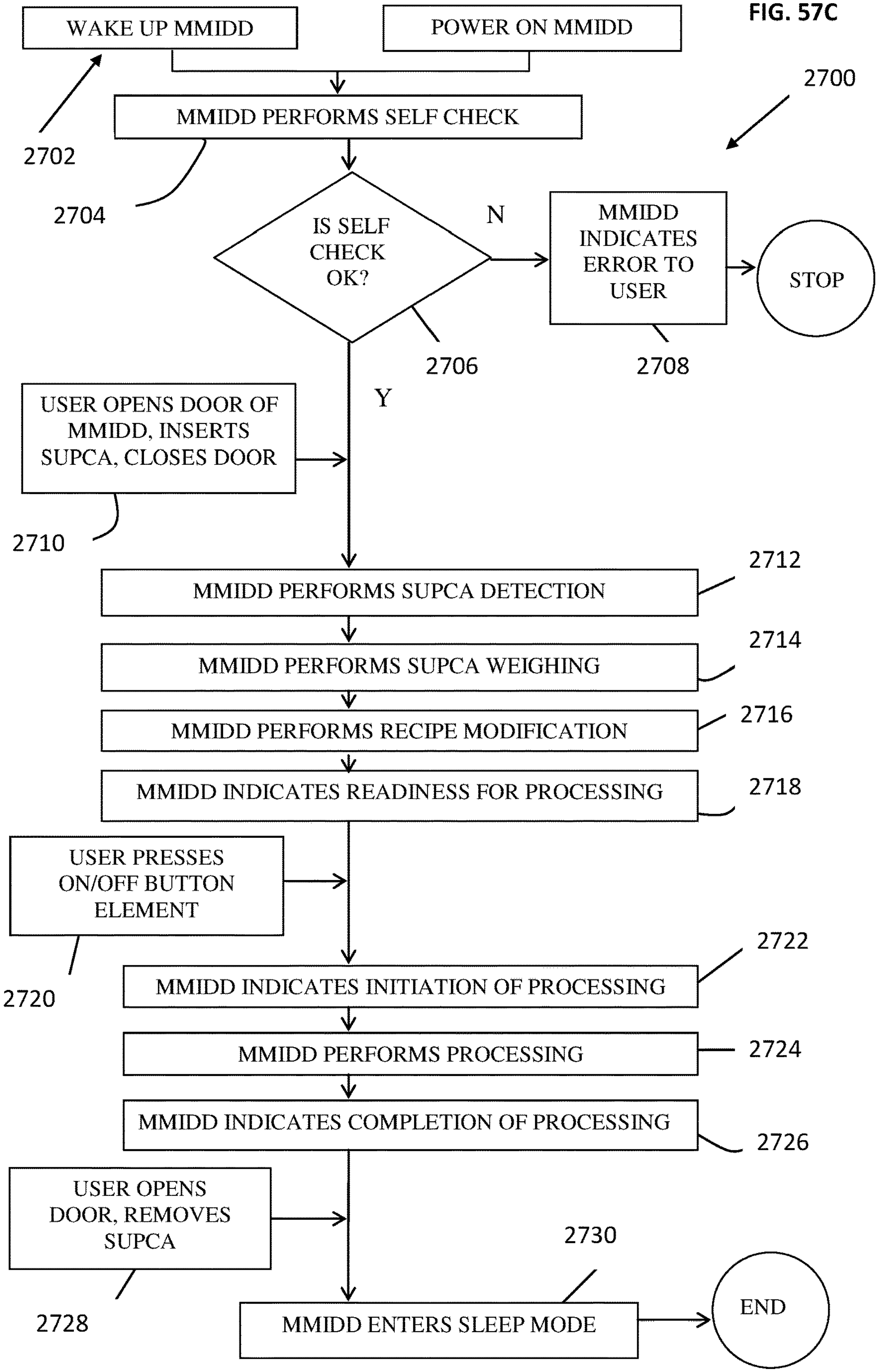

Turning to FIG. 57C, the main steps in the operation of the system described hereinabove with reference to FIGS. 1A-56B, simplified operational control of which is described in FIGS. 57A and 57B, are set forth in a main flow chart 2700. As seen at a first step 2702, the MMIDD 1000 is activated. Such activation may be by way of switching on of electrical power to the MMIDD 1000 in the case that the MMIDD is previously non-powered, or may be by way of waking up the MMIDD 1000 in the case that the MMIDD is previously in a sleep mode. Upon entering an active powered mode, the MMIDD 1000 preferably performs a self-check, as seen at a second step 2704. A detailed description of sub-steps involved in self-check step 2704 is provided hereinbelow with reference to FIGS. 57D and 57E.

Following performance of self-check 2704, the results of the self-check are ascertained, as seen at query 'IS SELF CHECK OK?' at a third step 2706. In the case that the results of the self-check are unacceptable, a user is preferably alerted to this, as seen at a fourth step 2708 and the operation of the MMIDD is halted. Such an alert may be by way of illumination of one or more LEDs incorporated in buttons and/or icons on the body of MMIDD 1000. In the case that the results of the self-check are acceptable, a user of MMIDD may proceed to insert the inverted, sealed pre-filled SUPCA 100 of FIGS. 1A-9B via opened rotatable door assembly 1050 of MMIDD 1000 onto SUPCASCA 1030, as seen at a fifth step 2710.

Following insertion of SUPCA 100, MMIDD 1000 preferably detects the presence of SUPCA 100 at a sixth step 2712, weighs SUPCA 100 at a seventh step 2714 and modifies a process recipe based on the outcome of the seventh weighing step 2714, at an eighth step 2716. Further details of sixth detection step 2712, seventh weighing step 2714 and eighth recipe modification step 2716 are provided hereinbelow with reference to FIG. 57F, FIG. 57G, and FIG. 57H respectively.

Following successful completion of sixth-eighth steps 2712-2716, MMIDD 1000 preferably indicates readiness for performing processing, as seen at a ninth step 2718. Indication of readiness for performing processing may be, for example, by way of illumination of push button element 1420 or other buttons and/or icons on the body of MMIDD 1000. Ninth step 2718 preferably additionally includes MMIDD 1000 checking that rotatable door assembly 1050 is in a closed position prior to indicating readiness for operation.

Responsive to an indication of readiness for performing processing at ninth step 2718, the user preferably presses the push button element 1420 to initiate operation of MMIDD 1000, as seen at a tenth step 2720. As seen at an eleventh step 2722, entry of MMIDD 1000 into an operative processing state may be indicated to a user by way of a change in the illumination of push button element 1420 or other buttons or icons on the body of MMIDD 1000, including, for example a change in color or pattern of illumination.

Upon the user initiating the performance of processing by MMIDD 1000 at tenth step 2720, MMIDD 1000 preferably processes contents of SUPCA 100 at a twelfth processing step 2724. MMIDD 1000 preferably processes contents of SUPCA 100 in accordance with the process recipe, as suitably modified at eighth step 2716. Further details of twelfth processing step 2724 are provided hereinbelow with reference to FIGS. 57I and 57J.

Upon completion of twelfth step 2724, MMIDD 1000 preferably indicates that SUPCA 100 has been processed and may be removed by the user, at a thirteenth step 2726. Indication of completion of processing and readiness for removal of SUPCA 100 from MMIDD 1000 may be, for example, by way of illumination of push button element 1420 or other buttons and/or icons on the body of MMIDD 1000. The user may then open rotatable door assembly 1050 and disengage and remove SUPCA 100 from MMIDD 1000, as seen at a fourteenth step 2728. MMIDD 1000 may then enter a sleep mode until subsequent reactivation thereof for further use, as seen at a fifteenth and preferably final step 2730. A sleep state of MMIDD 1000 may be indicated by appropriate illumination of buttons and/or icons on the body of MMIDD.

Figure 57D:
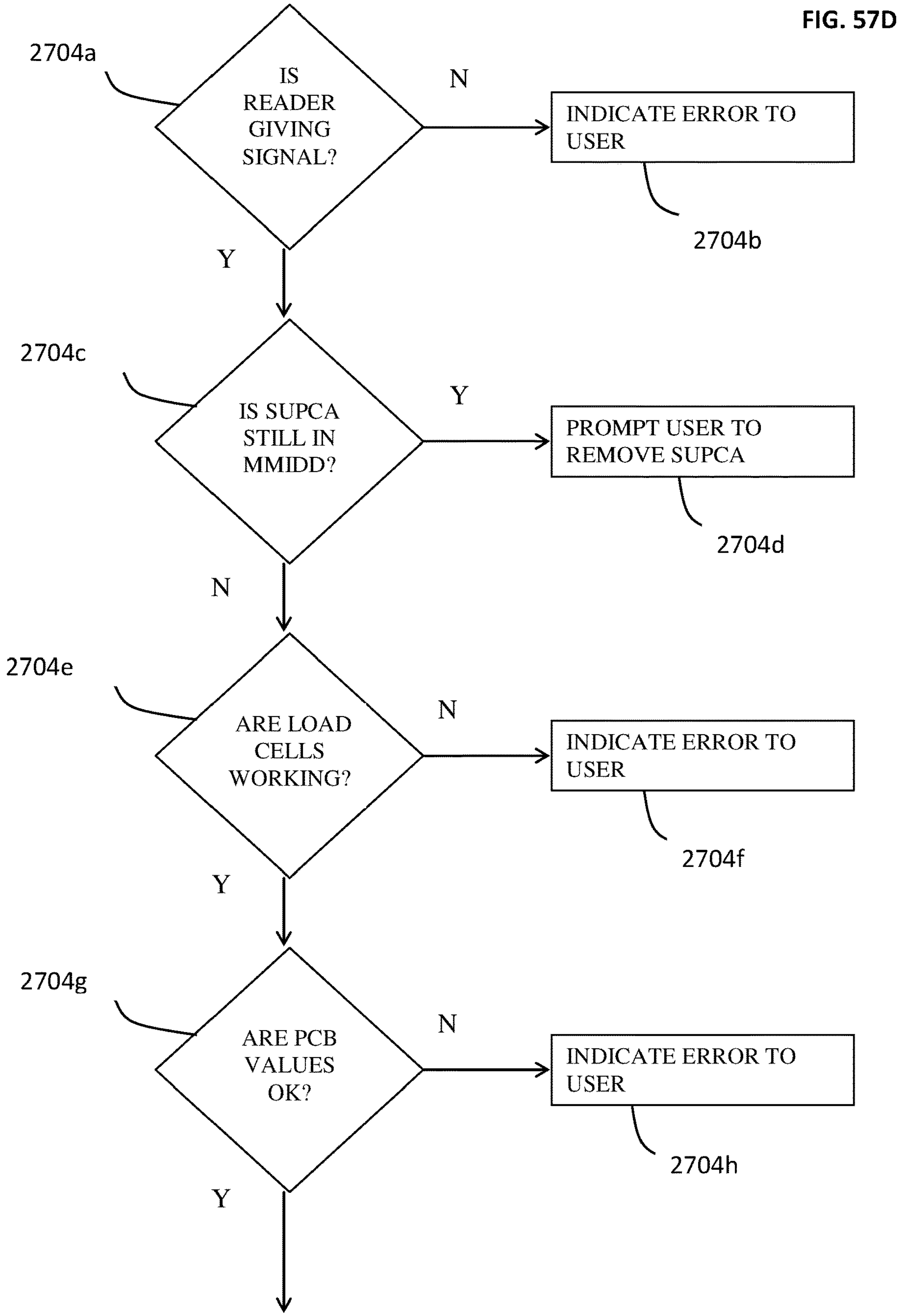
Figure 57E:
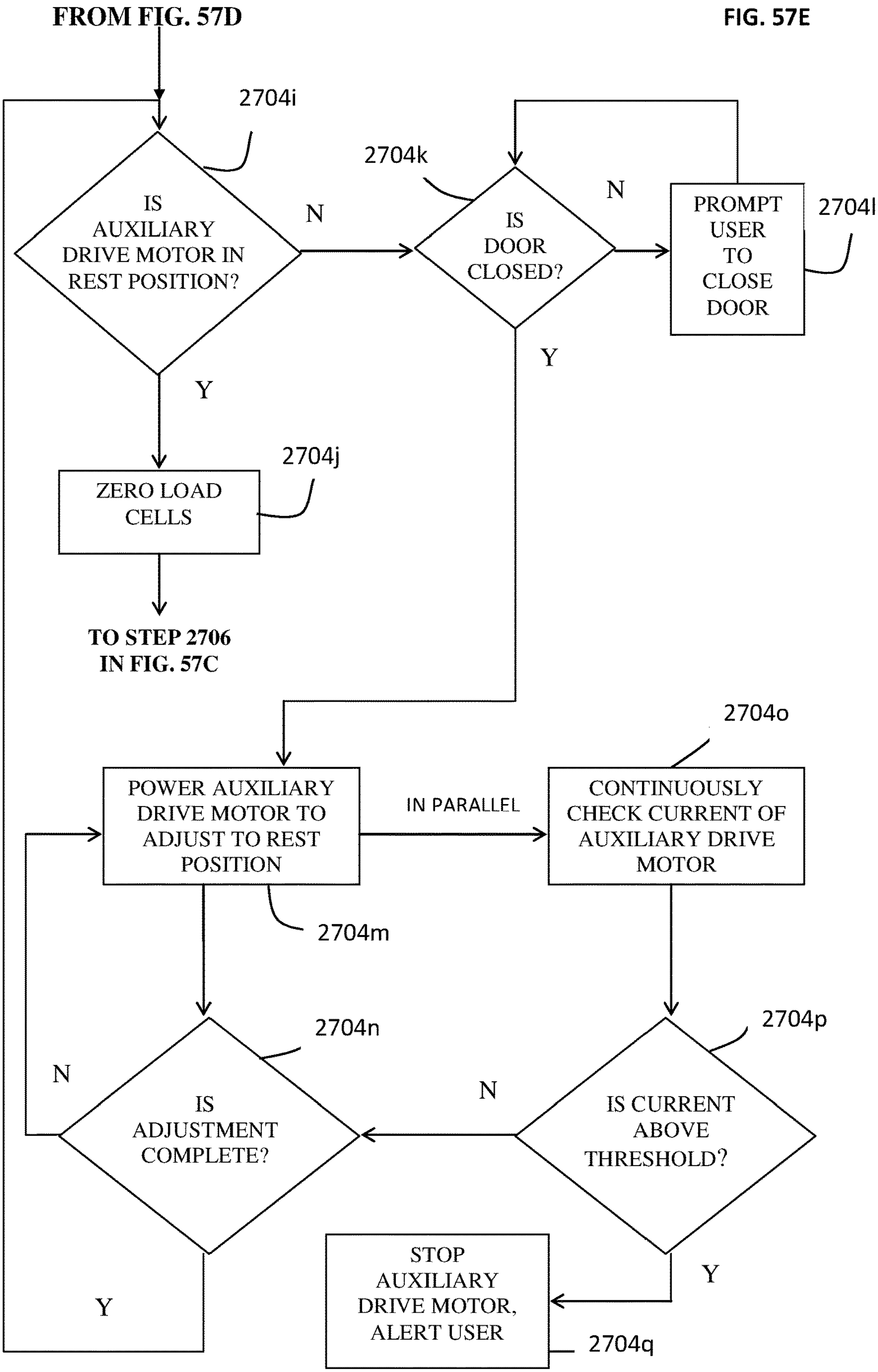

Reference is now made to FIGS. 57D and 57E, which are together a simplified flow chart illustrating sub-steps involved in self-check step 2704 of flow chart 2700 of FIG. 57C.

As seen in FIG. 57D, self-check 2704 preferably begins at a first self-check sub-step 2704*a*, with MMIDD 1000 checking that a reader module (not shown) included in MMIDD 1000 is in a properly functioning state and hence will be capable of reading machine-readable information source 162 of SUCSERDREA 120 upon insertion thereof in MMIDD 1000. In the case that machine-readable information source 162 is embodied as an RFID tag, the reader module in MMIDD 1000 is preferably embodied as an RFID reader and first self-check sub-step 2704*a* preferably includes checking that the RFID reader is giving a signal indicative of proper functioning.

If the reader module is not providing a suitable signal and thus not properly functioning, MMIDD 1000 preferably alerts the user of this, as seen at second self-check sub-step 2704*b*.

If the reader module is providing a suitable signal, MMIDD 1000 preferably proceeds to check if a previous SUPCA 100 is still in MMIDD 1000, as seen at a third self-check sub-step 2704*c*. If a SUPCA 100 is still in MMIDD 1000, MMIDD 1000 preferably alerts the user of this and prompts the user to remove the SUPCA 100, as seen at a fourth self-check sub-step 2704*d*. If a SUPCA 100 is not in MMIDD 1000, MMIDD 1000 preferably proceeds to check if load cells 1560 are properly functioning, for example by way of checking if a load sensor associated with load cells 1560 is providing a suitable signal, as seen at a fifth self-check sub-step 2704*e*. If the load sensor is not providing a suitable signal and thus not properly functioning, MMIDD 1000 preferably alerts the user of this, as seen at sixth self-check sub-step 2704*f*.

If the load sensor is providing a suitable signal, MMIDD 1000 preferably proceeds to perform a self-check on printed circuit board (PCB) 1440 at a seventh self-check sub-step 2704*g*. Printed circuit board 1440 preferably contains control electronics managing operation of the MMIDD 1000 and seventh self-check sub-step 2704*g* preferably includes checking if voltages and resistances of elements on printed circuit board 1440 are within predetermined acceptable ranges. If the parameters of the printed circuit board 1440 are not within acceptable ranges, MMIDD 1000 preferably alerts the user to this, as seen at an eighth self-check sub-step 2704*h*.

Turning now to FIG. 57E, if the parameters of the printed circuit board 1440 are found to be within acceptable ranges, MMIDD 1000 preferably proceeds, at a ninth self-check sub-step 2704*i*, to check if the vertically displacing rotary drive motor assembly 1430, and particularly auxiliary rotary drive motor 1520 thereof, is in its rest position, as illustrated in FIG. 39A.

If vertically displacing rotary drive motor assembly 1430 including auxiliary rotary drive motor 1520 thereof is in a rest position, MMIDD 1000 preferably zeros load cells 1560 at a tenth self-check sub-step 2704*j*.

If vertically displacing rotary drive motor assembly 1430 including auxiliary rotary drive motor 1520 is not in the rest position, MMIDD 1000 checks at an eleventh self-check sub-step 2704*k* if rotatable door assembly 1050 is in a closed position. If rotatable door assembly 1050 is not in a closed position the user is preferably alerted of this and prompted to close rotatable door assembly 1050, as seen at twelfth self-check sub-step 27041. The user may be alerted by way of appropriate illumination of at least one button and/or icon incorporated in MMIDD 1000.

If rotatable door assembly 1050 is in a closed position, MMIDD 1000 preferably powers auxiliary rotary drive motor 1520 so as to move vertically displacing rotary drive motor assembly 1430 to the rest position thereof, as seen at a thirteenth self-check sub-step 2704*m*. By way of example, thirteenth self-check sub-step 2704*m* may involve rotating auxiliary rotary drive motor 1520 in a clock-wise direction. MMIDD 1000 preferably subsequently ascertains at a fourteenth self-check sub-step 2704*n* whether auxiliary rotary drive motor 1520 and hence vertically displacing rotary drive motor assembly 1430 has assumed the required position and returns to self-check sub-step 2704*m* in the case that auxiliary rotary drive motor 1520 has not yet assumed the required position.

In parallel to the performance of thirteenth and fourteenth self-check sub-steps 2704*m* and 2704*n*, MMIDD 1000 preferably continuously checks the current of auxiliary rotary drive motor 1520, as seen at fifteenth self-check sub-step 2704*o*, in order to detect the presence of a possible blockage. If the measured current is above a predetermined threshold, as seen to be checked at a sixteenth self-check sub-step 2704*p*, MMIDD 1000 preferably stops auxiliary rotary drive motor 1520 and alerts a user of a malfunction, for example by way of appropriate illumination of one or more icons and/or buttons incorporated in MMIDD 1000, as seen at seventeenth self-check sub-step 2704*q*.

Figure 57F:
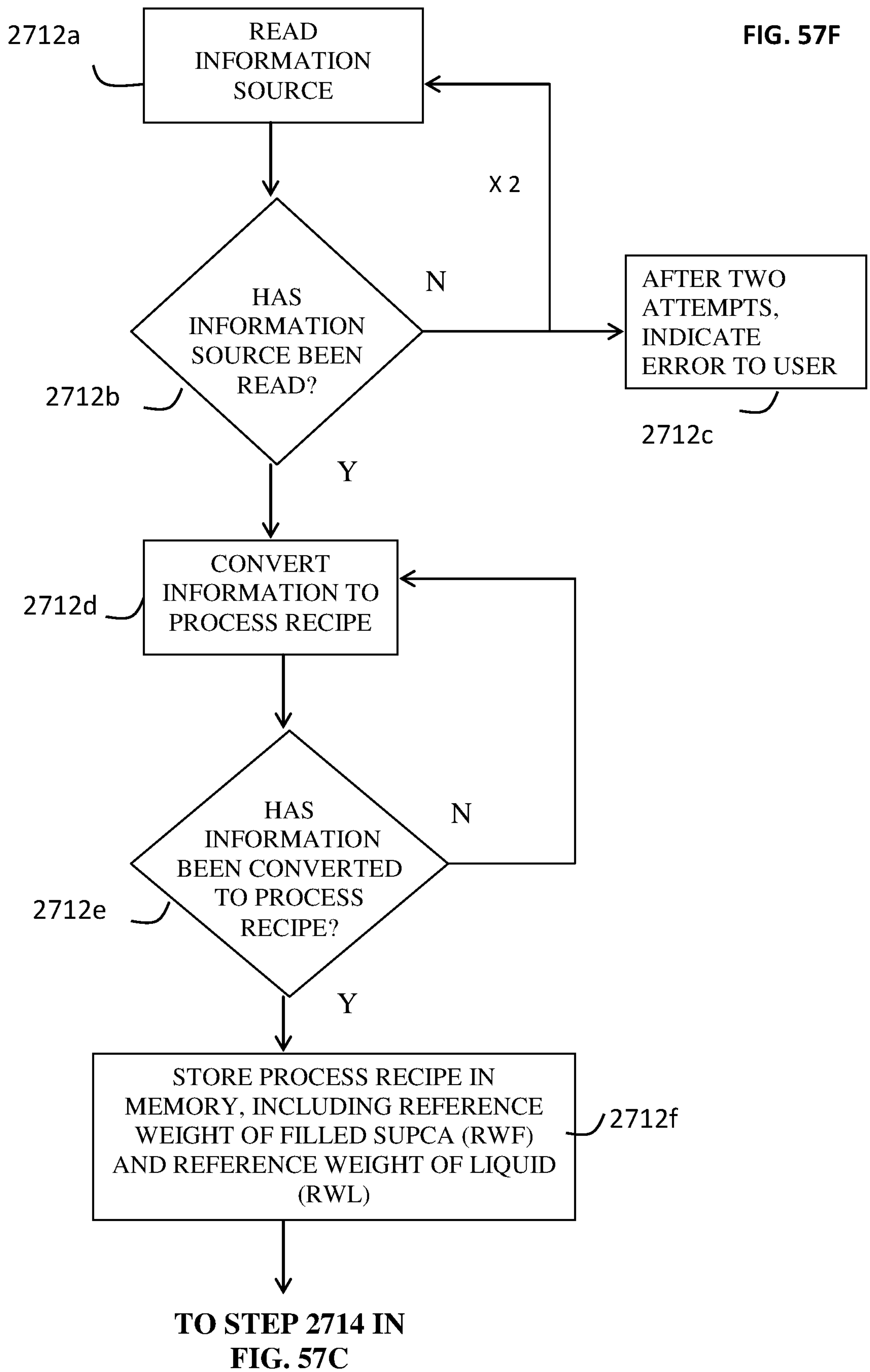

Reference is now made to FIG. 57F, which is a simplified flow chart illustrating sub-steps involved in SUPCA detection step 2712 of flow chart 2700 of FIG. 57C.

As seen in FIG. 57F, MMIDD 1000 preferably reads information contained in or referenced by machine-readable information source 162 of SUCSERDREA 120 at a first SUPCA detection sub-step 2712*a* and then proceeds, at a second SUPCA detection sub-step 2712*b*, to check if the information has been read. If the information contained in or referenced by machine-readable information source 162 has not been read, MMIDD 1000 preferably repeats first SUPCA detection sub-step 2712*a*. By way of example, MMIDD 1000 may repeat first SUPCA detection sub-step 2712*a* twice if second SUPCA detection sub-step 2712*b* successively indicates that the information has not been read. Following two unsuccessful attempts at carrying out first SUPCA detection sub-step 2712*a*, MMIDD 1000 may indicate this to a user, for example by way of appropriate illumination of icons or buttons incorporated in MMIDD 1000, as seen at a third SUPCA detection sub-step 2712*c*.

If the information contained in or referenced by machine-readable information source 162 has been read, MMIDD 1000 preferably decrypts the information at a fourth SUPCA detection sub-step 2712*d*. Particularly preferably, MMIDD 1000 preferably converts at least a portion of the information to a process recipe for processing the contents of the filled SUPCA 100. Such a process recipe preferably includes information relating to time sequencing of rotation of the blade element 160, including intended rpm, rpm threshold levels and timing.

An exemplary set of instruction steps, structured as a 48 byte structure and suitable for inclusion in or to be referenced by machine-readable information source 162 is set forth in Table 1 below. Additional look-up tables relating to various steps outlined in Table 1 are presented in Tables 2 and 3.

TABLE 1

| 48 byte structure | | | | | |
|---|---|---|---|---|---|
| Byte No. | Digit No. | Value range | Value | | Definition |
| 1 | 1 | 0-1 | 0 | | If value is 0, then recipe can only work if MMIDD is connected to internet |
| | | | 1 | | If value is 1, then recipe is fully programmed |
| | 2 | 0-9 | 0-9 | | The value 1-9 determines the "mixing" of the data string. It changes the position of e.g. digit no. 2 to e.g. digit no. 24. This number is used to put the digits in the right order again. |
| | 3 | 0-9 | 0-9 | | Digit to add to total sum of digits for Check Sum analysis. |
| 2 | 1 | 0-2 | 0-255 | SUPCA | Total SUPCA weight (empty SUPCA |
| | 2 | 0-9 | | weight | with ingredients) Each number |
| | 3 | 0-9 | | | corresponds to a weight increment of 3 gr → max is 3 × 255 = 765 gr. |
| 3 | 1 | 0-2 | 0-255 | Liquid | Weight of liquid to be added. Each |
| | 2 | 0-9 | | weight | number corresponds to a weight |
| | 3 | 0-9 | | | increment of 3 gr → max is 3 × 255 = 765 gr. |
| 4 | 1 | 0-1 | 0 | Step 1 | Step is preceded by a 0 sec pause. |
| | | | 1 | definition | Step is preceded by a 4 sec pause. |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 5 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 6 | 1 | 0-1 | 0 | Step 2 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 7 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 8 | 1 | 0-1 | 0 | Step 3 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 9 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 10 | 1 | 0-1 | 0 | Step 4 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 11 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 12 | 1 | 0-1 | 0 | Step 5 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |

TABLE 1-continued 48 byte structure

| Byte No. | Digit No. | Value range | Value | | Definition |
|---|---|---|---|---|---|
| | 3 | 0-9 | 0-9 | | 0 = 2 sec, 1 = 4 sec, 2 = 6 sec, . . . 9 = 20 sec |
| 13 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 14 | 1 | 0-1 | 0 | Step 6 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 15 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 16 | 1 | 0-1 | 0 | Step 7 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 17 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 18 | 1 | 0-1 | 0 | Step 8 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 19 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 20 | 1 | 0-1 | 0 | Step 9 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 21 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 22 | 1 | 0-1 | 0 | Step 10 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 23 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 24 | 1 | 0-1 | 0 | Step 11 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |

TABLE 1-continued

| 48 byte structure | | | | | |
|---|---|---|---|---|---|
| Byte No. | Digit No. | Value range | Value | | Definition |
| 25 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 26 | 1 | 0-1 | 0 | Step 12 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 27 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 28 | 1 | 0-1 | 0 | Step 13 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 29 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 30 | 1 | 0-1 | 0 | Step 14 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 31 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 32 | 1 | 0-1 | 0 | Step 15 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 33 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 34 | 1 | 0-1 | 0 | Step 16 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 35 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 36 | 1 | 0-1 | 0 | Step 17 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 37 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |

TABLE 1-continued

| 48 byte structure | | | | | |
|---|---|---|---|---|---|
| Byte No. | Digit No. | Value range | Value | | Definition |
| 38 | 1 | 0-1 | 0 | Step 18 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 39 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 40 | 1 | 0-1 | 0 | Step 19 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, 9 = 20 sec |
| 41 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 42 | 1 | 0-1 | 0 | Step 20 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, 9 = 20 sec |
| 43 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 44 | 1 | 0-1 | 0 | Step 21 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 45 | 1 | 0-2 | 0-19 | | % of RPM drop threshold. Each |
| | 2 | 0-9 | | | number is 3% → max 19 × 3% = 57% |
| | 3 | 0-9 | 0-9 | | number of repeats for this step |
| 46 | 1 | 0-1 | 0 | lookup | This digit refers to the lookup table of |
| | | | 1 | table 1 | Table 2, relating to the repetition of |
| | 2 | 0-9 | 0-9 | | steps. |
| | 3 | 0-9 | 0-9 | | |
| 47 | 1 | 0-2 | 0-19 | lookup | This digit refers to the lookup table of |
| | 2 | 0-9 | | table 2 | Table 3, relating to the repetition of |
| | 3 | 0-9 | 0-9 | | steps. |
| 48 | 1 | 0-2 | Any | Stop byte | If this byte equals 255, this is the end of |
| | 2 | 0-9 | OR | | the recipe definition. If ≠ just |
| | 3 | 0-9 | 255 | | continuation of recipe definition. |

TABLE 2

Look-up table relating to repetition of steps 1-21, referenced by byte 46

| Digit | Sequence Steps to be Repeated | Comments |
|---|---|---|
| 0 | 0 | Ignore |
| 1 | 1 | Activate |
| 2 | 1, 1 | |
| 3 | 1, 1, 1 | |
| 4 | 1, 2 | |
| 5 | 1, 2, 2 | |

TABLE 2-continued

Look-up table relating to repetition of steps 1-21, referenced by byte 46

| Digit | Sequence Steps to be Repeated | Comments |
|---|---|---|
| 6 | 1, 1, 2, 2 | |
| 7 | 1, 2, 1, 2 | |
| 8 | 2 | |
| 9 | 2, 2 | |
| 10 | 2, 2, 2 | |
| 11 | 1, 2, 3 | |

TABLE 2-continued

| Look-up table relating to repetition of steps 1-21, referenced by byte 46 | | |
|---|---|---|
| Digit | Sequence Steps to be Repeated | Comments |
| 12 | 1, 2, 2, 3, 3 | |
| 13 | 3 | |
| 14 | 3, 3 | |
| 15 | 3, 3, 3 | |
| 16 | 1, 2, 3, 4 | |
| 17 | 1, 2, 2, 3, 4 | |
| 18 | 4 | |
| 19 | 5 | |
| 20 | 6 | |
| 21 | 7 | |
| 22 | 8 | |
| 23 | 9 | |
| 24 | 10 | |
| 25 | 11 | |
| 26 | 12 | |
| 27 | 13 | |
| 28 | 14 | |
| 29 | 15 | |
| 30 | 16 | |
| 31 | 17 | |
| 32 | 18 | |
| 33 | 19 | |
| 34 | 20 | |
| 35 | 21 | |
| 36 | 1, 2, 3, 4, 5, 6, 7 | |
| 37 | 8, 9, 10, 11, 12, 13, 14 | |
| 38 | 15, 16, 17, 18, 19, 20, 21 | |
| 39 | 1, 2, 3, 4, 5, 6 | |
| 40 | 7, 8, 9, 10, 11, 12 | |
| 41 | 13, 14, 15, 16, 17, 18 | |
| 42 | 19, 20, 21 | |
| 43 | 18, 19, 20, 21 | |
| 44 | 17, 18, 19, 20, 21 | |
| 45 | 20, 21 | |
| 46 | 20, 21, 20, 21 | |
| 47 | 20, 21, 20, 21, 20, 21 | |
| 48 | 21, 21 | |
| 49 | 21, 21, 21 | |
| 50 | 21, 21, 21, 21 | |
| 51 | 1, 2, 3, 4, 5, 6, 7, 1, 2, 3, 4, 5, 6, 7 | |
| 52 | 1, 2, 3, 4, 5, 6, 7, 8, 9, 10, 11, 12, 13, 14 | |
| 53 | 17, 18, 19, 20, 21 | |
| 54 | 1, 2, 3, 4, 5 | |
| 55 | 19, 20, 21, 19, 20, 21 | |
| 56 | 18, 19, 20, 21, 18, 19, 20, 21 | |
| 57 | 4, 4 | |
| 58 | 5, 5 | |
| 59 | 6, 6 | |
| 60 | 7, 7 | |
| 61 | 8, 8 | |
| 62 | 9, 9 | |
| 63 | 10, 10 | |
| 64 | 11, 11 | |
| 65 | 12, 12 | |
| 66 | 13, 13 | |
| 67 | 14, 14 | |
| 68 | 15, 15 | |
| 69 | 16, 16 | |
| 70 | 17, 17 | |
| 71 | 18, 18 | |
| 72 | 19, 19 | |
| 73 | 20, 20 | |
| 74 | 16, 17, 18, 19, 20, 21 | |
| 75 | 4, 4, 4 | |
| 76 | 5, 5, 5 | |
| 77 | 6, 6, 6 | |
| 78 | 7, 7, 7 | |
| 79 | 8, 8, 8 | |
| 80 | 9, 9, 9 | |
| 81 | 10, 10, 10 | |
| 82 | 11, 11, 11 | |
| 83 | 12, 12, 12 | |
| 84 | 13, 13, 13 | |
| 85 | 14, 14, 14 | |
| 86 | 15, 15, 15 | |

TABLE 2-continued

| Look-up table relating to repetition of steps 1-21, referenced by byte 46 | | |
|---|---|---|
| Digit | Sequence Steps to be Repeated | Comments |
| 87 | 16, 16, 16 | |
| 88 | 17, 17, 17 | |
| 89 | 18, 18, 18 | |
| 90 | 19, 19, 19 | |
| 91 | 20, 20, 20 | |
| 92 | 1, 3, 5 | |
| 93 | 1, 3, 5, 7 | |
| 94 | 21, 19, 17 | |
| 95 | 21, 19 | |
| 96 | 21, 19, 19 | |
| 97 | 21, 18 | |
| 98 | 1, 2, 3, 1, 2, 3 | |
| 99 | 1, 2, 4 | |
| 100 | 1, 2, 5 | |
| 101 | 1, 2, 6 | |
| 102 | 1, 2, 7 | |
| 103 | 1, 2, 8 | |
| 104 | 1, 2, 9 | |
| 105 | 1, 2, 10 | |
| 106 | 1, 2, 11 | |
| 107 | 1, 2, 12 | |
| 108 | 1, 2, 13 | |
| 109 | 1, 2, 14 | |
| 110 | 1, 2, 15 | |
| 111 | 1, 2, 16 | |
| 112 | 1, 2, 17 | |
| 113 | 1, 2, 18 | |
| 114 | 1, 2, 19 | |
| 115 | 1, 2, 20 | |
| 116 | 1, 2, 21 | |
| 117 | 21, 20, 19 | |
| 118 | 21, 21, 20 | |
| 119 | 21, 21, 21 | |
| 120 | 21, 20, 20 | |
| 121 | 21, 21 | |
| 122 | 8, 9, 10, 11, 12, 13, 14, 8, 9, 10, 11, 12, 13, 14 | |
| 123 | 7, 8, 9, 10, 11, 12, 13, 14, 15, 16, 17, 18 | |
| 124 | 13, 14, 15, 16, 17, 18 | |
| 125 | 15, 16, 17, 18, 19, 20, 21, 15, 16, 17, 18, 19, 20, 21 | |
| 126 | 17, 18, 19, 20, 21, 17, 18, 19, 20, 21 | |
| 127 | 1, 2, 1, 2, 1, 2 | |
| 128 | 1, 2, 3, 4, 5, 18, 19, 20, 21, | |
| 129 | 1, 2, 3, 4, 5, 6, 7, 8, 9, 10 | |
| 130 | 4, 5, 6 | |
| 131 | 4, 5, 6, 7 | |
| 132 | 4, 5, 6, 7, 8 | |
| 133 | 4, 5, 6, 7, 8, 9 | |
| 134 | 4, 5, 6, 7, 8, 9, 10 | |
| 135 | 4, 5, 6, 7, 8, 9, 10, 11 | |
| 136 | 4, 5, 6, 7, 8, 9, 10, 11, 12 | |
| 137 | 6, 7, 8, 9 | |
| 138 | 6, 7, 8, 9, 10 | |
| 139 | 6, 7, 8, 9, 10, 11 | |
| 140 | 6, 7, 8, 9, 10, 11, 12 | |
| 141 | 6, 7, 8, 9, 10, 11, 12, 13 | |
| 142 | 7, 8, 9, 10 | |
| 143 | 7, 8, 9, 10, 11 | |
| 144 | 7, 8, 9, 10, 11, 12 | |
| 145 | 7, 8, 9, 10, 11, 12, 13 | |
| 146 | 7, 8, 9, 10, 11, 12, 13, 14 | |
| 147 | 8, 9, 10 | |
| 148 | 8, 9, 10, 11 | |
| 149 | 8, 9, 10, 11, 12 | |
| 150 | 8, 9, 10, 11, 12, 13 | |
| 151 | 8, 9, 10, 11, 12, 13, 14 | |
| 152 | 8, 9, 10, 11, 12, 13, 14, 15 | |
| 153 | 9, 10, 11 | |
| 154 | 9, 10, 11, 12 | |
| 155 | 9, 10, 11, 12, 13 | |
| 156 | 9, 10, 11, 12, 13, 14 | |
| 157 | 9, 10, 11, 12, 13, 14, 15 | |
| 158 | 9, 10, 11, 12, 13, 14, 15, 16 | |

TABLE 2-continued

Look-up table relating to repetition of steps 1-21, referenced by byte 46

| Digit | Sequence Steps to be Repeated | Comments |
|---|---|---|
| 159 | 10, 11, 12 | |
| 160 | 10, 11, 12, 13 | |
| 161 | 10, 11, 12, 13, 14 | |
| 162 | 10, 11, 12, 13, 14, 15 | |
| 163 | 10, 11, 12, 13, 14, 15, 16 | |
| 164 | 10, 11, 12, 13, 14, 15, 16, 17 | |
| 165 | 11, 12, 13 | |
| 166 | 11, 12, 13, 14 | |
| 167 | 11, 12, 13, 14, 15 | |
| 168 | 11, 12, 13, 14, 15, 16 | |
| 169 | 11, 12, 13, 14, 15, 16, 17 | |
| 170 | (ref: 10 sec break)21, (ref: 10 sec break), 20 | time out long |
| 171 | 21, 20, 21, 20 | |
| 172 | 21, 20, 21, 20, 21, 20 | |
| 173 | 21, 20, 21, 20, 21, 20, 21, 20 | |
| 174 | 21, 20, 19, 21, 20, 19 | |
| 175 | 21, 18, 21, 18 | |
| 176 | 21, 19, 21, 19 | |
| 177 | 21, 18, 21, 18 | |
| 178 | 21, 18, 21, 18, 21, 18 | |
| 179 | 21, 17, 21, 17 | |
| 180 | 21, 17, 21, 17, 21, 17 | |
| 181 | 21, 1 | |
| 182 | 21, 1, 2 | |
| 183 | 21, 1, 2, 21, 1 | |
| 184 | 21, 1, 2, 21, 1, 2 | |
| 185 | 21, 1, 21, 1 | |
| 186 | 21, 1, 21, 1, 21, 1 | |
| 187 | 21, 1, 2, 3 | |
| 188 | 21, 1, 2, 2 | |
| 189 | 21, 1, 2, 21, 1 | |
| 190 | 21, 1, 2, 3, 21 | |
| 191 | 21, 1, 2, 3, 4 | |
| 192 | 21, 1, 2, 3, 4, 5 | |
| 193 | 21, 8 | |
| 194 | 21, 8, 9 | |
| 195 | 21, 8, 21, 8 | |
| 196 | 21, 9 | |
| 197 | 21, 2 | |
| 198 | 21, 3 | |
| 199 | 21, 4 | |
| 200 | 21, 5 | |
| 201 | 21, 6 | |
| 202 | 21, 7 | |
| 203 | 21, 8 | |
| 204 | 21, 9 | |
| 205 | 21, 10 | |
| 206 | 21, 11 | |
| 207 | 21, 12 | |
| 208 | 21, 13 | |
| 209 | 21, 14 | |
| 210 | 21, 15 | |
| 211 | 21, 16 | |
| 212 | 21, 17 | |
| 213 | 21, 18 | |
| 214 | 21, 19 | |
| 215 | 21, 1, 2, 3, 4, 5, 6 | |
| 216 | 21, 7, 8, 9 | |
| 217 | 21, 10, 11, 12, 13 | |
| 218 | 21, 9, 21, 9 | |
| 219 | 21, 2, 21, 2 | |
| 220 | 21, 3, 21, 3 | |
| 221 | 21, 4, 21, 4 | |
| 222 | 21, 5, 21, 5 | |
| 223 | 21, 6, 21, 6 | |
| 224 | 21, 7, 21, 7 | |
| 225 | 21, 8, 21, 8 | |
| 226 | 21, 9, 21, 9 | |
| 227 | 21, 10, 21, 10 | |
| 228 | 21, 11, 21, 11 | |
| 229 | 21, 12, 21, 12 | |
| 230 | 21, 13, 21, 13 | |
| 231 | 21, 14, 21, 14 | |
| 232 | 21, 15, 21, 15 | |
| 233 | 21, 16, 21, 16 | |
| 234 | 21, 17, 21, 17 | |
| 235 | 21, 18, 21, 18 | |
| 236 | 21, 19, 21, 19 | |
| 237 | 21, 9, 21, 9, 21, 9 | |
| 238 | 21, 2, 21, 2, 21, 2 | |
| 239 | 21, 3, 21, 3, 21, 3 | |
| 240 | 21, 4, 21, 4, 21, 4 | |
| 241 | 21, 5, 21, 5, 21, 5 | |
| 242 | 21, 6, 21, 6, 21, 6 | |
| 243 | 21, 7, 21, 7, 21, 7 | |
| 244 | 21, 8, 21, 8, 21, 8 | |
| 245 | 21, 9, 21, 9, 21, 9 | |
| 246 | 21, 10, 21, 10, 21, 10 | |
| 247 | 21, 11, 21, 11, 21, 11 | |
| 248 | 21, 12, 21, 12, 21, 12 | |
| 249 | 21, 13, 21, 13, 21, 13 | |
| 250 | 21, 14, 21, 14, 21, 14 | |
| 251 | 21, 15, 21, 15, 21, 15 | |
| 252 | 21, 16, 21, 16, 21, 16 | |
| 253 | 21, 17, 21, 17, 21, 17 | |
| 254 | 21, 18, 21, 18, 21, 18 | |
| 255 | 21, 19, 21, 19, 21, 19 | |

TABLE 3

Look-up table relating to the repetition of steps, referenced by byte 47

| Digit | Sequence Steps to be Repeated | Comments |
|---|---|---|
| 0 | 0 | Ignore |
| 1 | 22 | Activate |
| 2 | 22, 22 | |
| 3 | 22, 21, 22 | |
| 4 | 1, 1 | |
| 5 | 1, 1, 1 | |
| 6 | 1, 2 | |
| 7 | 1, 2, 2 | |
| 8 | 1, 1, 2, 2 | |
| 9 | 1, 2, 1, 2 | |
| 10 | 2 | |
| 11 | 2, 2 | |
| 12 | 2, 2, 2 | |
| 13 | 1, 2, 3 | |
| 14 | 1, 2, 2, 3, 3 | |
| 15 | 3 | |
| 16 | 3, 3 | |
| 17 | 3, 3, 3 | |
| 18 | 1, 2, 3, 4 | |
| 19 | 1, 2, 2, 3, 4 | |
| 20 | 4 | |
| 21 | 5 | |
| 22 | 6 | |
| 23 | 7 | |
| 24 | 8 | |
| 25 | 9 | |
| 26 | 10 | |
| 27 | 11 | |
| 28 | 12 | |
| 29 | 13 | |
| 30 | 14 | |
| 31 | 15 | |
| 32 | 16 | |
| 33 | 17 | |
| 34 | 18 | |
| 35 | 19 | |
| 36 | 20 | |
| 37 | 21 | |
| 38 | 12, 13, 14, | |
| 39 | 12, 13, 14, 15 | |
| 40 | 12, 13, 14, 15, 16 | |

TABLE 3-continued

Look-up table relating to the repetition of steps, referenced by byte 47

| Digit | Sequence Steps to be Repeated | Comments |
|---|---|---|
| 41 | 12, 13, 14, 15, 16, 17 | |
| 42 | 12, 13, 14, 15, 16, 17, 18 | |
| 43 | 13, 14, 15 | |
| 44 | 13, 14, 15, 16 | |
| 45 | 13, 14, 15, 16, 17 | |
| 46 | 13, 14, 15, 16, 17, 18 | |
| 47 | 13, 14, 15, 16, 17, 18, 19 | |
| 48 | 13, 14, 15, 16, 17, 18, 19, 20 | |
| 49 | 13, 14, 15, 16, 17, 18, 19, 20, 21 | |
| 50 | 14, 15, 16 | |
| 51 | 14, 15, 16, 17 | |
| 52 | 14, 15, 16, 17, 18 | |
| 53 | 14, 15, 16, 17, 18, 19, 20, 21 | |
| 54 | 14, 15, 16, 17, 18, 19, 20 | |
| 55 | 14, 15, 16, 17, 18, 19, 20, 21 | |
| 56 | 15, 16, 17 | |
| 57 | 15, 16, 17, 18 | |
| 58 | 15, 16, 17, 18, 19 | |
| 59 | 15, 16, 17, 18, 19, 20 | |
| 60 | 15, 16, 17, 18, 19, 20, 21 | |
| 61 | 16, 17, 18 | |
| 62 | 16, 17, 18, 19 | |
| 63 | 16, 17, 18, 19, 20 | |
| 64 | 16, 17, 18, 19, 20, 21 | |
| 65 | 17, 18, 19 | |
| 66 | 17, 18, 19, 20 | |
| 67 | 17, 18, 19, 20, 21 | |
| 68 | 18, 19, 20 | |
| 69 | 1, 2, 3, 4, 5, 6, 7 | |
| 70 | 8, 9, 10, 11, 12, 13, 14 | |
| 71 | 15, 16, 17, 18, 19, 20, 21 | |
| 72 | 1, 2, 3, 4, 5, 6 | |
| 73 | 7, 8, 9, 10, 11, 12 | |
| 74 | 13, 14, 15, 16, 17, 18 | |
| 75 | 19, 20, 21 | |
| 76 | 18, 19, 20, 21 | |
| 77 | 17, 18, 19, 20, 21 | |
| 78 | 20, 21 | |
| 79 | 20, 21, 20, 21 | |
| 80 | 20, 21, 20, 21, 20, 21 | |
| 81 | 21, 21 | |
| 82 | 21, 21, 21 | |
| 83 | 21, 21, 21, 21 | |
| 84 | 1, 2, 3, 4, 5, 6, 7, 1, 2, 3, 4, 5, 6, 7 | |
| 85 | 1, 2, 3, 4, 5, 6, 7, 8, 9, 10, 11, 12, 13, 14 | |
| 86 | 17, 18, 19, 20, 21 | |
| 87 | 1, 2, 3, 4, 5 | |
| 88 | 19, 20, 21, 19, 20, 21 | |
| 89 | 18, 19, 20, 21, 18, 19, 20, 21 | |
| 90 | 4, 5, 6 | |
| 91 | 4, 5, 6, 7 | |
| 92 | 4, 5, 6, 7, 8 | |
| 93 | 4, 5, 6, 7, 8, 9 | |
| 94 | 4, 5, 6, 7, 8, 9, 10 | |
| 95 | 4, 5, 6, 7, 8, 9, 10, 11 | |
| 96 | 4, 5, 6, 7, 8, 9, 10, 11, 12 | |
| 97 | 6, 7, 8, 9 | |
| 98 | 6, 7, 8, 9, 10 | |
| 99 | 6, 7, 8, 9, 10, 11 | |
| 100 | 6, 7, 8, 9, 10, 11, 12 | |
| 101 | 6, 7, 8, 9, 10, 11, 12, 13 | |
| 102 | 7, 8, 9, 10 | |
| 103 | 7, 8, 9, 10, 11 | |
| 104 | 7, 8, 9, 10, 11, 12 | |
| 105 | 7, 8, 9, 10, 11, 12, 13 | |
| 106 | 7, 8, 9, 10, 11, 12, 13, 14 | |
| 107 | 8, 9, 10 | |
| 108 | 8, 9, 10, 11 | |
| 109 | 8, 9, 10, 11, 12 | |
| 110 | 8, 9, 10, 11, 12, 13 | |
| 111 | 8, 9, 10, 11, 12, 13, 14 | |
| 112 | 8, 9, 10, 11, 12, 13, 14, 15 | |
| 113 | 9, 10, 11 | |
| 114 | 9, 10, 11, 12 | |
| 115 | 9, 10, 11, 12, 13 | |

TABLE 3-continued

Look-up table relating to the repetition of steps, referenced by byte 47

| Digit | Sequence Steps to be Repeated | Comments |
|---|---|---|
| 116 | 9, 10, 11, 12, 13, 14 | |
| 117 | 9, 10, 11, 12, 13, 14, 15 | |
| 118 | 9, 10, 11, 12, 13, 14, 15, 16 | |
| 119 | 10, 11, 12 | |
| 120 | 10, 11, 12, 13 | |
| 121 | 10, 11, 12, 13, 14 | |
| 122 | 10, 11, 12, 13, 14, 15 | |
| 123 | 10, 11, 12, 13, 14, 15, 16 | |
| 124 | 10, 11, 12, 13, 14, 15, 16, 17 | |
| 125 | 11, 12, 13 | |
| 126 | 11, 12, 13, 14 | |
| 127 | 11, 12, 13, 14, 15 | |
| 128 | 11, 12, 13, 14, 15, 16 | |
| 129 | 11, 12, 13, 14, 15, 16, 17 | |
| 130 | 21, 20 | time out long |
| 131 | 21, 20, 21, 20 | |
| 132 | 21, 20, 21, 20, 21, 20 | |
| 133 | 21, 20, 21, 20, 21, 20, 21, 20 | |
| 134 | 21, 20, 19, 21, 20, 19 | |
| 135 | 21, 18, 21, 18 | |
| 136 | 21, 19, 21, 19 | |
| 137 | 21, 18, 21, 18 | |
| 138 | 21, 18, 21, 18, 21, 18 | |
| 139 | 21, 17, 21, 17 | |
| 140 | 21, 17, 21, 17, 21, 17 | |
| 141 | 21, 1 | |
| 142 | 21, 1, 2 | |
| 143 | 21, 1, 2, 21, 1 | |
| 144 | 21, 1, 2, 21, 1, 2 | |
| 145 | 21, 1, 21, 1 | |
| 146 | 21, 1, 21, 1, 21, 1 | |
| 147 | 21, 1, 2, 3 | |
| 148 | 21, 1, 2, 2 | |
| 149 | 21, 1, 2, 21, 1 | |
| 150 | 21, 1, 2, 3, 21 | |
| 151 | 21, 1, 2, 3, 4 | |
| 152 | 21, 1, 2, 3, 4, 5 | |
| 153 | 21, 8 | |
| 154 | 21, 8, 9 | |
| 155 | 21, 8, 21, 8 | |
| 156 | 21, 9 | |
| 157 | 21, 2 | |
| 158 | 21, 3 | |
| 159 | 21, 4 | |
| 160 | 21, 5 | |
| 161 | 21, 6 | |
| 162 | 21, 7 | |
| 163 | 21, 8 | |
| 164 | 21, 9 | |
| 165 | 21, 10 | |
| 166 | 21, 11 | |
| 167 | 21, 12 | |
| 168 | 21, 13 | |
| 169 | 21, 14 | |
| 170 | 21, 15 | |
| 171 | 21, 16 | |
| 172 | 21, 17 | |
| 173 | 21, 18 | |
| 174 | 21, 19 | |
| 175 | 21, 1, 2, 3, 4, 5, 6 | |
| 176 | 21, 7, 8, 9 | |
| 177 | 21, 10, 11, 12, 13 | |
| 178 | 21, 9, 21, 9 | |
| 179 | 21, 2, 21, 2 | |
| 180 | 21, 3, 21, 3 | |
| 181 | 21, 4, 21, 4 | |
| 182 | 21, 5, 21, 5 | |
| 183 | 21, 6, 21, 6 | |
| 184 | 21, 7, 21, 7 | |
| 185 | 21, 8, 21, 8 | |
| 186 | 21, 9, 21, 9 | |
| 187 | 21, 10, 21, 10 | |
| 188 | 21, 11, 21, 11 | |
| 189 | 21, 12, 21, 12 | |
| 190 | 21, 13, 21, 13 | |

TABLE 3-continued

Look-up table relating to the repetition of steps, referenced by byte 47

| Digit | Sequence Steps to be Repeated | Comments |
|---|---|---|
| 191 | 21, 14, 21, 14 | |
| 192 | 21, 15, 21, 15 | |
| 193 | 21, 16, 21, 16 | |
| 194 | 21, 17, 21, 17 | |
| 195 | 21, 18, 21, 18 | |
| 196 | 21, 19, 21, 19 | |
| 197 | 21, 9, 21, 9, 21, 9 | |
| 198 | 21, 2, 21, 2, 21, 2 | |
| 199 | 21, 3, 21, 3, 21, 3 | |
| 200 | 21, 4, 21, 4, 21, 4 | |
| 201 | 21, 5, 21, 5, 21, 5 | |
| 202 | 21, 6, 21, 6, 21, 6 | |
| 203 | 21, 7, 21, 7, 21, 7 | |
| 204 | 21, 8, 21, 8, 21, 8 | |
| 205 | 21, 9, 21, 9, 21, 9 | |
| 206 | 21, 10, 21, 10, 21, 10 | |
| 207 | 21, 11, 21, 11, 21, 11 | |
| 208 | 21, 12, 21, 12, 21, 12 | |
| 209 | 21, 13, 21, 13, 21, 13 | |
| 210 | 21, 14, 21, 14, 21, 14 | |
| 211 | 21, 15, 21, 15, 21, 15 | |
| 212 | 21, 16, 21, 16, 21, 16 | |
| 213 | 21, 17, 21, 17, 21, 17 | |
| 214 | 21, 18, 21, 18, 21, 18 | |
| 215 | 21, 19, 21, 19, 21, 19 | |

MMIDD 1000 preferably checks that the information has been successfully converted to a process recipe at a fifth SUPCA detection sub-step 2712*e*. If the information has not been successfully converted to a process recipe, MMIDD 1000 may repeat fourth SUPCA detection sub-step 2712*d*, preferably up to an additional two times.

If the information has been successfully converted to a process recipe, MMIDD 1000 preferably proceeds to store the obtained process recipe in a memory device of MMIDD 1000, such as an RAM memory, as seen at a sixth SUPCA detection sub-step 2712*f*. MMIDD 1000 preferably additionally stores the reference weight of the filled SUPCA 100 (RWF) and the reference weight of the liquid (RWL) to be added by the user to the filled SUPCA 100 prior to processing by the MMIDD 1000, which RWF and RWL values are preferably included in machine-readable information source 162.

Figure 57G:
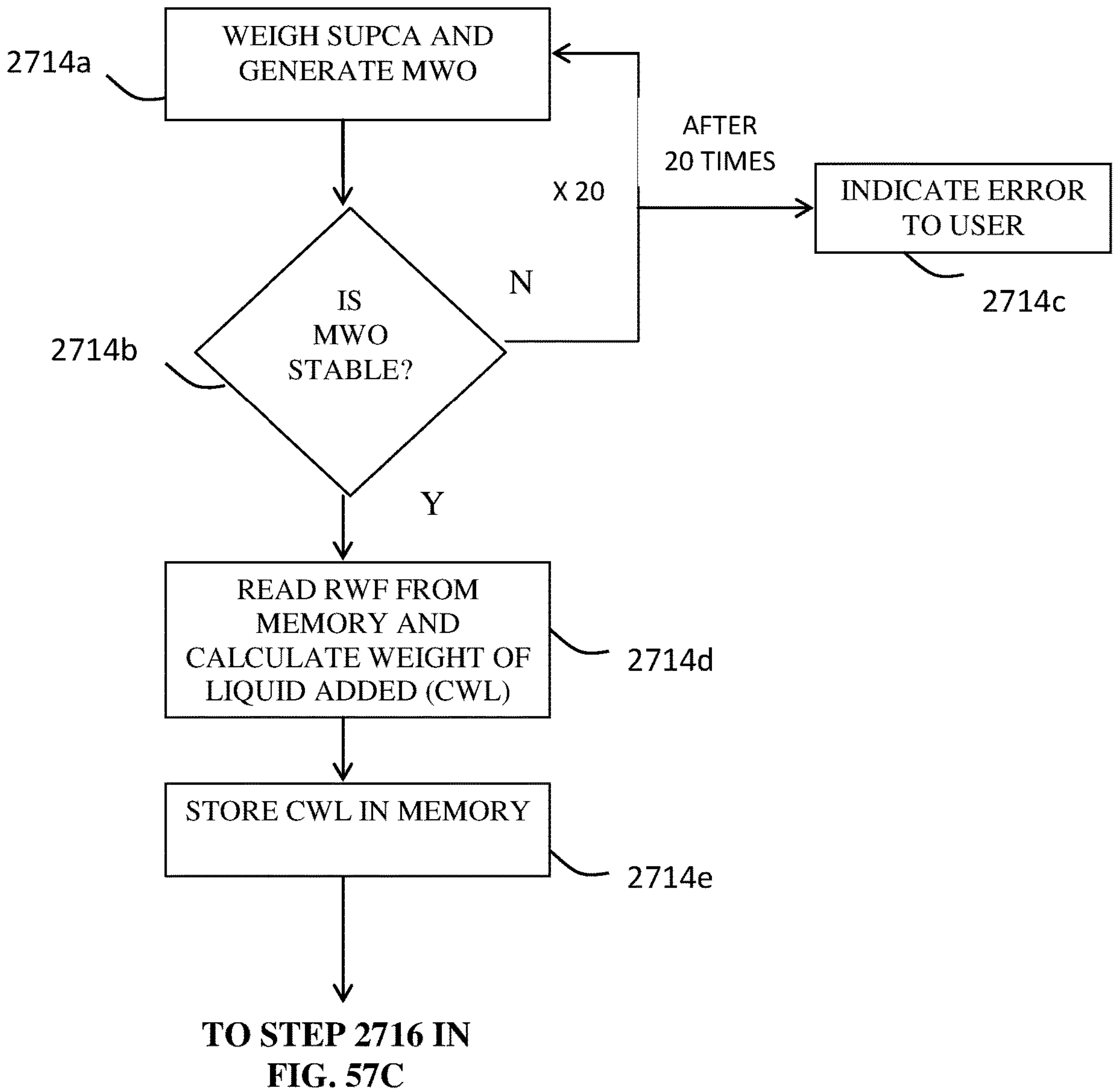

Reference is now made to FIG. 57G, which is a simplified flow chart illustrating sub-steps involved in SUPCA weighing step 2714 of flow chart 2700 of FIG. 57C.

As seen in FIG. 57G, MMIDD 1000 preferably weighs the filled SUPCA 100 by means of load cells 1560, as seen at a first SUPCA weighing sub-step 2714*a*, and generates a MWO (Measured Weight Output). MMIDD 1000 then checks at a second SUPCA weighing sub-step 2714*b* if the MWO generated at first SUPCA weighing sub-step 2714*a* is stable. If the MWO is not found to be stable, first SUPCA weighing sub-step 2714*a* is preferably repeated until a stable MWO is obtained. If following multiple repetitions of first SUPCA weighing sub-step 2714*a* a stable MWO has not been obtained, the user is preferably alerted of this at a third SUPCA weighing sub-step 2714*c*. Such alert may be, for example, by way of appropriate illumination of icons and/or buttons incorporated in MMIDD 1000. MMIDD 1000 preferably repeats first and second SUPCA weighing sub-steps 2714*a* and 2714*b* up to 20 times in order to obtain a stable MWO and before MMIDD 1000 alerts a user of malfunction at third SUPCA weighing sub-step 2714*c*. Malfunction may be due to MMIDD 1000 not being placed on a flat and/or stable surface, for example due to MMIDD 1000 not being free standing or due to the user touching or leaning on MMIDD 1000.

Following the generation of a stable MWO, MMIDD 1000 preferably calculates the weight of the liquid added by the user (CWL), as seen at a fourth SUPCA weighing sub-step 2714*d*. The CWL is preferably calculated based on subtracting the RWF stored in the memory of the MMIDD 1000 from the MWO. MMIDD 1000 preferably then stores the CWL value obtained, as seen at a fifth SUPCA weighing sub-step 2714*e*.

Reference is now made to FIG. 57H, which is a simplified flow chart illustrating sub-steps involved in recipe modification step 2716 of flow chart 2700 of FIG. 57C.

As seen in FIG. 57H, MMIDD 1000 compares the CWL value obtained at step 2714*d* to the RWL value stored at step 2712*f* and ascertains whether the CWL is less than the RWL by a weight value equal to or less than a lower predetermined limit, as seen at a first recipe modification sub-step 2716*a*. If the CWL is outside of the acceptable predetermined limits thereof, MMIDD 1000 requires the addition of liquid to filled SUPCA 100. The user is alerted of this at a second recipe modification sub-step 2716*b*.

If the CWL lies within acceptable limits, as found at first recipe modification sub-step 2716*a*, MMIDD 1000 proceeds to derive a liquid weight offset percentage (LWOP), defined as ((CWL−RWL)/RWL)*100, as seen at a third recipe modification sub-step 2716*c*. It is understood that the LWOP expresses the deviation of the actual weight of the liquid added from the intended weight of the liquid to be added, which intended weight of the liquid to be added is preferably contained in the machine-readable information source 162.

MMIDD 1000 preferably modifies the processing recipe as necessary based on the derived LWOP. By way of example only, as illustrated at third recipe modification sub-step 2716*c*, if the LWOP lies between 0-5% the process recipe may not require modification; if the LWOP lies between 5-10% then the rpm may be reduced to 80% of the intended rpm included in the processing recipe and the processing time may be reduced to 90% of the intended processing time; if the LWOP lies between 10-15% then the rpm may be reduced to 70% of the intended rpm and the processing time may be reduced to 85% of the intended processing time; if the LWOP lies between 15-20% then the rpm may be reduced to 60% of the intended rpm and the processing time may be reduced to 85% of the intended processing time; if the LWOP is greater than 20%, then the rpm may be reduced to 60% of the intended rpm and the processing time may be reduced to 60% of the intended processing time; if the LWOP lies between 0-−5% then the process recipe may not require modification; if the LWOP lies between −5%-−10% then the rpm may unmodified and the processing time may be increased to 120% of the intended processing time; and if the LWOP is less than −10% then more liquid may be required. It is appreciated that these ranges applicable to the LWOP are exemplary only and may be modified in accordance with the contents and processing requirements of SUPCA 100.

The MMIDD 1000 preferably stores the process recipe, including any modifications thereto, in a memory thereof, as seen at a fourth recipe modification sub-step 2716*d*.

Figure 57I:
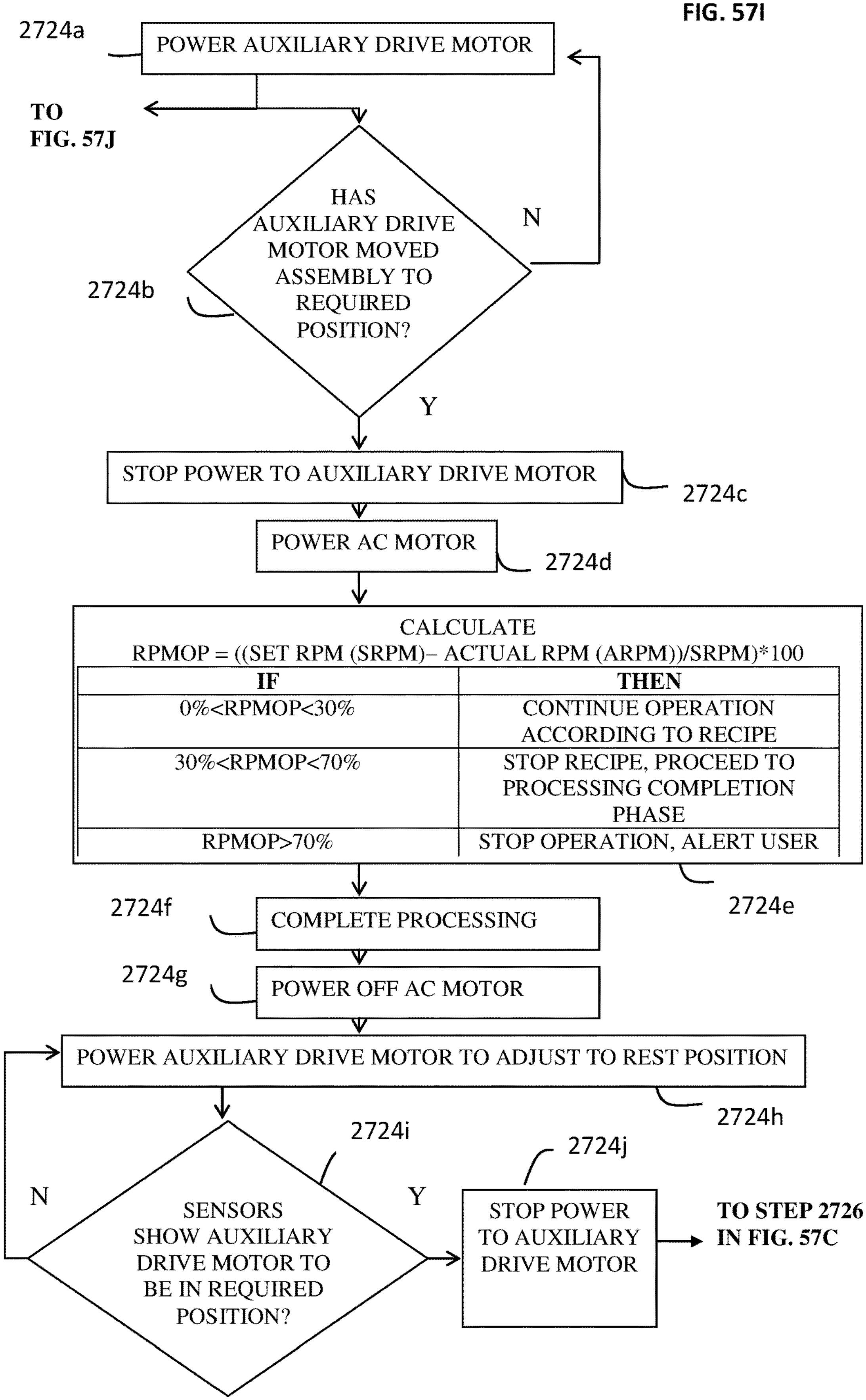
Figure 57J:
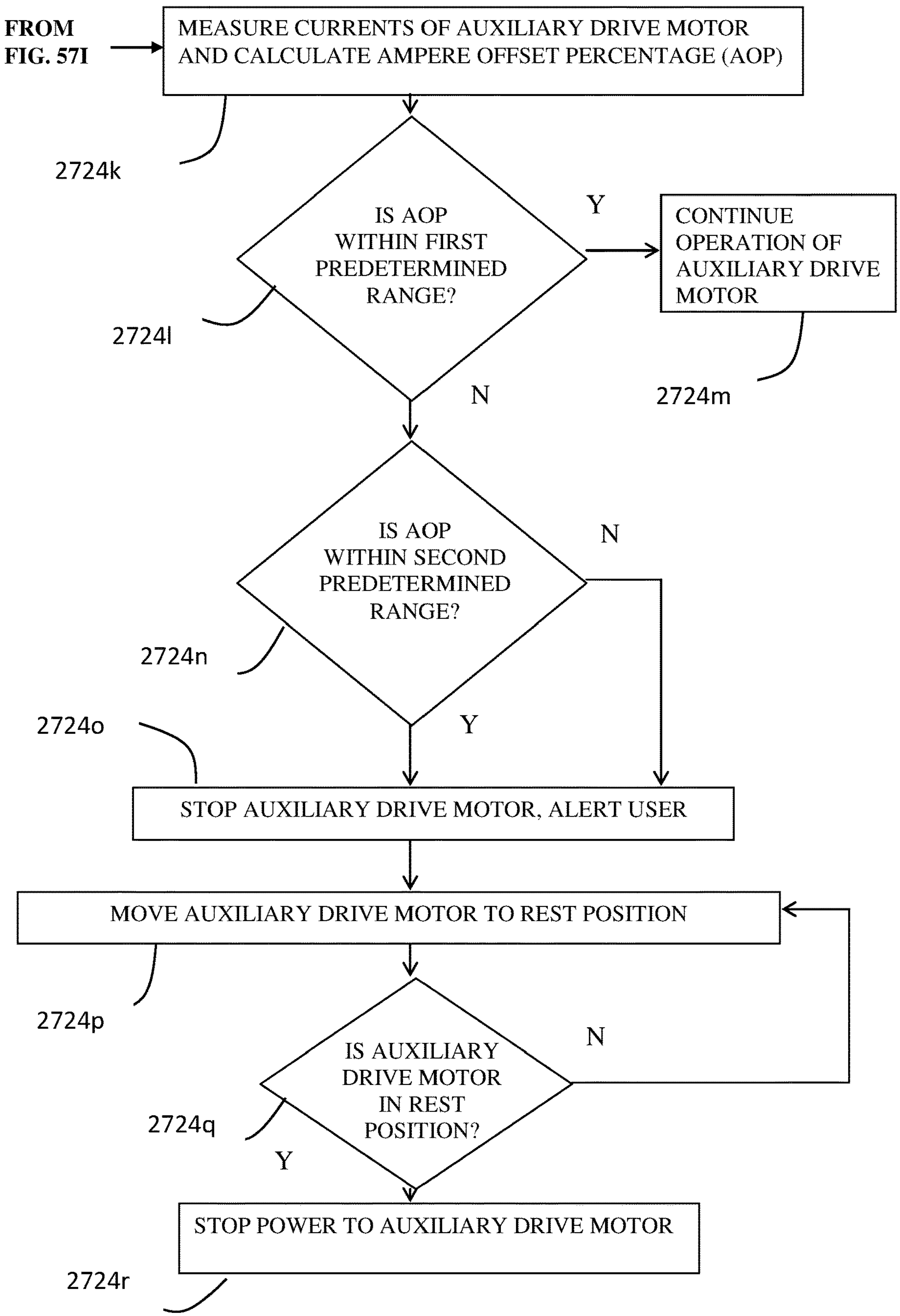

Reference is now made to FIGS. 57I and 57J, which are together a simplified flow chart illustrating sub-steps involved in processing step 2724 of flow chart 2700 of FIG. 57C.

As seen in FIG. 57I, MMIDD 1000 preferably powers auxiliary rotary drive motor 1520 at a first processing sub-step 2724*a* so as to move vertically displacing rotary drive motor assembly 1430 to its highest position, as shown in FIG. 39D. By way of example, auxiliary rotary drive motor 1520 may be rotated in an anticlockwise direction at first processing sub-step 2724*a*. If adjustment of auxiliary rotary drive motor 1520 and hence of vertically displacing rotary drive motor assembly 1430 is complete, as checked at second processing sub-step 2724*b*, power to auxiliary rotary drive motor 1520 is stopped, as seen at third processing sub-step 2724*c*.

Following the stopping of power to auxiliary rotary drive motor 1520 at third processing sub-step 2724*c*, power is provided to AC motor 1904 at a fourth processing sub-step 2724*d*. AC motor 1904 preferably drives blade element 160 in rotational motion for processing the contents of SUPCA 100, in accordance with the modified process recipe generated and stored at recipe modification step 2716.

As seen at a fifth processing sub-step 2724*e*, during operation of AC motor 1904 MMIDD 1000 compares the actual rpm (ARPM) delivered by AC motor 1904 to the set rpm (SRPM) according to the process recipe, as modified at recipe modification step 2716, and derives a rpm offset percentage (RPMOP) based thereon for each stage in the process recipe. RPMOP may be defined as ((SRPM−ARPM)/SRPM)*100. If the RPMOP lies within a first predetermined range, such as between 0%-30%, MMIDD 1000 continues to operate in accordance with the processing recipe. If the RPMOP reaches a second predetermined range, such as between 30%-70%, indicating that processing is nearly complete, MMIDD 1000 enters a processing completion phase as set forth in the appropriate process recipe and as seen at sixth processing sub-step 2724*f*. AC motor 1904 is then powered off at a seventh processing sub-step 2724*g* and auxiliary rotary drive motor 1520 repowered at an eighth operation sub-step 2724*h* in order to return vertically displacing rotary drive motor assembly 1430 to the rest position thereof.

During operation of AC motor 1904 the current draw thereof is also preferably continuously checked in order to ascertain that overloading of AC motor 1904 has not occurred. Should the current be found to exceed a predetermined threshold, thus indicating the possibility of overloading, AC motor 1904 is preferably powered off.

As seen at a ninth processing sub-step 2724*i*, one or more sensors preferably check whether vertically displacing rotary drive motor assembly 1430 has assumed the required position. By way of example only, ninth processing sub-step 2724*i* may involve checking by optical sensors or the use of micro switches. If the sensors confirm that vertically displacing rotary drive motor assembly 1430 has returned to its rest position, power is stopped to auxiliary rotary drive motor 1520 at a tenth processing sub-step 2724*j*.

Turning now to FIG. 57J, the current of auxiliary rotary drive motor 1520 is preferably continuously measured following the onset of first processing sub-step 2724*a*. As seen at an eleventh processing sub-step 2724*k*, measured currents (AREAD) are compared to a predetermined current map (AMAP) and an ampere offset percentage (AOP) defined as ((AMAP−AREAD)/AMAP)*100. If the AOP is found to lie within an acceptable predetermined range, as queried at a twelfth processing sub-step 2724*l*, power is continued to be supplied to auxiliary rotary drive motor 1520 at a thirteenth processing sub-step 2724*m*. If the AOP is found to lie within or beyond a second predetermined range, as queried at a fourteenth processing sub-step 2724*n*, power to auxiliary rotary drive motor 1520 is stopped, as seen at a fifteenth processing sub-step 2724*o* and the user is notified accordingly. Auxiliary rotary drive motor 1520 is preferably returned to its initial rest position at a sixteenth processing sub-step 2724*p*, the return of auxiliary rotary drive motor 1520 to its rest position is checked at a seventeenth processing sub-step 2724*q*, and power to the auxiliary rotary drive motor 1520 is then stopped at an eighteenth processing sub-step 2724*r*.

It is understood that the various steps and sub-steps detailed hereinabove with reference to control operation of the MMIDD 1000 are not necessarily performed in the order listed. Furthermore, depending on the particular configuration of the MMIDD and SUPCA employed, various ones of the steps and/or sub-steps may be obviated or may be replaced by alternative appropriate steps. In particular, it is appreciated that the control operation described hereinabove may be relevant to the embodiment of MMIDD 1000 described hereinabove with reference to FIGS. 1-56B as well as to the various embodiments of MMIDD described hereinbelow, with appropriate modifications as necessary.

It is understood that the above described operation of the MMIDD 1000 may be applicable, with appropriate modifications, to alternative versions of the MMIDD described hereinbelow.

Figure 58A:
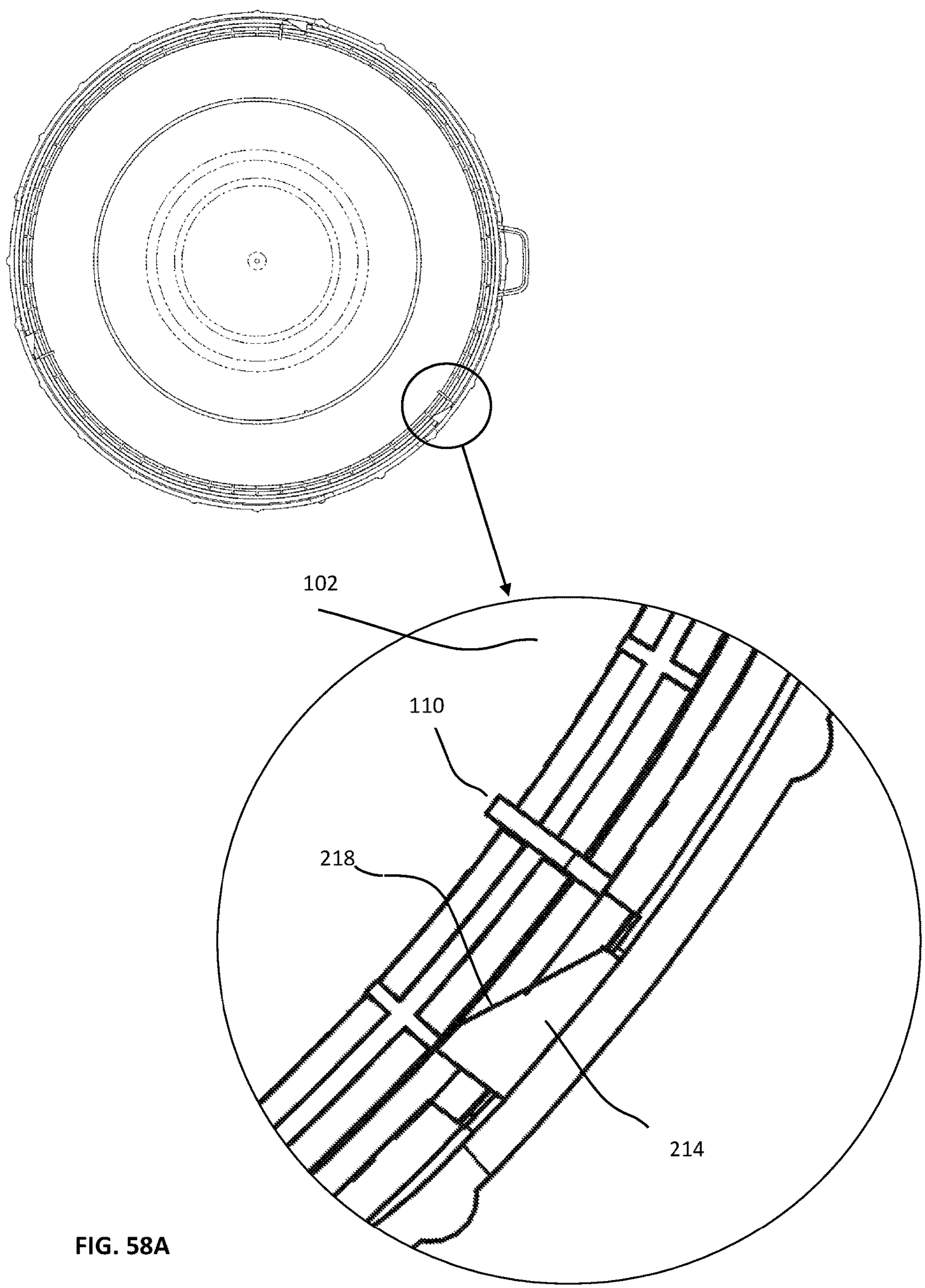
FIGS. 58A and 58B are simplified illustrations of the disengagement of the SUCSERDREA from the container body of the SUPCA in a situation where the SUPCA was not earlier processed by the MMIDD or in accordance with an alternative embodiment of the present invention.
Figure 58B:
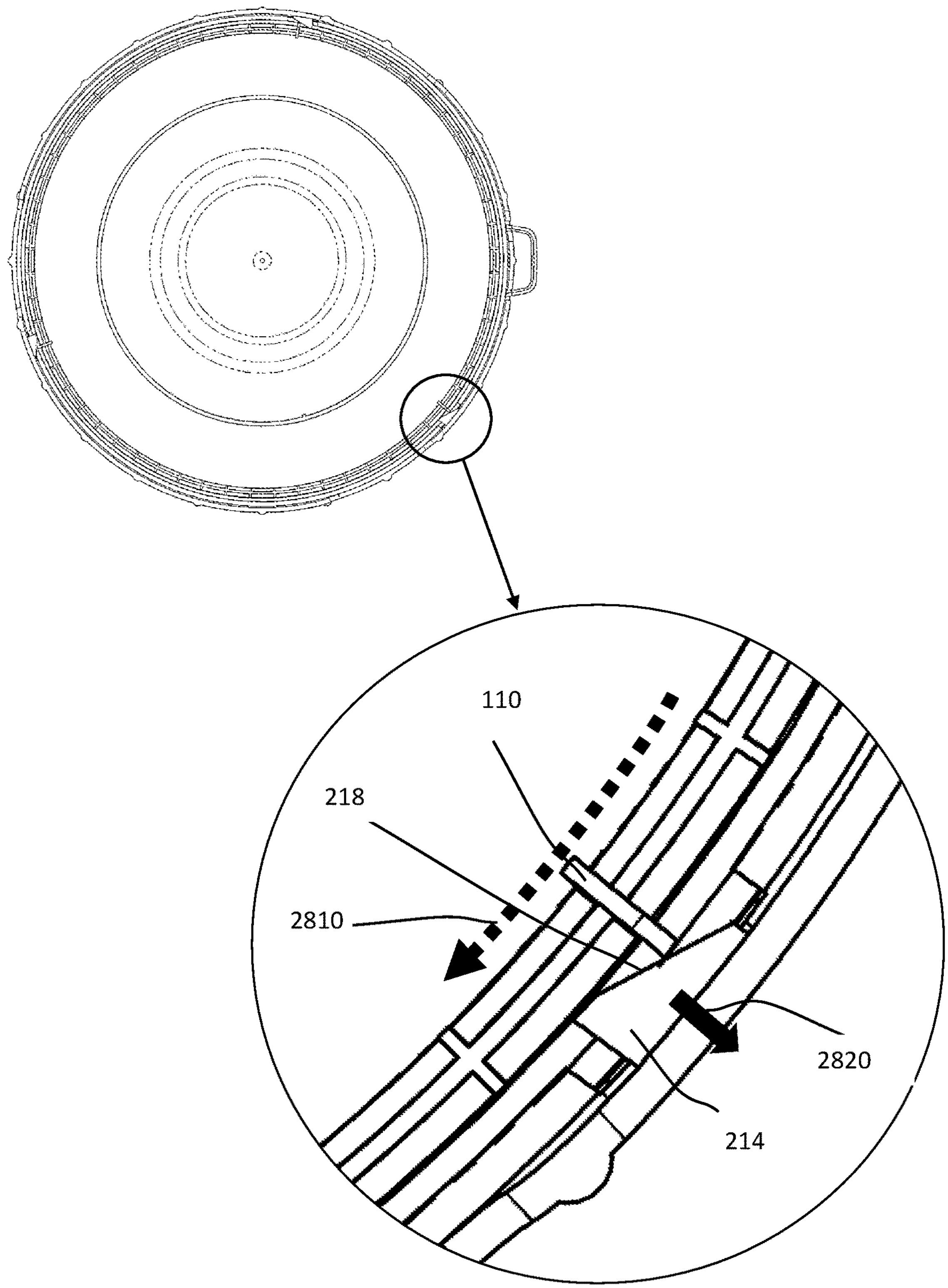

Reference is now made to FIGS. 58A & 58B, which are simplified illustrations of disengagement of the SUCSERDREA 120 from the container body 102 of SUPCA 100, in a situation where either the SUPCA 100 was not earlier processed by the MMIDD 1000 or in an alternative embodiment of the invention in which MMIDD 1000 does not include the tamper/reuse prevention functionality described hereinabove with reference to FIG. 49B but instead relies on use of machine readable information 162 for preventing reuse of the SUPCA 100.

As seen in FIG. 58A, prior to disengagement of the SUCSERDREA 120 from the container body 102 of SUPCA 100, tamper indicating tabs 110 of container body 102 are located adjacent to corresponding cam engagement surfaces 218 of tabs 214 of lid 140 of SUCSERDREA 120.

As seen in FIG. 58B, upon rotation of the SUCSERDREA 120, in a direction indicated by an arrow 2810, relative to container body 102 of SUPCA 100, the rotational engagement of tabs 110 with cam engagement surfaces 218 of tabs 214 causes tabs 214 to be irreversibly forced radially outwardly in the direction of an arrow 2820. The transition in the operative orientation of tabs 214 can be visualized by comparing enlargements A and B in FIG. 5A.

In the section which follows and refers to FIGS. 59A-59I and 60A-60I, there is described a container, such as a single-use preparation container assembly (SUPCA) 3100, also referred to as a product container assembly, constructed and operative in accordance with another preferred embodiment of the present invention. SUPCA 3100 is preferably used for food products but is not limited for use therewith unless explicitly stated hereinbelow.

SUPCA 3100 preferably comprises a cup body, such as a single-use container body 3102, for containing a food product prior to, during and following food preparation. Single-use container body 3102 may be any suitable container body 3102 and is preferably a truncated conical shaped container, preferably formed of polypropylene, having a bottom wall 3104, a truncated conical side wall 3106 and a circumferential rim 3108. It is appreciated that SUPCA 3100 may include any suitable one or more of the features described hereinabove with reference to a SUPCA.

In accordance with a preferred embodiment of the invention, there is also provided a cup closure, such as a single-use cover seal and externally rotatably drivable rotary engagement assembly (SUCSERDREA) 3120, for both human and machine sensible tamper-evident and re-use preventing fluid sealing engagement with the single-use container body 3102.

SUCSERDREA 3120 is preferably used for food products but is not limited for use therewith unless explicitly stated hereinbelow.

It is a particular feature of this embodiment of the present invention that the same SUCSERDREA 3120 may be used for container bodies 3102 having different sizes and configurations, provided that their circumferential rim 3108 is uniform.

Reference is now made to FIGS. 59A, 59B, 59C, 59D, 59E, 59F, 59G, 59H and 59I, which are respective simplified top-facing pictorial, bottom-facing pictorial, planar top, planar bottom, planar front, planar rear, first sectional, second sectional and third sectional illustrations of the SUCSERDREA 3120 in a pre-attachment and human and machine sensible tamper-evidencing and re-use preventing fluid sealing engagement operative orientation.

Reference is now also made to FIGS. 60A, 60B, 60C, 60D, 60E, 60F, 60G, 60H and 60I, which are respective simplified top-facing pictorial, bottom-facing pictorial, planar top, planar bottom, planar front, planar rear, first sectional, second section and third sectional illustrations of the SUPCA 3100 including the SUCSERDREA 3120 in an operative state which is both post-attachment and pre-human and machine sensible tamper-evidencing and re-use preventing fluid sealing engagement.

The structure of the SUCSERDREA 3120 will now be described in detail with reference to FIGS. 61A-63H. For the sake of clarity, reference numbers appearing in FIGS. 61A-63H also appear as appropriate in FIGS. 59A-60I.

As seen in FIGS. 59A-63H, SUCSERDREA 3120 preferably includes a cover 3130, a lid 3140, a hub 3150 and a blade 3160. Cover 3130 and lid 3140 are preferably fixedly connected to each other, preferably by suitable welding techniques, preferably ultrasonic welding. Hub 3150 is preferably fixedly connected to blade 3160 and is arranged for sealed rotation with respect to cover 3130 and lid 3140. Alternatively, hub 3150 and blade 3160 may be integrally formed.

Preferably, blade 3160 is substantially identical or similar to blade 160 described hereinabove with reference to FIGS. 6A-6E.

SUCSERDREA 3120 preferably includes a machine-readable information source 3162, preferably an RFID tag, but alternatively a bar-coded label or any other suitable machine-readable information source. Preferably, the information contained on the machine-readable information source 3162 is encrypted. Information source 3162 may contain some or all of the relevant information and/or may provide a reference, such as a link to information available on the internet.

Reference is now additionally made to FIGS. 62A-62E, which are simplified respective forward pictorial top, rearward top, pictorial bottom, planar sectional and planar rear view illustrations of cover 3130 of SUCSERDREA 3120 of FIGS. 59A-60I. As seen in FIGS. 62A-62E, cover 3130 preferably comprises a generally circular planar portion 3170 having an upwardly-facing surface 3172, in the sense of FIG. 62A, and a downwardly-facing surface 3173, in the sense of FIG. 62C, and defining a peripheral cut out 3174.

A central aperture 3175 is formed in generally circular planar portion 3170. An upwardly facing, in the sense of FIG. 62A, generally circular stacking positioning protrusion 3176 is preferably formed on upwardly-facing surface 3172. A pair of downward and inwardly facing hook protrusions 3182 are formed on downwardly-facing surface 3173 adjacent aperture 3175 for disengageable mounting of hub 3150 onto cover 3130.

Formed in generally circular planar portion 3170 is an integrally hinged pivotably openable straw ingress opening cover 3184, including an integral hinge portion 3186 and a pair of human visually sensible tamper-evident frangible portions 3188, which are normally necessarily broken when opening straw ingress opening cover 3184. A finger engagement portion 3190 is defined as an extension of straw ingress opening cover 3184. Integrally hinged pivotably openable straw ingress opening cover 3184 is preferably formed with an outer peripheral sealing surface 3191, which removably sealably engages a corresponding straw ingress opening of lid 3140 (FIGS. 63A-63H). A guiding lip portion 3192 is preferably provided for guiding the straw ingress opening cover 3184 when resealing straw ingress opening cover 3184 with respect to the corresponding straw ingress opening of lid 3140.

Also formed in generally circular planar portion 3170 is an integrally hinged liquid ingress cover 3193 including an integral hinge 3194 and a pair of human visually sensible tamper-evident frangible portions 3195, which are normally necessarily broken when opening cover 3193. A finger engagement portion 3196 is defined as a radially outward extension of cover 3193 and also serves for rotational orientation of SUPCA 3100 onto a container contents processor, such as a multiple motion intelligent driving device (MMIDD) (FIG. 68), also referred to as an intelligent driving device, as is described hereinbelow, which is generally similar to the MMIDD described hereinabove with reference to FIGS. 10A-10C, other than as specifically described hereinbelow.

It is a particular feature of an embodiment of the present invention that functionality for both human and machine sensible tamper-evident and re-use prevention may be actuated both by removal of the SUCSERDREA 3120 from the single-use container body 3102 and by clamping of the SUPCA 3100 to the MMIDD (FIG. 68) and subsequent unclamping and disengagement of the SUPCA 3100 from the MMIDD (FIG. 68).

Figure 62A:
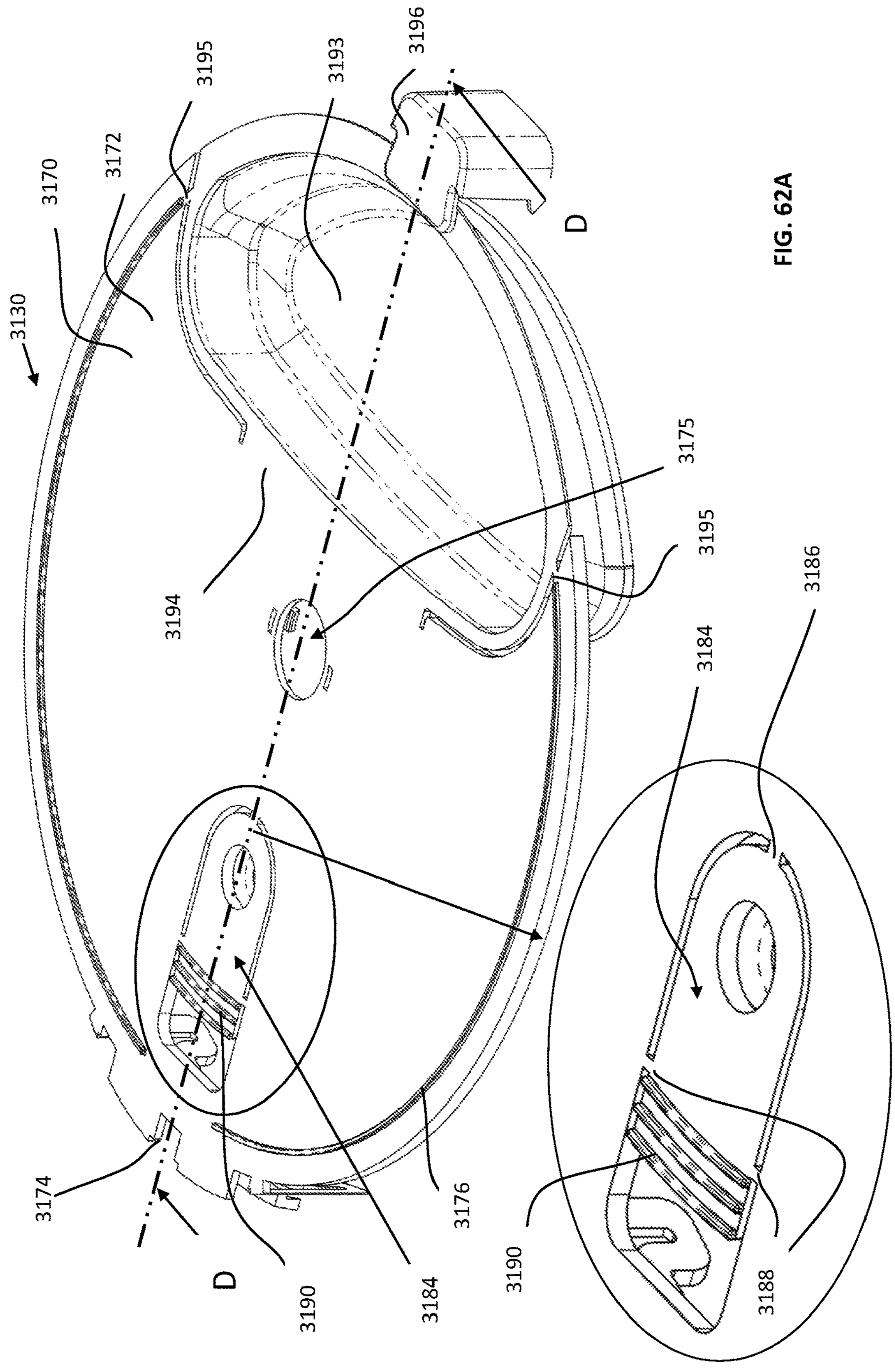
FIGS. 62A, 62B, 62C, 62D and 62E are simplified respective forward pictorial top, rearward top, pictorial bottom, planar sectional and planar rear view illustrations of a cover of the SUCSERDREA of FIGS. 59A-60I, FIG. 62D being taken along lines D-D in FIG. 62A.
Figure 62B:
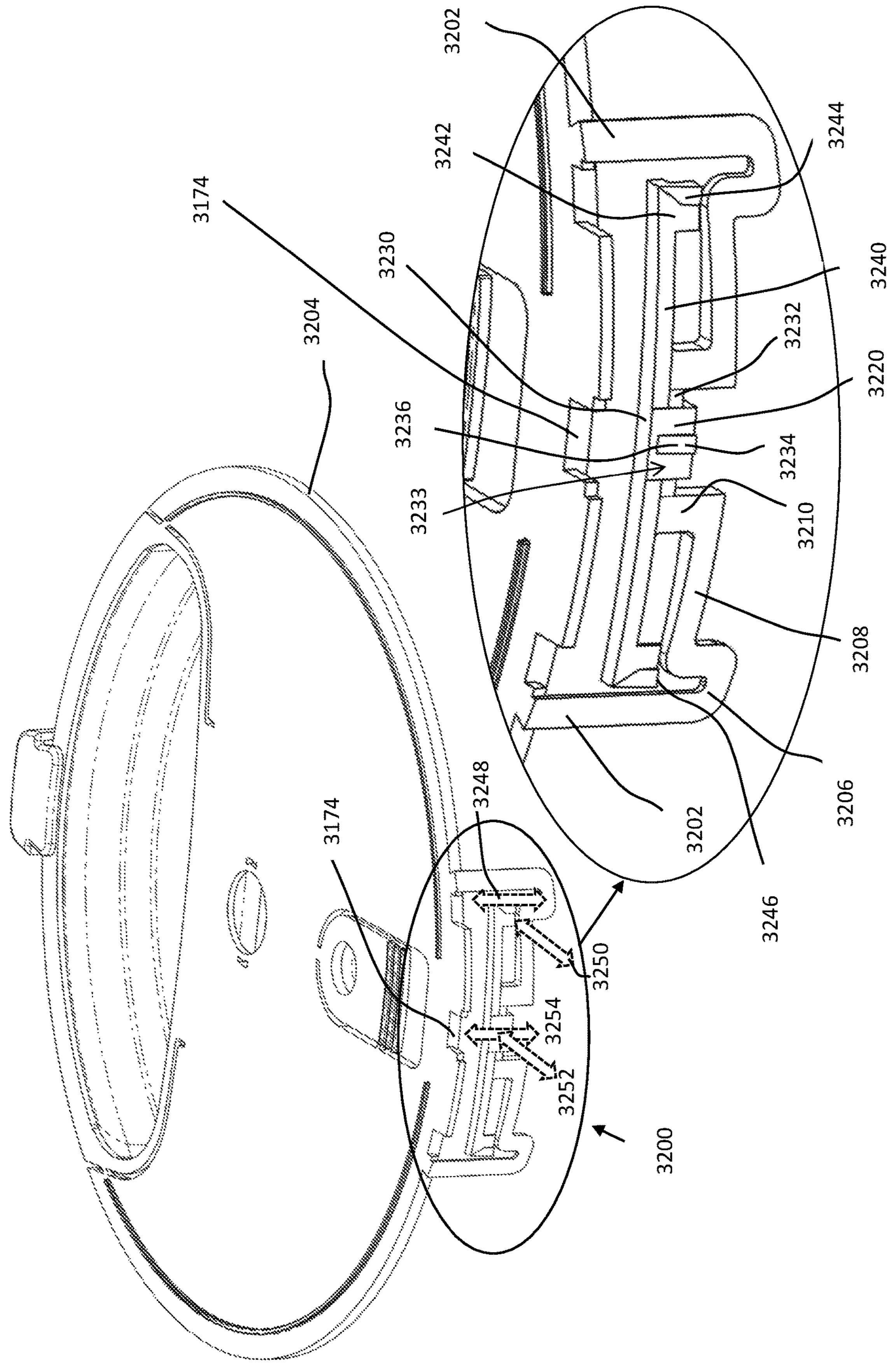
Figure 62C:
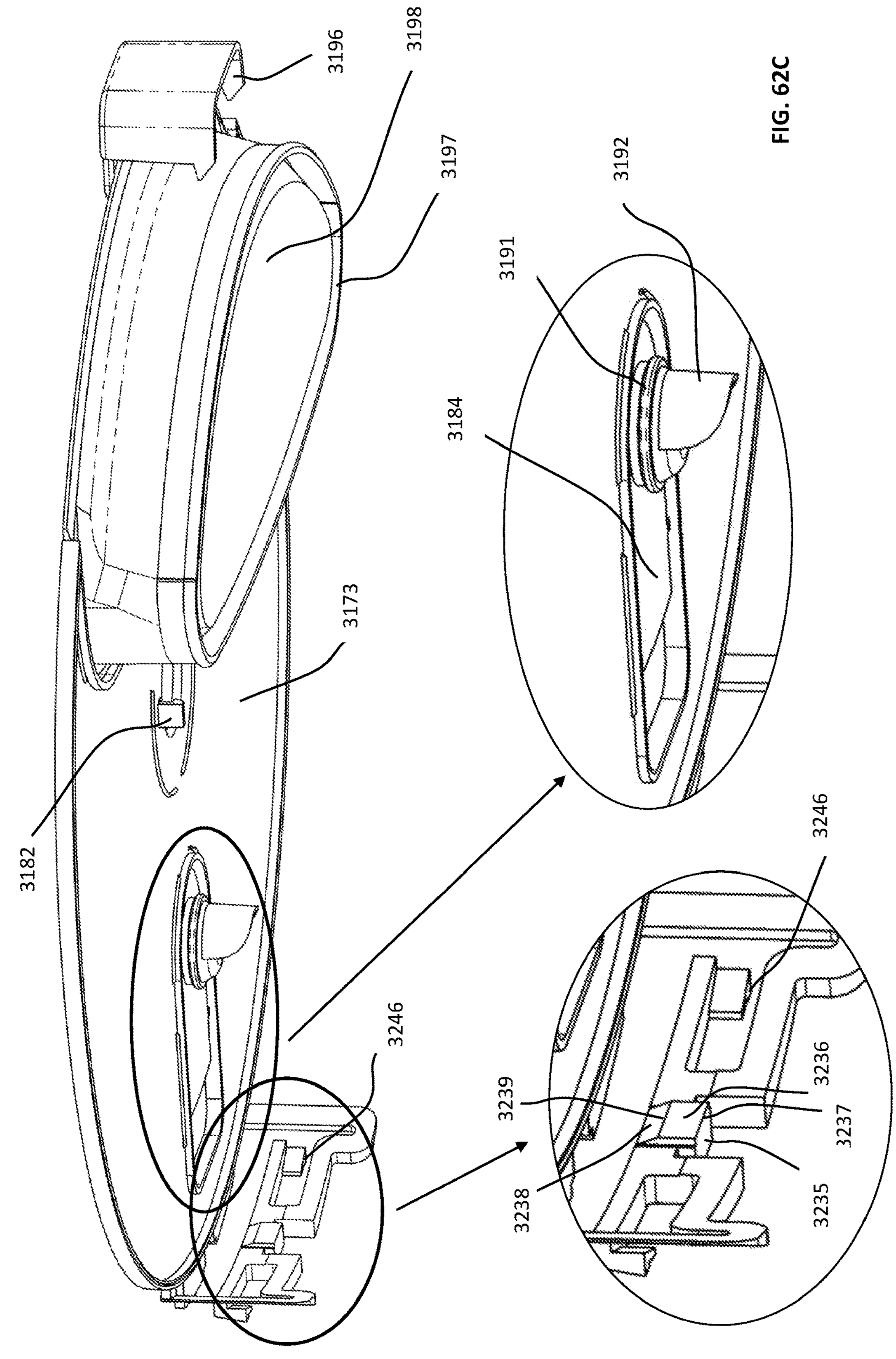
Figure 62D:
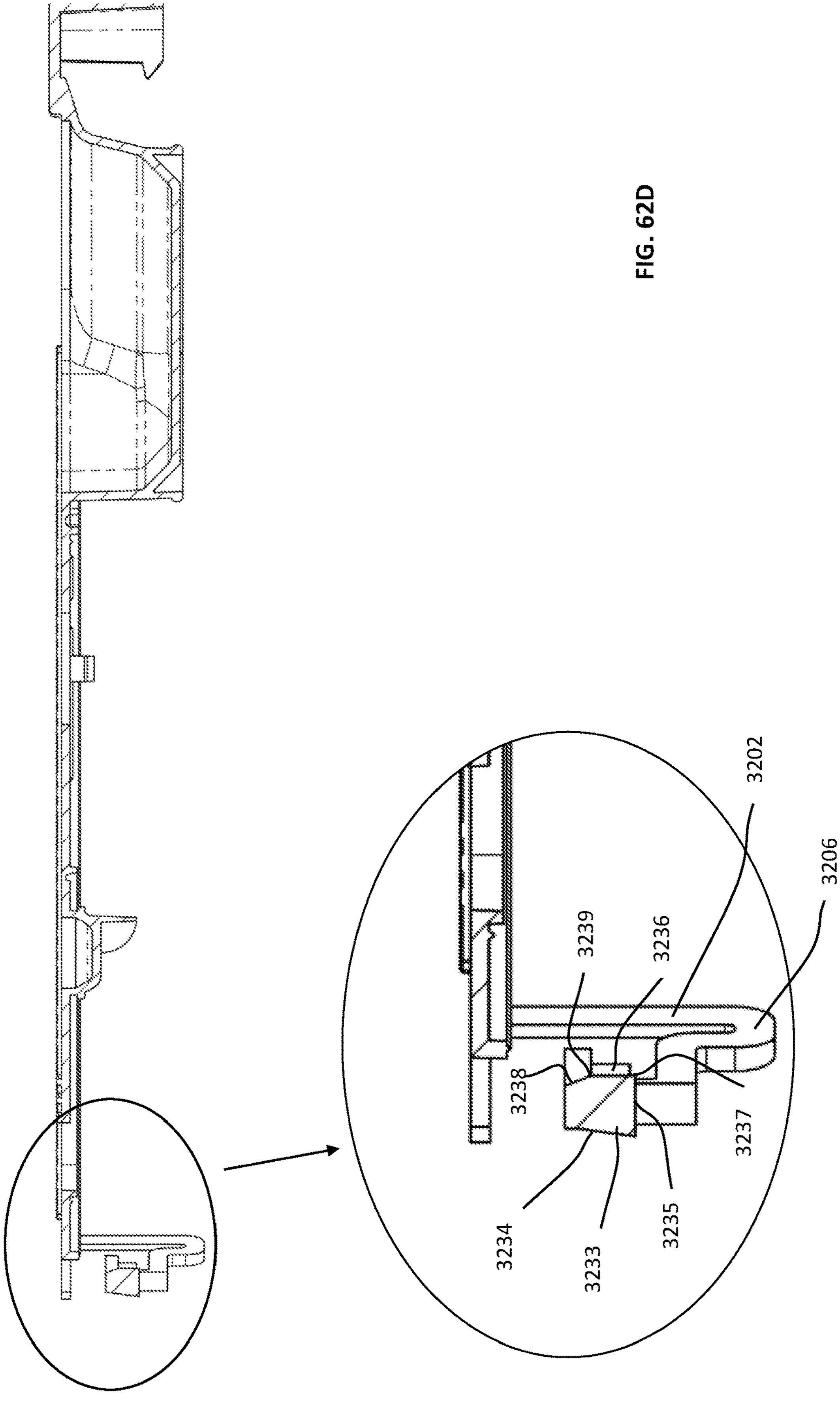
Figure 62E:
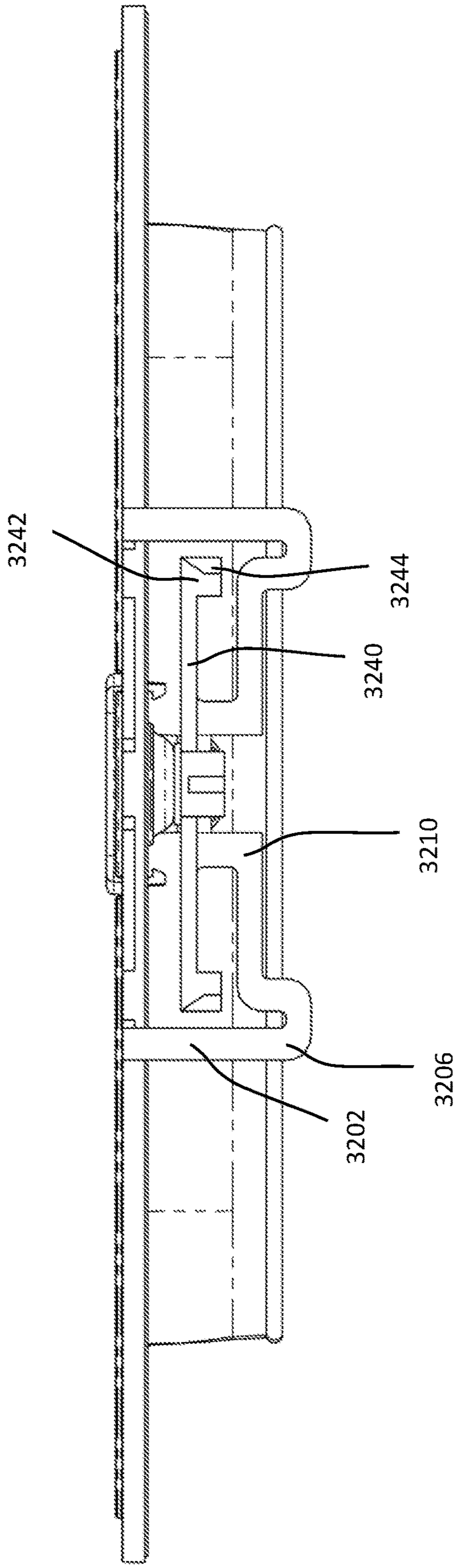

Integrally hinged pivotably openable liquid ingress opening cover 3193 is preferably formed with an outer peripheral surface 3197 which terminates in a recessed, generally planar, downwardly-facing, in the sense of FIG. 62C, cover surface 3198.

In accordance with a preferred embodiment of the present invention, cover 3130 is provided with a partially circumferential depending multifunctional tamper indicating and re-use prevention element (MTIRPE) 3200. Preferably, MTIRPE 3200 is integrally formed with cover 3130 by injection molding of plastic.

As seen particularly in the enlargement forming part of FIG. 62B, the MTIRPE 3200 includes a pair of depending circumferentially outer arms 3202, which extend generally perpendicularly to generally circular planar portion 3170 at locations radially outwardly from a circumferential edge 3204 of generally circular planar portion 3170.

Arms 3202 each terminate in an elbow portion 3206. A circumferentially inwardly directed spring arm portion 3208 extends from each elbow 3206 and terminates in an upwardly extending portion 3210. A cantilevered generally elongate locking portion 3220 is supported on upwardly extending portions 3210, which are mutually circumferentially spaced. A central lid engagement portion 3230 is supported on cantilevered generally elongate locking portion 3220 and by lateral support portions 3232 which extend on either side thereof to upwardly extending portions 3210. Central lid engagement portion 3230 includes a tapered lid locking portion 3233, which defines a locking surface 3234. Central lid engagement portion 3230 also includes a bottom surface 3235, which joins a planar surface 3236 at a corner edge 3237. Planar surface 3236 joins an inclined surface 3238 at an edge 3239.

Cantilevered generally elongate locking portion 3220 includes a pair of symmetric locking arms 3240, which extend outwardly from central lid engagement portion 3230 in mutually opposite directions. Each of symmetric locking arms 3240 includes an engagement window occluding end portion 3242 which includes a planar engagement window locking portion 3244, which lies in a plane which is angled in two dimensions with respect to the remainder of engagement window occluding end portion 3242 and defines an engagement window locking surface 3246.

It is a particular feature of this embodiment of the present invention that the symmetric locking arms 3240 of cantilevered generally elongate locking portion 3220 are resilient in two mutually perpendicular directions, here indicated by respective arrows 3248 and 3250.

It is a further particular feature of this embodiment of the present invention that arms 3202, elbow portions 3206 and arm portions 3208 are together resilient in two mutually perpendicular directions, here indicated by respective arrows 3252 and 3254.

Reference is now made to FIGS. 63A-63H, which illustrate lid 3140 of the SUCSERDREA 3120 of FIGS. 59A-60I.

As seen in FIGS. 63A-63H, lid 3140 preferably is a generally circular, generally planar element 3300 having a generally circumferential edge surface 3310. It is a particular feature of this embodiment of the present invention that generally circumferential edge surface 3310 is preferably formed with MTIRPE receiving portion (MTIRPERP) 3320 for receiving and interacting with MTIRPE 3200.

Figure 63A:
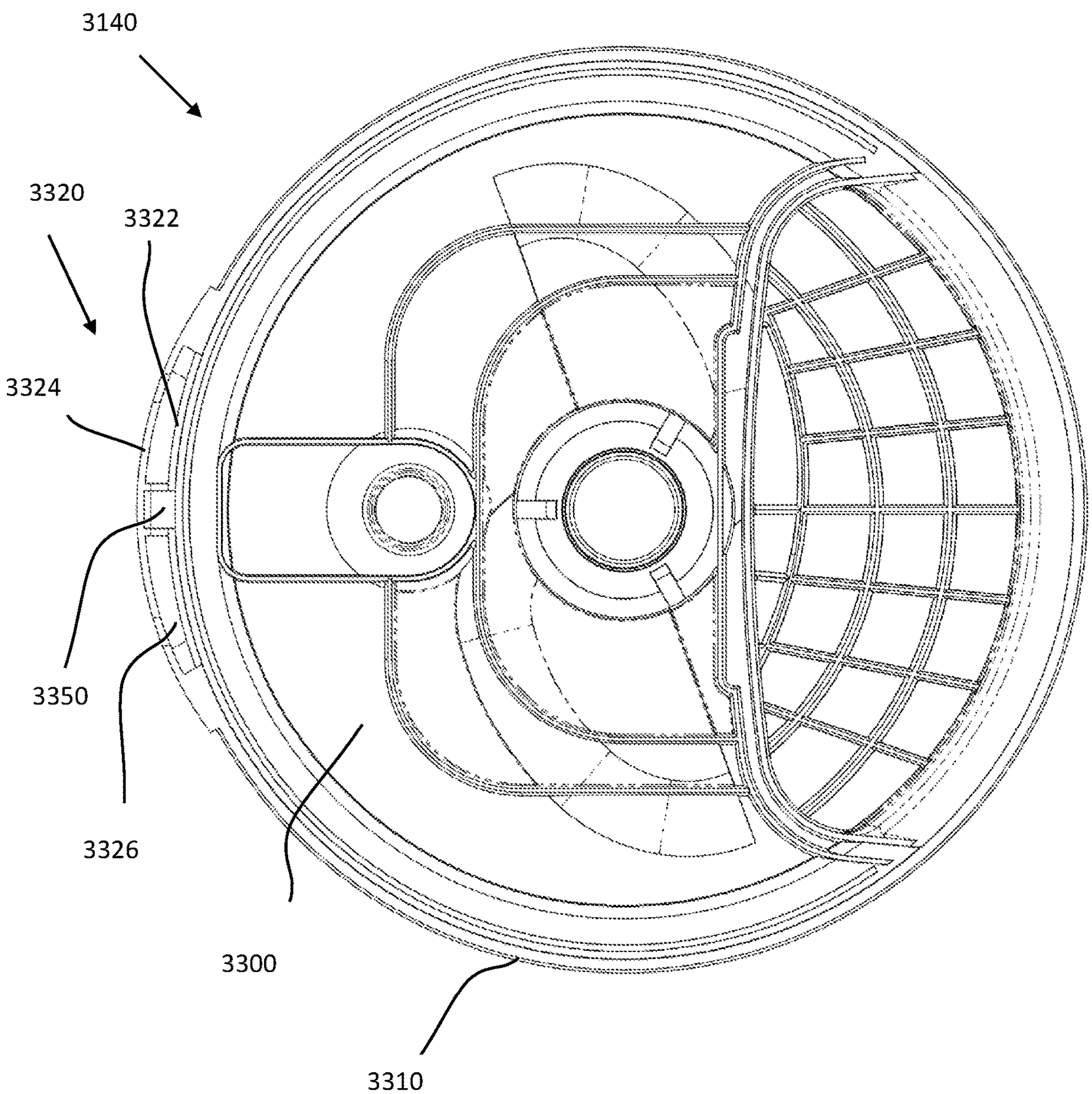
FIGS. 63A, 63B, 63C, 63D, 63E, 63F, 63G and 63H are simplified respective planar top, planar bottom, forward pictorial top, rearward pictorial top, pictorial bottom, first planar sectional, second planar sectional and pictorial sectional illustrations of a lid of the SUCSERDREA of FIGS. 59A-62E, FIGS. 63F, 63G and 63H being taken along respective lines F-F, G-G and H-H in FIG. 63B.
Figure 63B:
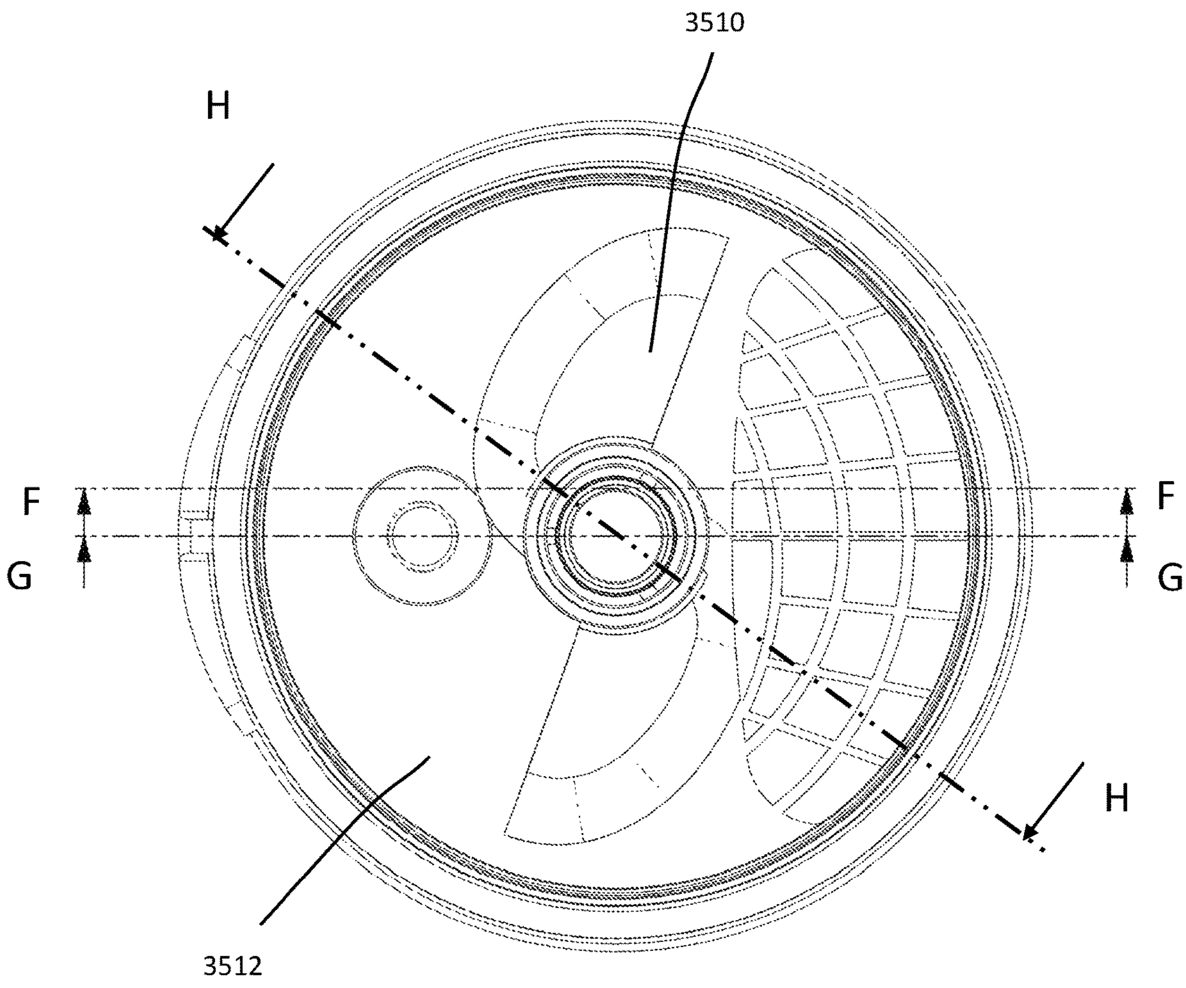
Figure 63C:
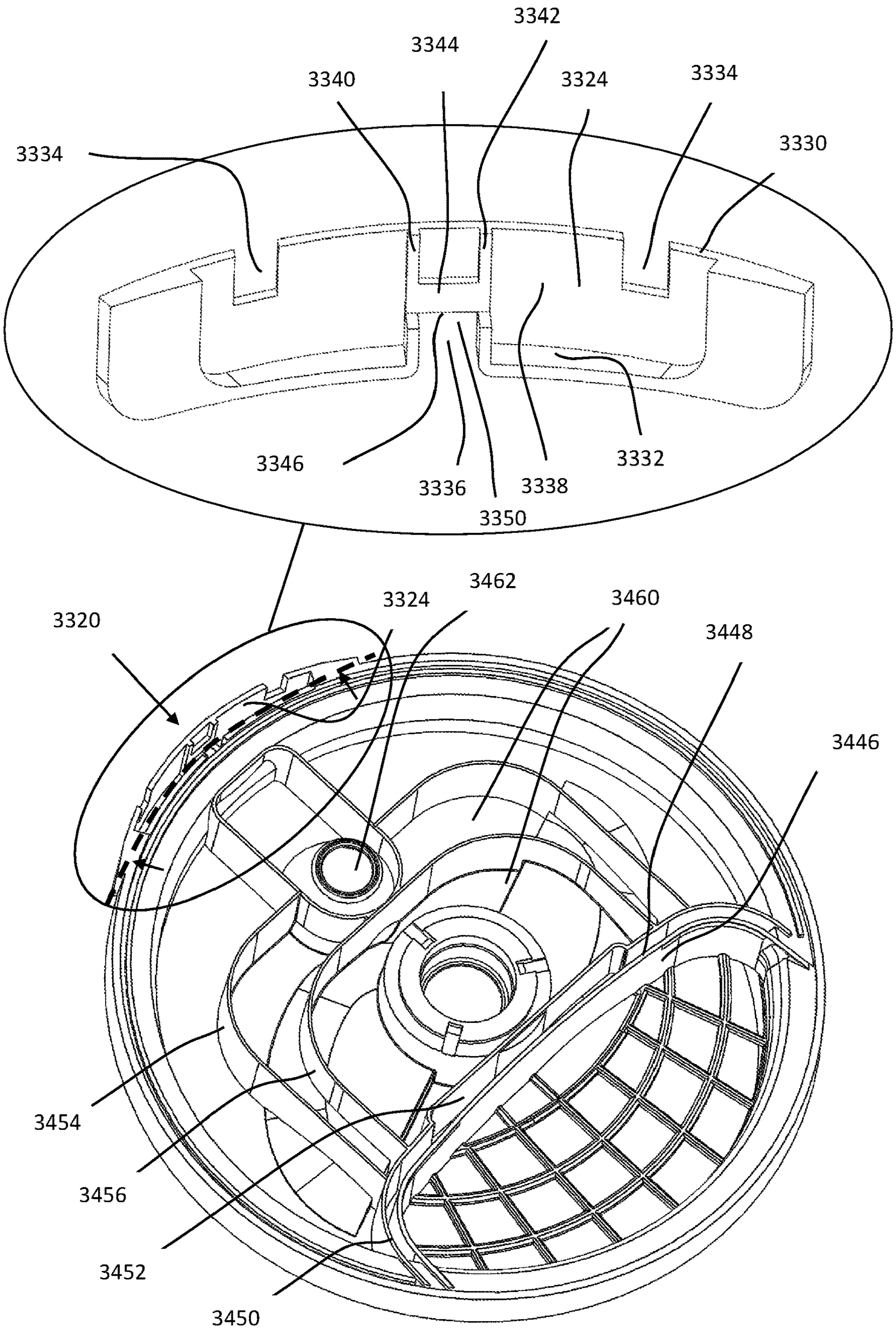
Figure 63D:
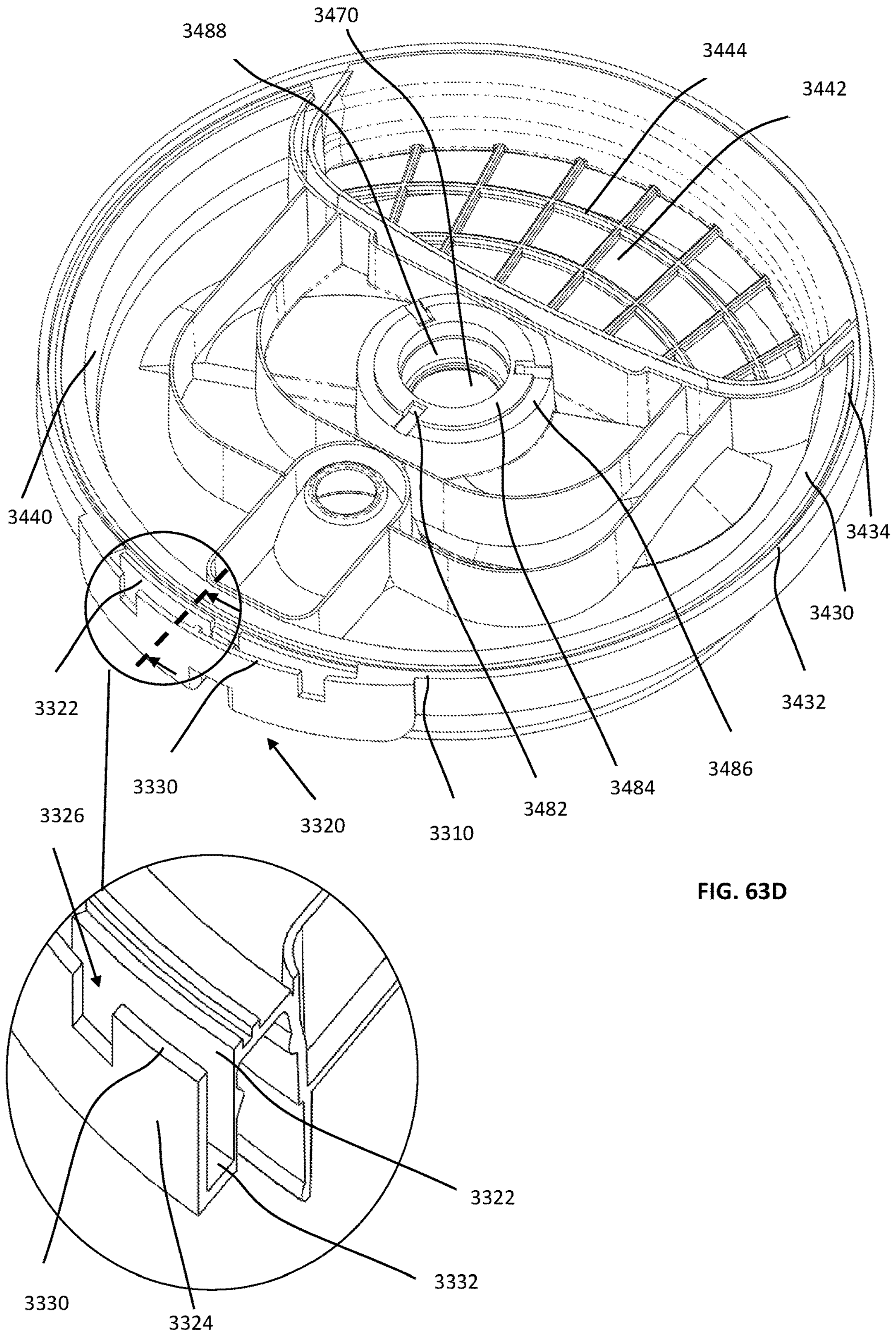

As seen in FIGS. 63A-63E and particularly in the enlargement forming part of FIG. 63C, MTIRPERP 3320 includes an inner circumferential edge portion 3322 and an outer circumferential edge portion 3324, which is generally radially spaced from inner circumferential edge portion 3322 by an MTIRPE receiving pocket 3326, which receives MTIRPE 3200 when the cover 3130 and the lid 3140 are joined during manufacture of the SUCSERDREA 3120.

The outer circumferential edge portion 3324 protrudes somewhat from the generally circumferential edge surface 3310 and is preferably somewhat tapered in opposite circumferential directions. As seen particularly in the enlargement forming part of FIG. 63D, outer circumferential edge portion 3324 defines a top edge 3330 which is preferably coplanar with a top edge of the generally circumferential edge surface 3310 and a bottom edge 3332 which extends inwardly below a bottom edge of the outer circumferential edge portion 3324 to a corresponding bottom edge of the inner circumferential edge portion 3322 and defines a bottom of pocket 3326.

As seen particularly in the enlargement forming part of FIG. 63C, outer circumferential edge portion 3324 preferably is formed with a pair of mutually spaced engagement windows 3334, for receiving cup engagement protrusions of the MMIDD (FIG. 68), and a clamp engagement slot 3336, for operatively receiving a clamp element of the MMIDD (FIG. 68) as will be described hereinbelow in detail with reference to FIGS. 99 & 100. A radially internally facing surface 3338 of outer circumferential edge portion 3324 is formed with a pair of ribs 3340 and 3342, located above and on either side of slot 3336 and a transverse rib 3344, joining ribs 3340 and 3342 just above a top edge 3346 of slot 3336. Bottom edge 3332 defines an aperture 3350 aligned with slot 3336.

Figure 63E:
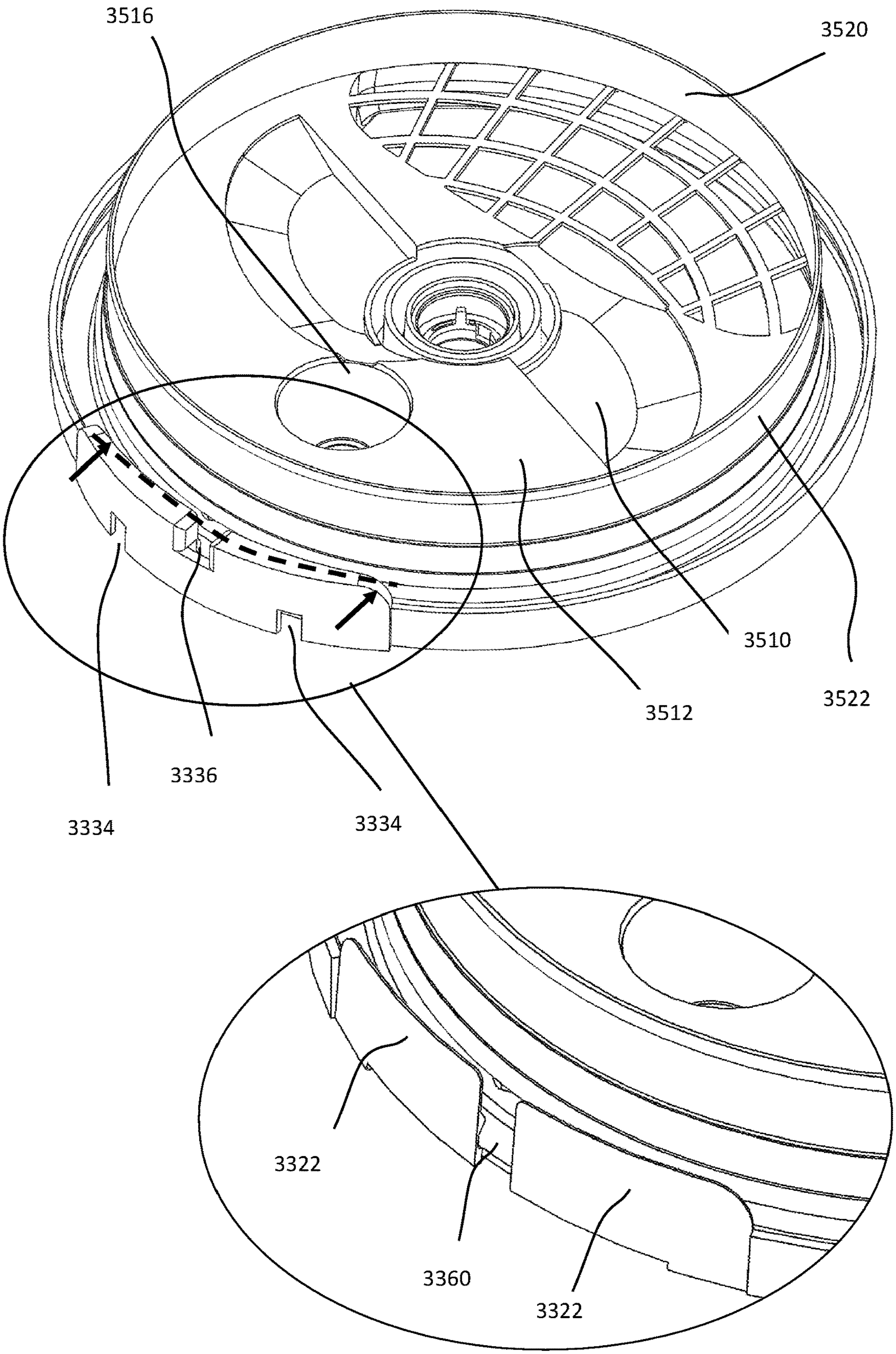

As seen particularly in the enlargement forming part of FIG. 63E, inner circumferential edge portion 3322 preferably is formed with a slot 3360 aligned with slot 3336 and extending between its top and bottom edges.

Inwardly of generally circumferential edge surface 3310 is a generally planar annular surface 3430, which lies slightly below a top edge 3432 of edge surface 3310. A generally circular protrusion 3434 extends upwardly, in the sense of FIG. 59A, from annular surface 3430.

Figure 59A:
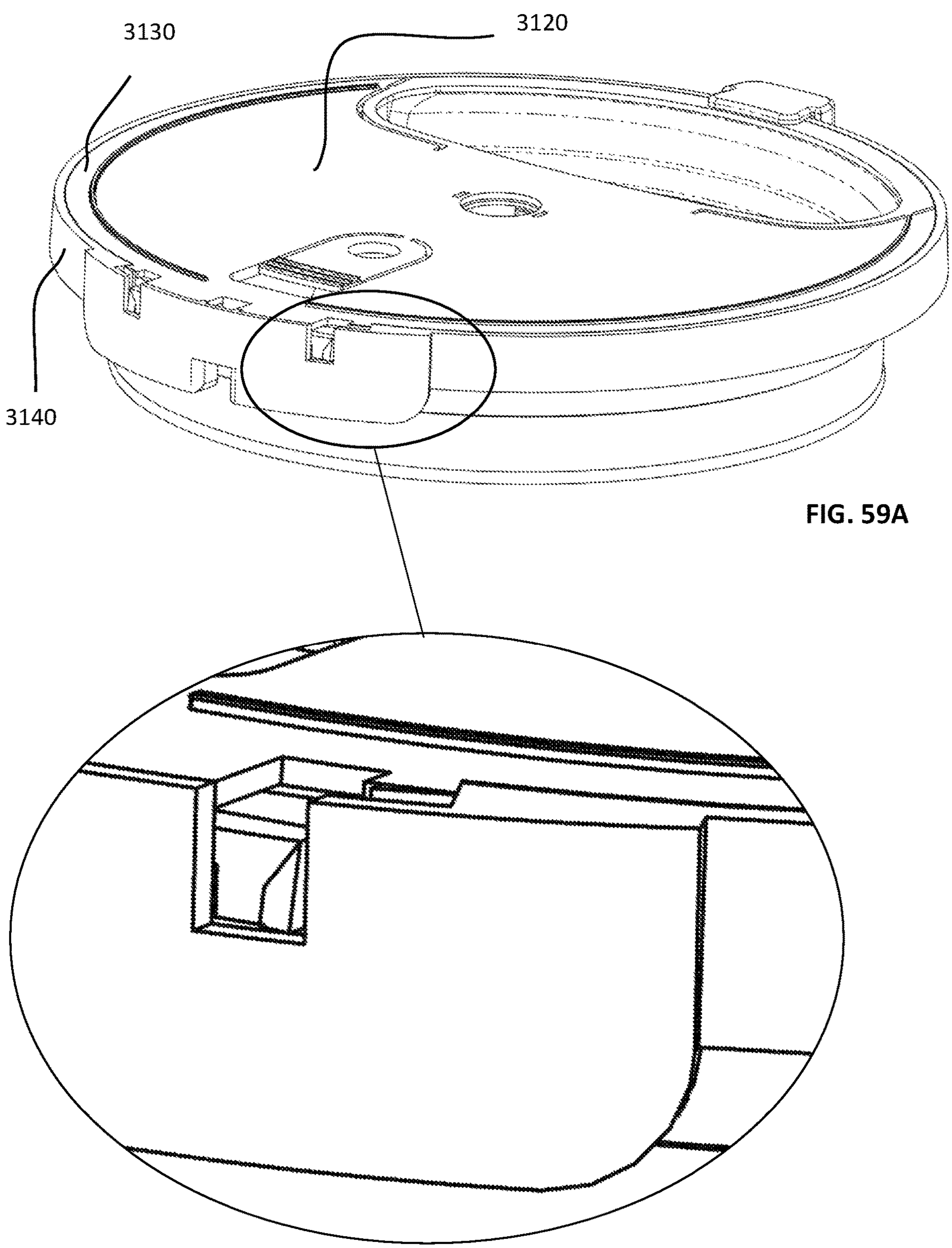
FIGS. 59A, 59B, 59C, 59D, 59E, 59F, 59G, 59H and 59I are respective simplified top-facing pictorial, bottom-facing pictorial, planar top, planar bottom, planar front, planar rear, first sectional, second sectional and third sectional illustrations of the SUCSERDREA in a pre-attachment and human and machine sensible tamper-evidencing and re-use preventing fluid sealing engagement operative orientation, FIGS. 59G, 59H and 59I being taken along respective lines G-G, H-H and I-I in FIG. 59C.
Figure 59B:
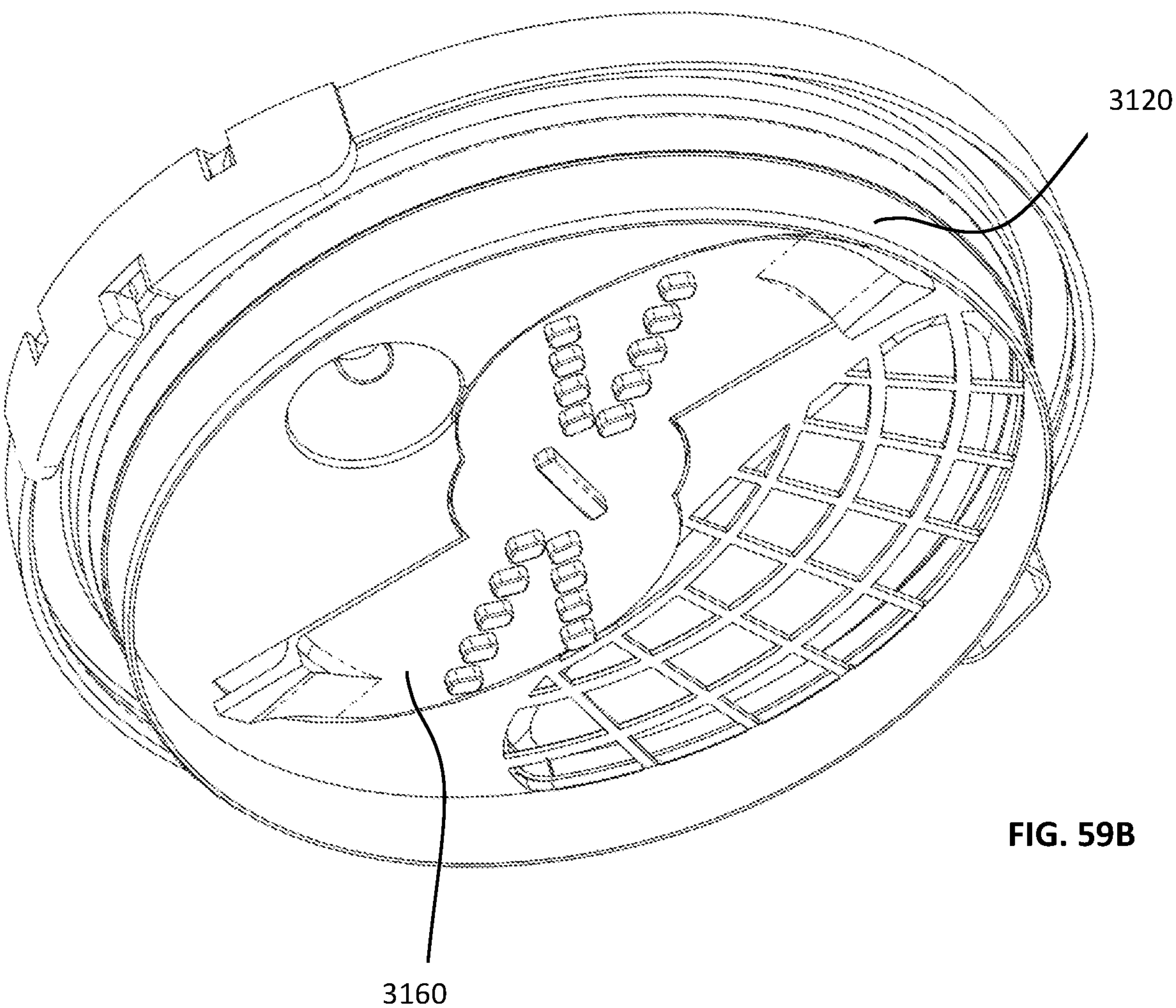
Figure 59C:
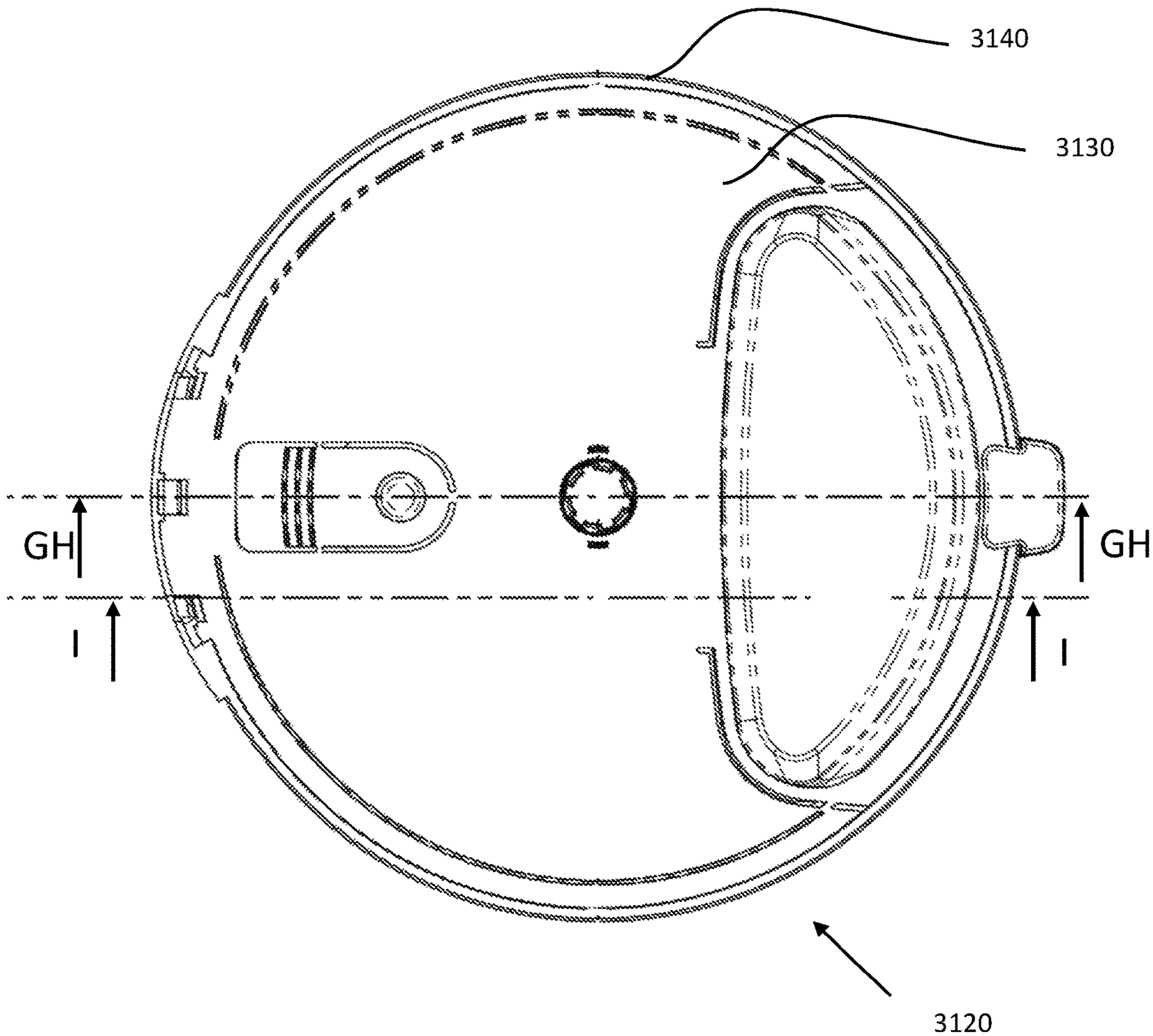
Figure 59D:
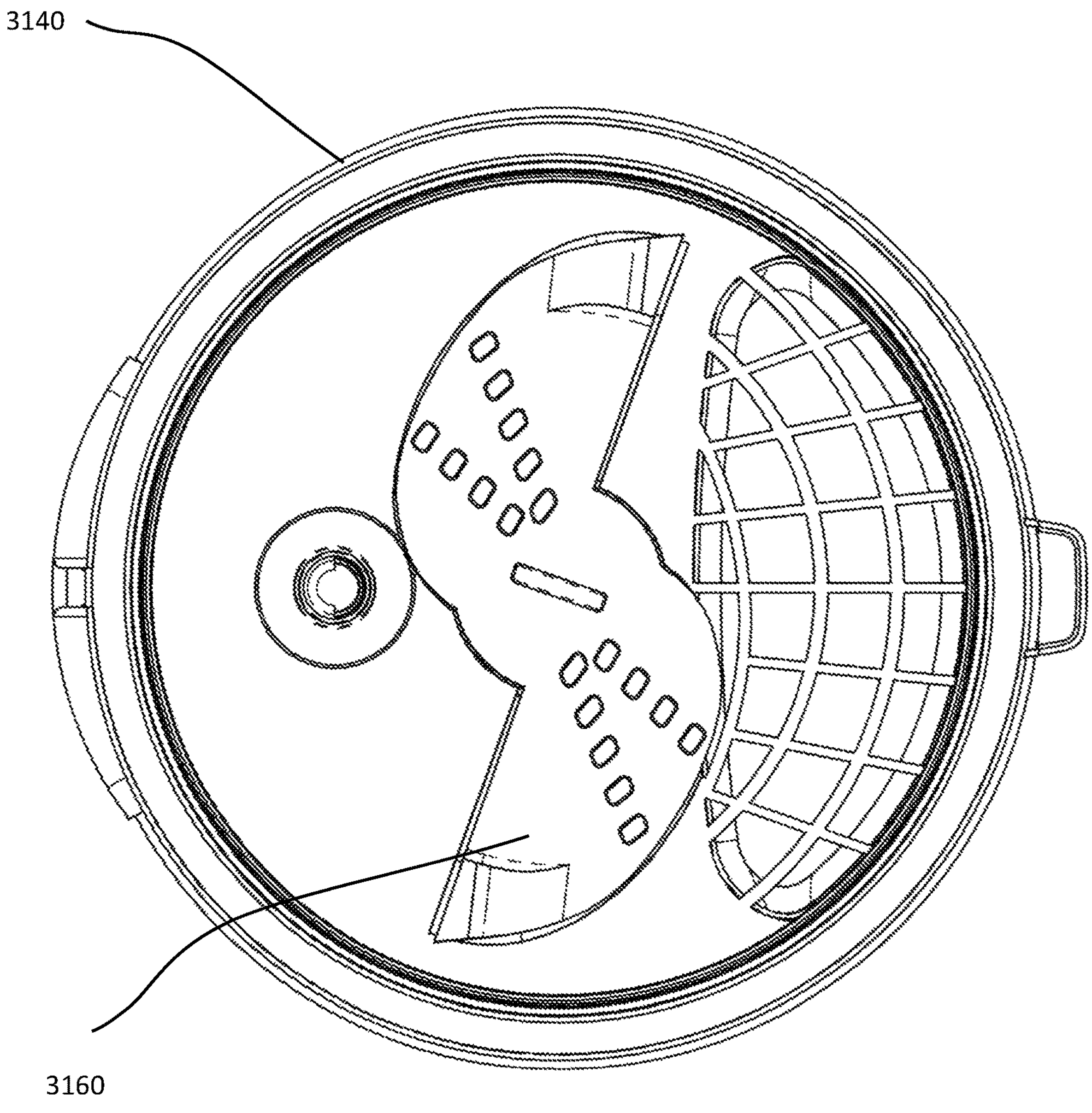
Figure 59E:
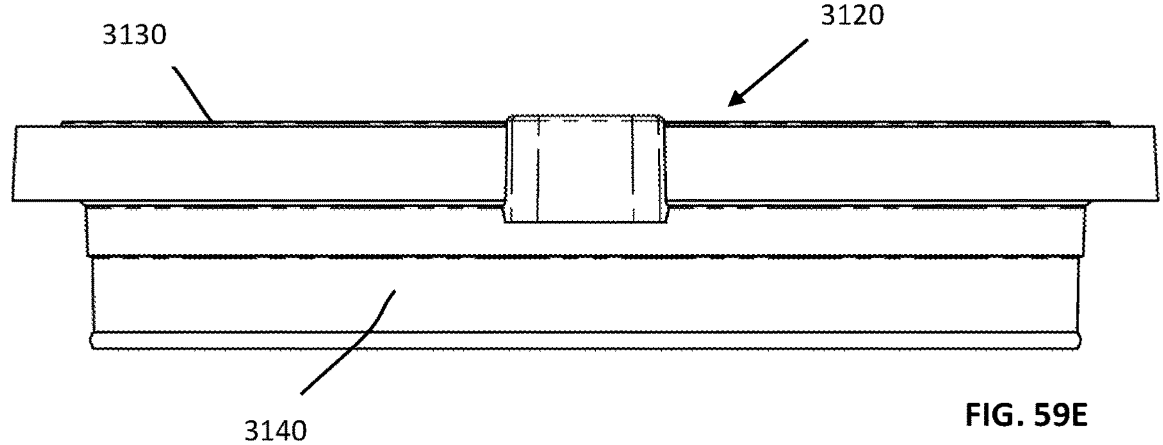
Figure 59F:
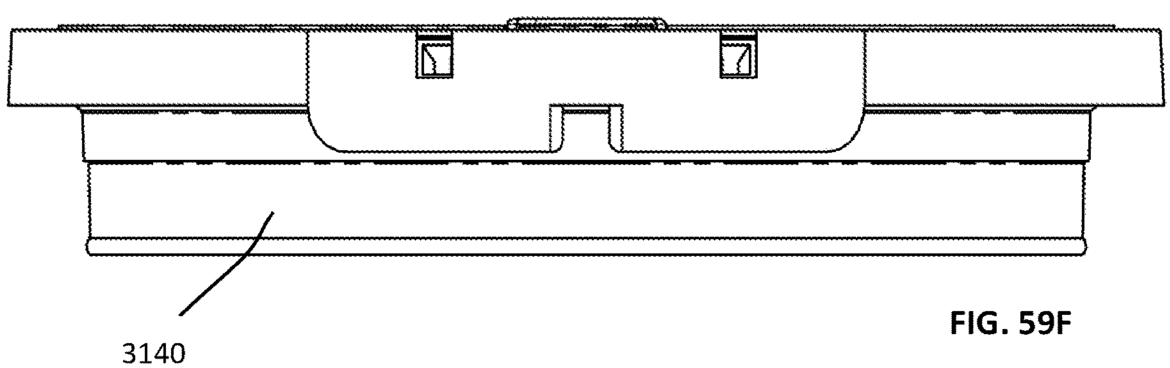
Figure 59G:
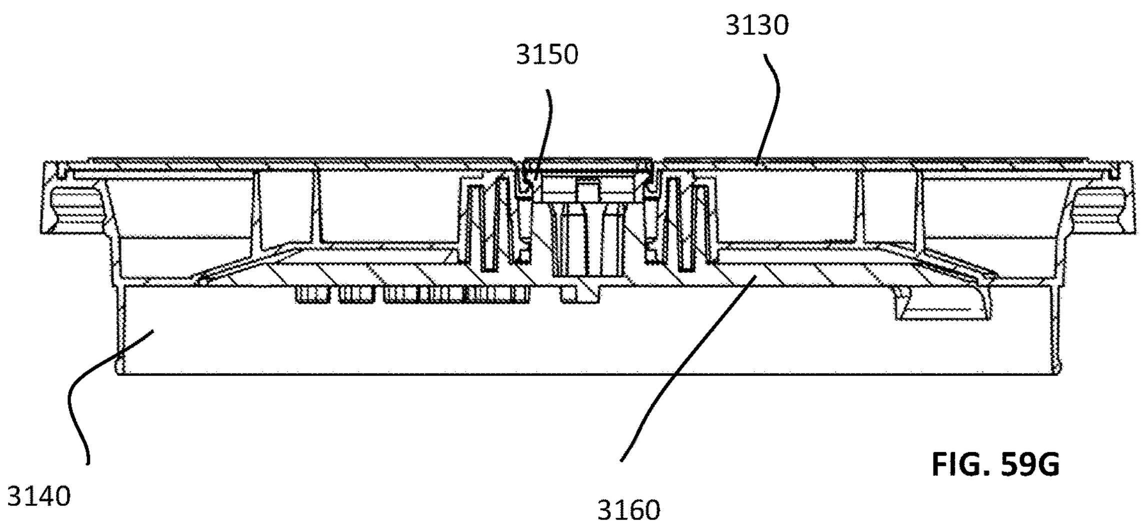
Figure 59H:
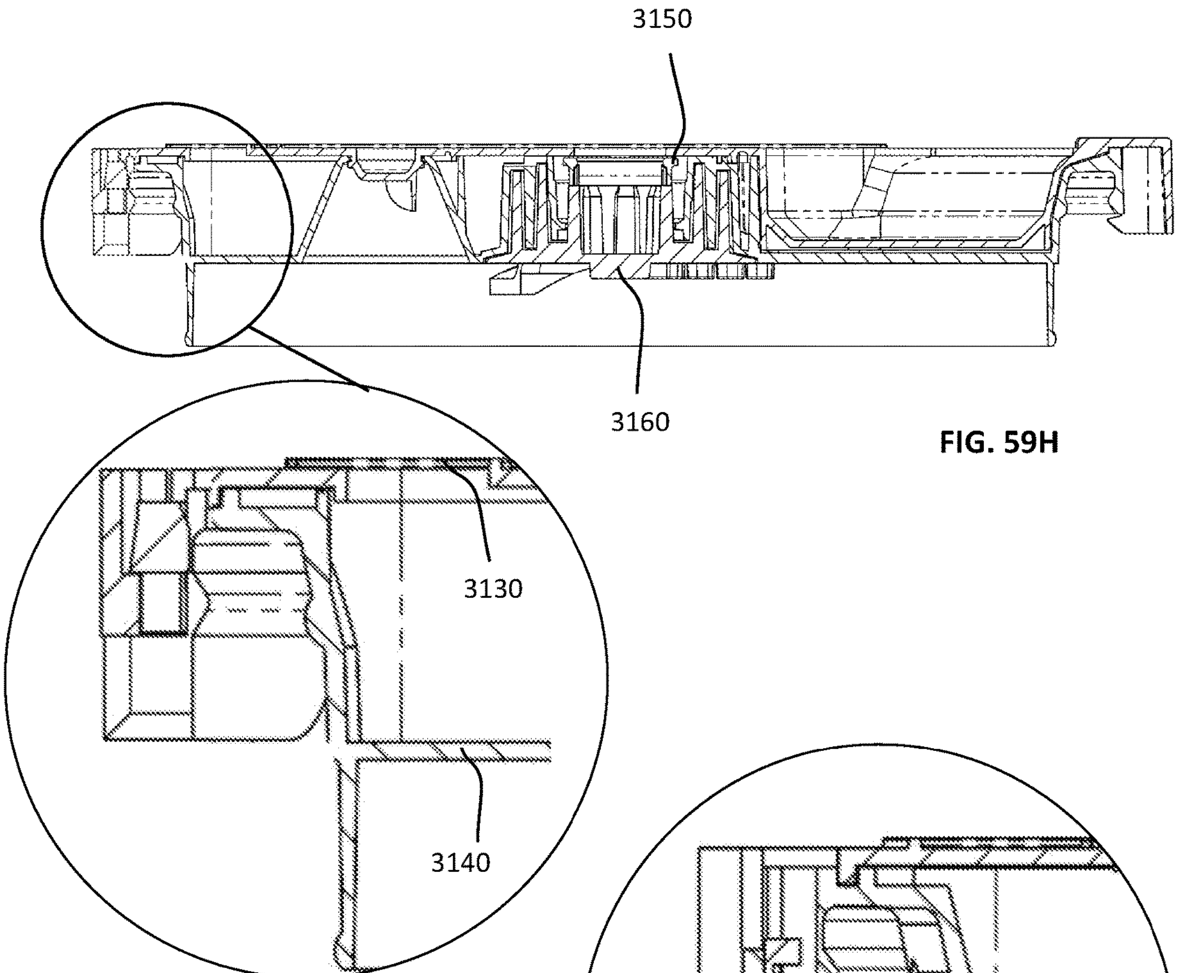
Figure 59I:
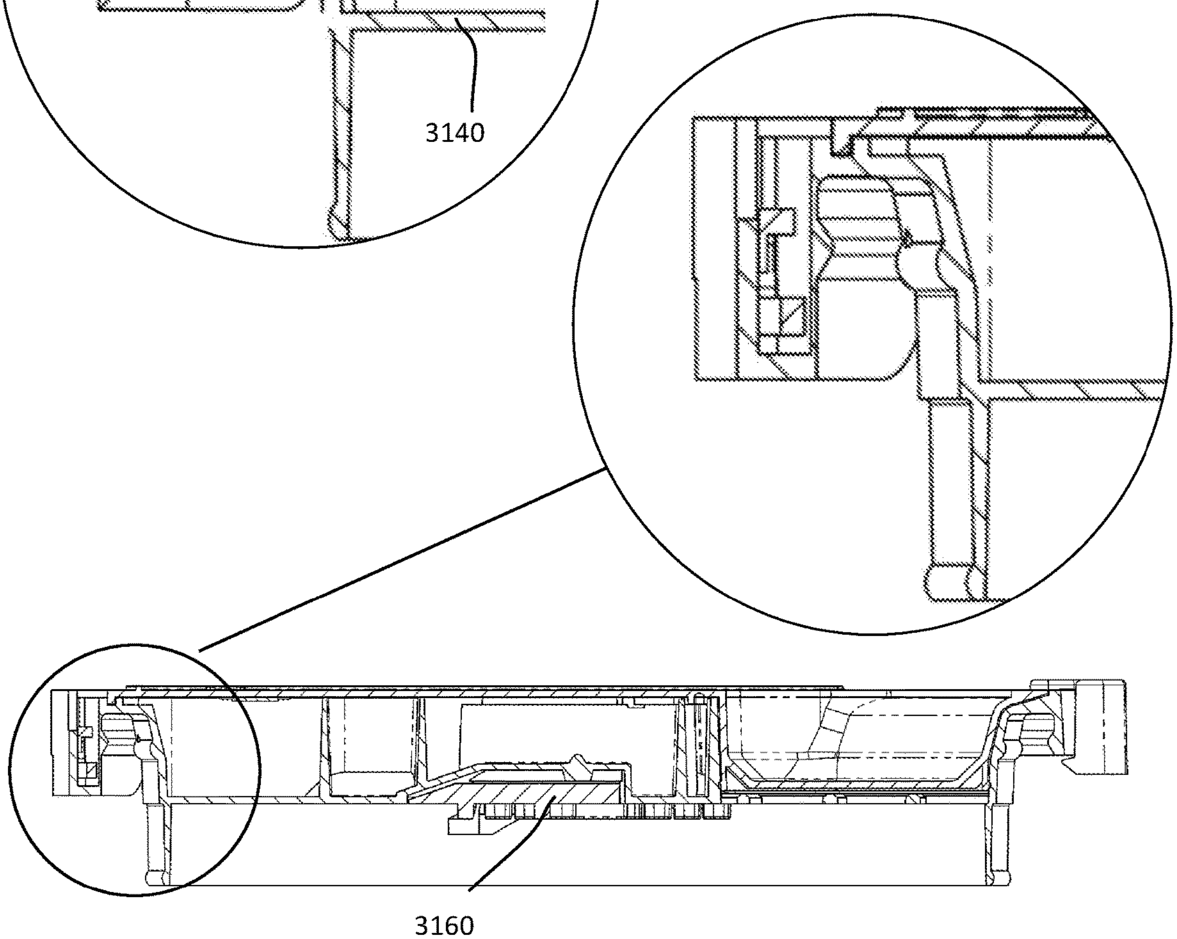
Figure 60A:
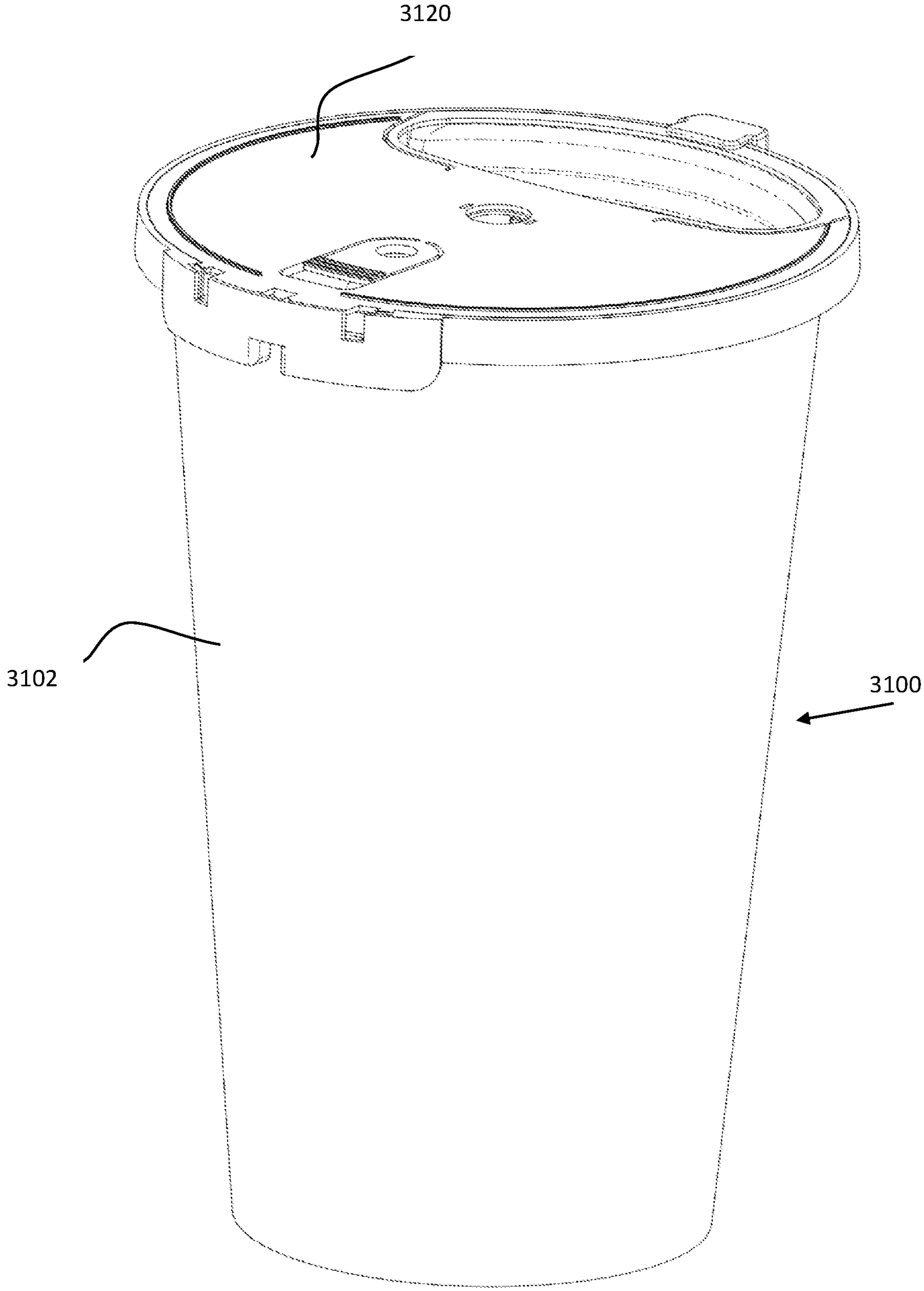
FIGS. 60A, 60B, 60C, 60D, 60E, 60F, 60G, 60H and 60I are respective simplified top-facing pictorial, bottom-facing pictorial, planar top, planar bottom, planar front, planar rear, first sectional, second sectional and third sectional illustrations of the SUPCA including the SUCSERDREA in an operative state which is both post-attachment and pre-human and machine sensible tamper-evidencing and re-use preventing fluid sealing engagement, FIGS. 60G, 60H and 60I being taken along respective lines G-G, H-H and I-I in FIG. 60C.
Figure 60B:
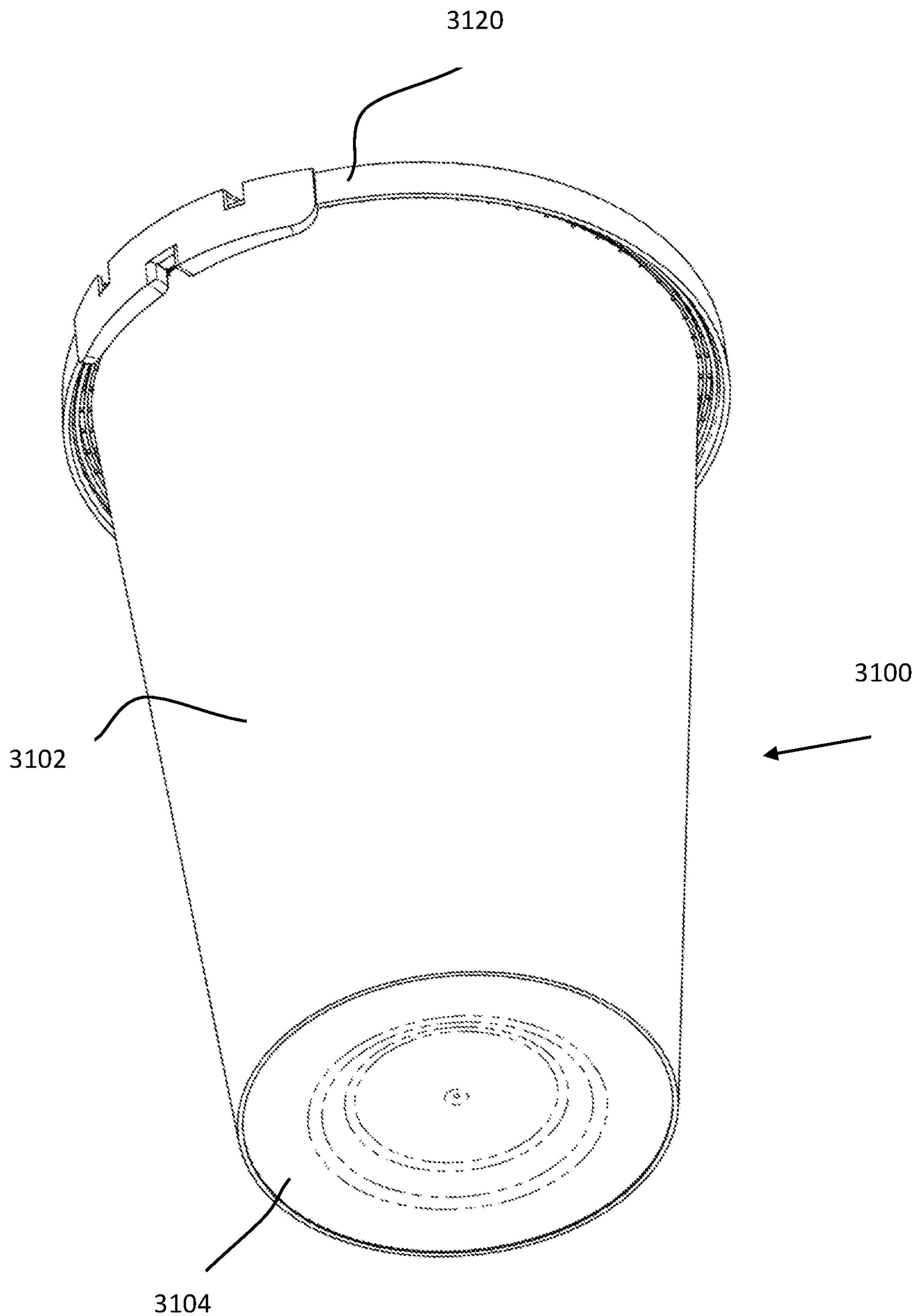
Figure 60C:
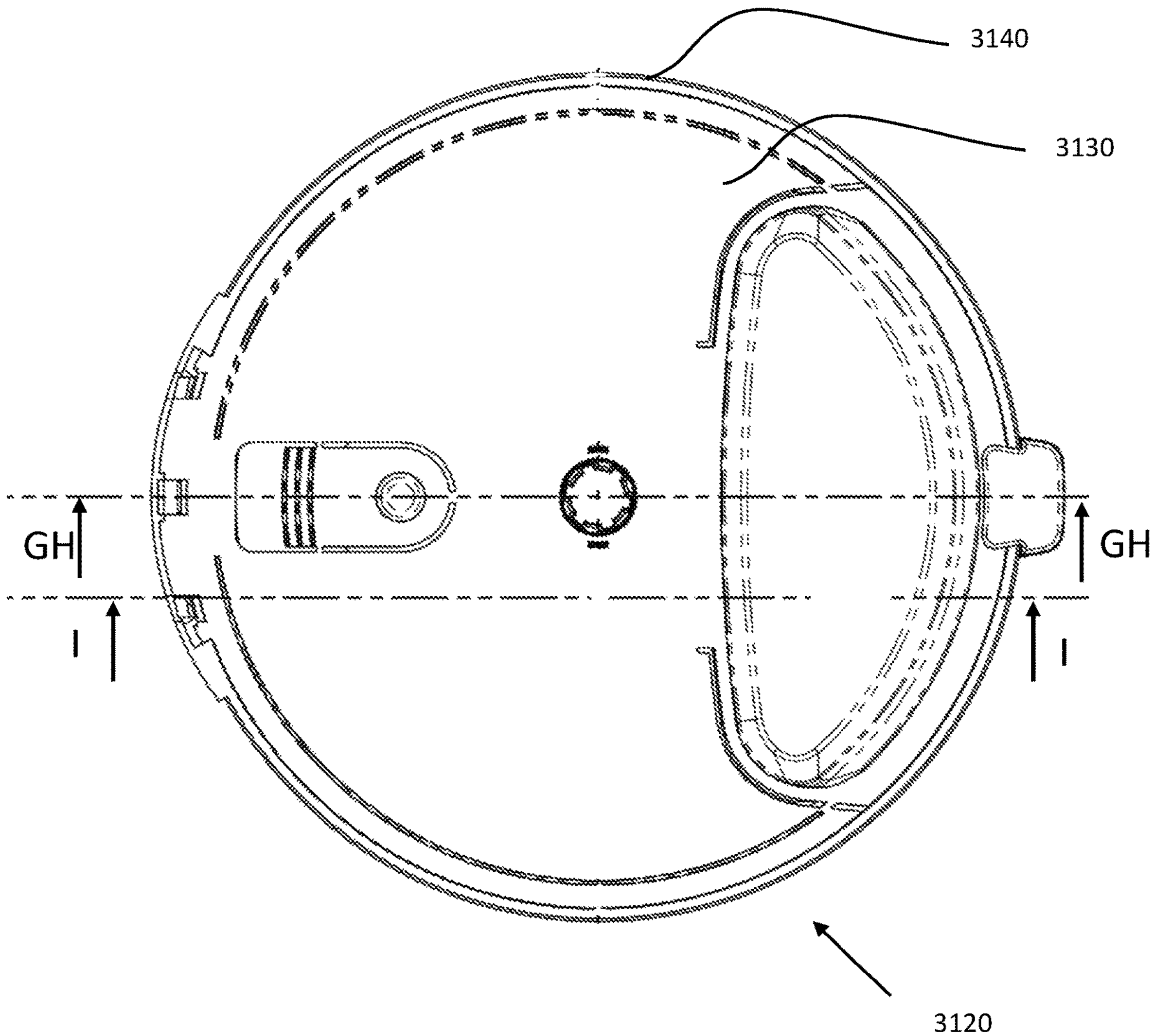
Figure 60D:
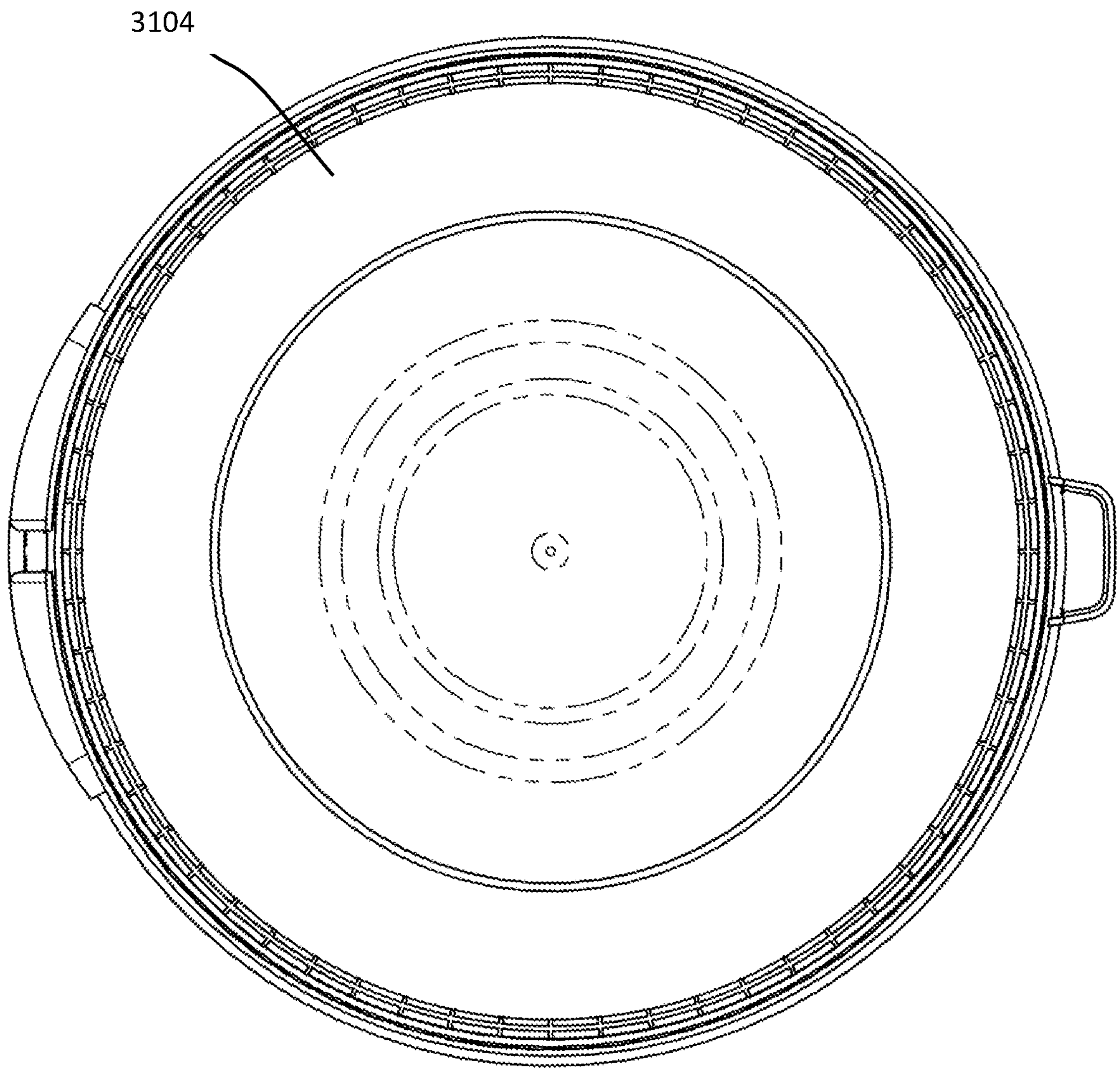
Figure 60E:
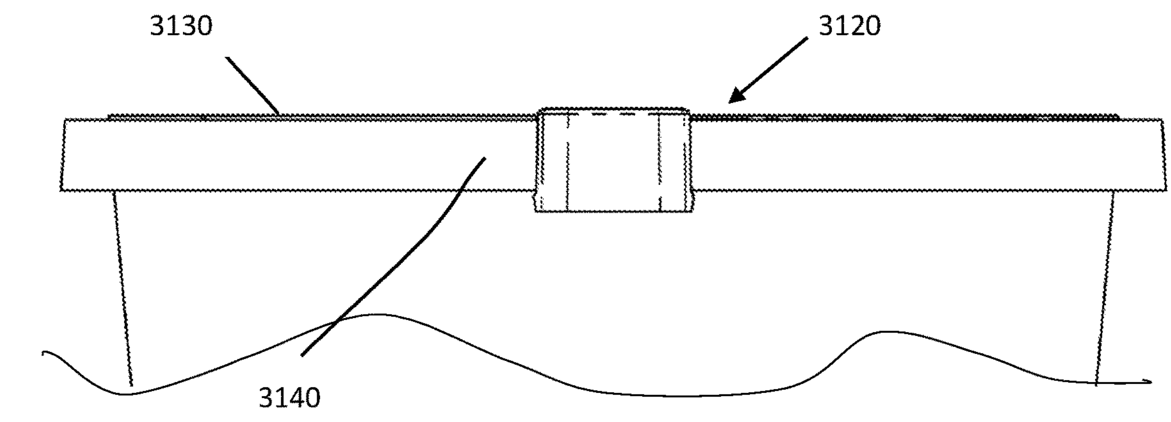
Figure 60F:
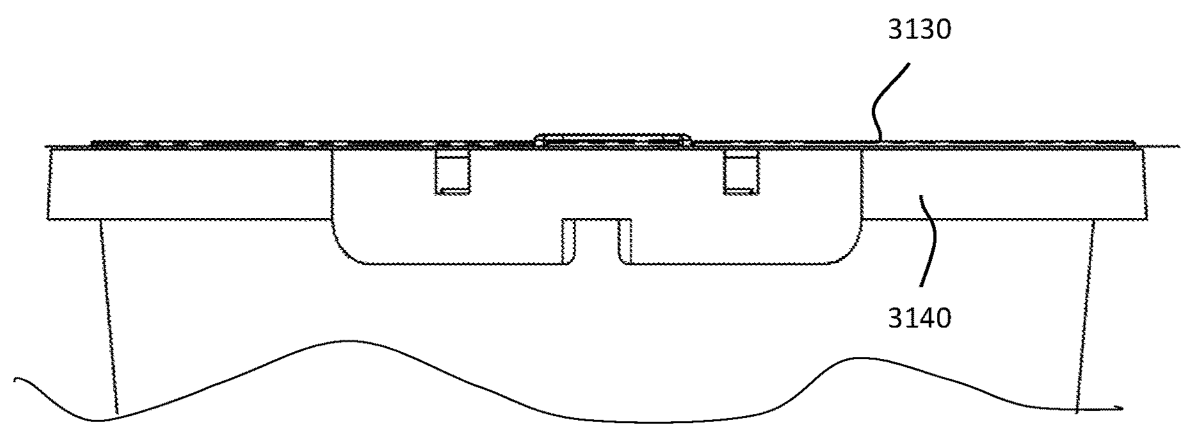
Figure 60G:
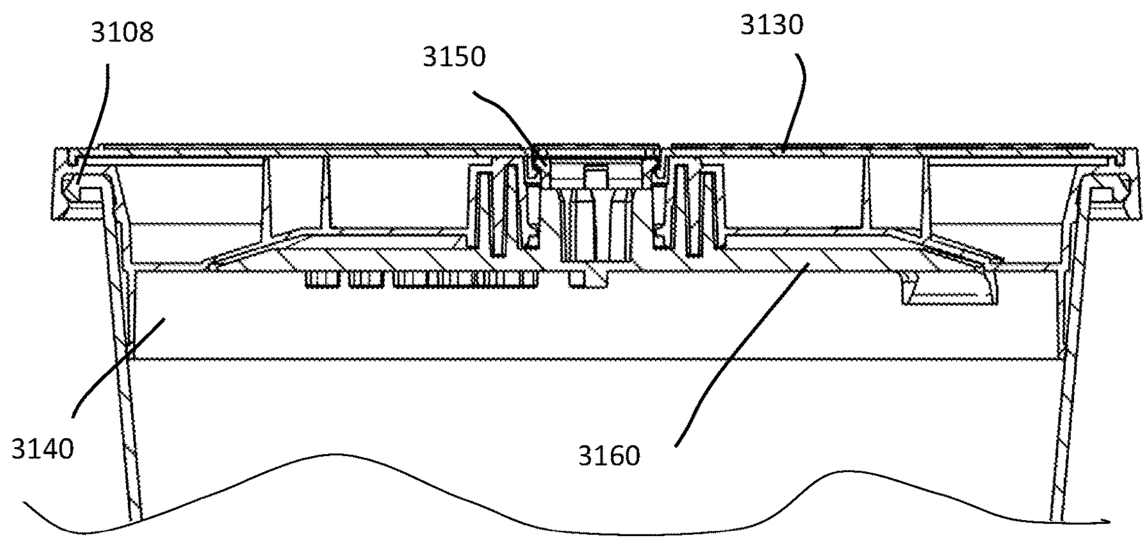
Figure 60H:
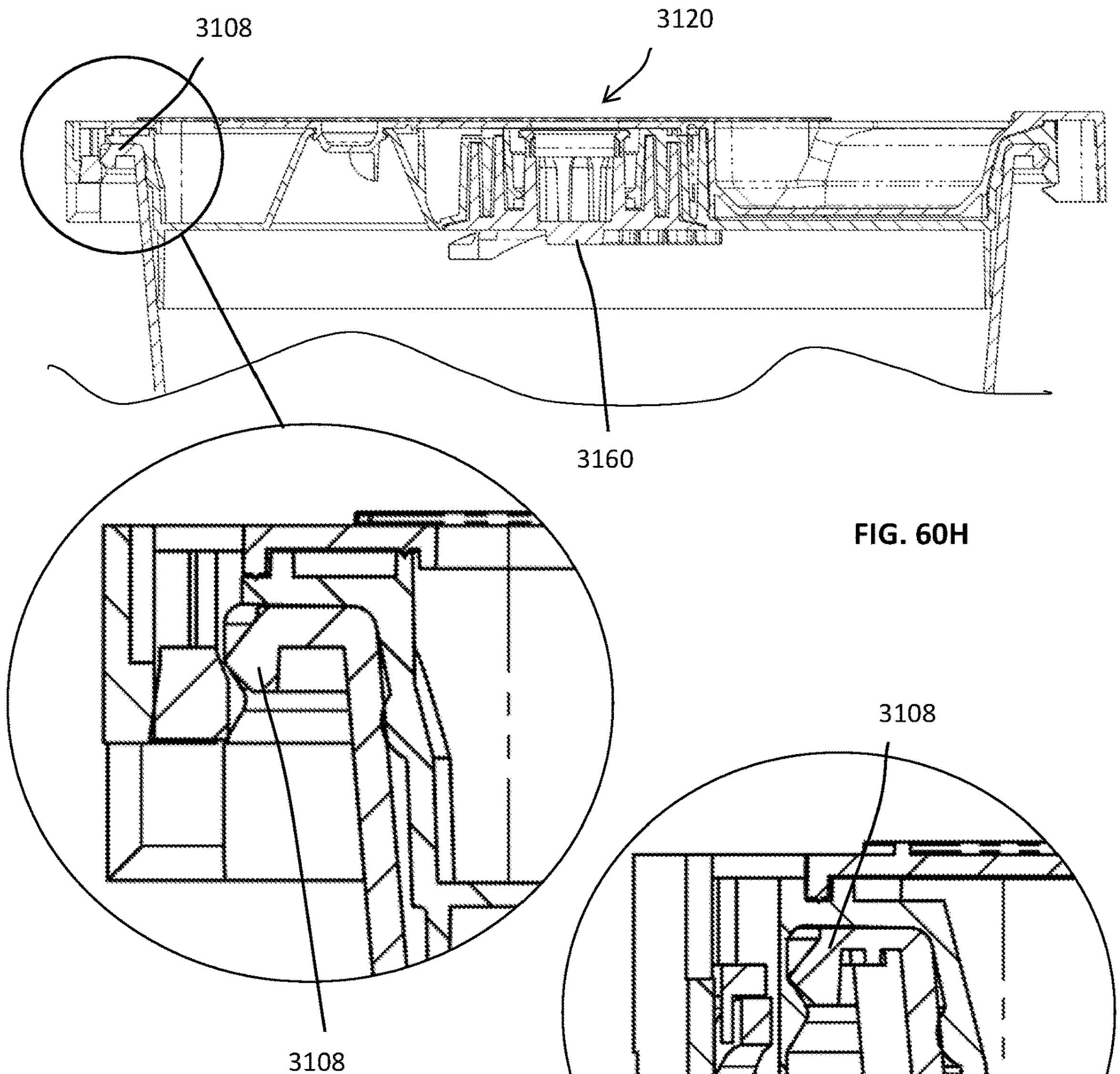
Figure 60I:
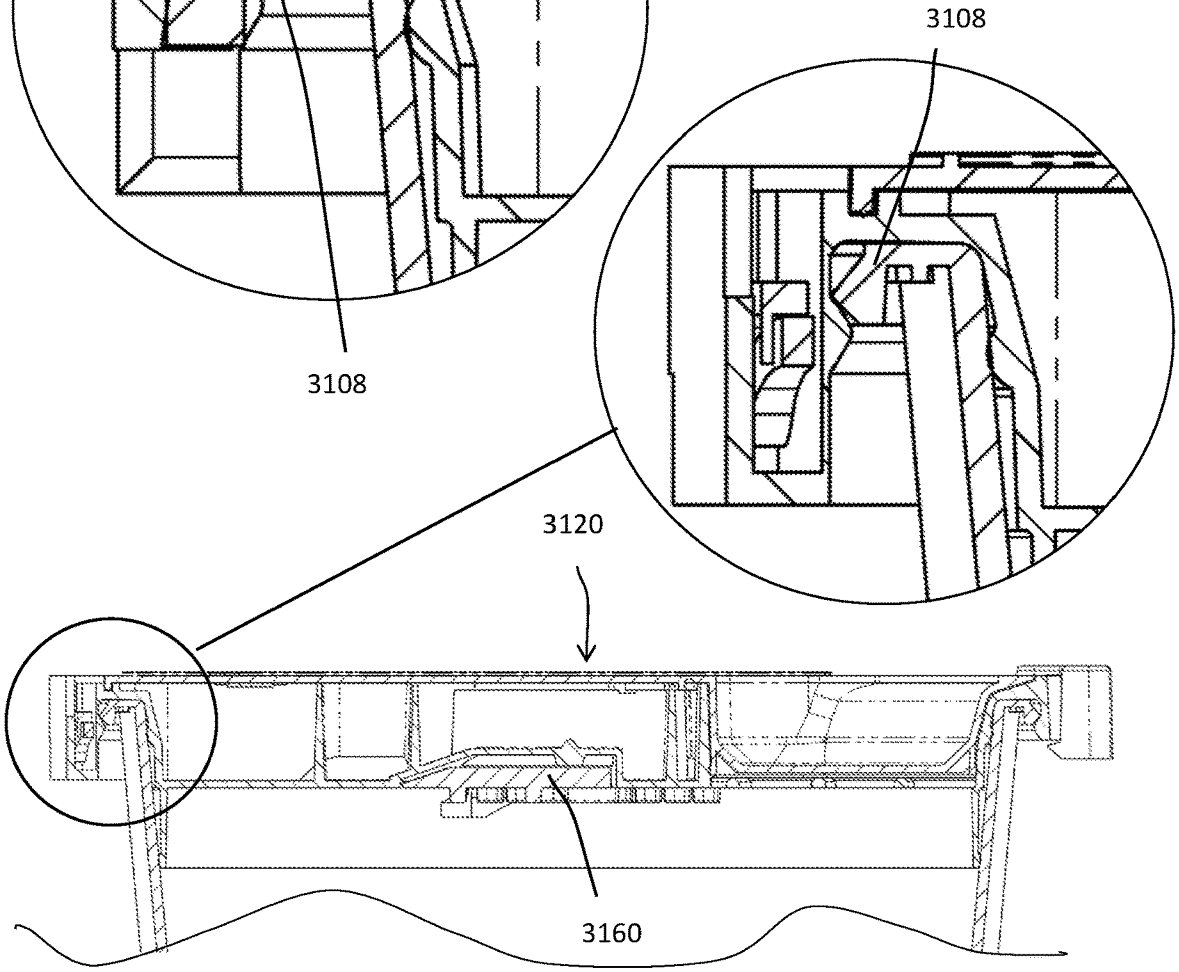
Figure 61A:
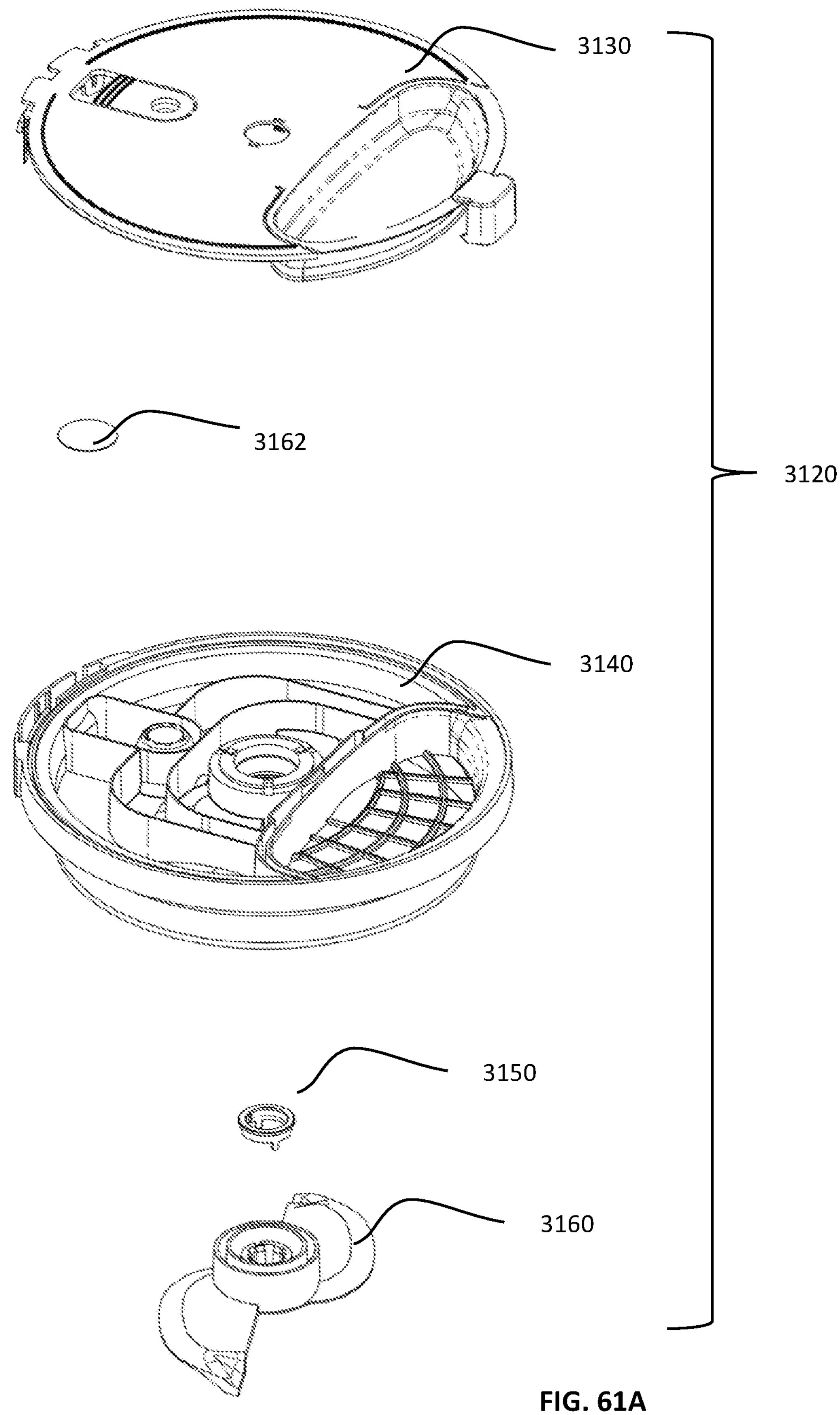
FIGS. 61A and 61B are simplified respective downward-facing and upward-facing exploded view illustrations of the SUCSERDREA of FIGS. 59A-60I.
Figure 61B:
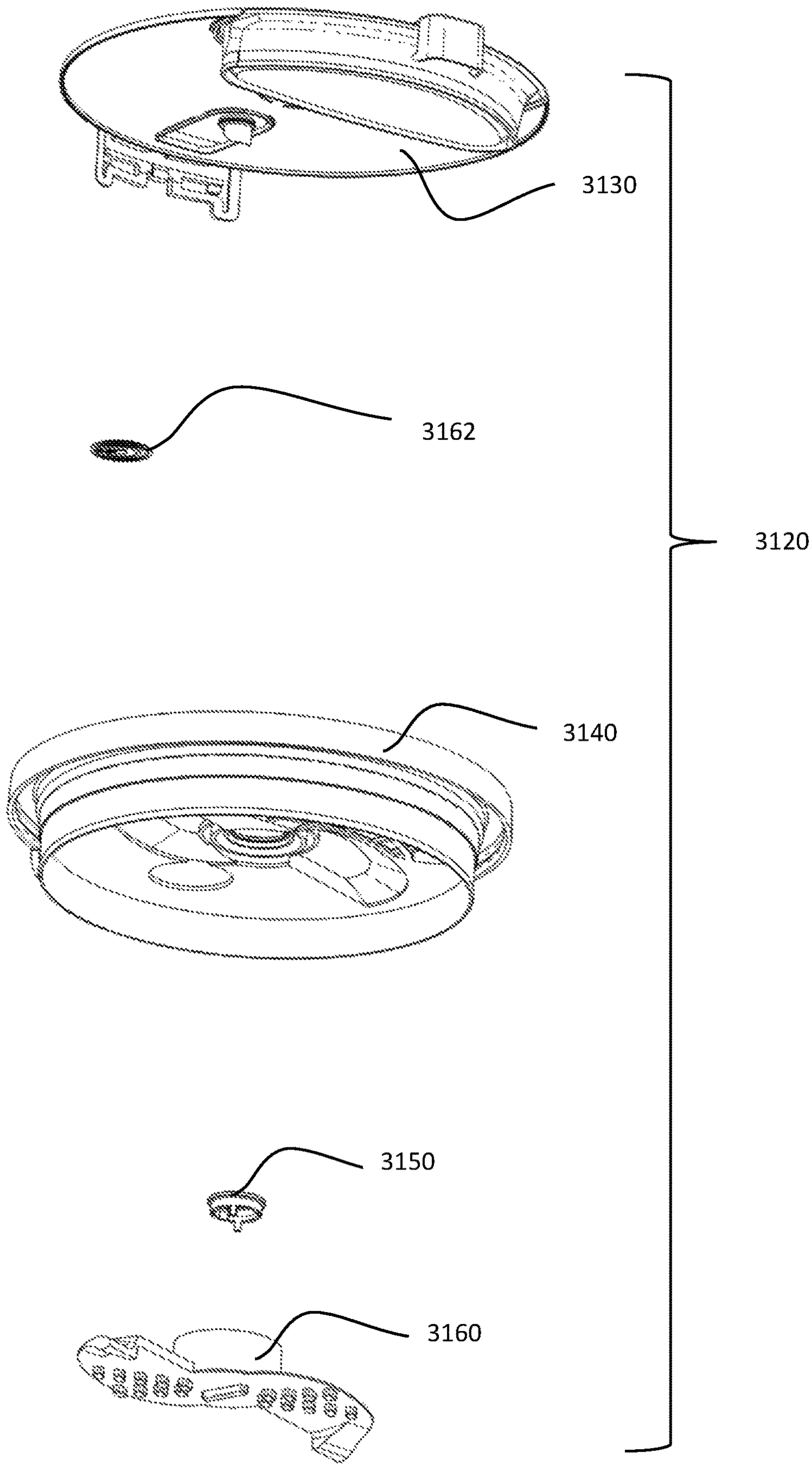

Extending downwardly, in the sense of FIG. 59A, from annular surface 3430 is a radially inwardly slightly tapered circumferential surface 3440. Extending inwardly of radially inwardly circumferential surface 3440 along a portion of the extent thereof, typically about one-third of the circumference thereof, is a liquid ingress opening 3442 formed with a protective grid 3444, which is engaged by cover surface 3198 of cover 3130 when the liquid ingress opening cover 3193 is in its closed and sealed operative orientation. The periphery of liquid ingress opening 3442 is partially defined by surface 3440 and partially by a surface 3446 of a wall 3448.

An additional wall 3450 is spaced from wall 3448 and defines therewith a volume 3452 which partially accommodates integral hinge 3194 of cover 3130.

Extending from wall 3450 in a direction opposite to liquid ingress opening 3442 are a pair of curved mutually separated walls 3454 and 3456, which may provide structural support to cover 3130, when welded to lid 3140, and which may define one or more sealed leaked fluid reservoir volumes 3460.

A straw communication aperture 3462 is preferably provided adjacent leaked fluid reservoir volumes 3460.

Located generally at the center of lid 3140 is a rotary drive aperture 3470, which is surrounded by a multiple walled sealing structure 3480, preferably having a plurality of leaked fluid egress apertures 3482, which communicate with one or more sealed leaked fluid reservoir volumes 3460. Apertures 3482 are distributed along a generally annular planar inner surface 3484, which surrounds aperture 3470. Surrounding surface 3484 and generally downwardly stepped with respected thereto is a generally annular planar surface 3486.

Cover 3130 is preferably welded to lid 3140 at the intersections respectively of an inner edge of annular surface 3484, annular surface 3430, and protrusion 3434 with corresponding surfaces of cover 3130.

An upwardly-facing partially tapered and partially flat annular surface 3488 is defined interiorly of aperture 3470.

Figure 63F:
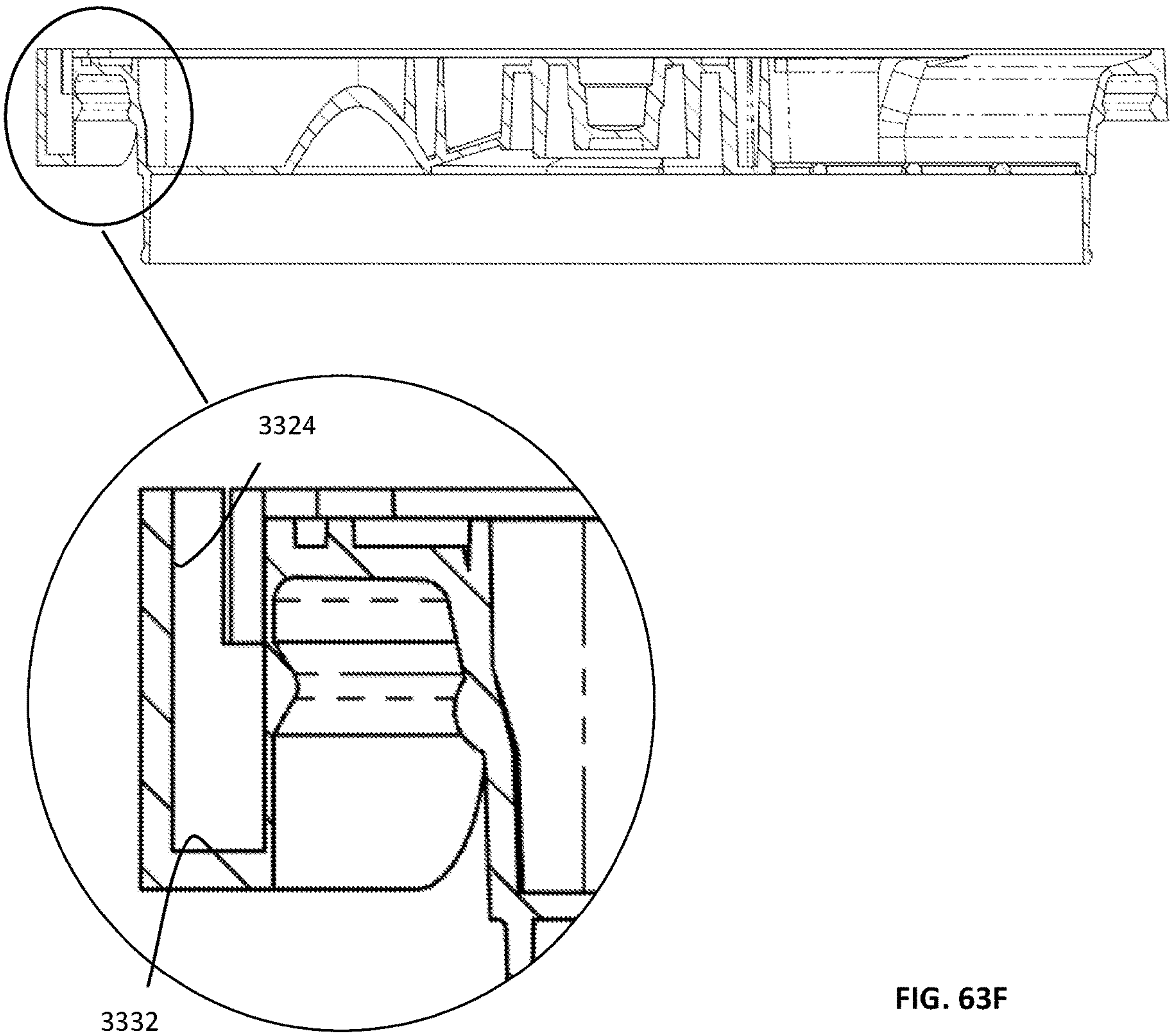
Figure 63G:
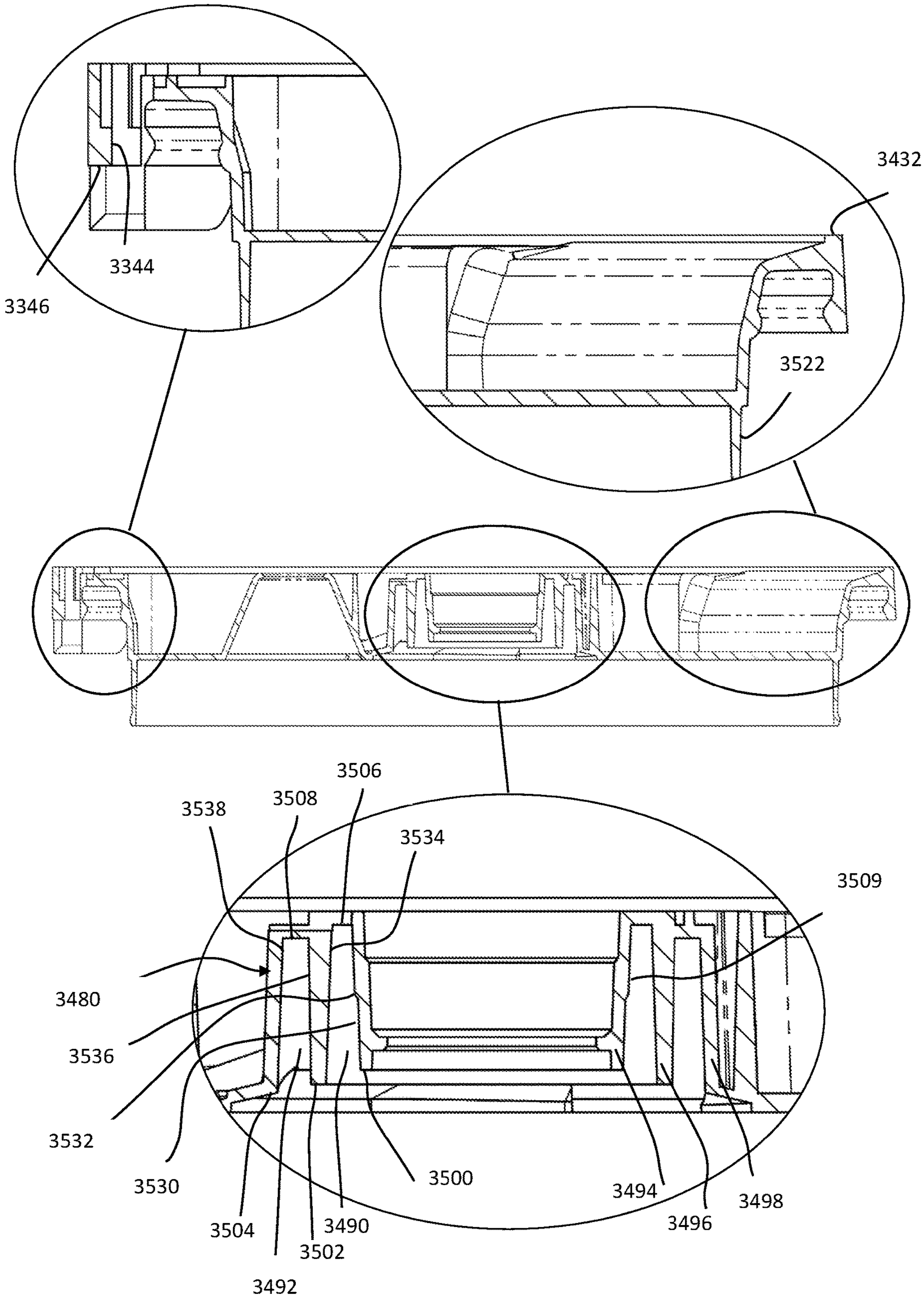
Figure 63H:
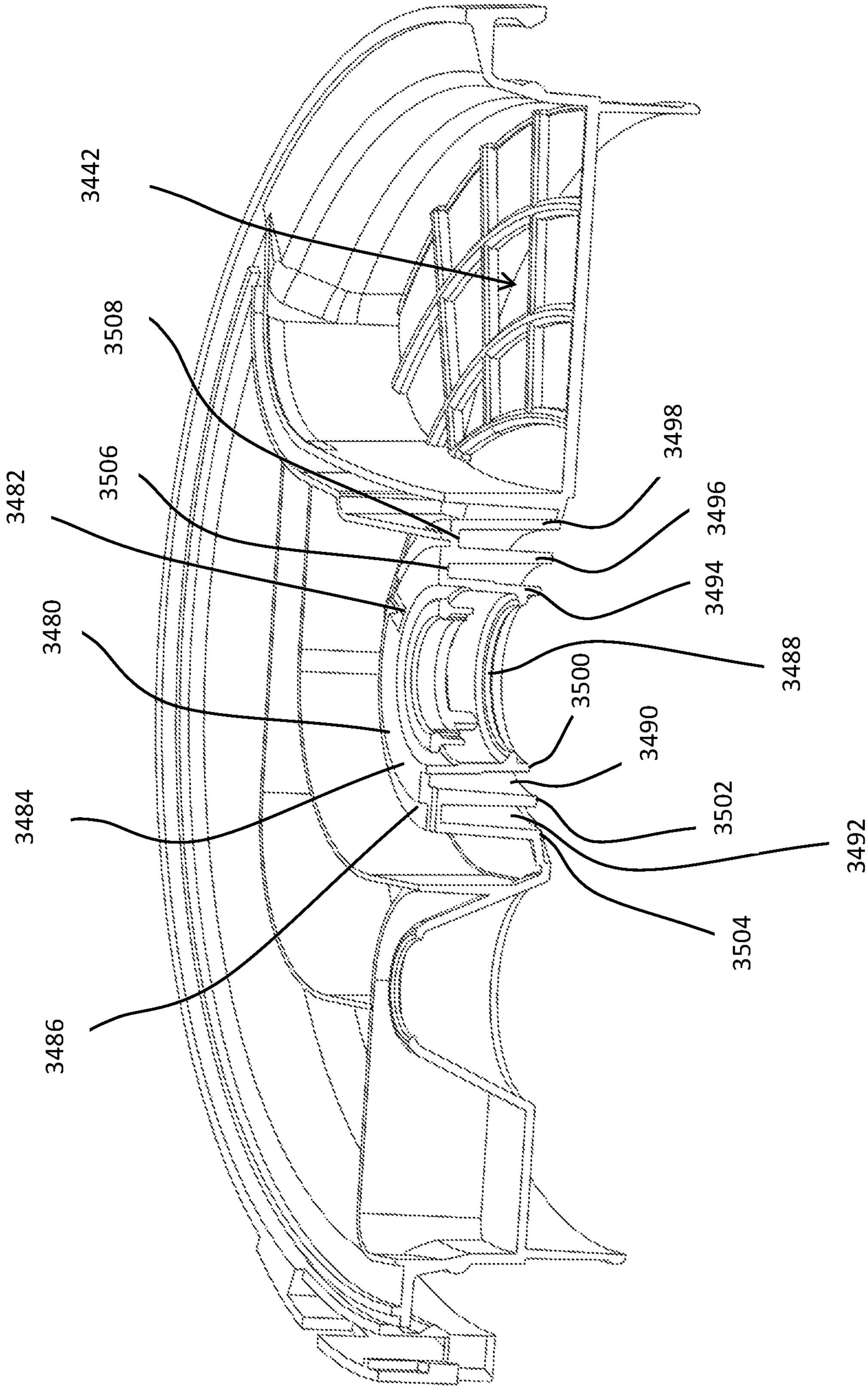

Turning now particularly to FIGS. 63F and 63H, it is seen that multiple walled sealing structure 3480 preferably comprises at least two mutually concentric downwardly-facing recesses 3490 and 3492, in the sense of FIG. 63H, which are sealingly engaged by corresponding protrusions of the blade 3160, as described in detail hereinbelow.

Recesses 3490 and 3492 are defined by three mutually concentric walls 3494, 3496 and 3498, having respective downwardly facing annular edges 3500, 3502 and 3504, and by base surfaces 3506 and 3508 extending respectively between walls 3494 & 3496 and 3496 & 3498. Base surfaces 3506 and 3508 generally underlie respective annular surfaces 3484 and 3486. Wall 3494 preferably defines a radially outwardly facing internal circumferential static sealing surface 3509, which intersects base surface 3506.

A downwardly-facing blade receiving recess 3510 is defined in a downwardly facing, generally planar surface 3512 of lid 3140.

A truncated conical recess 3516 is preferably defined with respect to surface 3512 about straw communication aperture 3462.

Generally coextensive with radially inwardly circumferential surface 3440 and extending downwardly from generally planar surface 3512 is a circumferential wall 3520 having an outer surface 3522 which preferably sealingly engages an interior surface of wall 3106 of container body 3102 when SUCSERDREA 3120 is fully engaged with the single-use container body 3102.

It is appreciated that walls 3494, 3496 and 3498 also define dynamic sealing surfaces as described hereinbelow:

Wall 3494 defines a dynamic radially outwardly facing circumferential sealing surface 3530 which is joined by a circumferential tapered junction surface 3532 to static sealing surface 3509.

Wall 3496 defines a dynamic radially inwardly facing circumferential sealing surface 3534 which faces surfaces 3509, 3530 and 3532.

Wall 3496 also defines a dynamic radially outwardly facing circumferential sealing surface 3536.

Wall 3498 defines a dynamic radially inwardly facing circumferential sealing surface 3538.

Reference is now made to FIGS. 64A-64F, which illustrate an alternative preferred embodiment of blade 3160 of SUCSERDREA 3120.

As seen in FIGS. 64A-64E, blade 3550 comprises a unitary element, preferably injection molded from polypropylene and including a central driving and sealing portion 3600 and a pair of blade portions 3602 extending radially outwardly therefrom in opposite directions. Central driving and sealing portion 3600 comprises a pair of mutually radially spaced, concentric sealing walls 3604 and 3606, extending upwardly in the sense of FIGS. 59A-59I, which show a different embodiment of a blade, from a wall 3608 and defining respective upwardly facing annular surfaces 3610 and 3612. Interiorly of wall 3606 and radially spaced therefrom and concentric therewith is a drive shaft engaging wall 3614 having, on a radially inwardly-facing surface 3616 thereof, an arrangement of curved splines 3618, which engage corresponding recesses on a drive shaft of a container contents processor, such as a multiple motion intelligent driving device (MMIDD), as shown in one of the alternative enlargements appearing in FIG. 68, and together with a portion of surface 3612 define a drive shaft seating recess 3620.

Blade portions 3602 each define a top-facing surface, in the sense of FIGS. 59A-59I, which includes a planar portion 3630 and a tapered portion 3632 which terminates at a curved cutting edge 3634. The tapered portion 3632 includes a further downwardly and circumferentially tapered portion 3636 alongside a trailing edge 3638 of blade portion 3602, defined with respect to a blade rotation direction indicated by an arrow 3640.

A bottom-facing surface 3650 of blade 3550 preferably includes a generally planar surface 3652, which extends over central driving and sealing portion 3600 and most of blade portions 3602. Generally planar surface 3652 may have a slightly downwardly-extending central dome 3654. Also formed on bottom-facing surface 3650 are one or two downwardly and circumferentially tapered portions 3656 alongside trailing edges 3638 of blade portions 3602, which underlie tapered portions 3636. Formed on planar surface 3652 are preferably a central protrusion 3660 and a plurality of mutually spaced radially distributed protrusions 3662.

It is appreciated that walls 3614, 3606 and 3604 define dynamic sealing surfaces as described hereinbelow:

Wall 3614 defines a dynamic radially outwardly facing circumferential sealing surface 3670.

Wall 3606 defines a dynamic radially inwardly facing circumferential sealing surface 3672 which faces surface 3670.

Wall 3606 also defines a dynamic radially outwardly facing circumferential sealing surface 3674.

Wall 3604 defines a dynamic radially inwardly facing circumferential sealing surface 3676.

It is appreciated that an inner disposed portion 3680 of surface 3672 also defines a static sealing surface.

Figure 64A:
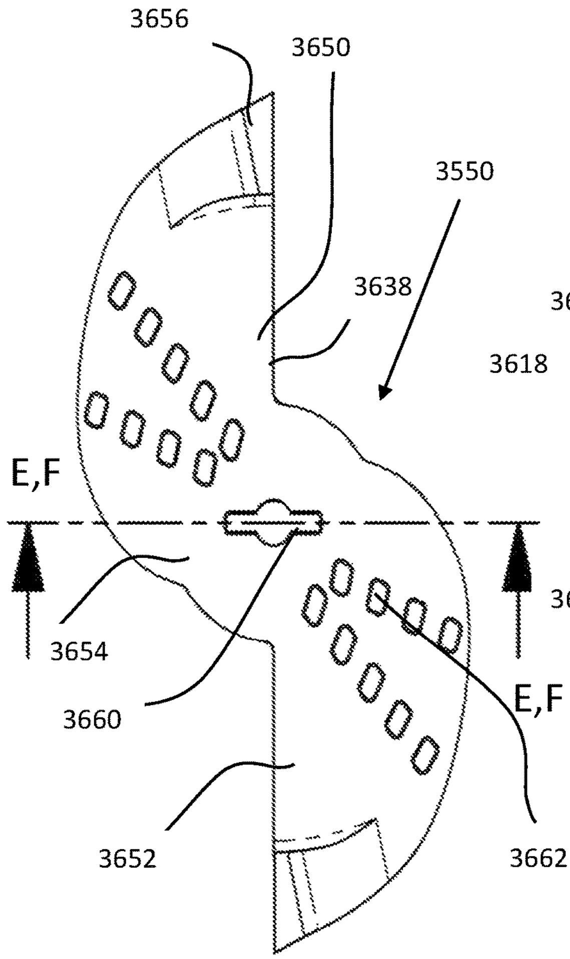
FIGS. 64A, 64B, 64C, 64D, 64E and 64F are simplified respective planar top, planar bottom, pictorial bottom, pictorial top, planar sectional and pictorial sectional illustrations of another preferred embodiment of a blade of the SUCSERDREA of FIGS. 59A-63H, FIGS. 64E and 64F being taken along respective section lines EF-EF in FIG. 64A.
Figure 64B:
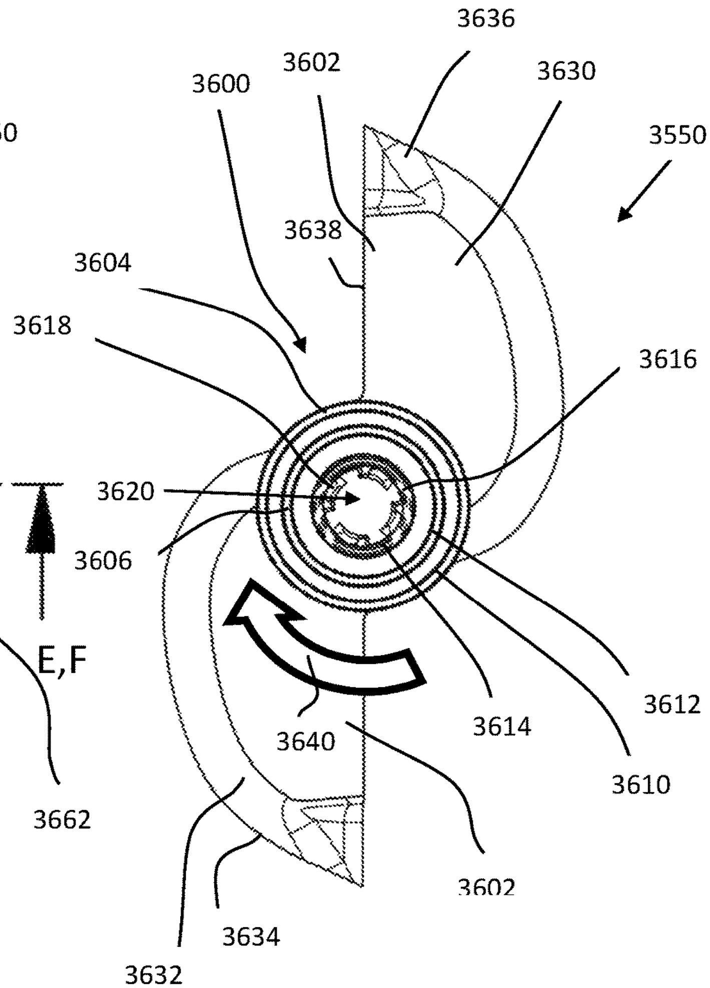
Figure 64C:
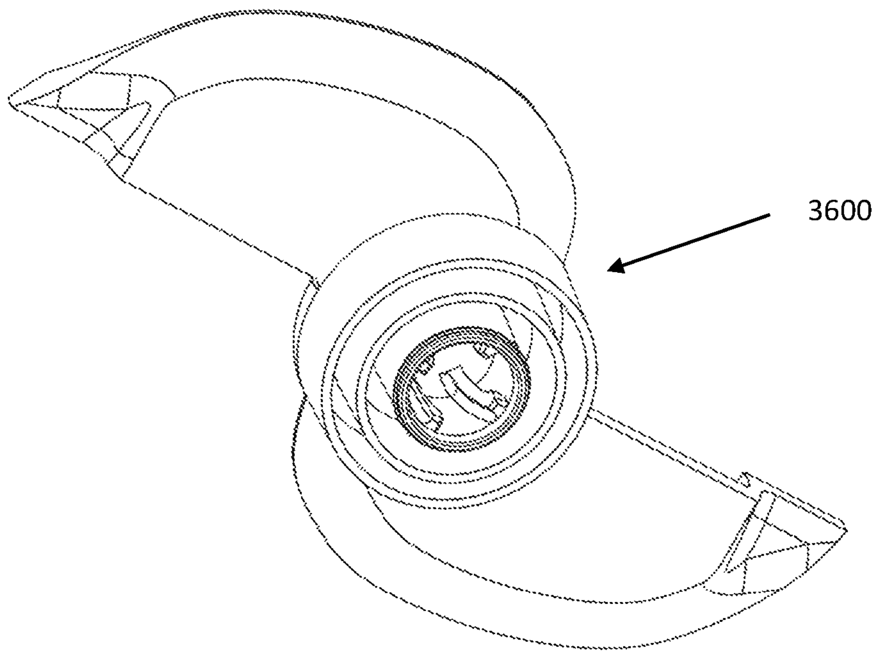
Figure 64D:
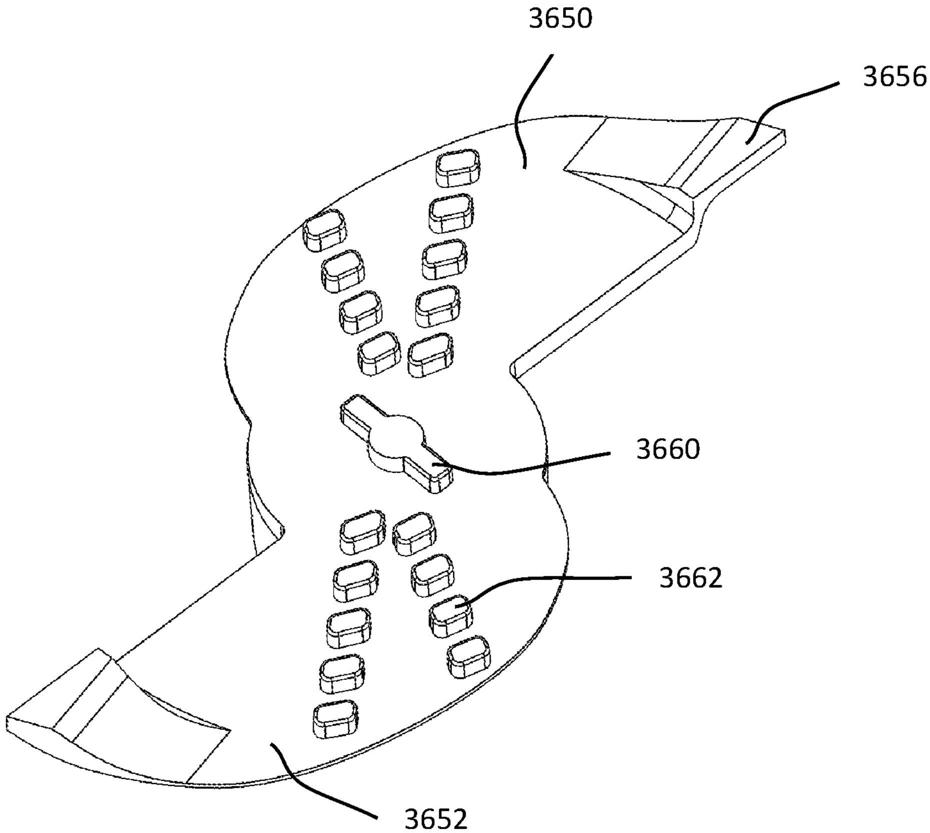
Figure 64E:
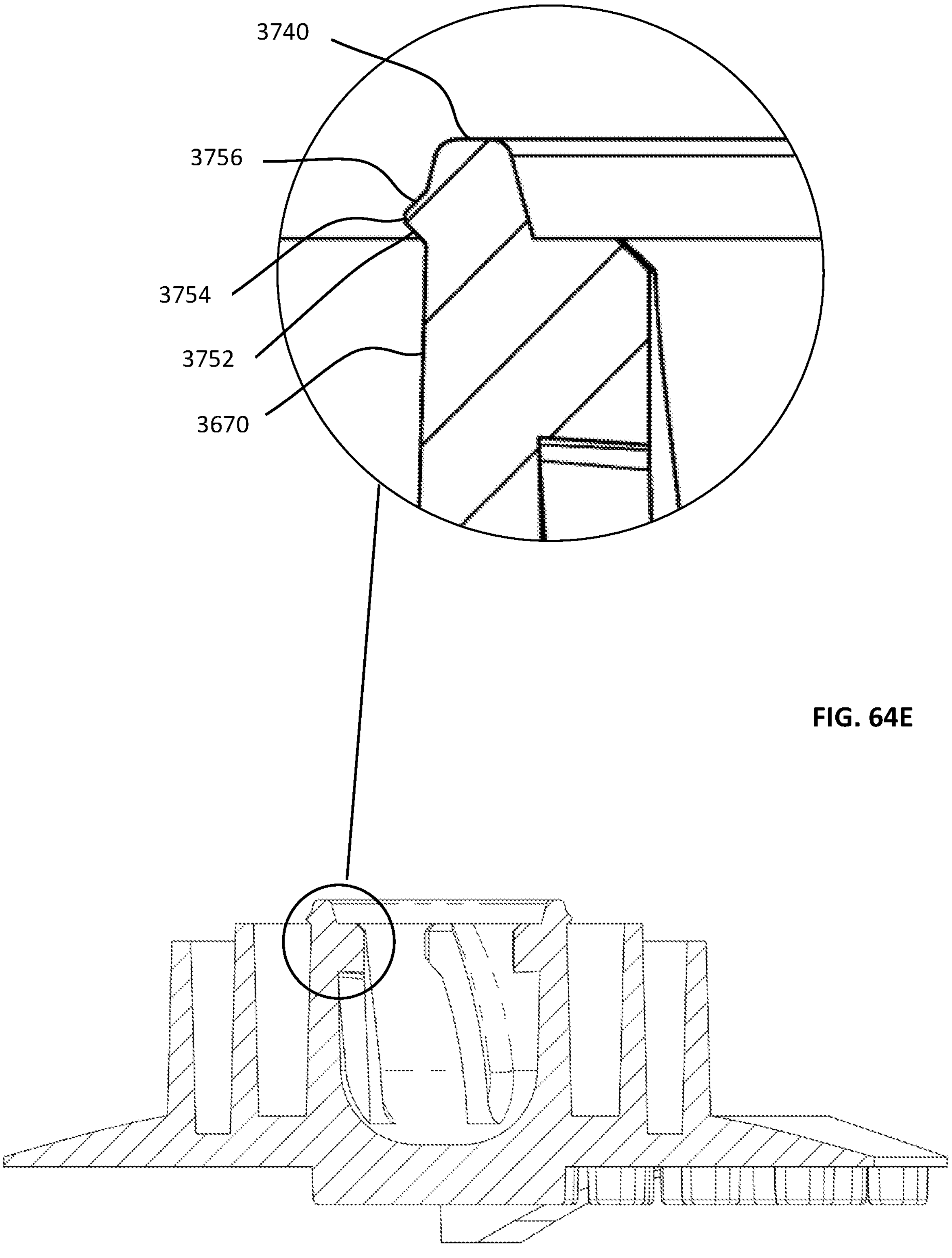
Figure 64F:
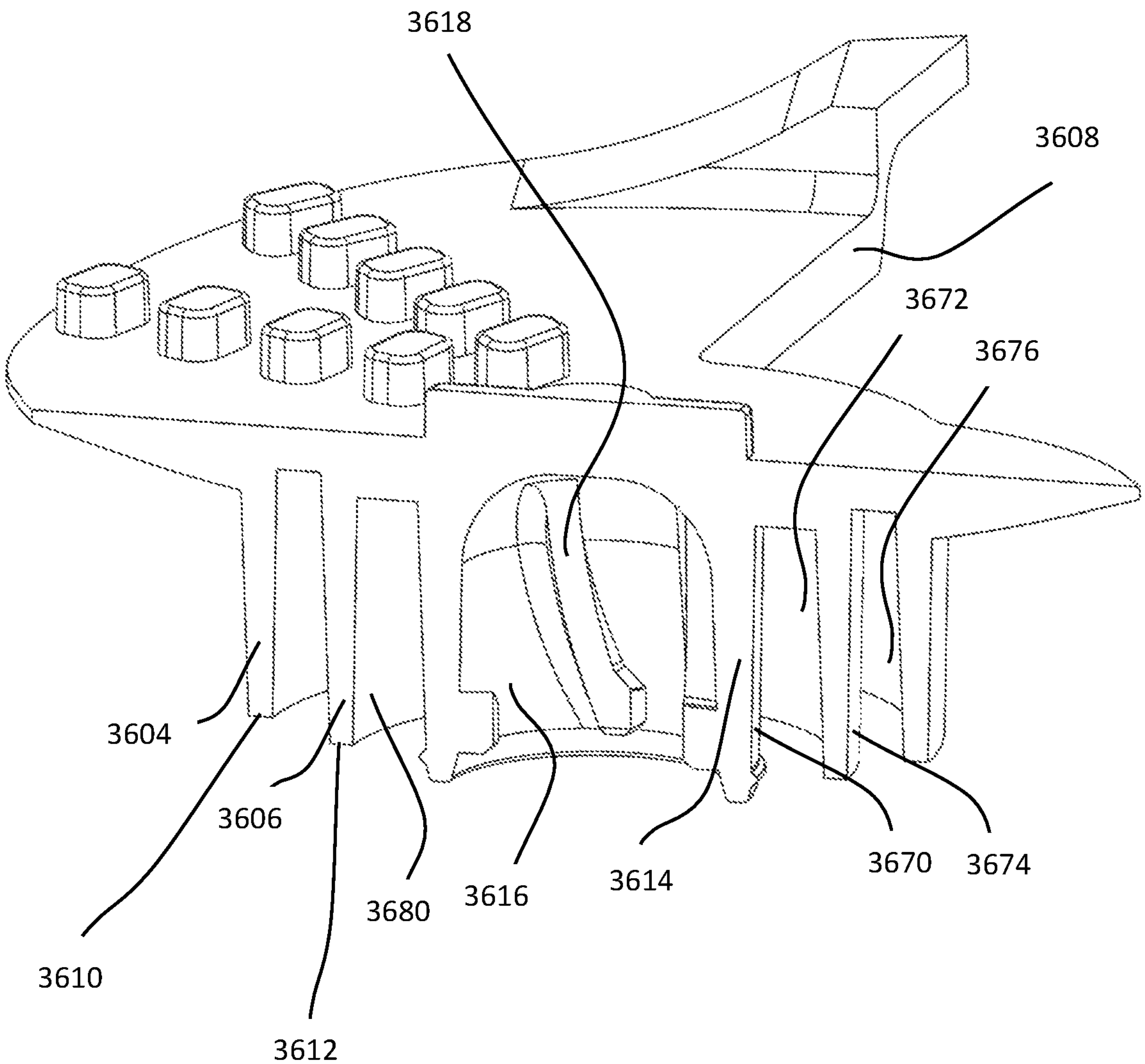

As seen particularly in FIGS. 64E and 64F, wall 3614 preferably defines an upwardly-facing, in the sense of FIGS. 1A & 1B, planar ring surface 3740 and a tapered annular radially outwardly-facing surface 3752 which extends into a radially outwardly-facing edge surface 3754. A radially outwardly and upwardly tapered surface 3756 joins surfaces 3754 and 3740. Tapered annular radially outwardly-facing surface 3752 preferably is rotatably snap fit engaged with flat annular surface 3488 of lid 3140.

Reference is now made to FIGS. 65A-65C, 66A-66E and 67A-67D which illustrate a single-use preparation container assembly (SUPCA) 4100, also referred to as a product container assembly, constructed and operative in accordance with yet another preferred embodiment of the present invention. SUPCA 4100 is preferably used for food products but is not limited for use therewith unless explicitly stated hereinbelow.

As seen in FIGS. 65A-65C, SUPCA 4100 preferably comprises a cup body, such as a single-use container body 4102, for containing a food product prior to, during and following food preparation. Single-use container body 4102 may be any suitable container body 4102 and is preferably a truncated conical shaped container, preferably formed of polypropylene having a bottom wall 4104, a truncated conical side wall 4106 and a circumferential rim 4108.

In accordance with a preferred embodiment of the invention, there is also provided a cup closure, such as a single-use cover seal and externally rotatably drivable rotary engagement assembly (SUCSERDREA) 4120 for fluid sealing engagement with the single-use container body 4102. SUCSERDREA 4120 is preferably used for food products but is not limited for use therewith unless explicitly stated hereinbelow. SUCSERDREA 4120 may also be provided with tamper evidencing and re-use preventing functionality, such as, for example, of the type described hereinabove in various embodiments of the invention.

It is a particular feature of this embodiment of the present invention that the same SUCSERDREA 4120 may be used for container bodies 4102 having different sizes and configurations, provided that their circumferential rim 4108 is uniform.

As seen in FIGS. 65A-65C, SUCSERDREA 4120 preferably includes a cover 4130, a lid 4140 and a blade 4150. Cover 4130 and lid 4140 are preferably fixedly connected to each other, preferably by suitable welding techniques, preferably ultrasonic welding.

SUCSERDREA 4120 preferably includes a machine-readable information source 4160, preferably an RFID tag, but alternatively a bar-coded label or any other suitable machine-readable information source. Preferably, the information contained on the machine-readable information source 4160 is encrypted. Information source 4160 may contain some or all of the relevant information and/or may provide a reference, such as a link to information available on the internet.

As seen in FIGS. 65A-65C, cover 4130 may be substantially identical or similar to cover 130 described hereinabove with reference to FIGS. 3A-3B and 4A-4C and the various elements thereof are identified in FIGS. 65A-65C by reference numerals identical to those employed in FIGS. 3A-3B and 4A-4C.

As seen in FIGS. 65A-65C and 66A-66E, lid 4140 may be similar to lid 140 described hereinabove with reference to FIGS. 5A-5M and may or may not include tamper evidencing and re-use preventing functionality and/or leaked fluid reservoir volumes and/or a blade receiving recess illustrated in FIGS. 5A-5M. Lid 4140 does not include a multiple walled sealing structure as illustrated in FIGS. 5A-5M. Instead lid 4140 includes a central boss 4170 surrounded by an annular sealing surface 4180. Preferably, central boss 4170 has a cylindrical outer surface 4182 and a cylindrical inner surface 4184 defining a radially inwardly directed annular snap fit locking protrusion 4186.

As seen in FIGS. 65A-65C and 67A-67D, blade 4150 may be similar to blade 160 described hereinabove with reference to FIGS. 6A-6E other than as described hereinbelow:

Blade 4150 includes a drive shaft engaging wall 4190, which is identical to drive shaft engaging wall 414 but preferably of increased length and includes an annular radially outwardly extending protrusion 4192.

Importantly, blade 4150 includes a rotatable static sealing portion 4194, which preferably includes a generally cylindrical wall 4196, surrounding drive shaft engaging wall 4190 and radially outwardly spaced therefrom, and a flexible radially outwardly and downwardly extending sealing skirt 4198.

As seen particularly in FIG. 65C, when blade 4150 is lockingly but rotatably engaged with lid 4140, sealing skirt 4198 rotatably sealingly engages annular sealing surface 4180. Preferably, blade 4150 is retained in locked rotatable engagement with lid 4140 by snap fitting of annular radially outwardly extending protrusion 4192 of blade 4150 past radially inwardly directed annular snap fit locking protrusion 4186 of lid 4140 so as to be rotatably axially retained thereby. It is appreciated that upon rotation of blade 4150 the resulting centrifugal force tends to raise sealing skirt 4198 and thus slightly space it from annular sealing surface 4180, thus reducing friction therebetween but, by virtue of the resulting negative pressure thus produced, maintaining an acceptable level of sealing.

Reference is now made to FIGS. 65D-65F, 66A-66E and 67E-67H, which illustrate a single-use preparation container assembly (SUPCA) 4200, also referred to as a product container assembly, constructed and operative in accordance with yet another preferred embodiment of the present invention. SUPCA 4200 is preferably used for food products but is not limited for use therewith unless explicitly stated hereinbelow.

As seen in FIGS. 65D-65F, SUPCA 4200 preferably comprises a cup body, such as a single-use container body 4202, for containing a food product prior to, during and following food preparation. Single-use container body 4202 may be any suitable container body 4202 and is preferably a truncated conical shaped container, preferably formed of polypropylene having a bottom wall 4204, a truncated conical side wall 4206 and a circumferential rim 4208.

In accordance with a preferred embodiment of the invention, there is also provided a cup closure, such as a single-use cover seal and externally rotatably drivable rotary engagement assembly (SUCSERDREA) 4220, for fluid sealing engagement with the single-use container body 4202. SUCSERDREA 4220 is preferably used for food products but is not limited for use therewith unless explicitly stated hereinbelow. SUCSERDREA 4220 may also be provided with tamper evidencing and re-use preventing functionality, such as, for example, of the type described hereinabove in various embodiments of the invention.

It is a particular feature of this embodiment of the present invention that the same SUCSERDREA 4220 may be used for container bodies 4202 having different sizes and configurations, provided that their circumferential rim 4208 is uniform.

As seen in FIGS. 65D-65F, SUCSERDREA 4220 preferably includes a cover 4230, a lid 4240 and a blade 4250. Cover 4230 and lid 4240 are preferably fixedly connected to each other, preferably by suitable welding techniques, preferably ultrasonic welding.

SUCSERDREA 4220 preferably includes a machine-readable information source 4260, preferably an RFID tag, but alternatively a bar-coded label or any other suitable machine-readable information source. Preferably, the information contained on the machine-readable information source 4260 is encrypted. Information source 4260 may contain some or all of the relevant information and/or may provide a reference, such as a link to information available on the internet.

As seen in FIGS. 65D-65F, cover 4230 may be substantially identical or similar to cover 130 described hereinabove with reference to FIGS. 3A-3B and 4A-4C and the various elements thereof are identified in FIGS. 65D-65F by reference numerals identical to those employed in FIGS. 3A-3B and 4A-4C.

As seen in FIGS. 65D-65F and 66A-66E, lid 4240 may be similar to lid 140 described hereinabove with reference to FIGS. 5A-5M and may or may not include tamper evidencing and re-use preventing functionality and/or leaked fluid reservoir volumes and/or a blade receiving recess illustrated in FIGS. 5A-5M. Lid 4240 does not include a multiple walled sealing structure as illustrated in FIGS. 5A-5M. Instead lid 4240 includes a central boss 4270 surrounded by an annular sealing surface 4280. Preferably, central boss 4270 has a cylindrical outer surface 4282 and a cylindrical inner surface 4284 defining a radially inwardly directed annular snap fit locking protrusion 4286.

As seen in FIGS. 65D-65F and 67E-67H, blade 4250 may be similar to blade 3550 described hereinabove with reference to FIGS. 64A-64F other than as described hereinbelow:

Blade 4250 includes a drive shaft engaging wall 4290, which is identical to drive shaft engaging wall 3614, but preferably of increased length, and having, on a portion of a radially inwardly-facing surface 4291 thereof, an arrangement of curved splines 4292 and includes an annular radially outwardly extending protrusion 4293.

Importantly, blade 4250 includes a rotatable static sealing portion 4294, which preferably includes a generally cylindrical wall 4296 surrounding drive shaft engaging wall 4290 and radially outwardly spaced therefrom and which includes a flexible radially outwardly and downwardly extending sealing skirt 4298.

As seen particularly in FIG. 65F, when blade 4250 is lockingly but rotatably engaged with lid 4240, sealing skirt 4298 rotatably sealingly engages annular sealing surface 4280. Preferably, blade 4250 is retained in locked rotatable engagement with lid 4240 by snap fitting of annular radially outwardly extending protrusion 4293 of blade 4250 past radially inwardly directed annular snap fit locking protrusion 4286 of lid 4240 so as to be rotatably axially retained thereby. It is appreciated that upon rotation of blade 4250, the resulting centrifugal force tends to raise sealing skirt 4298 and thus slightly space it from annular sealing surface 4280, thus reducing friction therebetween but, by virtue of the resulting negative pressure thus produced, maintaining an acceptable level of sealing.

It is appreciated that any of the blade portions shown in the embodiments of the blades of FIGS. 6A-6E, 7A-7E and 8A-8E may be utilized in blade 3160 of FIGS. 59A-63H, blade 3550 of FIGS. 64A-64F, blade 4150 of FIGS. 65A-65C and blade 4250 of FIGS. 65D-65F.

Reference is now made to FIG. 68, which is a simplified exploded view illustration of additional preferred embodiments of a multiple motion intelligent driving device (MMIDD) 4300, each constructed and operative in accordance with an embodiment of the present invention and useful with the SUPCA of one or more of FIGS. 1A & 1B, FIGS. 60A-60I, 65A & 65B and 65D & 65E.

As seen in FIG. 68, MMIDD 4300 includes a top housing assembly 4310, which is shown in FIG. 68 in a door closed operative orientation. The top housing assembly 4310 is supported on a base assembly 4320, which also supports a SUPCA support and clamping assembly (SUPCASCA) 4330, which is surrounded by the top housing assembly 4310, when it is in a door closed operative orientation.

The MMIDD 4300 is generally identical or similar to the MMIDD 1000 described hereinabove with reference to FIGS. 10A-37H, other than as described hereinbelow. The reference numerals appearing in FIGS. 10A-37H are employed hereinbelow where appropriate to designate analogous elements.

Reference is now made to FIGS. 69A, 69B, 69C, 69D and 69E, which illustrate SUPCA support and clamping assembly (SUPCASCA) 4330, forming part of the MMIDD 4300 of FIG. 68. As seen in FIGS. 69A-69E, SUPCASCA 4330 preferably includes a support element 4400, which rotatably supports a cam element 4410, which is identical or similar to cam element 1110 and pivotably and slidably supports a first and second identical clamp elements 4420 and a third clamp element 4421, which is narrower than and slightly different from clamp element 4420.

Reference is now made to FIGS. 70A-70F, which are simplified illustrations of clamp element 4420, forming part of the SUPCASCA 4330 of FIGS. 69A-69E. As seen in FIGS. 70A-70F, clamp element 4420 comprises a planar generally rectangular portion 4422, having a radially outward-facing surface 4424 and a radially inward-facing surface 4426. Radially outward-facing surface 4424 terminates at a radially inward top surface 4428 of a clamping portion 4430, defining a radially inwardly and downwardly directed clamping groove 4432, which extends to radially inward-facing surface 4426. Top surface 4428 and clamping groove 4432 together define a clamping engagement edge 4434. A cam engagement protrusion 4436 extends radially inwardly at a bottom portion of radially inward-facing surface 4426. A support element pivotable and slidable engagement protrusion 4438 is formed on radially outward-facing surface 4424 at a location generally opposite protrusion 4436.

Reference is now made to FIGS. 70G-70L, which are simplified illustrations of clamp element 4421, forming part of the SUPCASCA 4330 of FIGS. 69A-69E. As seen in FIGS. 70G-70L, clamp element 4421 comprises a planar generally rectangular portion 4452, having a radially outward-facing surface 4454 and a radially inward-facing surface 4456. Radially outward-facing surface 4454 terminates at a radially inward top surface 4458 of a clamping portion 4460, defining a radially inwardly and downwardly directed clamping groove 4462, which extends to radially inward-facing surface 4456. Top surface 4458 and clamping groove 4462 together define a clamping engagement edge 4464. A radially inwardly and downwardly extending stepped protrusion 4465 extends rearwardly of clamping portion 4460 partially into groove 4462.

A cam engagement protrusion 4466 extends radially inwardly at a bottom portion of radially inward-facing surface 4456. A support element pivotable and slidable engagement protrusion 4468 is formed on radially outward-facing surface 4454 at a location generally opposite protrusion 4466.

Reference is now made to FIGS. 71A-71F, which are simplified illustrations of support element 4400, forming part of SUPCASCA 4330 of FIGS. 69A-69E. As seen in FIGS. 71A-71F, support element 4400 preferably comprises a generally circular planar surface 4500, which is surrounded by a raised, generally annular planar container support surface 4510, preferably joined to surface 4500 by a tapered circular wall 4512. A spillage channel 4514 extends radially outwardly through tapered circular wall 4512 at a height between the planes of surface 4500 and annular planar container support surface 4510.

Disposed centrally of generally circular planar surface 4500 is a drive shaft accommodating aperture 4530, which is surrounded by an upstanding circumferential rim 4532, thereby to help prevent leaking of spillage located on generally circular planar surface 4500 into the remainder of the MMIDD 4300 lying below support element 4400.

Annular planar container support surface 4510 is preferably surrounded by a tapered wall 4540. Wall 4540 terminates in a circumferential planar annular top and radially outwardly extending wall 4544, having a top-facing surface 4546.

Extending circumferentially to both sides of channel 4514 is a SUPCA azimuthal locating channel 4550, which extends radially outwardly of wall 4540 and communicates with channel 4514. SUPCA azimuthal locating channel 4550 accommodates finger engagement portion 196 of SUPCA 100 and analogous finger engagement portions of other embodiments of SUPCAs described hereinabove.

A pair of cup engagement protrusions 4554 preferably extend radially inwardly from wall 4540.

Walls 4540 and 4544 are formed with a pair of clamp accommodating pockets 4560 and an additional clamp accommodating pocket 4561. Each of pockets 4560 and 4561 preferably includes an opening 4562, which extends from wall 4540 at a height just below that of wall 4544 radially outwardly along wall 4544. Each of pockets 4560 and 4561 includes a radially outwardly extending wall 4564 and side walls 4566. Radially outwardly extending wall 4564 includes a radially inward lower portion 4568 and a radially outward upper portion 4570 joined by a concave curved surface 4572. Preferably, a magnet 4574 is seated behind radially inward lower portion 4568. A pair of protrusions 4576 extend radially inwardly from radially inward outer portion 4568 adjacent each of side walls 4566 and underlying opening 4562 of pocket 4561. Extending radially inwardly from radially inward outer portion 4568 adjacent each of side walls 4566 and underlying opening 4562 of pockets 4560 is an elongate protrusion 4578.

Preferably, a depending circumferential wall 4580 extends along nearly one half of the circumference of wall 4544 at an outer edge thereof.

Underlying surface 4500 is a corresponding circular generally planar surface 4590, which is formed with a convex curved circumferential wall 4592 surrounding aperture 4530. Downwardly and outwardly of wall 4592 there is formed a centering wall 4593, which defines generally circular recess 4594, which is preferably configured to have a radially outwardly extending rectangular notch 4596. Wall 4593 preferably defines a plurality of circumferentially distributed radially inwardly-facing motor assembly engagement protrusions 4597.

Reference is now made additionally to FIGS. 72A, 72B, 72C and 72D, which are simplified respective pictorial, planar front, planar top and exploded view illustrations of multiple alternative embodiments of a base assembly 4320 forming part of the MMIDD 4300 of FIGS. 68-71F.

As seen in FIGS. 72A-72D, the base assembly 4320 includes a base housing 4600, which is preferably generally cubic in configuration and is supported on a bottom assembly 4610. Mounted on base housing 4600 is an ON/OFF push button element 4620.

Disposed within base housing 4600 are a vertically displacing rotary drive motor assembly 4630 and a printed circuit board 4635, which preferably contains control electronics which manage operation of the MMIDD 4300. Motor assembly 4630 includes an outer drive shaft assembly 4640, which may be identical to outer drive shaft assembly 1900, which is described hereinabove. Three alternative embodiments of outer drive shaft assemblies 4640, here respectively designated by reference numerals 4642, 4644 and 4646 are shown in enlargements in FIGS. 68, 72A-72B, 73B and 75B and described hereinbelow in detail with reference to FIGS. 76A-81B, FIGS. 82A-87D, and FIGS. 88A-88E, respectively.

Figure 73A:
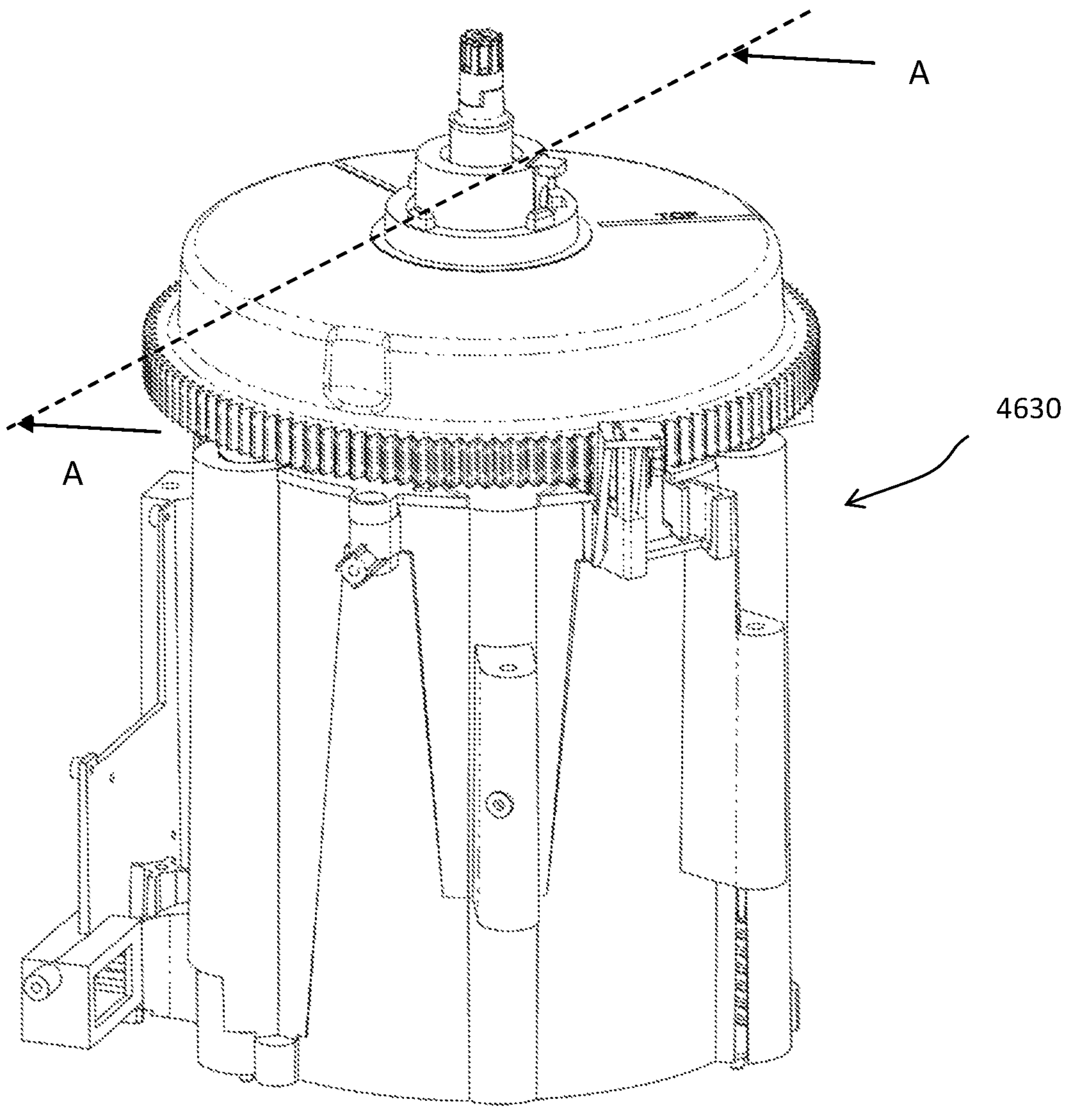
FIGS. 73A and 73B are simplified respective pictorial and exploded view illustrations of a vertically displacing rotary drive motor assembly forming part of the base assembly of FIGS. 72A-72D.
Figure 73B:
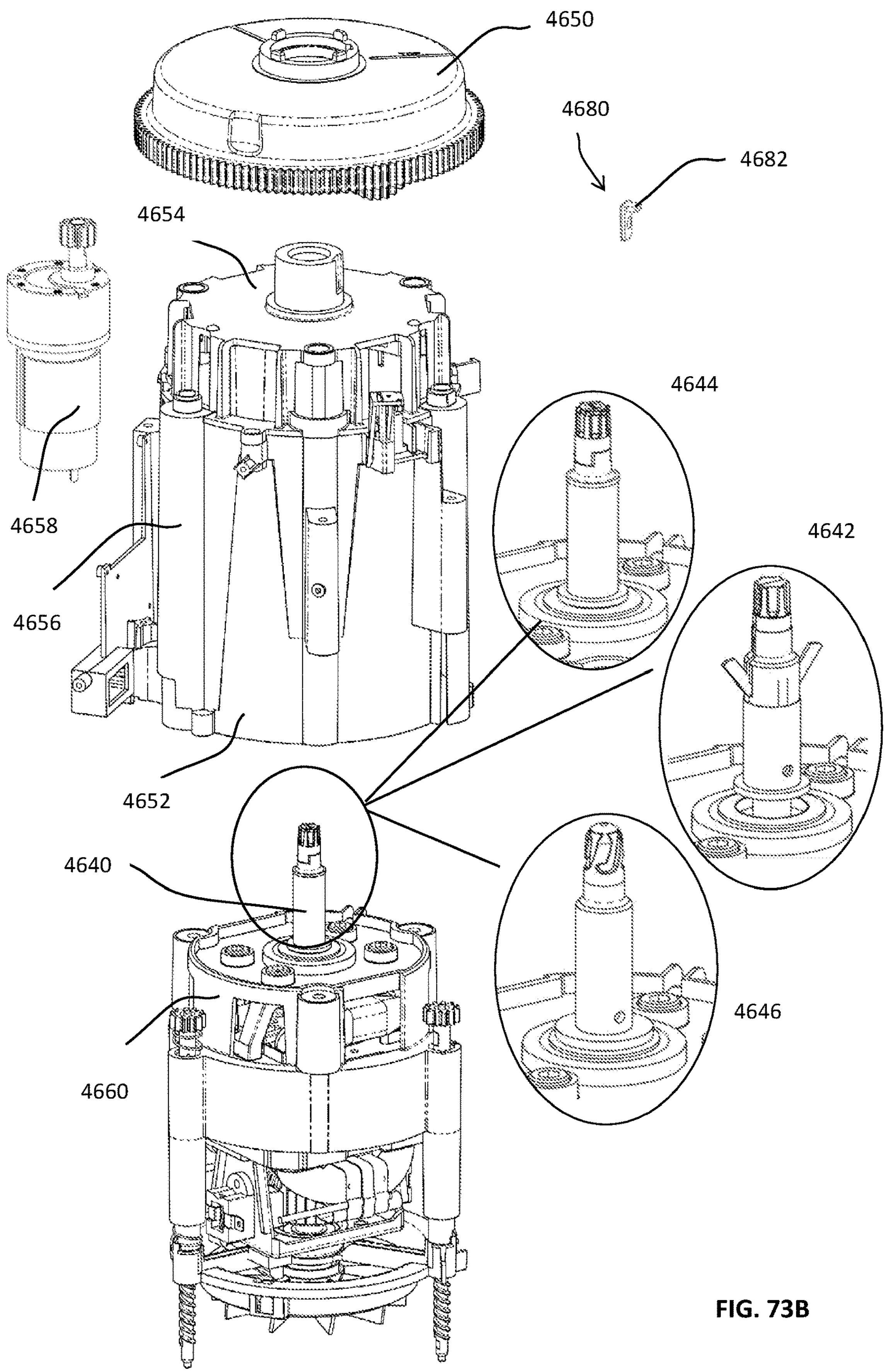

Reference is now made to FIGS. 73A and 73B, which are simplified respective pictorial and exploded view illustrations of vertically displacing rotary drive motor assembly 4630, forming part of the base assembly 4320 of FIGS. 72A-72D. Vertically displacing rotary drive motor assembly 4630 includes a rotary drive gear 4650, which is rotatably mounted on a motor housing and support assembly 4652 including a top element 4654 and a bottom element 4656. Motor housing and support assembly 4652 in turn supports an auxiliary rotary drive motor 4658 and encloses an axially displaceable rotary drive assembly 4660.

Axially displaceable rotary drive assembly 4660 includes outer drive shaft assembly 4640, which, as noted above, forms part of motor assembly 4630. As further noted above, outer drive shaft assembly 4640 may be identical to outer drive shaft assembly 1900 or may alternatively comprise one of outer drive shaft assemblies 4642, 4644 and 4646.

Figure 74A:
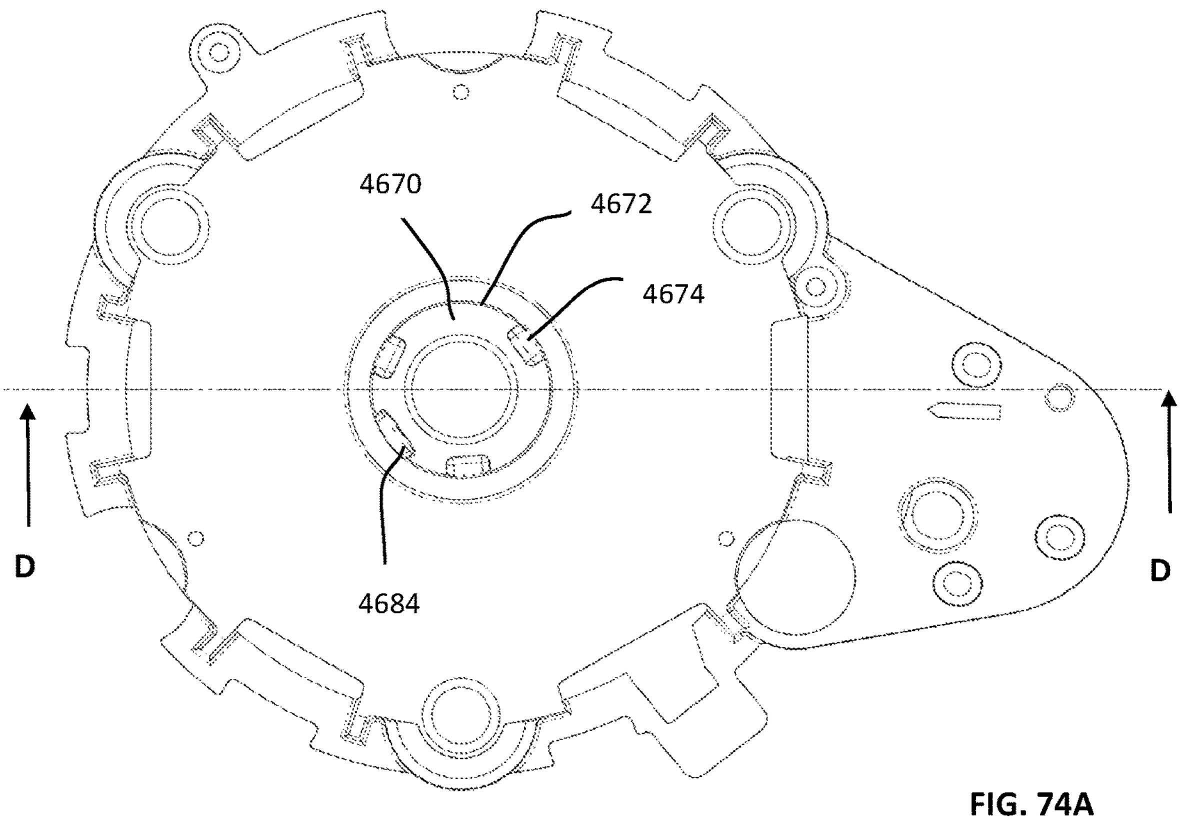
FIGS. 74A, 74B, 74C, 74D, 74E and 74F are simplified respective planar top, planar bottom, planar side, sectional, pictorial top and pictorial bottom view illustrations of a top element forming part of the vertically displacing rotary drive motor assembly of FIGS. 73A & 73B, FIG. 74D being taken along lines D-D in FIG. 74A.
Figure 74B:
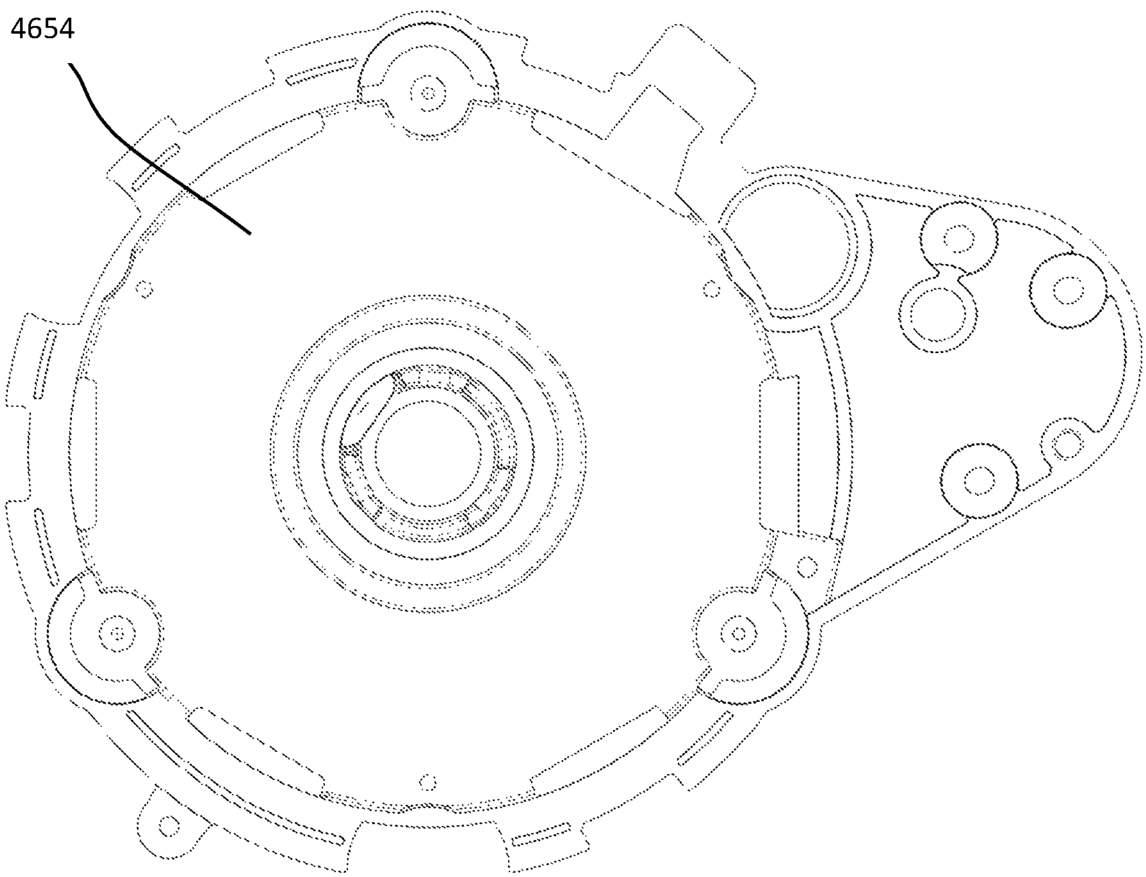
Figure 74C:
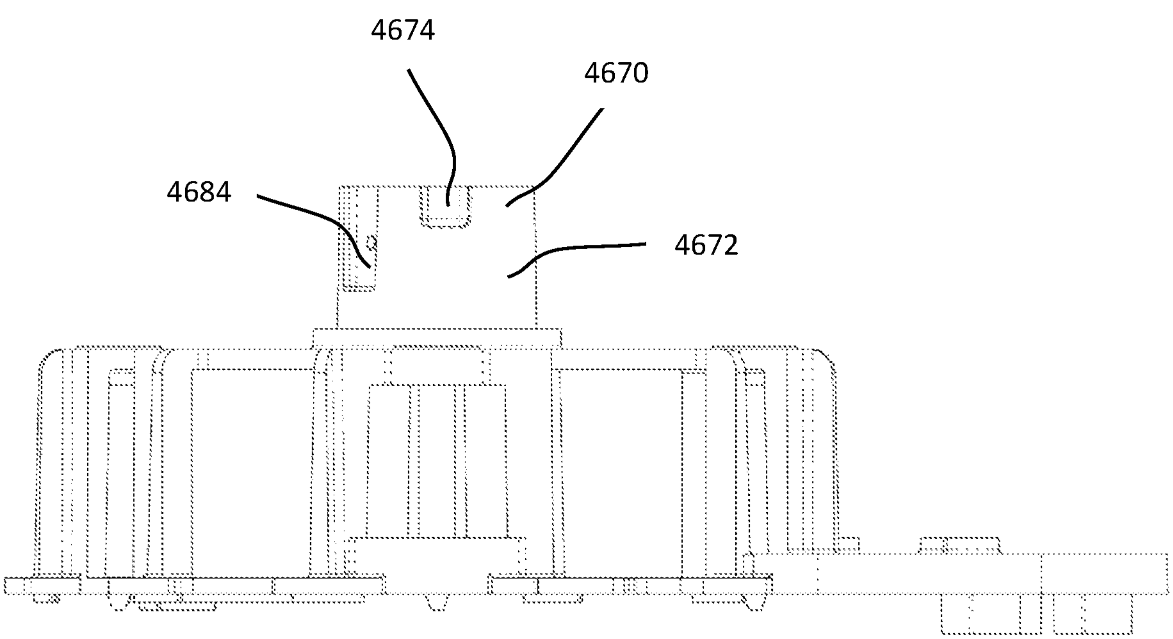
Figure 74D:
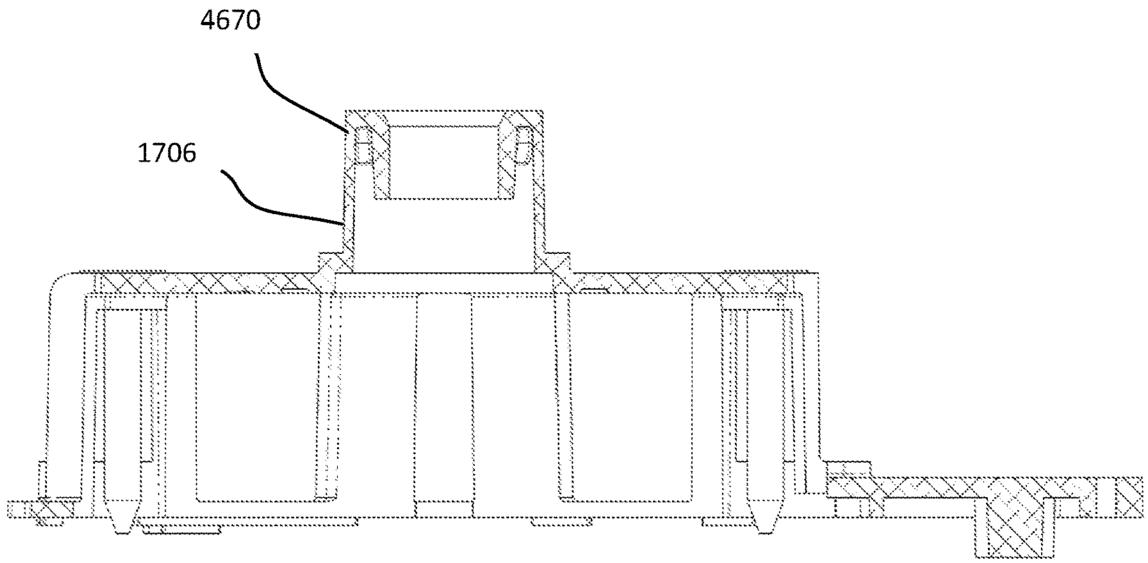
Figure 74E:
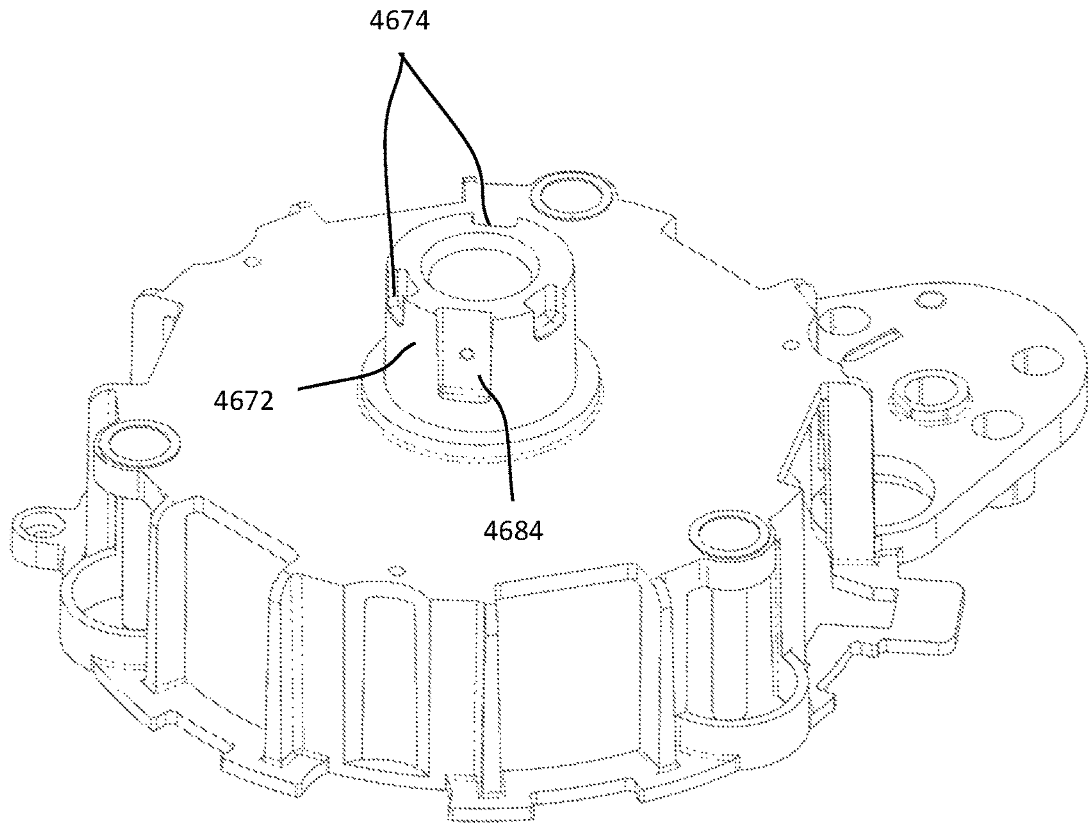
Figure 74F:
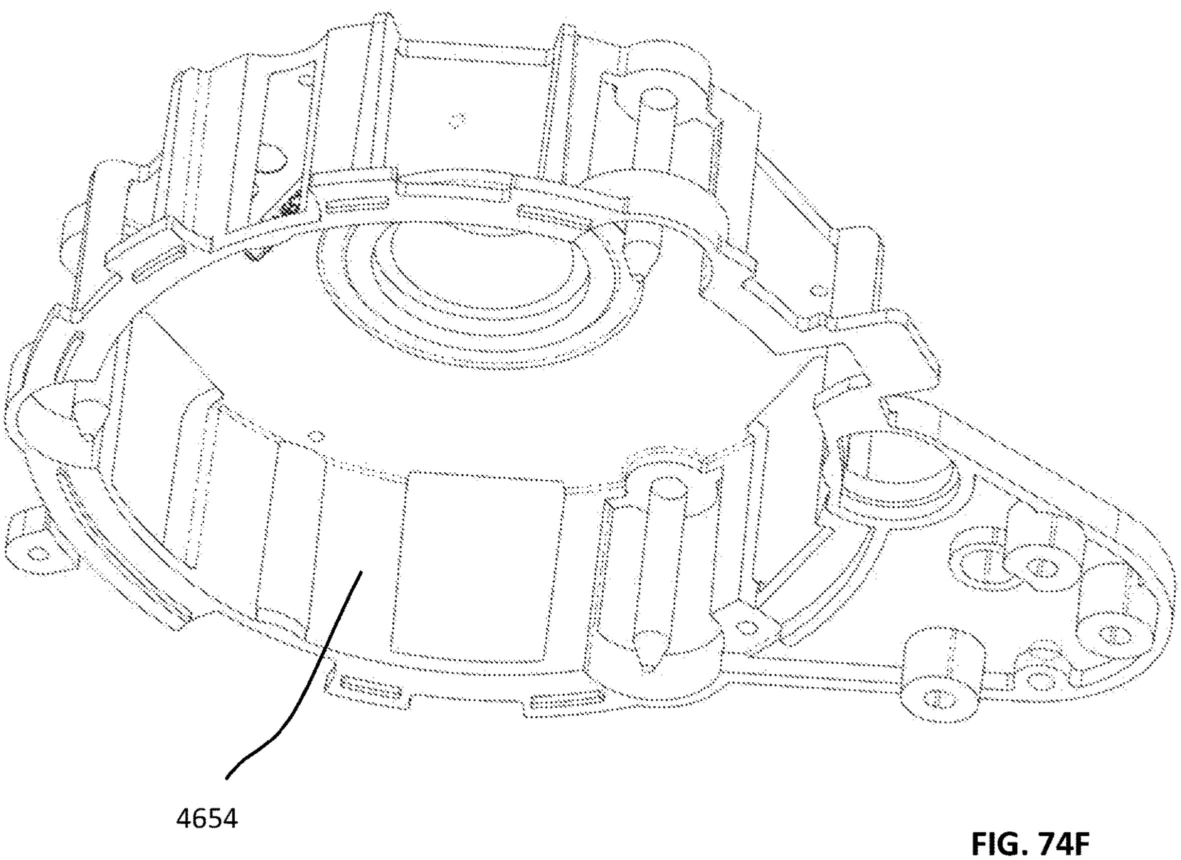

Vertically displacing rotary drive motor assembly 4630 may be identical or similar to vertically displacing rotary drive motor assembly 1430, which is described hereinabove with reference to FIGS. 19A-37H, except as described hereinbelow:

Specific reference is now made additionally to FIGS. 74A, 74B, 74C, 74D, 74E and 74F, which are simplified respective planar top, planar bottom, planar side, sectional, pictorial top and pictorial bottom view illustrations of top element 4654, forming part of the vertically displacing rotary drive motor assembly 4630 of FIGS. 73A & 73B, FIG. 74D being taken along lines D-D in FIG. 74A.

Top element 4654 may be identical or similar to the top element described hereinabove with reference to FIGS. 24A-24F except as described hereinbelow:

Upstanding circumferential wall surface 1706 (FIGS. 24A-24F) is extended upwardly to define a boss 4670 having a cylindrical outer surface 4672 having a plurality of circumferentially distributed recesses 4674, which are engaged by corresponding circumferentially distributed radially inwardly-facing motor assembly engagement protrusions 4597 of wall 4593 of support element 4400.

Radially outwardly extending protrusion 1710 (FIGS. 24A-24F) is replaced by a right angle element 4680 (FIG. 73B) having a radially outwardly protruding finger portion 4682 (FIG. 73B), which is seated in a recess 4684 formed on a cylindrical outer surface 4672 of boss 4670.

Figure 75A:
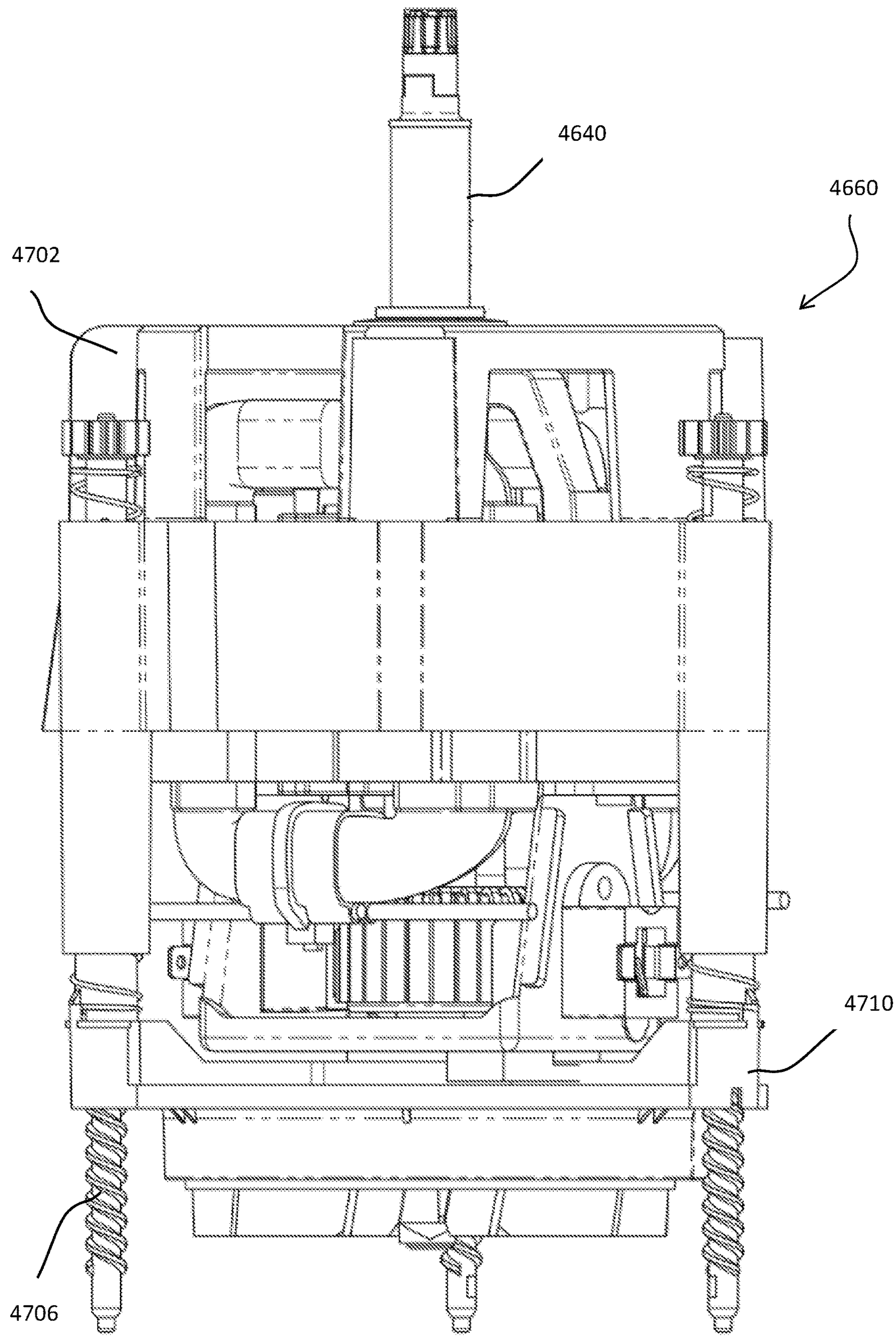
FIGS. 75A and 75B are simplified respective planar side and exploded view illustrations of an axially displaceable rotary drive assembly forming part of the vertically displacing rotary drive motor assembly of FIGS. 73A & 73B.
Figure 75B:
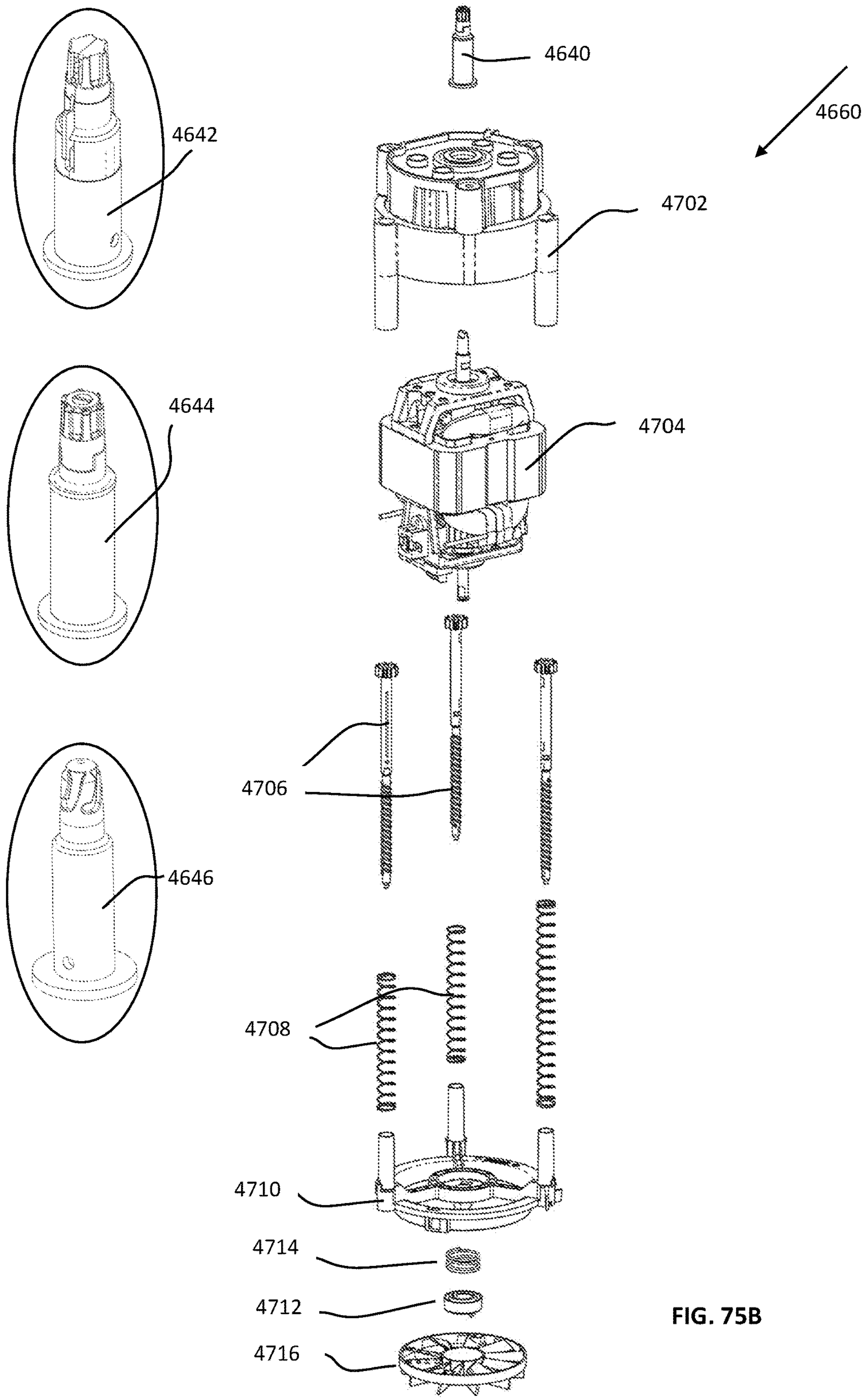

Reference is now made to FIGS. 75A and 75B, which are simplified respective planar side and exploded view illustrations of axially displaceable rotary drive assembly 4660, forming part of the vertically displacing rotary drive motor assembly 4630 of FIGS. 73A & 73B.

As noted above, axially displaceable rotary drive assembly 4660 preferably includes outer drive shaft assembly 4640.

As seen in FIGS. 75A & 75B, axially displaceable rotary drive assembly 4660 also comprises a motor support bracket 4702, an electric motor 4704, a plurality of, preferably three, spindles 4706, a corresponding plurality of coil springs 4708, a motor lifting element 4710, a linear to rotary converting adaptor 4712, a spring 4714 and a linearly driven rotating ventilating element 4716.

Figure 78:
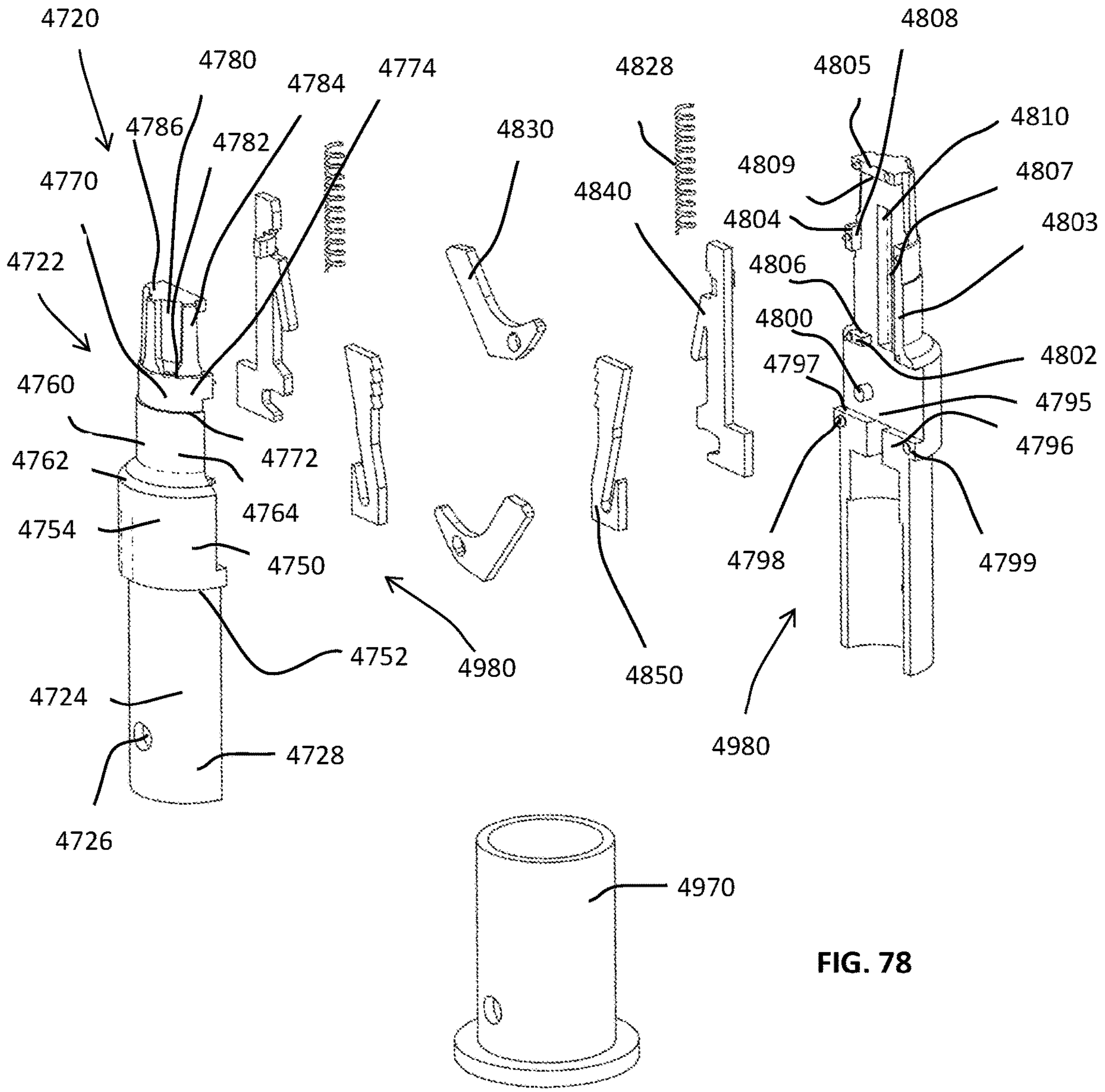
FIG. 78 is a simplified exploded view illustration of the embodiment of an outer drive shaft assembly shown in FIGS. 76A-77D.
Figure 79A:
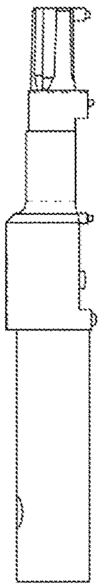
FIGS. 79A, 79B, 79C and 79D are simplified respective first, second and third planar side views and a pictorial view illustration of a half body element, forming part of the outer drive shaft assembly of FIGS. 76A-78.
Figure 79B:
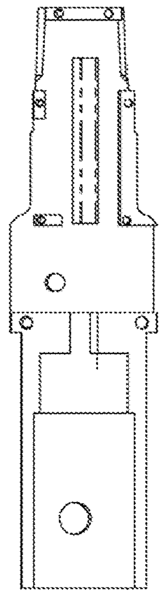
Figure 79C:
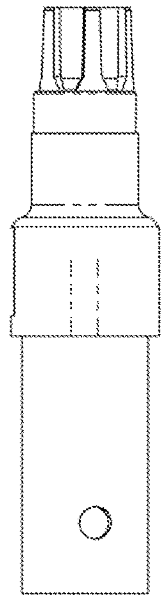
Figure 79D:
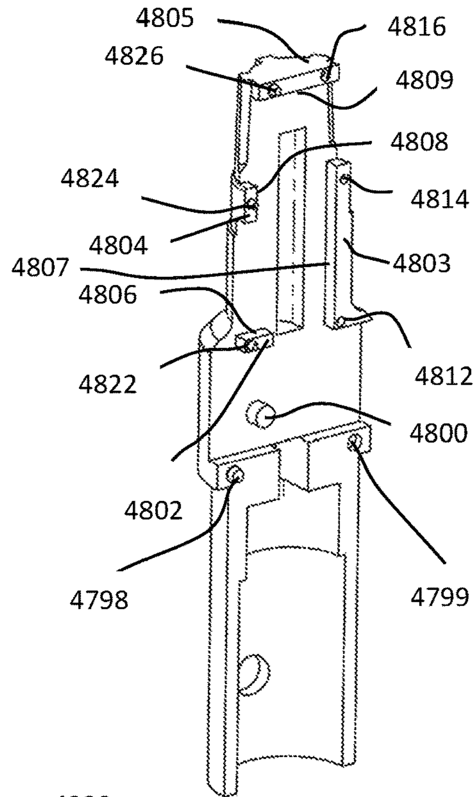
Figure 80A:
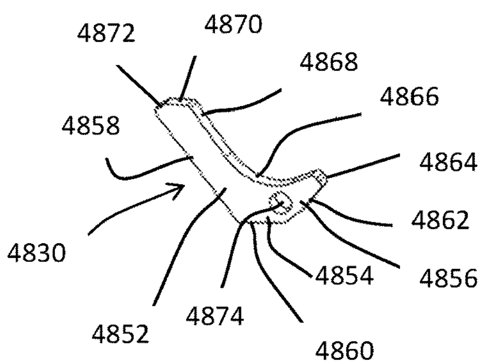
FIGS. 80A, 80B and 80C are simplified pictorial illustrations of respective elbow, activator and grip elements forming part of the outer drive shaft assembly of FIGS. 76A-79D.
Figure 80B:
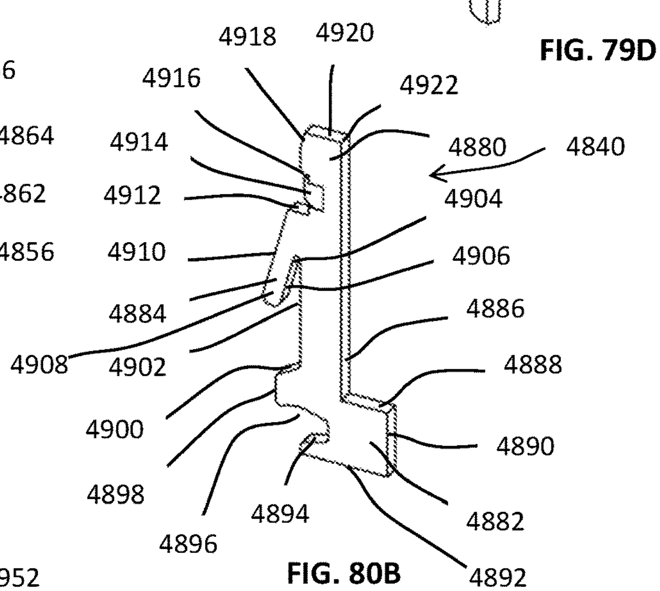
Figure 80C:
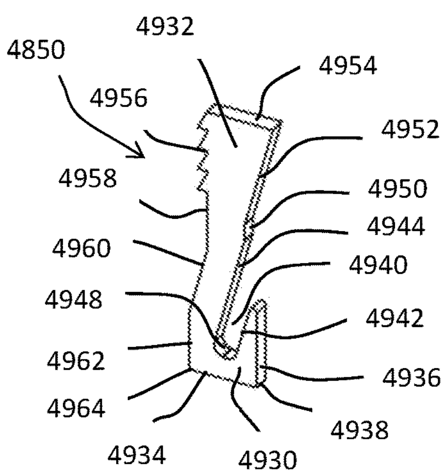
Figure 81A:
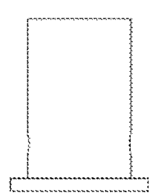
FIGS. 81A & 81B are simplified planar side view and pictorial view illustrations of a bushing, forming part of the outer drive shaft assembly of FIGS. 76A-80C.
Figure 81B:
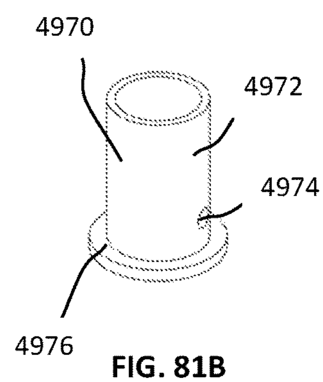
Figure 82A:
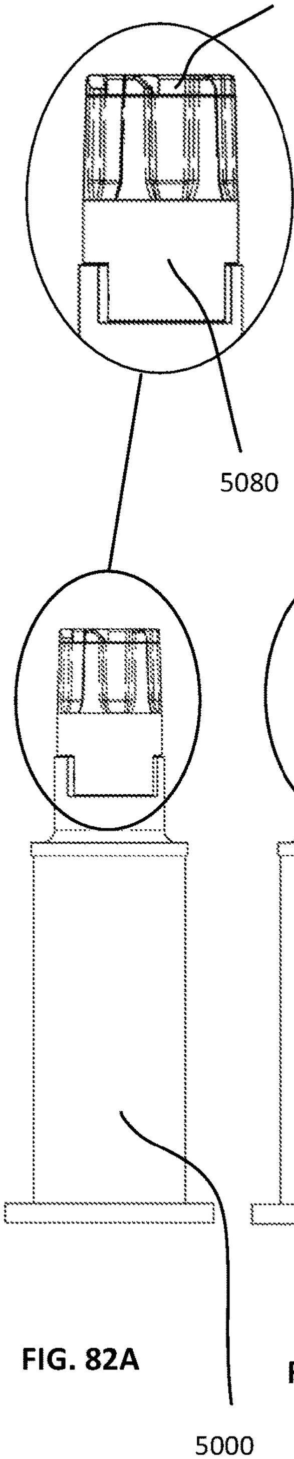
FIGS. 82A and 82B are simplified respective planar side and pictorial illustrations of a second embodiment of an outer drive shaft assembly, suitable for forming part of the axially displaceable rotary drive assembly of FIGS. 75A and 75B, in a first operative orientation.
Figure 83A:
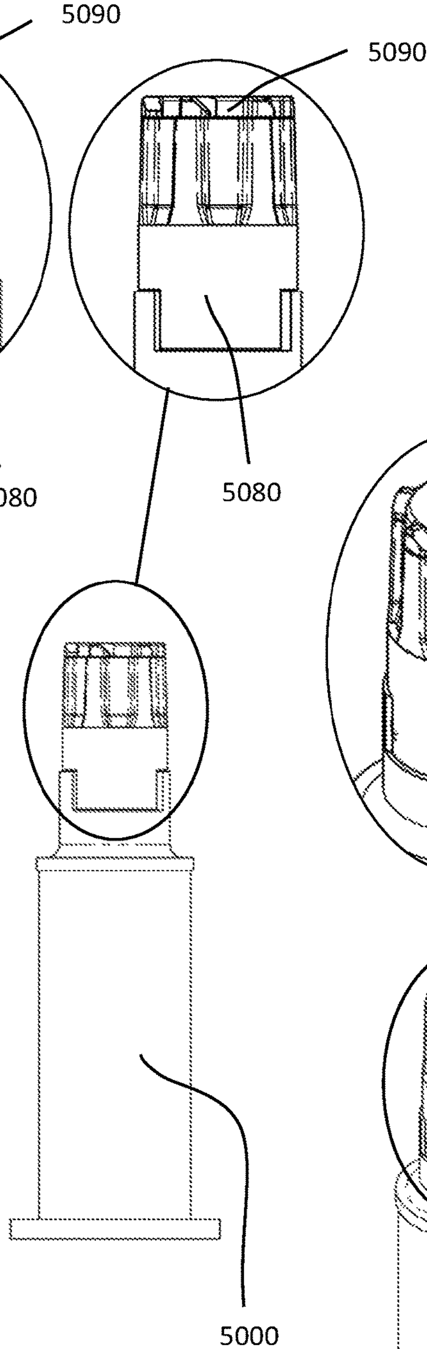
FIGS. 83A and 83B are simplified respective planar side and pictorial illustrations of the embodiment of the outer drive shaft assembly of FIGS. 82A & 82B, forming part of the axially displaceable rotary drive assembly shown in FIGS. 75A & 75B, in a second operative orientation.
Figure 82B:
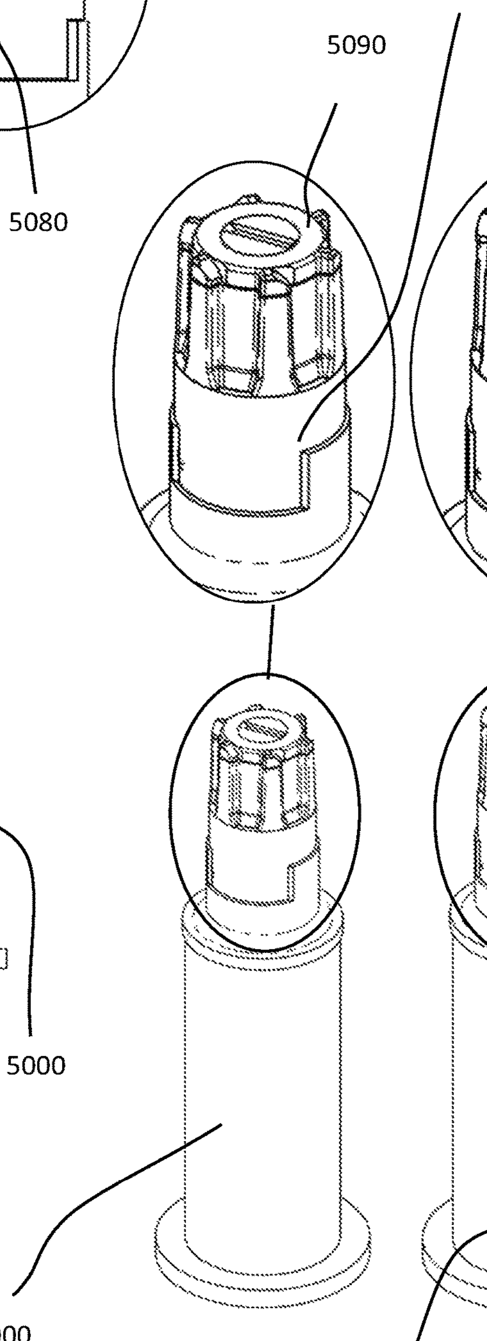
Figure 83B:
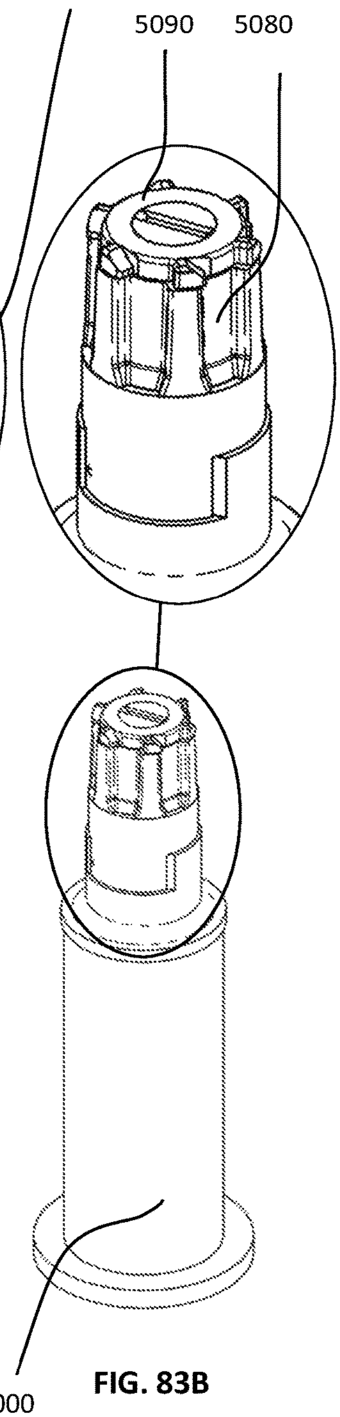
Figure 84:
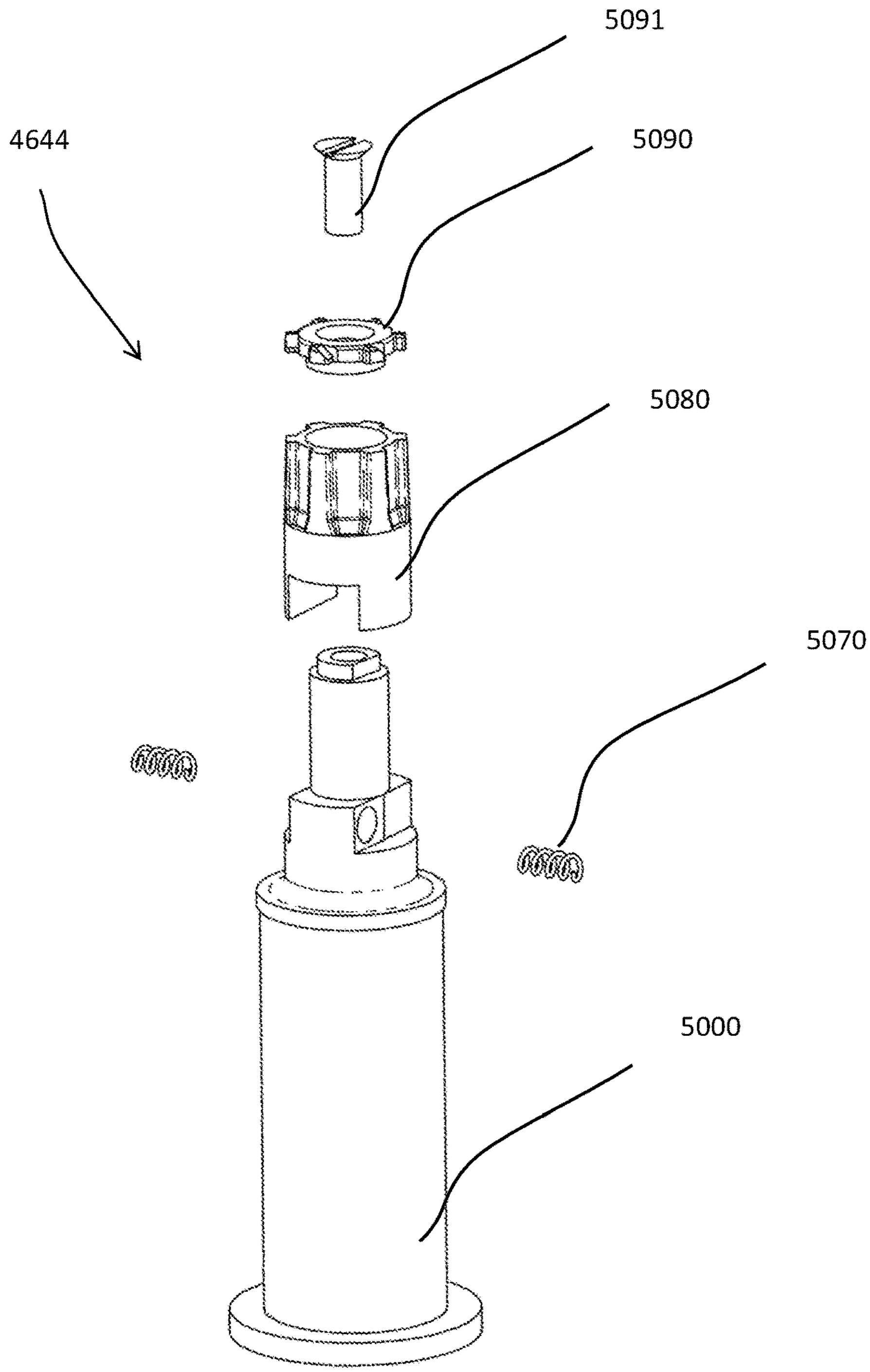
FIG. 84 is a simplified exploded view illustration of the embodiment of an outer drive shaft assembly shown in FIGS. 82A-83D.
Figure 85A:
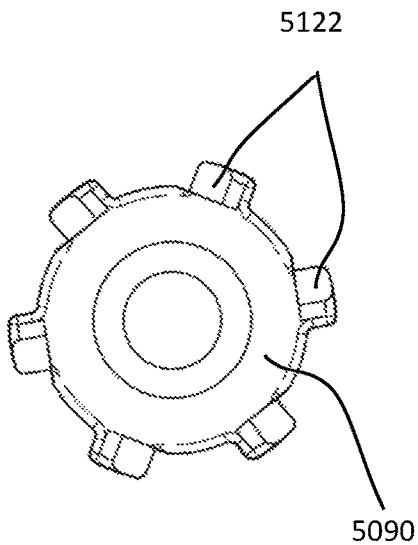
FIGS. 85A, 85B, 85C and 85D are simplified respective planar top, planar side, planar bottom and pictorial view illustrations of a grip element forming part of the outer drive shaft assembly of FIGS. 82A-84.
Figure 85D:
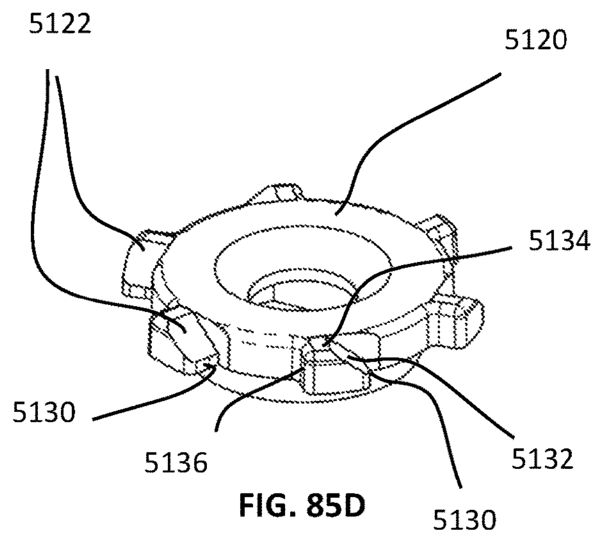
Figure 85B:
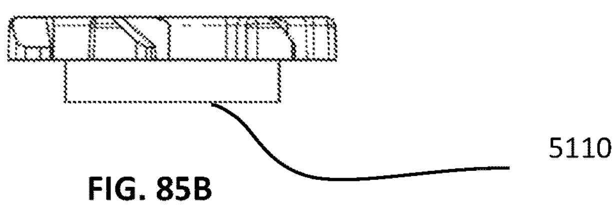
Figure 85C:
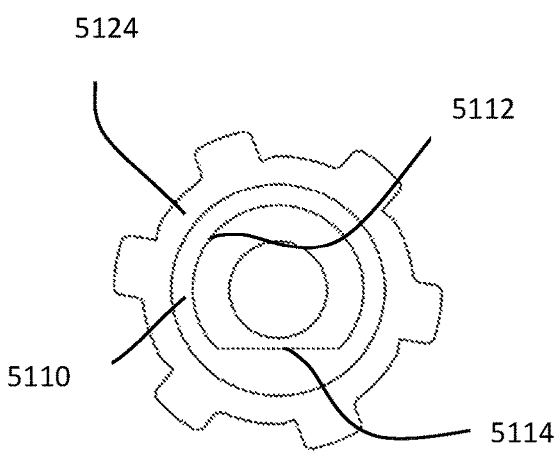
Figure 86A:
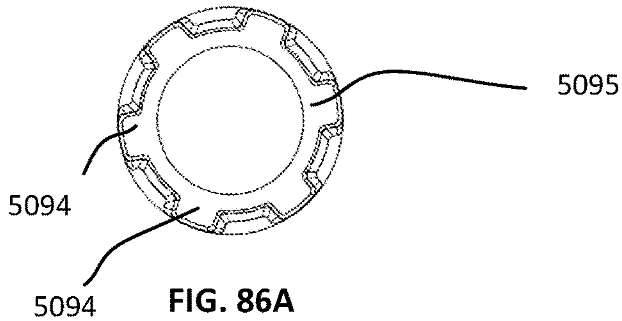
FIGS. 86A, 86B, 86C, 86D and 86E are simplified respective planar top, planar side, planar bottom, pictorial view illustrations and a planar sectional illustration, taken along lines E-E in FIG. 86C, of a blade engagement element forming part of the outer drive shaft assembly of FIGS. 82A-85D.
Figure 86B:
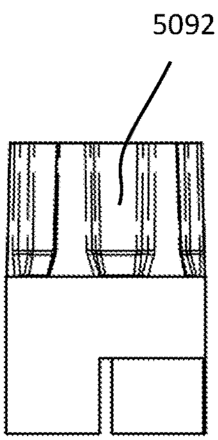
Figure 86D:
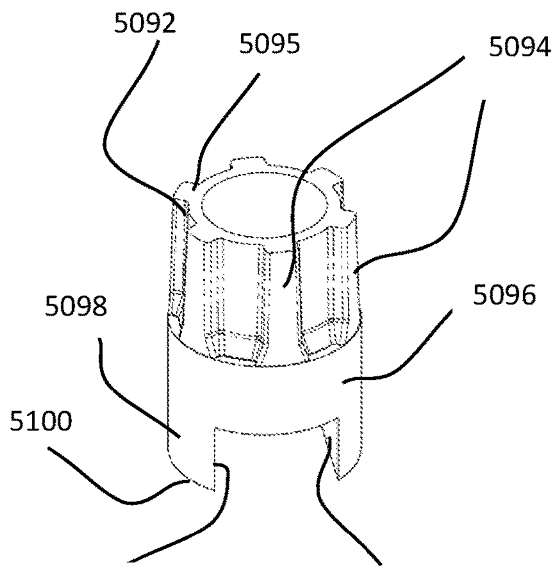
Figure 86E:
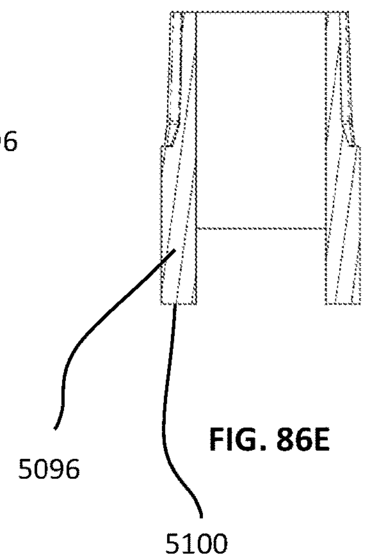
Figure 86C:
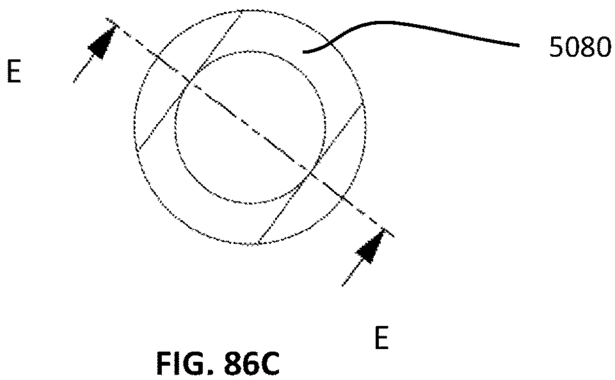
Figure 87A:
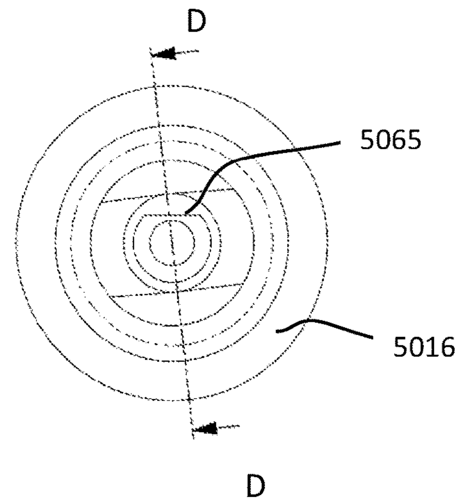
FIGS. 87A, 87B, 87C and 87D are simplified respective planar top, planar side, pictorial view and a sectional illustration of a body element forming part of the outer drive shaft assembly of FIGS. 82A-86E, FIG. 87D being taken along lines D-D in FIG. 87A.
Figure 87B:
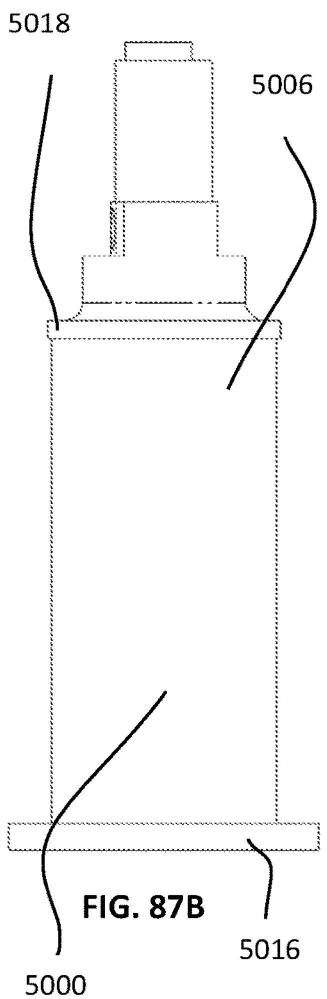
Figure 87C:
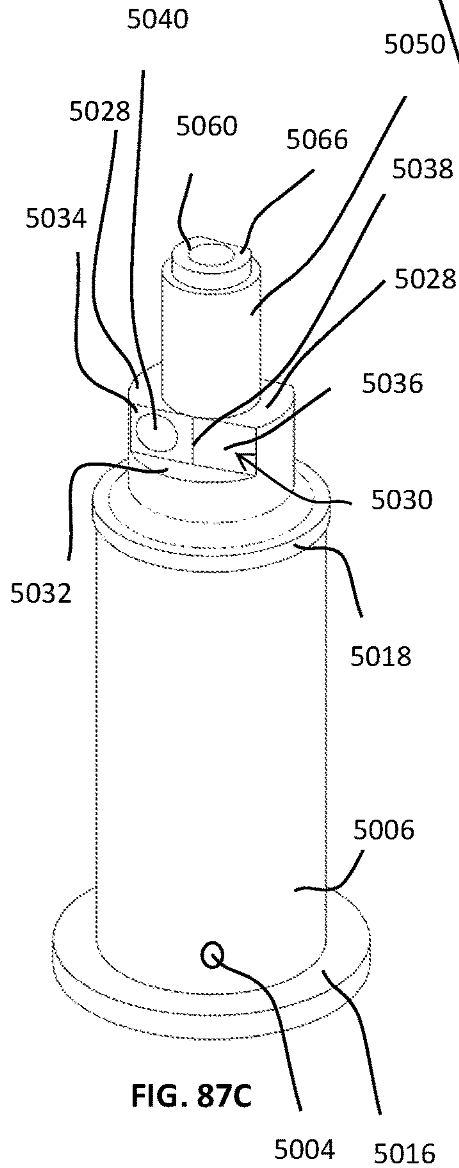
Figure 87D:
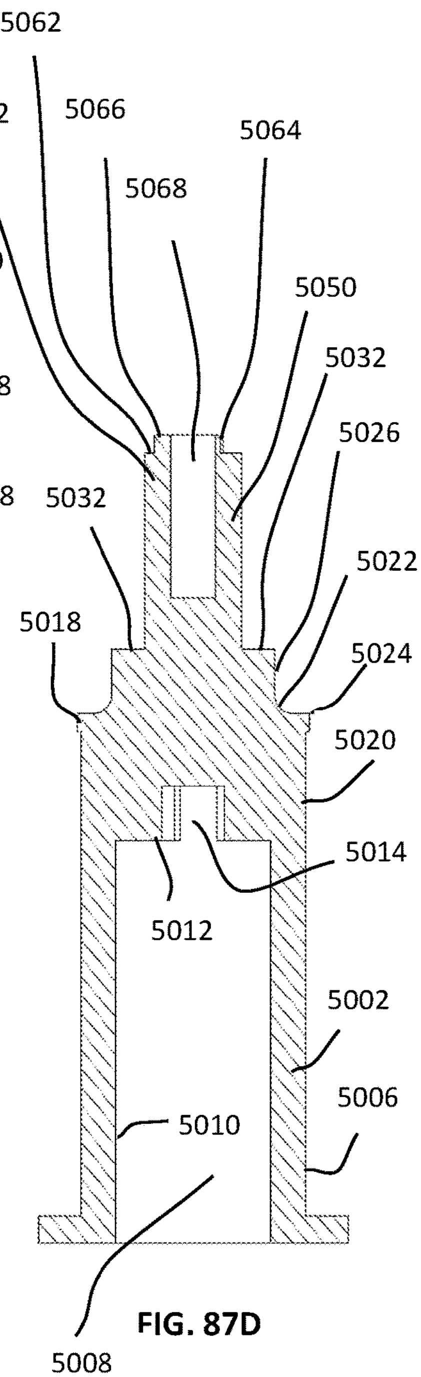
Figure 88A:
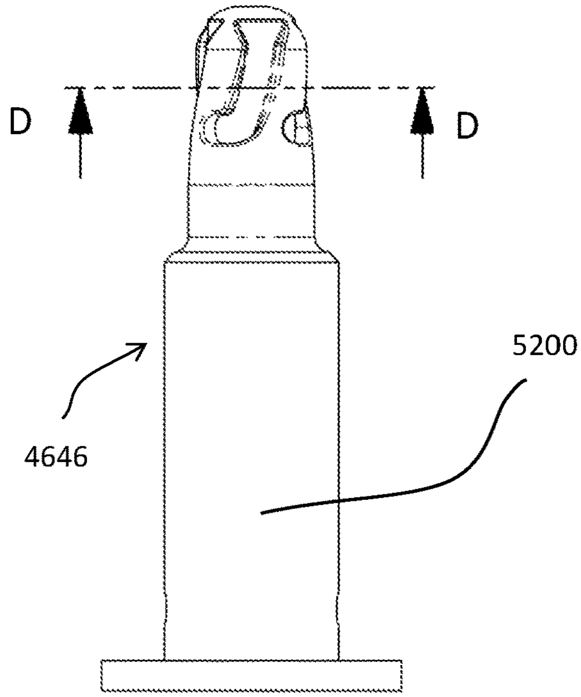
FIGS. 88A, 88B, 88C, 88D and 88E are simplified respective planar side, pictorial, planar top view and first and second planar sectional illustrations of a third embodiment of an outer drive shaft assembly suitable for forming part of the axially displaceable rotary drive assembly of FIGS. 75A and 75B, FIGS. 88D and 88E being taken along respective lines D-D in FIG. 88A and E-E in FIG. 88C.
Figure 88D:
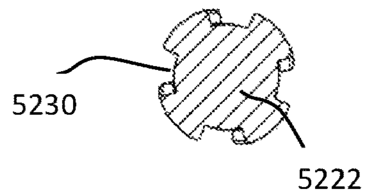
Figure 88C:
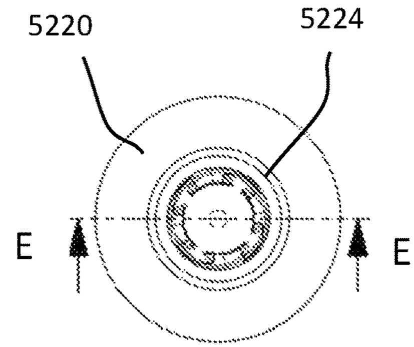
Figure 88B:
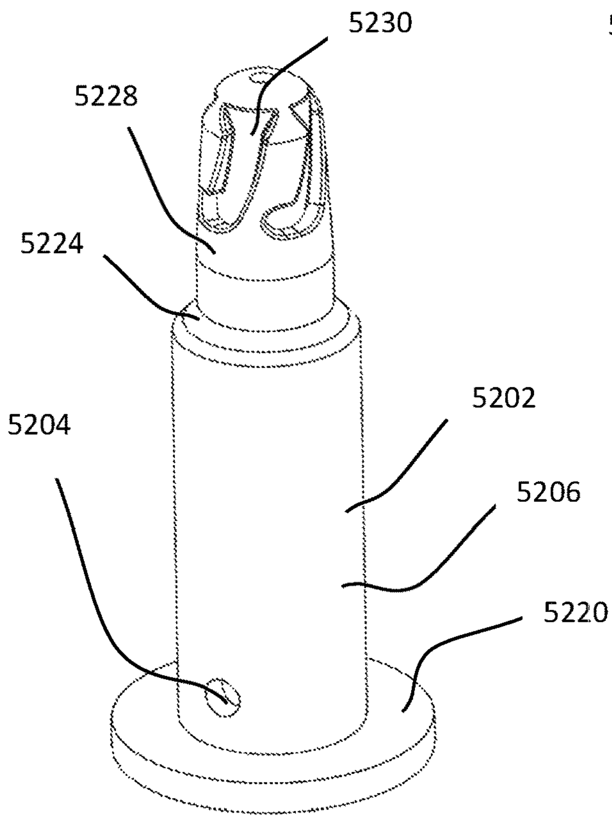
Figure 88E:
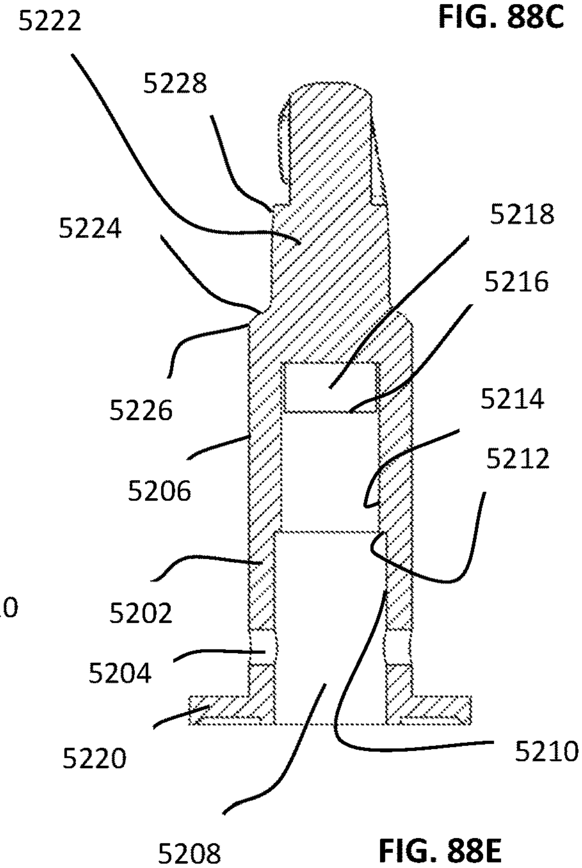

Reference is now made to FIGS. 76A, 76B, 76C and 76D, which are simplified respective planar side, pictorial, planar top view and planar sectional illustrations of outer drive shaft assembly 4642 in a first operative orientation, FIG. 76D being taken along lines D-D in FIG. 76C, to FIGS. 77A, 77B, 77C and 77D, which are simplified respective planar side, pictorial, planar top view and planar sectional illustrations of outer drive shaft assembly 4642 in a second operative orientation, to FIG. 78, which is a simplified exploded view illustration of outer drive shaft assembly 4642, to FIGS. 79A, 79B, 79C and 79D, which are simplified respective first, second and third planar side views and a pictorial view illustration of a half body element forming part of the outer drive shaft assembly of FIGS. 76A-78, to FIGS. 80A, 80B and 80C, which are simplified pictorial illustrations of respective elbow, activator and grip elements forming part of the outer drive shaft assembly of FIGS. 76A-79D, and to FIGS. 81A & 81B, which are simplified planar side view and pictorial view illustrations of a bushing, forming part of the outer drive shaft assembly of FIGS. 76A-80C.

As seen in FIGS. 76A-81B, outer drive shaft assembly 4642 preferably includes a body 4720 preferably constructed of two identical body halves 4722, which are seen best in FIGS. 79A-79D. As seen in FIGS. 79A-79D, each body half 4722 includes a semicircular cylindrical lower wall 4724, having a side aperture 4726 formed therein. Semicircular lower wall 4724 defines a semicircular cylindrical outer surface 4728 and has a stepped inner bore 4730, including a bottom-most semicircular cylindrical lower inner wall surface 4732, which terminates at a semiannular downwardly facing planar surface 4734. An intermediate semicircular cylindrical wall surface 4736 extends upwardly from surface 4734 to a downwardly facing planar surface 4738.

Disposed above semicircular lower wall 4724 is a lower intermediate generally solid section 4750, which defines a semiannular shoulder with respect to semicircular cylindrical outer surface 4728 having a semiannular downward facing surface 4752, which extends between semicircular cylindrical outer surface 4728 and a semicircular cylindrical outer surface 4754 of lower intermediate generally solid section 4750.

Disposed above lower intermediate generally solid section 4750 is a middle intermediate generally solid section 4760, which defines a tapered semiannular shoulder with respect to semicircular cylindrical outer surface 4754 having a semiannular tapered upward facing surface 4762, which extends between semicircular cylindrical outer surface 4754 and a semicircular cylindrical outer surface 4764 of middle intermediate generally solid section 4760.

Disposed above middle intermediate generally solid section 4760 is a upper intermediate generally solid section 4770, which defines a semiannular shoulder with respect to semicircular cylindrical outer surface 4764 having a semiannular upward facing surface 4772, which extends between semicircular cylindrical outer surface 4764 and a semicircular cylindrical outer surface 4774 of upper intermediate generally solid section 4770.

Disposed above upper intermediate generally solid section 4750 is a top generally solid section 4780, which defines a semiannular shoulder with respect to semicircular cylindrical outer surface 4774 having a semiannular upward facing surface 4782, which extends between semicircular cylindrical outer surface 4774 and a generally semicircular cylindrical outer surface 4784 of top generally solid section 4780.

Generally semicircular cylindrical outer surface 4784 is preferably a generally vertically splined cylindrical outer surface which terminates in a generally planar top surface 4786.

Returning to a description of the interior of the body half 4722, it is seen that a slot 4790, preferably of generally rectangular cross section, extends upwardly from downwardly facing planar surface 4738 into lower intermediate generally solid section 4750 to a downwardly facing planar interior surface 4792.

It is seen that most of lower, middle and upper intermediate and top generally solid sections, respectively designated by reference numerals 4750, 4760, 4770 and 4780, define a common planar surface 4795, which is slightly recessed from common coplanar edge surfaces, collectively designated by reference numeral 4796, of the body half 4722. A junction between respective surfaces 4795 and 4796 defines an elongate generally planar shoulder surface 4797, which serves as a support and guiding surface.

It is also seen that formed on opposite sides of common coplanar edge surfaces 4796 and a lower portion of lower intermediate generally solid section 4750 are an assembly pin 4798 and a corresponding assembly socket 4799.

Formed on common planar surface 4795 is a circular cylindrical pivotable mounting protrusion 4800, which extends to the plane of common coplanar edge surfaces 4796. Also formed on common planar surface 4795 are four mounting and guiding protrusions, respectively designated by reference numerals 4802, 4803, 4804 and 4805, each of which extends to the plane of common coplanar edge surfaces 4796. Junctions between some edges of protrusions 4802, 4803, 4804 and 4805 and common planar surface 4795 define respective planar shoulder surfaces 4806, 4807, 4808 and 4809, which serve as support and guiding surfaces.

An elongate coil spring accommodating recess 4810 is formed in common planar surface 4795.

Three additional assembly sockets, respectively designated by reference numerals 4812, 4814 and 4816 are formed on respective mounting and guiding protrusions, respectively designated by reference numerals 4803 and 4805, wherein sockets 4812 and 4814 are both formed on mounting and guiding protrusion 4803.

Three additional assembly pins, respectively designated by reference numerals 4822, 4824 and 4826, each corresponding to a respective one of the assembly sockets 4812, 4814 and 4816, are formed on respective mounting and guiding protrusions, respectively designated by reference numerals 4802, 4804 and 4805.

It is appreciated that the arrangement and configuration of the various assembly pins and assembly sockets described hereinabove is such that when the two identical halves 4722 are assembled, respective assembly pins of one half tightly seat into the assembly sockets of the other half and vice versa.

Disposed within body 4720 are a pair of coil springs 4828 as well as a pair of identical elbow elements 4830, which are shown in FIG. 80A, a pair of identical activator elements 4840, which are shown in FIG. 80B, and a pair of grip elements 4850, which are shown in FIG. 80C.

As seen clearly in FIG. 80A, each elbow element 4830 is preferably a generally planar element and may be stamped or laser cut from a sheet of metal and includes an arm portion 4852, an elbow portion 4854 and an engagement portion 4856. Arm portion 4852 defines a generally straight edge 4858, which extends to elbow portion 4854 where it joins a generally straight edge 4860. Generally straight edge 4860 extends to engagement portion 4856, where it joins a slight curved edge 4862, which terminates at a rounded tip edge 4864. A concave curved edge 4866 extends from rounded tip edge 4864 of engagement portion 4856 to arm portion 4852, where it terminates at a generally straight edge 4868, which terminates at a further, shorter straight edge 4870, which in turn which joins edge 4858 at a rounded corner 4872. A pivotable mounting aperture 4874 is provided at engagement portion 4856 for pivotable mounting onto pivotable mounting protrusion 4800.

As seen clearly in FIG. 80B, each activator element 4840 is preferably a generally planar element and may be stamped or laser cut from a sheet of metal and includes a main portion 4880, a base portion 4882 and an arm portion 4884. Main portion 4880 defines a generally straight edge 4886, which extends to base portion 4882, where it joins a generally straight edge 4888. Generally straight edge 4888 extends to a further generally straight edge 4890, which extends to an additional generally straight edge 4892, which is the bottom edge of base portion 4882.

Extending upwardly from straight edge 4892 of base portion 4882 is a concave curved edge 4894, which defines an engagement recess 4896, which is engaged by engagement portion 4864 of elbow element 4830. Above engagement recess 4896, curved edge 4894 terminates in a straight edge 4898, which extends into a tapered edge 4900, which in turn extends into a straight edge 4902, which extends to arm portion 4884.

At arm portion 4884, edge 4902 terminates at an inner corner 4904 and a straight edge 4906 of arm portion 4884 extends downwardly and outwardly with respect to straight edge 4902 to an arm portion end corner 4908, from where an additional straight edge 4910 of arm portion 4884 extends to a straight edge 4912, which is generally perpendicular to straight edge 4902. Above straight edge 4912 is a bent protrusion 4914, which is preferably bent at 90 degrees with respect to the remainder of the activator element 4840.

Above bent protrusion 4914 is a straight edge 4916 which terminates in a tapered edge 4918, which preferably is parallel to straight edge 4910 of arm portion 4884. Tapered edge 4918 terminates at a straight edge 4920, which is preferably parallel to edge 4892 and which meets straight edge 4886 at a corner 4922.

As seen clearly in FIG. 80C, each grip element 4850 is preferably a generally planar element and may be stamped or laser cut from a sheet of metal and includes an arm portion receiving socket portion 4930 and a gripping portion 4932. Arm portion receiving socket portion 4930 defines a generally straight edge 4934 along a base thereof, which meets a generally straight edge 4936 at a corner 4938. Generally straight edge 4936 terminates at an inclined arm portion receiving socket 4940, arranged to slidably receive arm portion 4884 of activator element 4840.

Inclined arm portion receiving socket 4940 is defined by generally parallel mutually spaced generally straight edges 4942 and 4944. Straight edge 4942 extends inwardly and downward from generally straight edge 4936 and meets straight edge 4944 at arm portion receiving socket end corner 4948, which receives arm portion end corner 4908 of activator element 4840. Straight edge 4944 extends outwardly and upwardly and terminates at a tapered shoulder 4950 where a straight edge 4952, parallel to straight edge 4944, extends to a straight edge 4954 at gripping portion 4932. Straight edge 4954 is preferably parallel to straight edge 4934 at the base of arm portion receiving socket portion 4930.

Extending downwardly from straight edge 4954 is a downwardly extending ratcheted edge 4956, which terminates in a generally straight edge 4958. Generally straight edge 4958 terminates in an outwardly and downwardly inclined straight edge 4960, which in turn terminates in a generally straight edge 4962, which joins straight edge 4934 at a corner 4964.

A bushing 4970 is provided for retaining the two halves 4722 of body 4720 together. Preferably, bushing 4970 includes a hollow generally circular cylindrical main portion 4972, having a pair of side apertures 4974 and an annular end flange 4976.

Turning now to the assembly of the outer drive shaft assembly 4642, it is appreciated that the outer drive shaft assembly 4642 is composed of two identical halves 4980 which are assembled in registration by means of the assembly pins and sockets described above and retained in registration by engagement thereof by bushing 4970. The assembly of one half 4980 is described hereinbelow:

A coil spring 4828 is seated in coil spring receiving recess 4810 of body half 4722. Activator element 4840 is mounted onto body half 4722 and slidably rests on common surface 4795 and is positioned such that bent protrusion 4914 extends into coil spring receiving recess 4810 adjacent the upper end of coil spring 4828 for selectable compression thereof, such that the coil spring 4828 normally urges the activator element 4840 upwardly.

The position of the activator element 4840 with respect to the body half 4722 is such that edge 4886 of the activator element 4840 is always in sliding engagement with a corresponding surface 4807 of the body half 4722.

When the outer drive shaft assembly 4642 is in a lowered position with respect to the base of the MMIDD, the position of the activator element 4840 with respect to the body half 4722 is such that, against the urging of spring 4828, edge 4892 of the activator element 4840 is adjacent to a corresponding surface 4797 of the body half 4722 and edge 4920 of the activator element 4840 is spaced from a corresponding surface 4809 of the body half 4722, as shown in FIG. 77D.

When the outer drive shaft assembly 4642 is in a raised position with respect to the base of the MMIDD, the position of the activator element 4840 with respect to the body half 4722 is such that, under the urging of spring 4828, edge 4892 of the activator element 4840 is spaced from corresponding surface 4797 of the body half 4722 and edge 4920 of the activator element 4840 is adjacent to corresponding surface 4809 of the body half 4722, as shown in FIG. 76D.

The elbow element 4830 is pivotably mounted onto pivot mounting protrusion 4800 of housing half 4722 and is positioned such that rounded tip edge 4864 of the elbow element 4830 is loosely seated in engagement recess 4896 of activator element 4840.

When the outer drive shaft assembly 4642 is in a lowered position with respect to the base of the MMIDD, the position of the elbow element 4830 with respect to the body half 4722 is such that edge 4868 of the elbow element 4830 is adjacent to protrusion 4802 of the body half 4722, as shown in FIG. 77D.

When the outer drive shaft assembly 4642 is in a raised position with respect to the base of the MMIDD, the position of the elbow element 4830 with respect to the body half 4722 is such that edge 4860 of the elbow element 4830 is adjacent to a corresponding surface 4797 of the body half 4722, as shown in FIG. 76D.

The grip element 4850 is mounted onto body half 4722 and slidably rests on common surface 4806 and is positioned such that edge 4934 of the grip element 4850 is always in sliding engagement with a corresponding surface 4806 of the body half 4722 and such that edge 4954 of the grip element 4850 is always in sliding engagement with a corresponding surface 4809 of the body half 4722. Additionally, the grip element 4850 is positioned such that arm portion 4884 of the activating element 4840 is slidably engaged with arm portion receiving socket portion 4930 of grip element 4850.

When the outer drive shaft assembly 4642 is in a lowered position with respect to the base of the MMIDD, the position of the grip element 4850 with respect to the body half 4722 is such that edge 4958 of the grip element 4850 is spaced from surface 4808 of the body half 4722, as shown in FIG. 77D.

When the outer drive shaft assembly 4642 is in a raised position with respect to the base of the MMIDD, the position of the grip element 4850 with respect to the body half 4722 is such that edge 4958 of the grip element 4850 is adjacent to surface 4808 of the body half 4722, as shown in FIG. 76D.

Turning now to the operation of the outer drive shaft assembly 4642, it is appreciated that when the outer drive shaft assembly 4642 is in its lowered position, as seen in FIG. 77D, it is located within a depending circumferential wall 1772 of top element 4654 such that edge 4858 corner 4872 of elbow element 4830 engages radially inwardly directed cylindrical surface 1774 and elbow element 4830 is constrained thereby to be in a rest position close to the position illustrated in FIG. 77D.

Once outer drive assembly 4642 is raised to its raised position by virtue of raising of axially displaceable rotary drive assembly 4660, outer drive assembly 4642 lies above circumferential wall 1772 and elbow element 4830 is no longer constrained by engagement with cylindrical surface 1774.

Accordingly, in the raised position of outer drive shaft assembly 4642, as seen in FIG. 76D, the compression force of spring 4828 urges activator element 4840 upwardly which produces upward displacement thereof and corresponding upward displacement of rounded tip edge 4864 of elbow element 4830 due to its engagement with engagement recess 4896 of the activator element 4840, producing pivoting of elbow element 4830 about protrusion 4800, thus causing outward and downward rotation of arm portion 4852 of elbow element 4830 to the orientation seen in FIG. 76D.

The upward displacement of activator element 4840 additionally produces corresponding outward displacement of grip element 4850 by virtue of engagement of arm portion 4884 of activator element 4840 with arm portion receiving socket portion 4930 of grip element 4850. This outward displacement produces tight engagement with a blade. It is appreciated that a return of the outer drive shaft assembly 4642 to its lowered position automatically causes inward displacement of grip element 4850 and of arm portion 4852 of elbow element 4830.

It is a particular feature of this embodiment of the present invention that rotation of the outer drive shaft assembly 4642 produces centrifugal forces which result in enhanced outward displacement of arm portion 4852 of elbow element 4830 and consequent enhanced outward displacement of grip element 4850, thus increasing the force retaining the blade onto the outer drive shaft assembly 4642.

Reference is now made to FIGS. 82A-87D, which are simplified illustrations of outer drive shaft assembly 4644.

As seen in FIGS. 82A-87D, outer drive shaft assembly 4644 preferably includes a body 5000, shown clearly in FIGS. 87A-87D. As seen in FIGS. 87A-87D, body 5000 includes a circular cylindrical lower wall 5002, having a pair of side apertures 5004 formed therein. Circular cylindrical lower wall 5002 defines a circular cylindrical outer surface 5006 and has an inner bore 5008, including a bottom-most circular cylindrical lower inner wall surface 5010, which terminates at an annular downwardly facing planar surface 5012. A slot 5014, preferably of generally rectangular cross section, extends upwardly from annular downwardly facing planar surface 5012.

Circular cylindrical outer surface 5006 is formed with a first generally annular flange 5016, at a base thereof, and a second generally annular flange 5018, at a top thereof.

Disposed above circular cylindrical lower wall 5002 is a lower intermediate generally solid section 5020, which defines an annular tapered shoulder 5022 with respect to flange 5018, which extends between a circumferential edge 5024 of flange 5018 and a circular cylindrical outer surface 5026 of lower intermediate generally solid section 5020.

Lower intermediate generally solid section 5020 defines a pair of generally planar top surfaces 5028 and is formed with side to side symmetric mutually spaced cut outs 5030, which extend from upward facing planar surfaces 5032 to generally planar top surface 5028. Cut outs 5030 each define a pair of nearly coplanar planar side surfaces 5034 and 5036, which meet along a line 5038. Each planar side surface 5034 has formed therein a circular cylindrical recess 5040.

Disposed above lower intermediate generally solid section 5020 is an upper intermediate section 5050, which extends upwardly from the pair of planar top surfaces 5028 and defines a circular cylindrical outer surface 5052.

Disposed above upper intermediate section 5050 is a truncated circular cylindrical top section 5060, which defines an annular shoulder with respect to circular cylindrical outer surface 5052. The annular shoulder defines an annular upward facing surface 5062, which extends between circular cylindrical outer surface 5052 and a truncated circular cylindrical outer surface 5064 of circular cylindrical top section 5060. Truncated circular cylindrical outer surface 5064 defines a planar surface portion 5065. Circular cylindrical top section 5060 defines a generally planar top surface 5066. A threaded circular cylindrical recess 5068 extends downwardly from top surface 5066 through top section 5060 and partially through upper intermediate section 5050.

A pair of coil springs 5070 are seated in respective circular cylindrical recesses 5040.

A blade engagement element 5080 is mounted onto body 5000 about top section 5060 and over upper intermediate section 5050 and partially over lower intermediate section 5020. A grip element 5090 is mounted over blade engagement element 5080 and secured to body 5000 by a screw 5091, which threadably engages threaded recess 5068. It is appreciated that this arrangement allows a limited degree of rotation (typically approximately 4 degrees) of blade engagement element 5080 about an axis defined along the center of recess 5068 relative to body 5000 and relative to grip element 5090.

Blade engagement element 5080 is a generally hollow, cylindrical element which includes a top portion 5092, which includes a plurality of circumferentially distributed splines 5094 and defines a top surface 5095. Below top portion 5092 is a bottom portion 5096, having a pair of depending engagement portions 5098, having bottom edges 5100 and mutually azimuthally oppositely directed side edges 5102 and 5104, which are configured to be seated in side to side symmetric mutually spaced cut outs 5030, such that bottom edges 5100 rotatably engage upward facing planar surfaces 5032 and azimuthally oppositely directed side edges 5102 and 5104 lie adjacent to or engage corresponding surfaces 5034 and 5036, depending on the rotation orientation of the blade engagement element 5080 relative to body 5000.

Grip element 5090 is a generally disk-like element having a downwardly-directed surface 5110 which is tightly engaged with corresponding annular upward facing surface 5062 of body 5000. Surface 5110 is generally annular and has a truncated circular inner edge 5112 including a planar portion 5114 which rests against planar surface portion 5065 of truncated circular cylindrical outer surface 5064 of body 5000.

Surrounding downwardly directed surface 5110 and recessed with respect thereto is a blade engaging portion 5120 of grip element 5090 which includes a plurality of toothed protrusions 5122, which correspond in number and mutual spacing to splines 5094 of blade engagement element 5080. Blade engaging portion 5120 includes a downwardly facing surface 5124, which is recessed with respect to surface 5110, which rotatably engages corresponding top surface 5095 of blade engaging element 5080.

Toothed protrusions 5122 are each preferably configured with a leading edge 5130 extending into a tapered upwardly facing wall 5132, which in turn extends into an upward facing wall 5134 and terminating in a flat trailing edge surface 5136.

It is appreciated that the above-described structure of the outer drive shaft assembly 4644 provides enhanced engagement between the outer drive shaft assembly 4644 and a blade, such as blade 160, having splines, such as splines 418, during driven rotation of the outer drive shaft assembly 4644 in engagement with the blade, by virtue of the fact that the protrusions 5122 of the grip element 5090 may be rotatably driven inside the blade by a limited amount (typically approximately 4 degrees) ahead of the blade engagement element 5080. This enables protrusions 5122, which are preferably formed of metal, to insinuate themselves into enhanced engagement with the splines, such as splines 418, of the blade, such as blade 160, which are typically formed of plastic, in a way that enhances resistance to linear disengagement between the blade and the outer drive shaft assembly 4644.

It is also appreciated that in the absence of rotation of the outer drive shaft assembly 4644, springs 5070 urge the blade engagement element 5080 to rotate in a direction opposite to the direction of driven rotation of the outer drive shaft assembly 4644 such that the splines 5094 of the blade engagement element 5080 become realigned with the protrusions 5122 of the grip element 5090.

Reference is now made to FIGS. 88A-88E, which are simplified illustrations of outer drive shaft assembly 4646. As seen in FIGS. 88A-88E, outer drive shaft assembly 4646 preferably includes a body 5200, which includes a circular cylindrical lower wall 5202, having a pair of side apertures 5204 formed therein. Circular cylindrical lower wall 5202 defines a circular cylindrical outer surface 5206 and has a stepped inner bore 5208.

Stepped inner bore 5208 includes a bottom-most circular cylindrical lower inner wall surface 5210, which terminates at a shoulder 5212. An intermediate circular cylindrical lower inner wall surface 5214 extends upwardly to a downwardly facing planar surface 5216. A slot 5218, preferably of generally rectangular cross section, extends upwardly from downwardly facing planar surface 5216.

Circular cylindrical outer surface 5206 is formed with a generally annular flange 5220 at a base thereof.

Disposed above circular cylindrical lower wall 5202 is a generally solid section 5222, which defines an annular tapered shoulder 5224 with respect to circular cylindrical outer surface 5206. Shoulder 5224 extends between a circumferential edge 5226 of circular cylindrical outer surface 5206 and a circular tapered outer surface 5228 of generally solid section 5222.

Circular tapered outer surface 5228 is preferably formed with a plurality of curved recesses 5230, which are configured and arranged to slidably and rotatably receive curved splines 3618 of blade 3550 (FIGS. 64A-64F).

Figure 89A:
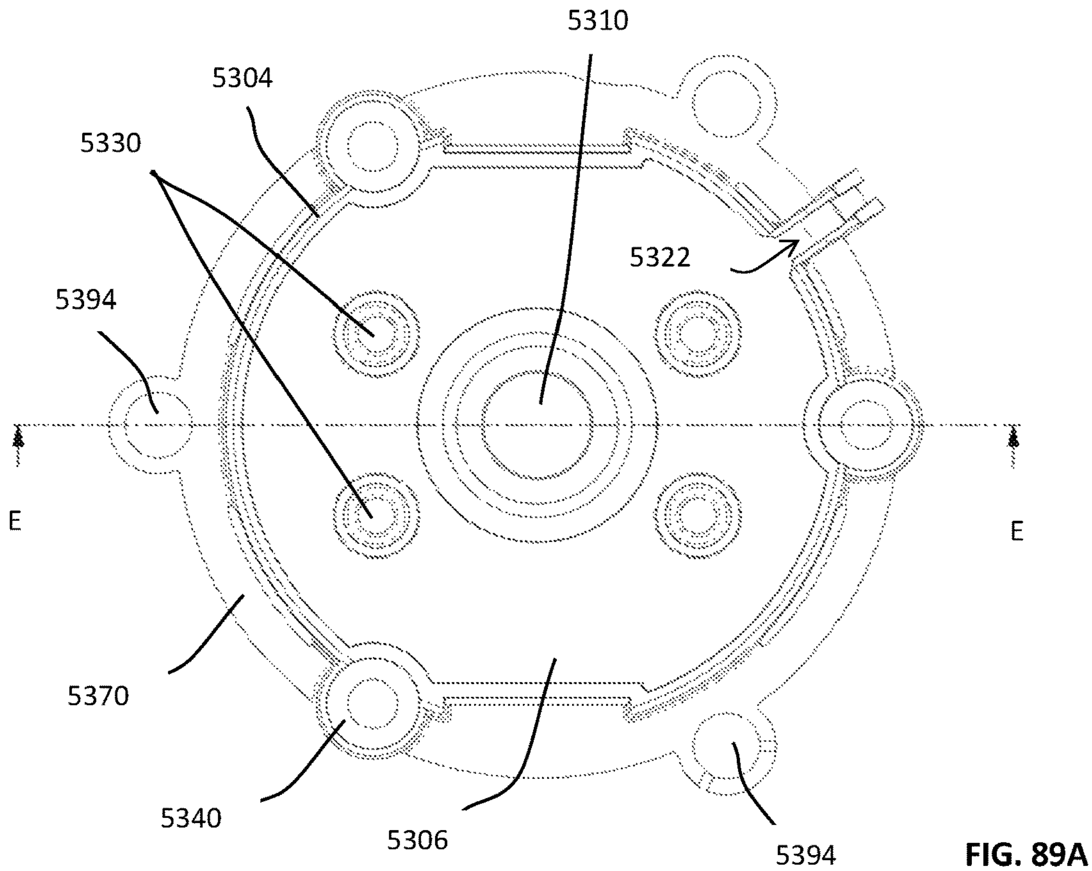
FIGS. 89A, 89B, 89C, 89D and 89E are simplified planar top, planar bottom, planar side, pictorial and sectional illustrations of a motor support bracket assembly forming part of the axially displaceable rotary drive assembly of FIGS. 75A & 75B, FIG. 89E being taken along lines E-E in FIG. 89A.
Figure 89B:
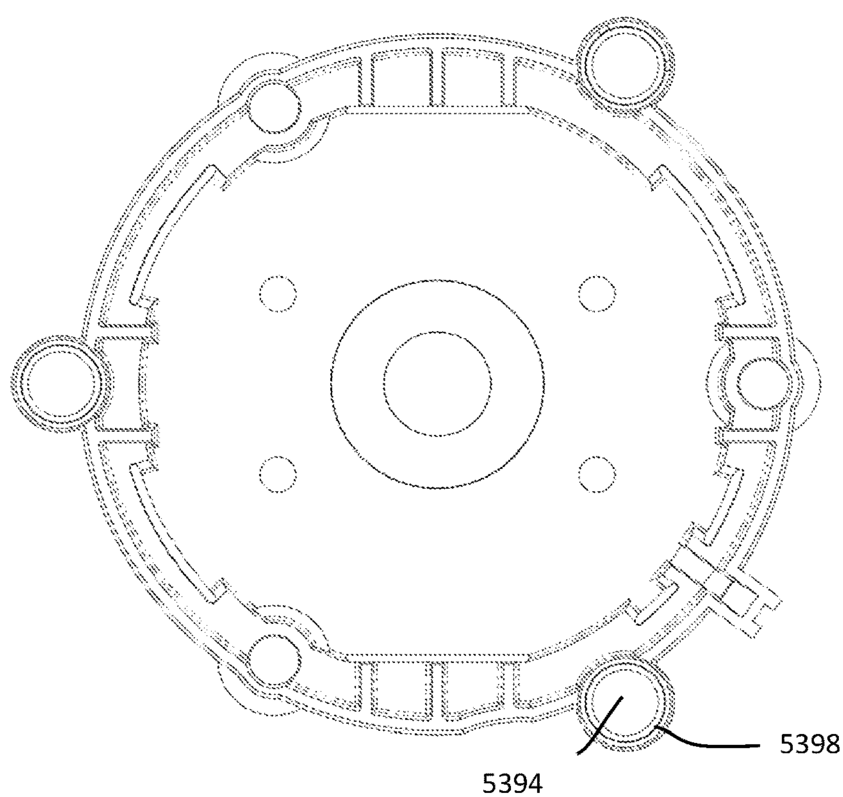
Figure 89C:
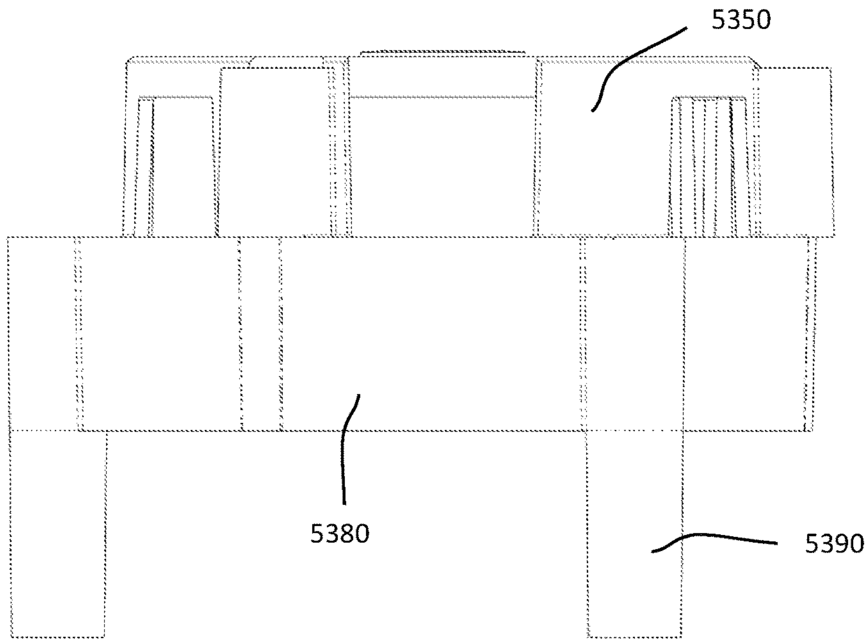
Figure 89D:
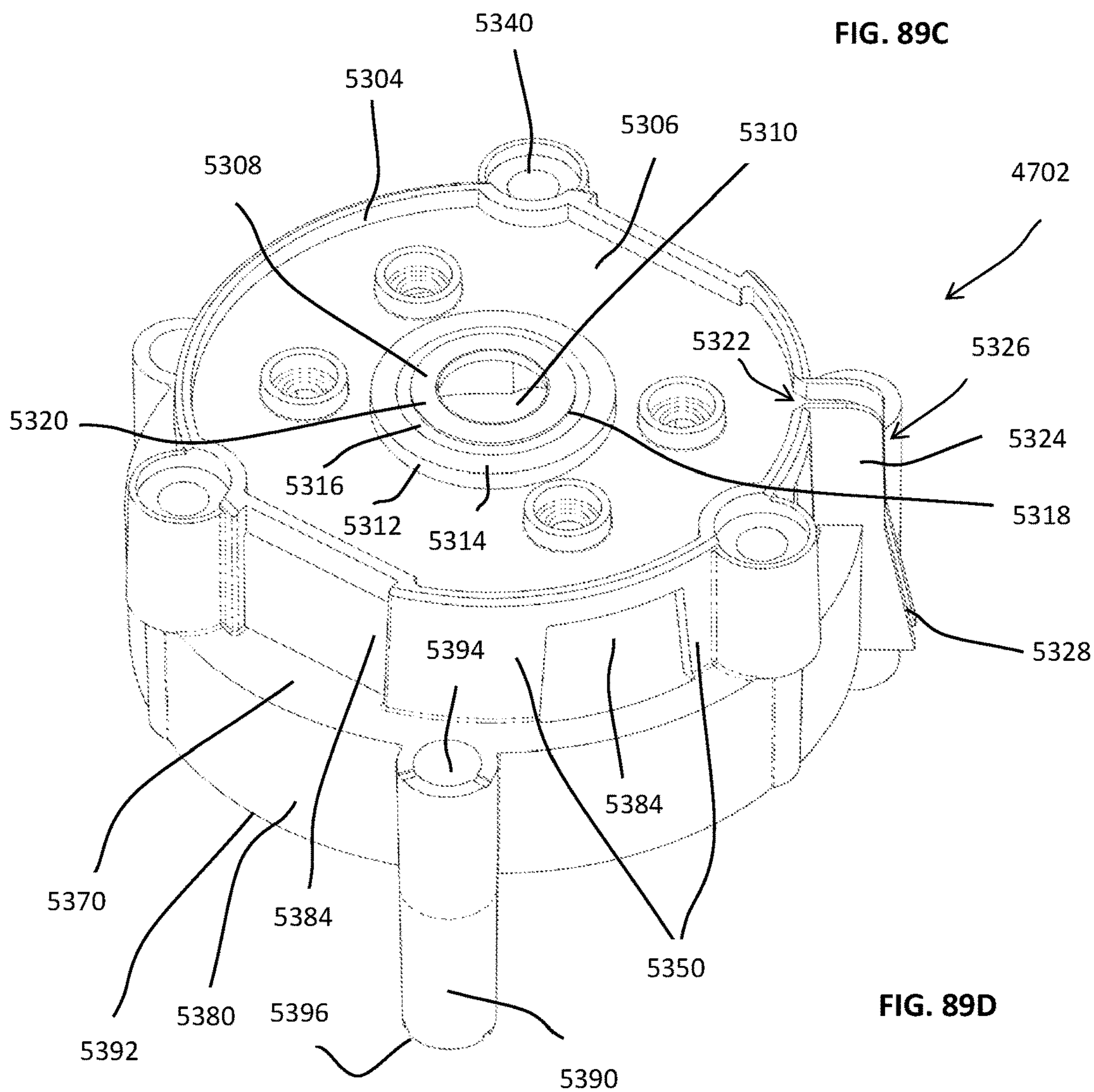
Figure 89E:
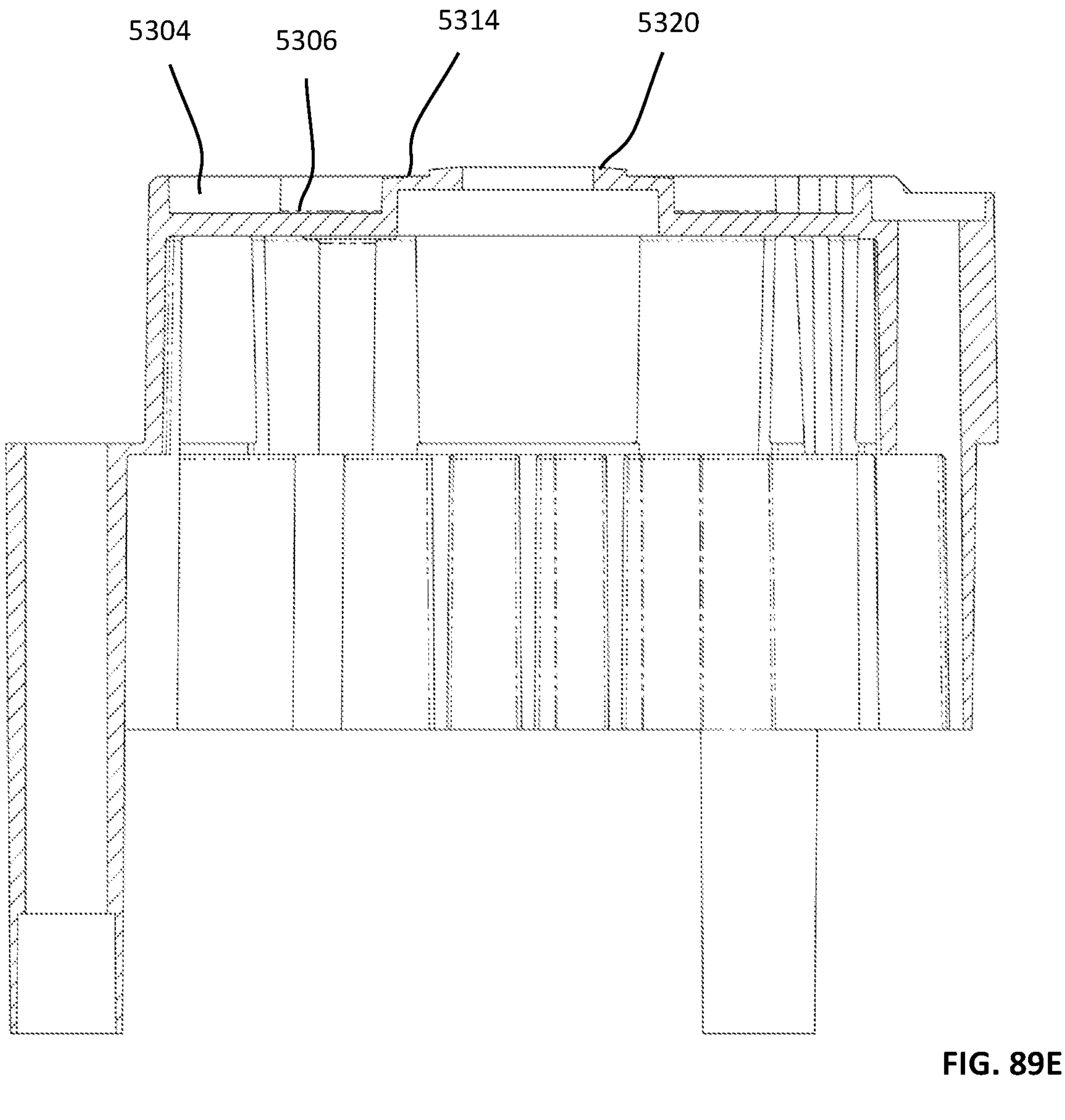

Reference is now made to FIGS. 89A, 89B, 89C, 89D and 89E, which are simplified planar top, planar bottom, planar side, pictorial and sectional illustrations of motor support bracket 4702, forming part of the axially displaceable rotary drive assembly 4660 of FIGS. 75A & 75B, FIG. 89E being taken along lines E-E in FIG. 89A;

As seen in FIGS. 89A-89E, motor support bracket 4702 is a generally cylindrical assembly, which includes a top planar generally circular wall 5304 surrounding a recessed annular top surface 5306 which surrounds a tapered boss 5308 having a central aperture 5310. Tapered boss 5308 includes an outer raised portion 5312 having a generally planar top surface 5314, interior of which is a generally inwardly and upwardly tapered raised portion 5316 and interior of which is a central annular raised portion 5318, which surrounds central aperture 5310 and defines a generally planar upper surface 5320 which is higher than surfaces 5314 and 5316.

Top planar generally circular wall 5304 is preferably formed with an opening 5322, which permits liquid outflow therethrough. Aligned with opening 5322 is a radially outwardly extending protrusion 5324, which defines a liquid outflow channel 5326 which extends downwardly to a liquid outflow channel termination location 5328.

A plurality of bolt mounting holes 5330 are preferably formed in recessed annular top surface 5306 for accommodating motor mounting bolts (not shown), which bolt an electric motor, such as electric motor 4704, to motor support bracket 4702.

A plurality, preferably three, of pin receiving shaft portions 5340 are preferably arranged about recessed annular top surface 5306 and are arranged for slidably receiving pins of a top element which is described hereinbelow.

Extending downwardly from top planar generally circular wall 5304, in a generally circular cylindrical arrangement, are a plurality of depending wall sections 5350, some of which preferably surround pin receiving shafts 5340.

Depending wall sections 5350 preferably all terminate at a generally circumferential planar wall surface 5370, from which depends in turn, a generally cylindrical wall portion 5380. Wall sections 5350, together with top planar generally circular wall 5304 and generally circumferential planar wall surface 5370, define an array of ventilation apertures 5384. The array of ventilation apertures 5384 is generally mutually aligned within an array of ventilation apertures 1732 formed in the top element 4654 of motor housing and support assembly 4652. It is a particular feature of this embodiment of the invention that the ventilation apertures 5384 lie above liquid outflow channel termination location 5328.

Protruding from generally cylindrical wall portion 5380 are a plurality of spindle guiding shaft portions 5390, which extend below a bottom edge 5392 of cylindrical wall portion 5380. Each of spindle guiding shaft portions 5390 preferably defines a vertical bore 5394, each of which terminates adjacent a lower edge 5396 of the spindle guiding shaft portion 5390 in a widened spring seat 5398 for accommodating a coil spring, such as coil spring 4708.

Reference is now made to FIGS. 90A, 90B, 90C, 90D and 90E, which are simplified respective planar top, planar side, planar bottom, top-facing pictorial and bottom-facing pictorial view illustrations of motor lifting element 4710 forming part of the axially displaceable rotary drive assembly 4660 of FIGS. 75A & 75B.

As seen in FIGS. 90A-90E, motor lifting element 4710 includes a plurality of upstanding internally threaded spindle receiving sockets 5400, which are disposed about a generally planar annular wall 5402, preferably having radial reinforcement ribs 5406 and defining a central ventilation aperture 5408. Disposed centrally of central ventilation aperture 5408 is a linearly displaceable ventilating element positioning hub 5410. The purpose of ventilating element positioning hub 5410 is to correctly azimuthally position a blade, such as blade 3160, upon lowering of axially displaceable rotary drive assembly 4660, such that the blade accurately seats in a downwardly-facing blade receiving recess, such as recess 3510 of lid 3140. This is achieved by correctly azimuthally positioning ventilating element 4716, which is rotationally fixed to a drive shaft, such as drive shaft 2202, which in turn is rotationally fixed to a blade, such as blade 3160.

Ventilating element positioning hub 5410 is preferably configured to have a planar wall 5412. Extending downwardly from planar wall 5412 is an outer circumferential wall 5414, interiorly of which is an inner circumferential wall 5416 having a pair of outer facing vertical elongate side slots 5418 for receiving a corresponding pair of interior ribs of linear to rotary converting adaptor 4712, thereby to lock linear to rotary converting adaptor 4712 against rotation relative to motor lifting element 4710.

Inner circumferential wall 5416 terminates at a downward facing edge 5420 adjacent which is provided a pair of protrusions 5422. Inwardly of edge 5420 is a circumferential wall 5430 having a bottom edge 5432 defining a pair of symmetric downward facing teeth 5434, each of which has a pair of inclined tooth surfaces 5436 which meet at a point 5438. It is also noted that protrusions 5422 also serve to lock linear to rotary converting adaptor 4712 against linear disengagement from motor lifting element 4710.

Figure 90A:
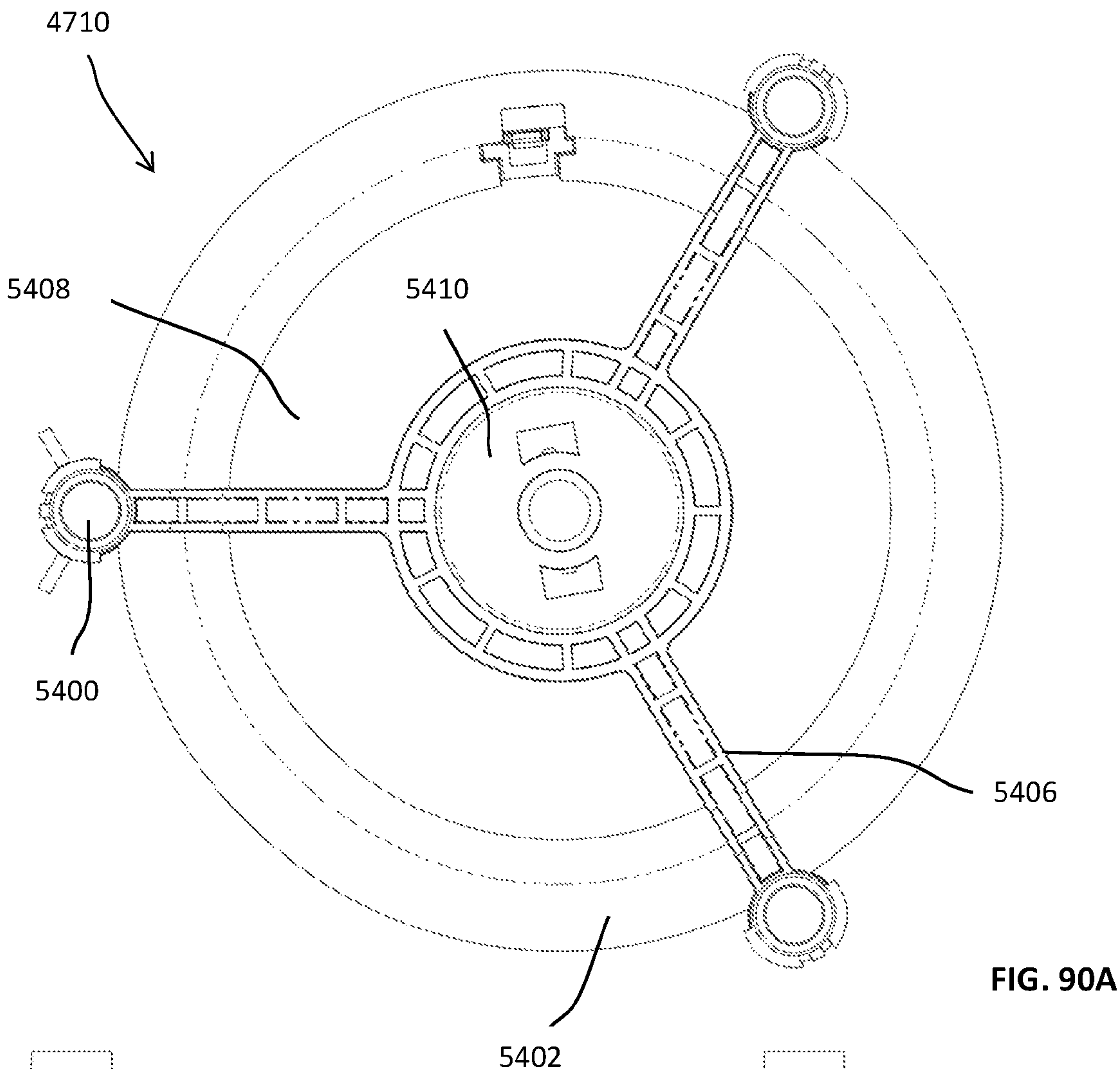
FIGS. 90A, 90B, 90C, 90D and 90E are simplified respective planar top, planar side, planar bottom, top-facing pictorial and bottom-facing pictorial view illustrations of a motor lifting element forming part of the axially displaceable rotary drive assembly of FIGS. 75A & 75B.
Figure 90B:
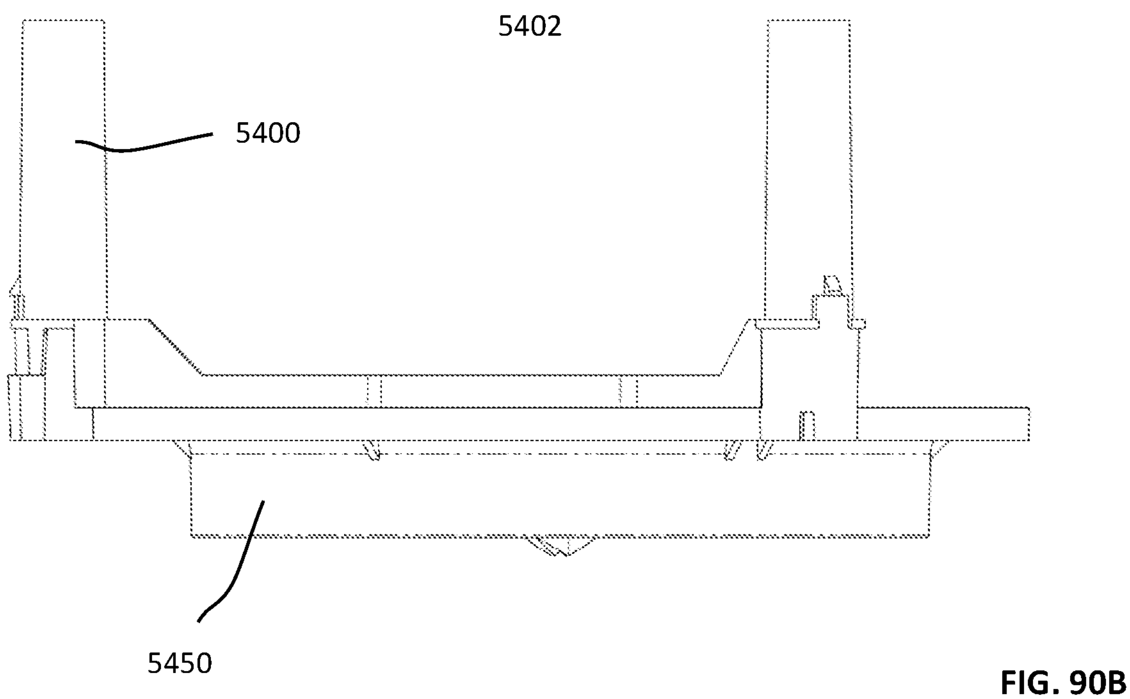
Figure 90C:
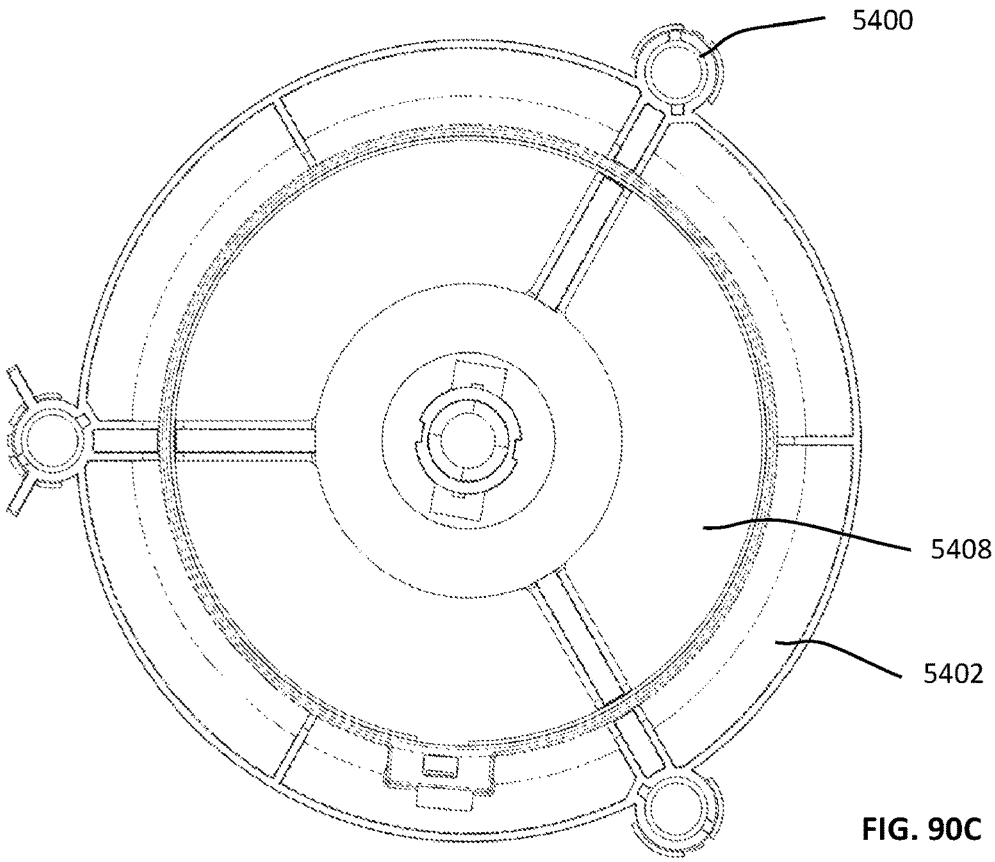
Figure 90D:
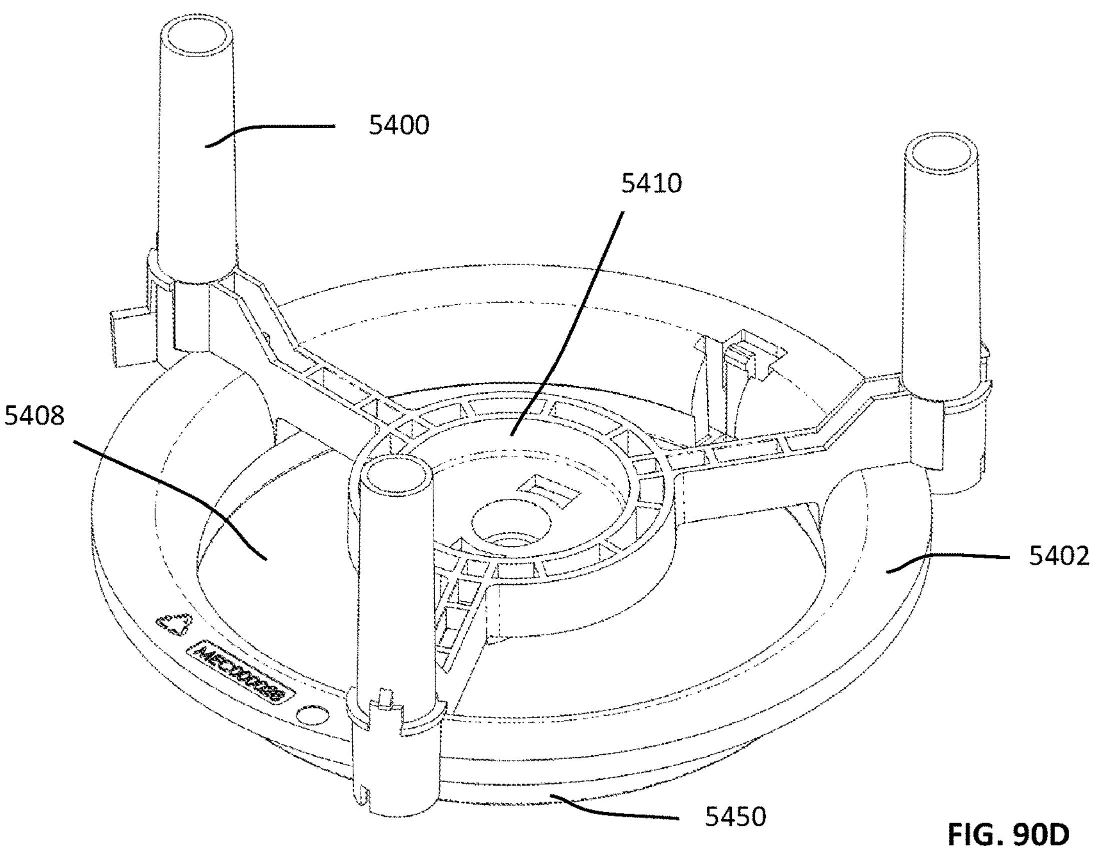
Figure 90E:
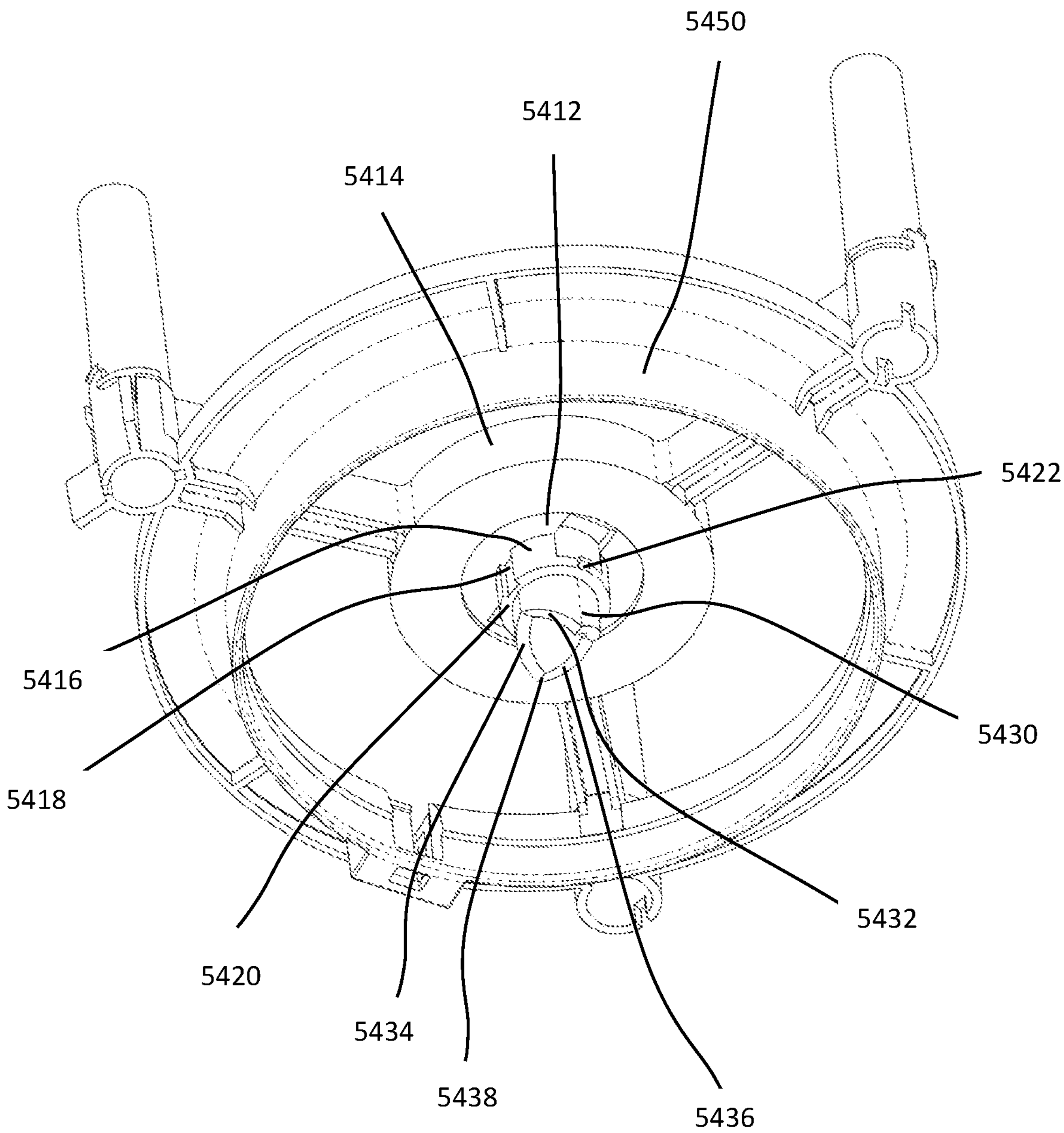

As seen particularly clearly in FIG. 90E, there is provided a ventilating element surround skirt 5450 which is supported on radial ribs 5406. Skirt 5450 defines a continuous downward extension of generally planar annular wall 5402.

Figure 91A:
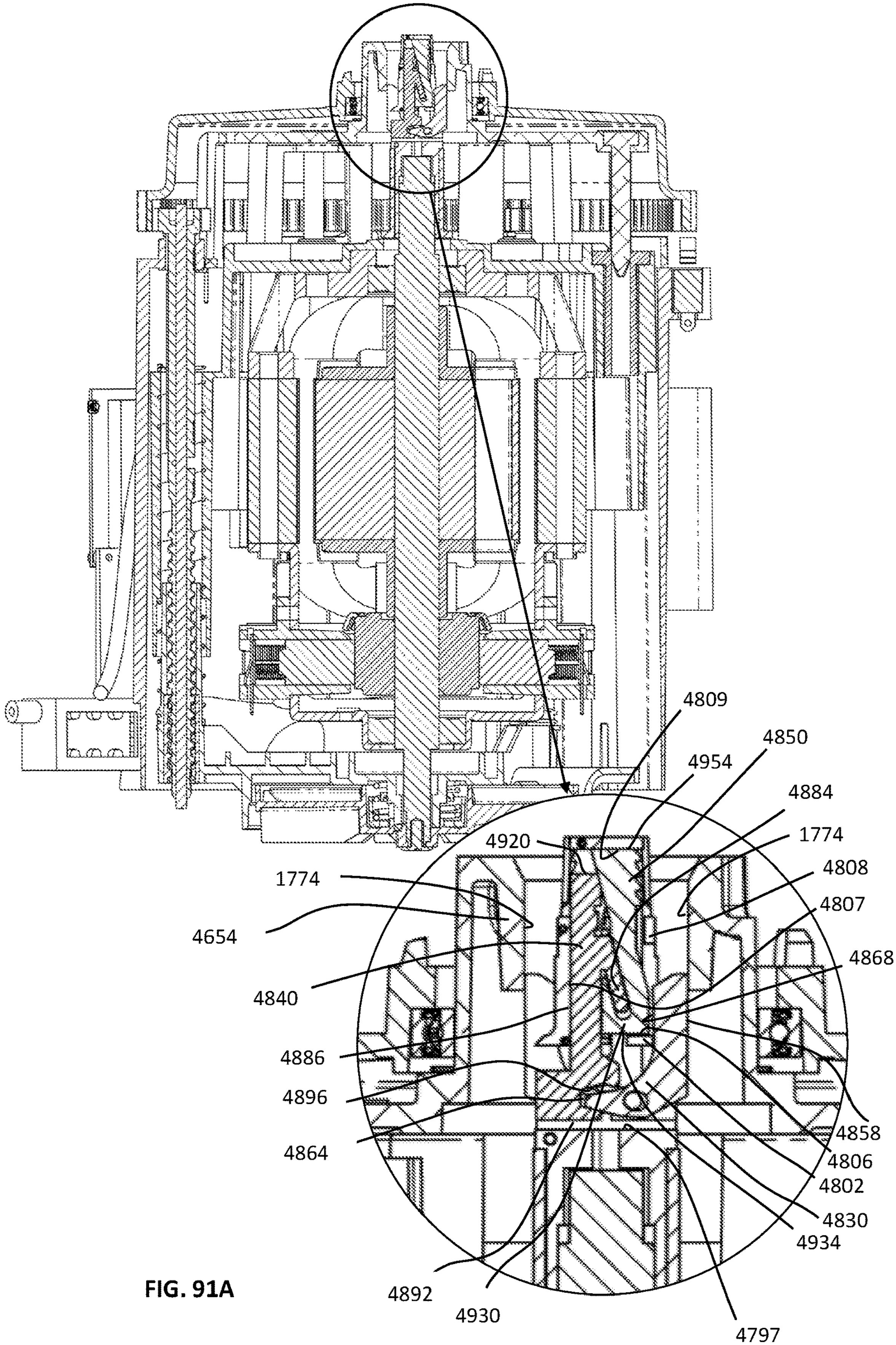
FIGS. 91A, 91B and 91C are sectional illustrations, taken along line A-A in FIG. 73A, showing part of the vertically displacing rotary drive motor assembly of FIGS. 73A-73B, including the outer drive shaft assembly of FIGS. 76A-81B in three operative orientations.
Figure 91B:
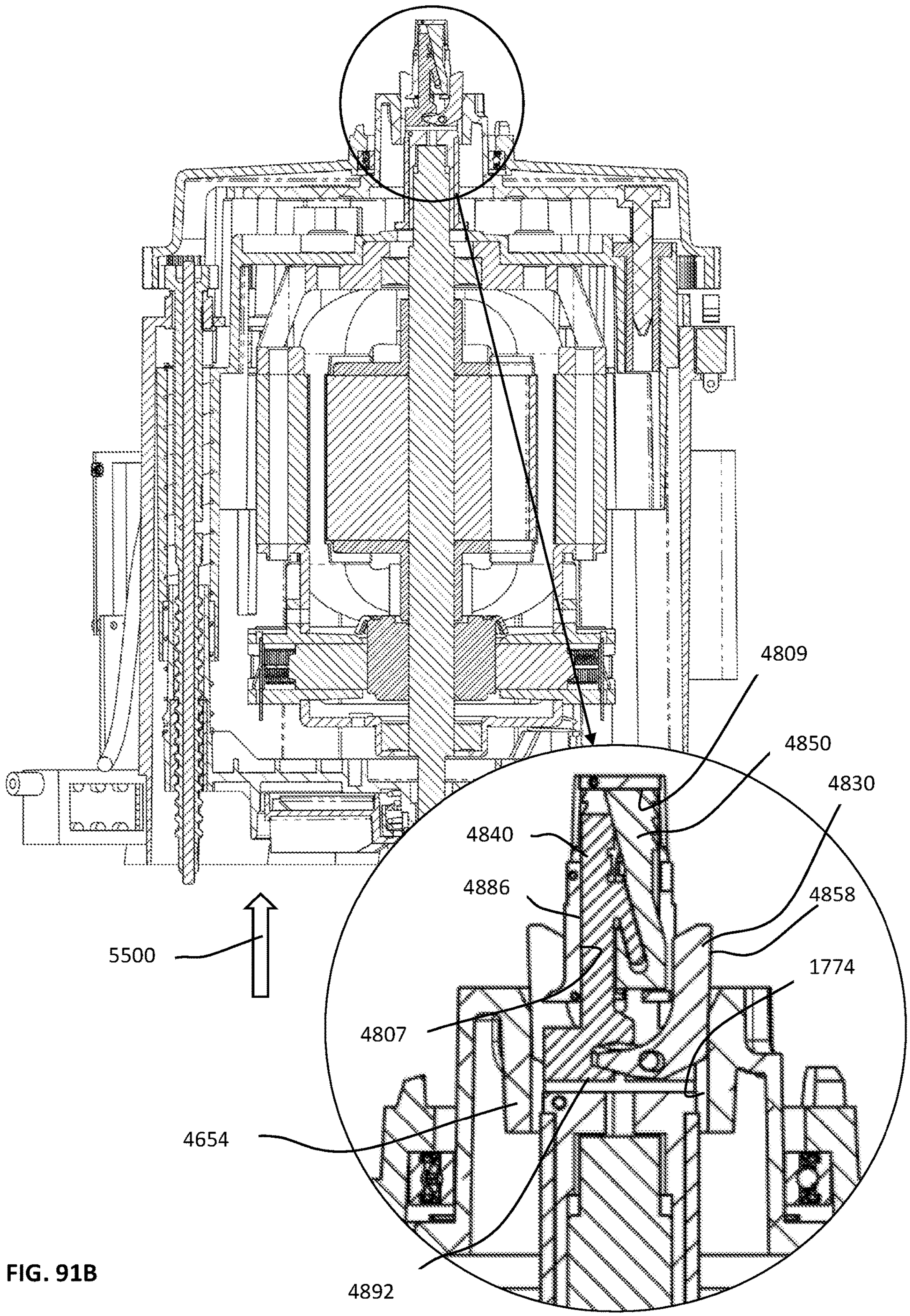
Figure 91C:
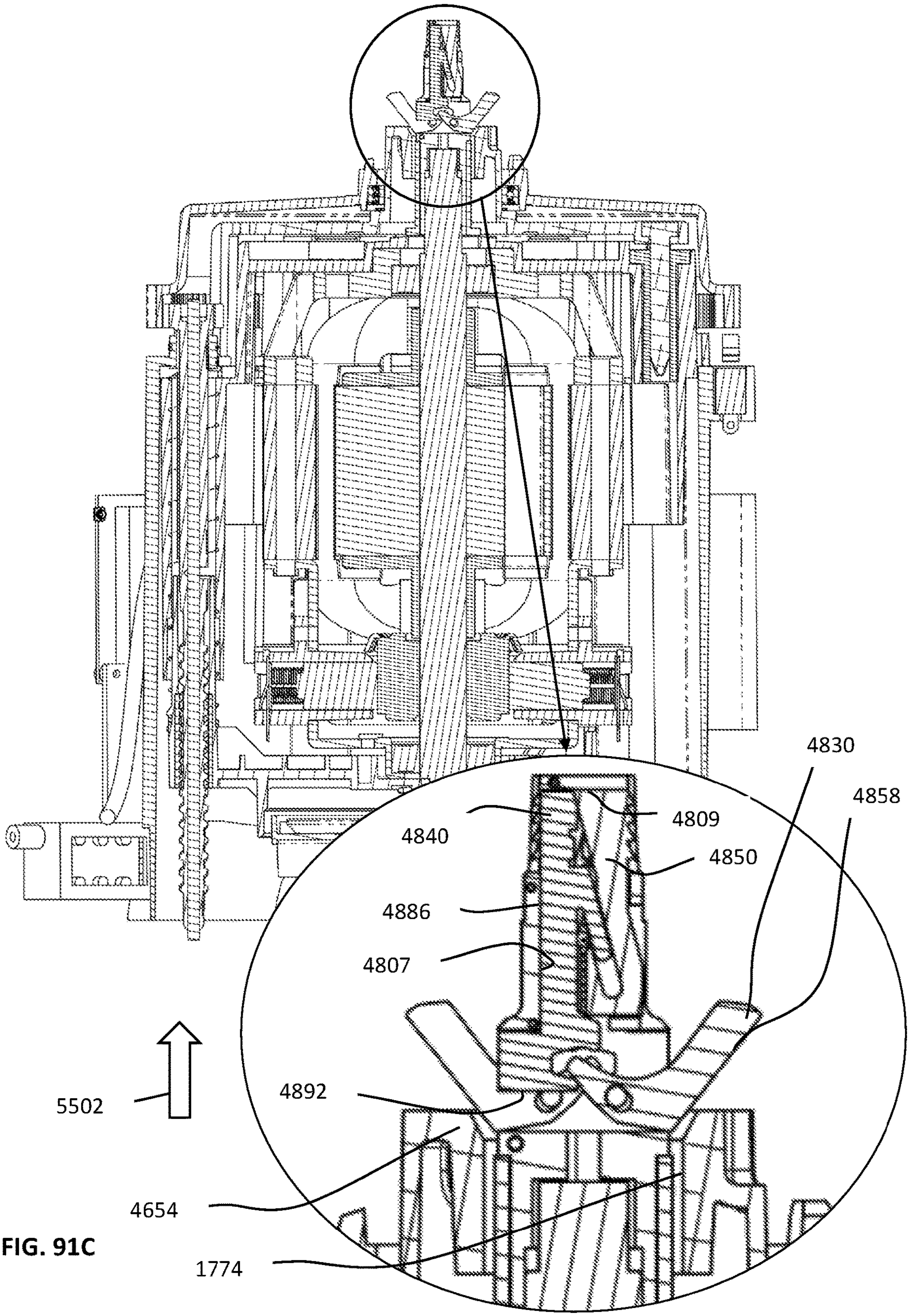

Reference is now made to FIGS. 91A, 91B and 91C, which are sectional illustrations, taken along line A-A in FIG. 73A, showing part of vertically displacing rotary drive motor assembly 4630 of FIGS. 73A-73B, including outer drive shaft assembly 4642 of FIGS. 76A-81B, in three operative orientations.

FIG. 91A shows outer drive shaft assembly 4642 in its lowest operative orientation at rest, wherein edges 4858 of a pair of identical elbow elements 4830 vertically slidably engage radially inwardly directed cylindrical surface 1774 of top element 4654 and are constrained thereby to be in a rest position close to the position illustrated in FIG. 77D.

FIG. 91B shows upward vertical displacement of outer drive shaft assembly 4642 from the operative orientation shown in FIG. 91A, as indicated by an arrow 5500. Edges 4858 of elbow elements 4830, however, remain in vertically slidable engagement with radially inwardly directed cylindrical surface 1774 of top element 4654 such that radially outward rotation of elbow elements 4830 is prevented.

FIG. 91C shows further upward vertical displacement of outer drive shaft assembly 4642 from the operative orientation shown in FIG. 91B, as indicated by an arrow 5502, such that most of outer drive shaft assembly 4642, including edges 4858 of elbow elements 4830, lies above radially inwardly directed cylindrical surface 1774 of top element 4654, such that radially outward rotation of elbow elements 4830 is no longer prevented. In this operative orientation, the drive shaft assembly is able to lockingly engage blade 3160 (FIG. 61A) against vertical separation therefrom. The outer drive shaft assembly 4642 is cleared for rotation about its axis.

Reference is now made to FIGS. 92A, 92B, 92C, 92D, 92E, 92F, 92G and 92H, which are simplified illustrations of various stages in engagement of SUCSERDREA 3120 of FIGS. 59A-63H with single-use container body 3102.

Figure 92A:
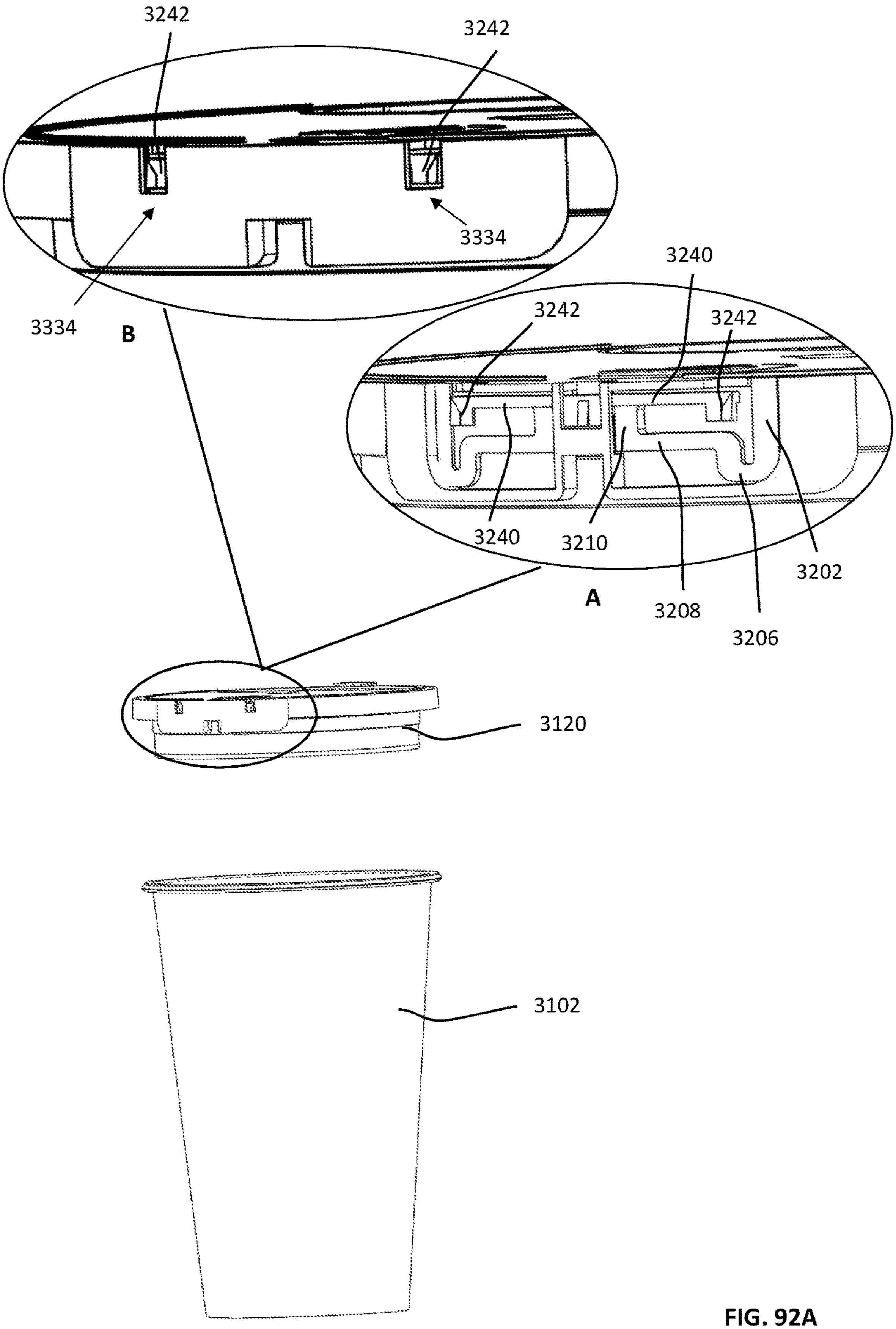
FIGS. 92A, 92B, 92C, 92D, 92E, 92F, 92G and 92H are simplified illustrations of various stages in engagement of SUCSERDREA of FIGS. 59A-60I with a single-use container body.

FIG. 92A is a pictorial illustration having a first partially cut away enlargement, marked A, and a second non-cut away enlargement, marked B, and shows the SUCSERDREA 3120 prior to attachment thereof to the single-use container body 3102. This attachment normally occurs at a manufacturing plant in which the SUPCAs are filled with a product, such as a food product.

As seen in FIG. 92A, the pair of mutually spaced engagement windows 3334 (FIG. 63C) are each occluded by an engagement window occluding end portion 3242 of a corresponding symmetric locking arm 3240 (FIG. 62B), which is not deformed. Circumferentially outer arms 3202, circumferentially inwardly directed spring arm portions 3208, elbows 3206 and upwardly extending portions 3210 are also not deformed.

Figure 92B:
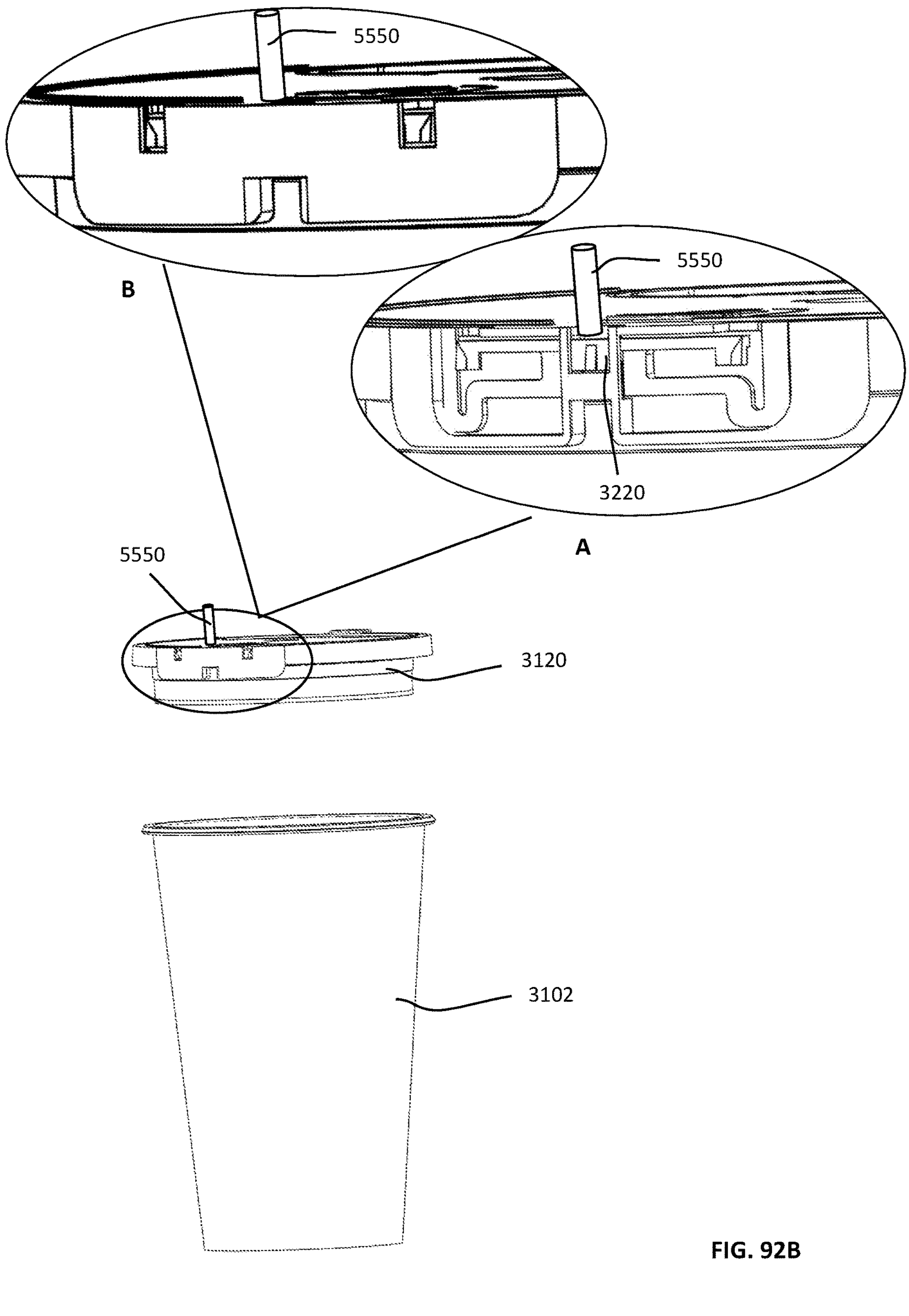

FIG. 92B is a pictorial illustration, corresponding to FIG. 92A and having a first partially cut away enlargement, marked A, and a second non-cut away enlargement, marked B, and additionally shows a pin 5550 about to be inserted into cut out 3174 (FIGS. 62A & 62B) aligned with aperture 3350 (FIG. 63A). It is seen that cantilevered generally elongate locking portion 3220 is in its non-deformed rest position.

Figure 92C:
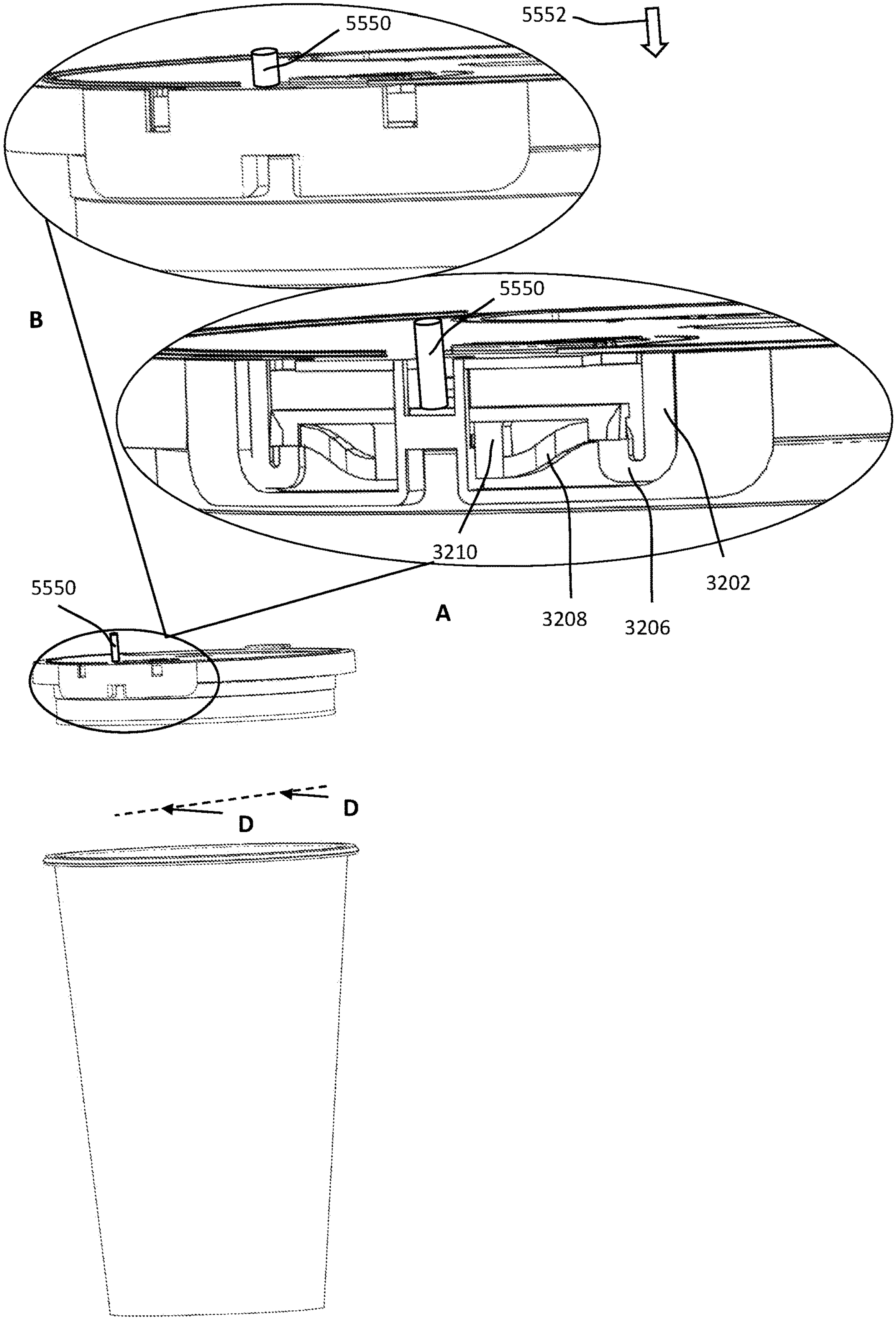

FIG. 92C is a pictorial illustration corresponding to FIG. 92B and having a first partially cut away enlargement, marked A, and a second non-cut away enlargement, marked B, and shows pin 5550 inserted into cut out 3174 in a direction indicated by an arrow 5552, forcing cantilevered generally elongate locking portion 3220 downwardly in the direction indicated by arrow 5552 out of its rest position to a window unblocking position, thus producing deformation of circumferentially outer arms 3202, circumferentially inwardly directed spring arm portions 3208, elbows 3206 and upwardly extending portions 3210. The deformation of a circumferentially inwardly directed spring arm portion 3208 is clearly seen in FIG. 92C.

Figure 92D:
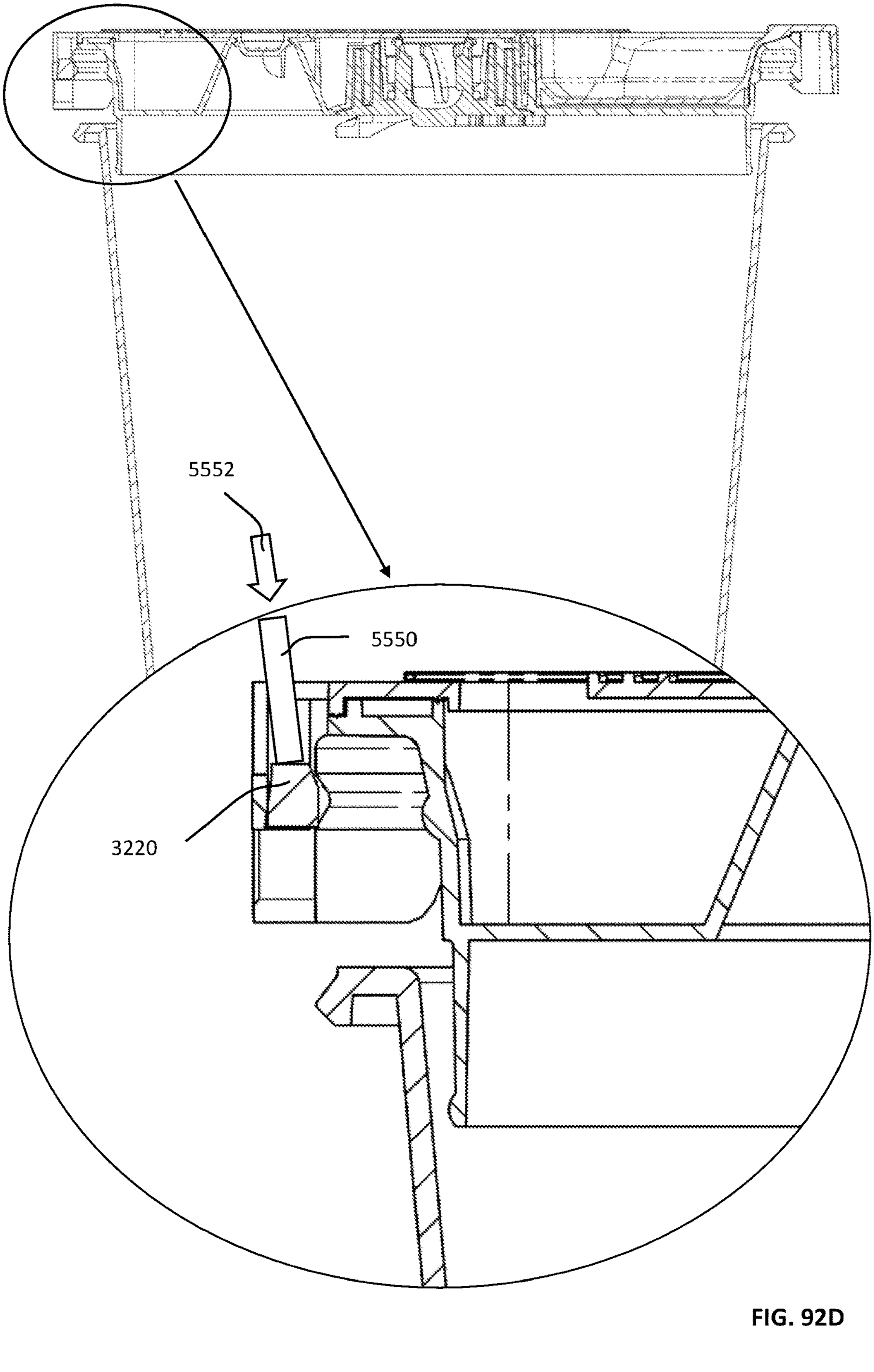

FIG. 92D is a sectional illustration corresponding to FIG. 92C, taken along lines D-D in FIG. 92C and having a partially cut away enlargement, and shows pin 5550, which retains cantilevered generally elongate locking portion 3220 in its window unblocking position.

Figure 92E:
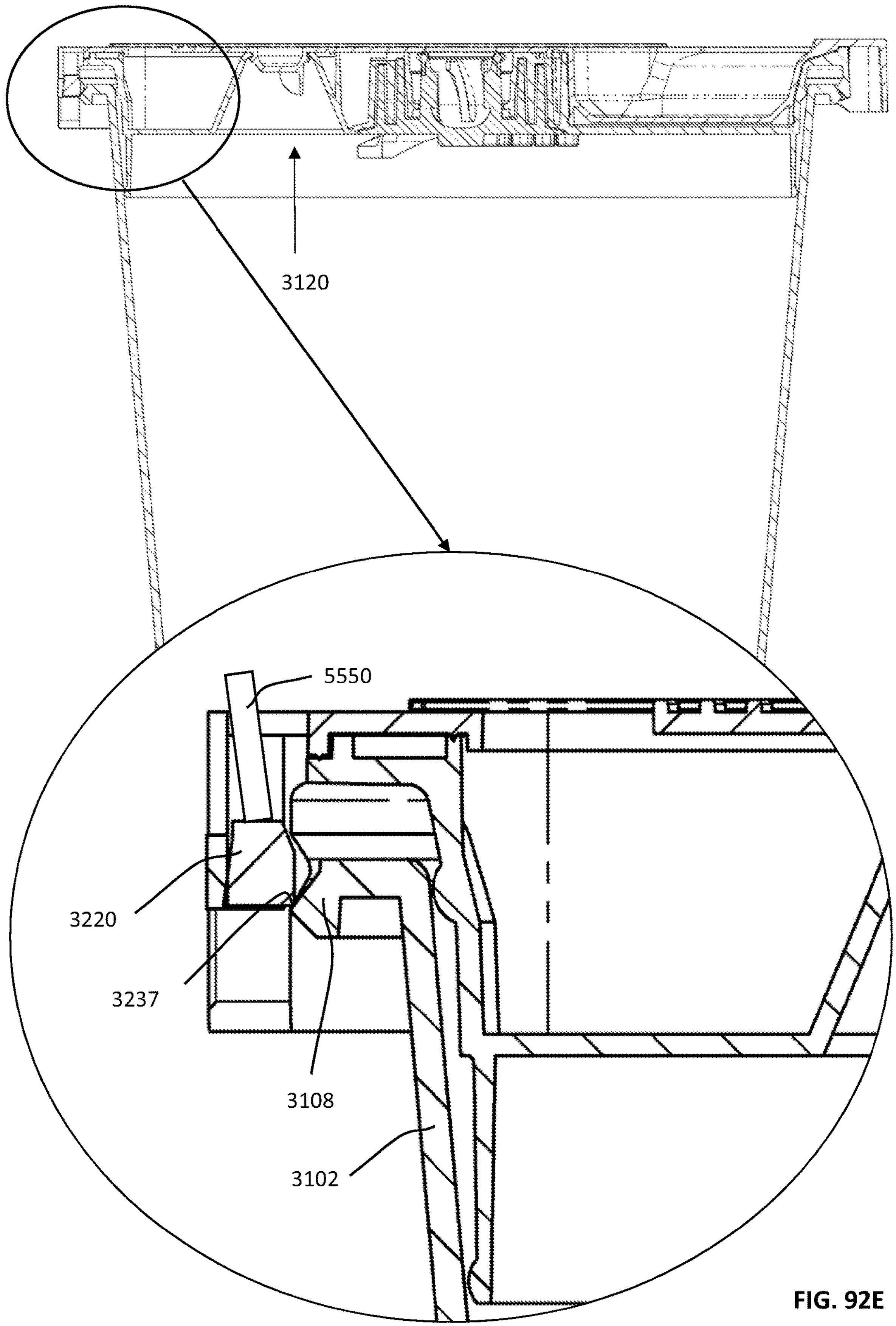

FIG. 92E is a sectional illustration, taken along lines D-D in FIG. 92C, having a partially cut away enlargement, but shows initial engagement of circumferential rim 3108 of single-use container body 3102 with SUCSERDREA 3120. It is seen that circumferential rim 3108 engages downward-facing corner edge 3237 of cantilevered generally elongate locking portion 3220, which prevents full seated engagement of the circumferential rim 3108 with the SUCSERDREA 3120.

Figure 92F:
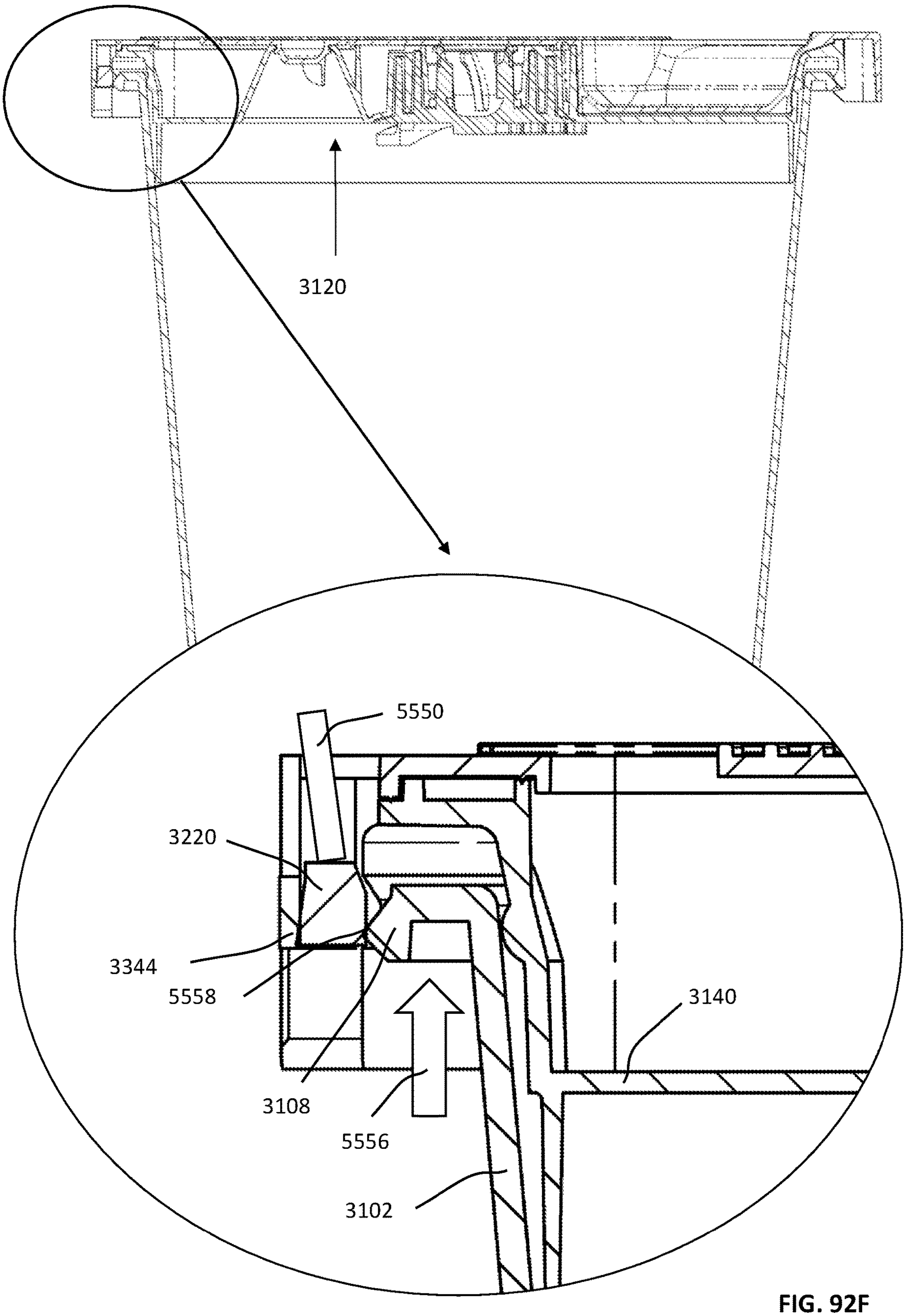

FIG. 92F is a sectional illustration, taken along lines D-D in FIG. 92C, having a partially cut away enlargement, but shows further engagement of circumferential rim 3108 of single-use container body 3102 with SUCSERDREA 3120. When pin 5550 is retained in its position relative to SUCSERDREA 3120 and circumferential rim 3108 is displaced in the direction indicated by an arrow 5556 relative to SUCSERDREA 3120, circumferential rim 3108 moves along a rim engagement surface 5558 in the direction indicated by arrow 5556. Rim engagement surface 5558 extends from edge 3237 along surface 3236 past edge 3239 and along surface 3238 (FIG. 62C). This movement produces deformation of cantilevered generally elongate locking portion 3220, circumferential rim 3108 of the single-use container body 3102 and transverse rib 3344 of lid 3140.

Figure 92G:
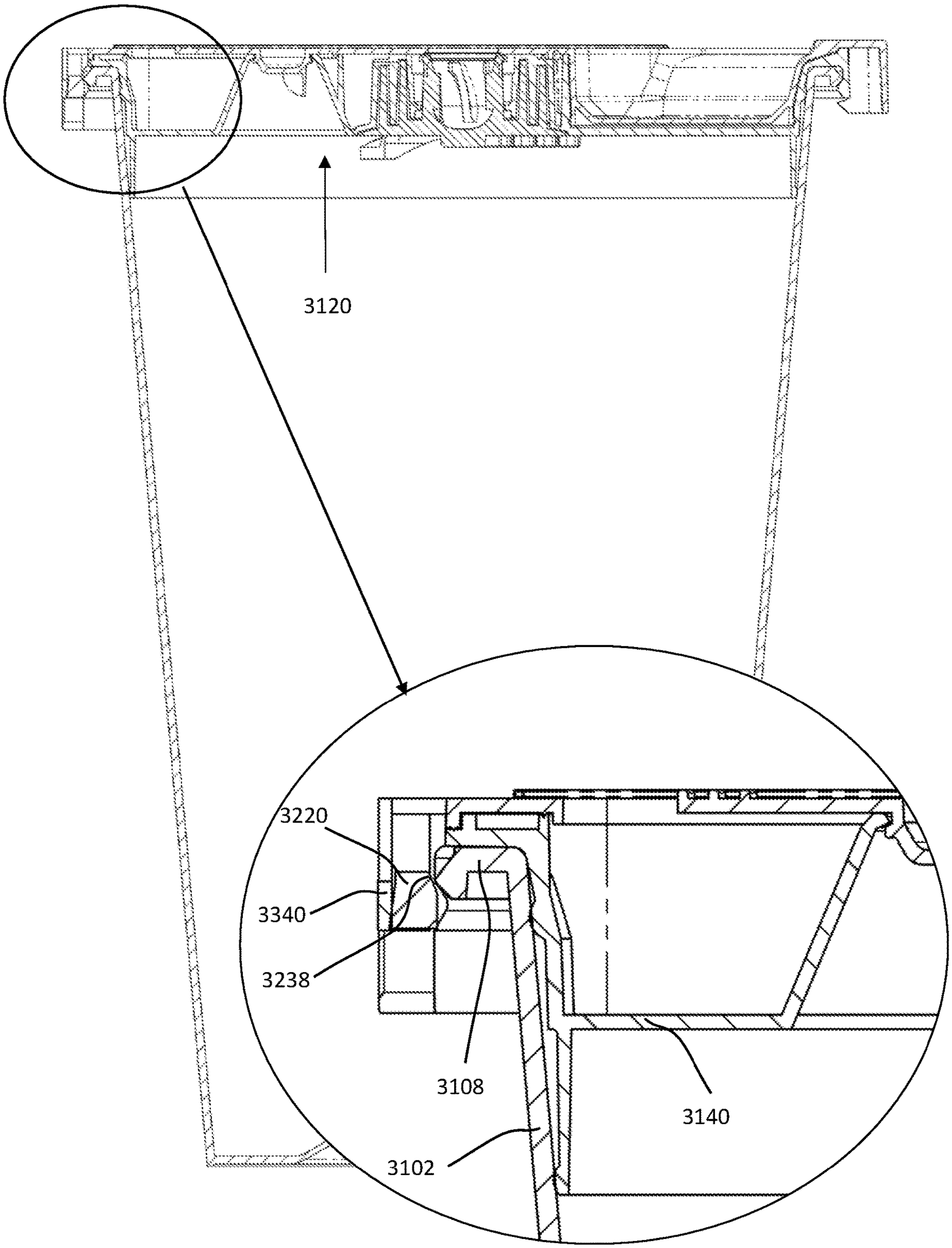

FIG. 92G is a sectional illustration, taken along lines D-D in FIG. 92C, having a partially cut away enlargement, but shows full seated engagement of circumferential rim 3108 of single-use container body 3102 with SUCSERDREA 3120, allowing removal of pin 5550, without such removal enabling the cantilevered generally elongate locking portion 3220 to return to its rest position (FIG. 92B). Cantilevered generally elongate locking portion 3220 is prevented from returning to its rest position (FIG. 92B) by engagement of an upward-facing corner surface 3238 of cantilevered generally elongate locking portion 3220 with circumferential rim 3108.

Figure 92H:
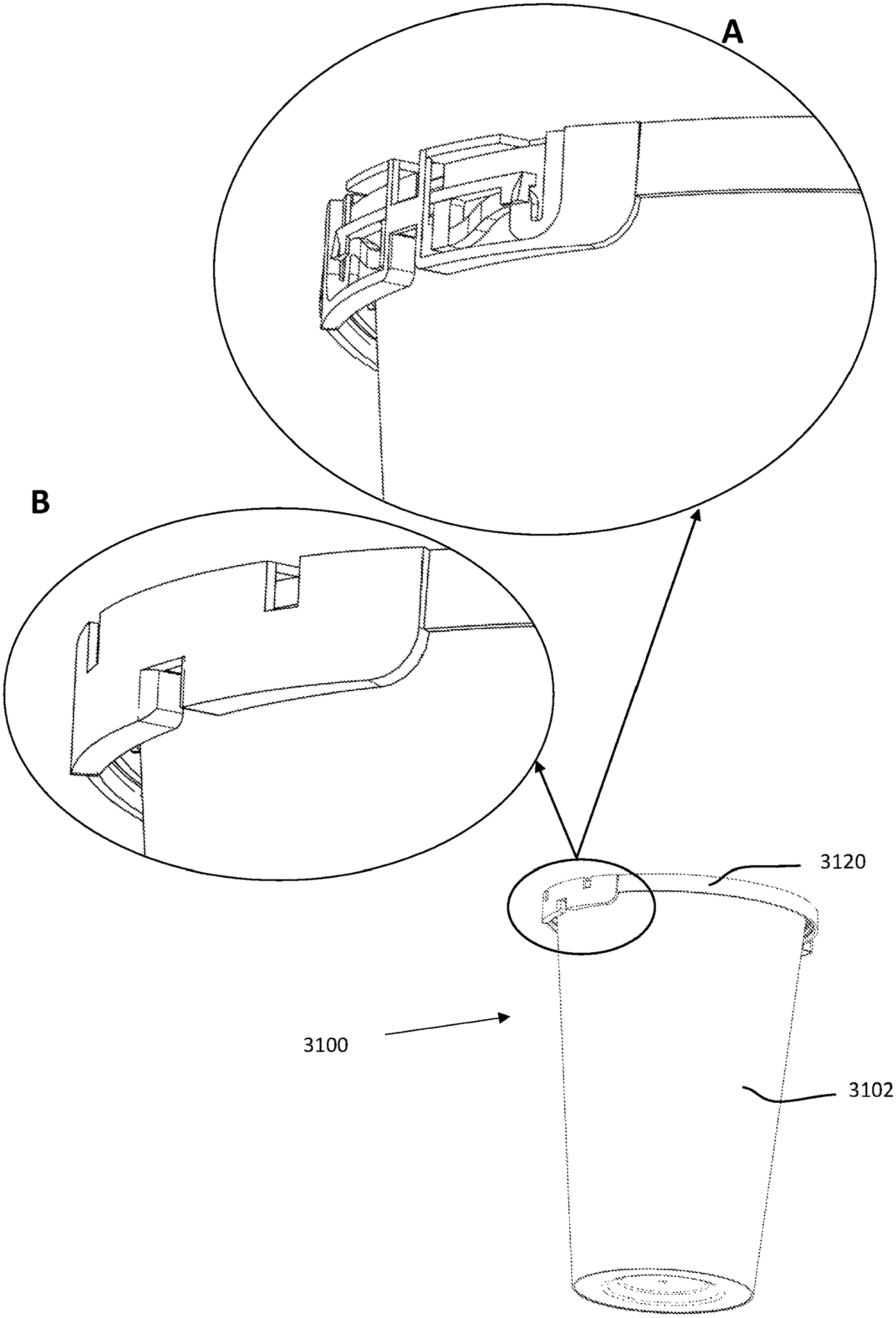

FIG. 92H, which corresponds to FIG. 92G, is a pictorial illustration having a first partially cut away enlargement, marked A, and a second non-cut away enlargement, marked B, and shows a fully assembled SUPCA 3100 including SUCSERDREA 3120 sealed to single-use container body 3102, filled with a product (not shown) and ready for storage and shipment.

Figure 93A:
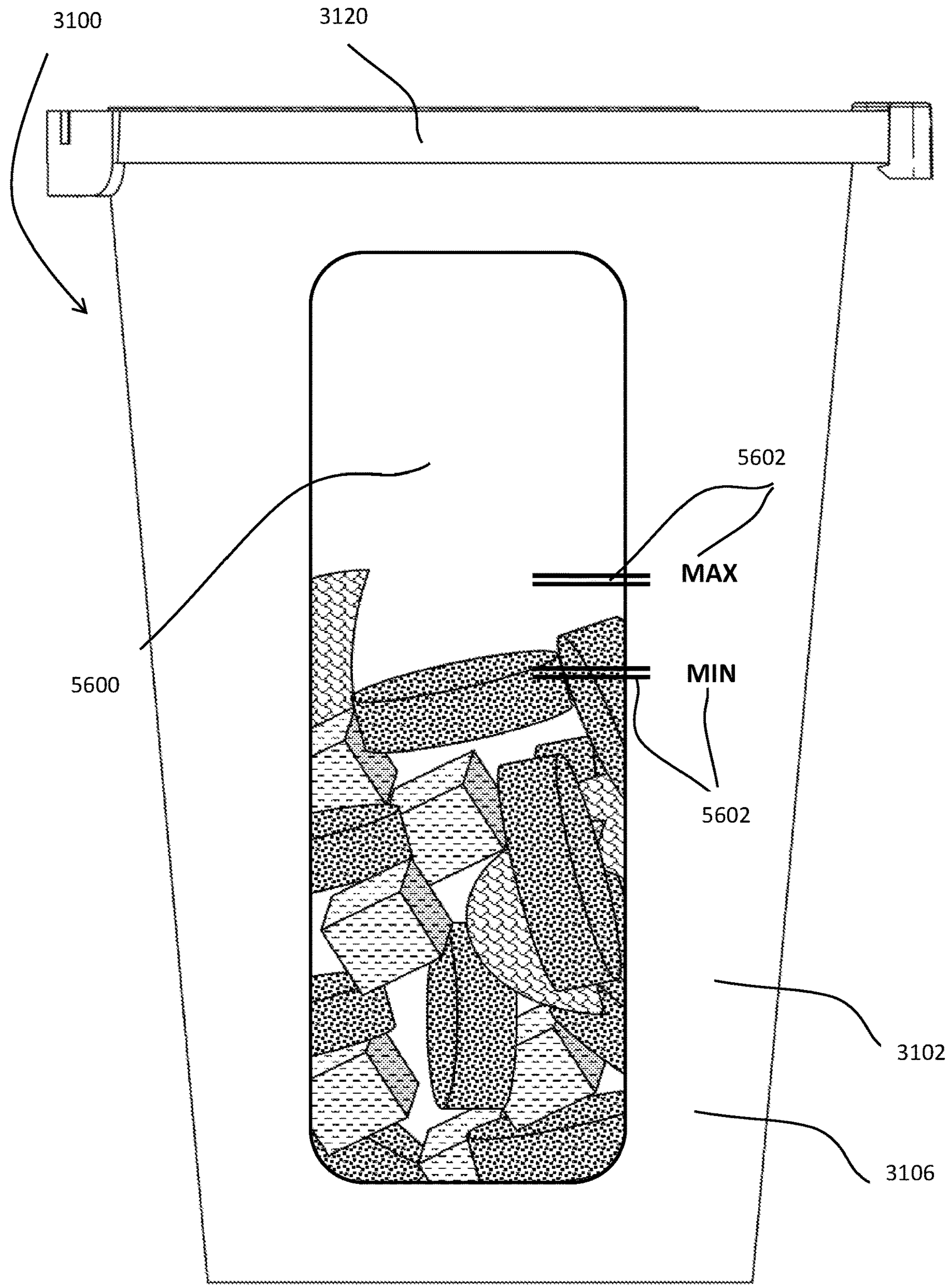
FIGS. 93A and 93B are respective simplified planar side view and central cross-sectional view illustrations of the SUPCA of FIGS. 60A-60I filled with a frozen food product.
Figure 93B:
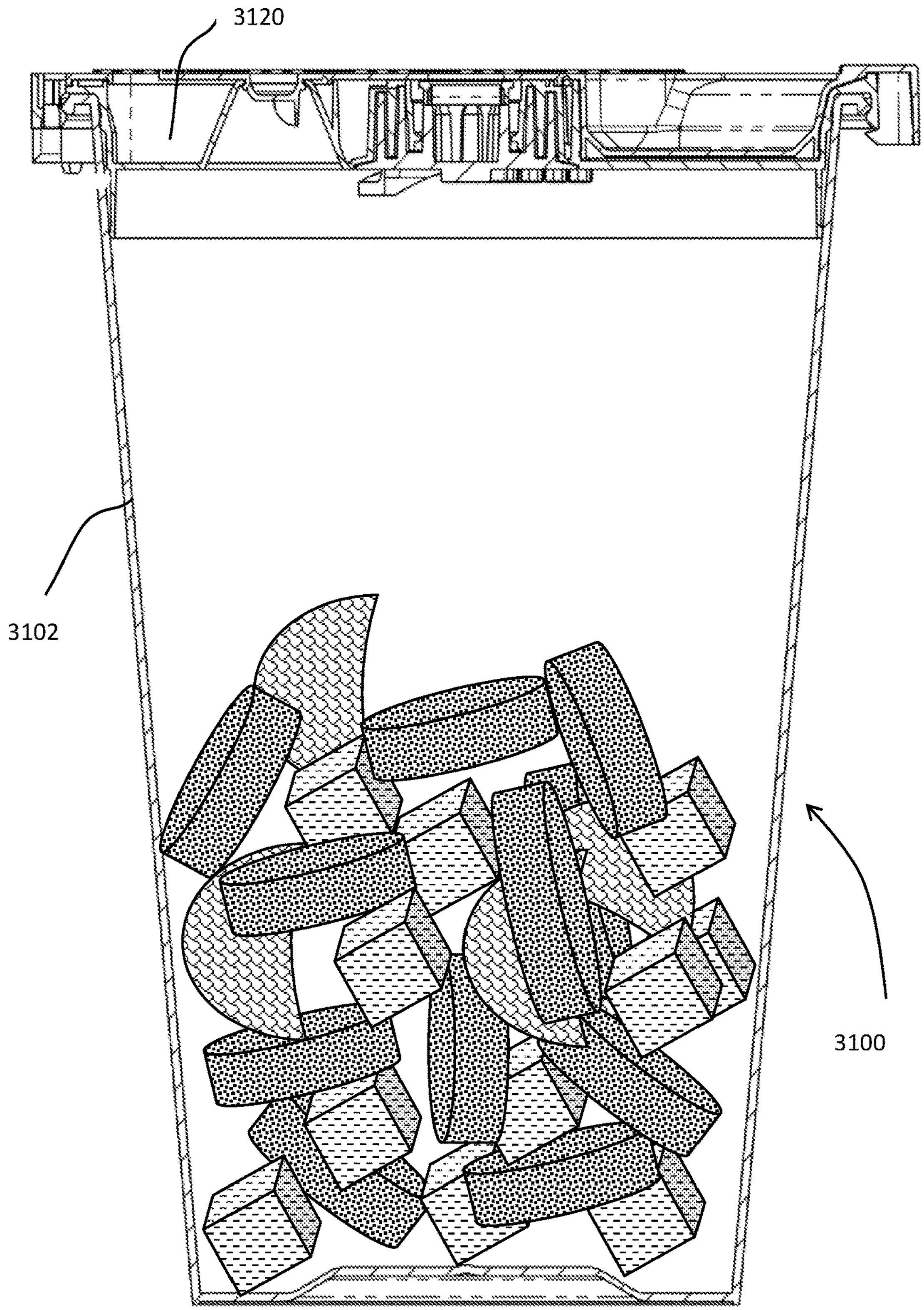
Figure 93C:
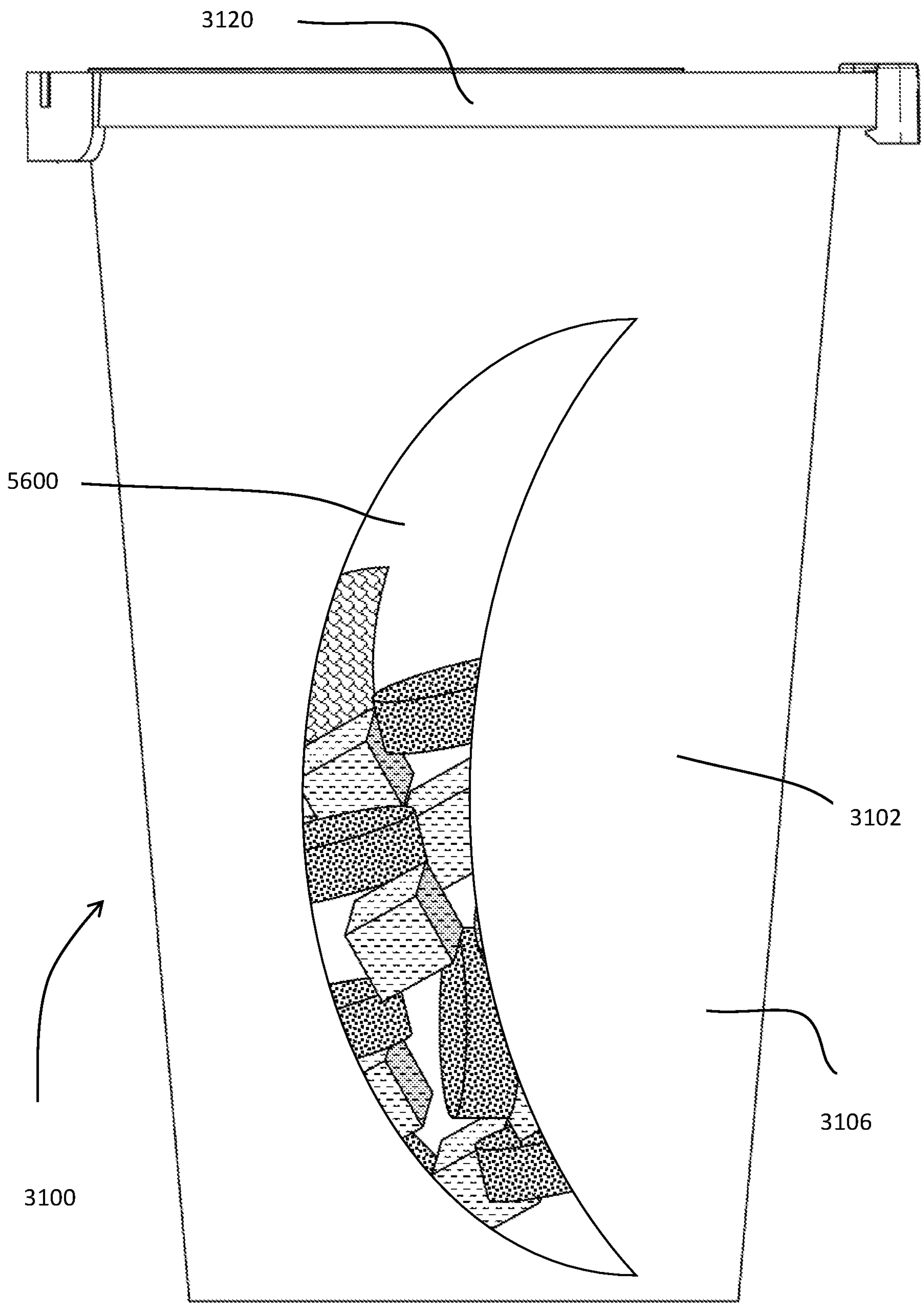
FIGS. 93C and 93D are respective simplified planar side and central cross-sectional illustrations of the SUPCA of FIGS. 60A-60I filled with a non-frozen food product.
Figure 93D:
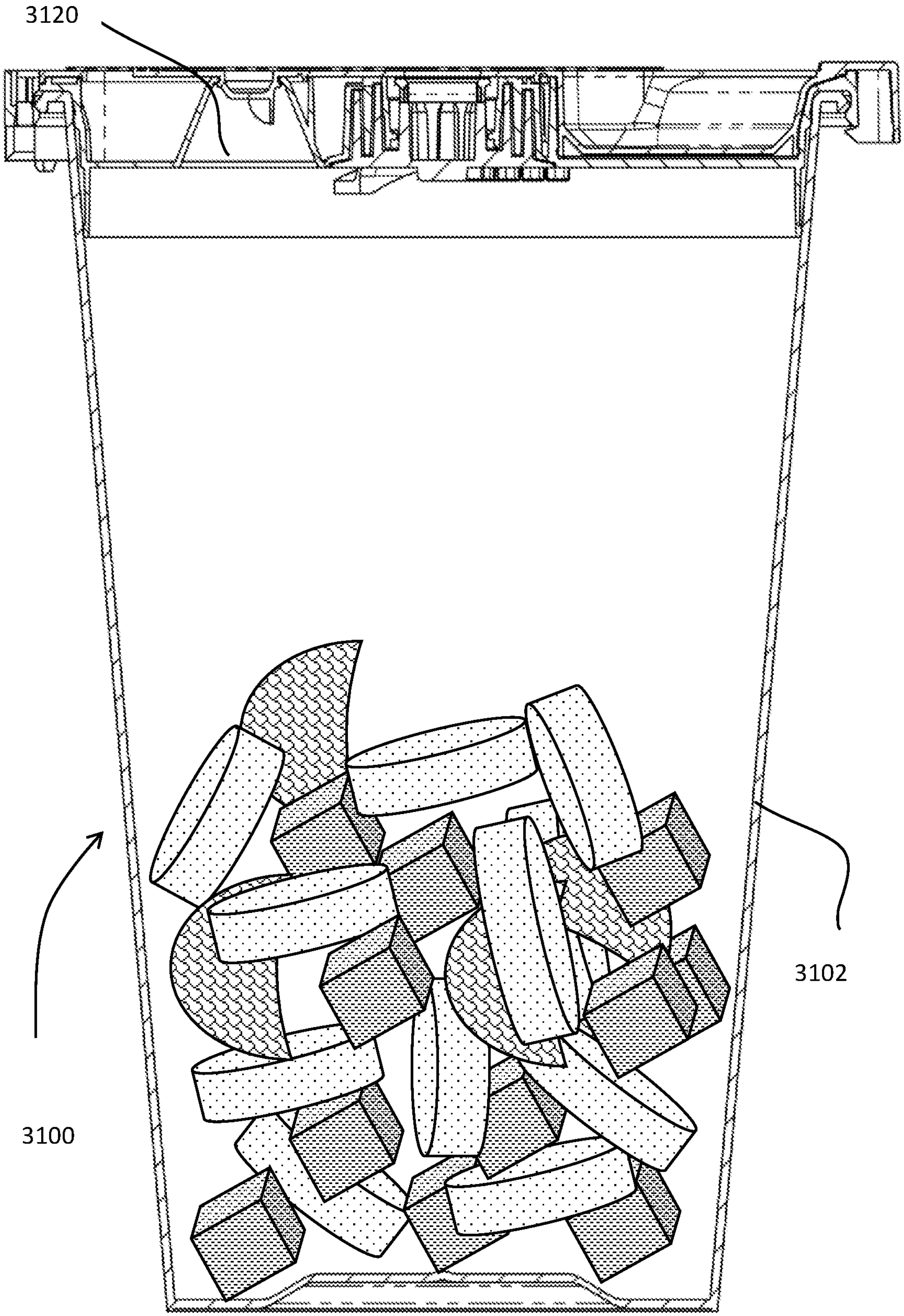

Reference is now made to FIGS. 93A and 93B, which are simplified respective planar side and central cross-sectional illustrations of the SUPCA 3100 of FIGS. 60A-60I filled with a frozen food product, and to FIGS. 93C and 93D, which are respective simplified planar side and central cross-sectional illustrations of the SUPCA of FIGS. 60A-60I filled with a non-frozen food product. The description that follows relates to use of the SUPCA 3100 and the MMIDD 4300 with a food product, it being appreciated that SUPCA

3100 and MMIDD 4300 are not limited to applications to food products although use thereof with food products is a preferred use.

As seen in FIGS. 93A & 93C, preferably, the single-use container body 3102 includes on wall 3106 thereof a transparent or translucent window, 5600, which enables a food product contained therein and a liquid level to be seen. As seen in FIG. 93A, the container body 3102 preferably includes markings 5602 preferably indicating minimum and maximum fill levels to be reached when adding liquid thereto. As seen in FIG. 93C, when the container body 3102 includes a non-frozen food product, normally no liquid filling is required and no markings are provided. Alternatively, even in the case of FIG. 93C, when the container body 3102 includes a non-frozen food product, additional liquid may be added and markings 5602 such as those in FIG. 93A may be provided.

It is a particular feature of the present invention that normally, the SUPCA 3100 is received by the user with SUCSERDREA 3120 attached thereto and intact, such that SUCSERDREA 3120 is in its non-previously used indicating operative orientation, shown in FIG. 92H, indicating that SUCSERDREA 3120 has not been disengaged from container body 3102 and has not been previously processed by an MMIDD. Should SUCSERDREA 3120 have been earlier disengaged from container body 3102 or should SUPCA 3100 have earlier been processed by an MMIDD, such as MMIDD 4300, SUCSERDREA 3120 is in its previously used indicating operative orientation, shown in FIGS. 113A-113E and FIGS. 116A-116C, providing a visible and a machine sensible indication of prior use or tampering, which prevents subsequent processing thereof by an MMIDD, such as MMIDD 4300.

Figure 94A:
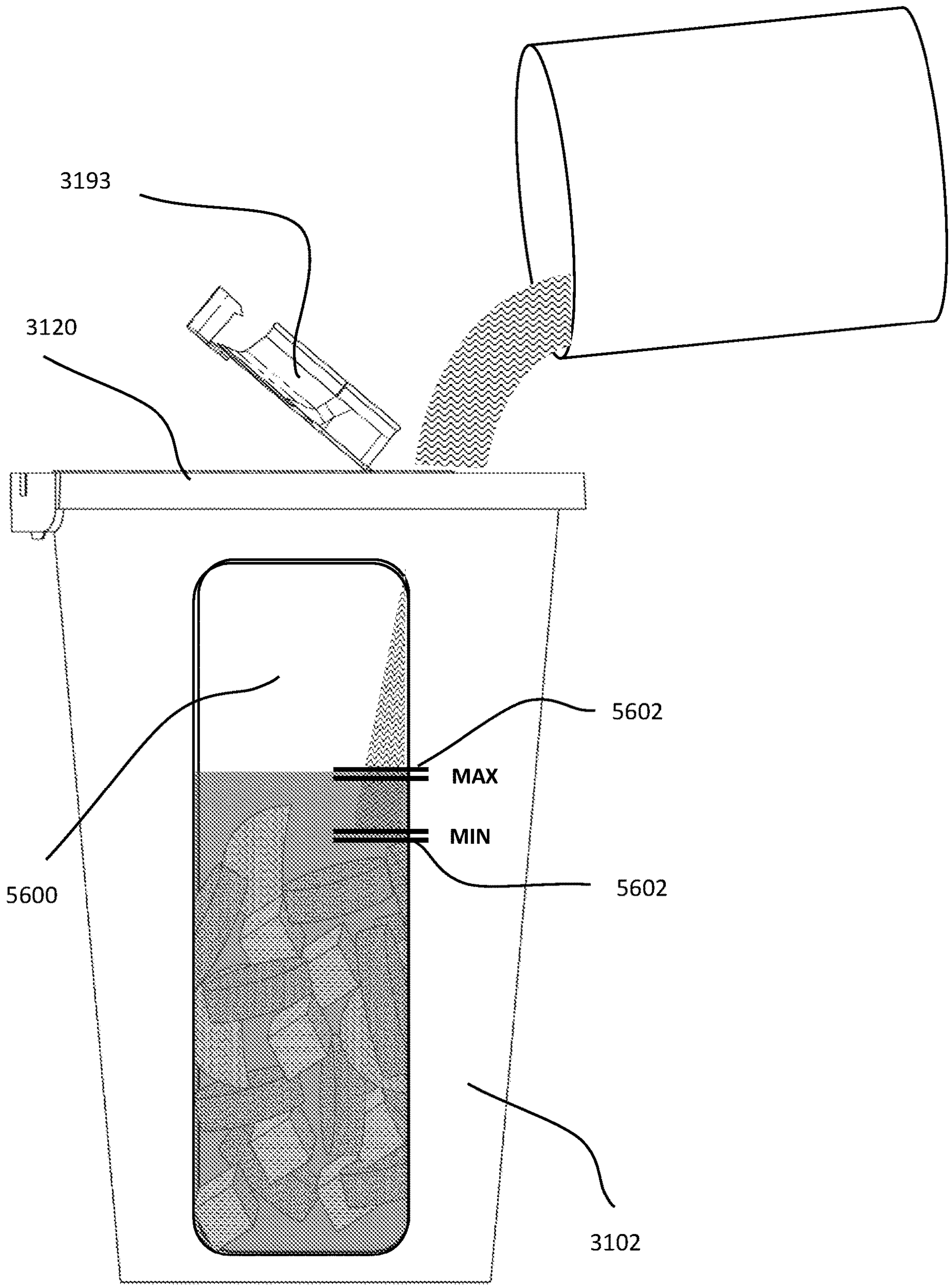
FIGS. 94A and 94B are simplified respective planar side and sectional illustrations of the SUPCA filled with a frozen food product of FIGS. 92A & 92B wherein liquid is being added to the frozen food product via a resealable opening in the SUCSERDREA of FIGS. 59A-60I.
Figure 94B:
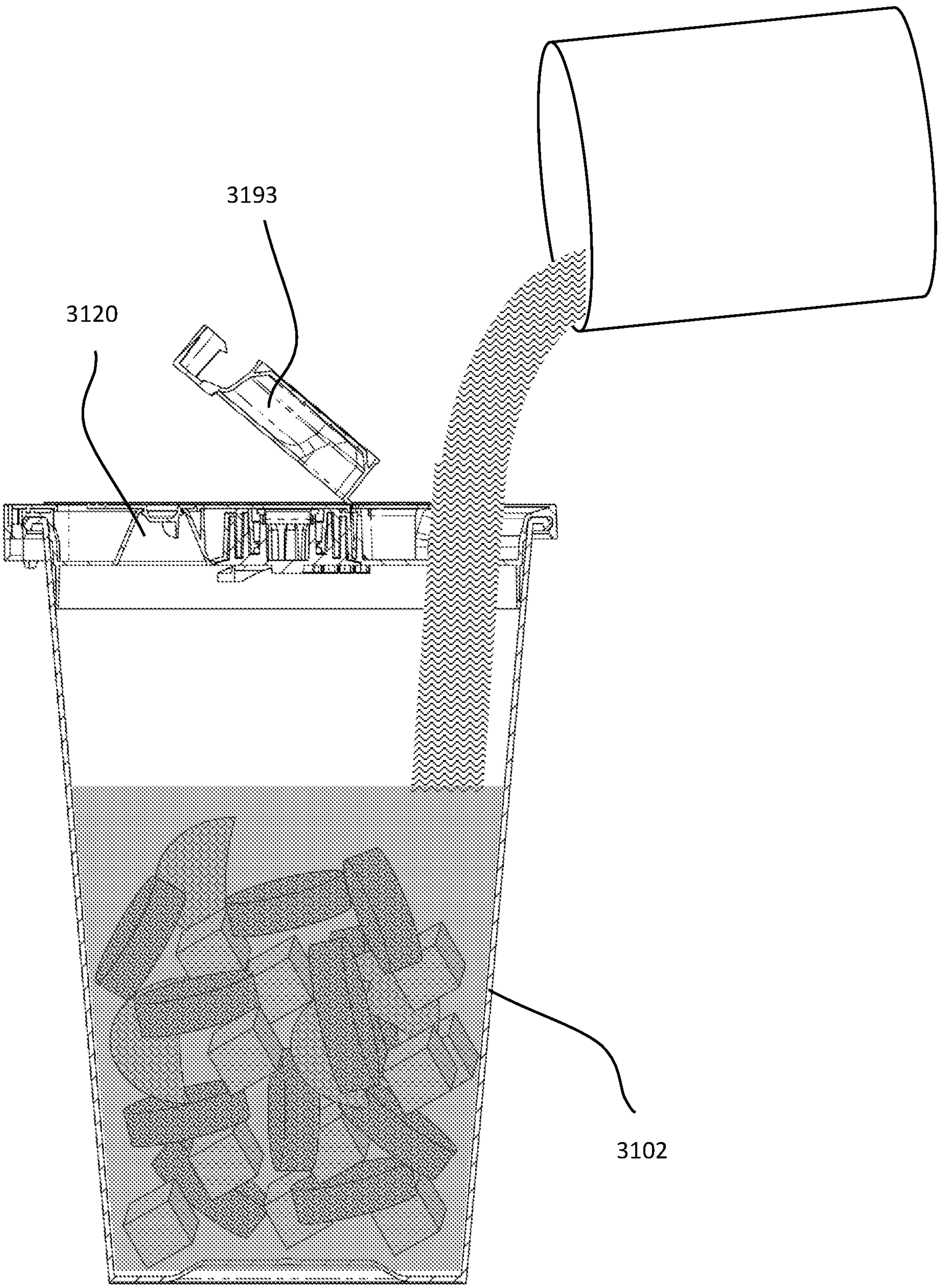

Reference is now made to FIGS. 94A and 94B, which are simplified respective planar side and sectional illustrations of the SUPCA 3100 filled with a frozen food product of FIGS. 93A & 93B, wherein liquid is being added to the frozen food product via a resealable opening in the SUCSERDREA of FIGS. 59A-60I.

Figure 95A:
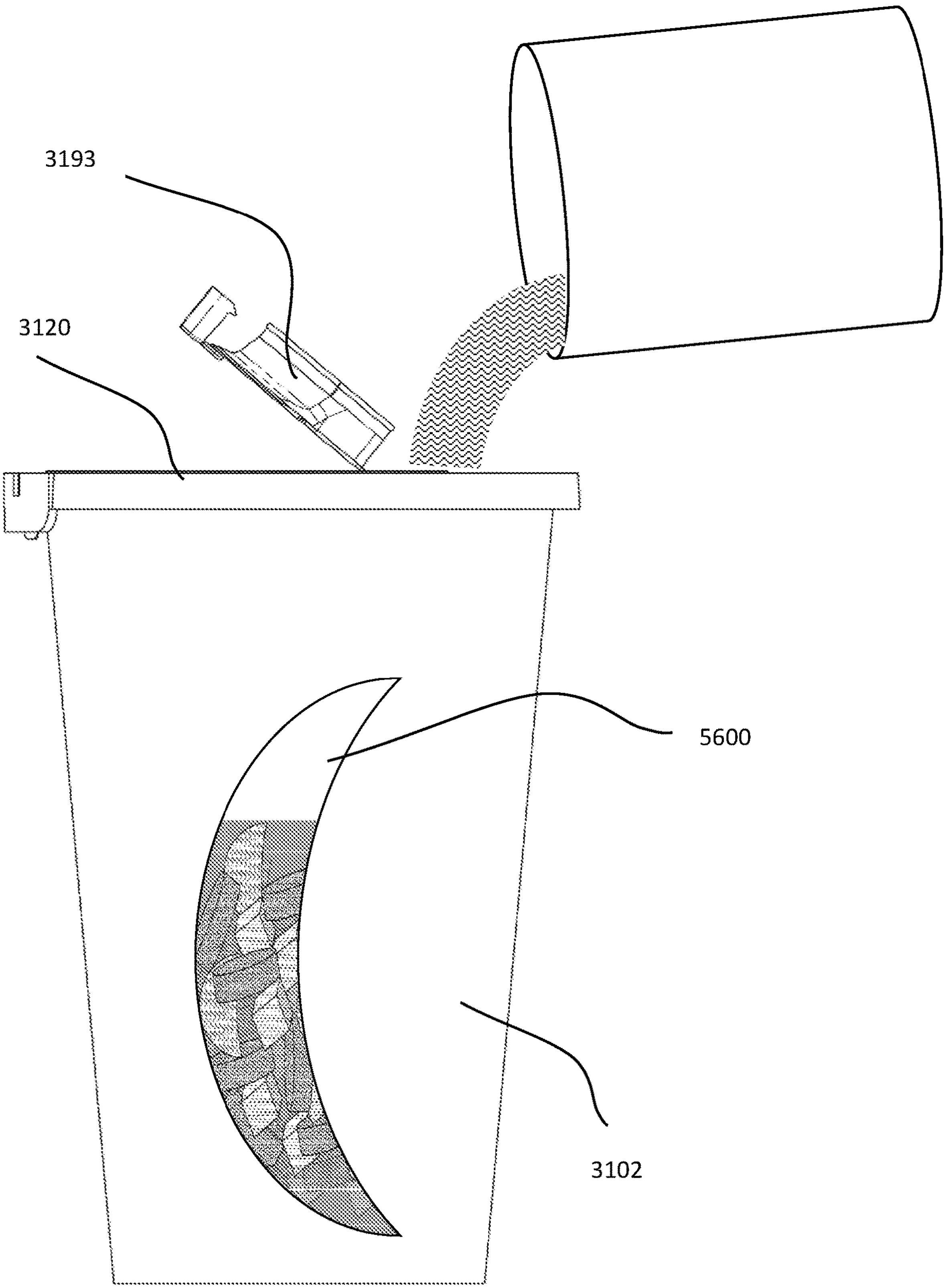
FIGS. 95A and 95B are simplified respective planar side and sectional illustrations of the SUPCA filled with a non-frozen food product of FIGS. 93A & 93B wherein liquid is being added to the non-frozen food product via a resealable opening in the SUCSERDREA of FIGS. 59A-60I.
Figure 95B:
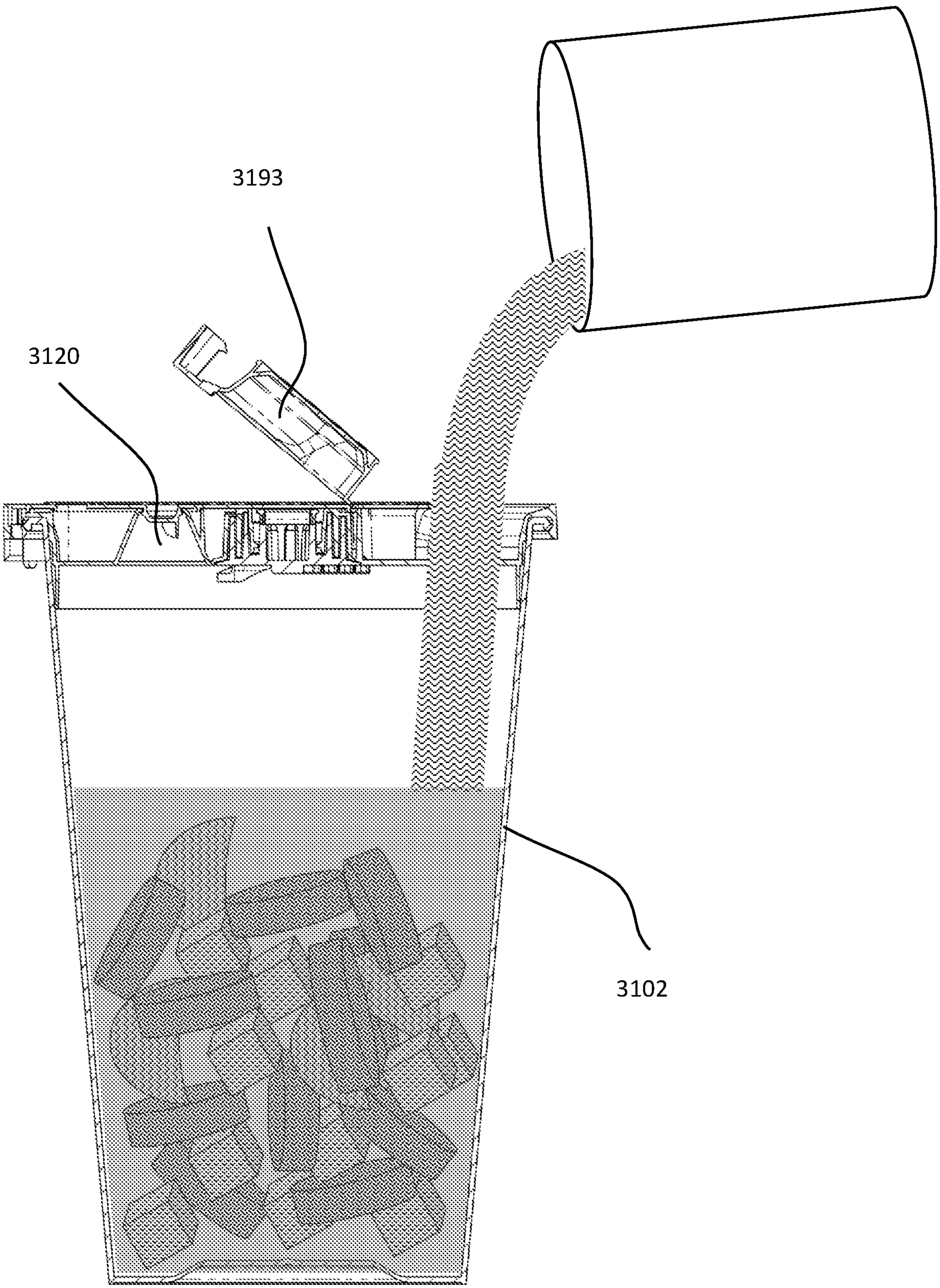

Reference is now made to FIGS. 95A and 95B, which are simplified respective planar side and sectional illustrations of the SUPCA 3100 filled with a non-frozen food product, as shown in FIGS. 93C & 93D, wherein liquid is being added to the non-frozen food product via a resealable opening in the SUCSERDREA of FIGS. 59A-60I.

Figure 96A:
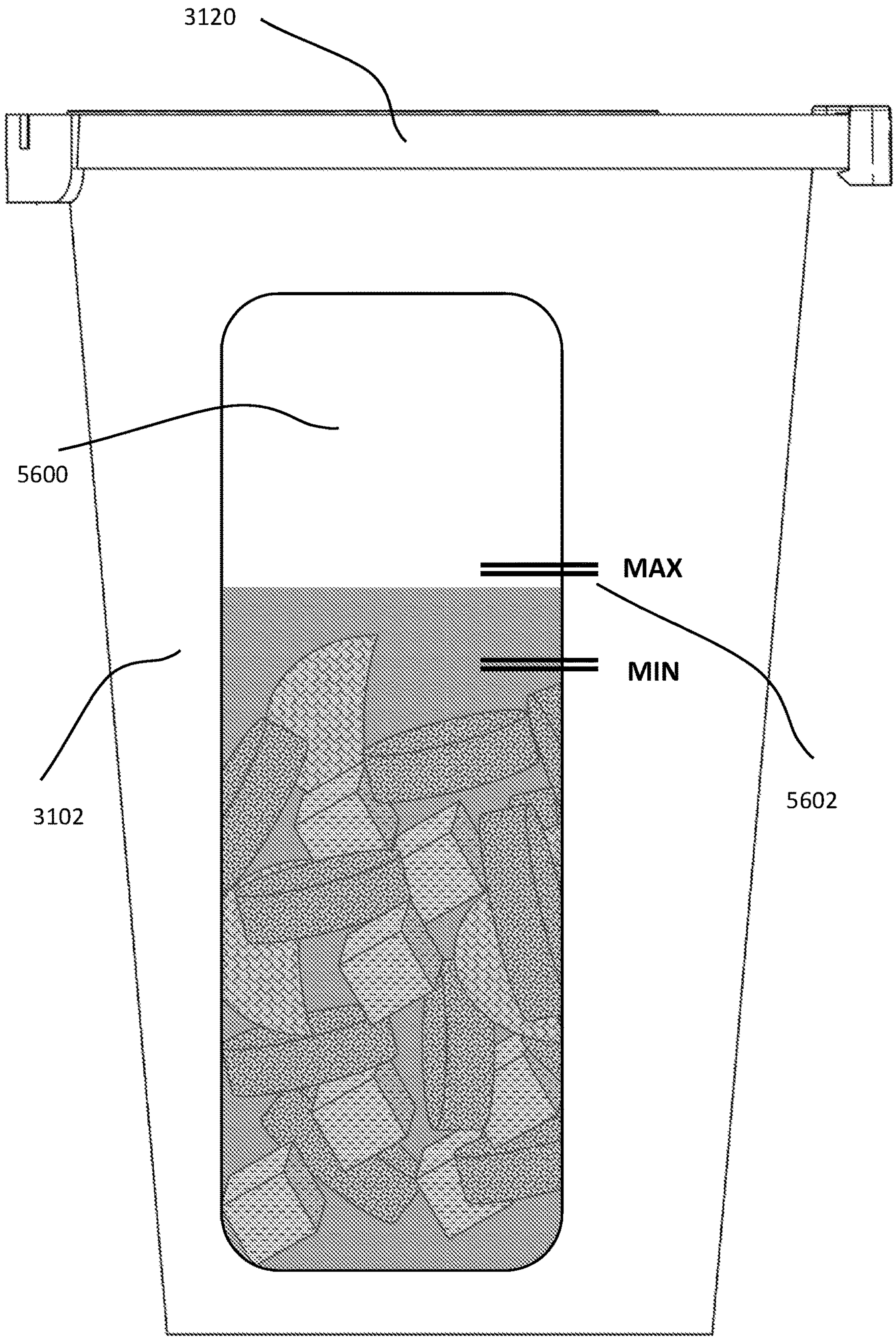
FIGS. 96A and 96B are simplified respective planar side and sectional illustrations of the SUPCA filled with a frozen or non-frozen food product as well as liquid, ready for processing by the MMIDD of FIG. 68.
Figure 96B:
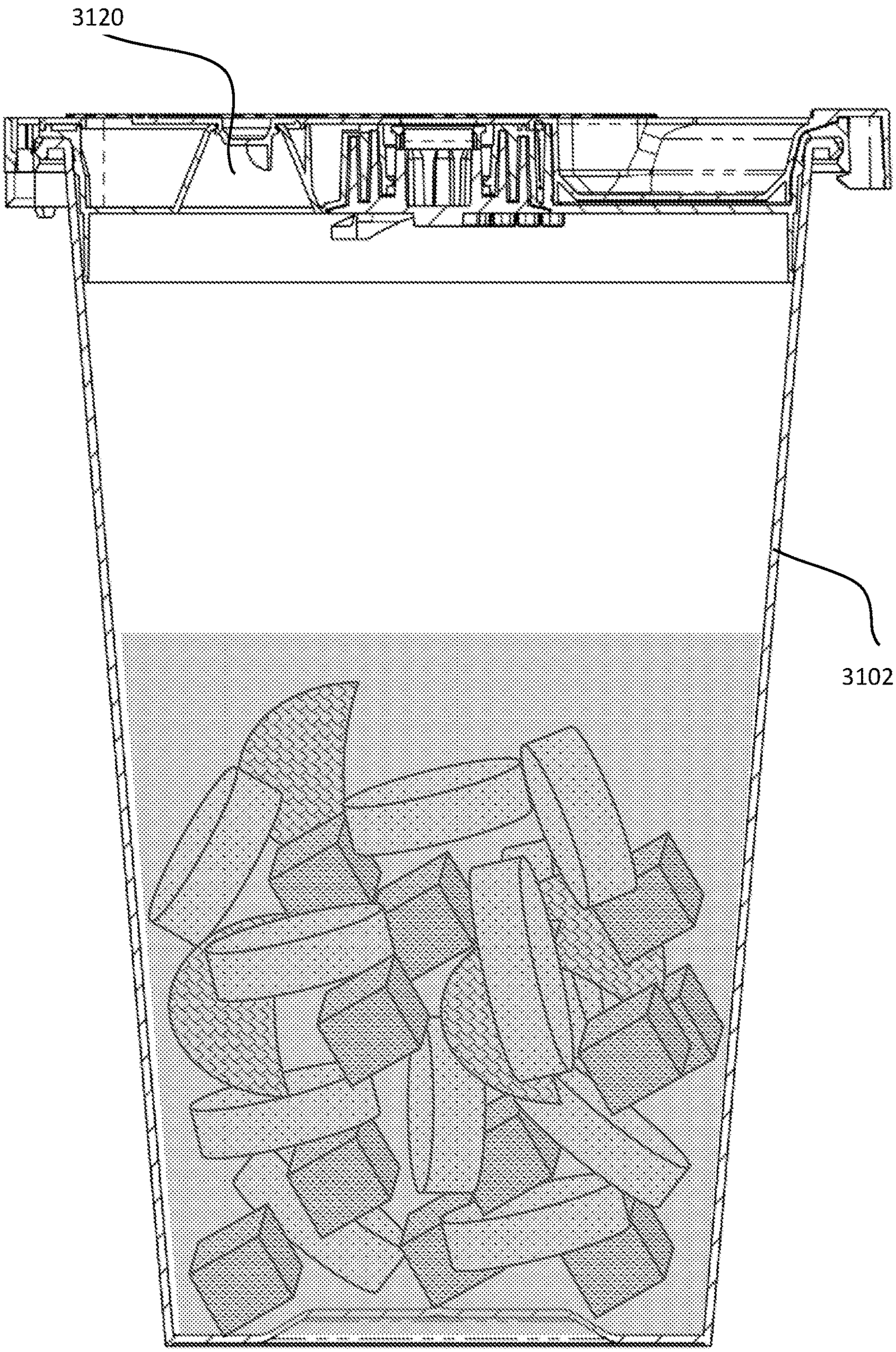

Reference is now made to FIGS. 96A and 96B, which are simplified respective planar side and sectional illustrations of SUPCA 3100 filled with a frozen or non-frozen food product, as well as liquid, ready for processing by the MMIDD 4300 of FIG. 68. It is seen SUCSERDREA 3120 is in its non-previously used indicating operative orientation shown in FIG. 92H, indicating that SUCSERDREA 3120 has not been disengaged from container body 3102 and has not been previously processed by an MMIDD 4300.

Figure 97A:
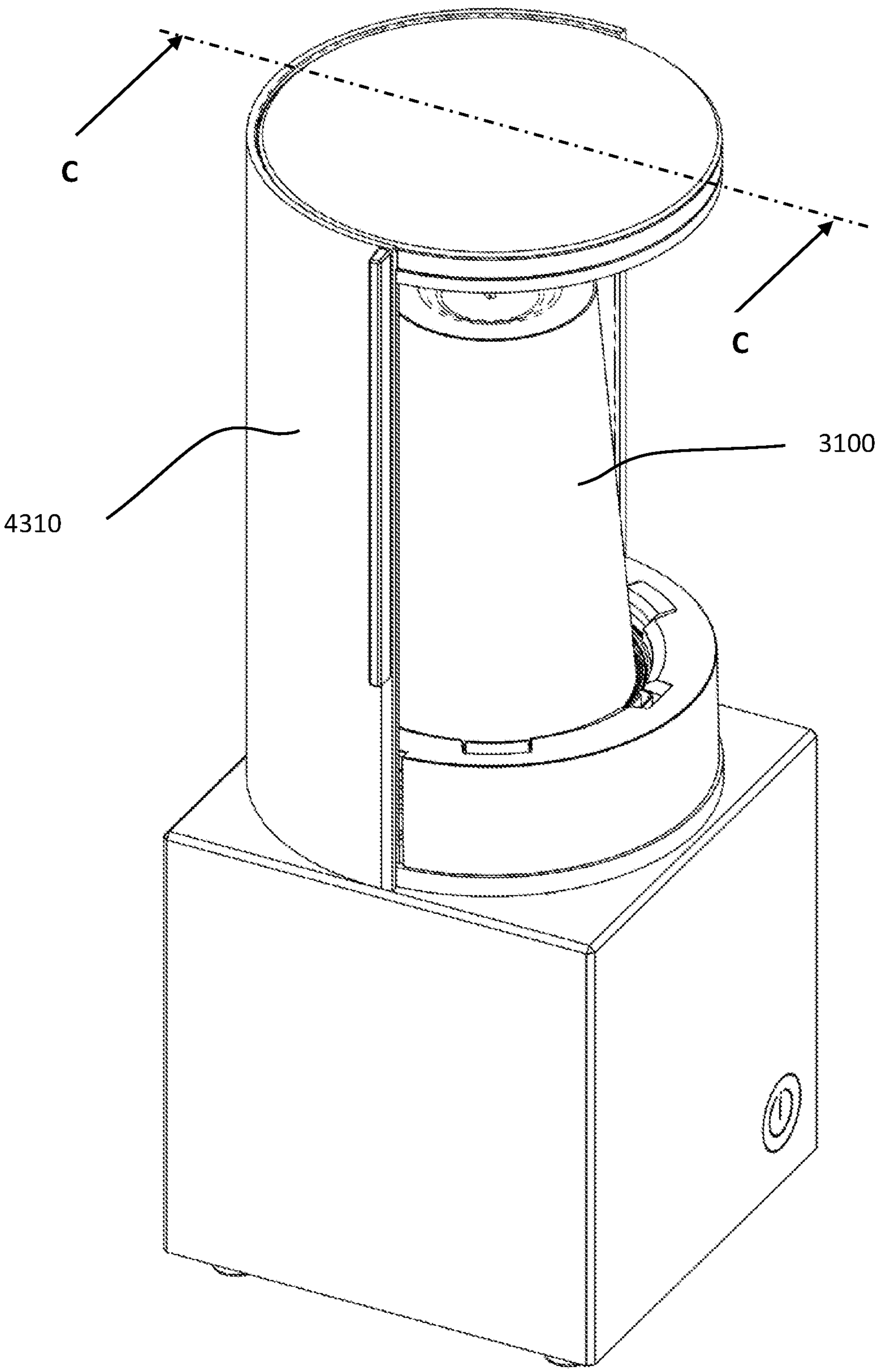
FIGS. 97A, 97B and 97C are simplified respective pictorial, planar side and sectional illustrations of the SUPCA of FIGS. 60A-60I, filled with a food product (not shown) in an upside-down unclamped orientation in typical initial operative engagement with the MMIDD of FIG. 68 with the door open, FIG. 97C being taken along lines C-C in FIG. 97A.
Figure 97B:
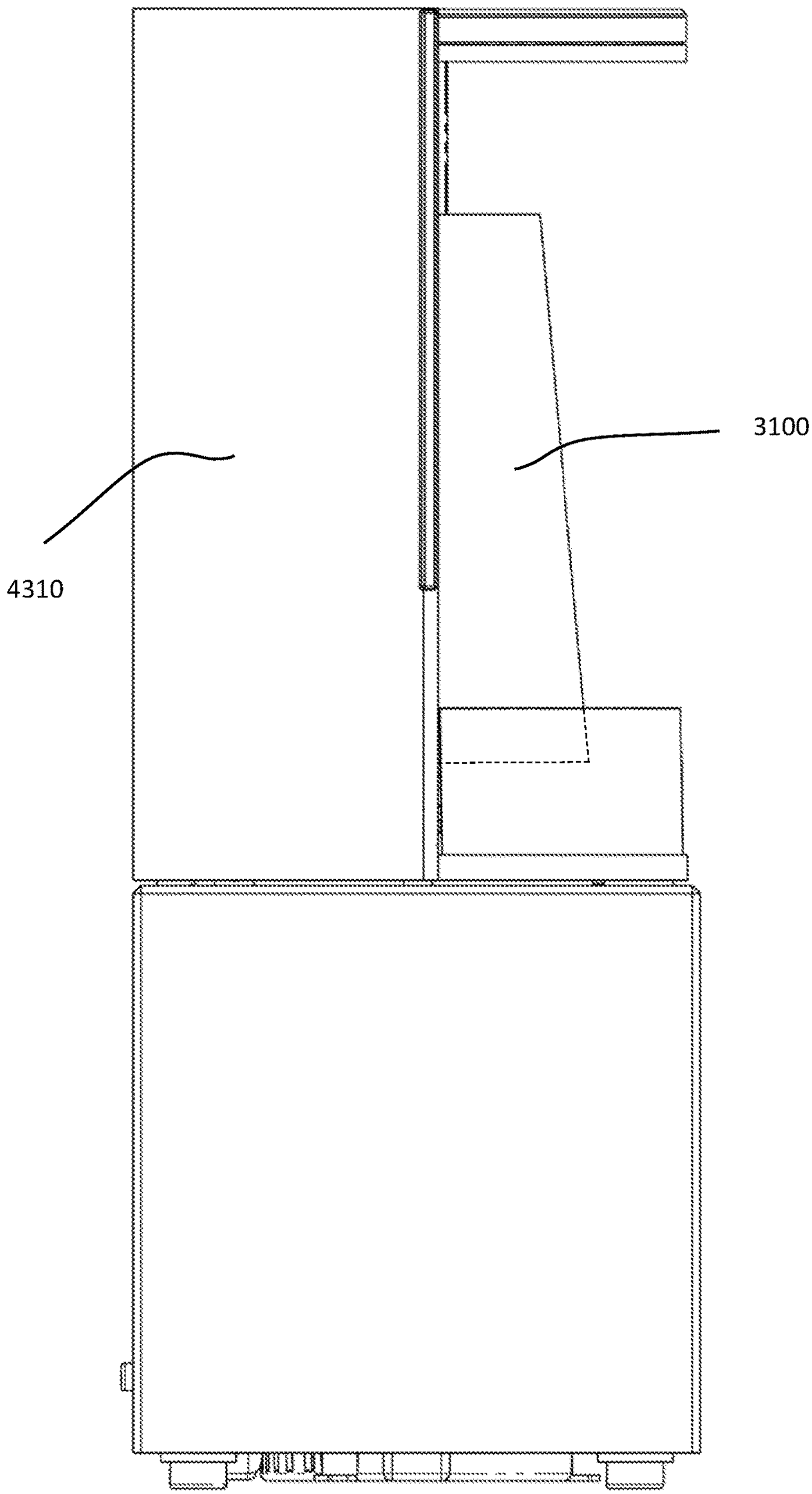
Figure 97C:
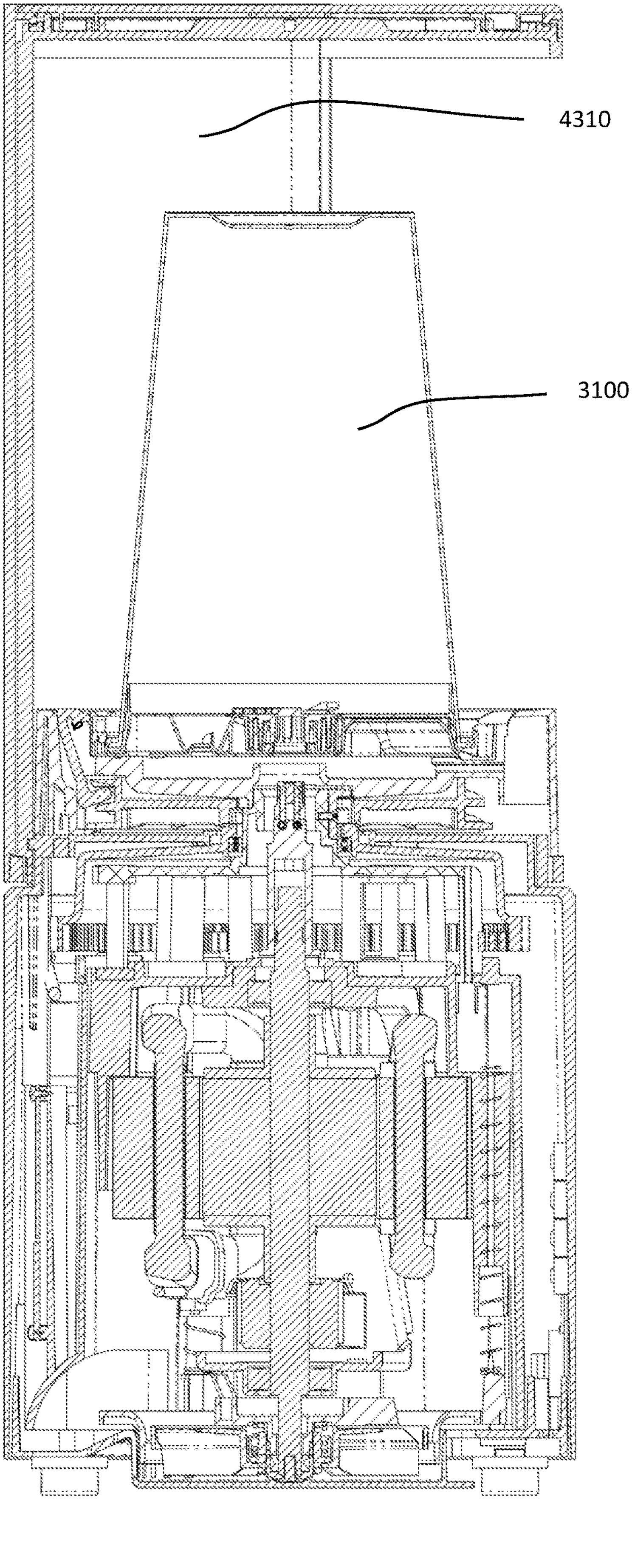

Reference is now made to FIGS. 97A, 97B and 97C, which are simplified respective pictorial, planar side and sectional illustrations of the SUPCA 3100 of FIGS. 60A-60I, filled with a food product (not shown) in an upside-down unclamped orientation in typical initial operative engagement with the MMIDD 4300 of FIG. 68 with the top housing assembly 4310 in a door-open operative orientation.

Figure 98:
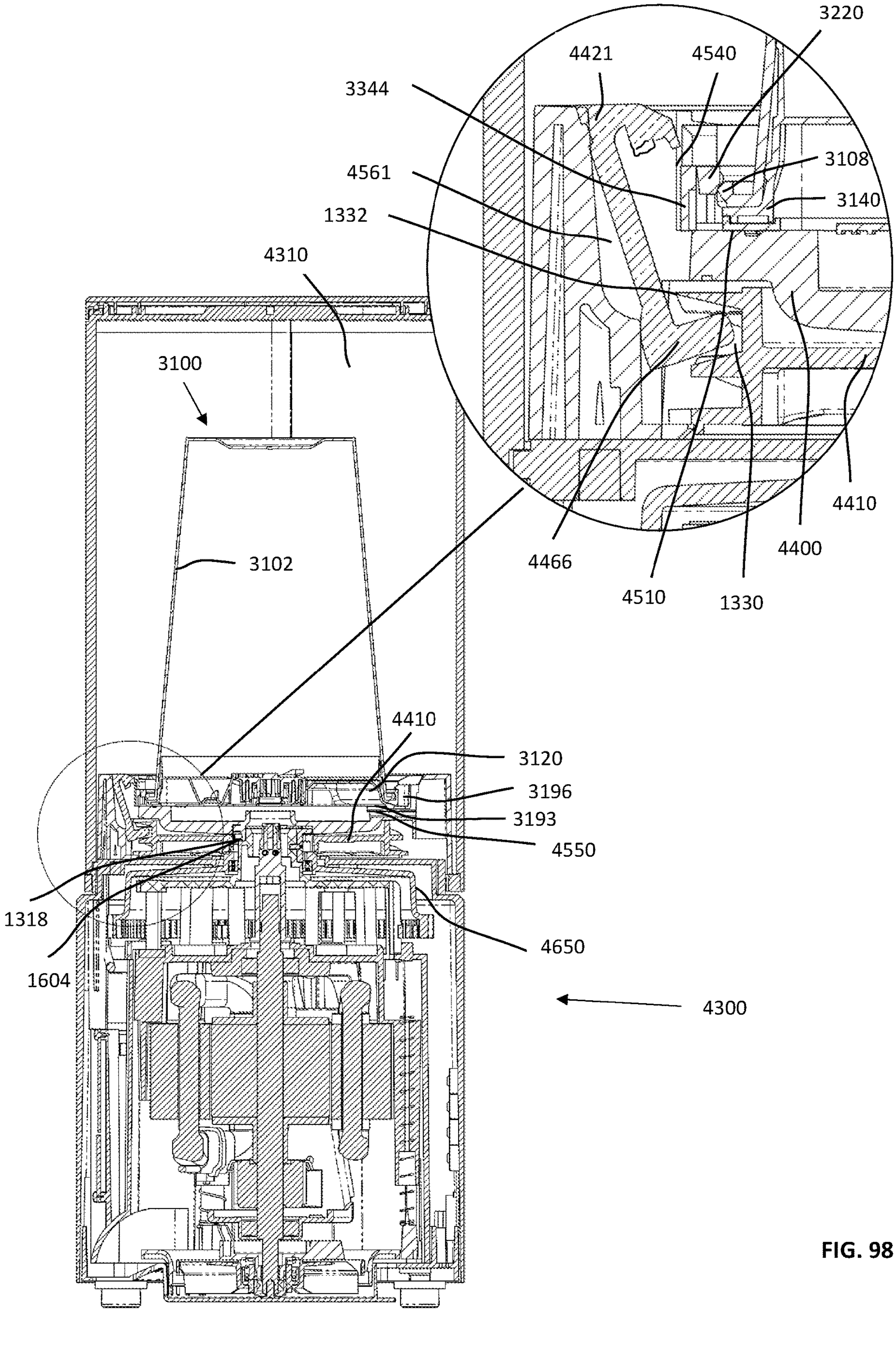
FIG. 98 is a simplified sectional illustration of the SUPCA of FIGS. 60A-60I in an upside-down unclamped orientation in operative engagement with the MMIDD of FIG. 68 with the door closed, FIG. 98 being taken along lines C-C in FIG. 97A.

Reference is now made to FIG. 98, which is a simplified sectional illustration of SUPCA 3100 of FIGS. 60A-60I in an upside-down unclamped orientation in operative engagement with MMIDD 4300 of FIG. 68 with the top housing assembly 4310 in a door-closed operative orientation. It is seen that SUCSERDREA 3120 is supported on annular planar container support surface 4510 and centered thereon by tapered wall 4540 of support element 4400. A predetermined azimuthal orientation of SUPCA 3100 on MMIDD 4300 is achieved by insertion of finger engagement portion 3196 of cover 3193 forming part of SUCSERDREA 3120, in SUPCA azimuthal locating channel 4550 of support element 4400.

As seen in FIG. 98, protrusions 1604 on rotary drive gear 4650 are seated in notches 1318 of cam element 4410 in order to transfer rotational motion of rotary drive gear 4650 to cam element 4410. The various elements of the MMIDD 4300 remain in their respective rest positions.

Clamp elements 4420 and 4421 are in a retracted operative orientation, each clamp being arranged with respect to cam element 4410 whereby respective cam engagement protrusions 4436 and 4466 thereof lie at a first location 1334 of a corresponding cam channel 1330, whereby the outward radial extent of the upper circumferential wall 1332 defining the cam channel 1330 is at a maximum, forcing the clamp elements 4420 and 4421 located in the cam channel 1330 at the first location 1134 radially outwardly in respective pockets 4560 and 4561. The enlargement shown in FIG. 98, illustrates clamp element 4421. This orientation of the clamp elements 4420 and 4421 enables the SUCSERDREA 3120 of SUPCA 3100 to clear the clamp elements 4420 and 4421 upon insertion of the SUPCA 3100 into engagement with MMIDD 4300.

It is also appreciated that in the operative orientation shown in FIG. 98, SUPCA 3100 is in an untampered and non-previously used operative orientation, wherein cantilevered generally elongate locking portion 3220 rests on circumferential rim 3108 of the single-use container body 3102 and is held in place by engagement thereof with transverse rib 3344 of lid 3140.

Figure 99:
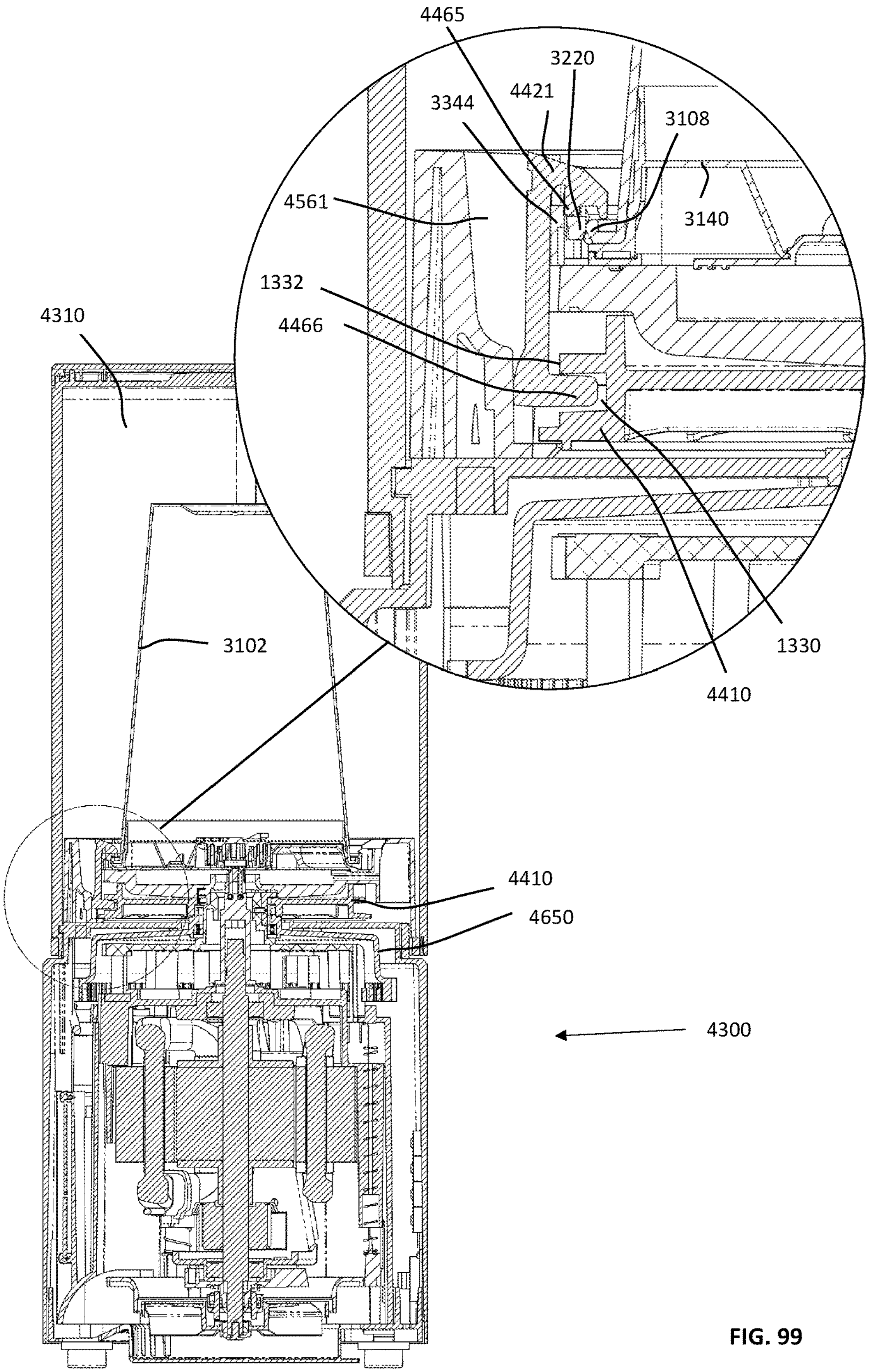
FIG. 99 is a simplified sectional illustration, corresponding to FIG. 98, but showing the SUPCA of FIGS. 60A-60I in upside-down partially clamped operative engagement with the MMIDD.

Reference is now made to FIG. 99, which is a simplified sectional illustration corresponding to FIG. 98 but showing SUPCA 3100 of FIGS. 60A-60I in an upside-down partially clamped orientation in operative engagement with MMIDD 4300 with the top housing assembly 4310 in a door-closed operative orientation.

The various elements of the MMIDD 4300 are in orientations intermediate those shown in FIGS. 91A and 91B. The outer drive shaft assembly is not yet in contact with SUPCA 3100.

As compared with the operative orientation shown in FIG. 98, cam element 4410 has been rotated from its orientation seen in FIG. 98 by rotary drive gear 4650 to an orientation wherein its outward radial extent is no longer at a maximum at the locations at which it engages the clamp elements 4420 and 4421.

It is seen that clamp elements 4420 and 4421 are no longer in a retracted operative orientation, each clamp being arranged with respect to cam element 4410 whereby respective cam engagement protrusions 4436 and 4466 thereof lie at an intermediate location between locations 1334 and 1336 of a corresponding cam channel 1330, whereby the outward radial extent of the upper circumferential wall 1332 defining the cam channel 1330 is no longer at a maximum, no longer forcing the clamp elements 4420 and 4421 located in the cam channel 1330 radially outwardly in respective pockets 4560 and 4561. The axial orientation of the cam channel 1330 at the locations of the clamp elements 4420 and 4421 is such that it forces the clamp elements radially inwardly. Clamp element 4421 is shown in the enlargement of FIG. 99.

As seen in the enlargement of FIG. 99, stepped protrusion 4465 of clamp element 4421 engages cantilevered generally elongate locking portion 3220 of the MTIRPE 3200.

It is also appreciated that in the operative orientation shown in FIG. 99, SUPCA 3100 is no longer in an untampered and non-previously used operative orientation. Cantilevered generally elongate locking portion 3220 no longer rests on circumferential rim 3108 of the single-use container body 3102 and is now located between circumferential rim 3108 and transverse rib 3344 of lid 3140. This reorientation involves deformation of cantilevered generally elongate locking portion 3220, circumferential rim 3108 of the single-use container body 3102 and transverse rib 3344 of lid 3140.

Figure 100:
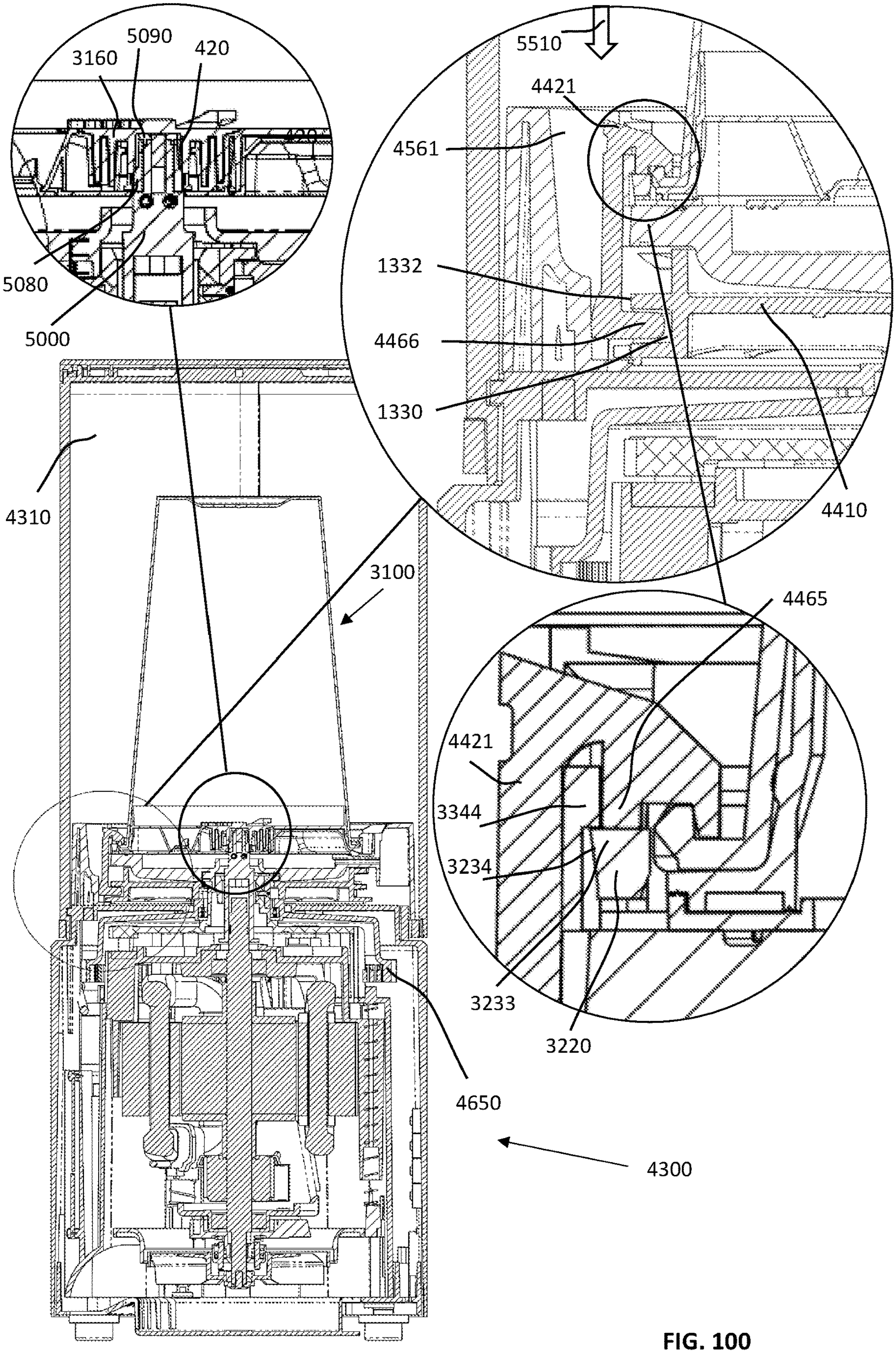
FIG. 100 is a simplified sectional illustration, corresponding to FIG. 99 but showing the SUPCA of FIGS. 60A-60I in upside-down fully clamped operative engagement with the MMIDD.

Reference is now made to FIG. 100, which is a simplified sectional illustration corresponding to FIG. 99 but showing SUPCA 3100 of FIGS. 60A-60I in an upside-down fully clamped orientation in operative engagement with MMIDD 4300 with the top housing assembly 4310 in a door-closed operative orientation.

The various elements of the MMIDD 4300 are in orientations intermediate those shown in FIGS. 91A and 91B. The outer drive shaft assembly is in full engagement with SUPCA 3100. In FIG. 100, it is seen that outer drive shaft assembly 4644 described hereinabove with reference to FIGS. 82-86 is shown. The grip element 5090 and the blade engagement portion 5080 of the outer drive shaft assembly 5000 are seen to be fully engaged with drive shaft seating recess 420 of blade 3160 of SUPCA 3100 of FIGS. 60A-60I.

As compared with the operative orientation shown in FIG. 99, cam element 4410 has been further rotated from its orientation seen in FIG. 99 by rotary drive gear 4650 to an orientation wherein its outward radial extent is no longer at a maximum at the locations at which it engages the clamp elements 4420 and 4421.

It is seen that clamp elements 4420 and 4421 are each arranged with respect to cam element 4410 whereby respective cam engagement protrusions 4436 and 4466 thereof lie at an intermediate location between locations 1334 and 1336 of a corresponding cam channel 1330, whereby the outward radial extent of the upper circumferential wall 1332 defining the cam channel 1330 is no longer at a maximum, no longer forcing the clamp elements 4420 and 4421 located in the cam channel 1330 radially outwardly in respective pockets 4560 and 4561. The axial orientation of the cam channel 1330 at the locations of the clamp elements 4420 and 4421 is such that it forces the clamp elements axially downwardly, as indicated by an arrow 5510. Clamp element 4421 is shown in the enlargement of FIG. 100.

As seen in the enlargement of FIG. 100, stepped protrusion 4465 of clamp element 4421 forces cantilevered generally elongate locking portion 3220 of the MTIRPE 3200 downward in a direction indicated by arrow 5510 to a location below transverse rib 3344. This partially relieves the deformations described hereinabove with reference to FIG. 99 and causes locking surface 3234 of tapered lid locking portion 3233 extending from cantilevered generally elongate locking portion 3220 of the MTIRPE 3200 to be locked in position below the transverse rib 3344.

Figure 101:
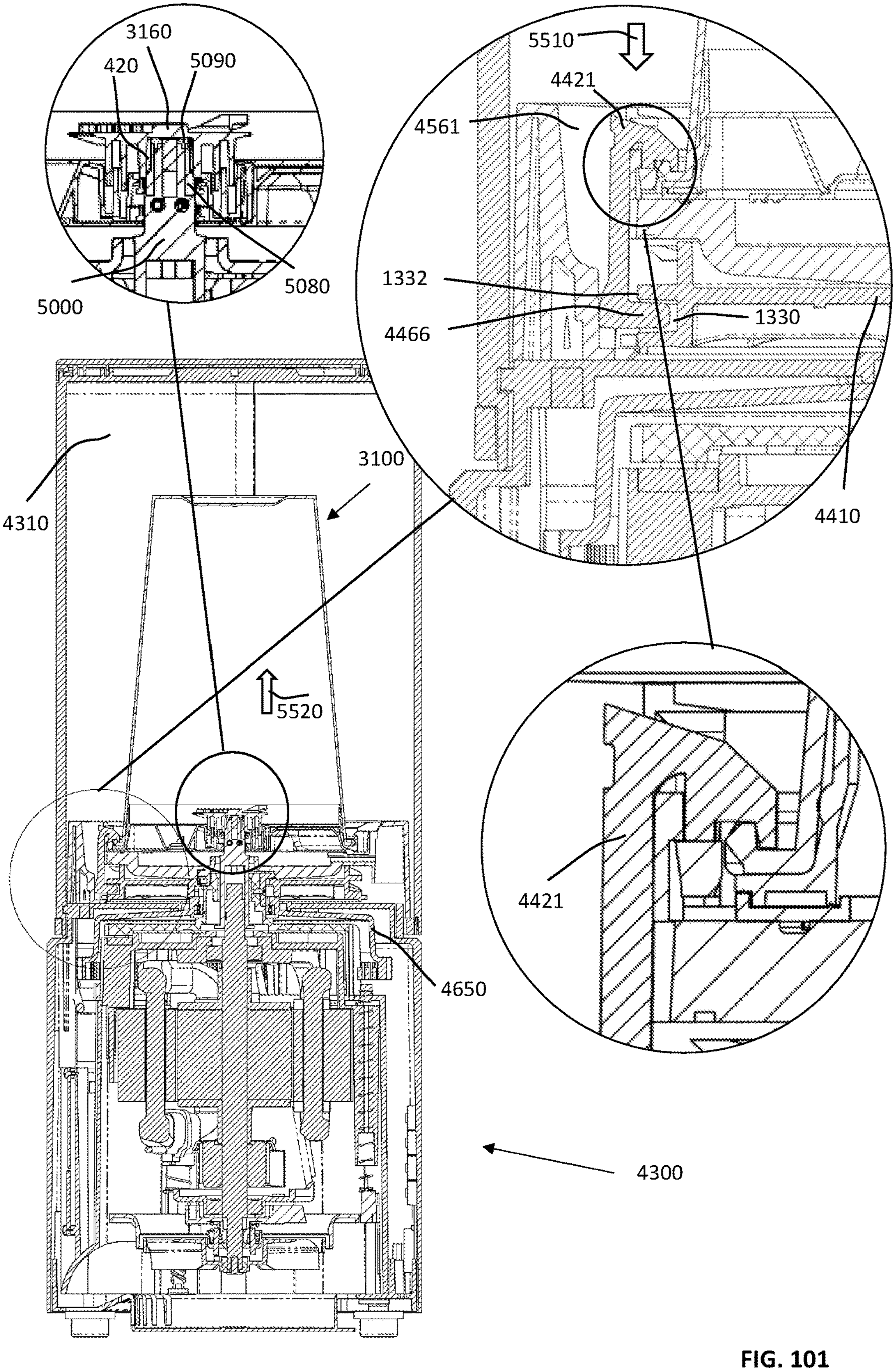
FIG. 101 is a simplified sectional illustration, corresponding to FIG. 100 but showing the SUPCA of FIGS. 60A-60I in operative engagement with the MMIDD wherein the blade of the SUPCA is extended and rotatable.

Reference is now made to FIG. 101, which is a simplified sectional illustration corresponding to FIG. 100 also showing SUPCA 3100 of FIGS. 60A-60I in an upside-down fully clamped orientation in operative engagement with MMIDD 4300 with the top housing assembly 4310 in a door-closed operative orientation. Here the blade 3160 is fully extended.

The various elements of the MMIDD 4300 are in orientations shown in FIG. 91C. The outer drive shaft assembly 4644 is in full engagement with SUPCA 3100. The grip element 5090 and the blade engagement portion 5080 of the outer drive shaft assembly 4644 are seen to be fully engaged with drive shaft seating recess 420 of blade 3160 of SUPCA 3100, which blade 3160 is extended in a direction indicated by an arrow 5520.

As compared with the operative orientation shown in FIG. 100, cam element 4410 has been still further rotated from its orientation seen in FIG. 100 by rotary drive gear 4650 to an orientation wherein its outward radial extent is still no longer at a maximum at the locations at which it engages the clamp elements 4420 and 4421.

It is seen that clamp elements 4420 and 4421 are each arranged with respect to cam element 4410 whereby respective cam engagement protrusions 4436 and 4466 thereof lie at locations 1336 of corresponding cam channel 1330, whereby the outward radial extent of the upper circumferential wall 1332 defining the cam channel 1330 is still no longer at a maximum, still no longer forcing the clamp elements 4420 and 4421 located in the cam channel 1330 radially outwardly in respective pockets 4560 and 4561. The axial orientation of the cam channel 1330 at the locations of the clamp elements 4420 and 4421 is still such that it forces the clamp elements axially downwardly, as indicated by arrow 5510. Clamp element 4421 is shown in the enlargement of FIG. 101.

Figure 102A:
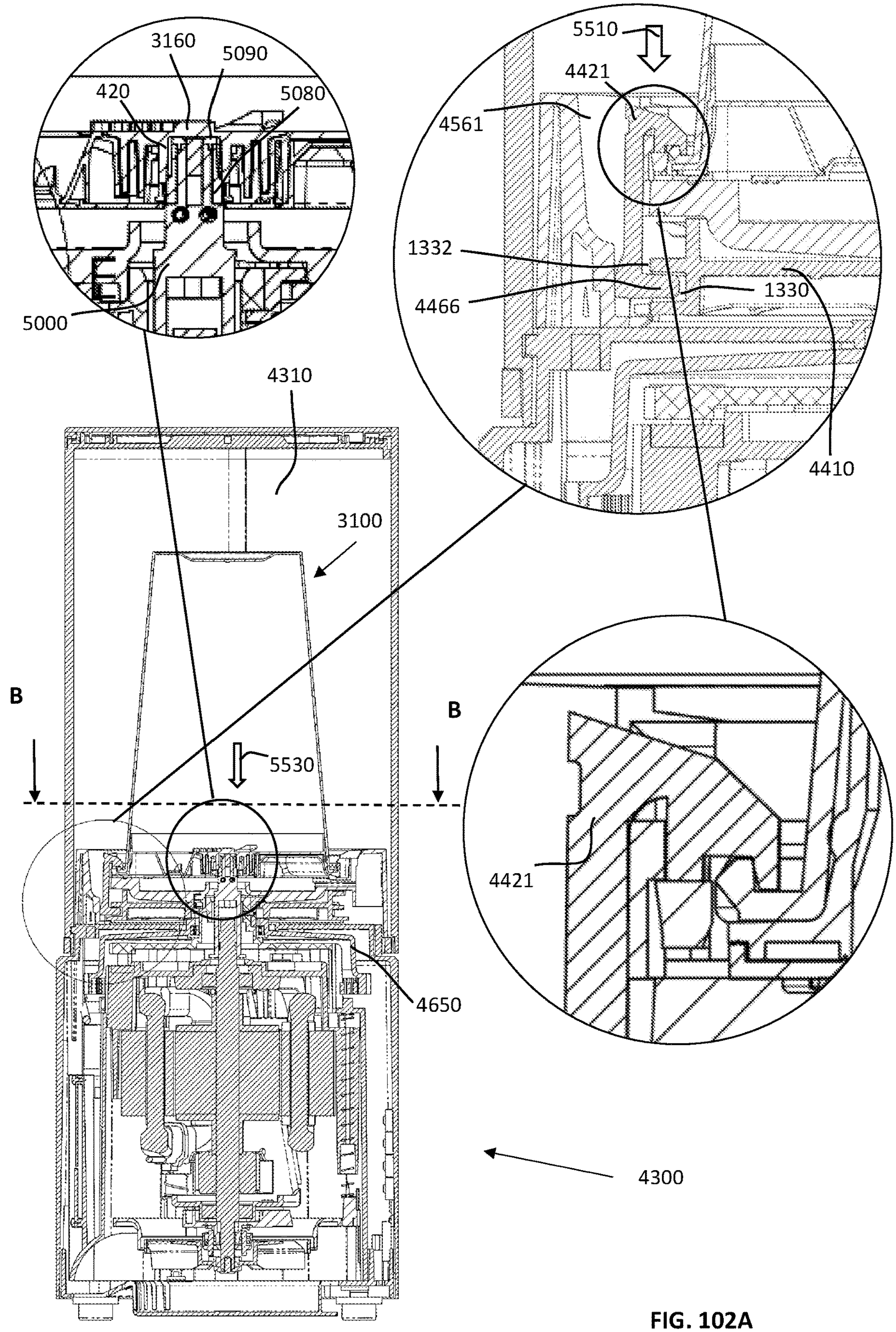
FIG. 102A is a simplified sectional illustration, corresponding to FIG. 101 but showing the SUPCA of FIGS. 60A-60I in operative engagement with the MMIDD wherein the blade of the SUPCA is retracted, after having been rotated to be aligned with the blade receiving recess.
Figure 102B:
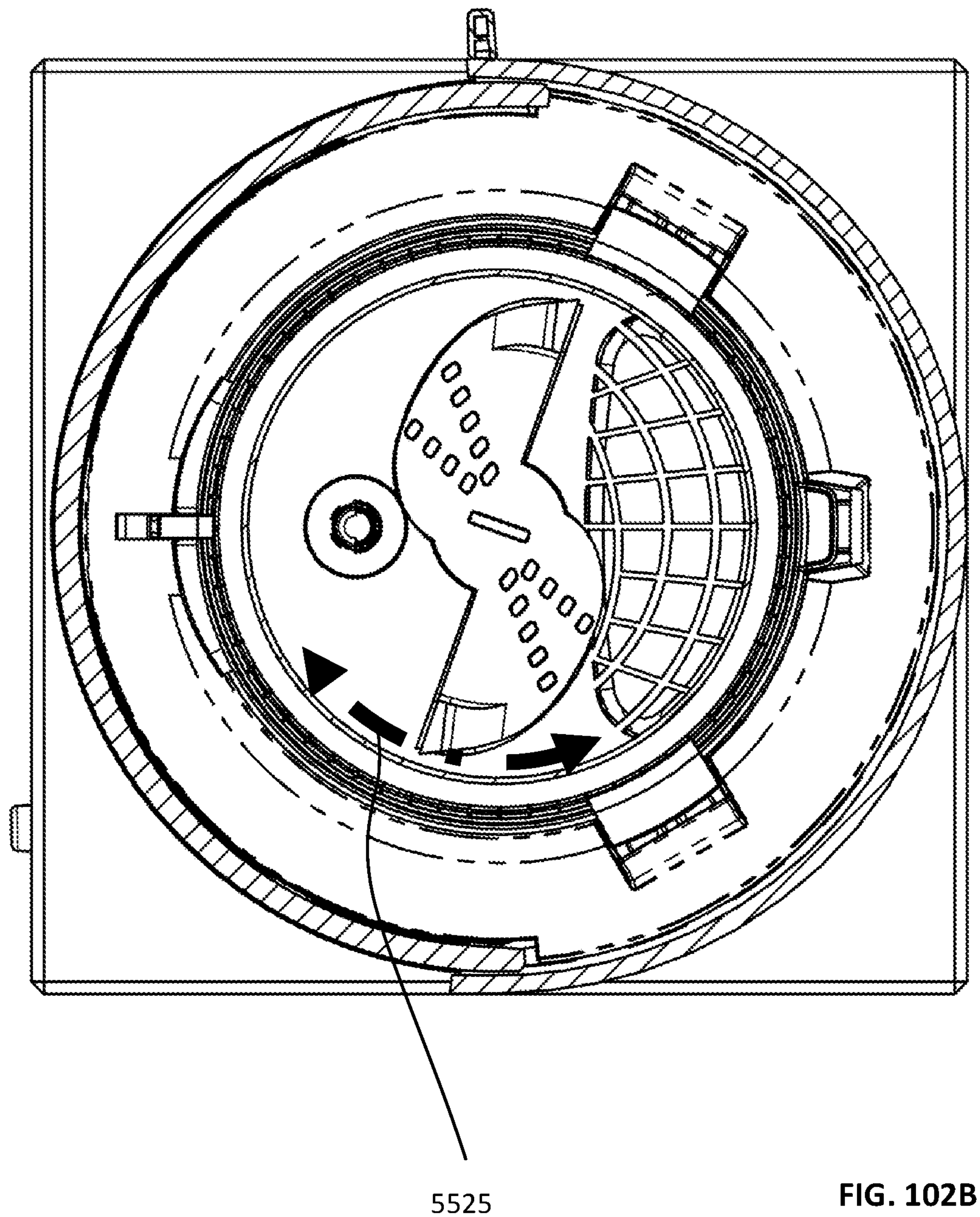
FIG. 102B is a simplified sectional illustration, taken along lines B-B in FIG. 102A wherein the blade of the SUPCA is aligned with the blade receiving recess.

Reference is now made to FIGS. 102A and 102B, which are simplified first and second sectional illustrations, wherein FIG. 102A corresponds to FIG. 101 and also shows SUPCA 3100 in an upside-down fully clamped orientation in operative engagement with MMIDD 4300 with the top housing assembly 4310 in a door-closed operative orientation. At this stage, rotary operation of the blade 3160 is complete and blade 3160 has been rotated to overlie the blade receiving recess 3510 and is fully recessed therein. FIG. 102B shows an arbitrary azimuth orientation of the blade 3160 relative to blade receiving recess 3510 prior to this rotation. The rotation, which may be in either a clockwise or counterclockwise direction, as indicated by an arrow 5525, is produced by mechanical interaction of teeth 5434 of motor lifting element 4710 and teeth 2444 of linearly driven rotating ventilating element 4716, similar to that described hereinabove with reference to FIGS. 40A-40G, depending on the precise azimuthal location of blade 3160 prior to rotation, as shown generally in FIG. 102B.

The various elements of the MMIDD 4300 are in orientations which are intermediate between the orientations shown in FIGS. 91A and 91B. Outer drive shaft assembly 4644 is in full engagement with SUPCA 3100. The grip element 5090 and the blade engagement portion 5080 of the outer drive shaft assembly 4644 are seen to be fully engaged with drive shaft seating recess 420 of blade 3160 of SUPCA 3100 of FIGS. 60A-60I, which blade 3160 is retracted in a direction indicated by an arrow 5530.

As compared with the operative orientation shown in FIG. 101, cam element 4410 has been rotated, in an opposite direction from its orientation seen in FIG. 101, to its orientation seen in FIG. 100, by rotary drive gear 4650, wherein its outward radial extent is still no longer at a maximum at the locations at which it engages the clamp elements 4420 and 4421.

It is seen that clamp elements 4420 and 4421 are each arranged with respect to cam element 4410 whereby respective cam engagement protrusions 4436 and 4466 thereof lie at locations 1336 of corresponding cam channel 1330, whereby the outward radial extent of the upper circumferential wall 1332 defining the cam channel 1330 is still no longer at a maximum, still no longer forcing the clamp elements 4420 and 4421 located in the cam channel 1330 radially outwardly in respective pockets 4560 and 4561. The axial orientation of the cam channel 1330 at the locations of the clamp elements 4420 and 4421 is still such that it forces the clamp elements axially downwardly, as indicated by arrow 5510. Clamp element 4421 is shown in the enlargement of FIG. 102A.

Figure 103:
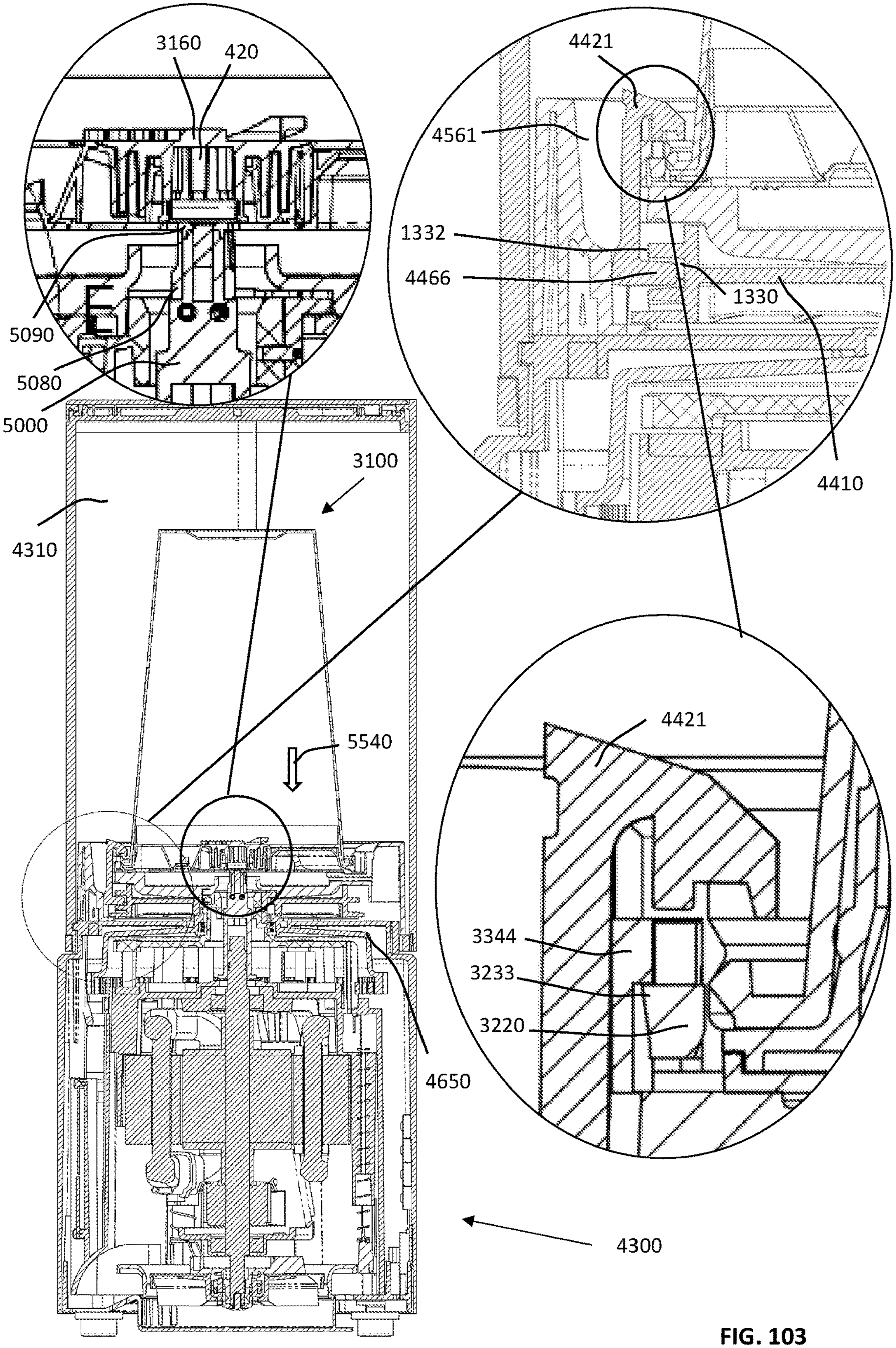
FIG. 103 is a simplified sectional illustration, corresponding to FIG. 102A but showing the SUPCA in upside-down partially clamped operative engagement with the MMIDD.

Reference is now made to FIG. 103, which is a simplified sectional illustration corresponding to FIG. 102A but showing SUPCA 3100 of FIGS. 60A-60I in an upside-down partially clamped orientation in operative engagement with MMIDD 4300 with the top housing assembly 4310 in a door-closed operative orientation. At this stage, the blade 3160 is fully recessed in the blade receiving recess 3510.

The various elements of MMIDD 4300 are in orientations which are intermediate between the orientations shown in FIGS. 91A and 91B. Outer drive shaft assembly 4644 is no longer in full engagement with SUPCA 3100 of FIGS. 60A-60I. The grip element 5090 and the blade engagement portion 5080 of outer drive shaft assembly 4644 are seen as being disengaged with drive shaft seating recess 420 of blade 3160 of SUPCA 3100 of FIGS. 60A-60I, as indicated by an arrow 5540.

As compared with the operative orientation shown in FIG. 102A, cam element 4410 has been further rotated, in an opposite direction from its orientation seen in FIG. 102A, to its orientation seen in FIG. 99, by rotary drive gear 4650 wherein its outward radial extent is not yet at a maximum at the locations at which it engages the clamp elements 4420 and 4421.

It is seen that clamp elements 4420 and 4421 are each arranged with respect to cam element 4410 whereby respective cam engagement protrusions 4436 and 4466 thereof lie at locations 1336 of corresponding cam channel 1330, whereby the outward radial extent of the upper circumferential wall 1332 defining the cam channel 1330 is not yet at a maximum, not yet forcing the clamp elements 4420 and 4421 located in the cam channel 1330 radially outwardly in respective pockets 4560 and 4561. The axial orientation of the cam channel 1330 at the locations of the clamp elements 4420 and 4421 is no longer such that it forces the clamp elements axially downwardly. Clamp element 4421 is shown in the enlargement of FIG. 103.

It is appreciated that in the operative orientation of FIG. 103, tapered lid locking portion 3233, extending from cantilevered generally elongate locking portion 3220, is retained in its locked position by transverse rib 3344.

Figure 104:
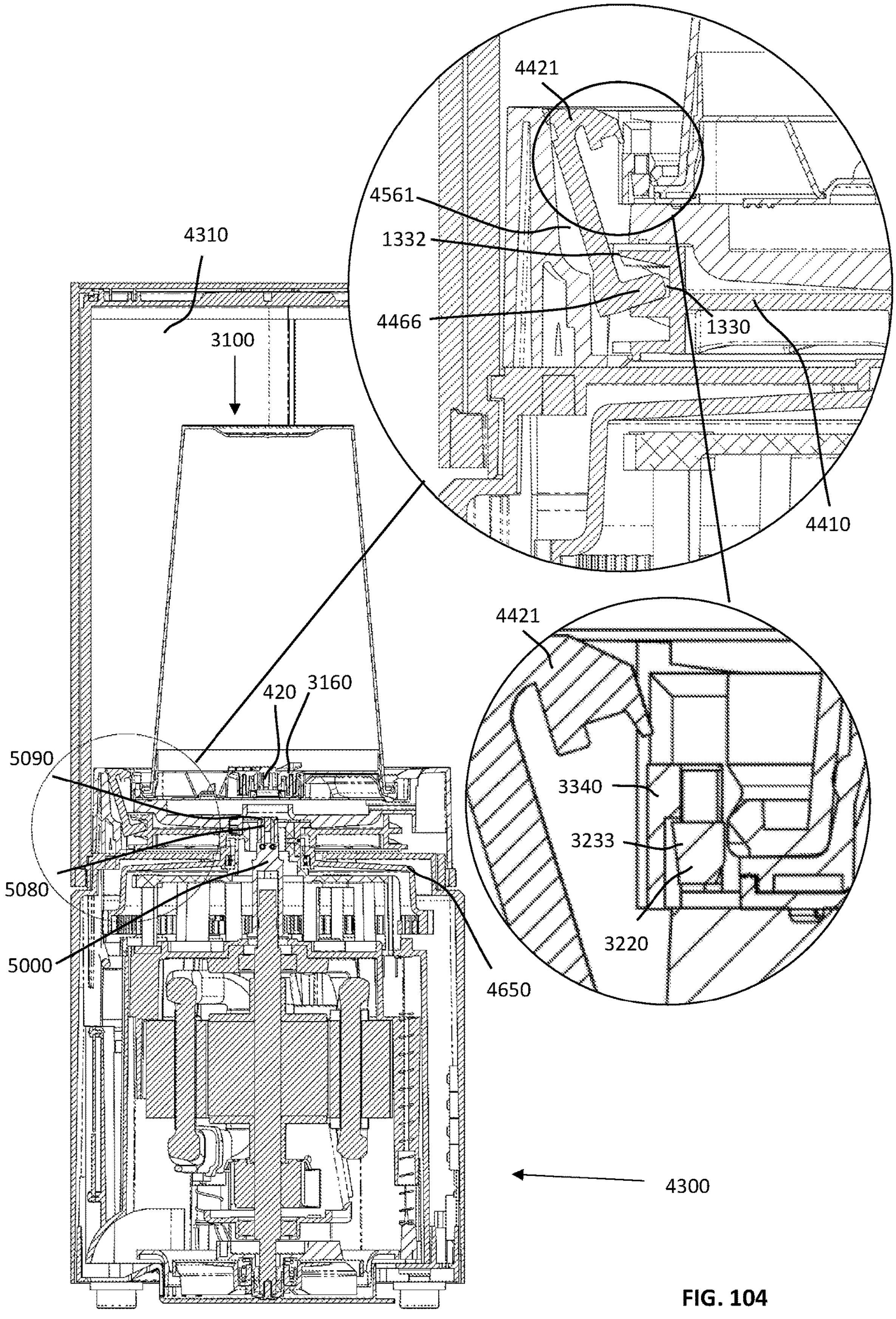
FIG. 104 is a simplified sectional illustration, corresponding to FIG. 103 but showing the SUPCA in upside-down unclamped operative engagement with the MMIDD with the door open.

Reference is now made to FIG. 104, which is a simplified sectional illustration corresponding to FIG. 103, but showing SUPCA 3100 of FIGS. 60A-60I in an upside-down unclamped orientation in operative engagement with MMIDD 4300 with the top housing assembly 4310 in a door-open operative orientation. At this stage, the blade 3160 is fully recessed in the blade receiving recess 3510.

The various elements of the MMIDD 4300 are in orientations which are shown in FIG. 91A. The outer drive shaft assembly 4644 is no longer in engagement with the SUPCA 3100 of FIGS. 60A-60I. The grip element 5090 and the blade engagement portion 5080 of the outer drive shaft assembly 4644 are seen as being fully disengaged with drive shaft seating recess 420 of blade 3160 of SUPCA 3100 of FIGS. 60A-60I.

As compared with the operative orientation shown in FIG. 103, cam element 4410 has been still further rotated, in an opposite direction from its orientation seen in FIG. 103, to its orientation seen in FIG. 98, by rotary drive gear 4650, wherein its outward radial extent is at a maximum at the locations at which it engages the clamp elements 4420 and 4421.

It is seen that clamp elements 4420 and 4421 are each arranged with respect to cam element 4410 whereby respective cam engagement protrusions 4436 and 4466 thereof lie at locations 1334 of corresponding cam channel 1330, whereby the outward radial extent of the upper circumferential wall 1332 defining the cam channel 1330 is at a maximum, forcing the clamp elements 4420 and 4421 located in the cam channel 1330 radially outwardly in respective pockets 4560 and 4561. The axial orientation of the cam channel 1330 at the locations of the clamp elements 4420 and 4421 is no longer such that it forces the clamp elements axially downwardly. Clamp element 4421 is shown in the enlargement of FIG. 104.

It is appreciated that in the operative orientation of FIG. 104, tapered lid locking portion 3233, extending from cantilevered generally elongate locking portion 3220, is retained in its locked position by transverse rib 3344.

Reference is now made to FIG. 105, which is a simplified sectional illustration, corresponding to FIG. 104 but showing SUPCA 3100 in an upside-down orientation, removed from operative engagement with MMIDD 4300. It is a particular feature of SUPCA 3100 in the operative orientation shown in FIG. 105 that SUCSERDREA 3120 is in its human and machine sensible tamper-evidencing and re-use preventing fluid sealing engagement orientation as shown in FIGS. 59A-59I.

Figure 106A:
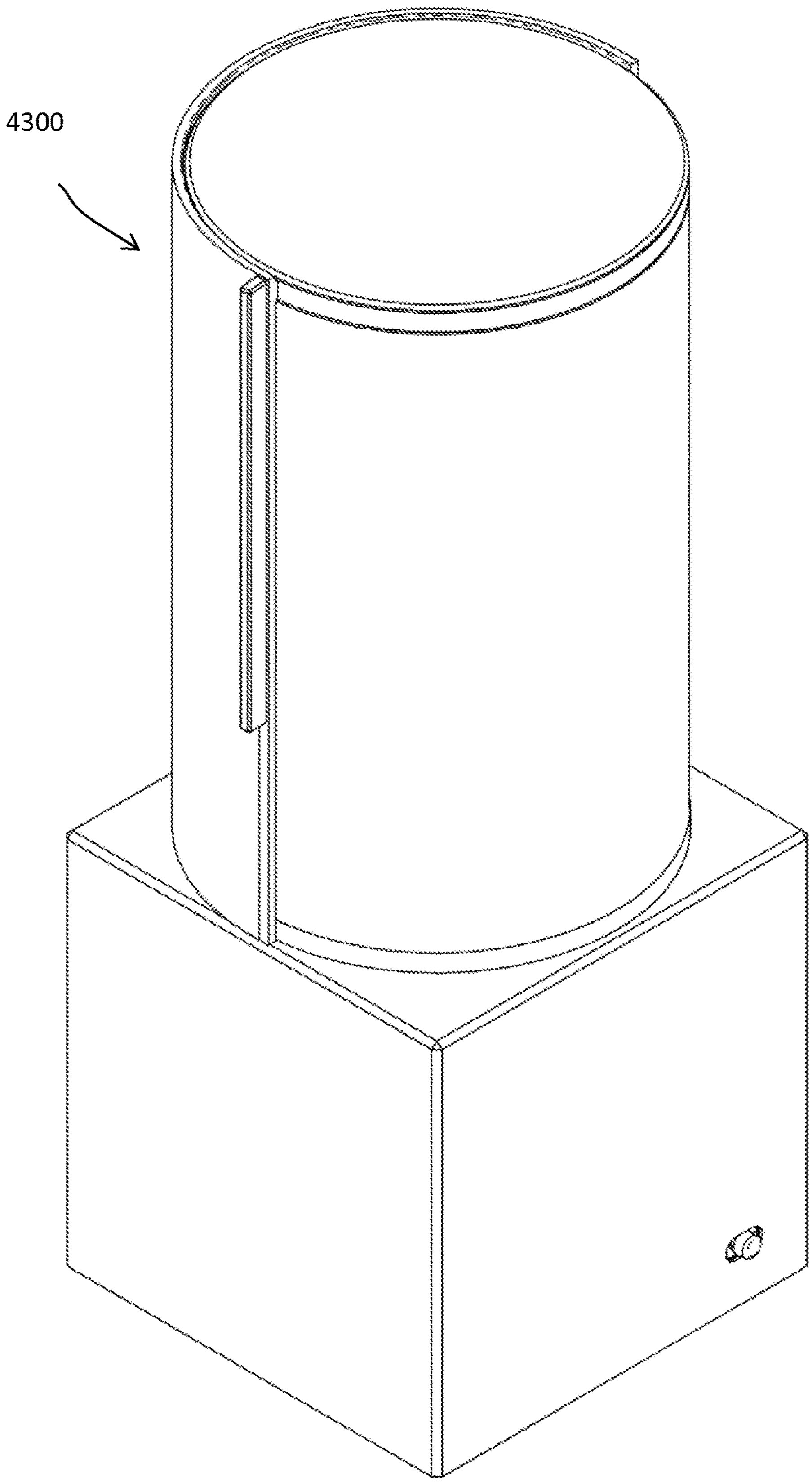
FIGS. 106A and 106B are respective simplified rear-facing pictorial and exploded view illustrations of the MMIDD of FIG. 68 and the SUPCA of FIGS. 60A-60I shown in FIGS. 97A-105.
Figure 106B:
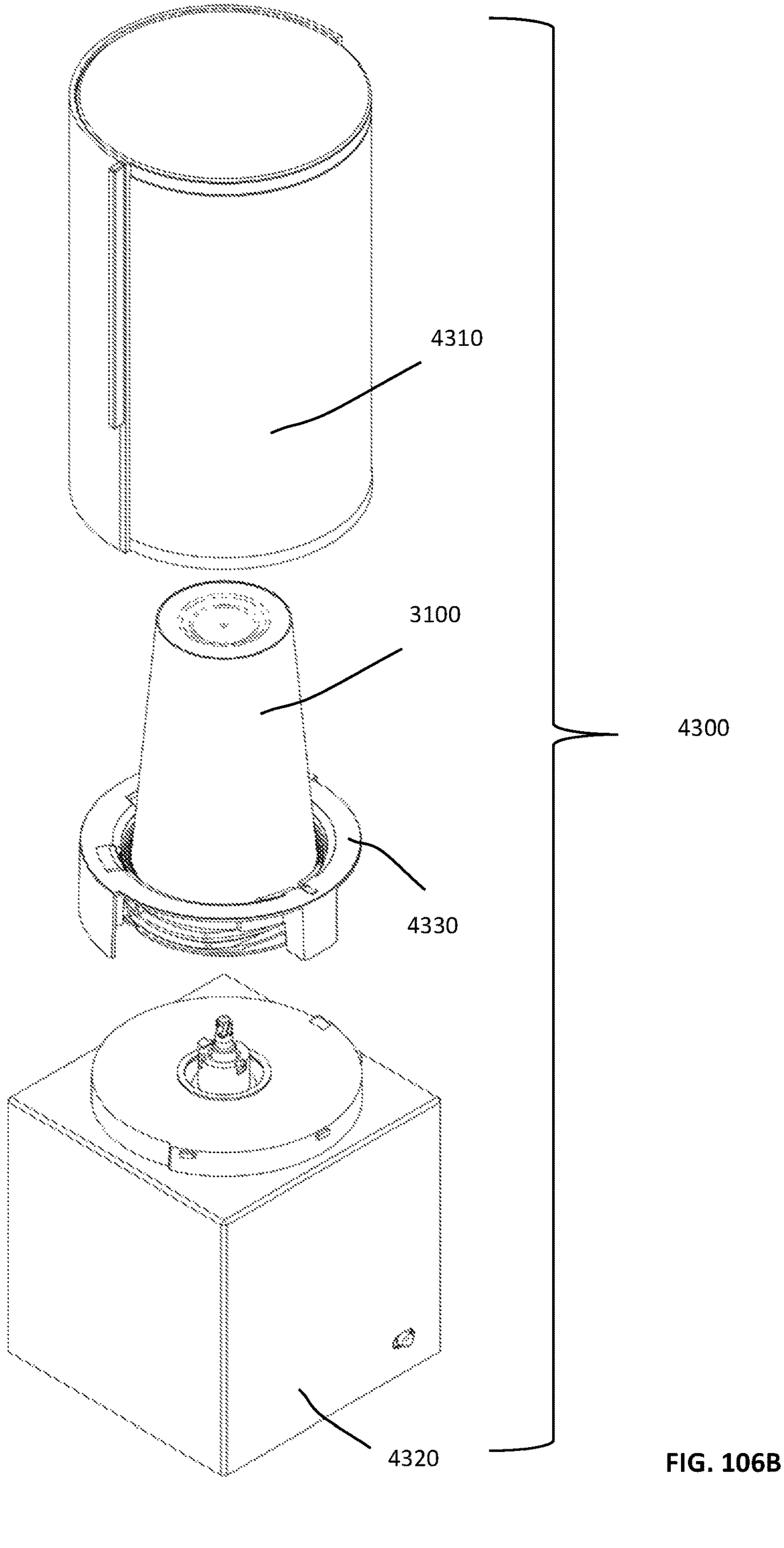
Figure 107A:
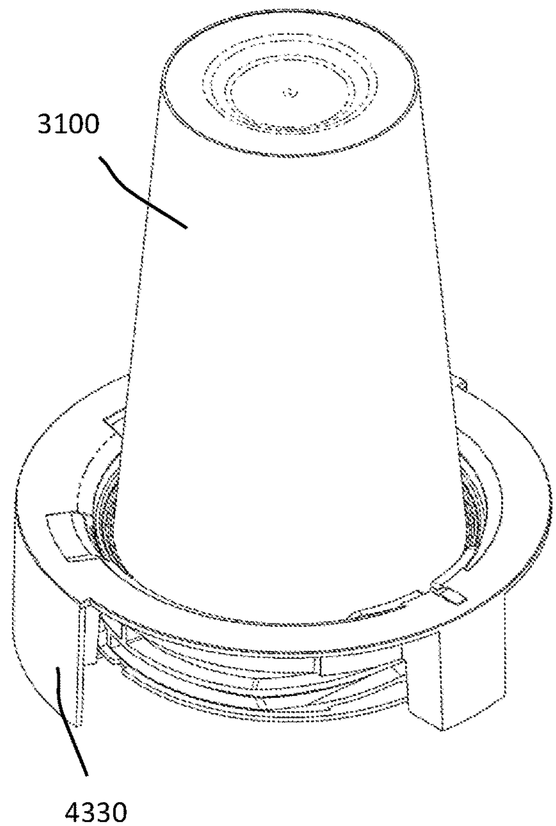
FIGS. 107A, 107B, 107C and 107D are respective simplified pictorial, exploded, partially cut-away exploded and planar side view exploded illustrations of the SUPCA of FIGS. 60A-60I and the SUPCASCA of FIGS. 69A-69E of the MMIDD of FIG. 68, shown in FIGS. 97A-105.
Figure 107B:
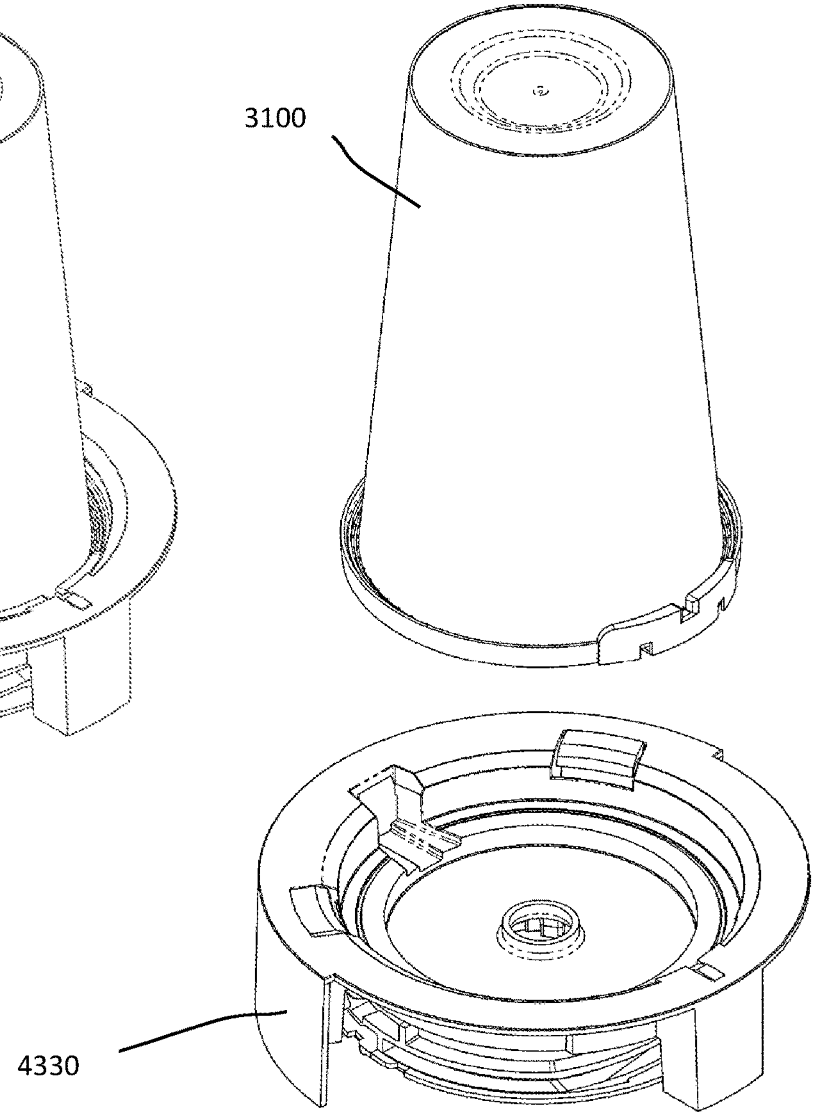
Figure 107C:
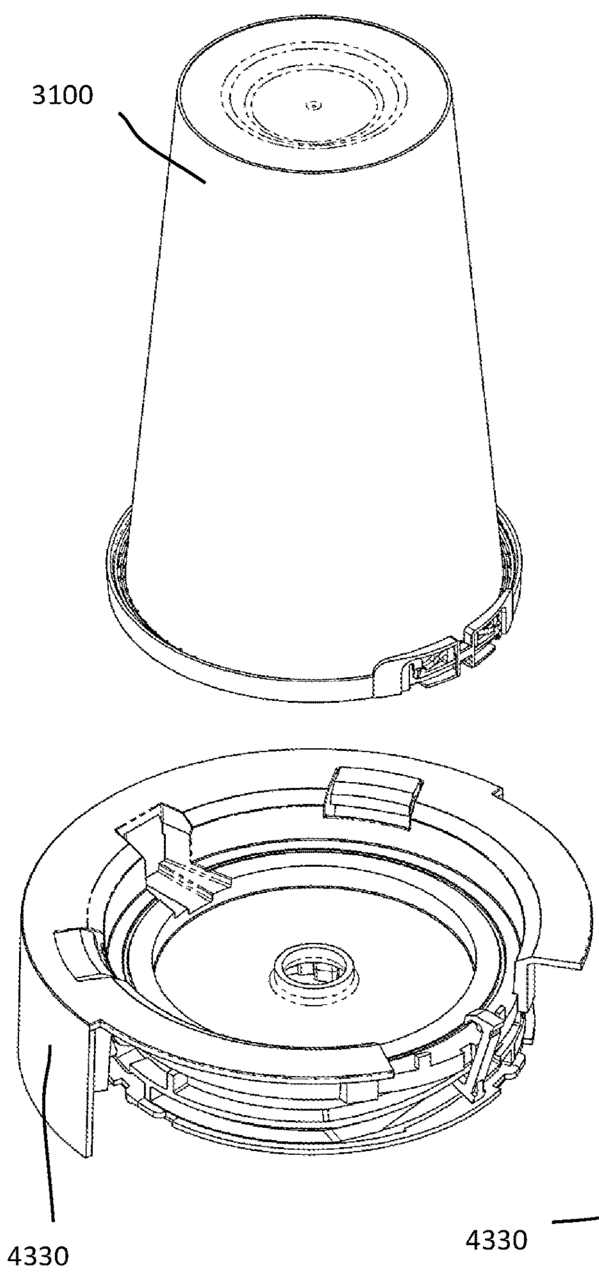
Figure 107D:
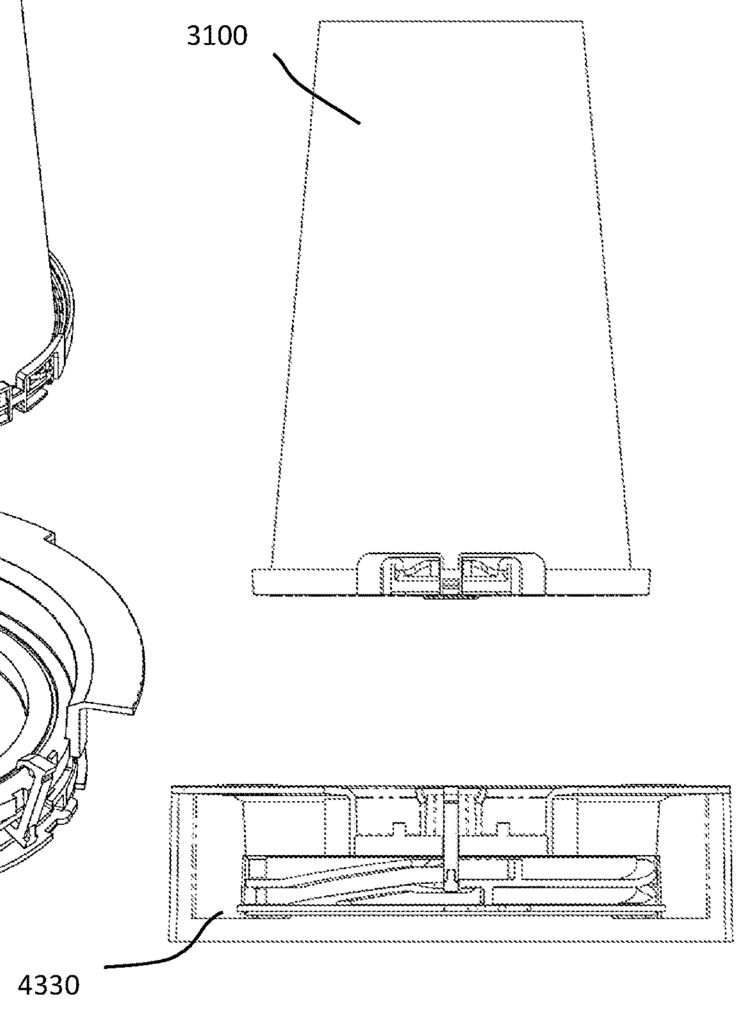

Reference is now made to FIGS. 106A and 106B, which are respective simplified rear-facing pictorial and exploded view illustrations of MMIDD 4300 of FIG. 68, including as SUPCASCA 4330 of FIGS. 69A-69E, and as SUPCA 3100. The elements of MMIDD 4300 are identified by the same reference numerals which appear in FIG. 68. In FIG. 106B, SUPCA 3100 is shown seated on SUPCASCA 4330.

Reference is now made to FIGS. 107A, 107B, 107C and 107D, which are respective simplified pictorial, exploded, partially cut-away exploded and planar side view exploded illustrations of SUPCA 3100 seated on SUPCASCA 4330 but not yet clamped thereto.

In the section that follows, which makes reference to FIGS. 108A-114C, activation of the human and machine sensible tamper-evidencing and re-use prevention functionality of SUPCA 3100, by clamping of SUPCA 3100 by SUPCASCA 4330, of MMIDD 4300 of FIG. 68, and subsequent unclamping and disengagement of SUPCA 3100 from MMIDD 4300 is described. It is appreciated that the human and machine sensible tamper-evidencing and re-use prevention functionality of SUPCA 3100 may also be included in SUPCAs 100, 4100 and 4200 by including MTIRPE 3200 of FIGS. 62A-62E on a cover thereof and MTIRPERP 3320 of FIGS. 63A-63E on a lid thereof.

Reference is now made to FIGS. 108A, 108B, 108C and 108D, which are simplified pictorial, partially cut-away pictorial, partially cut away side view and sectional view illustrations of SUPCACASCA 4330 of MMIDD 4300 prior to engagement of SUPCA 3100 therewith. FIGS. 108A-108D illustrate a stage prior to clamping and human and machine sensible tamper-evidencing and re-use preventing fluid sealing engagement of SUPCA 3100 with SUPCASCA 4330.

Figure 108A:
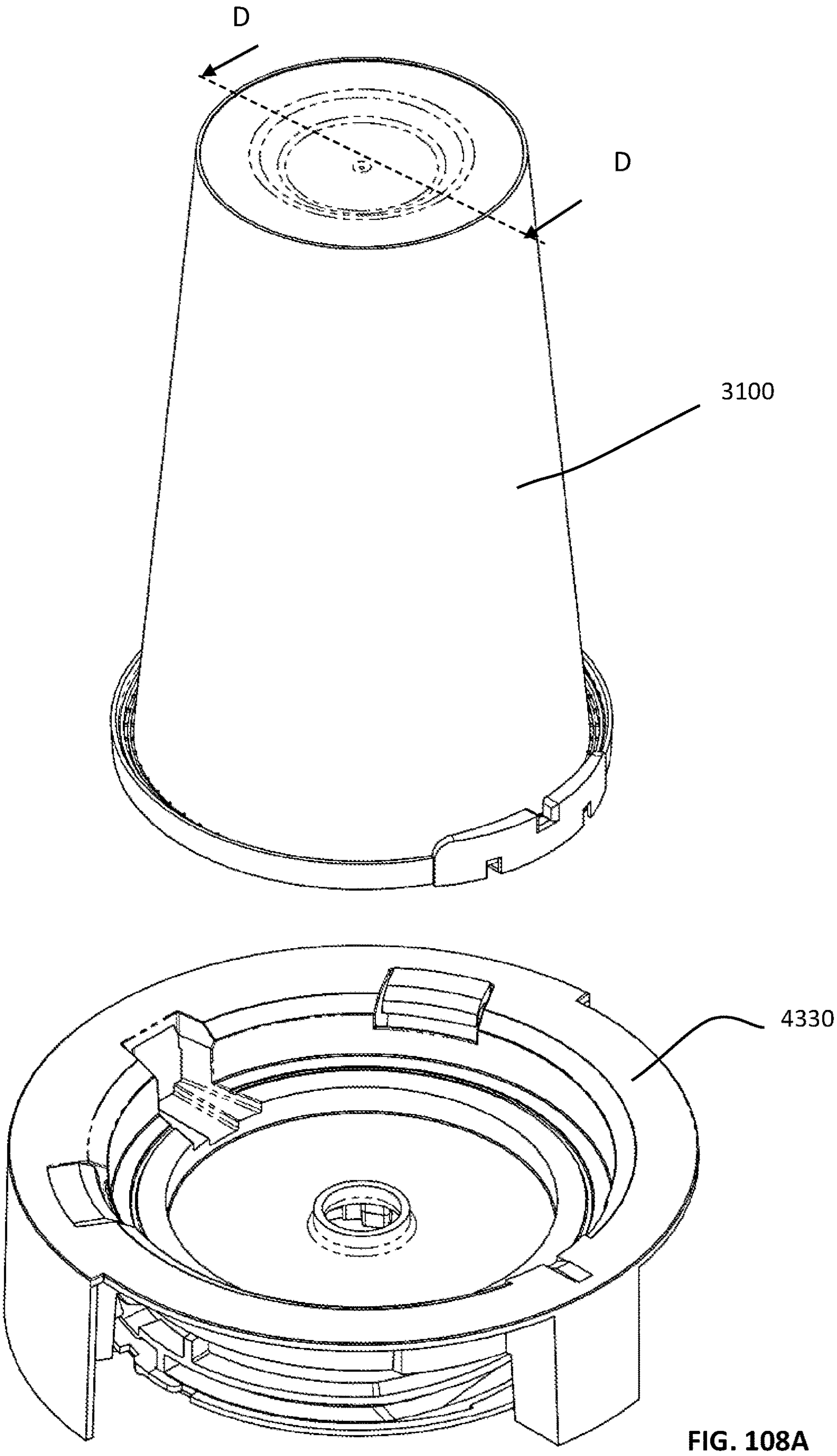
Figure 108B:
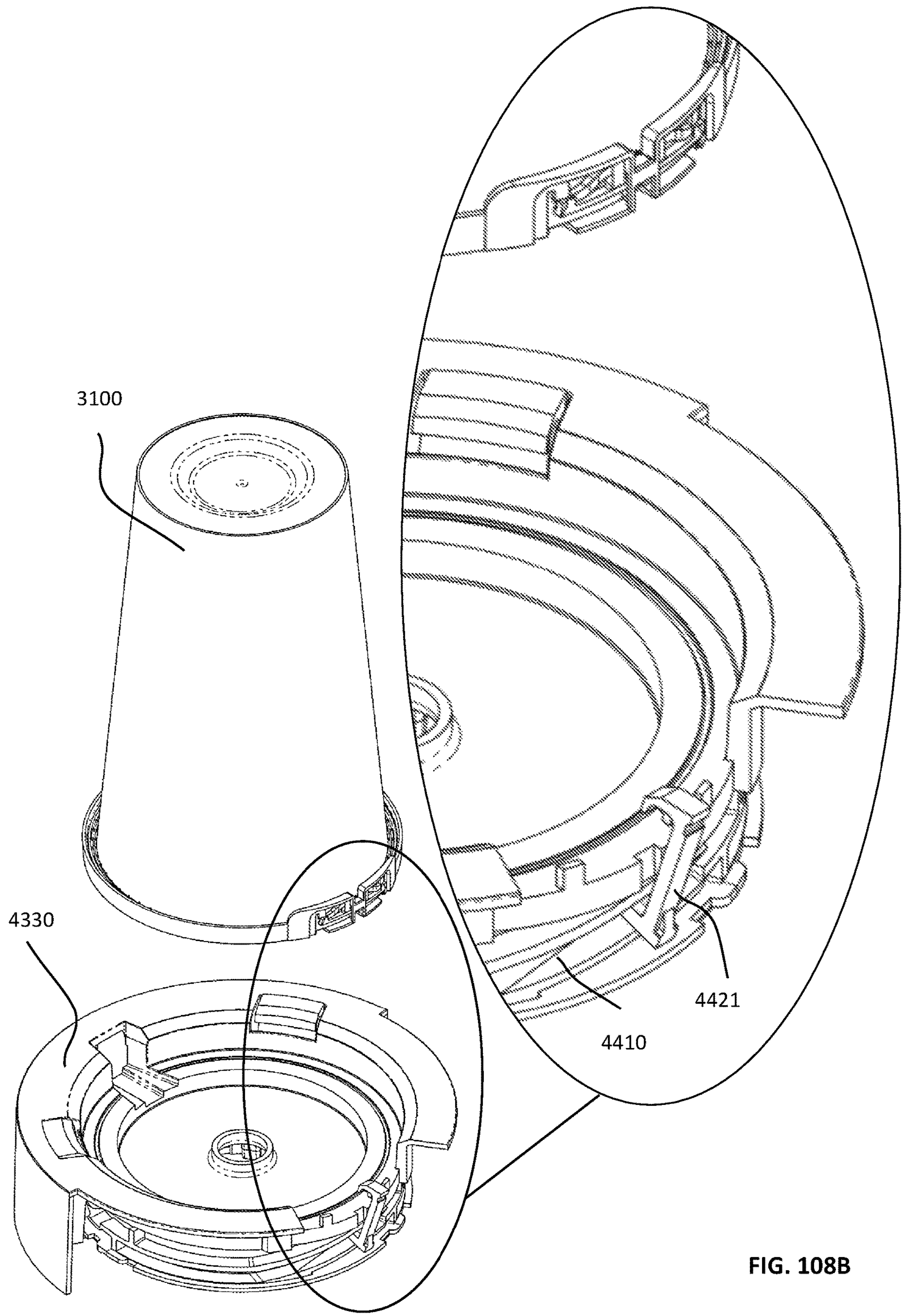
Figure 108C:
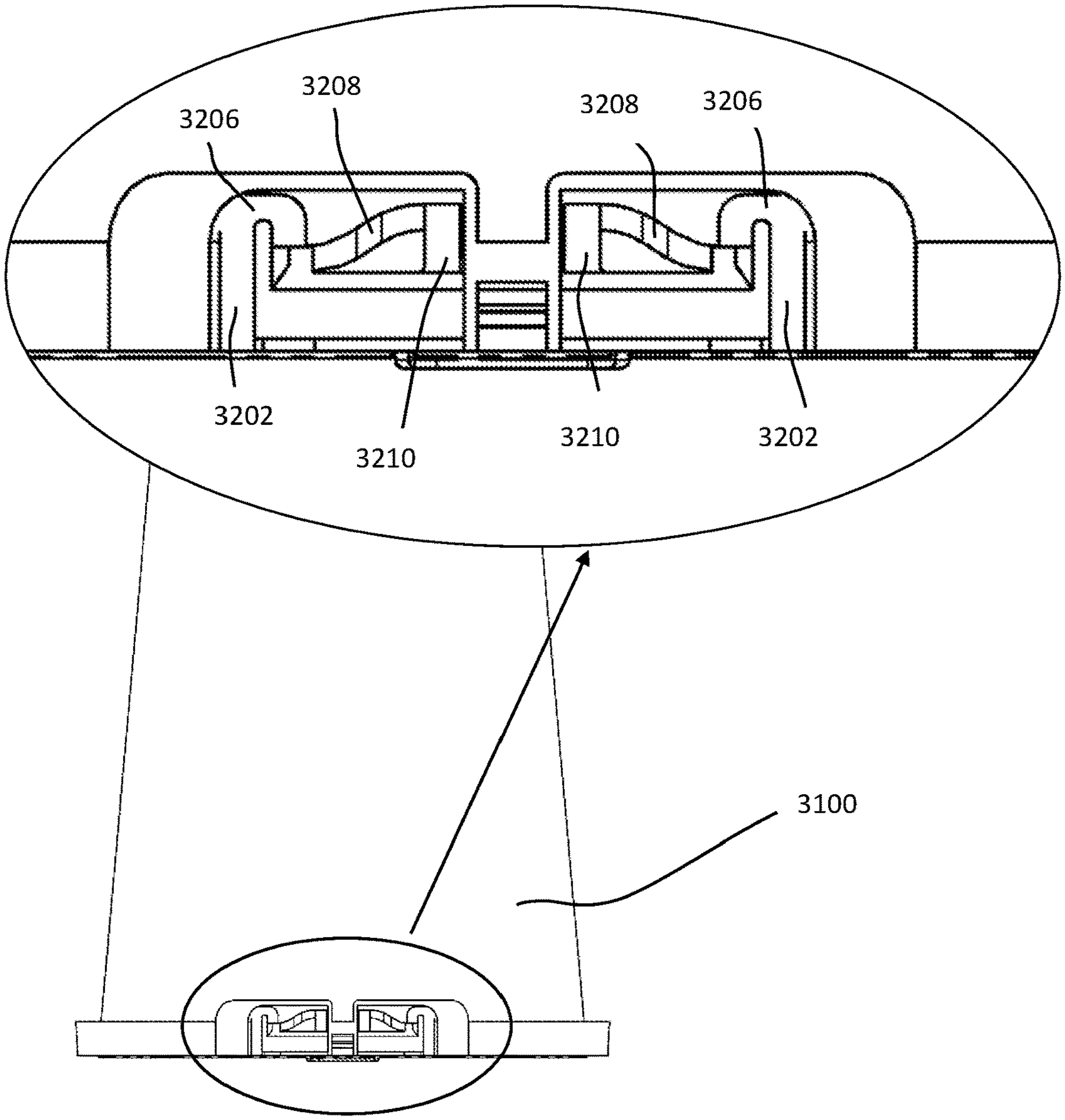
Figure 108C:
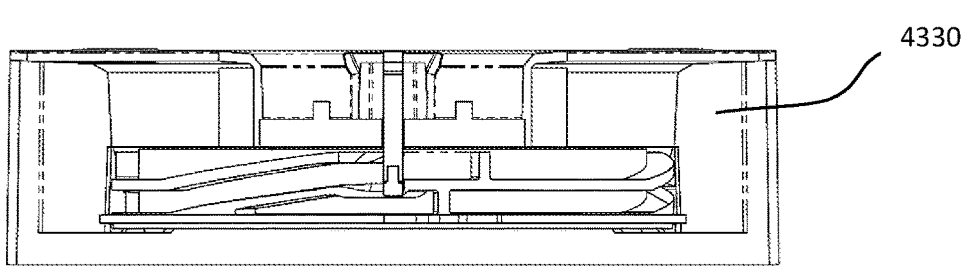
Figure 108D:
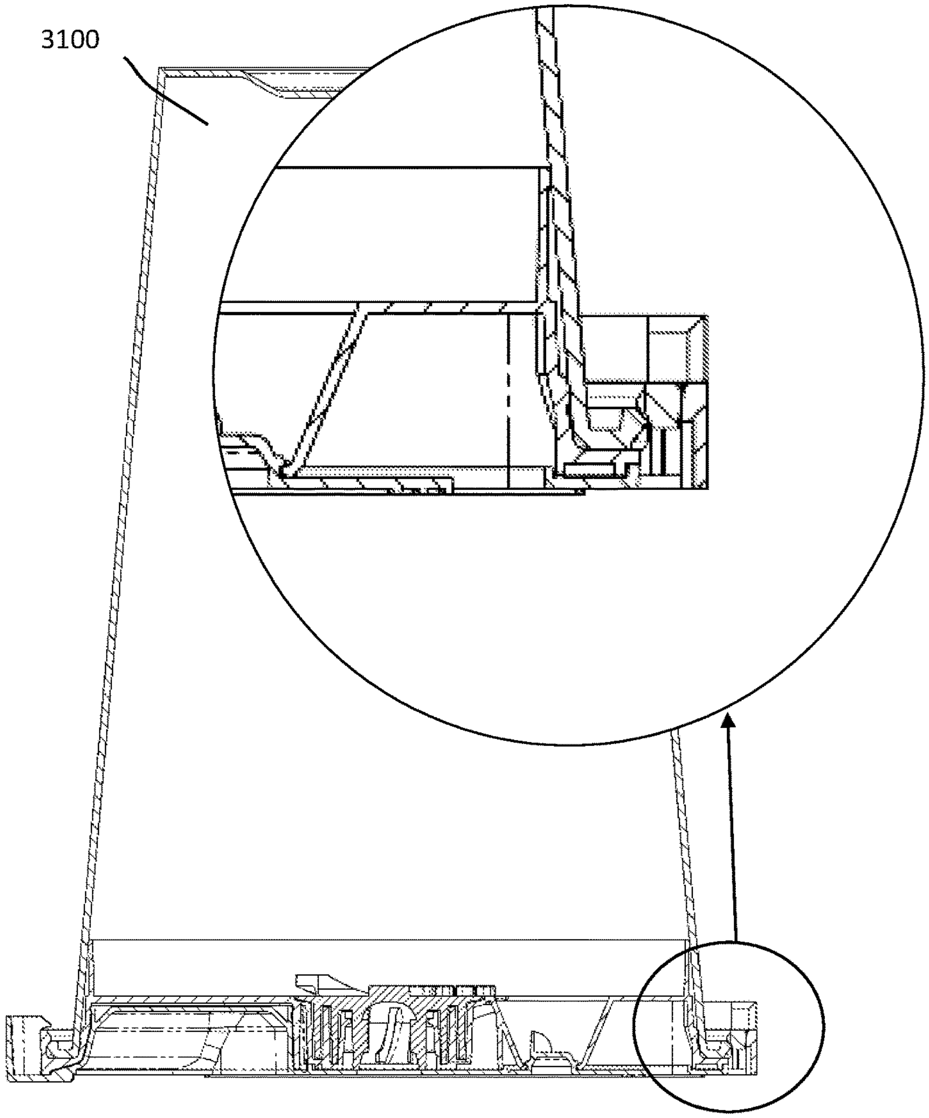
Figure 108D:
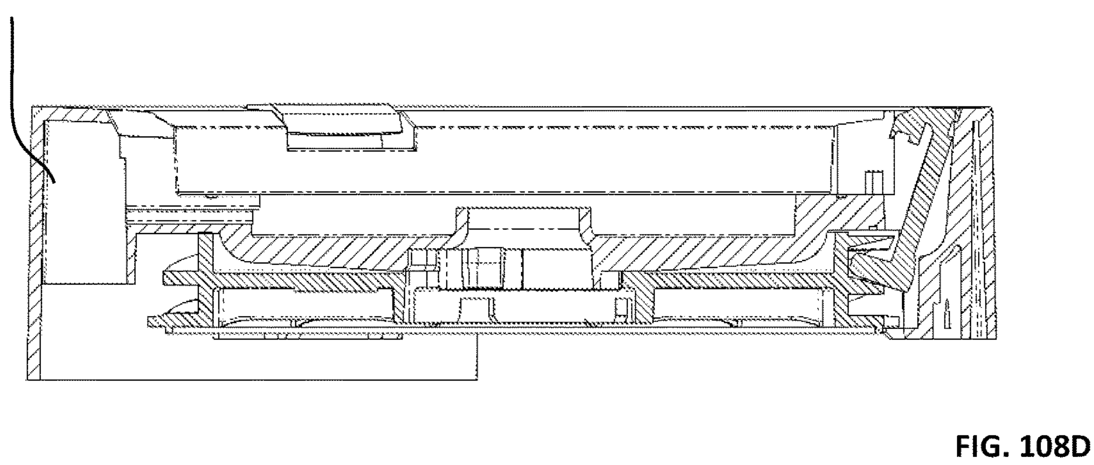

It is seen with particular clarity, in an enlargement of FIG. 108C, that outer arms 3202, spring arm portions 3208, elbows 3206 and upwardly extending portions 3210 are deformed.

Figure 109A:
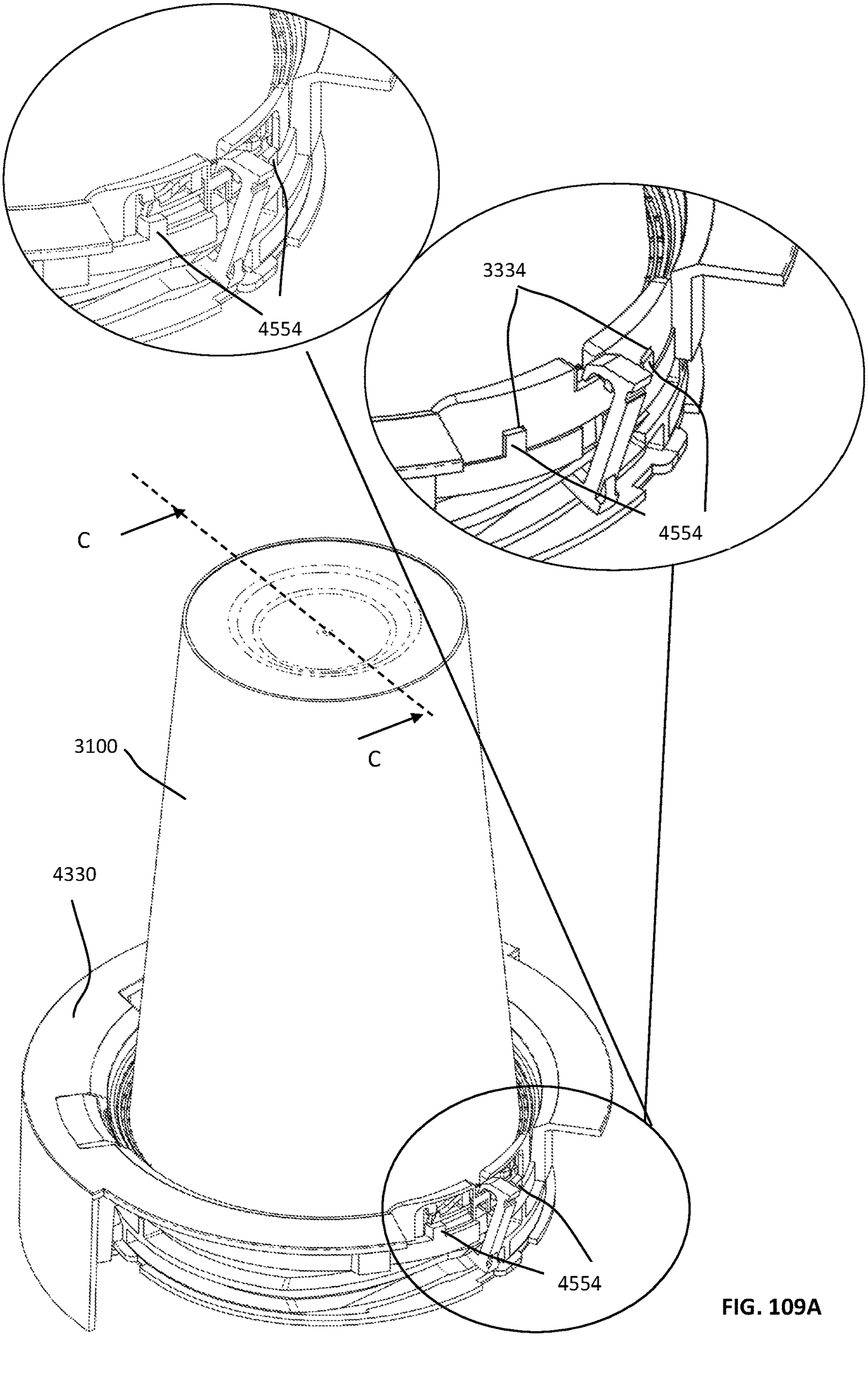
Figure 109B:
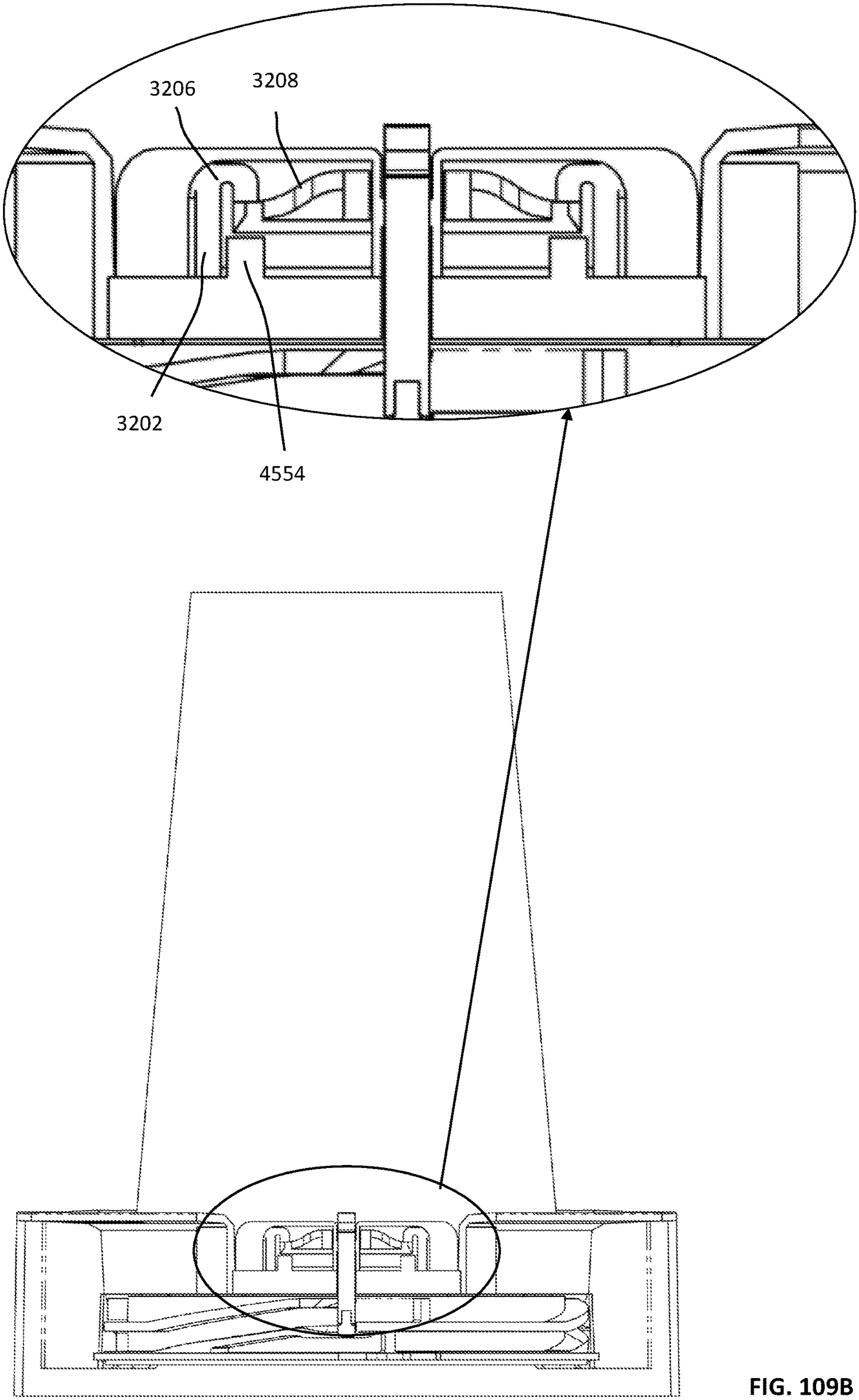
Figure 109C:
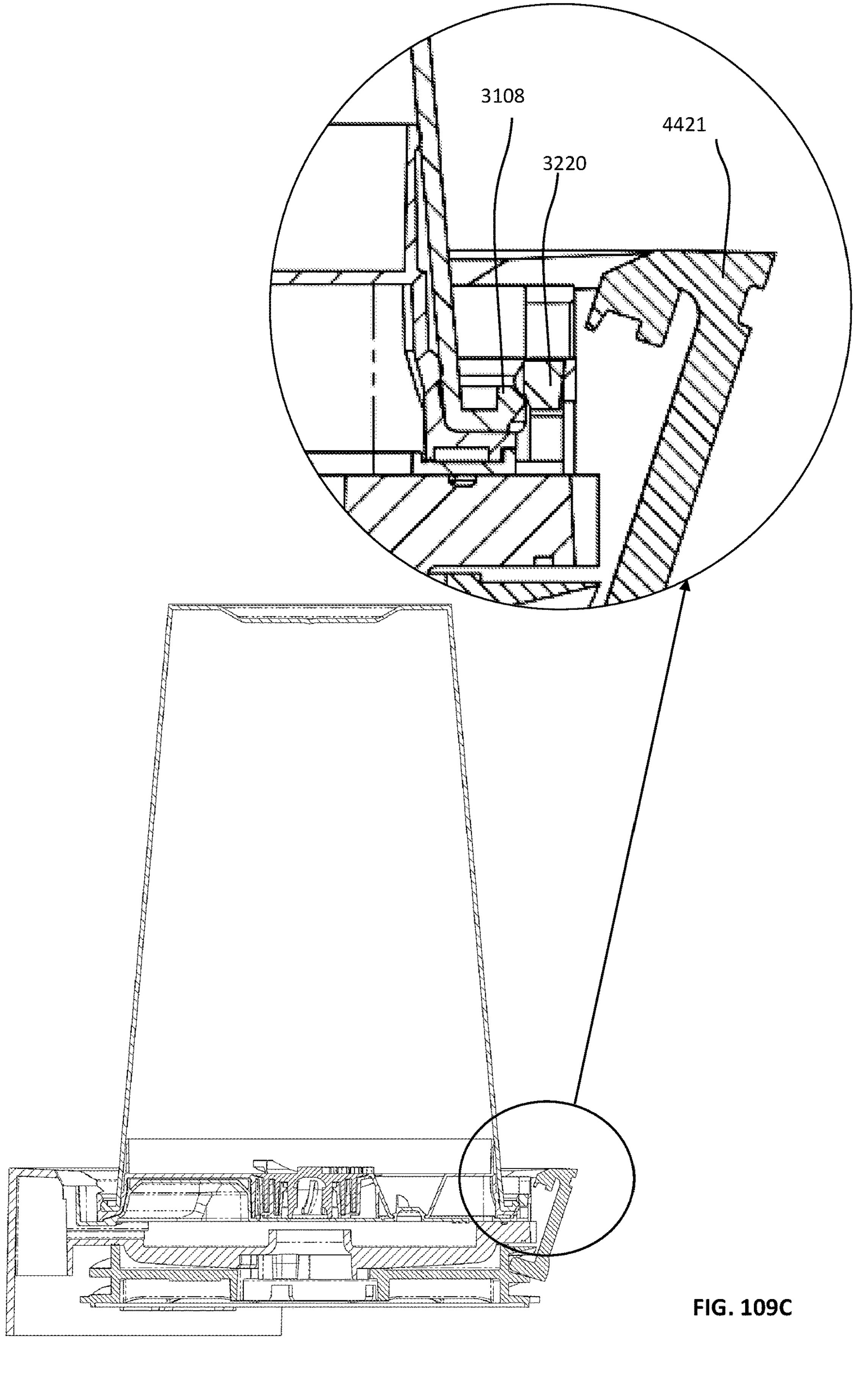

Reference is now made to FIGS. 109A, 109B and 109C, which are simplified partially cut-away pictorial, partially cut-away side view and sectional view illustrations, corresponding to FIG. 98, of initial engagement of SUPCA 3100 with SUPCASCA 4330 of MMIDD 4300, FIG. 109C being taken along lines C-C in FIG. 109A.

As seen in FIGS. 109A-109C, cup engagement protrusions 4554 of SUPCASCA 4330 are seated in engagement windows 3334 of SUPCA 3100. SUPCA 3100 is not yet clamped to SUPCASCA 4330 of MMIDD 4300.

Figure 110A:
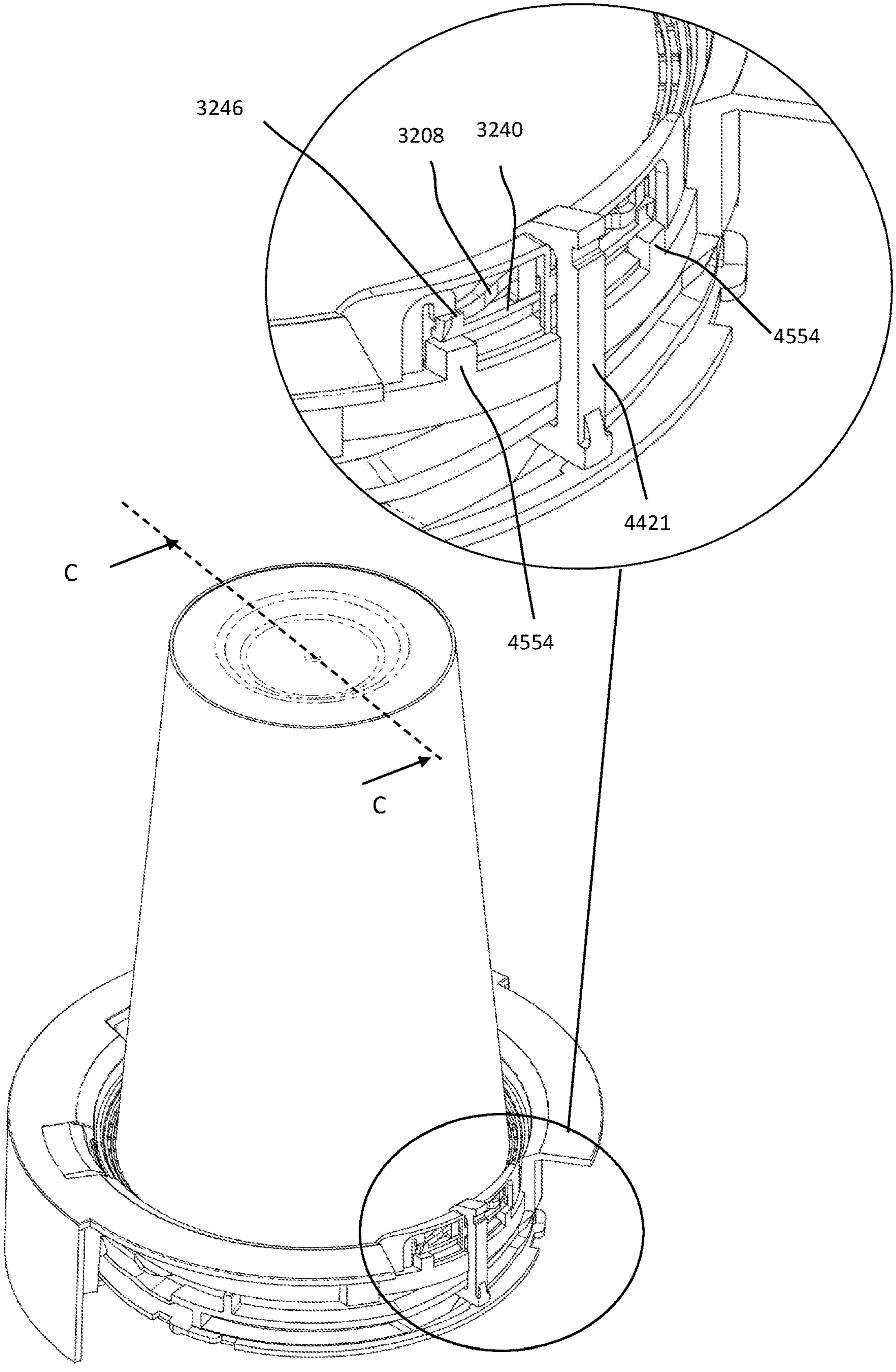
Figure 110B:
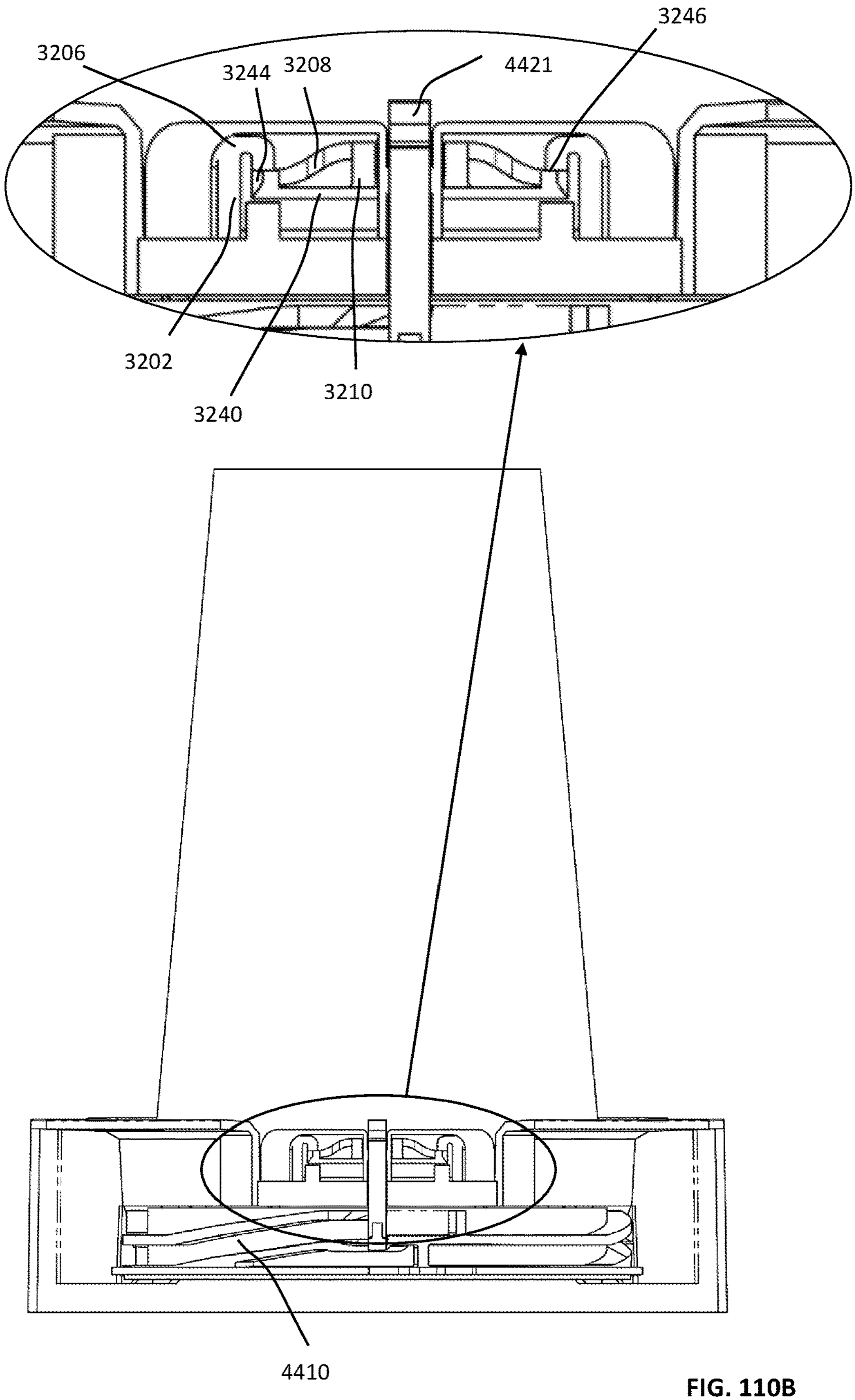
Figure 110C:
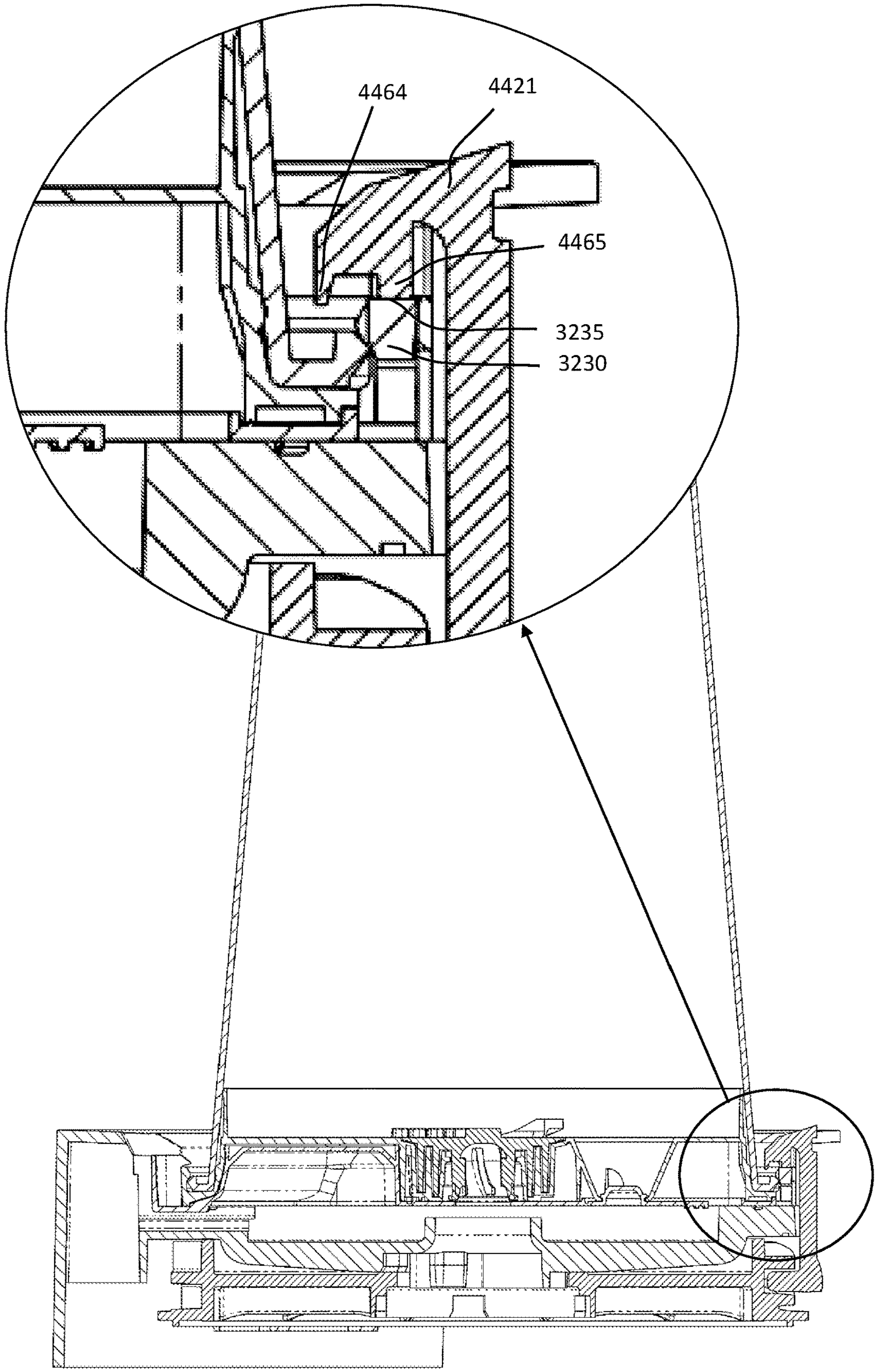

Reference is now made to FIGS. 110A, 110B and 110C, which are simplified partially cut-away pictorial, partially cut-away side view and sectional view illustrations, corresponding to FIG. 99, of an initial stage in clamping and human and machine sensible tamper-evidencing and re-use preventing fluid sealing engagement of SUPCA 3100 with SUPCASCA 4330. It is seen that stepped protrusion 4465 of clamp element 4421 engages a top surface 3235 of central lid engagement portion 3230 but has not yet displaced it downwardly.

Figure 111A:
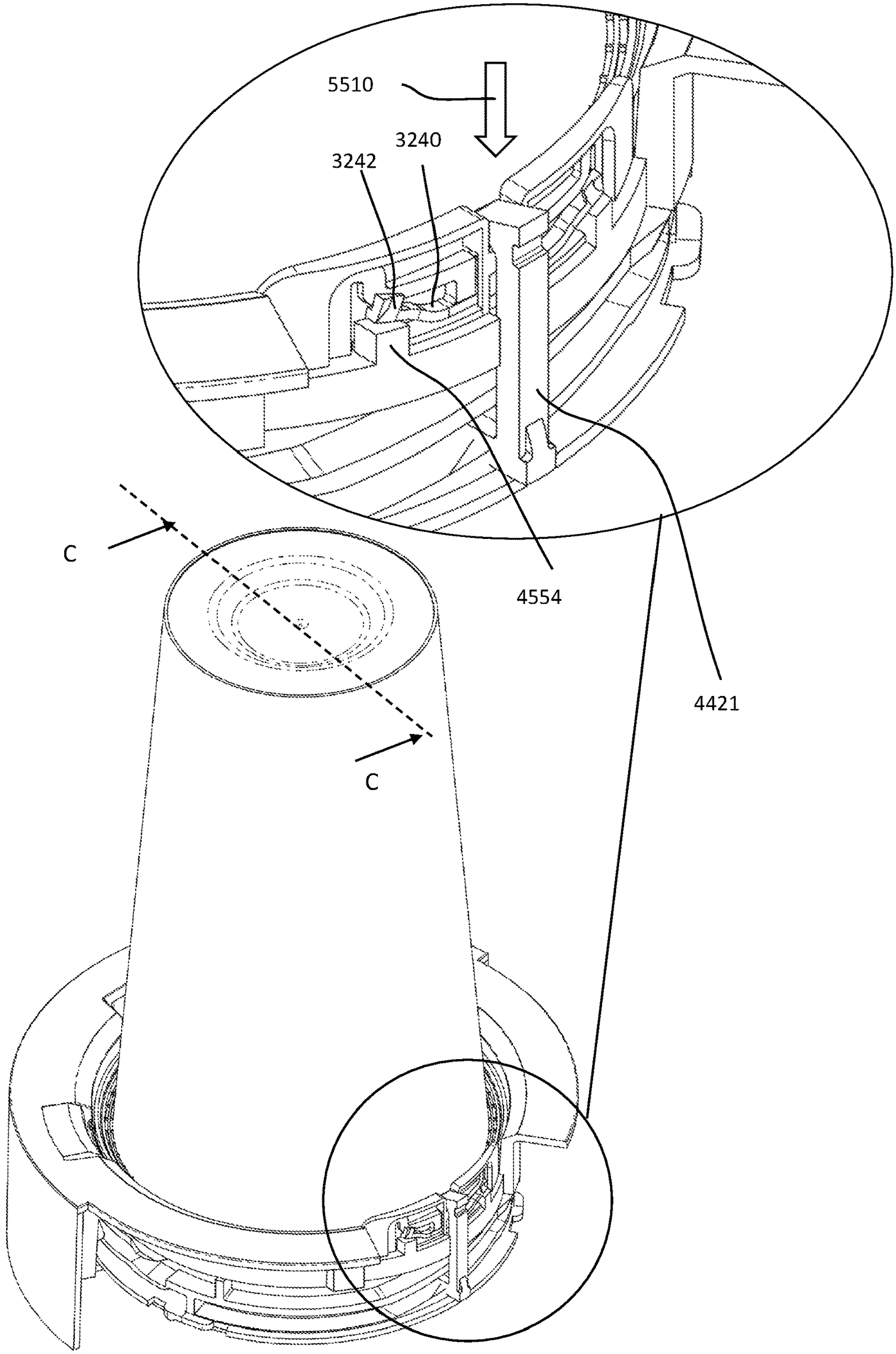
Figure 111B:
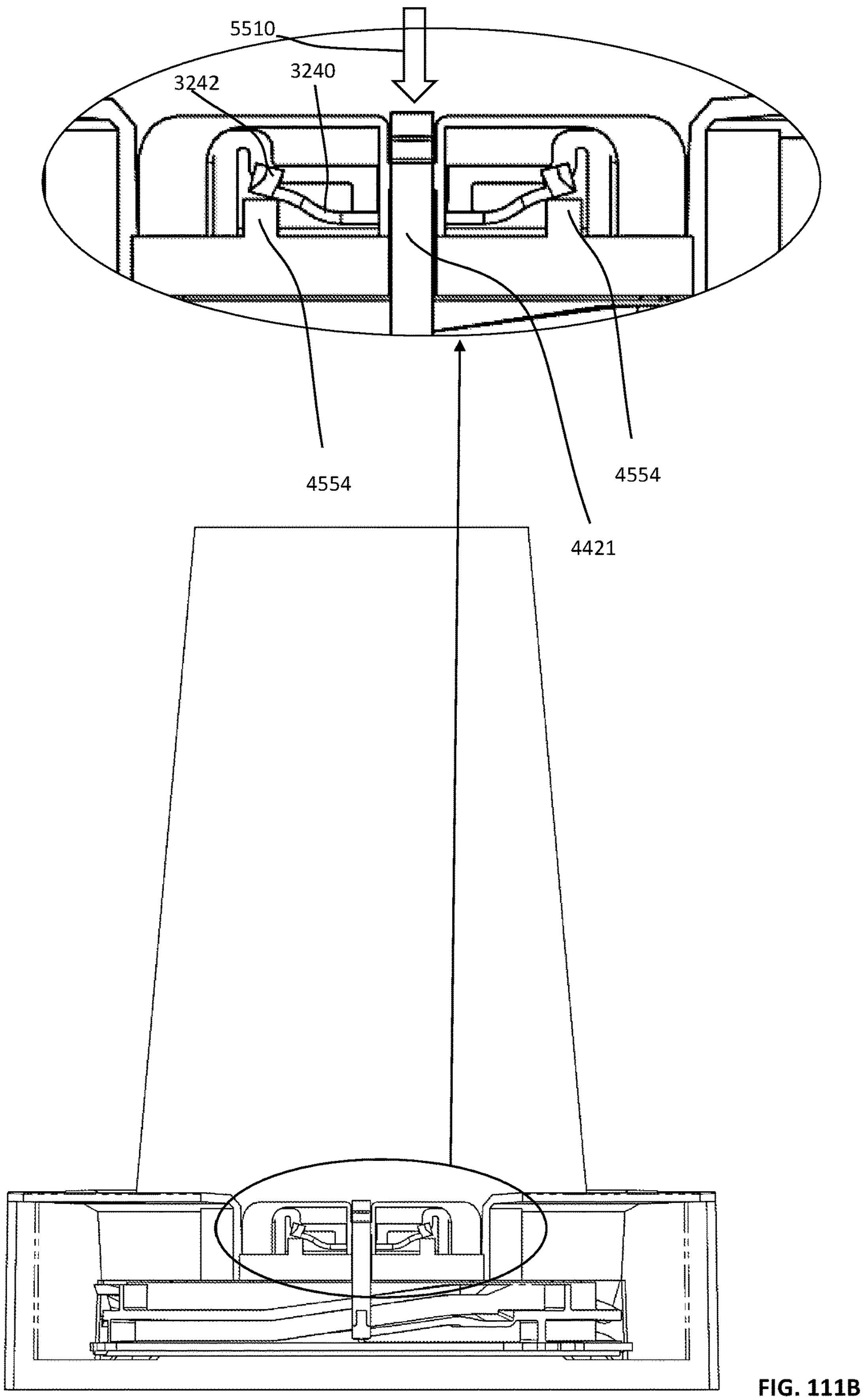
Figure 111C:
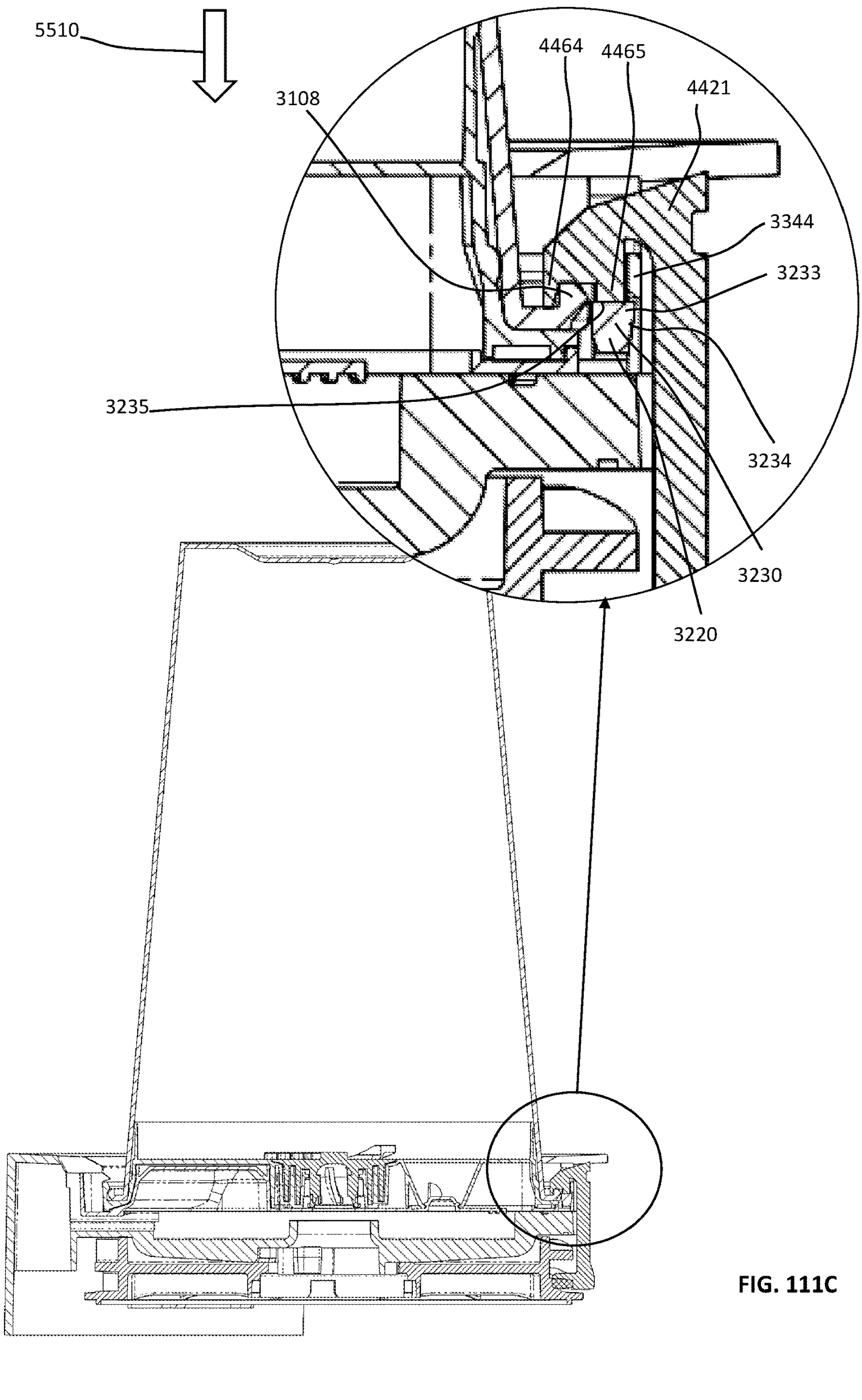

Reference is now made to FIGS. 111A, 111B and 111C, which are simplified partially cut-away pictorial, partially cut-away side view and sectional view illustrations, corresponding to FIG. 100, of a final stage in clamping and an intermediate stage of activation of human and machine sensible tamper-evidencing and re-use prevention functionality of the SUPCA 3100. It is seen that stepped protrusion 4465 of clamp element 4421 engages a top surface 3235 of central lid engagement portion 3230 has displaced it downwardly.

As seen in the enlargement of FIG. 111C, stepped protrusion 4465 of clamp element 4421 has forced cantilevered generally elongate locking portion 3220 of the MTIRPE 3200 downward in a direction indicated by arrow 5510 to a location below transverse rib 3344. This displacement partially relieved the deformations described hereinabove with reference to FIG. 99 and caused locking surface 3234 of tapered lid locking portion 3233, extending from cantilevered generally elongate locking portion 3220 of MTIRPE 3200, to be locked in position below the transverse rib 3344.

As seen with particular clarity in the enlargement of FIG. 111B, cup engagement protrusions 4554 of SUPCASCA 4330 are seated in engagement windows 3334 of the SUPCA 3100. The presence of cup engagement protrusions 4554 of SUPCASCA 4330 in engagement windows 3334 prevents engagement window occluding end portions 3242 of symmetric locking arms 3240 from occluding engagement windows 3334 in response to the downward displacement of cantilevered generally elongate locking portion 3220 in a direction indicated by arrow 5510 by clamping action of third clamp element 4421, thereby resulting in deformation of symmetric locking arms 3240.

Reference is now made to FIGS. 112A, 112B and 112C, which are simplified partially cut-away pictorial, partially cut-away side view and sectional view illustrations, corresponding to FIG. 104, of a stage wherein the SUPCA 3100 is fully unclamped and the human and machine sensible tamper-evidencing and re-use prevention functionality of the SUPCA 3100 is not yet fully activated.

As seen with particular clarity in the enlargements of FIGS. 112B and 112C, notwithstanding disengagement of third clamp element 4421 from cantilevered generally elongate locking portion 3220, the deformation of symmetric locking arms 3240 seen in FIG. 111B remains the same by virtue of locking of cantilevered generally elongate locking portion 3220 of MTIRPE 3200 below the transverse rib 3344.

Reference is now made to FIGS. 113A, 113B, 113C, 113D and 113E, which are simplified first partially cut-away pictorial, first partially cut-away side view, sectional view, second partially cut-away pictorial and second partially cut-away side view illustrations, corresponding to FIG. 105, of disengagement of SUPCA 3100 from SUPCASCA 4330 of MMIDD 4300 and activation of the human and machine sensible tamper-evidencing and re-use prevention functionality of SUPCA 3100.

It is seen with particular clarity in the enlargement of FIG. 113B that as result of the disengagement of SUPCA 3100 from the SUPCASCA 4330 of the MMIDD 4300, arms 3240 are no longer deformed and engagement window occluding end portions 3242 occlude engagement windows 3334, providing human visible evidence of prior use of the SUPCA 3100. More particularly it is seen that planar engagement window locking portions 3244 snap into locking engagement with corresponding engagement windows 3334 in an irreversible manner.

It is also appreciated that following engagement and clamping of SUPCA 3100 with SUPCASCA 4330 and subsequent unclamping and disengagement of SUPCA 3100 from SUPCASCA 4330, SUPCA 3100 can no longer be processed by MMIDD 4300 because cup engagement protrusions 4554 of SUPCASCA 4330 cannot seatingly engage engagement windows 3334, due to the fact that engagement windows 3334 are irreversibly occluded by engagement window occluding end portion 3242, as seen clearly in the enlargement of FIG. 113E, by virtue of locking engagement of engagement window locking portions 3244 with corresponding engagement windows 3334 in an irreversible manner.

Reference is now made to FIGS. 114A, 114B and 114C, which are simplified partially cut-away pictorial, partially cut-away side view and sectional view illustrations of the results of an attempted re-use of a SUPCA following activation of the human and machine sensible tamper-evidencing and re-use prevention functionality of the SUPCA as illustrated in FIGS. 108A-113E.

As seen particularly in the enlargements of FIGS. 114A and 114C, engagement window occluding end portions 3242 are locked in occluding engagement with engagement windows 3334, which prevent seating of cup engagement protrusions 4554 of SUPCASCA 4330 with engagement windows 3334. As a result, the SUPCA 3100 cannot be fully seated on the SUPCASCA 4330 and cannot be clamped thereto, inasmuch as clamping engagement edge 4464 lies above top edge 3346 of clamp engagement slot 3336 of SUCSERDREA 3120.

In the section that follows, which makes reference to FIGS. 115A-117C, activation of the human and machine sensible tamper-evidencing and re-use prevention functionality of SUPCA 3100 by disengagement of SUCSERDREA 3120 from the single-use container body 3102 is described. It is appreciated that the human and machine sensible tamper-evidencing and re-use prevention functionality of SUPCA 3100 may also be included in SUPCAs 100, 4100 and 4200 by including MTIRPE 3200 of FIGS. 62A-62E on a cover thereof and MTIRPERP 3320 of FIGS. 63A-63E on a lid thereof.

Reference is now made to FIGS. 115A, 115B and 115C, which are simplified partially cut-away pictorial, sectional view and pictorial illustrations of SUPCA 3100 including SUCSERDREA 3120 mounted on single-use container body 3102 prior to activation of the human and machine sensible tamper-evidencing and re-use prevention functionality of SUPCA 3100. It is appreciated that SUPCA 3100 and the SUCSERDREA 3120 may be identical to those illustrated in FIG. 92H and described hereinabove.

Reference is now made to FIGS. 116A, 116B and 116C, which are simplified partially cut-away pictorial, sectional view and pictorial illustrations corresponding to FIGS. 115A-115C but showing disengagement of SUCSERDREA 3120 from the single-use container body 3102 and resulting activation of the human and machine sensible tamper-evidencing and re-use prevention functionality of the SUPCA 3100.

It is seen with particular clarity in the enlargement of FIG. 116B, as compared with the corresponding enlargement in FIG. 115B, that the cantilevered generally elongate locking portion 3220 of the SUCSERDREA, which is seen in FIG. 115B to be locked in position between circumferential rim 3108 of the single-use container body 3102 and transverse rib 3344, is no longer locked in FIG. 116B, by virtue of mutual disengagement of the SUCSERDREA 3120 and the single-use container body 3102, and has returned to its rest position seen in FIG. 92B.

As seen with particular clarity in the enlargement of FIG. 116C, similarly to that described with reference to FIGS. 108A-114C, engagement window occluding end portions 3242 occlude engagement windows 3334, providing human visible evidence of prior use of the SUPCA 3100. Furthermore it is seen that planar engagement window locking portions 3244 snap into locking engagement with corresponding engagement windows 3334 in an irreversible manner.

As described above with reference to FIGS. 108A-114C, the human and machine sensible tamper-evidencing and re-use prevention functionality of the SUCSERDREA 3120 is operative following engagement and clamping of SUPCA 3100 with SUPCASCA 4330 and subsequent unclamping and disengagement of SUPCA 3100 from SUPCASCA 4330, such that SUPCA 3100 can no longer be processed by MMIDD 4300. It is appreciated that the human and machine sensible tamper-evidencing and re-use prevention functionality of SUCSERDREA 3120 operates similarly when SUCSERDREA 3120 is disengaged from the single-use container body 3102 of SUPCA 3100, as shown in FIGS. 115A-116C and described hereinabove, such that SUPCA 3100 can no longer be processed by MMIDD 4300 because cup engagement protrusions 4554 of SUPCASCA 4330 cannot seatingly engage engagement windows 3334, due to the fact that engagement windows 3334 are irreversibly occluded by engagement window occluding end portion 3242, by virtue of locking engagement of engagement window locking portions 3244 with corresponding engagement windows 3334 in an irreversible manner.

Reference is now made to FIGS. 117A, 117B and 117C, which are simplified partially cut-away pictorial, sectional view and pictorial illustrations corresponding to FIGS. 116A-116C but showing re-engagement of the SUCSERDREA 3120 with the single-use container body 3102 and operation of the human and machine sensible tamper-evidencing and re-use prevention functionality of the SUPCA. It is a particular feature of an embodiment of the present invention that re-engagement of SUCSERDREA 3120 with the single-use container body 3102 does not deactivate the human and machine sensible tamper-evidencing and re-use prevention functionality which was activated by disengagement of the SUCSERDREA 3120 from the single-use container body 3102. Accordingly, in the operative orientation shown in FIGS. 117A-117C, the SUPCA 3100 continues to provide human and machine sensible tamper-evidence and re-use prevention.

Specifically, as seen in the enlargement of FIG. 117B, cantilevered generally elongate locking portion 3220 is in its rest position as shown in FIG. 92A.

Similarly to that described hereinabove with reference to FIG. 100, cantilevered generally elongate locking portion 3220 of the MTIRPE 3200 is at a location below transverse rib 3344. As a result of relief of the deformations, described hereinabove with reference to FIG. 99, locking surface 3234 of tapered lid locking portion 3233 extending from cantilevered generally elongate locking portion 3220 of the MTIRPE 3200 is locked in position below the transverse rib 3344.

The following section, which makes reference to FIGS. 118A-122C, describes various stages in the operation of various embodiments of MMIDD 4300 of FIG. 68 in cooperation with various embodiments of a SUPCA.

Figure 118A:
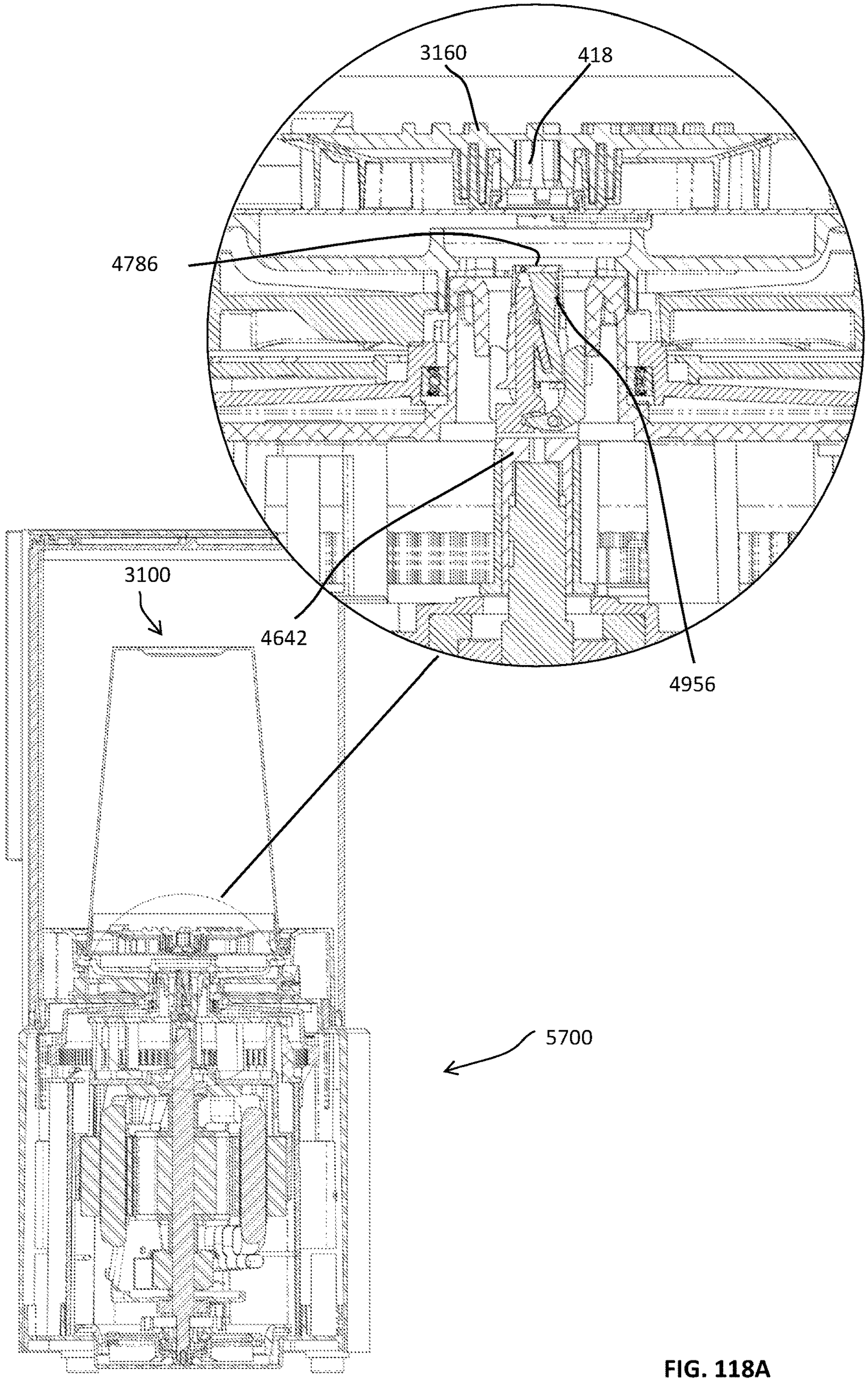
Figure 118B:
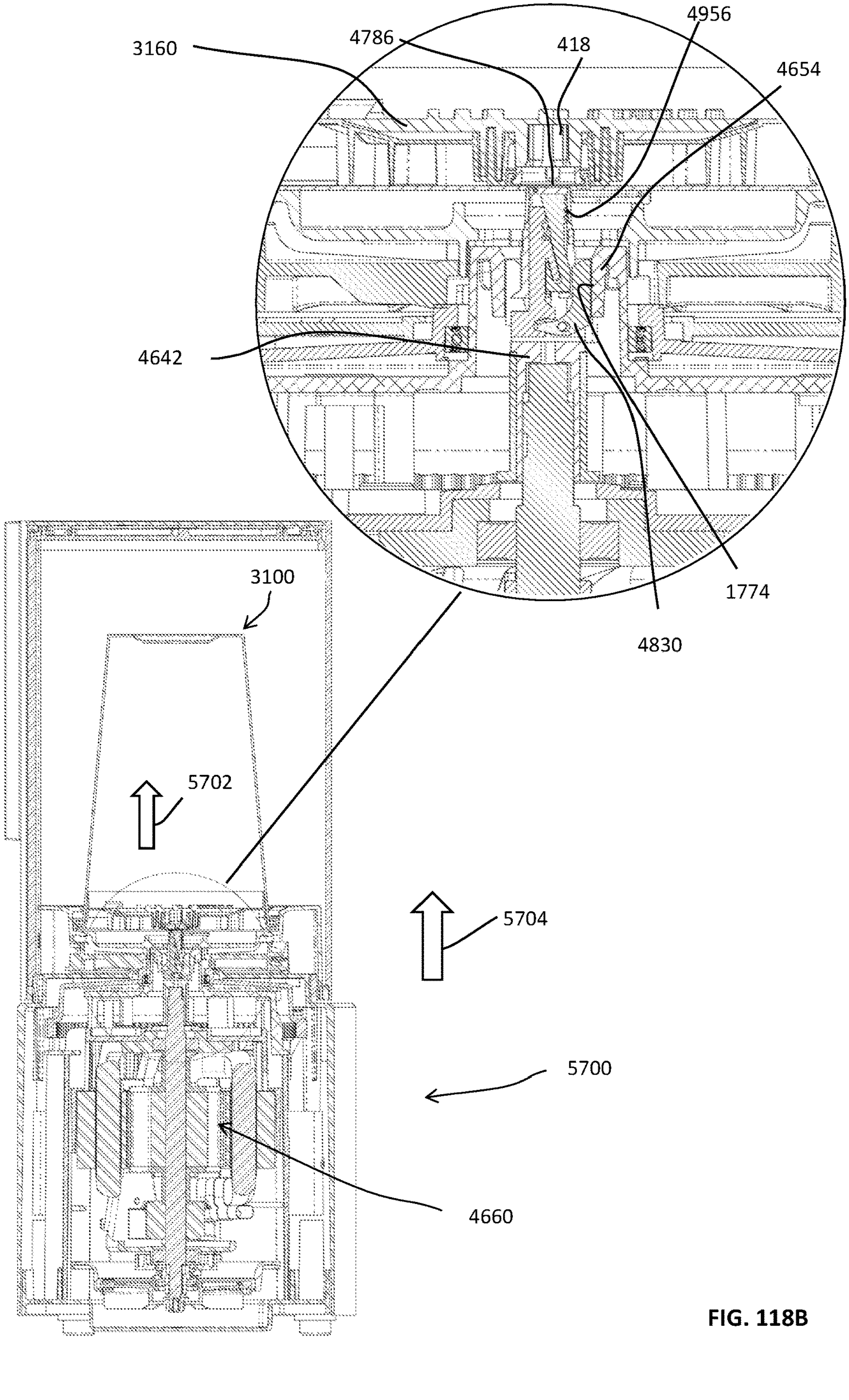
Figure 118C:
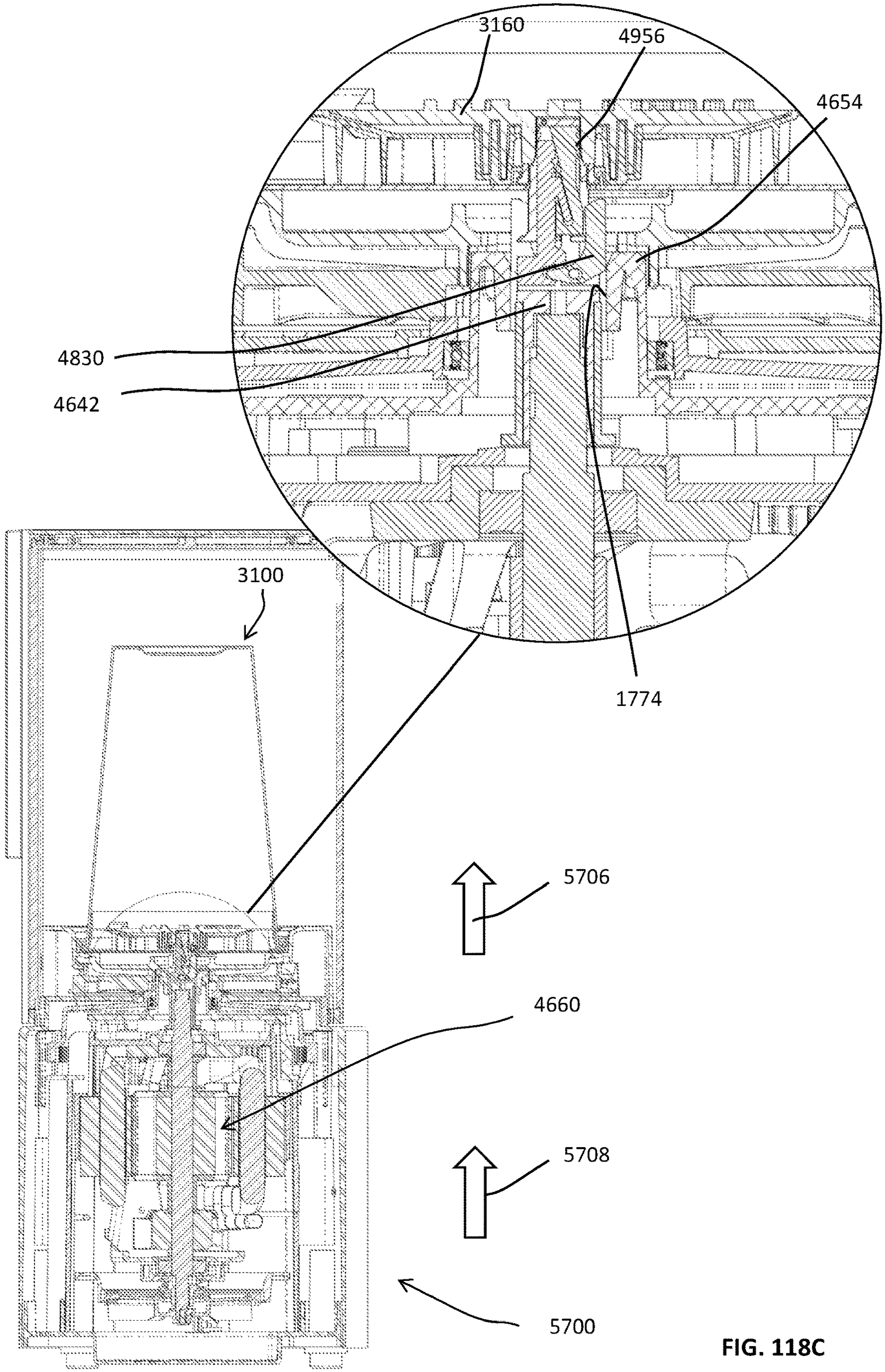
Figure 118D:
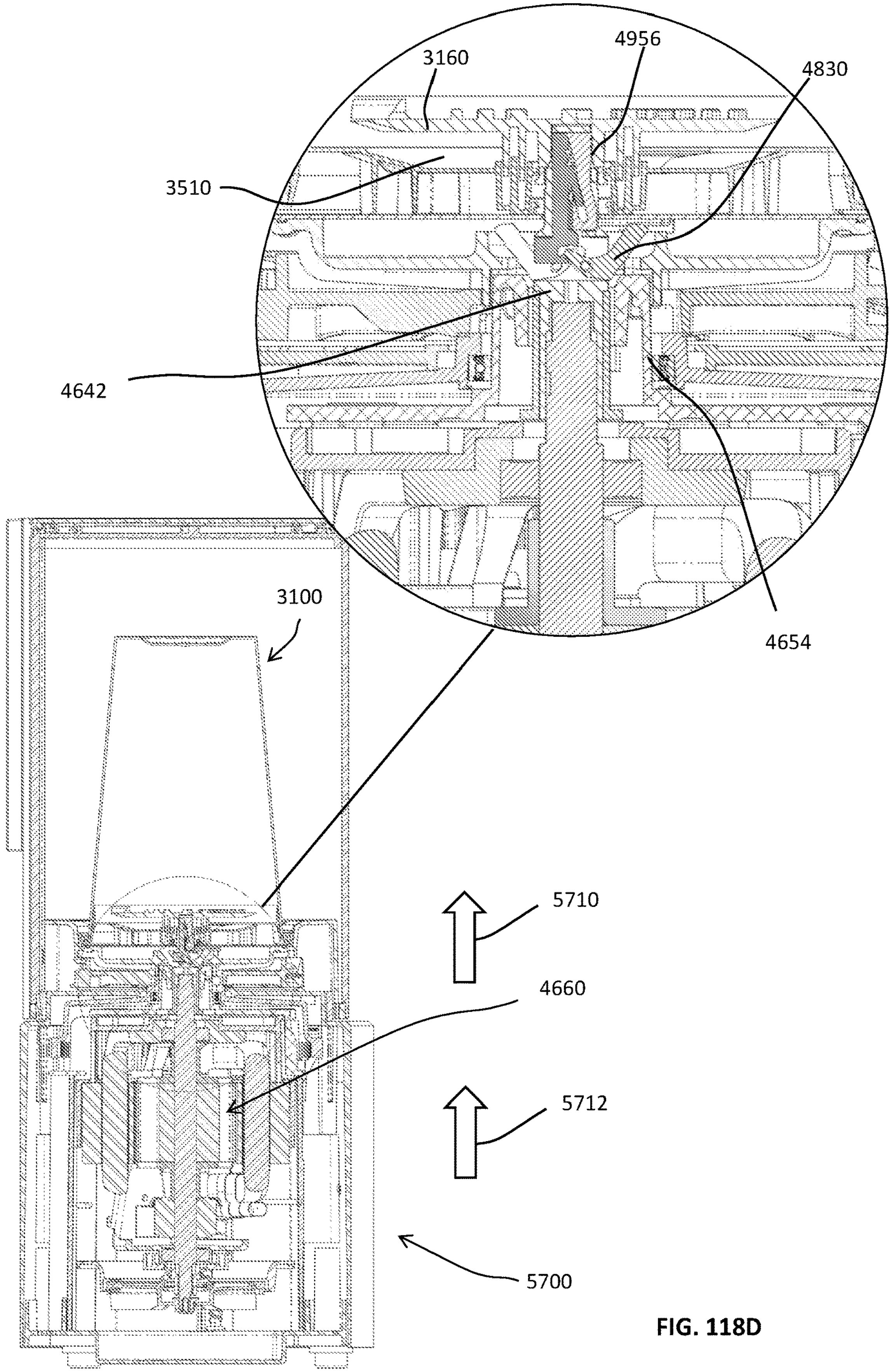

Reference is now made to FIGS. 118A, 118B, 118C and 118D, which are simplified sectional illustrations taken along a central cross section of MMIDD 4300 of FIG. 68, here designated MMIDD 5700, having outer drive shaft assembly 4642, as shown in FIGS. 76A-81B, with SUPCA 3100, as shown in FIGS. 60A-60I, illustrating blade engagement and sealing functionality thereof in four operative orientations. FIGS. 118A-118D illustrate the same embodiment of MMIDD 4300 that is shown in FIGS. 91A-91C. FIGS. 118A and 118D correspond to the operative orientations of MMIDD 4300 shown in corresponding FIGS. 91A and 91C.

FIG. 118A shows MMIDD 5700 is in its rest position, as partially shown in FIG. 91A, and SUPCA 3100 is in seated engagement with SUPCASCA 4330 of MMIDD 5700. The planar top surface 4786 of outer drive shaft assembly 4642 lies below and out of engagement with SUPCA 3100. It is noted that downwardly extending ratcheted edges 4956 of grip element 4850 lie within recesses defined between splines defined on semicircular cylindrical outer surface 4784 of outer drive shaft assembly 4642. It is also noted that splines 418 of blade 3160 are azimuthally aligned with recesses defined between splines defined on semicircular cylindrical outer surface 4784 of outer drive shaft assembly 4642, in order that fully seated engagement between the outer drive shaft assembly 4642 and the blade 3160 may be achieved by relative axial displacement therebetween.

FIG. 118B shows upward vertical displacement of outer drive shaft assembly 4642, as indicated by an arrow 5702, which results from upward displacement of the axially displaceable rotary drive assembly 4660, as indicated by an arrow 5704. The planar top surface 4786 of outer drive shaft assembly 4642 lies at, but not yet in engagement with, SUPCA 3100. The elbow elements 4830 remain in vertically slidable engagement with radially inwardly directed cylindrical surface 1774 of top element 4654 such that radially outward rotation of elbow elements 4830 is prevented. It is noted that downwardly extending ratcheted edges 4956 still lie within recesses defined between splines defined on semicircular cylindrical outer surface 4784 of outer drive shaft assembly 4642. Splines 418 of blade 3160 remain azimuthally aligned with recesses defined between splines defined on semicircular cylindrical outer surface 4784 of outer drive shaft assembly 4642.

FIG. 118C shows further upward vertical displacement of outer drive shaft assembly 4642, as indicated by an arrow 5706, which results from further upward displacement of the axially displaceable rotary drive assembly 4660 as indicated by an arrow 5708. The outer drive shaft assembly 4642 is in fully seated engagement with blade 3160 of SUPCA 3100. The elbow elements 4830 remain in vertically slidable engagement with radially inwardly directed cylindrical surface 1774 of top element 4654 such that radially outward rotation of elbow elements 4830 is prevented. It is noted that downwardly extending ratcheted edges 4956 still lie within recesses defined between splines defined on semicircular cylindrical outer surface 4784 of outer drive shaft assembly 4642.

FIG. 118D shows further upward vertical displacement of outer drive shaft assembly 4642, as indicated by an arrow 5710, which results from further upward displacement of the axially displaceable rotary drive assembly 4660, as indicated by an arrow 5712. The outer drive shaft assembly 4642 remains in fully seated engagement with blade 3160 of SUPCA 3100 and upwardly displaces blade 3160 out of blade receiving recess 3510. The elbow elements 4830 are no longer constrained by top element 4654 and allow downwardly extending ratcheted edges 4956 to lockingly engage blade 3160. Rotation of the outer drive shaft assembly 4642 produces a centrifugal force which thrusts elbow elements 4830 radially outward, enhancing locking engagement of ratcheted edges 4956 of grip element 4850 with blade 3160.

Reference is now made to FIGS. 119A, 119B, 119C and 119D, which are simplified sectional illustrations taken along a central cross section of the MMIDD of FIG. 68 having an outer drive shaft assembly 4644, as shown in FIGS. 82A-87D, with the SUPCA 3100, as shown in FIGS. 60A-60I, illustrating blade engagement and sealing functionality thereof in four operative orientations. FIGS. 119A-119D illustrate operative orientations which correspond to those shown in FIGS. 118A-118D, but illustrate an embodiment of the MMIDD, here designated MMIDD 5720, having an outer drive shaft assembly 4644.

Figure 119A:
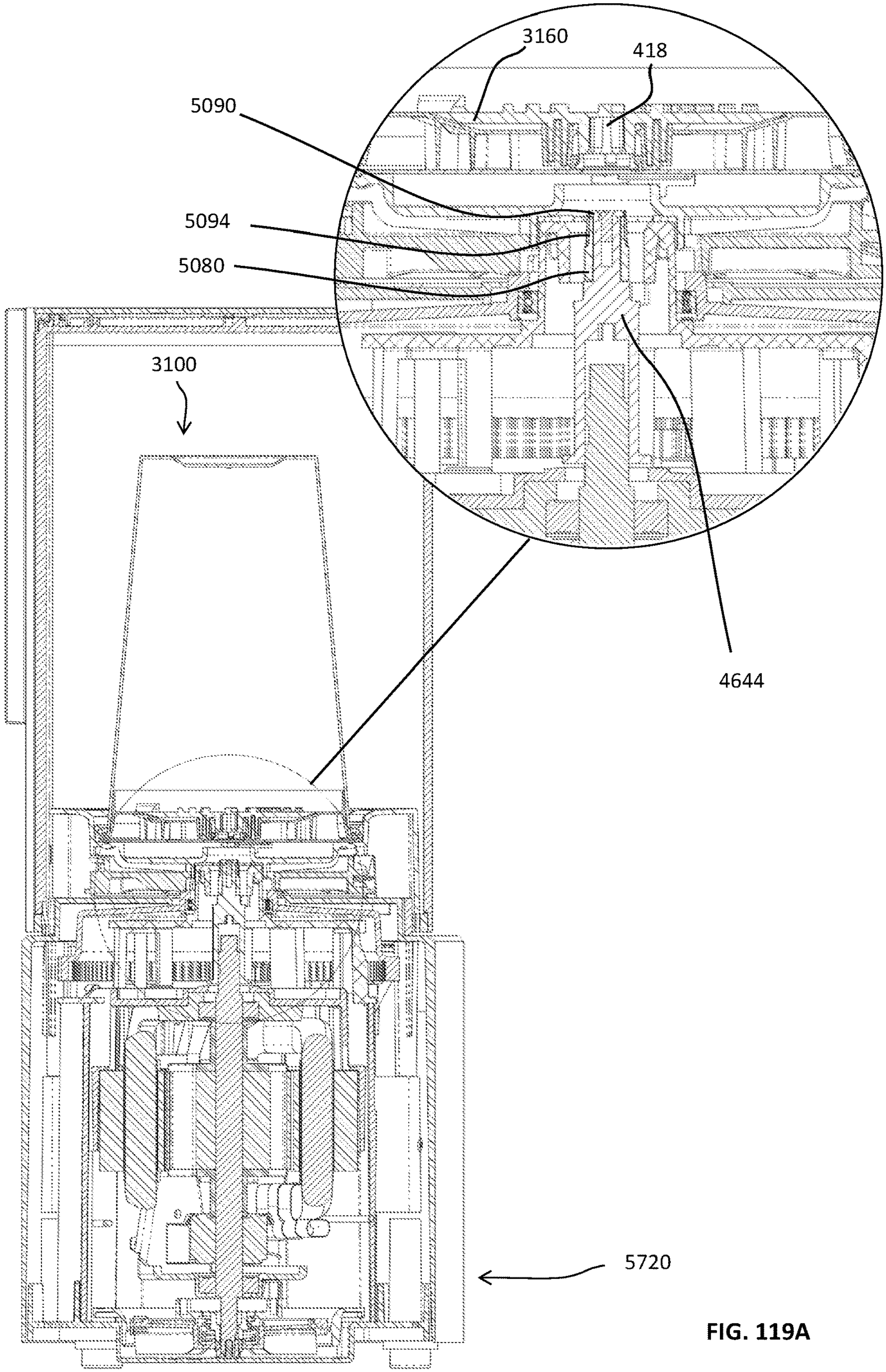

FIG. 119A shows MMIDD 5720 in its rest position and SUPCA 3100, having a blade 3160, in seated engagement with SUPCASCA of MMIDD 5720. The top of grip element 5090 of outer drive shaft assembly 4644 lies below and out of engagement with SUPCA 3100. The protrusions 5122 of the grip element 5090 are azimuthally aligned with the splines 5094 of the blade engagement element 5080. It is noted that splines 418 of blade 3160 are azimuthally aligned with recesses defined between circumferentially distributed splines 5094 of outer drive shaft assembly 4644, in order that fully seated engagement between the outer drive shaft assembly 4644 and the blade 3160 may be achieved by relative axial displacement therebetween.

Figure 119B:
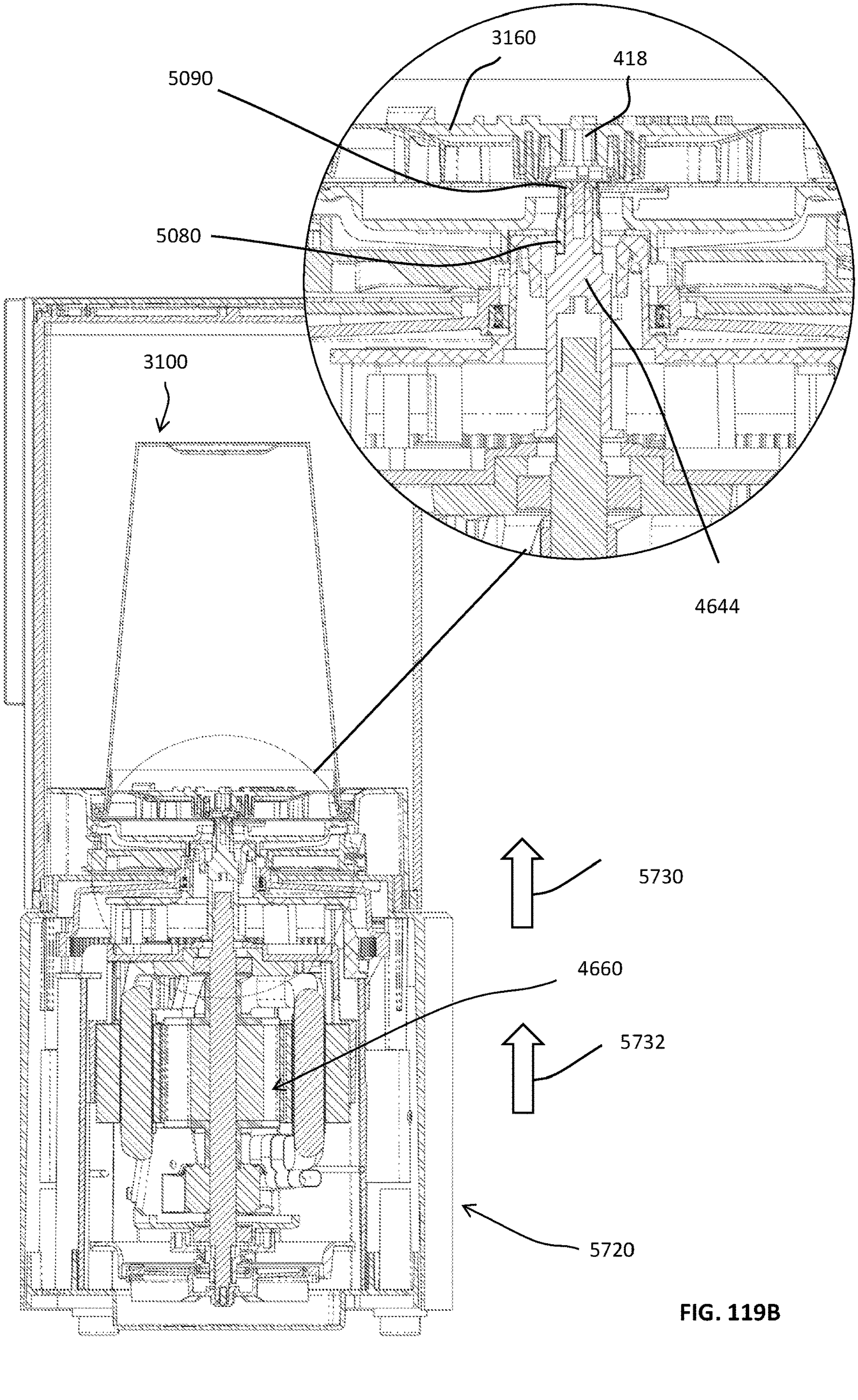

FIG. 119B shows upward vertical displacement of outer drive shaft assembly 4644, as indicated by an arrow 5730, which results from upward displacement of the axially displaceable rotary drive assembly 4660, as indicated by an arrow 5732. The top of grip element 5090 of outer drive shaft assembly 4644 lies at, but not yet in engagement with, SUPCA 3100. The protrusions 5122 of the grip element 5090 remain azimuthally aligned with the splines 5094 of the blade engagement element 5080. Splines 418 of blade 3160 remain azimuthally aligned with recesses defined between circumferentially distributed splines 5094 of outer drive shaft assembly 4644.

Figure 119C:
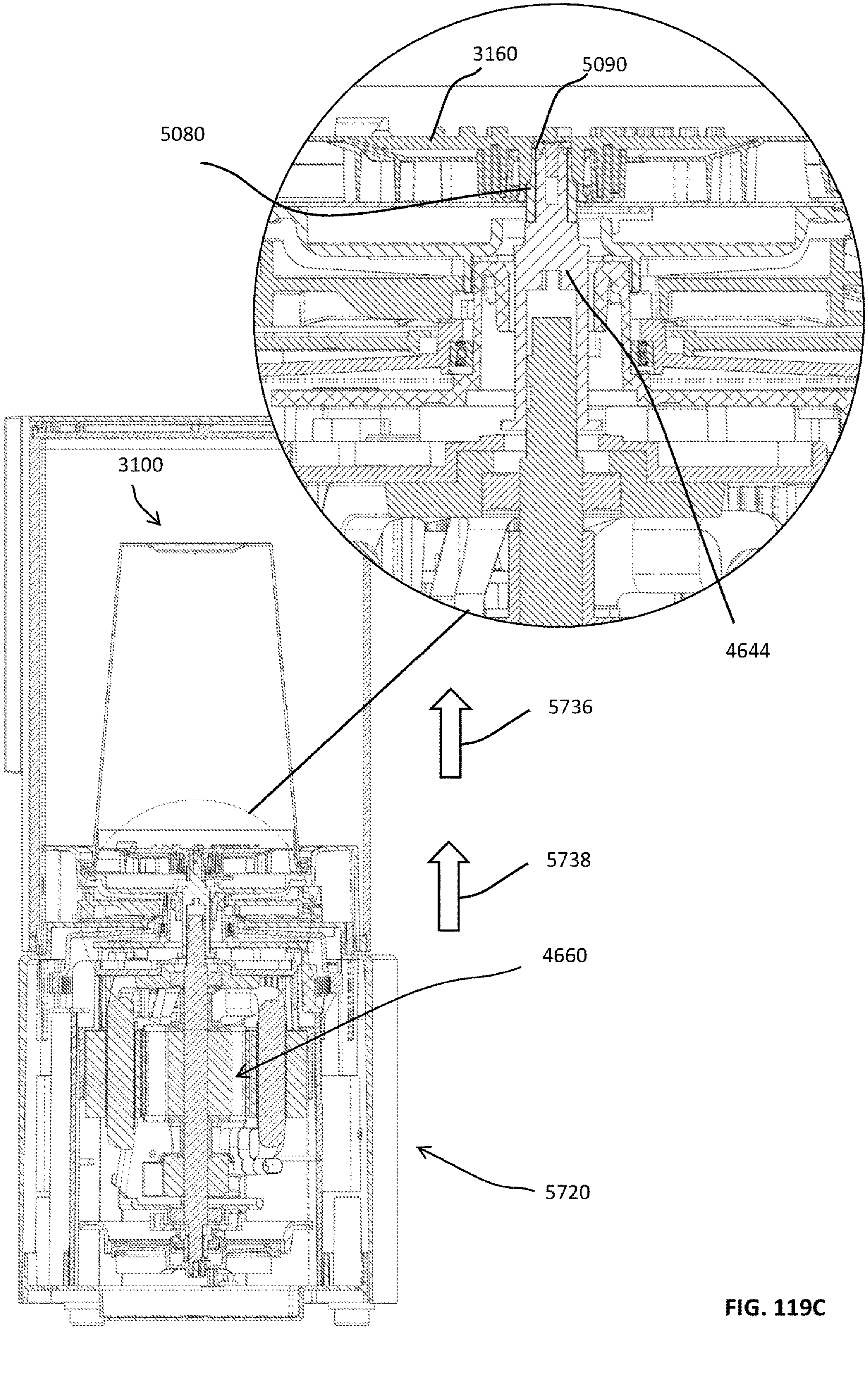

FIG. 119C shows further upward vertical displacement of outer drive shaft assembly 4644, as indicated by an arrow 5736, which results from further upward displacement of the axially displaceable rotary drive assembly 4660, as indicated by an arrow 5738. The outer drive shaft assembly 4644 is in fully seated engagement with blade 3160 of SUPCA 3100. The protrusions 5122 of the grip element 5090 remain azimuthally aligned with the splines 5094 of the blade engagement element 5080.

Figure 119D:
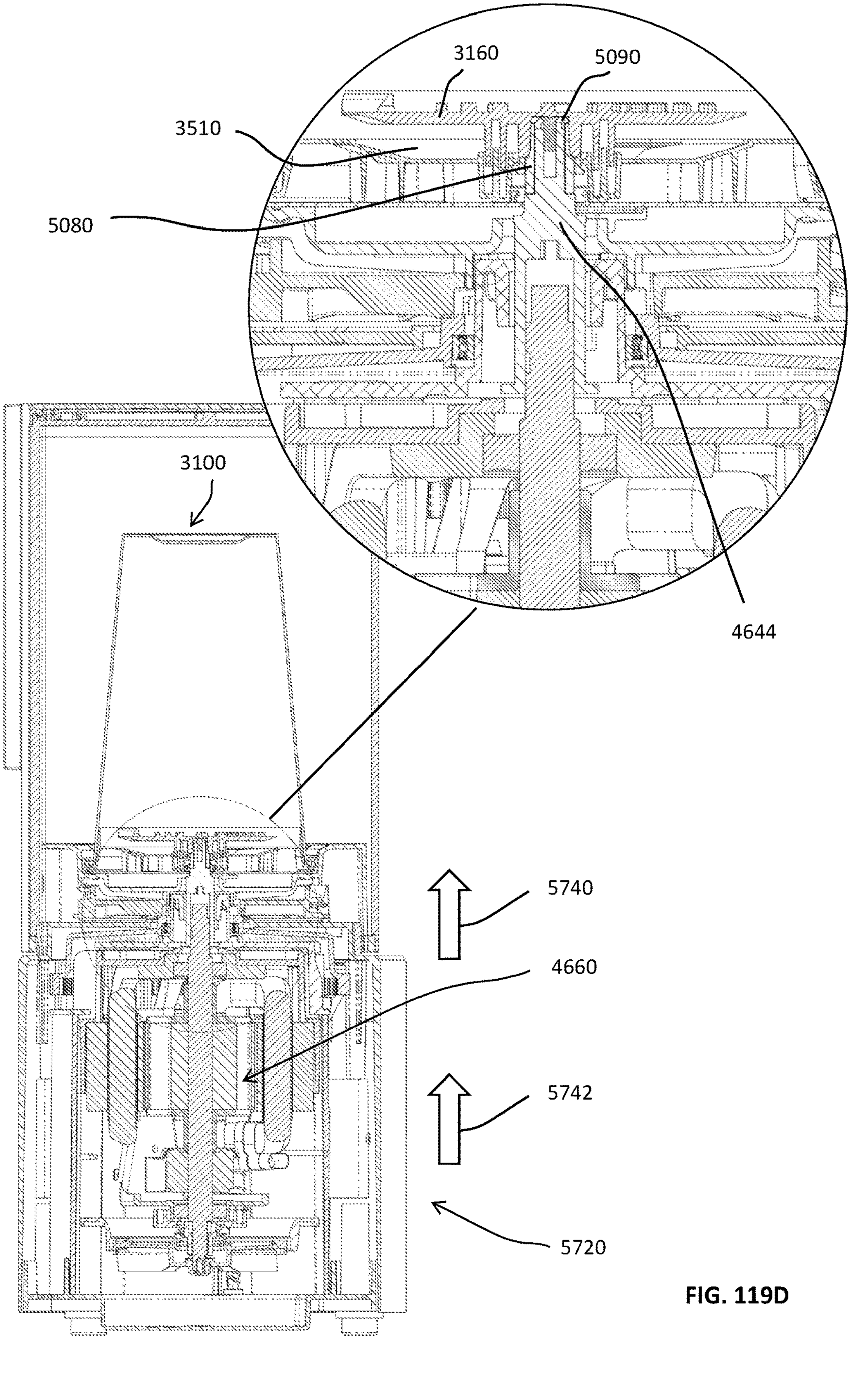

FIG. 119D shows further upward vertical displacement of outer drive shaft assembly 4644, as indicated by an arrow 5740, which results from further upward displacement of the axially displaceable rotary drive assembly 4660, as indicated by an arrow 5742. The outer drive shaft assembly 4644 remains in fully seated engagement with blade 3160 of SUPCA 3100 and upwardly displaces the blade 3160 out of blade receiving recess 3510. The protrusions 5122 of the grip element 5090 remain azimuthally aligned with the splines 5094 of the blade engagement element 5080, however, upon rotation of the outer drive shaft assembly 4644, the protrusions 5122 tend to rotate azimuthally ahead of splines 5094 and lockingly engage blade 3160.

Reference is now made to FIGS. 120A, 120B, 120C and 120D, which are simplified sectional illustrations taken along a central cross section of the MMIDD of FIG. 68, having an outer drive shaft assembly 4646, as shown in FIGS. 88A-88E, with the SUPCA 3160 as shown in FIGS. 60A-60I, having blade 3550 as shown in FIGS. 64A-64F, illustrating blade engagement and sealing functionality thereof in four operative orientations. FIGS. 120A-120D illustrate operative orientations which correspond to those shown in FIGS. 118A-118D but illustrate an embodiment of the MMIDD, here designated MMIDD 5750, having an outer drive shaft 4646.

Figure 120A:
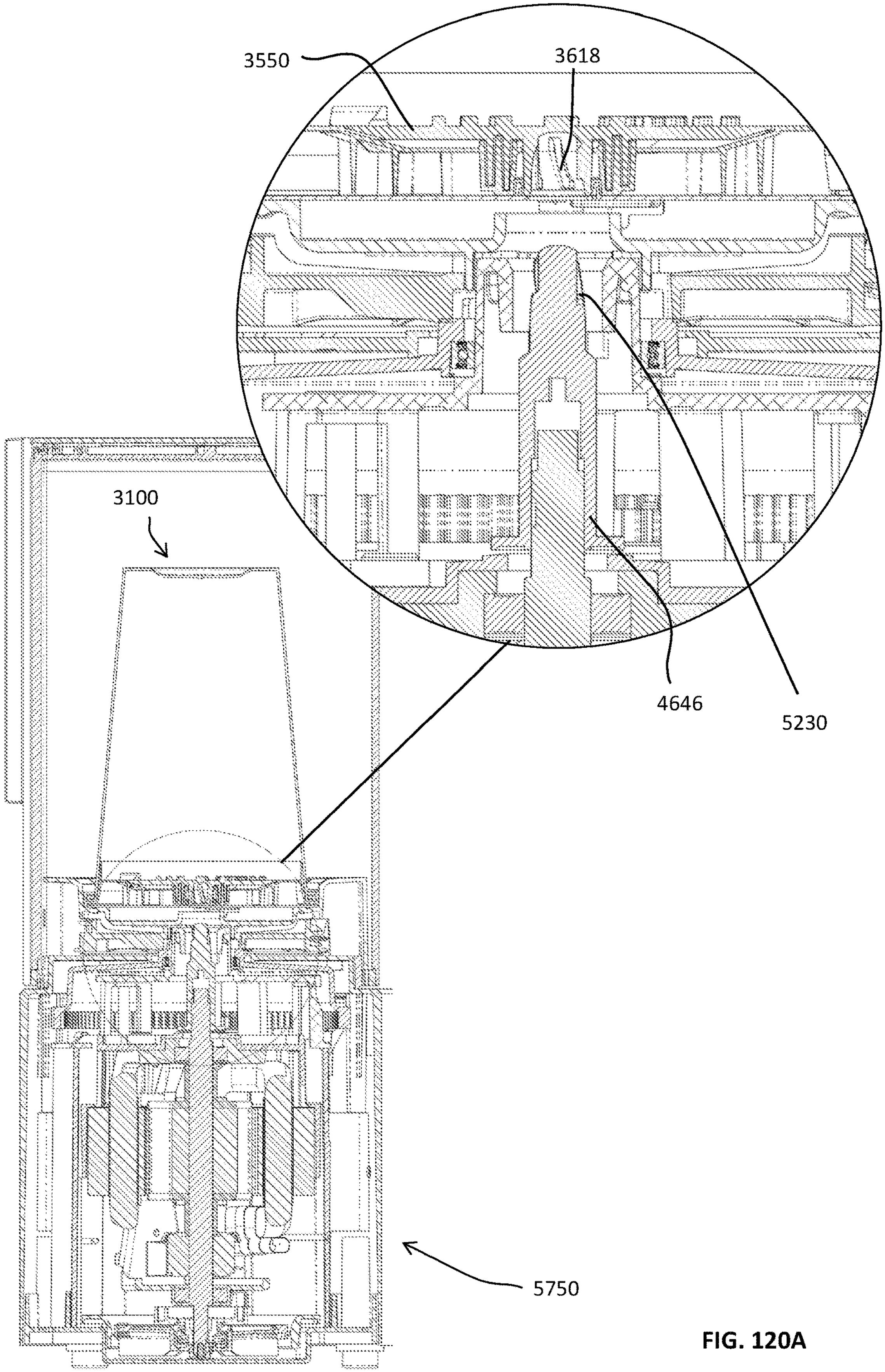

FIG. 120A shows MMIDD 5750 in its rest position and SUPCA 3100 having blade 3550, as shown in FIGS. 64A-64F, in seated engagement with SUPCASCA of MMIDD 5750. The top of outer drive shaft assembly 4646 lies below and out of engagement with SUPCA 3100. It is noted that lower portions of curved splines 3618 of blade 3550 are azimuthally aligned with top portions of curved recesses 5230 of outer drive shaft assembly 4646, in order that fully seated engagement between the outer drive shaft assembly 4646 and the blade 3550 may be readily achieved by relative axial displacement therebetween followed by relative rotational displacement therebetween.

Figure 120B:
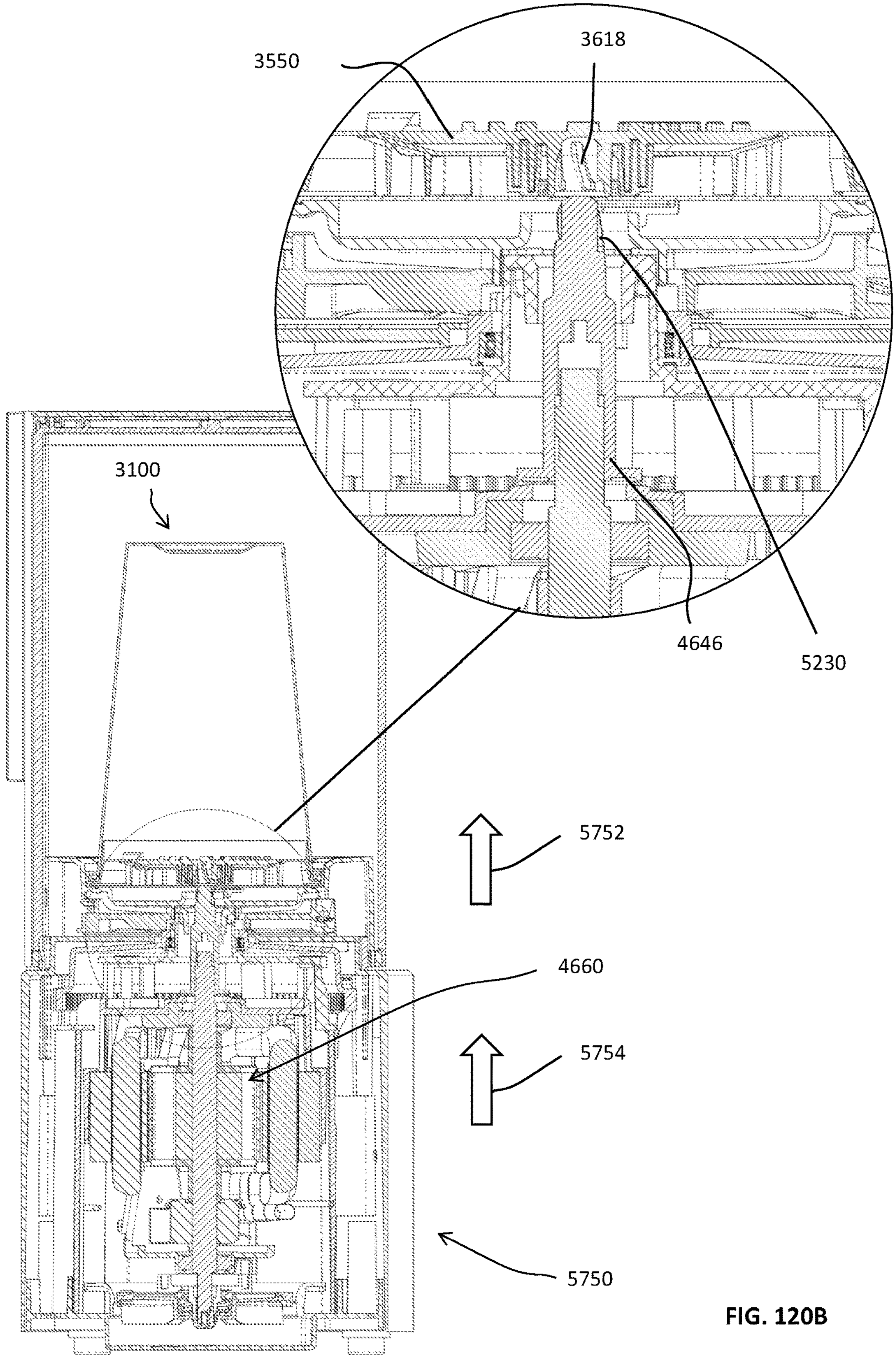

FIG. 120B shows upward vertical displacement of outer drive shaft assembly 4646, as indicated by an arrow 5752, which results from upward displacement of the axially displaceable rotary drive assembly 4660, as indicated by an arrow 5754. The top of outer drive shaft assembly 4646 lies at, but not yet in engagement with, blade 3550 of SUPCA 3100. Lower portions of curved splines 3618 of blade 3550 remain azimuthally aligned with top portions of curved recesses 5230 of outer drive shaft assembly 4646.

Figure 120C:
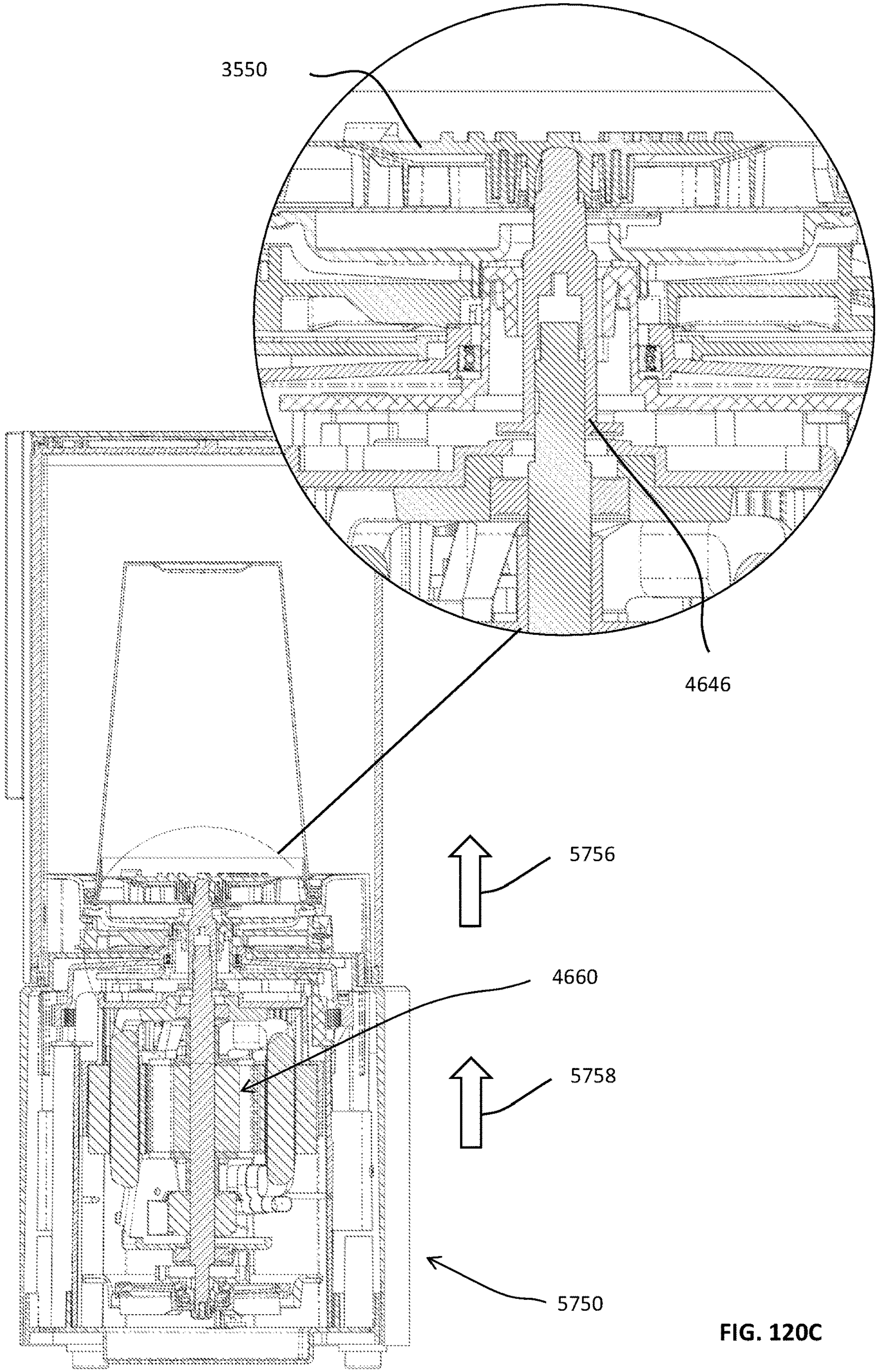

FIG. 120C shows further upward vertical displacement of outer drive shaft assembly 4646, as indicated by an arrow 5756, which results from further upward displacement of the axially displaceable rotary drive assembly 4660, as indicated by an arrow 5758. The outer drive shaft assembly 4646 is in full engagement with blade 3550, such that curved splines 3618 of blade 3550 are fully engaged with curved recesses 5230 of outer drive shaft assembly 4646.

Figure 120D:
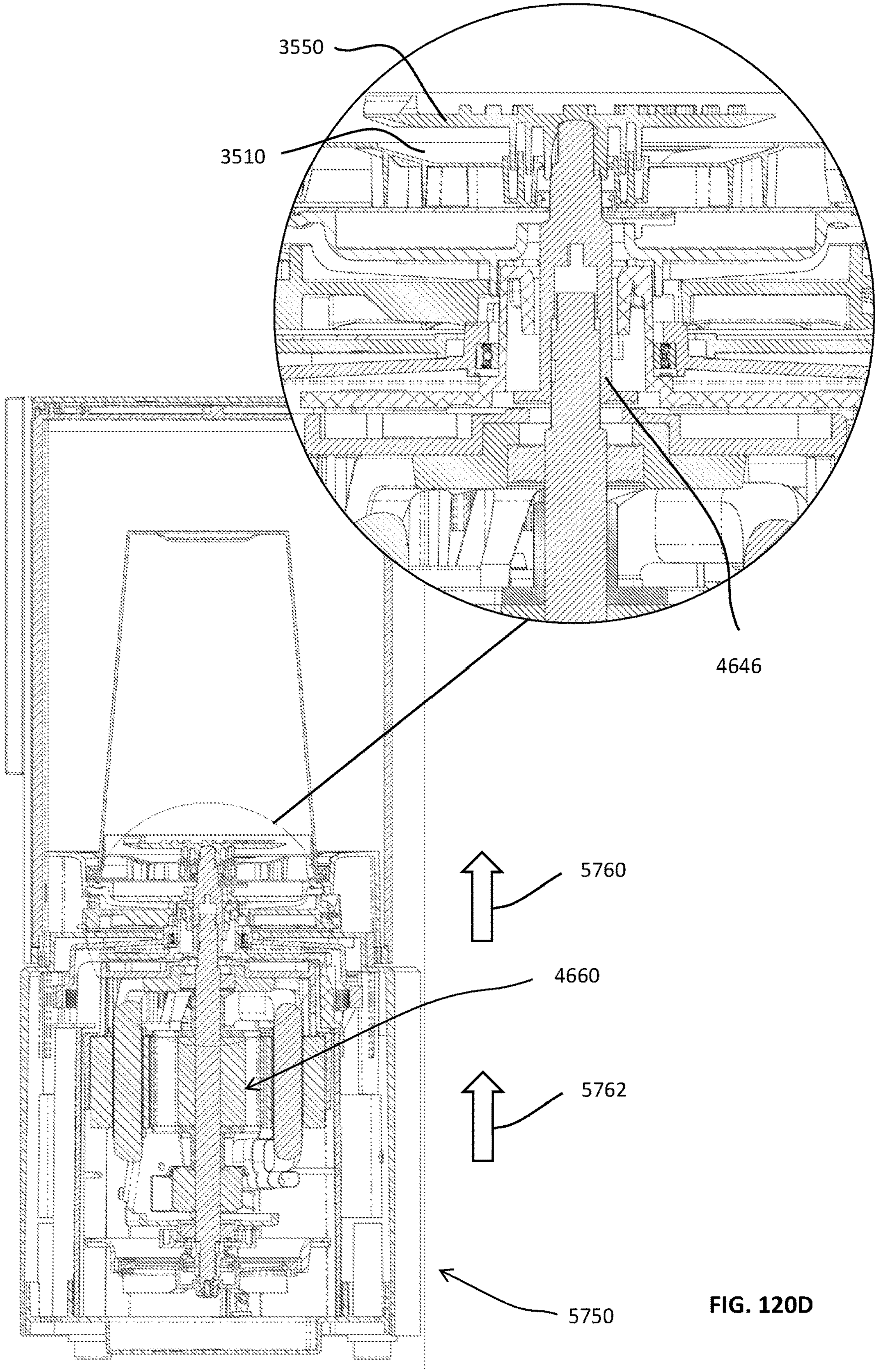

FIG. 120D shows further upward vertical displacement of outer drive shaft assembly 4646, as indicated by an arrow 5760, which results from further upward displacement of the axially displaceable rotary drive assembly 4660, as indicated by an arrow 5762. The outer drive shaft assembly 4646 remains in fully seated engagement with blade 3550 and upwardly displaces the blade 3550 out of blade receiving recess 3510. Curved splines 3618 of blade 3550 remain fully engaged with curved recesses 5230 of outer drive shaft assembly 4646 and produce a bayonet-type engagement therebetween.

Reference is now made to FIGS. 121A, 121B and 121C, which are simplified sectional illustrations taken along a central cross section of the MMIDD of FIG. 68 having an outer drive shaft assembly 4644, as shown in FIGS. 82A-87D, with the SUPCA 4100, as shown in FIGS. 65A-65C, illustrating blade engagement and sealing functionality thereof in three operative orientations. FIGS. 121A-121C illustrate operative orientations which correspond to those shown in FIGS. 118A, 118B & 118D but illustrate an embodiment of the MMIDD, here designated MMIDD 5720, having an outer drive shaft 4644.

FIG. 121A shows MMIDD 5720 in its rest position and SUPCA 4100, as shown in FIGS. 65A-65C, in seated engagement with SUPCASCA of MMIDD 5720. The top of grip element 5090 of outer drive shaft assembly 4644 lies below and out of engagement with SUPCA 4100. The protrusions 5122 of the grip element 5090 are azimuthally aligned with the splines 5094 of the blade engagement element 5080. It is noted that splines 418 of blade 4150 are azimuthally aligned with recesses defined between circumferentially distributed splines 5094 of outer drive shaft assembly 4644, in order that fully seated engagement between the outer drive shaft assembly 4644 and the blade 4150 may be achieved by relative axial displacement therebetween.

FIG. 121B shows upward vertical displacement of outer drive shaft assembly 4644, as indicated by an arrow 5764, which results from upward displacement of the axially displaceable rotary drive assembly 4660, as indicated by an arrow 5766. The top of grip element 5090 of outer drive shaft assembly 4644 lies at, but not yet in engagement with, SUPCA 4100. The protrusions 5122 of the grip element 5090 remain azimuthally aligned with the splines 5094 of the blade engagement element 5080. Splines 418 of blade 4150 remain azimuthally aligned with recesses defined between circumferentially distributed splines 5094 of outer drive shaft assembly 4644.

FIG. 121C shows further upward vertical displacement of outer drive shaft assembly 4644, as indicated by an arrow 5768, which results from further upward displacement of the axially displaceable rotary drive assembly 4660, as indicated by an arrow 5770. The outer drive shaft assembly 4644 is in fully seated engagement with blade 4150 of SUPCA 4100. The protrusions 5122 of the grip element 5090 remain azimuthally aligned with the splines 5094 of the blade engagement element 5080. Upon rotation of the outer drive shaft assembly 4644, the protrusions 5122 tend to rotate azimuthally ahead of splines 5094 and lockingly engage blade 4150.

Reference is now made to FIGS. 122A, 122B and 122C, which are simplified sectional illustrations taken along a central cross section of the MMIDD of FIG. 68, having an outer drive shaft assembly 4646 as shown in FIGS. 88A-88E, with the SUPCA 4200 as shown in FIGS. 65D-65F, having blade 4250 as shown in FIG. 65E, illustrating blade engagement and sealing functionality thereof in three operative orientations. FIGS. 122A-122C illustrate operative orientations which correspond to those shown in FIGS. 118A, 118B & 118D but illustrate an embodiment of the MMIDD, here designated MMIDD 5750, having an outer drive shaft 4646.

FIG. 122A shows MMIDD 5750 in its rest position and SUPCA 4100, having blade 4250 as shown in FIG. 65E, in seated engagement with SUPCASCA of MMIDD 5750. The top of outer drive shaft assembly 4646 lies below and out of engagement with SUPCA 4200. It is noted that lower portions of curved splines 4292 of blade 4250 are azimuthally aligned with top portions of curved recesses 5230 of outer drive shaft assembly 4646, in order that fully seated engagement between the outer drive shaft assembly 4646 and the blade 4250 may be readily achieved by relative axial displacement therebetween followed by relative rotational displacement therebetween.

FIG. 122B shows upward vertical displacement of outer drive shaft assembly 4646, as indicated by an arrow 5772, which results from upward displacement of the axially displaceable rotary drive assembly 4660, as indicated by an arrow 5774. The top of outer drive shaft assembly 4646 lies at, but not yet in engagement with, blade 4250 of SUPCA 4200. Lower portions of curved splines 4292 of blade 4250 remain azimuthally aligned with top portions of curved recesses 5230 of outer drive shaft assembly 4646, FIG. 122C shows further upward vertical displacement of outer drive shaft assembly 4646, as indicated by an arrow 5776, which results from further upward displacement of the axially displaceable rotary drive assembly 4660, as indicated by an arrow 5778. The outer drive shaft assembly 4646 is in full engagement with blade 4250, such that curved splines 4292 of blade 4250 are fully engaged with curved recesses 5230 of outer drive shaft assembly 4646. Engagement of curved splines 4292 of blade 4250 with curved recesses 5230 of outer drive shaft assembly 4646 produce a bayonet-type engagement therebetween.

Reference is now made to FIGS. 123A, 123B, 123C, 123D, 123E and 123F, which are simplified respective planar side, planar front, planar top, planar bottom, pictorial and exploded view illustrations of a further preferred embodiment of a multiple motion intelligent driving device (MMIDD) 6000, in a door open operative orientation, useful with any suitable embodiment of a SUPCA described hereinabove, and to FIG. 123G, which is a simplified pictorial illustration corresponding to FIG. 123E in a door closed operative orientation.

As seen in FIGS. 123A-123G, MMIDD 6000 includes a top housing assembly 6010, which is shown in FIGS. 123A-123F and in FIG. 123G in respective door open and door closed operative orientations. The top housing assembly 6010 is supported on a base assembly 6020, which includes a SUPCA support (SUPCAS) 6030, which is surrounded by the top housing assembly 6010, when it is in a door closed operative orientation.

Figure 124A:
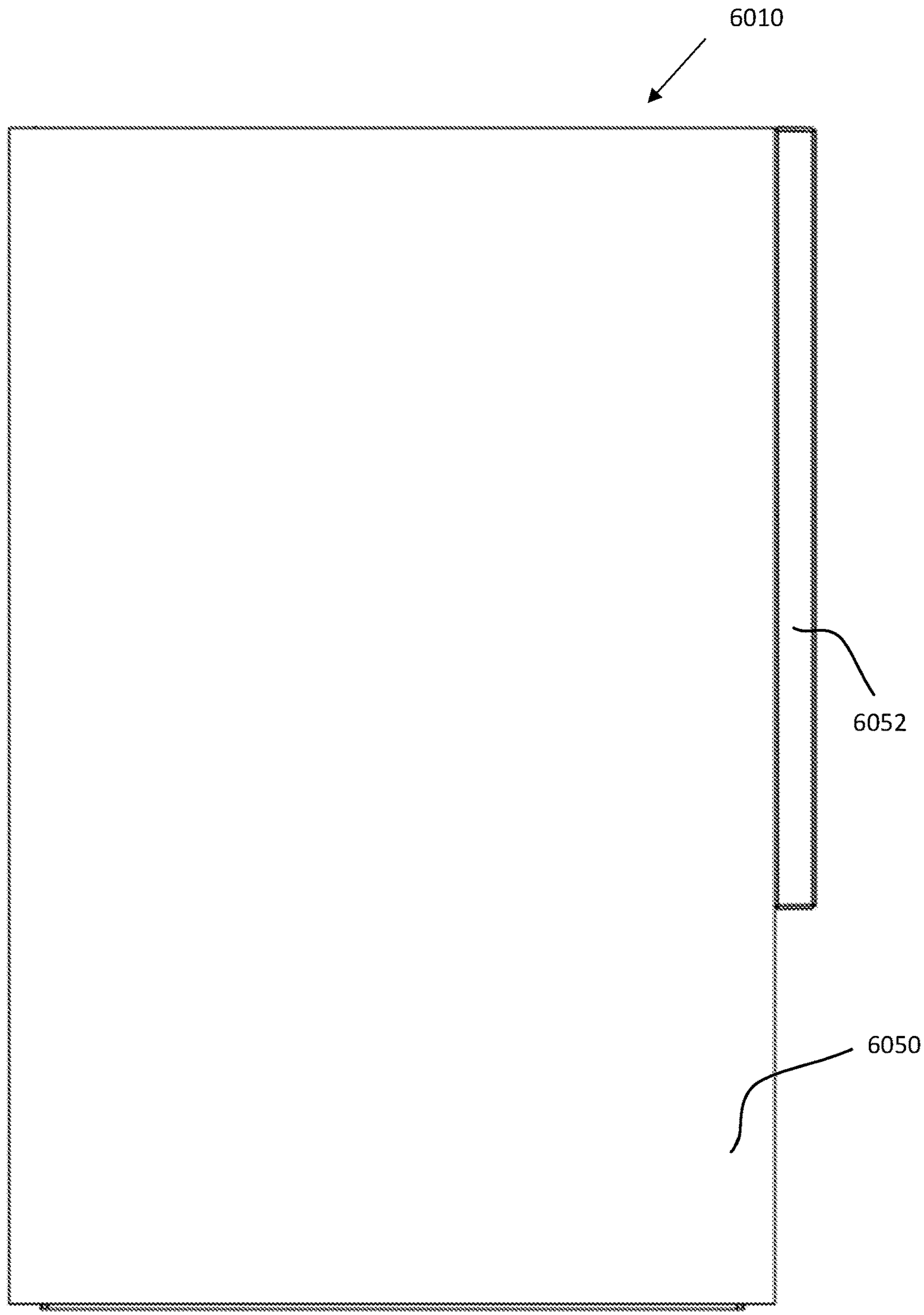
Figure 124B:
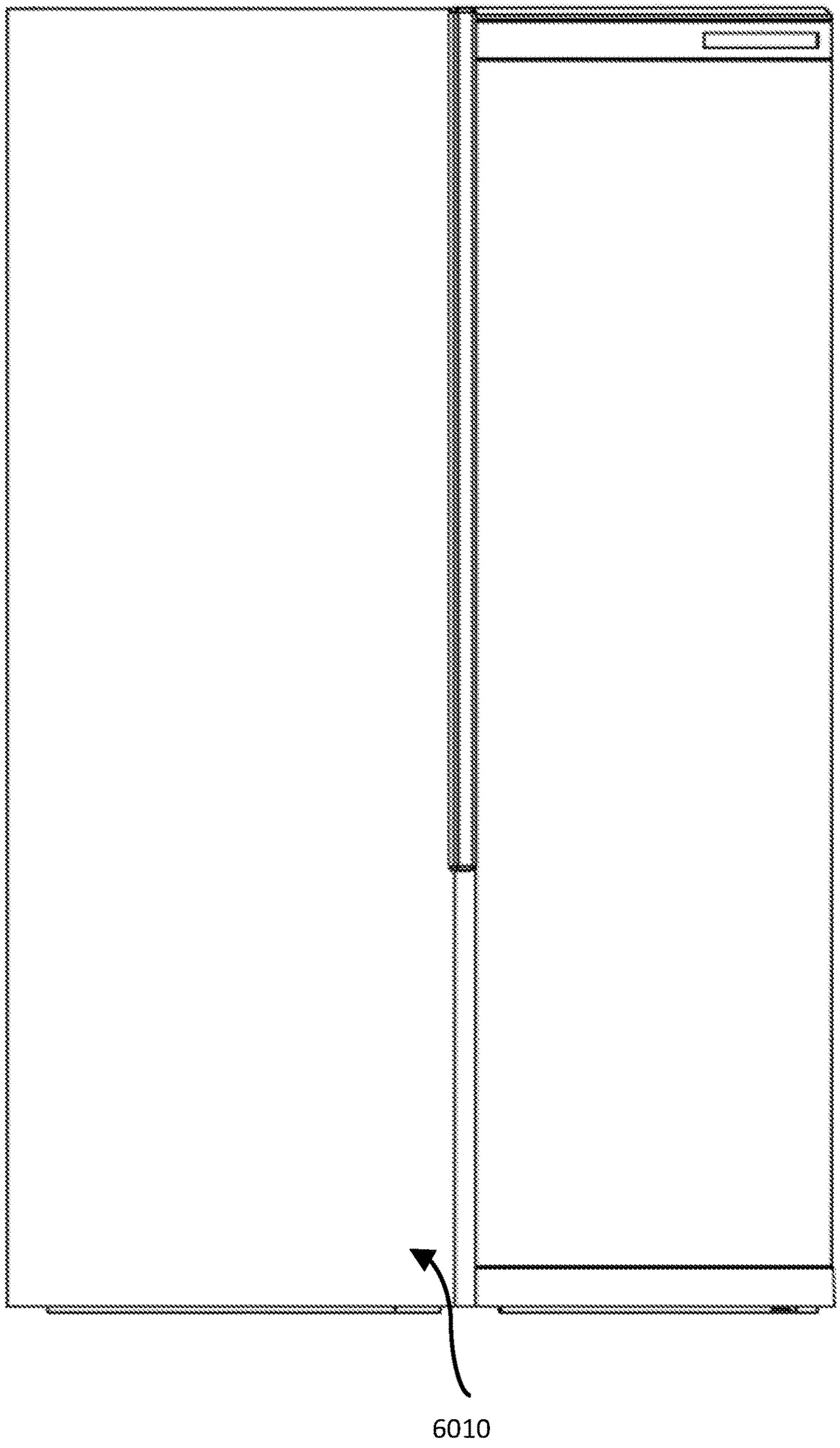
Figure 124C:
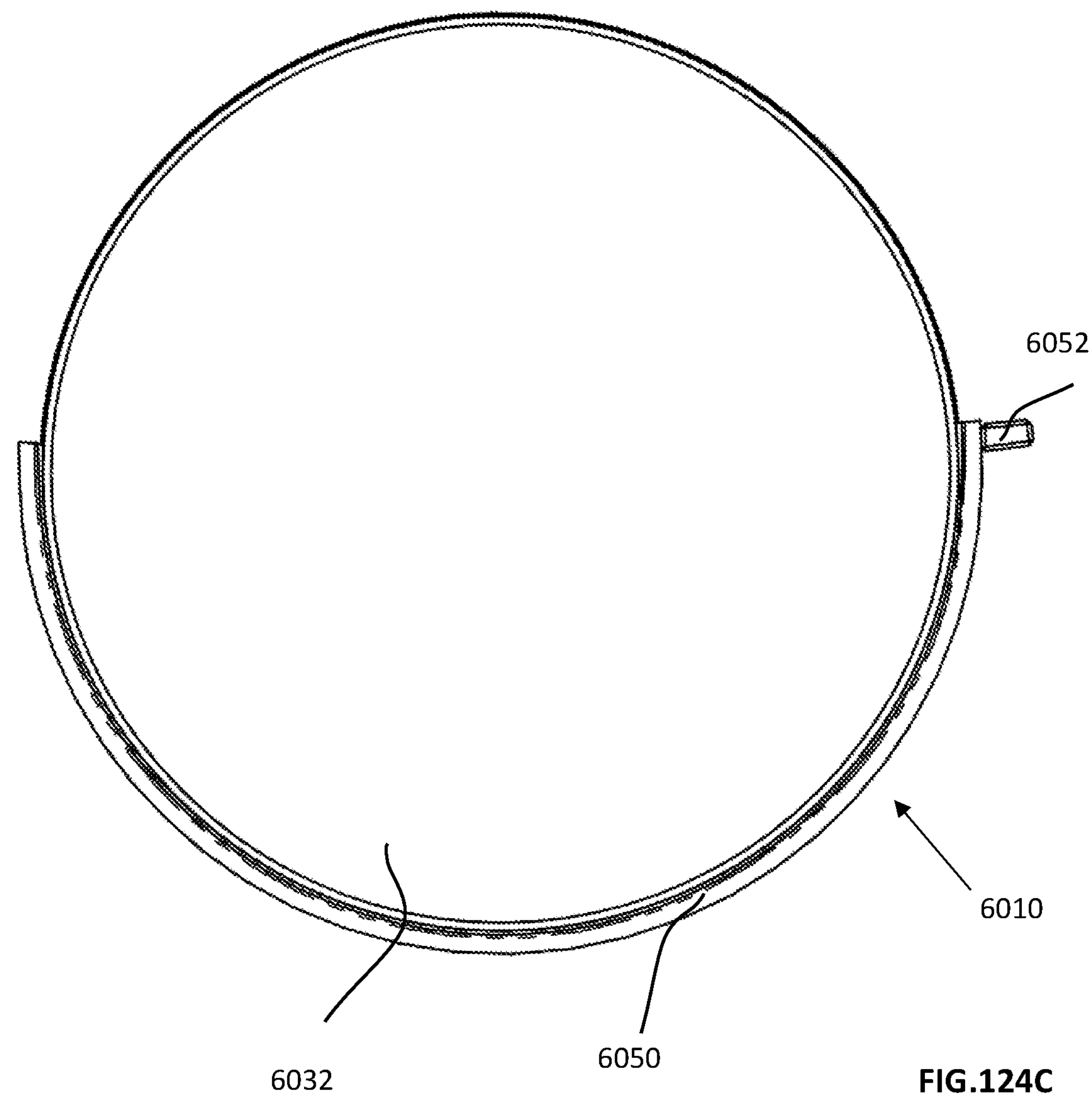
Figure 124D:
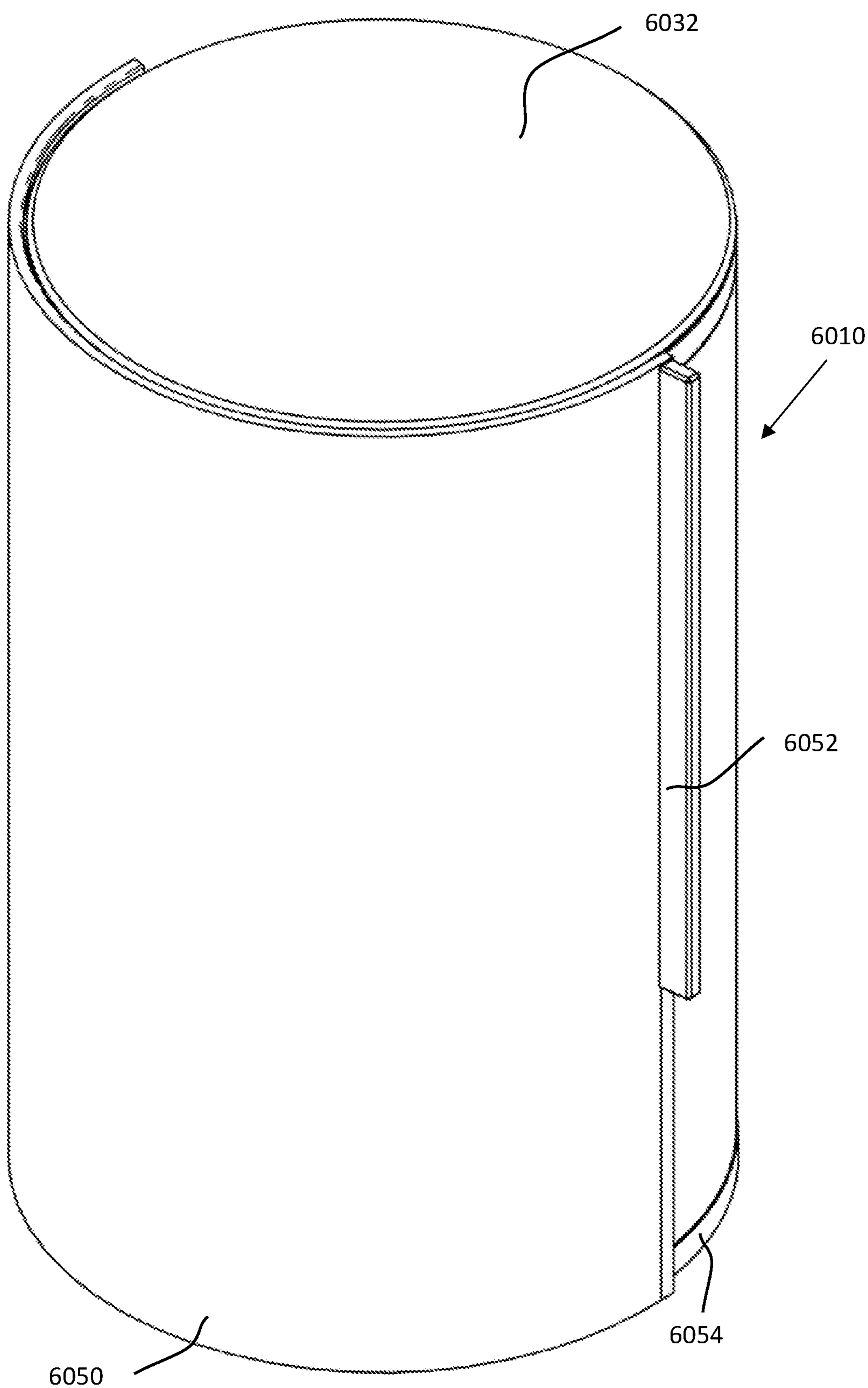
Figure 124E:
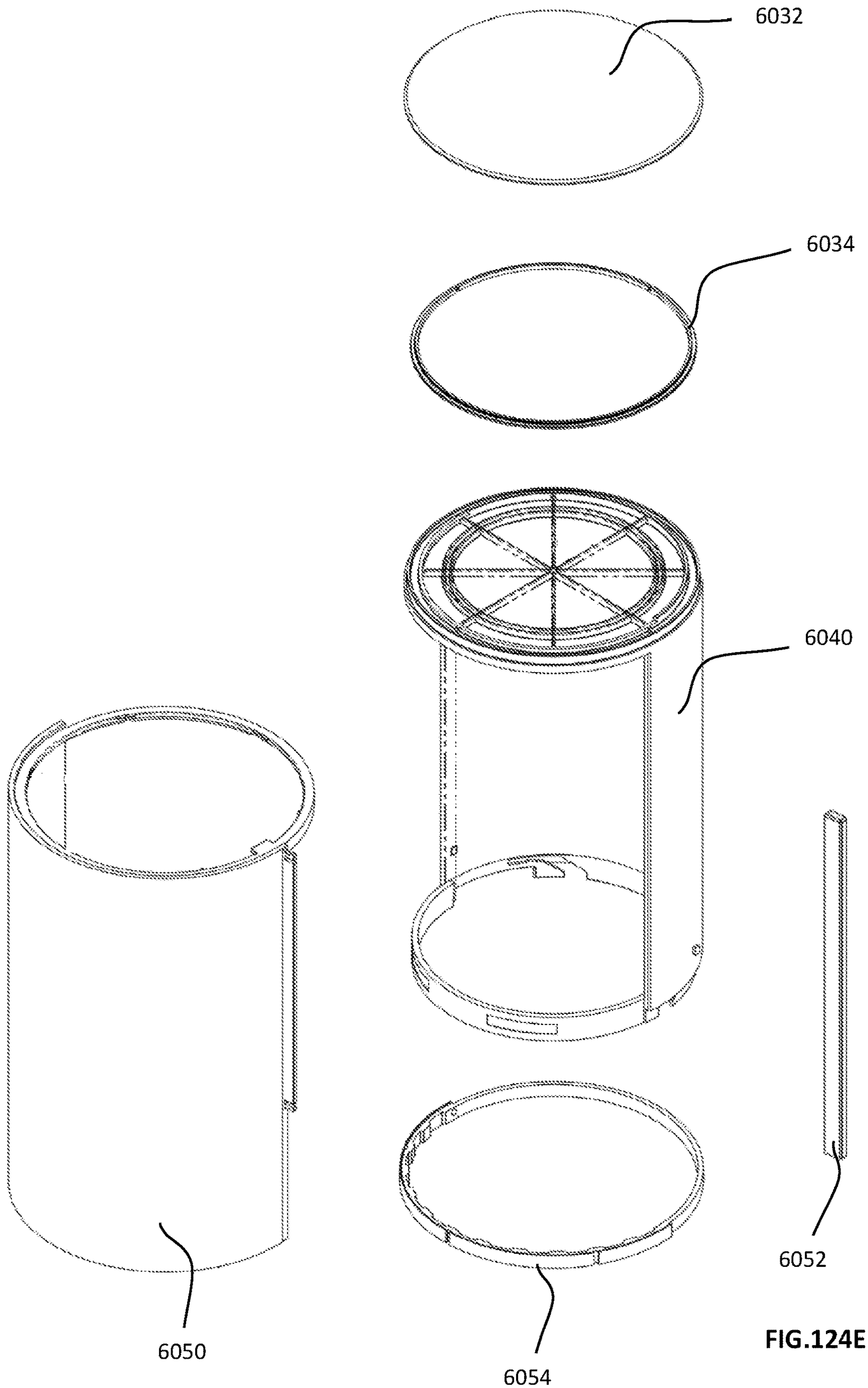
Figure 125A:
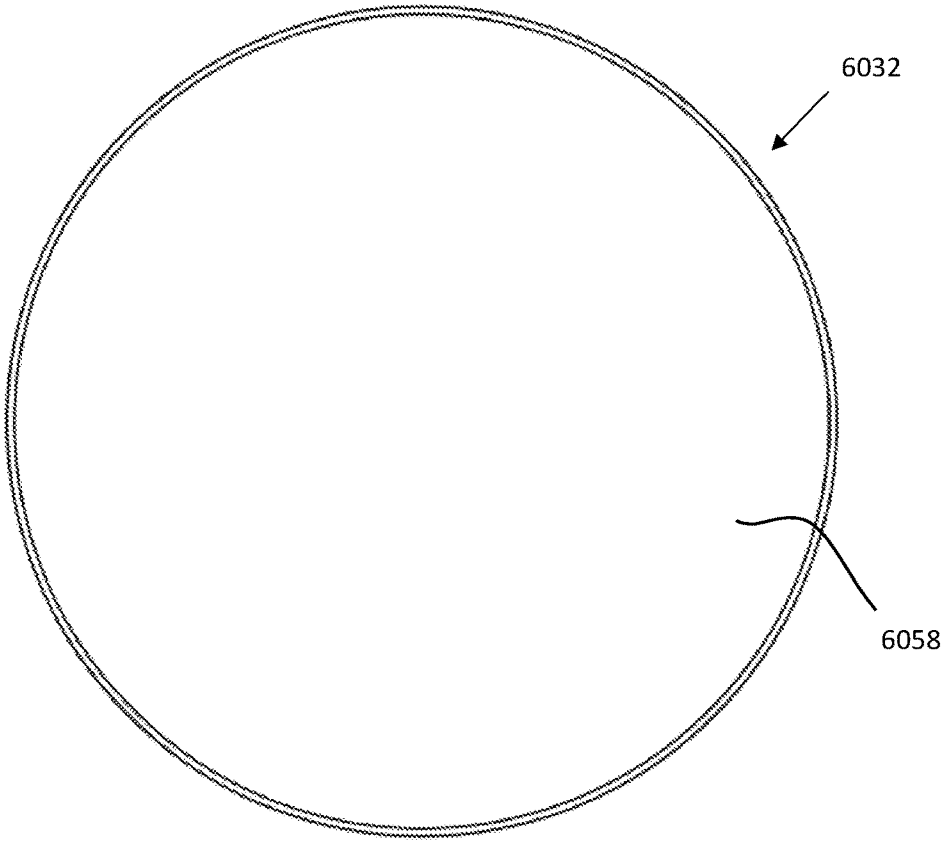
Figure 125B:
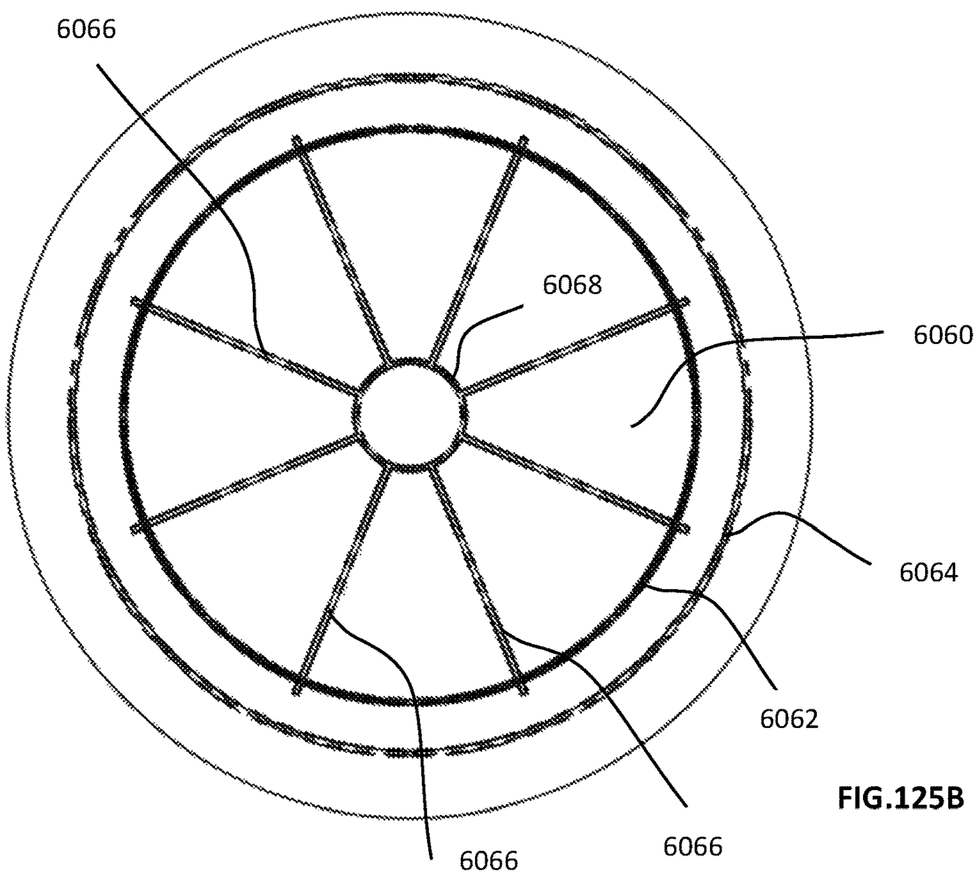
Figure 125C:
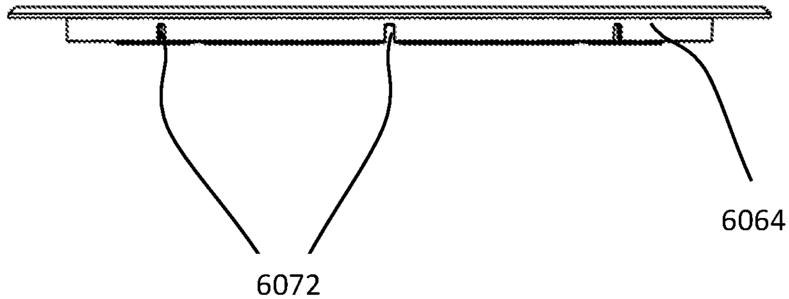
Figure 125D:
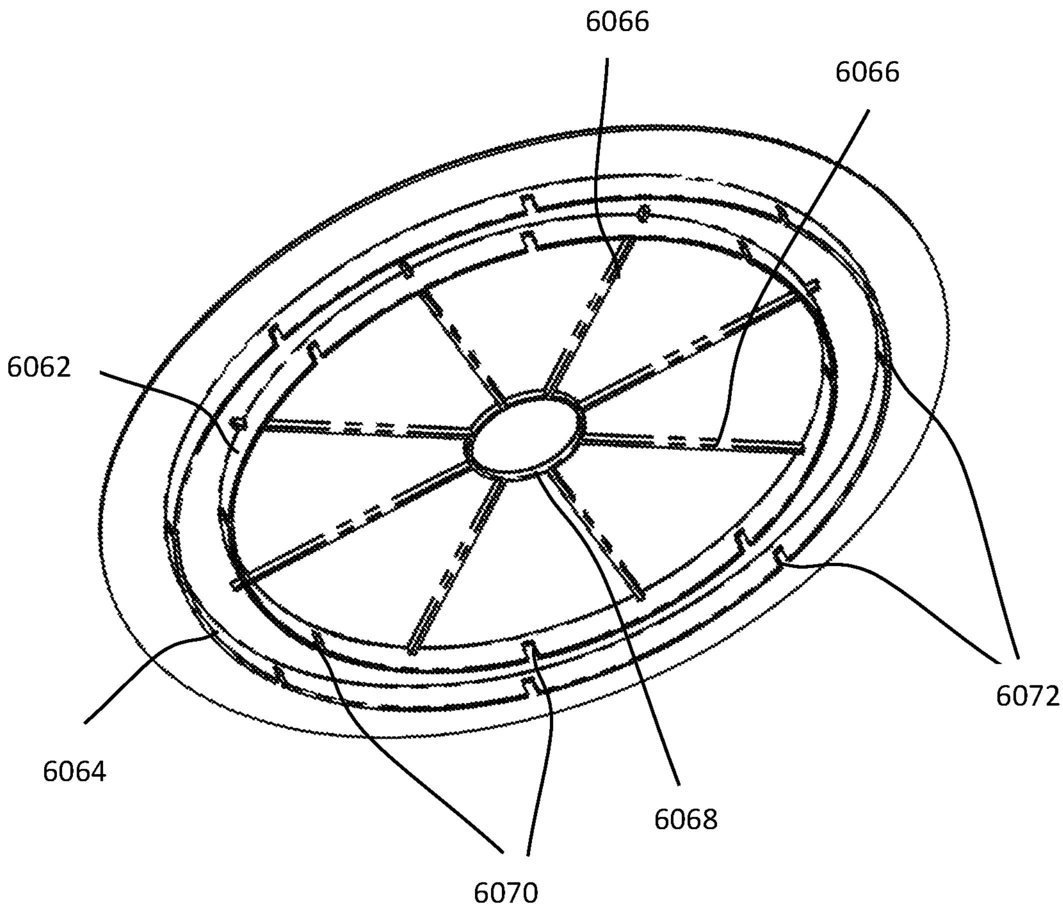

Reference is now made additionally to FIGS. 124A, 124B, 124C. 124D and 124E, which are simplified respective planar front, planar side, planar top, pictorial and exploded view illustrations of top housing assembly 6010 of the MMIDD 6000 of FIGS. 123A-123G in the door closed operative orientation of FIG. 123G.

As seen in FIGS. 124A-124E, top housing assembly 6010 comprises a top cover 6032, an upper movable housing element bearing ring 6034, a static housing element 6040, a movable housing element 6050, a handle 6052 and a lower movable housing element bearing ring 6054.

Reference is now made to FIGS. 125A, 125B, 125C and 125D, which are simplified respective planar top, planar bottom, planar side and pictorial illustrations of top cover 6032 of the top housing assembly of FIGS. 124A-124E. Top cover 6032 is a generally disk-like unitary element preferably having a generally planar upper outside surface 6058 and a bottom ribbed inside surface 6060. Inner surface 6060 includes respective inner and outer circular depending ribs 6062 and 6064, as well as an array of radially extending shallow ribs 6066, which extend outwardly from a circular shallow rib 6068. Respective inner and outer circular depending ribs 6062 and 6064 are provided with respective pluralities of mutually azimuthally aligned slots 6070 and 6072 distributed along the extent thereof.

Reference is now made to FIG. 126, which is a simplified illustration of upper movable housing element bearing ring 6034. As seen in FIG. 126, ring 6034 has a generally L-shaped cross section including an interior upstanding ring portion 6076 and an exterior annular ring portion 6078. It is further seen that interior upstanding ring portion 6076 is formed with a plurality of azimuthally evenly distributed interior-facing notches 6080.

Reference is now made to FIGS. 127A, 127B, 127C and 127D, which are simplified respective planar front, planar side, planar top and pictorial illustrations of static housing element 6040. As seen in FIGS. 127A-127D, static housing element 6040 preferably includes a generally planar top portion 6092 having a generally planar lower inside surface 6098 and a ribbed upper outside surface 6100. Ribbed upper outside surface 6100 is preferably formed with four mutually concentric circular upstanding ribs 6102, 6104, 6106 and 6108 as well as an array of radially extending ribs 6110, which extend outwardly from a center 6112 into intersection with ribs 6102, 6104 and 6106. Rib 6106 is formed with a semicircular raised portion 6114, which defines a pair of shoulders 6116 and 6118 and extends slightly more than 180 degrees in azimuth about a rotation axis 6120 extending through center 6112. Shoulders 6116 and 6118 limit rotation of the movable housing element 6050 relative to the static housing element 6040, about a rotation axis 6120, to approximately 180 degrees.

Static housing element 6040 includes a semicylindrical wall portion 6130, having mutually facing edges 6132 and 6134, which extends slightly more than 180 degrees in azimuth about axis 6120. A depending semicylindrical ring portion 6140 joins mutually facing edges 6132 and 6134 and top portion 6092. An upstanding semicylindrical ring portion 6150 joins mutually facing edges 6132 and 6134 at a bottom edge 6152 of semicylindrical wall portion 6130. Semicylindrical ring portion 6150 is recessed slightly inwardly with respect to semicylindrical wall portion 6130 and extends slightly beyond mutually facing edges 6132 and 6134 to overlap locations 6154 and 6155, respectively, on an interior surface 6156 of semicylindrical wall portion 6130 adjacent to respective edges 6132 and 6134. Overlap locations 6154 and 6155 define respective shoulders 6157 and 6158 with respect to interior surface 6156.

Semicylindrical wall portion 6130 also includes a generally smooth outer surface 6162 having an inwardly-recessed bottom ring portion 6164 adjacent bottom edge 6152. A plurality of bayonet sockets 6170, preferably three in number, are distributed along inwardly-recessed bottom ring portion 6164. A plurality of inwardly extending recesses 6172, preferably three in number, are distributed along interior surface 6156 adjacent ring portion 6164 and arranged to each form an extension of a bayonet socket 6170.

Semicylindrical ring portion 6150 has a generally smooth outer facing surface 6180 and is preferably formed with a pair of generally rectangular curved recesses 6182.

Reference is now made to FIGS. 128A, 128B, 128C and 128D, which are simplified respective planar front, planar side, planar top and pictorial illustrations of movable housing element 6050 forming part of top housing assembly 6010 of MMIDD 6000, and to FIG. 129, which is a simplified illustration of handle 6052.

Figure 128A:
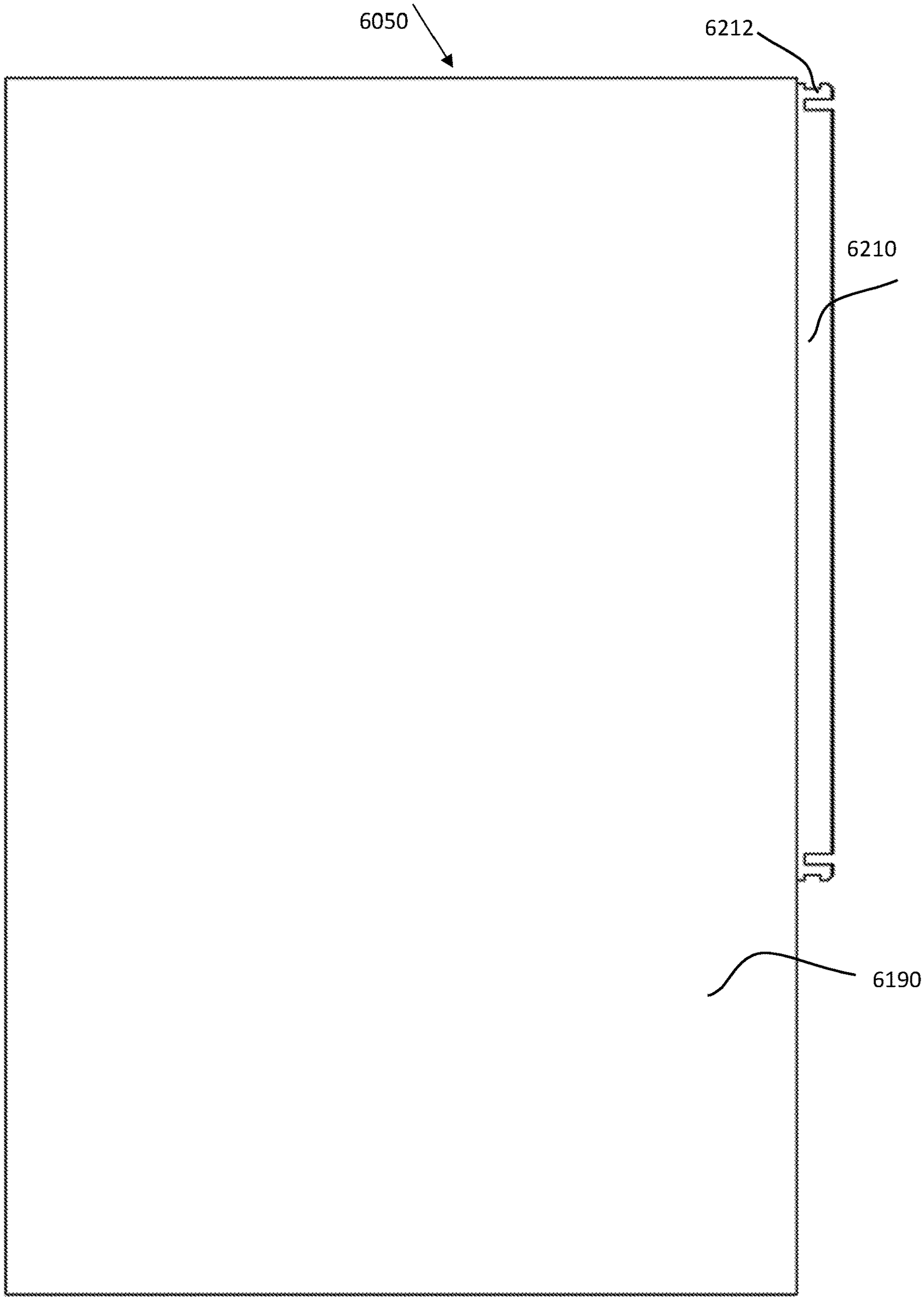
Figure 128B:
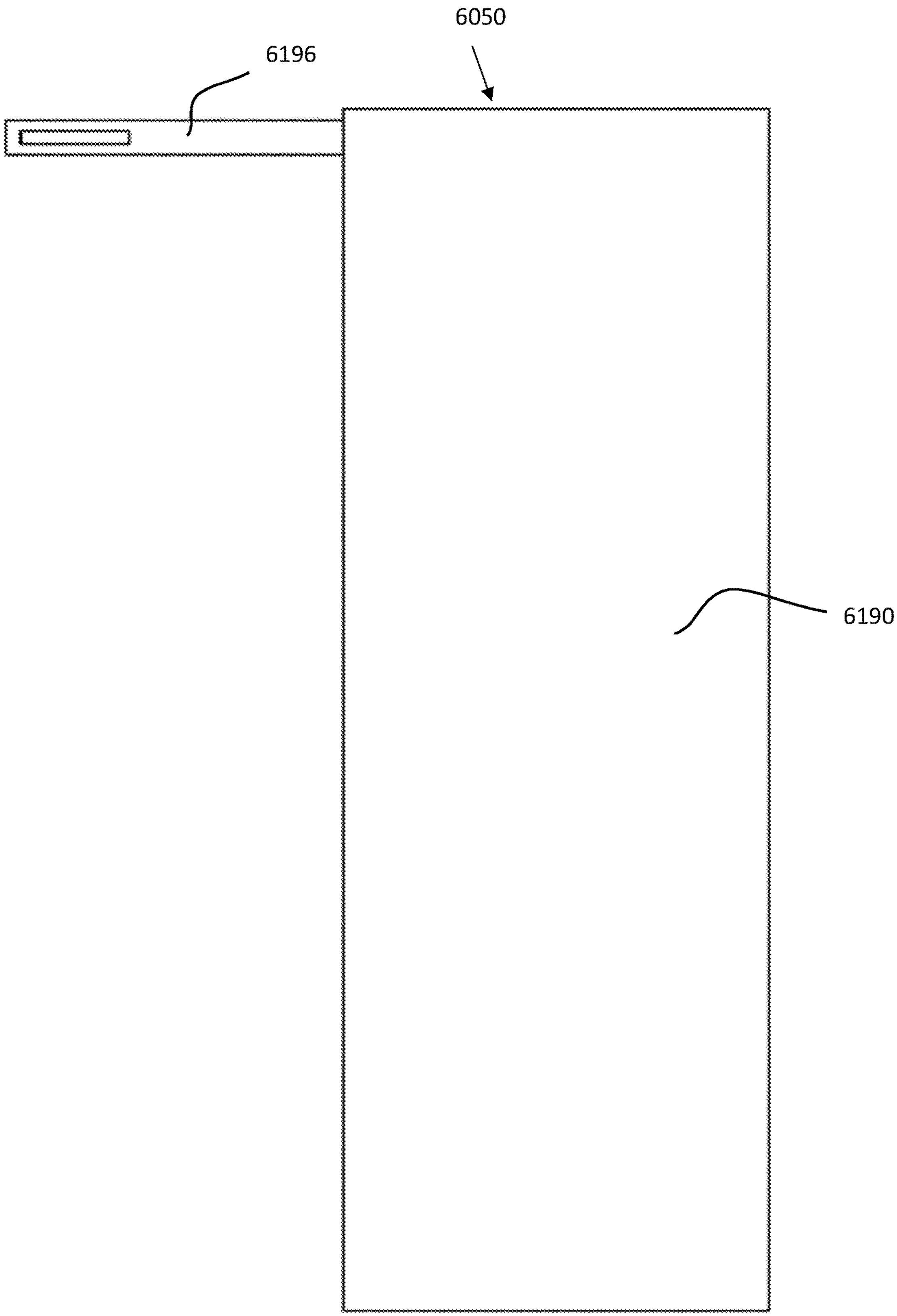
Figure 128C:
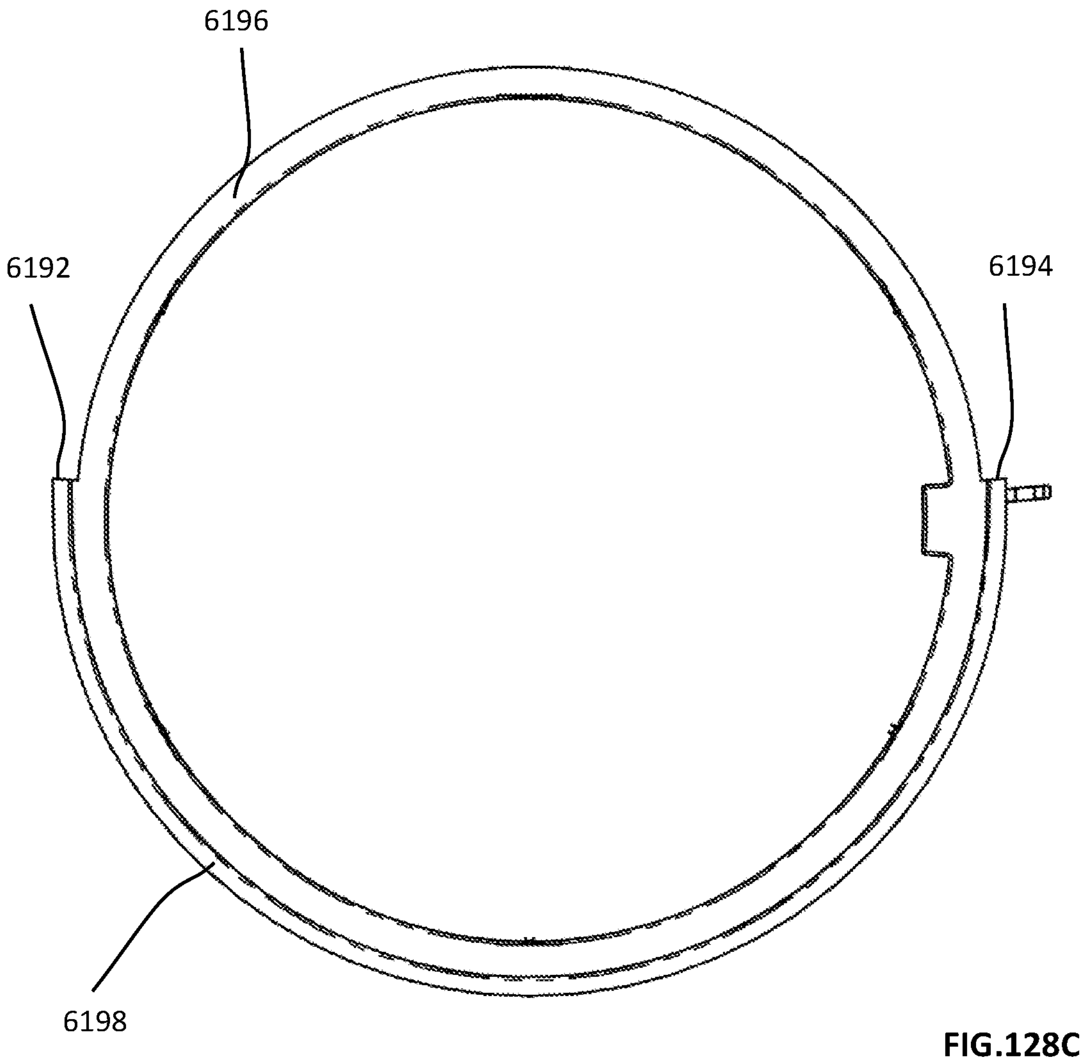
Figure 128D:
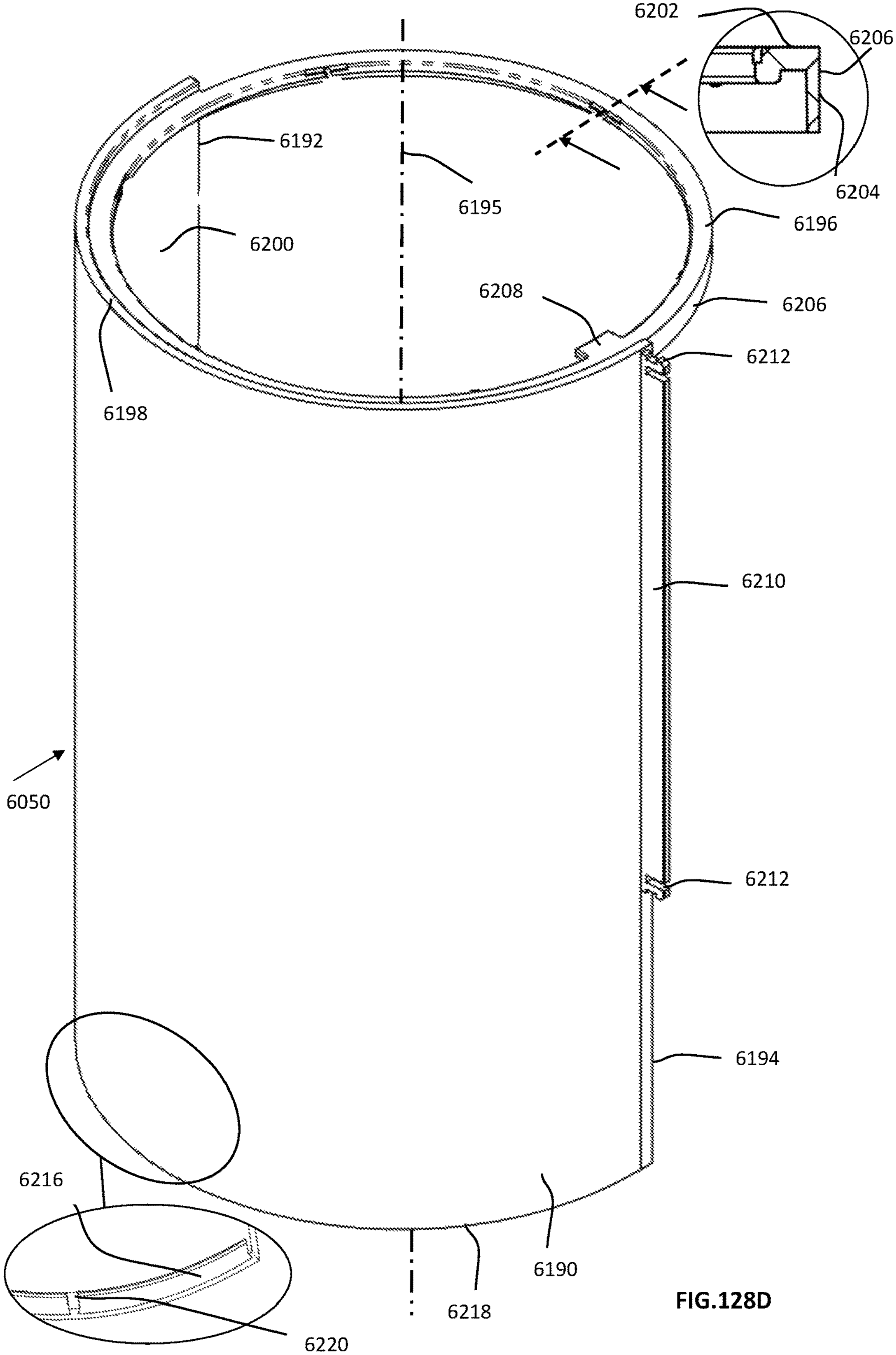

As seen in FIGS. 128A-129, movable housing element 6050 preferably includes a semicylindrical wall portion 6190, having mutually facing edges 6192 and 6194, which extends slightly more than 180 degrees in azimuth about an axis 6195 of a depending semicylindrical ring portion 6196. Depending semicylindrical ring portion 6196 joins mutually facing edges 6192 and 6194 adjacent an upper edge 6198 of semicylindrical wall portion 6190 and extends along an inner facing surface 6200 thereof. Ring portion 6196 preferably has a generally L-shaped cross section, including a cylindrical inner facing annular portion 6202 and an outer facing depending portion 6204.

Outer facing depending portion 6204 has a circular outer surface 6206, which lies along inner facing surface 6200. Formed on inner facing annular portion 6202 of ring portion 6196 is a rotation limiting inwardly-directed protrusion 6208 which interacts with shoulders 6116 and 6118 of static housing element 6040 (FIGS. 127C and 127D) for limiting the extent of rotation of the movable housing element 6050 relative to the static housing element 6040.

Extending outwardly from semicylindrical wall portion 6190 adjacent edge 6194 thereof is a handle mount protrusion 6210 having a pair of flexible snap connection portions 6212 at top and bottom edges thereof. Handle 6052 is preferably fixedly snapped onto handle mount protrusion 6210 and retained thereon by engagement of flexible snap connection portions 6212 with undercuts 6214 formed at the interior of handle 6052.

Semicylindrical wall portion 6190 is preferably formed with an inwardly facing recess 6216 adjacent a bottom edge 6218 thereof. A plurality of azimuthally distributed mounting protrusions 6220 extend inwardly at recess 6216.

Reference is now made to FIGS. 130A, 130B and 130C, which are simplified planar side, planar top and pictorial illustrations of lower movable housing element bearing ring 6054. As seen in FIGS. 130A-130C, bearing ring 6054 is a generally circular ring having a first generally smooth hemispherical outer surface 6230 having azimuthal edges 6232 and 6234 and a second generally smooth hemispherical outer surface 6236 joining azimuthal edges 6232 and 6234. Second generally smooth hemispherical outer surface 6236 extends slightly radially outwardly with respect to first hemispherical outer surface 6230 and defines shoulders with respect thereto at azimuthal edges 6232 and 6234. Second generally smooth hemispherical outer surface 6236 is preferably formed with a plurality of azimuthally distributed outwardly facing notches 6240, which are engaged by azimuthally distributed mounting protrusions 6220 (FIG. 128D) when bearing ring 6054 is mounted onto movable housing element 6050, preferably by ultrasonic welding.

Preferably, bearing ring 6054 has a generally smooth circular inner surface 6250 having an array of uniformly mutually spaced inner facing notches 6252 distributed along a hemispherical azimuthal extent thereof.

Reference is now made to FIGS. 131A, 131B, 131C, 131D, 131E and 131F, which are simplified planar front, planar side, planar top, planar bottom, pictorial and exploded view illustrations of base assembly 6020.

As seen in FIGS. 131A-131F, base assembly 6020 includes SUPCA support (SUPCAS) 6030, which is mounted onto a vertically displaceable base housing 6300. Enclosed within vertically displaceable base housing 6300 is a clamping and base housing raising assembly 6310, an azimuthal alignment assembly 6320, and a pair of typically identical springs 6322, which cooperate with clamping and base housing raising assembly 6310. Base assembly 6020 also includes a motor assembly 6330 and a bottom assembly 6340.

Reference is now made to FIGS. 132A, 132B, 132C and 132D, which are simplified planar side, planar top, planar bottom and pictorial view illustrations of a preferred embodiment of SUPCAS 6030 forming part of the base assembly 6020. As seen in FIGS. 132A-132D, SUPCAS 6030 preferably comprises a generally circular planar surface 6400, which is surrounded by a raised, generally annular planar support surface 6410, preferably joined to surface 6400 by a tapered circular wall 6412. A spillage channel 6414 extends radially outwardly through tapered circular wall 6412 at a height between the planes of surface 6400 and of annular planar support surface 6410. A generally circular groove 6420 is preferably formed in generally annular planar support surface 6410.

Disposed centrally of generally circular planar surface 6400 is a drive shaft accommodating aperture 6430, which is surrounded by an upstanding circumferential rim 6432, thereby to help prevent leaking of spillage located on generally circular planar surface 6400 into the remainder of the MMIDD 6000 lying below SUPCAS 6030.

Annular planar support surface 6410 is preferably surrounded by a partially tapered wall 6440, which terminates in a circumferential planar annular top and radially outwardly extending wall 6444 having a top-facing surface 6446.

Extending circumferentially to both sides of channel 6414 is a SUPCA azimuthal locating channel 6450, which extends radially outwardly of wall 6440 and communicates with channel 6414. SUPCA azimuthal locating channel 6450 accommodates a finger engagement portion of a SUPCA, such as finger engagement portion 196 of SUPCA 100 (FIGS. 4A-4C) and analogous finger engagement portions of other embodiments of SUPCAs described hereinabove.

Walls 6440 and 6444 are formed with a plurality of clamp accommodating pockets 6460, typically three in number. Each of pockets 6460 preferably includes an opening 6462, which extends from wall 6440, at a height just below that of wall 6444, radially outwardly along wall 6440. Each of pockets 6460 includes a radially outward wall 6464 and side walls 6466. Radially outward wall 6464 includes a radially inward lower portion 6468 and a radially outward upper portion 6470, joined by a concave curved surface 6472, which extends to a slightly inclined surface 6474. Preferably, a depending circumferential wall 6480 extends along nearly one half of the circumference of wall 6444 at an outer edge thereof.

Extending inwardly from radially outward upper portion 6470 and concave curved surface 6472 is a protrusion 6492, which has an inclined inwardly facing surface 6494, which defines a shoulder 6496 with respect to slightly inclined surface 6474.

Underlying surface 6400 is a corresponding circular planar surface 6498.

Reference is now made to FIGS. 133A, 133B, 133C, 133D, 133E and 133F, which are simplified planar front, planar side, planar top, planar bottom, top-facing pictorial and bottom-facing pictorial illustrations of vertically displaceable base housing 6300.

As seen in FIGS. 133A-133F, vertically displaceable base housing 6300 includes a cubic main portion 6550 and a generally cylindrical top portion 6552 integrally formed therewith. Generally cylindrical top portion 6552 includes a central aperture 6554, surrounded by a raised rim 6556, an outer surface 6558 of which is engaged by an inner surface of rim 6432 of SUPCAS 6030 (FIGS. 132A-132D).

Generally cylindrical top portion 6552 also includes a generally planar annular surface 6560, surrounding outer surface 6558 of raised rim 6556. Generally planar annular surface 6560 extends radially outwardly to a generally circularly cylindrical rim 6562 and includes a pair of generally rectangular slots 6564 and 6566 for accommodating struts (FIG. 134E) of clamping and base housing raising assembly 6310. Generally cylindrical top portion 6552 preferably includes a generally circularly cylindrical inner surface 6570, an annular top surface 6572 and a generally circularly cylindrical outer surface 6574.

It is noted that generally circularly cylindrical inner surface 6570 is preferably formed with shallow recesses 6576 and 6578, adjacent respective slots 6564 and 6566.

It is also noted that generally circularly cylindrical outer surface 6574 includes a first partially circularly cylindrical outer surface portion 6580, which extends over more than 180 degrees in azimuth, and a second partially circularly cylindrical outer surface portion 6582, which extends over less than 180 degrees in azimuth and extends radially outwardly of surface portion 6580. Surface portions 6580 and 6582 define shoulders 6584 and 6586 therebetween. Shoulders 6584 and 6586 limit the azimuthal rotation of top housing assembly 6010 by engaging respective shoulders 6157 and 6158 of static housing element 6040 (FIGS. 127A-127D).

Second partially circularly cylindrical outer surface portion 6582 is formed with a plurality of protrusions 6590, whose mutual spacing corresponds to that of bayonet sockets 6170, such that protrusions 6590 are seated in inwardly extending recesses 6172 extending from corresponding bayonet sockets 6170 by mutual rotation of the static housing element 6040 of top housing assembly 6010 and base assembly 6020.

A cut out 6600 is provided on a front wall 6602 of cubic main portion 6550 for accommodating a lever assembly, forming part of clamping and base housing raising assembly 6310, described hereinbelow. A pair of wedge-shaped protrusions 6604 are located on opposite inner facing side surfaces 6606 of side walls 6608 of cubic main portion 6550. A pair of mutually spaced upstanding protrusions 6610, having L shaped cross sections, are formed on an inner facing surface 6612 of front wall 6602 and together define a vertical lever displacement track 6616 for the lever assembly.

Reference is now made to FIGS. 134A, 134B, 134C, 134D and 134E, which are simplified planar front, planar side, planar top, pictorial and exploded view pictorial illustrations of clamping and base housing raising assembly 6310. As seen in FIGS. 134A-134E, clamping and base housing raising assembly 6310 includes clamp elements 6620, preferably three in number, which are pivotably mounted onto a pivotable clamp mounting element 6630 by means of pivot mounting pins 6632 and biased with respect thereto by respective springs 6633.

It is appreciated that, while in the illustrated embodiment of FIGS. 134A-134E clamping and base housing raising assembly 6310 includes clamp elements 6620 which are similar to clamp elements 1120 shown in FIGS. 13A-13H, clamping and base housing raising assembly 6310 may alternatively include clamp elements similar to clamp elements 4420 and 4421 shown in FIGS. 70A-70L.

Clamping and base housing raising assembly 6310 also includes a pivotable lever-operated element 6640, which is pivotably mounted with respect to pivotable clamp mounting element 6630 by means of struts 6634. Pivotable lever-operated element 6640 is, in turn, pivotably mounted onto bottom assembly 6340 (FIG. 131F) via pins 6642.

A lever connecting element 6650 is pivotably mounted onto pivotable lever-operated element 6640. A bottom lever element 6660 is pivotably mounted onto lever connecting element 6650 for slidable displacement along track 6616 defined by protrusions 6610 of vertically displaceable base housing 6300. A top lever element 6670 is slidably connected to bottom lever element 6660. A linkage element 6680 is pivotably mounted onto bottom lever element 6660 by means of a pin 6682 and is biased by a spring 6684. An activation pin element 6690 is pivotably mounted onto linkage element 6680 by means of a pin 6692.

Reference is now made to FIGS. 135A, 135B, 135C, 135D, 135E, 135F and 135G, which are simplified planar top, planar bottom, planar side, planar inward-facing, planar outward facing, top-facing pictorial and side-facing pictorial illustrations of clamp element 6620.

As seen in FIGS. 135A-135G, clamp element 6620 comprises a planar generally rectangular portion 6722 having a radially outward-facing surface 6724 and a radially inward-facing surface 6726. Radially outward-facing surface 6724 terminates at a radially inward top surface 6728 of a clamping portion 6730 defining a radially inwardly and downwardly directed clamping groove 6732, which extends to radially inward-facing surface 6726. Top surface 6728 and clamping groove 6732 together define a clamping engagement edge 6734.

A pivot mounting protrusion 6736 extends radially inwardly at a bottom portion of front surface 6726. Pivot mounting protrusion 6736 preferably has a U-shaped cross section defining a pair of mutually aligned pin mounting apertures 6737. A support element pivotable and slidable engagement protrusion 6738 is formed on radially outward-facing surface 6724 at a location generally opposite protrusion 6736 and includes a depending lip portion 6739.

A groove 6740 extends along radially outward-facing surface 6724 of clamp element 6620 from a top edge 6742 thereof to a location 6744 adjacent to but spaced from a bottom surface 6746 thereof. Bottom surface 6746 is defined both by a bottom edge lip portion 6739 and by a bottom surface of pivot mounting protrusion 6736 and includes a spring receiving recess 6748.

A generally U-shaped groove 6750 is formed on an outward-facing surface of support element pivotable and slidable engagement protrusion 6738 and defines a central internal shoulder 6752.

Figure 136A:
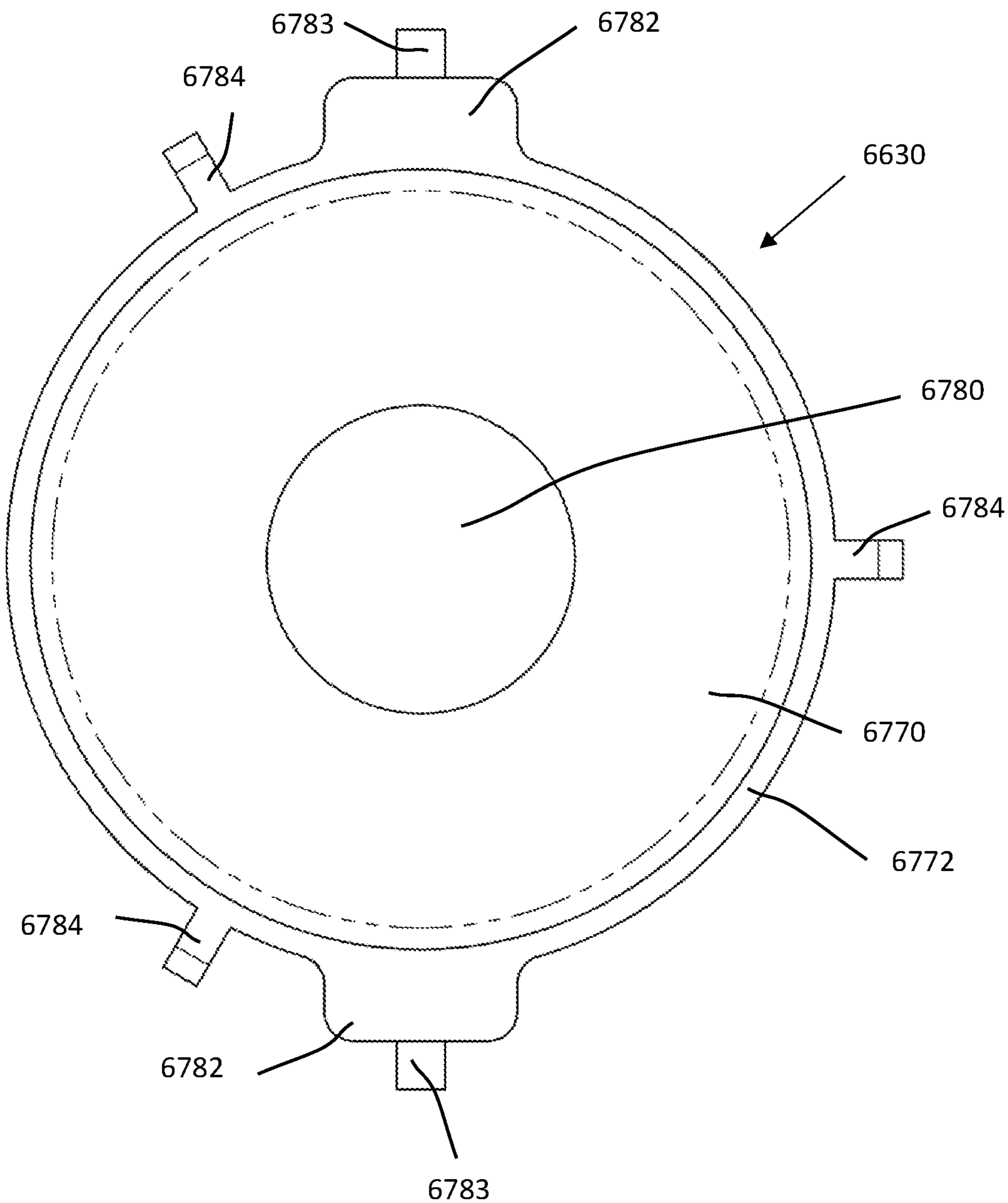
Figure 136B:
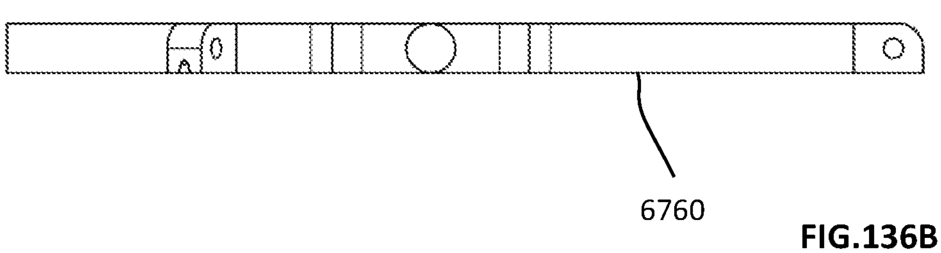
Figure 136C:
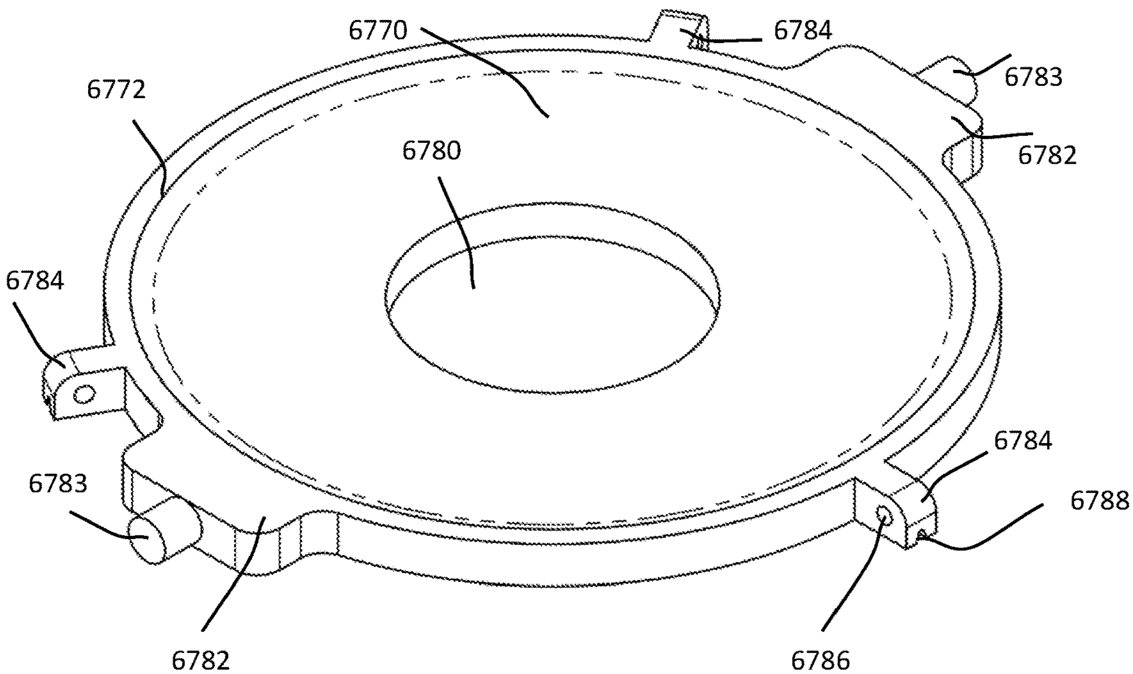
Figure 136D:
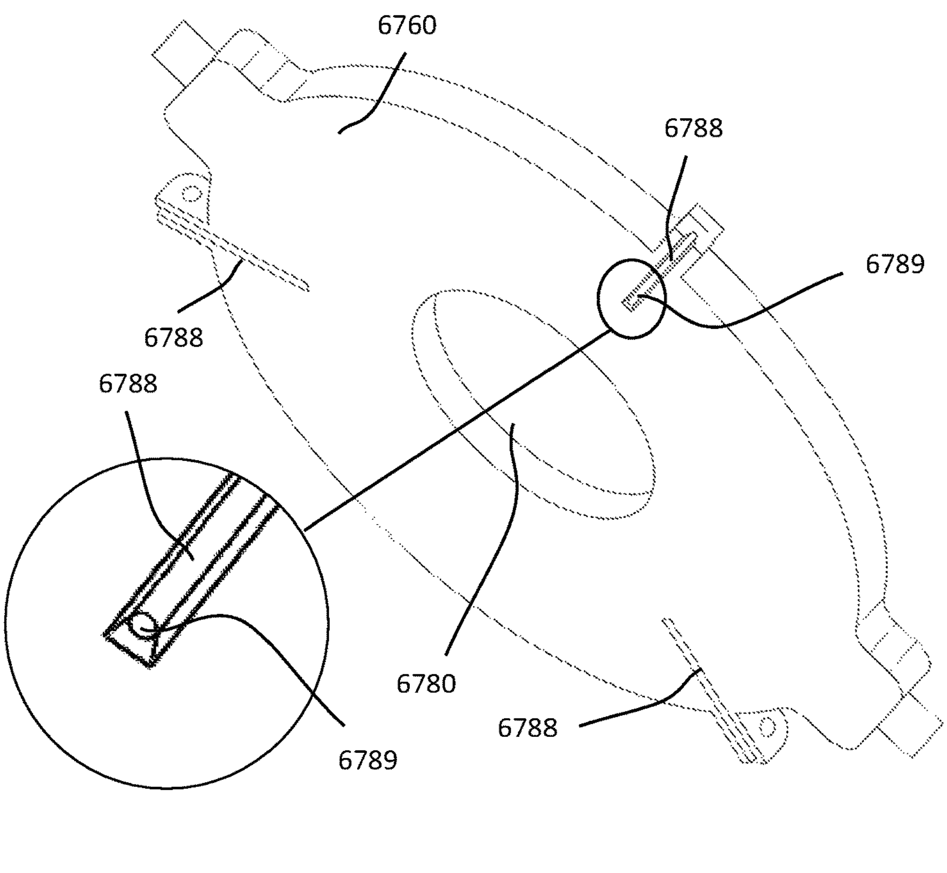

Reference is now made to FIGS. 136A, 136B, 136C and 136D, which are simplified planar top, planar side, top-facing pictorial and bottom-facing pictorial view illustrations of pivotable clamp mounting element 6630. As seen in FIGS. 136A-136C, pivotable clamp mounting element 6630 is a generally planar disc element having a generally planar, generally circular bottom surface 6760 and a generally planar, generally circular top surface 6770. Generally circular top surface 6770 is surrounded by an annular raised portion 6772.

Pivotable clamp mounting element 6630 includes a central aperture 6780 and a pair of side strut mounting protrusions 6782, each having an integrally formed pivot pin portion 6783, and a plurality, preferably three, clamp mounting protrusions 6784, each having a pin receiving aperture 6786.

Bottom surface 6760 preferably includes a plurality, preferably three, of spring receiving elongate recesses 6788, each aligned with a spring end seating aperture 6789 and with a corresponding clamp mounting protrusion 6784.

Reference is now made to FIGS. 137A, 137B and 137C, which are simplified planar top, planar side and pictorial view illustrations of pivotable lever-operated element 6640.

As seen in FIGS. 137A-137C, pivotable lever-operated element 6640 is a generally, but not entirely, circular element defining a ring 6800 having a generally smooth generally cylindrical inner surface 6802 having a pair of generally oppositely directed, inwardly facing strut mounting pin protrusions 6804.

Ring 6800 has a pair of generally smooth side generally circularly outer surfaces 6806 which are joined to a forwardly-directed stepped outer surface 6810. Forwardly-directed stepped outer surface 6810 includes a relatively wide base portion 6812 having side surfaces 6814 and a forwardly-directed surface 6816 having formed therein an elongate recess 6818 for slidably receiving and pivotably mounting an end of lever connecting element 6650.

Extending forwardly from a portion of forwardly-directed surface 6816 is a relatively narrow intermediate forwardly-directed surface 6820. Extending forwardly from a portion of forwardly-directed surface 6820 is a wall 6822 having a forward-most forwardly-directed surface 6824. Wall 6822 includes a cantilevered portion 6826, which overlies part of elongate recess 6818 and includes, on an inwardly facing surface 6828 thereof, an elongate recess 6830, opposite to recess 6818 which, together with recess 6818 is configured for slidably receiving and pivotably mounting an end of lever connecting element 6650.

Figure 134A:
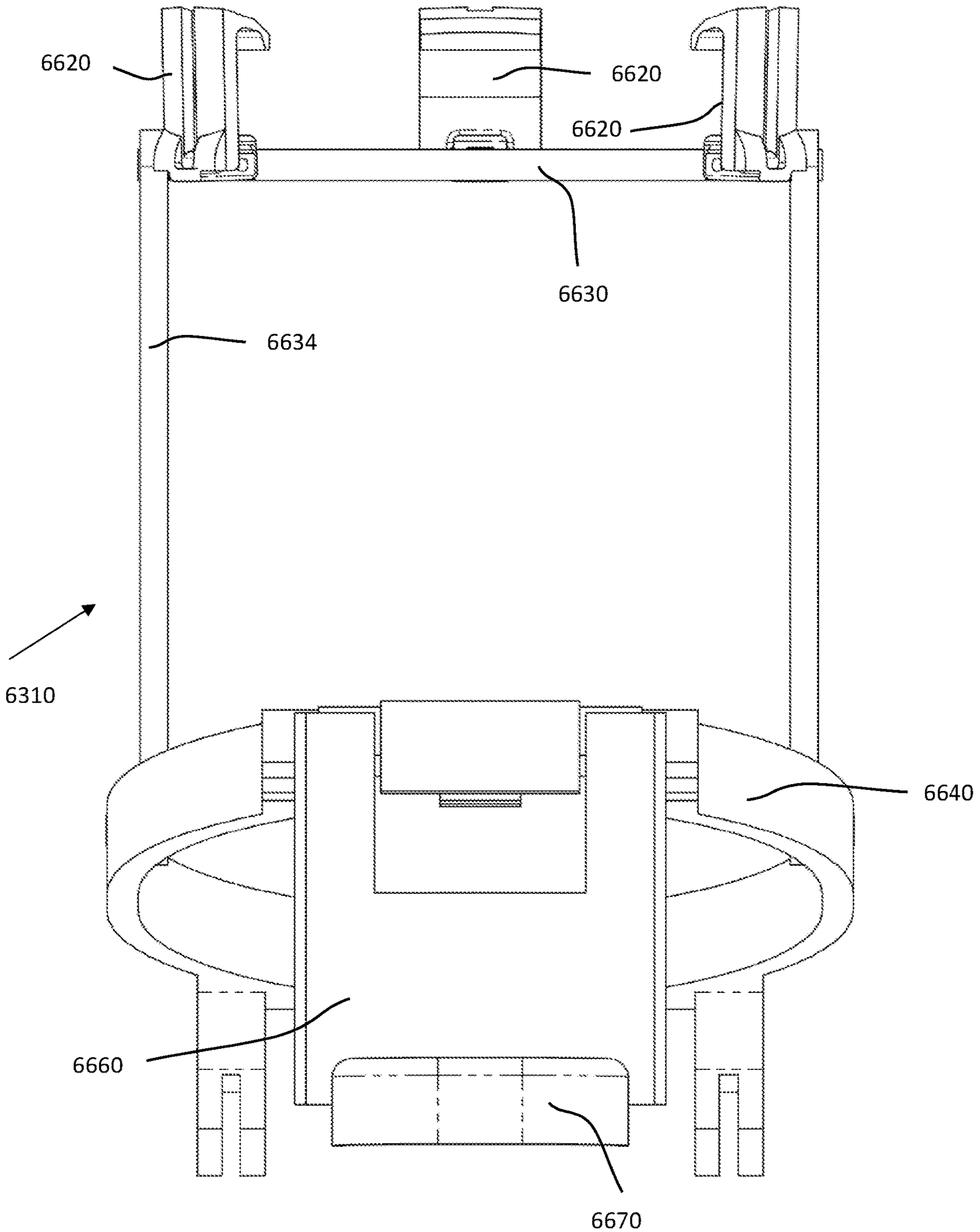
Figure 134B:
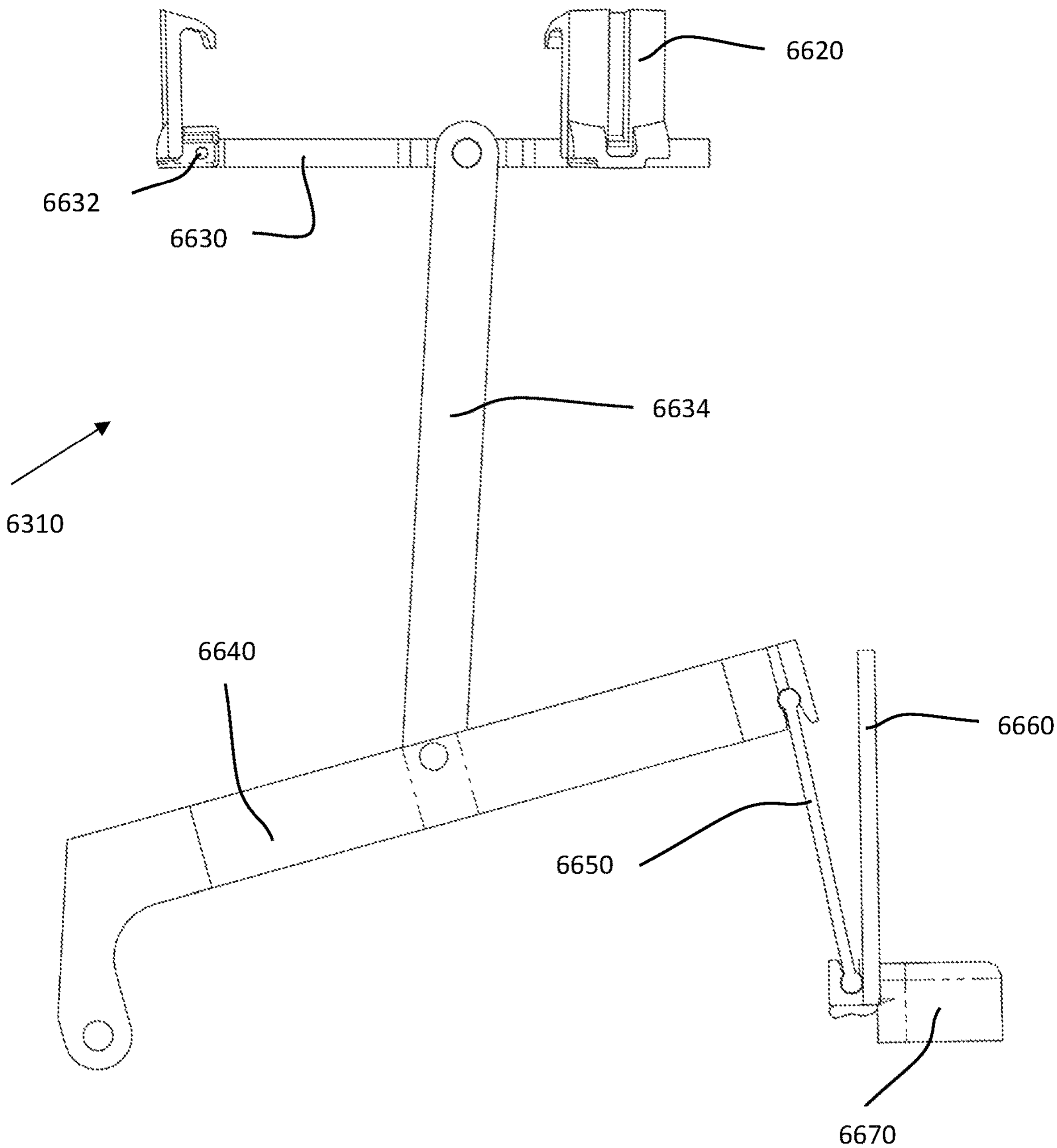
Figure 134C:
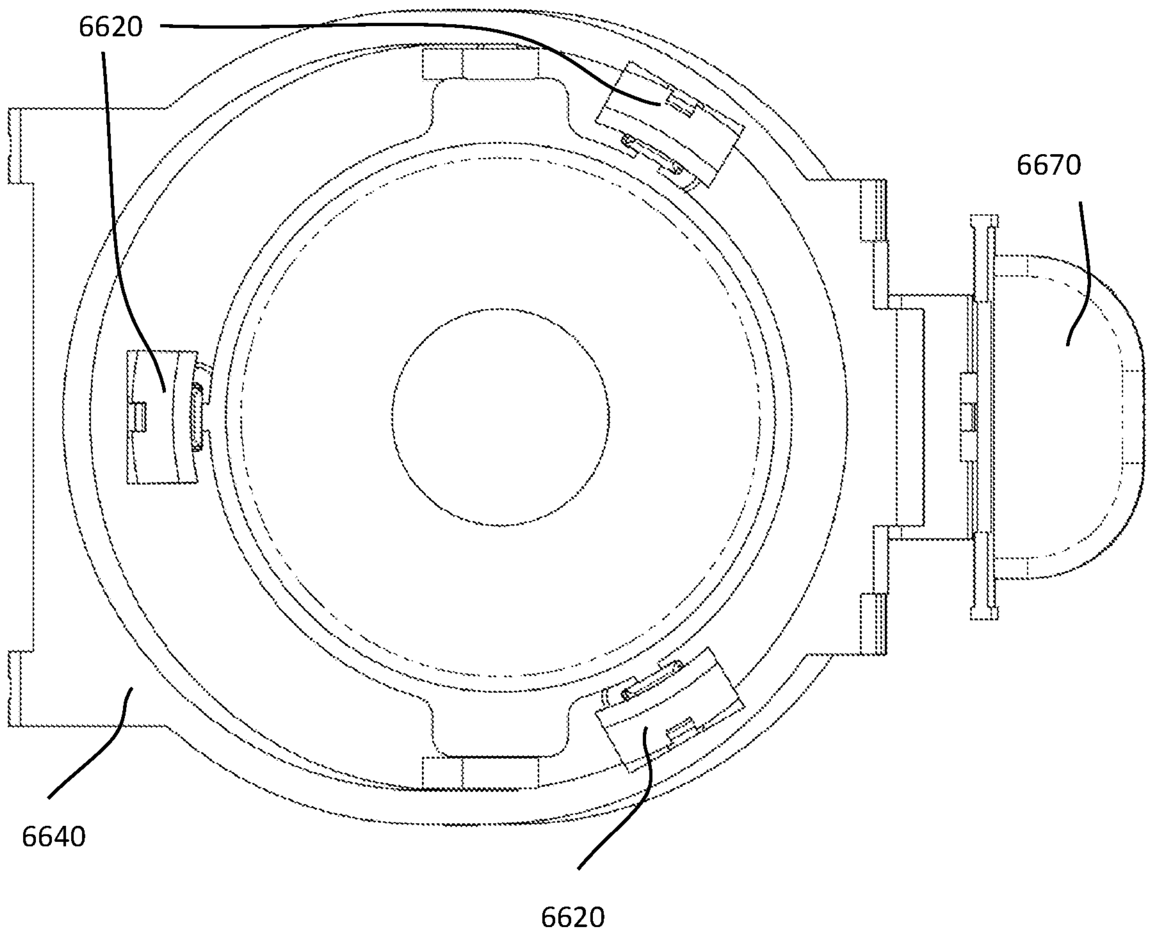
Figure 134D:
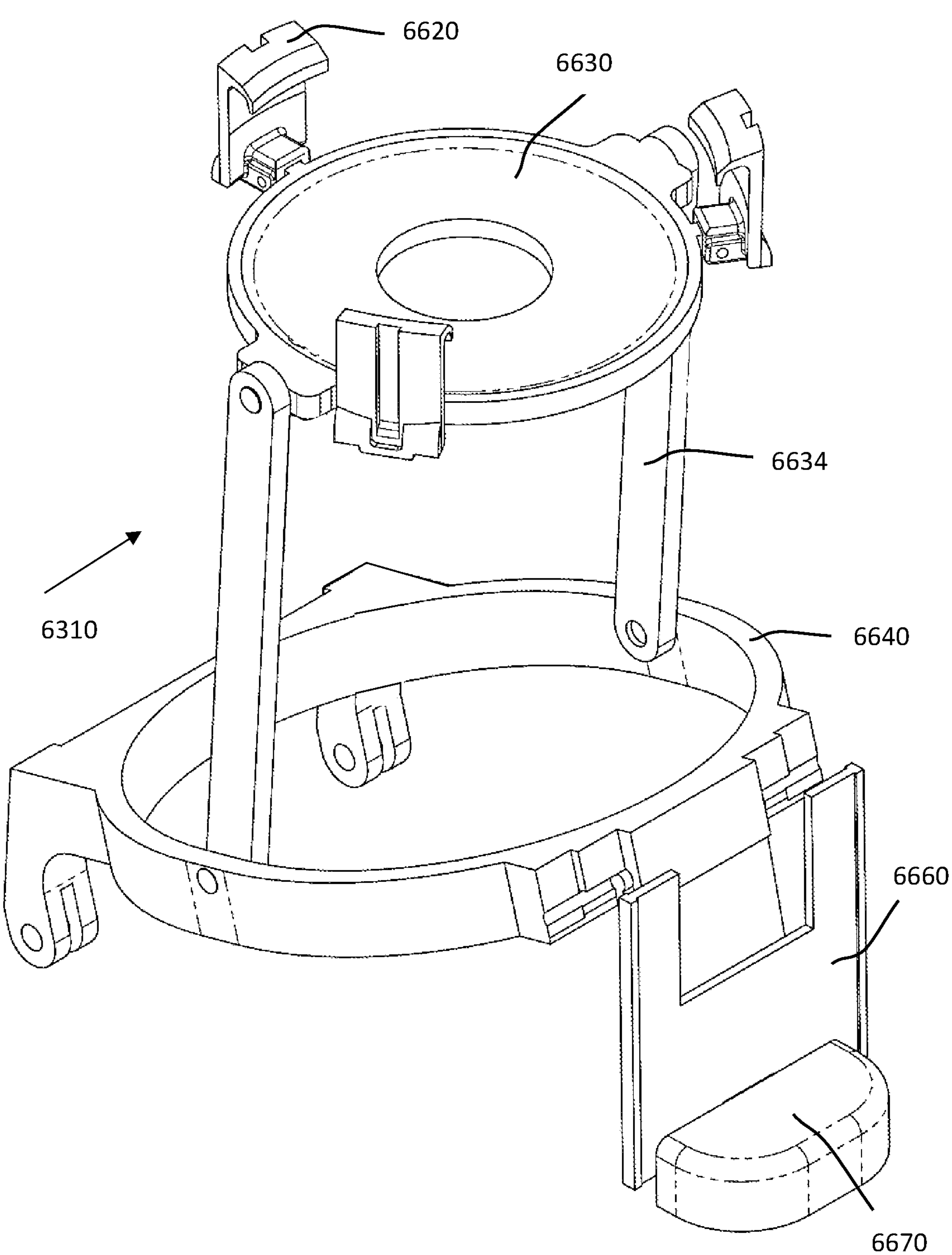
Figure 134E:
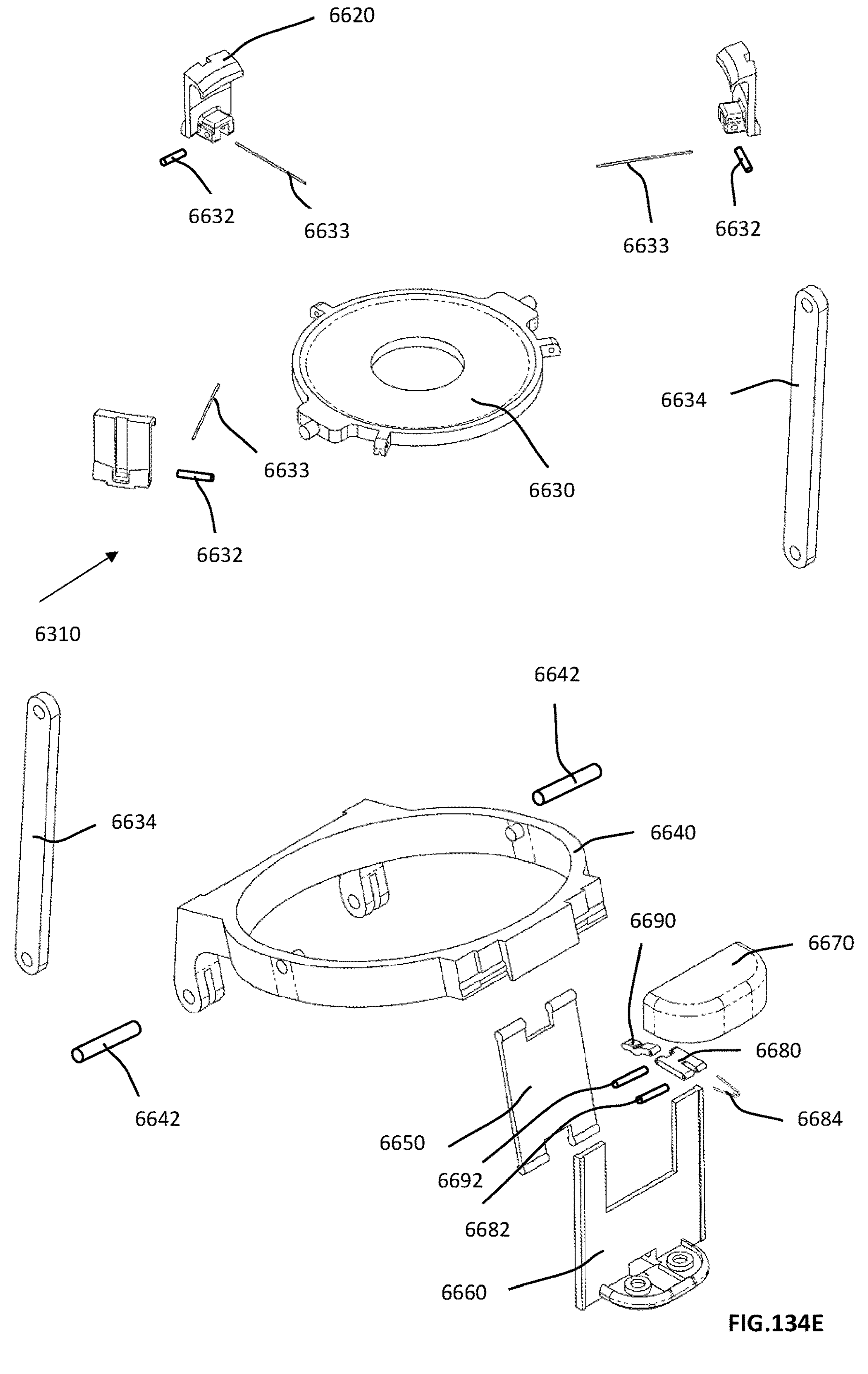
Figure 135A:
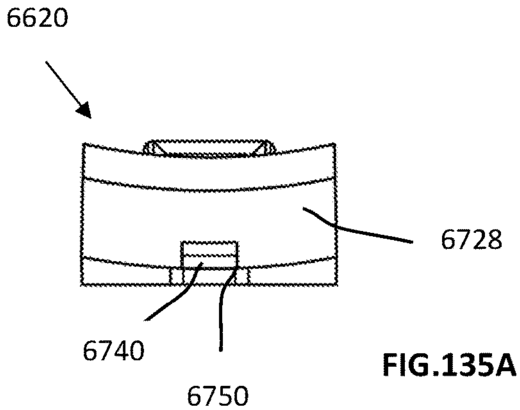
Figure 135B:
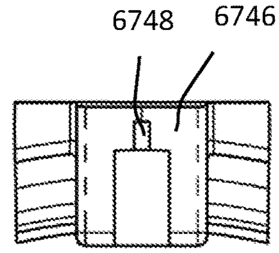
Figure 135C:
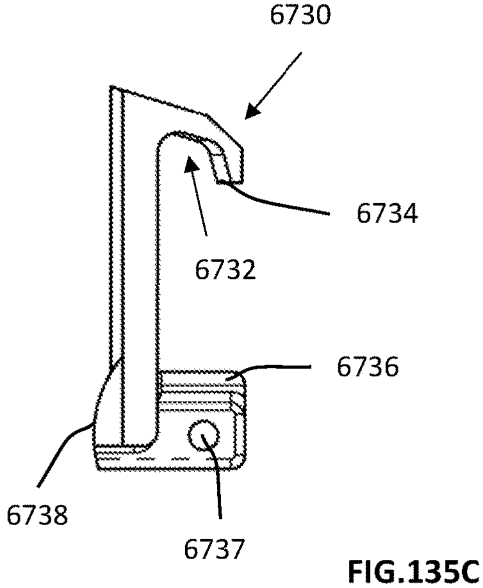
Figure 135E:
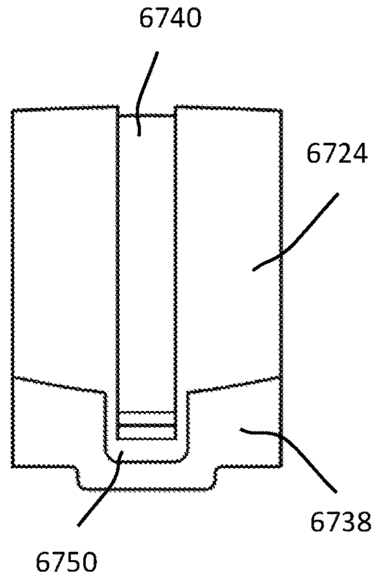
Figure 135D:
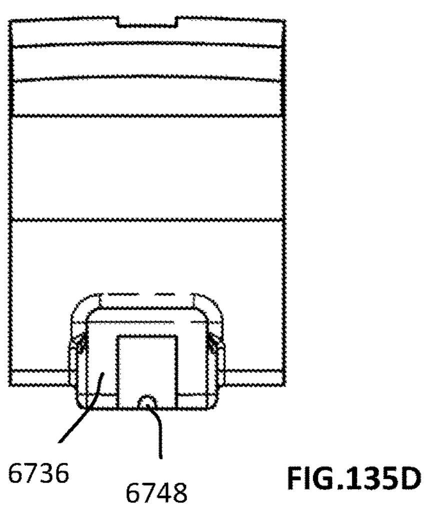
Figure 135F:
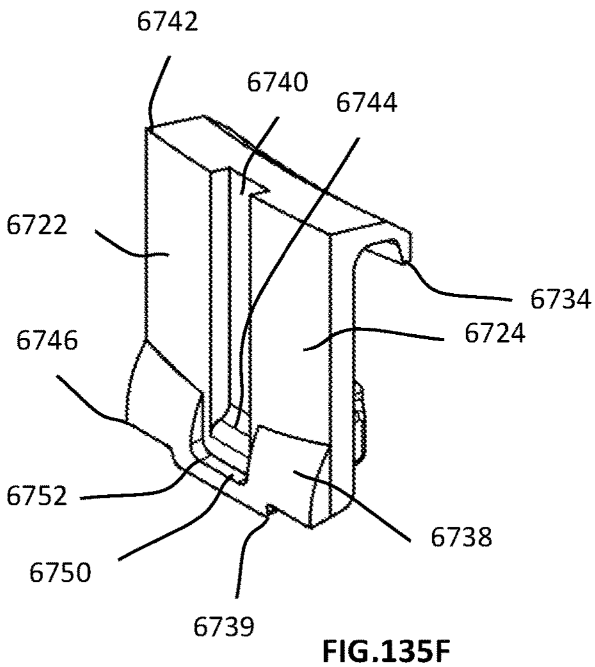
Figure 135G:
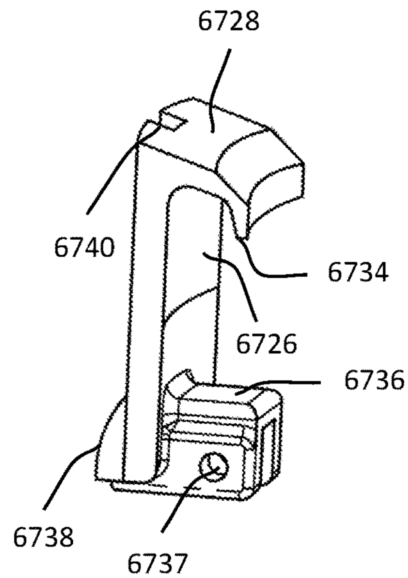

Generally smooth side generally circularly outer surfaces 6806 are also joined at a location opposite to forwardly-directed stepped outer surface 6810 by a rearwardly and downwardly-directed mounting portion 6840. Rearwardly and downwardly-directed mounting portion 6840 includes a partial ring defining portion 6842, which is generally coplanar with the reminder of ring 6800, and a pair of depending pivot mounting portions 6844, each of which includes a bifurcated mounting protrusion 6846, having a transverse pivot pin mounting aperture 6848 for receiving a pin 6642 (FIG. 134E).

Reference is now made to FIGS. 138A and 138B, which are simplified planar side and pictorial view illustrations of strut 6634. As seen in FIGS. 138A and 138B, strut 6634 is preferably an elongate planar element having rounded ends 6852, each having an aperture 6854 for pivotable mounting of strut 6634 on a pivot pin portion 6783 of pivotable clamp mounting element 6630 at one end of strut 6634 and for pivotable mounting of strut 6634 onto an inwardly facing strut mounting pin protrusion 6804 of pivotable lever-operated element 6640.

Reference is now made to FIGS. 139A, 139B, 139C and 139D, which are simplified planar front, planar side, planar top and pictorial view illustrations of lever connecting element 6650. As seen in FIGS. 139A-139D, lever connecting element 6650 is a generally planar element having central rectangular cut outs 6860 formed at opposite ends thereof and each defining a pair of generally rectangular mounting fingers, here designated by reference numerals 6862, 6864, 6866 and 6868. Each of generally rectangular mounting fingers 6862, 6864, 6866 and 6868 defines a rounded, generally cylindrical outer facing edge, the rounded edges being designated by respective reference numerals 6872, 6874, 6876 and 6878.

Reference is now made to FIGS. 140A, 140B, 140C, 140D, 140E, 140F and 140G, which are simplified planar top, planar bottom, planar side, planar front, planar back, top-facing pictorial and bottom-facing pictorial illustrations of top lever element 6670.

As seen in FIGS. 140A-140G, top lever element 6670 defines a generally planar finger engagement surface 6900 having a curved depending peripheral surface 6902 extending downwardly therefrom. A pair of screw bosses 6904 extend downwardly from a downwardly-facing surface 6906 underlying generally planar finger engagement surface 6900. Extending downwardly from generally planar finger engagement surface 6900 and through downwardly-facing surface 6906 is an inclined, generally planar surface 6908 which terminates in a generally planar surface 6910 which lies generally parallel to surface 6906.

Reference is now made to FIGS. 141A, 141B, 141C, 141D and 141E, which are simplified planar front, planar back, planar side, planar top and pictorial illustrations of bottom lever element 6660. As seen in FIGS. 141A-141E, bottom lever element 6660 includes a generally planar portion 6920, which extends upwardly from a base portion 6930, which extends generally perpendicularly to generally planar portion 6920.

Generally planar portion 6920 defines a forward-facing generally planar surface 6932 and a backward-facing generally planar surface 6934, each of which is bordered on its sides by a slightly protruding border 6936. Generally planar portion 6920 includes a generally rectangular cut out 6938, at a first edge 6940 thereof, and a generally rectangular cut out 6941, at an opposite edge 6942, the remainder of which is generally coplanar with a bottom surface 6944 of base portion 6930.

Base portion 6930 is generally planar and includes a pair of apertures 6946 which are surrounded by cylindrical bosses 6948 extending upwardly from a top surface 6950 thereof. Base portion 6930 is partially delimited by a raised curved peripheral wall 6954, which extends forwardly of forward-facing generally planar surface 6932. Raised curved peripheral wall 6954 is formed with a rearward-facing recess 6960 which communicates with a recess 6962 formed in top surface 6950 and extending to a cut out 6964 in top surface 6950, which cut out 6964 extends to forward-facing generally planar surface 6932 and defines an edge 6965.

Extending rearwardly of backward-facing generally planar surface 6934 are a pair of pivot mounting fingers 6966, each of which is formed with a pivot mounting groove 6967. Rounded edges 6876 and 6878 of lever connecting element 6650 (FIGS. 139A-139D) are pivotably seated in grooves 6967.

Linkage element 6680 is pivotably mounted onto base portion 6930 at rearward-facing recess 6960 and is pivotably retained therein by pin 6682, which is seated in a pin aperture 6968 formed in base portion 6930 and is biased by spring 6684. Activation pin element 6690 is pivotably mounted onto linkage element 6680 via pin 6692 which extends through a pin aperture in linkage element 6680 as described hereinbelow.

Reference is now made to FIGS. 142A, 142B and 142C, which are simplified planar side, planar top and pictorial view illustrations of activation pin element 6690. As seen in FIGS. 142A-142C, activation pin element 6690 is a curved elongate element having a side to side pin receiving aperture 6970 at a rounded end 6971 thereof. Activation pin element 6690 has a concave portion 6972 in a surface 6974 thereof. Activation pin element 6690 also includes a solid rounded end portion 6975 at an end opposite rounded end 6971.

Reference is now made to FIGS. 143A, 143B and 143C, which are simplified planar side, planar top and pictorial view illustrations of linkage element 6680. It is seen in FIGS. 143A-143C that linkage element 6680 is a generally rectangular planar element having first and second pairs of mounting fingers, here designated 6976, 6977, 6978 and 6979 mounted on respective ends thereof. Mounting fingers 6976 and 6977 each include a pin receiving aperture 6980 for receiving pin 6682. Mounting fingers 6978 and 6979 each include a pin receiving aperture 6982 for receiving pin 6692. Mounting fingers 6976 and 6977 are separated by a cut out 6984 having an inclined spring seating surface 6986 for seating of one end of spring 6684. Mounting fingers 6978 and 6979 are separated by a rectangular cut out 6988, which pivotably accommodates rounded end 6971 of activation pin element 6690.

Reference is now made to FIGS. 144A, 144B, 144C, 144D and 144E, which are simplified planar side, planar front, planar top, planar bottom and exploded view pictorial illustrations of azimuthal alignment assembly 6320. As seen in FIGS. 144A-144E, azimuthal alignment assembly 6320 includes a pair of hinge clamp elements 7000, which define a rotational axis 7010 about which a rotationally displacing element 7020 rotates. Azimuthal alignment assembly 6320 also includes an azimuthal alignment activation element 7030 which rotates about axis 7010 and is rotatably held in place by hinge clamp elements 7000. Azimuthal alignment activation element 7030 defines a rotation and translation pathway for rotationally displacing element 7020 and a spring 7032 biases rotationally displacing element 7020 relative to azimuthal alignment activation element 7030.

Azimuthal alignment assembly 6320 also includes a multifunctional bracket element 7040 which defines a spring seat for coil springs 7042 and 7044 and defines displacement pathways for a lever locking element 7050 and an azimuthal alignment activation driving element 7060.

Azimuthal alignment activation driving element 7060 is pivotably mounted on azimuthal alignment activation element 7030 and is biased by spring 7044. Linear displacement of azimuthal alignment activation driving element 7060 beyond a given extent, also produces corresponding linear displacement of lever locking element 7050. The linear displacement of azimuthal alignment activation driving element 7060 produces rotation of rotationally displacing element 7020, azimuthal alignment activation element 7030 and spring 7032 about axis 7010.

Spring 7042 biases lever locking element 7050.

Reference is now made to FIGS. 145A, 145B, 145C and 145D, which are simplified planar front, planar side, top-facing pictorial and bottom-facing pictorial illustrations of hinge clamp element 7000. As seen in FIGS. 145A-145D, Hinge clamp element 7000 includes a generally rectangular three-dimensional block 7100 having a pair of throughgoing screw mounting apertures 7102 and having a side protrusion 7104 at a base surface 7106 thereof defining a concave pivot pin receiving recess 7108.

Reference is now made to FIGS. 146A, 146B, 146C, 146D and 146E, which are simplified first planar side, second planar side, planar front, planar top and pictorial illustrations of rotationally displacing element 7020.

As seen in FIGS. 146A-146E, rotationally displacing element 7020 is a generally triangular three-dimensional element having a rounded pivot edge 7120, which is arranged to pivot about axis 7010. A pair of generally radially extending wall portions 7124 and 7126 extend radially from pivot edge 7120 to a curved cylindrical outer wall 7128 which extends at a uniform radial distance from rounded pivot edge 7120. A cam engaging protrusion 7130 extends radially outwardly from cylindrical outer wall 7128.

Wall portion 7124 is generally planar and has formed along a radially outward portion of a side edge 7132 thereof an elongate protrusion 7134. Elongate protrusion 7134 has a tapered inner facing edge 7136 and a tapered outer facing edge 7138. Side edge 7132 lies in a plane which is coplanar with tapered outer facing edge 7138 along the entire extent of wall portion 7124 from wall 7128 to rounded pivot edge 7120.

Wall portion 7126 includes a radially inward planar section 7140 and a radially outward planar section 7142, parallel to planar section 7140, which define a radially outwardly-directed shoulder 7144 therebetween and an edge 7145.

Figure 144A:
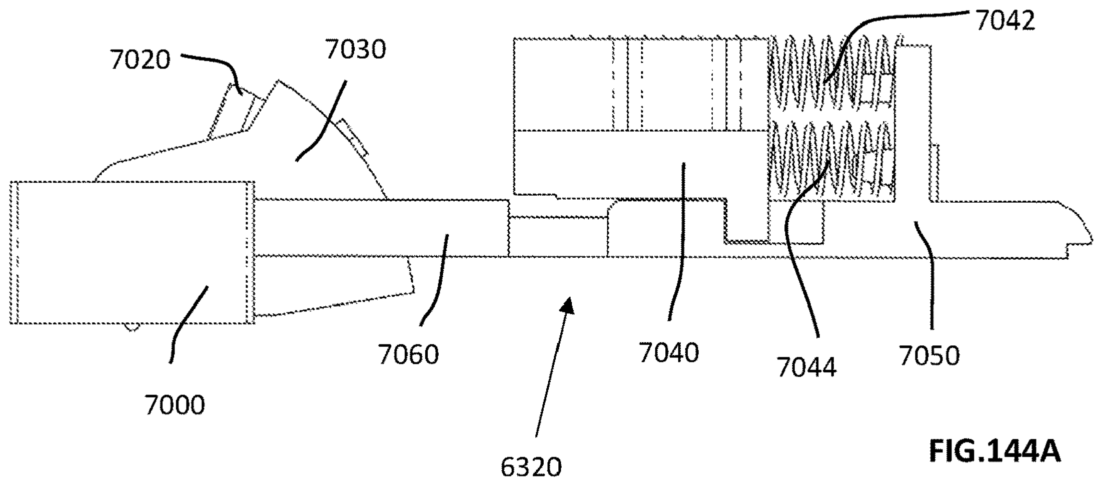
Figure 144C:
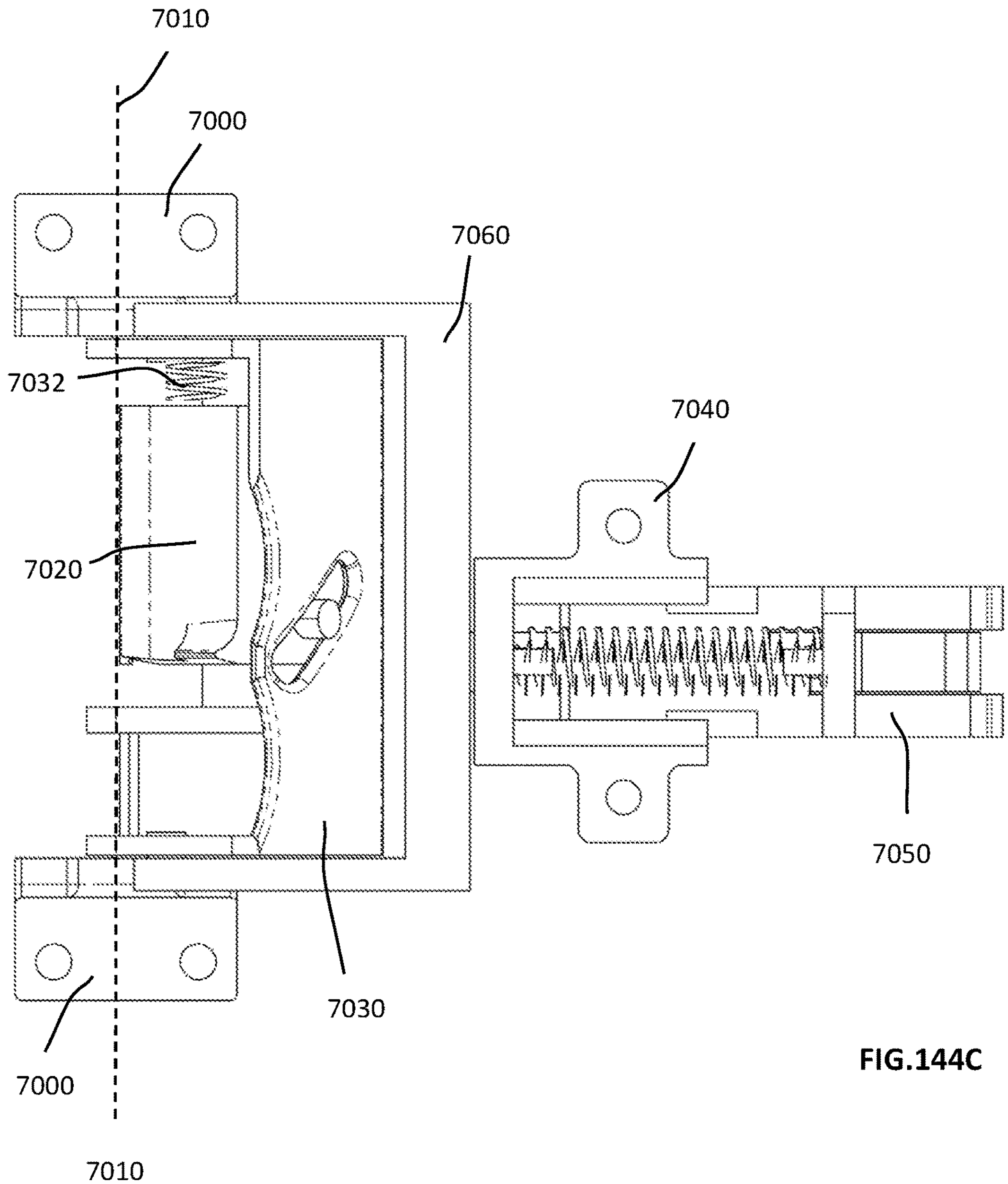
Figure 144B:
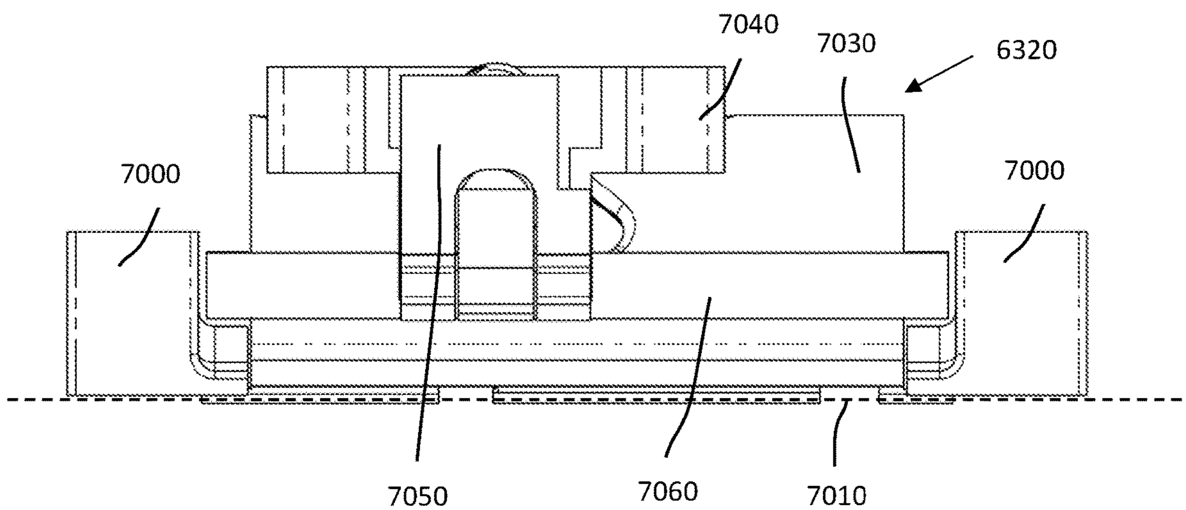
Figure 144D:
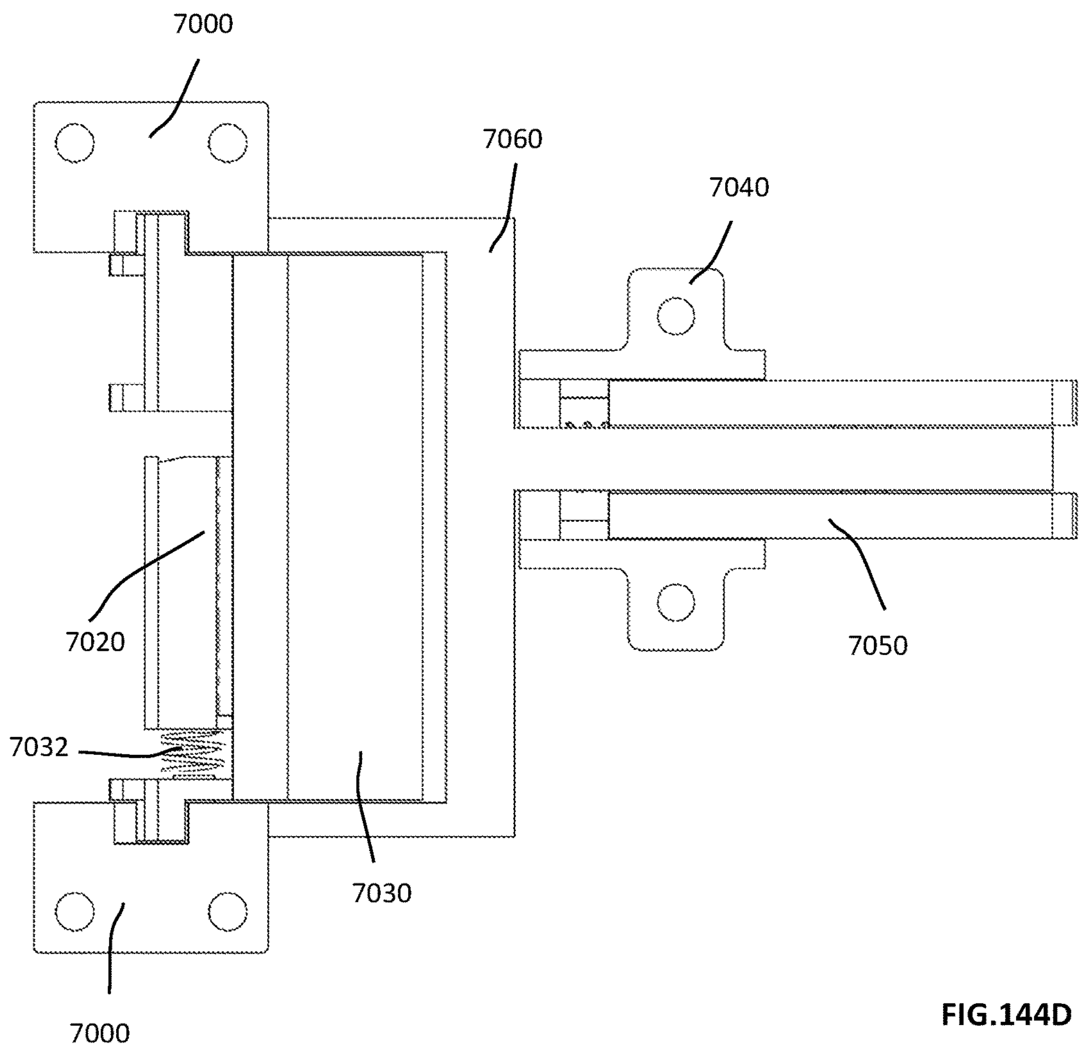
Figure 144E:
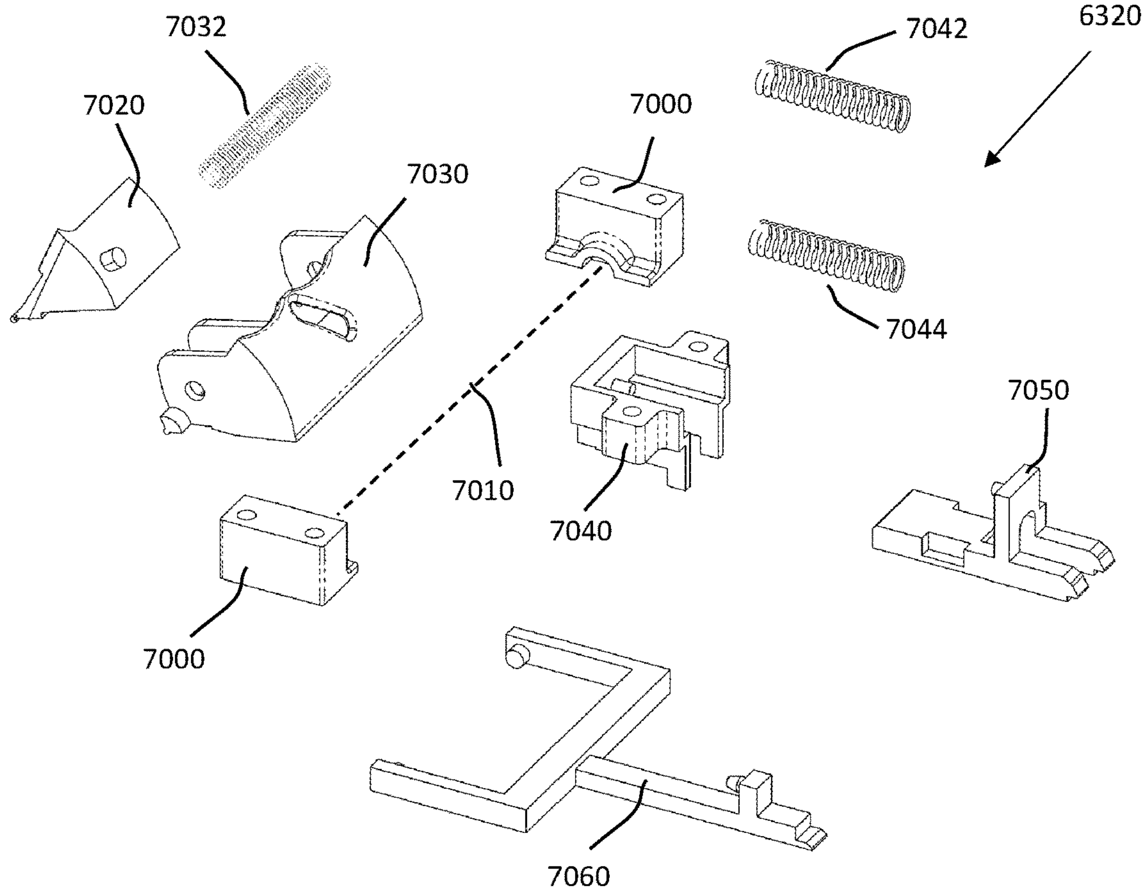

A wall portion 7146 joins respective edges 7132 and 7145 of wall portions 7124 and 7126 as well as an edge 7148 of outer wall 7128. Wall portion 7146 defines together with wall portions 7124 and 7126 an enclosure 7147, which accommodates spring 7032 (FIG. 144E).

Reference is now made to FIGS. 147A, 147B, 147C and 147D, which are simplified planar front, planar top, planar side and pictorial illustrations of azimuthal alignment activation element 7030.

As seen in FIGS. 147A-147D, azimuthal alignment activation element 7030 including a planar wall portion 7150 defining a planar base surface 7152 and an elongate edge 7153. First and second upstanding side wall portions 7154 and 7156 are formed at respective side edges of planar wall portion 7150. An intermediate upstanding wall portion 7158 extends alongside and spaced from wall portion 7156. Wall portions 7154, 7156 and 7158 each include a portion which extends outwardly from elongate edge 7153, which portions each include an aperture. The apertures of wall portions 7154, 7156 and 7158 are designated by respective reference numerals 7164, 7166 and 7168 and are mutually aligned along an axis 7170, which extends parallel to and outwardly of elongate edge 7153. When azimuthal alignment assembly 6320 is assembled axes 7170 and 7010 are parallel.

A curved wall portion 7180 joins wall portions 7150, 7154, 7156 and 7158 and defines a cam slot 7190 therein for slidingly accommodating cam protrusion 7130 of rotationally displacing element 7020. It is a particular feature of curved wall portion 7180 that it includes a curved cam path defining edge 7192, which assists in azimuthal alignment of the drive shaft, as will be described hereinbelow in detail.

Extending outwardly from the side walls 7154 and 7156 of alignment activation element 7030 at planar base surface 7152 thereof are a pair of pivot mounting pin portions 7194.

An interior-facing surface of side wall 7154 includes an interior facing spring seat protrusion 7196.

Reference is now made to FIGS. 148A, 148B, 148C, 148D and 148E, which are simplified planar top, planar side, planar front, planar back and pictorial illustrations of multifunctional bracket element 7040. As seen in FIGS. 148A-148E, multifunctional bracket element 7040 is a generally U-shaped element, having a common top edge surface 7200 and defining a central portion 7202 and a pair of symmetric side portions 7204.

Central portion 7202 includes a generally planar outer facing surface 7208 having a relatively broad upper region 7210 and a relatively narrow lower region 7212. Central portion 7202 also includes a generally planar inner facing surface 7218 from which extend first and second mutually spaced spring seat protrusions 7220 and 7222, which seat respective springs 7042 and 7044.

Each of symmetric side portions 7204 includes a stepped wall portion 7230 including an outer wall portion 7232, extending from a side edge 7233 of relatively broad upper region 7210, and an inner wall portion 7234, extending from a side edge 7235 of relatively narrow lower region 7212. Extending downwardly from a bottom edge of inner wall portion 7234 is a displacement limiting protrusion 7238. Extending outwardly from an outwardly-facing surface 7240 of outer wall portion 7232 is a screw boss 7242 having a throughgoing aperture 7244.

Reference is now made to FIGS. 149A, 149B, 149C, 149D and 149E, which are simplified planar top, planar bottom, planar back, planar side and pictorial illustrations of lever locking element 7050. As seen in FIGS. 149A-149E, lever locking element 7050 includes a pair of sliding shoe portions 7250, having mutually coplanar bottom surfaces 7252.

Sliding shoe portions 7250 are joined by a generally planar bridge portion 7254 having a pair of side cut outs 7256. Extending upwardly from sliding shoe portions 7250 is a generally planar portion 7260 having a bottom cut out 7262 with a curved top edge 7264 and having a top side edge cut out 7266. Generally planar portion 7260 has mutually parallel planar surface 7270 and 7272. A spring seat protrusion 7274 extends outwardly from planar surface 7272 and seats spring 7042 (FIG. 144E). Sliding shoe portions 7250 are provided with undercut shoulders 7276 and inclined outwardly facing surfaces 7278 at ends 7280 thereof.

Reference is now made to FIGS. 150A, 150B, 150C and 150D, which are simplified planar top, planar side, planar back and pictorial illustrations of azimuthal alignment activation driving element 7060.

As seen in FIGS. 150A-150D, azimuthal alignment activation driving element 7060 is a generally planar element having a planar bottom surface 7284. Azimuthal alignment activation driving element 7060 includes an elongate actuator rod portion 7286 which is fixed at an end 7288 thereof to a cross bar 7290. A pair of arms 7292 extend from cross bar 7290, parallel to and outwardly with respect to actuator rod portion 7286. A pair of mutually aligned inwardly-facing protrusions 7294 extend from outward ends of arms 7292 for pivotable engagement with apertures 7164 and 7166 of azimuthal alignment activation element 7030 about axis 7170.

Formed at an end 7296 of actuator rod portion 7286 is a shoulder 7297 and a tapered edge 7298. A protrusion 7299 is formed on actuator rod portion 7286 adjacent end 7296 and supports a spring seating protrusion 7300, which seats spring 7044 (FIG. 144E).

Reference is now made to FIGS. 151A and 151B, which are simplified pictorial and exploded view illustrations of motor assembly 6330. As seen in FIGS. 151A and 151B, motor assembly 6330 includes an outer drive shaft assembly 7400, which can be identical or similar to any of the outer drive shaft assemblies described hereinabove.

Outer drive shaft assembly 7400 is normally partially surrounded by a motor housing 7410, which includes a plurality of spring seating sockets 7412, in which are seated springs 7414. Outer drive shaft assembly 7400 is driven for rotation about an axis 7416 by an electric motor 7420, which is preferably identical to electric motor 1904 (FIGS. 26A-26E) and is located within motor housing 7410. Electric motor 7420 is supported on a motor support bracket 7430, which surrounds a rotating ventilating element 7440, which is driven by electric motor 7420.

Reference is now made to FIG. 152, which is a pictorial view illustration of outer drive shaft assembly 7400. It is seen that outer drive shaft assembly 7400 is preferably identical to outer drive shaft assembly 4646 shown in FIGS. 88A-88E.

Reference is now made to FIGS. 153A, 153B, 153C, 153D and 153E, which are simplified first planar side, second planar side, planar top, planar bottom and pictorial view illustrations of motor housing 7410. As seen in FIGS. 153A-153E, motor housing 7410 is a unitary element including a top portion 7450 and a bottom portion 7460. Top portion 7450 is generally cylindrical and includes a top planar generally circular wall 7464, surrounding a recessed annular top surface 7466, which surrounds a cylindrical boss 7468 having a central bore 7470. Cylindrical boss 7468 includes an outer raised portion 7472 having a generally planar top surface 7474.

Planar generally circular wall 7464 is preferably formed with an opening 7476, which permits liquid outflow therethrough. Aligned with opening 7476 is a radially outwardly extending protrusion 7478, defining a liquid outflow channel 7480, which extends downwardly to a liquid outflow channel termination location 7482.

A plurality of bolt mounting holes 7484 are preferably formed in annular top surface 7466 for accommodating motor mounting bolts (not shown), which bolt electric motor 7420 to the motor housing 7410.

Extending downwardly from top planar generally circular wall 7464 in a generally circular cylindrical arrangement are a plurality of depending wall sections 7490, some of which preferably at least partially surround spring seating sockets 7412.

Depending wall sections 7490 preferably all terminate at a generally circumferential planar wall surface 7500, from which depends in turn, a generally cylindrical wall portion 7510. Wall sections 7490, together with top planar circular wall 7464 and generally circumferential planar wall surface 7500, define an array of ventilation apertures 7520.

Bottom portion 7460 is generally cylindrical and has a cylindrical wall 7600. Cylindrical wall 7460 preferably defines a plurality of, preferably three, motor support bracket boss accommodating channels 7602.

Cylindrical wall 7600 also defines a plurality of mounting screw accommodating channels 7610, which receive mounting screws (not shown), which screws serve to fixedly attach the bottom portion 7460 to the bottom assembly 6340. A top edge surface 7612 of cylindrical wall 7600 joins top portion 7450 to bottom portion 7460.

The bottom of cylindrical wall 7600 is preferably formed with a first widened region 7622 for facilitating air flow therefrom. Formed over widened region 7622 is a mounting plate 7623 for accommodating electronic circuitry (not shown).

Reference is now made to FIG. 154, which is a simplified pictorial illustration of electric motor 7420. As seen in FIG. 154, electric motor 7420 is a modified model EU9537-1201 motor, manufactured by Euroka Electrical of Dongguan, China, and has a drive shaft 7624 having specially configured drive shaft top and bottom ends 7626 and 7628.

As seen in FIG. 154, drive shaft top end 7626 is configured to have an uppermost portion 7630, having a generally elongate rectangular cross section, which terminates in a pair of coplanar side surfaces 7632. Underlying the uppermost portion 7630 and side surfaces 7632, the drive shaft top end 7626 includes an intermediate cylindrical portion 7634, which terminates in an annular planar surface 7636. Underlying intermediate cylindrical portion 7634 is a section 7638 of the drive shaft top end 7626, which has a slightly larger cross section than that of intermediate cylindrical portion 7634 and defines therewith a circumferential shoulder 7640. A pair of mutually oppositely facing rectangular recesses 7642 are preferably formed on section 7638.

Drive shaft bottom end 7628 is configured to have a bottommost portion 7650, having a generally uniform cross section characterized in that it includes a flat side surface 7652 and a circular cylindrical surface 7654.

Reference is now made to FIGS. 155A, 155B and 155C, which are simplified planar bottom, planar side and pictorial view illustrations of motor support bracket 7430. As seen in FIGS. 155A-155C, motor support bracket 7430 includes a generally circular cylindrical wall 7660 which is integrally formed with a radially outwardly extending generally circular flange 7662. Formed on flange 7662 are a plurality of upstanding screw bosses 7664, which seat in corresponding motor support bracket boss accommodating channels 7602 of motor housing 7410.

Generally coplanar with flange 7662 is a generally rectangular bridge portion 7666 which spans generally circular wall 7660 and defines a generally central aperture 7670 for accommodating a bottom portion of motor 7420 and drive shaft bottom end 7628 thereof. Bridge portion 7666 is also preferably formed with a plurality of screw mounting apertures 7672 for accommodating screws (not shown) which join motor support bracket 7430 to motor 7420.

Reference is now made FIGS. 156A, 156B, 156C, 156D and 156E, which are simplified planar top, planar bottom, planar side, top-facing pictorial and bottom-facing pictorial view illustrations of rotating ventilating element 7440.

As seen in FIGS. 156A-156E, rotating ventilating element 7440 preferably includes an outer cylindrical wall 7700 to which are connected integrally formed outer edges of a plurality of circumferentially distributed generally radially extending vanes 7702. Preferably, there are provided a pair of recesses 7704 interior of outer cylindrical wall 7700 for retaining magnets (not shown) which may serve for sensing the rotational velocity of the rotating ventilating element 7440.

Inner edges of vanes 7702 are joined to an inner cylindrical wall 7706, which terminates at a downward-facing edge thereof in a planar, generally circular wall 7708, having formed at a center thereof a socket 7710, which is configured to lockably receive bottom end 7628 of drive shaft 7624 (FIG. 154).

Socket 7710 is formed with an inner generally circular cylindrical wall 7720 having a flat portion 7722, which receives flat surface 7652 of bottom end 7628 of drive shaft 7624. Socket 7710 is joined to wall 7706 by an array of radially directed ribs 7725.

Extending downwardly from planar, generally circular wall 7708 are a pair of mutually spaced wedge shaped protrusions 7726 which engage curved cam path defining edge 7192 of azimuthal alignment activation element 7030 (FIGS. 144A-144E) as well as tapered outer facing edge 7138 and wall portion 7124 of rotationally displacing element 7020 (FIGS. 144A-144E).

Figure 131A:
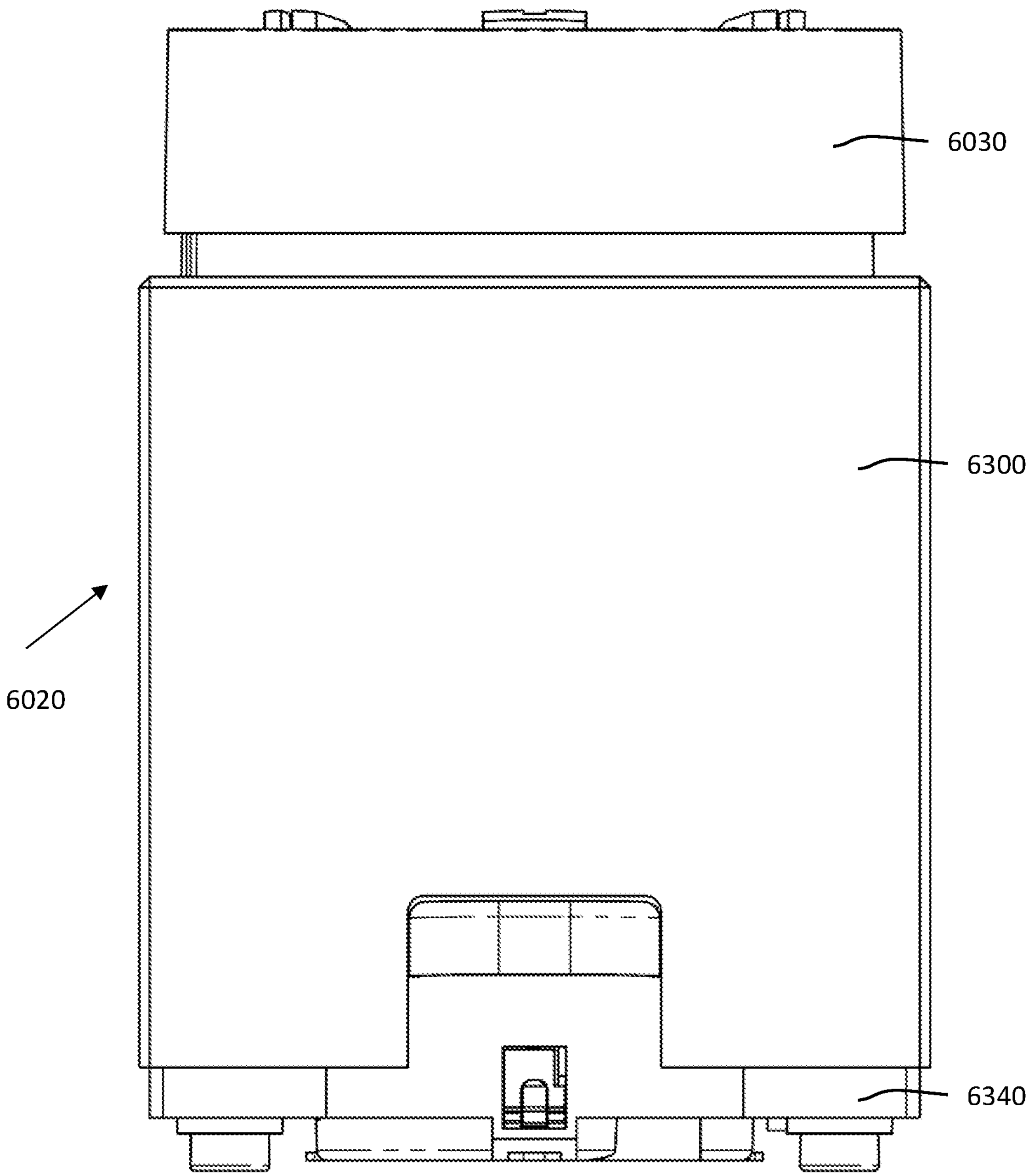
Figure 131B:
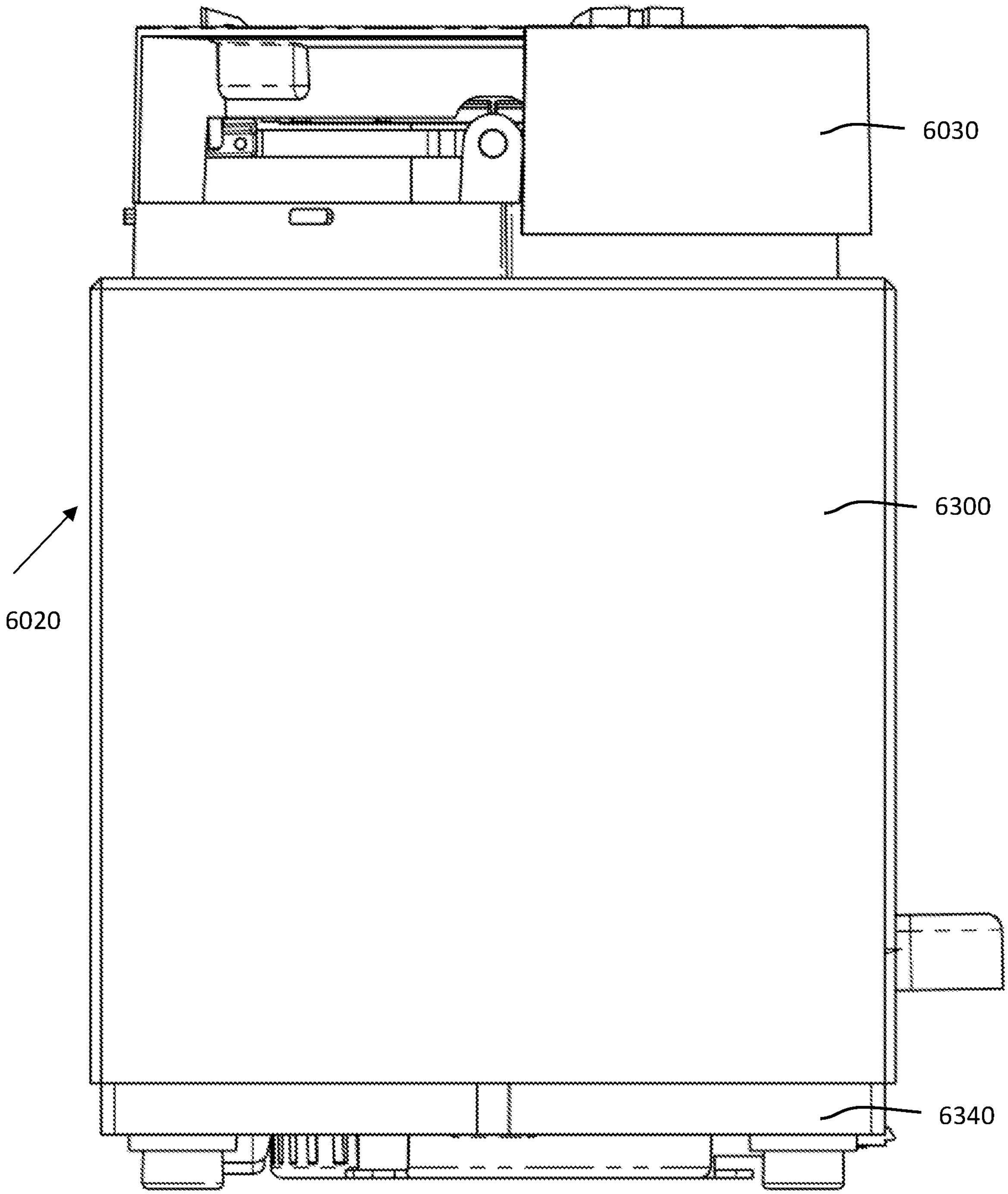
Figure 131C:
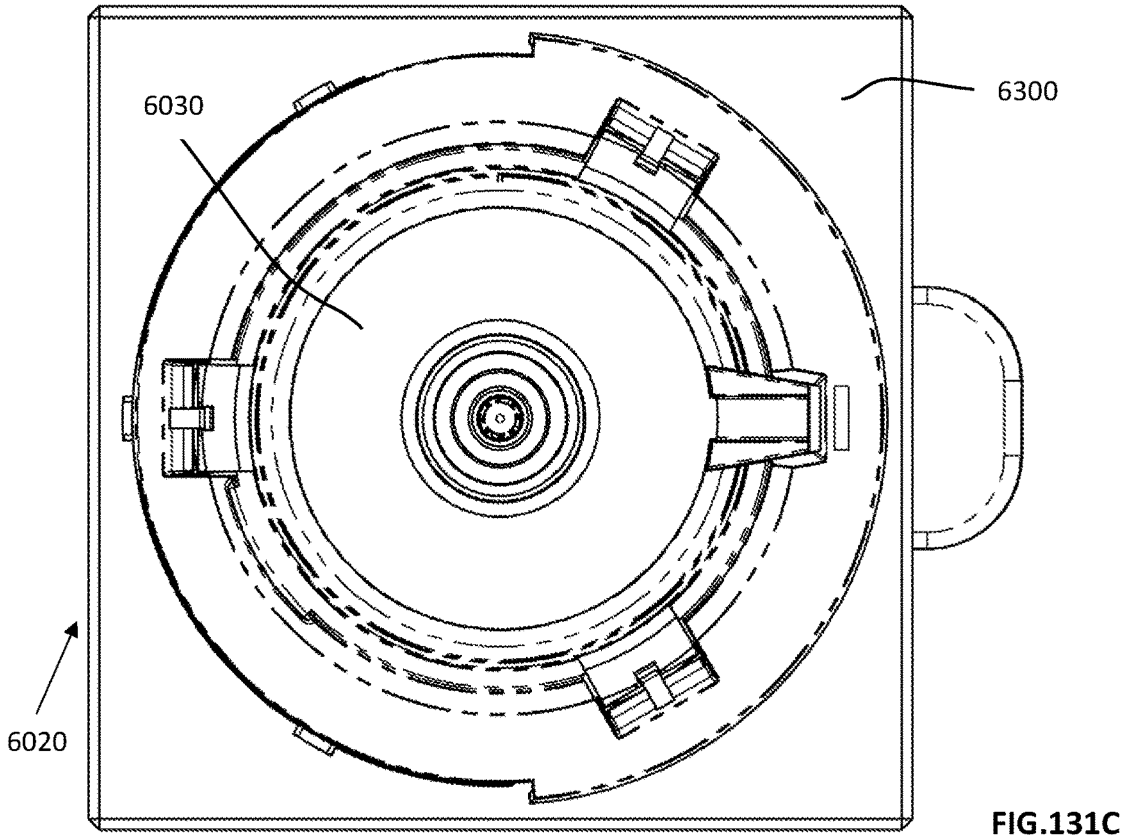
Figure 131D:
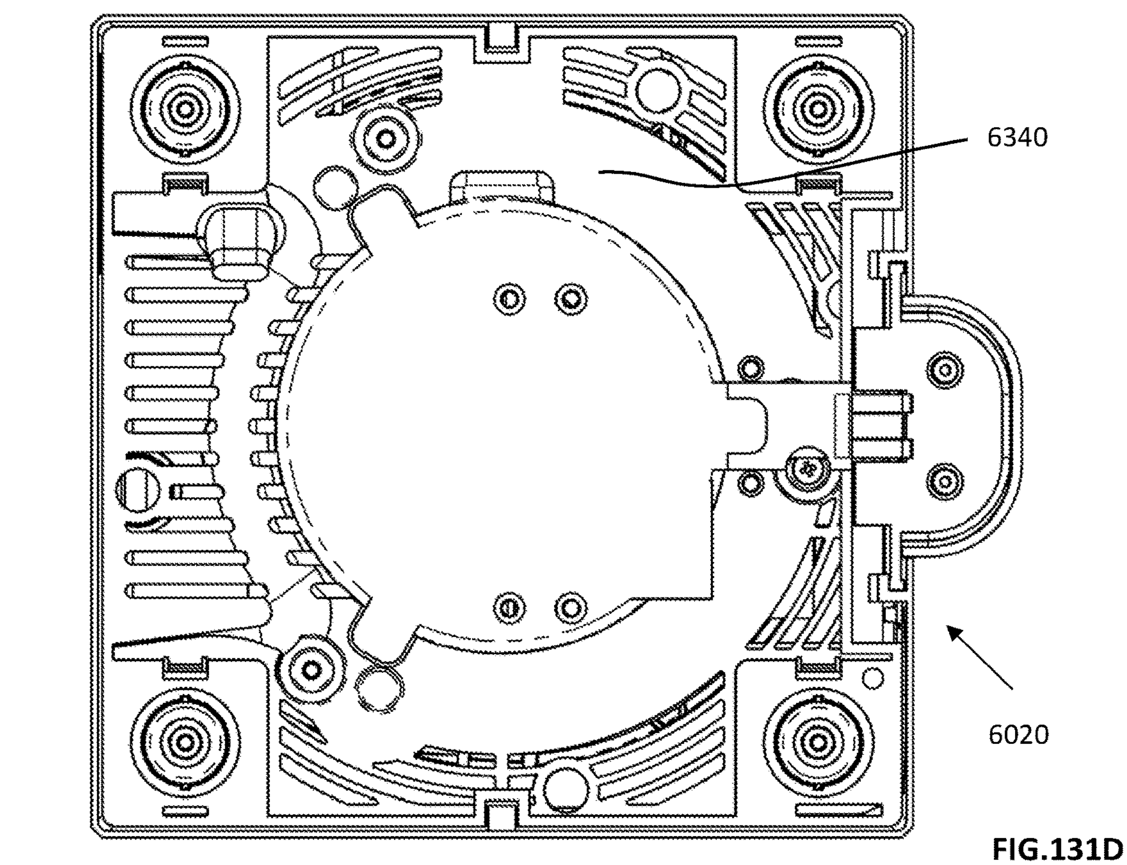
Figure 131E:
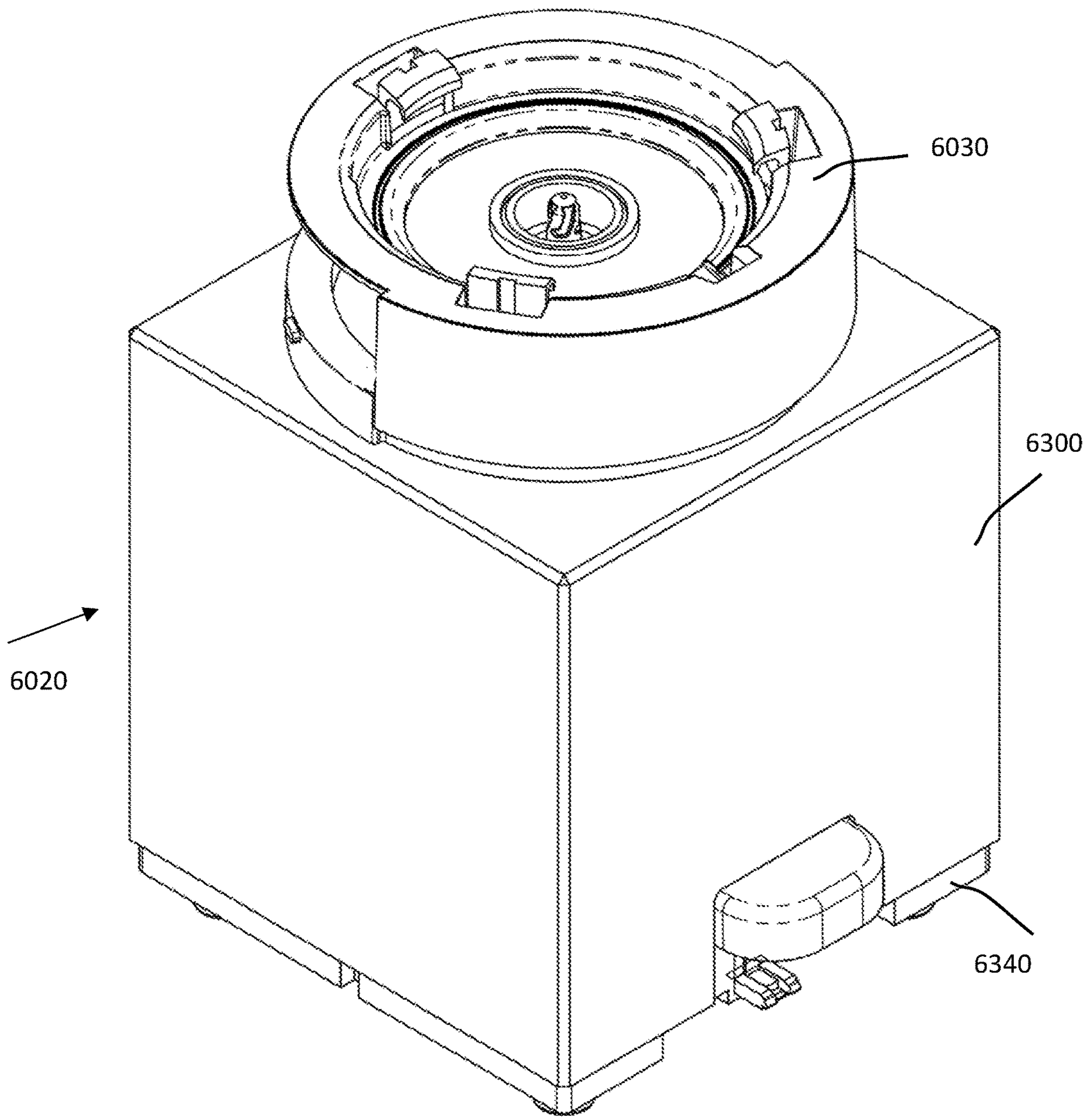
Figure 131F:
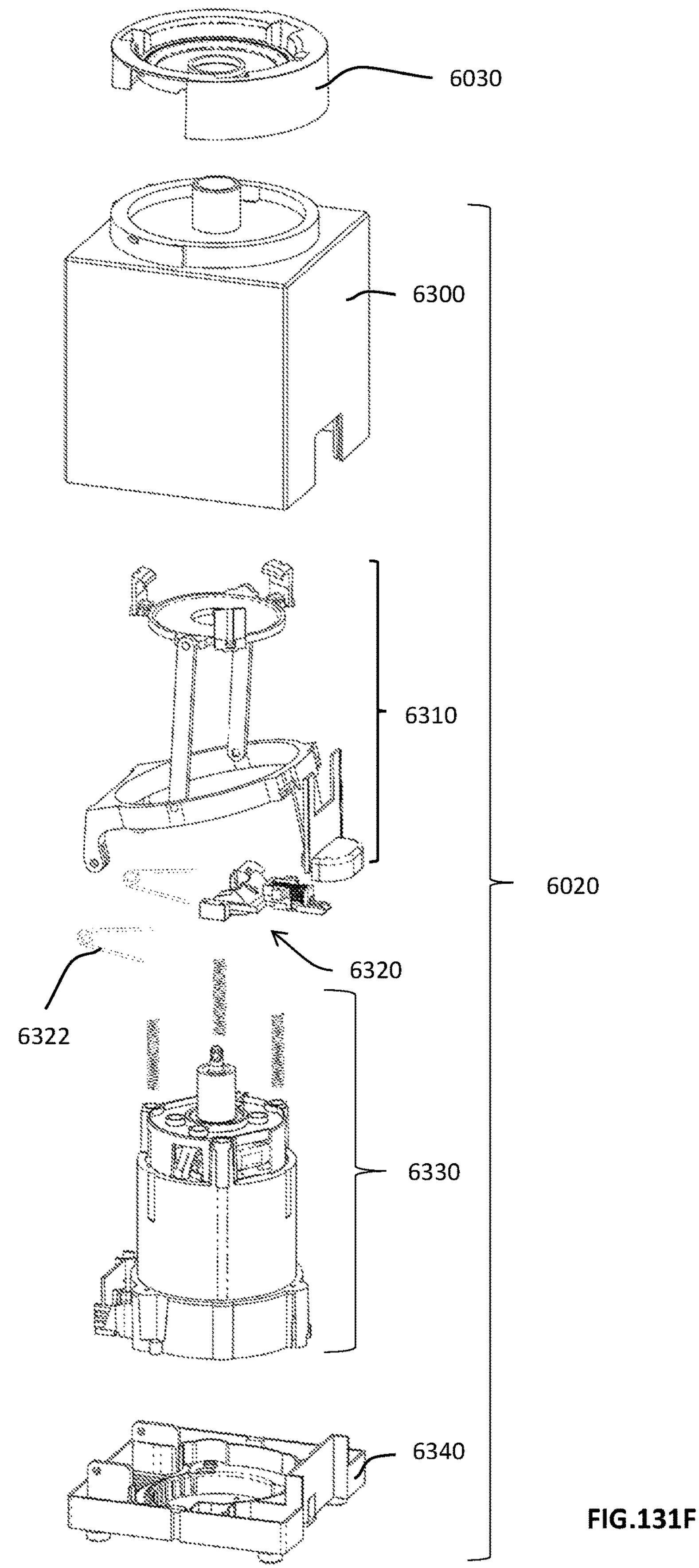
Figure 132A:
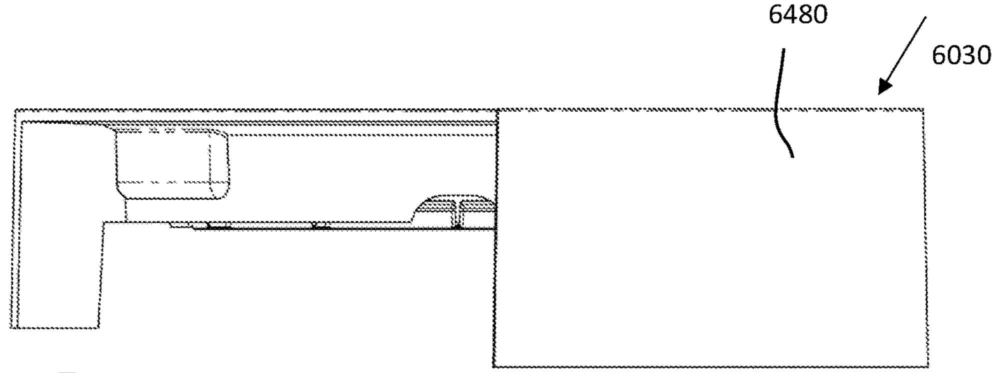
Figure 132B:
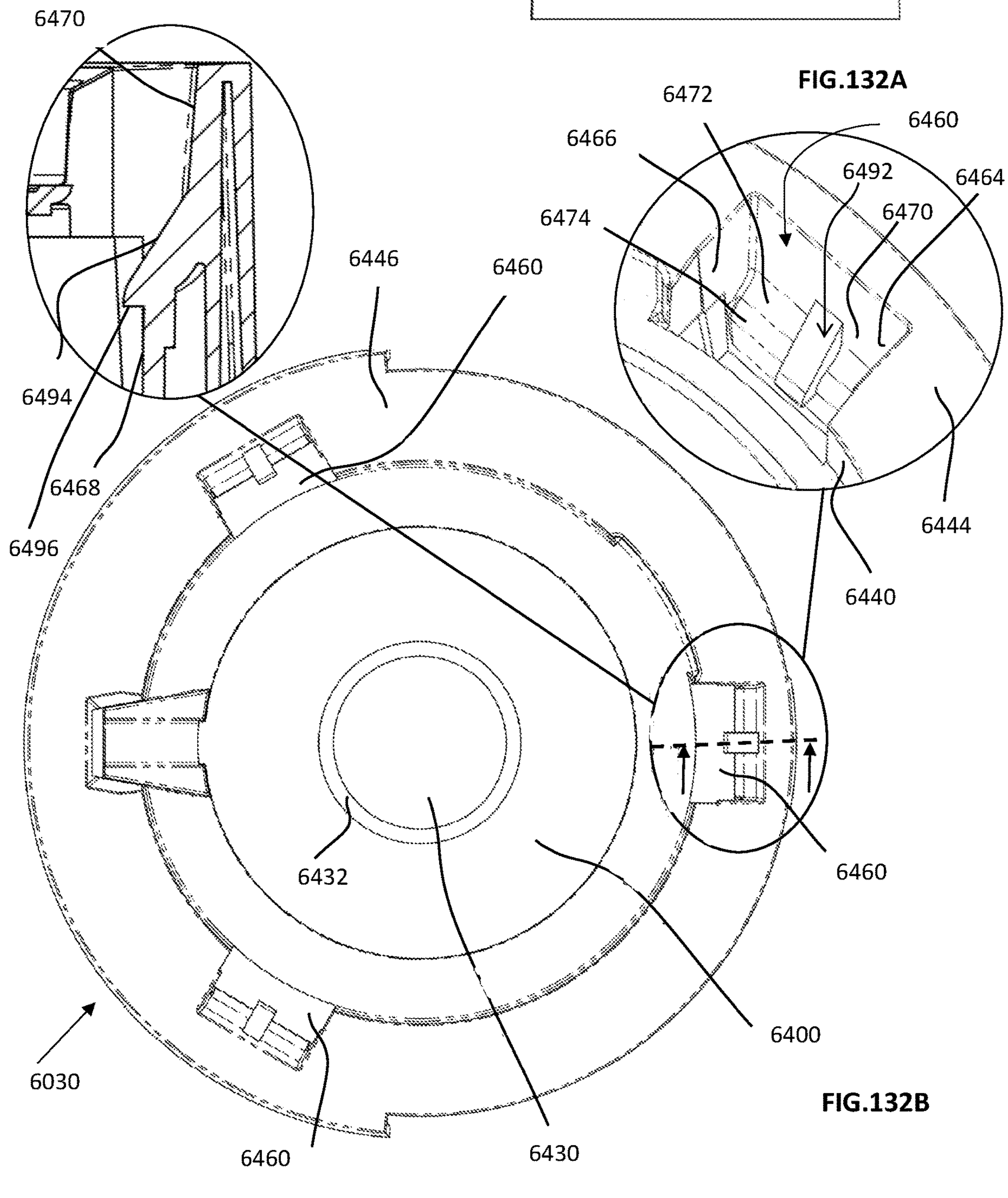
Figure 132C:
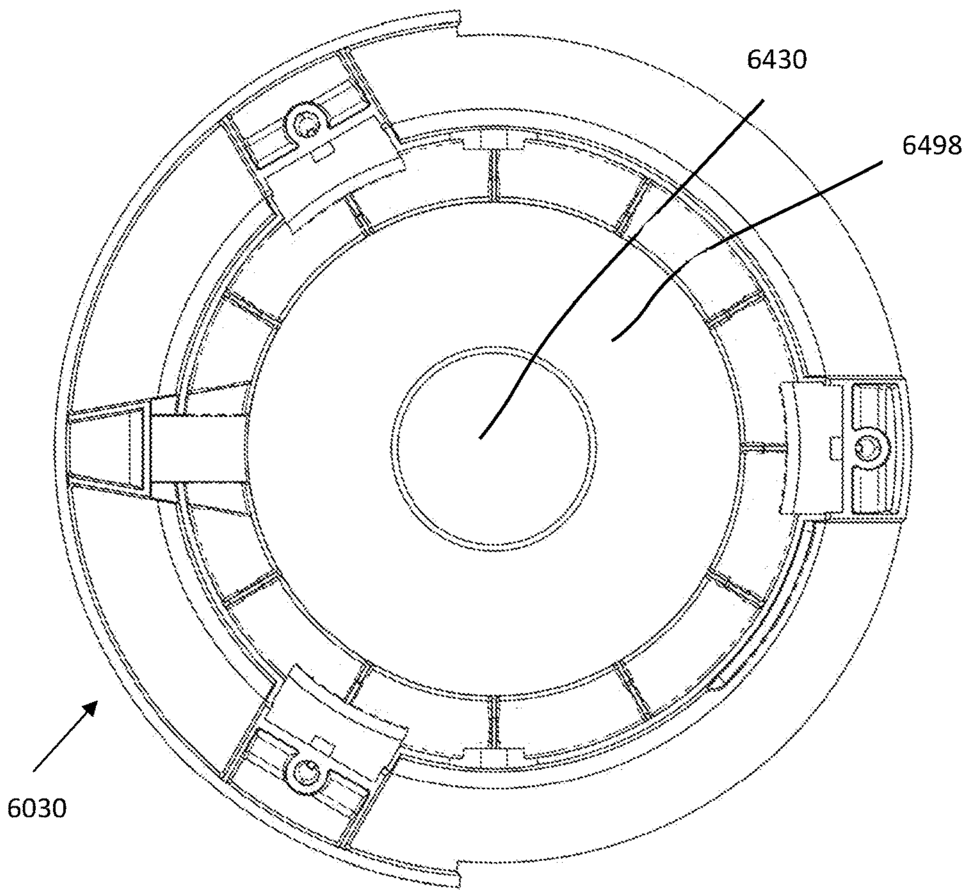
Figure 132D:
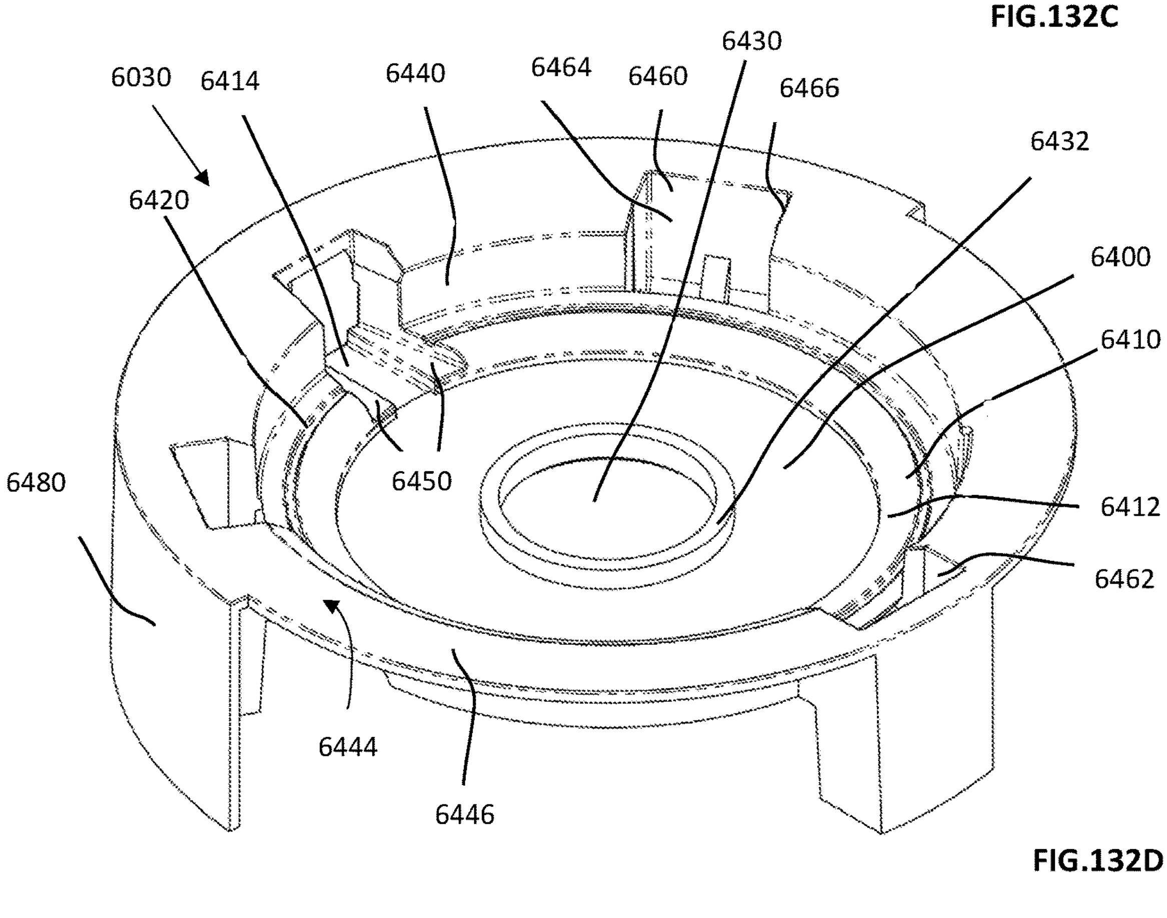
Figure 133A:
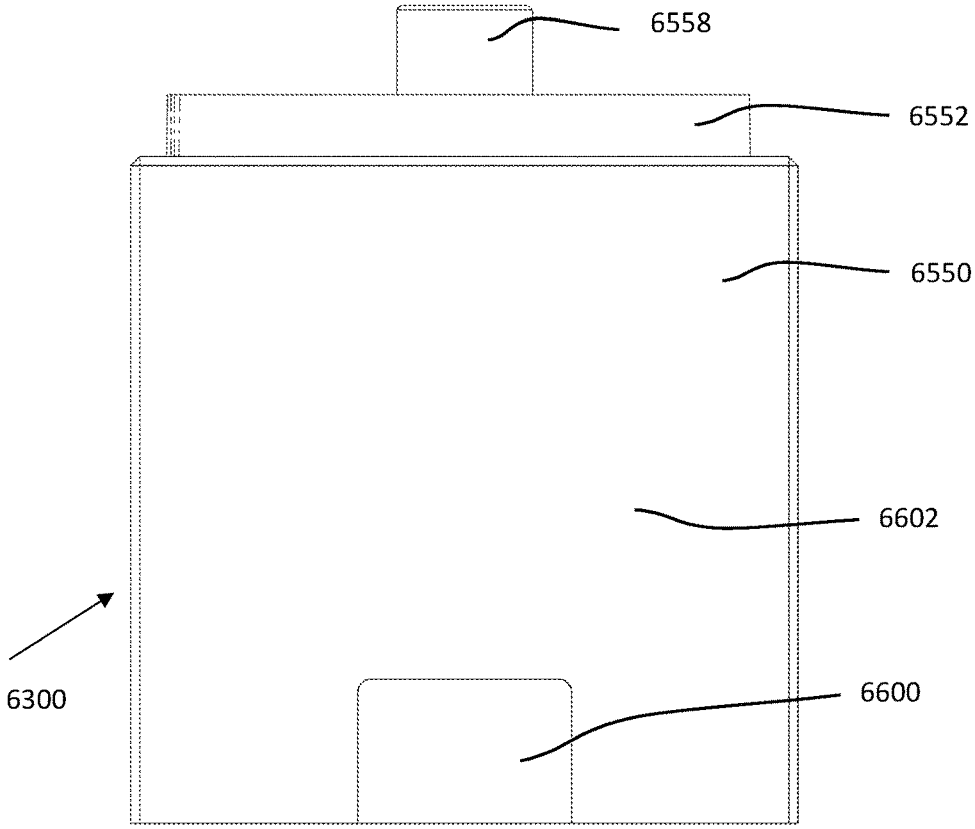
Figure 133B:
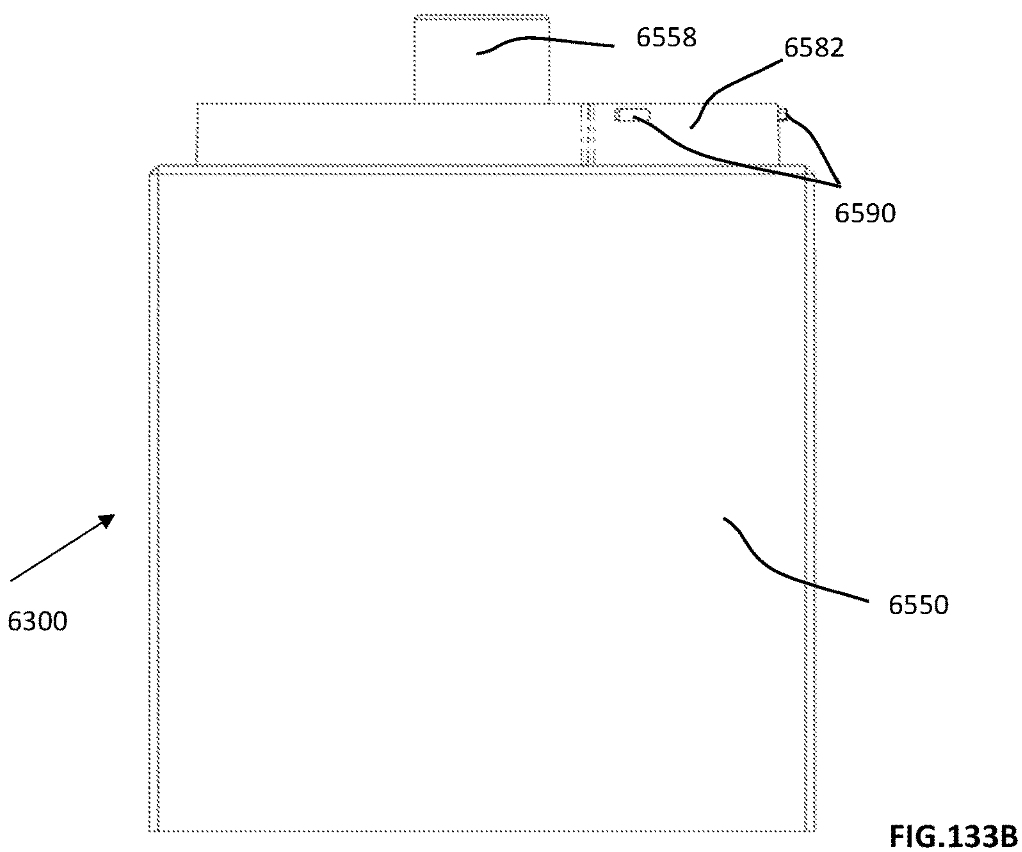
Figure 133C:
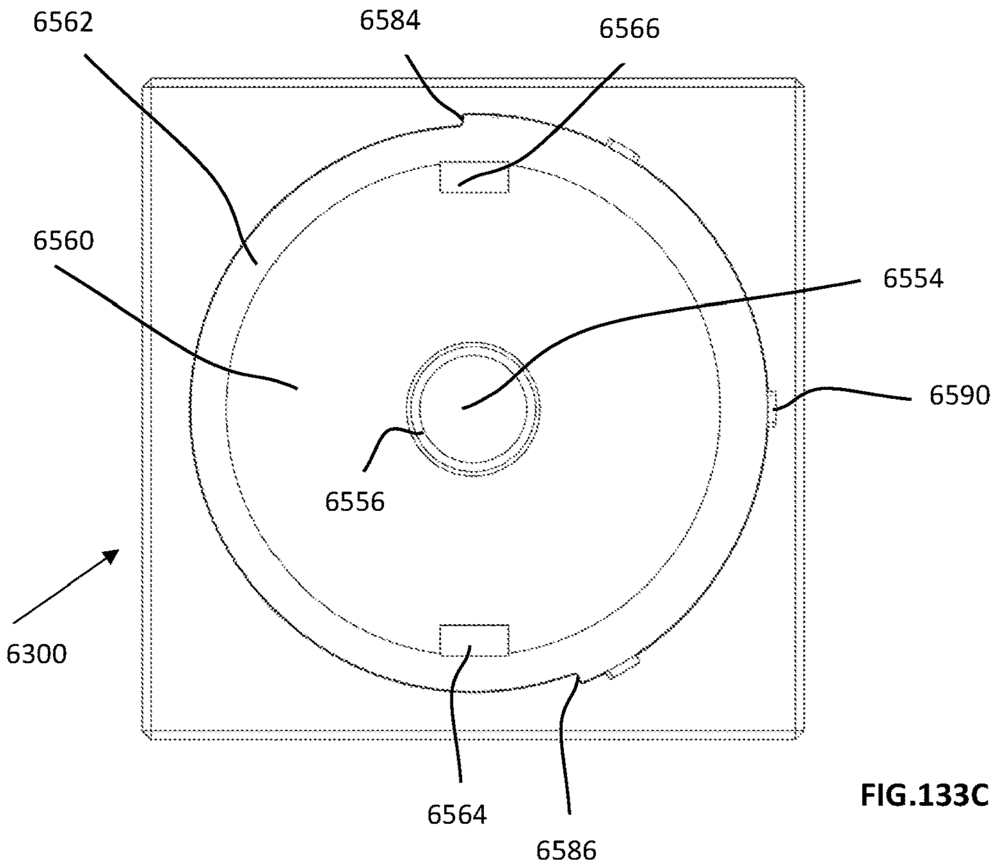
Figure 133D:
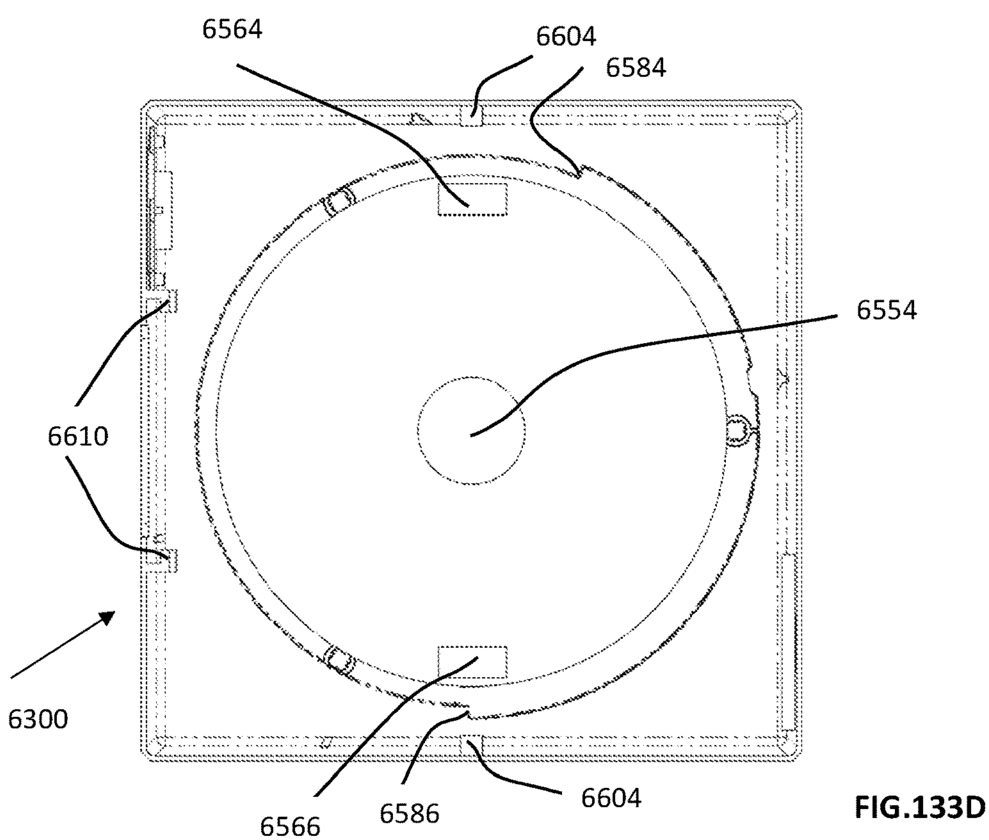
Figure 133E:
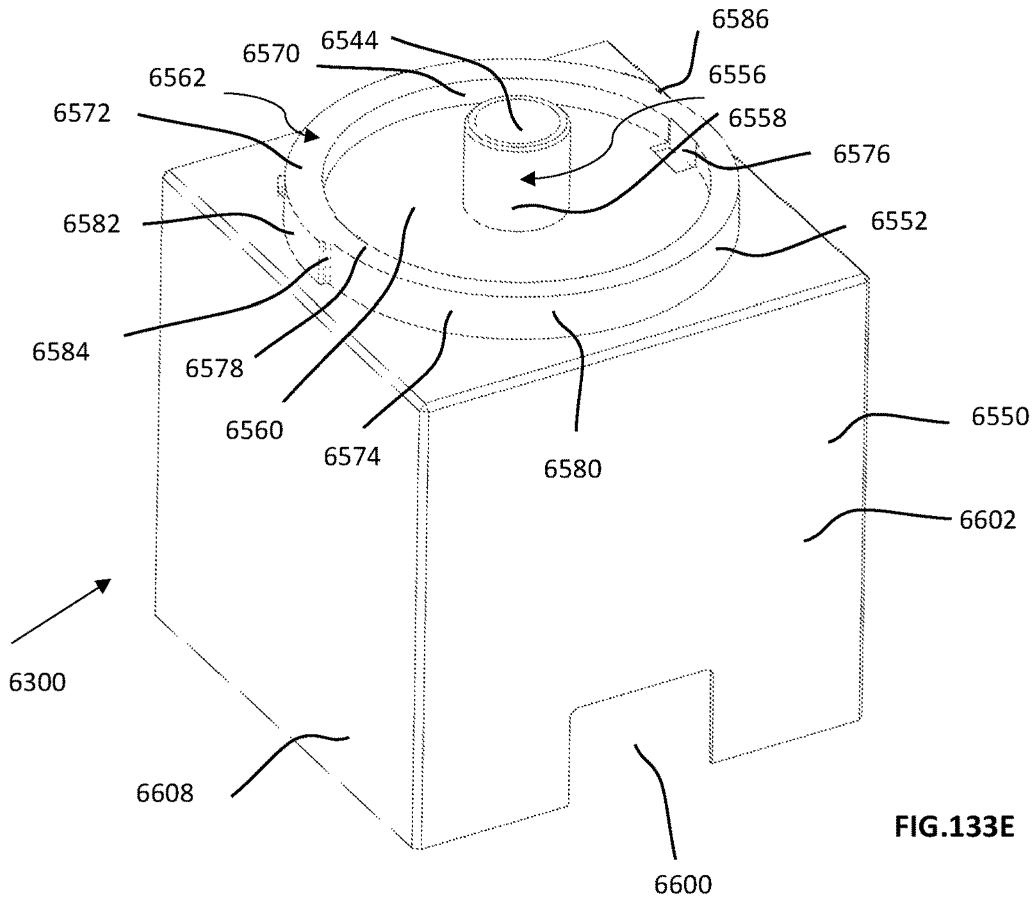
Figure 133F:
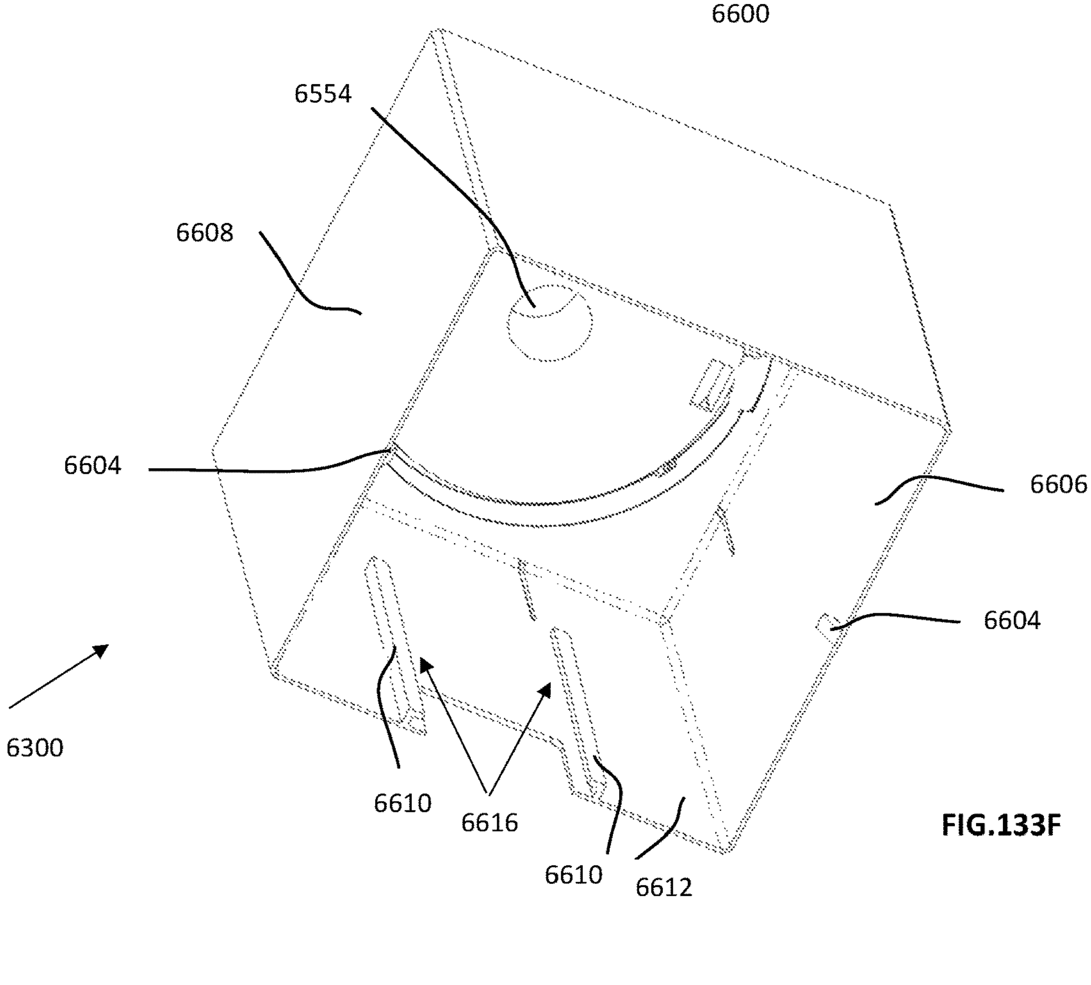

Reference is now made to FIGS. 157A, 157B, 157C, 157D and 157E, which are simplified planar front, planar side, planar top, pictorial and exploded view illustrations of bottom assembly 6340 (FIG. 131F).

As seen in FIGS. 157A-157E, bottom assembly 6340 preferably includes a generally square bottom element 7750. A plurality of, preferably four, load cells 7760 are preferably located in corner recesses 7762 (FIG. 159C) in bottom element 7750 and are secured by screws (not shown) to corresponding support pads 7764 underlying bottom element 7750 via load cell supports 7766, which overlie bottom element 7750. Support pads 7764 extend through corresponding corner apertures 7768 (FIG. 159C), which extend through bottom element 7750 at corner recesses 7762 (FIG. 159C). Load cells 7760 are preferably model GML624, commercially available from Xi'an Gavin Electronic Technology Co., Ltd Xi'an, Shaanxi, China.

Bottom assembly 6340 preferably defines a central recess 7770 for accommodating rotating ventilating element 7440 (FIGS. 156A-156E).

Reference is now made to FIGS. 158A, 158B, 158C and 158D, which are simplified respective planar top, planar bottom, planar side and pictorial view illustrations of load cell support 7766. As seen in FIGS. 158A-158D, load cell support 7766 is a generally circular integrally formed element having a central aperture 7780 for accommodating a screw. Outer surfaces of the load cell support 7766 include an apertured bottom surface 7782, a circumferential surface 7784 extending upwardly from bottom surface 7782 and terminating in a downward-facing annular surface 7786, thereby defining a circumferential locating shoulder 7788, which seats in a correspondingly configured portion of corner recess 7762 (FIG. 159C). Extending upwardly from annular surface 7786 is a circumferential surface 7790, which extends to a top annular surface 7792. A pair of upstanding load cell locating protrusions 7794 extend upwardly from top annular surface 7792. A pair of side protrusions 7796 extend laterally from each of protrusions 7794. A pair of rotational locating protrusions 7800 extend radially outwardly in opposite directions from circumferential surface 7784.

Reference is now made to FIGS. 159A, 159B, 159C and 159D, which are simplified respective planar front, planar side, planar top and pictorial view illustrations of bottom element 7750.

As seen in FIGS. 159A-159D, bottom element 7750 includes a plurality of screw mounting apertures 7804, corner recesses 7762 and corner apertures 7768. Each corner recess 7762 of the bottom element 7750 includes a plurality of, preferably two, snaps 7850, for securing load cells 7760 to bottom element 7750.

Bottom element 7750 preferably defines a partially interrupted circumferential wall 7854 for locating motor housing 7410 thereon and for separating warm and ambient air flows through the bottom element 7750.

Bottom element 7750 defines forward and rearward outer walls 7860 and 7870 as well as a pair of side walls 7880 and 7890. Forward wall 7860 is preferably formed with a central recessed wall portion 7892 delimited by side walls 7894 and 7896 and having formed therein a cut out 7898.

Figure 145A:
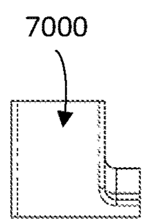
Figure 145B:
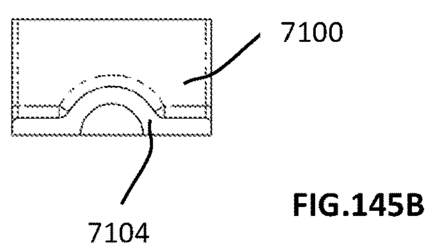
Figure 145C:
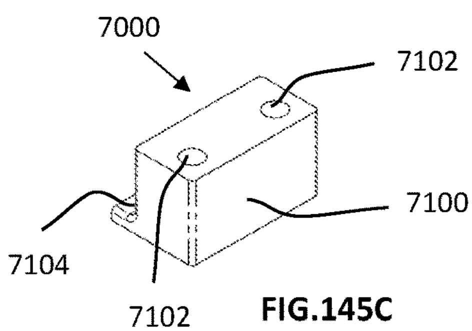
Figure 145D:
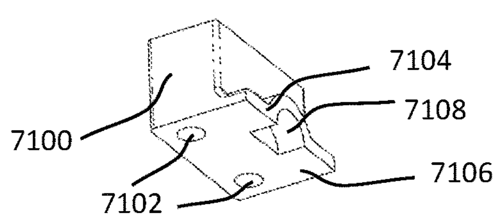
Figure 146A:
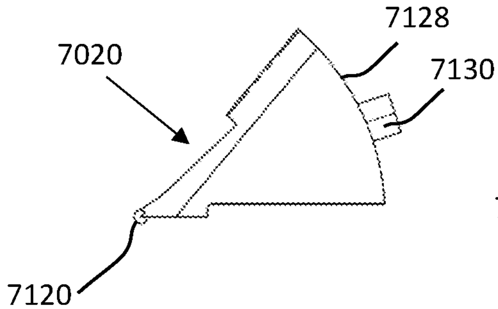
Figure 146B:
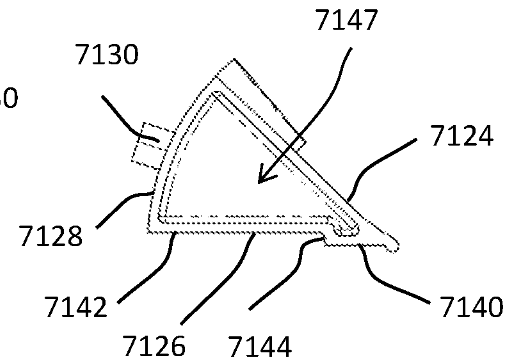
Figure 146C:
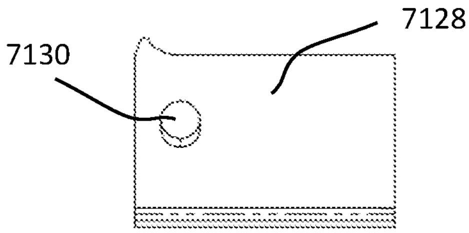
Figure 146D:
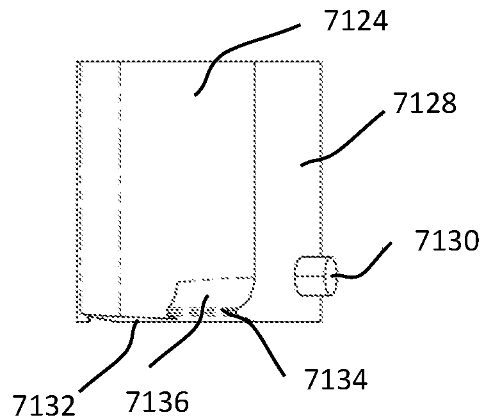
Figure 146E:
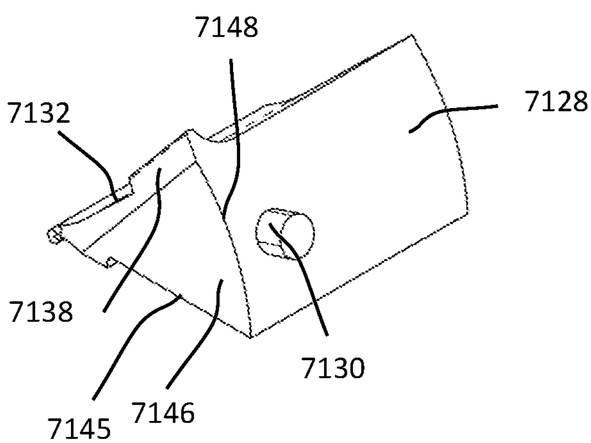
Figure 147A:
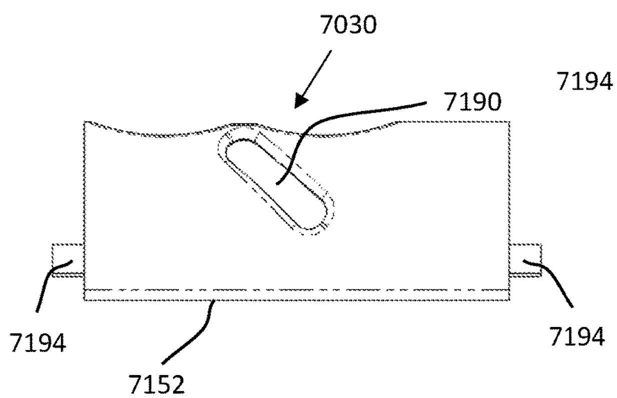
Figure 147B:
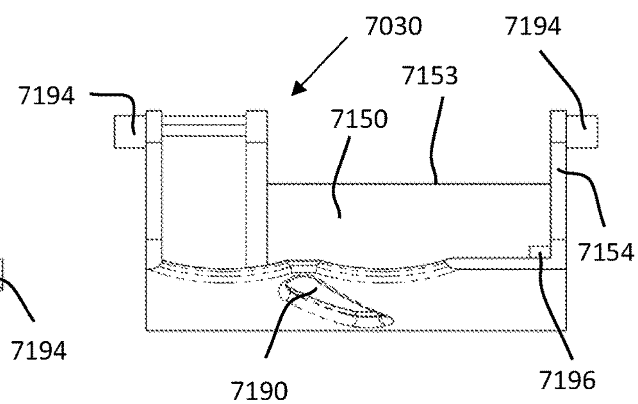
Figure 147D:
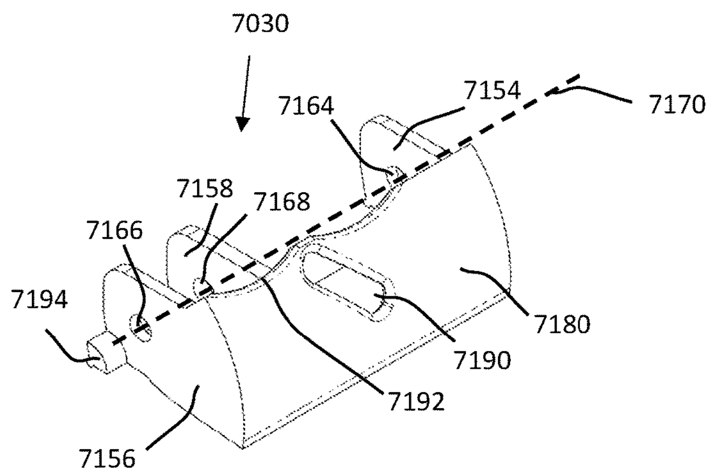
Figure 147C:
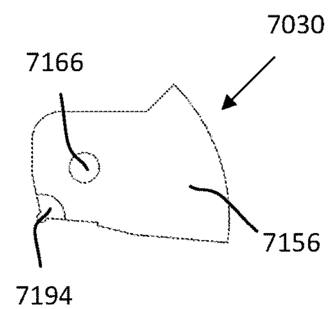
Figure 148A:
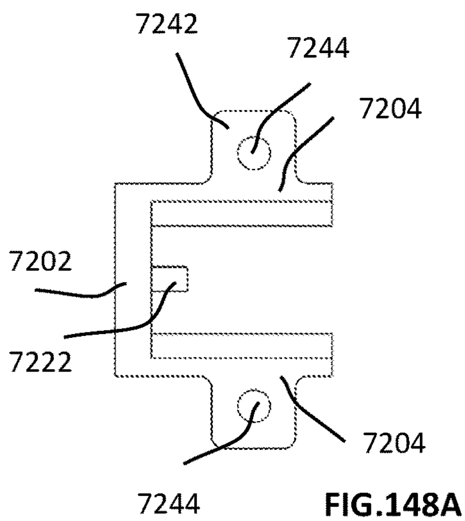
Figure 148B:
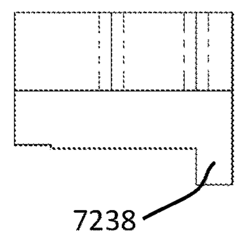
Figure 148D:
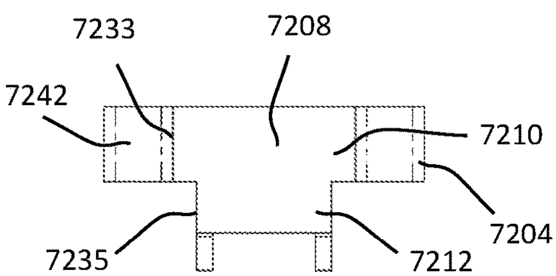
Figure 148C:
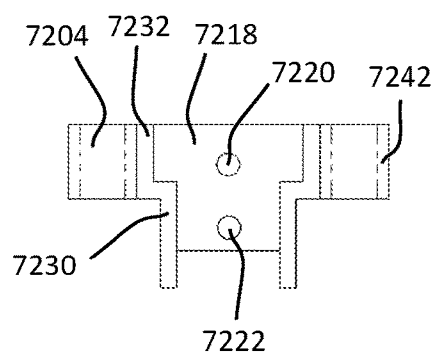
Figure 148E:
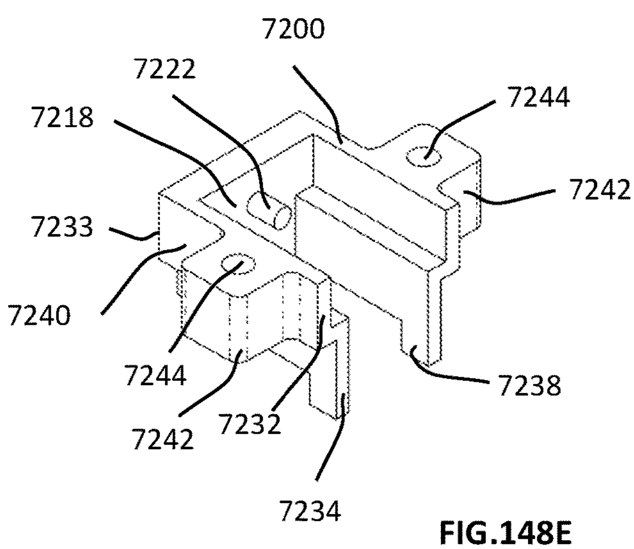
Figure 149A:
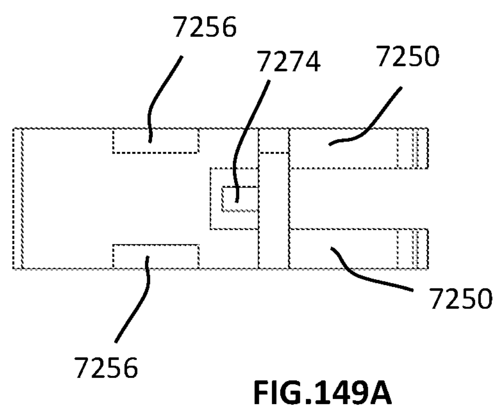
Figure 149D:
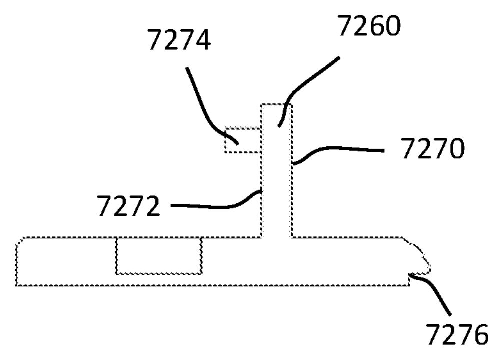
Figure 149B:
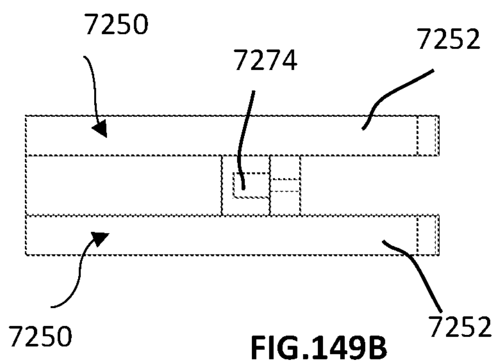
Figure 149C:
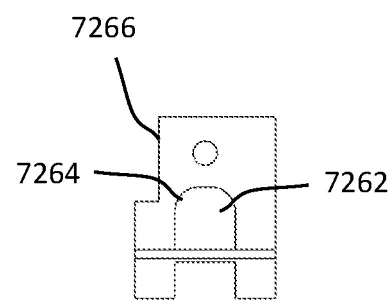
Figure 149E:
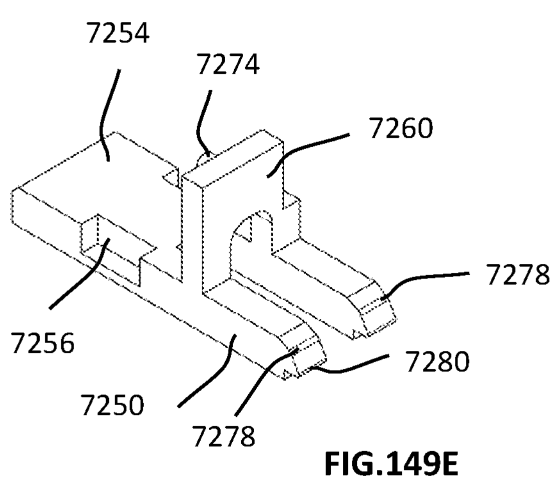
Figure 150B:
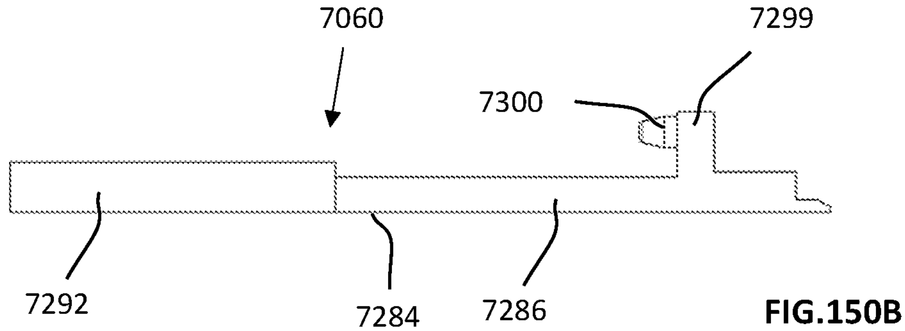
Figure 150C:
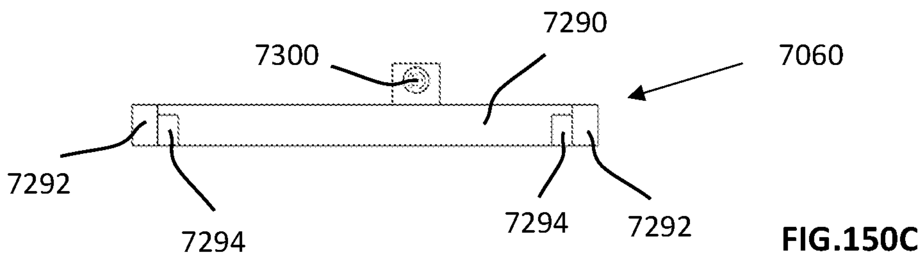
Figure 150A:
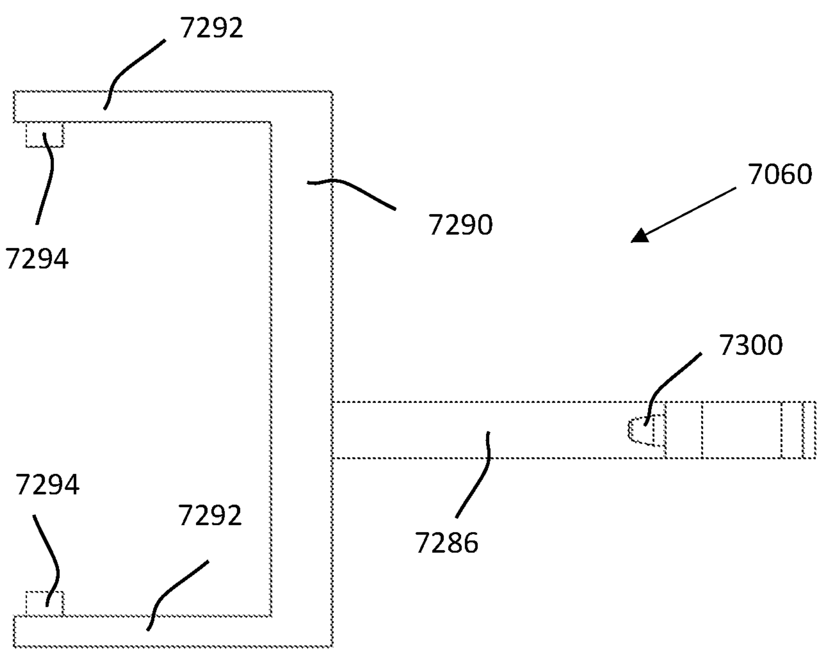
Figure 150D:
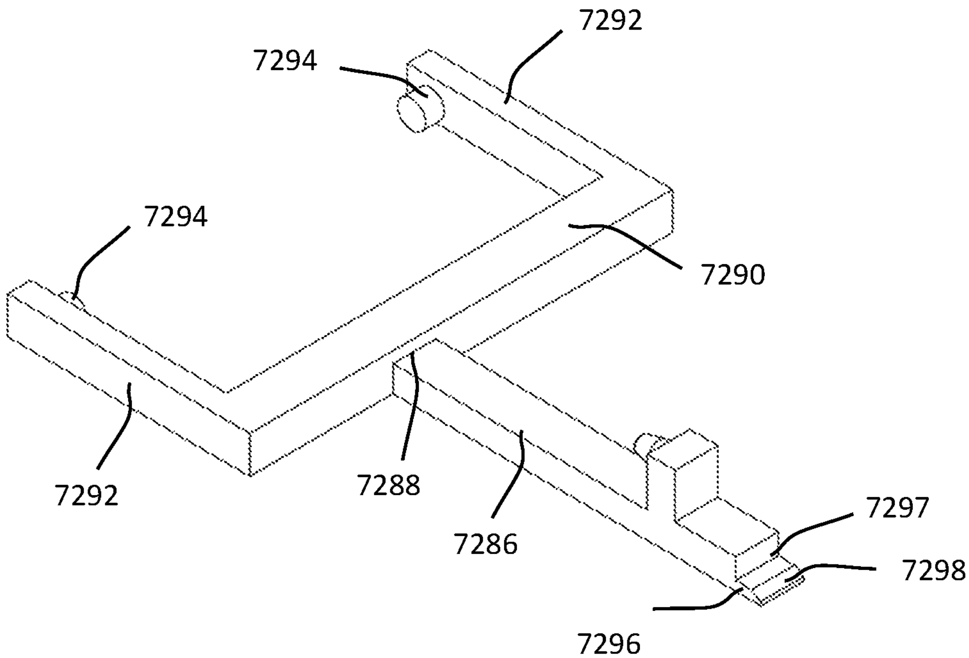

Bottom element 7750 preferably also defines a top-facing recessed generally circular planar surface 7900. Top-facing recessed generally circular planar surface 7900 defines two pairs 7910 of mounting apertures for mounting of hinge clamp elements 7000 (FIG. 144E) thereon. A shallow elongate recess 7920 is defined in top-facing recessed generally circular planar surface 7900 and extends generally between the two pairs 7910 of apertures. Recess 7920 preferably defines pivot axis 7010 (FIG. 145D). Extending adjacent to and parallel to recess 7920 is an upstanding wall 7930, having an interruption 7932. Upstanding wall 7930 defines a pivot support for rotationally displacing element 7020 and azimuthal alignment activation element 7030. Interruption 7932 accommodates rib 7158 of azimuthal alignment activation element 7030.

A channel 7950 communicates between cut out 7898 and an interior volume of the bottom element 7750 overlying generally circular planar surface 7900. A pair of mutually aligned apertures 7960 are formed alongside channel 7950 for screw mounting of multifunctional bracket 7040 onto bottom element 7750.

Interiorly of rear wall 7870 are formed a pair of upstanding walls 7970, which extend upwardly of rear wall 7870 and towards central recessed wall portion 7892. Each of rear walls 7870 is formed with an aperture 7972 at a location thereof lying above rear wall 7870. Apertures 7972 receive pins 6642 (FIG. 134E) for pivotable mounting of pivotable lever-operated element 6640 thereon.

Side walls 7880 and 7890 are preferably formed with mutually oppositely facing slots, respectively designated by reference numerals 7980 and 7982, which slots terminate at respective top walls 7984 and 7986. Each of slots 7980 and 7982 is engaged by a wedge-shaped protrusion 6604 of vertically displaceable base housing 6300.

The following section includes a simplified description of the operation of the embodiment of FIGS. 123A-159D.

Reference is now made to FIGS. 160A and 160B, which are simplified respective pictorial and sectional view illustrations of an initial step in the operation of MMIDD 6000 of FIGS. 123A-159D.

As seen in FIGS. 160A and 160B, initially MMIDD 6000 is seen to be in a rest operative orientation with the top housing assembly 6010 in a door open operative orientation prior to insertion of a SUPCA, such as SUPCA 3100, into operative engagement therewith. When the MMIDD 6000 is in the rest operative orientation, springs 7414 are in a compressed operative state and urge vertically displaceable base housing 6300 upwardly relative to bottom assembly 6340. Upward displacement of vertically displaceable base housing 6300 relative to bottom assembly 6340 is limited by engagement of wedge-shaped protrusions 6604 (FIG. 133F) with top walls 7984 and 7986 of bottom element 7750 (FIG. 159D) (not shown in FIGS. 160A & 160B).

The top of outer drive shaft assembly 7400 lies just above the plane of upstanding circumferential rim 6432 of SUPCAS 6030.

Pivotable lever-operated element 6640 is in an extreme upwardly rotated operative orientation relative to bottom assembly 6340 under the urging of springs 6322 (FIG. 131F) (not shown in FIGS. 160A & 160B). As a result of this operative orientation of pivotable lever-operated element 6640, lever connecting element 6650, bottom lever element 6660, top lever element 6670, linkage element 6680 and activation pin element 6690 are each in their upwardmost operative orientations.

Reference is now made to FIGS. 161A and 161B, which are simplified respective pictorial and sectional view illustrations of a second step in the operation of the MMIDD 6000 of FIGS. 123A-159D. The operative orientation of FIGS. 161A and 161B is reached by inserting a SUPCA, such as any of the SUPCAs described hereinabove, into seated engagement with SUPCAS 6030, as indicated by an arrow 7990 in FIG. 160A, and closing the door of top housing assembly 6010 of MMIDD 6000, as indicated by an arrow 7992 in FIG. 160A. Operation of MMIDD 6000 is not yet actuated by a user pressing on an electrical operation actuation button 8002. In the illustrated embodiment, SUPCA 3100 of FIGS. 61A-61B with blade 3550 of FIGS. 64A-64F is shown.

As seen most clearly in an enlargement in FIG. 161B, clamp elements 6620 are each in an outwardly rotated operative orientation outside of engagement with SUPCA 3100. This outwardly rotated operative orientation of each clamp element 6620 results from an upward operative orientation of pivotable clamp mounting element 6630, which in turn results from the extreme upwardly rotated operative orientation of pivotable lever-operated element 6640 relative to bottom assembly 6340. It is appreciated that the pivotable clamp mounting element 6630 is pivotably interconnected with pivotable lever-operated element 6640, via struts 6634, such that upward rotation of pivotable lever-operated element 6640 produces upward displacement of pivotable clamp mounting element 6630 under the urging of springs 6322 (not shown in FIGS. 161A & 161B).

Upward displacement of pivotable clamp mounting element 6630 under the indirect urging of springs 6322 relative to SUPCAS 6030 causes upward displacement of clamp element 6620, such that shoulder 6752 of clamp element 6620 comes into engagement with shoulder 6496 of SUPCAS 6030 and causes consequent rotation of clamp element 6620 relative to shoulder 6496 about pivot pin 6632.

Reference is now made to FIGS. 162A and 162B, which are simplified respective pictorial and sectional view illustrations of a third step in the operation of MMIDD 6000 of FIGS. 123A-159D. The operative orientation of FIGS. 162A and 162B is reached by a user pressing downwardly, in a direction indicated by an arrow 8000, on top lever element 6670. The vertically displaceable base housing 6300 is in the same position relative to the bottom assembly 6340 as in the operative orientations of FIGS. 160A-161B. Electrically driven operation of MMIDD 6000 is not yet actuated by a user pressing on electrical operation actuation button 8002.

As distinguished from the operative orientation of FIGS. 161A and 161B, in the operative orientation of FIGS. 162A and 162B:

Pivotable lever-operated element 6640 is no longer in an extreme upwardly rotated operative orientation relative to bottom assembly 6340. Concomitant with the slightly less upwardly rotated operative orientation of pivotable lever-operated element 6640, lever connecting element 6650, bottom lever element 6660, top lever element 6670, linkage element 6680 and activation pin element 6690 are each in a respective slightly less than upwardmost operative orientation.

Slightly downward displacement of pivotable clamp mounting element 6630 relative to SUPCAS 6030 causes corresponding downward displacement of clamp element 6620, such that shoulders 6752 of clamp elements 6620 no longer are in engagement with shoulders 6496 of SUPCAS 6030. Clamp elements 6620 are urged by springs 6633 into touching engagement with a rim 8010 of SUPCA 3100.

Reference is now made to FIGS. 163A and 163B, which are simplified respective pictorial and sectional view illustrations of a fourth step in the operation of MMIDD 6000. The operative orientation of FIGS. 163A and 163B is reached by a user pressing top lever element 6670 further downwardly, in a direction indicated by an arrow 8020. This results in the vertically displaceable base housing 6300 being lowered relative to the bottom assembly 6340, as indicated by an arrow 8030. Operation of MMIDD 6000 is not yet actuated by a user pressing on electrical operation actuation button 8002.

As distinguished from the operative orientation of FIGS. 162A and 162B, in the operative orientation of FIGS. 163A and 163B:

Pivotable lever-operated element 6640 is now in an extreme downward rotated operative orientation relative to bottom assembly 6340. Concomitant with the extreme downwardly rotated operative orientation of pivotable lever-operated element 6640, lever connecting element 6650, bottom lever element 6660, top lever element 6670, linkage element 6680 and activation pin element 6690 are each in a respective downwardmost operative orientation.

The downward displacement of pivotable clamp mounting element 6630, indicated by an arrow 8040, relative to SUPCAS 6030 causes corresponding downward displacement of clamp elements 6620, indicated by an arrow 8042, in clamping engagement with rim 8010 of SUPCA 3100. The downward displacement of clamp elements 6620 causes downward displacement of SUPCA 3100, as indicated by an arrow 8044, downward displacement of the SUPCAS 6030, onto which SUPCA 3100 is seated, as indicated by an arrow 8046, and the downward displacement of vertically displaceable base housing 6300, as indicated by an arrow 8048, relative to bottom assembly 6340 against the urging of springs 7414.

It is seen that as the result of downward displacement of SUPCAS 6030, the top of outer drive shaft assembly 7400 lies substantially above the plane of upstanding circumferential rim 6432 of SUPCAS 6030. As a result of this, the outer drive shaft assembly 7400 is in full seated engagement with blade 3550 and has forced blade 3550 out of blade receiving recess 3510.

It is also seen that as a result of downward displacement of top lever element 6670, in a direction indicated by arrow 8020 (FIG. 163A), inclined outwardly facing surfaces 7278 at ends 7280 of lever locking element 7050 engage edge 6965 of bottom lever element 6660 thereby causing transverse displacement of lever locking element 7050, in a direction indicated by an arrow 8050, against the urging of spring 7042. When edge 6965 is displaced sufficiently downwardly so as to clear inclined outwardly-facing surface 7278, lever locking element moves, under the urging of spring 7042, in a direction, indicated by an arrow 8052, opposite to the direction indicated by arrow 8050, and into locking engagement of shoulder 7276 of lever locking element 7050 with edge 6965 of bottom lever element 6660, as shown. In this operative orientation, activation pin element 6690 is seen to have rotated upwardly about pivot pin 6692 into engagement with elongate actuator rod portion 7286.

Locking engagement of shoulder 7276 of lever locking element 7050 with edge 6965 of bottom lever element 6660, as shown, ensures that, upon a user releasing top lever element 6670, the bottom lever element 6660 remains locked in its lowered position.

Reference is now made to FIGS. 164A, 164B and 164C, which are simplified respective pictorial, sectional and partially cut away pictorial illustrations of a fifth step in the operation of MMIDD 6000. The operative orientation of FIGS. 164A-164C is reached by a user releasing top lever element 6670. This results in the top lever element 6670 moving upwardly, as indicated by an arrow 8060, and being vertically spaced from the bottom lever element 6660, allowing linkage element 6680 to pivot about pin 6682 under the urging of spring 6684 into a raised operative orientation, thereby raising pivot pin 6692, about which activation pin element 6690 is pivotably mounted onto linkage element 6680, thereby retracting activation pin element 6690 and enabling seating of solid rounded end portion 6975 of activation pin element 6690 against shoulder 7297 of azimuthal alignment activation driving element 7060. This preserves full disengagement of the azimuthal alignment assembly 6320 from protrusions 7726 of ventilating element 7440 and allows unimpeded rotation of blade 3550.

At this stage operation of MMIDD 6000 may be actuated by a user pressing on electrical operation actuation button 8002 for processing the contents of SUPCA 3100 by rotation of blade 3550 of SUPCA 3100 in operative engagement with the contents thereof.

FIGS. 165A-167C described hereinbelow illustrate activation of the azimuthal alignment assembly 6320 following completion of processing of the contents of the SUPCA by the MMIDD 6000.

Reference is now made to FIGS. 165A, 165B and 165C, which are simplified respective pictorial, sectional and partially cut away pictorial illustrations of a sixth step in the operation of MMIDD 6000. The operative orientation of FIGS. 165A-165C is reached by a user pressing downwardly on top lever element 6670, as indicated by an arrow 8070. This initially reduces the vertical spacing between the top lever element 6670 and the bottom lever element 6660, thereby causing linkage element 6680 to approach planar alignment with activation pin element 6690. This, in turn, displaces activation pin element 6690 in a direction indicated by an arrow 8072. Displacement of activation pin element 6690 produces a corresponding displacement of azimuthal alignment activation driving element 7060, against the urging of spring 7042, in a direction indicated by an arrow 8074, which is coaxial with the direction indicated by arrow 8072.

Displacement of azimuthal alignment activation driving element 7060, in the direction indicated by arrow 8074, produces rotational movement of rotationally displacing element 7020 and azimuthal alignment activation element 7030 about pivot axis 7010, such that generally radially extending wall portion 7124 and elongate protrusion 7134 of rotationally displacing element 7020 and curved cam path defining edge 7192 of azimuthal alignment activation element 7030 approach engagement with one of protrusions 7726 of rotating ventilating element 7440, which is fixedly coupled to outer drive shaft assembly 7400 and thus rotates together with blade 3550. It is appreciated that the azimuthal orientation of the rotating ventilating element 7440, and thus of protrusions 7726, prior to engagement therewith by edge 7912, is entirely arbitrary at this stage, namely after completion of processing of the contents of SUPCA 3100.

It is a particular feature of an embodiment of the present invention that the azimuthal alignment assembly 6320 is operative to properly align a blade, such as blade 3550 in the illustrated embodiment, such that it is aligned with the blade receiving recess 3510 of SUPCA 3100 irrespective of the azimuthal orientation of blade 3550 and thus of protrusions 7726 on rotating ventilating element 7440. It is appreciated that blade receiving recess 3510 is configured to receive a blade, such as blade 160, blade 3160 or blade 3550, in one of two azimuthally opposite operative orientations. The features of the operation of the azimuthal alignment assembly 6320 which achieve the azimuthal alignment between the blade receiving recess 3510 and the blade, such as blade 160, blade 3160 or blade 3550, are described below with reference to FIGS. 166A-167C.

It is appreciated that when SUPCA 4100, including blade 4150, or SUPCA 4200, including blade 4250, is used together with MMIDD 6000, no azimuthal alignment is required since blades 4150 and 4250 do not move axially relative to MMIDD 6000.

Reference is now made to FIGS. 166A, 166B and 166C, which are simplified respective pictorial, sectional and partially cut away pictorial illustrations of a seventh step in the operation of MMIDD 6000. The operative orientation of FIGS. 166A-166C is reached by a user further pressing downwardly on top lever element 6670, as indicated by an arrow 8080. This further reduces the vertical spacing between the top lever element 6670 and the bottom lever element 6660, thereby causing linkage element 6680 to further approach planar alignment with activation pin element 6690. This further displaces activation pin element 6690 in a direction indicated by an arrow 8082. This further displacement of activation pin element 6690 produces a corresponding further displacement of azimuthal alignment activation driving element 7060, against the urging of spring 7042, in a direction indicated by an arrow 8084, which is coaxial with the direction indicated by arrow 8082.

Further displacement of azimuthal alignment activation driving element 7060, in the direction indicated by arrow 8084, produces further rotational movement of rotationally displacing element 7020 and azimuthal alignment activation element 7030 about pivot axis 7010, such that one of generally radially extending wall portion 7124 and elongate protrusion 7134 of rotationally displacing element 7020 and curved cam path defining edge 7192 of azimuthal alignment activation element 7030 engages one of protrusions 7726 of rotating ventilating element 7440, which is fixedly coupled to outer drive shaft assembly 7400 and thus rotates together with blade 3550. This initial engagement produces initial rotation of rotating ventilating element 7440 in either a clockwise or a counterclockwise direction, as indicated by an arrow 8086.

It is appreciated that in the operative orientation of FIGS. 166A-166C, lever locking element 7050 and bottom lever element 6660 remain in mutually locked engagement, thereby preventing raising of clamp elements 6620, pivotable clamp mounting element 6630, pivotable lever-operated element 6640, lever connecting element 6650, SUPCAS 6030 and vertically displaceable base housing 6300 relative to bottom assembly 6340.

Reference is now made to FIGS. 167A, 167B and 167C, which are simplified respective pictorial, sectional and partially cut away pictorial illustrations of an eighth step in the operation of MMIDD 6000. The operative orientation of FIGS. 167A-167C is reached by a user still further pressing downwardly on top lever element 6670 as indicated by an arrow 8090. This still further reduces the vertical spacing between the top lever element 6670 and the bottom lever element 6660, thereby causing linkage element 6680 to still further approach planar alignment with activation pin element 6690. This, in turn, still further displaces activation pin element 6690 in a direction indicated by an arrow 8092. This still further displacement of activation pin element 6690 produces a corresponding further displacement of azimuthal alignment activation driving element 7060, against the urging of spring 7042, in a direction indicated by an arrow 8094, which is coaxial with the direction indicated by arrow 8092.

Still further displacement of azimuthal alignment activation driving element 7060, in the direction indicated by arrow 8094, produces still further rotational movement of rotationally displacing element 7020 and azimuthal alignment activation element 7030 about pivot axis 7010 such that portions of generally radially extending wall portion 7124 and elongate protrusion 7134 of rotationally displacing element 7020 and curved cam path defining edge 7192 of azimuthal alignment activation element 7030 engages both protrusions 7726 of rotating ventilating element 7440, which is fixedly coupled to outer drive shaft assembly 7400 and thus rotates together with blade 3550. In practice, both protrusions 7726 are engaged with at least curved cam path defining edge 7192 at this stage. It is appreciated that there are only two possible azimuthal orientations of the rotating ventilating element 7440 at which both protrusions 7726 are engaged with curved cam path defining edge 7192.

It is appreciated that in the operative orientation of FIGS. 167A-167C, lever locking element 7050 and bottom lever element 6660 no longer remain in mutually locked engagement, thereby no longer preventing raising of clamp elements 6620 pivotable clamp mounting element 6630, pivotable lever-operated element 6640, lever connecting element 6650, SUPCAS 6030 and vertically displaceable base housing 6300 relative to bottom assembly 6340.

Reference is now made to FIGS. 168A, 168B and 168C, which are simplified respective pictorial, sectional and partially cut away pictorial illustrations of a ninth step in the operation of MMIDD 6000.

The operative orientation of FIGS. 168A-168C is reached only after the blade, such as blade 160, blade 3160 or blade 3550, is properly azimuthally aligned, so as to be able to be axially displaced into blade receiving recess 3510, and in response to a user releasing top lever element 6670. As noted above, when using a SUPCA including blade 4150 or blade 4250 no azimuthal alignment is necessary, and the operative orientation of FIGS. 168A-168C is reached in response to a user releasing top lever element 6670.

Releasing the top lever element 6670 allows the bottom lever element 6660, together with clamp elements 6620, pivotable clamp mounting element 6630, pivotable lever-operated element 6640, lever connecting element 6650, SUPCAS 6030 and vertically displaceable base housing 6300, to be displaced upwardly relative to bottom assembly 6340 under the urging of springs 7414, 6684 and 6322. This upward displacement causes blade 3550 to be fully seated in blade receiving recess 3510. At this stage, the outer drive shaft 7400 is still fully seated in blade 3550.

As specifically seen in FIGS. 168A-168C, an initial upward displacement of bottom lever element 6660 in a direction indicated by an arrow 8100 changes the near-coplanar mutual alignment of activating pin 6690 and azimuthal alignment activation driving element 7060 which enables unseating of activating pin 6690 from shoulder 7297 of azimuthal alignment activation driving element 7060, allowing displacement of azimuthal alignment activation driving element 7060 in a direction 8102 under the urging of spring 7042. The displacement of azimuthal alignment activation driving element 7060 in the direction 8102 under the urging of spring 7042 causes rotational movement of rotationally displacing element 7020 and azimuthal alignment activation element 7030 about pivot axis 7010 in a direction indicated by an arrow 8104.

Reference is now made to FIGS. 169A and 169B, which are simplified respective pictorial and sectional view illustrations of a tenth step in the operation of MMIDD 6000. The operative orientation of FIGS. 169A and 169B is reached automatically without requiring user action following the stage shown in FIGS. 168A-168C.

In the operative orientation of FIGS. 169A and 169B, due to upward displacement of the SUPCAS 6030, the upper part of the outer drive shaft assembly 7400 no longer lies substantially above rim 6432 and is thus fully disengaged from blade 3550.

Additionally, pivotable lever-operated element 6640 is approaching its extreme upwardly rotated operative orientation relative to bottom assembly 6340. Concomitantly lever connecting element 6650, bottom lever element 6660, top lever element 6670, linkage element 6680 and activation pin element 6690 are each in a respective slightly less than upwardmost operative orientation.

It is appreciated that in this stage clamp elements 6620 are still in light clamping engagement with the rim 8010 of SUPCA 3100.

Reference is now made to FIGS. 170A and 170B, which are simplified respective pictorial and sectional view illustrations of an eleventh step in the operation of MMIDD 6000. The operative orientation of FIGS. 170A and 170B is reached automatically without requiring user action following the stage shown in FIGS. 169A and 169B.

Further upward displacement of pivotable clamp mounting element 6630 relative to SUPCAS 6030 causes corresponding upward displacement of clamp element 6620, such that shoulders 6752 of clamp elements 6620 are in engagement with shoulders 6496 of SUPCAS 6030. Clamp elements 6620 are thus rotated against the urging of springs 6634 out of engagement with the rim 8010 of SUPCA 3100.

At this stage a user can open the door of the upper housing assembly 6010 and remove SUPCA 3100 from the SUPCAS 6030.

It will be appreciated by persons skilled in the art that the present invention is not limited to what has been particularly shown and described hereinabove. The scope of the present invention includes both combinations and subcombinations of various features described hereinabove as well as modifications thereof, all of which are not in the prior art.

The invention claimed is:

1. A container suitable for machine processing of contents thereof in an upside-down orientation by a container contents processor, the container including:

a cup body; and a cup closure configured for operative engagement with the cup body, the cup closure including a single-use cover seal and externally rotatably drivable rotary engagement assembly (SUCSERDREA), the SUCSERDREA including:

a cover;

a lid, fixedly connected to the cover; and a container contents processor drivable, rotatable blade configured to be located within the cup body, the rotatable blade being arranged for rotation with respect to the cover, the rotatable blade including a rotatable static sealing portion;

said lid and said rotatable blade interacting to prevent leakage from said cup body when said container assembly is in said upside-down orientation by:

defining a seal having a first static sealing operative orientation, when the rotatable blade is not in rotation, and a second dynamic sealing operative orientation, different from the first static sealing operative orientation, when the rotatable blade is in rotation.

2. A container suitable for machine processing in an upside-down orientation according to claim 1 and wherein the cup body is prefilled with consumer usable contents prior to initial engagement of the cup closure therewith.

3. A container suitable for machine processing in an upside-down orientation according to claim 1 and wherein the seal is in the first static sealing operative orientation, when the rotatable blade in a first axial operative orientation, and the seal is in the second dynamic sealing operative orientation, when the rotatable blade is in a second axial operative orientation, different from the first axial operative orientation.

4. A container suitable for machine processing in an upside-down orientation according to claim 1 and wherein the blade includes a drive shaft engaging wall, a generally cylindrical wall, surrounding the drive shaft engaging wall and radially outwardly spaced therefrom, and a flexible radially outwardly and downwardly extending sealing skirt.

5. A container suitable for machine processing in an upside-down orientation according to claim 4 and wherein when the blade is lockingly but rotatably engaged with the lid, the sealing skirt sealingly engages an annular sealing surface of the lid.

6. A container suitable for machine processing in an upside-down orientation according to claim 5 and wherein when the blade is rotated relative to the lid, the sealing skirt is slightly spaced from the annular sealing surface by centrifugal force of rotation of the blade.

7. A container according to claim 1 and wherein the cup closure includes:

a reuse inhibiting portion having a first operative orientation, prior to the operative engagement thereof with the cup body, a second operative orientation, different from the first operative orientation, when in the operative engagement with the cup body, and a third operative orientation, different from the second operative orientation, subsequent to disengagement thereof from the cup body.

8. A container according to claim 7 and wherein the third operative orientation is different from the first operative orientation.

9. A container according to claim 7 and wherein the third operative orientation provides at least a human sensible indication of the cup closure having previously been in the second operative orientation, notwithstanding re-engagement thereof with the cup body subsequent to the disengagement thereof from the cup body.

10. A container according to claim 7 and wherein the third operative orientation provides at least a machine sensible indication of the cup closure having previously been in the second operative orientation, notwithstanding re-engagement thereof with the cup body subsequent to the disengagement thereof from the cup body.

11. A container according to claim 7 and wherein the reuse inhibiting portion has a fourth operative orientation, following processing engagement thereof with the container contents processor and subsequent disengagement thereof from the container contents processor, the fourth operative orientation being different from at least the first operative orientation and preventing subsequent processing engagement thereof with the container contents processor.

12. A container according to claim 11 and wherein the fourth operative orientation is different from at least two of the first, second and third operative orientations.

13. A container according to claim 7 and wherein:

the SUCSERDREA provides both human and machine sensible tamper-evident and re-use preventing fluid sealing engagement with the cup body, and the SUCSERDREA includes the reuse inhibiting portion.

14. A container according to claim 1 and wherein the SUCSERDREA also includes a machine-readable information source.

15. A container according to claim 1 and wherein the SUCSERDREA also includes an encrypted machine-readable information source.

16. A container according to claim 7 and wherein the reuse inhibiting portion includes a multifunctional tamper indicating and re-use prevention element (MTIRPE) integrally formed with the cover and a MTIRPE receiving portion (MTIRPERP) for interacting with the MTIRPE.

17. A container according to claim 16 and wherein the MTIRPERP includes an inner circumferential edge portion and an outer circumferential edge portion, which is generally radially spaced from the inner circumferential edge portion and is formed with at least one engagement window.

18. A container according to claim 17 and wherein when the reuse inhibiting portion is in the first operative orientation, the at least one engagement window is blocked, when the reuse inhibiting portion is in the second operative orientation, the at least one engagement window is open and when the reuse inhibiting portion is in the third operative orientation, the at least one engagement window is blocked.

* * * * *